United States Patent [19]

Swanstrom et al.

[11] 4,138,719

[45] Feb. 6, 1979

[54] AUTOMATIC WRITING SYSTEMS AND METHODS OF WORD PROCESSING THEREFOR

[75] Inventors: H. Wallace Swanstrom; Kenneth C. Campbell; Werner Schaer, all of Dallas, Tex.

[73] Assignee: Xerox Corporation, Stamford, Conn.

[21] Appl. No.: 622,780

[22] Filed: Oct. 15, 1975

[30] Foreign Application Priority Data

Nov. 11, 1974 [GB] United Kingdom .............. 48626/74

[51] Int. Cl.[2] .............................................. G06F 3/12

[52] U.S. Cl. .................................................... 364/200

[58] Field of Search ......................... 340/172.5; 444/1; 364/200 MS File, 300, 200

[56] References Cited

U.S. PATENT DOCUMENTS

| | | | |
|---|---|---|---|
| 2,853,696 | 9/1958 | Mendelson | 340/172.5 |
| 3,470,542 | 9/1969 | Trantanella | 364/200 X |
| 3,533,076 | 10/1970 | Perkins et al. | 340/172.5 |
| 3,533,078 | 10/1970 | Perkins et al. | 340/172.5 |
| 3,760,376 | 9/1973 | Tanner | 340/172.5 |
| 3,805,249 | 4/1974 | Rich | 340/172.5 |
| 3,815,104 | 6/1974 | Goldman | 364/200 |
| 3,973,244 | 8/1976 | Lovercheck et al. | 364/200 |

*Primary Examiner*—Raulfe B. Zache

[57] ABSTRACT

Automatic writing systems and methods of word processing therefor are provided in accordance with the teachings of the present invention wherein a central processor and a plurality of peripherals including at least keyboard means, printer means, buffer means and means for recording data on a record media are each connected to a common data bus, a common status bus and a common instruction word bus and a printer data storage peripheral means is connected to said common data bus and said common instruction word bus. Alphameric character data, format data, and function data may be entered from the keyboard and the presence of such data is indicated to the central processor on the common status bus. Upon receipt of a data presence condition, program control is initiated by the central processor calculated to achieve the designated function or functions with the alphameric or format data presented. The manner as asynchronous operation in data translation between a plurality of peripherals and a central processor enables a multitude of editing, revision, control and manipulation steps to be accomplished in the central processor under program control while allowing the overall automatic writing system to be highly flexible in operation and readily expandable.

119 Claims, 39 Drawing Figures

PRINTER DATA ROM

PROGRAM TIME DELAY

FIG. 13
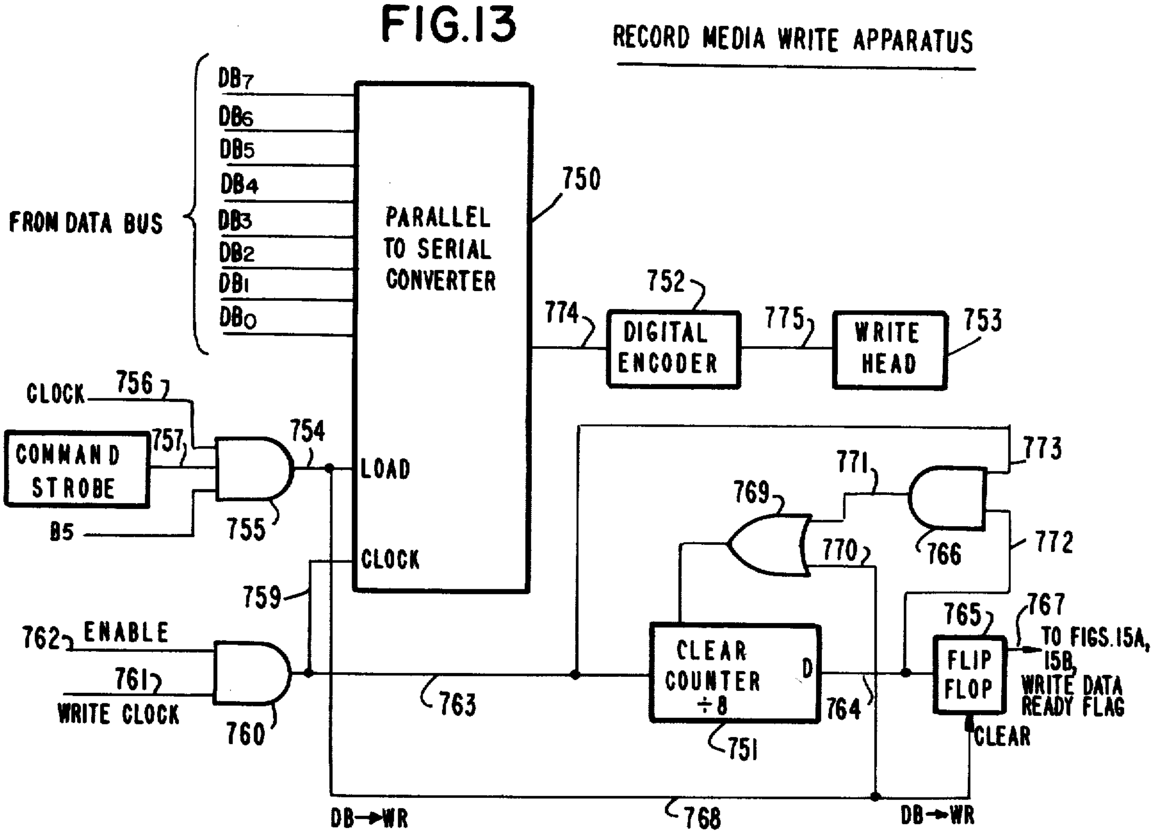
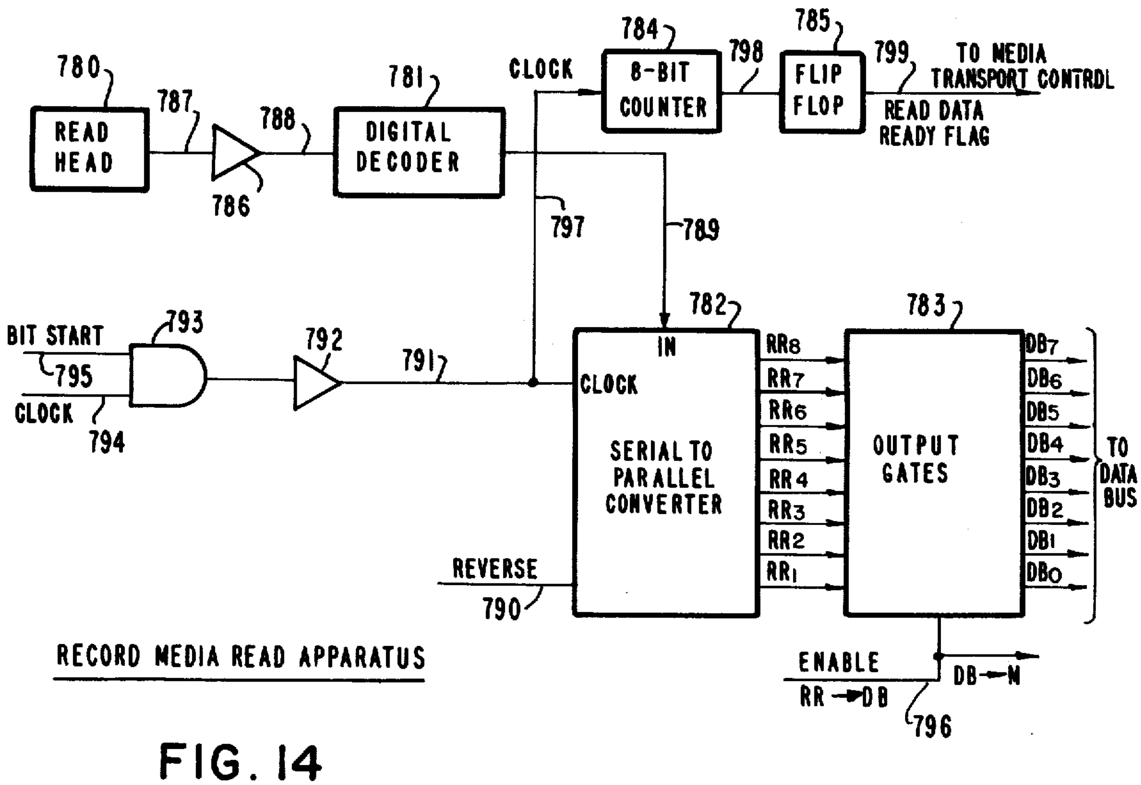
RECORD MEDIA READ APPARATUS
FIG. 14

THE "RIBBON ADVANCE" NUMBER (ACTUAL NUMBER ON DL 572 THROUGH DL 129) IS CALCULATED AS FOLLOWS $$\frac{\text{WT. OF LAST CHAR. (DEFD ESC.)} + \text{WT. OF CHAR. IN G7} - 4}{2}$$

NOTE:
STACK (REG $H_4$(TOP)-$H_7$
FOR TEMP. STORAGE OF
INSERTIONS OR MODIFICATION
DUE TO MGC RULES

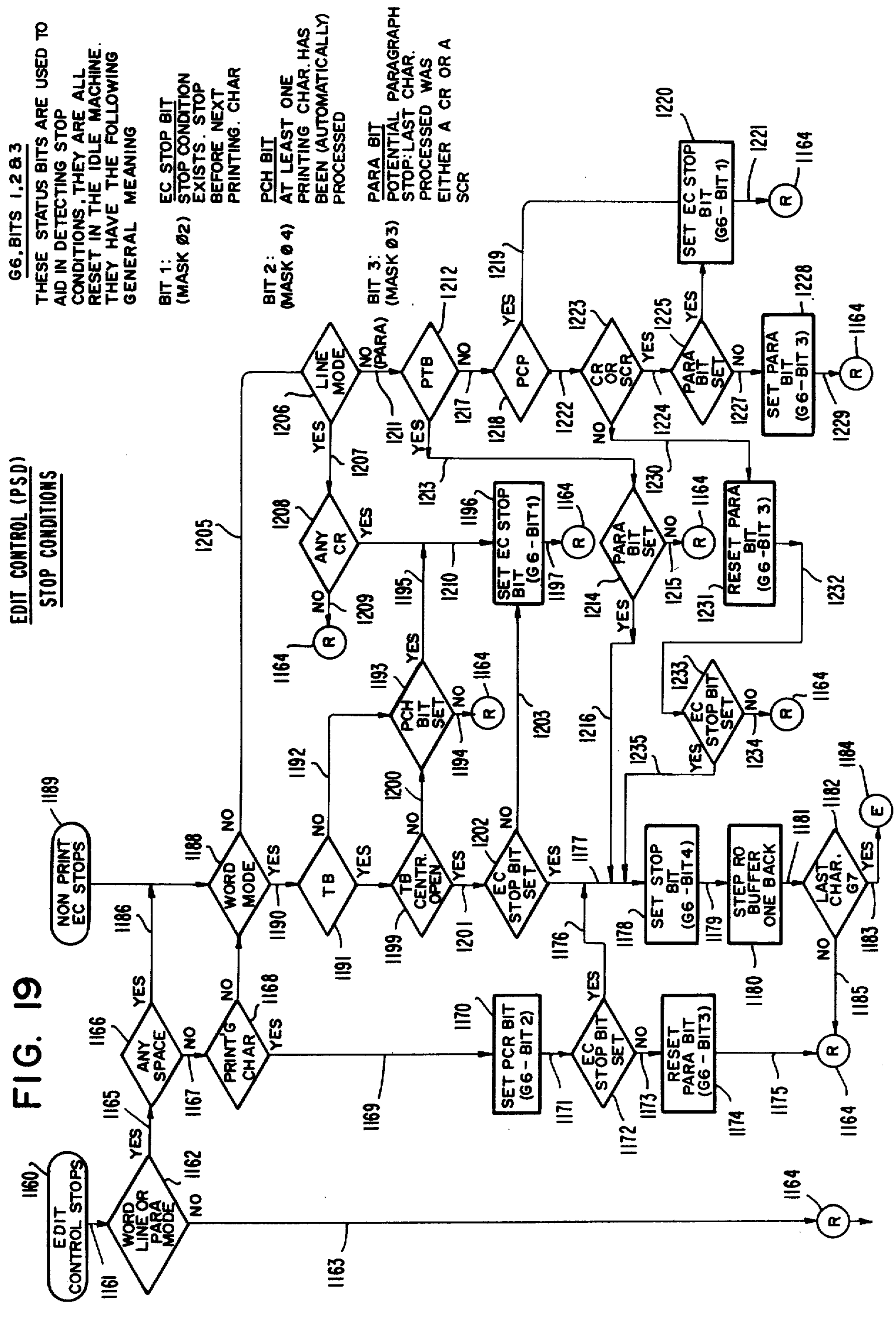
FIG. 19
EDIT CONTROL (PSD)
STOP CONDITIONS
G6, BITS 1, 2 & 3
THESE STATUS BITS ARE USED TO AID IN DETECTING STOP CONDITIONS. THEY ARE ALL RESET IN THE IDLE MACHINE. THEY HAVE THE FOLLOWING GENERAL MEANING
BIT 1: (MASK Ø2) EC STOP BIT STOP CONDITION EXISTS. STOP BEFORE NEXT PRINTING CHAR
BIT 2: (MASK Ø4) PCH BIT AT LEAST ONE PRINTING CHAR. HAS BEEN (AUTOMATICALLY) PROCESSED
BIT 3: (MASK Ø3) PARA BIT POTENTIAL PARAGRAPH STOP: LAST CHAR. PROCESSED WAS EITHER A CR OR A SCR
EDIT CONTROL STOPS
WORD LINE OR PARA MODE
ANY SPACE
PRINT'G CHAR
NON PRINT EC STOPS
WORD MODE
TB
TB CENTR. OPEN
EC STOP BIT SET
PCH BIT SET
LINE MODE
ANY CR
SET EC STOP BIT (G6-BIT1)
PTB
PCP
CR OR SCR
PARA BIT SET
SET PARA BIT (G6-BIT 3)
RESET PARA BIT (G6-BIT 3)
SET PCR BIT (G6-BIT2)
RESET PARA BIT (G6-BIT3)
SET STOP BIT (G6-BIT4)
STEP RO BUFFER ONE BACK
LAST CHAR. G7
YES
NO
NO (PARA)
R
E

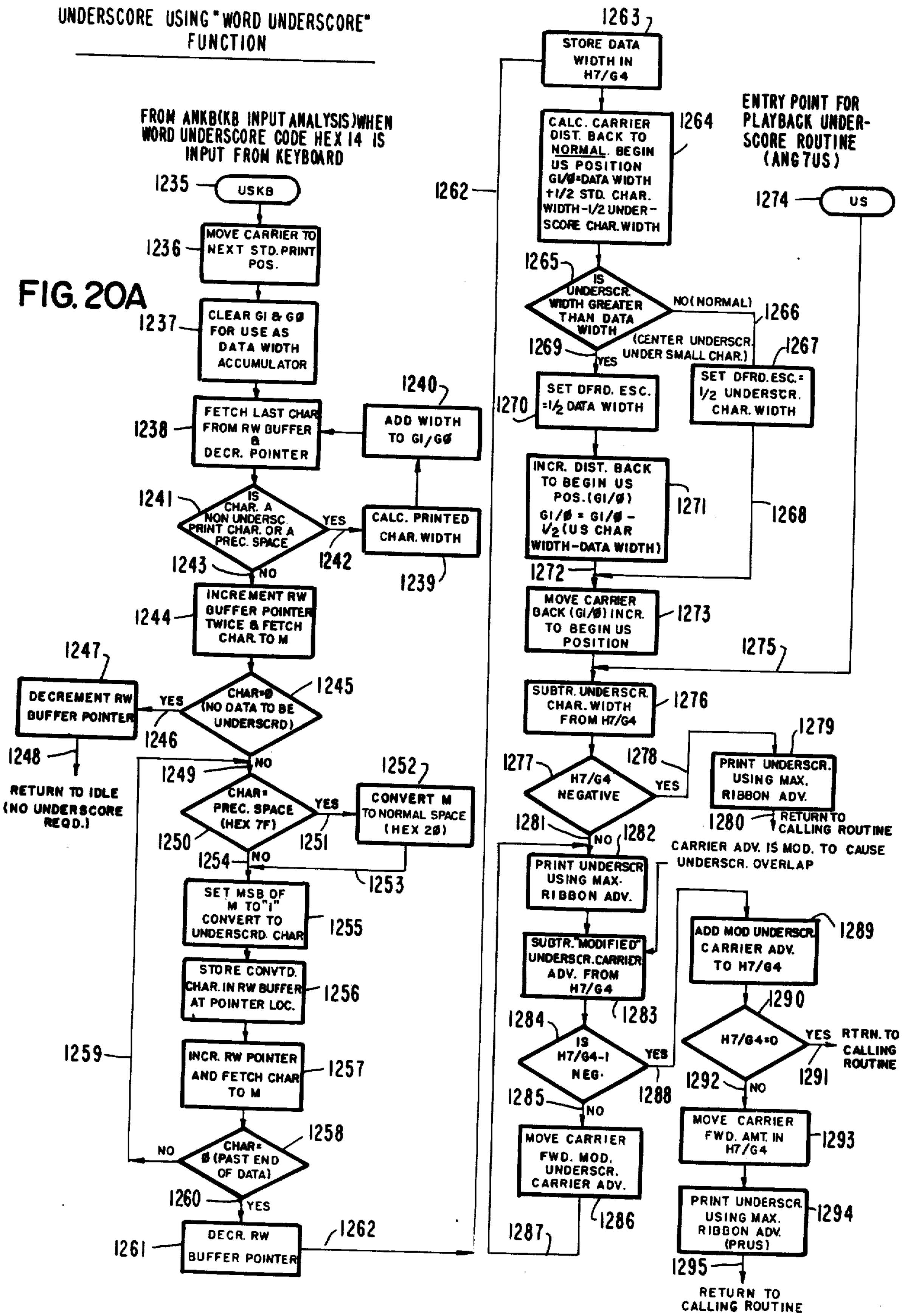
UNDERSCORE USING "WORD UNDERSCORE" FUNCTION
FIG. 20A
FROM ANKB(KB INPUT ANALYSIS) WHEN WORD UNDERSCORE CODE HEX 14 IS INPUT FROM KEYBOARD
USKB
MOVE CARRIER TO NEXT STD. PRINT POS.
CLEAR G1 & GØ FOR USE AS DATA WIDTH ACCUMULATOR
FETCH LAST CHAR FROM RW BUFFER & DECR. POINTER
ADD WIDTH TO G1/GØ
IS CHAR. A NON UNDERSC. PRINT CHAR. OR A PREC. SPACE
YES
CALC. PRINTED CHAR. WIDTH
NO
INCREMENT RW BUFFER POINTER TWICE & FETCH CHAR. TO M
CHAR=Ø (NO DATA TO BE UNDERSCRD)
DECREMENT RW BUFFER POINTER
RETURN TO IDLE (NO UNDERSCORE REQD.)
CHAR= PREC. SPACE (HEX 7F)
CONVERT M TO NORMAL SPACE (HEX 2Ø)
SET MSB OF M TO "1" CONVERT TO UNDERSCRD. CHAR
STORE CONVTD. CHAR. IN RW BUFFER AT POINTER LOC.
INCR. RW POINTER AND FETCH CHAR TO M
CHAR= Ø (PAST END OF DATA)
DECR. RW BUFFER POINTER
STORE DATA WIDTH IN H7/G4
CALC. CARRIER DIST. BACK TO NORMAL. BEGIN US POSITION G1/Ø=DATA WIDTH +1/2 STD. CHAR. WIDTH-1/2 UNDER-SCORE CHAR. WIDTH
ENTRY POINT FOR PLAYBACK UNDER-SCORE ROUTINE (ANG7US)
US
IS UNDERSCR. WIDTH GREATER THAN DATA WIDTH
NO (NORMAL)
(CENTER UNDERSCR. UNDER SMALL CHAR.)
SET DFRD. ESC. =1/2 DATA WIDTH
SET DFRD. ESC.= 1/2 UNDERSCR. CHAR. WIDTH
INCR. DIST. BACK TO BEGIN US POS. (G1/Ø) G1/Ø = G1/Ø - 1/2 (US CHAR WIDTH-DATA WIDTH)
MOVE CARRIER BACK (G1/Ø) INCR. TO BEGIN US POSITION
SUBTR. UNDERSCR. CHAR. WIDTH FROM H7/G4
H7/G4 NEGATIVE
PRINT UNDERSCR. USING MAX. RIBBON ADV.
RETURN TO CALLING ROUTINE
CARRIER ADV. IS MOD. TO CAUSE UNDERSCR. OVERLAP
PRINT UNDERSCR USING MAX. RIBBON ADV.
SUBTR. "MODIFIED" UNDERSCR. CARRIER ADV. FROM H7/G4
IS H7/G4-1 NEG.
MOVE CARRIER FWD. MOD. UNDERSCR. CARRIER ADV.
ADD MOD UNDERSCR CARRIER ADV. TO H7/G4
H7/G4=0
RTRN. TO CALLING ROUTINE
MOVE CARRIER FWD. AMT. IN H7/G4
PRINT UNDERSCR USING MAX. RIBBON ADV. (PRUS)
RETURN TO CALLING ROUTINE
1235 1236 1237 1238 1239 1240 1241 1242 1243 1244 1245 1246 1247 1248 1249 1250 1251 1252 1253 1254 1255 1256 1257 1258 1259 1260 1261 1262 1263 1264 1265 1266 1267 1268 1269 1270 1271 1272 1273 1274 1275 1276 1277 1278 1279 1280 1281 1282 1283 1284 1285 1286 1287 1288 1289 1290 1291 1292 1293 1294 1295

① HY, PREC. HY., SPACE CENTERING, FL. FIND, CR, SCR, PREC. CR, PREC. SCR, TAB & PREC. TAB

⊗ REFER TO PLAY/SKIP/DUP FUNCT. FLOW CHART FOR THESE ENTRY POINTS

FETCH CHAR: THIS ROUTINE FETCHES NEXT CHAR. FROM RO BUFFER (INCL. SECOND CH. IF ANY. ALL FILL CHAR. ARE SKIPPED. IF AT END OF DATA A NEW BLOCK ("LINE") OF DATA IS READ FROM MEDIA INTO RO BUFFER.

KEYBD. INPUT CONVERSION ROUTINE (CALLED FROM IDLE FOR ALL KEYBD. ENTRIES "UNLESS IN JUSTIFY" OR "MARGIN CONTROL SINGLE CYCLE" MODES)

MANUAL MARGIN CONTROL

BREAK PT. CHARACTERS

TB (IF TB CTR OPEN)
PTB
FL
CR
SCR
PCR
SP (ONLY 1ST IN SERIES)
HY
PHY
HLT (T-STOP)
NRS (STOP)
FMT (CODE Q)
CEN
EJT
EOR
BMK

EXECUTION OF CENTERING CODE IN PLAYBACK MODE (SEE "PLAY/SKIP/DUP" FLOW OPERATION LABELLED "EXECUTE FUNCTION OF CODE IN G7)

⚠ CENTERING BREAK POINTS ARE: ANY TAB, ANY CARRIAGE RETURN, OR A CENTERING CODE

CARRIAGE POSITION ADJUSTMENT FOR "RIGHT FLUSH" AND COLUMN CENTERING" DATA DURING PLAYBACK

ǂ04
ǂMG:1284
TB 7ǂ: 24 32 42 47 57 62 72
FINANCIAL REPORT.

AUTOMATIC WRITING SYSTEMS AND METHODS OF WORD PROCESSING THEREFOR

TABLE OF CONTENTS

Abstract of the Disclosure
Brief Summary
General Description
Detailed Description of an Exemplary Embodiment
- The Typewriter Configuration
- The Typewriter Configuration Interface
- The Printer Data ROM
- The Buffer and Miscellaneous Storage Apparatus
- The Record Media Transport Apparatus
- The Program Time Delay Peripheral
- The Microprocessor Apparatus The Processing and Computational Portions of the Microprocessor
- The Common Data Bus
- The Common Instruction Word and Status Buses The Subsystems and Programming
The ROM Address Register
The Return Address Register
The Read Only Memory
The Printer Unit
The Printer Interface
- The Data Section
- The Command Strobe Section The Printer Data ROM
- Table I
- Table II The Keyboard Configuration
- The Standard Keyboard Array
- The Mode Control Keys
- The Action Keys
- The Encoded Functions The Keyboard Interface
- The Status Conditions Monitored The Data Conveyed To and From the Common Data Bus
The Ram Peripheral
Record Media Transport Stations
- The Record Media Write Apparatus
- The Record Media Read Apparatus Record Media Transport Control Apparatus
- FIG. 15A
- FIG. 15B The Flow Charts
- System Idle Routine
- Escapement and Character Printing
- Play, Skip and Duplicate Functions
- Edit Control Stop Conditions
- Word Underscore
- Underscoring During Playback
- Playback Mode of Margin Control
- Manual Mode of Margin Control
- Justification
- High Speed Print Mode of Playback
- Line Centering Operations
- Line Centering Upon Playback
- Column Centering and Right Flush
- "Auto Log" Printout Mode
- Print Text String Search Conclusion
Appendices A–G This invention relates to word processing methods and apparatus employing data processing techniques and more particularly to improvements in the automatic writing techniques and systems disclosed in U.S. patent application Ser. Nos. 429,479 and 430,130, each application being filed in the names of Harry W. Swanstrom, Werner Schaer and Kenneth C. Campbell, on Jan. 2, 1974 and assigned to the Xerox Corporation.

In U.S. patent application Ser. Nos. 429,479 and 430,130 there is disclosed automatic writing systems and techniques therefor wherein, a central processor and a plurality of peripherals cooperate to form a highly flexible and versatile word processing system. According to a preferred embodiment, the plurality of peripherals include at least a keyboard, a printer unit, a buffer and a transport station for recording data on a record media. The central processor and each of the plurality of peripherals are each connected to a common data bus, a common status bus and a common instruction word bus, through which the word processing system as a whole is controlled and data is conveyed and processed among the various peripherals. Automatic system control is exercised pursuant to operator instructions by the control processor which is disclosed in specie in U.S. patent application Ser. No. 430,130, supra, while the system as a whole is set forth in U.S. patent application Ser. No. 429,479, supra, and the disclosures of each of these applications is incorporated herein by reference so that recourse to these applications may be had for appropriate description of common functions and modes of operation to thereby avoid the lengthy recitation thereof in this specification.

Briefly, however, upon the initiation of a power up cycle of operation, the central processor begins automatic sequencing through its fixed program, the initial positions of which are devoted to an initializing of the system to prepare it for subsequent word processing operations. During this period, a read only memory within the central processor is sequentially addressed and as each instruction is issued the address is incremented by one to obtain the next sequential instruction. Upon the completion of an initializing of the system, a monitoring loop is entered whereupon the central processor awaits the occurrence of an event at the keyboard and upon a detection of such an event a branch or jump instruction issues to cause addressing to shift to a program routine calculated to achieve appropriate processing in response to the event which occurred. Alphanumeric character data, format data and function data may be entered from the keyboard and the presence of such data is indicated to the central processor on the common status bus. Upon receipt of a data presence condition, program control is initiated by the central processor to achieve the designated function of functions with the alphameric or format data presented. The program control of each peripheral by the central processor is carried out on the common instruction word bus while the degree of completion of the command issued to a peripheral is indicated to the central processor on the common status bus. Data is conveyed among the peripherals and the central processor through the common data bus for example, in a record mode, alphameric data entered at the keyboard is placed on the common data bus and entered on a per character basis into the central processor. Thereafter such data is again placed on the common data bus and applied on a per character basis to the printer and buffer under program control. When a line of characters has been entered into the buffer, the contents of the buffer are recorded, again under program control, and each character to be recorded is first loaded into the central processor and is thereafter applied to the transport station for recording purposes. Conversely, in a playback mode, a line of characters is read from the record media and loaded into the buffer. Thereafter, each character loaded is applied to the printer unit, under program control, with the transfer of each character taking place through and under the control of the central processor. This manner of asynchronous operation in data translation between a plurality of peripherals and a central processor enables the automatic writing systems disclosed in U.S. patent application Ser. Nos. 429,479 and 430,130 to perform a multitude of editing, revision, control and manipulation steps within the central processor, under program control, while allowing the overall automatic writing system formed to be highly flexible in operation and readily expandable.

Through the utilization of additional memory and dedicated, special purpose peripherals, the automatic writing systems and techniques disclosed in U.S. patent application Ser. Nos. 429,479 and 430,130 may be improved so that additional word processing features, enhanced speed and printing characteristics as well as advanced levels of operator convenience and ease of operation, heretofore unavailable in word processing equipments conventionally accessible in the market place may be provided. Thus, since the subject automatic writing system employs an independent printer unit in the form of a peripheral whose printing functions, indexing functions and escapement and other carriage displacement functions are independent of the keyboard, the printer unit may be controlled by the automatic writing system in such manner that both variable pitch and proportionally spaced printing is selectively available at the option of the operator. Similarly where high speed printing from a prerecorded media is required without an attendant requirement for editing, such high speed printing may selectively occur under program control in both a forward and reverse direction wherein alternate lines are printed in opposite directions so that the time required for the printing of prerecorded material is not wasted by unnecessary carriage return operations and the like. In like manner, overall print speed characteristics may be enhanced by deferring execution of escapement associated with space code characters and the like until a next alphameric character is entered whereupon the total displacement associated with both the space code character and that required prior to the printing of the alphameric character may be executed at once to avoid repetitive, adjacent escapement operations and the loss of time attending such repetitive operations.

Additional memory may also be relied upon to enhance operator convenience as well as the overall utility of the automatic writing system. For example, automatic modes of underscoring may be provided wherein designated groupings of alphameric character information such as one or more words or a line of information are automatically underscored, under program control. Additionally, memory backspace may be provided to not only erase a previously entered character from memory but to also precisely reposition the carriage at the printer to accept corrected character information. This is highly advantageous to an operator where proportional spaced printing is selected as it obviates a need for repetitive, manual carriage positioning operations and similar advantages will also obtain where backspacing over a tab entry or the like occurs. Similarly, line information may be entered without special placement during a record mode operation together with appropriate designator codes and automatically centered, under program control, upon playback while columnar information may be entered from the left-hand portion of defined columns together with appropriate designator codes without special placement during a record mode operation and upon playback, automatically centered and/or printed in a right-flush manner so that such columnar data is aligned adjacent to the right-hand portions of the columns defined. Further, although margin control functions upon the playback of prerecorded documents has been known in conventional word processing equipment, additional memory capability may be utilized to extend the margin control function to straight typing or recording modes of data entry so that in this mode, an operator need not be concerned with the right hand margin defined but instead may merely enter data on a continuous basis while the automatic writing system acts independently to automatically insert carriage return information and the like at appropriate locations so that the right hand margin will be honored and reflected on the document initially printed. Similarly during the playback of a prerecorded record media, document information may be printed in a justified format so as to exhibit a uniform right hand margin and the manner and extent to which word spaces are modified, under program control, to achieve such justified format may be rendered controllable by the operator.

An increase in memory capability over that set forth in U.S. patent application Ser. Nos. 429,479 and 430,130 supra, may also be employed to provide enhanced operator convenience through the provision of specialized functions which add to the overall utility and ease of word processing within the automatic writing system. For instance, blocks of format information may be recorded which not only include the usual margin and tab stop information for data to be recorded, but in addition thereto title or other information descriptive of the following document information may be recorded therewith and a mode of operation provided where a reading and printing of only blocks of format information takes place. This would mean that for record media recorded in this manner, an operator could quickly, easily and automatically obtain a print out or log in the form of a listing of the title or other descriptive information representing the data present on a record media. Similarly, although access to pages of document information on a record media is available in conventional word processing equipment as is the indescriminate accessing of paragraphs, lines, words and characters of information without regard to content within a given page, a mode of operation may be made available wherein an operator may define a precise string of text located within a page of information and the automatic writing system may locate or search to a point at which that string of text is initiated to thereby provide data accessing capabilities which may descriminate in regard to substance as well as gramateral structure.

Embodiments of automatic writing systems employing magnetic cards as a recording medium may be provided with a capability to search to a given recording track thereon as well as to step a descrete number of tracks in either direction to more readily facilitate editing operations. Furthermore, in embodiments of automatic writing systems employing magnetic cards as a recording medium, during modes of operation wherein entered, non printing codes are being selectively printed, the track upon which printing is taking place may be automatically printed at end of the line being entered thereon to thereby enhance the utility of draft copy and to provide increased ease in the subsequent retrieval of information on a selective basis.

Automatic processing features within an automatic writing system may also be enhanced to increase operator efficiency. For instance, switch codes, search codes and switch and search codes are known to permit batched letter operations to be performed. In such batched letter operations a constant letter format recorded on one record media is employed in combination with an address list recorded on a second record media to automatically prepare an individually addressed form letter to each addressee listed on the second record media through conventional word processing techniques. However, the addition of recordable Switch and Skip codes and functions as well as recordable Skip Off codes and functions for terminating an initiated skip operation would also enable the address information recorded on the second record media to be employed in the preparation of printed envelopes for the batched letters prepared to thereby enhance the overall utility of the automatic writing system under consideration.

Therefore, it is an object of this invention to provide improved automatic writing systems for word processing applications and the like.

It is a further object of this invention to provide an improved automatic writing system exhibiting enhanced speed and printing characteristics as well as advanced levels of operator convenience and ease of operation.

It is an object of this invention to provide an automatic writing system capable of selectively performing variable pitch and proportionally spaced printing operations.

It is an additional object of this invention to provide an automatic writing system having a selective playback mode for prerecorded information wherein alternate lines of information are ordinarily printed in opposite directions to avoid time consuming carrier return operations and the like.

It is a further object of this invention to provide an improved automatic writing system wherein print speed is increased during selected playback modes of operation by deferring the execution of carriage escapement in response to space codes and the like until a next alphameric character is entered whereupon the total displacement associated with both the space code character and that required prior to the printing of the alphameric character may be executed at once to avoid repetitive operations.

It is another object of this invention to provide an automatic writing system capable of performing automatic underscoring operations upon designated groupings of information during a data entry mode of operation.

It is a further object of this invention to provide an improved automatic writing system having a memory backspace function which acts to automatically reposition the printer to a location corresponding to an appropriate entry position for the next character to be entered upon on enabling of said memory backspace function.

It is an additional object of this invention to provide an automatic writing system capable of automatically centering during playback, recorded line information entered without special placement.

It is a further object of this invention to provide an automatic writing system responsive to defined columns, columnar data and designator codes for automatically centering, upon playback, recorded columnar data within the associated columns defined.

It is another object of the instant invention to provide an automatic writing system responsive to defined columns, columnar data entered from the left-hand portion of each column defined and designator codes for automatically printing, upon playback, recorded columnar data flush to the right-hand portion of an associated column.

It is an additional object of the present invention to provide an improved automatic writing system exhibiting a margin control mode of operation operable during data entry which is responsive to data entered from the keyboard to cause such data to be printed and to insert carriage return codes where appropriate to achieve printing of entered data in accordance with established margins.

It is a further object of the present invention to provide an automatic writing system capable of printing recorded text in a justified format exhibiting a uniform right-hand margin and permitting an operator to selectively control the limits of spaces inserted between words, under program control, to achieve such justified format.

It is another object of the instant invention to provide an improved automatic writing system capable of recording title and other descriptive information within blocks of format information and upon initiation of a special playback mode to cause printing of only information contained in said blocks of format information and thus provide a log of recorded information.

It is an additional object of the present invention to provide an automatic writing system having a search mode of operation wherein a string of recorded text may be defined at the keyboard and said automatic writing apparatus conducts a search of a page of recorded information to the beginning of the text string defined.

It is a further object of the present invention to provide an improved automatic writing system wherein embodiments thereof relying upon magnetic cards as a recording medium have the capability to search to a given track on said magnetic card as well as the ability to step to adjacent tracks in either direction.

It is another object of the instant invention to provide an automatic writing system having embodiments employing a magnetic card as a recording medium and a mode in which entered non-printing codes are selectively printed, the mode in which entered non-printing codes are selectively printed in a record mode of operation additionally causing the track number upon which printing is taking place to be automatically printed at the end of the line being entered thereon.

It is an additional object of the instant invention to provide an improved automatic writing system having recordable switch and skip and skip-off codes and responsive thereto to shift a playback operation from one record media to another and to skip over the information recorded thereon until a skip-off code is read whereupon playback and printing is resumed.

Various other objects and advantages of the instant invention will become clear from the following description of several exemplary embodiments thereof, and the novel features will be particularly pointed out in connection with the appended claims.

BRIEF SUMMARY

In accordance with a preferred embodiment of this invention an automatic writing system is provided wherein a central processor and a plurality of peripherals including at least keyboard means, printer means, buffer means and means for recording data on a record media are each connected to a common data bus, a common status bus and a common instruction word bus and a printer data storage peripheral means is connected to said common data bus and said common instruction word bus; alphameric character data, format data, and function data may be entered from the keyboard and the presence of such data is indicated to the central processor on the common status bus; upon receipt of a data presence condition, program control is initiated by the central processor calculated to achieve the designated function or functions with the alphameric or format data presented; program control of each peripheral by the central processor is carried out on the common instruction word bus while the degree of completion of the command issued to a peripheral, if required, is indicated to the central processor on the common status bus; data is conveyed among the peripherals and the central processor through the common data bus; in a record mode, for example, alphameric data entered at the keyboard is placed on the data bus and entered on a per character basis in the central processor, thereafter such data is again placed on the data bus and applied on a per character basis to the printer data storage peripheral means and the buffer means, each character applied to the buffer means is stored therein for accumulation purposes while the printer data storage peripheral means is responsive to such character data to apply character print information appropriate to the variable pitch or proportional spaced printing mode selected to the common data bus for initial application to the central processor and subsequent application through the common data bus to the printer means; when a line of character information has been accumulated in the buffer means, the contents of the buffer means is recorded, again under program control, wherein each character to be recorded is first loaded into the central processor and thereafter applied to said means for recording; conversely, in a playback mode, a line of characters is read from the record media and loaded into the buffer means; thereafter, each character loaded is applied to the printer data storage peripheral means with the transfer of each character taking place through and under the control of the central processor; the printer data storage peripheral means is reponsive to each character received to apply corresponding character print information appropriate to the variable pitch or proportional spaced printing mode selected through the common data bus for initial application to the central processor and subsequent application through the common data bus to the printer means under program control with the transfer of each character taking place through and under the control of the central processor; this manner of asynchronous operation in data translation between a plurality of peripherals and a central processor enables a multitude of editing, revision, control and manipulation steps to be accomplished in the central processor under program control while allowing the overall automatic writing system to be highly flexible in operation and readily expandable.

The invention will be more clearly understood by reference to the following detailed description of an exemplary embodiment thereof in conjunction with the accompanying drawings in which.

Figure 1:
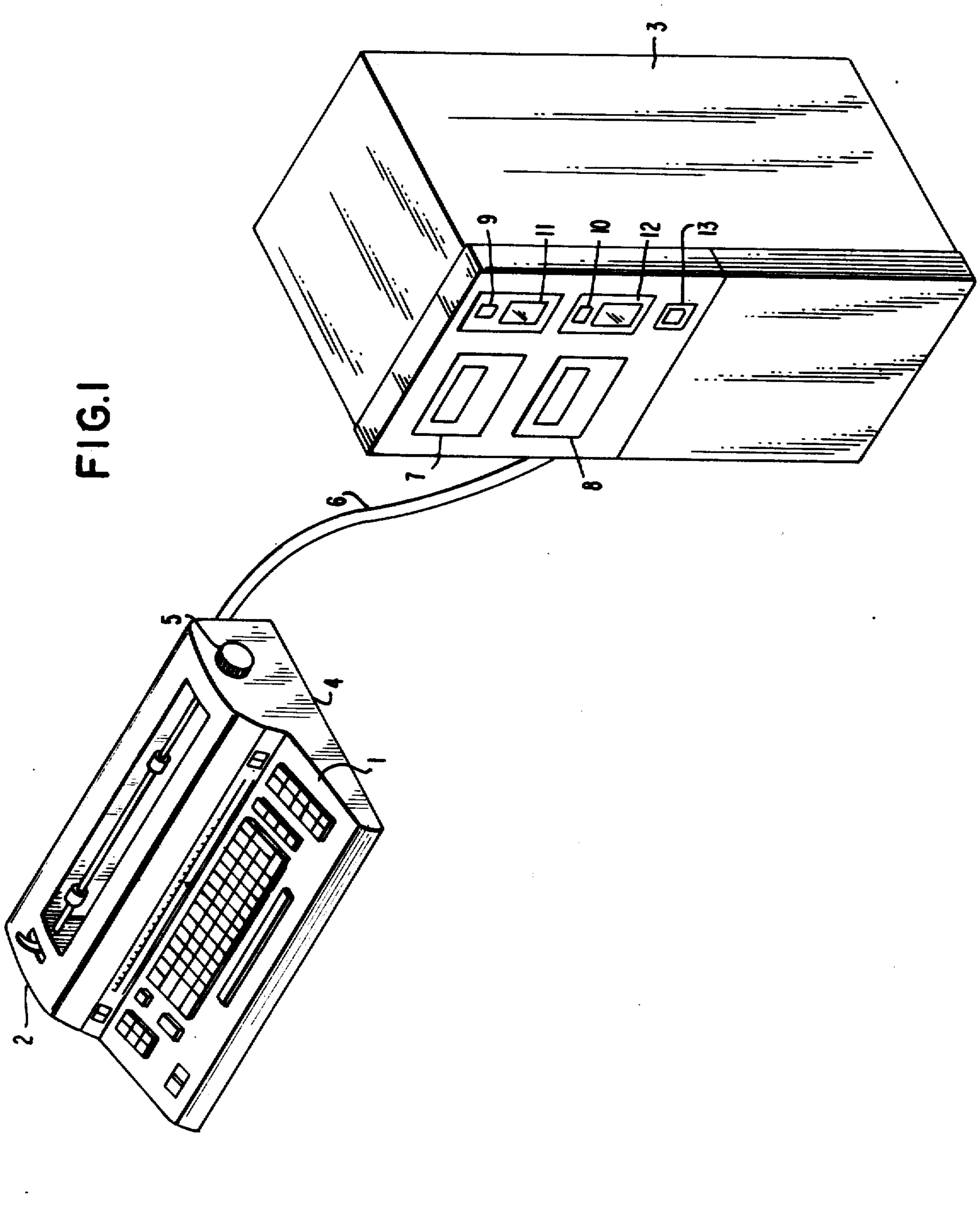
FIG. 1 is a pictorial view of an embodiment of an automatic writing system in accordance with the teachings of the present invention.
Figure 2:
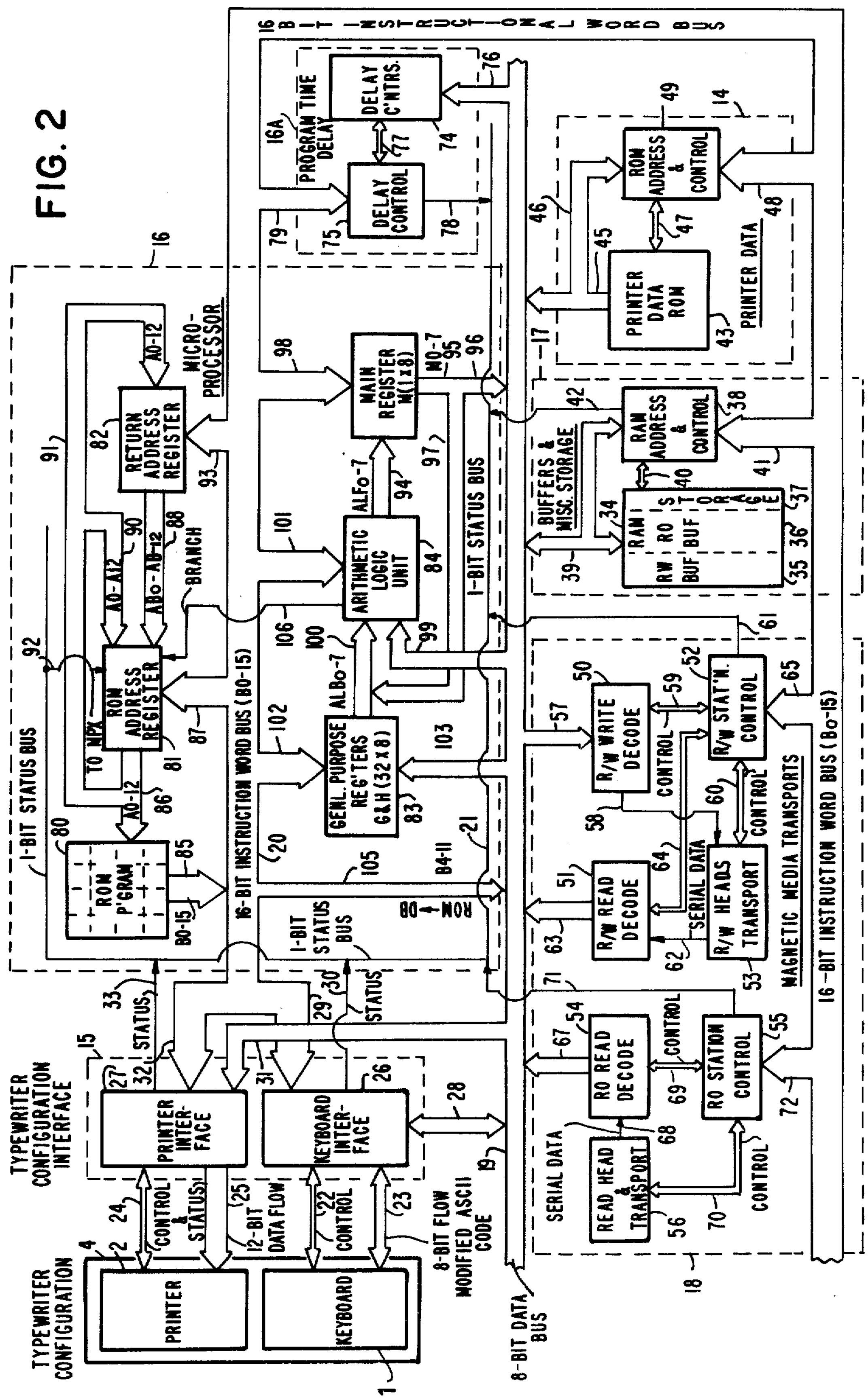
FIG. 2 is a block diagram which schematically illustrates the overall apparatus contained in the embodiment of the invention depicted in FIG. 1.
Figure 3:
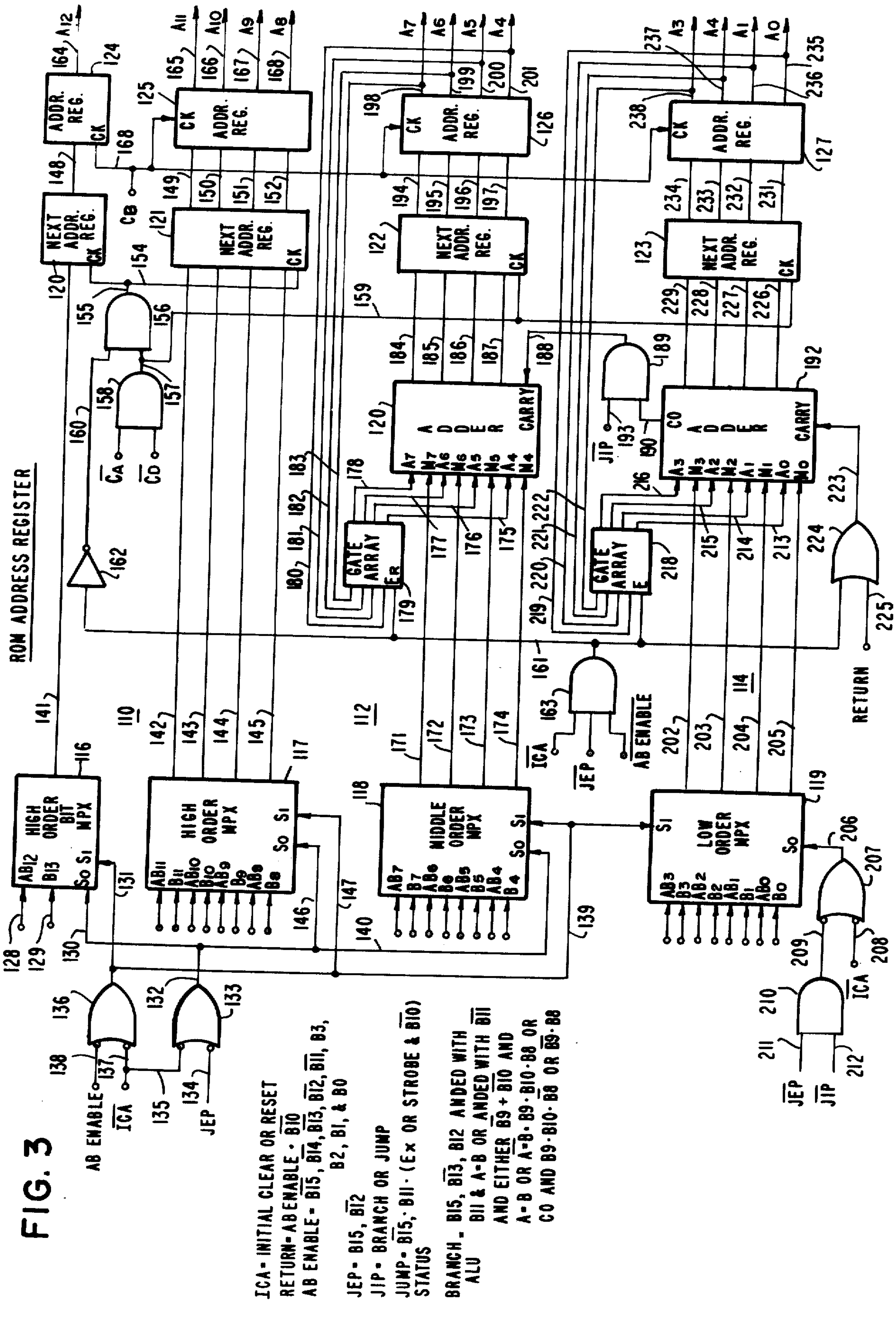
FIG. 3 is a block diagram schematically illustrating an exemplary ROM address register suitable for incorporation into the embodiment of the automatic writing system depicted in FIG. 1 and more particularly into the microprocessor portion of the apparatus depicted in FIG. 2.
Figure 7:
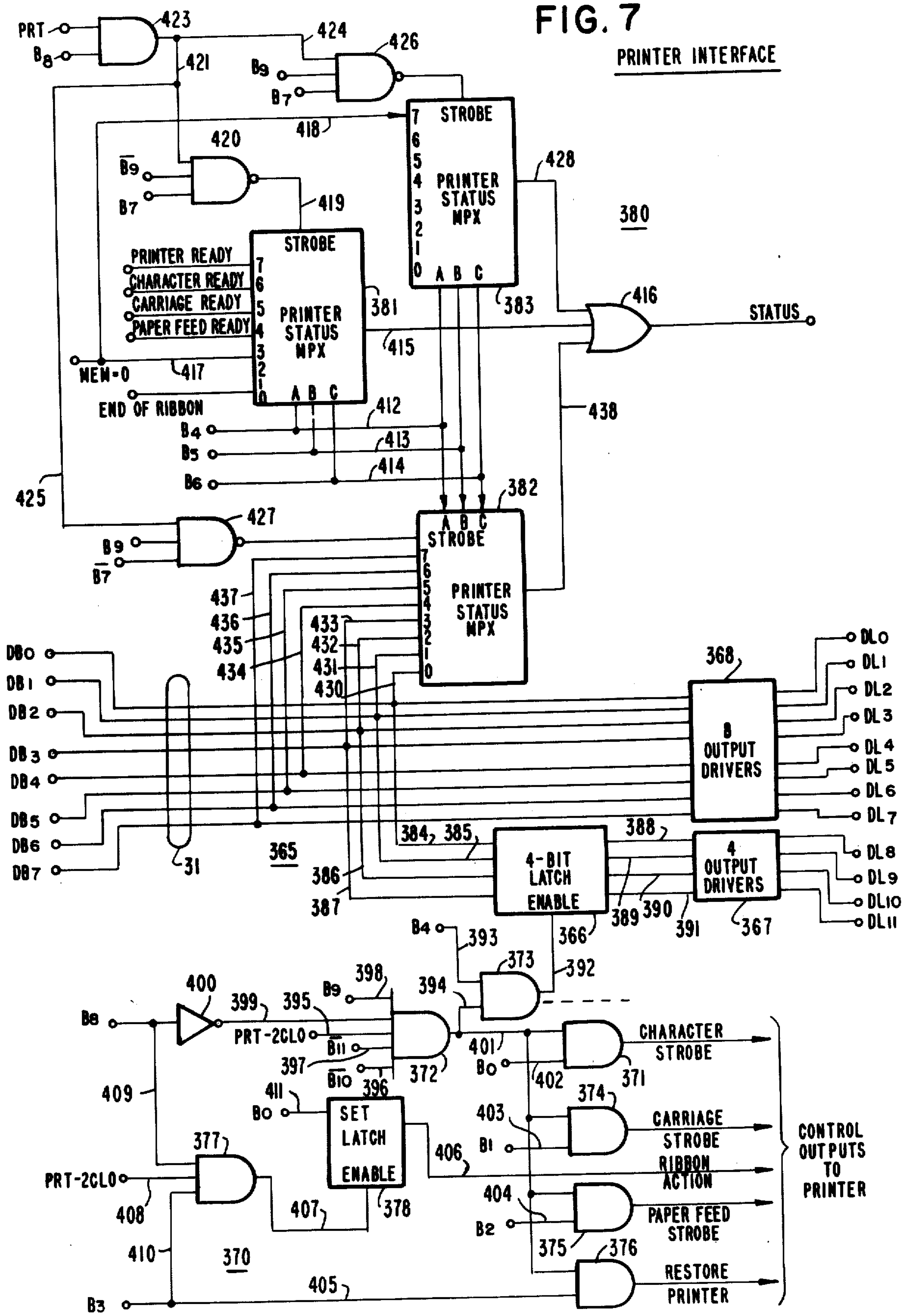
Figure 8:
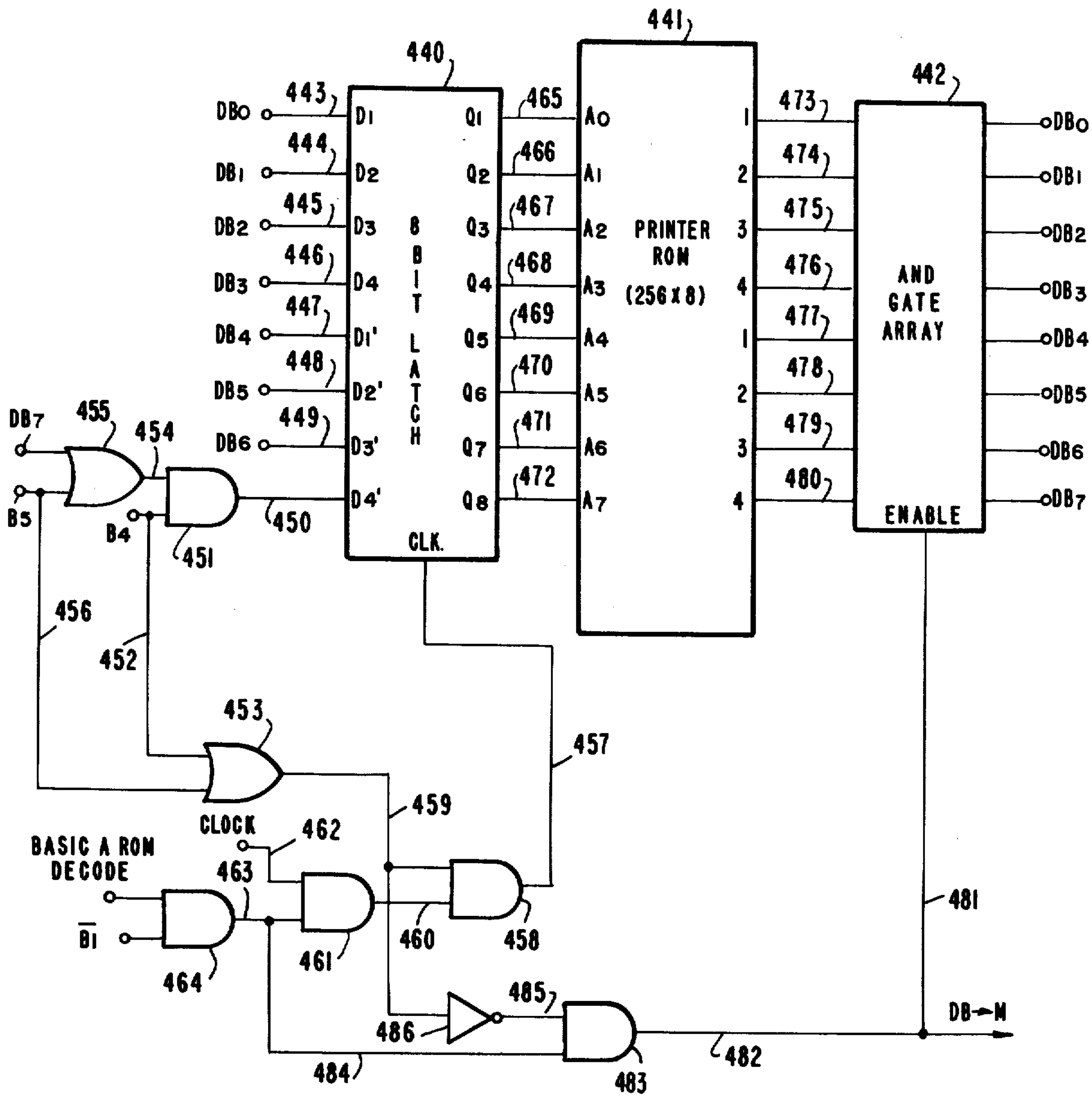
Figure 9A:
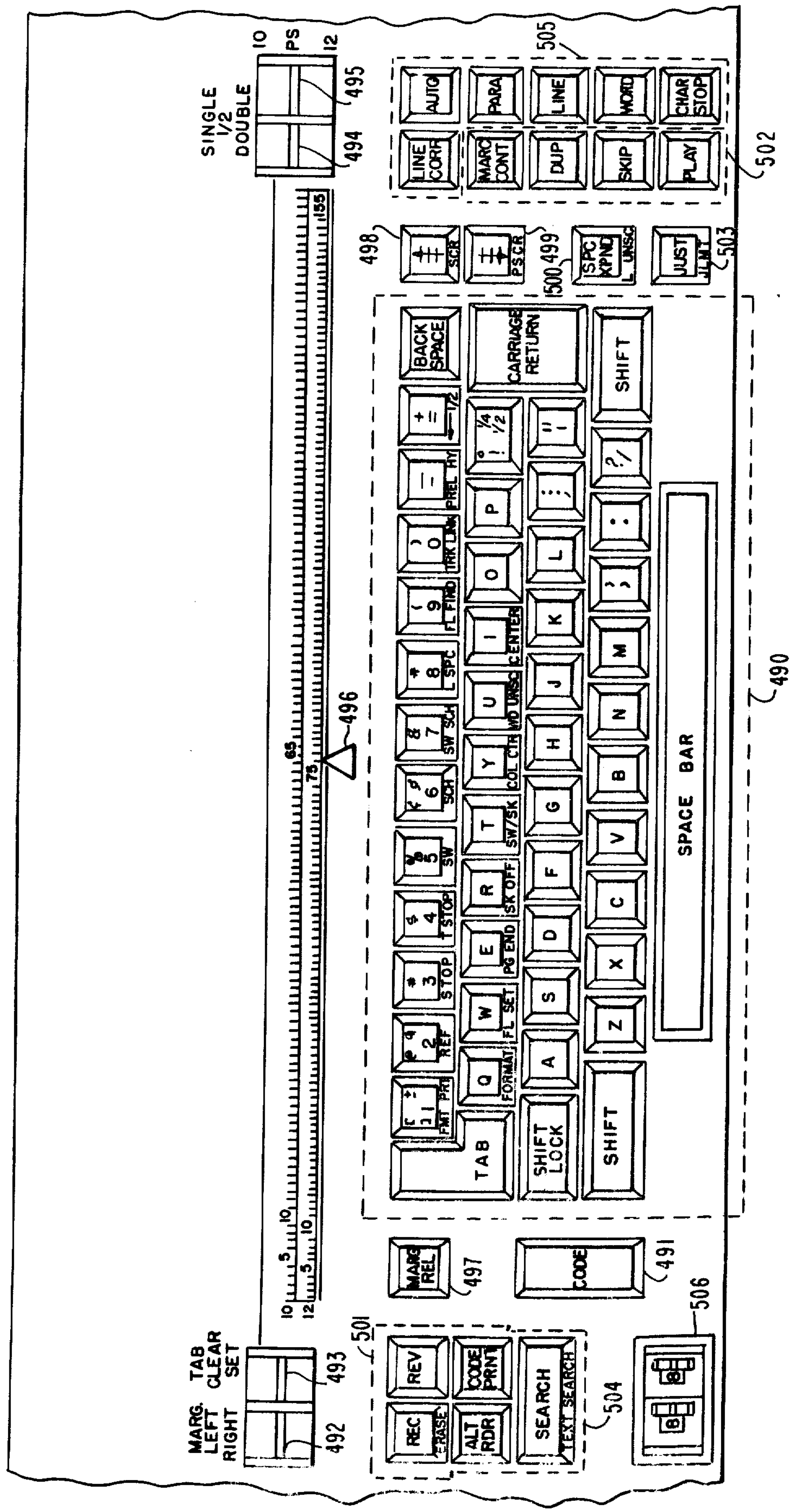
Figure 9B:
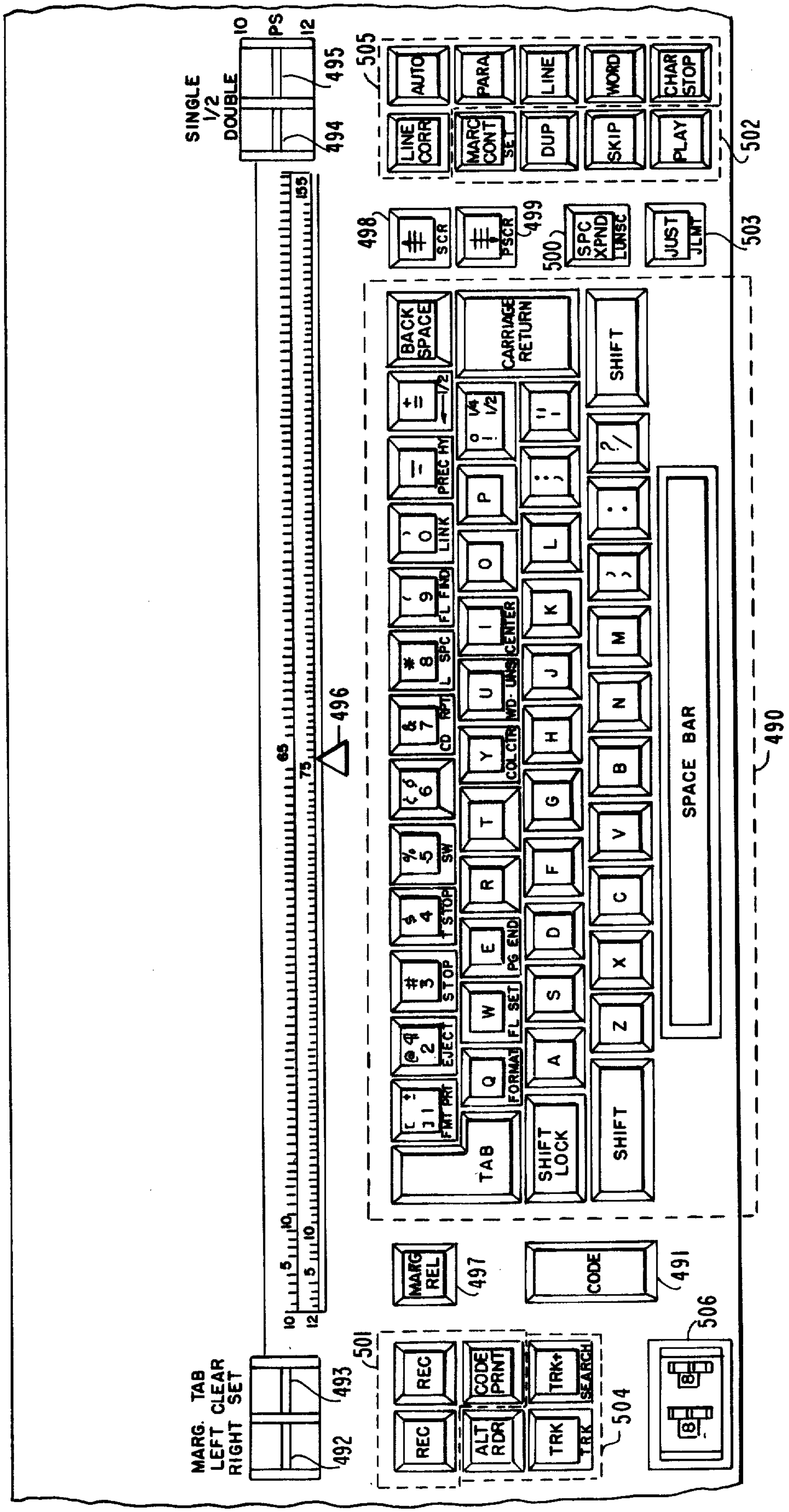
Figure 10:
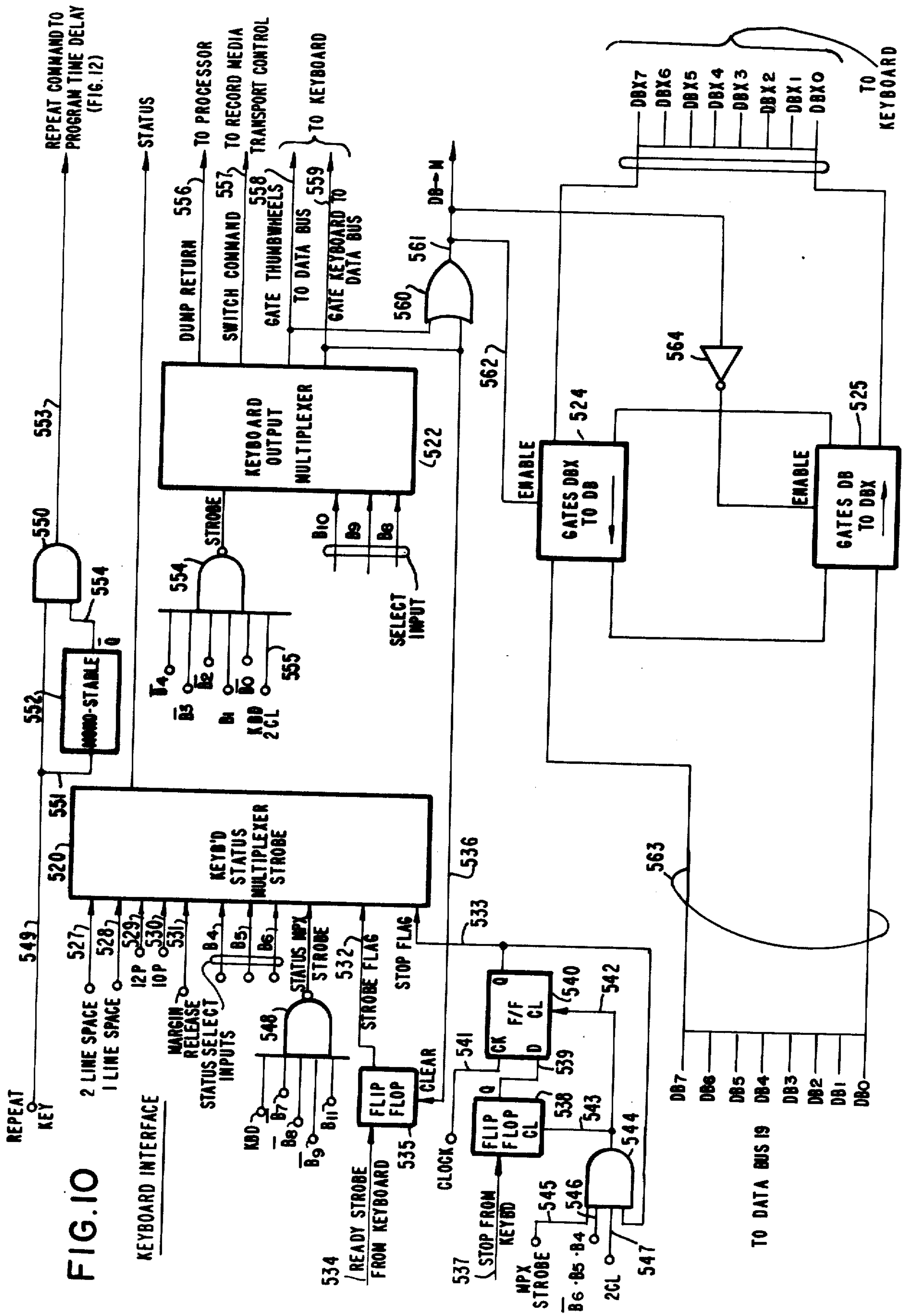
Figure 11:
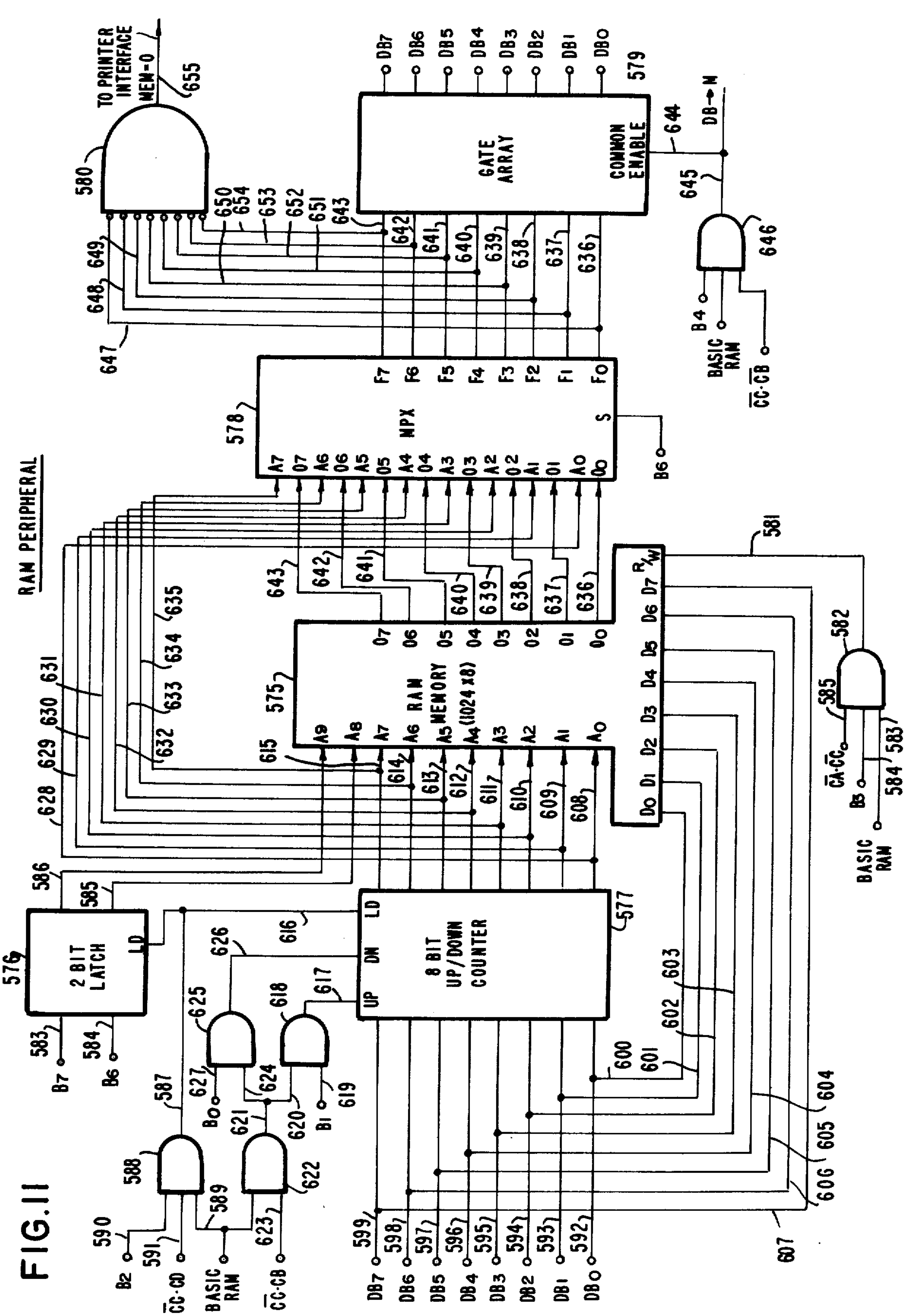
Figure 12:
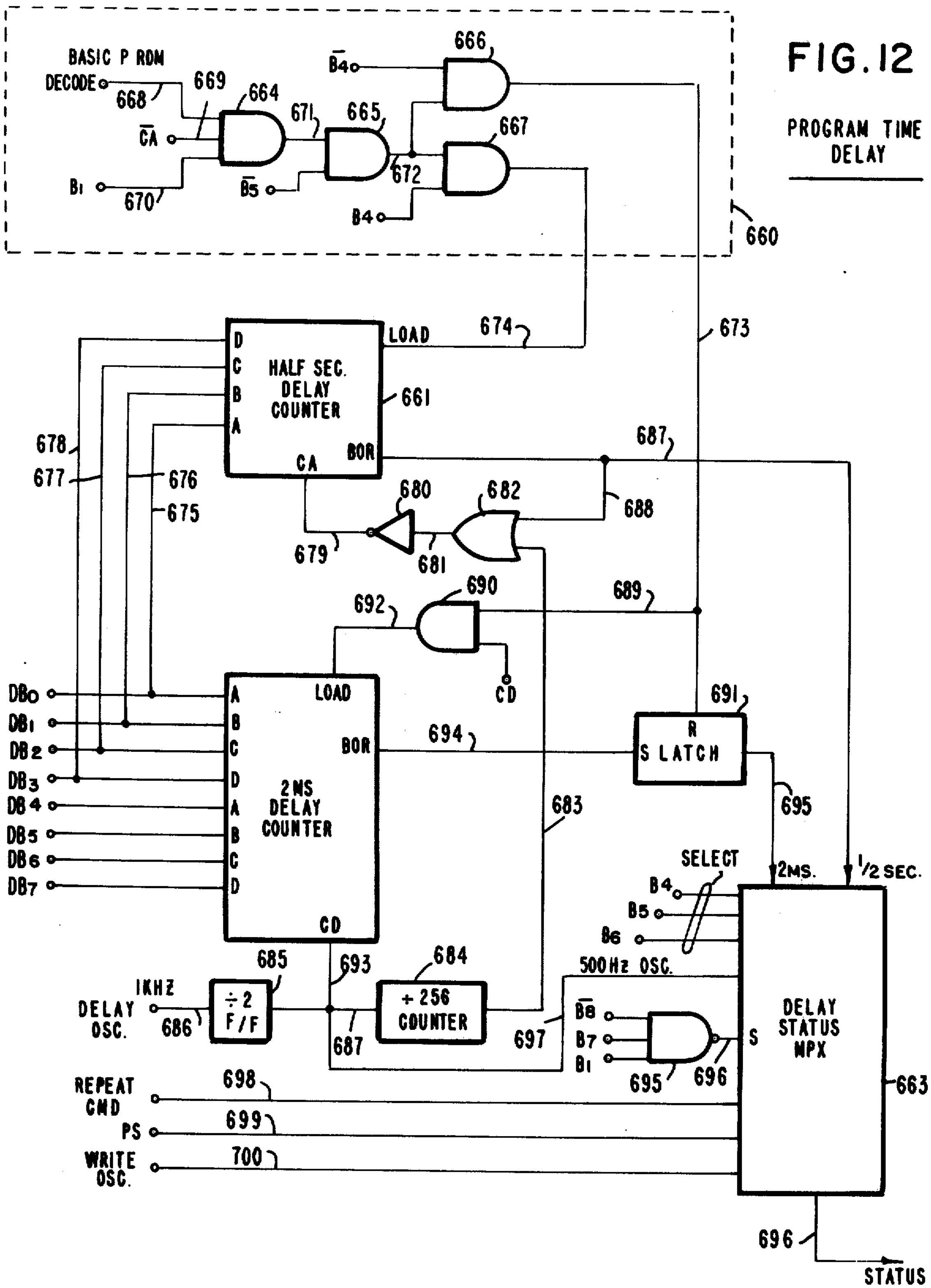
Figure 15A:
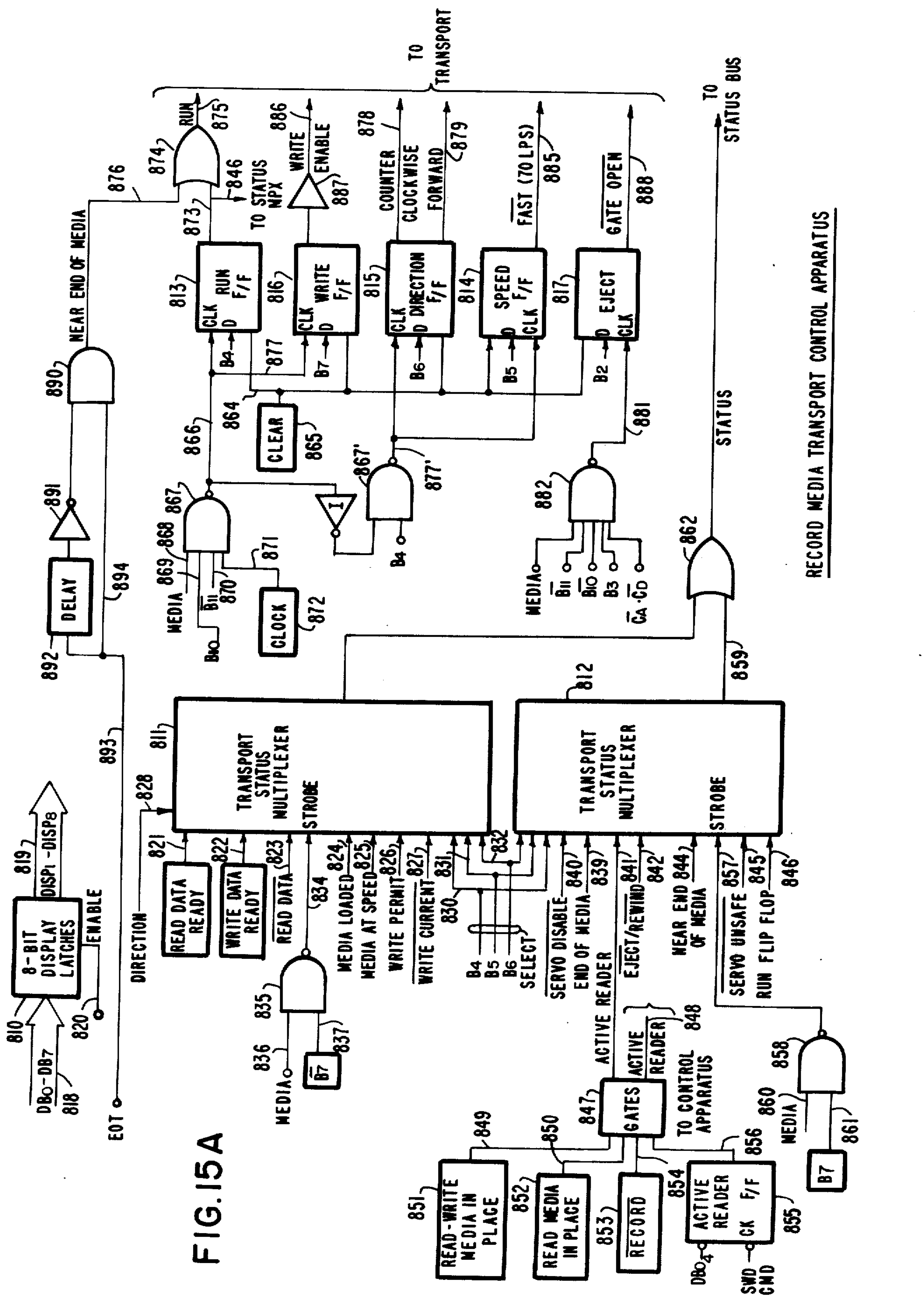
Figure 15B:
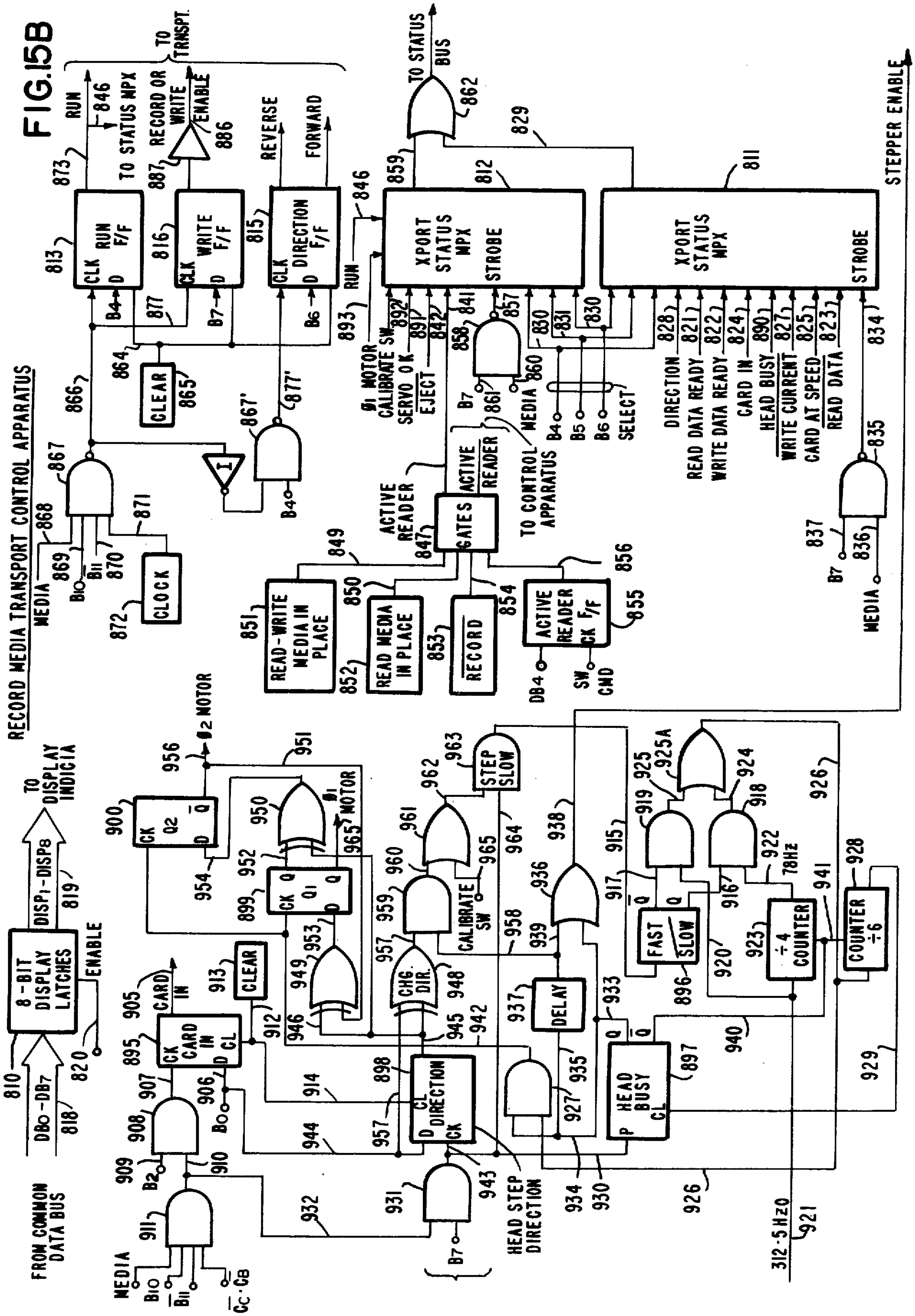
Figure 16:
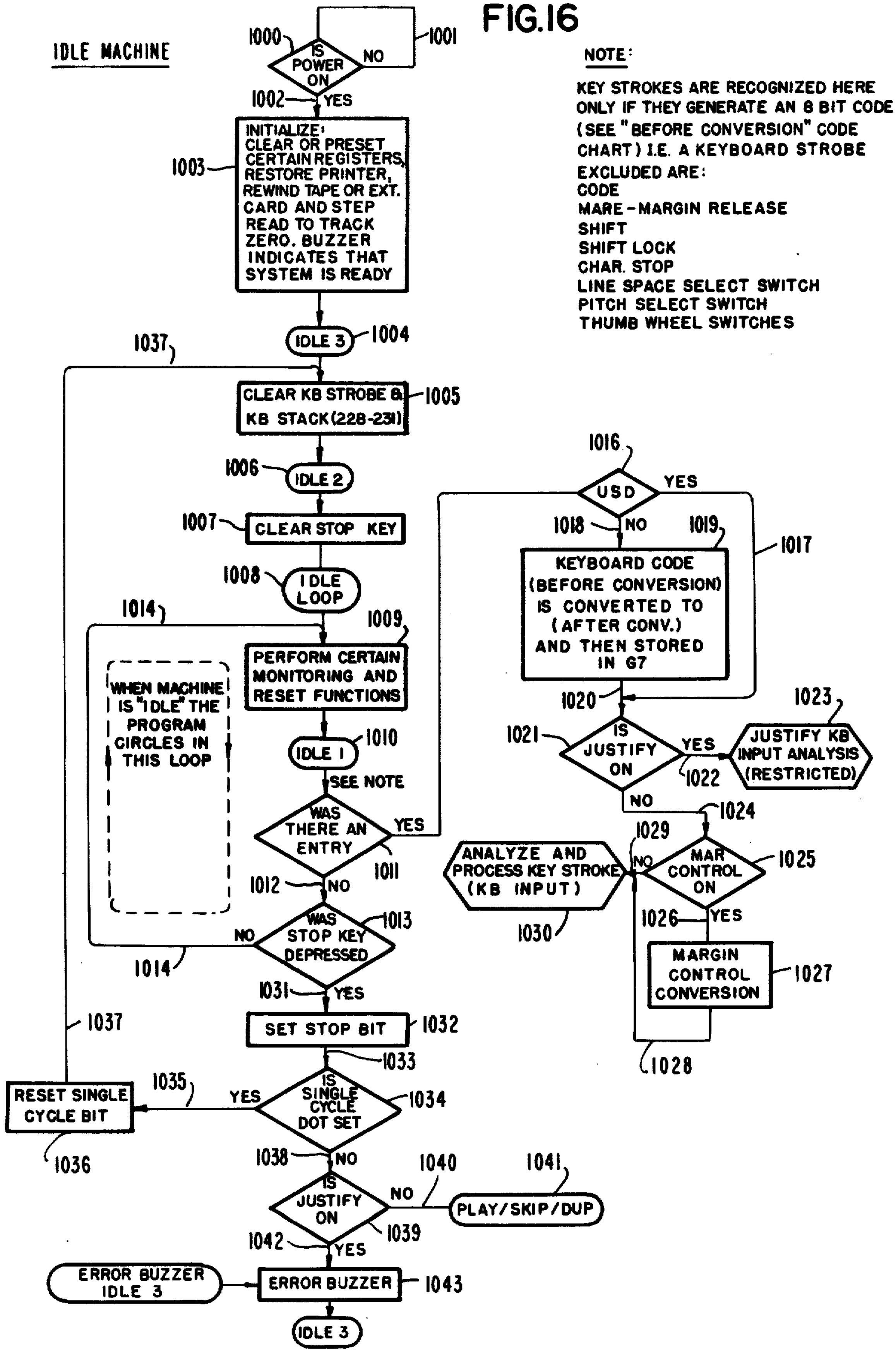
Figure 17:
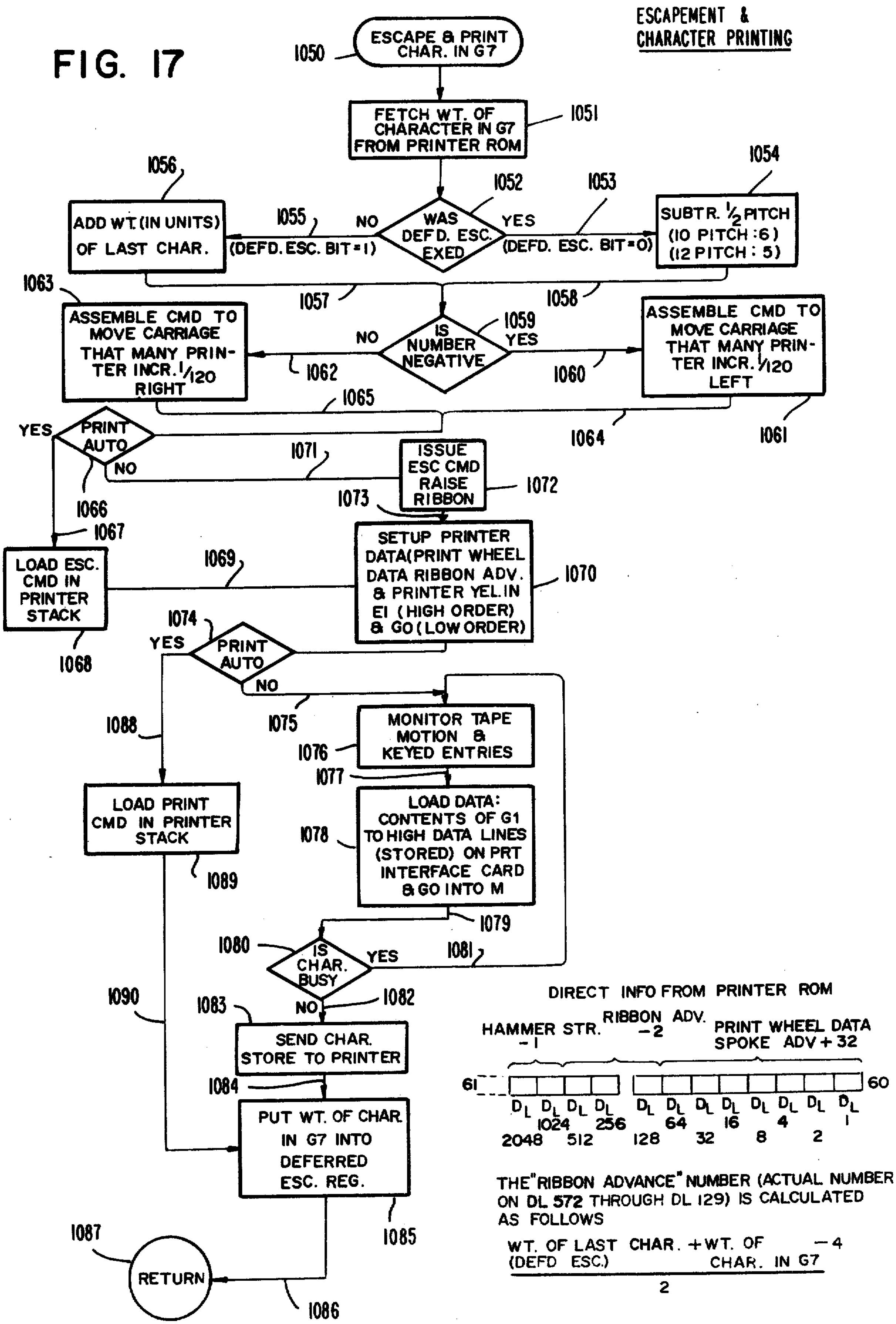
Figure 18:
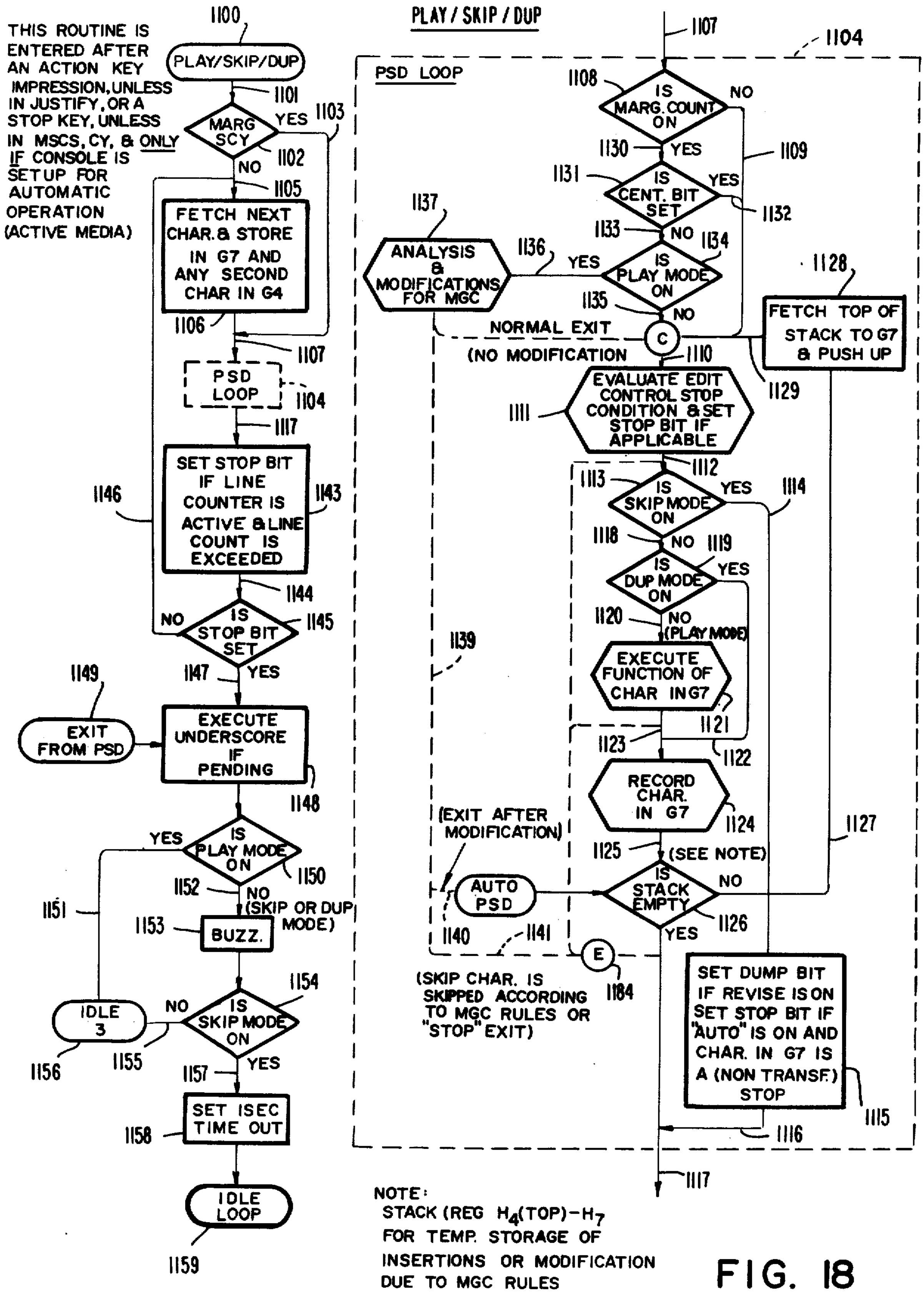
Figure 20B:
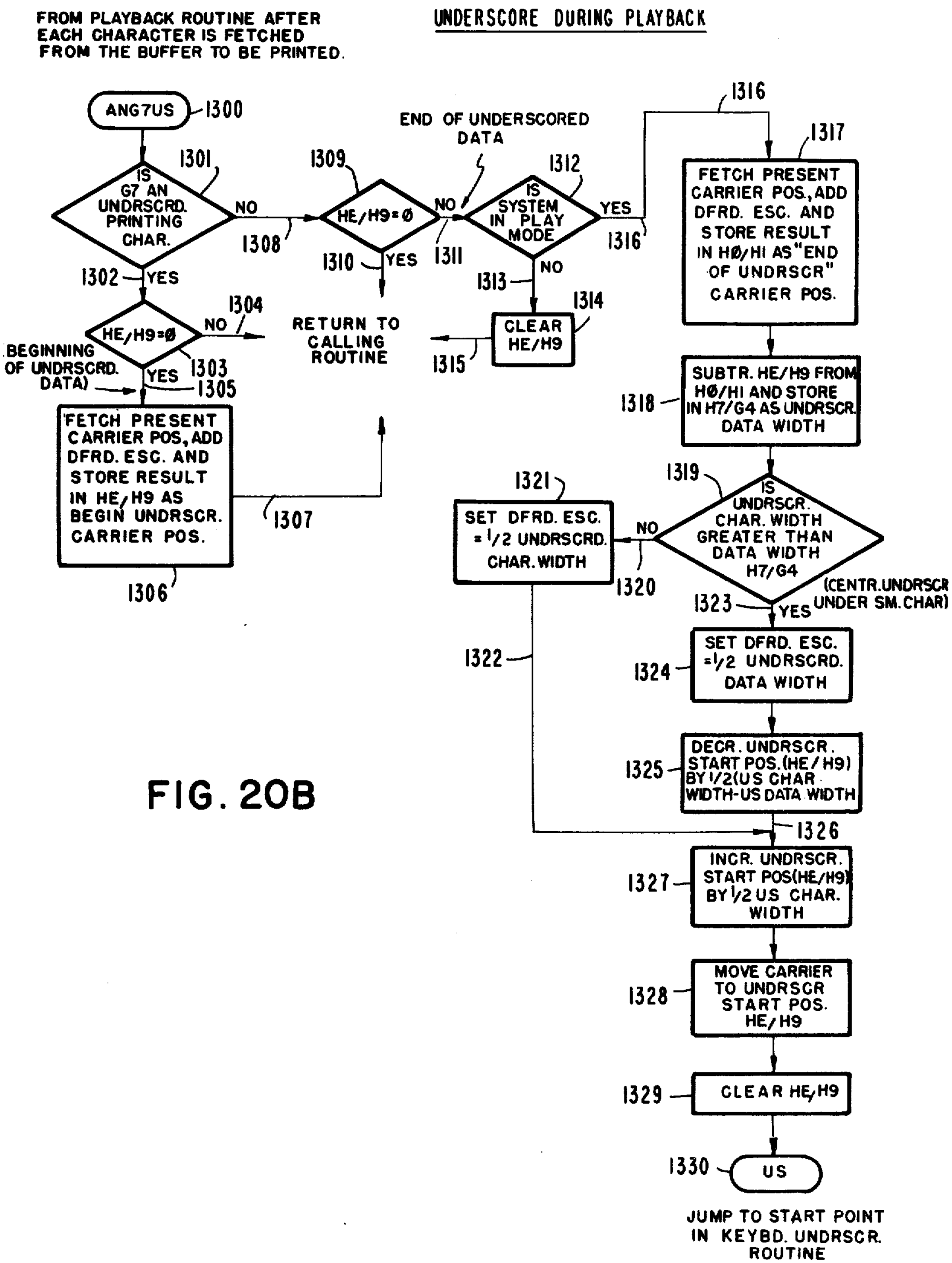
Figure 21:
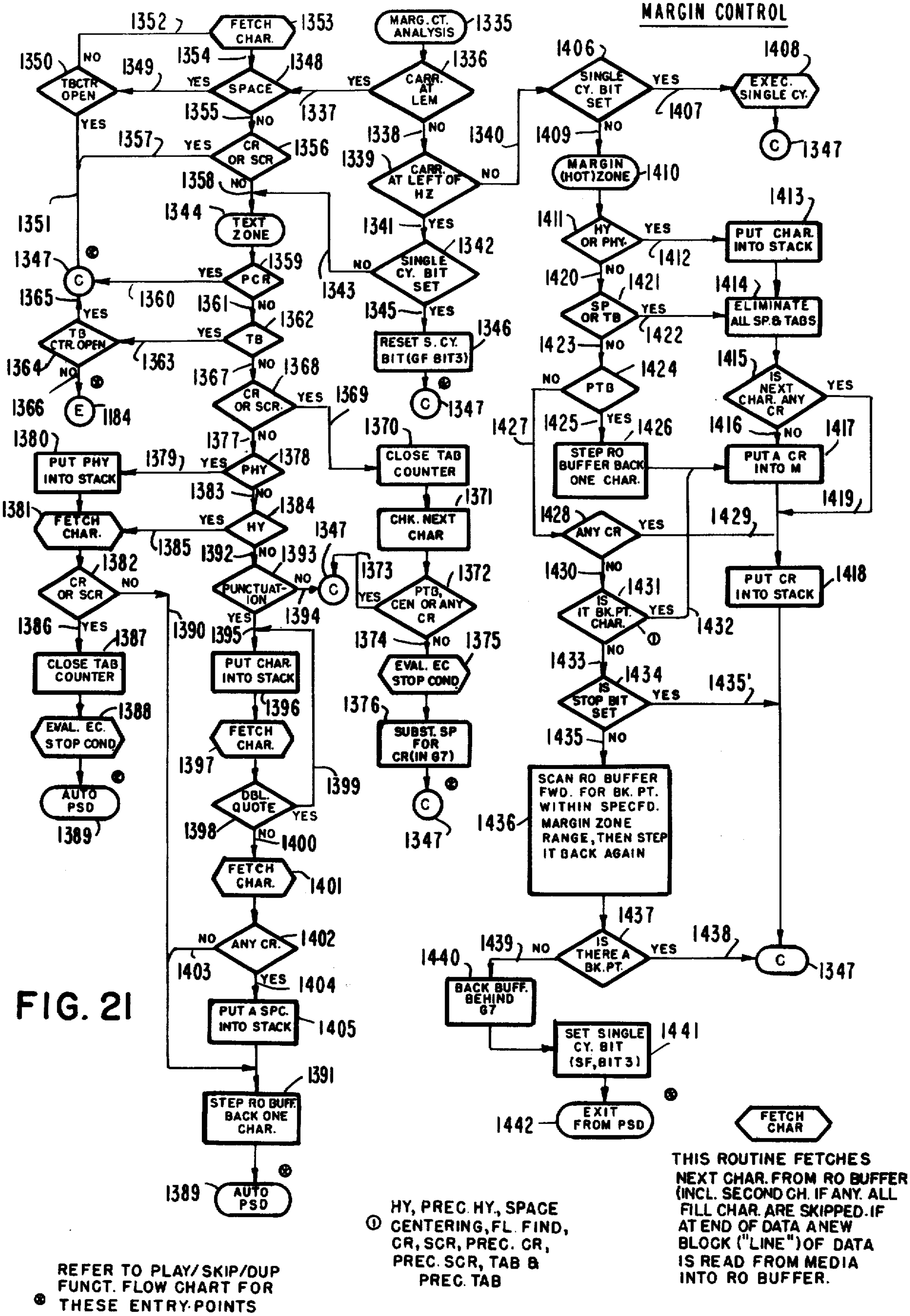
Figure 22:
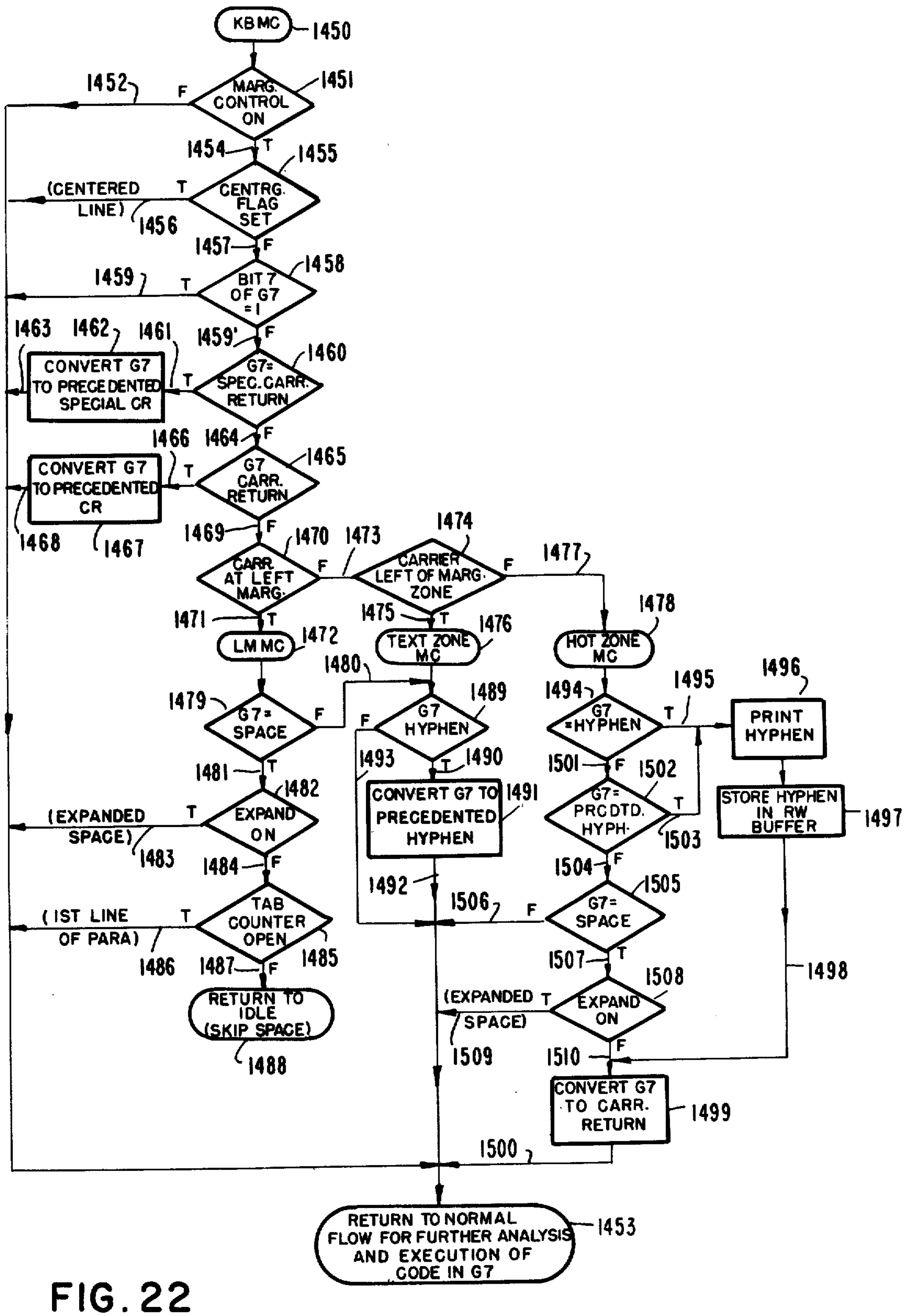
Figure 23A:
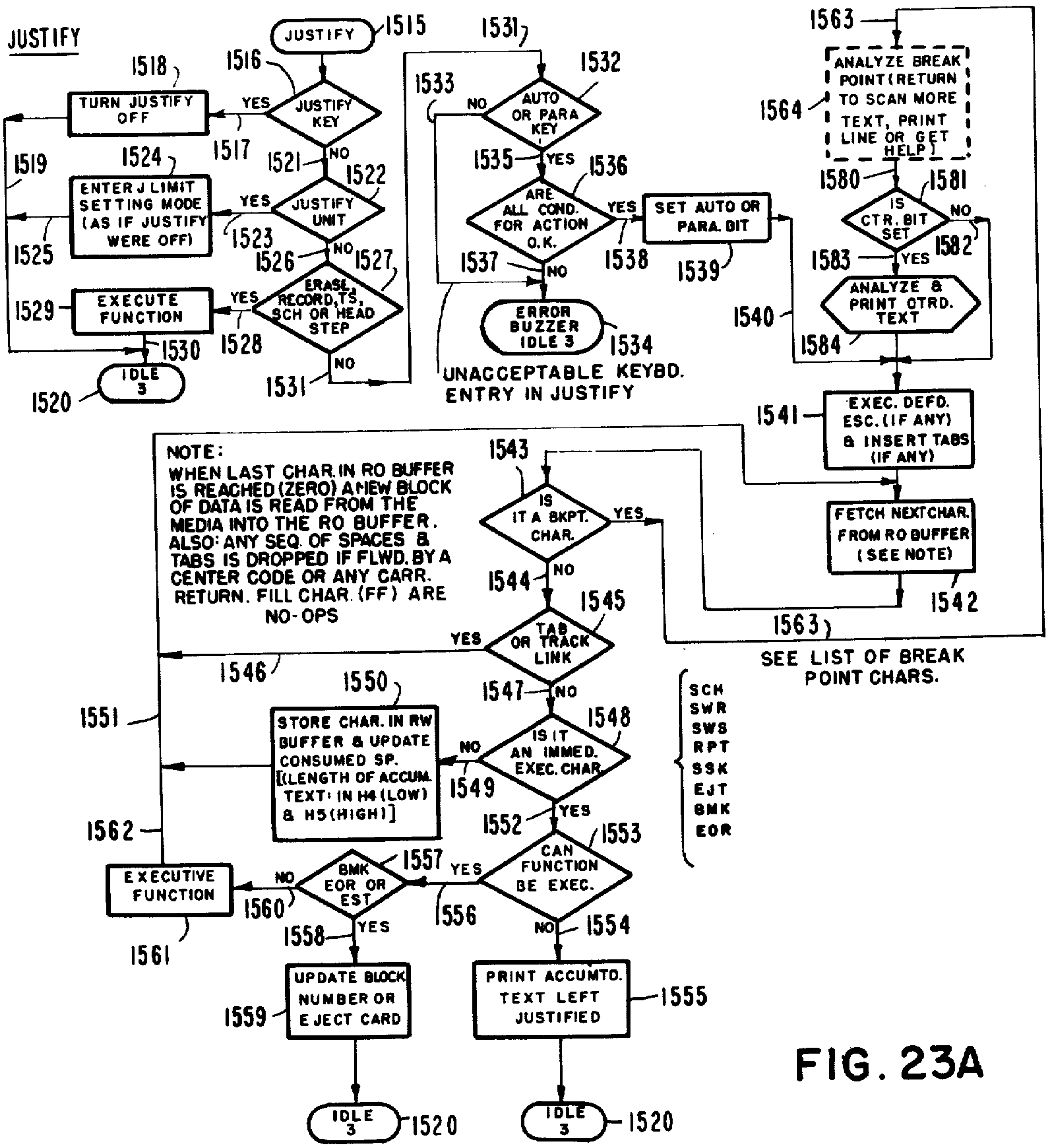
Figure 23B:
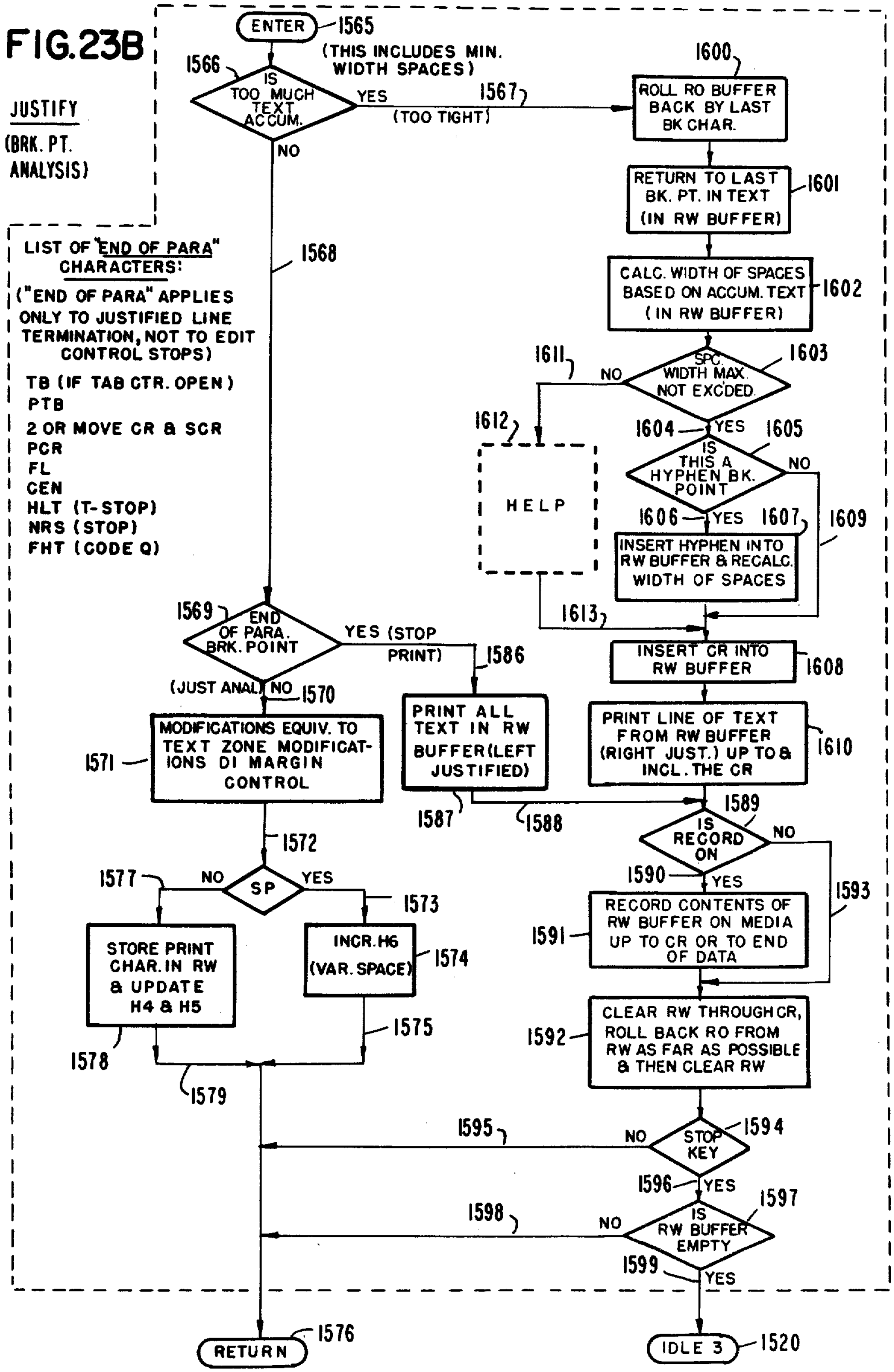
Figure 23C:
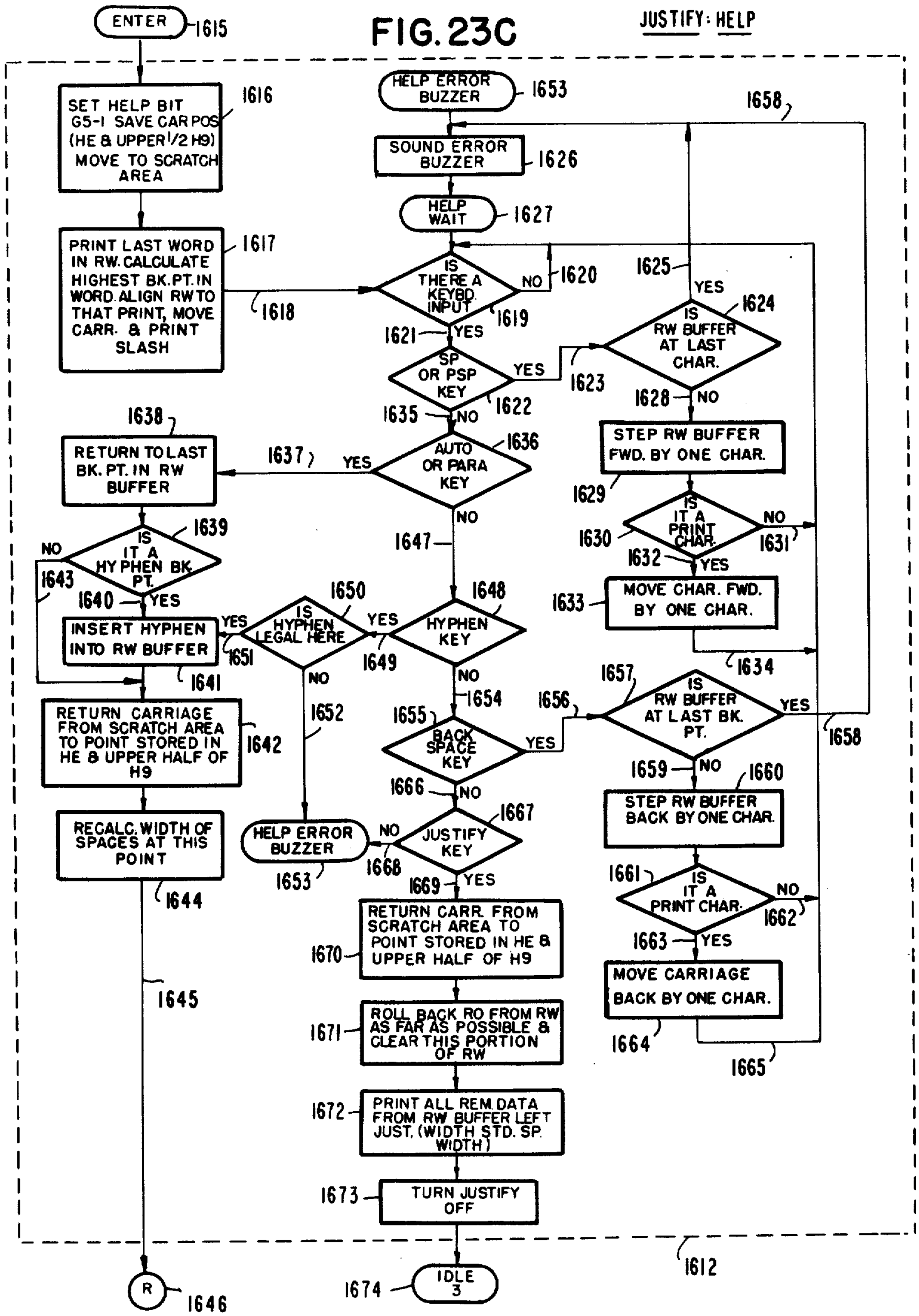
Figures 1, 24:
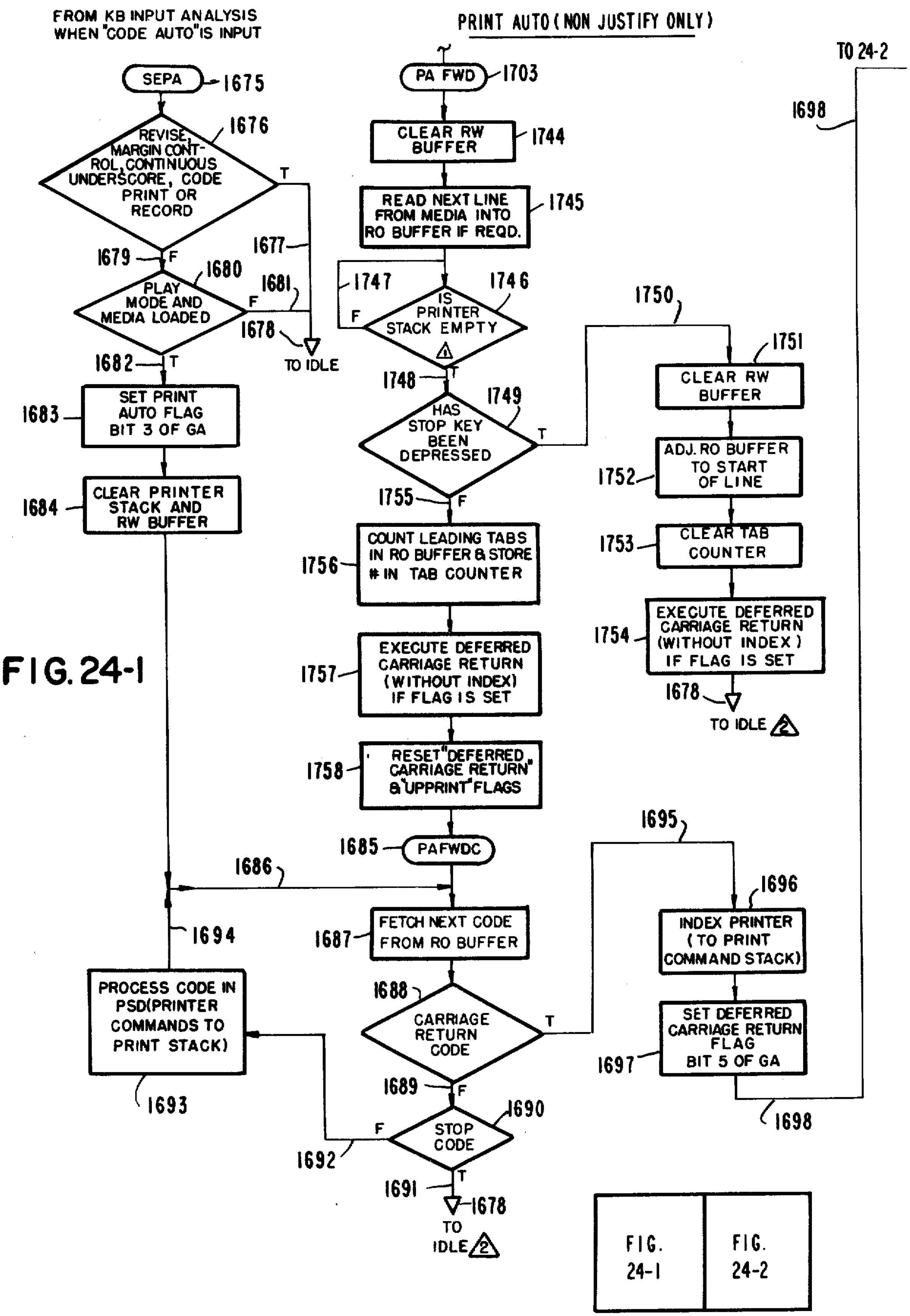
Figures 2, 24:
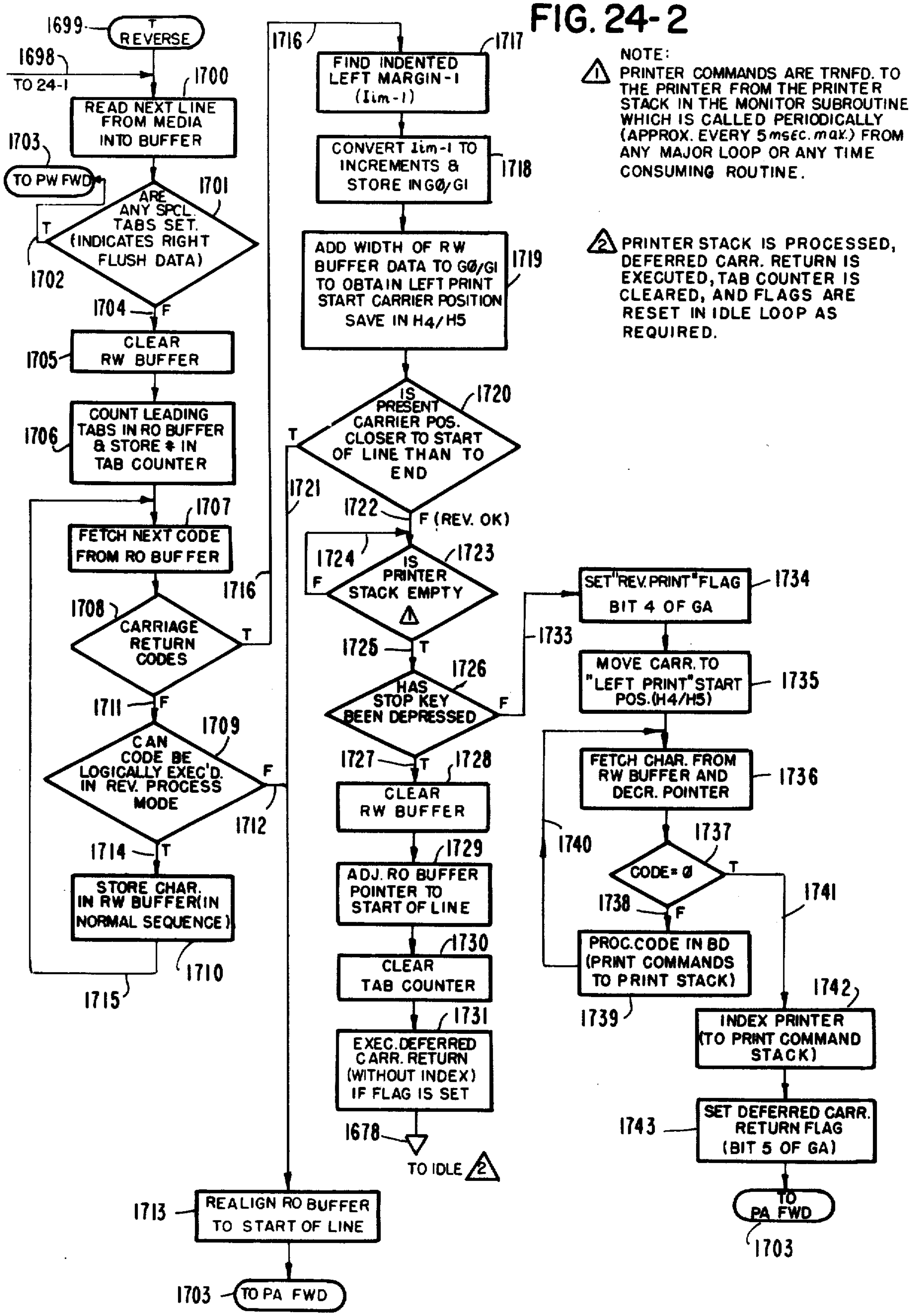
Figure 25A:
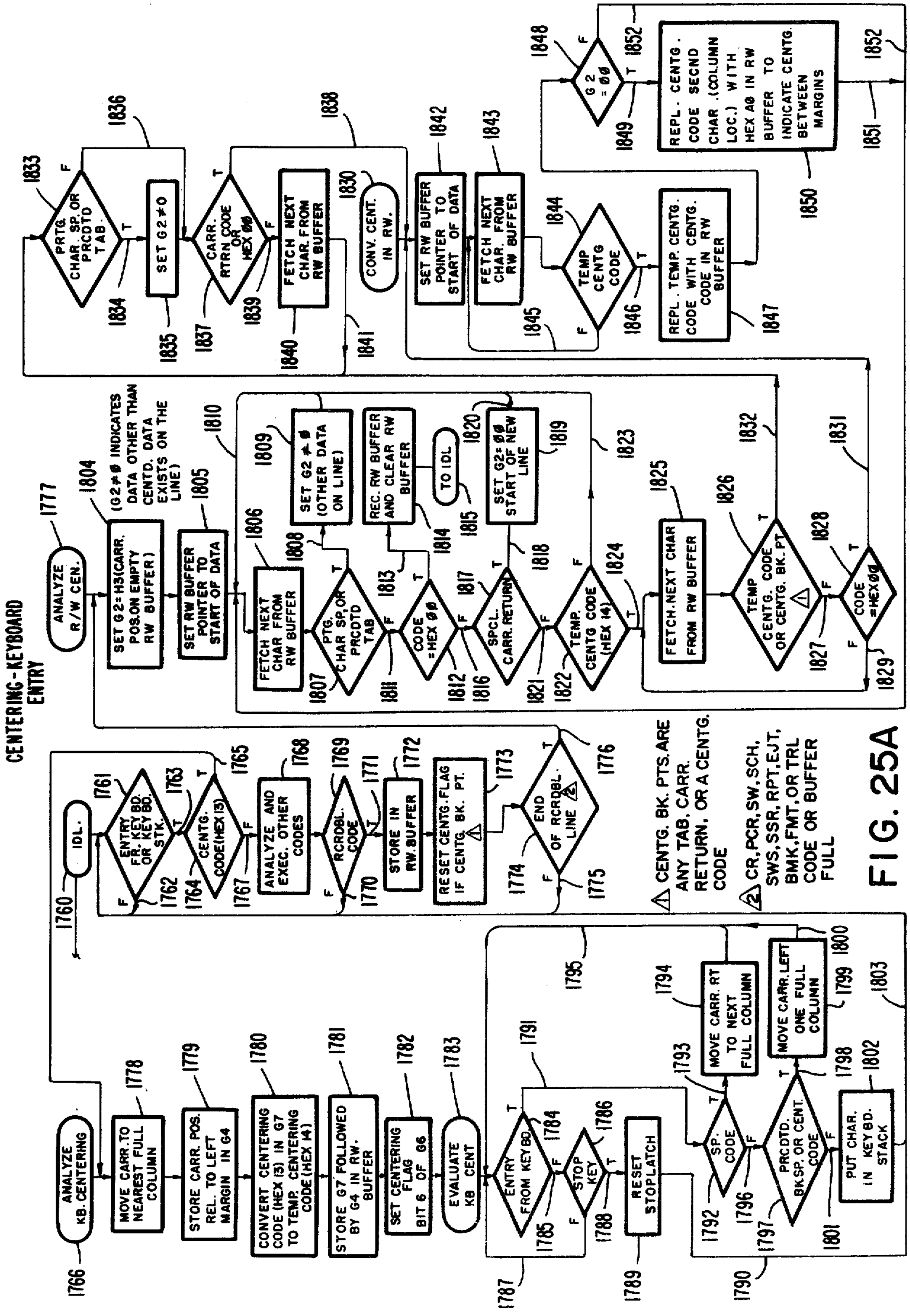
Figure 25B:
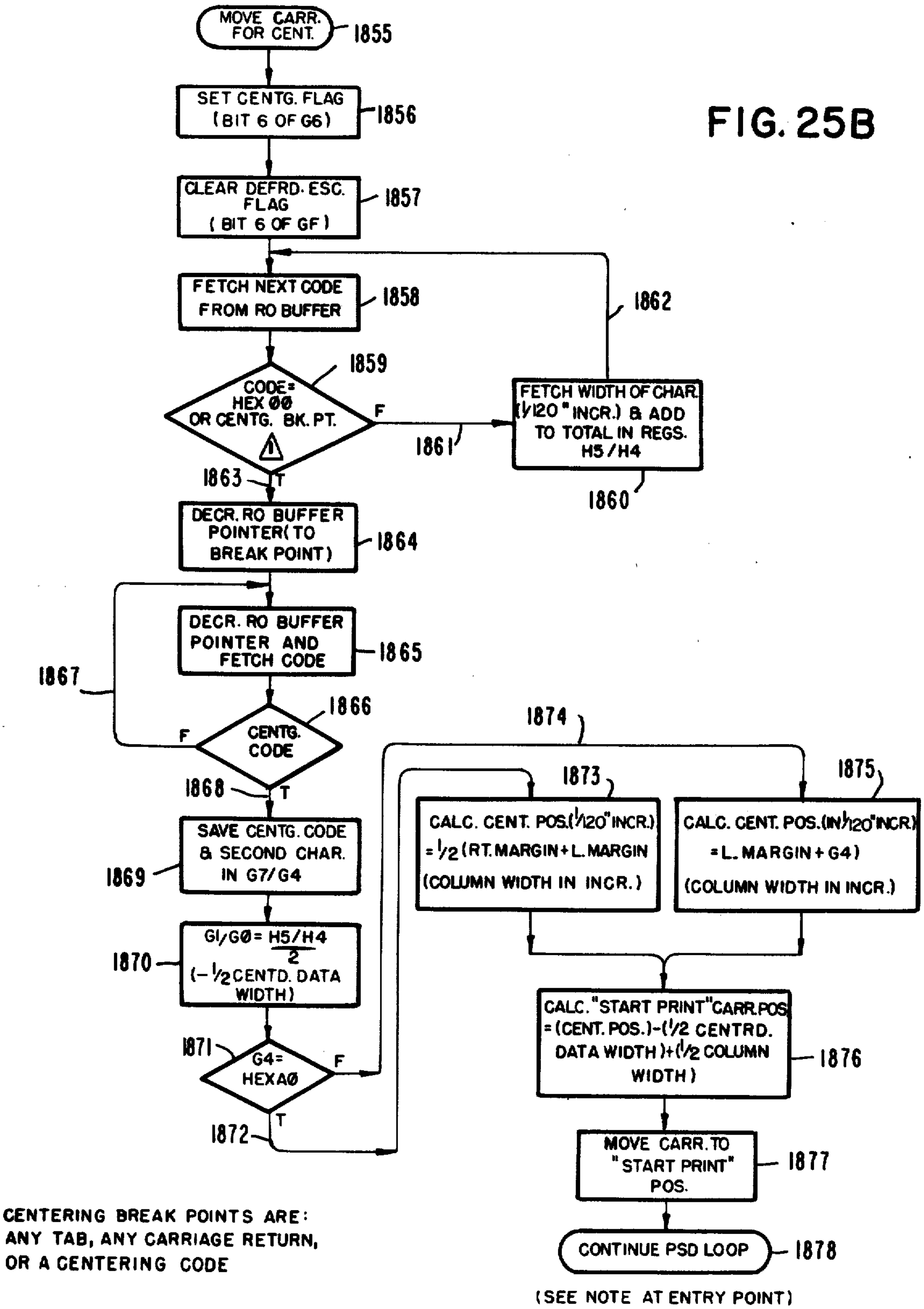

FIG. 7 schematically shows an interface suitable for use with the printer unit illustrated in FIG. 3;

FIG. 8 schematically depicts an exemplary printer data storage peripheral suitable for use in the embodiment of the invention depicted in FIGS. 1 and 2;

FIGS. 9*a* and 9*b* illustrate keyboard configurations suitable for use in conjunction with the apparatus depicted in FIG. 2 wherein FIG. 9*a* is a keyboard configuration specially adapted for embodiments of this invention employing record media in the form of a tape or the like and FIG. 9*b* is a keyboard configuration more suitable for embodiments of this invention employing a magnetic card as the record media;

FIG. 10 illustrates a suitable keyboard interface for keyboard configurations shown in FIGS. 9*a* and 9*b*;

FIG. 11 schematically depicts an exemplary RAM peripheral which is suitably configurated to provide the buffer and miscellaneous storage requirements for the apparatus depicted in FIG. 2;

FIG. 12 schematically depicts a program time delay peripheral suitable for use in the apparatus depicted in FIG. 2;

FIG. 13 schematically illustrates record media write apparatus suitable for use in the embodiment of the automatic writing system depicted in FIG. 2;

FIG. 14 depicts record media read apparatus suitable for use in the embodiment of the automatic writing system depicted in FIG. 2;

FIGS. 15*a* and 15*b* schematically illustrate record media transport control apparatus suitable for use in the embodiment of the automatic writing system shown in FIG. 2, wherein FIG. 15*a* is record media transport control apparatus specially adapted for embodiments of this invention employing record media in the form of a tape or the like and FIG. 15*b* is record media transport control apparatus configured for embodiments of this invention employing a magnetic card as the record media;

FIG. 16 is a flow chart illustrating a simplified system idle loop program;

FIG. 17 is a flow chart illustrating a simplified escapement and character printing program sequence of operation;

FIG. 18 is a flow chart illustrating the program sequence of operations for Play, Skip and Duplicate functions;

FIG. 19 is a flow chart illustrating a program sequence for Edit Control Stop Conditions associated with play skip and duplicate operations;

FIGS. 20a and 20b are flow charts illustrating program sequences of operations for word underscore operations wherein FIG. 20a depicts the processing functions which occur when a word underscore code is entered from the keyboard while FIG. 20b shows the functions occurring during playback;

FIG. 21 is a flow chart depicting normal program sequence operations under a playback mode of margin control;

FIG. 22 is a flow chart illustrating a program sequence of operations under a manual mode of margin control operative upon an entry of data from the keyboard;

FIGS. 23a, 23b and 23c are flow charts illustrating the program sequence of operations relied upon to achieve justification of the right-hand margin of printed document information wherein FIG. 23a depicts the normal justification routine, FIG. 23b illustrates the justification break point analysis subroutine and FIG. 23c depicts the justify help routine employed under cases where justification can not be achieved without operator intervention;

FIG. 24 is a flow chart illustrating the program sequence of operations relied upon in a high speed print mode of playback wherein printing takes place in a forward and reverse direction, the flow chart is combinable with FIG. 23 to achieve this mode of playback with justification;

FIGS. 25a and 25b are flow charts illustrating the program sequence of operations associated with line centering operations wherein FIG. 25a depicts the program routine initiated in conjunction with the entry of a line centering code from the keyboard and FIG. 25b shows the program routine for implementing line centering upon playback.

Figures 1, 26:
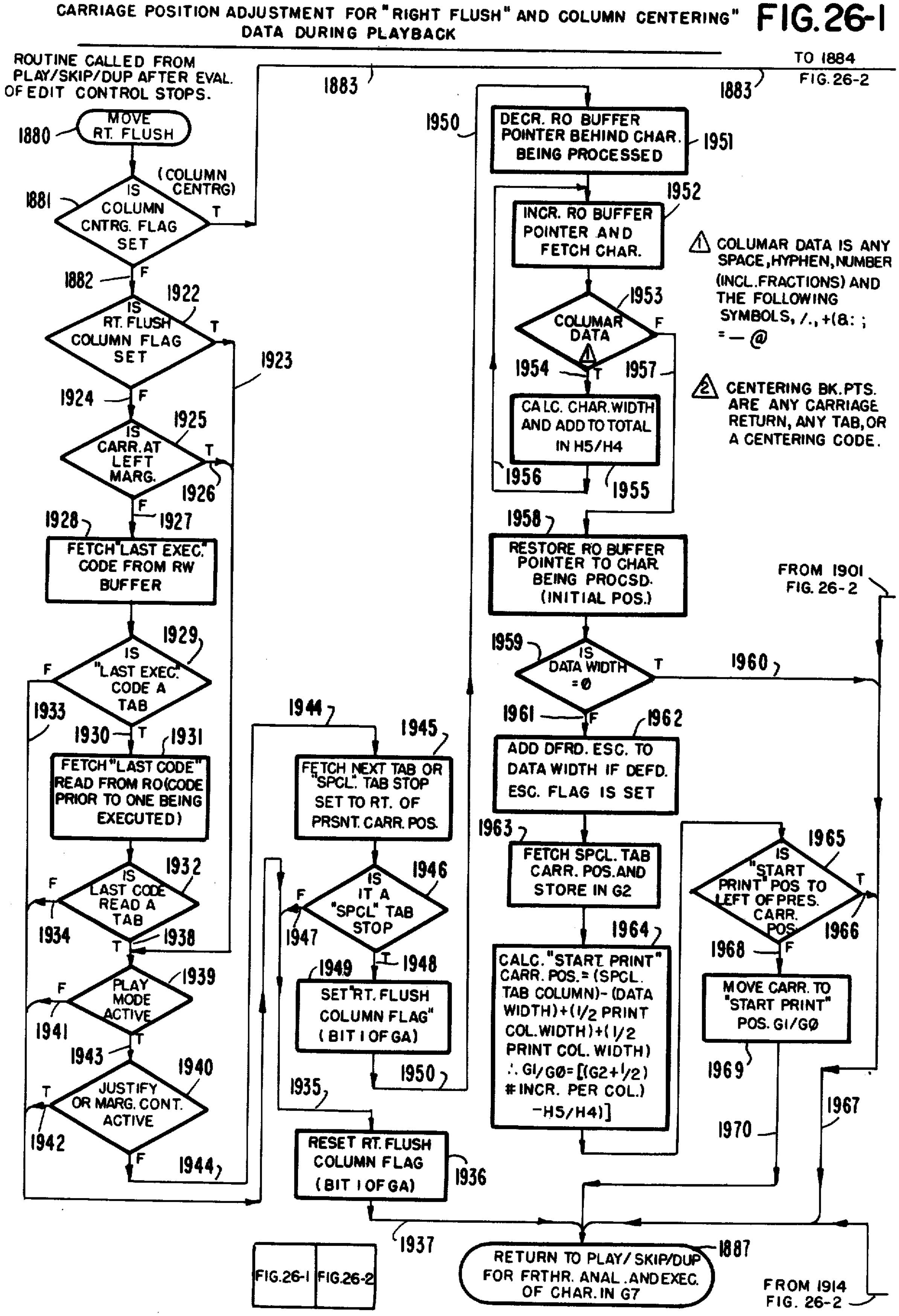
Figures 2, 26:
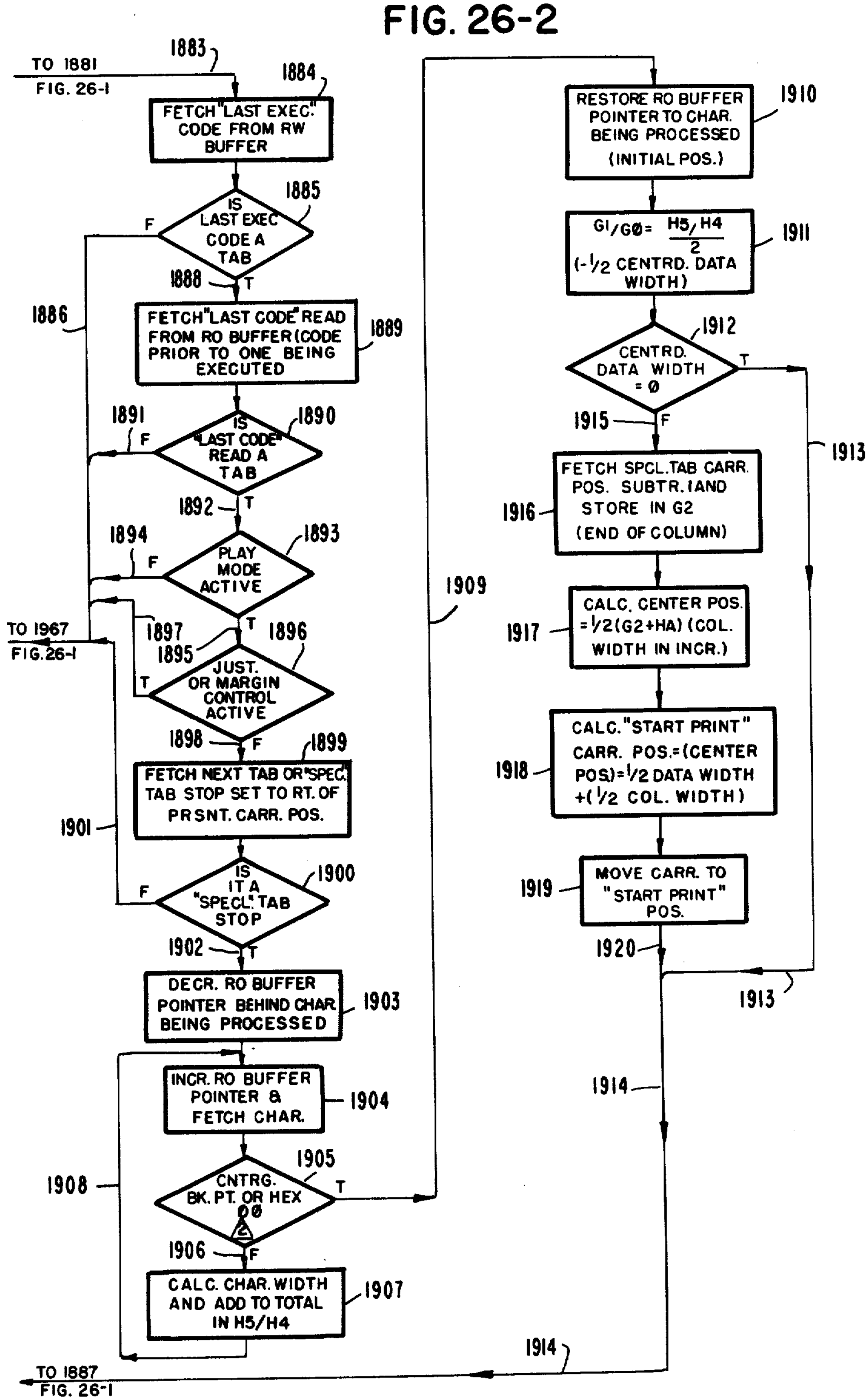
Figure 27:
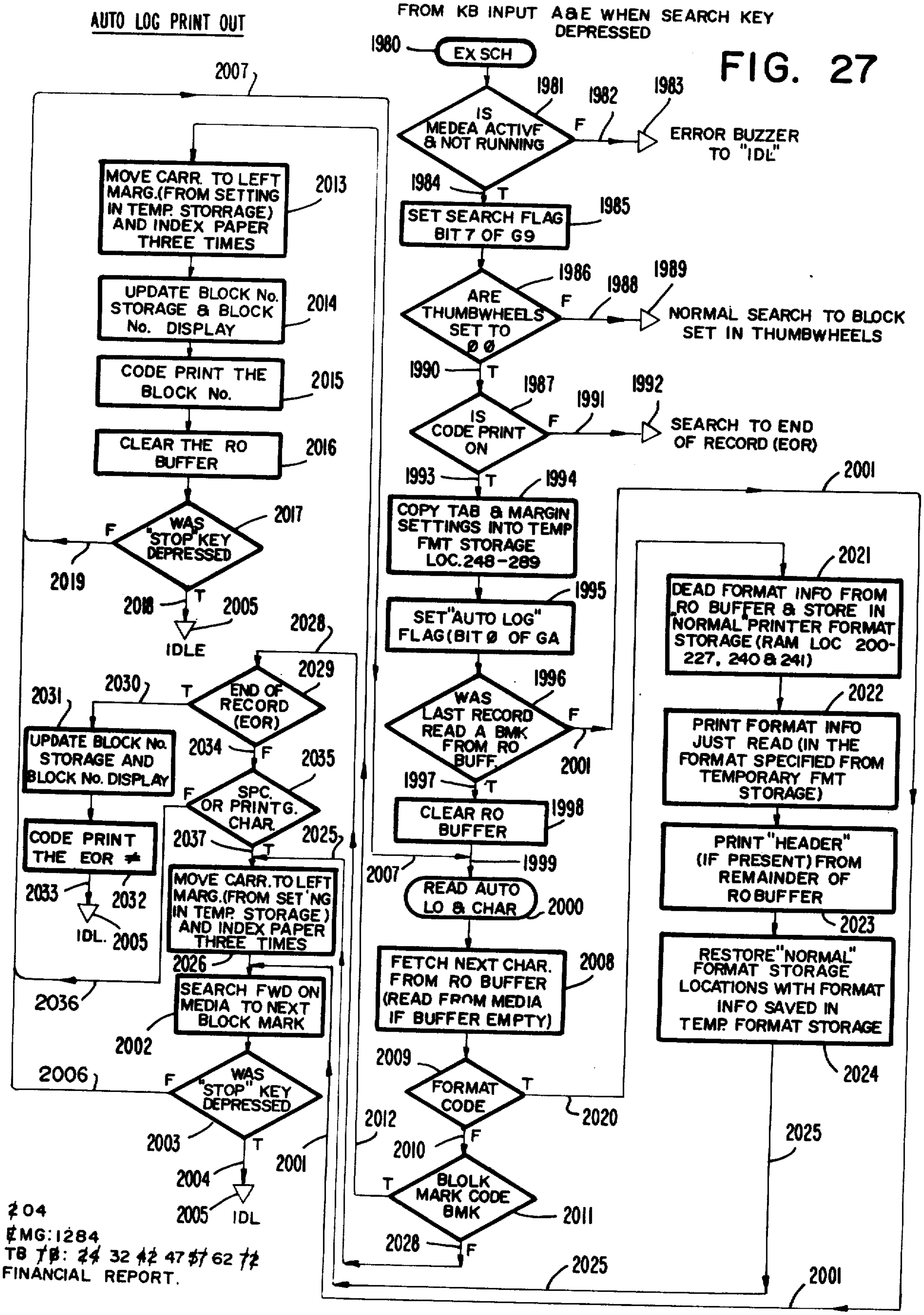
Figure 28A:
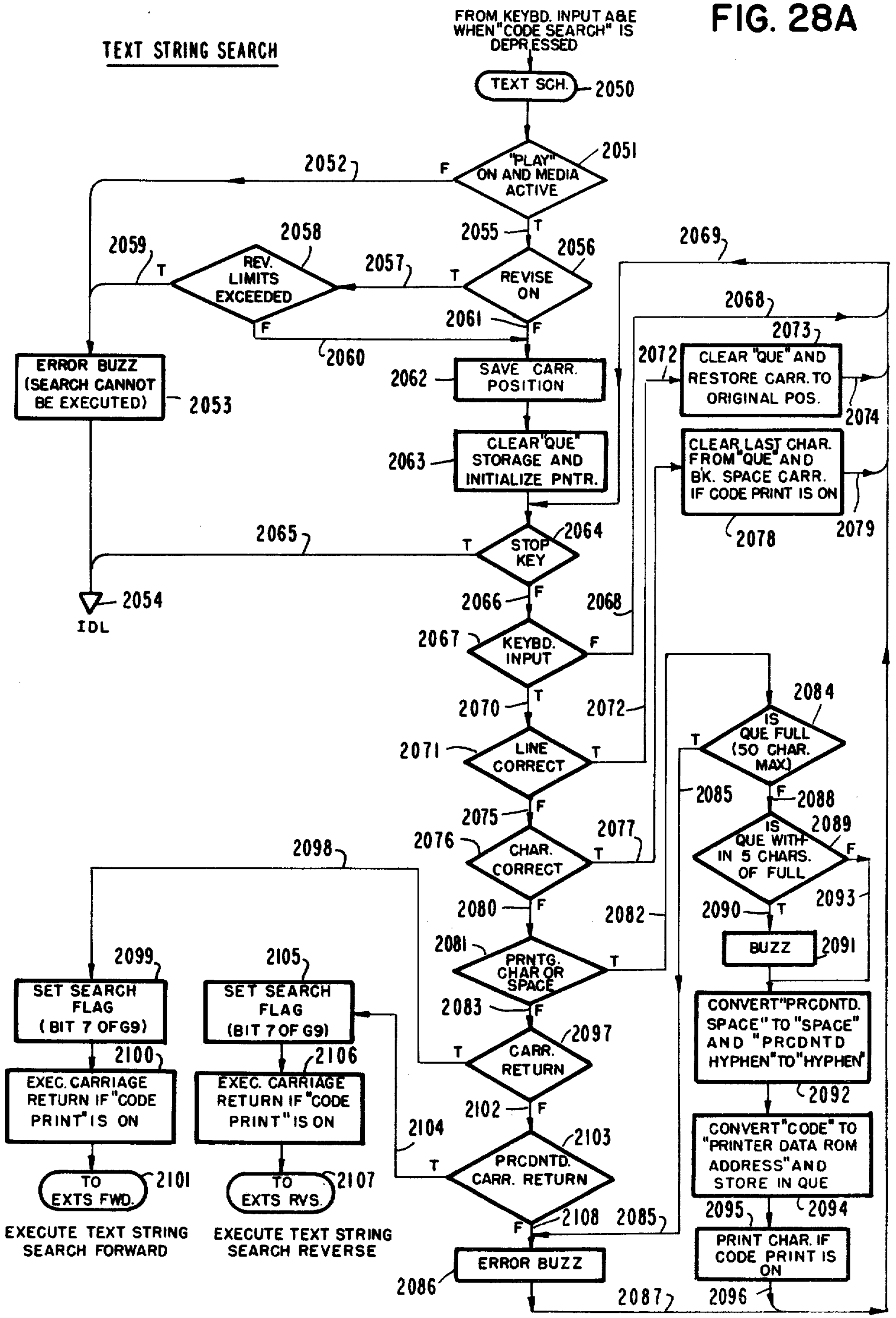
Figure 28B:
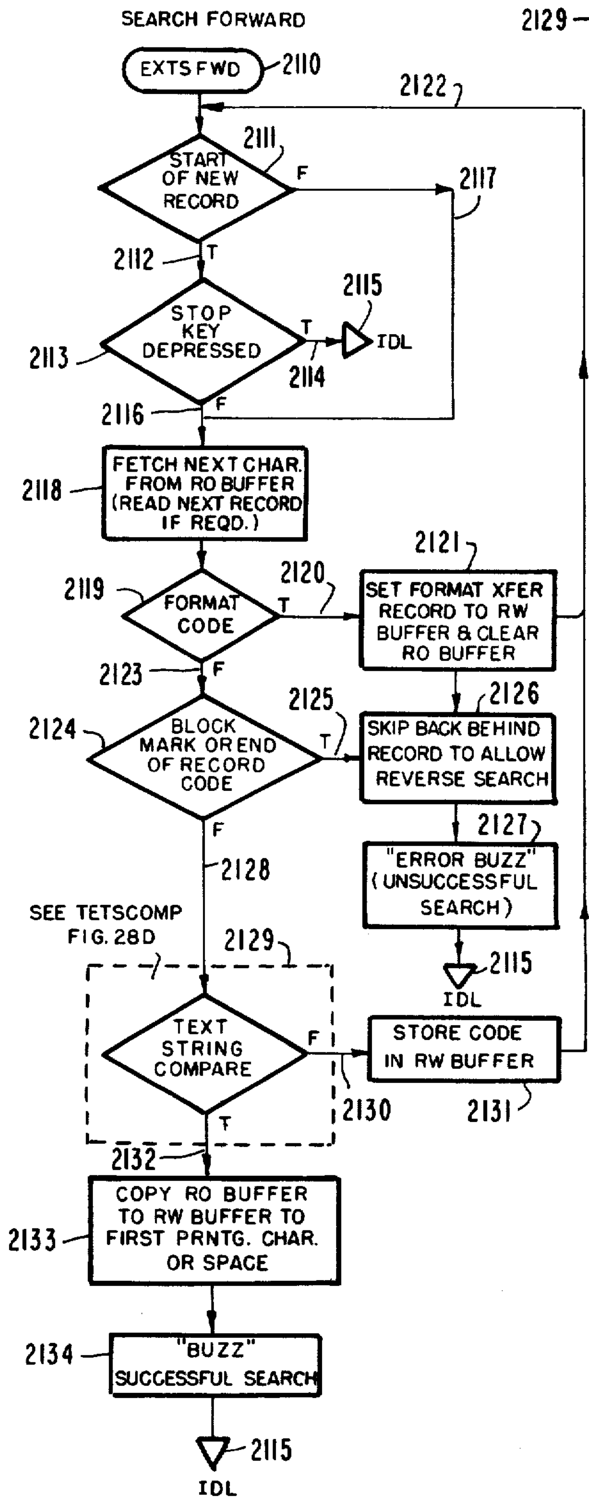
Figure 28D:
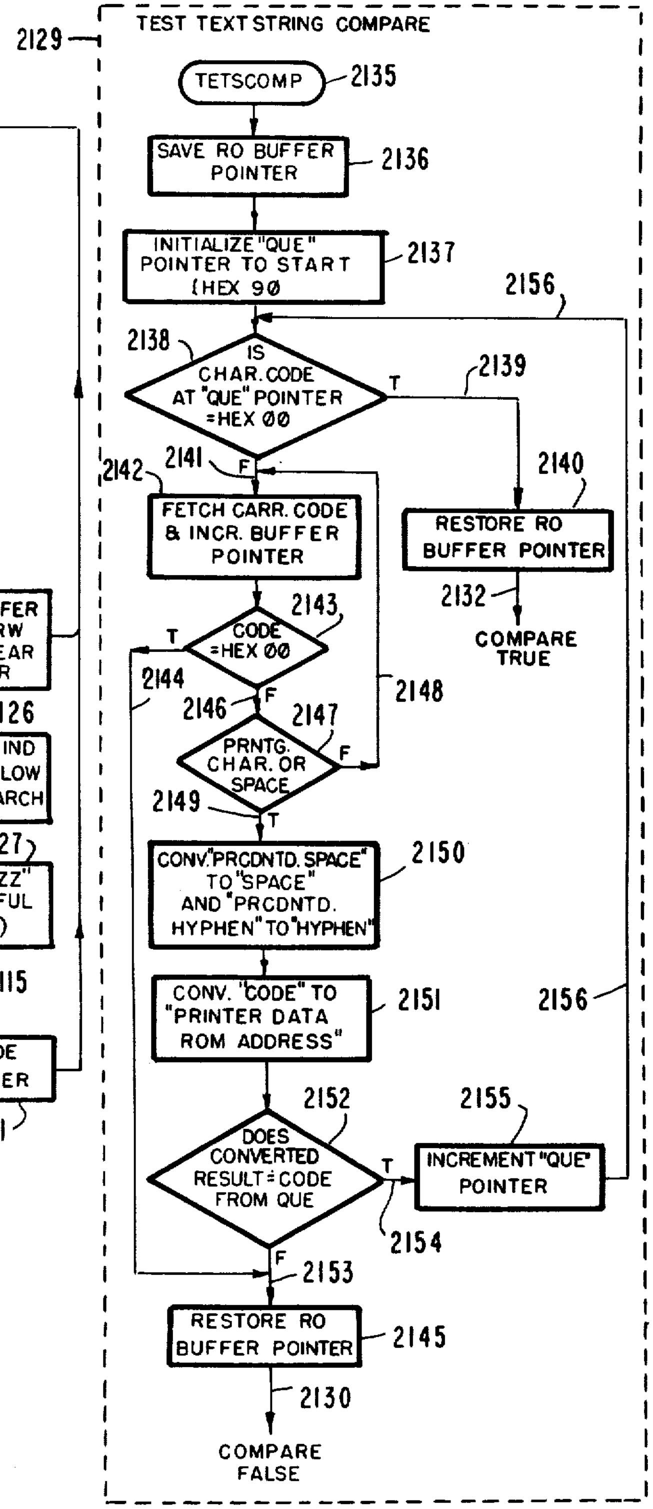
Figure 28C:
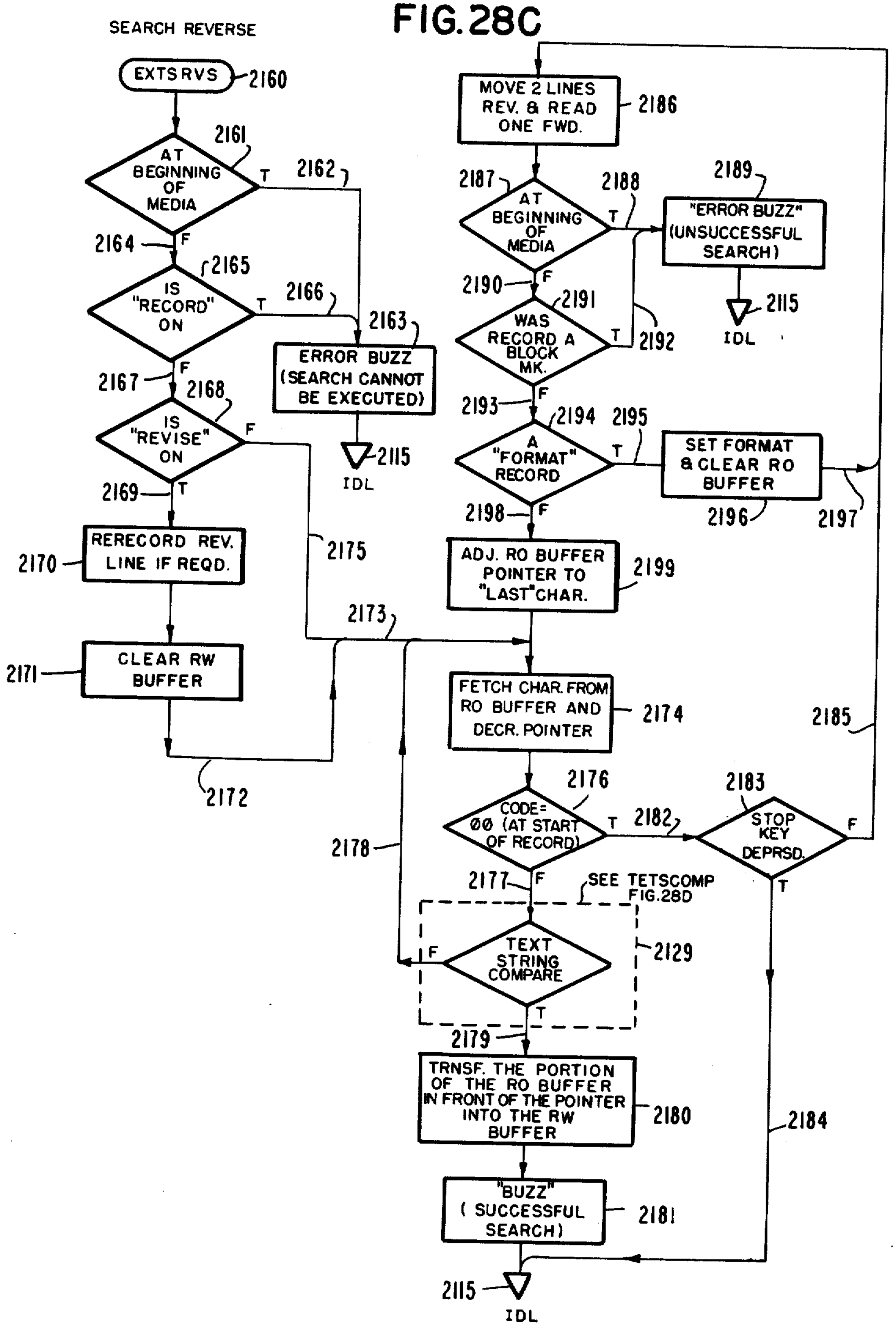

FIG. 26 is a flow chart depicting a program sequence of operations for "Column Centering" data and presenting the same in a "Right Flush" manner during playback;

FIG. 27 is a flow chart depicting a program sequence of operations for an "Auto Log" printout mode of operation wherein format information and descriptive information recorded in format blocks is selectively printed; and FIGS. 28a - 28d are flow charts depicting the program cycle of operations wherein data is entered from the keyboard and the record media is searched therefor, FIG. 28a illustrating the initial portion of this routine and FIGS. 28b and 28c illustrating forward and reverse portions, respectively, of the searching routines and FIG. 28d showing the comparison routine per se.

GENERAL DESCRIPTION

Referring now to the drawings and more particularly to FIG. 1 thereof, there is shown a pictorial view of one embodiment of an automatic writing system in accordance with the teachings of the present invention. The exemplary embodiment of the automatic writing system depicted in FIG. 1 comprises keyboard means 1, printer means 2 and a record media and processor control console 3. The keyboard means 1 and the printer means 2 are enclosed within a common housing and arranged to give the appearance of an input/output typewriter configuration 4. This arrangement is desireable because it presents an operator with a familiar typewriter configuration while placing, as shall be seen below, substantially all elements of the automatic writing system which require manipulation at the operator's fingertips. Although, as shall be appreciated by those of ordinary skill in the art, any input/output typewriter apparatus could be utilized with the instant invention, independent keyboard means and printer means are here preferred. The keyboard means 1 may take the form of a conventional electronic keyboard such as those manufactured by The Microswitch Division of Honeywell Corporation or The Keytronics Corporation of Spokane Washington and conventionally available. Physical characteristics of the keyboard such as touch and feel should preferably approach those of conventional electric typewriters so that input operations carried out at the keyboard will not adversely affect the operator or convey the impression that alien equipment is being employed. The keyboard means 1, as further described hereinafter, includes all the standard 44 alphanumeric character keys found on conventional typewriters. In addition, as better illustrated in FIGS. 9a and 9b a plurality of specialized function keys have been added to the conventional keyboard and a plurality of additional functions have been added to certain selected ones of the conventional alphameric keys.

Figure 6:
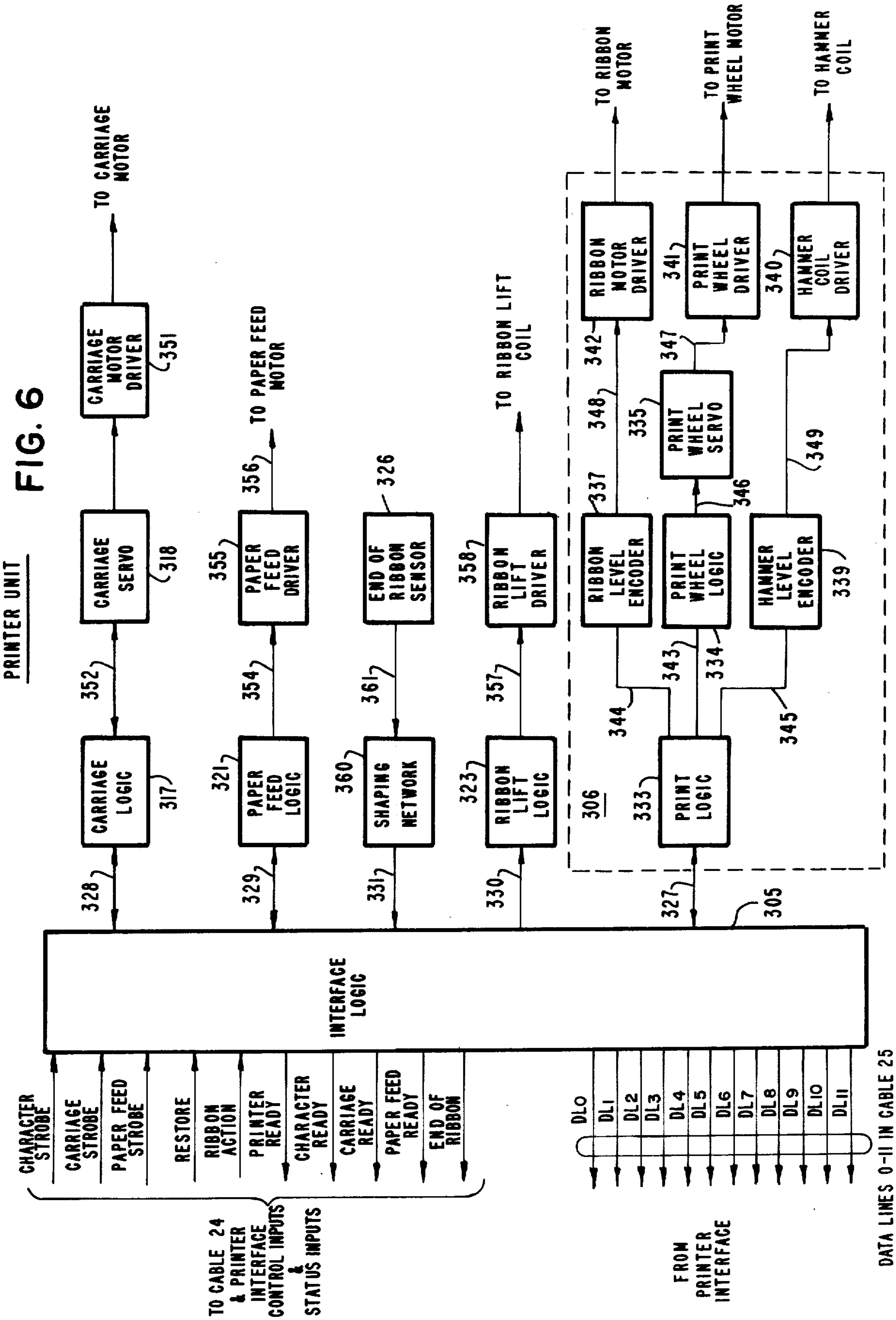
FIG. 6 is a block diagram schematically illustrating the logic details of a printer unit suitable for incorporation into the embodiment of the automatic writing system depicted in FIG. 2.

The printer means 2, as further described in conjunction with FIG. 6, may take the form of a serial electronic printer wherein a servo controlled daisy wheel mounted on a servo controlled carriage effects printing while paper indexing and the like is controlled by a servo associated with the roll 5. Although any conventional serial printer may be employed, this type of serial printer is preferred as it allows printing to be accomplished at essentially twice the rate available with conventional input/output modified Selectric typewriters when the printer is being driven in an ordinary manner from the record medium. The keyboard means 1 and printer means 2 arranged in a typewriter configuration 4 is connected through a multiconductor cable 6 to the record media and processor control console 3.

The record media and processor control console 3 depicted in FIG. 1 includes first and second cassette mounting chambers 7 and 8, rewind/eject buttons 9 and 10 associated with each of the cassette chambers 7 and 8 as well as digital displays 11 and 12; which also may serve as read/record function indicators; in addition, a power switch 13, for energizing the automatic writing system depicted in FIG. 1 is also provided on the record media and processor control console 3. Although the embodiment of the automatic writing system depicted in FIG. 1 has been illustrated as employing multiple record media in the form of magnetic tape cassettes, it will be appreciated by those of ordinary skill in the art that any suitable recording media such as magnetic cards, magnetic tapes, magnetic belts or even paper punched tape could be substituted therefor. In addition as shall be apparent to those or ordinary skill in the art as the disclosure of the present invention preceeds, although a two (2) station recording and playback system has been depicted in FIG. 1 and will be described below, the common bus operation of the instant invention allows more or fewer recording and playback stations to be employed without deviating a whit from the concepts of the instant invention. Accordingly, if it were desired to provide an automatic writing system having more limited capabilities than that of the embodiment disclosed herein, a single recording and playback station could be employed while if it were desired to add further capability three (3) or more recording or playback stations could be utilized.

Similarly, cassettes, preferably of the conventional Phillips type have been illustrated in FIG. 1, because they are highly desireable from the standpoint of operator handling and filing while allowing substantial amounts of information to be recorded on a single media. However, should a limited system be desired such as a system wherein a single letter is provided per record media, magnetic cards or belts could be readily substituted for the cassettes depicted in the FIG. 1 embodiment of the present invention. The structure and function of the cassette chambers 7 and 8 and rewind/eject buttons 9 and 10 therefor are entirely conventional. Thus, in the well known manner, the depression of one of the eject buttons 9 and 10 results in the rewinding of the record media and the opening of the cassette chamber associated therewith, whereupon a cassette may be loaded or removed. As shall be seen below, the condition of the cassette chambers 7 and 8 are monitored so that the status of each system is continuously available to a central processor. The digital displays 11 and 12 associated with each record station act in the conventional manner to indicate, by their illumination and the provision of read and record indicia means therein, which of the stations is active in a given role and additionally provide in a manner to be detailed hereinafter, a digital display indicative of the portion of the record media then being utilized. Although not illustrated in FIG. 1, the record media and processor control console 3 houses the majority of the logic and processing equipments employed in the automatic writing system illustrated. Thus, as shall become apparent in connection with the description of FIG. 2, the record media and processing control console 3, houses the central processor, the buffers, the control and transport equipment associated with the record media stations and interface equipment for the printer means and keyboard means 1 and 2.

Accordingly, the embodiment of the automatic writing system illustrated in FIG. 1 comprises a typewriter configuration which provides all control, format and alphanumeric input elements at the operator's fingertips and a record media and processor control console which houses the logic associated with the instant automatic writing system and the record media stations as well as the power switch 13 which acts to energize and deenergize the entire system.

DETAILED DESCRIPTION OF AN EXEMPLARY EMBODIMENT

Referring now to FIG. 2 there is shown a block diagram schematically representing the embodiment of the automatic writing system depicted in FIG. 1. The embodiment of the automatic writing system schematically illustrated in FIG. 2 comprises a keyboard means 1 and printer means 2 arranged in a typewriter configuration 4, as briefly described in conjunction with FIG. 1, and the electronic structure contained in the record media and processor control console 3 which comprises a printer data ROM peripheral indicated by the dashed block 14, a typewriter configuration interface indicated by the dashed block 15, a central processor which takes the form of a microprocessor indicated by the dashed block 16 and a program time delay peripheral indicated by the dashed block 16A, buffer and miscellaneous storage apparatus indicated by the dashed block 17, record media control write and read apparatus indicated by the dashed block 18, a common data bus 19, a common instruction word bus 20, and a common status bus 21.

THE TYPEWRITER CONFIGURATION

The keyboard means 1, as mentioned above, may take the form of a conventional electronic keyboard such as that manufactured by the Microswitch Division of Honeywell Corporation or the Keytronics Corporation and should exhibit touch and feel characteristics similar to those of a conventional electric typewriter. The keyboard means 1 includes a standard 44 character set of keys which are each capable of three functions, to whit, lower case, upper case, and an encoded function. As each key on the keyboard means 1 is depressed an eight (8) bit ASCII code associated with the character is produced in parallel by the keyboard in the conventional manner. In addition, certain of the keys within the standard forty-four (44) character set are typamatic or repeatable as is also conventional in electric typewriters and/or electronic keyboards. Such typamatic or repeatable keys should include at least the underscore key, the hyphen key, the space key and the x-key and act in the conventional manner to enable a repeat line so that the character code associated with the key depressed is automatically repeated whenever such typamatic key is held depressed for longer than a predetermined interval of time such as five hundred milliseconds (500 ms) in a manner to be further described below. In addition to the forty-four (44) conventional alphanumeric character keys, the keyboard means 1 should also include conventional input keys or levers such as space bar, shift, shift lock, carrier return, tab set, tab clear and tab as will be further described below. Typical configurations for the keyboard employed in the instant invention are shown in FIG. 9*a* for tape versions and 9*b* for card versions. In addition to the conventional keys found on the majority of electric typewriters, the keyboard means 1, as shown in FIGS. 9*a* and 9*b* also includes a plurality of specialized function keys such as record, revise, alternate reader, code print, search or track step, code, line correct, margin control, duplicate, skip, play, auto, paragraph, line, word, character stop, paper index, space expand and justify keys, as shall be more fully discussed below. Furthermore, as an independent printer is here employed, levers are provided on the keyboard to control the margin settings, print pitch selected including proportional spacing and the intermediate line spacing. These levers, as shall be seen below are necessary because the electronic printer which is preferably employed in this embodiment of the instant invention does not utilize physical stops for margin settings, but instead maintains margin settings and printer position information in memory and selectively controls the limits at which the single element printer carriage may move. Therefore, margin settings are electronically set and stored and paper spacing intermediate lines is controlled by an indexing operation.

The keyboard means 1 is connected to the typewriter configuration interface indicated by the dashed block 15 through a multiconductor control cable 22 and an eight (8) bit data cable 23. The multiconductor control cable 22 comprises a plurality of individual conductors through which control information is interchanged between the keyboard means 1 and other apparatus present in the record media and processor control console 3. Although the control signals supplied to the conductors in the multiconductor cable 22 will be described in detail in connection with the description of FIG. 10, it should be here noted that in essence control signals indicative of conditions at the keyboard are supplied to the apparatus within record media and processor control console 3 and command signals indicative of the type of data to be gated onto the eight (8) bit data cable are supplied to the keyboard from the record media and processor control console 3 through the multiconductor cable 22. The eight (8) bit data cable 23 comprises eight (8) parallel conductors which are each bi-directionally gated to form a full duplex conductor. The eight (8) bit data cable 23 is employed to supply each eight (8) bit ASCII code sequence generated at the keyboard upon the depression of a key thereat in parallel to the apparatus within record media and processor control console 3, while information employed to produce a status indication such as by the illumination of a key or the sounding of an alarm at the keyboard is supplied through the eight (8) bit data cable 23 to the keyboard means 1 from apparatus in the record media and processor control console 3.

The printer means 2, as aforesaid, takes the form of an electronic serial printer. Although any conventional serial printer or for that matter any input/output typewriter may be employed in the instant embodiment of the automatic writing system in accordance with the teachings of the present invention, a modified version of The Diablo Model 1200 High Type I serial printer, available from Diablo Systems Incorporated of Haywood, California is here preferred. The printer means 2 will be more fully described in conjunction with FIGS. 6 and 7 below; however, it should be noted that the Diablo 1200 High Type I serial printer is viewed as highly desireable for applications such as those present in automatic writing systems of the type here being described because a single element print carriage employing a rotating daisy wheel is utilized and results in a serial printer which operates at twice the rate of conventional input/output devices while such serial printing is accomplished without the high ambient noise attendant in both normal line printers and input/output typewriters. In addition, print element positioning, carriage displacement and paper movement or indexing are all accomplished electronically and hence the unit exhibits exceptionally high reliability characteristics due to the avoidance of the majority of mechanical parts normally employed to accomplish these functions in both input/output typewriter devices and line printers. Furthermore, as a plurality of the so-called daisy wheel print fonts are available, type styles and format may be rapidly and easily changed by an inexperienced operator. The printer means 2 is connected to the typewriter configuration interface indicated by the dashed block 15 through a multiconductor control and status cable 24 and a twelve (12) bit data cable 25. The multiconductor control and status cable 24 will be described in greater detail in conjunction with FIG. 7. However, it may be noted that the multiconductor control and status cable 24 is employed to supply status information as to the various conditions monitored at the printer to the apparatus contained in the record media and processor control console 3 and to supply strobe information for character data, carriage movement and data and paper indexing or movement data from the apparatus in the record media and processor control console 3 to the printer means 2. The twelve (12) bit data cable comprises twelve (12) parallel conductors employed to convey the character data, carriage displacement data and paper indexing information between the printer means 2 and apparatus in the record media and processor control console 3. When character data is being supplied from apparatus in the record media and processor control console 3 to the printer means 2 twelve (12) bit wide character data is supplied from a reading of the printer data ROM peripheral 14. Only seven (7) bits of this character data are employed to define the ASCII code utilized for the character information perse while the remaining five (5) bits are employed at the printer means 2 to define hammer force and ribbon width to be used in printing. However, for carriage displacement information or paper indexing information, one bit is employed to define direction while only the necessary number of the remaining eleven (11) bits as are required to define the given displacement within the twelve (12) bit data cable 25 are utilized. The twelve (12) bit data cable 25 is indicated as only providing an input to the printer means 2 because once such an input is supplied, the printer means 2 has sufficient logic to carry out the designated function and provide an indication of its status, i.e. ready, busy or the like, on the multiconductor control and status cable 24.

THE TYPEWRITER CONFIGURATION INTERFACE

The typewriter configuration interface indicated by the dashed block 15 comprises a keyboard interface 26 and a printer interface 27. Each of the interfaces 26 and 27 is described in greater detail below in conjunction with FIGS. 10 and 7 respectively. Therefore, at this juncture in the description of the present embodiment of the instant invention, it is only necessary to note that the keyboard interface 26 and the printer interface 27 perform a plurality of common functions with respect to the printer means 2 or keyboard means 1 with which they are associated and the remaining apparatus in the record media and processor control console 3 and in addition thereto receives control and command information from the apparatus present in the record media and processor control console 3, supplies and receives command and status information from the keyboard means 1 and supplies status information on a command basis to the remaining apparatus in the record media and processor control console 3. Similarly, the printer interface 27 receives twelve (12) bit and multiple bit data representing character information, carriage displacement information or paper movement information from the remaining apparatus within the record media and processor control console 3 and supplies the same as an input to the printer means 2. In addition, the printer interface 27 receives control and command information from the remaining apparatus within the record media and processor control console 3, supplies control information to and receives the same from the printer means 2 and provides a status indication on a command basis as to a selected status condition of the printer to the remaining apparatus within the record media and processor control console 3. Both the keyboard interface 26 and the printer interface 27, additionally act in the traditional role of conventional interfaces in providing for the raising of the various forms of data conveyed to appropriate logic levels for translation to the logic device at the designated destination as well as in the usual gating roles. The keyboard interface 26 is connected to the multiconductor control cable 22 and the eight (8) bit data cable 23, both of which are associated with the keyboard means 1. Thus, control and status information are exchanged between the keyboard means 1 and the keyboard interface 26 through the multiconductor control cable 22 while the data in the form of eight (8) bit characters, wherein each bit of a character is conveyed in parallel, is exchanged between the keyboard means 1 and the keyboard interface 26.

The keyboard interface 26 is connected to the remaining apparatus within the record media and processor control console 3 through an eight (8) bit data cable 28, a sixteen (16) bit instruction word cable 29 and a single bit status conductor 30. As shall become more apparent as the disclosure of the instant invention proceeds, the automatic writing system disclosed herein is organized as a single address data processing system wherein all data is conveyed in parallel along the common data bus 19, all instructions are conveyed along the common instruction word bus 20, while all status information as to the various conditions of the peripherals is conveyed along the common status bus 21. Furthermore, the addressing technique employed is such that the microprocessor indicated by the dashed block 16 initially goes through an idle program in which it selectively samples a plurality of status conditions at each of the peripheals in sequence. Thus, in this idle program the microprocessor indicated by the dashed block 16 essentially waits for a designated event of one type or another to occur at one of the peripherals. When such an event occurs as indicated by a flag on the status bus, the program shifts as a function of the event at the peripheral for which the flag appeared on the common status bus 21 to thereby accomplish appropriate processing for the condition at the peripheral indicated. Accordingly, to achieve this mode of organization, the eight (8) data cable 28 is connected from the keyboard interface 26 to the common data bus 19, the sixteen (16) bit instruction word cable 29 is connected intermediate the keyboard interface 26 and the common instruction word bus 20 while the single bit status conductor 30 is connected between the keyboard interface 26 and the common status bus 21. Thus, eight (8) bit character data is conveyed between the common data bus 19 and the keyboard interface 26 through the eight (8) bit data cable 28, instruction words in the form of command and control information is supplied to the keyboard interface 26 through the sixteen (16) bit instruction word cable 29 from the common instruction word bus 20 and status information, representing a condition on the keyboard which the microprocessor seeks to monitor is supplied from the keyboard interface 26 to the common status bus 21 through the single bit status conductor 30. Therefore, as shall become more apparent in connection with the description in FIG. 10, the keyboard interface 26 acts to logically accept commands issued by the microprocessor indicated by the dashed block 16 on the common instruction word bus 20, to indicate the status of various conditions to be monitored at the keyboard and to logically gate eight (8) bit character data to and from the common data bus 19 so that characters are maintained on a separate basis on the common data bus 19.

The printer interface 27 is connected to the printer means 2 through multiconductor control and status cable 24 and through a twelve (12) bit data cable 25. In addition, in a similar manner to the keyboard interface 26, the printer interface 27 is connected to the remaining apparatus in the record media and processor control console 3 through an eight (8) bit data cable 31, a sixteen (16) bit instruction word cable 32 and a single bit status conductor 33. The eight (8) bit data cable 31 is connected to the common data bus 19 and may take the same form and provide the same function as the eight (8) bit data cable 28 connected intermediate the common data bus 19 and the keyboard interface 23. The eight (8) bit data cable 31, as indicated in FIG. 2, thus acts to convey characters in the form of eight (8) or less parallel bits from the common data bus 19 to the printer interface 27 for subsequent application through cable 25 to the printer means 2, however, as shall be seen in conjunction with FIG. 7, no data is conveyed from the printer interface 27 to the common data bus 19 and accordingly a single direction of data flow is indicated for the eight (8) bit data cable 31. As will be fully apparent to those of ordinary skill in the art, the eight (8) bit data cable 31 need not be gated half duplex cable in that the gating function is here achieved by output apparatus located at the printer interface 27 which responds to instructions issued by the microprocessor indicated by the dashed block 16 while the printer means 2 is capable of independently acting upon instructions and placing an instruction completed flag, as shall be more fully described below, on the single bit status conductor 33. The single bit status conductor 33 is connected to the common status bus 21 and may take the same form and provide the same function as the single bit status conductor 30 connected intermediate the keyboard interface 26 and the common status bus 21. Thus, as shall also be seen hereinafter, the single bit status conductor 33 serves to provide status indications on the common status bus 21 as to the condition of any bit on the common data bus 19 and of the printer and more particularly, as to the ready, busy or instruction completed condition of the various aspects of the printer means 1 which are being selectively monitored.

Although both the keyboard interface 26 and the printer interface 27 will be separately discussed and described in connection with FIGS. 7 and 10 respectively, it should now be apparent that the typewriter configuration interface indicated by the dashed block 15 provides an independent interface for the printer means and the keyboard means and that each interface so provided carries out three separate and distinct functions in addition to the normal logic functions of raising inputs to and outputs from a destination device to appropriate logic levels. The first of these functions is to provide a status indication to the common status bus 21 as to the status of the condition within the printer means 2 or the keyboard means 1 which is then being monitored. For instance, if operation is being initiated and the microprocessor indicated by the dashed block 16 is in an idle program and is thus waiting for some action to occur at one of the peripherals, when a flag goes up on the single bit status conductor 30 and a data presence condition is being monitored, the microprocessor will branch into A Data Presented From The Keyboard program and run through the appropriate program steps to insure that the data character presented from the keyboard is appropriately processed. Similarly, the single bit status conductor 33 from the printer interface 27 is employed to indicate the status of the printer means 2. Thus, for example, if a print step has been issued to the printer, through the combined action of the microprocessor and data supplied from the common data bus 19, the status condition supplied to the common status bus 21 through cable 33 will indicate, in a manner to be more fully explained below, that the print instruction has successfully been completed, that it is still in process, or that further instructions may now be provided to the printer means 2.

The second distinct function of the typewriter configuration interface indicated by the dashed block 15 is to selectively gate alphameric character data or other selected forms of data from the common data bus 19 to the keyboard means 1 or the printer means 2 and to assure that data on the common data bus 19 is appropriately gated at the proper interval to these peripherals or that data from the peripherals is gated at appropriate intervals to the common data bus 19. For example, in a recording operation each eight (8) bit data character presented by an operator to the keyboard means 1 will be selectively gated from the keyboard interface 26 to the common data bus 19 through the eight (8) bit data cable 28 and such gating, which occurs under program control, will ensure that only one eight (8) bit character is supplied to the common data bus 19 in a given processing interval. Similarly, in a printing operation, the printer interface 27 functions to ensure that twelve (12) bit character information is gated from the common data bus 19 to the printer at intervals in which the printer means 2 is ready to receive such information and that no subsequent character information is supplied to the printer before a previous printing operation has been completed The third distinct function of the typewriter configuration interface indicated by the dashed block 15 is to selectively receive address and instruction data from the common instruction word bus 20 to thereby enable the peripheral which has been addressed and to cause such peripheral to acquire the appropriate data from the common data bus 19 and further to perform the appropriate command upon receipt of such data. For instance, when data has been inserted by an operator at the keyboard means 1, a Gate Data To The Data Bus command will be presented on the common instruction word bus 20 and in a manner to be fully described below, the eight (8) bit ASCII code or a modification thereof supplied by the keyboard means 1 is gated through the eight (8) bit data cable 28 to the common data bus 19. Similarly, when a character is to be printed an Acquire Data From The Data Bus command will be presented on the common instruction word bus 20 and supplied to the printer interface 27 through the sixteen (16) bit instruction word cable 32, assuming a proper status indication on the common status bus 21 had previously been received. In response to this command, the printer interface 27 will cause the printer means 2 to acquire the data present on the common data bus 19 and respond to an appropriate manner thereto. From the foregoing description of the keyboard means 1, the printer means 2, the keyboard interface 26 and the printer interface 27, it will be apparent that no direct connection of any type is established between the keyboard means 1 and the printer means 2. Therefore, unless appropriate commands for printing are received from the common instruction word bus 20 and appropriate character information is supplied to the printer means 2 from the common data bus 19, the depression of a key at the keyboard means 1 will not automatically result in the printing of a character representing the key depressed at the printer means 2.

THE PRINTER DATA ROM

The present embodiment of the instant invention is capable of selectively printing information, as shall become more apparent below, in ten pitch, twelve pitch and proportionally spaced print modes. The selection of a desired pitch for printing is accomplished by the placement of the pitch lever at the keyboard, as may be seen in FIGS. 9*a* and 9*b*, in the appropriate position for the pitch selected and the mounting of a daisy wheel print element having a corresponding pitch to that selected within the printer. Although seven (7) bits of the eight (8) bit codes generated at the keyboard are sufficient to uniquely designate each of the alphameric printing characters employed within the instant invention, in proportionally spaced printing modes, the width of each character printed, together with appropriate portions of intercharacter spacing therefor, may vary depending upon the character from three (3) to eight (8) units wherein a unit corresponds to one-sixtieth (1/60th) of an inch while in ten (10) pitch and twelve (12) pitch, printing character widths together with portions of intercharacter spacing therefor are six (6) units and five (5) units, respectively. Furthermore, high quality printing requires that a variable impact or hammer force be employed so that a uniform character impression in printing is achieved regardless of the actual width or other physical parameters of the alphameric character struck. For this reason, the printer data ROM peripheral indicated by the dashed block 14 is employed to provide twelve (12) bit character information to the printer unit 2. Seven (7) of these bits are employed to uniquely define a character to be printed in terms of the spoke on the daisy wheel print element upon which said character is located, three (3) of the bits are relied upon to define character width and are used in proportional spaced modes of printing to control ribbon displacement and the escapement information forwarded while the remaining two (2) bits are employed to define hammer force in four (4) levels.

The printer data ROM peripheral indicated by the dashed block 14 comprises a printer data ROM 43 and a ROM address and control means 44. Although the details of the printer data ROM peripheral indicated by the dashed block 14 are set forth in great detail in conjunction with FIG. 8, it may be here noted that the printer data ROM 43 may take the form of a conventional read only memory containing two hundred fifty-six (256), eight bit words loaded therein and is addressable by eight bits in parallel which are sufficient to uniquely define each eight (8) bit word. The printer data ROM 43 is connected through an eight (8) bit data cable 45 to common data bus 19 to which it supplies addressed eight (8) bit words stored therein and through a multi conductor cable 47 to the ROM address and control means 44 from which address information is received. Both the cables 47 and 45 may be viewed as comprising eight (8) parallel conductors and the output of the printer data ROM 43 is gated.

The ROM address and control means 44 may take the form of an address register and a decoding arrangement for commands received from the common instruction word bus 20. The ROM address and control means 44 is connected through an eight (8) bit data cable 46 to the common data bus 19 and through a sixteen (16) bit instruction cable 48 to the common instruction word bus 20. The eight (8) bit data cable 46 may comprise eight (8) conductors which are connected in parallel to the eight (8) bit data cable 45, as shown, while the sixteen (16) bit instruction cable 48 may comprise sixteen (16) conductors connected in parallel to the common instruction word bus 20. The printer data ROM peripheral indicated by the dashed block 14 is not connected to the common status bus 21 as only ROM addressing and output operations are conducted therein and hence no monitoring operations need be conducted.

In essence, the printer data ROM peripheral indicated by the dashed block 14 functions each time an alphameric character is to be printed to supply twelve bit character information read from the printer ROM 43 in two passes to the common data bus 19 for subsequent application to the printer unit 2. Of this twelve (12) bits of character information, the first seven (7) bits define the spoke position of the character to be printed, the next three (3) bits define character width to be employed whenever proportional spaced printing has been selected and the remaining two bits define the hammer force with which printing is to take place. A character to be printed as initially introduced at the keyboard, or one of the other peripherals, as will become more apparent below, is applied to the common data bus 19 in the form of an eight (8) bit character wherein only the first seven (7) bits thereof are definitive of the character while the eighth bit designates the underscored or non-underscored nature thereof. This convention for character designation is available because only seven (7) bits are required to define alphameric character information while an eight (8) bit code is required to define all of the function and processing information which may be introduced into the system together with alphameric information. At any rate, whenever a character is to be presented, the eighth bit thereof is masked off, a command is applied to the common instruction word bus 20 to cause the ROM address and control means 44 to latch at least the first seven (7) bits of data on the common data bus 19 to thereby serve as the first seven (7) bits of an address for the printer data ROM 43. Whether the eighth bit on the common data bus 19 is latched or a bit from the command instruction is latched as part of the address will turn upon the specific command issued. The command and data to serve as the address is applied to the ROM address and control means 44 through the cables 46 and 48 and the latched address is applied through the multi-conductor cable 47 to the printer data ROM 43. In response to this address, an eight (8) bit word is read from the printer data ROM 43 and applied to the common data bus 19 for subsequent assembly into twelve (12) bit character information and application to the printer. Thus it will be seen that the address for the initial eight (8) bit word of character information read from the printer data ROM 43, is provided essentially by the character information on the common data bus 19 which defines the character per se.

The address initially latched in the ROM address and control means 44 and employed to obtain the first eight (8) bits of the desired twelve (12) bits of character information is also inspected under program control and depending upon the condition of one of the bits therein, data bit 6, one of two fixed quantities are added to the address and a new address is formed. This new address, as formed in the microprocessor, is next latched under program control into the ROM address and control means 44 and applied through multi-conductor cable 47 to the printer data ROM 43. This causes a second eight (8) bit word to be addressed, read therefrom and applied to the common data bus. If one of the two fixed quantities were employed to obtain the new address, the four (4) most significant bits of the eight (8) bit word read from the printer data ROM 43 are employed in the assembly of the twelve (12) bit character information while if a second of the two fixed quantities was employed, the four (4) least significant bits of the second eight (8) bit word are relied upon in the assembly of the twelve (12) bits of character information. Thus, by reliance upon the information defining the character to be printed per se and fixed variations thereof, twelve (12) bits of character information are developed under program control for controlling the operation of the printer unit 2 and these twelve (12) bits of character information define the character to be printed, its width if a proportionally spaced mode of printing has been selected and the hammer force with which it is to be printed.

THE BUFFER AND MISCELLANEOUS STORAGE APPARATUS

The buffer and miscellaneous storage apparatus indicated by the dashed block 17 comprises a random access memory (RAM) 34 and RAM address and control means 38. The actual construction of both the random access memory 34 and the RAM address and control means 38 is developed in great detail in conjunction with FIG. 11. Therefore it is here sufficient to appreciate that the random access memory 34 may comprise a conventional 1024×8 non-destructive read, random access memory requiring a ten (10) bit address for uniquely defining a given eight (8) bit storage location for reading or writing purposes. More particularly for functionally understanding the operation of random access memory 34, it should be noted that the available storage locations within the RAM 34 are divided into quarters to form a read/write buffer 35 having two hundred fifty-six (256), eight (8) bit words of available storage, a read only buffer 36 having a like number of storage locations and the remaining half of the RAM 34 is allocated for general storage purposes, as set forth in an attached listing, to thereby accommodate five hundred twelve (512) words of information which require selective storage and retrieval during normal processing operations. Here, however, principal focus should be placed upon the read/write and read only buffers 35 and 36 formed within the RAM 34 as they act, under program control, as independent peripherals within the instant invention. Both buffers 35 and 36 defined within the RAM 34 act, in essence, to accumulate line information to be processed either as the same is entered from the keyboard 1, read from another buffer and/or a record media so that such information as is accumulated as a line may be further processed at highly efficient rates and in a manner to suitably accommodate both the forwarding and receiving peripherals involved in a given operation. Thus, for example data entered at the keyboard for recording purposes is typically accumulated in the read/write buffer 35 until an end of a line is indicated by a carriage return character. Thereafter, the record media is enabled and brought to speed and the entire line of eight (8) bit characters accumulated in the read/write buffer 35 is recorded. Conversely when a record media is being played back, a line of information is typically read therefrom and accumulated in the read only buffer 36. Thereafter it is handled on a per character basis as the same is read out and transformed into character information suitable for application to the printer unit 2. When the line of information in the read only buffer 36 has been processed, the record media may again be enabled to cause the reading of a new line of information therefrom and the insertion of this line of information into the read only buffer 36.

The RAM 34 is connected through the eight (8) bit data cable 39 to the common data bus 19. The eight (8) bit data cable 39 may take the form of eight (8) conductors which are connnected in parallel to individual conductors within the common data bus 19 so that any addressed location within the RAM 34 may be read out onto the common data bus 19 or alternatively an eight (8) bit word present on the common data bus 19 may be written in parallel into an addressed storage location within the RAM 34.

The RAM 34 is connected through a multi-conductor cable 40 to the RAM address and control means 38. As the RAM 34 requires a ten (10) bit address as aforesaid plus an additional bit for enabling either a write or read function, the RAM address and control means 34, as shall be seen in greater detail in conjunction with FIG. 11, comprise essentially an eight (8) bit up/down counter for addressing a given quarter of the RAM 34 in sequence, a multiplexor for selectively applying either the output of the up/down counter or the RAM 34 to a gated output to the common data bus 19 and logic for decoding commands issued to the buffer and miscellaneous storage apparatus indicated by the dashed block 17 and enabling appropriate functions therein in response thereto.

The RAM address and control means 38 is connected to the common data bus 19 through the eight (8) bit data cable 39 through which it receives eight (8) bit address information for the up/down counter and to which it selectively supplies the current address of the up/down counter. The up/down counter provides eight (8) of the ten (10) bits of the address required for the RAM 34 and therefore serves to address individual words therein within a quarter through the multi-conductor cable 40. Similarly, the RAM address and control means 38 is connected to the common instruction word bus 20 through a sixteen (16) bit instruction cable 41. The sixteen (16) bit instruction cable 41 may comprise sixteen (16) conductors which are connected in parallel to individual conductors within the common instruction word bus 20. The decoding of instructions issued to the buffer and miscellaneous storage apparatus indicated by the dashed block 17 controls the operations thereof and it should also be noted that two bits within such instructions are employed to complete the address applied to the RAM 34 through the multiconductor cable 40 and serve in the role of uniquely defining one of the quarters therein. The RAM address and control means 38 is also shown as connected through connector 42 to the common status bus 21 so as to selectively provide status indications thereto. Such status indications may be provided, for example, to indicate an end of stored line information in one of the buffers 35 and 36.

Thus, in the same manner as any other peripheral employed within the instant invention, the buffer and miscellaneous storage apparatus indicated by the dashed block 17, receives commands from the common instruction word bus 20, conveys eight (8) bit data between itself and the common data bus 19 and indicates appropriate status conditions on a command basis to the common status bus 21. However, due to the functional division by quarters of the RAM 34, effectively three independent peripherals are here provided in the form of a read/write buffer 35, a read only buffer 36 and general storage locations 37.

THE RECORD MEDIA TRANSPORT APPARATUS

The remaining alphameric data handling peripheral employed in the instant embodiment of the automatic writing system according to the present invention is the record media control write and read apparatus indicated by the dashed block 18. In similar manner to the buffer and miscellaneous storage apparatus indicated by the dashed block 17, the record media control write and read apparatus indicated by the dashed block 18 comprises two record media stations wherein one of said record media stations is employed for both writing data on and playing data from a record media while the other station is employed solely to read data from a record media which has previously been recorded. This mode of organization, though arbitrary, has here been employed so that recording will always take place at the same record station to avoid possible operator confusion; however, it will be apparent from the portions of this disclosure that follow that both record stations could be supplied with a writing capability without any deviation from the concepts of the invention here being disclosed. The record media control write and read apparatus indicated by the dashed block 18 includes a read/write station comprising a write decoder means 50, a read decoder means 51, a read/write station control circuit 52 and a read/write record media transport 53 which includes recording/playback heads; and a read only station comprising a read decoder means 54, a read only station control circuit 55 and a read only record transport 56 which includes a playback head.

The read/write record station acts to either receive data in parallel on a per line basis from the common data bus 19 and to cause such data to be serially recorded on a record media or to read data in a series on a per line basis from a record media and apply such data in parallel to the common data bus 19. Accordingly, although the write decoder means 50 will be further described in connection with FIG. 13, the write decoder means 50 may here be considered to take the form of a conventional parallel to series converter which acts in the well known manner to convert an eight (8) bit data character received in parallel to a serial format and present the converted character on a single output conductor. The write decoder means 50 is connected through an eight (8) bit data input cable 57 to the common data bus 19, through a single output conductor 58 to the read/write record media transport 53 and through a multi-bit control cable 59 to the read/write station control circuit 52. The eight (8) bit data input cable 57 may take the form of eight (8) parallel conductors each of which is connected to one of the eight (8) data bit conductors in the common data bus 19. Thus, the eight (8) bit data input cable 57 may take precisely the same form as the other data cables employed to convey data between one of the peripherals utilized in the instant invention and the common eight (8) bit data bus 19. The eight (8) bit data input cable 57 acts as will be apparent to those of ordinary skill in the art, to apply eight (8) bit character data to the write decoder means 50 from the common data bus 19. The single bit output conductor 58 is connected intermediate the write decoder 50 and the read/write record media transport 56 and more particularly, as shall be seen below, to the recording head therein. Accordingly, the single bit output conductor 58 acts to supply each data character applied to the write decoder means 50 to the write head within the read/write record media transport 53 after such data has been converted into serial format.

The multibit control cable 59 is connected between the write decoder means 50 and the read/write station control circuit 52. As shall be more fully described in connection with FIGS. 9 and 11, the multibit control cable 59 is employed to convey control information between the write decoder means and the read/write station control circuit 52 for the control of both the write decoder means 50 and the read/write record media transport. More particularly, the multibit control cable 59 is employed to supply enabling signals to the write decoder means 50 so that data from the common data bus 19 is selectively gated thereto and in addition, data presence information is applied from the write decoder means 50 to the read/write station control circuit 52 for controlling the read/write record media transport 53. The read/write station control circuit 52 will be described in detail in conjunction with FIG. 11; here, however, it is sufficient to appreciate that the read/write station control circuit 52 acts to control the selective enabling of the write decoder means 50 and the read decoder means 51 in response to commands from the microprocessor 16 applied thereto from the common instruction word bus 20. In addition, the read/write station control circuit 52 acts to control the operation of the read/write record media transport 53 in a manner which is consistent with the command instructions received and to provide a status indication of such operation to the common status bus 21. For instance, the read/write station control circuit 52 controls the speed and direction of the read/write record media transport 53 in a manner which is consistent with the speed and directional requirements of the command received. Thus, if a search operation has been commanded in an embodiment employing cassettes, the read/write station control circuit 52 will cause the read/write record media transport 53 to drive the record media at a fast rate, i.e. about seventy inches per second (70 ips), in an appropriate direction to locate the appropriate material being searched. Conversely, if a read or write operation has been commanded, the read/write station control circuit 52 will cause the read/write record media transport 53 to drive the record medium at a reduced speed, about twenty inches per second (20 ips), in an appropriate direction for reading or writing and will enable the appropriate write decoder means 50 or the read decoder means 51 when the speed mandated has been obtained. Furthermore, the read/write station control circuit 52 will provide a status indication to the common status bus 21 as to the status of the mode of operation of the read/write record transport 53 so that such status indications may be employed in the microprocessor indicated by the dashed block 16 to cause further commands, under program control, to be issued for completing or furthering the operations commanded.

The read/write station control circuit 52 is connected to the read/write record media transport 53 through a multiconductor control cable 60 and to the common status bus 21 through a single bit status conductor 61. The read/write record media transport 53 may take the form of a conventional record media transport means which includes recording and playback heads. More particularly, if the record media employed in this embodiment of the present invention takes the form of conventional Phillips type cassettes, the read/write record media transport would take the form of a conventional cassette drive or transport system having a record or playback speed of approximately twenty inches per second (20 ips) and a fast forward and rewind speed, which is here employed for media manipulation as well as search purposes, of approximately seventy inches per second (70 ips). Conversely, if magnetic cards were employed, conventional card discs could be employed wherein the card is separately driven by one motor and a second motor would control a lead screw upon which the head was mounted. Furthermore, such conventional record media transport would include record and playback heads together with an appropriate biasing source and preferably a common record and playback head having low noise characteristics would be employed. However, as will be apparent to those of ordinary skill in the art, the record media upon which recording takes place does not matter a whit to the input and output electronics associated therewith and hence, conventional cassette drives, magnetic belt drives, or even paper punch tape drives, together with appropriate record, playback and erase transducers could be readily substituted for the read/write transport 53 here described. Furthermore, if a record media better suited to the parallel recording of character information than the instant cassettes being described were selected, it would be obvious to those of ordinary skill in the art that the write decoder means 50 and the read decoder means 51 could be replaced by direct, gated connections to the common data bus 19. Although, as aforesaid, any suitable read/write record media transport could be employed in the practice of the instant invention, the manner in which the record media is manipulated and operated on an intermittent basis requires a transport system having an ability to rapidly come to speed and stop so that only limited amounts of the record media are wasted during such operations. In addition, relatively constant speed characteristics which are capable of being monitored are preferred. For this reason, it is preferable that the record media transport system disclosed in conjunction with U.S. Ser. Nos. 3,299,054; 329,055; and 329,056 each of which were filed on Feb. 2, 1972 or of the kind disclosed in U.S. Ser. No. 512,578 as filed in the names of Kockler, Johnson and Leinberger on Oct. 7, 1974 entitled Means For Visually Adjusting A Pinch Roll For Magnetic Card Transport System; and assigned to the same Assignee as the instant application be employed. For these reasons the disclosures of these applications should be viewed as incorporated by reference herein.

The read/write record media transport is connected to the read decoder means 51 through the single bit conductor 62 and to the write decoder means 50 through the single bit output conductor 58, as aforesaid. The single bit input conductor 62 is connected at the read/write record media transport 53 to the read head therein while the single bit output conductor 58 is connected to the write head; of course, in cases where a common read/write transducer is employed, which would be the preferable case, both conductors 58 and 62 would be connected to appropriate transducer portions in the same head. In addition, the record media transport electronics for controlling the speed and direction of the transport as well as the on or off input for selectively enabling the transport are controlled by the read/write station control circuit 52 through the multiconductor control cable 60. A more detailed description of the various modes of control exercised over the transport by the read/write station control circuit 52 is set forth in connection with FIGS. 15a and 15b.

The read decoder means 51 is described in greater detail in connection with FIG. 14. Here, however, it is sufficient to appreciate that the read decoder means 51 comprises a conventional serial to parallel converter which acts in the well known manner to accept serial character information in the form of eight (8) bits applied to the single bit input conductor 62 and to transform the character format thereof into an eight (8) bit parallel code for application to the common data bus 19. The read decoder means 51 is connected through an eight (8) bit data cable 63 to the common data bus 19 and through a multibit control cable 64 to the read/-write station control circuit 52. The read decoder means 51 thereby acts, under program control supplied to the read/write station control circuit 52, to accept serial character data read from the record media on the single bit input conductor 62 and to transform such data into an eight (8) bit parallel format for application to the common data bus 19 through the eight (8) bit data output cable 63. The multibit control cable 64, in similar manner to the multibit control cable 59, is employed to convey instruction and status information between the read decoder means 51 and the read/write station control circuit 52. Thus, the operation of the read decoder means 51 is selectively enabled in response to commands supplied to the read/write station control circuit 52 on the common instruction word bus 20 while the status of the data at the read decoder means 51 is indicated through the multibit control cable 64 to the read/-write station control circuit 52 so that such status may be indicated to the microprocessor and employed to extend the program commands for the continuation or altering of the operation being performed.

The write decoder means 50, the read decoder means 51, the read/write station control circuit 52 and the read/write record media transport 53 thus form a complete record media station having the capability for both recording data on a record media and reading data therefrom. Thus, as will be apparent to those of ordinary skill in the art, were it desired to provide a more limited automatic writing system, not having, as shall be more readily appreciated hereinafter, the capability for transferring information between the record media, no further record station apparatus would be employed. Such a more limited embodiment of the present invention could utilize the single read/write record station and both the buffers depicted in the dashed block 17 or only a single buffer could be employed. This same approach to providing a more limited system could be here utilized regardless of whether or not cassettes, magnetic cards, belts, tapes or paper punch recording and playback apparatus were utilized. At this juncture in the disclosure of the present invention, it should be appreciated that the read/write record media station formed by the write decoder means 50, read decoder means 51, the read/write station control circuit 52 and the record media transport 53 operates with respect to the overall automatic writing system disclosed herein in the same manner as any other peripheral in the instant embodiment of the automatic writing system. Thus, the read/write record media station receives or applies character information in the form of eight (8) bit data characters to the common data bus 19, receives commands from the microprocessor indicated by the dashed block 16 from the common instruction word bus 20 and indicates the status of its response to such commands on the common status bus 21. Furthermore, the operation of the read/write record media station is characterized in that character information loaded into the buffers enclosed within the dashed block 17 is accumulated until a line of information has been obtained. Thereafter, the buffer is dumped onto the recording medium through the action of the microprocessor and the read/-write station. Alternatively, a complete line of data is read from the record media, supplied through the common eight (8) bit data bus to the buffers enclosed within dashed block 17 and read out from said buffers on a per character basis to further peripherals within the system.

The read only record media station enclosed within dashed block 18 comprises as aforesaid, the read decoder means 54, the read only station control circuit 55 and the read only record transport 56 which includes at least a playback head. The read decoder means 54 may take the same form as the read decoder 51 and hence acts as a serial to parallel converter in transforming the format of eight (8) bit character information received in series into parallel and applying the same to the common data bus 19. The read decoder means 54 is connected to the common data bus 19 through an eight (8) bit data output cable 67 and to the output of the read head in the read only record media station 56 through a single bit input conductor 68. The read decoder means 54 thereby acts to receive character information in serial format, to transform such character information into a parallel format and thereafter apply such character information in a parallel format to the common data bus 19. In addition, the read decoder circuit means 54 is connected through a multiconductor control cable 69 to the read only station control circuit 55. The multiconductor control cable 69 is employed to exchange status and control information between the read decoder means 54 and the read only station control circuit 55 in the same manner and for the indentical purposes as control information and status information is exchanged between the read decoder circuit 51 and the read/write station control circuit 52 through the multiconductor control cable 64.

The read only record media transport 56 may take the same form, perform the same functions and admit to the same variations as the read/write record media transport 53 with the exception that no write apparatus need be provided therefore since a recording function is not utilized in the read only record media station in this embodiment of the present invention. However, manufacturing expediency may dicatate that the read only record media transport 56 be identical to the transport employed in the read/write record media station and that the write inputs thereto not be connected. This view is taken because when a common recording and playback transducer is employed, the cost differential between a read only transport and a read/write transport such as employed in this embodiment of the instant invention is insubstantial. The playback head present in the read only record media transport 56 is connected to the single bit input conductor 68 so that data read from the record media during the operation thereof may be applied to the read decoder means 54 through the single bit input conductor 68 in the manner aforesaid. The read only record media transport 56 is connected to a multiconductor control cable 70 to the read only station circuit 55. The read only record media transport 56 is controlled, through the multiconductor control cable 70, by the read only station control circuit 55 in the same manner that the read/write media transport 53 is controlled by the read/write station control circuit 52 though the multiconductor control cable 60 except that no information associated with a write function is applied thereto. The read only station control circuit 55 may take a similar form to the read/write station control circuit 52 except that no information associated with a write function is supplied thereto and accordingly no control information associated with such a write function is generated thereby. However, the read only station control circuit 55 acts in the same manner as the read/write station control circuit 52 to selectively enable and control the operation of both the read only record media transport 56 and the read decoder means 54 under program instructions and commands received from the common instruction word but 20. The read only station control circuit 55 is connected to the common status bus 21 through a single bit status conductor 71 and thereby acts to apprise the microprocessor enclosed within the dashed block 16 as to the status of the various aspects of the read only record media transport 56 and the read decoder means 54 which are monitored for the purposes, as shall be further explained below, of implementing the program commands and instructions placed on the common instruction word bus 20. The read only station control circuit 55 is additionally connected to the common instruction word bus 20 through a sixteen (16) bit instruction word cable 72. In this manner, the read only station control circuit 55 receives instructions and commands produced by the microprocessor and applied to the common instruction word bus 20 and provides control instructions in accordance with such commands to the read only record media transport 56 and the read decoder means 54.

Although a more detailed description of the operation of the read only record media station formed by the read decoder means 54, the read only record media transport 56 and the read only control circuit 55 will be presented hereinafter, the basic relationship between the read only record media station and the read/write record media station enclosed within the dashed block 18 may be readily appreciated by a basic recognition of their roles within the system. Thus, the read/write record media station is employed whenever it is desired to record data from any periphral on a record media. Such data may originate from the keyboard means 1 and/or the read only record media station. Once the data is introduced to the common data bus 19, it is manipulated in a manner which is consistent with the operation in progress and eventually is loaded on a per character basis into the read/write buffer 35. Once a full line of data has been loaded into the read/write buffer 35, the buffer is dumped and the entire contents of the buffer are recorded on the record media present in the read/write record media transport 53. If a record operation from the keyboard is in progress, the read only station will not be employed; however, if it is desired to duplicate in whole or in part, the contents of a previously recorded record media, this record media is loaded at the read only station and is read on a per line basis into the read only buffer 36. If the line of data thus read from the record media at the read only station is to be duplicated completely, the read only buffer will be dumped into the read/write buffer which is subsequently dumped and recorded on a record media at the read/write record station. However, if only partial recordation of the line loaded into the read only buffer 36 is desired, the read only buffer 36 is selectively read out on a per character basis and such characters as are read out are selectively loaded into the read/write buffer 35. For instance, such data characters as are read from the read only buffer 36 may be merged with other data characters placed onto the common data bus 19 by the keyboard so that a reorganization of the data applied in sequence in a selective manner to common data bus 19 results. Once a complete line of data is loaded into the read/write buffer 35 the line is read out in its entirety through the common data bus 19 and applied to the read/write record media station where it is recorded in a serial manner on the record media loaded at the record media transport 53.

In the modes of operation just described the read only station was employed as a reader while the read/write station was employed as a data recording station. In a playback mode, however, either the read only station or the read/write station may be employed to read the record media located thereat on a per line basis and to insert the data read thereby into the read only buffer 36. Thereafter, the read only buffer 36 is read on a per character basis and each character applied the reby to the common data bus 19 results in the application of character printing information through the action of the printer data ROM 43, as aforesaid, to the printer to obtain document production. In a further mode of operation to be described, both the read only station and the read/write station are employed as readers and information representing data obtained therefrom is selectively applied to the printer so that batched letters and the like may be obtained. Thus, it is seen that the read/write station and the read only station employed in the instant embodiment of the present invention provides an automatic writing system having substantial flexibility and versatility; however, should lesser capability be desired the read only record station could be omitted while if greater flexibility were though to be advantageous, additional read only or read/write stations would be added as they are merely individual peripherals to be connected in the same manner as the read/write station and the read only station to the common data bus 19, the common status bus 21 and the common instruction word bus 20.

THE PROGRAM TIME DELAY PERIPHERAL

The program time delay peripheral indicated by the dashed block 16*a* functions to provide designated real time intervals, under program control, for processing operations being conducted by the microprocessor indicated by the dashed block 16 so that the available memory therein need not be consumed by the creation therein of special counting arrangements devoted to this purpose as was the case in U.S. Ser. Nos. 429,479 and 430,130 supra. Such real time intervals are necessary during processing operations under conditions, for instance, wherein the program seeks to ascertain whether a repeatable key has been held depressed for the requisite 500 millisecond interval to enable the repeat function, where a gap on a record media is being tested as to length for identification purposes and the displacement speed thereof is known, or where a buzzer or the like is to be enabled for a fixed interval. For this reason the program time delay peripheral indicated by the dashed block 16a may properly be considered to be part of the microprocessor as indicated by the dashed block 16 and has been given a related referenced numeral. However, as the program time delay peripheral indicated by the dashed block 16*a* is essentially self contained and structured in much the same manner as the other peripherals employed within the instant invention, a functional description as well as an understanding of the operation thereof is best conveyed by way of treating the same as an independent peripheral.

The program time delay peripheral indicated by the dashed block 16a comprises delay counters 74 and delay control means 75. The delay counters 74, as may be seen in greater detail in FIG. 12, comprise a half second delay counter and a two millisecond (2ms) delay counter. Each delay counter is loaded from the common data bus 19 with the number of half second or two millisecond increments to be counter and provides an indication as to when the designated count has been achieved. The delay counters 74 are connected through an eight (8) bit data cable 76 to the common data bus 19 so that bit information defining the number of increments to be loaded for counting purposes, as placed on the common data bus 19 by the microprocessor may be loaded therein.

The delay counters 74 are connected through a multiconductor cable 77 to the delay control means 75. The delay control means 75 receives count completed status indications from the delay counters 74 through the multiconductor cable 77 and applies such status indications on a command basis to the common status bus 21 through a single bit status conductor 78. In addition, the delay control means 75 decodes commands issued to the program time delay peripheral 16a on the common instruction word bus 20 and in response thereto applies appropriate load commands and clock signals to the delay counters 74 through the multiconductor cable 77 so that increments to be counted may be loaded from the common data bus 19 and appropriately counted down. The delay control means 75 is connected through a sixteen (16) bit instruction cable 79 so that commands issued to the program time delay peripheral on the common instruction word bus may be received and decoded. The sixteen (16) bit instruction cable 79 may comprise sixteen (16) conductors which are connected to individual conductors within the common instruction word bus 20.

Thus it will be seen that the program time delay peripheral indicated by the dashed block 16a receives commands issued thereto on the common instruction word bus 20 and in response thereto loads increments to be counted from the common data bus 19 into an appropriate two millisecond (2ms) or half (½) second counter. Thereafter the counting of the real time interval defined is initiated and upon a completion of the real time interval being timed, a count done condition is indicated on a command basis on the common status bus 21.

THE MICROPROCESSOR APPARATUS

The central processor which takes the form of a microprocessor, is indicated by the dashed block 16. Although memory capacity and attendant addressing ability have been increased, the operation of the microprocessor is much the same as disclosed in U.S. patent application Ser. No. 430,130 entitled Automatic Word Processing System, as filed in the names of Harry W. Swanstrom, Werner Schaer and Kenneth C. Campbell on Jan. 2, 1974 and assigned to the Assignee of the instant application. This application which is incorporated herein by reference explains in great detail the structure, special and general functions of, and the specialized and general operation of a smaller version of the microprocessor included within the dashed block 16. Therefore, a duplication of the substantial disclosure materials present in that application shall not be reiterated here with respect to areas which have remained unchanged. However, to properly appreciate the modified structure of the microprocessor and various modes of operation of the automatic writing system according to the present invention, a general acquaintance as to the structure, modes of operation, and programming techniques employed in the microprocessor indicated by the dashed block 16 is appropriate and the modified structure of the microprocessor is set forth in detail in conjunction with FIGS. 3 - 5. A general description of the structure and mode of operation of the microprocessor indicated by the dashed block 16 will be set forth in conjunction with FIGS. 2 and 3 - 5 and exemplary programs, addressing techniques and the use and function of instructions at the peripherals will be described below while complete copies of the programs for cassette and card embodiments of the instant invention are attached hereto as Appendices A and B. It should be appreciated, however, that a detailed understanding of the microprocessor enclosed within the dashed block 16 may be enhanced by an inspection of U.S. application Ser. No. 430,130.

The central processor in the form of the microprocessor indicated by the dashed block 16 comprises a read only memory 80, a ROM address register 81, a return address register 82, general purpose registers G and H as indicated by the block 83, an arithmetic logic unit 84 and a main register M. The read only memory 80 may take the form of a preprogrammed, hard wired memory having 8, 192 (8K) sixteen (16) bit instruction words, wherein each of these instruction words designates a specific system operation. The sixteen (16) bits of each instruction word, are designates $B_0 - B_{15}$ in FIG. 2 and in the remaining figures of this application as will be described hereinafter. The read only memory 80 may take the form of a plurality of MSI chips organized in a three-dimensional array having eight (8) major pages, an exemplary major page being shown in FIG. 5. Each major page thereby contains 1,024 (1K) of said preprogrammed sixteen (16) bit instruction words and each page is further divided into four minor pages wherein each minor page contains 256 of the sixteen (16) bit instruction words. Although any conventional semiconductive LSI or hard wire magnetic read only memory configuration may be employed in the formation of the read only memory 80, MSI chips are here preferred because they may be readily programmed and organized into the three-dimensional structure described above in a manner such that groups of four (4) chips form one of the requisite four minor pages required for each major page. In an actual embodiment of this invention which was constructed and tested, one hundred twenty-eight (128) INTERSIL 5603*c* chips, each of which is 256 bits long and 4 bits wide were employed to form the read only memory 80. Although a read only memory having 8, 192 sixteen (16) bit instruction words is here being discussed, it will be readily appreciated by those of ordinary skill in the art that the read only memory 80 may be readily expanded, through the use of either the addition of major pages internally or the use of an external memory, if additional capability should be required.

The output of the read only memory 80, which takes the form of a sixteen (16) bit instruction word is connected to the common instruction word bus 20 through a sixteen (16) bit instruction word cable 85. The sixteen (16) bit instruction word cable 85 may take the form of sixteen (16) parallel conductors which each receive a single bit of a sixteen (16) bit instruction word readout each time the read only memory 80 is addressed and acts to apply each bit of the sixteen (16) bit instruction word in parallel to the common instruction word bus 20. As shall be appreciated by those of ordinary skill in the art, the organization of the read only memory 80 is such that three (3) bits are required to address each major page and two (2) bits are required to address each minor page so that a total of five (5) bits are required to uniquely address each of the thirty-two (32) minor pages each of which contains 256 sixteen (16) bit instruction words.

Therefore, as eight (8) bits are required to uniquely define each word of a minor page, a thirteen (13) bit address is employed in the addressing of the read only memory 80. In addition, the read only memory 80 is further organized in a manner such that each minor page is divided into sixteen (16) sections each of which is sixteen (16) bits wide. Therefore, of the eight (8) bits required to uniquely define each of the 256 sixteen (16) bit instruction words within a minor page, the four (4) high order order bits may be viewed as defining the section therein while the four (4) low order bits uniquely define one of the sixteen (16) instruction words in that section. Thus, of the thirteen (13) bits required to address the read only memory 80, the five (5) high order bits define a minor page, the four (4) middle order bits define a section of a minor page, while the lower order four (4) bits define a given instruction within the minor page section.

The read only memory 80 is connected to ROM address register 81 through a thirteen (13) bit address cable 86. As shall be seen below the thirteen (13) bit address cable 86 receives a thirteen (13) bit address from the ROM address register 81 and applies such thirteen (13) bit address in parallel to the read only memory 80 so that a selected word therein is uniquely addressed. The thirteen (13) bit address cable 86 may take the form of thirteen (13) parallel conductors. The ROM address register 81 is more fully described below in conjunction with FIG. 3 and in U.S. application Ser. No. 430,130 which is directed, as aforesaid, to a smaller version of the microprocessor enclosed within the dashed block 16. However, for the purposes of this portion of the instant disclosure, a sufficient understanding of the structure and function of the ROM address register 81 may be had by an appreciation that the ROM address register 81 acts to provide a thirteen (13) bit address to the read only memory 80 and comprises a multiplexer, an adder, a next absolute address register and an output register connected in the order recited. In addition, the ROM address register 81 is designed internally so that independent control is exercised over the five (5) high, four (4) middle and four (4) low order bits in each thirteen (13) bit address produced thereby so that the addressing technique employed is organized along the same lines as the read only memory 80 whereupon the five (5) high order bits of each address designate a minor page, the middle four (4) bits of each address designate a section and the lower four (4) bits designate a unique sixteen (16) bit instruction word within a section of a minor page. Therefore, the ROM address register 81 is internally organized essentially into one five (5) bit and two four (4) bit sections such that each section provides one group of the thirteen (13) bits required to be present in the output thereof applied to the thirteen (13) bit address cable 86 as an address for the read only memory 80. For this reason, as may be seen in greater detail in FIG. 3, essentially three (3) multiplexers are employed wherein the first such multiplexer provides a five (5) bit output directed to the high order bits associated with the thirteen (13) bit address, the second multiplexer provides a four (4) bit output associated with the middle four (4) bits associated with the thirteen (13) bit address and the third multiplexer provides a four (4) bit output associated with the lower four (4) bits of the thirteen (13) bit address. The multiplexer, or more particularly, the three (3) multiplexers present in the ROM address register 81 are arranged to provide either thirteen (13) low order "B" bits from the read only memory 80, thirteen (13) "AB" bits from the return address register 82, or thirteen (13) zero (0) bits at the output thereof. For this reason, the ROM address register 81, as shown in FIG. 2, is connected through a sixteen (16) bit instruction word cable 87 to the sixteen (16) bit instruction word bus 20 and through a thirteen (13) bit address cable 88 which is connected to the return address register 82. As will be apparent to those of ordinary skill in the art from the internal organization of the ROM address register 81 mentioned above, high order bits $AB_8 - AB_{12}$ from the thirteen (13) bit address cable 88 are connected to five (5) of the inputs to the high order multiplexer while in similar manner, bits $B_8 - B_{12}$ from the sixteen (16) word instruction word cable 87 are connected to the other five inputs of the high order multiplexer. Similarly, bits $AB_4 - AB_7$ from the thirteen (13) bit address cable 88 are connected to four inputs of the middle multiplexer and the bits $B_4 - B_7$ from the sixteen (16) bit instruction word cable 87 are connected to the remaining four inputs of this multiplexer. The four low order bits from the thirteen (13) bit address cable 88 and the four low order bits from the sixteen (16) bit instruction word cable 87 are connected in similar manner to the eight (8) inputs of the low order multiplexer. Therefore in the conventional manner, well known to those of ordinary skill in the art, whether the output of each of the three multiplexers comprise "AB" bits "B" bits or all Zero bits employed for sequential addressing is determined by the select input to each of the multiplexers. The remaining bits applied from the sixteen (16) bit instruction word cable 87, bits $B_{13} - B_{15}$, are employed within the read only memory address register 81 for logic purposes which are not presently deemed appropriate for discussion.

The five outputs of the high order multiplexer comprising either Zero bits, bits $AB_8 - AB_{12}$ or $B_8 - B_{12}$ are applied directly to five inputs of the next absolute address register present within the ROM register 81 as aforesaid. The next absolute address register connected to the output of the high order multiplexer, may comprise five flip flops, which are preferably embodied on an MSI chip or the like. The outputs of the next absolute address register are connected directly to five inputs of an output address register, which may again take the form of five inputs of an output address register, which may again take the form of five flip flops preferably embodied on an MSI chip of similar nature to that described for the next absolute address register. The output register provides the five high order outputs on the thirteen (13) bit address cable 86 connected to the read only memory 80 and hence acts to define the minor page addressed. The relationship between the next absolute address register and the output address register associated with the five (5) high order output bits is such that the output presently being applied to the five high order inputs of the read only memory 80 is loaded in the output address register while the next succeeding address is loaded in the next absolute address register if it is to be changed and subsequently transferred to the output register upon an appropriate clock pulse which follows the addressing of the read only memory 80.

The output of the second multiplexer, which provides a four bit output comprising Zero Bits, bits $AB_4$ - $AB_7$ or alternatively bits $B_4$ - $B_7$, is also applied through a four (4) bit next absolute address register and a four (4) bit output address register to the central four bits of the thirteen (13) bit address cable 86 for application to the read only memory 80 and acts to designate a minor page section therein. The next absolute address register and the output register associated with the central four (4) bits of the address, may take precisely the same form of conventional flip flop structure mentioned above. Here, however, an adder circuit, which may comprise a conventional MSI chip such as an MSI 7483 chip available from the Texas Instrument Corporation is interposed intermediate the output of the multiplexer associated with the central four (4) bits, as aforesaid and the input to the next absolute address register. This adder is a conventional four (4) bit binary full adder which acts to sum the information present on its input lines and adds a one (1) to the resultant sum if the carry input is enabled. The adder circuit thus receives either Zero bits, bits $B_4$ - $B_7$ or bits $AB_4$ - $AB_7$ from the multiplexer. In addition, the adder also receives as an input thereto the four (4) middle order bits $A_4$ - $A_7$ of the previous address supplied to the read only memory 80. For this reason, as shown in FIG. 2, the ROM address register 81 is connected to an eight (8) bit last address cable 90 which, as will be apparent to those of ordinary skill in the art, receives the eight (8) low order bits from the last thirteen (13) bit address applied to the read only memory 80 through the thirteen (13) bit address cable 86 from a thirteen (13) bit return address cable 91 which merely feeds back the address applied to the read only memory 80 to the return address register 82. The thirteen (13) bit return address cable 91 may simply comprise thirteen (13) individual conductors, each of which is connected to one of the thirteen (13) conductors within the thirteen (13) bit address cable 86. Therefore, the stripping of the eight (8) low order bits on the thirteen (13) bit return address cable 91 is simply achieved by merely connecting eight (8) individual conductors, which may be present within the eight (8) bit last address cable 90 to the eight (8) low order conductors within the thirteen (13) bit return address cable 91. Of the eight (8) bits which are applied to the eight (8) bit last address cable 90, the four (4) high order bits $A_4$ - $A_7$ therein are applied as gated separate inputs to the adder connected intermediate the middle order multiplexer and the next absolute address register therein. Accordingly, the adder sums the output of the multiplexer, which may be Zero (0) connected thereto and the four (4) intermediate order bits $A_4$ - $A_7$ from the last address if they are gated through, and the resulting sum may then be incremented, if appropriate, and thereafter loaded into the next absolute address register for subsequent loading in parallel into the output address register associated with the middle four (4) order bits for subsequent application to the read only memory 80 in the next address. Thus, the adder may increment by ONE (1) the sum of the four (4) middle order bits $A_{4-7}$ from the last previous address and the output from the multiplexer which may comprise, as aforesaid, either all Zero bits, the middle order bits $AB_4$ - $AB_7$ from the return address register 82 or the middle order bits $B_4$ - $B_7$ from the read only memory 80.

The portion of the read only memory address register 81 associated with the lower order bits, though somewhat differently controlled, may comprise the same structure as the portion thereof associated with the middle order address bits. Thus, the four (4) outputs from the lower order multiplexer are applied to a four (4) bit binary full adder which receives both the output from the multiplexer and the lower order four (4) bits $A_0$ - $A_3$ of the previous address from the eight (8) bit last address cable 90. This second adder therefore may act to selectively increment the sum of each of four (4) low order bits and the output of the multiplexer and apply these bits to a next absolute address register associated with the four (4) lower order bits for subsequent application to an output address register which is also associated with the four (4) low order bits and thereby uniquely defines one of sixteen (16) instruction words. Thus, the low order bits are processed in the same manner as the middle four (4) order bits so that the low order bits associated with an address are produced. The thirteen (13) address bits produced by the ROM address register 81 in the manner briefly described above are applied to the read only memory 80 through the thirteen (13) bit address cable 86 and returned through the thirteen (13) bit return address cable 91.

The common status bus 21 is also connected through a single bit status conductor 92 to the ROM address register 81. More particularly, the condition of the common status bus 21 is applied after logical processing to the select input on the multiplexer associated with the four (4) low order bits which define, as aforesaid, the individual words within a section of a minor page. In this manner,the condition of the common status bus 21 will cause, in a manner to be more fully described, a branch operation to occur in the addressing sequence of the read only address register 81. Briefly, it will be recalled from the organization of the read only memory 80 described above, that such organization caused the formation of major pages within the memory wherein each major page included 1096 instructions each of which was sixteen (16) bits wide. These major pages are further divided into minor pages, each of which includes 256 words each of which is sixteen (16) bits wide and each minor page is divided into 16 sections including sixteen (16) words. Whenever a branch on a peripheral instruction is read from the read only memory 80, in a manner more clearly described below and in the referenced microprocessor application, read only memory bit $B_{11}$ will be a ONE (1). When the read only memory bit $B_{11}$, as contained in any such instruction applied to the sixteen (16) bit instruction word bus 20 is a ONE (1), the $B_{10}$ bit contained in that instruction may be a ONE (1) or a Zero (0) and under these conditions is exclusively ORed with the condition indicated on the common status bus 21. When the common status bus 21 also resides at the designated ONE (1) or Zero (0) level, indicating that something has occurred at one of the peripherals, the result of the exclusive ORing will be positive. Under these conditions,the four (4) low order bits $B_0$ - $B_3$ from the read only memory instruction are supplied through the multiplexer associated with the low order bits and added with the low order portion of the previous address in the adder to obtain a next relative address and then supplied through the next absolute address register, and the output address register so that the resulting four (4) low order bits will be a part of the next address applied to the read only memory 80 by the ROM address register 81. This will cause, as will be apparent from the organization of the read only memory 80 described above, a branch within a section of a minor page which is relative to the previous address and as will be apparent, minor page branch or jump operations and major page branch or jump operations may be obtained through similar manipulations of the middle order and high order bits of the address in response to conditions on the common status bus 21, the output of arithmetic logic unit 84, as shall be seen below or a programmed sequence of events. The condition of ROM bit $B_{10}$ is a status qualifier determinative of the condition on the common status bus 21 which should obtain for the branch operation to occur and both ONE (1) and ZERO (0) conditions may be selected.

Accordingly, the multiplexers, adders, next absolute address registers and output address registers within the ROM address register 81, serve to form a thirteen (13) bit address for application to the read only memory 80 through the thirteen (13) bit address cable 86. The multiplexers are used to select either the thirteen (13) low order "B" bits from the ROM, all Zero bits or the thirteen (13) "AB" bits from the return address register 82. The adders, which act upon the eight (8) low order bits of the thirteen (13) bit address word to be formed, sums the information present on its input lines and adds a one (1) bit to the resultant sum if the carry input is enabled. The output from the adders are applied in parallel to the next absolute address registers with respect to the eight (8) low order bits while the outputs from the high order multiplexer are applied directly to the next absolute address register associated therewith. From there, the thirteen (13) bit address is clocked into the address registers, and onto the thirteen (13 ) bit address cable. Combined, these major elements and the associated gating circuitry provide the means by which sequential, intra section and minor page branch or jump, extra minor and major page branch or jump, and extra minor and major page branch or jump and return addresses are formed. The gating circuits decode the information contained in the instruction word from the read only memory 80 to determine which one of five (5) basic addresses will be formed. Typically, the ROM address register 81 forms sequential addresses unless otherwise directed by a decoded function from the read only memory instruction word.

The return address register 82 comprises a thirteen (13) bit wide, sixteen (16) word deep push down stack employed whenever jump and return operations are utilized to address the read only memory 80. The return address register 82 may therefore comprise a conventional push down stack which is sufficiently wide to accommodate the thirteen (13) bit words employed to address the read only memory 80, however, it preferably takes the form of the random access memory described in conjunction with FIG. 4. The return address register 82 functions in the conventional manner of a push down stack to store, when enabled for push down operations, each address word supplied. In any series of operations each succeeding address word is inserted into the top word location while the address word initially stored therein is pushed down into the next work location and this operation continues as each successive address word, up to the full limit of the push down stack, is received. Conversely, when enabled for readout, the address word stored in the top word location is read out first and each address word stored in lower word locations is pushed up so that the next to last address word stored is, after one readout from the return address register 82 stored in the top word location. In this manner, the return address register 82, acts in the conventional manner to read out words inserted therein on a first in last out basis. Although a sixteen (16) word deep stack has been discussed in association with the return address register 82, it will be readily appreciated by those of ordinary skill in the art that additional storage facilities may be provided if branch and return operations, involving more than sixteen (16) returns within a given program sequence are required.

An address word input to the return address register 82, as shown in FIG. 2, is provided by the thirteen (13) bit return address cable 91 which is connected thereto. The selective enabling of the return address register 82 for appropriate push down and push up operation is accomplished upon the decoding of "B" bits from the read only memory 80. Instruction words from the read only memory 80 are applied through the common instruction word bus 20 to the return address register 82 through a sixteen (16) bit instruction word cable 93. Thus, in a manner more fully described below and in the above identified microprocessor application, whenever a jump or branch and return operation is defined by the instruction word read from the read only memory 80, the return address register 82 will be selectively enabled for a push down operation by the B bits applied thereto from the common instruction word bus 20. Under these conditions, the last thirteen (13) bit address word applied to the read only memory 80 from the ROM address register 81 through the thirteen (13) bit address cable 86 will be additionally inserted into the return address register 82 upon its application thereto through the thirteen (13) bit return address cable 91. Subsequently, when the return address register 82 is enabled for a push up operation from "B" bits decoded from the common instruction word bus 20, the previously stored instruction word applied thereto from the thirteen (13) bit return address cable 91 will be read out from the return address register 82, applied to the ROM address register 81 through the thirteen (13) bit address cable 88 incremented by ONE (1) at the read only address register 81 and applied through the thirteen (13) bit address cable 86 to the read only memory 80 so that the read only memory 80 may receive the next address in the returned to sequence.

The return address register 82 thereby provides, in a manner well known to those of ordinary skill in the art, a branch or jump and return capability in the addressing arrangement employed for the read only memory 80. This means that even though a single word addressing technique is employed, up to four branch and return subcycles may be utilized in conjunction with a single addressing sequence. Thus, it is seen that the read only memory 80 received thirteen (13) bit address words from the ROM address register 81 and in response to each such address word, a sixteen (16) bit instruction word is read out and applied to the common instruction word bus 20. The sixteen (16) bit instruction word applied to the common instruction word bus 20 may be employed to control the various peripherals utilized in conjunction with the instant embodiment of the automatic writing system and in addition thereto, may be employed to control the subsequent action of the ROM address register 81 and the return address register 82. In addition, each thirteen (13) bit address applied to the read only memory 80 from the ROM address register 81 is additionally returned through the thirteen (13) bit return address cable to the return address register 82 where it may be employed to store the departure address for a branch operation and is partially applied through the eight (8) bit last address cable 90 to the ROM address register 81 for incrementing wherein a new address which is incremented by one is applied as the next address for the read only memory 80.

THE PROCESSING AND COMPUTATIONAL PORTIONS OF THE MICROPROCESSOR

The processing and computational portions of the microprocessor indicated by the dashed block 16 are associated with the general purpose registers 83, the arithmetic logic unit 84 and the main register M. Although the computational and processing portion of the microprocessor indicated by the dashed block 16 is set forth in greater detail in U.S. application Ser. No. 430,130 which, as aforesaid,is directed to the microprocessor as a whole, the structure and general operation of this portion of the microprocessor will be briefly described to sufficiently acquaint the reader with the operation thereof to a degree which is appropriate to an understanding of the embodiment of the automatic writing system set forth herein, it being understood that a more detailed disclosure of this portion of the microprocessor is available through direct reference to the aforesaid application as the same has remained essentially unchanged in operation. The main register M comprises an eight (8) bit storage register which acts as shall be seen below as a holding register for each eight (8) bit data word applied to the common data bus 19. Thus, the main register M may comprise a single one (1) by eight (8) bit MSI chip such as a 7495 MSI chip available from the Texas Instrument Corporation. The main register M therefore contains sufficient storage for only a single eight (8) bit character and hence, as shall be seen below, whenever data is being applied to the common data bus 19 at a rate which exceeds that at which the microprocessor may manipulate data, data characters from the main register M must be placed in temporary storage elsewhere. The main register M acts as a conventional holding register in that each eight (8) bit data character introduced to the common data bus 19 by a peripheral or from the read only memory 80 is initially placed in the main register M prior to its transfer to another peripheral. Accordingly, it will be appreciated that the main register M acts to store each data character which is transferred or otherwise manipulated among peripherals in the instant automatic writing system according to the present invention.

The main register M is employed to provide a holding function so that each eight (8) bit data character introduced to the common data bus 19 for processing and storage within the automatic writing system according to the instant invention may be inspected prior to forwarding to a destination peripheral whereupon data processing or manipulation when appropriate, may be carried out by the microprocessor indicated by the dashed block 16 prior to the forwarding of such eight (8) bit data character. Each eight (8) bit data character present on the common data bus 19 is inserted, in parallel, into the main register M through the arithmetic logic unit 84 and may be applied, depending upon whether or not inspection or processing is required, either directly from the main register M to the common data bus 19 or may be inserted into the arithmetic logic unit 84 for logical processing. For this reason, the main register M is connected to an eight (8) bit input cable 94 and an eight (8) bit output cable 95. The eight (8) bit input cable 94 is connected intermediate the arithmetic logic unit 84 and the main register M and may comprise eight (8) parallel conductors each of which carries one output bit $ALF_0 - ALF_7$ from the arithmetic logic unit 84. The eight (8) bit output cable 95 is connected to receive the output of the main register M and is further connected to selectively apply such output to either the common data bus 19 or as an input to the arithmetic logic unit 84. Accordingly, as shown in FIG. 2, the eight (8) bit output cable 95 is connected to receive the eight parallel bits of each data character loaded into the main register M, wherein such eight (8) bits are designated $M_0 - M_7$ and apply the output of the main register M to a pair of branched output cables 96 and 97, wherein each branched output cable has a gated input controlled by instructions present on the common instruction word bus 20 as provided by the read only memory 80. The gated input for the pair of branched output cables 96 and 97 may take the conventional form of a plurality of AND gates which are controlled by the decoded "B" bits from the common instruction word bus 20. Thus, if the gated input to the branched output cable 96 is enabled by the bits decoded from the common word bus 20, data is applied from the main register M to the common data bus 19 while when the input to the branched output cable 97 is enabled by such decoded "B" bits, the eight (8) bit character present in the main register M is applied, as shall be seen below, as an input to the arithmetic logic unit 84 where logical operations and manipulations may be performed therewith. B bits for controlling the output of the main register M are applied from the common instruction word bus 20 through a sixteen (16) bit instruction word cable 98 and such 37 B" bits as described above, are decoded and employed to control the selective application of the output of the main register M to the branched conductors 96 and 97.Furthermore, as shall be seen below, should data be applied to the common data bus 19 at a rate which exceeds the microprocessor's ability to handle such data for the program sequence then in progress, each eight (8) bit data character present in the main register M may be applied to the common data bus 19 for insertion into the general purpose registers 83 rather than for application to a peripheral.

The arithmetic logic unit 84 may comprise a conventional eight (8) bit arithmetic logic device capable of performing arithmetic functions such as addition, subtraction, decrement, straight transfer and magnitude comparison as well as logical operations such as Exclusive OR, comparator, AND, NAND, or NOR. The arithmetic logic unit employed for the purposes of the instant invention may comprise a pair of 74181 MSI chips conventionally available from the Texas Instrument Corporation, and, as shall be seen below, is utilized to perform all of the arithmetic and logic functions employed in the present invention. The output of the arithmetic logic unit is connected through the eight (8) bit input cable 94 to the input of the main register M as aforesaid and takes the form of eight (8) parallel bits $ALF_0 - ALF_7$ in the form of a data character. The arithmetic logic unit 84 accepts eight (8) bit character data directly from the common data bus 19, from the main register M on branched output cable 97 or from the general purpose registers 83. Eight (8) bit character data from the common data bus 19 is applied to the arithmetic logic unit 84 through an eight (8) bit input cable 99, which may take the form of eight (8) parallel conductors. In addition, the arithmetic logic unit 84 is connected at a second input thereto to an eight (8) bit conductor 100 which serves to provide an input from either the general purpose registers 83 or the main register M. The eight (8) bit input cable 100 may also take the form of eight (8) parallel conductors, it being appreciated that inputs thereto from the main register M are applied thereto from the branched output cable 97 under the control of instructions supplied to the main register M from the common instruction word bus 20, which instructions control the selective enabling of the input gates associated with the branched output cable 97. Conversely, as shall be seen below, inputs to the eight (8) input cable 100 from the general purpose registers 83 are selectively enabled from instructions present on the common instruction word bus 20 and applied to the general purpose registers 83. The arithmetic or logical function exhibited by the arithmetic logic unit 84 is controlled by operational commands applied to the arithmetic logic unit 84 from the common instruction word bus 20. The common instruction word bus 20 is connected to the arithmetic logic unit 84, and more particularly to the control inputs thereof, through a sixteen (16) bit instruction word cable 101 which may simply comprise sixteen (16) parallel conductors. In addition, a logic output is provided from the arithmetic logic unit 84 to the ROM address register 81 on a single bit branch conductor 106. The logic level, i.e., ONE (1) or ZERO (0), on this conductor is indicative of the result of a logical operation performed in the arithmetic logic unit 84 and is employed to cause the ROM address register 81 to branch upon the receipt of a branch instruction if a certain logical result is obtained, in the same manner as branching is achieved in response to branch instructions and true or false conditions on the common status bus 21. Thus, if a branch instruction is issued requiring a branch if a comparison is obtained, the comparison is performed in the arithmetic logic 84 and the result thereof is placed on the branch conductor 106 to initiate the propriety of a branch operation.

The operation of the arithmetic logic unit 84 may be simply characterised as performing two principal functions. The first function is to simply transfer eight (8) bit character data from the common data bus 19 to the main register M. In this role, the straight transfer inputs to the arithmetic logic unit 84 are enabled by the instructions present on the common instruction word bus 20 and character data in the form of eight (8) bits in parallel are thereby applied from the common data bus 19 through the eight (8) bit input conductor 99 through the arithmetic logic unit 84 and through the eight (8) input cable 94 to the input of the main register M. Once loaded into the main register M, such data characters may be simply returned to the common data bus 19 for application to another peripheral or returned through the branched output cable 97 to the arithmetic logic unit 84 for processing. The second principal function of the arithmetic logic unit 84 is to process the eight (8) bit data characters returned thereto from the main register M or otherwise inserted in the arithmetic logic unit 84 from the common data bus 19. The nature of the processing steps performed, which take the form of the various arithmetical and logic operations which the arithmetic logic unit 84, as aforesaid, may accomplish is determined by function instructions applied to the arithmetic logic unit 84 from the common instruction word bus 20. For instance, when a search of the record media for a designated location operation is initiated at the keyboard means 1, the microprocessor indicated by the dashed block 16 will be required to search the record media until an address designated by the thumbwheels at the keyboard means 1 has been located. Under these circumstances, the address set at the thumbwheels will be inserted into the general purpose register 83 and a selected address read from the record media and applied to the common data bus 19 will be compared against the thumbwheel address by the arithmetic logic unit 84 to ascertain if an identity is present. Thereafter, the microprocessor will cause the record media transport being searched to stop through a branch operation resulting from a true level on the branch conductor 106 and indicate to the operator that a successful search has been initiated and completed. Similarly, in edit operations where words, lines, or paragraphs are selectively read out and identified within the automatic writing system by the punctuation which follows such words, lines or paragraphs; data characters representative of the selective punctuation are selectively read from the read only memory 80, and applied to the common data bus 19 for subsequent insertion into the main register and reinsertion into the general purpose registers 83. Thereafter, each character applied to the common data bus 19 during the editing operation, such as characters read from the record media for subsequent application to the printer, is compared against the character representing the selected punctuation and when an identity is achieved between the characters being compared, the edit operation is stopped through the branch condition present on branch conductor 106 so that additional information from the keyboard means or the like may be inserted onto the common data bus 19. The various utilities of the remaining arithmetic and logic functions of the arithmetic logic unit will become apparent from the subsequent portions of the instant discosure. Accordingly, it will be seen that the arithmetic logic unit 84 performs, under program control, all of the processing operations required in the instant embodiment of the automatic writing system according to the present invention and provides branch conditions, when appropriate, to the ROM address register 81 in response thereto.

The general purpose registers 83 comprise two (2) standard scratch pad memories each of which contains storage for 16 eight (8) bit characters. The two general purpose registers, designated hereinafter as the G and H registers, may take the form of conventional scratch pad memories preferably in the form of MSI chips. For instance, each of the G and H registers may be formed by a pair of four (4) bit wide Texas instruments 7489 MSI chips connected such that one chip accepts a low order four (4) bits of each character and the second chip accepts the higher order four (4) bits of each character. The G and H registers within the general purpose register block 83 are connected in cascade so that common inputs and outputs for each register are commonly connected wherein the input and output of each register is controlled by the enabling inputs thereto. The enabling inputs for the G and H registers are controlled by decoded B bits from the read only memory 80 supplied thereto through the common instruction word bus 20.

The general purpose registers G and H are connected to the common instruction word bus 20 through a sixteen (16) bit instruction word cable 102. Thus, depending upon the instruction present on the common instruction word bus 20, inputs supplied to the common eight (8) inputs of the G and H registers will be written into storage in the register whose inputs are enabled and conversely, outputs from either the G or H registers will be appropriately gated, under program control, to the common outputs of the G and H registers. The common outputs of the G and H registers are connected to the eight (8) bit input cable 100 so that the designated contents of either the G or H register may be selectively applied to the eight (8) bit input cable 100 as input bits $ALB_0$ - $ALB_7$ for application to the arithmetic logic unit 84, as aforesaid. A data character input to the general purpose registers G and H is supplied from the common data bus 19 through an eight (8) bit input cable 103 to the common inputs of the G and H registers. Accordingly, depending upon the command instruction on the common instruction word bus 20, eight (8) bit data characters from the common data bus 19 may be selectively loaded into selected ones of the storage locations in the G or H registers.

The G and H registers, as is conventional for any scratch pad memory, provide a plurality of functions, further described below, for the automatic writing system according to the present invention. Of the sixteen (16) word storage locations available in each of the G and H registers, one word location in the G register is reserved for the character then being processed such as for cases where a data character initially loaded into the main register M must be placed in temporary storage so that subsequent processing operations may be preformed in a later cycle without interrupting the transfer of data to the single word location within the M register. In addition, a plurality of word locations in both the G and H registers are reserved for overflow characters from the main register M. In addition, there are many instances where a data character which has been inserted in the main register M and thereafter inserted into the arithmetic logic unit 84 for processing results in a plurality of intermediate data characters prior to the formation of the resultant character for processing operation then being performed. In these cases, such intermediate character or characters must be stored for subsequent processing operations in the arithmetic logic unit 84 and storage for such characters is provided within the plurality of reserved word locations within the G and H registers or alternatively within the selected half of RAM 34 not employed for buffering as may be seen by the separate listings of storage location assignments within the RAM and G and H registers attached hereto. Furthermore, preassigned word locations within the G and H registers are provided for certain specified functions of the automatic writing systems which are pre-set at the keyboard. For instance, operator selected operation codes such as record, play, skip and the like are stored within the G register. Additionally, the addresses for the read/write and read only buffers are inserted and maintained in preassigned word locations within the G register for use in the accumulation of data in adjacent storage locations within said buffers. In addition, other preassigned word storage locations are employed within the G and H registers to accommodate operator settings required for the implementation of particular functions of the instant invention; however, a description of the data stored shall await a description of the functions with which they are associated. Thus, at this juncture in the description of the instant embodiment of the present invention, it is sufficient to note that the general purpose registers 83, which comprises the G and H registers, combine with the miscellaneous storage provided by the RAM 34 to act to store operator set parameters and the state of selected conditions within the automatic writing system in the form of word, character, or bit information, for use in the arithmetic or logical processing operations which take place in the arithmetic logic unit 84.

THE COMMON DATA BUS

The remaining portions of the automatic writing system depicted in FIG. 2 comprise the common data bus 19, the commoninstruction word bus 20, and the common status bus 21. The common data bus 19 comprises 8 parallel conductors each of which is employed to convey one bit of the eight (8) bit data characters which are applied to this bus. Each conductor within the common data bus 19 is appropriately junctioned to one of the conductors in each of the eight (8) bit data cable which connect the common data bus 19 to each of the peripherals and the registers and arithmetic logic unit 84 within the microprocessor indicated by the dashed block 16 so that a commonly ordered bit may be selectively gated to or from its associated bit conductor within the common data bus 19 by each of the peripherals and the data handling apparatus within the microprocessor. Thus, as will be apparent to those of ordinary skill in the art, the common data bus 19 acts as common eight (8) bit path through which all of the eight (8) bit data characters within the automatic writing system are conveyed between the peripherals and the microprocessor indicated by the dashed block 16. Accordingly, if focus is placed merely upon the flow of eight (8) bit character data to be processed within the instant embodiment of the automatic writing system according to the present invention, it will be appreciated that each eight (8) bit data character is selectively gated, under program control, onto the common eight (8) bit data bus and taken therefrom by an enabled peripheral or register within the microprocessor indicated by the dashed block 16. Therefore, by utilizing the high rates of data manipulation available with conventional data processing techniques, single eight (8) bit character information may be selectively gated to and from the common data bus 19 while a plurality of program steps are carried out with respect thereto.

The eight bit data cables 28, 31, 39, 45, 46, 57, 63 67, 76, 95, 96 and 103 may each be viewed as generally acting to convey eight (8) bit character information, representing either alphanumeric characters or function information, which information may have been manipulated while being conveyed to and from an associated peripheral or register and the common data bus 19. However, there are instances in the operation of this embodiment of the automatic writing system according to the present invention wherein data, not originating at the keyboard means 1 is required, such as the paper index and carriage movement data necessary for the appropriate operation of the printer means 2. For these functions, it is often necessary that constants in the form of eight (8) bit characters be applied to the common data bus 19 so that such constants may be selectively gated to the appropriate peripheral when a function of that peripheral requiring the application of such constants is mandated. For this reason, it is necessary to have the capability of applying such constants from the read only memory 80 to the common data bus 19; however, as was seen above in conjunction with the description of the read only memory 80, the output of the read only memory 80 takes the form of sixteen (16) bit instruction words which are only applied through the sixteen (16) bit instruction word cable 85 to the common instruction word bus 20. Therefore, to provide an appropriate expedient for conveying selected groups of eight (8) bits, which take the form of constants, from each sixteen (16) bit word read from the read only memory 80 to the common data bus 19 an eight (8) bit input cable 105 is connected intermediate the common instruction word bus 20 and the common data bus 19. The eight (8) bit input cable 105 may comprise eight parallel conductors each of which is connected to one of the bit conductors within the common data bus 19. The inputs to the eight (8) bit input cable 105, however, are connected to the output of a conventional multiplexer whose inputs are selectively connected to predetermined ones of the bit conductors in the common instruction word bus 20. More particularly, the multiplexer inputs are connnected to the bit conductors associated with instruction word bits B4 through B11 of the common instruction word bus 20 and whenever the multiplexer is appropriately enabled by a read only memory to data bus command generated by decoding selected ones of the bits in an instruction word read from the read only memory 80, bits $B_4$ through $B_{11}$ of that instruction word are applied from the common instruction word bus 20 through the eight (8) bit input cable 105 to the common data bus 19. In this manner, constants from the read only memory 80 may be applied to the common data bus 19 for utilization in the control of the various peripherals connected to the common data bus 19 as well as in the various data processing manipulations which are performed by the arithmetic logic unit 84.

For the purposes of appreciating the flow of data to be processed within the instant embodiment of the present invention, a brief description of the manner in which data is propagated among the peripherals and the microprocessor indicted by the dashed block 16 is appropriate. As will be appreciated by the conventional use of the arrowheads adopted in FIG. 2, the eight (8) bit data cables 28, 39 and the combination of 45 and 46 connected intermediate the common data bus 19 and the keyboard interface 26, the RAM buffer and miscellaneous storage peripheral 34 and the printer data ROM peripheral, respectively, are full duplex eight (8) bit conductors which allow data to be either applied from the peripheral to the common data bus 19 or conversely allow data to be conveyed from the common data bus 19 to the peripheral associated with the full duplex cable. This means that the keyboard means 1, the RAM buffer and miscellaneous storage peripheral 34 and the printer data ROM peripheral 14 may input data into the system or derive data therefrom. The printer interface 27, read/write decoder means 50, the delay counters 74, the general purpose registers 83, and the arithmetic logic unit 84, however, may only derive eight (8) bit character data from the common data bus 19 as is indicated by the single arrow present on the eight (8) bit input cables 31, 57, 76, 103 and 99 associated, respectively, therewith. Conversely, the read/write read decoder means 51, the read only read decoder means 54, and the main register M may only apply data to the common data bus 19 through the eight (8) bit data cables 63, 67, and 96 associated therewith; it being recalled that the output from the main register M may either be directly applied to the common data bus 19 through the cable 96 or reinserted into the arithmetic logic unit 84 for processing. With these input/output functions of the various peripherals and the processing apparatus within the microprocessor indicated by the dashed block 16 in mind, the flow of eight (8) bit character data among the peripherals, the microprocessor indicated by the dashed block 16 and the common data bus 19 may be readily appreciated.

In a typical though highly simplified printing operation wherein the alphanumeric and function information generated at the keyboard means 1 is to be printed at the printer means 2 without the recordation of such generated information on a record media, each key depressed at the keyboard means 1 will result in the conventional manner in the generation of an eight (8) bit character representing either the alphanumeric character or the functional information associated with the key depressed. Each character thus generated is applied through the keyboard interface 26 and the eight (8) bit data cable 28 to the common data bus 19 and no second character will be introduced to the common data bus 19 from the originating peripheral, until the previously introduced eight (8) bit character is processed and supplied to a destination device so that the eight (8) bit data bus is clear with respect to the previously processed eight (8) bit character prior to the introduction of a subsequent character. As shall be seen below this is accomplished through the action of the common status bus 21 and the common instruction word bus 20.

At a time corresponding to the enabling of the keyboard interface 26, which allows each eight (8) bit data character to be gated onto the common data bus 19, the arithmetic logic unit 84 for the operation presently being described and the main register M are also enabled in a manner to accept eight (8) bit data information from the common data bus 19. The arithmetic logic unit 84 is enabled, under program control, for a straight transfer operation to input information directly to the main register M. Therefore, when the eight (8) bit data character is applied to the common data but 19 through the eight (8) bit data cable 28 such eight (8) bit data character is applied from the common data bus 19 through the eight (8) bit data cable 99 to the arithmetic logic unit 84 and transferred therefrom through the eight (8) bit data cable 94 to the main register M where it is loaded into the single eight (8) bit character location therein. This operation, as shall become more apparent below, is accomplished under program control and results from instructions from read only memory 80 designated keyboard to data bus and data bus to M. As this character is merely to be printed, it is subsequently applied in succeeding instructions from the main register M through the eight (8) bit conductors 95 and 96 to the common data bus 19 and from the common data bus 19 to the eight (8) bit data input cable 39 for loading into the read/write buffer 35 and in another instruction cycle from the common data bus 19 to the eight (8) bit data input cable 46 which is connected to the ROM address and control means 44. This will cause a first eight (8) bit character to be read from printer data ROM 43 and loaded into the main register M. This eight (8) bit character is inspected and loaded into the general purpose registers 83 for storage and a modified address is loaded into the main register M and forwarded through the common data bus 19 and the eight (8) bit data cable 46 to ROM address and control means 44. This will cause a second eight (8) bit character to be read from the Printer data ROM 43, which in this case has only four (4) bits which comprise pertinent information. The twelve (12) bits of pertinent character information now available are placed in an appropriate sequence, the character width specified thereby is retained in the general purpose register 83 for later use in escapement operations and initial escapement information is forwarded from the main register M to the printer unit 2 through the common data bus 19 to achieve appropriate positioning for the print carriage. Thereafter, the first four (4) bits of appropriate twelve (12) bit character information is forwarded to the printer interface 27 and is latched. In the next instruction cycle the next eight (8) bits of character information are forwarded to the printer interface 27 so that the now assembled twelve (12) bit printing command may be applied to the printer to cause character printing to take place and the printer logic will cause the appropriate printing of this character. These transfers result, as shall be seen hereinater, from programmed instruction words designated main register M to data bus and data bus to printer, while the appropriate timing of these instructions is achieved through the utilization of status conditions presented on the common status bus 21. Thus, each alphameric character or function represented by the eight (8) bit character which results from the depression of a key on the keyboard means 1 and represents printable information under the pure printing operation herein being described results in the application of that eight (8) bit character to the read/write buffer 35 for storage and to the printer data ROM 43 so that a corresponding twelve (12) bit character may be applied to cause the appropriate character to be printed as a consequence of the character translated through the common data bus 19. Accordingly, as each eight (8) bit data character is generated at the keyboard means 1, the operating sequence for the straight printing operation here being considered results in the application of twelve (12) bit character information to the printer wherein appropriate action such as the printing of an alphameric character, space, carriage return or the like results.

In the straight printing operation described above, no record media was prepared and hence the record media control write and read apparatus enclosed within the dashed block 18 was not employed. Where a record media is to be prepared, data characters will be accumulated in the read/write buffer 35 and conveyed between the keyboard interface 28, the common data bus 19, the arithmetic logic unit 84, the main register M, the printer data peripheral 14 and the printer interface 27 in the same manner as was described above; however, data is additionally selectively gated from the read/write buffer 35 to the main register M and from the main register M to the record media control, write and read apparatus indicated by the dashed block 18 through the common data bus 19 upon the accumulation of a complete line of information within the read/write buffer 35.

The relationship between the buffer and miscellaneous storage apparatus indicated by the dashed block 17 and the record media control write and read apparatus indicated by the dashed block 18 is such that data is only recorded on the record media after a full line of characters, which generally correspond to a line of material produced by the printer and defined by a carriage return, has been inserted on a per-character basis into the buffer storage apparatus indicated by the dashed block 17. This relationship obtains because, as is well known to those of ordinary skill in the art, relative motion between a record media and the recording transducer is required for recording to take place and hence, starting and stopping intervals in which no recording takes place, must precede and follow each recording interval. Therefore, to avoid the wasteful utilization of the record media, a full line of characters are accumulated in the read/write buffer 35 before any recording takes place and once such accumulation is present all of the characters accumulated are recorded at once so that only one stopping and starting interval on the record medium is utilized per line of data recorded. Thus, the buffer and miscellaneous storage apparatus indicated by the dashed block 17 is utilized to accumulate data for subsequent recording to provide for the efficient utilization of the record medium and as shall be seen below such buffers are also employed for the reordering and maintenance of data until appropriate recording has been assured.

As each character is supplied by the keyboard means 1 and inserted into the main register M, it is applied to the common data bus 19 for insertion, under the conditions here being discussed, into the read/write buffer 35 as well as being applied to the common data bus 19 for conversion and application o the printer means 2. Thus, when a record medium is being prepared and a full line of characters has been accumulated in the read/write buffer means 35, as indicated by a carriage return character, a dump the buffer onto the record media instruction cycle is initiated. This occurs by reading each previously stored character in the read/write buffer 35 onto the common data bus 19, through the eight (8) bit data cable 39 and thereafter gating each data character through the arithmetic logic unit 84 to the main register M. From the main register M, each data character received is gated back onto the common data bus 19 and through the eight (8) bit conductor cable 57 to the read/write decoder 50 for serial conversion and application to the write head present in the read/write station transport 53. This operation also takes place on a per character basis in that each character from the read/write buffer 35 is inserted into the M register and applied from the M register to the read/write station prior to the application of the succeeding character from the read/write buffer 35. However, as both the main register M and the read/write buffer 35 operate at extremely high data processing rates and no printing operation for this transfer takes place, the transfer operation can take place at the maximum speed acceptable to the recording electronics. This means that prior to the transfer of the first character in a line from the read/write buffer 35, the read/write transport 53 is started and the record media is brought to speed. Thereafter, the entire contents of the read/write buffer 35 applied through the main register M may be dumped onto the record media and the record media stopped at the completion of this cycle while appropriate housekeeping functions, to be explained below, are performed by the microprocessor indicated by the dashed block 16. Therefore, even though the per character nature of each transfer is maintained, the recording which takes place at the record media if viewed from the standpoint of starting and stopping the transport may be considered to be a per line recording of the information. Accordingly, it will be appreciated that when a printing and record media preparation operation is being performed, data characters from the keyboard means are introduced to the common data bus 19 and inserted into the main register M on a percharacter basis. Thereafter, each character so inserted is applied from the main register M to the common data bus 19 for insertion into the read/write buffer 35 and to the printer data ROM peripheral for conversion and subsequent application to the printer means 2 wherein independent applications of each data character from the main register M to the common data bus 19 are utilized for each transfer. Thus, as far as the generation of each eight (8) bit character from the keyboard means 1 is concerned, the preparation of a record media while printing occurs does not require the selective gating of an additional peripheral onto the common data bus 19 or a change in the per character nature of the data character translations being employed. However, at the completion of each line to be printed, the read/write buffer 35 is emptied on a per character basis and recorded on a record media at the read/write station so that the previous line is recorded on the record media and the buffer is emptied and readied for the next line of data to be recorded.

In the same manner as the keyboard means 1 is employed as an input peripheral to the automatic writing system according to the instant invention, any other peripheral, with the exception of the printer means 2 and program time delay apparatus 16a may also be employed as an input to the automatic writing system according to the instant invention and the manner in which these peripherals are selectively employed as input and output devices within the automatic writing system is determined by the various modes of operation selected at the keyboard. These various modes of operation will be described in much greater detail below. However, a simplified mode of playback will here be illustrated to further acquaint the reader with the techniques with which the interconnection of a plurality of peripherals and a microprocessor to a common data bus 19 may be employed in manner such that it matters not a whit from the standpoint of data flow which peripheral is presently being employed as an input device and which peripheral or peripherals are utilized as output devices.

The simplest playback mode wherein a prerecorded tape is being read and data therefrom is being printed will now be considered. For the purposes of the instant discussion, it wil be assumed that a prerecorded record media having the contents of a document which is desired to be prepared, has been loaded within the read/write record media transport 53. When this mode of operation is initiated at the keyboard by an operator, the read/write record media 53 will, under program control, be energized so that a line of data, which as aforesaid corresponds to a line of printed material terminated by a carriage return, is read out in series and serially applied through conductor 62, to the read/write read decode means 51; it being appreciated that what is meant by reading a line is that the read/write record media transport 53 is brought to speed prior to reading the line and its motion is stopped at the completion of the line. However, data is read serially from the medium on a per character basis and each character in the line appears in a continuing sequence as long as the read/write record media transport 53 is energized. In this manner, as each serial character is applied to the read/write read decode means 51, it is conventional into a parallel format and applied through the eight (8) bit data cable 63 to the common data bus 19. Each character so applied to the common data bus 19 is further applied in parallel to the main register M through the eight (8) bit data cable 99, the arithmetic logic unit 84, which has been enabled for a straight transfer operation and the eight (8) bit data conductor 94. Each data character loaded in parallel in the foregoing manner into the main register M is subsequently gated, under program control, through the multiconductor data cable 95 and 96 back onto the common data bus 19 and from the common data bus 19 through the eight (8) bit data cable 39 into an appropriate storage location within the read only buffer 36 wherein the particular insertion of a character in storage location within the buffer 36 is accomplished under program control. This operation will continue until the entire line read from the record media has been loaded into the read only buffer 36 and the movement of the record media within the read/write record media transport terminated under program control; it being apparent to those of ordinary skill in the art that an entire line of characters may be read from the record media on a per line basis and still be processed on a per character basis by the read decoder means 51, the arithmetic logic unit 84, the main register M and the read only buffer 36 due to the high data processing speeds exhibited by the elements which exceed the maximum available speed capability of the read/write record media transport. Therefore, even though the record media is read on a per line basis, to thereby avoid wasting the record media in a manner which would occur if a per character read and recording technique was employed, the remaining portions of the instant embodiment of this invention still process all such data read from the media on a per character basis.

Once the read only buffer 36 has been fully loaded with a line of data, the read/write buffer 35, acting under program control, will apply each character present therein in sequence to the common data bus 19 through the eight (8) bit data cable 39. Each character so applied to the common data bus 19 from the read only buffer 36 is further applied through the eight (8) bit data cables 99 and 94 through the arithmetic logic unit 84 to the main register M where such character is loaded in the single eight (8) bit storage location therein. After such character is loaded into the main register M, the character is subsequently read out in parallel and applied through the eight (8) bit data cables 95 and 96 to the common data bus 19 for subsequent application to the read/write buffer 35 and the printer data ROM peripheral 14 and subsequently printed in the same manner as if such data had originated at the keyboard means 1. After each character loaded into the main register M has been applied to the printer means 2, the next character in sequence is read from the read only buffer 36 and loaded into the main register M and this operation continues until the entire line loaded into the read only buffer 36 has been transferred and applied through the main register M to the printer means 2. When the entire line in the read only buffer 36 has been transferred to the read/write buffer 35 and printed at the printer peripheral, the read/write record media transport is again enabled so that the next succeeding line on the record media is again loaded into the read only buffer 36 in the previously described manner. Thus, the operation of the printer means 2 again takes place on a per character basis wherein the manipulation and translation of data associated with a particular character is completed prior to the transfer of the next eight (8) bit data character to the common data bus 19. Of course, were it desired to duplicate a portion of a record media on another record media, it will be appreciated that reading could take place from the read only station, into the read only buffer 36 while data would be subsequently applied through the main register M and written into the read/write buffer 35 for ultimate recording on a per line basis at the read/write record station to avoid the selective gating of the printer data ROM 14 and the printer unit 2. Thus, regardless of the peripherals employed, the transfer of eight (8) bit data characters in parallel always takes place from an originating peripheral to the common data bus 19, from the common data bus 19 to the main register M, from the main register M to the common data bus 19 and from the common data bus 19 to one or more destination peripherals and each translation of data occurs on a per character basis under program control. The purpose of translating each data character to be transferred through the arithmetic logic unit 84 into the main register M is to allow each such character to be inspected under program control so that functions and conversions required by certain data characters may be initiated. Thus, the common data bus 19 serves as the basic data path through which all data conveyed through the instant invention is accessed, inspected and captured by the various peripherals and the microprocessor employed.

While the function of the common data bus 19 is to convey eight (8) bit data characters throughout the automatic writing system, the function of the common instruction word bus 20 is to receive appropriate commands from the read only memory 80 ahd convey such commands to enable the peripherals required by an operation specified at the keyboard means 1 and to cause those peripherals and the portions of the microprocessor which handle data and the addressing of the read only memory 80 to function in a manner which is consistent with the nature of the operations specified and the character of the data then being conveyed. However, as the instant embodiment of the automatic writing system according to the present invention is organized on a single address basis, as aforesaid, the manner in which the read only memory 80 is addressed and hence, the instructions applied to the common instruction word bus 20, is provided as a function of the various indications on the status bus so that the read only memory 80 may be addressed to provide new instructions when a previously issued instruction has been completed and the results of the completion of that instruction indicate whether the same Program format is to be completed or a branch to another program format is appropriate to achieve the necessary data processing, manipulation and translation among the peripherals.

THE COMMON INSTRUCTION WORD AND STATUS BUSES

The common instruction word bus 20 may comprise sixteen (16) parallel conductors wherein each conductor carries one of the sixteen (16) bits ($B_0$ - $B_{15}$) of each instruction word issued by the read only memory 80. The only input to the common instruction word bus 20 is provided from the read only memory 80 through the sixteen (16) bit instruction word cable 85. Outputs from the common instruction word bus 20 are, however, provided to each of the peripherals and each of the elements within the microprocessor other than the read only memory 80 itself. Thus, the common instruction word bus 20 is connected through the sixteen (16) bit instruction word cable 29 to the keyboard interface, through the sixteen (16) word instruction cable 32 to the printer interface, through the sixteen (16) bit instruction word cable 41 to the buffer and miscellaneous storage apparatus 17, through the sixteen (16) bit instruction word cable 48 to the printer data ROM peripheral 14, through the sixteen (16) bit instruction word cables 65 and 72 to the read/write and read only station control circuits 52 and 55 and through the sixteen (16) bit cable 79 to the program time delay peripheral. The commands issued on the common instruction word bus 20 are decoded at each peripheral or more properly, the peripheral control and when appropriate to that peripheral are utilized to control the operation thereof in acquiring or conveying data characters from or to the common data bus 19 and the peripheral's response to any such data conveyed or acquired. The common instruction word bus 20 is also connected through the sixteen (16) bit instruction word cables 98, 101, and 102, to the main register M, the arithmetic logic unit 84, and the general purpose registers G and H within the data handling section of the microprocessor indicated by the dashed block 16. The command information conveyed on the common instruction word bus 20 to the general purpose register 83, the arithmetic logic unit 34 and the main register M is decoded within each element and when appropriate to that element controls the operation thereof with respect to the data acquired and supplied to the common data bus 19, the operations performed within that element with respect to such data and the manipulation of any data acquired and operated upon with respect to further insertion within one of these three elements of the microprocessor indicated by the dashed block 16. The common instruction word bus 20 is connected through the sixteen (16) bit instruction word cables 87 and 93 to the ROM address register 81 and the return address register 82. The instructions from the common instruction word bus 20 applied to the ROM address register 81 and the return address register 82, are decoded and when applicable to that element are utilized to control the operation thereof. For instance, when the return address register 82 is enabled, the previously issued address word from the ROM address register 81 is placed in the push down stack or alternatively, a previously stored address word is read therefrom to enable jump and return addressing sequences to be employed in the addressing of the read only memory 80. Similarly, the instruction words applied to the ROM address register 81 are decoded and when applicable to the ROM address register 81 will cause the read only memory 80 to be addressed in a sequential manner or to allow intra-section branch, extra minor page branch or jump, extra page branch or jump and return, and external addresses to be employed in the addressing sequence utilized; it being noted that in branch operations, portions of the instruction are also employed as portions of the address. In addition, eight (8) conductors present within the common instruction word bit bus, those conductors carrying bits $B_4$ through $B_{11}$, are selectively applied to the common data bus 19, in the manner aforesaid so that constants read out from the read only memory 80 may be applied to the common data bus 19 on a selective basis.

In what is tantamount to the reciprocal organization of the common instruction word bus 20, the common status bus 21, which may comprise a single bit conductor, receives at least one input from each of the peripherals employed in the present embodiment of the instant invention and provides a single output to the microprocessor indicated by the dashed block 16. However, as will become apparent below, instruction words present on the common instruction word bus 20 define which one of the several peripherals is to provide an output to the common status bus 21 at a given sampling interval and more particularly, which of the plurality of status inputs from that peripheral is to be applied to the common status bus 21. Thus, at the same time that decoded B bits from the common instruction word bus 20 are determining what peripheral is to be enabled and the action to be taken thereby, such decoded B bits are also defining the status input to be supplied to the common status bus 21 to which the ROM address register 81 will respond to provide the next sequential address applied to the read only memory 80 whereupon the next program step is initiated. Thus, although the instant embodiment of the automatic writing system according to the present invention is organized on the basis of a single address operation, the next address to be applied to the read only memory 80 is generally a function of the previous address supplied and the response obtained on the common status bus 21 or the result of a logical operation which takes place at the arithmetic logic unit 84, each of which supplies an input to the ROM address register 81. The inputs to the common status bus 21 are applied, as aforesaid, through the single bit status conductor 30 from the keyboard interface 26, through the single status conductor 33 from the printer interface 27, from the RAM address and control apparatus 38 through conductor 42 from the read only and read/-write station control circuits 55 and 52 through the single bit status conductors 61 and 71 and from delay control apparatus 75 through single bit status conductor 78.

The interrelationship between the manner in which the read only memory 80 is addressed by the ROM address register 81 to supply instruction words to the common instruction word bus 20 in relation to the status condition indicated on the common status bus 21 may best be illustrated by an exemplary program which simply illustrates the relationship betwen the manner in which addressing is initiated and subsequently modified in response to the conditions indicated on the common status bus 21. For the purposes of the present simplified explanation, it will be assumed that data entered at the keyboard is merely to be printed and a highly simplified program will be set forth; it being appreciated that the detailed program steps utilized will be more fully understood from succeeding portions of the instant disclosure and the detailed programs per se which are attached hereto.

When the automatic writing system according to the present invention is energized, an initial clear sequence, under program control is intiated. During this sequence, the G and H registers are cleared and proper per set, tape slack in tape embodiments is taken up within the record media stations and the printer is initialized by being reset to the extreme left hand margin position, as described in U.S. Application Ser. No. 430,130 supra, and below, and the keyboard and its associated components are placed in a cleared condition. Thereafter, an idle program is initiated in the microprocessor indicated by the dashed block 16 where the processor essentially waits for an event to occur at one of the peripherals. This is achieved by the cycling of the ROM address register 81 through an initial program sequence in an idle loop which monitors pertinent ones of the status conditions at selected ones of the peripherals for each instruction word read from the read only memory 80 in response to an address from the ROM address register 81. If a flag does not appear on the common status bus 21, the address word is incremented and applied to the read only memory 80 whereupon an instruction word is applied to the common instruction word bus 20 which causes another status condition to be monitored. This sequence of incrementing the address word applied to the read only memory 80 is maintained until each of the status conditions at each of the peripherals which are appropriate for monitoring during this initial idle sequence has been interrogated. If no flag has occurred on the common status bus 21, the last address word applied to be read only memory 80 causes an instruction to be read out therefrom which causes the ROM address register 81 to return to the first address word within the idle sequence and recirculation within this monitoring loop is continued.

As will be appreciated by those of ordinary skill in the art, the idle sequence of address words keeps repeating until a flag finally occurs on the common status bus 21. For the simplified printing operation here being considered the flat which initially occurs on the status bus will occur in response to an instruction word applied to the keyboard interface 26 which requires the gating of the output of a strobe flip flop to the common status bus 21 as will be seen below in conjunction with FIG. 10. Here it is sufficient to appreciate that each time a key on the keyboard means 1 is depressed, the eight (8) bit ASCII code representative of the character on the key depressed is loaded into an eight (8) bit register whose outputs connect to a set of eight (8) output gates and a strobe flip flop is set to provide a flag indicative of the loaded condition of the output gates. Therefore, in response to an instruction to gate the condition of the strobe flip-flop to the status bus, the output of this flip flop will be applied to the common status bus 21 through keyboard interface 26. Accordingly, when a key at the keyboard means has been depressed and the eight (8) bit ASCII code associated therewith has been loaded into the output gate therefor, the strobe flip flop at the keyboard means will be set and upon interrogation will place a ONE (1) on the common status bus 21. When a ONE (1) appears on the common status bus 21, in response to an instruction requiring the gating of the strobe flip flop at the keyboard interface onto the common status bus 21, the ONE (1) which appears on the common status bus will be compared at the ROM address register 81 with bit $B_{10}$ of that instruction which is a ONE (1). As this is a branch instructon, i.e., bit $B_{11}=1$, and the results of the comparison under these conditions will be positive, the read only memory address register 81 will branch from the idle program in which it is presently operating and into a program seqence designated branch on the keyboard. Of course, if the ONE (1) bit did not appear on the common status bus 21, the idle loop would be continued by the usual incrementing of the ROM address register 81 and no branch operation would result until an appropriate condition finally appeared on the common status bus 21 in response to some branch instruction.

The first command issued by the read only memory 80 in response to the first address of the branch on keyboard program sequence is a transfer keyboard character to data bus and data bus to main register M command. This, causes the eight (8 ) bit code to be transferred from the eight gates at the keyboard interface 26 onto the common data bus 19 and through the arithmetic logic unit 84 into the eight (8) bit storage location of the main register M. The ROM address register 81 is incremented and the next instruction from the read only memory 80 in this sequence is a command to classify the character captured. This results in a transfer of the eight (8) bit character loaded into the main register M back into the arithmetic logic unit 84 where the same is processed to determine whether it is a printable character or a non-print character representing functional information or the like. The character tested is transferred back into the main register M for subsequent utilization. If the result of the comparison in the arithmetic logic unit 84 has indicated that a non-print data character has been loaded into the main register M, a jump address sequence is next initiated at the ROM address register 81 to return the program sequence to step 1 of the idle program. However, if it is assumed that the character loaded into the main register M was in fact a character to be printed, the read/write buffer 35 may be addressed, the character loaded into main register M is stored therein and in addition, this character as well as a variation thereof, as aforesaid, are employed to address the printer data ROM 43 and cause the assembly of the twelve (12 ) bits of character information as well as the storage thereof within the general purpose registers 83 in the manner described above. In addition, appropriate escapement information associated with the character defined is also stored in the general purpose registers 83. The ROM address register 81 is again incremented and the next program step of the branch on keyboard program will be read out. The resulting instruction from the read only memory 80 under these conditions is a branch on the status of the printer instruction which ascertains whether or not the printer is busy and more particularly, as shall be seen below, whether the carriage displacement status input is busy. If the carriage status input applied to the common status bus 21 indicates that the carriage is in a busy condition, the ROM address register 81 will go into a branch and return routine awaiting a not busy status indication from the carriage condition output. If a not busy condition is indicated on the common status bus 21 in response to this branch, on printer instruction, the ROM address register 81 will be incremented and apply the next address of this program sequence to the read only memory 80. This address in the program sequence causes the read only memory 80 to produce an instruction word for causing up to twelve (12) bits of displacement information to be applied to the printer interface 27 for controlling the displacement of the daisy wheel element carriage. Such displacement information is formed from constants read from the read only memory 80 or data stored in the general purpose registers 83 depending on the pitch or proportionally spaced mode of printing selected and applied to the main register M. Effectively, this information is applied to the printer interface 27 in two passes in the same manner as character information and represents displacement information for half of the previous character and half of the next character to be printed. This displacement information is subsequently applied to the printer unit 2 which displaces the daisy wheel print element carriage in response thereto upon the receipt of a strobe command issued by the read only memory 80, under program control.

Once the printer carriage has been appropriately positioned the next instruction in this sequence is again a branch on the printer to see if the same is busy, here however, the status of the character input to the printer interface 27 is tested to ascertain a busy status. The response of the printer interface 27 to an instruction seeking to ascertain whether the character input thereof is busy is applied from the printer interface onto the common status bus 21. If a ONE (1) is applied to the common status bus 21, indicating that the character input to the printer is in fact busy, this ONE (1) will be compared to bit $B_{10}$ of the interrogating instruction and will cause the ROM address register 81 to branch into a monitor printer address sequence where, in effect, the character input of the printer is monitored until the flag on the status bus goes low indicating the printer may receive character information. When this happens, the ROM address register 81 will return to the next step of the branch on the keyboard program sequence. If, however, the instruction inquiry to the printer interface 27 indicated that the character input to the printer is not in fact busy, the ROM address register 81 will be incremented and immediately intitiate the next step of the branch on the keyboard program sequence. The instruction read from the read only memory 80 in response to this step of the branch on keyboard program sequence is designated control printer character strobe which causes the twelve (12) bit data character information assembled in the general purpose registers 83 to be conveyed to the common data bus 19 and through the eight (8) bit data conductor 31 to the printer interface 27 in two discrete passes. In addition a character strobe command is issued to the printer to cause it to acquire the twelve (12) bits of character information assembled at the printer interface and respond thereto. This command, as shall be seen below, causes the daisy wheel printing element at the printer means 2 to be properly positioned and thereafter, the character is printed. Thus, the sequential addressing of the read only memory register 80 by the ROM address register 81 due to the continuing incrementing thereof has caused an eight (8) bit character representing a key depressed at the keyboard means 1 to be loaded into the main register M and transferred to the read/write buffer 35. In addition, twelve (12) bit character information was developed from the printer data ROM 43. This twelve (12) bit character information or constants read from the ROM 80 were applied to the printer means 2 together with a carriage strobe pulse so that appropriate escapement prior to printing would occur. Thereafter, the twelve (12) bit character was applied to printer to cause actual printing of the defined character to occur in the presence of a character strobe. The last instruction read from the read only memory 80 instruction sequence now being discussed causes the ROM address register 81 to jump to the first address of the idle program which effectively causes the read only memory 80 to again begin step 1 of the idle loop instruction sequence previously discussed.

Thus, for the printing sequence described above, the keyboard information was selectively transferred from the keyboard means 1 to the printer means 2 and printing resulted therefrom. However, for the purposes of the instant discussion, it is more important to note that the common status bus 21 was utilized in conjunction with the addressing sequences read from the ROM address register 81 to apprise the logic as to when a character was present for processing and cause the ROM address register 81 to branch in response to a branch instruction into a specialized addressing sequence calculated to achieve the printing of the character information presented on the common data bus 19 if the status condition sought was present. Furthermore, each time character or carriage displacement information was to be applied to the printer means 2, a branch on the printer operation was initiated wherein the condition of the common status bus 21 was utilized to monitor the readiness of the printer means 2 to receive the information to be conveyed. If the printer means 2 was ready to receive the information conveyed, this information was transferred. However, when the printer means 2 was not ready to receive such information, an indication to this effect present on the common status bus 21 was utilized to cause the ROM address register 81 to go into a branch addressing sequence wherein the condition tested at the printer means 2 was monitored until a ready condition was in fact present. Thus, instructions issued on the common instruction word bus 20 and status conditions received on the common status bus 21 are utilized in conjoint to vary and alter through appropriate branch and jump instructions, the address sequence employed by the ROM address register 81 to achieve appropriate operation of the present embodiment of the automatic writing system according to this invention.

A more detailed explanation of the operation of the embodiment of the automatic writing system according to this invention, as shown in FIG. 2, must await the further description of the structure and the operation of the peripherals as set forth below. However, it should be here noted that the arrangement of the automatic writing system according to this invention wherein all peripherals are connected with a central processor through a common data bus 19 which acts to convey all system data, a common instruction word bus 20 which acts to convey all commands issued by the central processor to the various peripherals and a common status bus 21 which acts to convey the condition of any peripheral whose condition is sought to be monitored to the central processor admits of a wide ambit of obvious alterations and modifications because any peripheral which it is desired to add or remove may be added or deleted from the present invention without requiring major modifications of the system as a whole. For instance, should it be desired to add telecommunications peripherals to the instant invention, such telecommunication peripheral, be it a high or low speed peripheral, could be simply added to the common data bus 19, the common instruction word bus 20 and the common status bus 21, together with appropriate modification to the read only memory 80 and the ROM address register 81. The basic system, however, would not have to be altered. In addition, it should be noted that the present invention allows each peripheral to be used at a speed which is commensurate with the highest operational speed of that peripheral and hence, when the printer is not being employed in a given operation, the other elements of the system, which are capable of operating at much higher speeds would determine the speed with which the operation is performed. Thus, should it be desired to transfer information from one record media to another, the slowest peripherals in the system needed for that operation would be the record stations and hence, the transfer operation could proceed at the highest available speed of the record stations. It should also be noted that although not shown in FIG. 2 to avoid additional complexity, a common clock bus would preferably also be employed in the instant embodiment of the present invention. Such a common clock bus could, under program control, supply appropriate clocking rates to each of the peripherals and to the microprocessor indicated by the dashed block 16 through conventional step down and phase multiplication techniques while avoiding the undue redundancy in structure which would be required if independent clocking souces were used at each peripheral as well as internally within the microprocessor indicated by the dashed block 16.

THE SUBSYSTEMS AND PROGRAMMING

The manner in which the various subsystems employed within the instant invention, as indicated by the major peripheral and microprocessor blocks depicted in FIG. 2, are organized and cooperate within the system has been illustrated and described in some detail in conjunction with FIGS. 1 and 2. The detailed structure of pertinent ones of such subsystems are illustrated in FIGS. 3–15*b* and described hereinafter in specifically entitled specification sections devoted to such subsystems. Although the structure of FIGS. 3 - 15*b* has been highly simplified to facilitate an ease of understanding the specification sections associated therewith in this provisional specification frequently contain simplified schematics which are referred to therein rather than to the structure contained in FIGS. 3 - 15*b* per se.

System functions and modes of operation which are common to the automatic writing system described in U.S. Ser. Nos. 429,479 and 430,130 are not described as specific reference to these applications and the incorporation of their disclosures herein serves to avoid undue repitition. The program sequence of operations for inventive system functions are set forth in a highly simplified manner in the flow charts depicted in FIGS. 16 - 28*d*. These system flow charts are self explanatory; however, details of the programming associated with each flow chart as well as the complete programming employed in exemplary tape and card record media embodiments of the instant invention may be more fully appreciated by reference to Appendices A and B, attached hereto, which set forth annotated exemplary programs for tape and card record media versions of the instant invention. Additionally, Appendix C sets forth a list of Operands and Instructions, which is also annotated in a detailed manner and organized on a subsystem basis, to assist in an understanding of the programs attached as Appendices A and B, as well as readily yielding the various B-bit decodes employed in each subsystem.

THE ROM ADDRESS REGISTER

The ROM address register 81, as briefly described in conjunction with FIG. 2 serves to uniquely address a given instruction word in the read only memory 80 during each instruction cycle. The address provided by the ROM address register 81, as aforesaid, is a 13 bit address as is required to uniquely define a given word within the 8K read only memory 80. Of this 13 bit instruction word, the most significant three bits in the instruction act to define one of the eight pages within the read only memory 80 wherein each page contains 1,024 sixteen (16) bit instruction words. Each 1K page within the read only memory 80 may be further considered to be divided into four minor pages which each comprise 256 sixteen (16) bit instruction words and accordingly, the next two most signficiant bits in the 13 bit address provided by the ROM address register 81 may be viewed as uniquely addressing one such minor page so that the five most significant bits within the thirteen (13) bit address provided by the ROM address register 81 act to uniquely define a minor page within the read only memory 80 which includes 256 sixteen (16) bit instruction words. The remaining eight (8) bits of each address provided by the ROM address register 81 act to uniquely define a given instruction word within the 256, sixteen (16) bit instruction words present within each minor page. More particularly, each minor page of memory within the read only memory 80 may be arbitrarily considered to be divided into sixteen (16) sections wherein each section contains sixteen (16), sixteen (16) bit instruction words. Under these conditions, it will be appreciated that of the remaining eight (8) bits in a given thirteen (13) bit address, the upper four (4) bits may be viewed as uniquely defining an individual one of the sixteen, (16) sixteen word sections within each minor page while the lower four (4) bits of each address uniquely defines a given instruction word within a selected section so that each thirteen (13) bit address provided by the ROM address register 81 acts to uniquely define a given sixteen (16) bit instruction word within the read only memory 80.

The ROM address register 81 normally functions to address the read only memory 80 in sequential fashion wherein a previous address is incremented and the automatic sequencing is continued until an event takes place within the automatic writing system according to the present invention to cause a deviation from the sequencing operation initiated. Thus, when the automatic writing system according to the instant invention is initialized, as for instance during a power up operation, an all Zero (0) address is initially provided by the ROM address register 81 to the read only memory 80 and it is followed in the next instruction cycle by an address having Zeros (0's) in the twelve (12) most significant bit locations and a ONE (1) in the least significant bit location. The next address in this sequence would then be incremented by one in the next instruction cycle and such sequential operation would continue until an even took place within the system to cause the automatic sequential incrementing of the thirteen bit addresses supplied to the read only memory 80 to be modified under program control. Such an event might typically take the form of a condition on the common status bus 21 which satisfies a branch condition present in an instruction read from the read only memory 80, while the same is reading instructions associated with a monitoring operation wherein the system effectively waits for a designated event, such as the inputting of character information, to occur. Similar other events which may occur to cause a change in the initial address sequence provided by the ROM address register 81 may take the form of the inputting and detection of function codes from the keyboard, the detection of specified character information on the common data bus 19, the detection of information defining a condition appropriate for terminating a given mode of operation, or a multitude of similar other events.

A deviation in the normal mode of incrementing a previous address in sequence may take the form of a jump operation wherein the ROM address register 81 effectively jumps to a new address. Such a jump operation may take a plurality of forms depending upon the events which occur. Thus for instance, an entirely new address may be loaded into the ROM address register 81 from bits read in a previous instruction cycle from the read only memory 80 and under these conditions, a jump to any address in the 8K memory may occur without limitation to page, or section. Furthermore, when a jump operation occurs, the last address employed prior to the jump may be loaded into the return address register 82 so that upon the completion of a given routine, the system may return to a point in the sequence of addresses at which the jump operation occurred so that addressing may continue in a sequential manner. Thus, the system may jump to an entirely new thirteen bit address in response to address bits obtains from a previous instruction read from the read only memory 80 or a previously utilized address as stored in the return address register 82. Thus, jumps of this type may be roughly classified as jumps to a newly supplied address or to a return address and are characterized by the substitution of thirteen new address bits without reference to the sequence of address operations presently in process. Additionally, jumps to relative addresses are also performed, typically in response to the satisfaction of a branch condition on the common status bus 21 and for this reason jumps to such relative addresses will be hereinafter referred to as branch operations to distinguish them from cases where an entirely new address is employed. A branch to a next relative address typically occurs through the addition of four address bits obtained from the previous instruction to the current address. These four bits which are added are, in the exemplary embodiment of the instant invention, added to the lowest four significant bits of the address to cause relative addressing within a section. Thus, it will be appreciated that the ROM address register 81 essentially performs four types of addressing functions under the control of sixteen (16) bit instruction words read from the read only memory 80 in that it normally supplies addresses in sequence to the read only memory 80 wherein a previous address is incremented by one during each instruction cycle; however, jumps to an entirely new address, jumps to a return address and branch operations to a relative address may also be performed thereby.

Referring now to FIG. 3, there is shown a block diagram schematically illustrating an exemplary ROM address register suitable for incorporation into the embodiment of the automatic writing system depicted in FIG. 1 and more particularly into the microprocessor portion of the apparatus depicted in FIG. 2, The exemplary ROM address register depicted in FIG. 3 comprises three sections 110, 112 and 114 each of which is associated with the manipulation and development of a fixed number of bits within the thirteen (13) bit address supplied to the read only memory 80. More particularly, of the thirteen address bits, $A_0 - A_{12}$ supplied by the ROM address register 81, the five most significant bits $A_8 - A_{12}$, are handled by the section of the ROM address register indicated generally by the reference numeral 110 while the middle four order bits $A_4 - A_7$, are handled by the section of the ROM address register indicated generally by the reference numeral 112 and the lowest four order bits $A_0$ - $A_3$ are processed by the section of the ROM address register indicated by the reference numeral 114. Each section of the ROM address register 110, 112, and 114 includes multiplexer means 116 - 119, next address register means 120 - 123 and address register means 124 - 127. The multiplexer means 116 - 119 may take any of the conventional forms of this well known class of device which act in the conventional manner to place one of two inputs or a zero (0) level on an associated output depending upon the condition of the select inputs thereto. As conventionally available multiplexer means are generally 8 input/4 output devices, a single device of this type has been illustrated for the multiplexer means 117 - 19 as present within each section of the ROM address register. However, as section 110 of the ROM address register must process five (5) bits rather than four (4) bits processed by sections 112 and 114 thereof, an additional, two input, single bit output multiplexer means 116 is also included in the upper section of the ROM address register means associated with the high order five bits $A_8$ - $A_{12}$ of the address. This single bit multiplexer means may be formed in the well known manner by the utilization of appropriately connected flip flops or alternatively a single stage of a multi-input multiplexer device may be employed.

The four bit multiplexer 117 - 119 may take the form of conventional 8233 multiplexer devices as available from The Signetics Corporation of California. Alternatively, a ten input, five output multiplexer means may be substituted for the pair of multiplexer means 116 and 117, since, as shall be appreciated by those of ordinary skill in the art, the select inputs thereof are commonly connected. The single bit multiplexer means 116 is associated with the processing of high order address bit $A_{12}$ while the multiplexer means 117 is associated with the processing of high order bits $A_8$ - $A_{11}$ and thus, as shall be apparent to those or ordinary skill in the art, the five high order bits of each address produced are processed thereby to uniquely define a minor page.

The multiplexer means 116 has a first input 128 connected through multi-conductor cable 88, FIG. 2, so as to receive address information associated with the highest order bit stored in the top location of the return address register 82. This input to the multiplexer means 116 is designated $AB_{12}$ and, as shall be appreciated by those of ordinary skill in the art upon a review of FIG. 2, all outputs from the return address register 82 supplied to the ROM address register 81 through the multi-conductor cable 88, bear the designation AB together with a subscript designating the bit location or significance of the bit information applied thereto. Thus, the high order multiplexer means 116 receives the One (1) or Zero (0) condition of bit twelve (12) of the last address stored in the top of the return address register 82. Similarly, a second input to multiplexer means 116 on conductor 129 is connected to an individual bit conductor within the instruction word cable 87, as shown in FIG. 2, which is associated with bit 13 of each instruction word applied to the common data bus 20 by the read only memory 80. From the organization of the ROM address register 81 described above, instruction word bit $B_{12}$, rather than bit $B_{13}$, might be expected to be applied to conductor 129 through the 16 bit instruction word cable 87. This is not here the case as instruction word bit $B_{12}$ has not been accorded this function; however, such an option is readily available to a programmer should it be a desired mode of organization.

The multiplexer means 116 associated with address bit $A_{12}$ has its select inputs $S_0$ and $S_1$ connected to conductors 130 and 131. The conductor 130 is connected through conductor 132 to the output of an OR gate 133 whose inputs are inverted. The OR gate 133 may take any of the conventional forms of this well known class of logic device which acts to provide a high level output on conductor 132 whenever any of the inverted inputs thereto are low. A first input to the OR gate 133 is connected through conductor 134 to an input annotated JEP. This input, stands for JUMP EXTERNAL PAGE and represents an AND decoding of ROM bits $B_{15}$ and $\overline{B_{12}}$ as read in each instruction sequence. Thus, whenever an instruction is issued from the read only memory 80 having $B_{15}$ bit in a One (1) condition and $B_{12}$ bit in a Zero (0) condition, the JEP input to OR gate 133 will go high causing the output of the OR gate 133 on conductor 132 to go low if no low is presented at the other input thereof. As will be readily appreciated by those of ordinary skill in the art, the JEP input on conductor 134 may be decoded through an ANDing of ROM bits $B_{15}$ and $\overline{B_{12}}$ as obtained from each instruction applied to the common instruction word bus 20. The second input to OR gate 133 is applied through conductor 135 from the terminal annotated $\overline{ICA}$. The reference ICA stands for the condition INITIAL CLEAR ACTIVE and hence a high level resides on this input terminal and conductor 135 whenever initial clear is not in an active state. The initial clear condition occurs each time a power up or resetting cycle occurs and represents a fixed interval during which normal processing operations are inhibited while the logic, registers, and memories employed within the instant invention are initialized. Thus the $\overline{ICA}$ input applied to conductor 135 is normally in a high condition except when the timer associated with a resetting or an initial clear cycle has been energized and has not yet timed out. Thus it will be appreciated by those of ordinary skill in the art that the output of the OR gate 133 whose inputs are inverted, is normally in a high state due to a high level normally present on conductor 135 and a low level present on conductor 134. However, any time a JEP instruction is decoded and applied to the input 134, the output of OR gate 133 will go low except under such conditions as when an initial clear or resetting operation is in progress as indicated by a low level on conductor 135. Thus it will be appreciated that the SO select input to the multiplexer 116 as applied through conductors 130 and 132 is normally in a high condition.

The $S_1$ input to the multiplexer means 116 is connected through conductor 131 to the output of OR gate 136 whose inputs are inverted. The OR gate 136 may take precisely the same form as the OR gate 133 and hence acts in the conventional manner to provide a high level output on conductor 131 whenever any of the inputs thereto are low. A first input to the OR gate 136 is connected through conductor 137 to the terminal annotated $\overline{ICA}$ which is normally high except during an initial clear or reset interval as aforesaid. A second input to the OR gate 136 is supplied through conductor 138 from a terminal annotated AB Enable. The terminal annotated AB Enable is normally at a low level exept under such conditions when AB bits present at the outputs of the return address register 82 in the form of bits $AB_0$ - $AB_{12}$ are to be gated to the outputs of the various multiplexer means 116-119, as is the case during a jump and return instruction where a previously stored address is to be read from the return address register 82 and supplied through multi-conductor cable 88 to the ROM address register 81 so that a point in a previously abandoned addressing sequence may be returned to. The AB Enable input is obtained from an ANDing of ROM bits $B_0$ - $B_3$ and $\overline{B_{11}}$ - $\overline{B_{15}}$ under conditions wherein ROM bits $B_0$ - $B_3$ are all in a One (1) condition while ROM bits $B_{11}$ - $B_{15}$ are all in a Zero (0) state. Therefore, as the input to OR gate 136 on conductor 137 is normally high, as aforesaid, while the input on conductor 138 is low except when a return instruction has been decoded, the output of OR gate 136 applied to the $S_1$ select input to the multiplexer 116 is normally in a high condition and such condition will persist except when a return instruction has been decoded and the initial clear level is not active. It should be noted that the output of OR gate 136 is commonly connected through conductor 139 to the $S_1$ select input of all of the multiplexer means 116 - 119 while the output of OR gate 133 is commonly connected through conductor 140 to the $S_0$ select inputs of only multiplexer means 116 - 118. The operation of the multiplexer means 116 is such that when a high level resides on both of select inputs $S_0$ and $S_1$ a zero (0) output is provided thereby on conductor 141. When however, select inputs $S_1$ goes low, the $AB_{12}$ input applied to the high order multiplexer on conductor 128 will be applied to the output thereof on conductor 141 while when the $S_0$ input goes low the ROM bit input $B_{13}$ applied thereto on conductor 129 is gated through to the output thereof on conductor 141. The output of the multiplexer means 116 is connected through conductor 141 to an input of the next address register 120 and serves to provide the same with a Zero (0) input when normal sequencing operations are to be continued, address bit $B_{13}$ when a jump instruction has been decoded or returned address bit $AB_{12}$ when a return operation has been initiated.

The second multiplexer means 117 within section 110 of the ROM address register devoted to the high order bits of each address is an eight input/four output multiplexer device which may take the conventional form as aforesaid of an 8233 MSI chip conventionally available from Signetics Corporation. The multiplexer means 117 thus acts, in the conventional manner, to apply either all Zero's (0's), inputs $AB_{11}$ - AB, or inputs $B_{11}$ - $B_8$ to the outputs thereof connected to conductors 142 - 145 depending upon the state of the select inputs $S_0$ - $S_1$ thereof. The $S_0$ input to multiplexer means 117 is connected through conductors 146, 140 and 132 to the output of the OR gate 133 while the $S_1$ input to multiplexer means 117 is connected through conductors 147 and 130 to the output of OR gate 136 as aforesaid. Thus it will be seen that since the output of the OR gates 133 and 136 are normally high, a high level will normally be applied to both of the select inputs $S_0$ and $S_1$ of the multiplexer means 117. However, when a JEP instruction has been encoded and no initial clear active level is present, the $S_0$ input to the multiplexer means 117 will go low while when a return condition has been decoded, as indicated by an AB Enable level on conductor 138, the $S_1$ input connected to conductor 147 will go low.

Like the multiplexer means 116, whenever both of the select inputs $S_0$ and $S_1$ to the multiplexer means 117 are high, Zero's (0's) will be applied to the outputs thereof connected to conductors 142 - 145 while if a 0 level is applied to the $S_0$ select input on conductor 146, ROM bits $B_{11}$ - $B_8$ will be applied to conductors 142 - 145 so as to provide a new high order address bit from an instruction read from the read only memory 80. Conversely, should the $S_1$ input to the multiplexer means 117 go low due to the presence of an AB Enable level decoded in response to a return instruction, inputs $AB_{11}$ - $AB_8$ will be applied to conductors 142 - 145 to thereby provide a new set of high order address bits from the return address register 82. The outputs of the high order multiplexer means 117 are connected through conductors 142 - 145 to the inputs of the next address register means 121. Thus it will be appreciated by those of ordinary skill in the art that the common select inputs applied to the multiplexer means 116 and 117 control, in effect, the five high order address bits supplied to the next address register means 120 and 121.

The next address register means 120 and 121 may take the conventional form of bi-stable latch devices which act in the well known manner to accept data presented at the inputs thereof in the presence of a clock pulse and to retain such data as has been loaded therein in temporary storage until new data is loaded in the presence of a clock pulse. Although any conventional form of flip flop or bi-stable device could be employed for each bit of storage necessary for the next address register means 120 and 121, model 7475 four bit bistable latches, as conventionally available from Texas Instruments Incorporated of Dallas Texas, are here preferred. Thus, when these well known MSI devices are employed for the next address registers 120 and 121, only one stage of such four bit latch would be employed for the next address register means 120 since the same only receives a single bit of information from conductor 141 while all four stages of such a four bit bistable latch would be employed for the next address register means 121 as the same receives four bits of information from the outputs of the high order multiplexer means 117 through conductors 142 - 145.

The single bit output of the next address register means 120 is applied through conductor 148 to the input of the address register means 124 while the four inputs to the next address register means 121 provided at the output of the high order multiplexer means through conductors 142 - 145 are applied from the next address register means 121 through conductors 140 - 152 to the inputs of the address register means 125. Thus it will be appreciated by those of ordinary skill in the art that whenever a clock pulse is applied to the next address register means 120 and 121, the current five bit output of the high order multiplexer means 116 and 117 will be loaded into the next address register means 120 and 121 to represent the five bits of high order address information for the next address. However, when no clock pulse is present, the previous five bits loaded into the next address register means 120 and 121 will be retained to act as the high order five bits for the next address. This means, that during the various addressing functions provided by the ROM address register means 81, new address B bits from the common instruction word bus 20, or AB bits applied from the return address register means 82, may be inserted for the middle order $A_4$ - $A_7$ or low order $A_0$ - $A_3$ address bits while previously relied upon address bits in the high order next address registers 120 and 121 may be retained to effectively accomplish branch operations within a section.

The clock input to the next address register means 120 and 121 are connected through conductors 154 and 155 to the output of an AND gate 156. Although separate clock pulse sources may be employed for each peripheral, the instant embodiment of the automatic writing system according to the present invention employs a common clock bus as the system clock to avoid apparatus redundancy and ensure synchronization between the various peripherals. The main system clock preferably takes the form of the output of a stable 4 $MH_z$ crystal controlled oscillator to provide a basic clock output signal in the form of a four 4 $MH_z$ symetrical square wave having a 250 nanosecond period. The basic or main system clock may then be divided down by four flip flops in line whose outputs yield the subclock signals CA, CB, CC and CD as well as their complements. These subclock signals, under the exemplary conditions being described above would each have a frequency of 0.5 $MH_z$ and would be phased displaced by 250 nanoseconds. The signals CA - CD as well as their complements are variously indicated in FIG. 3, as well as certain of the remaining figures of the instant specification, and it will be appreciated by those of ordinary skill in the art, that eight (8) recurring combinations of these subclocks may be employed to represent eight (8) phases of a 2ms system cycle. These eight (8) phases may be represented as phases $CL_0 - CL_7$ wherein each clock time has a pulse duration of 250 ns and may be fully represented by the following truth table:

$CB \cdot \overline{CC} = 1$ represents $CL_0$
$CC \cdot \overline{CD} = 1$ represents $CL_1$
$CA \cdot CD = 1$ represents $CL_2$
$\overline{CA} \cdot CB = 1$ represents $CL_3$
$\overline{CB} \cdot CC = 1$ represents $CL_4$
$\overline{CC} \cdot CD = 1$ represents $CL_5$
$\overline{CA} \cdot \overline{CD}_4 = 1$ represents $CL_6$
$CA \cdot \overline{CB} = 1$ represents $CL_7$ Thus through the development of the four subclocks CA - CD, a basic eight (8) phase system clock may be developed and employed within the instant invention on a common bus basis. Since the CB subclock, as developed through a division by four (4) flip flops whose outputs are connected in the form of a four (4) bit Johnson code ring counter configuration, is set by the output of the CA flip flop, the CB subclock will initiate the cycle and follows CA by one main clock cycle. Furthermore, each of the eight (8) subclocks listed above will occur in the order set forth under circumstances wherein each clock will have a duration of 250 ns and will occur in the order listed every 2ms.

The actual clock input to the next address register means 120 and 121, as supplied from the output of the AND gate 156, is supplied as a function of both subclock $CL_6$, as listed above, and the nature of the addressing operation taking place. More particularly, the AND gate 156 acts in the well known manner to provide a high at the output thereof connected to conductor 155 only when both of the inputs thereto are high. The lower input to the AND gate 156 is connected through conductor 157 to the output of an AND gate 158 which may take the same form as AND gate 156 to thus provide a high only when both inputs thereto are high. The AND gate 158 is illustrated in FIG. 3 as connected to terminals annotated $\overline{CA}$ and $\overline{CD}$ which represents, as will be appreciated by those of ordinary skill in the art, the complements of subclock CA and CD which decode as subclock phase $CL_6$ and occur towards the latter portion of the two microsecond system cycle. Accordingly, when both subclocks CA and CD are low, i.e., subclock phase $C_6$ the output of AND gate 158 will go high and this high is applied through conductor 157 to the lower input of AND gate 156. Additionally, the output of AND gate 158 is applied through conductor 159 to the clock inputs of next address registers 122 and 123 to directly control the loading of these registers. Thus it will be seen that the next address register means 122 and 123 are directly clocked during each instruction cycle while the next address registers 120 and 121 are merely primed to receive a clock towards the end of each instruction cycle. Accordingly, at clock time $CL_6$ of the two microsecond system cycle, the next address register means 120 - 123 may be clocked, while, as shall be developed hereinafter, the address register means 124 - 127 are clocked at the occurrence of the initial subclock CB so that in effect, an address is loaded into the address register means 124 - 127 from the next address register means 120 - 123 at the beginning of the two microsecond system cycle, i.e, at $CL_0$, while the next address may be loaded into the next address register means 120 - 123 during a succeeding portion of the two microsecond system cycle, corresponding to the clock time $CL_6$.

The second input to the AND gate 156 is connected through conductors 160 and 161 and a conventional inverter 162 to the output of AND gate 163. The AND gate 163 is a conventional three input device which acts in the well known manner to produce a high level output only when all of the three inputs thereto are high while producing a low level output for all other input conditions. Therefore, as the output of AND gate 163 is connected through inverter 162 to the second input of AND gate 156, it will be appreciated by those of ordinary skill in the art that AND gate 156 is only enabled to apply a clock input to the next address register means 120 and 121 when the output of AND gate 163 goes low.

The three inputs to the AND gate 136 are connected, as indicated in FIG. 3 to the terminals annotated $\overline{ICA}$, $\overline{JEP}$, and $\overline{AB\ Enable}$. The nature of these three signals or their complements were described in conjunction with the OR gates 133 and 136 and hence it is here sufficient to appreciate that the terminal $\overline{ICA}$ will be high under all circumstances other than when an initial clear signal is active such as takes place for a fixed interval during the initialization of the automatic writing system or during a resetting operation. Similarly, the terminal annotated $\overline{JEP}$ will be high except when a jump external page instruction, as aforesaid, has been issued by the read only memory 80 and decoded while the terminal annotated $\overline{AB\ enable}$ will be high under all conditions except when a return instruction has been issued by the read only memory 80 and decoded. This means that the AND gate 163 will produce a high level to disable AND gate 156 under all conditions except those attending an initial clear active signal, a jump external page instruction or a jump to a return address instruction. When any of these three inputs to the AND gate 163 goes low, the AND gate 156 will be enabled to gate a clocking signal from the output of AND gate 158 to conductor 154 and appropriate order address bits will be provided at the output of the high order multiplexer means 116 and 117 and applied through conductors 141 - 145 to the respective inputs of the next address register means 120 and 121 to replace the high order address bits of the previously employed address with those attending the instruction decoded. Thus, when an initial clear active signal is present, the terminal annotated $\overline{ICA}$ will go low to force the high order multiplexer means 116 and 117 to place 0 bits on conductors 141 - 145 while the output of AND gate 163 goes low to enable AND gate 156. Therefore, under these conditions, during clock time $CL_6$, Zeros (0's) will be loaded into each address location of the next address register means 120 and 121 so that the highorder bits for the new address will be in a Zero (0) condition. If the condition of the address locations within the next address registers 122 and 123 are in a like state, which is present under these conditions as shall be seen below, the next address loaded into address registers 124 - 127 will be an all Zero (0) bit address whereupon sequential addressing may again start from the beginning point of the programmed mode of operation.

Similarly, when the terminal annotated $\overline{JEP}$ goes low, the output of AND gate 163 will again go low to enable AND gate 156 to gate clock pulses to the next address registers 120 and 121 during clock time 6. This also means that a jump external page instruction has been read from the ROM so that conductor 134 will go high to place an 0 level on conductor 130 whereupon the high order multiplexer means 116 and 117 will apply B bits obtained from the instant instruction to conductors 141 - 145 for loading into the next address register means 120 and 121 upon the occurrence of clock time $CL_6$ to replace the five (5) high order address bits present in the next address register means 120 and 121 with B bits obtained from an instruction read from the read only memory 80. This action, as will be appreciated by those of ordinary skill in the art, is also appropriate for the command instruction decoded, since for a jump external page instruction, the replacement of the high order bits in the address is required to define a new major and minor page. In a similar manner, when the terminal annotated $\overline{\text{AB Enable}}$ goes low, the output of AND gate 163 will also go low to permit AND gate 156 to clock the next address register means 120 and 121 during clock phase $CL_6$. At the same time, the conductor 132 which directly receives a decoding of the AB Enable signal will go high to cause the $S_1$ input to the high order multiplexer means 116 and 117 to go low whereupon AB bits will be gated through the high order multiplexer means 116 and 117 and applied to the next address register means 120 and 121 through conductors 141 - 145 to cause the replacement of the five high order address bits in registers with the AB bits obtained from the top of the return address register 82.

The five high order bits thus loaded into the next address register means 120 and 121 are applied to conductors 148 - 152 so that the data loaded into the next address register means 120 and 121 is present thereon and available for loading into the address register means 124 and 125 upon a clocking of these registers. The address register means 124 and 125 may take the same form of conventional bistable latch means described in conjunction with the next address register means 120 and 121 and it should also be appreciated from FIG. 3 that address register means 124 is configured to indicate a single bit bistable latch while the address register means 125 is configured to indicate the presence of a four bit latch. The address register means 124 and 125 are thus conventional bistable latches which act in the presence of a clock input to store the data applied to the inputs thereof on conductors 148 - 152 and to reflect any such data loaded on the outputs thereof indicated as connected to conductors 164 - 168. The conductors 164 - 168 are further annotated to indicate their direct relation to the five high order bits $A_{12} - A_8$ and it will be appreciated by those of ordinary skill in the art that these inputs may serve as part of the individual cables within the multiconductor cable 86 which provides the 12 bit address information to the read only memory 80 and the return address register means 82 through cable 91.

The clock input to the address register means 124 and 125 is connected through conductor 168 to a terminal annotated CB which, as indicated, receives subclock CB directly when the same occurs for a 1 us interval at the beginning portion of the system cycle. Thus it will be appreciated by those of ordinary skill in the art that the address register means 124 and 125 are loaded at the initial portion of the machine cycle with the address presently in the next address register means 120 and 121 and thereafter, during the same machine cycle, the next address register means 120 and 121 are loaded with new information corresponding to the five high order address bits for the next address if a clocking signal results as a function of one of the inputs to AND gate 163. The conductor 168 which provides clocking information to the address register means 124 and 125 also applies clock information to the address register means 126 and 127.

The section of the ROM address register means 112 devoted to the middle order address bits $A_4 - A_7$ includes a multiplexer means 118, next address register means 122, and address register means 126 as aforesaid and in addition, includes adder means 170 interposed between the multiplexer means 118 and the next address register means 122. The function of the middle order multiplexer means 118, the next address register means 122 and the address register means 126 are essentially the same as those described for the corresponding apparatus within the section of the ROM address register means devoted to the high order bits; however, the adder means 170 is present within section 112 of the ROM address register means to implement in part, the sequential incrementing functions and the intrapage branching operations employed within the instant invention in conjunction with the low and middle order address bits $A_0 - A_7$. Thus, although this will be described in greater detail below, it should be noted at the outset that the sequential incrementing function of the ROM address register means 81 is limited to the minor page defined by the high order bits loaded into the next address register means 120 and 121 and should it be desired to jump to a new minor page, the five high order bits $A_8 - A_{12}$ defining the address thereof must be loaded into the high order section 110 of the ROM address register means 81 through an initial clear or resetting operation, a jump operation to an external page or to a return address as controlled by the outputs of the high order multiplexer means 116 and 117 and the enabling of AND gate 156.

The multiplexer means 118 devoted to the middle order address bits $A_4 - A_7$ may take the same form of eight input/four output multiplexer devices described in conjunction with the multiplexer means 117 except that the multiplexer means 118 receives ROM bits $B_4 - B_7$ from the common instruction word bus at four of the inputs thereto and return address bits $AB_4 - AB_7$ from the top of the return address register means 82 through the multiconductor cable 88. The middle order multiplexer means 118 will thus apply either all 0 bits, ROM bits $B_4 - B_7$ from a current instruction or return address bits $AB_4 - AB_7$ from the return address register means 82 to its outputs connected to conductors 171 - 174 depending upon the state of the select inputs $S_0$ and $S_1$ thereof. The select inputs to the middle order multiplexer means 118 are connected through conductors 140 and 139 to the outputs of OR gates 136 and 133 in the same manner as described for the select inputs $S_0$ and $S_1$ of the high order multiplexer means 117. Thus, as was described for the high order multiplexer means 117, both of the select inputs to the multiplexer means 118 are normally in a high condition to cause all 0s to be applied to conductors 171 - 174 except under such conditions as when a jump external page (JEP) or jump to a return address (AB Enable) instruction is decoded whereupon the appropriate select input $S_0$ or $S_1$ goes low to cause the middle order multiplexer means 118 to apply ROM bits $B_4$ – $B_7$ or return address bits $AB_4$ – $AB_7$, respectively, to the conductors 174 – 171. Thus it will be appreciated by those or ordinary skill in the art that the operation of the middle order multiplexer means 118 is essentially the same as that of the high order multiplexer means 117 in that normally an all 0 output is applied to conductors 171 – 174 and when a jump or jump to return address instruction is decoded, appropriate ones of the middle order bits from the read only memory 80 or the return address register means 82 are applied to conductors 171 – 174. The conductors 174 – 171 are connected to inputs of the adder means 170 annotated $M_4$ – $M_7$, it being noted that the annotation M has been adopted to indicate an input from the multiplexer device while the subscript corresponds to the order of the bit applied thereto.

The adder means 170 may take any of the well known forms of this conventional class of device; however, a four bit binary full adder such as a Model 7483 MSI Device, as available from Texas Instruments, is preferred. The adder means 170 act in the conventional manner of four bit binary full adders to sum two four bit binary numbers applied to the inputs thereof and add a 1 to the resultant sum if the carry input thereto is enabled. A first set of four inputs to the adder means 170 is applied thereto through conductors 171 – 174 and represent the output of the middle order multiplexer means 118, as aforesaid. Therefore, the four bit binary number applied to inputs $M_4$ – $M_7$ of the adder means 170 may take the form of all 0's, ROM bits $B_4$ – $B_7$ if a jump to an external page instruction has been decoded or return address bits $AB_4$ – $AB_7$ from the top of the return address register means 82 if a jump to a return address instruction has been decoded. The second set of inputs to the adder means 170 are applied, as indicated in FIG. 3, to the inputs annotated $A_4$ – $A_7$ to represent the middle four bits of the current address as applied to the read only memory 80 from the output of the address register means 126. More particularly, the current middle order address bits $A_4$ – $A_7$, as applied to the read only memory 80 from the output of the address register means 126, is applied to inputs $A_4$ – $A_7$ of the adder means 170 through conductors 175 – 178, gate array means 179 and conductors 180 – 183. The gate array 179 may take any conventional form of gating array for gating four discrete inputs to four discrete outputs when commonly enabled or alternatively may take the form of four individual AND gates having one input connected to a respective one of conductors 180 – 183 and the second input commonly connected to conductor 161 as shown in FIG. 3 while the outputs thereof are connected to a respective one of conductors 175 – 178. Under these circumstances, as will be recalled from the description of the operation of AND gate 163, the current state of middle order bits $A_4$ – $A_7$ would ordinarily be applied through conductors 180 – 183 and 175 – 178 to inputs $A_4$ – $A_7$ of the adder means 170 as the gate array means 179 would be normally enabled by a high level on conductor 161 except under such conditions where an initial clear level is active, a jump external page instruction has been decoded or a jump to a return address whereupon an AB Enable level would be decoded, has occurred. Thus it will be noted that the gate array means 179 is normally in an enabled condition so that the middle order bits $A_4$ – $A_7$ of the previous address are normally applied to the adder means 170 and it should also be noted that the enabling of the gating array means 179 is complementary to that of the AND gate 156 due to the action of the inverter means 162 in that whenever one gate is in an enabled condition, the other will be disabled as a function of the high or low state of the output of AND gate 163. Accordingly, the binary number applied to inputs $A_4$ – $A_7$ of the adder means 170 will normally take the form of the middle order bits $A_4$ – $A_7$ from the previous address.

When, however, the gate array means 179 is disabled, all of the inputs on conductors 175 – 178 will be at a Zero (0) level so that the initial adding function of the adder means 170, as carried out on a corresponding bit basis, may effectively result in the gating through of only one set of inputs applied to either the inputs annotated $A_4$ – $A_7$ or $M_4$ – $M_7$. This means, for normal incrementing functions, the middle order address bits $A_4$ – $A_7$ will be applied to the adder means 170 through the normally enabled gate array means 179 while all Zero (0) bits will be applied to inputs $M_4$ – $M_7$ of the adder means 170 from the output conductors 171 – 174 of the middle order multiplexer means 118 whose select inputs are normally in a high condition. However, should it be desired to substitute new bits for the middle order bits of the next address, the gate array means 179 may be disabled whereupon Zero (0) level inputs are applied to the inputs $A_4$ – $A_7$ of the adder means 170 while new bits for inclusion into the next address are applied to inputs $M_4$ – $M_7$ of the adder means 170 from the middle order multiplexer means 118 whose select inputs $S_0$ – $S_1$ would be appropriately conditioned to gate either B bits $B_4$ – $B_7$ from a current ROM instruction to the adder means 170 or return bits $AB_4$ – $AB_7$ from the last address stored in the return address register means 82. It will be appreciated that the conductors 180 – 183 for applying the middle bits of the last address to the inputs of the gate array means 179 essentially form one-half of the multiconductor cable 90 illustrated in FIG. 2.

The carry input to the adder means 170, as appropriately annotated in FIG. 3, acts in the conventional manner to cause a One (1) level to be added to the sum of the adder inputs whenever a high level is applied to said carry input while when a Zero (0) level resides thereon, only the sum of the inputs to the adder are applied to the output conductors 184 – 187 thereof. The carry input to the adder means 170 is connected through conductor 188 to the output of an AND gate 189. The AND gate 189 may take any conventional form of this well known class of device such as those described above and hence acts in the well known manner to provide a high level output only when both of the inputs thereto are high. A first input to the AND gate 189 is connected through conductor 190 to the carry output of a second adder means 192 which essentially performs, as will be described below, the same functions for the low order address bits $A_0$ – $A_3$ that the adder means 170 performs for the middle order address bits $A_4$ – $A_7$. Therefore, it is here sufficient to appreciated that the adder means 192 merely acts to sum its inputs and add a One (1) thereto whenever the carry input thereto is enabled. The reason for connecting the carry output of the adder means 192 to the carry input of the adder means 170 through conductors 188 and 190 as well as AND gate 189 is to enable the first and second adder means 170 and 192 to act as an eight (8) bit adder for operations where the AND gate 189 is enabled. Thus, for instance, during normal modes of operation wherein an address sequence is being employed wherein each succeeding address is merely implemented by one from the previous address, the AND gate 189 will be enabled to cause the first and second adder means 170 and 192 to act as an eight (8) bit adder so that, in effect, whenever the sum of the first and second inputs to the adder means 192 equals a One (1) in each of the four bit positions thereof, and the carry input is enabled, the carry input to adder means 170 will be enabled to cause a One (1) to be added to the sum of the inputs to the adder means 170 while the output of the adder means 192 is made to comprise a Zero (0) in each of the four bit positions thereof. This means, that when the AND gate 189 is enabled as is the case in ordinary sequencing operations, incrementing of an address sequence can continue up to two hundred and fifty-five (255) which corresponds to all addresses within a minor page of 256, sixteen (16) bit instruction words within the read only memory 80. However, as no adder is present within the section 110 of the ROM address register 81, it will be appreciated by those of ordinary skill in the art that normal incrementing in an addressing sequence cannot proceed past 255 and hence the establishment of the page and minor page of an address as controlled by the five high order bits $A_8 - A_{12}$ of an address must be inserted through the operation of the high order multiplexer means 116 and 117 and retained through a given addressing sequence through the action of the latch means 120 and 121.

The second or enabling input to the AND gate 189 is connected through conductor 193 to a terminal annotated $\overline{JIP}$. The annotation JIP stands for a JUMP INTRA PAGE instruction which, as shall be developed more fully below, takes place on a per section basis within the organization for addressing employed within the instant invention. More particularly, when a branch condition occurs, a next relative address in the form of ROM bits $B_0 - B_4$ is added to the current address which is incremented; however, as it is currently desired to limit such branch operations to the sixteen bit instruction words within a given section the carry to the adder means 170 is inhibited so that both forward and reverse jump operations within a section may take place by causing the address assembled within the adder means 192, associated with the low order bits to exceed fifteen. The $\overline{JIP}$ level applied to conductor 193 is high to normally enable the AND gate 189 to apply a carry level to the adder 170 whenever the carry out terminal of adder means 192 goes high; however, conductor 193 will go low whenever a JIP command or jump internal page command is decoded to disable this gate and hence, disable the application of a carry input to the adder means 170.

As will be appreciated from a recollection of the overall apparatus set forth in conjunction with FIG. 2, two forms of jump intrapage or branch conditions may occur within the instant invention. The first such branch conditions results when an instruction is read from the read only memory 80 seeking to test a condition on the common status bus 21 and the desired condition on the common status bus 21 is satisfied as indicated by the level thereon applied to the ROM address register 81 through conductor 92. As far as the ROM address register means 81 is concerned, status bus branch conditions are indicated by a decoding of ROM bits $B_{15}$ and $B_{11}$ under such conditions where ROM bit $B_{15}$ is equal to a Zero (0) and ROM bit $B_{11}$ is equal to a One (1). When this decode, as carried out by conventional AND gate means, not shown, is present, the complement of the ROM bit $B_{10}$ is exclusively ORed with the condition of the common status bus 21 as supplied to the ROM address register 81 through conductor 92. If a one (1) output results from the exclusive ORing which takes place, it will be appreciated by those of ordinary skill in the art that the One (1) or Zero (0) condition of ROM bit $B_{10}$ identically compares to the condition of the common status bus sought to be detected and this decode results in the terminal indicated $\overline{JIP}$ going low to thereby identify a jump intra page condition which disables AND gate 189.

Similarly, as was also discussed in conjunction with FIG. 2 and brought out in great detail in U.S. Ser. No. 12, 796 supra, a great many testing functions are performed in the arithmetic logic unit 84 such as a comparison of data present on the common data bus 19 with constants read from the read only memory 80 to classify such data for various purposes within the instant invention. Typical ROM instructions of this type are set forth in the Operand List attached hereto as Appendix C as BALG(H)$\pm n$ instructions and the result of the arithmetic operation performed is supplied to the ROM address register means 81 from the arithmetic logic unit 84 through the branch conductor 106. These branch instructions are also decoded within the ROM address register means 81 and when a desired branch condition is indicated on conductor 106, it results in the terminal annotated $\overline{JIP}$ going low. A decode of the various arithmetic logic unit branch instruction is performed in the ROM address register means 81 and includes the condition indicated on conductor 106 so that when the conditions imposed by the ALU branch instruction are satisfied an appropriate next relative address is established in the adder means 192 while the carry input to adder means 170 is inhibited. The branch on the ALU decode, although not illustrated through circuitry in FIG. 3 is as follows:

$B_{15} \cdot B_{13} \cdot B_{12}$
ANDed with $B_{11}$ and
$A = B$, the arithmetic condition or
ANDed with $\overline{B_{11}}$ and either
$\overline{B_9} \cdot \overline{B_{10}}$ and $A = B$ or
$\overline{A = B} \cdot B_9 . B_{10} \cdot B_8$ or
CO (carry out) and $\overline{B_8} \cdot B_9 \cdot B_{10}$ or
$\overline{B_9} \cdot B_8$.

Thus, any of these jump intrapage instruction decodes will result in an inhibiting of AND gate 189 wherein relative addressing may only be achieved with a carry within the adder means 192.

The outputs of the adder means 170 are connected through conductors 184 - 187 to the next address register means 122 associated with the middle order address bits $A_4 - A_7$. The next address register means 122 may take the form of a four (4) bit bistable latch of the conventional variety described in conjunction with the next address register means 121. Thus, the next address register means 122 acts in the well known manner to store the binary levels on conductors 184 - 187 each time a clock pulse is applied to the clock input thereof and presents these inputs on the four outputs thereof connected to conductors 194 - 197. The clock input to the next address register means 122 is connected directly to conductors 159 and 157 so as to directly receive the output of AND gate 158. Thus, as it will be recalled that the output of AND gate 158 will go high during clock phase $CL_6$, i.e., when clock pulse $\overline{CA}$ and $\overline{CD}$ each equal one toward the end of each two microsecond machine cycle, it will be appreciated by those of ordinary skill in the art that the next address register means 122, as distinguished from the next address register means 121 and 120, is clocked during each machine cycle and hence is loaded each machine cycle with the outputs of the adder means 170. This operation obtains, as will be appreciated by those of ordinary skill in the art, because even in the absence of a jump or jump to return instruction, the lower eight (8) bits of the address $A_0 - A_7$ are being changed during each machine cycle and hence a new four bit setting, when incrementing occurs, for the next address register means 122 so that the same may be loaded into the address register means 126 at the beginning of the next machine cycle. The outputs of the next address register means 122 are connected through conductors 194 - 197 to the address register means 126.

The address register means 126 may take an identical configuration to the address register means 125 and is clocked from conductor 168 at the beginning of each cycle of operation when clock phase CB goes high, in precisely the same manner as was described above. The outputs of the address register means 126 are applied to conductors 198 - 201 for direct application to the read only memory 80 as address bits $A_4 - A_7$ within the multiconductor cable 86 as well as for a return to the return address register means 82 through multiconductor cable 91 and to the gate array 179 through conductors 180 - 183. Thus, it will be seen that the section of the read only memory 112 differs in operation from section 110 due to the presence of the adder means 170 and the direct clocking of the next address register means 122 which acts to effect loading of the next address register means 122 during each machine cycle of operation. The bits loaded during each machine cycle of operation may comprise the output bits applied by the middle order multiplexer means 118 which in turn may consist of ROM bits $B_4 - B_7$ as supplied from a current program instruction read from the read only memory 80, returned address bits $AB_4 - AB_7$ obtained from the return address register means 82, or Zero (0) bits provided to conductors 171 - 174 under normal conditions when no external page jump or return operation is in progress. This four (4) bit output of the middle order multiplexer 118 is summed by the adder means 170 with the output of the gate array means 179 which may comprise either the four middle order bits $A_4 - A_7$ of the previous instructions or Zero (0) bits if the gate array means 179 is disabled. In actuality, what results is that either ROM bits $B_4 - B_7$ from the present instruction, return address bits $AB_4 - AB_7$ or the previous address bits $A_4 - A_7$ are effectively processed by the adder means 170, since for a jump external page or a return operation the gate array means 179 is disabled while the Zero (0) output of the middle order multiplexer means 118 is present when the gate array means 179 is enabled.

The result of the summed inputs processed by the adder means 170 may then be incremented by One (1) if the carry input thereto as connected to conductor 188 is enabled. This occurs, as will be further appreciated below, during normal sequencing operations or jump to return operations when an incrementing of the carry input of the adder means 192 results in a carry output. However, the carry input to the adder means 192 is disabled during jump external page instructions while the AND gate 189 is disabled for intrasection or jump internal page instructions as next relative address is loaded into the adder means 192 and processed only with respect to the four low order address bits $A_0 - A_3$.

The resultant output present on output conductors 184 - 187 of the adder means 170 is loaded at clock time $CL_6$ of each machine cycle into the next address register means 122 and thereafter gated through conductors 194 - 197 into the address register means 126 at the beginning of the next machine cycle whereupon the output thereof on conductors 198 - 201 acts as the middle order bits of the next address supplied to the read only memory 80 and is additionally fed back for processing purposes to the gate array 179 through conductors 180 - 183.

Section 114 of the ROM address register means 81 is responsible for processing the low order bits $A_0 - A_3$ of each instruction and comprises the low order multiplexer means 119, the adder means 192, the next address register means 123 and the address register means 127. Thus, Section 114 of the ROM address register means 81 is configured in a highly similar manner to section 112. However, as shall be seen below, the select input $S_O$ to the low order multiplexer 119 as well as the carry input to the adder means 192 are differently controlled from their counterparts in Section 112 to permit the incrementing of an address loaded into the adder means 192 during sequential operations, and jump intrasection or intrapage operations as well as accommodating, through the operation of the low order multiplexer means 119, the substitution of a next relative address in all jump intrapage operations and a resetting of the address to 0 during initial clear operations. The low order multiplexer means 119 may take the same format described above for the middle order and high order four bit multiplexer means 117 and 118 and is an eight input, four output device whose outputs are clamped at a Zero (0) level whenever highs are applied to both of the select inputs $S_1$ and $S_0$ thereof. Since the multiplexer means 119 is associated with the low order four bits processed within the ROM address register means 81, a first set of four of the eight inputs thereto are connected through the multiconductor cable 87 to the common instruction word bus 20 and received therefrom ROM bits $B_0 - B_3$ of a current instruction. These ROM bits $B_0 - B_3$ may, as was the case for the other multiplexer devices 116 - 118, comprise the low order ROM bits for a jump external page instruction, but in addition thereto, in JIP instructions, i.e. those associated with a branch on the common status bus where conditions are satisfied or a branch due to an arithmetic operation, ROM bits $B_0 - B_3$ as applied to the low order multiplexer means 119 may comprise a next relative address for the low order section 114 of the ROM address register 81. This next relative address, is imposed upon the previous address, which is incremented, so that in effect only the low order four bits of that instruction are shifted in response to the next relative address which is supplied in a JIP instruction where the branch conditions therefor have been satisfied. Similarly, the remaining four inputs to the low order multiplexer means 119 are connected through the multiconductor cable 88 to the appropriately ordered bits of the last address inserted within the return address register means 82 and hence, the inputs to the low order multiplexer means 119 annotated $AB_0 - AB_3$ will receive the low order bits of a designated address for return purposes. The $S_1$ select input to the low order multiplexer means 119 is connected through conductor 139 to the output of the OR gate 136, and hence is gated in the same manner as the select inputs $S_1$ to the remaining multiplexer means 116 - 118 described above. This means, that normally a high level will be applied to the $S_1$ input of the multiplexer means 119 except under such conditions when an AB Enable level is applied to conductor 138 upon a decoding of a jump to a return address and the initial clear level is inactive. Thus, it will be appreciated by those of ordinary skill in the art that the $S_1$ select input to the low order multiplexer means 119 acts to gate the low order bits of a return address to the outputs thereof connected to conductors 202 - 205 only under such conditions as when a jump to a return address instruction has been decoded and no initial clear or resetting operation is in progress.

The $S_0$ select input controls the application of low order ROM bits $B_0 - B_3$ to the outputs of the low order multiplexer 119 applied to conductors 202 - 205. The $S_0$ input to the low order multiplexer means 119 is connected through conductor 206 to the output of an OR gate 207 whose inputs are inverted. The OR gate 207 may be of the same type described above and hence acts in the well known manner to produce a high level output on conductor 206 whenever either of the inputs thereto are low while producing a low level output on conductor 206 only when both of the inputs thereto are high. A first input to the OR gate 207 is connected through conductor 208 to a terminal annotated $\overline{ICA}$ which, as aforesaid, corresponds to the complement of the initial clear active signal and hence a high normally resides on conductor 208 except under such conditions as when an initial clear or resetting operation is initiated and the time interval associated therewith has not yet expired. Therefore, as the input supplied to the OR gate 207 on conductor 208 is normally high during processing operations, the higher or low state of the output of the OR gate 207 will turn on the condition of the second input thereto supplied on conductor 209.

The input to OR gate 207 supplied on conductor 209 is connected to the output of a NAND gate 210. The NAND gate 210 may take any conventional form of this well known class of logic device and hence acts in the well known manner to produce a low on conductor 209 only when both of the inputs thereto are high while producing a high level on output conductor 209 whenever any of the inputs thereto are low. Whenever a low level is outputted by the NAND gate 210, the $S_0$ select input to the low order multiplexer means 119 will be in the high condition for the normal conditions described above while when the output of NAND gate 210 goes high, the $S_0$ input to multiplexer means 119 will go low to cause the gating of the low order bits $B_0 - B_3$ onto the output conductors 202 - 205. A first input to the NAND gate 210 is connected through conductor 211 to a terminal annotated $\overline{JEP}$ which, as aforesaid, is a decode of the complement of the jump external page instruction which is applied to the conductor 134 of the OR gate 133. Thus, other than when a jump external page instruction has been decoded, a high level will reside on conductor 211 which serves as a first input to NAND gate 210.

The second input to NAND gate 210 is connected through conductor 212 to a terminal annotated $\overline{JIP}$ which, as aforesaid, is a decode of the complement of the jump intrapage instruction applied to conductor 193 of AND gate 189. Thus, conductor 212 will also normally reside at a high level except under such conditions when a jump internal page instruction has been satisfied as through an arithmetic logic function performed by the ALU 84 or a satisfied branch on the status bus 21. Since both of the inputs to NAND gate 210 will be high except under such conditions as when a jump external page or jump intrapage instruction has been satisfactorily decoded, it will be appreciated that the output of NAND gate 210 is normally low whereupon the output of OR gate 207 will normally be high to impose a normally high input level on the select input $S_0$ connected to conductor 206. This means that the input levels normally imposed on the select inputs $S_1$ and $S_0$ will both normally be high as was the case for the multiplexer means 116 - 118 whereupon Zero (0) levels will normally be clamped to output conductors 202 - 205 to cause normal incrementing of the previous address to take place at the adder means 170 and 192 in a manner to be further described below.

Similarly, the $S_1$ select input will only go low upon a decoding of a jump to return address instruction wherein the AB Enable level goes high and hence inputs $AB_0 - AB_3$ will be applied to the output conductors 202 - 205 when a jump to return instruction has been decoded in a similar manner to the operation of multiplexer means 116 - 118 whereupon a new address from the return address register means 82 is substituted whenever the AB Enable level on conductor 138 goes high. In the case of the low order multiplexer means 119, the $S_0$ select level is normally high, however, may go low when either a jump external page or jump intrapage instruction has been satisfactorily decoded. This means that the low order ROM bits $B_0 - B_3$ will be applied to conductors 202 - 205 under conditions which are the same for the multiplexer means 116 - 118 whereupon an entirely new address from the common instruction word bus 20 is employed and also under such conditions where a JIP instruction is satisfactorily decoded whereupon the previous address associated with address bits $A_4 - A_{12}$ is returned through the operation of multiplexer means 116 - 118 but a next relative address is imposed within the low order section 114 of the ROM address register means 81 due to the imposition of ROM bits $B_0 - B_3$ on conductors 202 - 205. The output conductors 202 - 205 are connected to the four inputs of the adder means 192 annotated $M_0 - M_3$ wherein the M annotation indicates an input from the multiplexer and the subscript notation associated therewith is indicative of the order of the bit applied thereto.

The adder means 192 may take the same form as the adder means 170 described above and hence preferably takes the conventional configuration of a four (4) bit binary full adder. Thus, the adder means 192 acts in the well known manner to sum on a per bit basis each of the four bit inputs applied thereto at the terminal annotated $M_0 - M_3$ and $A_0 - A_3$ and additionally acts to increment the resulting sum by one (1) if the carry input thereto is enabled. Additionally, the adder means 192 has been indicated as provided with a carry output which acts in the well known manner to go high whenever the four (4) bit number 1111 is incremented so that the same may act in conjoint with adder 170 when AND gate 189 is enabled to form an eight (8) bit binary adder. The second set of four inputs to the adder means 192 is supplied through conductors 213 - 216, gate array means 218, and conductors 219 - 222 to the outputs of the address register means 127 so as to receive therefrom the four low order bits $A_0 - A_3$ of the current address. The gate array means 218 may take precisely the same form as the gate array means 179 and is commonly enabled through conductor 161 from the output of the AND gate 163. Thus, in the same manner described for the gate array means 179, when a high level resides at the output of AND gate 163 to disable AND gate 156, and hence, the enabling of the next address register means 120 and 121, the gate array means 218 will apply the low order bits from the current address as received from conductors 219 - 222 to the inputs of the adder means annotated $A_0 - A_3$ through conductors 213 - 216. However, when the output of AND gate 163 goes low, to enable the next address register means 120 and 121 to receive a new address in the form of the high order address bits $A_8 - A_{12}$ for a jump external page instruction or a jump to a return address instruction, the gate array means 128 will be disabled to apply Zeros (0's) to the inputs of the adder means 192 annotated $A_0 - A_3$.

The carry input to the adder means 192 is connected through conductor 223 to the output of OR gate 224. The OR gate 224 may take any of the well known forms of this conventional class of device and acts to provide a high level at the output thereof connected to conductor 223 whenever either of the inputs thereto are high. A first input to AND gate 224 is connected through conductor 161 to the output of AND gate 163. Thus it will be appreciated by those of ordinary skill in the art that the carry input to adder means 192 is enabled whenever the gate array means 179 and 218 are enabled and the next address register means 120 and 122 have their clock input disabled. Conversely, whenever the clock input to the next address register means 120 and 121 is enabled, the gate array means 179 and 218 are disabled and the carry input to adder means 192 may be disabled if the other input to OR gate 224 has not gone high. The output of the AND gate 163, it will be recalled, will be high except under conditions when an initial clear level is active, a jump external page instruction has been decoded or a jump to a return operation has resulted in an AB Enable level. The second input to OR gate 224 is connected through a conductor 225 to a terminal annotated RETURN. This terminal is essentially a decode of the AB enable level ANDed with the complemented condition of ROM bit $B_{10}$, i.e. $\overline{B_{10}}$. This is a decode, as will be appreciated by those of ordinary skill in the art of a jump to a return condition and is here employed to enable the carry input to the adder means 192 so that when the returned to address is loaded through the insertion of bits $AB_0 - AB_{12}$, the actual address inserted into the next address register means 120 - 123 will be incremented so that a return to the next address in sequence after the stored address is directly implemented. Thus although the carry input is disabled through the output of AND gate 163 whenever a jump to a return address is decoded, the same instruction will effectively cause an enabling level to be applied to the carry input of adder means 192 through the action of input 225 to the OR gate 224.

As will be appreciated, the mode of connection of the adder means 170 and 192 are highly similar except with respect to the interconnection of the carry inputs thereof and more particularly, the inhibited nature of the carry input to adder means 170 when a JIP instruction is decoded while the carry input to adder means 192 is effectively enabled for the same type of instruction. Thus, although the operations of the adder means 170 and 192 will be the same for all instruction modes other than a decoding of a JIP instruction, when such a JIP instruction is decoded, four low order ROM bits $B_0 - B_3$ will be summed in the adder with the low order address bits $A_0 - A_3$ of a current address and the resulting sum will be incremented within the low order adder 192 but no carry output is available to the adder means 170. For this reason, when a JIP instruction is decoded, the next relative address inserted will be added to the current address which is incremented only with respect to the low order bits so that a relative branching operation is initiated for this mode of operation. More particularly, during normal sequencing operations, all 0 outputs will be provided by the low order multiplexer means 119 on conductors 202 - 205 so that the current address, as applied to the adder means 192 through conductors 213 - 126 is incremented by the adder means 192 and applied to output conductors 226 - 229 for loading into the next address register means 123 during clock time $CL_6$ which represents the latter portion of the instruction cycle. Of course, should the current address as applied to inputs $A_0 - A_4$ be a 1111 address, the carry out output of the adder means 192 will be enabled in addition to the incrementing of the four low order bits so that in affect, during normal sequencing operations wherein a current address is merely incremented by one such normal sequencing operations may continue through the complete set of 256 sixteen bit instruction words stored within a section. However, as no adder is employed in conjunction with the high order address bits $A_8 - A_{12}$, it will be seen that normal sequencing operations wherein each address is incremented by one is limited in sequence to a section. Should this result be undesireable for a given application, additional adder means may be readily inserted within the high order section of the ROM address register 110 so that such normal incrementing action may be extended as desired, to include a minor page, a major page, or the complete extend of the read only memory 80.

When a jump external page (JEP) or jump to a return address (AB Enable) instruction is decoded, the appropriate low order ROM bits $B_0 - B_3$ or low order return address bits $AB_0 - AB_3$ will be conveyed to the outputs of the low order multiplexer means 119 and applied through conductors 202 - 205 to inputs $M_3 - M_0$ of the adder means 192. Furthermore, under either of these conditions, the gate array means 218 will be disabled due to the low level presence at the output of AND gate 163 so that effectively all Zeros (0's) will be applied through conductors 213 - 216 to the inputs $A_0 - A_3$ of the adder means 192. For a jump external instruction, ROM bits $B_0 - B_3$ will be added to the all Zero (0) bits at the various inputs to the adder means 192 and applied to output conductors 229 - 226 for loading into the next address register 123 during the latter part of the instruction cycle. If a return operation was signaled, AB bits $AB_0 - AB_3$ will be applied to inputs $M_0 - M_3$ of the adder means, and added to the all Zero (0) inputs at inputs $A_0 - A_3$ of the adder means 192. Here, however, the carry input to the adder means 192 will be high due to the high level on input 225 to OR gate 224 and thus the return address loaded will be incremented by one and the incremented version of the return address will be applied to conductors 226 - 229 for loading into the next address register means 123 during the latter part of the instruction cycle.

For an intrapage jump instruction, i.e. JIP, low order ROM bits will be gated through the low order multiplexer means 119 due to the action of NAND gate 210 and applied through the conductors 202 - 205 to the inputs $M_0 - M_3$ of the adder means 192. In addition, the output of AND gate 163 will be high so that the four low order bits of the current address will be applied through conductors 219 - 222 and the gate array means 218 to the inputs $A_0 - A_3$ of the adder means 192. Thus, under these circumstances, the adder means 192 will sum the four low order bits of the current address on inputs $A_0 - A_3$ with the next relative address ROM bits supplied to inputs $M_0 - M_3$ thereof on a per bit basis. The carry in input to adder means 192 will also be high so that the resulting sum of the current address plus the next relative address will be incremented by one and applied to conductors 226 - 229 for loading into the next address register 123. It should here be noted that only a four bit adding configuration is effectively employed because when a JIP instruction is decoded AND gate 189 is disabled so that any carry output produced by the adder means 192 will not be applied to adder means 170. This means that branching backwards may be implemented by causing the adder means to recycle through the utilization of incrementing past the count 15 state thereof. Thus, whichever output is developed at the output of the adder means 192 in response to the four available forms of addressing employed, the four low order bits of this address are applied to conductors 226 - 229 for loading into the next address register means 123.

The next address register means 123 may take the form of a conventional four bit bistable latch of the type described in conjunction with next address register means 121 and 122. In this case, the inputs to the four bistable stages thereof are connected, as aforesaid, to the outputs of the adder means 192 through conductors 226 - 229 while the clock input thereto is connected through conductor 159 to the output of AND gate 158 in the same manner as the clock input to the next address register means 122 so that it is effectively clocked toward the latter portion of each instruction cycle regardless of the nature of the instruction being decoded. The outputs of the next address register means 123 are connected through the conductors 231 - 234 to the inputs of the address register means 127. The address register means 127 may take the same form as the address register means 125 and 126 mentioned above and hence acts to load a four bit input thus loaded to the outputs thereof on conductors 235 - 238 to thereby represent the lower four order address bits $A_0 - A_3$. The clock input to the address register means 127 is connected through conductor 168 to the terminal annotated $C_B$ and hence, in the same manner as the address register means 124 - 126 is clocked at the beginning of each instruction cycle when this input goes high. It will thus be noted that the current address is clocked into address registers 124 - 127 from the next address registers 120 - 123 at the beginning of each instruction cycle while new information inserted into the next address register means 120 - 123 is loaded therein during the latter portion of the same instruction cycle, if loading does occur, so that it is ready to be loaded into the address register means 124 - 127 at the beginning of the next instruction cycle. The four low order address bits $A_0 - A_4$ are applied on conductors 235 - 238 through conductors 219 - 222, which form a portion of the multiconductor cable 90 to the input of the gate array means 218 while the same is also applied through multiconductor cables 86 and 91 to the read only memory 80 where the same serves as the low order portion of the current address and to the return address register means 82 where the same may be stored upon appropriate commands.

In operation, the ROM address register means 81 is initialized during a power up or resetting operation to provide an initial address wherein all 13 address bits are in a 0 state to the read only memory 80. Thereafter, sixteen (16) bit instruction words read from the read only memory 80 and applied thereto through the 16 bit instruction word bus 20 and the instruction word cable 87 are decoded and the remainder of the addressing operations performed by the ROM address register 81 occur as a function of either specific instructions decoded from the ROM bits applied or as a result of the normal sequencing operations of the ROM address register means 81 wherein the current address is incremented by one to provide the next address. Thus, in the absence of a decode of a specific sixteen bit instruction word representing a JEP command, a jump to a return address command, or a JIP command wherein an intrasection jump is performed in response to a satisfactory branch on the status bus or as a result of a branch initiated as a result of an arithmetic function performed in the arithmetic logic unit 84; the ROM address register means 81 merely proceeds to increment each previous address which has been provided thereby by one to obtain the next address. This all occurs in a timed sequence established by the clock phases described above. For the purposes of simplifying the instant disclosure, the various specific decodes performed at the ROM address register means 81 have not been shown in detail in FIG. 3; however, the nature of such decodes is set out in tabular form as part of FIG. 3 for the reader's convenience and the manner in which such decodes may be performed in response to conditions on the common status bus was described above. Therefore, the mode of operation of the ROM address register 81 will be described in regard to the various addressing functions which may be performed thereby without regard to a specific program, it being appreciated by those of ordinary skill in the art that the specific programs employed are readily viewable in their detailed format in Appendices A and B as attached hereto while the overall instruction format is set forth in the list of operands attached hereto as Appendix C.

When the automatic writing system according to the instant invention is initialized or reset, the initial clear level goes active for a predetermined interval of time. This low level on conductors 137 and 135 will cause the outputs of OR gates 133 and 136 to be forced high whereupon both of the select inputs $S_1$ and $S_0$ to each of the multiplexer means 116 - 119 will provide 0's on all of the outputs thereof connected to conductors 141 - 145, 171 - 174 and 202 - 205. Additionally, when the initial clear goes active, the level $\overline{ICA}$ as input to AND gate 163 will go low causing this AND gate to provide a low level on conductor 161 which acts the disable gate arrays 179 and 218 while enabling AND gate 156 to convey clock pulses to the next address registers means 120 and 121. Similarly, no high level has been provided to OR gate 224. Under these conditions, all of the inputs to adder means 170 and 192 will reside at a zero (0) level and the carry input to adder means 192 will not be enabled and hence, the output of the adder means 170 and 192 on conductors 184 - 187 and 229 - 226 will be zero. Therefore, as the AND gate 156 is enabled and all of the next address register means 120 - 123 have 0's supplied to their inputs when the output of AND gate 158 goes high in response to the sixth clock subphase when $\overline{CA}$ and $\overline{CD}$ are high, all zeros (0's) will be gated into the next address register means 120 - 123. This all 0 address is subsequently clocked into the address registers 124 - 127 at the beginning of the next machine cycle when clock phase CB goes high and hence an initial all Zero (0) address is provided as outputs $A_0$ - $A_{12}$ on the multiconductor cable 86 as the initial address for the read only memory 80. Thus, when $\overline{ICA}$ goes low, during a power up or resetting operation, it causes the address register means 81 to automatically be reset to an initial address comprising all 0 bits.

Upon a timing out of the initial clear interval, the level $\overline{ICA}$ goes high and normal address operation begins within the read only memory 81. When the level $\overline{ICA}$ goes high, it should be noted that all three of the OR gates 133, 136 and 207, will be placed in a condition so that, in effect, their output is the complement of the other inputs applied thereto. This means that both of the select inputs $S_0$ and $S_1$ to each of the multiplexer means 116 - 119 will be in a high condition to cause the respective multiplexer to place all 0 bits on the outputs thereof unless a specific command is decoded which satisfies the alternate input condition for the OR gate associated with that select input. More particularly, select input $S_1$ to all of the multiplexer means 116 - 119 will be maintained in a high state unless an AB Enable level upon conductor 138 is decoded which reflect the issuance of a jump to a return address and causes AB bits to be gated through each multiplexer.

Similarly, the $S_0$ select input to each of the multiplexer means 116 - 118 will be maintained in a high state unless a jump external page command is decoded and reflected on conductor 134 which will cause the multiplexer means 116 - 118 to provide all B bits from the instruction word on the respective outputs thereof. Finally, the $S_0$ input to multiplexer mans 119 will be retained in a high state unless either a jump external page or jump intra page instruction is decoded whereupon B bits will be gated onto the low order multiplexer lines 202 - 205. Additionally, when the initial $\overline{\text{clear active}}$ level goes high, the output state of AND gate 163 will go high to enable gate array means 179 and 218 and provide a high level output on the carry input to the adder means 192. Thus, when the output of AND gate 163 goes high, the AND gate 156 is effectively disabled so that the five high order address bits initially loaded into the next address register means 120 and 121 are effectively retained in these latches until one of the complemented input conditions for AND gate 163 is decoded to cause the insertion of new order address bits therein for a next address. Accordingly, once the initial clear active condition resets the address register means 124 - 127 to an all Zero (0) condition and the interval associated with an initial clear operation times out, all zero outputs are provided at the outputs of the multiplexer means 116 - 119. The gate array means 179 and 218 are enabled to provide current address information to inputs $A_0$ - $A_7$ of the adder means 170 and 192 and a high level is applied to the carry input of adder means 192. This establishes the normal sequencing mode of operation for the ROM address register means 81 wherein each current address is incremented by one to automatically establish the next address in sequence and this operation will continue up to an address of 255 within a given section, which in this case, is the initial section defined by an address having all five high order bits $A_8$ - $A_{12}$ in a Zero (0) condition. Thus, once the ROM address register means 81 has been reset to all Zero (0) address and the initial clear condition has timed out, the initial address will be fed back through conductors 180 - 133 and 219 - 222 through the gate array means 179 and 218 to inputs $A_0$ - $A_7$ of the adder means 170 and 192.

As the other inputs $M_0$ - $M_7$ to the adder means 170 and 192 are Zeros (0's) under these conditions, but the carry input to the adder means 192 is enabled, the various inputs to each of the adder means 170 and 192 will be summed and the resulting address will be incremented by one. Therefore, the adder means 192 and 170 will provide a One (1) level on conductor 226 while a Zero (0) level is provided on the remaining output conductors 227 - 229 and 184 - 187. This address is latched into the next address registers 122 and 123 when the output of AND gate 158 goes high during clock phase $CL_6$; however, no clock signal is applied to the next address registers 120 and 121 because the AND gate 156 is not enabled and hence the previously stored Zero (0) bits are retained therein. At the beginning of the next cycle of operation, when clock subphase $C_B$ goes high, the Zero (0) bits latched into the next address registers 120 - 123 are inserted into the address registers 124 - 127 through lines 148 - 152, 194 - 197, and 332 - 234 while the One (1) level latched into the lowest order bit position of the next address register means 123 is applied through conductor 231 to the address register means 127. The next address, as formed in the sequential manner noted above, is latched into address registers 124 - 127 at the beginning of the next machine cycle when clock subphase $C_B$ goes high and is applied through conductors 164 - 168, 198 - 201 and 235 - 238 as the current address to the read only memory 80 during the next machine cycle.

Referring to FIG. 2, it will be seen that each address outputted from the ROM address register means 81 is applied through multiconductor cables 86 and 91 to the read only memory 80 as well as to the return address register 82 so that the same may be selectively gated therein, as well as being returned through the multiconductor cable 90, as shown as individual conductors 180 - 183 and 219 - 222 in FIG. 3, to adder means 170 and 192 for use in the formation of the next incremented address provided the gate array means 179 and 218 are in their normally enabled condition. This action will continue unless a reset, JEP, AB Enable or JIP instruction is decoded until a count of 255 is reached at the output of the adder means 170 and 192 whereupon the adder means will reset themselves to an all 0 output condition through normal incrementing procedures. Such resetting occurs, as will be appreciated by those of ordinary skill in the art because for the normal sequencing operation being described above, the AND gate 189 is enabled so that the carry output of adder means 192 will supply, when appropriate, a carry input to the adder means 170 to cause the resultant combination to act as an eight bit full adder. Furthermore, it will be appreciated that the normal sequencing operation associated with the operation of the adder means 170 and 192 is limited to a state of 255 corresponding to the full 256 instruction word makeup of a section as the portion of the address associated with the high order bits $A_8$ - $A_{12}$ is not formed by adder means. Thus, for normal sequencing operations, wherein each current address is incremented by one to form the next address through the addition of a low order carry in at adder means 192, the addressing mode employed by the ROM address register means 81 effectively acts to apply the current address as obtained from output conductors 235 - 238 and 201 -198 to the adder means 192 and 170 where the same is incremented and loaded into the next address register means 122 and 123 for use at the beginning of the next machine cycle as the current address and this sequence automatically continues to a state of 255 unless the same is interrupted by a detection of an initial clear active level, a jump external page level, an AB enable level associated with a jump to a return operation or a jump intrapage level.

Although the sequential addressing which normally takes place within the ROM address register means 81 is appropriate for initializing the automatic writing system according to the instant invention and causing the appropriate implementation of various function under program control, once a given program routine or subroutine has been appropriately addressed, the microprocessor indicated by the dashed block 16 must deal with a great number of variables and call for the appropriate program routines to cause correct processing under program control for the input conditions established by an operator and the data and control functions input in association therewith. The jump external page, jump to a return address or jump intrapage instructions, which may take the form of a branch on the common status bus 21 or a branch in response to an arithmetic result such as a comparison operation lends to the requisite versatility to enable the ROM address register means 81 to deal with such a multitude of variables and to provide appropriate accessing of program routines in response thereto. For instance, it was seen that the ROM address register means 81 is reset to an all Zero (0) address in response to an initial clear active level which might represent a power up operation or a resetting operation. Thereafter, the ROM address register means 81 will enter into its automatic sequencing mode of addressing wherein each previous address is merely incremented by one for each machine cycle until and instruction issues which is decodable as a jump external page instruction, a jump to a return address instruction, or a jump intrapage instruction which results in a branch operation in addressing if a condition specified in the the instruction is satisfied.

Detailed exemplary programs which demonstrate actual program sequencing employed within the instant invention are set forth in a highly annotated listing, which are attached hereto as Appendices A and B, to fully apprise those of ordinary skill in the art as to the precise nature of the programming employed within the instant invention. Here, however, in order to provide a reader with a threshold appreciation as to the manner in which jump external page, jump intrapage and jump to return address operations are employed by the microrocessor in order to achieve appropriate processing for the multitude of variables which may occur, a highly simplified example of addressing operations which may take place will be set forth. For the purposes of such simple example, let it be assumed that once the ROM address register means 81 is reset to its all Zero (0) state, sequential addressing is automatically implmented thereby for such purposes as initializing the automatic writing system according to the instant invention. Such initialization would include a resetting of all registers within the system, a clearing of the counters and the performance of general housekeeping functions which are necessary and appropriate to ensure that the automatic writing system according to the instant invention will be established in a given threshold condition each time power is applied thereto or the system is reset. Additionally, the printer unit 2 could be placed in a restored condition, i.e., made ready for printing wherein all registers are reset and the record media transports tested to see if the same are active and if active, the record media could be appropriately loaded through operations of taking up tape slack or positioning a card to an initial position through either the automatic sequencing operations described above or various jump and/or jump and return operations until the system as a whole, is in a condition of readiness to begin processing.

Thereafter, as the last instruction within the initialization sequence or the last sequential instruction of an address which resulted from a jump or jump and return instruction the address would be jumped to a monitor routine wherein a plurality on the status bus instructions are addressed in a sequential manner until one of the branch conditions are satisfied. In this monitoring routine, the automatic writing system according to the instant invention is essentially sitting in an idle loop awaiting the occurrence of an event which is appropriate for the initialization of a specific processing operation. Typcially, an event which might trigger one of the branch conditions would be an entry from the keyboard which is signaled on the common status bus 21. When the condition of the common status bus 21 indicated that the particular status condition sought to be monitored has satisfied the branch condition, a JIP operation occurs wherein the next relative address associated with the satisfied branch instruction is inserted as the low order bits for the next address. For instance, if the branch resulted from a monitor the keyboard instruction, the satisfied branch command might cause the next address from the ROM address register to be shifted to a next relative address which would cause a jump and return instruction to be read from the read only memory 80 which is associated with the analysis of the keyboard. In response to this command, sequential operations would resume through a new routine to cause the keyboard entry to be accepted into the system and analyzed. Should the analysis indicate that the entry is merely specifying a mode of operation or the like, a branch operation might be initiated to cause the mode of operation specified to be stored in register means and then the last address of the satisfied branch causing the storage of the mode of operation would cause a return to the monitor routine for further monitoring of the various inputs to the system. However, should a printable character be detected during the analizing routine, a branch instruction might have been initiated to cause the character to be printed and otherwise processed. In a similar manner, jumps to external pages, jumps intrapage, and jumps to return address commands are employed to permit the ROM address register means 81 to access appropriate program routines in response to the varying nature of the inputs thereto and it will be appreciated by those of ordinary skill in the art that although the foregoing example was highly simplified and hence did not illustrate the various sequential jumps which may occur in response to more complex processing operations, the same will suffice to illustrate the manner in which conditions on the common status bus and the results of operations performed by the arithmetic logic unit 84 modify the operation of the ROM address register 81 to accommodate different variables introduced into the system.

Prior to describing the manner in which JEP and JIP instructions are implemented within the ROM address register means 81 to cause addressing to jump to either an entirely new address or a relative address, a brief description of the program instruction format is appropriate to familiarize a reader with the manner in which the various sixteen (16) bit instruction words read from the read only memory 80 are organized; however, since the program instruction format has not been greatly modified from that employed in the automatic writing system described in U.S. Ser. No. 429,130 reference may be had to that application for a detailed description thereof. As was described above, each instruction loaded into the read only memory 80 comprises sixteen (16) bits which are designated as bits $B_0 - B_{15}$ wherein each four bit group, i.e. bits $B_0 - B_3$, $B_4 - B_7$, $B_8 - B_{11}$ and $B_{12} - B_{15}$ may be represented by an hexadecimal character according to the conventional coding scheme set forth below:

| Binary | Decimal | Hexidecimal |
|---|---|---|
| 0000 | 0 | 0 |
| 0001 | 1 | 1 |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 | 10 | A |
| 1011 | 11 | B |
| 1100 | 12 | C |
| 1101 | 13 | D |
| 1110 | 14 | E |
| 1111 | 15 | F |

Thus, each sixteen (16) bit instruction may alternatively be represented by a four (4) digit hexadecimal number whose right most digit represents ROM bits $B_0 - B_3$ of a sixteen (16) bit instruction code while the left most digit thereof represents ROM bits $B_{12} - B_{15}$. Thus, a sixteen (16) bit ROM instruction having all of the bits therein set to Zero (0) could alternatively be represented by the hexadecimal code 000 while a sixteen (16) bit instruction having all of the bits therein in a One (1) conditions could be alternatively represented by the hexadecimal code FFFF.

The sixteen (16) bit instruction words read from the read only memory may generally be viewed as configured into one or four discrete types of commands which will be referred to as OPERATE COMMANDS, BRANCH ON STATUS COMMANDS, ALU BRANCHES, and JUMPS of various types. The operate commands are by far the most numerous employed within the program and act to control the functions of the system. In operate commands, ROM bits $B_{12} - B_{15}$ form a module address which generally acts to define the peripheral whose operations are being controlled by that command. Thus, when ROM bits $B_{12} - B_{15}$ are each equal to Zero (0), i.e. hex 0, the keyboard is being defined by the module address defines the printer, a hex 2 module address defines the record media transports and a hex 3 module address defines the RAM peripheral 34; it being noted that both the printer data ROM 43 and the program time delay peripheral 16A are addressable under the module address employed for the keyboard wherein bits $B_{12} - B_{15}$ are all set to a Zero (0) state. In addition, in Operate commands, ROM bit $B_{11}$ is always in a Zero (0) state and this condition of ROM bit $B_{11}$ serves to distingush Operate commands from commands which are defined as branch on status commands in a manner which shall be rendered more apparent below.

Within Operate commands, ROM bits $B_9$ and $B_8$ serve to define a minor module wherever the same is present. For instance, in Operate commands having a module address of 2, to thus define the record media, a 01 state for ROM bits $B_9$ and $B_8$ will define the read only media, a 10 condition for ROM bits $B_9$ and $B_8$ will define the read/write media, while an eleven (11) condition for ROM bits $B_9$ and $B_8$ will define the actiive media. However, when a hex 3 module address is present to define the RAM storage device, ROM bits $B_6$ and $B_7$ act to define the quadrant being addressed rather than ROM bits $B_8$ and $B_9$. The remaining bits present in an Operate command, i.e., ROM bits $B_0 - B_7$ and $B_{10}$ act to define the function or action commanded within a given instruction and hence, will vary in accordance with the nature of the instruction issued. Thus, for Operate commands, ROM bits $B_{15} - B_{12}$ define the module being addressed, ROM bit $B_{11}$ resides in a Zero (0) state to indicate that branch command is not present, ROM bits $B_9$ and $B_8$ may define a minor module while ROM bits $B_{10}$ and $B_7 - B_0$ are reserved to implement the function which is being commanded.

Branch On Status commands are similarly configured to Operate commands in that ROM bits $B_{15} - B_{12}$ define the modular address while ROM bits $B_8$ and $B_9$ define any minor module which may be present in the same manner as was employed for Operate comands. With Branch On Status commands however, the nature of the branch command is indicated by ROM bit $B_{11}$ being in a one condition while ROM bit $B_{10}$ is a status qualifier bit defining the status condition upon which the branch is to be implemented. More particularly, it will be recalled that whenever a branch on the status bus commaned is issued, the condition of the common status bus 21 is compared with the condition of ROM bit $B_{10}$ and if a appropriate comparison results, a branch to a next relative address is initiated. Thus, in a Branch On Status command, ROM bit $B_{11}$ is in a One (1) condition and the One (1) or Zero (0) condition of ROM bit $B_{10}$ is definitive of the desired condition of the common status bus 21 for which the branch operation will be implemented. In addition, in Branch On Status commands, ROM bits $B_7 - B_4$ are definitive of the status condition to be gated onto the common status bus 21 while ROM bits $B_3 - B_0$ are representative of the next relative address to be inserted into the ROM address register means 81 should the branch condition defined by $B_{10}$ be true. The manner in which ROM bits $B_0 - B_3$ are applied to the ROM address register means 81 is directly shown in FIG. 3 as the B inputs to the low order multiplexer means 119 while the use of ROM bits $B_7 - B_4$ in controlling the select inputs to various status multiplexers present at the interfaces of the various peripherals employed within the instant invention will be further developed below.

ALU Branch operations may take the form of branch operations between what is presently in the M register and data in a given location within the G or H registers present within the general purpose registers illustrated as 83 in FIG. 2. In addition, an ALU Branch operation may be initiated in response to the condition of the common data bus 19. These branch operations, as will be apparent from the Operand List attached hereto as Appendix C, each bear a module address wherein ROM bits $B_{12} - B_{15}$ are equal to hex 9 or D while general operate instructions devoted to the control of the arithmetic logic unit 84 bear module addresses equal to B or F in hex code. In these these branch instructions, ROM bit $B_{11}$ may be equal to a One (1) or a Zero (0) wherein the Zero (0) condition operates for operands BALG and BALH while the one condition is operative for branches on the data bus having an operand equal to DBAT. The module address will vary between 9 or D depending upon the condition of ROM $B_{14}$ which defines whether or not the comparison is to be made with the contents of a register within the G or H register, ROM bit $B_{14}$ being in a Zero (0) condition to define the G register and in a One (1) condition to define the H register. Furthermore, under these conditions, ROM bits $B_7$ - $B_4$ define the precise one of sixteen (16) register locations which may be selected within a given one of the G or H registers while ROM bits $B_0$ - $B_3$ again define the next relative address to which branching is to occur should the branch condition test true. For branch operations of this type wherein ROM bit $B_{11}$ is in a One (1) condition, i.e a branch on the condition of the data bus (BDAT), ROM bits $B_4$ - $B_{10}$ specify the least significant bit of the data which is being sought while ROM bits $B_0$ - $B_3$ again define the next relative address.

The last significant instruction format configurations are those devoted to jump operations of various types. Jump operations wherein an entirely new thirteen (13) bit address is specified within the instruction per se fall within one of two types. Instructions of the first type are unconditional jumps wherein no return address is stored. As will be appreciated by those of ordinary skill in the art from the discussion of the B inputs to the ROM address register means 81, ROM bits $B_{13}$ and $B_{11}$ - $B_0$ are employed to specify the new address. Therefore, within ROM bits $B_{15}$ - $B_{12}$ which form the modular address, the condition of ROM bit $B_{13}$ will vary depending upon whether or not the new address defines the low order 4K bits of memory in which case bit $B_{13}$ will be in a Zero (0) condition or the high order 4K bits of memory in which case bit $B_{13}$ will be in a One (1) condition. Thus, in effect the nature of a jump instruction will be defined by the condition of ROM bits $B_{15}$, $B_{14}$ and $B_{12}$, the only ROM bits not forming a part of the new address. For unconditional jumps, i.e. those where no return address is stored, ROM bit $B_{15}$ is in a One (1) condition while ROM bits $B_{14}$ and $B_{12}$ are in a Zero (0) condition. Therefore, the modular address of unconditional jumps will be equal to hex 8 or hex A depending upon whether or not the low or high order 4K are specified by the new address contained within ROM bits $B_{13}$ and $B_{11}$ - $B_0$. For conditional jumps wherein a return address is stored prior to jumping, so that such address may be returned to upon the issuance of a jump to return instruction, the condition of ROM bits $B_{15}$ and $B_{14}$ is a One (1) while the conditon of ROM bit $B_{12}$ is a Zero (0). Therefore, the modular address of these conditional jumps will vary between a hex C or E condition depending upon whether or not the new address specified therein defines the high or low order K bits of the memory. Additionally, jumps to a return address are specially specified by the instruction 000F while jumps to an external address may also be accommodated.

Returning now to the description of the ROM address register means 81 illustrated in FIG. 3, it will be appreciated that whenever a jump instruction is issued, i.e. that having a module address equal 8, A, C or E, such instruction will be docoded and cause the terminals annotated JEP to go high while the terminals annotated $\overline{JEP}$ go low. When the terminal $\overline{JEP}$, connected as an input to AND gate 163 goes low, it will cause the output of AND gate 163 to go low disabling the gate array means 179 and 218 as well as disabling the carry input to the adder means 192. Additionally, the output of AND gate 163 going low will cause AND gate 156 to be enabled and hence permit new inputs to be latched into the next address register means 120 and 121 when the next clock interval occurs on conductor 157 as a result of the inputs to AND gate 158.

Under these conditions, the next address register means 120 and 121 will be enabled to receive a new set of high order address bits from the outputs of the high order multiplexer means 116 and 117 while the current address inputs $A_0$ - $A_7$ to the adder means 170 and 192 have Zero (0) input levels imposed thereon. The high level input now on terminal 134, upon a decoding of a jump external page instruction, will cause the output of OR gate 133 to go low whereupon the SO input to multiplexer means 116 - 118 as connected to conductors 130, 146 and 140 will go low causing the multiplexer means 116 - 118 to select ROM bit outputs $B_4$ - $B_{11}$ and $B_{13}$ on output conductors 171 - 174, 142 - 145 and 141. This means, that the next address register means 120 and 121 will load ROM bits $B_8$ - $B_{11}$ and $B_{13}$ as address bits $A_8$ - $A_{12}$ during the next clock interval while adder means 170 adds ROM bits $B_4$ - $B_7$ to Zero's (0's) and hence these ROM bit conditions are applied in species through conductors 184 - 187 to the next address register means 122 for loading therein when the next clock pulse occurs on conductor 159.

In a similar manner, when the $\overline{JEP}$ terminal connected to conductor 211 goes low, the output of NAND gate 210 will go high to cause the output of OR gate 207 to go low and clamp the SO input to the low order multiplexer means 119 to a low level and thereby select the $B_0$ - $B_3$ inputs for application to the output conductors 202 - 205. Under these conditions, the input $M_0$ - $M_3$ of the adder means 192 will be added to the Zero (0) level applied to the inputs $A_0$ - $A_3$ and since the carry input connected to conductors 223 is also disabled, under these conditions, the $B_0$ - $B_3$ inputs from the jump instruction read are applied directly to conductors 226 - 229 for loading into the next address register means 123 upon the next clock pulse applied to conductor 159. Thus it will be seen by those of ordinary skill in the art that at clock time $CL_6$ when clock input $\overline{CA}$ and $\overline{CD}$ are both high, ROM bits $B_0$ - $B_{11}$ and $B_{13}$ will be loaded into the next address register means 120 - 122 to form the next address which is applied to address registers 124 - 127 at the beginning of the next address cycle. Accordingly, upon the decoding of a JEP instruction, an entirely new address, from the instruction, is loaded into the next address register means 120 - 123 for use in the next instruction cycle, it being noted that this mode of operation substantially varies from the normal sequencing mode of operation in that a new address is effectively inserted into the next address register means 120 and 121 while a previously stored section address as normally retained therein during sequencing modes of operation is abandoned while the adder means 170 and 192, which have their carry inputs disabled here act merely as straight transfer devices due to the fact that Zero (0) bits are clamped to inputs $A_0$ - $A_7$.

Similarly, when a jump to return address instruction is decoded, the terminal annotated AB Enable will go high while the terminal annotated $\overline{AB\ Enable}$ goes low. Additionally, the terminal annotated Return connected to conductor 225 will also go high. When the terminal annotated $\overline{AB\ Enable}$ goes low, this will disable AND gate 163 to impose a low level on conductor 161 which has the effect of disabling gate array means 179 and 218 and enabling AND gate 156 in the same manner as occurs when the $\overline{JEP}$ input to AND gate 163 goes low.

This means that the next address registers 120 and 121 will be enabled to receive clock pulses from the output of AND gate 158 and hence load the next address bits supplied on conductors 141 - 145 while the adder means 170 and 192 have Zero (0) levels imposed on the inputs thereto annotated $A_0 - A_7$. As the conductor 161 goes low, a high level will be removed from OR gate 224 but since the return terminal connected to the carry input of adder means 192 through conductor 223 will stay in a high or enabled condition so that adder means 170 and 192 will increment any address applied thereto as the same acts as an eight (8) bit full adder. When the terminal AB Enable connected to conductor 138 goes high, under these conditions, the output of OR gate 136 will go low clamping a Zero (0) or low level to the $S_1$ inputs of each of the multiplexer means 116 - 119 through conductors 131, 147 and 139. This selects, as aforesaid, the AB inputs to the multiplexer means 116 - 119 whereupon the last return address stored within the return address register means 82 will be applied to conductors 141 - 145 for direct loading into the next address register means 120 and 121 upon the production of the next clock pulse by the AND gate 158. Additionally, return address bits $AB_0 - AB_7$ will be applied to conductors 171 - 174 and 202 - 205 for application to the inputs of the adder means 192 and 170 annotated $M_0 - M_7$.

The eight (8) bit input will be added to the all Zero's (0's) present on inputs $A_0 - A_7$, incremented by one due to the high leel on the carry input connected to adder means 192 and applied through conductors 184 - 187 and 226 - 229 to the inputs to the next address register means 122 and 123. This means that upon the production of the next clock pulse by AND gate 158, the last address stored in the return address register means 82 will be incremented by one within a minor page of two hundred and fifty-six (256) and loaded into the next address registers 120 - 123. Subsequently, at the beginning of the next instruction cycle, this address will be loaded into the address register means 124 - 127 for direct application to the read only memory 80 and hence, addressing is caused to return to a previously stored address, which is incremented by the ROM address register means 81, so that the next sequential address from that stored is employed in addressing the read only memory 80.

When a jump intrapage instruction is read and the brannch condition associated therewith is satisfieed, the terminals annotated $\overline{JIP}$ connected to conductors 192 and 212 will go low. The low level on conductor 193 will cause the AND gate 189 to be disabled so that no carry input will be applied through conductor 188 to the adder means 170 regardless of whether or not a carry output is generated by the adder means 192. However, as the output of AND gate 163 remains high, AND gate 156 remains disabled so that previously latched address bits $A_8 - A_{12}$ stored in the next address register means 120 and 121 are retained while the gate array means 179 and 218 are maintained in an enabled condition whereupon the current address applied to the read only memory 80 is applied to the inputs $A_0 - A_7$ of the adder means 192 and 170. Additionally, a high leel present on conductor 161 is applied to OR gate 224 so that the carry input to the adder means 192 will remain enabled. The decoding of a jump intrapage instruction has no effect on the select inputs of the multiplexers 116 - 118 so that the outputs thereof on conductors 141 - 145 and 171 - 174 are retained in an All Zero (0) condition.

This means that inputs $M_4 - M_7$ to adder means 170 will be in a Zero (0) state so that the adder means 170, under these conditions, merely acts to apply the inputs thereof, annotated $A_4 - A_7$ to output conductors 187 - 184 as inputs to the next address register means 122 for insertion therein upon the next clocking interval. When, however, the $\overline{JIP}$ input on conductor 212 to AND gate 210 goes low, the output of this AND gate will go high causing the output of the OR gate 207 connected to conductor 206 to go low. This in turn will cause the B inputs associated therewith, i.e., ROM bits $B_0 - B_3$ which contain the next relative address in all branch instructions, to be gated to output conductors 202 -205. The adder means 192 thus receives a next relative address at the iputs annotated $M_0 - M_3$ and the current address at the inputs thereto annotated $A_0 - A_3$. These two, four bit quantities are added by the adder means 192 in the conventional manner and the sum is incremented by one within a four bit sequence, to be distinguished from the eight bit sequence normally employed when AND gate 189 is enabled, and applied to the output conductors 226 - 229. The result is that at clock time $CL_6$, when the output of AND gate 158 goes high, the next address register means 120 and 121 will retain their previous address, the next address register means 122 will receive the same four (4) address bits $A_4 - A_7$ as is present in the current address while the bits loaded into next address register means 123 will be equal to the incremented sum of the four bits $A_0 - A_3$ of the current address plus the next relative address contained within ROM bits $B_0 - B_3$ of the last instruction with no higher order carry. Thus the resultant address present at the outputs of the next address register means 120 - 123 defines the same section previously relied upon; however, the sixteen (16) bit instruction defined therein has been branched with respect to that previously defined by a sum equal to one plus the next relative address defined by ROM bits $B_0 - B_4$. This newly formed address, equal to the present address plus the next relative address plus one is loaded within the address register means 124 - 127 at the beginning of the next instruction cycle to form a new address for the read only memory 80.

Accordingly, it will be appreciated by those of ordinary skill in art that the ROM address register means 81 normally acts to increment each address previously supplied to the read only memory 80 and continues within this mode of operation until either a jump external page, jump to a return address or jump intrapage address is received. There after, the mode of addressing achieved will shift, under the control of instructions issued on the common instruction word bus, to either insert a new thirteen (13) bit address or modity a current address by a relative, incremented address received in the last instruction read. More particularly, if a jump external page instruction is read, the ROM address register means 81 will change the current address to an entirely new address contained within ROM bits $B_0 - B_{11}$ and $B_{13}$ of the jump instruction decoded while if a jump to return instruction is read, a previously stored address will be taken from the return address register means 82, incremented by one within a two hundred and fifty-six (256) word minor page and employed as the new address. Furthermore, if a $\overline{JIP}$ instruction is decoded, the current address applied to the read only memory 80 will be incremented by one and the low order four bits $A_0 - A_3$ thereof will be added to a next relative address contained in the low order bits $B_0 - B_3$ of the current instruction read from the read only memory 80. In this manner, the ROM address register means 81 may automatically act to sequentially address the read only memory 80 but may shift through one of three branching formats to deal with the multitude of variables presented thereto in the normal course of operation.

In order to simplify circuit representation, decoder arrangements for the ROM bits necessary to yield the various commands which have been indicated by letter representation in FIG. 3 have not been illustrated; but instead, the decodes therefor have been listed as employing conventional logic notation. Therefore, it will be appreciated by those of ordinary skill in the art for the decodes listed in FIG. 3, a dot or comma will represent a normal ANDing logic function while OR function is set forth in specie and eac command may thus be readily available through the use of conventional AND and OR logic for the ROm bit conditions or other conditions specified through the use of conventional AND or OR techniques or by using complementary NOR and NAND logic.

THE RETURN ADDRESS REGISTER

The return address register means 82 functions within the automatic writing system according to the instant invention to provide the microprocessor indicated by the dashed block 16 with the ability to perform one or more jump operations in sequence and upon the completion of a routine initiated by a jump operation to return to a pointt in the addressing sequence just prior to the point where the jump instruction was initiated so that the same may be incremented and successive sequential addressing continued. This capability lends great versatility to the automatic writing system according to the instant invention because it permits the microprocessor to respond to a variable requiring special processing routines with a jump operation to such special processing routines and upon the completion of the special processing routines required, the microprocessor may automatically return to a previously established addressing sequence upon the appropriate disposition of the variable causing the jump instruction to be initiated. As was developed above, two basic types of jump external page instructions are employed within the instant invention wherein the first type comprises unconditional jumps wherein no return address is stored while the second comprises a jump and return instruction whrein the last address is stored within the return address register means 82 so that the same may be returned to upon a completion of a new routine initiated by the initial instruction. Therefore, as the addresses employed within the instant invention include thirteen (13) bits, the return address register means 82 may comprise a thirteen (13) bit wide, push down stack which in this case is sixteen (16) words deep to permit the storing of up to sixteen return addreses. Furthermore, the return address means 82 preferably operates on a last in, first out basis so that upon receipt of a plurality of return addresses issued in a series of jump and return instructions, return operations occur in the inverse order to that for which jump and return instructions were received to enable a step wise return to previously established addressing sequences which permits a precise retracing of addresses in sequence. The return register means 82 thus functions in the conventional manner of a push down stack to store, when enabled for push down operations, each address word applied and in any series of operations each succeeding word is inserted into the top word location while the address word initially stored therein is pushed down to the next word location and this operation will continue in sequence as each successive address word is received up to the full limit of the push down stack. Conversely, when enabled for read out, the address words stored in the top word location is read out first and each address word stored in a lower location is pushed up so that the next to last address word stored is stored in the top location of the return address register 82 after one read out cycle. In this manner, the return address register 82 acts to read out words inserted therein on a first in, last out basis. Although any conventional push down stack having sufficient width and depths to accommodate the program and address width of the instant invention, may be employed, a preferred embodient thereof employing a random access memory and a counter to control the address of the memory is preferred as it avoids the actual implementation of push down and push up operations within a conventional memory array. Such a preferred embodiment for the return address register 82 is illustrated in FIG. 4.

Figure 4:
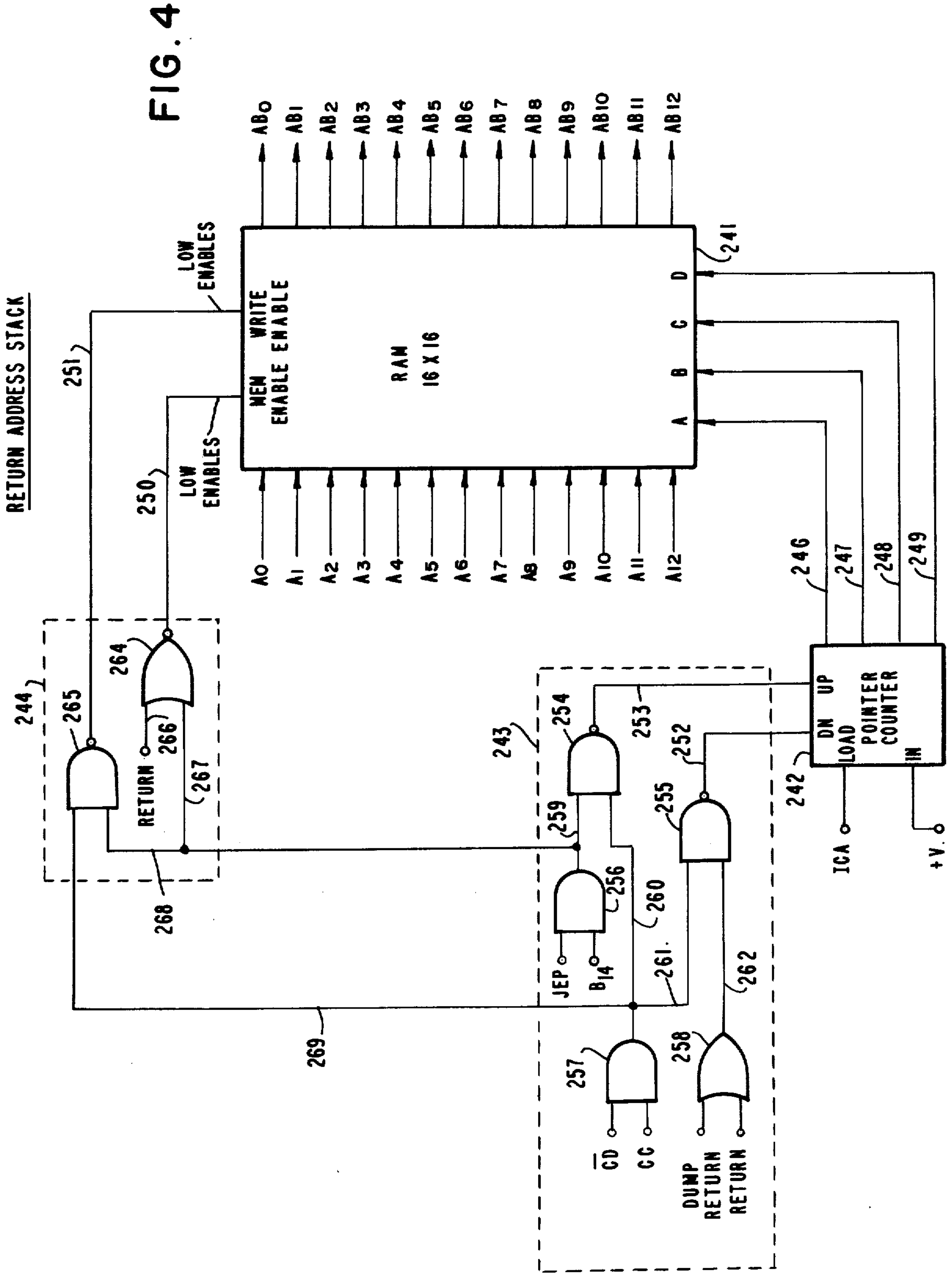
FIG. 4 is a block diagram schematically showing an exemplary return address register suitable for use as the return address register depicted in FIG. 2.

Referring now to FIG. 4, there is shown a block diagram schematically illustrating an exemplary return address register that is suitable for use as the return address register depicted in FIG. 2. The exemplary return address stack depicted in FIG. 4 comprises memory means 241, pointer counter means 242, counter function control means indicated by the dashed block 243 and memory function control means indicated by the dashed block 244. The memory means 241 may take the conventional form of a sixteen (16) bit wide, sixteen (16) bit deep random access memory which, for the purposes of the instant invention, would provide storage for sixteen (16) thirteen (13) bit wide return addresses under such circumstances that three (3) bits of width would remain unused. Such a memory is readily available by using four SN7489, 64 bit read/write LSI memory chips as conventionally available from the Texas Instruments Corporation wherein each chip is connected in a parallel fashion to accept four bits of an address and hence provides up to sixteen storage locations for each four bits of address associated therewith. As the instant invention only requires a thirteen (13) bit wide input and output, three bits of width on one of the four chips employed would remain unused. In FIG. 4, a unitary random access chip has been indicated as having 13 inputs annotated $A_0$ - $A_{12}$ and 13 outputs annotated $AB_0$ - $AB_{12}$ and it will be appreciated by those of ordinary skill in the art that such unitary configuration can be formed of the four 7489 chips mentioned above wherein each chip has the various enable and select inputs thereto connected in parallel while the data inputs and outputs thereof are separately connected to associated inputs and outputs within the multiconductor cables 88 and 91 illustrated in FIG. 2.

The memory means 241 illustrated in FIG. 4 may thus be viewed as comprising a conventional random access memory which is sixteen (16) bits wide and sixteen (16) bits deep wherein only thirteen (13) bits of width are employed for storing and accessing return addresses. The inputs to the memory means 241 are annotated $A_0$ - $A_{12}$ and, as will be apparent to those of ordinary skill in the art, are connected to the multiconductor cable 91 illustrated in FIG. 2. Conversely, the thirteen (13) bit output of the memory means 241 illustrated in FIG. 4 is annotated $AB_0$ - $AB_{12}$ and this output, it will be appreciated, is connected to individual ones of the conductors present within the multiconductor cable 88 illustrated in FIG. 2 and hence are applied to the commonly annotated inputs to the multiplexer means 116 - 119 illustrated in FIG. 3. The memory means 241 acts in the conventional manner of a random access memory to access one of the sixteen (16) storage locations therein defined by the four (4) select inputs thereto annotated A - D in FIG. 4. Thus, whenever the memory enable input thereto goes low, the word location defined by the select inputs A - D is read out in parallel in a non-destructive manner and applied to the outputs thereof annotated $AB_0$ - $AB_{12}$ while when both the memory enable and write enable inputs thereto go low, a thirteen (13) bit word or address as applied to input conductors $A_0$ - $A_{12}$ is written into a storage location defined by the select inputs A - D thereof. The select inputs A - D of the memory means 241 are connected through conductors 246 - 249 to the output of the pointer counter means 242 while the enable inputs to the memory means 241 are connected through conductors 250 and 251 to the outputs of the memory function control means indicated by the dashed block 244.

The pointer counter means 242 acts as an address register for the memory means 241 and causes information to be written into and read therefrom in the last in, first out manner generally attributable to a push down stack. More particularly, the pointer counter means 242 may take the conventional form of a four (4) bit up/-down counter such as a 74 193 synchronous four (4) bit up/down counter available from the Texas Instrument Corporation. This counter acts in the well known manner to increment each time a pulse is received at the incrementing input thereto annotated Up in FIG. 4 and decrement each time a pulse is received at the decrementing input thereto annotated DN in FIG. 4. The outputs of the pointer counter 242 are connected through conductors 246 - 249 to the select inputs A - D of the memory means 241 and hence, as will be apparent to those of ordinary skill in the art, a discrete 13 bit storage location within the memory means 241 will be addressed in correspondence to the state of the count of the pointer counter means 242 as reflected at the outputs thereof. The data input, annotated IN in FIG. 4, is tied high to a source of positive voltage +V while the load input thereto is connected to a terminal annotated ICA, as defined in conjunction with FIG. 3 as a level which goes high during the initialization of the automatic writing system according to the instant invention or any time that the system is reset. Due to these input conditions, it will be appreciated by those of ordinary skill in the art, that any time the ICA input goes high, a Hex F or 1111 count state is loaded into the pointer counter means 242 while each time the up or down input thereto is pulsed, the state of the count therein is incremented or decremented respectively. This means, that when the automatic writing system according to the instant invention is initialized, a Hex F output state will be assumed. Therefore, as shall be seen hereinafter, when the first jump and return instruction is decoded, the address is stored and thereafter the pointer counter means 242 will be incremented to its Hex O or all Zero (0) output state so that the first storage location within the memory means 241 which is addressed for the receipt of the first return address will be the 1111 location. Thereafter, normal incrementing operations which attend each jump and return instruction and decrementing operations which attend each return operation will cause the addressing of the memory means 241 by the pointer counter means 242 to occur in the last in, first out fashion of a push down stack.

The increment and decrement inputs, annotated Up and DN are connected through conductors 252 and 253 to the counter function control means indicated by the dashed block 243. The counter function control means indicated by the dashed block 243 comprises NAND gates 254 and 255, AND gates 256 and 257, and OR gate 258. The increment input to the pointer counter means 242 is controlled by the output of the NAND gate 254 and is enabled to cause the pointer counter means 242 to increment when a low output is present thereon. The NAND gate 254 may comprise any of the well known forms of this conventional class of logic device and hence acts in the conventional manner to provide a low output when both of the inputs thereto are high while providing a high level output for all other input conditions. A first input to NAND gate 254 is connected through conductor 259 to the output of AND gate 256.

The AND gate 256 may be conventional and acts in the well known manner to provide a high or enabling input to NAND gate 254 on conductor 259 only when both of the inputs thereto are high while providing a low level output under all other sets of input conditions. As was noted above, two forms of jump external page instructions are provided within the instant invention wherein a first form is an unconditional jump instruction and is defined by a modular address equal to a Hex 8 or Hex A while the second form of jump external page is a jump and return instruction which is defined by a modular address equal to C or E. It will be appreciated that a modular address of 8 differs only from a modular address of C by the presence of a One (1) in ROM bit location $B_{14}$ and exactly the same relationship holds between modular addresses equal to A and E. Therefore, it is the function of AND gate 256 to decode only jump and return instructions and to provide an enabling input to NAND gate 254 only in response thereto. A first input to AND gate 256 is connected to a terminal annotated JEP which is defined in conjunction with FIG. 3 and it will be recalled that any jump external page instruction which is decoded will result in a high level at this terminal. The second input to AND gate 256 is connected to a terminal annotated $B_{14}$ and hence this terminal is connected to receive the input condition of ROM bit $B_{14}$ in each instruction issued on the common instruction word bus 20. Thus, as the terminal annotated JEP will go high for all jump external page instructions while the terminal annotated $B_{14}$ will go high only for those instructions having ROM bit $B_{14}$ in a One (1) condition, it will be appreciated by those of ordinary skill in the art that AND gate 256 will apply a high level to the input of NAND gate 254 only when a jump and return instruction has been decoded.

The second input to NAND gate 256 is connected to the output of AND gate 257 through conductor 260. The AND gate 257 may take the same format as AND gate 256 and acts to provide a high or enabling level at the output thereof only when both of the inputs thereto are high. The respective inputs of AND gate 257 are connected to terminals annotated CC and $\overline{CD}$ which corresponds to the clock phase interval when clock phase CC is high and clock phase CD is low. This means, that AND gate 256 will provide a high or enabling level at the output thereof connected to conductor 260 during the interval when clock phase CC is high and clock phase CD is low which translates to clock phase interval $C_5$. Therefore, as shall be seen below, both the pointer counter means 242 and the memory means 241 are enabling during clock phase interval $CL_5$ which preceeds by one clock phase interval the clocking of the next address registers 120 - 123 in FIG. 3 but is subsequent to clock phase interval $C_B$ at which time the address register means 124 - 127 are loaded. Thus it will be appreciated by those of ordinary skill in the art that the NAND gate 254 is enabled to apply a low or incrementing level through conductor 253 to the pointer counter means 242 during subclock phase $C_5$ of an instruction cycle wherein a jump and return instruction is issued.

The decrement input annotated Dn to the pointer counter means 242 is connected through conductor 252 to the output of NAND gate 255. The NAND gate 255 may take the same form as NAND gate 254 and hence acts to provide a low or decrementing enable level at the output thereof only when both inputs thereto are high while providing a high level at the output thereof for any other set of input conditions. One input to the NAND gate 255 is connected through conductor 261 to the output of AND gate 257 and hence NAND gate 255 will only be enabled for the purposes of decrementing the pointer counter means 242 during subclock phase 5 of an instruction cycle. A second input to NAND gate 255 is connected through conductor 262 to the output of OR gate 258. The OR gate 258 may take any conventional form of this well known class of logic device and acts in the well known manner to provide a high level output whenever either of the inputs thereto are high. A first input to the OR gate 258 is connected to a terminal annotated Return which was described in conjunction with FIG. 3 in association with the ANDing of an AB Enable level and the complement of ROM bit $B_{10}$. This return level, as aforesaid, is produced only when a jump to return instruction is issued and is provided to OR gate 258 to decrement the state of the pointer counter means 242 subsequent to the reading of a previously stored and addressed return address in the memory means 241 so that the previously stored address to that just read will be addressed by the pointer counter means 242.

The second input to the OR gate 258 is connected to the terminal annotated Dump Return. The Dump Return input to OR gate 258 gives the instant invention the ability to skip over a previously stored return address under conditions wherein the results of a jump to routine indicate that a return to a previous sequence is unnecessary. Under these circumstances, the select input for the storage location wherein the unnecessary address is stored is merely skipped over through a decrementing operation to avoid the necessity of manipulating the contents of the memory means 241. The dump return input signal, as shall be seen below, is an output obtained from the keyboard interface, representing a decoding of the instruction 0002 in Hex. Thus it will be appreciated by those of ordinary skill in the art that the output of OR gate 255 will go high when either a Dump Return or Return instruction is decoded and this high will cause the pointer counter 242 to be decremented during clock subphase 5 when the NAND gate 255 is enabled to provide a low level on conductor 252.

Accordingly, it will be appreciated by those of ordinary skill in the art that the pointer counter means 242 is initially set in a Hex F count condition when the initial clear active level is applied to the load input of the pointer counter means 242. Thereafter, for each jump and return instruction decoded, the pointer counter means 242 will be incremented by one (1) to increment the address applied through conductors 246 - 249 to the memory means 241 while for each dump and return or return operation the state of the count of the pointer counter means 242 is decremented by one to reduce the address applied on the select inputs A - B of the memory means 241. It should be noted that the pointer counter means 242 will actually increment or decrement on the positive edges of the respective pulses applied thereto on conductors 252 and 253 so that the decrementing or incrementing of the pointer counter means 242 occurs at the end of clock phase $CL_5$ when the low level gated onto one of the conductors 252 or 253, due the clock inputs to AND gate 257, again go high. Conversely, as shall be seen below, reading operations from the memory means 241 occur throughout the instruction cycle while write operations thereinto occur on a negative transition applied to conductor 251 which is also associated with the output of AND gate 257. This means, that for a jump external page and return instruction wherein information is written into the memory means 241, an address will be written into the memory means 241 at a previously addressed location and thereafter the address generated by the pointer counter means 242 is subsequently incremented to a condition to receive a new address in a subsequent instruction cycle. However, since read operations from the memory means 241 are available throughout the instruction cycle, it will be appreciated that a decrementing in response to a return instruction will occur at the end of clock phase $CL_5$ due to the decrementing of the pointer counter means 242 and at clock phase $CL_6$, the newly selected address within the memory means 241 will be loaded into the next address register means 120 - 123 under the timed gating relationship associated with clock phase $CL_6$ imposed by the output of AND gate 158 as shown in FIG. 3.

Both the memory enable input to the memory means 241 connected to conductor 250 and the write enable input connected to conductor 251 are connected to outputs of the memory function control means indicated by the dashed block 244 and must be in a low condition for their respective functions to be implemented. The memory enable input must be in a low condition for either a writing or reading operation within the memory means 241 while the write enable input must go low in conjunction with the memory enable input to permit a write function to be achieved. However, while the memory enable input to the memory means 241 is active anytime the same is low to permit a read operation, in the nondestructive manner associated with a random access memory, the actual write function associated with the write enable input on conductor 251 actually occurs during a negative transition and hence the memory means 241 will have an address as present on conductors $A_{12}$ - $A_0$ written into a storage location defined by the select inputs A - D at the beginning of the write cycle when the negative leading edge of an input pulse on conductor 251 occurs in the pesence of a low level on conductor 250. The write enable level applied to conductor 251, as shall be seen below, is also controlled by the output of AND gate 257 during clock phase $CL_5$; however, the timing for the implementation of functions between the memory means 241 and the pointer counter means 242 differs by the two hundred fifty (250ns) nanosecond (250ns) interval associated with clock phase $CL_5$ in that writing occurs on the leading edge of the timing pulse output by the AND gate 257 while an incrementing or decrementing of the pointer counter means 242 occurs on the trailing edge of an input thereto.

The memory function control means indicated by the dashed block 244 comprises a NOR gate 264 whose output is connected through conductor 250 to the memory enable input of the memory means 241 and a NAND gate 265 whose output is connected through conductor 251 to the write enable input of the memory means 241. The output of the NOR gate 264 acts to independent control the enabling of the memory means 241 for a read operation and acts in conjunction with the output of the NAND gate 265 to enable A write operation upon a coincidence of a low level on conductor 250 and a negative transition on conductor 251 as the output of NAND gate 265 goes low. The NOR gate 264 may take any conventional form of this well known class of logic device and accordingly acts in the well known manner to provide a low or enabling level at the output thereof whenever either of the inputs thereto are high. One input to the NOR gate 264 is connected through conductor 266 to a terminal annotated Return. This is a decode of a 000F jump to return instruction and is developed in the same manner as mentioned in association with the commonly annotated input to OR gate 258. Accordingly, any time a high level is present on conductor 266, a low level will be generated at the output of NOR gate 264 to enable the memory means 241 for read operations during which an address storage location, as defined on select inputs A – D, is read out in a non-destructive manner and applied to the output conductors $AB_0$ – $AB_{12}$. The second input to NOR gate 264 is connected through conductor 267 to the output of the AND gate 256 which acts to decode, as aforesaid, jump external page and return instructions. Thus, the return input applied to conductor 266 will cause the NOR gate 264 to apply an enabling level to the memory means 241 so that the same may read out a return address subsequent to the decrementing of the pointer counter means 242 while the input to NOR gate 264 connected to conductor 267 will cause an enabling level to be applied to conductor 250 so that a current address applied on input conductors $A_0$ – $A_{12}$ may be written into the memory means 241 when a write enable level is produced on conductor 251, which occurs as aforesaid, prior to the incrementing of the pointer counter means 242.

The NAND gate 265 may take any of the well known forms of this conventional class of device and acts to provide a low or enabling level at the output thereof only when both of the inputs thereto are high while producing a high level output for all other sets of input conditions. A first input to NAND gate 265 is applied through conductor 268 from the output of AND gate 256, which acts as aforesaid, to decode jump and return instructions wherein a return address is stored. Thus, AND gate 256 will apply a high or enabling level to conductor 268 to enable the NAND gate 265 to produce a low going pulse upon the occurrence of clock phase $CL_5$, as decoded by the AND gate 257. The second input to NAND gate 265 is connected through conductor 269 to the output of AND gate 257 which produces a high or enabling level on conductor 269, as aforesaid, during the 250 ns interval associated with clock phase $CL_5$ which decodes as clock subphase CC high and clock subphase CD low. Thus, for a return operation, NOR gate 264 will produce a low level on conductor 250 to enable the memory means 241 to read for the entire instruction interval while upon the decoding of a jump and return instruction, NOR gate 264 will produce an enabling level on conductor 250 for the entire instruction cycle, NAND gate 265 is partially enabled by the level on conductor 268 for the complete instruction cycle but only goes low during the presence of clock phase $CL_5$ as indicated on conductor 269, while the actual writing of an address presented on inputs $A_0$ – $A_{12}$ occurs only during the leading or negative going edge of the level produced on conductor 251.

In operation of the return address stack illustrated in FIG. 4, it will be appreciated that when the system is initialized, the ICA or initial clear active terminal connected to the load input of pointer counter means 242 will go high to cause the state of the pointer counter means 242 to be set to the hex F condition. Since the pointer counter means 242 continuously counts from hex F to hex O and back to F again, there is no necessity to start at any one given point in the counter and the F state may thus be arbitrarily chosen for the cleared condition. Alternatively, it will be appreciated by those of ordinary skill in the art that another starting point may be chosen such as the hex 0 state. In the normal mode of operation of the automatic writing system according to the instant invention, it may reasonably be expected that an address would be stored within the memory means 241 prior to the issuance of a jump and return instruction by the microprocessor. Therefore, the operation of the return address stack illustrated in FIG. 4 subsequent to the setting of the pointer counter means 242 to the hex F state will be to store one or more addresses in response to the issuance of jump and return instructions. Thus, assuming that the pointer counter means 242 is set to the hex F count condition, and with a recognition that each address output by the ROM address register means 81 during each instruction cycle will be applied to inputs $A_0$ – $A_{12}$ of the memory means 241 through the multiconductor cable 91, it will be appreciated that when a jump and return instruction is issued, it will be decoded by AND gate 256 and results in the application of a high level to each of conductors 259, 267, and 268. When this high level is applied to conductor 267, the output of NOR gate 264 will immediately go low to place a low on the memory enable input to the memory means 241 connected to conductor 250. Thus, at this juncture, the current address being output by the ROM address register means 81 is applied to inputs $A_0$ – $A_{12}$ of the memory means 241, the pointer counter means 242 is addressing storage location hex F through the select inputs to the memory means 241 connected to conductors 246 – 249, and the write enable input to the memory means 241 is in a disabled condition. At this time, it should also be noted that high levels are present at both the decrement (Dn) and increment (Up) inputs to the pointer counter means 242, as NAND gate 254 has not yet been enabled while NAND gate 255 has no enabling inputs applied thereto.

At clock phase $CL_5$, the output of AND gate 257 will go high. When the output of AND gate 257 goes high, the partially enabled NAND gates 254 and 265 will be fully enabled to produce low levels at outputs thereof connected to conductors 251 and 253. As the memory means 241 acts to store information therein upon a negative going transition at the write enable input thereto while a low level is present at the memory enable, the address applied on conductors $A_0$ – $A_{12}$ will be written into storage locations hex F thereof as soon as the output of NAND gate 265 goes low. However, as the incrementing or decrementing of the pointer counter means 242 occurs only during a positive transition, the low level produced at the output of NAND gate 254 will not yet cause an incrementing of the pointer counter means 242 so that the hex F output state applied to conductors 246 – 249 is retained to assure that the current address is written into this storage location within the memory means 241. At the termination of clock phase $CL_5$, the output of AND gate 257 again goes high. This will cause the output of NAND gates 254 and 265 to also go high whereupon the positive transition applied to conductor 253 causes the state of the pointer counter means 242 to be incremented whereupon a hex O count condition is applied to conductors 246 – 249 while the write enable level on conductor 251 terminates. Upon the termination of the instruction cycle, the enabling input applied to NAND gates 254 and 265 as well as NOR gate 264 terminates so that NAND gates 254 and 265 are not in an enabled condition for the next machine cycle while the memory enable level applied to conductor 250 is removed. Thus at the completion of the machine cycle in which a first jump and return instruction was received, the current address which resulted in the jump and return instruction is stored in the hex F location of the memory means 241 and subsequently the state of the pointer counter means 242 is incremented to the hex 0 state.

A subsequently received jump and return instruction would result in the storage of the current address in storage location hex 0 of the memory means 241 and thereafter an incrementing of the pointer counter means to a hex 1 count condition. This technique of storing the current address of the ROM address register means 81 within the currently addressed location of the memory means 241 and subsequently incrementing the state of the pointer counter means 242 may continue without interruption until all sixteen storage locations of the memory means 241 are occupied by return addresses. However, should a 17th return address be attempted to be inserted into the memory means 241 without intervention of a jump to a return instruction or a dump return instruction, the pointer counter means 242 would again be in the hex F condition whereupon information previously stored in this location would be lost due to a writing of new address information thereover. This is not a practical concern due to the programming employed within the instant invention; however, should additional push down storage be required, the size of the memory means 241 and the pointer counter means 242 could be increased to accommodate more than sixteen (16) return address locations.

At any time after an initial address has been stored in the memory means 241, a jump to return or dump return instruction may be issued to retrieve the last return address stored within the memory means 241. For the purposes of the instant description, it may be assumed that two return addresses have been previously stored in the memory means 241 so that, through the operation outlined above, the first address stored resides in memory location hex F, the second return address stored resides in memory location hex 0 and the current state of the count in the pointer counter means 242 is hex 1. This address is therefore supplied through conductors 246 – 249 to the select inputs to the memory means 241 so that the same is in an appropriate condition to receive a new return address inserted through a jump and return instruction. If now, it is desired to access the return address which was last stored the microprocessor would issue a return instruction in the hex 000 F format described above. When the return instruction is decoded, a highlevel will be immediately applied to input 266 of the NOR gate 264 causing a low level to be applied to conductor 250 connected to the memory enable input of the memory means 241 to condition the memory means 241 for a read operation. Because the output of the pointer counter means 242 is presently in the hex 1 state in which it was left at the end of the last jump and return instruction assumed, the content of the hex 1 storage position will be read from the memory means 241 and applied to output conductors $AB_0$ – $AB_{12}$ of the memory means and, if FIG. 3 is inspected, it will be appreciated that the multiplexer means 116 – 119 will select their AB inputs as outputs and these inputs, after incrementing in the adder means 170 and 192, will be applied to the inputs of the next address register means 120 – 123. However, as no clock input is applied to the next address register means 120 – 123 by the AND gate 158 until clock phase $CL_6$, whatever information happens to be present in the hex 1 storage location of the memory means 241 will not presently be gated into the next address register means 120 – 123. Furthermore, under the circumstances, here being considered, such information will never be gated into the next address register means 120 – 123 as the select input to the memory means 241 will be changed, as shall be seen below, prior to the appearance of clock time $CL_6$. Thus, as soon as the return instruction is decoded, the memory enable input to the memory means 241 goes low to access whatever information is in the storage location defined by select inputs A – D thereof.

The decoded return instruction will also be applied to the commonly annotated lower input to OR gate 258 whereupon a high level will be applied to conductor 262 to prime the NAND gate 255. However, as clock time $CL_5$, i.e., $CC \cdot \overline{CD}$ has not yet occurred, the output of NAND gate 255 will remain high and the output of the pointer counter remains unchanged. When clock time $CL_5$ arrives, clock subphase CC will be in a high condition while clock subphase CD will be in a low condition whereupon the output of AND gate 257 goes high. Since the NAND gate 255 is already primed, the output thereof will go low and this low will be applied through conductor 252 to the decrement, input Dn to the pointer counter means 242. However, since the counter increments or decrements on a positive edge, when the output of NAND gate 255 first goes low, no change in the state of the pointer counter 242 will occur. Upon the termination of clock phase $CL_5$, the high level will be removed from conductor 261 whereupon the output of NAND gate 255 goes high. This will cause a positive transition to be applied to conductor 252 to cause the pointer counter means 242 to decrement and hence change the state of the count reflected on conductors 246 – 249 from the hex 1 state previously assumed to the hex 0 state which, it will be recalled, is the address within the memory means 241 in which the last return address stored resides. Thus upon termination of clock phase $CL_5$, under the conditions here assumed, the select inputs A – D of the memory means 241 will define the hex 0 storage location within the memory means 241 as the location from which reading is to occur.

Therefore, as the memory enable input to the memory means 241 is already in a low state, and will be retained in such low state for the complete instruction cycle, the contents of the storage location $hex_0$ within the memory means 241 will be read out and applied to conductors $AB_0 - AB_{12}$. These $AB_0 - AB_{12}$. These AB bits are now gated through the multiplexer means 116 - 119 as shown in FIG. 3, incremented within the adder means 170 and 192 and applied to the associated inputs of the next address register means 120 - 123. Upon termination of clock phase $CL_5$, clock phase $CL_6$, in which CA and CD are both low, occurs and will cause a clocking, under these conditions, of all of the next address registers 120 - 123 whereupon the last stored return address, as stored within location $hex_0$ of the memory means 241, is loaded therein after appropriate incrementing so that the appropriately incremented last address stored is retrieved and inserted within the next address register means 120 - 123 of the ROM address register means 81 for use in the next instruction cycle. As the output of the pointer counter means 242 is currently at a hex 0 state, it will be appreciated that should a jump and return instruction now issue, a new return address will be loaded into the hex 0 storage location of the memory means 241 and the state of the pointer counter 242 incremented, while if the next instruction cycle causes a return instruction to issue, the pointer counter means 242 will be decremented and the address stored in the hex F storage location of the memory means 241 read, incremented and loaded into the next address register means 120 - 123. Thus, in this manner, the return address stack illustrated in FIG. 4 acts as a push down stack to store and access return addresses in a last in, first out manner. It should also be noted that a dump return instruction will be decoded and cause the output of AND gate 258 to go high to cause a decrementing of the pointer counter means 242 in precisely the same manner as in a return instruction. Here, however, no low level is applied to the memory enable input of the memory means 241. This means that the return address stored in the location addressed by the pointer counter 242 upon a decrementing in response to the issuance of a dump and return instruction, will not be read from the memory means 241 and applied to output conductors $AB_0 - AB_{12}$ so that the same will be effectively skipped while the preceding return instructions stored in the memory means 241 are queued for readout during a subsequent return instruction. This means, that the microprocessor has the ability to cause previously stored return instructions to be skipped or dumped should the results of subsequent processing operations indicate that no return thereto is warranted.

Thus it will be appreciated that the exemplary return address stack illustrated in FIG. 4 supplies the automatic writing system according to the instant invention with the ability to store up to sixteen (16) return addresses upon the initiation of a jump and return instruction and to access such return addresses on a command basis on a last in first out basis. Furthermore, selected return addresses may be dumped subsequently to further lend the ability to skip backwards through the return addresses stored while the technique of addressing the memory means 241 with the pointer counter 242 avoids a requiremented for the maintenance of a separate address store and necessary programs to retrive and update each address stored.

THE READ ONLY MEMORY

The read only memory 80, as shown in FIG. 2, takes the form of an 8K memory having sufficient storage available therein, in the form of 8, 196 storage locations for sixteen (16) bit words to store the program employed to control and implement the operations within the automatic writing system according to the instant invention. Typical programs for the instant invention are set forth in their entirety in Appendices A and B attached hereto wherein Appendix A takes the form a highly annotated program listing for the tape embodiment of the instant invention while Appendix B takes the form of a highly annotated program listing for card versions of the instant invention. The read only memory 80 is organized, as aforesaid, into eight 1K pages wherein each page may be viewed as addressable by the highest order three (3) bits in the address provided by the ROM address register means 18 or address bits $A_{10} - A_{12}$. Thereafter, each major page of the read only memory 80 is organized into four minor pages wherein each minor page contains 256 sixteen bit instruction words and is addressable by address bits $A_8$ and $A_9$ of the thirteen (13) bit address required by the read only memory 80, as illustrated in FIG. 2. In turn, each minor page of the read only memory 80 may be viewed as divided into sixteen (16) sections wherein each section contains sixteen (16), 16 bit instruction words and is addressable by address bits $A_4 - A_7$ of the thirteen (13) bit address required while an individual sixteen (16) bit instruction word within each section in a minor page is addressable by the lowest order four bits $A_0 - A_3$ of the address and this organization, it will be appreciated, when combined with the organization of the ROM address register means illustrated in FIG. 3, limits the sequencing mode of addressing employed within the instant invention to sequences within a minor page as the upper five bits of the addrss formed by the ROM address register means 81 is not formed by an adder.

Figure 5:
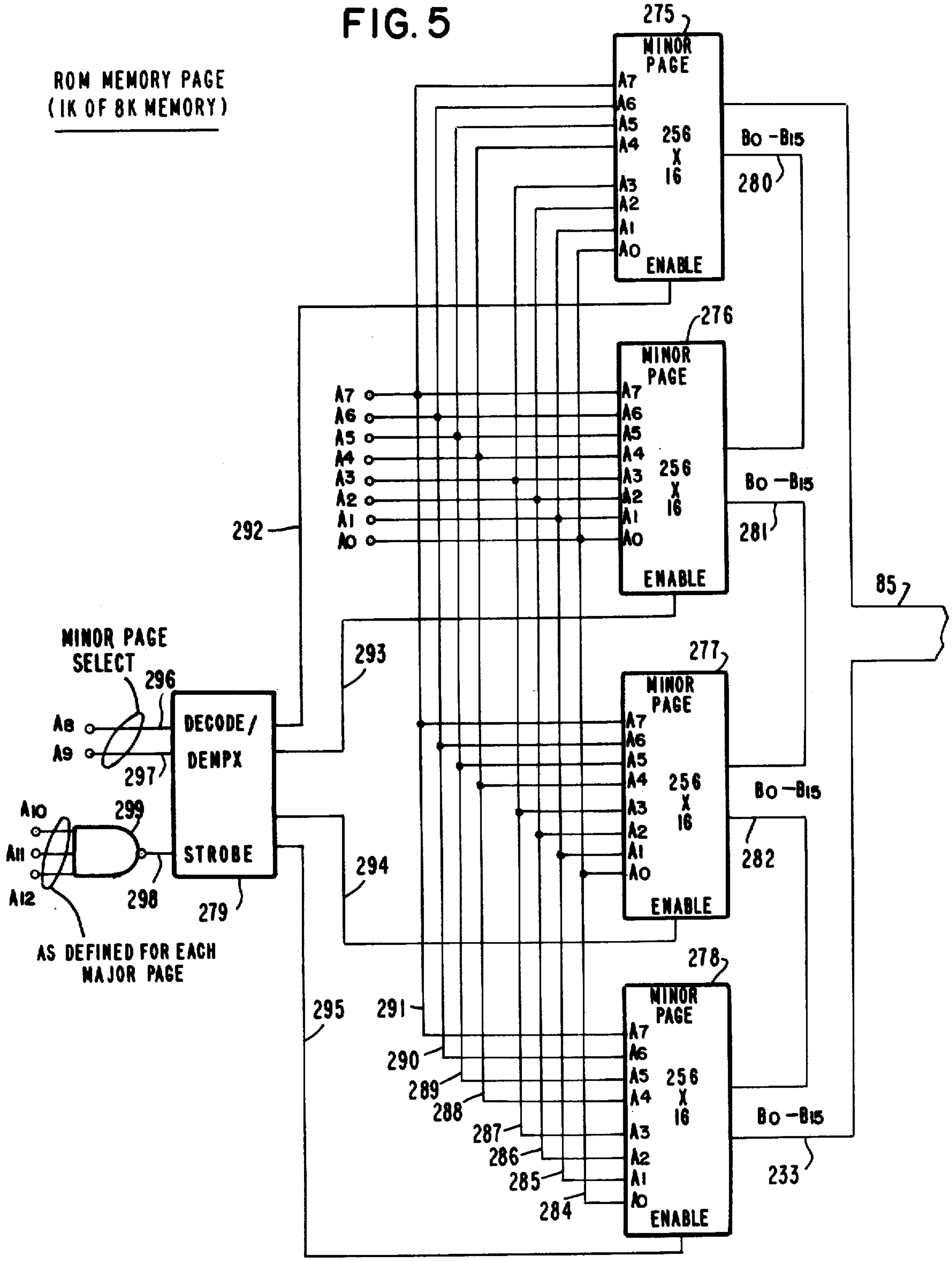
FIG. 5 is a block diagram schematically illustrating the structure of a typical page of the eight page read only memory employed for ROM program storage within the microprocessor illustrated in FIG. 2.

Since each of the eight, 1K pages employed to form the read only memory 80 is identical, only a single exemplary page has been illustrated in FIG. 5 to acquaint the reader with the structure necessary to form the memory and enable the addressing thereof. However, it will be appreciated that the full 8K memory will be formed by eight pages of memory identical to that shown herein although the address of each page, as defined by the address bits $A_{10} - A_{12}$ will vary through the eight states of definition available to three bits to fully and uniquely define each page of memory. Referring now to FIG. 5, there is shown a block diagram schematically illustrating the structure of a typical page of the eight page read only memory employed for the read only memory 80 within the microprocessor illustrated in FIG. 2. More particularly, the exemplary page of the eight page read only memory 80 illustrated in FIG. 5 comprises a plurality of minor page memory means 275 - 278 and a decoder/demultiplexer means 279. Each of the minor page memory means 275 - 278 may be viewed as taking the form of a two hundred fifty-six (256) sixteen read only memory which therefore provides 256 sixteen bit storage locations for the instruction words which have been preprogrammed therein.

Typically, each of the minor page memory means 275 - 278 may be formed by four, 4×256 chips of the ROM variety, conventionally available from Harris, Intel, Intersel, Signetics, TI or a plurality of other manufacturers. Each 4×256 bit chip provides four common bits of each instruction and the four (4) chips are commonly addressed by eight (8) bits of address information in the manner illustrated for the minor page memory means 275 - 278 in FIG. 5. A P ROM system, as well known to those of ordinary skill in the art, provides a convenient format for the assembly of each memory page and is readily programmable on site since each of the locations therein need only be addressed and the links therefor burned to the appropriate One (1) and Zero (0) condition desired for the program non-destructively loaded therein. Thus, as four chips of this variety would be required for each minor page employing a P ROM system each memory page would require sixteen chips while the entire read only memory 80 would require 128 chips of this type. Alternatively, ROM chips which are programmed through mask techniques may be substituted for the P ROM systems employed and such substitution would work a marked reduction in the number of chips required for the read only memory 80 since 2K×4 chips of this type are available although somewhat larger in size than those employed within a P ROM system. However, assuming that a P ROM system is under discussion, each of the four chips required to form a minor page may be organized in a column direction so that the four chip array would be commonly addressed in the manner shown for each of the minor page memory means 275 - 278 illustrated in FIG. 5, and would also provide a sixteen (16) bit output in the form of a suitable 16 bit instruction for application to the common instruction word bus 20 as is also illustrated in FIG. 5.

More particularly, as shown in FIG. 5, each of the minor page memory means 275 - 278 contains 256, sixteen (16) bit instructions which are read therefrom in parallel upon an enabling of that chip and the appropriate addressing of a given storage location thereof. The outputs of the minor page memory means 275 - 278 are illustrated as connected to multiconductor cables 280 - 283 and these cables are in turn junctioned to the instruction word cable 85 which connects to the common instruction word bus 20 in the manner shown in FIG. 2. Although not shown in FIG. 5, it will be appreciated by those of ordinary skill in the art that each of the multiconductor cables 280 - 283 may comprise sixteen (16) individual bit conductors connected to the sixteen (16) outputs of each of the minor page memory means 275 - 278 associated with outputs $B_0$ - $B_{15}$. Furthermore, athough not specifically shown in FIG. 5, it will be appreciated by those of ordinary skill in the art that suitable driver stages may be inserted at the output of the minor page memory means 275 - 278 to appropriate logic levels. As the page of the read only memory illustrated in FIG. 5 is only one page of eight (8), it will be further appreciated that each of the eight (8) pages are connected to the multiconductor instruction word cable 85 in the same manner as shown for the exemplary page depicted in FIG. 5. Thus, when a given one of the minor page memory means 275 - 278 are selectively enabled, an addressed one of the 256, sixteen (16) bit storage locations therein will be read out in parallel and apply an instruction containing ROM bits $B_0$ - $B_{15}$ to the multiconductor instruction word cable 85 for application to the common instruction word bus 20.

Each of the minor page memory means 275 - 278 is commonly addressed through conductors 284 - 291 with address bits $A_0$ - $A_7$ of an address provided by the ROM address register means 81 during each instruction cycle. Furthermore, it should be appreciated that since eight pages such as the exemplary page illustrated in FIG. 5 are employed within the instant invention, each minor page within each K page of memory is commonly addressed so that address bits $A_0$ - $A_7$ are applied in common to all of the 32 minor pages required in the 8K memory. As each minor page contains sixteen (16) sections and each section contains sixteen (16) instructions which each in turn contains sixteen (16) bits, it will be appreciated by those of ordinary skill in the art that the commonly applied address bits $A_4$ - $A_7$ may be viewed as addressing a given one of sixteen (16) sections within each of the minor pages while address bits $A_0$ - $A_3$ act to define an individual instruction within a section. Thus, during each instruction cycle a given section and a given instruction within that section is addressed at each minor page within the read only memory 80. Although commonly addressed only one minor page within the read only memory 80 will be enabled during a given instruction cycle and hence only the addressed instruction within the addressed section of the enabled minor page will be actually read out to apply ROM bits $B_0$ - $B_{15}$ through the multiconductor cable 85 to the common instruction word bus 20.

The selection of a major page and one of four minor pages therein is accomplished through the action of the decoder/demultiplexer means 279. The decoder/-demultiplexer means 279 may take any of the conventional forms of this well known class of logic device and acts to provide a select level on one of four outputs depending upon the condition of the select inputs thereto during the presence of a strobe pulse. For instance, the decoder/demultiplexer means 279 may comprise a conventional 74155 dual, two line to four line decoder/demultiplexer as is conventionally available from Texas Instruments Corporation. The four distinct outputs of the decoder/demultiplexer means 279 are connected through conductos 292 - 295 to respective ones of the enable inputs to the minor page memory means 275 - 278 and it may be assumed for the purposes of this discussion that only a minor page memory means 275 - 278 having a high level applied to the input thereto will be enabled for read out operations in the presence of an address while all remaining ones of the minor page memory means 275 - 278 are disabled. The select inputs to the decoder/demultiplexer means 279 are applied through conductors 296 and 297 from terminals annotated $A_8$ and $A_9$ and it will be appreciated by those of ordinary skill in the art that these terminals receive address bits $A_8$ and $A_9$ of each address provided by the ROM address register means 81. Thus, in the presence of a strobe pulse, the decoder/demultiplexer means 279 acts to decode the one out of four code received on conductors 296 and 297 and enable or place a high level on one of conductors 292 - 295 to enable and select a given one of the minor page memory means 275 - 278 through the use of these two bits in each instruction. However, whether or not the decoder/demultiplexer means 279 acts to decode address bits $A_8$ - $A_9$ to provide an enabling level on one of conductors 292 - 295 will turn on whether or not a strobe pulse is provided thereto and only one strobe will be produced during a given instruction for all of the eight pages of memory so that, as shall be seen below, the decoding of address bits $A_{10}$ - $A_{12}$ as connected to the strobe input of each decoder/demultiplexer means 279 will determine whether or not that page of memory is selected.

The strobe input to the decoder/demultiplexer means 279 is connected through conductor 298 to the output of NAND gate 299. The NAND gate 299 may take a conventional format and acts to provide a low or enabling output to the strobe input of the decoder/demultiplexer means 279 only when all of the inputs thereto are high while providing a high or disabling output under any other set of input conditions. The three inputs to the NAND gate 299, as shown in FIG. 5, are connected to the terminals annotated $A_{10}$ - $A_{12}$ which, as aforesaid, are the three bits of each address employed to define one of eight pages. The exemplary annotations employed for these terminals in FIG. 5 would indicate that the page of memory illustrated therein is selected when each of address bits $A_{10}$ - $A_{12}$ are high; however, it will be appreciated by those of ordinary skill in the art that through the use of the various permutations of the One (1) and Zero (0) states of address bits $A_{10}$ - $A_{12}$ and their complements eight individual combinations to selectively address one of the eight (8) pages will be provided.

Thus when the address bits $A_{10}$ - $A_{12}$ as defined for each major page of memory are present in an address, the output of NAND gate 299 associated with that page will go low to provide a strobe input to the decoder/-demultiplexer means 279. In the presence of such a strobe input, address bits $A_8$ and $A_9$ are decoded and one of the enable lines 292 -295 has a high level applied thereto to enable one of the minor page memory means 275 - 278 on the selected page. Upon such enabling, the section within the enabled minor page memory means 275 - 278 defined by address bits $A_4$ - $A_7$ is addressed and the instruction therein defined by address bits $A_0$ - $A_3$ is read out on one of the multiconductor cables 280 - 283 and applied through the multiconductor instruction word cable 85 to the common instruction word bus 20. Accordingly, it will be seen that each time an address is read from the ROM address register means 81 and applied through the multiconductor cable 86 to the read only memory 80, one of eight pages of memory therein are selected through a decoding of address bits $A_{10}$ - $A_{12}$ and on the selected page of memory one of four minor pages is selected through a decoding of address bits $A_8$ and $A_9$ to cause the enabling of a minor page memory means 275 - 278 selected by that address. Thereafter, one of sixteen sections within that minor page is selected through a direct addressing by address bits $A_4$ - $A_7$ and an instruction therein is addressed through address bits $A_0$ - $A_3$ whereupon a selected sixteen (16) bit instruction word is applied to the common instruction word bus for each instruction cycle.

The discussion of FIGS. 3 - 5 set forth above substantially completes the treatment of the microprocessor indicated by the dashed block 16 because both the arithmetic logic unit 84 and the general purpose registers 83 have retained the same structure and operation described in U.S. Ser. No. 430,130, supra, which is incorporated herein by reference and hence a detailed discussion thereof is not set forth to avoid undue repetition. It should be noted however, that several of the storage assignments associated with the general purpose registers G and H have been modified within the instant invention as temporary storage is also available within the random access memory means 34. To provide a reader with a complete disclosure however, all of the storage assignments presently employed for each of the sixteen, eight bit storage locations within the G and H registers are listed in Appendices D and E attached hereto in a listing where the eight bits of each word are set forth along the abscessa while the sixteen, eight bit register location are specified along the ordinate. Thus, the microprocessor indicated by the dashed block 16, when provided with the microprograms listed in either Appendix A or B provide a sophisticated, versatile, resident control within the instant invention which permits the microprocessor to monitor each of the input/output devices for asynchronous occurrences, analyze any action detected and take appropriate steps to branch, jump or generate control signals in order to process in an appropriate manner the asychronous occurrence indicated.

The instructions issued by the read only memory 80 in accordance with the operation of the microprocessor also perform a similar function within the microprocessor itself. Thus, when these instructions are connected together the system acts to process raw data into a finished output form whereupon the entire automatic writing system according to the instant invention functions under microprogram control.

THE PRINTER UNIT

The automatic writing system according to the instant invention herein being disclosed, preferably employs an independent serial printer which acts as the output device for the system. This serial printer exhibits operational speeds exceeding those generally available in conventional input/output typewriter apparatus while printing a single character at a time through the utilization of impact printing techniques. In preferred embodiments of the instant invention, the printer unit may take the form of a Model 1200 High Type I serial printer available from Diablo Systems Incorporated of Haywood, California. This printer unit has been slightly modified to accommodate the proportionally spaced printing requirements of the instant invention through what is tantamont to a bypassing of certain of the logic therein, as shall be described below, so that the printer unit effectively accepts print position data from the system in a form directly useful thereby rather than employing its own read only memory to develop print position data from a standardized code such as ASCII. However, in all other respects, the Model 1200 High Type I serial printer available from Diablo Systems Inc. effectively functions as an off-the-shelf item within the instant invention and hence, the detailed structure thereof will not be set forth as the same is readily available to those of ordinary skill in the art. It should be noted, however, that the High Type I serial printer is described in detail in the Model 1200 High Type I training course published by Diablo Systems Inc., 1973, and in addition, the same is described in U.S. application Ser. Nos. 229,314, 229,397 and 229,396 each of which was filed on Feb. 25, 1972 and are entitled respectively, "High Speed Printer with Intermittent Print Wheel and Carriage Movement", "High Speed Printer with Drift Compensation Cable for Carriage", and "Ribbon Carriage", wherein the first two applications were filed in the name of A. Gabor while the last application is filed in the names of S. L. Lee and E. T. Hess. Furthermore, the logic of the printer unit in a nonmodified form is dislcosed in U.S. Ser. No. 429,479. Each of these applications are incorporated specifically by reference herein and therefor the details of the printer unit shall only be briefly described where the same has been previously set forth in one of the applications, referred to above, to reduce the length of the instant disclosure; however, additional detail is readily available to a reader upon inspection of any of the aforesaid applications.

The printer unit is a serial printer which functions in response to logical inputs provided thereto to achieve serial printing at a rate which exceeds 30 characters per second with a 90 character set being available and arranged about a so-called daisy wheel print element. Printing is achieved by the positioning, in response to appropriate logic signals, of a designated spoke on a daisy wheel print element opposite a print position. Depending upon the daisy wheel print element in place and the mode of printing selected in the system, characters may be printed according to 12 pitch, 10 pitch or proportionally spaced printing techniques. Once the approrpriate spoke of the daisy wheel print element is positioned opposite a print position, an electrically fired impact hammer is driven into the spoke to cause a carbon or cloth ribbon to impact the document being prepared with the appropriate character. As no mechanical drives or mechanically driven print hammers are employed, the operation of the printer unit is extremely quiet. Similarly, carriage displacement and paper indexing operations are achieved by the printer unit in response to displacement information, specifying both distance and direction, provided to the printer unit from the automatic writing system according to the instant invention. Thus, the printer unit employed within the automatic writing system according to the instant invention acts in receipt of control signals on the common instruction word bus 20 to implement the print, carriage displacement or paper indexing functions specified on the common data bus 19 and provides appropriate indications on the common status bus 21 when these functions have been appropriately completed.

Although the detailed operation of the printer unit is best left to the aforementioned applications, three principle functions of the printer unit should be noted for an appropriate appreciation of the operation of the printer means 2, its function and interconnection within the remaining apparatus disclosed in the present embodiment of the automatic writing system according to the instant invention. In essence, each of these three principle functions are independently controlled by logical inputs provided to the serial printer and may be generally described in terms of three basic printer motions, to wit, print wheel displacement associated with character printing, carriage displacement associated with character escapement, carriage return operations and the like and paper feed motions associated with line spacing, and other indexing functions. The control signals to implement each motion are supplied through 12 data lines to the serial printer wherein the data lines either transmit the seven bit, two's complement of the absolute position number for a desired spoke on the print wheel for the next character to be printed, a twelve (12) bit word specifying the direction and displacement to be moved by the carriage in multiples of 120th of an inch, or a twelve bit word which specifies the direction and number of vertical line space indices that the paper is to be displaced through paper feed functions in multiples of 1/48th of an inch. In addition, whenever spoke position information is furnished through 7 of the 12 data lines present, a three (3) bit word which specifies the length of the ribbon movement, i.e. character width, and a two (2) bit word defining the level of print hammer intensity for the next character to be printed are also forwarded so that a full twelve (12) bits of information is always provided to the printer unit. Strobe levels to initiate the apropriate action at the printer unit are decoded from the common instruction word bus 20 at the printer interface 27 and forwarded to the printer unit while command completed signals are provided by the printer unit to the status bus 21 to apprise the automatic writing system that a commanded motion has been completed.

The function of printing character information occurs in a serial manner and is accomplished by causing a daisy wheel print element to rotate until the designated character is in an appropriate printing position and thereafter impacting the pedal of the daisy element upon which the designated character resides to cause the character information thereon to be impacted against a carbon ribbon and the document on the carriage roller 5 (FIG. 1) of the printer unit. Any conventional daisy wheel print element having an appropriately spaced print font for the mode of printing selected may be employed; however, due to the repidity with which printing occurs with the instant invention, daisy wheel print elements of the type disclosed in U.S. application Ser. No. 509,195 as filed in the names of R. J. Lahr and Frank M. Weller, Jr. and entitled Proportional-Space Character Print Wheel on Sept. 25, 1974 and U.S. Ser. No. 509,193, as filed in the names of G. Sohl, D. L. Bogert, R. G. Crystal and M. C. Weisberg entitled Composite Print Wheel on Sept. 25, 1974 are preferred.

The daisy wheel print element, as will be appreciated by those of ordinary skill in the art, is a flat disc like member having one spoke or pedal for each character representation thereon. The pedals are impacted in such manner that they are driven transversely to the plane of the disc to impact a ribbon and thereafter the document being prepared. The daisy wheel print element is mounted for rotation on a print carriage which is displaceable along the longitudinal axis of the carriage roller 5 (FIG. 1), and hence, the positioning of the carriage determines the location at which the character to be printed is placed on the document being prepared. Such displacement of the carriage in response to a command strobe and a predetermined increment defined on the twelve (12) data lines forms the second basic motion of the printer unit and, as well known, it is preferable to displace a print element carriage rather than the carriage roller 5 per se due to the lower relative mass thereof. The carriage roller 5 would ordinarily take the form of a fifteen inch roller, although thirty inch rollers and/or pin wheel feed rollers for automatic paper feeding operations are also available.

The third basic function of the printer unit, which is also an independent function enabled by separate control inputs to the printer means 2, is the index or paper movement function which accomplishes the vertical spacing of each character line printed on the document as well as subscripting, superscripting and the like. Thus it will be appreciated that control inputs to the printer means 2 which control the rotation and ultimate positioning of the daisy wheel print element determine what character is printed upon command, the control inputs which control positioning of the print element carriage determine wherein a vertical column of character spaces that character is printed while the control inputs on the printer unit which control the paper indexing or movement functions thereof determine the position of the document at which information such as lines appear as well as super and subscripting which may occur in any given line.

The control inputs which act to initiate each displacement command or basic motion concerning the positioning of the daisy wheel print element, the carriage position and paper indexing are independent of one another and hence in the absence of appropriate commands, automatic escapement does not occur upon the completion of printing of each character nor does automatic paper indexing work at the completion of each line. These features, as shall be seen below, are utilized by the instant invention to achieve more efficient printing operations when the printer is being controlled by a record media. It should further be noted that although a preferred format for the serial printer employed within the instant invention has been set forth, any serial printer or input/output modified typewriting configuration could be substituted therefor without a substantial modification of the instant invention as the same merely represents a preferred form of output peripheral. Additionally, CRT displays with or without an off line printing functions could be readily substituted for the printer peripheral disclosed.

Although reference to the aforesaid U.S. applications and/or manuals directed to the printer unit per se are relied upon herein for a thorough disclosure thereof, the logical inputs and outputs of the printer means 2 are depicted in FIG. 6 so that the interconnection of the printer means to the logical inputs of its interface and the automatic writing system as a whole may be fully appreciated. Therefore, turning now to FIG. 6, there is shown a block diagram schematically illustrating the logical details of a printer unit suitable for incorporation into the embodiment of the automatic writing system depicted in FIG. 2. The printer unit illustrated in FIG. 6 comprises interface logic for the printer unit indicated by the block 305, print logic circuitry indicated by the dashed block 306, carriage logic means 317, carriage servo system means 218, paper feed logic means 321, ribbon lift logic means 323 and end of ribbon sensor means 326. The printer unit interface logic indicated by the block 305 includes appropriate logic and gating circuitry, well known to those of ordinary skill in the art, for raising inputs and outputs applied thereto to appropriate levels and for thereafter distributing such input signals in an appropriate manner corresponding to the nature of such input signals to either the print logic circuitry indicated by the dashed block 306, the carriage logic means 317, the paper feed logic means 321 or the ribbon lift logic means 323. In addition, as described in U.S. Ser. No. 429,479, the interface logic indicated by the block 305 may include means responsive to system clock inputs for gating information in a bi-directional manner therethrough in appropriately timed sequences.

The interface logic indicated by the block 305 is connected along the left-hand portion thereof to a plurality of input and output connectors, which, as indicated in FIG. 6 connected through the twelve bit data cable 25 and the multiconductor control and status cable 24 to the printer interface 27 shown generally in FIG. 2 and more specifically in FIG. 7. More particularly, data lines $DL_0 - DL_{11}$ are connected through the twelve bit data cable 25 to the printer interface 27 and, as shall become more apparent below, receive either twelve (12) bit print information, twelve (12) bit carriage displacement information or twelve (12) bit paper indexing information from the common data bus 19 through the printer interface 27. At the onset, it should be noted that although the common data bus 19 comprises an eight bit wide bus, twelve (12) bit data for application to data lines $DL_0 - DL_{11}$ at the printer unit are assembled at the printer interface 27 by what is in effect, a latching of four bits from a first eight bit word on the common data bus and combining such latched four bits with the next eight (8) bits supplied to the printer interface 27 on the common data bus 19 to effectively form a twelve (12) bit data word for use in the printer unit through a direct application of such 12 bits of information to data lines $DL_0 - DL_{11}$.

The nature of the 12 bits of data supplied to the printer unit through lines $D_0 - D_{11}$ will vary depending upon which of the three printer unit motions are being defined. Thus, if a print command is specified, 7 bits of character information defining, in a two's complement format, the absolute position number of a selected character on the daisy wheel print element will be supplied on data lines $DL_0 - DL_6$ from the common data bus 19 while 3 bits of information, defining the character width for ribbon advance purposes will be supplied on data lines $DL_7 - DL_9$ and the hammer force with which printing is to be implemented is supplied as two bits of information on data lines $DL_{10}$ and $DL_{11}$. Therefore, when character print information is specified, the twelve bits of information supplied to the interface logic on data lines $DL_0 - DL_{11}$ in effect is a combination of three words wherein the first seven (7) bit word supplied on data lines $DL_0 - DL_6$ defines the characters to be printed, the three bit word supplied on data lines $DL_7 - DL_9$ defines the width of the character to be printed for the purposes of advancing the ribbon while the two bit word supplied on data lines $DL_{10}$ and $DL_{11}$ defines the impact or hammer force with which character printing is to be achieved. As stated above, each daisy wheel employed in the exemplary printer unit being discussed may include up to 96 spokes wherein each spoke has a character representation suitable for printing thereon. In actuality, in an English language system, only 88 of such spokes are utilized; however, the seven (7) bit twos complement code supplied on data lines $DL_0 - DL_6$ is more than sufficient to uniquely define each of such spokes with reference to a Zero (0) position on the wheel.

It should be noted that the High Type I printer as supplied by Diablo Systems is equipped with a read only memory which accepts a seven (7) bit ASCII code and transforms this code into a seven (7) bit two's complement code which specifies the absolute position number of a spoke on the daisy wheel. Therefore, as the automatic writing system according to the instant invention supplies a seven (7) bit, two's complement absolute position code directly to data lines $DL_0 - DL_6$, this read only memory within the printer unit is effectively by-passed as the same is unnecessary. Furthermore, as the automatic writing system according to the instant invention may print in either a 12 pitch, 10 pitch or proportionally spaced mode wherein character representations have different widths, a three (3) bit word is married to each character representation defining the width associated therewith. This three bit word is employed within the microprocessor indicatd by the dashed block 16, in a manner to be more fully described below, in furnishing escapement information to the printer unit and is used directly by the printer unit to cause ribbon advancement so that an appropriate new width unit is stationed at the print position prior to character printing. For purposes of the instant invention, units of width for ribbon advance and escapement purposes are defined in terms of 1/60th of an inch and seven definitions of character width varying from two units to eight units are employed depending upon the mode of printing selected. Thus, in a twelve pitch mode of printing, all character representations are printed having a five unit width, in ten (10) pitch all characters are printed using six units of width, while in proportionally spaced modes of operation, character width may vary from two to eight units. Therefore, the three bits of width specified on conductors $DL_7$ - $DL_9$ may vary from two units, defined by a 000 code to eight units defined by the code 110 in binary.

Similarly, to achieve high quality printing, the hammer impact level must vary in accordance with the nature of the character representation being printed. Thus, even in twelve pitch or ten pitch, if an "i" and an "M" character representation were printed with the same force, the "M" might be faintly represented while the same intensity applied to an "i" alphameric character representation might puncture the document being prepared. Therefore, as there are widely varying character representations in uniform pitch print modes and this mode of variation is compounded in proportional spaced printing, four levels of hammer force are employed for printing within the instant invention and supplied to the printer unit on data lines $DL_{10}$ and $DL_{11}$.

When a carriage movement commanded is supplied from the printer interface 27 to the interface logic 305, a twelve bit word which specifies the direction and number of printing spaces or columns through which the carriage is to be displaced, in multiples of an increment equal to 1/120th of an inch are provided through data lines $DL_0$ - $DL_{11}$. For carriage displacement information, data lines $DL_0$ - $DL_{10}$ are employed for the portion of the word actually defining the displacement under such circumstances where only so much character information as is required to define the actual displacement in absolute terms is supplied while the character information supplied on data line $DL_{11}$ represents motion to the right or left wherein a One (1) level residing on data line $DL_{11}$ in association with a carriage displacement command represents motion to the left while a Zero (0) level under these circumstances represents motion to the right.

Similarly, data representing a paper feed or indexing command is also applied as a twelve (12) bit word to data lines $DL_0$ - $DL_{11}$ under conditions wherein the information present on data lines $DL_0$ - $DL_{10}$ represents the indexing displacement commanded while the data present on data line $DL_{11}$ represents the direction through which indexing is to occur under such conditions that a One (1) level on data line $DL_{11}$ represents a reverse index operation, i.e. paper down, while a Zero (0) level on conductor $DL_{11}$ represents paper indexing in the normal direction implemented upon a carriage return operation or the like. For paper indexing operations, only so much bit information is necessary to specify the actual displacement is applied to data lines $DL_0$ - $DL_{10}$ and for the purposes of paper indexing, increments of displacement equal to 1/48th of an inch are employed to represent the increment of displacement. Thus, regardless of which of the three basic motions are being commanded, all data directed to the printer as present on the common data bus 19, is assembled at the printer interface 27 into twelve (12) bits of word information and is applied through the twelve (12) bit data cable 25 on data lines $DL_0$ - $DL_{11}$ to the interface logic indicated by the block 305 for further distribution to the various subsystems within the printer unit.

The various control inputs applied to the printer unit from the printer interface 27 and the various status outputs supplied thereby to the printer interface are conveyed through the multiconductor cable 24. More particularly, as shown in FIG. 6, the interface logic indicated by the block 305 receives five input conductors from the printer interface 27 and supplies five output indications thereto. The input conductors present within the multiconductor cable 24, as indicated in FIG. 6, are annotated character strobe, carriage strobe, paper feed strobe, ribbon action and restore. These input conductors serve to provide the printer unit with the following information:

Character strobe — A signal used to sample the print information provided on data lines $DL_0$ - $DL_{11}$. The print information supplied comprises a seven (7) bit word on data lines $DL_0$ - $DL_6$ defining in a two's complement format, the absolute spoke position number on the daisy wheel print element of the next character to be printed, a three (3) bit word, presented on data lines $DL_7$ - $DL_9$, which specifies the width of the character for use in defining the length of ribbon movement and a two (2) bit word presented on data lines $DL_{10}$ and $DL_{11}$ which defines the level of print hammer intensity for the next character to be printed.

Carriage Strobe — A signal used to designate and cause sampling of a twelve (12) bit carriage displacement command supplied on data lines $DL_0$ - $DL_{11}$ wherein the information contained on data lines $DL_0$ - $DL_{10}$ defines the displacement distance in increments of 1/20th of an inch while the level of data line $DL_{11}$ defines direction.

Paper Feed Strobe — A signal used to designate and cause the sampling of a twelve (12) bit paper feed command presented on data lines $DL_0$ - $DL_{11}$ wherein the bit content of data lines $DL_0$ - $DL_{10}$ defines the metes and bounds of the displacement through which indexing is to occur in increments of 1/48th of an inch while the level on data line $DL_{11}$ defines the direction in which incrementing is to occur.

Ribbon Action — A signal employed to control the position of a carbon or cloth ribbon between an up print position and a down position where the ribbon does not have a tendency to obscure the operator's view of the print location.

Restore — A signal employed to set the daisy wheel print element, the print element carriage and the various logic registers to initial conditions, such as when a system is initially energized or reset.

Additionally, athough only five control input conductors have been provided to the printer unit in the instant embodiment of the invention being described, it will be appreciated by those of ordinary skill in the art that additional inputs could be supplied if additional printer functions were desired. For instance, in a printer having the capability of employing a two or more color ribbon, a ribbon logic input could be supplied to designate the level to which the ribbon is raised to control the portion of the multicolor ribbon which is impacted during printing.

The five status outputs provided by the printer unit to the printer interface 27 are indicated in FIG. 6 as including the conductors annotated printer ready, character ready, carriage ready, paper feed ready, and end of ribbon. These conductors within the multiconductor cable 24 are utilized to perform the following functions:

Printer Ready — A conductor whose level is utilized to indicate that the printer is properly supplied with power.

Character Ready — A line whose signal level is utilized to indicate that the printer is in a ready condition to accept a character command.

Carriage Ready — A conductors whose signal level is utilized to indicate that the printer is ready to accept new carriage displacement commands.

Paper Feed Ready — A conductor whose signal level is relied upon to indicate that the printer is ready to accept new paper feed commands.

End of Ribbon — A sensor initiated indication utilized to provide the operator with an indication that the end of ribbon is near. This indication, which may be provided through audible and/or visual indicia means, may occur, for example, when a point at the ribbon is reached where only sufficient ribbon is left to permit the printing of approximately 3,000 characters. Thereafter, a second indication may be provided when sufficient ribbon for approximately 1,250 characters remains and this second indication could be continuously provided to the operator so that machine operation could be terminated at a convenient location and the ribbon changed. Additionally, automatic shut down may be provided in response to this indication when the actual end of ribbon is reached.

Although only five status output conductors have been illustrated in FIG. 6, it will be appreciated that additional status conductors may be employed to monitor additional status conditions at the printer. For instance, a microswitch may be employed to indicate whether or not paper has been loaded at the printer unit and the output condition of such microswitch may be taken from the interface logic indicated by the block 305 and placed on a separate status conductor for application to the printer interface 27. Similarly, a check condition output conductor may be employed to indicate whether a previously supplied instruction has been appropriately implemented or a malfunctions has occurred. If such a check status output is utilized, the output thereof would ordinarily only be capable of being superceded by restore printer input which would act to initialize the printer means 2 and hence clear the malfunction. Accordingly, it will be appreciated that the printer unit depicted in FIG. 6 receives all data inputs supplied thereto from the printer interface 27 on data lines $DL_0 - DL_{11}$ while control inputs are supplied to the printer unit and the status outputs are supplied by the printer unit to the printer interface 27 through individual ones of the conductors within the multiconductor cable 24. The data inputs supplied to the printer unit originate from the common data bus 19, the control inputs supplied to the printer unit derive from commands present on the common instruction word bus 20 while the status outputs provided by the printer unit result in appropriate status indication on the common status bus 21. The manner in which this data is manipulated through the system, will become more apparent below in connection with the description of the printer interface 27 as described in detail in conjunction with FIG. 7.

The interface logic indicated by block 305 is connected through multiconductor cables 327 - 331 to the print logic circuitry indicated by the dashed block 306, the carriage logic means 317, the paper feed logic 321, the ribbon lift logic means 323, and the end of ribbon sensor means 326. The multiconductor cables 327 - 329 are employed, to convey data, control, and status information between the interface logic indicated by the dashed block 305 and the basic printer motion functional logic blocks 306, 317, and 321; while the multiconductor cables 330 and 331 are relied upon to convey a control or status level intermediate the interface logic block 305 and the ribbon lift logic 323 or the end of ribbon sensor means 326. For instance, all data present on data lines $DL_0 - DL_{11}$ is loaded into an appropriate register at one of the logic blocks 306, 317 or 321 only in response to the application of control information to one of the control conductors annotated character strobe, carriage strobe, or paper feed strobe. Thus, if it is assumed that a twelve (12) bit character information code defining a unique character, the width of the character and the hammer force required for a printing of the character is applied through data lines $DL_0 - DL_{11}$, this twelve (12) bit code will be loaded into register means within the print logic circuitry indicated by the dashed block 306 upon the occurrence of a character strobe. Thereafter, the three basic words within the twelve (12) bit code associated with character information will be divided in such a manner that the seven (7) bit word uniquely defining the character to be printed, as originally forwarded on data lines $DL_0 - DL_6$, will be supplied to print wheel logic while the three bit word defining appropriate ribbon width for the character to be printed will be supplied to ribbon level encoder logic to thus cause, in a manner to be described below, the displacement of the daisy wheel print element to position the appropriate spoke for the character to be printed at the print position while the ribbon is displaced to present a sufficient amount of new ribbonto accommodate the printing of this character. Both ribbon and print wheel displacements are initiated in a virtually simultaneous manner and after both of such displacements have been successfully completed, the print hammer is fired with force defined by the two bit word, originally conveyed on data lines $DL_{10}$ and $DL_{11}$.

Upon the successful completion of the printing operations specified, a ready signal will be conveyed from the print logic circuitry indicated by the dashed block 306 through the multiconductor cable 327 so that a character ready indication may be applied to the printer interface 327 through the appropriately annotated status conductor at the interface logic indicated by block 305. Similarly, when a carriage motion instruction is presented to the printer unit, the distance in multiples of 1/120th of an inch are applied from the printer interface 27 to be eleven low order data lines $DL_0 - DL_{10}$ while the direction of the displacement in indicated by the condition of the bit applied to the high order data line $DL_{11}$. This information is loaded in parallel through the multiconductor cable 328 into a register therefor in the carriage logic means 317 upon the occurrence of a carriage strobe on the appropriately annotated control conductor. After the displacement instruction has been processed by the carriage logic and the carriage displaced a distance equal to that specified by the data character applied to the data lines $DL_0 - DL_{10}$, in a direction specified by the condition of data $DL_{11}$, an operation completed indication is supplied from the carriage logic means 317 through the multiconductor cable 328 to the interface logic 305 and is applied therefrom to the carriage ready status conductor connected through the control cable 24 to the printer interface means 27. The carriage ready status indication may be subsequently supplied to the common status bus 21 so that the microprocessor indicated by the dashed block 16 is apprised that the next program may be initiated.

In like manner, when an eleven (11) bit paper displacement increment is applied to the data lines $DL_0 - DL_{10}$ and the direction in which such displacement is to occur is indicated on data line $DL_{11}$, this twelve (12) bit paper displacement data is loaded in parallel into a register present within the paper feed logic means 321 upon the application of a paper feed strobe to the interface logic 305 on the appropriately annotated conductor. Thereafter, the paper displacement instruction is implemented by the paper feed logic means 321 and upon the completion of the command, a paper feed ready signal is conveyed through the multiconductor cable 329 to the interface logic 305 for application to the appropriately annotated paper feed ready output conductor so that such status condition is applied to the printer interface 27 and subsequently to the common status bus 21. Thus, the operation of the printer unit depicted in FIG. 3 is such that data is conveyed from the common data bus 19 to the data line inputs $DL_0 - DL_{11}$ of the printer unit, and gated to the appropriate circuitry which responds thereto upon the application of a command signal in the form of a strobe pulse issued by the read only memory 80 and conveyed through the common instruction word bus 20. Upon the appropriate completion of the command, a status indication is provided by the printer unit to indicate that such command has been successfully completed whereupon the next step of the program sequence then in process may be initiated. In a typical printing sequence, as shall be seen more in detail below, a displacement command is issued to the printer unit which causes the carriage to displace a distance which is equal to one half (½) the width of a previously printed character plus one half (½) the width of the new character to be printed plus any intervening space code character or the like. Thereafter, a print command is issued to cause the newly selected character to be printed and the print sequence is terminated. Additionally, as will be appreciated by those of ordinary skill in the art, prior to the issuance of any command to the printer unit, the appropriate status conditions associated with the command to be issued are tested and the command actually issued by the microprocessor only occurs once the peripheral in this case the printer unit, has indicated on the status bus that it is ready to accept a new command for a specified function.

Although the printer unit is described in great detail in U.S. appln. Ser. No. 229,314, supra and the additional materials and manuals recited herein, a brief description thereof will be set forth to acquaint the reader with the operation of FIG. 6 as well as the simplified modifications applied to the printer to better accommodate its insertion within the instant invention. The print wheel logic circuitry indicated by the dashed block 306 controls all functions of the printer associated with the basic motion of displacing the daisy wheel print element so that a selected character is placed in a print position, and printed. The print logic circuitry indicated by the dashed block 306 is connected to the interface logic 305 through the multiconductor cable 327 and comprises print logic means 333, print wheel logic means 334, print wheel servo means 335, ribbon level encoder means 337, hammer level encoder means 339, and driver means 340 - 342. The print logic means 333 is connected through the multiconductor cable 320 to the interface logic 305 and serves as a buffer and control means between information forwarded from the interface logic 305 to the remaining elements within the print logic circuitry indicated by the dashed block 306, to appropriately sequence the operation of the hammer level encoder means 339 with respect to the print wheel logic 334 and the ribbon level encoder means 337 and additionally serves to convey status information, in the form of a character ready input, to the interface logic 305 upon the appropriate completion of a character print operation.

More particularly, focusing for the moment on actual data applied to the interface logic indicated by the block 305 on conductors $DL_0 - DL_{11}$, the printer logic means 333 may be viewed as receiving each bit of data therefrom each time a twelve (12) bit character is presented and hence may be viewed as containing a twelve (12) bit buffer store for loading the bit information received on conductors $DL_0 - DL_{11}$ whenever a character strobe is received. Alternatively, the interface logic per se may contain a buffer store in which case the twelve (12) bits of data applied on conductors $DL_0 - DL_{11}$ would be appropriately gated through the print logic means 333 upon the receipt of a character strobe at the interface logic indicated by the block 305. An appropriate gating arrangement for this purpose may comprise either twelve (12) AND gates arranged to be commonly enabled by the character strobe and convey the individual bits of data from lines $DL_0 - DL_{11}$ therethrough or a multiplexer device similar to those described above. In any event, the print logic means 333 functions with respect to data received on data lines $DL_0 - DL_{11}$ to receive such data upon the arrival of a character strobe which identifies that data as appropriate for the print logic circuitry indicated by the dashed block 306 and divide the bits therein in an appropriate manner among the ribbon level encoder means 307, the print wheel logic means 334, and the hammer level encoder means 339. As was previously described, each twelve (12) bit character applied on data lines $DL_0 - DL_{11}$ which conveys character print information effectively comprises three (3) words within a first word as present on data lines $DL_0 - DL_6$ contains a seven (7) bit word actually defining the character to be printed according to a two's complement format. This seven (7) bit word would be applied to the print wheel logic through multiconductor cable 343 which would contain at least one conductor for each of the seven (7) bits of data to be conveyed plus additional conductors which are necessary to provide control information, as shall be seen below.

In a similar manner, data lines $DL_7 - DL_9$ would contain a three (3) bit word defining character width each time a twelve (12) bit character associated with a print command is forwarded. Therefore, upon the arrival of a character strobe, this three (3) bit word would be conveyed through the print logic means 333 through the multiconductor cable 344 to the ribbon level encoder 337 which will function in response thereto to displace an appropriate amount of ribbon to enable the character defined to be printed. The multiconductor cable 344 would contain at least one conductor for each bit of information to be conveyed therethrough plus at least an additional control conductor so that a completion of the ribbon displacement operation may be indicated. Finally, data lines $DL_{10}$ and $DL_{11}$, under these conditions, would contain a two (2) bit word defining the force with which the character defined is to be printed. This information would be conveyed through the print logic means 333 through the multiconductor cable 345 to the hammer level encoder means 339 which would respond thereto to initiate hammer displacement for printing purposes at an appropriate force or velocity upon receipt of a triggering signal.

The multiconductor cable 345 would thus contain at least one conductor for each of the two bits of information to be provided to the hammer level encoder means 333 plus at least one additional control conductor through which a triggering signal is supplied. Thus, with respect to data supplied for print purposes on the data lines $DL_0 - DL_{11}$, the print logic means 333 will respond thereto in the presence of a character strobe input to appropriately distribute the three words therein to the ribbon level encoder means 337, the print wheel logic means 334 and the hammer level encoder means 339 so that the same may be acted upon. Additionally, the print logic means 333 performs the control function of supplying a triggering level to the hammer level encoder means 339 upon the completion of the print wheel and ribbon displacements, as aforesaid, and thereafter provides a control level through the multiconductor cable 327 to the interface logic block 305 so that a character ready status level may be provided at the output thereof to indicate that new character information may be supplied to the printer unit.

Both the ribbon level encoder means 337 and the print wheel logic 335 will convey through the multiconductor cables 344 and 343 a signal to the print logic means 333 indicative that the displacements associated therewith have been completed. These signals may be ANDed at the print logic means 333 according to conventional logic techniques to provide a triggering level to the hammer level encoder means 339 to effectively fire the hammer and cause printing to occur. Thereafter, the print logic means 339 would supply a character ready indication to the interface logic block 305 so that a ready status for character information may be presented thereby on the common status bus assuming the same is appropriately gated. Although a multitude of logic techniques may be employed to obtain the triggering signal followed by a character ready signal which occurs at a time which is sufficiently removed from that of the triggering signal to assure that the hammer firing operation has been completed, a preferred technique may take the form of the triggering of a monostable multivibrator by an ANDing of the ribbon displacement and print wheel displacement completed signals which act to trigger the hammer and thereafter, upon a termination of the duty cycle of the monostable multivibrator, the changed state of the monostable could be employed as an enabling level to a gate controlling the outputting of the character ready status level from the interface logic.

In the Diablo Model 1200 High Type I printer, as supplied from the factory, there is present an absolute print wheel address read only memory, a present position counter, and a logic and difference counter for providing an indication of the difference in terms of both magnitude and direction between the address read from the absolute print wheel address read only memory and the present position counter. Because the instant invention directly supplies a seven (7) bit character defining the character to be printed in a two's complement format, the absolute print wheel address read only memory may be bypassed and hence, the print wheel logic means indicated by block 334 may be viewed as including only the present position counter and a logic and difference counter for providing an indication of the difference in terms of both magnitude and direction between the seven (7) bit address supplied to the print wheel logic means 334 from data lines $DL_0 - DL_6$ and the print wheel position indicated by the present position counter. Upon the occurrence of a character strobe at the control input to interface logic 305, the seven (7) bit, two's complement code designating a particular character is supplied through the multiconductor cable 343 to the print wheel logic means 334 and more particularly is applied in parallel to the logic and difference counter which also receives a seven (7) bit output from the present position counter present within the print wheel logic 334. The present position counter present within the print wheel logic 334 is utilized to maintain a count indicative of the actual position of the daisy wheel print element due to previous rotations therein in previous printing cycles. Thus, assuming a 96 character print wheel, the absolute print wheel address will designate the rotation coordinates of the character to be printed with respect to a home position while the present position counter will provide an output signal designating the present coordinates of the print wheel.

These two outputs are applied to the logic and difference counter where they are subtracted and an output indicating the shortest rotational movement to place the print wheel in a position where the desired character resides, as specified by the seven (7) bit word presented on data lines $DL_0 - DL_6$ is provided at the output thereof. As will be readily appreciated by those of ordinary skill in the art, the shortest rotational distance to achieve appropriate daisy wheel print element positioning may be obtained by taking both the difference and complemented difference between the inputs of the present position character and the characters supplied on data lines $DL_0 - DL_6$. Thereafter, the smallest value between the actual difference count and the complemented count is selected to represent the magnitude of the displacement where the actual difference is utilized to represent rotation of the print wheel in one direction, i.e., clockwise, and the complemented difference is utilized to indicate rotational movement in the opposite direction. Thus, the logic and difference counter provides a pair of output signals wherein one such signal is indicative of the magnitude of the rotation through which the print wheel is to be driven while the other such output is indicative of the direction in which rotation is to occur. Furthermore, as the present position counter is continuously incremented as the daisy wheel print element is rotated, it will be appreciated by those of ordinary skill in the art that the magnitude of the output from the logic and difference counter will continuously diminish as the daisy wheel print element is rotated toward a defined position. Due to the manner in which the print wheel logic initially specifies the direction and magnitude of the displacement through which the daisy wheel print element is to be rotated and thereafter provides a continuously diminishing signal representing the remaining necessary displacement, the output of the print wheel logic may be utilized to initiate and control the displacement of the print wheel driver as well as providing for an operation completed signal and other necessary housekeeping signals when the designated print position is obtained. For these reasons, the output of the print wheel logic means 334, as well will be more fully appreciated upon a review of U.S. application Ser. No. 229,314 supra and the additional applications and manuals cited herein, may be used to develop a velocity signal indicating various velocities for large displacements and a level control signal for precisely centering the print wheel at a desired location. These signals are applied through multiconductor cable 346 to the print wheel servo which responds thereto to actually displace the daisy wheel print element in accordance with the velocity and control signals supplied and acts to update the position information maintained within the present position counter of the print wheel logic means 334 as the displacement occurs. As will be appreciated by those of ordinary skill in the art, when the count of the logic and difference counter present within the print wheel logic means 334 becomes zero, indicating that the daisy wheel print element has been rotated to the defined print position, this zero level may be applied through conductor 343 to the print logic means 333 to indicate that the print wheel displacement operation has been successfully completed and may be employed as an input to an AND gate for developing the triggering level for the hammer firing signal.

Although any suitable servo system may be employed for the print wheel servo means 335, it is preferred that the servo systems disclosed in U.S. pat. applns. Ser. Nos. 157,283 and 71,984 to A. Gabor and referred to in U.S. appln. Ser. No. 229,314, supra, be employed because this form of servo system provides an extremely rapidly responding and positively acting servo system for placing the print wheel in a designated position without any overshoot. The multiconductor cable 346 may comprise a plurality of conductors which are utilized to convey direction and magnitude information in terms of a velocity command and level control to the print wheel servo means 335. In addition, the multiconductor cable 346 includes an additional conductor which conveys displacement information from the print wheel servo means 335 to the print wheel logic means 334 so that such displacement information may be utilized to increment the present position counter therein whereupon the present position is continuously updated and maintained in a curren tate to reflect the actual position of the daisy wheel print element being rotated.

The output of the print wheel servo means 335 is connected through a conductor 347 to the print wheel driver means 341. The print wheel driver means 341 may take the form of a conventional motor driver circuit which responds to the magnitude and polarity of an input signal applied thereto to cause a motor to rotate a shaft in a direction indicated by the polarity of the input and at an instantaneous velocity representative of the magnitude of such input. The print wheel, may be axially mounted on the motor shaft and rotates with the motor although gearing arrangements therefor are readily available. Thus, the print wheel logic means 334, the print wheel servo means 335, and the print wheel driver means 341 act in conjoint to appropriately position a daisy wheel print element at a position so that the character defined by the seven (7) bit code supplied on conductors $DL_0$ - $DL_6$ during a print command is placed in an appropriate position for impacting by a hammer and hence printing.

The ribbon level encoder means 337, receives as aforesaid, the three bit word from the multiconductor cable 344 which defines the character width as originally specified on data lines $DL_7$ - $DL_9$ by the character information specified thereon during a print instruction. The ribbon level encoder means 337 may therefor take any conventional form of level encoder which responds to a three bit input to provide one of up to eight (8) analog levels or alternatively, pulse sequences, depending upon the input level supplied thereto. As well known to those of ordinary skill in the art, the three bit input supplied thereto on the multiconductor cable 344 may define increments varying from 0 to 7 wherein a zero (0) is not employed but instead is relied upon to indicate a deenergized condition while input levels 1 - 7, are responded to by the ribbon level encoder means 337 to provide seven (7) discrete levels of ribbon advance which may be characterized for the purposes of the instant invention as varying from two (2) increments to eight (8) increments of ribbon displacement. Thus, depending upon the input levels supplied to the ribbon level encoder means 337, an analog output level, a series of pulses, or a decimal output indication varying from 2 to 8 increments through which the ribbon is to be displaced is applied to the multiconductor cable 348 connected to the ribbon motor driver means 342. The ribbon motor driver means 342 may take the form of a conventional amplifier or driver apparatus which acts in the well known manner to apply the level encoder output of the ribbon level encoder means 337 to a stepper motor means after raising the same to a suitable magnitude to drive the stepper motor. The stepper motor may here be viewed as displacing the printer ribbon one increment for each output level, pulse of decimal level provided by the ribbon level encoder means 337 so that the ribbon on the printer is displaced a suitable amount for printing the character defined on data lines $DL_0$ - $DL_6$. In twelve pitch printing operations, five increments of ribbon advance are employed, in ten pitch printing operations, six increments of ribbon displacement are employed while in proportional spaced printing operations, from two to eight increments of ribbon advance will be employed depending upon the width of the character to be printed. Upon the completion of the incrementing of the ribbon by the ribbon stepping motor, a signal is supplied from the ribbon level encoder means 337 through the multiconductor cable 344 to the printer logic means 333. This ribbon advance completed indication may be provided as a function of the output of the stepper motor per se, or as a function of a suitably timed interval which assures that the ribbon incrementing function has been completed. At any rate, the print logic means 333 receives an indication from both the ribbon displacement circuitry indicated by the blocks 337 and 342 and a print wheel displacement completed indication from the circuitry indicated by the blocks 334 and 335 indicative that the functions of print wheel displacement and ribbon incrementing for a given character have been completed thereby. Both of these function completed signals are ANDed at the print logic means 333 and employed to develop a hammer fire signal, as aforesaid.

The two (2) bit word initially supplied for each character on data lines $DL_{10}$ and $DL_{11}$ associated with the hammer force with which a given character is to be printed are supplied from the print logic means 333 through the multiconductor cable 345 to the hammer level encoder means 339. The hammer level encoder means 339 may take the form of a digital to analog converter, digital to pulse converter or digital to decimal converter of the conventional varieties mentioned anent the ribbon level encoder 337 and its function is to provide one of four levels which act to define the force with which the hammer is to be impacted in the printing operation to be initiated. As will be appreciated by those of ordinary skill in the art, the two bit word defining the hammer force supplied on data lines $DL_{10}$ and $DL_{11}$ may act to define up to four (4) discrete levels and all four of such levels are employed within the instant invention to control the velocity with which a hammer in the form of a piston is driven against the spoke on the daisy wheel print element which has been positioned for a given printing operation. The output of hammer level encoder means 339 is applied through the multiconductor cable 349 to the hammer coil driver means 340. The hammer coil driver means 340 may take the conventional form of a relay driver which provides an appropriate input to an armature which is arranged to impact a portion of a piston-like print hammer whenever an input signal is applied thereto. The print hammer, as will be appreciated by those of ordinary skill in the art, when impacted by the armature of the relay, will be driven forward to drive the selected daisy element from the plane of the print wheel and into engagement with a carbon or cloth ribbon and the document upon which printing is taking place. The actual application of the output of the hammer coil driver 340 to the solenoid does not occur until a triggering level is supplied to the hammer coil driver means 340 through multiconductor cables 345 and 349 from the print logic means 333. This triggering level is provided as a function of the print wheel positioning and ribbon displacement completed signals provided thereto so that the triggering of the hammer does not occur until the daisy wheel print element has been appropriately positioned to the desired character location and the ribbon incremented to assure appropriate printing will take place. Once triggered, the hammer coil driver means 340 will apply a pulse to the solenoid to cause the same to actuate the piston-like print hammer. The duration of the pulse is controlled by the output of the hammer level encoder 339 which may directly control the duration of the pulse produced by the hammer coil driver 340 or may alternatively act to superimpose a velocity level on the back porch of such pulse so that the initial driving force applied to the piston-like print hammer is uniform in each case, however, the velocity signal applied thereto at a moment before impact, will vary as a function of the output of the hammer level encoder means 339. In this manner, an appropriate hammer force which is uniquely suited to the particular character to be printed is supplied to the hammer coil driver means 340. Thus, the printing of alphanumeric characters such as ".", "1", "i" and the like, generally require a print stroke of a first duration while the printing of characters occupying substantially more area such as "M", "N" and the like require substantially longer print strokes. Thus the instant invention defines four levels of print strokes and furnishes one of such levels for each character to be printed with the character information furnished to the printer unit.

After the expiration of a suitable interval following the issuance of a hammer trigger signal by the print logic means 333, a signal is applied through the multiconductor cable 327 which causes the interface logic means 305 to provide a character ready status output on the appropriate conductor for application to the printer interface means and subsequent application to the common status bus 21 on a demand basis. The hammer trigger level output by the print logic means 333 may be issued as a function of the ANDing of completion signalsfrom the ribbon drive and print wheel servo apparatus and a result of the ANDing of these two levels may be employed to trigger a monostable flip flop. Upon the termination of the duty cycle of the monostable flip flop, the output thereof may also be ANDed with the completion signals from the print wheel servo and the ribbon motor driver to assure that each of the three functons provided by the print logic circuit indicated by the dashed block 306 are in a completed condition prior to the issuance of a character ready status indication by the interface logic block 305. Thus it will be appreciated that when a three word character associated with character printing is applied to data lines $DL_0 - DL_{11}$ and a character strobe is applied to the interface logic indicated by the block 305, the print logic circuitry indicated by the dashed blocks 306 responds to each of the words therein to cause printing of the character to occur. More particularly, in response to the seven (7) bit word defining the character to be printed the daisy wheel print element is displaced to position the character defined in an appropriate print position and a suitable length of ribbon is displaced by the ribbon stepping motor so that an appropriate portion of new ribbon will be made available to the character to be printed. After both of these operations are completed, a piston-like print hammer will be triggered to cause printing and the force or duration of the impact will be controlled by the hammer force specified on data lines $DL_{10}$ and $DL_{11}$ so that an appropriate hammer force for the character defined will be employed during the printing operation. Accordingly, the printer unit illustrated in FIG. 6 responds to character print data and a character strobe to accept the characterinformation, the ribbon displacement information and the hammer force informaton contained therein and thereafter acts to independently cause the printing of the character defined and subsequently acts to apprise the microprocessor through an appropriate indication on the status bus that printing has been satisfactorily completed.

The carriage logic means 317, the carriage servo means 318 and a carriage motor driver 351 together with the carriage motor connected thereto may each take the same form as the corresponding elements associated with the daisy print wheel element. This position is taken because a similar logically controlled servo system may be employed to control the rotational displacement of the print wheel may be employed to achieve the longitudinal displacement of the daisy print wheel element carriage. The only exceptions being that the carriage logic may be substantially simplified as it need not perform as many functions nor need it perform as complex a position designating function and the rotational motion of the shaft of the carriage motor must be translated into longitudinal motion through a cable driver or through other conventional techniques well known to those of ordinary skill in the art. More particularly, as the carriage logic means 317 receives a twelve (12) bit input wherein the high order bit designates the direction in which travel is to occur, i.e, right or left, while the lower eleven order bits designate the distance to be travelled in increments of 1/120th of an inch, the displacement data applied to the carriage logic means 317 may be directly loaded into a register. Thereafter, the register may be counted down in response to increment of movement pulses supplied by the carriage servo means 318 and hence the present location counter employed in the print wheel logic 111 may be avoided. Thus, when twelve (12) bit carriage displacement information is loaded onto data lines $DL_0 - DL_{11}$ and a carriage strobe is applied to the appropriately annotated conductor in a multiconductor cable 24, the lower eleven (11) bits on data lines $DL_{10} - DL_0$ are loaded into a register in the carriage logic means 317 while the directional information contained in the high order bit may be used to set a flop or the like. The carriage servo means 318 may take precisely the same form as the print wheel servo means 335 and hence, when the output of the carriage logic means 317, which represents a magnitude equal to the setting of the register therein is applied through multiconductor cable 352 to the carriage servo means 318, the carriage servo means 318 will cause the energization of the carriage motor driver 351 and the carriage motor so that the carriage will be displaced in a direction determined by the setting of the flip flop, at a rate representative of the magnitude of the setting in the register present in the carriage logic means 317. As the carriage is displaced, the carriage servo means 318 will apply pulses through the multiconductor cable 352 to the carriage logic means 317 representing each increment of motion through which the carriage is displaced. These pulses are utilized to count down the register originally set by the displacement magnitude applied to data lines $DL_{10}$ - $DL_0$ and hence the state of the count in the register continuously represents the remaining distance through which the carriage must be displaced to achieve the displacement originally set on data lines $DL_{10}$ - $DL_1$. When the state of the register in the carriage logic means 317 has been decremented to a zero condition a carriage ready pulse is applied through the multiconductor cable 328 to the interface logic 305 so that a carriage ready status indication may be applied to the carriage ready conductor indicated and subsequently to the common status bus 21. It should be noted however, that as the instant printer means does not employ physical margin detents or other physical stops, circuitry external to the printer must be utilized to keep track of the position of the carriage and prevent the motion thereof when a margin zone setting would be exceeded by a carriage displacement command. This function, however, is provided by the RAM peripheral 34 in combination with the operations of the microprocessor 16.

Thus, it is seen that when a twelve (12) bit carriage displacement character is applied to data lines $DL_{11}$ - $DL_0$ and a carriage strobe is applied to the appropriately annotated conductor at the interface logic 305, the displacement character will be loaded into the carriage logic means 317 and utilized to control the carriage servo means 318 which energizes the carriage motor driver 351 to thereby cause the displacement of the carriage while each increment of displacement of the carriage while each increment of displacement of the carriage is applied from the carriage sero means 318 to the carriage logic means 317 to decrement the register therein. Accordingly, when the register within the carriage logic means 317 has been decremented to a zero count and the carriage has been displaced to the full extent designated, the carriage logic means 317 provides an appropriate carriage ready status indication to the interface logic 305. It should additionally be noted that the input required to cause carriage displacement does not in any manner derive from those associated with the positioning of the daisy print wheel element and hence in the absence of appropriate commands, no automatic escapement will operate. In the foregoing manner, the carriage position of the printer may be moved on a continuous basis to any column position in a line with which printing is normally associated and it should be noted that unlike conventional input/output typewriter apparatus, the movement of the carriage from one position to the next is not an incremental unit, but is continuous so that carriage shifting is accomplished at a maximum available speed. Carriage escapement, like ribbon advance described in conjunction with a print command will be generally uniform when printing is occurring in either a 10-pitch or 12-pitch mode; however, for proportional spaced modes of operation, the escapement associated with each character will vary depending upon the incremental width assigned to that character. Furthermore, to accommodate proportional spaced modes of printing, the commands issued to the printer unit, as aforesaid, are such that the printer unit is caused to escape a distance equal to one half the incremental width of the previous character printed plus one-half the incremental width of the next character to be printed and thereafter an actual print command is initiated. At this juncture, no further escapement command is provided until a new print cycle occurs unless a 100ms delay expires prior to the entry of a new character to be printed. At this juncture, the microprocessor assumes something has occurred to interrupt an input operation and therefor, to provide the operator with a synthesized version of the familiar escapement of a typewriter, a displacement of one-half the incremental value employed in 12-pitch operations is added to the incremental value of the previous character printed, and this escapement value is forwarded to the printer unit so that it appears to an operator as if the printer unit has escaped in the familiar typewriter fashion and has stopped at a location where the entry of new character information may occur. However, in proportional modes of operation, if the next character entered after the interruption does not have an incremental value equal to the uniform incremental value in 12-pitch modes of operation, the microprocessor will effectively subtract one-half the incremental value assigned to that character from the one-half incremental value of a 12-pitch unit previously utilized and cause the daisy wheel print carriage to move either in a forward or reverse direction to achieve appropriate positioning prior to the actual printing of character information. Since the varying escapement, ribbon advance motions, and hammer impacting levels employed within a proportional spaced mode of operation are quite diverse, exemplary values for one typical proportionally spaced print font have been set forth in Appendix F so that the same may be viewed for exemplary purposes by a reader; however, it will be appreciated by those of ordinary skill in the art, that any desired print font may be designed and appropriate hammer force, escapement and ribbon advance functions assigned thereto.

The paper feed logic means 321, like the carriage logic means 317, accepts a twelve (12) bit movement command which in this case represents the upward or downward indexing of the paper. The high order bit supplied on data line $DL_{11}$ represents the direction in which movement is to take place while the data character presented on data lines $DL_{10}$ - $DL_0$ represents the displacement to be implemented in increments of 1/48th of an inch or ¼th of a print line advance. This enables superscripts and subscripts to be automatically achieved, as well as the automatic positioning of the document to a first line position which is exceedingly useful when continuous paper forms are employed or when the operator merely loads the document so that the top of the document is indexed with the top of the document carrier and thereafter proper indexing of the paper to a first line position is automatically achieved. The paper feed logic 321, like the carriage logic 317, includes a register in which the displacement information represented by low order bits on data lines $DL_{10}$ - $DL_0$ are inserted, upon the appearance of a paper feed strobe at the interface logic block 110. Similarly, the direction input present on data line $DL_{11}$ may be employed to set a flip flop. However, for paper feed advance no servo system is employed to achieve movement, but rather a paper feed motor, as indicated in FIG. 3, which takes the form of an incremental stepping motor is relied upon. Therefore, the setting of the register within the paper feed logic 321 enables clock pulses to be applied from the paper feed logic 321 through a conductor 354 to a paper feed driver 355. Each clock pulse so applied to the paper feed driver 355 is raised to an appropriate logic level and is applied through a conductor 356 to the paper feed motor indicated. Each pulse applied to the paper feed motor will cause the paper feed motor to step thereby causing the roller 5 to step and hence index the paper in an upward or downward direction, an amount equal to such step. As each pulse is applied by the paper feed logic means 321 to the paper feed driver 355 through conductor 354, the pulse is also employed to decrement the register in which the paper indexing displacement has been loaded. Thus, as will be appreciated by those of ordinary skill in the art, clock pulses will be applied to the paper feed driver 355 and to the paper feed motor to continuously cause the stepping thereof and hence the appropriate indexing of the document until the register present in the paper feed logic means 321 is decremented to zero.

When the register present in the paper feed logic means 321 is decremented to zero to thereby indicate that the displacement indicated by the low order bits supplied thereto by data lines $DL_{10}$ – $DL_0$ has been achieved, the flip flop indicative of the direction in which the indexing occurred is reset and a paper ready status indication is supplied through the multiconductor cable 329 for application to the paper feed ready conductor present within the multiconductor cable 24. In this manner, an indication to the printer interface 27 for subsequent application to the common status bus 21 is supplied to provide an indication to the microprocessor indicated by the dashed block 16 that the next step in the program sequence may be initiated The direction in which the motor is stepped and hence the paper is indexed may be controlled by the polarity of the pulses applied on conductor 356 to the paper feed motor. This is controlled, as will be appreciated by those of ordinary skill in the art by the setting of the flip flop which responds to the high order bit present on data line $DL_{11}$.

The sequence in which instructions associated with a paper movement command are applied to the printer unit is as follows, initially a twelve (12) bit data displacement character is applied to the data lines $DL_{11}$ – $DL_0$, thereafter a paper feed strobe is applied to the appropriately annotated input conductor on the interface logic block 305 whereupon the paper displacement character is loaded into the paper feed logic register 321, paper displacement is then caused in response to pulses applied to the conductor 354 by the paper feed logic means 321 and subsequently a paper feed ready status indications is provided at the status output indicated in FIG. 6 at the interface logic 305.

In the same manner as other peripherals in the automatic writing system according to the present invention, a data character, which in this case takes the form of a twelve (12) bit character formed at the printer interface means 27 from a pair of entries to the common data bus 19, is conveyed to the printer unit while instructions applied to the strobe inputs of the interface logic means 305 originate as instruction commands on the common instruction word bus 20. Similarly, the status condition provided at the outputs of the interface logic means 305 connected to the multiconductor cable 24 are applied through the printer interface 27 to the common status bus 21 to apprise the microprocessor indicated by the dashed block 16 that the next instruction in the program sequence being processed may be issued. It should be noted that the inputs to the interface logic block 305 associated with the paper indexing operation do not derive in any form from carriage displacement character information which may be supplied thereto. Therefore, in the absence of appropriate instructions from the read only memory 80, the document being prepared will not be automatically indexed to the next line upon receipt of a carriage return command, which takes the form of a carriage displacement instruction.

Although the ribbon lift logic 323 may be employed to control the printing position of a two color ribbon, the ribbon lift logic 323 here performs only the simplified function of positioning a black or other single color cloth or carbon ribbon in a first position intemediate the character pedal of the daisy print wheel element and the document to be printed so the same is impacted when the print hammer strikes the selected pedal of the daisy wheel print element, or a second position in which the ribbon is in a down position and hence does not tend to obscure the operator's view of the print position on the document being printed. The function is achieved, in essence, by providing a delay interval through the operation of the program time delay means 16A such as a five-hundred millisecond (500 ms) interval in which a succeeding character input is to be supplied to the printer unit. If this input is not supplied within the given period a high level input is supplied to the input conductor within the multiconductor cable 24 and more specifically, the conductor annotated Ribbon Action in FIG. 6. When the ribbon action input conductor to the interface logic 305 is high, the ribbon is placed in the down position while when the input on the ribbon action is low, the ribbon is placed in a first or up position. For this reason, the ribbon lift logic means 323 need only comprise a flip flop or other suitable logic device which produces an output which follows the input supplied thereto. The input to the ribbon lift logic 323 is supplied through a cable 330 from the interface logic block 305, which essentially acts to apply the level on the ribbon action input thereto, to the ribbon lift logic 323 although the internal structure of the interface logic 305 may be employed to raise the control signal on the ribbon action conductor to an appropriate output level for the ribbon lift logic 323. The output of the ribbon lift logic 323 is applied through a conductor 357 to ribbon lift driver means 358. The ribbon lift driver means 358 may comprise any suitable form of driver stage which raises the output of the ribbon lift logic means 358 to a level which is suitable to drive the ribbon lift coil indicated. The output of the ribbon lift driver 358 is connected, as indicated in FIG. 6, to the ribbon lift coil through a conductor 359. Therefore, as will be appreciated by those of ordinary skill in the art, when a low condition resides on the conductor annotated Ribbon Action within the multiconductor cable 24, this low level will be reflected at the output of the ribbon lift logic means 323 and conveyed to the ribbon lift coil to place the ribbon in an up condition which is the appropriate condition for a printing operation. However, when the level on the ribbon action input conductor within the multiconductor cable 24 goes high, indicating as shall be seen below, that no character input has been provided within a specified interval, this high level is reflected at the output of the ribbon lift logic means 323 whereupon the ribbon lift coil is de-energized and the carbon or cloth ribbon is displaced in its non-print or low condition so that the operator may clearly view the portion of the document at which printing is to occur.

The end of ribbon sensor means 326 is employed within the instant invention to apprise the operator, the microprocessor 16, and hence the system as a whole that the cloth or carbon ribbon employed in the printer unit for print purposes, is approaching exhaustion and upon exhaustion, to shut down the system. The printer unit employed within the instant invention preferably employes a specialized ribbon cartridge containing a cloth or carbon ribbon which is provided with indicator means at locations thereon corresponding to a point where sufficient ribbon is left to print only 3,000 characters, a point where sufficient ribbon is left to print only 1,250 characters and a point corresponding to the actual end of the ribbon. Additionally, such ribbon cartridges are available both in cloth ribbon and carbon ribbon versions so that the cloth ribbon may be employed on a reusable basis for draft copy work and the like while carbon ribbon embodiments are utilized in the preparation of final copy. The indicia provided in the ribbon cartridge may optionally take the form of magnetic, metallic or reflective indicia so that the same may be appropriately detected by sensory means present within the end of ribbon sensor means 326. Preferably, the indicia present on the ribbon would take the form of reflective metallic strips of foil and hence, the end of ribbon sensor means 326 may comprise means for illuminating the ribbon whenever the automatic writing system according to the instant invention is energized and means for detecting reflected radiation disposed in such relationship to the illuminating means and the typewriter ribbon present at the print position that radiation from the illuminating means is only sensed thereby when a reflective strip is present on said ribbon. Additionally, it is preferred that the automatic writing system according to the instant invention provide an initial warning to the operator when only sufficient typewriter ribbon remains for the printing of 3,000 characters and thereafter this warning is repeated and maintained at a location on the ribbon which is sufficient for printing only 1,250 characters while the system is to be shut down at the actual end of the typewriter ribbon. Therefore, under these conditions, a reflected strip may be placed on the typewriter ribbon at each of these locations and a counter provided within the end of ribbon sensor means 326 which effectively counts the pulses produced by the optical sensor and is reset through conventional means upon a changing of the ribbon. Thus, under these conditions, when the first strip is detected, the microprocessor according to the instant invention may be responsive to an end of ribbon indication from the interface logic 305 to provide an audible beep or the like; however, such end of ribbon level would terminate as soon as the sensed condition terminated. However, upon a detection of the second reflector on the typewriter ribbon, the counter would be set to a count of two (2) and the end of ribbon indication from the interface logic maintained so that the microprocessor could respond thereto to provide a continuous audible warning to the operator. Upon the actual end of the ribbon, a count 3 state would be registered and this condition could be employed to actually disable further printing operations in the automatic writing system according to the instant invention until the ribbon was actually changed. Alternatively, the powerful microprocessing techniques employed within the instant invention could be relied upon to maintain a count of the end of ribbon pulses provided at the output of the interface logic means 305 and the same results could be obtained by the microprocessor keeping track of the number of end of ribbon pulses supplied to the common status bus so that upon the first such pulse, an audible beep would be briefly produced, the second pulse would cause an audible beep to be continously produced, while a third pulse causes system shut down. The output of the end of ribbon sensor means 326 is applied to a shaping network 360 through a conductor 361 which applies the outputs of the end of ribbon sensor means 326 to the interface logic 305. The shaping network means 360 acts in the conventional manner to configure the output of the optical sensor means present within the end of ribbon sensor means 326 into a logic compatible format and hence may take any of the well known forms of this conventional class of device. The output of the shaping network 360 as applied to the interface logic 305 may be directly applied to the status output conductor present within the multiconductor cable 24 annotated End of Ribbon and hence acts to apprise the microprocessor as to the condition of the ribbon loaded.

The output conductor within the multiconductor cable 24 annotated Printer Ready in FIG. 6 is employed to indicate the status of the printer unit. More particularly, the printer ready conductor is employed to indicate whether or not the printer is properly supplied with power. Therefore, as will be appreciated by those of ordinary skill in the art, the status condition defined by the printer ready conductor apprises the microprocessor indicated by the dashed block 16, when this status condition is gated to the common status bus 21, that the printer peripheral is in the system and that such peripheral is ready to receive operational commands. Accordingly, the program control sequence utilized by the microprocessor indicated by the dashed block 16 will test the status of the printer ready conductor prior to the issuance of any command to the printer unit depicted in FIG. 6.

The restore input conductor within the multiconductor cable 24 provides a specialized input to the printer unit which causes the printer unit to be placed in a predetermined initial state. More particularly, an input on the restore input conductor causes a restore operation sequence to occur at the printer unit wherein the printer unit is placed in an initial condition by returning the carriage to the first character position, rotating the daisy print wheel element to its starting or home position and resetting the internal logic of the printer unit. The restore sequence is introduced to the logic whenever power is turned on or when an operator activates the restore command input line through a reset operation or the like. Data inputs for achieving the necessary displacements in a restore operation sequence are supplied to data lines $DL_0$ - $DL_{11}$ from the common data bus 19 in response to commands issued by the read only memory 80. The restore operation, as will be appreciated by those of ordinary skill in the art, is not only utilized to initialize the printer unit each time that system power is turned on, but in addition thereto, the initiation of this sequence is mandated each time it is necessary to clear a malfunction. In the restore sequence, the print wheel carriage is first displaced to its left most position, by causing the carriage logic means 317 to issue a move to the left command and this command is maintained until the carriage servo means 318 indicates that the carriage is no longer moving. As fully explained in the above cited applications directed to the printer unit, no mechanical detents or margin settings are employed in the printer unit, therefore, as the printer unit will attempt to fully carry out each command issued thereto, the axis upon which the print wheel carriage traverses is provided with a pair of crash stops located at the extreme limits of permissible carriage movement. When the carriage servo means 318 detects that the carriage is no longer being displaced towards the left, such condition indicates that the print wheel carriage is against the left crash stop and has been prevented from being further displaced. A failure to further displace is indicated to the carriage servo means 318, which normally senses inductively coupled cross points for each increment of displacement of the print wheel carriage, by a failure to further detect such cross points. Upon a detection that the print wheel carriage is up against the left crash stop, a move twelve (12) to the right command is supplied to the printer unit by loading the data lines $DL_0 - DL_{11}$ with a magnitude of twelve (12) units (24 increments) and a right direction inpuyt while applying a character strobe to the interface logic 305. This causes the carriage logic means 317 to initiate the movement of the print wheel carriage twelve (12) units to the right and terminate such movement after the carrige servo means 318 has appropriately decremented the register in the carriage logic means 317. The twelve (12) unit incrementing of the position of the print wheel carriage to the right of the left crash stop is significant because it aligns the print wheel carriage with a position which corresponds to the zero margin or column position of the carriage. Thus, the restore operation effectively acts to place the daisy print wheel element carriage in a zero starting position whereupon the registers employed to keep track of the position of the print wheel carriage for margin control monitoring purposes may be placed in a cleared condition as the zeroing of the print wheel carriage is assured.

After the print wheel carriage has been placed in its starting or zero (0) position, the print wheel is placed in a home position. The print wheel takes the form of a flat disc-like member having a plurality of regularly extending spokes on which each character is positioned. Normally, the print wheel element includes 96 available character locations and a metal tab is affixed to a character position which has arbitrarily been assigned as the zero character position. Under logic control the print wheel is rotated in a counter clockwise direction until the metal tab associated with the zero character position is detected. At this position the rotation of the print wheel is stopped. During the rotation of the print wheel, in a restore cycle, the feed back from the print wheel servo to the present position register in the print wheel logic means 334 is disabled and when the print wheel is stopped at its home position, the present position register within the print wheel logic means 334 is cleared or placed in its zero condition, it now being assured that the daisy print wheel element is in a home or zero position and hence the zeroing of the present position register within the print wheel logic quarantees that a synchronization between the daisy print wheel element and the present position counter within the print wheel logic means 334 is established. In addition, during the restore sequence, the ribbon lift logic means 323 may be gated to place the ribbon in its down position while paper feed logic means 321 is inhibited. Accordingly, as will be appreciated by those of ordinary skill in the art, the restore operation initiated by a restore input establishes a set of initial conditions in the printer unit so that from this point forward synchronization between the various monitoring registers in the printer unit and in the printer interface 27 and the various command displacements issued to the printer will be assured. This is necessary because the use of dynamic registers and the like within the present embodiment of the automatic writing system according to the present invention requires that the microprocessor indicated by the dashed block 16 be assured that each time a power up operation is initiated a predetermined set of starting conditions are present. However, as dynamic registers lose their storage when the system is deenergized, such set of initial conditions must be reestablished when the system first receives power. Similarly, any malfunction which might occur at the printer unit might well cause one of the monitoring registers therein to lose synchronization. Therefore, the restore operation is necessary to clear the malfunction in order that a re-synchronization of the system is assured.

From the foregoing description of the printer unit logically set forth in FIG. 6, it will be appreciate that all operations of the printer are electronically initiated, implemented and controlled. This makes for highly reliable printer structure because the majority of mechanical expedients employed in most printers are completely avoided while the printer may operate at speeds exceeding those available from conventional input/output typewriters. For instance, while conventional input-/output typewriters normally operate at a maximum speed of 15 characters per second, the instant printer unit depicted in FIG. 3 may operate at rates exceeding 30 characters per second when driven by a record media. Furthermore, the printer unit depicted in FIG. 6 is particularly well suited for incorporation into the automatic writing system according to the present invention because, as will be appreciated from the operation thereof set forth above, once a command is issued to the printer, the printer may act in the absence of further program control, to carry out that function and will indicate on an appropriate status output when that function has been appropriately completed. This means that once the microprocessor indicated by the dashed block 16 has issued an instruction to the printer unit, the microprocessor may advance its program sequence to carry out further operations at other peripherals and may later return to the printer unit to monitor if the command issued has been successfully carried out prior to the issuance of a new command thereto.

THE PRINTER INTERFACE

Referring now to FIG. 7, there is shown the details of the printer interface 27 and more particularly, FIG. 7 schematically illustrates the printer interface 27 for the printer unit illustrated in FIG. 6. The printer interface depicted in FIG. 7, as shall become more apparent below, essentially performs three basic functions associated with the various operations of the printer unit depicted in FIG. 6 so that the same may function as an independent peripheral within the automatic writing system as a whole and appropriately implement and comply with instructions issued by the microprocessor indicated by the dashed block 16, with which it has primary association. The three basic functions performed by the printer interface illustrated in FIG. 7 are (1) selectively obtaining data from the common data bus 19, assembling such data into twelve bit characters for application to the printer unit and selectively gating such twelve bit characters to the printer unit, (2) decoding printer action instructions issued on the common instruction word bus 20 and selectively applying such action instructions as are decoded to the printer unit in the form of discrete control levels and (3) responding to status conditions indicated at the printer as well as other locations assigned thereto and responding to instructions issued on the common instruction word bus to selectively gate such status conditions to the common status bus 21. Thus, in accomplishing these basic functions, the printer interface depicted in FIG. 7 complements and controls the functions of the printer unit so that when the printer unit is connected through the printer interface to the common status bus 19, the common instruction word bus 20 and the common status bus 21; the printer appears as any other peripheral to the microprocessor indicated by the dashed block 16 and can be selectively enabled or disabled by the issuance of selected sixteen (16) instruction words on the common instruction word bus 20.

The printer interface depicted in FIG. 7 comprises a data section 365 which includes four (4) bit latch means 366 and driver means 367 and 368; a command strobe section 370 which includes AND gates 371 - 377 and a single bit latch means 378; and a status section 380 which includes the multiplexer means 381 - 383.

THE DATA SECTION

The function of the data section indicated generally at 365 is to selectively assembled data conveyed in the form of eight bits in parallel from the common data bus 19 into twelve (12) bit characters suitable for application to the printer unit illustrated in FIG. 6 through the twelve parallel data lineS $DL_0 - DL_{11}$ which serve as the data input thereto. As will be appreciated by those of ordinary skill in the art, when the automatic writing system according to the instant invention is operating in a processing mode, data of one form or another is normally present on the common data bus 19 and hence, only data destined for the printer unit is to be assembled into a twelve bit format and selectively applied to the printer unit illustrated in FIG. 6. The assembly of eight (8) bit data into a twelve (12) bit format is accomplished by the data section 365 while selective gating to the printer unit is controlled through the generation of a character strobe, carriage strobe, or paper feed strobe input to the printer unit by the demand strobe section 370. The twelve (12) bit character information assembled within the data section 365, may take the form of a twelve (12) bit carriage escapement displacement defined in increments of 1/120th of an inch as well as direction, a twelve bit paper indexing displacement defined in terms of 1/48th of an inch as well as direction, or a three word print command wherein seven (7) bits act to define the character to be printed, three (3) bits define the width thereof for the purposes of ribbon displacement and the remaining two bit word acts to define the hammer force with which printing is to occur. Briefly, since data is conveyed through the common data bus 19 in the form of eight bits in parallel, data for application to the printer unit 2 is applied to the printer interface illustrated in FIG. 7 in the form of two eight bit applications of data on the common instruction word bus. During the first eight (8) bit application of data on the common data bus, significant information is contained only on data lines $DB_0 - DB_3$ of the common data bus and such information as is contained therein is latched at the printer interface. Thereafter, the second eight (8) bits of data applied to the common data bus are directly applied through the printer interface illustrated in FIG. 7 to the printer unit together with the four (4) bits from the previous pass which were latched thereat. The twelve bits of relevant data thus assembled by the printer interface originate, as shall be seen below, in the case of print information at the printer data ROM 43 and are applied in two passes to the common data bus, rearranged into an appropriate order by the microprocessor indicated by the dashed block 16 and applied in two eight bit passes to the printer interface illustrated in FIG. 7. Displacement information, whether in the form of escapement information associated with carriage displacement or paper feed displacement information is generated by the microprocessor as a function of constants read from the read only memory 80, and various stored conditions which result as a function of conditions set by the operator such as line spacing, print pitch and the like as well as previously stored escapement information associated with character information printed during a previous cycle of operation.

Turning specifically to the data section 365, it will be appreciated by those of ordinary skill in the art that the same is directly connected to the individual bit conductors within the common data bus 19 through the multiconductor data cable 31, illustrated in FIGS. 2 and 7. The various data bus bits $DB_0 - DB_7$ associated with the individual conductors of the common data bus 19 have been indicated on the separate conductors illustrated within the multiconductor cable 31 in FIG. 7 and to simplify the description presented hereinafter, the individual bit conductors illustrated in FIG. 7 will be referred to in terms of the data bit $DB_0 - DB_7$ associated therewith. Each of the eight bit conductors $DB_0 - DB_7$ within the multiconductor data cable 31 are directly applied to respective inputs of the driver means 368 while data conductors $DB_0 - DB_3$ are connected through conductors 384–387 to individual ones of the inputs to the four bit latch means 366. The four bit latch means 366 may take the conventional form of a Model 7475 four bit latch as available from The Texas Instrument Corporation which acts in the well known manner to store the four bits of information applied to the inputs thereof on conductors 384 - 387 in the presence of an enable level and to retain such four bits of information available at the outputs thereof until new information is written therein upon the subsequent generation of an enable level. The four outputs of the four bit latch means 366 are applied through conductors 388- 391 to respective inputs of the driver means 367. Thus, when enabled, the four bits of information conveyed during a first pass of data on the common data bus 19 will be applied through conductors384 - 387 and loaded into the four bit latch means 366 where the same will be maintained as output levels on conductors 388 - 391. Therefore, during the next application of data to the common data bus 19, twelve bits of data in parallel will be applied to the driver means 367 and 368. The driver means 367 and 368 may take the form of individual amplifier stages associated with each of the twelve inputs and outputs such as Model 7406 drivers as conventionally available from The Texas Instrument Corporation; however, to simplify the illustration in FIG. 7, each of the driver means 367 and 368 has been shown in block format. In any event, the function of the driver means 367 and 368 is to raise each of the bit levels applied to the inputs thereof to appropriate logic levels and after suitable amplification to apply such inputs to the outputs thereof connected to terminals $DL_0$ - $DL_{11}$. The output lines annotated $DL_0$ - $DL_{11}$ directly correspond to the input data lines on the printer until illustrated in FIG. 6 and it will be appreciated by those of ordinary skill in the art that whenever the printer unit receives an appropriate command strobe level, the information contained on data lines $DL_0$ - $DL_{11}$ will be accepted thereby and employed to implement the print, carriage displacement or paper indexing function defined by the strobe level associated therewith.

The data actually present on data lines $DL_{11}$ - $DL_0$, it will be recalled, may take one of three forms depending upon the nature of the command being implemented. Thus, when a print instruction was forwarded, a three (3) bit word will be defined on data lines $DL_{11}$ - $DL_0$ wherein the two bit word defined on data lines $DL_{11}$ and $DL_{10}$ defines the hammer force in four levels, the three bit word on data lines $DL_9$ - $DL_7$ defines the ribbon displacement width while the seven (7) bit word on data lines $DL_6$ - $DL_0$ defines the absolute spoke position of the character to be printed. Conversely, when escapement information is being provided, the bit information contained on data line $DL_{11}$ will define the direction in which the carriage is to be displaced while the information contained on data lines $DL_{10}$ - $DL_0$ will define the actual displacement in terms of 1/120th of an inch. Similarly, for paper index functions, the information on data line $DL_{11}$ defines the direction with which the paper is to be displaced while the information contained on data lines $DL_{10}$ - $DL_0$ defines the distance through which displacement is to occur in increments of 1/48th of an inch. Thus, when data is to be applied to the printer unit 2 for the purpose of printing a character, carriage displacement associated with escapement or the like, or paper indexing functions, the first eight (8) bits of information is applied through the common data bus to the printer interface wherein only the data contained on bit conductors $DB_0$ - $DB_3$ is significant. This data is applied through conductors 382 - 387 to the four bit latch means 366 where it is stored and applied to the outputs thereof on conductors 388 - 391. In a subsequent instruction cycle wherein the second eight (8) bits of data for implementing a printer function are applied to the common data bus, the four (4) bit latch means 366 remains in a disabled condition so that all eight (8) bits of information are applied through conductors $DB_0$ - $DB_7$ to the eight bit output driver 368. Under these conditions, both driver means 367 and 368 will have printer function data applied to the inputs thereof so that the outputs annotated $DL_0$ - $DL_{11}$ will have the assembled twelve bits of information present thereon for application to the printer unit.

The four (4) bit latch means 366 is selectively enabled so that the same may accept four bits of information from conductors 384 - 387 only during the first application of eight (8) bits of data destined for the printer unit to the common data bus 19. The instruction for implementing the enabling of the four bit latch means 366 is annotated Load High Order Data Bits in the operand list associated with printer control which is attached hereto as Appendix C. Like all other printer commands this instruction bares a module address, defined by ROM bits $B_{15}$ - $B_{12}$ equal to Hex 1 and ROM bits $B_{11}$, $B_{10}$, and $B_9$ are in the binary condition 0, 0, 1 to define a control function so that, in effect, ROM bits $B_0$ - $B_8$ act to actually define the control function which is to occur. In the case of the instruction load high order data bits, ROM bit $B_4$ is in a One condition while the remaining ones of ROM bits $B_0$ - $B_8$ are in a low condition and hence this form of decode is employed to selectively enable the four (4) bit latch means 366. The enable level for the four (4) bit latch means 366 is applied through conductor 392 from the output of AND gate 373. The AND gate 373, is within the command strobe section 390, however, as shall become more apparent below, this AND gate acts to decode a load high order bit instruction and to apply an appropriately timed enable level to the four bit latch means 366 so that the same is enabled during an interval when the first eight (8) bit pass of data for application to the printer unit 2 is on the common data bus 19. A first input to the AND gate 373 is connected through conductor 393 to a terminal annotated $B_4$ and as will be appreciated by those of ordinary skill in the art, receives the condition of ROM bit $B_4$ during each instruction cycle. The second input to AND gate 373 is connected through conductor 394. This AND gate, as shall become apparent below, serves to decode and time the high output level whenever a printer control function is present wherein ROM bit $B_8$ is in a low condition. Thus, it will be appreciated by those of ordinary skill in the art that the data section indicated generally by the reference numeral 365 serves to assemble a twelve (12) bit data character from two eight (8) bit characters applied to the common data bus whenever such characters are destined for application to the printer unit and holds such twelve bit character in readiness for acceptance by the printer unit whenever a command strobe is applied thereto. The generation of command strobes are governed by the command strobe section 370.

THE COMMAND STROBE SECTION

Regardless of the nature of the data outputs provided on data lines $DL_0$ - $DL_{11}$, the printer unit illustrated in FIG. 6 will not respond thereto to accept such data and initiate a print operation, a carriage displacement operation, or a paper feed displacement until a character strobe, carriage strobe, or paper feed strobe is applied thereto to cause this information on data lines $DL_0$ - $DL_{11}$ to be taken and appropriately processed by the printer unit depicted in FIG. 6. In addition, as was seen in conjunction with the description of FIG. 6, a restore control inut and a printer action input are also applied to the printer unit to cause the same to establish itself in an initial state of readiness wherein certain specified initial conditions are assumed or to periodically drop the ribbon so as to place the print position in plain view of the operator. Each of these control levels are generated at the printer interface illustrated in FIG. 7 and more particularly within the command strobe section 370 thereof whereupon they are applied to respective ones of the conductors within the multiconductor cable 24. This function is achieved by the command strobe section 370 by a decoding of instructions issued by the read only memory on the common instruction bus 20 and the provision of an appropriate output from one of the AND gates 371, 374 - 376 or the one bit latch means 378 whenever the appropriate instruction is received. As was mentioned above, all printer commands bear a module address equal to One (1) i.e. wherein ROM bits $B_{15}$ - $B_{13}$ are each in a zero (0) condition while ROM bit $B_{12}$ is in a One (1) state. In addition, all control functions have binary 0, 0, 1 conditions for ROM bits $B_{11}$, $B_{10}$, and $B_9$ while the condition of ROM bits $B_0 - B_8$ within a control instruction specifies the specific control action which is to occur. Additionally, for each of the control functions developed within the command strobe section 370, ROM bit $B_8$ will be in a Zero (0) condition. Therefore, as shall be seen below, the command strobe section 370 initially acts to generate an appropriately timed signal when any of the control instructions for the printer unit are present on the common instruction word bus and thereafter acts to specifically decode individual bits to ascertain whether or not that specific control function is present.

The AND gate 372 within the command strobe section 370 performs the principal function of decoding control functions designated for the printer means. The AND gate 372 may take the conventional form of a five input AND gate device which acts in the well known manner to provide a high at the output thereof only when each of the inputs thereto are high. A first input to the AND gate means 372 on conductor 395 receives an input annotated PRT · 2CL. The annotation (PRT has been adopted herein to indicate the printer address which is a module 1 address, as aforesaid, and hence, the PRT input may be developed through conventional ANDing techniques under conditions wherein ROM bits $B_{15}$, $B_{14}$, and $B_{13}$ are in a 0 condition while ROM bit $B_{12}$ is in a One (1) state. In addition, this printer or module 1 address, is ANDed with two phases of the four phase clock which in this case comprise clock phases CB and CC which yield clock subphase $CL_3$ as aforesaid. Thus, the input to AND gate 372 on conductor 395 will go high during clock subphase $CL_3$ of any instruction cycle wherein an instruction on the common instruction word bus 20 contains a module 1 address in ROM bit positions $B_{15} - B_{12}$ to thus define the printer unit. The remaining inputs to AND gate 372 on conductors 396 - 399 act to provide the remaining necessary inputs for a complete decoding of printer control functions wherein the condition of ROM bit $B_8$ is low. Thus, the inputs on conductors 396 and 397 are connected to bit conductors within the common instruction word bus to which the condition of ROM bits $B_{10}$ and $B_{11}$ are applied and both of these inputs will go high, as indicated by the not condition illustrated only when the condition of ROM bits $B_{11}$ and $B_{10}$ are low. In similar manner, conductor 398 is connected to the bit conductor within the common instruction word cable to which ROM bit $B_9$ is applied and hence this input to AND gate 372 will go high only when the condition of ROM bit $B_9$ is high. The last input to the AND gate 372 is connected through conductor 399 and at inverter 400 to a terminal annotated $B_8$ and it will be appreciated by those of ordinary skill in the art that this terminal connects to a conductor within the common instruction word employed to convey the condition of ROM bit $B_8$. Therefore, due to action of the inverter 400, line 399 which serves as an input to AND gate 372 will go high only for instructions wherein ROM bit $B_8$ is low. Thus it will be seen that the output of AND gate 372 goes high only during clock subphase $CL_3$ of control function instructions designated for the printer where ROM bit $B_8$ is in a 0 condition and hence a high output from AND gate 372 may serve as a predicate or enabling level for the development of each of the control levels provided by the command strobe section 370 which are derived solely as a function of instructions defining printer control functions. The output of AND gate 372 is connected through conductor 401 to an enabling input to each of the AND gates 371, and 374 - 476 while it is additionally applied through conductor 394 as an enabling input to the AND gate 373. The AND gate 373, it will be recalled, provides an enabling level for the four bit latch means 366 for printer command control function instructions having ROM bit $B_4$ in a One (1) condition. Thus, the input thereto on conductor 393 decodes the high condition of ROM bit $B_4$ while the input thereto on conductor 394 is effectively an appropriately timed decode of a printer command control function instruction.

The AND gate 371 acts to define character strobe commands as a function of instructions issued to the printer on the common instruction word bus 20. The AND gate 371 acts in the conventional manner of a two input AND gate to provide a high level output or character strobe only when both of the inputs thereto are high. As shall now be apparent to those or ordinary skill in the art, a character strobe is developed from a printer command control function instruction which has ROM bit $B_0$ in a high condition. Therefore, the condition of ROM bit $B_0$ is applied to AND gate 371 through conductor 402 while the overall nature of the printer command control instruction is defined by the output of AND gate 372. Whenever an appropriately timed high output is provided by the AND gate 371, this output, as indicated, is applied through the multiconductor cable 24 to the printer unit illustrated in FIG. 6 and causes a twelve (12) bit character to be accepted thereby on data lines $DL_0 - DL_{11}$ and processed in a manner appropriate to achieve a print function.

Similarly, AND gate 374 acts to decode instructions including a carriage strobe control level which, as shall be apparent to those of ordinary skill in the art, comprise printer control function instructions having ROM bit $B_1$ in a One (1) condition. Thus, whenever these conditions are present, as indicated on conductors 401 and 403, the output of AND gate 374 will go high for the clock subphase interval $CL_3$ to thereby produce a carriage strobe output on the appropriately annotated output conductor. This output, will be applied through the multiconductor cable 24 to the printer unit illustrated in FIG. 6 and cause the same to accept twelve bit data contained on data lines $DL_0 - DL_1$ and process the same as a carriage displacement function. In a like manner, the AND gate 375 acts to decode printer command control functions which include a paper feed command. These instructions, as shall be apparent, are printer control functions wherein ROM bit $B_2$ is in a One (1) condition. Therefore, the condition of ROM bit $B_2$ is applied to AND gate 375 through conductor 404 while the printer command control function instruction is decoded generally by the AND gate 372 and applied as an input to the AND gate 375 through conductor 401. Accordingly, when such a paper feed strobe control level is decoded by the AND gate 375, a high level for paper feed strobe will be produced at the output of AND gate 375 and applied through the multiconductor cable 24 to the printer unit where it causes twelve bit data present on data lines $DL_0 - DL_{11}$ to be accepted and processed as paper feed or paper indexing information. In like manner, the AND gate 376 acts to decode restore printer instructions and to provide an appropriate strobe level to the printer unit illustrated in FIG. 6 whenever such instructions are decoded. These instructions as shall be apparent, are printer control function instructions wherein ROM bit $B_3$ is in a high condition. Therefore, the condition of ROM bit $B_3$ is applied as one input to the AND gate 376 through a conductor 405 while an appropriately timed control function decode is applied thereto through conductor 401. When both conditions obtain, the AND gate 376 will apply an enabling or strobe level to the printer unit illustrated in FIG. 6 through the multiconductor cable 24 to cause the printer unit to automatically initiate a restore function as described above.

The remaining output provided by the command strobe section 370 as indicated on conductor 406 is the ribbon action function. As was described in conjunction with FIG. 6, the ribbon action function provided at the printer unit is implemented, under program control, to drop the ribbon so that the operator's view of the print position is unimpeded any time the receipt of information to be printed is terminated for a fixed interval which may typically comprise a half second or 500ms interval. Although this particular function may be implemented in a plurality of ways, it is here achieved through program control. More particularly, each time a print function has terminated, an instruction is read which causes a 500ms delay to be set within the program time delay 16A as shown in FIG. 2 and each time new print information is generated, this delay is reset so that under conditions where character information is continuously being printed under operator or media control, the 500ms delay set at the program time delay means 16A will be continuously reset and hence will not time out. However, should the operator stop for corrections or the flow of character information to be printed otherwise terminate through editing procedures or the like, the 500ms delay set at the program time delay indicated by the dashed block 16A in FIG. 2 will time out. Under these conditions, the timed out condition will be indicated to the microprocessor indicated by the dashed block 16 on the common status bus and will cause an instruction to be issued to the printer interface illustrated in FIG. 7 to drop the ribbon through the production of a ribbon action input for the printer unit. Conversely, any time character information is printed at the printer unit, one of the early steps in the escapement and character printing routine, as illustrated in conjunction with FIG. 17, is to cause the ribbon to be raised through a resetting of the ribbon action input produced at the printer interface. A ribbon action or ribbon down instruction takes the form of Hex 1309, while a ribbon up or $\overline{\text{Ribbon Action}}$ instruction takes the form of a Hex 1308 instruction on the common instruction word bus 20. As will be appreciated by those of ordinary skill in the art, the only difference between a Hex 1308, and a Hex 1309 instruction is that in the latter case ROM bit $B_0$ is in a One (1) condition while in the former case it is in a Zero (0) condition. Furthermore, although each of these instructions will contain a module ne printer address, ROM bit $B_8$ will be in a One (1) condition and ROM bit $B_3$ will also be high. Thus, the condition of ROM bit $B_8$ will distinguish these commands from the strobe levels otherwise produced by the command strobe section 370. The presence of a Hex 1308 or 1309 instruction is decoded within the command strobe section 370 by the action of AND gate 377 while the condition of ROM bit $B_0$ is relied upon during an appropriately timed interval when this command is present to either establish or remove the ribbon action level produced on conductor 406. More particularly, the AND gate 377 comprises a three (3) input AND gate which acts in the well known manner to produce a high or enabling level at the output thereof connected to conductor 407 only when each of the three inputs thereto are high. A first input to AND gate 377 is applied through conductor 408 from a terminal annotated PRT · 2CL. This input is the same as that applied to conductor 395 of AND gate 372 and hence it will be appreciated that this input goes high during clock subphase $CL_3$ when an instruction having a module One address has been issued on the common instruction word bus 20. Similarly, second and third inputs to the AND gate 377 are provided through conductors 409 and 410 to the terminals annotated $B_8$ and $B_3$, respectively, so that these inputs to the AND gate 377 will go high only in the presence of instructions having ROM bits $B_8$ and $B_3$ in a One (1) condition. Accordingly, the output of AND gate 377 will go high to produce a high level on conductor 407 whenever either a Hex 1308 (ribbon up) or a Hex 1309 (ribbon down) command has been issued on the common instruction word bus 20. The output of the AND gate 377 is connected through conductor 407 to the Enable input of the one bit latch means 378. The one bit latch means 378 may take any conventional form of this well known class of device which acts in well known manner to latch an input only in the presence of an enable level and apply that input to the output thereof until a new input has been loaded therein. Typically, the one bit latch means 378 may be formed by a $\overline{R}$, $\overline{S}$ flip flop and the single data input thereto is applied through a conductor 411 from a terminal annotated $B_0$. Thus, the one (1) bit latch means 378 will only be enabled in the presence of a high at the output of AND gate 377 which will occur during the presence of a Hex 1308 or 1309 instruction while the $B_0$ input applied to the one bit latch means 378 on conductor 411 will be high or low depending upon whether a 1309 or 1308 Hex instruction, respectively, is present. Accordingly, when a Hex 1309 instruction is received, the one bit latch means will be set to a One condition whereupon a One output level wil be aplied to the output thereof connected to conductor 406 to produce a ribbon action level which will cause the printer unit, which receives this command strobe through the multiconductor cable 24, to drop the ribbon so that the print position is not obscured and this One level will reside on conductor 406 until such time as the One (1) bit latch 378 is reset by the issuance of a 1308 instruction in Hex. Conversely, when a 1308 Hex instruction is issued, the Zero (0) present on input conductor 411 will be loaded into the one (1) bit latch to cause a Zero (0) level to be applied to conductor 406 whereupon the printer unit will respond to the $\overline{\text{Ribbon Action}}$ indication to place the ribbon in an up or print position and such condition will persist until a One (1) is subsequently set into the One (1) bit latch means 378. Accordingly, it will be seen that the command strobe section 370 produces each of the five strobe inputs for the printer unit illustrated in FIG. 6 so that the same may accept and appropriately process displacement data and the like present on data lines $DL_0 - DL_{11}$, initiate a ribbon action function to clear the print position, or implement a restore the printer function in response to the output of AND gate 376.

The status section 380 of the printer interface depicted in FIG. 7 acts to respond to the various status conditions generated at the printer unit illustrated at FIG. 6 and other status conditions which are here convenient to monitor to apprise the microprocessor indicated by the dashed block 16 as to the status of various aspects of the printer unit or the other conditions monitored so that the same may cause new instructions to be issued thereto or held in abeyance until the appropriate status condition is present to indicate that the printer unit or the like is in a condition to receive and process new instructions. This function of the status section 380 is achieved through the operation of the multiplexer means 381 - 383 which act, on a command basis, to gate a selected one of a plurality of status conditions onto the common status bus 21 so that the same may be sampled at the ROM address register means 81, as aforesaid, to cause appropriate branch operations to occur. More particularly, each of the multiplexer means 381 - 383 may take the conventional form of eight (8) input single output multiplexer means which act in the presence of a strobe input to apply a selected one of the inputs thereto to the single output thereof. In each case, the desired input which is applied to the single output of each multiplexer device in the presence of a strobe pulse is defined by the select inputs to each multiplexer device annotated as terminals A, B and C. Typically, each of the three multiplexer means 381 - 383 illustrated in FIG. 7 may comprise an eight input multiplxer device such as a 74151 MSI multiplexer chip conventionally available from The Texas Instrument Corporation. Each device, has eight data inputs annotated 0 - 7, three select inputs annotated A, B and C, and a strobe input which has been annotated accordingly so that the device performs in the well known manner to gate one of the eight inputs thereto 0 - 7, to the output thereof, when the input is defined by the select inputs A - C thereof and a strobe pulse is applied to the multiplexer. Each of the three multiplexer devices illustrated in FIG. 7 has different inputs so that a total of 24 status conditions, to be described below, may be selectively gated onto the common status bus 21. The three multiplexer means 381 - 383 are organized in such manner that the select inputs thereto annotated A, B and C are commonly connected through conductors 412 - 414 to terminals annotated $B_4$ - $B_6$ so that for each instruction cycle, a common input 0 - 7 for each multiplexer device 381 - 383 will be selected; however, the strobe inputs to each of the multiplxer means 381 - 383 are decoded in such manner that only a selected one of the multiplexer means 381 - 383 will be enabled in a printer branch instruction having ROM bits $B_9$ - $B_7$ in a condition to define the selected multiplexer means having the status input condition which is desired to be gated onto the common status bus 21. Thus, as shall be seen more clearly below, a strobe input to one of the multiplexer means 381 - 383 is only available in a printer instruction having ROM bit $B_8$ in a Zero (0) condition while a selected one of the multiplexer means 381 - 383 will be strobed in accordance with the condition of ROM bits $B_9$ and $B_7$. Thus, when ROM bits $B_9$ and $B_7$ are both high, multiplexer means 383 will be strobed, when ROM bit $B_9$ is low, and ROM bit $B_7$ is high, multiplexer means 381 will be strobed and when ROM bit $B_9$ is high and ROM bit $B_7$ is low, multiplexer means 382 will be strobed. Accordingly, of the three multiplexer means 381 - 383 illustrated within the status section 380, a desired input to a given one of the multiplexer means is selected through selection inputs which are commonly supplied to each of the multiplexer means 381 - 383 while a desired multiplexer means having the selected input thereto is defined through the selective strobing thereof and it will be appreciated by those of ordinary skill in the art that this technique readily admits of the addition of more multiplexer means should additional sampling at this interface be desired.

The multiplexer means 381 receives the majority of status outputs provided by the printer unit illustrated in FIG. 6. Thus, an end of ribbon status indication as plainly indicated in FIG. 7 is provided to the Zero (0) input thereof, a paper feed ready status input is provided at input 4 thereof, the carriage ready input is provided at input 5 thereof, a character ready input is provided at input 6 thereof and a printer ready input is provided at input 7 thereof. Each of these status inputs from the printer unit was described in conjunction with FIG. 6 and it will be appreciated by those of ordinary skill in the art that when one of these inputs is selected by the select inputs to status multiplexer means 381 and a strobe input is supplied thereto this input will be gated onto the output of the status multiplexer means 381 connected to conductor 415 and subsequently through an OR gate 416 to the common status bus as generally indicated in FIG. 7. The OR gate 416, it will be appreciated, is conventional and hence acts in the well known manner to go high when any of the inputs thereto are high. Accordingly, as Zero (0) inputs are obtained from non-selected status multiplexers, the One (1) or Zero (0) condition of the selected status condition at a strobed status multiplexer, as applied to the input of the OR gate 416, will be reflected at the output thereof and applied to the common status bus 21 as indicated generally in FIG. 7. An additional input annotated Memory Equals Zero is applied through a conductor 417 to input 3 of the printer status multiplexer means 381. This input, as shall be seen in greater detail in conjunction with FIG. 11, is employed to sample the condition of storage locations within the random access memory 34 to ascertain whether or not a location is present wherein no information is stored. Additionally, this input is also applied through conductor 418 to data input 7 of multiplexer means 383 whereat it takes on a different connotation due to the condition of the select bits employed therefor. Thus, this similar input, as shall become more apparent in conjunction with FIG. 11 takes on the connotation of memory address equal to zero (0) when applied to the seventh input of multiplexer means 383 due to the effect of the changed conditon of ROM bit $B_4$ in the selection input of the instruction which also has a differing gating effect in the random access memory illustrated in FIG. 11. The different nature of the input may be quickly seen by an inspection of the operand list attached hereto as Appendix C and more particularly, a comparison of the operands MAZ=C and MEZ=C set forth in the list of printer branch instructions. When these instructions are inspected it will be noted that ROM bit $B_6$ is a One (1) or a memory address equal to zero (0) instruction, while it is in a Zero (0) condition for a memory data equals zero instruction and hence these instructions not only cause the address or data to be read from the ROM but the appropriate input to be selected at different ones of the multiplexer means 381 and 383. Inputs 1 and 2 to the multiplexer means 381 are not illustrated as employed in FIG. 7; however, it will be appreciated by those of ordinary skill in the art that these inputs are available for additional status functions such as a printer check status indication or a printer out of paper status indication, as described above, should it be desired to employ such status indications at the printer.

The select inputs to the status multiplexer means 381 are connected through conductors 412 - 414 to terminals annotated $B_4 - B_6$ and it will be appreciated by those of ordinary skill in the art that these inputs are connected to conductors within the common instruction word bus 20 which convey bit information associated with ROM bits $B_4 - B_6$. The varying One and Zero states of these three bits are sufficient to select any one of up to eight of the inputs of the printer status multiplexer for gating to the output thereof connected to conductor 415 in the presence of a strobe input. The strobe input to the multiplexer means 381 is connected through conductor 419 to the output of NAND gate 420. The NAND gate 420 may comprise any of the conventional forms of this well known class of logic device which acts to provide a low or strobing level for the multiplexer means 381 whenever all of the inputs thereto are high. The lower two inputs to the NAND gate 420 are connected to the terminals annotated $B_7$ and $\overline{B_9}$ so that these two inputs will go high for instructions wherein bit $B_9$ is a Zero (0) and ROM bit $B_7$ is equal to a One (1). The remaining input to NAND gate 420 is connected through conductor 421 to the output of AND gate 423 which acts in the conventional manner to provide a high level output only when both of the inputs thereto are high. A first input to AND gate 423 is connected to a terminal annotated PRT which is a decode of the modular one (1) printer address, as described below, while the second input thereto is connected to a terminal annotated $\overline{B_8}$. Accordingly, the output of AND gate 423 goes high whenever the printer is addressed in an instruction with ROM bit $B_8$ in a low condition and hence a strobe or low level output will be applied to the printer status multiplexer means 381 on conductor 419 whenever such an instruction is present and additionally, such instruction has ROM bits $B_9$ and $B_7$ in a 0, 1 condition respectively. Thus, the AND gate 423 acts to decode instructions having a modular one printer address and ROM bit $B_8$ in a Zero (0) condition which serves as a predicate for enabling one of the printer status multiplexer means 381 - 383 while NAND gate 420, when properly enabled by the output of AND gate 423, acts to further decode the condition of ROM bits $B_9$ and $B_7$ to ascertain whether the status multiplexer 381 is to be enabled.

The output of AND gate 423 is applied through conductors 424 and 425 to the inputs of NAND gates 426 and 427 which perform a corresponding role to the NAND gate 420 for their multiplexer means 383 and 382 respectivey. Thus, in a manner well known to those of ordinary skill in the art, the NAND gate 426 will apply a low or enabling level to the status multiplexer means 383 whenever the output of AND gate 423 goes hgh in instructions having ROM bits $B_9$ and $B_7$ in a 1, 1 condition while the NAND gate 427 will provide a low or strobe input to the multiplxer means 382 when the output of AND gate 423 goes high in instructions having ROM bits $B_9$ and $B_7$ in a 1, 0 condition respectively. Accordingly, it will be appreciated that the selected strobing of one of the multiplxer means 381 - 383 is achieved by the selective decoding of ROM bits $B_9$ and $B_7$ in instructions defining a module One printer address where ROM bit $B_8$ is in a Zero (0) condition and with this technique an additional eight bit multiplexer means could be readily added should this be desired.

The multiplexer means 383 is illustrated in FIG. 7 as having only a single status input supplied through conductor 418 to input 7 thereof. This input, as was described above, reflects a ROM memory address equal to 0 condition and hence in the presence of a strobe pulse when this input is selected, the One or Zero condition of this status input will be selectively gated through conductor 428 to another input of OR gate 416. Although only a single input to the multiplxer means 383 has been illustrated in FIG. 7, it will be appreciated that the remaining inputs to this multiplexer means are available for diagnostic test status conditions or, for the status condition of a language translator peripheral as disclosed in U.S. Ser. No. S/1084)B as filed on equal date herewith.

The status multiplexer 382 has its select inputs commonly connected to conductors 412 - 414, its strobe input connected to the output of NAND gate 427, as aforesaid, while each of the eight data inputs thereto are connected through conductors 431 - 437 to individual ones of the bit conductors within multiconductors data cable 31 and hence to the individual data bit conductors within the common data bus 19. This means, that through the appropriate manipulation of select inputs A, B and C, the condition of any bit currently on the common data bus may be sampled and output by the status multiplexer means 382 to the common status bus 21 for testing, through the exclusive OR operation conducted at the ROM address register means 81 for branch operations. Typically, such testing may be employed to ascertain whether or not character information presently on the common data bus is underscored as indicated by a One (1) in bit position $DB_7$, or similarly, testing of this type might be employed in the classification of information presently on the common data bus. The output of the status multiplexer means 382 is connected through conductor 438 to an output of the OR gate 416. Thus, when the status multiplexer 382 has been strobed to the exclusion of the status multiplexers 381 and 383, whenever bit position on the common data bus is selected through the conditon of ROM bits $B_4 - B_6$ will be applied through the OR gate 416 to the common status bus 21 it being noted that since the multiplexer means 381 and 383 apply 0's indicative of their disabled conditon to the OR gate 461, the 1 or 0 output condition of OR gate 416 will be appropriately reflective of the output condition of the status multiplexer means 382. Furthermore, as the multiconductor data cable 31 is directly connected to the common data bus 19 as illustrated in FIG. 2, the sampling of individual bit conductors therein through the operation of the status multiplexer means 382 is available regardless of whether or not the printer unit illustrated in FIG. 6 is presently operational.

Accordingly, it will be appreciated by those of ordinary skill in the art that the printer interface illustrated in FIG. 7 acts to render the printer unit depicted in FIG. 6 an independent peripheral while appropriately interfacing the same with the automatic writing system as a whole. With respect to data directed to the printer unit, the printer interface accepts data from the common data bus in two passes and assembles the same into twelve bit character information for application to the printer unit on data lines $DL_0 - DL_{11}$. In addition, through a decoding and properly timing of instructions issued on the common instruction word bus, various operational commands are issued to the printer in a format in which they may be directly received thereby to cause the printer unit illustrated in FIG. 6 to appropriately process data according to a character format, a carriage displacement format, or paper indexing format, while restore printer functions and ribbon action functions are additionally controlled. Finally, the printer interface illustrated in FIG. 7 acts to accept status information generated by the printer and to apply the same on a command basis to the common status bus so that the same may be tested within the condition, as defined by ROM bit $B_{10}$, specified within branch instructions and in addition thereto various other status conditions are conveniently monitored at the printer interface. Such status conditions as have here been noted, include the monitoring of the various states of individual bit conductors within the common data bus 19, as well as the memory and address conditions associated with the random access memory 34. Furthermore, it will be noted that additional status monitoring conditions may be accepted at the printer interface and, as will be readily appreciated by those of ordinary skill in the art, even though certain status conditions are shown as being monitored at the printer interface, the same could be conveniently monitored at other locations wherever open multiplexer inputs were available or additional multiplexer units could be conveniently accommodated.

THE PRINTER DATA ROM

The printer data ROM peripheral indicated by the dashed block 14 in FIG. 2 acts in response to eight (8) bit information present on the common data bus to supply, when appropriate, twelve (12) bit print information to the printer unit so that the same may be gated onto data lines $DL_0 - DL_{11}$ for actuating, in response to character strobe information, the appropriate printer function. The data supplied through the common data bus 19 to the printer data ROM peripheral indicated by the dashed block 14 may originate from the keyboard or an active record media and is supplied to the printer data ROM peripheral indicated by the dashed block 14 from the main register M through the common data bus 19 for translation into the twelve (12) bit format necessary for printer functions. The twelve (12) bits of appropriate data read from the printer data ROM peripheral indicated by the dashed block 14 are read onto the common data bus 19 and loaded into the main register M in the form of two eight (8) bit passes and as each eight (8) bit character is received, the same is stored within appropriate character locations within the general purpose registers 83 until both eight (8) bit passes have been completed and the microprocessor indicated by the dashed block 16 is ready to cause the translation of the appropriate twelve (12) bits of data to the printer unit in two eight bit passes as aforesaid. Thereafter, the sixteen (16) bits of data read from the printer data ROM peripheral indicated by the dashed block 14 are rearranged, as necessary, and loaded into the main register M whereupon they are subsequently gated through the common data bus 19 to the printer unit whereat the twelve (12) bits of data forwarded to the printer interface 27 into eight (8) bit passes are assembled into the appropriate twelve (12 ) bit format, as described above, and applied through data lines $DL_0$ - $DL_{11}$ to the printer unit to implement the printer function thereof in the presence of a character strobe. Of the twelve bits of print information forwarded to the printer unit through the operation of the printer data ROM peripheral indicated by the dashed block 14, the seven bit word contained on data lines $DL_0 - DL_6$ defines the character to be printed, the three bit word on data lines $DL_7 - DL_9$ defines the width through which the ribbon is to be displaced during the print function while the two (2) bit data word contained on data lines $DL_{10}$ and $DL_{11}$ defines the hammer impact with which printing is to be implemented. It also should be noted that as certain embodiments of the instant invention may be utilized in conjunction with a language translator peripheral wherein position codes from various foreign language format keyboards may be employed, appropriate outputs from such language translator peripheral may be employed as an input to the printer data ROM peripheral indicated by the dashed block 14 so that an appropriate format print instruction will be issued to the printer unit regardless of the language format employed at the keyboard. The nature of the language translator peripheral, together with its incorporation within the instant invention, will however best be appreciated, upon reading of British provisional specification Ser. No. 31701/75 filed on July 29, 1975 and commonly assigned. Here, however, it is sufficient to appreciate that translated data originating from a record media or the keyboard is further translated by the printer data ROM peripheral indicated by the dashed block 14 into the appropriate format for assembly by the printer interface 27 into twelve bit information for application to data lines $DL_0$ - $DL_{11}$ and that such twelve bits of information are read from the printer data ROM peripheral in two eight bit passes, rearranged as necessary by the microprocessor indicated by the dashed block 16 and subsequently gated back onto the common data bus, in two eight (8) bit passes, for assembling into a twelve bit format by the printer interface 27 and subsequent application to the printer unit.

Referring now to FIG. 8, there is schematically illustrated, an exemplary printer data storage peripheral suitable for use in the embodiment of the invention illustrated in FIGS. 1 and 2. More particularly, as shown in FIG. 8, the printer data ROM peripheral comprises address latch means 440, printer data ROM means 441, and gate array means 442. The function of the address latch means 440 is to accept data from the common data bus and to maintain the same in storage therein for the purposes of addressing the printer data ROM means 441 until such time as the microprocessor is ready to receive the addressed eight bit output of the printer data ROM as initiated by the selective enabling of the gate array means 442. Accordingly, the address latch means 440 may take the conventional form of an eight bit latch which acts in the well known manner to load inputs supplied to the inputs thereof annotated $D_1 - D_4$ and $D_{1'} - D_{4'}$ in the presence of a clock pulse and supply such inputs as loaded therein to the outputs thereof as indicated by $Q_1 - Q_4$ and $Q_{1'} - Q_{4'}$ until new information is loaded therein. The address latch means 440 may take any conventional format but may be conveniently formed by a pair of Model 7475 four bit latches conventionally available from the Texas Instrument Corporation whose clock inputs are commonly connected and whose D and Q outputs are connected in the manner illustrated in FIG. 8 wherein the primed inputs and outputs would correspond to the outputs of one four bit latch

TABLE I

| MSB/LSE Hex | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | Printer Data ROM | | | | | | | | | | |
| 0 | FF | AF | 80 | AA | 35 | 76 | FC | BD | 0F | DE | OD | DD | B6 | 13 | 52 | 38 |
| 1 | F5 | B5 | DB | AE | EE | CC | C5 | B8 | 4E | EE | 49 | 5D | B7 | 14 | 34 | 37 |
| 2 | AF | 35 | 5F | AD | 78 | E4 | BC | 49 | 5E | EE | 59 | 95 | A4 | 8C | 33 | 30 |
| 3 | FD | A2 | 24 | AC | DC | F2 | C2 | 4D | 9A | 9D | E9 | 99 | BA | 80 | 35 | 53 |
| 4 | 35 | B5 | F9 | AB | EO | 6D | C4 | 4B | EE | 9A | D9 | 99 | 81 | 57 | 49 | 44 |
| 5 | FF | A2 | 31 | A9 | 70 | DE | C6 | CI | FE | 4E | F9 | 99 | 82 | 45 | 49 | FF |
| 6 | FF | B5 | B3 | A8 | 6A | 74 | 53 | C0 | FE | 9A | E9 | 99 | 83 | 5A | 32 | FF |
| 7 | FF | A4 | 69 | A7 | D8 | 56 | BF | CA | FE | 9F | OD | 9A | 8F | 6F | 3D | FF |
| 8 | B5 | F1 | B4 | A6 | E6 | CE | C3 | BA | EE | 9A | 49 | D9 | 89 | 38 | 54 | FF |
| 9 | AF | A3 | B6 | A5 | E7 | D4 | D1 | BE | E8 | 9A | 44 | 99 | 87 | 38 | 6F | FF |
| A | FD | 5D | F1 | E3 | EB | 7A | CF | B9 | 39 | 1A | 98 | 49 | 11 | 38 | 43 | FF |
| B | A3 | D7 | F5 | E5 | D2 | 2F | BB | 23 | EE | 3E | 59 | 4E | 8A | 30 | 52 | FF |
| C | FD | A4 | B2 | D7 | 6C | 37 | D5 | 7D | EA | 9E | 08 | 0E | 8B | 37 | 39 | 46 |
| D | FD | FB | 5D | F7 | 5A | FB | 50 | FD | EF | 99 | 1F | 59 | 8D | 36 | 39 | 54 |
| E | 24 | A2 | 80 | D9 | E8 | D9 | C7 | 22 | EE | 33 | 09 | OE | 8E | 59 | 39 | 0A |
| F | FD | A4 | 61 | EF | E2 | F3 | C8 | 80 | EE | 91 | 59 | 50 | 88 | 54 | 50 | OC |

TABLE II

| | 0 | 1 | 2 | 3 | 4 | 5 | 6 | 7 | 8 | [illegible] | [illegible] | [illegible] |
|---|---|---|---|---|---|---|---|---|---|---|---|---|
| 0 | | | space | ∅ | [illegible] | P | [illegible] | p | [illegible] | | | |
| 1 | | | [illegible] | 1 | A | Q | a | q | | | | |
| 2 | | | " (BSP→....) | 2 | B | R | b | r | | | | |
| 3 | | | # [illegible] | 3 | C | S | c | s | | | | |
| 4 | | | $ [illegible] | 4 | D | T | d | t | | | | |
| 5 | | | % | 5 | E | U | e | u | | | | |
| 6 | | | & | 6 | F | V | f | v | | | | |
| 7 | | | backspace | 7 | G | W | g | w | | | | |
| 8 | | | ( | 8 | H | X | h | x | | | | |
| 9 | | | ) | 9 | I | Y | i | y | | | | |
| A | | | * [illegible] | : | J | Z | j | z | | | | |
| B | | | + [illegible] | ; [illegible] | K | [illegible] | k | [illegible] | | | | |
| C | | | , | [illegible] | L | [illegible] | l | [illegible] | | | | |
| D | | | - | = | M | [illegible] | m | [illegible] | | | | |
| E | | | [illegible] | . | N | [illegible] | n | [illegible] | | | | |
| F | | | / | ? | O | _ | o | (DEL) | | | | |

while the unprimed inputs and outputs would correspond to the inputs and outputs of the second latch. As was briefly mentioned above, seven bits of information are sufficient to represent all of the printable alphameric information employed within the instant invention while all eight bits of information conveyed through the common data bus 19 are required to represent the alphameric, control, and function information conveyed within the instant invention and the code assignments employed are such that all alphameric character representations in a non-delineated format have a 0 in the most significant bit of the eight (8) bit code assigned thereto so that when the same is delineated, the delineated nature thereof may be simply and readily indicated by the insertion of a One in a bit location associated with the data bit 7. Therefore, it will be appreciated by those of ordinary skill in the art, that the alphameric character being conveyed on the common data bus may be appropriately represented by the condition of data bits $DB_0$ - $DB_6$ while the condition of data bit $DB_7$ is representative of the delineated or undelineated state of the character being translated.

For this reason, the first seven (7) inputs connected to the address latch means 440 through conductors 443 - 449 are connected directly through the multiconductor data cable 46 to corresponding conductors within the common data bus 19 employed for translating the condition of data bits $DB_0$ - $DB_6$ as it is these bits which are of paramount significance with regard to the identity of alphameric characters. Thus it will be appreciated by those of ordinary skill in the art that the inputs associated with data bits $DB_0$ - $DB_6$ as applied to input conductors 443 - 449 of the address latch means 440 are sufficient in and of themselves to designate all alphameric characters which are to be printed and hence if only an eight (8) bit code were employed to define character information to the printer, this seven (7) bit input would be sufficient to provide an appropriate address therefor. However, as was seen above, twelve bits of information are required to drive the printer unit and this is formed, as shall be seen below, from two eight bit data words read from the printer data ROM means 441 onto the common data bus and accordingly, two addresses for each character to be printed must be supplied to the address latch means 440 for a multiple addressing of the printer data ROM means 441 for each alphameric character to be printed.

Under these circumstances two eight bit addresses are supplied to the address latch means 440 for each alphameric character to be printed wherein each eight (8) bit address has data bits $DB_0$ - $DB_6$ in a common state while the address supplied to input $D'_4$ of the address latch means 440 is forced to a Zero (0) condition to achieve an addressing of the low order eight (8) bits while the same is forced to the One state to achieve reading of a second eight (8) bit word, four (4) bits of which will be employed to form the high order four (4) bits conveyed to the printer. For this reason, the input $D'_4$ of the address latch means 440 is connected through 450 to the output of an AND gate 451. The AND gate 451 may take any conventional form of this well known class of logic device and hence acts to provide a high level output on conductor 450 only when both of the inputs thereto are high. A first input to AND gate 451 is connected to a terminal annotated $B_4$ which, as shall now be appreciated by those of ordinary skill in the art, is connected through the multiconductor cable 48 to the bit conductor within the common instruction word bus 20 which receives the condition of ROM bit $B_4$ during each instruction cycle. The condition of ROM bit $B_4$ during instructions to the printer data ROM illustrated in FIG. 8, as shall be seen below, acts to control whether or not high or low addressing bits are loaded into the address latch means 440 during a given instruction cycle for those instructions wherein addressing is appropriate. More particularly, reference to the Operand List attached hereto as Appendix C will readily reveal that only four instructions, as listed within the grouping of keyboard control instructions, are directed to the printer data ROM and bear the notations M=XL, XL=M, XL=ML and XL=MH wherein the last two instructions described are directed to loading low order and high order addresses into the address latch means 440. Furthermore, a comparison of the bit content of each of these two instructions, ie., XL=ML and XL=MH will reveal that the only difference is that ROM bit $B_4$ resides in a Zero (0) condition for addressing the low order translator bits while the same resides in a One (1) condition for an addressing of the high order translator bits. Thus, it will be seen that whenever an instruction is issued for gating the contents of the main register M into the address latch means 440, the first seven (7) bits contained on bit conductors $DB_0$ - $DB_6$ will be applied to the address means 440 on conductors 443 - 449 while the state of ROM bit $B_4$ as applied to one input of AND gate 541 will be low when it is desired to address low order bits and high when it is desired to address the high order bits. The terminal annotated $B_4$ is additionally connected through conductor 452 to one input of an OR gate 453.

The second input to AND gate 451 is connected through conductor 454 to the output of an OR gate 455. The OR gate 455 may take any conventional form of this well known class of logic device and hence acts to provide a high or enabling output whenever either of the inputs thereto are high while providing a low or disabling output only under such conditions where both of the inputs thereto are low. A first input to the OR gate 455 is connected to a terminal annotated $B_5$ which, as will be appreciated by those of ordinary skill in the art, receives the bit condition of ROM bit $B_5$ on the common instruction word bus 20 during each instruction cycle. Furthermore, reference to Appendix C will also indicate that for both of the instructions XL=ML and XL=MH, the condition of ROM bit $B_5$ is high so that during the addressing of the printer data ROM indicated in FIG. 8, AND gate 451 will be enabled by a high level on conductor 454 due to the condition of ROM bit $B_5$ and hence whether or not the high or low order bits for a print command are addressed will turn on the condition of ROM bit $B_4$. It should also be noted that ROM bit $B_5$ is in a Zero (0) condition for both the M=XL and XL=M instructions listed. The terminal annotated $B_5$ is also connected through conductor 456 to an input of the OR gate 453. A second input to OR gate 455 is connected to the terminal annotated $DB_7$ and it will be appreciated by those of ordinary skill in the art that this terminal receives the condition of data bit $DB_7$ each time eight (8) bits of data are gated from the main register M onto the common data bus 19. This input, will enable the application of an address to the address latch means 440 which effectively reflects all eight (8) bits on the common data bus when an XL=M instruction is issued; however, such instructions, though available are not presently employed within the instant invention. Accordingly, it will be appreciated by those of ordinary skill in the art that addresses applied to the address register means 440 for the purposes of reading either high or low order data for the formation of print information essentially comprise data bits $DB_0$ - $DB_6$ as output from the main register M while the condition of data bit $DB_7$ is essentially masked by the condition of ROM bit $B_5$ and the action of OR gate 455 so that whether or not high or low order bits are addressed will turn on the condition of ROM bit $B_4$. Thus, whenever an XL=ML or XL=MH instruction is issued, the address applied to the address latch means 440 will be formed by the alphameric character defined by data bits $DB_0$ - $DB_6$ and first and second addresses are formed through the manipulation of the condition on conductor 450 which effectively reflects the condition of ROM bit $B_4$ during instructions where ROM bit $B_5$ is high.

The clock input to the address latch means 440 is connected through conductor 457 to the output of AND gate 458. The AND gate 458 may take the same conventional format as AND gate 451 and hence acts to provide a high at the output thereof only when both inputs thereto are high. A first input to AND gate 458 is connected through conductor 459 to the output of OR gate 453. The OR gate 453 may take the same form as OR gate 455 and hence acts to provide a high or enabling output when either of the inputs thereto are high while providing a low level output whenever both of the inputs thereto are low. Accordingly, as one input to OR gate 453 is connected through conductor 452 to the terminal annotated $B_4$ while the second input thereto is connected through conductor 456 to the terminal annotated $B_5$ it will be appreciated by those of ordinary skill in the art that the AND gate 458 will be enabled for clocking the address latch means 440 for all instructions containing ROM bit $B_4$ or $B_5$ in a One (1) condition which involves all of the translator instructions associated with the printer data ROM illustrated in FIG. 8 except the instruction annotated M=XL in the Operand List which, as will be appreciated by those of ordinary skill in the art, does not involve the loading of an address in the address latch means 440 but instead is associated, as shall be seen below, with the reading of addressed data from the printer data ROM means 441 and a loading of the same into the main register M for subsequent application to the printer interface 27.

The second input to the AND gate 458 is connected through 460 to the output of an AND gate 461. The AND gate 461 may take the same form as AND gate 468 and hence acts to provide a high level output whenever both of the inputs thereto are high while providing a low level output for all other sets of input conditions. The function of the AND gate 461 is to provide a gating or enabling level to AND gate 458 during predetermined clock intervals when the printer data ROM illustrated in FIG. 8 has been addressed. A first input to the AND gate 461 is connected through conductor 462 to the terminal annotated Clock while a second input thereto is connected through conductor 463 to an AND gate 464. The clock input to AND gate 461 determines the appropriate interval when the output thereof should go high while the input thereto from AND gate 464 is high only when instructions directed to the printer data ROM, illustrated in FIG. 8, have been appropriately decoded. More particularly, the clock input connected to conductor 462 represents an ANDing of clock phases $\overline{CA}$, $\overline{CB}$, and $\overline{CC}$ which, as shall be appreciated by those of ordinary skill in the art from the descriptive matter set forth above provides a 500ns interval for gating data into the address latch means 440 when either ROM bits $B_5$ or $B_4$ are high during an instruction directed to the printer data ROM as decoded by AND gate 464. The AND gate 464 is conventional and acts in the well known manner to produce a high level at the output thereof connecting to conductor 463 only when both of the inputs thereto are high. Accordingly, the output of AND gate 464 acts to enable AND gate 461 under conditions where in an instruction directed to the printer data ROM has been decoded so that the output of AND gate 461 will go high during the appropriate time interval during the presence of such instruction. A first input to the AND gate 464 is connected to a terminal annotated Basic P ROM Decode. This decode, although not shown in FIG. 8, represents an AND ing of ROM bits $B_{15}$ – $B_6$, $B_3$, $B_2$ and $B_0$ under such conditions wherein ROM bit $B_0$ is equal to a One (1) while the remaining bits listed are equal to a Zero (0) as will be readily apparent upon a consideration of the translator instructions listed in Appendix C. A second input to AND gate 464 is connected to a terminal annotated $\overline{B_1}$ and hence a high will be present on this input for instructions where $B_1$ is equal to a Zero (0). A decoding of the condition of ROM bit $B_1$ is here necessary because as will be seen hereinafter, both the program time delay and the printer data ROM have essentially the same decode except for the condition of ROM bit $B_1$ and hence while the upper input to AND gate 464 acts to decode an instruction addressing either the printer data ROM shown in FIG. 8 or the program time delay means, the condition of ROM bit $B_1$ equal to 0 distinguishes therebetween and defines an instruction wherein the printer data ROM is being addressed. Accordingly, the input to AND gate 458 connected to conductor 460 will go high during an appropriate 500ns interval when the printer data ROM is addressed while the output of OR gate 453 will go high to fully condition AND gate 458 to clock the address register means 440 for all translator instructions except the M=XL instruction, as listed in Appendix C, which causes the printer data ROM to be loaded into the main register M.

The outputs of the address latch means 440 are applied in parallel through conductors 465 – 472 to the inputs of the printer data ROM means 441 and hence due to the operation of the address latch means 440, as described above, it will be appreciated by those of ordinary skill in the art that once an eight (8) bit address is clocked into the address register means 440, the same will be applied to the outputs thereof connected to conductors 465 – 472 and will be maintained thereon until a new address has been loaded into the address register means 440. Thus, once the microprocessor indicated by the dashed block 16 has caused a given address to be loaded into the address register means 440, it may return at some later time to receive the eight (8) bit data word read from the printer data ROM means 441 in response thereto by simply enabling the gate array means 442. The printer data ROM means 441 may comprise a conventional read only memory having two hundred fifty six (256) storage location for eight (8) bit words. Although any conventional non-destructive read only memory may be employed, the printer data ROM means 441 may be conveniently formed by a pair of 1024 MSI ROM chips as conventionally available from Harris or INTEL semiconductor manufacturers. These chips are conventionally 256 bits long by four (4) bits wide and hence a pair of such chips which are commonly addressed will readily provide the requisite $256 \times 8$ storage locations. As well known to those of ordinary skill in the art, such printer data ROM means 441 acts in the conventional manner to apply the contents of an addressed storage location to the outputs thereof connected to conductors 473 – 480 so that the eight (8) bits stored in an addressed storage location are nondestructively read therefrom and applied in parallel to conductors 473 – 480 until a new address has been loaded into the address latch means 440.

As stated above, twelve (12) bits of data are required for each print instruction and data is stored within the printer data ROM means 441 in such manner that an address for the low order bits reads data from the printer data ROM 441 which is only associated with the addressed character while an address for high order bit reads an address location within the printer data ROM 441 which comprises four bits of data associated with the addressed character while an address for high order bits reads an address location within the printer data ROM 441 which comprises four bits of data associated with the addressed character and four (4) bits of data which are associated with another character while the operation of the microprocessor is relied upon to separate the appropriate four (4) bits within the eight high order bits read out and forward the same to the printer interface for assembly into twelve (12) bits of print information. This operation, may best be appreciated by way of example. Therefore, exemplary contents for the 256 eight (8) bit storage locations within the printer data ROM 440 are reproduced below in Table I, while exemplary addresses for printable characters are set forth in Table II. In both Table I and Table II all data column and row notation is set forth in Hex code and the addresses specified are configured in such manner that the most significant bits are defined across the top of the table as column designations while the least significant four (4) bits are defined along the ordinate as row notation. Looking first at Table II, it will be appreciated that no addresses are present in Column 8 and hence the eight (8) bit code associated with each printable character listed therein effectively has a Zero (0) in the eighth (8) bit position associated with $DB_7$. Thus, for instance, when the alphameric character *w* is inserted at the keyboard, the binary equivalent of Hex 77 is applied to the common data bus 19 while when the alphameric character 7 is introduced, the binary equivalent to Hex 37 is applied to the common data bus. These addresses, it will be appreciated by those of ordinary skill in the art, would be applied through conductors 443 - 447 to the address latch means 440 while the condition of input conductor 450 would be varied from Zero to One to obtain the low and high order bits, respectively; however, this does not effect the uniqueness of the address defined as only a seven (7) bit code is required for each address in each case. Data for the twelve (12) bit print information is then formed as follows:

The input address when conductor 450 resides at a Zero (0) level results in the loading of an address in the address latch means 440 which will access a location within the printer data ROM means 441 containing an eight (8) bit code associated with the lowest eight significant bits of the necessary print information. If the address loaded resides in columns 0 - 3 in Table II, the most significant part of the printer data word is obtained by incrementing the column designation by +8 while residing in the same row. This will be accomplished, as will be appreciated by those of ordinary skill in the art by changing the address bit on conductor 450 from a Zero (0) to a One (1) condition. The new address will access a new eight (8) bit storage location within the printer data ROM means 441 whose most significant Hex bit represents the required data needed for the remaining four (4) bits in the twelve (12) bits of print information being formed. Conversely, if the seven (7) bit address loaded into the address latch means 440 when conductor 450 resides at a Zero is in columns 4 - 7 of Table II, the most significant part of the printer data word is obtained by incrementing the column address by +4 which is again achieved by changing the condition of conductor 450 to a One (1). When this is done, the least significant Hex bit in the newly addressed location within the printer data ROM means 441 constitutes the additional four (4) bits of required data necessary to form the twelve bit print information. Whether the addressed portion defined on data lines 447 - 449 falls within a Hex code or column address equal to 0 - 3 or 4 - 7 is determined, under program control, by comparison operations conducted within the ALU and once the result thereof is determined, the microprocessor retains either the high or low order four bits read from the shifted address and appropriately positions them with respect to data lines $DL_0$ - $DL_3$ so that the twelve (12) bits of print information may be formed at the printer interface 27. Thus, returning to a specific example, reference to Table II will indicate that when a *w* is to be printed, the initial address therefor as obtained from Table II is 77 and such address, referring now to Table I, will result in the eight (8) bit code CA being read from the printer data ROM means 441 as representative of the lower eight (8) bits of print information or the information specifying the spoke address data and the lower significant bit of the width data word. As this address defines in columns 4 - 7, an incrementation of the column address by four through the application of a One (1) through conductor 450 results in a new address in Table II equal to $B_7$ and the least significant Hex bit in this location represents the required data. Therefore, the eight (8) bit code 9A will be read from the printer data ROM means 441 and the A portion thereof will be selected by the microprocessor indicated by the dashed block 16 so that twelve (12) bit print information ACA will be formed at the printer interface 27 and forwarded to the printer unit. Conversely, for the character 7, the address for the low order bits, as obtained from Table II with conductor 450 at a Zero (0) level is 37 which causes the eight (8) bit code A7, as seen in Table I, to be read from the printer data ROM means 441. As this address resides in column 0 - 3, an incrementing of the column address by eight, as accomplished by the application of a One (1) to conductor 450 will result in a new address equal to $B_7$ and the eight (8) bit code stored in this location as seen in Table I is 9A. Therefore, as the low order address resulted from column 0 - 3, the microprocessor indicated by the dashed block 16 will select the most significant Hex bit in this storage location as the required four (4) bits of data and cause the twelve (12) bit print information 9A7 to be formed at the printer interface 27 for forwarding to the printer unit. Thus, in this manner, print codes applied to the common data bus in a seven (7) bit format are employed through manipulation of the eighth bit of the address associated therewith to derive two eight (8) bit codes and twelve (12) bits of print information for application to the printer unit.

The contents of each location within the printer data ROM means 441 as addressed on conductors 456 - 472 in the aforesaid manner are applied through conductors 473 - 480 to the inputs of the gate array means 442. The gate array means 442 may take any conventional form of gating array which acts to apply the inputs thereof connected to conductors 473 - 480 to the outputs connected to terminals $DB_0$ - $DB_7$ whenever the enable input connected to conductor 481 is high. Typically, the gate array means 442 may be formed by eight (8) AND gates in parallel wherein each AND gate has one input connected to an associated one of inputs 473 - 480 and its output connected to an associated one of terminals $DB_0$ - $DB_7$ while the second input to all of such eight (8) AND gates are commonly connected to conductors 481 so as to be enabled thereby. The relationship between the address latch means 440, the printer data ROM means 441 and the gate array means 442 essentially permit the microprocessor indicated by the dashed block 16 to load a given address into the address latch means 440 during one instruction cycle and subsequently obtain the contents of the addressed location read from the printer data ROM means 441 from the output of the gate array means 442 during a subsequent instruction cycle when the same is ready to receive such data. As will be appreciated from Appendix C, the loading of the various addresses within the address latch means 440 is accomplished through XL=ML and XL=MH instructions while the loading of the output of the printer data ROM through an enabling of gate array means 442 is accomplished through an M=XL instruction.

The enable input to the gate array means 442 is connected through conductors 481 and 482 to the output of an AND gate 483. Additionally, the conductor 482 is connected to a terminal annotated DB to M which, as shall be appreciated by those of ordinary skill in the art connects to a main register M and acts as a gating signal so that the same may accept eight (8) bit data from the common data bus 19. This means, that whenever an M=XL instruction has been issued, data will be gated onto the common data bus 19 from the gate array means 442 while a gating signal is applied from conductor 482 to the main register M so that the same may accept the eight (8) bits of data gated onto the common data bus 19. The AND gate 483 may take the same form as AND gate 458 and hence acts to provide a high or enabling level at the output thereof connected to conductor 482 whenever both of the inputs thereto are high while providing a low or disabling output on conductor 482 for all other sets of input conditions. A first input to AND gate 483 is connected through conductor 484 to the output of AND gate 464. As it will be recalled that the AND gate 464 acts to decode the presence of instructions directed to the printer data ROM illustrated in FIG. 8, it will be appreciated that the input to AND gate 483 connected to conductor 484 goes high to provide an enabling level to this gate any time an instruction to the printer data ROM is issued and decoded and this level stays at a high or enabling level for the full duration of the instruction cycle. The second input to AND gate 483 is connected through conductor 485 and invertor 486 to the output of the OR gate 453. Since the inputs to OR gate 453 are connected to receive the condition of ROM bits $B_5$ and $B_4$ during each instruction, it will be appreciated by those of ordinary skill in the art that the output of OR gate 453 will go low to produce a high level at the output of invertor 486 only when the condition of both ROM bits $B_5$ and $B_4$ are low. However, as will be apparent from Appendix 6, this only occurs for an M=XL instruction when instructions are being issued to the printer data ROM illustrated in FIG. 8 and hence the output of AND gate 483 will go high to enable the main register M to accept eight (8) bit data from the common data bus and also enable the gate array means 442 when a M=XL instruction is decoded.

The printer data ROM peripheral illustrated in FIG. 8 is rendered operative under microprocessor control each time a character gated onto the common data bus is identified as a printable character and a mode of operation for the automatic writing system according to the instant invention has been selected wherein a print output operation at the printer unit is operative. The alphameric character information gated onto the common data bus 19 may have originated at the keyboard, a record media which is active in a play mode of operation, or in appropriate embodiments, at a language translator peripheral disclosed in the aforesaid British Provisional Application.

Typically, once such data has been identified as printable data by the microprocessor, the printer data ROM is enabled to act in its role of providing print data for the microprocessor so that twelve bit print information may be assembled therein for subsequent forwarding to the printer interface 27 and the printer unit. Typically, once printable alphameric character information has been identified by the microprocessor indicated by the dashed block 16, the printer data ROM illustrated in FIG. 8 will be addressed and print information retrieved in two passes will be assembled into twelve (12) bit print information for application to the printer interface 27. The first instruction issued by the read only memory 80 for accessing print information from the printer data ROM illustrated in FIG. 8 will normally take the form of an XL=M instruction where the $DB_7$ level is imposed on conductor 450 for loading into the address latch means due to the condition of ROM bit $B_4$ in the instruction while the condition of data bits $DB_0$ - $DB_6$ are present in the main register M would be directly applied through the data bus for the remaining portion of the address initially supplied for the high order bits to the address latch means 440. This address is clocked into the address latch means 440 due to the action of AND gate 458 so that in response to the XL=MH instruction, an eight (8) bit address is latched into the address latch means 440 which is approriate to access the high order bits of a print instruction for the alphameric character presently loaded into the main register M. This address, as will be appreciated by those of ordinary skill in the art, is directly applied to the printer data ROM means 441 through conductors 465 - 472 and in response thereto eight (8) bits of information will be read from the printer data ROM means 441 and applied to conductors 473 - 480. Once this address has been latched into the address latch means 440, the program may or may not require this information immediately. At any rate, when the data is required, an M=XL instruction is issued. During this instruction cycle, the only thing that happens is that the information from the printer data ROM 441, as applied to conductors 473 - 480 is gated through the gate array means 442 and loaded into the main register M; it being noted that the gating level generated by AND gate 483 in response to an M=XL instruction acts both to enable the gate array means 442 and to generate a DB to M level so that the output of the gate array means 442 as applied to the common data bus 19 may be accepted by the main register M. Subsequently, an XL=ML instruction will issue which causes a second eight (8) bit address to be loaded into the address latch means 440. In this case, the bit content associated with input conductors 443 - 449 is the same as loaded for an XL=MH instruction; however, the bit level on conductor 450 is now in a low condition due to the condition of ROM bit $B_4$ and hence, the address loaded into the address latch means 440 is appropriate for accessing the low order bits of print information for the alphameric character under consideration. This address is applied through conductors 465 - 472 to the printer data ROM 441 and will cause, as aforesaid, the eight (8) low order bits of print information to be read therefrom and applied to conductors 473 - 480. Subsequently, an M=XL instruction again issues to cause the eight (8) low order bits to be applied through the gate array means 442 to the common data bus 19 and loaded into the main register M due to the enable level DB to M generated on conductor 482. Accordingly, at this juncture, sixteen (16) bits of print infformation have been read from the printer data ROM means 441 and loaded into the main register M in two passes.

The four pertinent high order bits received and the low order eight (8) bits received by the microprocessor are appropriately ordered and stored within the $G_1$ and $G_0$ register locations within the general purpose registers 83. Additionally, the microprocessor acts, under program control, to ascertain the mode of printing employed and calculate the ribbon advance data which is to be forwarded in the twelve (12) bits of print information being assembled. For instance, if proportional spaced printing is taking place, the ribbon advance information read from the printer data ROM means 441 appropriately defines ribbon advance displacement; however, in ten pitch or twelve pitch modes of printing, constants read from the read only memory 80 appropriate for the uniform width of printing employed are substituted therefor in the twelve (12) bits of print information being assembled within the $G_1$ and $G_0$ register locations. Additionally, the character width thus calculated is also retained in storage for use in the formulation of a escapement command which precedes and that which is to follow the printing of an alphameric character. More particularly, it will be recalled that escapement within the instant invention takes the form of an escapement equal to one-half the width of both the preceding and succeeding character prior to the printing of information. Therefore, the width of the previous character printed is already stored and hence one-half this width plus one-half of the width of the new character to be printed, as currently identified in registers $G_0$ and $G_1$ is employed to assemble the escapement command. This command is then executed whereupon the carriage is displaced to the appropriate position for printing the character. Once registers $G_1$ and $G_0$ have been properly set up, the low order bits (0–3) stored in register $G_1$ are loaded into the high order data bit latches at the printer interface 27 and subsequently $G_0$ is loaded into M for application to the printer interface so that the whole twelve (12) bits of print information now assembled at the printer interface may be strobed to the printer unit. Thus it will be appreciated by those or ordinary skill in the art that the printer data ROM illustrated in FIG. 8 is directly addressed by the alphameric character information defined on the common data bus and read through the manipulation of a high order bit to provide twelve bits of print information. Once such print information is assembled, at the microprocessor, appropriate escapement commands are executed at the printer unit and thereafter the whole twelve bits of print information are assembled at the printer interface for application to the printer unit. It may also be noted, as aforesaid, that in cases where deferred escapement has operated, i.e. where a 100ms interval has elapsed, so that the microprocessor causes automatic escapement to operate whereby the printer unit resembles the operation of an ordinary typewriter to an operator, the forwarding of appropriate escapement information to the printer unit prior to the execution of a print command, would involve the subtraction of one-half the uniform escapement width assumed for purposes of deferred escapement plus the addition of one-half the width of new characters to be printed from the sum of one-half the width of the previous character printed plus onehalf the width of the standard escapement already executed at the printer unit under a deferred escapement approach. Thus, in proportionally spaced modes of printing where a narrow character is to be printed in the next command, and deferred escapement has operted, escapement may effectively occcur to the appropriate character print position in a reverse direction.

THE KEYBOARD CONFIGURATION

FIGS. 9A and 9B illustrate keyboard configurations suitable for use in conjunction with the instant invention and more particularly within the apparatus depicted in FIG. 2 wherein FIG. 9A is a keyboard configuration especially adapted for embodiments of this invention employing record media in the form of a tape or the like and FIG. 9B is a keyboard configuration more suitable for embodiments of this invention employing a magnetic card as the record media. The keyboard configuration shown in FIGS. 9A and 9B may take the form of conventional electronic keyboards which include 44 or 46 standard character keys, the latter arrangement not being illustrated as this format is only preferred for embodiments of the instant invention which are to be employed outside the United States. In addition, each of the keyboard configurations include a plurality of added function keys, which as shall be seen below, are denominated Mode Keys, Action Keys and Encoded Function Keys. As such, the keyboards illustrated in FIGS. 9A and 9B may take any of the well know forms of electronic keyboard arrangements conventionally available in the marketplace such as those manufactured by Honeywell Incorporated or Keytronics Corporation. Because the keyboard arrangements illustrated in FIGS. 9A and 9B are highly similar, and differ only in areas associated with the capability of the record media employed, common reference numerals will be relied upon to define keys performing equivalent functions in the FIG. 9A and 9B embodiments set forth to clearly point out their corresponding nature. Where however, a commonly placed key has a different function due to the record media, it will be differently referenced and described in specie in conjunction with the description of the Figure in which it appears.

In essence, each of the standard character keys are capable of three functions; to wit, lower case, upper case and an encoded function. As each character is struck, the key provides the eight (8) bit modified ASCII code (U.S. ASCII) associated with a given character for transmission to the console and such eight bit modified ASCII code will be inputted in parallel format into the automatic writing system according to the present invention through the eight (8) bit data cable 23 illustrated in FIG. 2. More particularly, the keyboard configurations illustrated in FIGS. 9A and 9B comprise a standard keyboard array indicated by the dashed block 490, a code key 491, a margin lever 492, a tab clear and set lever 493, a line space lever 494, a font pitch lever 495, a carriage position pointer 496, a margin release key 497, forward and reverse paper index keys 498 and 499, a space expand key 500, mode control keys indicated by the dashed blocks 501 and 502, justify mode key 503, action keys indicated by the dashed blocks 504 and 505 and a pair of thumbwheels 506.

THE STANDARD KEYBOARD ARRAY

The standard keyboard array indicated by the dashed block 490 includes the majority of basic operational keys found in any typewriting system. Thus, the standard keyboard array enclosed within the dashed block 490 includes a 44 key array of standard alphameric characters, as found on any conventional typewriter keyboard or alternatively, one of the standard 46 key arrays conventionally employed in most foreign countries may be substituted therefor in the manner considered in British provisional application Ser. No. 31701/75. Additionally, the standard keyboard array includes a tab key, a shift lock key, a shift key, a carriage return key, and a backspace key; each of which is also conventional in any electric typewriter configuration.

The forty-four (44) standard character keys located within the standrd keyboard array indicated by the dashed block 490 are each capable of three functions. These functions are lower case, upper case and an encoded function. The lower case function, as is conventional in any keyboard is initiated merely by a depression of the key whereupon an eight (8) bit modified ASCII code associated with the lower case character of that key is generated at the keyboard in the well known manner and thereafter will be inputted into the system. The upper case function is initiated, also in the conventional manner by the depression of that key with the shift or shift lock keys in a down position. When these conditions occur, the upper case function or where appropriate, the capital letter associated with the letter imprinted on the key will be represented by the eight (8) bit modified ASCII code generated at the keyboard. The depression of the left or right shift key or the shift lock key will cause an electronic shift, in the well known manner of the keyboard but no printer movement. As each character is struck, the upper case eight (8) bit modified ASCII code associated with each struck character is inputted into the system. Although each of the forty-four (44) standard character keys within the standard keyboard array indicated by the dashed block 490 is capable of a third or encoded function only those keys with an annotation printed on the aslant portions thereof such as Format, Stop or the like are utilized with respect to the encoded function. The encoded function, like the upper case function, is obtained by a depression of the character key with the code key 491 in a depressed condition. The code key, like the shift key, though only operative in predetermined modes, will cause an electronic shift of the keyboard to occur in such manner that as each character is struck, the encoded function eight (8) bit modified ASCII code associated with each struck character is inputted into the system. Of the forty-four (44) standard character keys present within the standard keyboard array indicated by the dashed block 490 at least the index, reverse index, carriage return, space, underscore, x, hyphen and period keys are typamatic or repeatable alphameric keys in that when such keys are depressed and held depressed for more than 500ms the eight (8) bit modified ASCII code associated with the character on the key struck will be repeatedly inputted to the system as long as such key is held depressed so that an automatic repeat function is displayed thereby. Similarly, the space bar, when depressed, will cause the carriage to advance forward, left to right, one character space for each depression. As is conventional in keyboards of this type, the space bar is also repeatable and hence if it is held depressed for more than 500ms the daisy wheel print element carriage will continue to be advanced as long as the space bar remains in a depressed condition or until the right hand margin is reached. The repeat function, as shall be appreciated as this disclosure proceeds, may be achieved by causing a separate line associated with keys displaying the repeat function to go high when the key is struck and timing the duration through which the key is held in a depressed condition with a monostable having the duty cycle of 500ms. If the key remains in a depressed condition upon the timing out of the monostable, the eight (8) bit ASCII code associated with the struck key is automatically repreated until the same is released. Alternatively, repeat keys or those for which an N-rollover function is desireable, may be caused to provide a separate output from the encoder chip at the keyboard and the same may be timed by the microprocessor so that at the termination of the desired interval selected for the repeat function, i.e., 500ms, the modified eight (8) bit ASCII code associated therewith would be automatically repeated by multiple samplings of the output of the encoded chip. An alternative arrangement would be to have the repeat function generate a status input which then could be timed by the microprocessor to again obtain a similar result. When the space bar is depressed together with the code key 491 during a record mode, a required space character will be inputted into the automatic writing system according to the instant invention.

The shift key, right or left, when held depressed will cause an electronic shift of the keyboard but no printer movement occurs. As each character is struck, the upper case eight (8) bit modified ASCII code associated with each character struck is inputted to the automatic writing system according to the present invention. The shift lock key mechanically locks the left hand shift key in the upper case position until depressed again to release. The carriage return key, when struck, initiates a program sequence which causes the daisy wheel print element carriage to move to the left hand margin or tab position established and the paper feed to execute the number of vertical index operations specified by the setting of the line space lever 494. When depressed together with the code key 491 during a record mode, a required carriage return will be encoded into the system. The function and utilization of required carriage returns and other encoded functions will be described in connection with the operation of the overall automatic writing system according to the present invention.

The tab key, when depressed, will cause the carriage to move from its present location to the next tab position set to the right of the disy wheel print element carriage provided the carriage is not at a right hand margin position. When depressed, toegether with the code key in a record mode, a required tab will be provided to the automatic writing system according to the present invention. As shall be seen below, all tabs set are stored in the automatic writing system according to the present invention and are implemented under program control in a print mode of operation. For instance, tab set in the first line of a pragraph during recording are determinative of the left hand margin for that paragraph in a play mode and hence if it is desired that only a first line of a paragraph be indented, the code key 491 must also be employed.

The backspace key, when depressed, will cause the daisy wheel print element carriage to move in a reverse direction, (right to left) one character space for each depression. Such character spacing is ascertained under program control and hence will be appropriate regardless of the pitch set or whether or not a tab was the last character recorded. The key is preferably repeatable and hence when held for a greater interval than 500ms, the carriage will continue to move in a reverse direction for as long as the backspace key is in a depressed condition or until the left hand margin is reached. When depressed together with the code key 491, in a record mode, a precedented backspace will be input into the system; it being noted that in a record mode, the mere depression of the backspace key causes an erasure of previous information inputted into the system while the depression of the backspace key together with the code key 491 merely causes the backspacing by one character position of the daisy wheel print element carriage for underlining operations and the like. The depression of a key to enble a function such as space, backspace or table all generate a code which is analyzed and causes a branch to a program that defines what action is to be taken by the printer. Furthermore, in the case of a backspace code, the nature of the character previously inserted and hence that to be backed over is withdrawn from the read/write buffer and in the case of proportionally spaced information, the character width thereof is obtained by an addressing of the printer data ROM so that the printer unit may be backed up to its precise position prior to the entry of that character so that even though a proportionally spaced mode of printing may be employed, the automatic writing system according to the instant invention is responsive to backspace or precedented backspace codes to precisely back up the print position at the printer unit to that which existed just prior to the entry of the last character. Thus, the standard keyboard array indicated by the dashed block 490 provides the majority of the print function operational keys for the instant embodiment of the automatic writing system according to the present invention and are similar, as aforesaid, to those generally found on any conventional typewriter keyboard so that an overall familiarity with the operation and use of these keys is assured.

The margin set lever 492 is employed to electronically set the left and right margin positions in precisely the same manner as was described in U.S. 429,479, supra. Thus, it will be appreciated that when the lever is placed in its up position, an eight (8) modified ASCII code representing the present position of the daisy wheel print element carriage will be forwarded to the microprocessor for storage and in this case, as shall be seen in greater detail in conjunction with FIG. 11, margin information is stored within hex storage location 240 within the random access memory means 34. Similarly, with the daisy wheel print element carriage repositioned for the right hand margin, the margin set lever 492 may be placed in its downward position to store the right hand margin information in storage location 241 of the random access memory means 34. Accordingly, when the margin set lever 492 is employed, the present position of the daisy wheel print element carriage, when the left and right margins were set, will be loaded into appropriate storage locations within the storage portion 37 of the random access memory means 34 and standard margin settings, as provided by the instant invention will be ignored. In the instant invention, the current position of the daisy wheel print carriage is maintained within the general purpose registers 83 within register location HA and is continuously updated. Therefore, when a margin setting operation is indicated, the current position of the daisy wheel print element carriage is read from register HA and loaded into the appropriate one of the storage locations within the random access memory means 34 wherein location 240 is employed for the left hand margin setting and storage location Hex 241 is employed for the right hand margin. The instant invention additionally provides standard margin settings which are automatically loaded into the system during a power up operation as soon as the selected pitch at which printing is to take place is sampled. These standard margins are maintined within the read only memory 80 and appropriately accessed during a power up operation or whenever the pitch is changed through a manipulation of the font pitch set lever 495. For ten pitch, exemplary standard margins which may be employed are 10 and 70, while for twelve pitch, or proportional spacing modes of printing, margin settings of 12 and 84 are suitable. The numerical values set forth for the standard margins described represent column settings on the scales illustrated in FIGS. 9A and 9B and when paper is inserted within the printer unit at column 0, these settings will provide a six inch right and one inch left margin when only these standard margins have been set and no tabs have been established. Changing of the pitch mode of printing selected merely redefines the character positions at which the margins are located; however, as no mechanical detents are present within the printer unit employed within the instant invention, no physical relocation takes place. Resetting of the left hand margins is implemented by effectively setting new margins through the use of the margin set lever 402. If a new left hand margin is to be set to the left of the previous left hand margin established or if a new right hand margin is to be set to the right of the previous margin established, the margin release key is first employed to achieve appropriate placement of the daisy wheel print element carriage in conjunction with the utilization of the space bar, the carriage return key, or through similar other conventional techniques. In the proportional spaced mode of operation, margins may be set every 1/12th of an inch corresponding to columnar print positions for a twelve pitch mode of printing, should an attempt be made to establish margins intermediate the twelve pitch column settings, the automatic writing system according to the instant invention will automatically redefine the margin to the nearest columnar position in a twelve pitch printing mode. Additionally, as shall be seen below, margin settings and tab settings may be recorded on a record media during a record mode of operation and automatically set into the system upon a playback of such a prerecorded media. As will now be appreciated from the description set forth above, information such as margin settings, tab settings and paper index settings must be electronically set into the system because the printer unit employs no mechanical detents and hence, such information may not be permanently set thereinto.

The tab clear and set lever 493 is employed to electronically set or clear tab locations. More particularly, since the instant invention employs no mechanical detents or the like to accommodate the mechanical implementation of tab settings, established, a portion of the general storage area 37 of the random access memory 34 is employed for the establishment of a tab register which on essennce provides a pair of bit locations for each possible column in a print line at which a tab may be established. Therefore, in such tab register, either a tab or non-tab indication is provided as a function of the tab settings established by an operator and such tab register is cleared each time a power down operation is initiated or loaded as a function of a record media being played or the operator's manipulation of the tab clear and set lever 493. Storage locations Hex 200 - Hex 227, as shall be seen below, within the random access memory means 34 are devoted to the formation of a tab register and, as will be appreciated by those of ordinary skill in the art, this number of addresses will effectively provide 39 eight (8) bit storage locations for the maintenance of tab information. Therefore, as two (2) bit locations are employed for the storage of tab information for each column position, it will be appreciated by those of ordinary skill in the art that 156 column positions, which more than exceed those available on a standard fifteen (15) inch roll printer, are provided within the tab register established within the random access memory means 34. Furthermore, it should be noted that column print positions defined within the RAM are defined in terms of twelve (12) pitch print columns which is also appropriate for proportional spaced modes of printing. Therefore, whenever a ten (10) pitch print mode is selected or a tab is set in proportional spaced printing modes which does not correspond identically to a column in twelve (12) pitch, a conversion to the appropriate ten pitch value occurs, while in proportionally spaced print modes the tab setting established is displaced to the next adjacent twelve (12) pitch print position. The actual setting of a tab or the clearing of the same is done in the conventional manner in that the daisy wheel print element carriage is appropriately displaced by the periodic depression of the space bar or the like until the desired tab location is obtained. Thereafter, the tab is set by displacing the tab clear and set lever 493 in a downward position or cleared by displacing the tab set and clear lever 493 in an upward position. The tab clear and set lever 493, when displaced in the downward position will cause a 01 to be written into the tab register established within the random memory means 34 at a bit location corresponding to the present position of the daisy wheel print element carriage. Conversely, a 00 condition is written into the address when a tab is cleared or no tab has been set for a given column position. The actual writing of the 01 or 00 conditions within appropriate storage locations in the random access memory means 34 is accomplished by instructions read from the read only memory 80 onto the common instruction word bus 20 in response to data obtained from a setting of the tab set and clear lever 493 in either the downward or upward position. Such instruction will cause the addressing ot the appropriate address locations within the random access memory means 34, followed by the writing of the appropriate two bit character therein. The address for the appropriate storage location within the RAM is obtained by dividing the current address of the daisy wheel print element carriage, as maintained in register location HA, by four (4) and adding the resulting Hex value to Hex address 200 which represents the start of the tab register within the random access memory means 34. The resulting Hex address will yield the eight bit storage location in which the requisite column address resides while the remainder, if any, will define the appropriate bit pair within that eight bit address. Furthermore, when read, the condition of any bit gated onto the common data bus may be obtained through a gating of that bit condition onto the common status bus through the action of the printer status multiplexer 382 illustrated in FIG. 7. Whenever the tab clear and set lever 493 is raised or lowered, a coded eight (8) bit character representative thereof is applied in parallel from the keyboard means to the common data bus 19 and loaded into the main register M. Thereafter, the eight (8) bit character is processed in the ALU 84 where its nature is ascertained by a plurality of comparison operations.

When a compare is obtained indicting that a tabset or clear operation is present, a low level is sent by the ALU onto branch conductor 106. This causes the read only memory address register means 81 to go into a branch sequence wherein appropriate instructions are read from the read only memory 80 and applied to the sixteen (16) bit instruction word bus 20 to cause a 01 or 00 (set or clear) to be written into the appropriate bit location in the tab register established in the random access memory means 34. Additionally, when the tab clear and set lever 493 is placed in an upward condition with the code key 491 depressed, all stored tabs will be cleared under program control. Furthermore, when the tab clear and set lever 493 is placed in a downward condition with the code key 491 depressed, a special tab defined as a 1,0 bit pair condition will be written into the appropriate column location within the tab register established. Such special tab indications, as shall be seen in greater detail below, are employed to define the right hand limit of any column defined by an operator in certain special modes of operation employed within the instant invention such as the right flush program wherein columnar data may be entered on the left hand portion of a column defined and played back so that the same is appropriately printed flush to the right hand without the operator going through a plurality of manual spacing functions. Such special tab indications are also employed for column centering program routines and in each of these routines, as shall be seen in greater detail below, various columns in which columnar data is to be specially treated are defined at the keyboard by the insertion of a regular tab at the left hand limit of a column and a special tab at the right hand limit of the column. Therefore, it will be appreciated that up to three sets of conditions may be established for each column print position within the tab register established within the random access memory means 34 under such conditions that a 00 represents an absence of a tab, a 01 represents a tab and a 10 represents a special tab in the pair of bit locations associated with each columnar print position. Furthermore, any tab or margin information entered at the keyboard during a record mode of operation is recorded on the record media and when such record media is subseqently employed in a playback mode of operation, tab and margin information recorded on the record media may be relied upon to automtically cause the setting of the margin and tab registers present within the random access memory 34 for the appropriate printing of the document information recorded thereon.

The line space lever 494 acts in the conventional manner to define whether single, double or one and one-half line spacing is to be employed in the document which is being printed in response to data supplied to the system at the keyboard or from the record media. The instant invention is capable of three discrete vertical line spacing operatios which are selectable for any mode of printing elected. More particularly, when the line space lever 494 is placed in the down position, double spacing is selected wherein printing is accomplished at three lines per inch which when the line space lever 4944 is displaced to its up position, a single space printing mode is elected whereupon printing at a spacing of six (6) lines per inch occurs. In the intermediate position illustrated in FIGS. 9A and 9B, the line space lever 494 acts to select a one and one-half line spacing mode wherein printing is achieved at line spacing of four (4) lines per inch. As the printer unit employed in the instant invention does not utilize mechanical detents to accomplish any of the functions indicated below, the setting of the line space lever 494, as shall be seen below, is connected to status inputs on the keyboard interface illustrated in FIG. 10. More particularly, as shall be seen in conjunction with FIG. 10, two status lines representing single space and double space settings for the line space lever 494 are run out so that the status bus may be tested and appropriate One or Zero conditions representing the line space function selected set in register locations GB1 and GB2 under such conditions wherein a One on the appropriate status line will indicate the selection of the line spacing function asociated with that conductor while a Zero (0) on both status inputs and hence in both register locations within the general purpose G register will indicate that a one and one-half line spacing function has been selected. During printing operations, the condition of the status line or the bit condition established within register locations GB7 and GB6 may be tested and an appropriate paper index command to achieve the desired line space function forwarded to the printer unit in response to each carriage return operation. As will be seen hereinafter, particular line space functions may be recorded on the record media and employed to override a selected line spacing at the keyboard.

In a similar manner, the font pitch set lever 495 is employed to designate whether a ten, twelve, or proportional spaced pitch mode of printing is desired and a daisy wheel print element having a corresponding pitch is mounted in the printer unit. This is required because the nature of the pitch of the character font being employed will determine the per character spacing required by the printer unit and hence the nature of the character displacements forwarded to the printer unit in response to the width definition for each character printed in the printer data ROM. More particularly, it was seen in conjunction with the description of the printer data ROM that each time a character is to be printed, twelve (12) bits of character information for printing purposes are accessed from the printer data ROM and three bit of such character information represents the width of the character for proportional spaced printing modes. When a proportional spaced printing mode has been elected, this width information may be used in a direct manner for forwarding escapement information to the printer unit. However, when either a twelve (12) or ten (10) pitch mode of printing is selected, the width information supplied by the printer data ROM is discarded and displacement constants associated with the pitch selected are red from the read only memory 80 and employed in supplying escapement information to the printer unit. In a ten (10) pitch mode, normal carrier escapement is one-tenth of an inch, in twelve (12) pitch mode, normal character escapement is one-twelth of an inch, while in a proportionally spaced mode of printing, the escapement will vary depending upon the nature of the character to be printed. Like the line space lever 494, the condition of the front pitch set lever 495 is run to a pair of inputs at the keyboard interface illustrated in FIG. 10, and hence, may be selectively gated to the common status bus 21. One of such status inputs is associated with an election of a twelve pitch mode of printing while the other status inputs is associated with the election of a ten pitch mode of printing. If the condition of both status inputs are low, it is automoatically assumed by the microprocessor that a proportionally spaced mode of printing has been selected. The condition of the font pitch set lever 495 is stored within the general purpose registers in terms of proportional spaced or twelve pitch within register locations G6 - 7 or GF - 7.

The carriage position printer 496 is mechanically coupled, in a manner not shown, to the daisy wheel print element present in the printer in such manner that as the daisy wheel print element in the printer is displaced from left to right or right to left, the carriage position pointer 496 is displaced therewith as shown in both FIGS. 9A and 9B. A portion of the keyboard housing associated with the carriage position pointer bears displacement graduations, defining print column positions, in units which are appropriate for both ten and twelve pitch character fonts. These graduations are in registration with the carriage position pointer 496 so that when the carriage is at its extreme left position the pointer reads Zero (0) on the graduations provided while when it is in its extreme right position, a maximum scale reading is provided. For proportionally spaced printing modes, the twelve (12) pitch scale is the most appropriate, although intermediate column print positions do obtain. In this manner, an operator is continuously apprised of the position of the daisy wheel print element carriage in a manner similar to that utilized in conventional electric typewriters.

The margin release key 497 and the forward and reverse index keys 498 and 499 perform essentially the same functions in essentially the same manner as was described in U.S. application Ser. No. 429,479, supra and hence, a detailed discussion thereof will not be repeated. However, it may be briefly observed that the margin release key 497 provides a status indication to the common status bus 21 through the keyboard interface illustrated in FIG. 10 which causes the automatic writing system according to the instant invention to ignore the margin settings established for the interval during which this key is depressed. Thus, when the margin release key 497 is depressed, the margin set will not be honored.

Similarly, the paper indexing keys 498 and 499, when depressed, will cause the paper feed to execute a vertical indexing operation equal to one twelfth (1/12) of an inch or that corresponding to one-half (1/2) of a single line space and such displacement of the paper feed roll will occur in the direction of the arrows indicated on the keys. Both paper index keys 498 and 499 are repeatable or typamatic and hence, if held for a greater interval than 500mm, the paper will contines the vertical indexing in the direction specified for as long as the key remains depressed. The depression of one of the index keeys 498 or 499 results in the imputting of eight (8) bit character informtion on the common data bus 19 to the system and this eight (8) bit information is analyzed and responded to under program control. In a record mode of operation, characters input upon the depression of paper index keys 498 and 499 will be recorded to ensure that when the record media is read during playback, the feed will automatically execute recorded vertical index operation be it in a forward or reverse direction. The forward index key 498 is also utilized to designate an encoded function, indicated as SCR thereon, as well as an index operation and hence, when the code key 491 is struck, the encoded function associated therewith, ie, special carriage return, will be applied to the automatic writing system according to the present invention. Similarly, the reverse index key 499, as indicated thereon, is utilized to designate an encoded function, indicated PSCR thereon as well as a reverse index operation and thus, when the code key 491 is depressed and the reverse index key 499 is struck, the encoded function associated therewith, ie, precedented special carriage return, will be applied to the automatic writing system according to the present invention. The function and purpose of the encoded functions employed in the instant embodiment of the present invention will be described hereinafter.

The space expand key 500 is operative whenever a proportionally spaced printing mode is selected to cause the printing of space, period, comma, hyphen or parenthese to occur on a uniform five unit basis (1/12of an inch) to effectively block out the spacing associated with these characters in a proportionally spaced mode of printing so that alphameric characters such as numbers and the like may be printed in a columnar format. The space expand key 500, when depressed, creates what is in effect a new code group which corresponds to the printing of these characters in a twelve pitch mode. Upon a depression of the space expand key, an eight (8) bit code is entered onto the common data bus and classified by the microprocessor indicated by the dashed block 16. When its nature as a space expand code is ascertained, a space expand bit is set in the general purpose registers 84 at location G87 so that the system is provided with a flag notation that this key has been depressed. Thereafter, as each alphameric character is entered at the keyboard, the microprocessor acts to ascertain during the classification thereof, whether or not such alphameric character is an expandable character and if it is an expandable character, the status of the space expand bit stored in register location G8-7 is checked. When this bit is set, the expandable character entered at the keyboard is printed in the same manner as if it were entered in a twelve pitch mode of printing to thereby achieve a blocked format therefor. If a record mode is selected, the resultant recording codes for expandable characters entered when the space expand key 500 is depressed will have expanded codes so that in subsequent playback in a proportionally spaced mode, such codes will be printed as five unit characters. The space expanded key 500, as indicated thereon, is also utilized to designate an encoded function, indicated as L UNSC thereon, as well as the space expand function and hence, when the code key 491 is depressed and the space expand key is placed in a down condition, the encoded function associated therewith, ie, line underscore, will be applied to the automatic writing system according to the present invention. The function and purpose of the encoded functions employed in the instant embodiment of the subject invention will be described below.

THE MODE CONTROL KEYS

The mode control keys enclosed within the dashed blocks 501 and 502 include the record key annotated REC, the revise key annotated REV, the code print key, the margin control key annotated MARG CONT, the duplicate key annotated DUP, the skip key and the play key. Each of these mode control keys perform the same function in both the cassette and card record media embodiments of the instant invention and hence their description with respect to both FIGS. 9A and 9B may be commonly set forth except as hereinafter specifically noted. Furthermore, since in the majority of cases these mode control keys perform substantially the same function in substantially the same manner as the corresponding mode control keys described in U.S. application Ser. No. 429,479, supra, whose disclosure is incorporated specifically by reference herein, only a brief description of the operation of the corresponding functions of such mode control keys will be here set forth together with any substantial differences in the modes of operation initiated thereby. In this latter regard, it may be noted that certain of such mode control keys are employed in conjunction with the code key to initiate an encoded function which was provided in the keyboard structure set forth in FIG. 5 of U.S. application Ser. No. 429,479, supra, however, such encoded function was provided in association with another key at the keyboard. When these conditions obtain, in regard to the instant invention, the different disposition of such encoded function will be noted, it being appreciated by those of ordinary skill in the art that the function initiated thereby together with its mode of implementation is substantially the same as was set forth within U.S. Ser. No. 429,479. It should also here be noted that a justification key 503, annotated JUST, is also properly classifiable as a mode control key and hence is treated in both FIGS. 9A and 9B within this section of the specification.

Each of the mode control keys included within the dashed blocks 501, and 502 or the justify key 503, specifies a unique mode of operation within the present invention to enable one or more modes of operation to be selected by an operator. As each of the mode control keys specifies one of several modes of system operation, each of these keys, though not described herein, is preferably illuminated upon the actuation thereof so that the mode of operation selected is plainly indicated to the operator at the keyboard. When none of the mode control keys are operative while the system is energized, the automatic writing system according to the instant invention will act as an electronic typewriter wherein data entered at the keyboard, is forwarded under program control through the microprocessor indicated by the dashed block 16 and each character forwarded thereto is loaded into the main register M. Thereafter, alphameric characters suitable for printing are classified by the microprocessor, loaded within the read/write buffer 35 on a first in first out basis and employed to address the printer data ROM 43 in the manner described above. Thereafter, character information as well as escapement informaton is developed and forwarded to the printer unit to cause the printing of alphameric characters inputs at the keyboard to thus synthesize the normal mode of operation of the typewriter. Similarly, control and function information entered at the keyboard is forwarded through the common data bus 19 to the microprocessor indicated by the dashed block 16 and loaded within the main register M. Here however, such control and function information is input at the keyboard is classified and subsequently identified whereupon the same is appropriately employed to set various flags within the general purpose registers 83 or the general storage area 37 of the random access memory means 34 as well as to cause various branch operations to initiate program sequences of operation under the control of sixteen (16) bit instructions issued by the read only memory 80. Thus, when none of the mode control keys are depressed, the instant embodiment of the present invention acts in a mode which corresponds to that of a normal typewriter and no recording on the record media takes place even though the buffers are active.

The record key, annotated REC, is a key which when depressed selects the record mode of operation. In this mode, the read/write record media station is active and in tape or cassette versions of the instant invention, associated with the keyboard illustrated in FIG. 9A, the record media is automatically searched for a recordable area which is detected when an end of record character (EOR) is located. An end of record character (EOR) is recorded on the record media each time the record mode is turned off in cassette embodiments of the instant invention. This enables previously recorded data to be preserved while new data is added to the record media at a location not previously utilized or where data which is not to be retained is present. When the record key is depressed an eight (8) bit code representative thereof, is applied from the keyboard to the common data bus in a manner to be more fully explained in conjunction with the keyboard interface illustrated in FIG. 10 and is loaded into the main register M. Under program control, the eight bit character loaded into the main register M is inspected in the arithmetic logic unit 84 and comparison operations are run to determine the specific nature of the eight (8) bit character. More particularly, it is first determined that the eight (8) bit character is a non-print character and thereafter the specific nature of the character as a record mode character is ascertained through various logical operations such as a comparison of this character with constants read from the read only memory 80. A branch operation is then signaled from the arithmetic logic unit 84 through the branch conductor 106 to the read only memory address register 81 whereupon a record mode of operation program sequence is initiated and a record flag is set within the general purpose registers 84 in location G9-5. The manner in which recording takes place was briefly outlined above and hence it is here sufficient to appreciate that when a record mode of operation is initiated, each character inserted at the keyboard will be forwarded to the microprocessor indicated by the dashed block 16 and loaded within the main register M. Thereafter, the nature of the character inputted into the system is ascertained through classification operations and printable alphameric characters are employed to address the printer data ROM 43 to cause twelve (12) bit character information as well as escapement information to be provided to the printer unit. Additionally, all alphameric, function, and control information entered to the keyboard is loaded on a first in first out basis within the read/write buffer 35 formed within the random access memory means 34. Subsequently, upon the receipt of a line terminating character, each character accumulated within the read/write buffer is read out in a first in first out basis and applied to the main register M through the common data bus 19. Each character thus read from the read/write buffer 35 and loaded into the main register M is subsequently forwarded to the read/write record media transports which are energized upon an indication that a complete line of information has been accumulated within the read/write buffer 35 so that lines of information are effectively recorded on the record media a line at a time to render the recording operation highly efficient. Thus, as each line of information is recorded on the record media, the read/write buffer 35 becomes available for the entry of new data from the keyboard which data is associated with the next line of information being input to the system. Although the depression of the record key in association with a data entry mode from the keyboard is apparent, it should be noted that this key may also be depressed when a record media loaded at the read only station is being read in a play mode of operation so that data read therefrom may be again recorded on a record media loaded at the read/write transport and such recording may occur in association with other data entered at the keyboard in a manner which shall become more apparent below.

In cassette embodiments of the instant invention, as was described above, when the record key is depressed, a media loaded at the read/write transport is initially searched for the presence of data thereon and if such data is present, as detected in the manner disclosed in U.S. patent application Ser. No. 429,479, supra, an end of record (EOR) character is searched for so that new data will be entered only on available portions of the record media. However, under certain circumstances it will be desired to discard previous information loaded on the cassette so that a new recording operation effectively is initiated at the beginning of the record media. Under these conditions, an erase mode is initiated by the depression of the record key in conjunction with the code key 491. This encoded function, as effectively described in U.S. patent application Ser. No. 429,479 in association with the "1" key, causes the search for an end of record media to be deleted so that a new recording operation takes place at the beginning of the record media. The erase encoded function is not provided in embodiments of the instant invention employing a record media in the form of a card and hence, this encoded function is not shown in FIG. 9B it being noted that the operator may readily and easily position recording heads at the read/write station to a desired track and hence this function is not here needed.

The revise key annotated REV in FIGS. 9A and 9B is a key, which when depressed, selects the revise mode of operation for the automatic writing system according to the present invention. This mode of operation, as described in greater detail in U.S. Ser. No. 429,479 is utilized to make corrections on a prerecorded record media loaded at the read/write station in such manner that a line of prerecorded information is read from the record media and loaded into the read only buffer portion of the random access memory 34. Thereafter, alphameric information loaded into the read only memory is selectively played, edited, and merged with information inserted at the keyboard to form a new line of information for insertion on the record media at the read/write buffer 35. Play operation transfers data from the read only buffer 36 to the printer unit 2 and to the read/write buffer 35 while keyboard entries transfer data entered at the keyboard to the printer and to the read/write buffer 35 so that a new line of information for recording on the record media may be formed therein. Furthermore, as will be appreciated by those of ordinary skill in the art, data in the read only buffer 36 may be selectively skipped so that it is neither printed nor transferred to the read/write buffer 35 in the formation of a new line of information for recording therein. Accordingly, in the revise mode, a line of prerecorded information is read from the record media, loaded into the read only buffer 36 and thereafter selectively played, edited and merged with other information inserted at the keyboard so that an appropriately modified line of information is printed at the printer unit and assembled within the read/write buffer 35 under operator control. Subsequently, upon an indication that the newly formed line of information is terminated by the inputting of a carriage return, link, or similar terminating character, such newly assembled line of information as now present in the read/write buffer 35 is recorded on the record media at a portion thereof corresponding to the location at which the original line of information to be revised was recorded so that, in effect, the newly formed line of information as assembled in the read/write buffer is substituted on the record media for the original line which was revised. In cassette embodiments of the instant invention newly formed lines of information established in the read/write buffer 35 in a revise mode of operation may include up to fifty additional characters over that present in the original line of information recorded on the record media. This mode of line expansion is available in revise in cassette versions of the instant invention because, as explained in great detail in U.S. application Ser. No. 429,479, each line of information recorded on a record media during a record mode of operation includes fifty revision character spaces for the subsequent expansion of the line in a revise mode while during recording which occurs in revise mode, no additional revision spaces are added so that the length of tape employed in recording a newly formed line of information will not exceed that originally utilized so long as the fifty additional character limitation is not exceeded. In card embodiments of the instant invention, each line of information is recorded on an individual track of the record media and each track on a standard magnetic card employed within the instant invention has space available for the recording of up to one hundred fifty characters. Therefore, in card embodiments of the instant invention, exceeding the space utilized in the recording of an original line is not a relevant consideration unless the revision achieved adds so many characters to the line that effectively the track length available on the card is exceeded. Accordingly, in card embodiments of the instant invention it will be appreciated by those of ordinary skill in the art, that the newly assembled line of information in the read/write buffer 35 as formed during a revise mode of operation may include up to 150 characters without exceeding the available space limitation on the card and hence the total character length of the new line of information formed is the relevant consideration rather than the length of the previous line plus a fixed increment available for additional character information.

Basically, the revise mode of operation is employed when a prerecorded record media is loaded at the read/write record media station and it is desired to make minor changes within lines of information recorded thereon. Major changes are more readily achieved in multitransport embodiments of the instant invention under transfer modes of operation wherein a prerecorded record media is loaded at the read only record media transport and information thereon is selectively played, edited, and merged with other information inserted at the keyboard for the accumulation of new line information in the read/write buffer 35 and subsequent recordation on another record media loaded at the read/write transport. When the revise key is depressed, an eight (8) bit character respesentative thereof is applied to the keyboard interface, as shall be seen below, through the common data bus 19 and is loaded into the main register M. Thereafter, this character is inspected under program control in the arithmetic logic unit 84 until its nature is ascertained. Once the revise character has been thus identified, a branch indication is placed on the branch conductor 106 whereupon the ROM address register 81 is placed in a revise program sequence.

The encoded function information used within the present invention without exception represents, as shall be seen below, control instructions supplied to the microprocessor from the keyboard and hence is not alphameric character information suitable for printing. Therefore, when an encoded function is entered by the depression of the code key 491 and one of the standard alphameric character keys to which an encoded function is assigned, the eight (8) bit character read in response thereto is generally not printed. There are conditions however where an operator is preparing a draft document when it would be convenient to have the presence of an encoded function indicated in the order in which it was inserted on the draft document being prepared so that such presence is apparent when the draft copy is reviewed or employed in the preparation of final copy. For this reason, the code print key is supplied. When the code print key is depressed, it will cause the printing of the alphameric character to which the encoded function is assigned and then automatic overprinting of this character with a slash to indicate that an encoded function is present rather than the regular alphameric character associated with the key depressed. For instance, where the stop encoded function is generated by a depression of the code key 220 and the three alphameric key while the code print key is depressed, a three (3) with a slash therethrough would be printed on the document to indicate the presence of the encoded function. Similarly, the instant invention is provided with rather powerful searching and formating functions wherein a string of text may be entered from the keyboard and the record media searched for the beginning point of such string of text while the record media may be formatted by providing margin, tab and title information for each block of information recorded on the record media and the record media automatically caused to print out such format information so that a log of recorded information on a record media may automatically be retrieved. The latter function is only enabled when the code print key is depressed while the former function will operate in either mode. However, a depression of the code print key will allow the string of text entered at the keyboard to be prined to enable the operator to ascertain the correctness thereof. Thus, the code print key affords operator convenience by enabling selective printing of specialized character representations indicating that an encoded function has been inserted into the system at the point on the document where the encoded function appears. The following is a list of slashed characters and the encoded functions represented thereby:

| Code | Encoded Function | Key Annotation |
|---|---|---|
| 1̸ | Reference (Cassette Only) | REF |
| 2̸ | Eject (Card Only) | EJECT |
| 3̸ | Stop | STOP |
| 4̸ | Transferring Stop | T STOP |
| 5̸ | Switch Reader | SW |
| 6̸ | Search (Cassette Only | SCH |
| 7̸ | Switch and Search (Cassette Only) | SW/SCH |
| 7̸ | Card Repeat (Card System Only) | CD RPT |
| 8̸ | Line Space | L Space |
| 9̸ | First Line Find | FL FIND |
| 0̸ | Track Link | LINK |

-continued

| Code | Encoded Function | Key Annotation |
|---|---|---|
| ‡ | Precedented Hyphen-Also used for precedented carriage return, precedented space and precedented tab. | PREC HY |
| Φ | Format | FORMAT |
| ¥ | First line set | FL SET |
| E | Page End | PG END |
| K | Skip Off (Cassette Only) | SK OFF |
| † | Switch and Skip (Cassette Only) | SW/SK |
| ¥ | Column Center | CONCTR |
| J | Center | CENTER |

Although the majority of encoded functions employed within the instant invention are assigned the key symbol associated therewith overprinted with a slash for print out when the code print key is depressed, not all encoded functions employed within the instant invention have a print symbol assigned thereto since the operation of the encoded function and hence its presence will be apparent due to the mode of printing initiated. Thus, in the case of the word underscore encoded function associated with the *w* key, the presence of this encoded function will be manifested by the initiation of an underscoring operation and hence a symbolic print out when the code key is depressed is unnecessary. Similarly, a slashed hyphen is employed not only for a mandatory or precedented hyphen, but all mandatory or precedented spacing functions such as tab, space, and carriage return and the nature of the encoded function will be apparent from the action which occurs at the printer and its context within the print sequence. Furthermore, although certain encoded functions are only assigned to cassette or card embodiments of the instant invention, whose keyboards are illustrated in FIGS. 9A and 9B respectively, it will be appreciated by those of ordinary skill in the art that the use of certain encoded functions is best suited to the characteristics of a particular embodiment; however, should it be desired to extend these functions to different embodiments or embodiments using other recording techniques, such extension will be well within the purview of one of ordinary skill in the art. However, the few differences between certain of the encoded functions employed for cassette and card record media versions of the instant invention has been amply illustrated in the differing nature of the keyboards set forth therefor in FIGS. 9A and 9B. It should be noted that the above listed encoded function symbols are only printed when the code print key is depressed to provide an operator with a symbolic representation of the encoded functions merged into the system or recorded on the record media. If the code print key is not depressed, the encoded function will be inserted into the automatic writing system in the same manner as any other character inserted at the keyboard; however, no slashed character representation thereof will be printed. The record key, the revise key, and the code print key comprise all of the mode control keys disposed on the left hand portion of the keyboard which is enclosed within the dashed block 501.

The mode control keys disposed on the right hand portion of the keyboard and enclosed within the dashed block 502 comprise the margin control key annotated MARG CONT, the duplicate key annotated DUP, the skip key and the play key. The DUP, SKIP and PLAY mode control keys within the dashed block 502 in FIGS. 9A and 9B perform the same function in the same manner to achieve substantially the same result as the correspondingly annotated mode control keys described in U.S. patent application Ser. No. 429,479. Thus, the play key acts, when depressed, to cause an automatic reading operation in which a prerecorded record media loaded at a selected one of the read/write or read only record media stations is read on a per line basis and loaded into the read only buffer 36 for subsequent printing and possible transfer to the read/write buffer when an action key is depressed. When the play key is depressed together with the record mode key, the system is conditioned to read data from a record media loaded at the read only record media station, while if the system is not in the record mode, reading will take place from the read/write record media station unless the read only station has been loaded and manually selected by means of an alternate reader key, to be discussed below, or the read only station is the only station loaded. Data read from a prerecorded record media in a play mode of operation is placed in the read only buffer 36, a line at a time, prior to transfer to the printer or read/write buffer for possible recording. The play, skip and duplicate modes are mutually exclusive. The skip key, when depressed, conditions the system to read data and function codes from a prerecorded, active record media without printing or performing any coded functions. The active media is selected under the same rules governing play modes of operation and therefore, when an action key is depressed while the skip mode is enabled, information, loaded a line at a time from the prerecorded medium into the read only buffer 36 is read but neither forwarded to the printer nor to the read/write buffer 35 and such reading is continued until conditions satisfying the action key depressed have been met. The duplicate mode is only operative in dual record media transport embodiments of the instant invention and will function only when the instant invention is in a record mode. The duplicate mode of operation causes groups of data, as defined by an action key, to be read from a record media loaded at the read only record media station and duplicated at a record media loaded at the read/write record media transport station. The reading of information from the prerecorded record media loaded at the read only record media transport station is achieved essentially on a per line basis and each line read is loaded into the read only buffer 36 in the manner described for a play or skip operation. Thereafter, each character loaded into the read only buffer 36 is read on a per character basis, loaded into the read/write buffer 35 until an entire line has been accumulated therein and thereafter recorded on a record media loaded at the read/write record media station. Here however, no printing takes place and hence the media to media transfer may take place at the extremely high speeds associated with the reading of the record media and the data translation associated with the read only and read/write buffers 35 and 36. The foregoing brief description of the functions of the play, skip, and duplicate mode control keys is here viewed as sufficient as additional detail associated with the function and operation of these mode control keys may be obtained upon a consideratin of U.S. application Ser. No. 429,479 supra, whose disclosure is incorporated herein by reference.

Similarly, the margin control key enclosed within the dashed block 502 when enabled during play modes of operation performs the same margin control features associated with this mode control key as was described in conjunction with U.S. application Ser. No. 429,479. In addition, however, a manual margin control mode function has been added to the functions enabled by this mode control key and the length of the margin zone selected may be varied through the encoded function associated wtih this key which encoded function was associated with a different key in U.S. application Ser. No. 429,479. Thus, as described in U.S. application Ser. No. 429,479, when the margin control key, annotated MARG CONT, is struck during a play mode of operation, it acts, under program control, to cause the right hand margin of the document being prepared to be adjusted to within a limited margin zone so that the right hand margin of the document prepared in this mode of playback is extremely uniform. Normally, the automatic writing system according to the present invention employs a standard five (5) character zone for margin control purposes in domestic embodiments while employing a standard seven (7) character zone in international versions and such standard zones are automatically loaded within the general purpose register at storage locations $GF_3 - GF_0$ as a function of the instructions read from the read only memory 80 when the system is initially energized. However, the margin zone established may be selectively altered by the operator so that a zero - fifteen character zone may be selected. This is achieved, by the depression of the code key 491 and the margin control key so that the encoded functionassociated therewith is enabled. After the encoded function is enabled the system is placed in a two-digit entry routine whereupon two digits, corresponding to the selected character width for the margin zone to be established is expressed in standard characters inserted at the keyboard wherein the accepted range is represented by the characters 00 – 15. Once a new width for the margin zone is established, such width is retained until it is subsequently changed by the operator or a power down operation occurs whereupon the margin zone set is wiped out and the standard margin inserted when the automatic writing apparatus according to the instant invention is again energized.

Briefly, the margin zone may be defined as a zone which is bounded at the extreme right column position on a document by the right margin set and whose left most portion is defined by the width of the zone utilized as measured from the right hand margin in a direction towards the left hand margin. Accordingly, if a standard five character zone is being employed, the margin zone will terminate at the setting provided by the right hand margin established and will be initiated five (5) character positions to the left thereof. During the actuation of a margin control mode of operation when the play key is depressed and hence a prerecorded record media is being read, line terminating codes which appear in the printing of prerecorded document information to the left of the margin zone established are replaced by space characters and the like so that premature termination of a printed line does not occur outside of the margin zone and hence the avoidance of an extremely ragged right hand margin is achieved. This means, that space code characters will be substituted for carriage return characters, non-mandatory hyphens and the like whenever the same occur outside the margin zone during the printing of a prerecorded record media. Conversely, when printing is occurring within the margin zone, hyphens and carriage return characters are honored to terminate printing within the zone while space codes and the like are transformed into carriage return characters to cause line termination to occur within the margin and thus provide termination of all lines printed either at the right hand margin set or within the right hand margin zone established. Furthermore, the automatic writing system according to the instant invention, as was described in U.S. patent application Ser. No. 429,479 is provided with a look ahead feature which provides an operator with the full width of the margin zone established for hyphenating information about to be printed within the margin zone if no character occurs for which a carriage return operation may be substituted.

Thus, during a play mode of operation when the margin control mode of operation is enabled, the automatic writing system according to the instant invention acts, under program control, upon an entry into the margin zone to cycle through the remaining characters in the line being printed until a carriage return character, or hyphen, upon which automatic carriage return occurs is located or alternatively, until a space code or the like for which a carriage return character may be substituted under rules established for the margin control mode of operation is found. Once one of these characters is detected, its order of presentation from the beginning point of the margin zone is ascertained and compared, under program control, with the width of the margin zone. If the character occurs in the printing sequence within the width of the zone established, automatic printing continues and the carriage return operation is automatically initiated within the zone; however, should this character not appear within the width of the margin zone established, the automatic writing system according to the instant invention immediately goes into a single cycle mode wherein printing may only be achieved in a manual mode by the operator by hitting the character action key so that, in effect, the operator is given the full width of the margin zone established to print out appropriate characters and insert a hyphen at an appropriate breakpoint within the margin zone established. This avoids, the normal exceeding of the right hand margin whenever appropriate breakpoint does not occur in the material being printed from the prerecorded record media. The details of the margin control mode of operation which attends a play mode of operation are set forth with particularity in the disclosure of U.S. application Ser. No. 429,479.

In accordance with the teachings of the instant invention, a manual mode of margin control is also provided within the instant invention and intiated whenever the margin control key is depressed when the automatic writing system according to the instant invention is in a mode wherein data is entered from the keyboard such as an ordinary typing mode or a record mode of operation. This manual mode of margin control will be described in great detail in conjunction with FIG. 22 of the instant invention; therefore, it will be sufficient at this juncture of the instant specification to appreciate that the manual mode of margin control provided by the instant invention is essentially an automatic carrier return feature which offers a significant increase in typing speeds whenever data is entered from the keyboard and this is particularly so during the preparation of rough drafts and the like. In essence, the manual margin control feature according to the instant invention is an extension of the normal mode of margin control exhibited by the instant invention during playback operations and the like. Here, however, since the contents of the buffer cannot be reviewed to provide such features as look ahead within the margin zone and the like, the manual mode of margin control reviews each character entered from the keyboard in light of the current position of the daisy wheel print element carriage and when appropriate, transfers the nature of this character to a carriage return character or the like so that the operator may continuously enter data without a thought to the present position of the daisy wheel print element carriage or the margins which were established. It is assumed however, that the operator is cognizant that the automatic writing system according to the instant invention has been placed in a manual mode of margin control and therefore, carriage returns and hyphens receive a somewhat specialized treatment. More particularly, in a manual mode of margin control, single carriage return characters will be converted to a precedented carriage return character since in the manual mode of margin control herein being discussed, automatic carriage return occurs within the margin zone at the entry of a space or a hyphen. Therefore, there is no need for an operator to ever enter a carriage return unless the operator is desirous of defining an end of paragraph. For this reason, any carriage return entered when a manual mode of margin control is established is transformed into a precedented carriage return and hence acts to define an end of a paragraph since a precedented carriage return is always entered to so define an end of a paragraph.

Similarly, space codes entered within the margin zone are transformed into carriage return characters so that the carrier is automatically returned, in this mode of operation, while space codes entered within the text zone are honored as is. In a similar manner, hyphens entered within the margin zone or at margin end are automatically followed by a carriage return as it is assumed, under program control, that the operator is cognizant that printing is occurring within the margin zone and the entry of a rather long word which will not allow the carrier to return within the margin zone is taking place. However, hyphens entered to the left of the margin zone or within the text zone are converted to precedented hyphens which are always honored as it is assumed that a mandatory hyphen function, such as occurs within the word "mother-in-law" is present. When the margin zone is entered by the daisy wheel print element carriage, a tone signal is provided in a manner reminiscent of the bell tone normally present on a typewriter near the margin zone to apprise the operator that the margin zone has been entered. The operator, upon hearing such tone signal, indicating that the margin or hot zone has been entered, merely continues typing assuming that at the first permisible space, or hyphen, according to the rules for margin control established by the system the carriage will automatically return to cause a continuation of printing on the succeeding line. However, if the operator is entering an abnormally long word when the tone signal sound and the point of entry thereof is such that the same will not terminate within the width of the margin zone established, the operator merely enters a hyphen code at a suitable location within the word whereupon automatic carrier return operates to carrier return and index the printer. Thus, during a manual margin control mode of entry, except when entering data following a center code, single carrier returns will be converted to procedented carrier returns, a space code entered in the margin zone or at the margin end is converted to a carrier return, a hyphen in the margin zone or at the margin end will generate an automatic carrier return, and hyphens left of the margin zone will be converted to precedented or mandatory hyphens. Furthermore, for reasons which will become apparent in the paragraph immediately below, no spaces entered at the left margin will be honored if the same are entered following a carriage return initiated under program control due to the tab control feature enabled during all modes of margin control operation. Thus, during a manual mode of margin control, spaces entered at the left hand margin will be only honored if the same are entered at the first line of a new paragraph as defined by the entrance of a precedented carriage return or the like at the end of the previous line printed. Accordingly, the manual mode of margin control established, under program control, within the automatic writing system according to the instant invention allows an operator to continuously enter data to be printed without a need for a diversion of the operator's attention to the entry of carriage return characters at the right hand margin established except when an end of paragraph is to be defined and this may occur at any desired point in a line. Furthermore, as the width of the whole margin zone established is provided for periodic hyphenation when the need arises, it will be appreciated that the manual mode of margin established within the instant invention permits an operator to continously enter data without regard to format while the programmed mode of operation established assures that entered data will be formatted in an appropriate manner.

Any time the margin control mode key is in a down condition, the automatic writing system according to the instant invention is additionally operative to indicate a tab controlled feature of the instant invention, under program control, to automatically format all data entered on a paragraph bais in a block format regardless of the nature program control to count each tab entered in the first line of a paragraph and to automatically initiate printing for each succeeding line of that paragraph at the location of the last tab entered so that each paragraph is printed in a blocked format as viewed from the left most point at which printing is initiated for that paragraph. Furthermore, if, new limits of tab control are not established at the first line of a paragraph, block printing continues in the manner defined for the previous paragraph. The tab control feature is active only when the automatic writing system according to the instant invention is in a margin control mode and the feature provides the facility for storing in a register, unprecedented tab commands whether entered from the keyboard or the media which occur for indentation purposes during the entry of the first line of a paragraph. During the printing of each succeeding line of the paragraph, stored tabs are automatically executed to thereby maintan the indentation established for the first line of the paragraph. Precedented tabs are always executed as they occur, but are never stored. Each time a paragraph break appears, stored tabs are cleared from the register to thereby cancel the previously established line indentation for the previous paragraph. A paragraph break is defined as a precedented carriage return, a precedented special carriage return, any two or more code sequence of carriage return codes of any type, (CR, SCR, PREC CR, and PREC SCR), a carriage return followed by a precedented tab or a special carriage return followed by a precedented tab. The conditions for tab control conversions are such that when the register is opened, it is indicative of the first line of a paragraph. The end of the first line results in the closing of the register regardless of whether the end of the line is defined by an actual carriage return or a carriage return operation which results from the margin control mode. Upon return of the carrier, the register is closed and for each succeeding line of the paragraph, as defined by the closed condition of the register, each carriage return character which is executed results in the register remaining closed and tabs loaded therein being executed to place the paragraph in a block format. When a paragraph break occurs, the register is opened and no tabs are executed pending the loading of new tabs therein. When automatic playback by paragraph is occurring, the automatic writing system according to the instant invention will stop prior to the first tab or the first printing character, which ever occurs first, following the end of a paragraph. Accordingly, in any mode of margin control, a tab control mode of operation is automatically operative to block the format of data entered during such margin control mode of operation regardless of whether or not such entry occurs through the implementation of the manual mode of margin control during which data is principally entered at the keyboard or in the normal margin control mode of entry which precedes from the initiation of a playback operation from a prerecorded record media.

The Justify Key 503 is a mode control key which enables a playback mode of operation, under program control, which causes prerecorded information to be printed with a uniform right hand margin in that the last character of each line printed ends uniformly at the right hand margin established. This is achieved, under program control, in essence, by varying the width of interword spaces within selective limits so that each line terminates precisely at the right hand margin established. Thus, justification may here be defined as the capability of the system to terminate each line evenly on the right hand margin by distributing more or less space between words of a line, space being added or subtracted in units of 1/60th of an inch which corresponds to two increments. The automatic writing system according to the instant invention has the ability, under program control, to semi-automatically justify, operator intervention being required for hyphenation if margins set are substantially different from those employed in the rough draft prepared or it the rough draft has uncontrolled right line endings. Text to be justified must be first inputted and recorded. If any error corrections or revisions are required, they must be done either in revise or transfer mode with or without a margin control mode of operation operative. Thereafter, the system may be placed in a justify mode of operation by a depression of the justify key 503 and this mode will cause test to play out in a justified manner upon depression of the auto or paragraph key and the such automatic playback will terminate when a reference mark or paragraph end is red or at the end of a line if the character/stop key is depressed during the playback of a line of information. The semi-automatic mode of justification exhibited by the instant invention, functions for any pitch printing mode available within the automatic writing system according to the instant invention, however, the same may only properly function if each line to be justified is equal to or less than 132 characters in length for 12 pitch, 110 characters, in ten pitch or eleven inches or a maximum of 250 characters in length for proportionally spaced modes of printing. Furthermore, the semi-automatic mode of justification available within the instant invention will not function if only one word fits between margins. Following the printing of a justified line of characters, the various single interword spaces within the line printed will differ by no more than one unit wherein spaces having the greater number of units are printed first followed by smaller spaces.

Although the semi-automatic mode of justification employed within the instant invention will be described in great detail in conjunction with FIGS. 23A – 23C, a brief description of the qperation of this mode control key will be set forth to acquaint the reader with the general operation thereof. In a justify mode of operation, standard maximum and minimum line spaces are employed which act to define the metes and bounds through which the automatic writing system according to the instant invention may vary inter-word line spaces in a justify mode of operation. The automatic writing system according to the instant invention is equipped with standard maximum and minimum line space settings for the justify mode of operation and these standard settings, as loaded from the read only memory 80, may be varied by the operator within prescribed limits. More particularly, in proportionally spaced printing modes, the primary mode in which a justify mode of operation is intended, the length of a standard interword space is three units and for this reason, the standard settings for a justify mode of operation vary between a minimum of three units and a maximum of seven units so that up to four units may be added under program control to the standard line space to achieve line justification. Conversely, in twelve (12) pitch printing modes, a standard line space is five units in length and hence standard settings therefor in a justify mode of operation are varied between five and seven, while for ten pitch modes of printing, the standard line space is six units and hence, this value is substituted for the lower limit of line spacing. The justify key 503 as indicated by the annotations on the aslant portions thereof is an encoded function key, which encoded function here serves to permit the operator to vary the defined range for line spaces permissible in a justify mode of operation. Furthermore, the operator is given the option of adjusting only the upper limit for both the lower and upper limits of line spacing employed; however, a readjustment of the lower limit is only available through readjusting both the lower and upper limits although the upper limit may be reset to a previous or standard value. For proportionally spaced printing modes, the upper limit is adjustable between 05 and 50 units while the lower limit may only be adjusted downward one unit to two (2). Therefore, if the operator is desirous of resetting only the upper limit, the code key 491 and the justify key 503 are both struck and thereafter, a two digit number which may vary from 05 to 50 is entered at the keyboard to define the width of the upper limit to be employed within the justify mode of operation. Similarly, if the operator is desirous of resetting both the lower and upper limits, the code key 491 and the justify key 503 are again struck and then a one digit number which may be a two or three is entered from the keyboard followed by a comma and then a two digit number of define the upper limit to be employed. The new limits to be employed for justify mode operations are stored within register locations H8 within the general purpose registers 83. Similarly, for justify operations conducted in twelve (12) pitch and ten (10 ) pitch, the upper limit may be varied through the settings described above for proportionally spaced modes of operation, however, the lower limit is modified to better accommodate the pitch employed. Thus in twelve (12) pitch printing operations, the minimum limit for spaces to be printed is three (3) units while for ten (10) pitch printing operations a minimum width of four (4) all that is available and such readjustments to accommodate pitch are automatically accomplished under program control.

As was briefly stated above, specified modes of operation may only be performed during the playback of a prerecorded record media and no editing operations are available when this mode of operation is operative. Furthermore, no printing associated with a given line takes place until the entire line has been justified by the logic and conversely, should the character/stop key be depressed, it will only operate to stop automatic playback upon the completion of a line being printed. When the system is in a justify mode of operation, all keys at the keyboard are effectively locked out except the auto key, the paragraph key, the character/stop key, the write justify key, the record key, the record key, the code key plus record, and search. When hyphenation is required, as shall be discussed below, the backspace and hyphen keys are unlocked. The rules for code conversion within a line to be justified are the same as those described above for margin control and columns are not justified. Furthermore, when the justify mode is turned off by a second depression of the justify key 503, the system will print any characters remaining in the read/write buffer 35. Normal termination of justify in auto, paragraph, or stop modes will leave the read/write buffer 35 empty.

In the justify mode of playback, as occurs for any other mode of playback, lines of information to be printed are read from the record media and loaded, on a per line basis, into the read only buffer 36. Here, however, prior to any printing, characters are transferred from the read only buffer 36 to the read/write buffer 35 on a per character basis and the width of each character transferred is accumulated within register locations H4 and H5 in the general purpose registers 83. However, space codes which are transferred are not employed to increment the width being accumulated in register locations H4 and H5 but instead are merely counted and the state of the count is maintained in register location H6. This transfer of characters of a line to be justified is continued until the total width of data accumulated in register locations H4 and H5 exceeds the length of the line as defined by the right hand margin minus the left hand margin. Once the width of the line is exceeded by the data transferred, the width accumulated in register locations H4 and H5, plus the number of spaces counted as stored in register location H6 times the minimum space width is compared against the total length of the line to ascertain whether or not the same exceeds permissible line length. As the result of this test is always affirmative, the logic will then cycle back in the read/write buffer 35 until a breakpoint such as a space, hyphen, tab, carriage return or any other of a plurality of control codes is reached. As cycling back through the first breakpoint to be encountered takes place, the width of each character passed through is subtracted from the accumulated length of the line maintained in register locations H4 and H5 so that when the first breakpoint is reached, the width present in register locations H4 and H5 represents the length of character information, excluding spaces, to that breakpoint. Thereafter, the width accomulated in register locations H4 and H5 is subtracted from the line length (right margin minus left margin) and the remainder is divided by the number of spaces left whose count was accumulated, it will be recalled in register location H6. This division will result in a whole number representing the minimum width of line spaces which must be employed in the line undergoing justification and a remainder representing additional unit increments to be distributed over the available spaces within that line on a unit basis representing the larger spaces to be employed. If the whole number value plus any additional unit due to the remainder is less than the maximum width of spaces specified under the standard conditions imposed by the system or the maximum width defined by the operator, the line is automatically justified and hence may be printed in such manner that the smaller spaces employed in that line will correspond to the whole number resulting from the division while the beginning spaces of the line are increasesd by one unit to correspond to the value present within the remainder. Thus for instance, if the division resulted in a whole number equal to six and a remainder of three, and standard limits were being employed, it would be seen that the first three spaces of the line justified, upon printing, would be seven units wide, while the remaining spaces therein would correspond to a six unit width.

If however, the system cannot justify a line because the whole number value defined for spaces plus any additional increment associated with a remainder is greater than the maximum line spacing permissible, as defined by the maximum space limit imposed by the operator or the system, the carrier moves out to column position 138 whereat a piece of scratch paper may conveniently be placed. At that position, the printer is caused to print out the word which prohibits the line from being justified and types a diagonal or slash within the word. The slash is positioned at a portion of the word to indicate that all characters to the left of the diagonal plus a hyphen is the maximum that can be used in the line without violating the space size limits then imposed. Thereafter, the carrier will automatically relocate at the position of the slash symbol. If the diagonal appears at a point where hyphenation is acceptable to the operator, the operator need merely depress the hyphen key and play operation will continue automatically wherein the line is played out and printed in such manner that a hyphen is inserted as the last character of the line immediately at the right hand margin. However, if hyphenation is not satisfactory at the position of the diagonal, the operator has available two options. Under the first option, the operator may backspace to an appropriate break in syllables and depress the hyphen key. Here again, the system will cause a play mode of operation to be automatically resumed wherein the hyphen is printed as the last character at the line at the right hand margin so that the line is justified; however, under these conditions, the spaced size upper limit may be exceeded. Alternatively, the operator's second option is to depress the auto key. This instructs the automatic writing system according to the instant invention to disregard the upper limit setting of the maximum units for spaces previously imposed and effectively allows the system to justify the length of the line adding whatever number of units to spaces that is necessary to achieve appropriate justification. Under these conditions, the entire word initially printed at column position 138 is printed at the beginning of the next line so that a full line of justified text is presented.

Justified text may be recorded by means of a transfer operation while justified printing is taking place. However, while the text will be recorded on the read/write media, line for line as it appears on the justified copy, the system cannot record the size of the adjusted spaces and hence play back of this recorded media will not occur in a justified format unless the justify key is again depressed. Accordingly, it will be appreciated by those of ordinary skill in the art that the justify mod of operation permits the automatic writing system according to the instant invention to semi-automatically justify lines of information to be printed in a manner which is both highly convenient to the operator and presents options which may be quickly and economically implemented when operator intervention is required.

THE ACTION KEYS

The action keys indicated by the dashed blocks 504 and 505 comprise the record media control keys enclosed within the dashed block 504 and the printer action keys enclosed within the dashed block 505. In FIGS. 9A and 9B, the record media control keys enclosed within the dashed block 504 differ to a certain degree due to the varying nature of the record media controlled thereby. Thus for instance, the keyboard embodiment illustrated in FIG, 9A is directed to an embodiment of the instant invention employing a cassette medium or the like while the embodiment illustrated in FIG. 9B is directed to embodiments of the instant invention employing a magnetic card and each of these embodiments employs two record media transport stations although a lesser or greater number of stations may be relied upon. Therefore, the record media control keys enclosed within the dashed block 504 will be treated at the end of this section since individual attention must be devoted to each of FIGS. 9A and 9B.

The printer action keys enclosed within the dashed block 505 comprise the character/stop key annotated CHAR STOP, the word key, the line key, the paragraph key annotated PARA, the automatic key annotated AUTO and the line correct key annotated LINE CORR. The line correct key is operative during a revise or record mode of operation to permit correction of a recorded line of information. All of the remaining action keys enclosed within the dashed block 505 will cause the action specified thereby to occur when the automatic writing system according to the present invention is in a play, skip or duplicate mode, whether or not associated with a revise or record operation, and it should be appreciated at the outset that the action keys included within the dashed block 505 cause the specific action associated therewith to occur the depression of a key assuming that the automatic writing system is otherwise appropriately conditioned. The character/stop key, when depressed, when the automatic writing system is a play, revise, skip or duplicate mode of operation will immediately stop the respective operation except as aforesaid, during play back modes of operation in which the complete line of character information must be printed such as a justify mode of operation, a margin control mode of operation or in the high speed print mode of operation to be described hereinafter. If the system is at rest in a play, skip or duplicate mode, one character will be played, skipped or duplicated. Each subsequent depression of this key will also cause a single character to be played back and either printed, skipped or duplicated depending on the mode key which is then depressed. The character/stop key also has an instruction cancel function in that if a coded function which is normally followed by a digit entry routine is inadvertently entered from the keyboard, the function may be absorted prior to completion of the digit entry by the depression of the character/stop key. Processing in response to the eight (8) bit character code generated upon the depression of the character/stop action key occurs in essentially the same manner described in U.S. application Ser. No. 429,479, supra, in that when such eight (8) bit character is loaded into the main register M it is classified and employed to set a bit within storage location GF-4 within the general purpose registers 83 and in addition thereto a depression of this key acts to set a flag at the keyboard interface 26. Depending upon the operation then in process, the stop flag, when gated onto the common status bus 21 in one of the frequent sampling operations of the keyboard interface 26 by instructions read from the read only memory 80 will cause, as will be described below, a branch operation to occur through a comparison of ROM bit B10 in the preceding instruction with the condition of the common status bus 21. This branch operation will generally cause the processing operation being carried out in the microprocessor enclosed within the dashed block 16 to stop either immediately or at an appropriate point within the branching operation which has been initiated. As will be appreciated by those of ordinary skill in the art, the programming sequence being carried out by the ROM address register 81 must stop at a point in the program sequence where reinitiation of the program then in process is convenient and accordingly, whether or not the bit set on the common status bus causes a branch operation wherein the program sequence is immediately stopped or stopped upon the completion of several additional program steps depends upon the nature of the branch instruction defined. Thus for instance, if a character being processed by the character/-stop key is part of an underscored word, generated other than by a required back spaced and underscoring, the associated underscore is processed simultaneously. Similarly, if the character being processed by the action initiated by the depression of the character/stop action key has a diacritical mark associated with it, this diacritical mark is processed simultaneously with the character prior to stopping. Diacritical marks, such as accent codes and the like are processed in a rather specialized manner within the instant invention in that once they are analyzed under program control, no escapement information is furnished therefor, although the ribbon at the printer is appropriately displaced to accommodate the printing of the diacritical mark. Thus, printing of a diacritical mark and its associating character normally occurs in two strokes with the attendant escapement corresponding to that normally employed for the printing of a single character to thereby avoid the necessity for an operator to backspace and reposition the carriage so that the accent mark and the like is appropriately appended to the character. Thus, in accordance with the teachings of the instant invention, the diacritical mark is entered at the keyboard and printed and no escapement occurs. Thereafter, the character associated therewith is entered, printed, and the printer unit escapes in the traditional manner. Although not much used within the United States, diacritical marks have a great deal of use in foreign countries and hence embodiments of this invention employing a keyboard especially suited for such for foreign countries, as disclosed in British provisional Ser. No. 31701/75 would be employed to a large extent. A keyboard configuration specially suited for Canadian application would serve as a typical example where diacritical marks are employed to a large degree.

The word action key within the dashed block 505 acts in precisely the same manner described in U.S. application Ser. No. 429,479, supra in that when this key is depressed during the play, revise, skip or duplicate modes of operation, during which a margin control mode of operation may also be active, it causes the automatic writing system according to the present invention to play and print, skip or duplicate a single word wherein the term "word" here means an actual word printed on the document under preparation. If a space, tab, or carriage return code is sensed on the media, the printer responds to the code and prior to the next printed character, the automatic writing system according to the instant invention will cause processing to stop. Updating or correction of information pursuant to the detailed editing and revision operation set forth in U.S. patent application Ser. No. 429,479 may then be manually inserted and thereafter, automatic processing under the control of one of the printer action keys may resume. Unlike a character, a word in a document under preparation in not uniformly represented by a given number of eight bit characters but instead may comprise a plurality of letters and hence an aribitrary number of eight (8) bit characters. However, each word is always followed by a space, tab, index or carriage return character and hence an analysis of the character being supplied to the main register M to ascertain the presence of a character designating a space code or the like will act to invaribly define a word on the printed document and if the word is followed by a punctuation mark, the punctuation mark will be included as part of the word so that it will not be left standing alone. Accordingly, when the word key is depressed, a flag indicating the depression thereof is set in general purpose register location G8-0 and thereafter characters are read from the only buffer 36 loaded into the main register and thereafter appropriate processed through a forwarding thereof to the read/write buffer 35 and, if appropriate, to the printer data ROM so that twelve (12) bit print instructions may be formed and forwarded to the printer unit together with escapement information. As each eight (8) bit character is loaded into the main register M, in addition to the normal analysis thereof to ascertain whether or not the same comprises printable alphameric information, control information, format information or the like, each character is compared within the arithmetic logic unit 84 with constant read from the read only memory 80 corresonding to character information representing word terminating codes such as space, tab, carriage return or the like. When the word read from the read only buffer 36 is identifed as corresponding to one of such word terminating codes, that code is processed and thereafter the automatic writing system is caused to stop, the word flag is cleared, and the system returns to a monitor loop so that new processing operations under operator control, such as the manual insertion of data or a resuming of an automatic playback mode can be initiated by operator. The primary function of the word key is to enhance the editing capabilities of the instant embodiment of the present invention and more particularly, the ease with which editing may be accomplished by an operator. Thus, in an editing operation, once the operator has arrived at the appropriate line at which an editing operation is to be performed, selected depression of the word key will cause the automatic writing system to position itself at the appropriate word location at which the editing operation is to be performed. If the editing operation should involve a character within a word, the character/stop key would then be employed to appropriately position the automatic writing system at the desired character location. Thus, the word key allows the selected correction or deletion of words as a whole, but in addition defines the secondary function of enabling the operator to rapidly arrive at a character position on the document at which a correction is to be implemented. The word key thereby allows an operator not only to play, duplicate, or skip given words, but provides the additional function of allowing an operator to rapidly reach a predetermined point within a document being prepared where a correction is to be carried out. This second function is an important as the actual editing capability provided at the keyboard because the ability to rapidly and conveniently reach a point where a correction is to be implemented is quite as important as the capability to implement the correction itself.

The line action key, when depressed, causes the system to play, skip or duplicate a line and stops prior to the next printed character following that line. Once the line key is depressed, the automatic writing system according to the instant invention remains in a line mode until the function has been completed, or another action key is depressed. In play or revise modes of operation, the carriage return character which, it will be appreciated by those of ordinary skill in the art, act to define a line, is sensed and executed whereupon the system returns to an idle loop after the execution of the carriage return code and prior to the printing of the first character in a new line of information. In a skip mode, the system will skip the entire line, but no carriage return character is executed so that when this action key is employed for up dating, revisions, or manual editing operations, the daisy wheel print element carriage is always in the appropriate position to implement subsequent editing steps. The line key functions precisely in the same manner as disclosed in U.S. application Ser. No. 429,479 and it should also be noted that neither this action key nor the word action key is operative in justify modes of operation or the high speed print routine actuated as a result of the encoded function associated with the automatic key. The character/stop key is operative in these modes of operation, however, its modes of operation are restricted to stopping an operation and such stopping is limited to a stop at the end of a completed line in both a justify mode of operation and the high speed print routine. Accordingly, the line key present within the dashed block 505 acts, when depressed, during a play, revise skip or duplicate mode of operation to cause the automatic writing system to play and print, skip or duplicate a single line of information as defined by a line of information upon a document to be printed or a grouping of characters which is terminated by a carriage return character.

The line action key thus performs the same function with respect to a line of printed information as the word key performs for a word of information and the character/stop key performs for each character. Accordingly, when the line action key is depressed, an eight (8) bit character representative of the depression thereof is supplied from the keyboard depicted in FIGS. 9A and 9B through the keyboard interface 26 to the main register M. Subsequently, this eight (8) bit character is classified through the operation of the arithmetic logic unit 84, and a branch condition is signaled to the ROM address register means 81 through branch conductor 106. The branch routine initiated causes the read only memory to set a flag in the general purpose register location G8-1 indicating that the line action key has been depressed. Furthermore, constants representative of a carriage return character in precedented and non-precedented form as well as precedented special format are read from the read only memory 80 as each character is read from the read only buffer 36 and loaded into the main register M so that each such character read may be compared therewith. After the completion of the comparison operation being preformed, the character codes are forwarded to destination peripherals in the manner described above until a carriage return character is detected through the comparison operation in progress. When this line defining character is detected, the arithmetic logic unit 84 causes a branch condition to be supplied on conductor 106 whereupon the operation of the instant invention is terminated subsequent to the appropriate forwarding or non-forwarding of the carriage return character and any execution associated with such forwarding. Additionally, the line flag set in the general purpose registers is cleared and the system is placed in an idle loop to await operator initiation of the next system action. The line action key additionally provides the operator with the capability to arrive at a point for an editing operation which corresponds to the beginning point of any line therein so that such editing operation may be initiated or further positioning of data may be achieved through the appropriate manipulation of the word or character/stop action keys. Accordingly, the line action key provides an operator and the system as a whole with the ability to selectively play and print, skip or duplicate, a given line of material as well as to rapidly play and print data recorded on a record media until a selective editing point is achieved.

The paragraph action key annotated PARA in FIGS. 9A and 9B, as explained in U.S. application Ser. No. 429,479, supra, when depressed during a play, revise, skip, or duplicate mode will cause the system to play and print, skip or duplicate a single paragraph of information. Thus, this key provides the same function for the system as did the line key except that while the paragraph key functions with respect to printed information on the document in a paragraph format, the line key operated with respect to lines on such document. Paragraphs, it will be appreciated are defined by a carriage return character followed by a tab, two or more consecutive carriage returns of any type, a precedented carriage return, or a carriage return followed by a precedented tab. Therefore, when this action key is depressed, recorded information will be loaded into the read only buffer and forwarded through the main register M to the approrpriate destination peripherals for the mode of operation defined. As each character is loaded into the main register M, its nature is compared against constants read from the read only memory 80 to ascertain whether or not a carriage return of any type is present. If a precedented carriage return is detected, a paragraph is automatically defined and upon the detection of such precedented carrage return, the carriage return will be executed, the paragraph flag set in the general purpose register location G8-2 is cleared and the system will stop pending the receipt of further commands initiated at the keyboard. However, if a single carriage return other than a precedented carriage return is detected, the next character must be tested to ascertain whether or not the same is a tab, carriage return, or precedented tab. If the next character does not constitute one of these characters, only the end of a line was defined by the initial carriage return character detected and hence processing continues; however, if one of these characters is detected, the end of a paragraph is defined and hence the character will be executed, the paragraph flag will be cleared and the system then stops to await the entrance of new instructions from the keyboard. Thus, after the paragraph key is depressed, the system will play and print, skip or duplicate, character information read from the read only buffer 36 until an end of paragraph is defined. Thereafter, the automatic writing system accoding to the instant invention stops prior to the first tab if one exists or the printed character following two or more consecutive carriage return characters of any type, a precedented carriage return, or a carriage return followed by a precendented tab. The paragraph action key is also operative in margin control, justification, and high speed print modes of operation as shall be described above as a paragraph of information is a block of data which is to be terminated whenever its end occurs on a document and is not subjected to format revisions associated with margin control, justification, or high speed printing techniques. However, in a revise mode, this function is rendered inoperative, under program control, if the skip key is enabled, since the skipping of such large blocks of data in a revise mode of operation tends to be inconsistent with the line mode of organization associated with revision operations and hence would ordinarily indicate an erroneous form of data entry at the keyboard. Thus, the paragraph key provides an operator and the automatic writing system according to the present invention with the capability to play and print, skip or duplicate paragraphs as a whole as well as with the enhanced ability to rapidly arrive at a portion of a document being prepared where an editing operation is to take place by enabling the automatic processing of information in paragraph format as well as providing additional graduations from paragraph to line and line to word and word to character so that the operator may always employ the largest block of appropriate information in an automatic mode of operation to arrive at a location where an editing operating is to occur.

The automatic action key annotated AUTO in FIGS. 9A and 9B varies slightly in the manner in which data is defined in cassette and card embodiments of the instant invention, but essentially provides the same function as was described in U.S. patent application Ser. No. 429,479 when the same is employed directly as a action key. Additionally, however, this action key has been provided, in accordance with the teachings of the instant invention, with an encoded function which provides an extremely high speed printing operation wherein the contents of a prerecorded record media are printed in what may be generally described as a high speed print mode wherein general editing functions are precluded and a document is printed in such manner that alternate lines are generally printed in opposite directions so that no time is lost in carriage return operations and the like. A review of U.S. patent application Ser. No. 429,479, supra, will reveal that information is recorded in tape or cassette embodiments of that automatic writing system on a per line basis and each line of recorded data is separated by an inter-line gap appropriate for the starting and stopping of the record media transport as well as bringing the same to appropriate speed. Lines of data are organized into blocks on the record media wherein a block of data frequently corresponds to a printed page on a document and is organized on the record media in such manner that each block of data has an inter-record gap on the media whose length uniquely defines the same as the start of a block of information and this gap is immediately followed by character information recorded in the same manner as a line of information, which contains the number of the block present as well as any format information which is to be included therein. Such blocks of data are automatically and sequentially numbered by the automatic writing system disclosed whenever the reference encoded function, to be described below, is enabled. The cassette version of the instant invention records information in the same manner as set forth in U.S. application Ser. No. 429,479 and hence, the automatic action key functions with respect to such blocks of information, in the manner essentially described therein. More particularly, in cassette versions of the instant invention associated with FIG. 9, when the atomatic action key is depressed during a play, revise or skip mode of operation, it will cause the system to play and print or skip a single block of information wherein a block of information is defined as the record material identified by the previously described numerical codes inserted immediately after a large 9 inch inter-record gap employed to code whatever information is to be designated as a block and retrievable through the search operation which is described below. Such blocks of information are normally associated with complete pages of information in a multipage document recorded on a record media in cassette versions of the instant invention for items such as letters and the like which are independent of one another. Pages of information such as lettes or independent pages of a multipage document are normally defined as blocks of information because, as will be appreciated by those of ordinary skill in the art, each new page of information received requires the insertion of new paper in the printer unit and hence although an operator may use any desired character grouping as a block of information, the use of completed information as such blocks of information is normally the most advantageous. Accordingly, in cassette versions of the instant invention, when the automatic action key, annotated AUTO in FIG. 9 is depressed during a play, revise, or skip mode of operation, it will cause the system to play and print or skip a single block of information. This occurs, in a similar manner to the operation of any of the other action keys wherein when the AUTO key is depressed, in one of the foregoing modes of operation, a branch operation is initiated, an AUTO flag is set in general purpose registers location G8-3 and information is continuously processed from the present position of the record media to the end of the block until an end of block is detected due to the presence of the substantial interrecord gap.

Although the processing of character information associated with a single block is the most convenient in play, revise and skip modes of operation, due to the association of a block of information with a page of data and hence the attendant requirement for the insertion of new copy paper in the printer, such convenience does not extend to duplicate modes of operation since in these modes no printing takes place and accordingly, there is no attendant requirement that a new piece of paper be inserted within the printer at the end of each block of information. Therefore, in cassette versions of the instant invention, if the automatic writing system according to the instant invention is in a duplicate mode, and the automatic action key is depressed, all data on the record media up to and including the data specified in a block address, as set into the block address thumbwheels 506 in FIG. 9A, will be duplicated at the record media located at the read/write record media station. If the thumbwheels 506 are set to 00, the record media at the read only station will be duplicated from its present position as indicated at the display 12, FIG. 1, to the end of the recorded material thereon and hence, a setting of 00 at the thumbwheels 506 may be employed to rapidly duplicate an entire record media or a defined remaing portion thereof. If however, the thumbwheels have a specified numerical setting which is higher than the present block position of the record media, as indicated at the display 12, loaded at the read only station, all data from the present location of the record media up to and including that data specified by the block address set at the thumbwheels 506 will be duplicated on a record media loaded at the read/write station. However, should the thumbwheel 233 be set to a block address which is lower than that of the present location of the record media loaded at the read only station, no duplication will take place. Thus, it will be seen that the operation of the automatic action key in cassette versions of the instant invention will vary as a function of what the operator is attempting to accomplish. Accordingly, where a record media to record media transfer is to occur without printing, the automatic action key will cause continuous processing to occur in the manner described in U.S. patent application Ser. No. 429,479 until the location of the record media being played corresponds to that defined at the thumbwheels 506. However, where the operator is printing or editing on a per page basis, the operation of the automatic action key is also caused to operate on a per block basis, since blocks of data recorded in this manner normally correspond to a page and each new page has an attendant requirement that new paper be loaded at the printer through manual or automatic feeding techniques.

In magnetic card versions of the instant invention, it will be appreciated that recorded data is differently organized due to the differing nature of the recording media. More particularly, each magnetic card will have 72 tracks for the recording of information thereon and each track may accept up to 150 characters due to the fixed length thereof. Thus, card versions of the instant invention are organized, due to their format on a per page basis because both the length of each track on a card and the recording technique employed therefor causes lines of recorded information to be recorded on discrete tracks of the cards. Thus it will be appreciated that each time a line of data to be recorded is accumulated in the read/write buffer 35, the insertion of a carriage return character will cause such line of accumulated data to be recorded on the next track of a card loaded at the read/write station. For this reason, regardless of whether a card embodiment of the instant invention is in the play, revise, skip or duplicate mode of operation when the automatic action key is actuated, the depression of this key will result in the system playing and printing, skipping or duplicating the entire card loaded or, as is also true for cassette embodiments of the instant invention, should part of the block of information represented on the card be partially played out from previous operations, the automatic writing system when the automatic action key is depressed causes the remaining portion of the block to be read. In card embodiments of the instant invention, at the end of data on the card being read, the automatic branch routine initiated will additionally cause the card which has been loaded and read to be ejected. Thus, when either embodiment of the instant invention is in a play, revise or skip mode of operation and the automatic action key is depressed, the present block of data on the record media will be read in its entirety and appropriately processed and thereafter, the auto flag set is cleared and the automatic writing system according to the instant invention ceases processing functions in order to await the entry of new processing instructions at the keyboard. Furthermore, in both cassette and card versions of the instant invention, the function of the automatic action key is disabled whenever the system is in a revise mode with the skip key depressed. This mode of disabling is here employed for the same reasons set forth in conjunction with a description of the paragraph key as the mode of operation wherein a page of data is skipped is basically inconsistent with a revise mode of operation and hence, an attempt to skip such a large amount of data in a revise mode is treated as an erroneous entry which is not permitted.

The automatic action key in accordance with the teachings of the instant invention is also provided with an encoded function which results in an extremely high speed printing routine where no editing functions are permitted. However, such high speed print routine may be carried out in margin control and justify modes as well as a straight play routine. Although this high speed print routine, as will hereinafter be referred to as PRINT AUTO, will be described in great detail in conjunction with the flow chart therefor associated with FIG. 24, a brief description of this encoded function will here be set forth to familiarize the reader with this enclosed function of the automatic action key. The print auto high speed printing function is enabled by a depression of the automatic action key within the dashed block 505 with the code key 491 in a depressed condition. When this encoded function is enabled, a prerecorded record media loaded at an active transport is to be played and printed through a print routine which allows the printer unit to function at the fastest available rate at which it is capable of acting. In addition, in this high speed print routine, escapement associated with space codes and carriage returns are deferred so that the same either occur, under usual conditions, in conjunction with the escapement for the next character to be printed or are implemented through a printing routine in the reverse direction so that time wasted for the printer unit to implement carriage displacement functions is kept to a minimum. In the print auto mode of operation printing in margin control or justify format modes may be implemented; however, no revision, transfer, or general editing modes of operation are available. Furthermore, although the character/stop key is operative to promptly terminate the automatic high speed playback mode of operation initiated, it is only active to terminate printing at the end of a line as is also the case for justify modes of operation. Briefly, when the print auto mode is initiated as the keyboard, the system is checked to ensure that it is in a play mode and no other modes other than justify or margin control have been established at the keyboard. When these conditions obtain, a print auto flag is set within the general purpose register location GA3 and the system will initiate the high speed playback and printing operation associated with this encoded function. In essence, in a print auto mode of operation, alternate lines of printed information are generally printed in opposite directions so that the time required for the printer unit to execute a carriage return operation is avoided and indexing functions are all that are required. Thus, under normal circumstances, a first line is printed from left to right, the second line is printed from right to left and this sequence keeps alternating for each line of data printed on a page being played back in the print auto mode enabled unless printing from right to left can not be implemented for a given line due to the presence of certain data therein or the termination point of the previous line renders this mode of printing inefficient. Under these conditions, the line is printed from left to right and the sequence of alternating the direction of printing for each line is reversed.

Furthermore, because in most playback modes of operation within the instant invention, the time interval associated with a carriage return is employed by the automatic writing system for the purpose of reading a next line of data to be printed from a prerecorded record media and loading the same in the read only buffer 36, a printer stack is established within the RAM peripheral 34 so that data is always in a read condition for forwarding to the printer unit and hence appropriate new information may be dispatched to the printer unit as soon as the same is in a condition to receive it. The storage locations assigned within the RAM peripheral 34 are set forth in Appendix G attached hereto and it will be seen upon a perusal thereof that the eight (8) bit storage locations 2C6-2EF are associated with the printer stack. This means, as the storage locations are assigned in terms of HEX notations, that the printer stack established within the RAM peripheral 34 is 42 word locations deep wherein each word location is eight (8) bits wide. However, as it was seen above that each printer instruction is twelve (12) bits wide, it will be appreciated by those of ordinary skill in the art that two storage locations are required for each printer command stored under conditions wherein twelve (12) bits of information are required for the printer command per se in terms of character print information, escapement information, or indexing information, while the remaining four bits available within each pair of eight (8) bit storage locations may be employed to define the nature of the command associated therewith, i.e., character information, escapement information or indexing information, so that these four (4) bits of information may be employed to apprise the microprocessor indicated by the dashed block 16 as to the nature of the printer information stored so that appropriate strobe information may be supplied to the printer unit in conjunction therewith. Furthermore, as will also be seen in Appendix G, storage locations 2C4 and 2C5 within the RAM 34 are employed for use as pointer counters and more particularly, location 2C4 is utilized as a print stack input pointer while location 2C5 is employed as a print stack output pointer. This enables, as will be appreciated by those of ordinary skill in the art, the printer unit to be loaded from the bottom, while data is read from the top thereof and supplied to the printer unit whereupon loading and reading of data from the printer unit may occur as independent operations.

Because the normal operation associated with printing in the print auto routine alternates printing from left to right and right to left, for alternate lines of information, it will be appreciated by those of ordinary skill in the art that the normal content of the printer stack will interleave character print information and printer displacement data under such conditions that the majority of the printer displacement information therein will comprise escapement information, assuming no superscripting or subscript information is present, while index codes associated with indexing operations at the printer unit will normally define an end of a line of printed material. In this regard, it should be noted that index codes are submitted for carriage return characters for left to right printing in this print routine and a deferred carriage return flag is set within storage location GA5. This means that when the printer is printing in the normal direction from left to right, it will merely be indexed to the line at the end of the line being printed in the normal direction and displaced, under normal conditions, to the beginning print point which in this case would coincide with the end of the line to be printed. Conversely, as shall be seen more in detail in conjunction with FIG. 24, when the printer is printing from right to left and either the left hand margin or a tab character at the beginning of a line is encountered, the routine acts to check the condition of the deferred carriage return flag and if the same has been set, it will index down to the next line so that it is again in a condition to print information in the stack in a direction from left to right.

In essence, what occurs during a print auto routine is that the microprocessor causes the print stack to be loaded with the portion of the line which may be accommodated thereby and feeds data to the printer unit from the top of the stack as quickly as the same may receive it. Once the stack is full, which takes about 5ms, the operation of the microprocessor slows down to a rate which corresponds to the rate which the stack is being emptied or data is being forwarded to the printer unit. More particularly, the microprocessor initially acts to go through the contents of the read only buffer 36 to determine such factors as the length of the line, whether or not the line may be printed backwards and then stacks up commands within the printer stack while printing so that the stack is essentially filled with printer execution commands and the printer unit is periodically tested to ascertain whether or not it may receive new instructions and as soon as the same is in a ready condition, new instructions are issued thereto from the top of the stack as defined by the output pointer so the printer unit is maintained in a continuously active condition. Typically, reading and printing of information here takes place from the read only buffer 36 and always occurs in a forward direction. Thus, once the contents of the read only buffer 36 have been inspected, the microprocessor typically reads the character, analyses it, employs the same to address the printer data ROM 43 or to development escapement information from a previously read character and places this information into the printer stack as fast as it can until the stack is full. Throughout this routine, the microprocessor keeps checking the printer unit 2 every few minutes to ascertain if the same is ready to receive a new command and each time a ready condition is detected, a new printer execution command is issued thereto from the top of the stack. The microprocessor thus keeps loading the printer stack as long as there is room therein and the initial filling thereof, which takes approximately 5ms occurs at the fastest rate available to the microprocessor 16. Thereafer, the microprocessor 16 slows down the filling of the stack to correspond to the rate at which twelve bit instructions are being forwarded therefrom to the printer unit 2. At the end of the read only buffer 36, the microprocessor 16 causes the next line of recorded information to be read from the active record media and loaded into the read only buffer 36 which reading operation occurs rather slowly as the same is limited to the reading speeds of the transport. At this juncture, the microprocessor waits until the stack empties and this, as will be appreciated by those of ordinary skill in the art, corresponds to the end of the line being printed.

When the stack is emptied, the microprocessor first acts to monitor the common status bus 21 to determine whether or not the stop key has been depressed. If the stop key has been depressed, processing will stop at the end of the line in the print auto mode being described in response thereto. If the stop key has not been depressed, the new contents of the read only buffer are analyzed to ascertain whether or not this line of data can be printed in a reverse direction, it being assumed that the initial line printed was printed in the forward direction, as occurs, for the first line printed in a print auto routine and each line subsequent thereto after the routine has been arbitrarily stopped. Lines are only permitted to be printed in a reverse direction, under the program limitations imposed, if no index or control codes like stop, switch, or switch and search are present in the line. If no codes of this nature are present, the length of the line is calculated and added to indent level. If the start point is closer to the left hand margin than the right hand margin, as viewed from the last print position, printing of a next line in a reverse direction is also inhibited and forward printing occurs as the whole purpose of printing in a reverse direction on alternate lines is to keep print displacement where no printing takes place to a minimum. Assuming reverse direction printing is proper, the printer stack maintained within the random access memory 34 will be loaded in the same manner described above for forward printing here, however, the contents of the read only buffer 36 are read out in a reverse direction or on a last in, first out basis so that the stack is appropriately loaded. Thus, the printer stack is fully loaded, and printer commands are issued to the printer unit at the fastest rate at which it may respond thereto.

Once the printer stack is full, the microprocessor slows down to the rate of the outputting of print instructions to the printer unit and this continues until the entire contents of the line have been read. Under these conditions, it will be appreciated, that the last character read in a print forward operation was a carriage return and that to accommodate reverse printing, an index code was substituted therefor and, as aforesaid, a deferred carriage escapement bit was set in register location GA5. Therefore, where the last character is read from the read only buffer in a reverse printing operation, the condition of the deferred carriage return flag is checked and of the same is set, an index code is established within the stack, the deferred carriage displacement flag is cleared and a left print flag is set in register location GA4. In this manner, index codes are generally substituted for carriage return codes in print auto operations and the most efficient use is made of the printer in that no time is wasted for carriage returns except under such conditions where reverse printing may not be implemented due to internal codes within the line or due to the fact that a greater displacement will be required to get to the beginning print position for a line to be reversely printed, than if printing was to be initiated from the left hand margin. Accordingly, it will be appreciated that the print auto encoded function associated with the automatic action key is an exceptionally fast automatic printing routine as it allows the reader unit to effectively operate at its fastest rate in that data is supplied thereto as quickly as the same may be processed by the printer unit while all escapement operations which may be avoided through reverse printing or deferred, spacing, are foreclosed.

The line correct key, annotated LINE CORR within the dashed block 505 in FIGS. 9A and 9B is a key which provides an operator with the ability to correct errors noted during a record or revision operation wherein such errors are either of substantial magnitude or were not immediately detected during the normal insertion and recordation of the information being accumulated. The basic purpose and functions as well as the various modes of operation initiated upon a striking of the line correct key were described in U.S. application Ser. No. 429,479 which is incorporated by reference herein, and therefore, only a brief description of the purpose and functions implemented in response to a striking of the line correct key will be here set forth to acquaint the reader with the uses theeof. However, it will be appreciated that a detailed description thereof is set forth in U.S. application Ser. No. 429,479 for purposes of detailed reference and disclosure. In essence, the line correct key is operative any time information is being accumulated in the read/write buffer during a record or revise operation for the purposes of recording on a record media loaded at the read/write station. The function of the line correct key is to wipe out the current line being accumulated in the read/write buffer and to reposition the daisy wheel print element at the printer unit so that printing of the line which was wiped out may begin anew. Thus, in typical modes of operation, a striking of the line correct key will wipe out any accumulated contents of the read/write buffer and will back up the daisy wheel print element carriage at the printer unit to a point where printing for that line of information was initiated. Subsequent depressions of the line correct key will result in a reverse indexing of the printer unit so that the initial print positions for previously inserted lines of information are obtained while the record media loaded at the read/write transport is backed up so that new information for corresponding lines may be recorded. For other than straight recording operations, appropriate interplay between the read only and read/write buffers and transports are achieved so that the system maintains its position with respect to the new line initiation locations initiated by the operator.

The line correct key is operative in both the record and revise modes of operation to wipe out any partially completed line already accumulated in the read/wirte buffer 35 and subsequent depressions thereof will wipe out previously accumulated and recorded lines of information. Furthermore, for each depression of the line correct key, the daisy wheel print element at the printer unit is backed up or indexed to the starting point for the line wiped out for the last depression of the line correct key. In record modes of operation, it will be appreciated that each depression of an alphameric character key at the keyboard results in the application of an eight (8) bit character, actually a seven (7) bit character as the eighth bit thereof is a Zero (0), to the main register M and such character is subsequently applied and inserted into an appropriate location within the read/write buffer 35. In addition, the carriage position when the read/write buffer 34 is in an empty condition, ie., that corresponding to the beginning point of the line being printed, is maintained within storage location H3 within the general purpose registers 83. This line start position character, as was described in U.S. application Ser. No. 429,479 is recorded at the end of each line of information on the record media so that the starting position of the printer for each line of character information is available as a reference. Such carriage position reference is desireable, as will be appreciated by those of ordinary skill in the art, because not all lines of information recorded are initiated at the left hand margin. At any rate, during record modes of operation, as each alphameric character is inserted at the keyboard, the read/write buffer 35 acts to accumulate such characters until a full line of data, as denoted by a carriage return character or the like has been stored therein. Thereafter, the contents of the buffer are recorded on the record media location at the read/write transport modes of operation to wipe out any partially completed line already accumulated in the read/write buffer 35 and subsequent depressions thereof will wipe out previously accumulated and recorded lines of information. Furthermore, for each depression of the line correct key, the daisy wheel print element at the printer unit is backed up or indexed to the starting point for the line wiped out for the last depression of the line correct key. In record modes of operation, it will be appreciated that each depression of an alphameric character key at the keyboard results in the application of an eight (8) bit character, actually a seven (7) bit character as the eighth bit thereof is a Zero (0), to the main register M and such character is subsequently applied and inserted into an appropriate location within the read/write buffer 35. In addition, the carriage position when the read/write buffer 35 is in an empty condition, i.e., that corresponding to the beginning point of the line being printed, is maintained within storage location H3 within the general purpose registers 83. This line start position character, as was described in U.S. application Ser. No. 429,479 is recorded at the end of each line of information on the record media so that the starting position of the printer for each line of character information is available as a reference. Such carriage position reference is desireable, as will be appreciated by those of ordinary skill in the art, because not all lines of information recorded are initiated at the left hand margin. At any rate, during record modes of operation, as each alphameric character is inserted at the keyboard, the read/write buffer 35 acts to accumulate such characters until a full line of data, as denoted by a carriage return character or the like has been stored therein. Thereafter, the contents of the buffer are recorded on the record media location at the read/write transport station and the carriage position character is recorded at the end of each line as one of three housekeeping characters described in U.S. application Ser. No. 429,479. Thus, in a record mode of operation, current line information is accumulated in the read/write buffer 35 on a per character basis and upon a completion of the line being accumulated the same is recorded on the record media loaded at the read/write record media station. Therefore, when the line correct key is depressed during a record mode of operation, the system responds thereto to clear the contents of the read/write buffer 35 and return the character to the beginning print position of the line. Each subsequent depression of the line correct key causes the system to back up the media and reverse index one line at the printer unit so that a tracked relationship persists between the position of the daisy wheel print element at the printer unit and the information disposed near the head at the read/write transport.

The term beginning of the line has been employed herein because the position at which printing is initiated for a given line of information in the record mode of operation may vary depending upon whether or not the margin control mode key is depressed. Thus, if only a straight record mode of operation is being employed, the beginning print position will generally correspond to the left hand margin; however, if the margin control key is depressed, and the line correct key was not depressed for an initial line of a paragraph, the tab control action of the system which is operative in the margin control mode of operation to begin each line of a paragraph at the last tab inserted will operate to cause the beginning print position for that line to occur at the location of the last tab inserted. Therefore, under these conditions, a depression of the line correct key will return the carrier to the indented left hand margin and thereafter, the backspace key may be employed to remove tabs from the register or the tab key may be employed to add tabs to the register. The line correct key is not effective to remove reference marks which have been recorded.

In a revise mode of operation, previously recorded line information is read from a record media loaded at the read/write station, and loaded into the read only buffer 36. Thereafter, a new or revised line of information to be recorded on the record media in the space occupied by the line information just read is accumulated in the read/write buffer 35 through an operation which may include the selective reading of the contents of the read only buffer and the insertion of new character information from the keyboard. At any rate, such new line information, which may include up to fifty (50) additional characters in cassette embodiments of the instant invention or the difference between the original length of the line loaded into the read only buffer 36 and the 150 character length associated with a magnetic card, is accumulated within the read/write buffer and upon the completion of this line in the read/write buffer 35, the same is recorded on the record media loaded at the read/write transport station on a location on the record media which corresponds to that previously occupied by the line loaded into the read only buffer and revised. Therefore, if the line correct key is struck, during a revise operation, the contents of the read/write buffer should be wiped out, but the contents of the read only buffer 36 should be restored and subsequent depressions of the line correct key should maintain an approprite relationship between the contents of the record media, the read/write buffer, and the current print position at the printer unit. For this reason, when the line correct key is struck during a revise mode of operation, the daisy wheel print element carriage at the printer unit is returned to the left hand margin, since margin control and hence, tab control modes of operation are not available with revise, and the contents of the read/write buffer 35 are transferred into the read only buffer 36. The record media however is not backed up as the same was previously positioned for recording over the location on the media where the line of information initially loaded into the read only buffer 36 was recorded. Thus for an initial depression of the line correct key, the contents of the read/write buffer 35 are inserted into the read only buffer where they may be again selectively inserted into the read/write buffer in the accumulation of new line information and the daisy wheel print element carriage is returned to the left hand margin. For subsequent depressions of the line correct key in a revise mode of operation, the printer unit is indexed and the record media is backed up so that a new line of information corresponding to the positioning of the printer unit may be read from the record media and loaded into the read only buffer 36 where the same may be selectively read into the read/write buffer 35 for the accumulation of new line information.

In transfer modes of operation, the data manipulations achieved by a depression of the line correct key are also somewhat different, because, under these conditions, data associated with two active buffers and the two active transports must be maintained in an appropriate relationship. Thus, in a transfer mode it will be recalled that both the play and record modes are operative and data is effectively being read from a prerecorded record media loaded at the read only transport and each line of data read therefrom is loaded into the read only buffer 36. Thereafter, data from the read only buffer may be selectively played, skipped, and merged with data inserted at the keyboard 1 in the accumulation of a new line of information at the read/write buffer 35. As each line of data is accumulated at the read/write buffer 35, and defined by a carriage return or similar character code, it is thus recorded on a record media loaded at the read/write transport. Thus, under these conditions, both the transports must be maintained in an appropriate relationship. Accordingly, when the line correct key is initially struck in a transfer mode of operation, the daisy wheel print element carriage at the printer unit is returned to the left hand margin or the appropriate last tab location if a margin control mode of operation is additionally enabled. Additionally, the read/write buffer is wiped out; however, the contents of the read only buffer which contains line information previously read from the record media loaded at the read only transport is retained while the present condition of both the record media loaded at the read only and read/write transports are maintained in the present position. This occurs, under program control because as will be appreciated by those of ordinary skill in the art, the read only transport is already positioned at a location where the line retained in the read only buffer 36 has been read and hence it is positioned in the interline gap associated with the next line to be loaded into the read only buffer upon a completion of the processing of the line information therein. Similarly, the read/write transport has not yet been activated to record what was initially accummulated in the read/write buffer 35 and subsequently wiped out by the depression of the line correct key. Thus, both record media transports are in their appropriate position and hence an initial depression of the line correct key works only to clear the contents of the read/write buffer 35 and displace the daisy wheel print element carriage back to the initial print position for the line and hence, retyping of previously prepared information is unnecessary if the same was loaded in the read only buffer 36. Therefore, only modifications to the new line of information to e accumulated in the read/write buffer 35 need be entered by the operator.

If the line correct key is pressed twice in succession during a transfer mode of operation, the initial depression of the line correct key causes the data transfers and results outlined above. However, the second depression of the line correct key must be implemented in a somewhat more complex fashion as the line which now must be wiped out has already been recorded on the read/write record media and, as will be appreciated by those of ordinary skill in the art, this line need not correspond to the line recorded on the record media loaded at the read only transport as the same may have been formed through a selective reading thereof together with a merger of information inserted at the keyboard. Accordingly, on the second successive depression of the line correct key, when the automatic writing system according to the instant invention is in a transfer mode of operation, the read/write buffer would be in a cleared condition due to the action which took place in response to the initial depression of the line correct key. Therefore, under these conditions, the contents of the read only buffer are transferred to the read/write buffer so the same may be saved and thereafter, the record media loaded at the read/write transport is backed up to the beginning of the previous line and that line is read and loaded into the read only buffer 36. Accordingly, at this juncture, the read only transport has not been active while the last line recorded at the read/write transport with which the second depression of the line correct key is associated, has been read and loaded into the read only buffer 36 while the original contents of the read only buffer have been saved in the read/write buffer 35. The correct position of the daisy wheel print element carriage is now ascertained through an analysis of the contents of the read only buffer and the daisy wheel print element carriage is displaced to the appropriate position for the beginning of the printing of the line with which the second depression of the line correct key is associated. This may involve a mere indexing operation at the printer unit or alternatively, a displacement of the carriage to accommodate a tab position may take place. Once the appropriate carriage position has been obtained from an analysis of the contents of the read only buffer as aforesaid, the record media loaded at the read/write transport is again backed up so that recording of a newly accumulated line of information will take place over the line information just read and loaded into the read only buffer. Additionally, the contents of the read only buffer are wiped out and the original contents thereof which were transferred, as aforesaid, to the read/write buffer are transferred back to the read only buffer so that the operator's place is assured and a new line of information may now be accumulated in the read/write buffer through the selective reading of the contents of the read only buffer together with any desired merger with data input at the keyboard. Each successive depression of the line correct key when the automatic writing system according to the instant invention is in a transfer mode of operation will occur in the manner described for the second successive depression of the line correct key. It should also be appreciated that the described mode of saving the contents of the read only buffer by an initial transfer to the read/write buffer followed by a subsequent transfer back to the read only buffer after a line of information has been read from the read/write record media is advantageous as it ensures that the operator will not lose her place; however, an alternate mode is readily available wherein the contents of the read only buffer are not saved but instead, the contents read from the read/write buffer are retained in the read only buffer for use in accumulating new line information within the read/write buffer.

When the line correct key is depressed, an eight (8) bit character representing the depression of this key is applied through the keyboard interface 26, the common data bus 19 and the arithmetic logic unit 84 wherein a classification operation takes place to ascertain the nature of an eight (8) bit character. The identification of the eight (8) bit character as a line correct action character results in a branch level being applied to the branch conductor 106 which causes the ROM address register to go through a branch routine. This branch routine checks the record/revise/transfer status of the automatic writing system according to the instant invention and causes the requisite operations for each mode, as outlined above, to occur. Accordingly, the line correct key enables the operator to correct subsequently noticed errors or errors of major proportions which appear in the line of information presently being recorded or those which may appear in already recorded lines of information preceding that presently being recorded. In this manner, the line correct action key provides the instant invention with the capability to return through discrete lines of previously recorded material to enable an operator to rapidly arrive at a point in which an error occurred to thereby provide a highly advantageous mode of editing in record and revise modes of operation. As an operator convenience, all of the action keys as well as the mode control keys heretofore described, may be illuminated keys, which are active, when depressed, to light, and hence provide a visual indication to an operator as to their current status.

The action keys enclosed within the dashed block 505, as shall now be appreciated, provide the automatic writing system according to the instant invention and hence any operator thereof with a powerful set of control functions wherein, in any record or playback situation, the instant invention may be operated in a manner such that predetermined amounts of material may be rapidly accessed and presented for any desired purpose such as the correction of errors which may appear or the selective editing or printing of pertinent portions of the prerecorded material. Thus, the automatic, paragraph, line, word and character/stop action keys cooperate in such mannerthat an operator may duplicate, play, revise and/or skip material on a selective basis so that the material processed in the selected mode may be accessed in a graduated manner wherein the largest unit of material, i.e., blocks, paragraphs, lines, words and characters, are processed on a per unit basis so that the largest units of material are handled until the unit at which the location is sought is obtained whereupon accessing then may be stepped down to the next smallest logical unit to be operated upon. Furthermore, the line correct action key, in a record or revise mode, may be employed to back up information inserted into the present embodiment of the instant invention until the daisy wheel print element carriage and the record media and/or the read/write buffer 35 are positioned at the beginning of a desired line of information while intraline corrections are obtained, if they are relatively close to the present position of the daisy wheel print element carriage by repeated depressions of the backspace key. The program controlledbacking up of the carriage in response to each depression of the backspace key also makes use of the stored character which defines the initial position of the carriage for that line in that whenever this key causes backup through a tab or similar character whose point of initiation is not readily available, a calculation is initiated, under program control, which effectively adds the widths of the characters to be retained in the register to the position where the line is initiated so that the appropriate position is obtained. Furthermore, each time the backspace key is depressed when the automatic writing system according to the instant invention is in a proportionally spaced mode of printing, the printer data ROM 43 is addressed with the character being backed up through and the width associated therewith is employed by the program control initiated to cause the daisy wheel print element carriage to back up to the precise position at which it would reside were this character not originally entered. Thus, in this manner too, perfect tracking is maintained between the disposition of the daisy wheel print element carriage and data which has been entered into the system. Furthermore, it will be appreciated, that the encoded function now associated with the automatic action key provides a high speed print routine which represents a landmark in the area of word processing. Accordingly, the automatic writing system according to the present invention not only provides a plurality of modes of operation wherein material may be recorded and selectively played back to speed and automate the evolution of draft copy into final document format, but in addition thereto, provides a highly selective and graduated mode for obtaining the selective accessing of desired positions when either the draft or final copy is being prepared.

The action keys included within the dashed block 504 in FIGS. **9*a* and 9*b* differ to a certain degree in that their nature and function tends to depend upon the nature of the recording medium employed in the embodiments of the automatic writing system associated therewith. In both embodiments however, two record media and associated transports are employed and hence, selectivity between which media is read must be available to an operator in either system. For this reason, both the action keys enclosed within the dashed block 504 in FIGS. 9*a* and 9*b* include an alternate reader key annotated ALT RDR, which here functions, assuming other appropriate input conditions are present, to cause the active reader or the reader then being read in a playback operation to switch from one transport to the other. More particularly, it will be recalled that when automatic playback is initiated by a depression of the playback key and appropriate action key, information from the read/write record media station, assuming the same is loaded, is read and utilized to initiate the operation of the printer. The alternate reader key, when depressed, during a play mode of operation will cause an eight (8) bit code representing the depression thereof to be generated at the keyboard, forwarded through the common data bus 19 and loaded into the main register M. Thereafter, upon appropriate inspection and classification of this character, a branch operation is initiated which will cause a switch active reader or switch command to be generated at the keyboard interface, in a manner to be described in connection with FIG. 10. This switch command, will be applied directly to the record media transport control apparatus illustrated in FIGS. 15A and 15B** to cause the then active reader to be de-energized while the inactive reader is energized and thereby effectively switch the active media then being employed from one transport to the other in the same manner as described in U.S. Ser. No. 429,479. Accordingly, the alternate reader key when depressed during a play mode, assuming both record media stations are loaded and no record mode is in force, will cause the reading of information from the record media to be switched from the read/write record media station to the read only record media station so that the input peripheral to the automatic writing system according to the present invention may be selectively switched from one record media to the other.

When the alternate reader key is depressed, the active station read indicator, i.e., the digital counter located next to the cassette transport or the card transport, as generally shown in FIG. 1, associated with the selected record media station will light when the selected reader is activated. A subsequent depression of the alternate reader key will cause the reading to be returned to the read/write station. This action, occurs in the same manner regardless of whether or not a cassette embodiment of the instant invention as illustrated by the keyboard in FIG. 9A or a magnetic card embodiment, as illustrated by the keyboard in FIG. 9B is being employed and hence, regardless of the embodiment being considered, the alternate reader key acts to switch the record media being read from the read/write station which is automatically selected when a play mode of operation is initiated to the read only station while a second depression of this key acts to return playback to the read/write station. Subsequent depressions of the alternate reader key will cause switching back and forth between the active record media transports so that playback and printing may be formed on a selective basis from recorded information at both record media transports and a common mode of operation is associated with the alternate reader key regardless of which embodiment of the instant invention is being employed. Furthermore, it will be appreciated by those of ordinary skill in the art that in embodiments of the instant invention employing only a single record media, the function associated with the alternate reader key as well as the key per se may be omitted.

It has already been noted that the manner in which recorded information is organized on a record media varies substantially as a function of the record media being employed. More particularly, as described in U.S. Ser. No. 429,479, supra, recorded information recorded onto a cassette or tape embodiment of the instant invention is organized in such manner that each time the read/write buffer 35 is full, the record media is started, and the line accumulated within the read/write buffer 35 is recorded thereon whereupon the record media is stopped. Thus lines are separated on the record media by an interrecord gap whose length is sufficient to bring the record media to speed for recording or reading purposes and thereafter stop the same. Furthermore, succeeding lines of information recorded on a record media in cassette or tape form are further organized into blocks wherein a block will traditionally correspond to a page of information and each block is separated from the next by a rather substantial interecord gap whose presence is detectable through a timing operation and this gap is further followed by an introductory recorded portion, which is recorded in the same manner as a line and contains the number of that block. Any format information such as margin and tab information inputted in association with that block as well as heading information which, as shall be seen below, may be inserted to describe the contents of the block and serve as a log therefor is recorded as the next succeeding line. Thereafter, the normal recording of line information will occur until the block, as defined by the insertion of a new block number has terminated. Blocks, recorded on record media in the form of tapes or cassettes according to the instant invention, are automatically numbered in sequence under program control, as soon as the operator defines a new block by the depression of the encoded function REF associated with the two (2) key and enabled by the multiple depression of the code key 491 and the two (2) key. Thus, in tape or cassette versions of the instant invention, a search of the record media in the form of numbered blocks will be the normally implemented operator function and, as shall be seen below, such function may be enhanced through the provision of encoded functions calculated to cause the printing of a log from a prerecorded record media or the location of specific text thereon.

Conversely, in embodiments of the instant invention wherein a card is employed as the recording media, individual lines of information are recorded on individual tracks of the record media which are fixed in length, while a page or block of information would here correspond to the total number of lines on a given card. Furthermore, normal operator useage would mandate that the total information on a given card normally correspond to information associated with a page of a printed document. Therefore, under these conditions, it being recalled that only one card may be loaded in a transport at a given time, the search function which would normally be provided to an operator would cause the head at the transport to step in one direction or another so that new tracks of informaton could be conveniently located. This mode of searching, can additionally be enhanced, as shall be seen below, by encoded functions which enable the automatic printing of a log representing recorded data on the magnetic card per se. However, it should here be appreciated that the recordation of information on magnetic card embodiments of the instant invention renders access to specific information somewhat easier as tracks on a magnetic card will normally correspond to a line of information on a page of printed data and each such line is discretely numbered by the automatic writing system according to the instant invention each time a line on the page is terminated by a carriage return. Furthermore, during the preparation of draft material, should the code print key be depressed, the track number upon which the line of printable material has been recorded will be printed out at the end of the line on the document being prepared so that such draft materials are highly useable by an operator for the purposes of subsequently accessing information and hence search facilities for specific information are not as necessary in card embodiments of the instant invention.

Turning now specifically to FIG. 9A, the exemplary keyboard for tape or cassette embodiments of the instant invention shown therein includes a record media action key enclosed within the dashed block 504 annotated SEARCH KEY and this key includes a text string search, annotated TEXT SEARCH, encoded function. The function of the search key is to initiate, under program control, a manual search for a block of recorded information located on the active record media as specified by the operator by the manual setting of thumbwheels 506. Both the thumbwheels 506 and the action intiated in response to a depression of the search key may take precisely the same form described in U.S. Application Ser. No. 429,479 and hence, will only be briefly described herein. The search key, as shown in FIG. 9A, when depressed during the record or play modes of operation acts to actuate the active record media transport and automatically search the record media for a block address which corresponds to the particular block address manually set into the thumbwheels 506. If employed in conjunction with the alternate reader key, the search conducted may take place at the read only station. As was briefly mentioned above, character information to be recorded is loaded into the read/write buffer 35 until a full line of information is contained therein. Thereafter, the read/write record media station is energized, the record media brought to speed and the entire contents of the read/write buffer 35 recorded thereon so that a full line of character information is recorded each time the record media station is energized and subsequently stopped. In addition, as will be more fully explained below, groups of lines, paragraphs and the like may be arbitrarily designated as blocks and marked in a unique manner so that a search may be initiated therefor although, normally, block markings are utilized to code individual pages of documents as aforesaid and hence it is ordinary operating procedure to insert a new block number on the record media each time a page of a document being recorded is terminated. In this manner, automatic play out on a per page basis can be initiated and automatically terminated at the end of a given block so as to coincide with a requirement at the printer that a new sheet of paper be inserted. In any event, numerical codes are entered at the keyboard in a manner to be described and recorded in a specialized manner prior to the recordation of character information associated with a page to be printed. Therefore, when a given page of material is sought, the block designation or number associated with that page is set at the thumbwheels 506 and the search key is depressed. This initiates, under program control, a search of the record media at the active record media station and when the search is completed, it will be indicated by a coincidence in the numerical value set at the thumbwheels 233 and the digital counter associated with the cassettes at the read only and read/write record media transports.

The digital counter located at the read only and read/write record media station, as shall be seen below, also provides a numerical indication as to the last block code read from the record media loaded at that station and hence, when the settings of the digital display and thumbwheels 506 correspond, a successful search operation for a designated block of material has been completed. The search operation for a block of information, as described in detail in U.S. Ser. No. 429,479, supra, occurs through a comparison operation of the block number set at the thumbwheels 506 with that at which the record media located at the active record media transport resides as indicated by the digital counter present at the transport. More particularly, placing initial focus on the manner in which information is recorded on a record media it will be appreciated that each line of material dumped onto the record media from one of the buffers is initiated and terminated by a short interrecord gap associated with the starting and stopping of the record media tape prior and subsequent to recording. When a block of material is to be placed on the record media, the interrecord gap associated with a block is made substantially longer than that intermediate the recording of lines and a digital code representing the number of the block, as well as certain other information to be described below, is recorded at the end of the block gap in the same manner as a line is recorded but prior to the start of any character information associated with document information to be printed. Therefore, when a search operation is initiated, the character information representative of the block designated at the thumbwheels 506 and representing the block to be searched is subtracted from the value of the block at which the record media is presently positioned as indicated at the digital counter 11 or 12 (FIG. 1) associated with the active record media station. This subtraction takes place in the arithmetic logic unit 84 (FIG. 2) and results in either a positive or negative value which represents in magnitude the number of blocks through which the record media must be displaced while the positive or negative sign associated with this value represents a direction through which the displacement is to occur. The direction information is utilized to drive the record media at a search speed i.e., approximately seventy inches per second in the clockwise or counter clockwise direction as indicated by the sign obtained from a comparison of the block address set at the thumbwheels 506 and that initially present at the digital display 11 or 12 of the active record media transport station. The magnitude of the count obtained from the comparison of the block address set at the thumbwheels 506 and that initially present in the digital display 11 or 12 for the active reader is stored in the G register within the general purpose registers indicated by the block 83. As the record media is displaced in the direction indicated by the sign information obtained from the comparison, an analysis is conducted in the arithmetic logic unit 84 and the main register M to detect gaps on the record media whose length is sufficient to indicate that they are interrecord gaps associated with block information rather than those associated with the plurality of lines present within each block. This may be readily accomplished through a timing operation wherein the duration in which no flux transitions are detected on the record media is sampled, block gaps being indicated by a real time interval which is substantially longer than interrecord gaps. For example, as the gap associated with block information are approximately 9 inches in length while the interrecord gaps required for starting and stopping the record media information individual lines within a block are generally only approximately 2½ inches in length, a substantially longer period without transitions is normally associated with the reading of a block interrecord gap. Accordingly, each time an absence of transitions for an appropriate interval occurs the analysis being conducted under program control, uses such absence of transitions for a predetermined interval to determine that a block is present. Each time this condition obtains, the count in the G register is decremented while the digital display associated with the active reader is incremented or decremented depending upon the direction in which the search is taking place. When a sufficient number of gaps indicative of block information have been detected to decrement to zero (0) the count in the G register and to cause the digital display at the active reader to be equal in numerical value to the value set at the thumbwheels 506, the automatic writing system according to the instant invention is placed under program control in a normal read mode. This read mode, as shall be seen hereinafter, causes the record media to be read at approximately twenty inches per second in a direction wherein the record media is moving with respect to the record head from left to right. In this mode, the block information actually recorded at the end of the interrecord gap associated with a block is actually read and the numerical value thereof is placed in the read/write buffer 35 and subsequently into the main register M for analysis. The character representing the block information as thus inserted into the main register M is then inserted into the arithmetic logic unit 84 where it is compared with the thumbwheel setting which has been loaded into the G register present in the block annotated General Purpose Registers 83. If an appropriate comparison is obtained, no further searching takes place; however, if an appropriate comparison does not take place, further searching is accomplished in the previously described manner. When the search has been appropriately completed, the setting of the thumbwheels 233 and the setting of the digital display for the active record media station will coincide whereupon any desired operation may take as the record media is located at the desired position set at the thumbwheels 506. Accordingly, it will be seen that the search key located at the keyboard depicted in FIG. 9A gives the operator the facility to cause one of two record media, which may be utilized in the instant embodiment of the present invention to be searched and cause a record media to be positioned at the desired block of information requested. Although such block indications are ordinarily utilized to designate pages within a document being prepared, it shall be apparent as this disclosure proceeds that such block settings may be utilized to designate any given grouping of material within the document under preparation and hence, any time any particular portion of a record media is desired for playback, duplication or any other purpose, it may be rapidly accessed by an operator. The foregoing mode of search operation is manual in nature in that the operator manually sets a desired block number at the thumbwheels 506 and thereafter the automatic writing system according to the instant invention automatically conducts a search of the active record media for that block location. As shall be seen hereinafter, automatic search operations are also available wherein search codes or the like entered during a recording operation on the recording media together with an appropriate block designation, will similarly cause the automatic writing system to search a defined record media for the new block number indicated and thereafter, an automatic playback operation or the like may be continued. An unsuccessful search condition will be indicated any time an end of record character is detected without encountering the desired reference mark. This condition may be visually or audibly indicated to an operator through flashing lamps or an audible buzz and may be cleared by a depression of the character/stop key. A manual form of search is not available when the automatic writing system according to the instant invention is in a revise mode of operation and hence, the manual search function must be initiated prior to operator placement of the automatic writing system according to the instant invention in a revise mode.

The automatic writing system according to the instant invention is also provided with a mode of operation, hereinafter referred to as Auto Log Print Out wherein format information and file header information may be entered on the record media in a periodic manner and a selective playback mode of printing may be initiated, under program control, where such format information as is on the record media is printed out while all textural material is skipped so that dependent upon the nature of the file header information entered during a record or revise mode of operation, the operator is presented with a printed log which may effectively summarize the content of the record media. More particularly, as shall be seen in greater detail below, the instant invention is provided with a format data entry mode, which, when entered by the operator, automatically records the margin and tabs which have been established as well as any file header information which the operator may desire to enter to summarize the content of the character information which is to be entered subsequently. Thus, the system has the capability of recording margin settings, tab settings and file header information on the media. When this information is read during a play mode of operation, the system is responsive thereto to adopt the new settings of margins and tabs recorded while the file header information is skipped. However, in such a play mode of information where the code print key is depressed, margin, tab and file header information will be printed any time a format block is encountered. A format block may be entered in a record or revise mode of operation by a depression of the code key 491 and the format key which is an encoded function associated with the Q key. When the code key and format keys are depressed, the carrier at the printer automatically relocates to the left most or 00 column position and the present settings of the margin and tabs are retained. If the operator wishes to change any of the present settings, the space or tab keys may be depressed to locate the carrier at any column and setting or resetting of margins and/or tabs may there occur. Those settings not changed are retained while total tab clear is available if necessary. In this mode, tab operations will access special tab positions as well as normal tabs, special tabs being indicated by the momentary lifting of the ribbon. After the margin and tab information associated with the format for which printing is to occur has been entered, the file header information may be entered by the entry of a special carriage return character followed by text which is to constitute the file header which will, as will be appreciated by those of ordinary skill in the art, normally correspond to a summary, precise or the like of the actual character information to be entered in succeding lines entered at the keyboard. The amount of data for the file header may not exceed two hundred and fifty-six (256) characters, i.e., the maximum line length available within the read/write buffer 35 less the space used for the entry of format information defining margins and tabs. The system acts to warn the operator when only ten (10) character spaces, remain for the entry of information within the format block through a audible or visual indication and special character return characters must be employed to format the file header information into lines of text. The file header prints as it is typed regardless of whether or not the code print key is depressed. The code format entry procedure is terminated by the entrance at the keyboard of a carriage return character which causes, the margin, tab and file header information if any, to be recorded on the record media.

In accordance with the teachings of the instant invention, a special search mode is provided wherein the record media is automatically searched under program control for reference block information and format block information which is positioned in such relationship to such reference blocks that no intervening textural material is present. Each time a reference block is located, it is printed together with the contents of the following format block so that if the record media was recorded with appropriate file header information, the operator is provided with a printed log of the content of the record media. Format blocks may, of course, be entered at any point in a data entry cycle so long as the same are treated as a new line of information; however, only those format blocks which directly follow a reference block without intervening textural material are employed in the auto log printout associated with cassette versions of the instant invention since the page organization assumed therefor best accommodates file header information which is organized on a per page or a group of pages basis.

Referring specifically to FIG. 9A, the auto log printout search mode is entered by a setting of the thumbwheels 506 to a 00 state and enabling the code print function by the depression of the code print key and a depression of the search key. As will be appreciated by those of ordinary skill in the art, the setting of a 00 at the thumbwheels distinguishes the specialized auto log print out search function from other search functions as no 00 reference block is employed within the instant invention, since the initial block entered is accorded a One (1) designation. The auto log search function permits the automatic printing of a list of numbered reference marks used on the record media, which in this case takes the form of cassette or tape, together with the format block information which may or may not contain file heater information. Once the auto log printout search function is initiated, as aforesaid, the system searches forward in the active reader until a reference mark is encountered through the timing function described above. The reference mark and number is then printed and thereafter a two index carriage return function is carried out. The system then reads the group of data following the reference block mark which is recorded as a line of information. If this next group of data is a carriage return, a precedented carriage return or a link code, the system proceeds to read the next group of data in succession and this continues so long as only carriage return codes or link codes, as described below, are encountered, read and similarly passed over. If a format block, as determined by the character code associated with the encoded function of the Q key, is read before a group of information on the record media containing textural material or the like, the format block is printed as recorded. Any subsequent format block under the same reference mark is ignored. Following the printing of a format block as above, or upon a reading of a line of information containing textural materials defined as characters other than a carriage return character, a precedented character or link code, the system carries out three, two (2) index carriage returns and searches for the next reference mark. The complete process is repeated until an end of record mark is encountered or the stop key is depressed.

During the auto log printout, the first and subsequent carrier returns employ the left margin setting which obtains at the start of the process. The margin and tab settings, if any, are modified by the format blocks read during an auto log print out operation. Accordingly, it will be appreciated by those of ordinary skill in the art that the auto log printout search function provided within the instant invention allows any record media recorded with appropriate format blocks of information to be played out in an auto log print out search mode and each reference mark recorded on the record media is played out together with any following format information which may include file header information. Thus, all textural material on the record media is effectively skipped during this specialized mode of searching while the operator is provided with a complete log in terms of block number, recorded margins and tabs and file header information associated with each block recorded on the record media. A typical example of the printout obtained during an auto log printout search mode is set forth below, together with appropriate annotations in parentheses to acquaint the reader with the nature of the log achieved.

| Examples of Autolog Printout | |
|---|---|
| ‡01 | (Ref Mark 01 wherein ‡ is a ref mark encoded function indication) |
| ‡02 | (Ref Mark 02) |
| ϕMG:12 84 | (ϕ = Format Block, MG = Margins) |
| TB:25 | (TB=TAB) |
| Use of paging system, 4/11/73 | (File Header) |
| ‡03 | (Ref Mark 03) |
| ϕMG:10 90 | |
| TB:12 25 30 | |
| QUAL. TEST STATUS | (File Header) |

The autolog printout mode of operation occurs at search speeds when the record media is being searched for reference block information and thereafter processing takes place at skip speeds so that an automatic log of the information contained on a properly recorded record media is provided to the operator upon an initiation of this mode of operation. It should be noted that in cassette or tape embodiments of the instant invention, the autolog printout search operation, outlined above, acts upon appropriate initiation thereof to proceed with an autolog printout of the record media loaded from a location at which the cassette then resides to a position where an end of record character obtains. Therefore, if an operator is desirous of obtaining an autolog printout of the contents of a record media which is not presently at the initial portion thereof, a search for the initial block mark thereon must be initiated and conversely, should an operator desire an autolog printout of only the latter portion of a record media, a manual search to some intervening reference mark may be initiated prior to the implementation of the autolog printout function.

Referring for the moment to FIG. 9B, it will be seen that in this figure, which is devoted as aforesaid, to magnetic card embodiments of the instant invention, the search key included within the dashed block 504 within FIG. 9A is replaced by a pair of keys annotated TRK− and TRK+ which are employed, in a manner to be seen below, to initiate manual or semi-automatic search functions for different tracks on a magnetic card. This embodiment of the instant invention also includes an autolog printout feature which is highly similar to that described above in connection with FIG. 9A and in essence, only differs due to nature of the recording medium employed. More particularly, to implement an autolog printout function within the keyboard illustrated in FIG. 9B, the code print key must be depressed and the thumbwheels 506 set to 00. Under these conditions, the autolog printout function is implemented by the depression of the code kay 491 and either one of the track search keys TRK− or TRK+. When this operation pertains, in magnetic card embodiments of the instant invention, the head for reading the card, unlike the case for a cassette embodiment of the invention, will automatically displace to the beginning track of the card and the card is searched in a forward direction at the active reader until a format block is encountered, or the character/stop key is depressed. All format blocks encountered are printed out in the manner set forth below and upon the completion of the search function on the card, the card is ejected. An autolog printout from card embodiments of the instant invention may take the typical form as follows:

| | |
|---|---|
| ϕMG: | 12 84 (01) (ϕ = Format Block and No. in parentheses is track No.) |
| ϕMG: | 12 84 |
| TB: | 25 |
| Use of paging system, 4/11/73 (09) | |
| ϕMG: | 10 90 |
| TB: | 25 |
| QUAL. TEST STATUS (25) | |

A cursory inspection of the typical form of autolog printout obtained upon an initiation of this function in a card embodiment of the instant invention such as illustrated in FIG. 9B will indicate that no track marks, corresponding to block reference marks in the cassette embodiments of the instant invention are printed if they are not accompanied by a format block. This action here obtains because while cassette versions of the instant invention have a per page orientation with regard to reference marks and hence a log of information on a page is normally desireable, card embodiments of the instant invention have a line orientation and hence, only a few pages of information or short letters would be normally recorded on a single card. Therefore, in the autolog printout search function initiated in these embodiments of the instant invention, the beginning of each line of recorded information on a card is searched for a format block and if the same is found, the symbol ϕ for a format block is printed together with any margin, tab, and/or file header information present therein and upon the completion of printing of the format information contained in this recorded line of information, the track number of the track containing such format information is printed within parentheses in the manner indicated. Thus, it will be appreciated that the autolog printout function associated with card embodiments of the instant invention has been suitably modified to provide an operator with the maximum convenience for the record media associated therewith.

Returning now to FIG. 9A and the record media action functions associated with the dashed block 504, it will be seen that the search key has associated therewith an encoded function indicated as text search on the aslant portion of this key. This encoded function, which has no counterpart in card embodiments of the instant invention, is operative in play, non-justify modes of operation to enable an operator to enter a string of up to fifty (50) words at the keyboard and have the automatic writing system according to the instant invention, search the record media for such defined string of text and once such string of text has been located on the medium, the system stops, provides an indication that the defined string of text has been located, and is in a position to begin printing at the beginning of the string of defined text when an action key is depressed. Thus, this encoded function permits the automatic writing system according to the instant invention to search within the current reference sequence of blocks on the record media for a particular string of test and to locate the same under program control. To implement this function, the system must be in a play, non-justify mode and the function is implemented by the depression of the code key 491 and the search key. Thereafter, the operator would enter the string of text to be searched for at the keyboard, such string of text normally being defined by the least number of characters necessary to uniquely define a string of text on the medium, it being noted that up to fifty (50) consecutive characters within a desired line may be entered to uniquely define the beginning of a particular word group. The characters entered at the keyboard to define a string of text will not be printed unless the code print key is also depressed. Upon completing the entry of the defined string of text for which the search is to be initiated, the operator must indicate to the system whether or not such search is to be carried out in a forward or reverse direction on the record media. If a search in the forward direction is to take place, a carriage return is entered upon the completion of the text string definition while if a reverse search is to occur, a precedented carriage return, i.e., code +CR, is entered. A reverse search can not be initiated in a record mode. The text string entered at the keyboard, which is to correspond to the text string to be located on the record media is stored within storage locations 290 - 2C2 within the RAM peripheral 34. Upon the completion of the entry mode including the defined text string and the direction in which the search is to be conducted, the current reference block at which the reference media is located is searched in the direction indicated for the text string defined through a comparison operation. More particularly, a line on the record media is read in the direction indicated and the first character loaded in the read only buffer 36 is compared with the first character of the text string defined as stored within storage locations 290 - 2C2 within the RAM peripheral 34. If these characters do not compare, the second character within the line read is compared in a similar manner and this continues in the direction indicated as far as the reading of succeeding lines from the record media is concerned until the first character read compares with the first character inserted for the defined text string. Once a comparison of the first character is obtained, the second character of the defined text string is compared with the second character loaded in the read only buffer after the first comparison has been obtained. If no comparison is achieved, the contents of the buffer are again consecutively compared with the first character of the string and this operation is continued until a consecutive group of characters read from the media corresponds identically to the defined text string. Once this occurs, the automatic writing system according to the instant invention provides an audible indication that a comparison has been obtained and thereafter queues the located string of text through a positioning of the buffer pointer to the beginning of the defined text string. Thus, the defined text string is searched on a line by line and character by character basis until the text string defined at the keyboard is identified on the record media.

The search initiated occurs at a skip rate and this function, it will be appreciated by those of ordinary skill in the art, provides an operator with a power mode of quickly locating and identifying portions of previously recorded material provided the operator can identify the block or page at which such material appears. It should be further noted that the automatic writing system according to the instant invention also acts, under program control when this encoded function is initiated to correct for operator error in entering the defined string of text. Thus, in this mode of operation, any space is treated as a space and any hyphen is treated as a hyphen regardless of whether or not the same is recorded as a regular or precedented character. During a forward search in transfer mode, reverse searches not being capable of being accomplished with the record mode turned on, text is duplicated up to the termination point of the search, so that an operator may employ this mode of operation to achieve duplication to a desired point. If a referenced mark, end of record mark or the end of the recording medium is encountered prior to a successful text string comparison, the system provides an audible indication that error is present and automatically stops. The stop condition and/or an aborting of the text string search may be achieved by a depression of the character/stop key which here acts to clear the condition. During the entry of the text string to be searched for as defined by entry at the keyboard, the character correct and line correct keys are active to promote rapid error correction.

Thus, it will be seen that in the embodiment of the invention whose keyboard is illustrated in FIG. 9A an operator may manually switch between the active media through the use of the alternate reader key, while the search key, when coupled with its specialized functions of autolog printout and text string search, permits an operator to search to a given block as defined at the thumbwheels, achieve a file header printout of format information entered on the record media and the location of a defined string of text whose length may be as long as fifty (50) characters. In this manner, the automatic writing system according to the instant invention provides high utility and maximum convenience for locating information loaded on a record media.

Returning now to FIG. 9B, it will be recalled that although embodiments of the instant invention employing magnetic cards for a record media are highly similar, in their keyboard configurations to that employed with cassette or tape embodiments of the instant invention, the search modes thereof have been modified to accommodate the mode of organization employed in recording. Thus in card embodiments of the instant invention, lines of data to be recorded are generally recorded as discrete tracks on the medium and although more than one page of material may be accommodated on a record media in the form of a card, this would normally not be the case unless the document information being recorded correspond to a plurality of short pages or the like. Thus, for this reason, the search facilities provided in the keyboard embodiment illustrated in FIG. 9B are provided with a track orientation which generally corresponds to a line of data on the document rather than the block orientation corresponding to a page of information as is employed in the keyboard embodiment illustrated in FIG. 9A. Accordingly, as aforesaid, the search key illustrated in FIG. 9A has been replaced by a pair of keys in FIG. 9B annotated TRK− and TRK+ wherein the abbreviation TRK stands for the term Track associated with recording tracks on the card. These keys are also provided with an encoded function, indicated on the aslant portion thereof by the annotation TRK Search which stands for track search More particularly, tracks of recorded information recorded on a magnetic card are automatically numbered and logged by the system under such conditions that the first track number is defined as 01 and the last defined as 72. During a record or revise mode of operation, each track recording operation causes the record media station to step one track and conversely during a reading or transfer mode of operation, each track read from a card into the read only buffer 36 causes the reading media station to step to the next track containing data and such stepping normally occurs in sequence across the card. If code print is on, during the recording or playing and printing of a track of information, the data printed is followed by the automatic printing of the relevant track number. This two digit number is printed in parentheses immediately following the last character or function symbol but prior to the execution of any carrier return. Associated with the read/write and read only card media stations, are two digit displays which show the number of the currently accessed track on the card. If no card is loaded, on the display a 00 is indicated. Similarly, the thumbwheels 506 in FIG. 9B corresponds to a pair of ten digit thumbwheels for the manual setting of track numbers rather than block numbers and hence the number of a desired track to be located during search functions may be set therein and obtained through comparison operations in much the same manner outlined briefly above in regard to FIG. 9A. The track selection or track search function in card embodiments of the instant invention such as shown in FIG. 9B are provided with both a manual positioning function and a semi-automatic search function. More particularly, on insertion of a card into a media transport, track number 01 is immediately available and is displayed. The track plus and track minus keys which may here be referred to as Track Seek keys, may be employed to displace the working point to other tracks. More particularly, the track +key moves the working point toward higher number tracks and the minus track key moves the working point toward lower number tracks. A momentary depression of either key moves the working point one track. Each key has a repeat function associated therewith and hence if either key is held depressed for more than five hundred milliseconds (500 ms), the system commences to move the working point further until the key is released or the first or last track is reached. As the working point is displaced, its current position is indicated in the track number displays associated with the active media. This is a manual mode of track selection in which the operator may rapidly access any desired track and hence, the recorded information location thereon, in magnetic card embodiments of the instant invention.

A semi-automatic search mode highly reminiscent of the search function employed in cassette embodiments of the instant invention is available in magnetic card embodiments of the instant invention through the track seek search mode available as an encoded function associated with the track plus and minus keys. The track seek encoded functions acts under program control, to position the head at the active record media station over the track whose number correspond to that set into the thumbwheels 506 upon initiation of the track seek encoded function. This function is implemented by a comparison of the track number set into the thumbwheels with that at which the record head is positioned as indicated by the digital display at the active record media station. This comparison, is achieved in basically the same manner discussed in conjunction with the search operation for cassette embodiments of the instant invention in that the magnitude and size of the difference resulting from the comparison is employed to ascertain the direction and number of tracks through which the recording head at the active record media station must be displaced. Here, however, rather than counting block marks which may vary in length as was the case in cassette embodiments of the instant invention, each track on a magnetic card is represented by a discrete displacement of the recording head and hence, the recording head is displaced through a distance equal to the displacement number for the number of tracks of difference ascertained by the comparison operation and in a direction indicated by the sign of the difference obtained. To implement the track seek function, the code key 491 and either one of the track plus or track minus keys may be depressed, it being noted that the plus or minus function associated with each track key is here not operative and hence either may be depressed by the operator as the direction in which head displacement occurs is controlled by the sign of a comparison between the number set into the thumbwheels 506 and that track number indicated by the display at the active reader. The track seek function may be implemented in record or revise provided that in revise no unterminated block remains in the read/write buffer and upon a completion of the track seek function, it is preferable that the automatic writing system provide an audible or visual indication to the operator that this function has been completed. Thus it will be seen that in the embodiments of the instant invention employing a magnetic card as the record media, both a manual and semi-automatic search function is provided so that the operator may either change the operating point on the record media as a function of a present position or may quickly displace the recording head to a designated track.

Although the thumbwheels 506 have only been briefly mentioned in conjunction with the disclosure of the search modes of operation employed in both the cassette and card embodiments of the instant invention, it will be appreciated that the same may take precisely the form of the thumbwheels disclosed in U.S. Ser. No. 429,479, supra. Thus the thumbwheels are manually setable by an operator to provide a visual indication of a desired block or track number to an operator while additionally providing a digital indication of the number manually set therein to the automatic writing system according to the instant invention. The pair of thumbwheels 506 are thus employed to indicate the two digit block addresses or numeric codes mentioned above which may range fron 00 to 99 while in magnetic card embodiments of the instant invention the same are employed to define track numbers on a magnetic card which may here vary from 00 to 72 it being recalled that a 00 indication in each case is utilized only in conjunction with an autolog printout function, the reference mark 01 being relied upon to define an initial block or track for each recording medium.

THE ENCODED FUNCTIONS

As was described previously, the code key 491 acts when depressed to provide an encoded function for selected ones of the standard keys within the standard keyboard array enclosed within the dashed block 490 which are employed for encoded functions. The encoded functions are briefly described below with the function of the encoded character associated therewith; however, it should be noted that when the encoded function is akin to that normally employed by the key itself, i.e., such as tab, carriage return, space and the like the encoded function is referred to as a precedented function or in certain cases, a special or precedented special function and it will be understood that in each case such precedented or encoded function is obtained by a depression of the code key 491 and the standard character or function key associated with that function.

Furthermore, because certain of the specialized encoded functions employed within the instant invention are common to those set forth in U.S. Ser. No. 429,479, supra, such encoded functions as are common to that application will be only briefly set forth herein, that application being relied upon to provide a detailed disclosure thereof and it should additionally be noted that this mode of disclosure will be employed to avoid undue repetition even though the actual placement of the encoded function on the keyboard varies with respect to the alphameric key utilized therefor in Ser. No. 429,479. In the description of the encoded functions which follows both FIGS. 9A and 9B will be treated together. However, where differing encoded functions are employed due to the nature of the recording medium relied upon in the embodiment, special attention wll be given to the encoded functions associated with the key being discussed in a particular model. In addition to the encoded functions associated with the standard keys enclosed within the dashed block 490, certain other keys employed at the keyboards illustrated in FIGS. 9A and 9B are associated, as indicated by the annotations on the aslant portions thereof with an encoded function and where such encoded function has not been previously discussed in connection with that key, a description thereof will additionally be provided at this point in the specification.

In the cassette embodiment of the automatic writing system according to the present invention, whenever the automatic writing system is removed from the record mode of operation, by a second depression of the record mode key, the record media or cassette in which recording was taking place is marked with an end of record code in the same manner as described in U.S. application Ser. No. 429,479, supra. This end of record code is employed to mark the record media at a point in which a record operation terminated so that when the automatic writing system is again energized in a record mode of operation, the record media may be automatically searched for the end of record character so that new recording may pick up at a point where the previous recording operation terminates. This highly important feature is initiated and achieved through a search and timing operation as described in U.S. Ser. No. 429,479 wherein the absence of data for a predetermined interval is detected as an end of record mark and hence permits the operator to interrupt recording, deenergize the system and at a later time continue the recording operation at a point at which recording terminated. There are frequent cases however when recorded information on a record media has outlived its usefulness and hence, an operator is desirous of rerecording new information over the old information and hence, requires that the recording operation begin at the start of the cassette loaded regardless of the presence of other information thereon. For this reason, an erase encoded function is provided in association with the record key in the manner indicated in FIG. 9A so that when the record key is struck with the code key 491 in a depressed condition, the automatic searching operation for an end of record character is skipped and new recording occurs at the beginning of the cassette loaded in the same manner as described in U.S. Ser. No. 429,479, supra. In embodiments of the instant invention employing magnetic cards as the recording media, discrete lines of information are recorded on each magnetic track and the operator is given a wide ambit of versatility through search, autolog printout and track seek search functions to rapidly access to any point on the record media. Furthermore, while the nature of a cassette is such that information recorded is organized according to pages of information and a great number of pages may be recorded thereon, embodiments of the invention employing magnetic cards are organized on a per line basis and will generally accommodate data associated with a single page. For this reason, it is assumed that an operator here knows the nature of the recorded material on a magnetic card or may readily obtain a print out of selected portions thereof and hence no erase function is provided therefor, it being assumed that any time a magnetic card is loaded and a record mode of operation initiated, the operator is desirous of having the record function initiated at track one on the record media. Thus, no erase encoded function is illustrated in the embodiment of the invention set out in FIG. 9B.

The format print encoded function, abbreviated FMTPRT, is associated with the 1 key within the standard array and is enabled by a depression of the code key 491 and the 1 key within the standard array 490. The generation at the keyboard of the code format print encoded function, is achieved by the depression of the code key 491 and the 1 key and may be implemented during any non-automatic mode. Upon the generation of the code, the eight (8) bit code representing the encoded function generated is supplied through the common data bus and loaded into the main register M. Upon a classification and detection of this character, the printer, acting under program control, executes a two index carriage return and prints the current margin and tab settings. A two index carriage return follows the printout. The format print encoded function is a nonrecordable code and operates whether or not the code print is on to apprise the operator of the current margin and tab information loaded into the system. Printout will take the following form:

line 1 MG: 10 70 tab /5 : 20 /1ø 40 /5ø wherein the / associated with the tabs indicate that special tabs have been set for use in such operations as column centering and the like to be described below. The implementation of the format print encoded function is achieved, under program control, by effectively reading out the contents of the registers in which margin information and tab information are set, as aforesaid, and providing spacing and letter deisngations in the printout as a function of the branch operation initiated upon a classification and generation of the format print encoded function generated at the keyboard. Thus, the format print encoded function is provided in both the embodiments of the invention indicated in FIGS. 9A and 9B and permits the operator to quickly determine the current margin and tab information which has been set into the system and which will be employed in any succeeding print operation.

The 2 key as illustrated within the standard array 490 as shown in FIG. 9A has an encoded function associated therewith annotated REF standing for the reference encoded function. This encoded function is only provided in cassette versions of the instant invention and is employed to cause the recordation of a block reference mark on a record media being prepared. It is normally initiated by an operator prior to recording any line information for a new page of information, however, as was described above, block designations may be employed in cassette versions of the instant invention at any points arbitrarily selcted by an operator. The reference encoded function is initiated merely by striking the 2 key with the code key in a depressed condition. If the code print key is also down, a two with a slash therethrough (2̸) will print to indicate the insertion of the reference encoded function. In addition, a reference block number is automatically recorded each time the reference encoded function is generated and if the code print key is in a depressed condition, a two digit number corresponding to the reference block number is also printed. The block number inserted upon a striking of the reference encoded function is automatically entered by the automatic writing system according to the instant invention and follows in sequence the last block number entered into the system in the automatic manner described in U.S. application Ser. No. 429,479, supra, and hence, as this material is fully disclosed in that application, it is sufficient to appreciate that the automatic writing system according to the instant invention keeps track of reference codes employed for block numbers entered into the system and each time the reference encoded function is generated, automatically increments the last reference block number employed and records the same on the record media as well as causing a two digit number representative thereof to print out if the code print key is depressed. Turning briefly to FIG. 9B, it will be seen that the encoded function associated with the 2 key in this figure is annotated EJECT. As was explained above, embodiments of the instant invention employing magnetic cards as the recording medium are organized in such manner that the entire contents of a magnetic card will normally correspond to a page of printed information and hence numbered blocks of recorded information are unnecessary and hence are not imposed in these embodiments of the instant invention. Instead, the encoded function associated with the 2 key here acts to cause the record media in this case, a magnetic card to automatically eject. The eject code associated with the 2 key in FIG. 9B is generated upon a depression of the code key 491 and the two (2) key. The code is recorded and thus provides a facility for programmed ejection of a magnetic card loaded in the active media. If the code print key is in a down condition, the relevant symbol, which in this case corresponds to a two with a slash therethrough (2̸) is printed. When the code is generated, either at the keyboard or from a reading of the record media, the system is responsive upon the classification thereof to eject the card at the read/write transport station or in the active reader if record is not enabled. In a record or revise mode of operation, the line of data in the read/write buffer 35 is terminated and recorded and the mode is cancelled. When a prerecorded code eject is read, in a play, non-record mode of operation, the system is responsive thereto to eject the card while in a revise mode of action, the play action is terminated. In a transfer mode, the action is terminated, the magnetic card at the read only record media station is ejected; however, the card eject code is not transferred or recorded on a record media loaded at the read/write station. In a duplicate, auto mode, the eject code is duplicated and both the read/write and read only record media cards are ejected.

The stop, transferring stop (annotated T STOP) and switch codes (annotated SW) are common to both the keyboard embodiments illustrated in FIGS. 9A and 9B and correspond to the encoded functions described in conjunction with U.S. Ser. No. 429,479, supra. Therefore it is here sufficient to appreciated that each code is generated by the depression of the code key 491 and the standard key 3, 4 or 5 associated therewith within the standard array and should the code print key be depressed, the numeral associated with the standard key will be printed with a slash therethrough to indicate the encoded function. The stop key associated with the 3 key is a recordable code which acts when read to stop automatic processing for the insertion of specialized material or the like, in transfer operations however, this stop code will not be transferred to the media loaded at the read/write transport and hence it is only sufficient to cause system action to stop so that data from the keyboard may be selectively entered or the like. The transfer or T STOP encoded function associated with the four (4) key is a recordable character which does effectively transfer during a transfer or duplicate mode of operation. Thus, when read, system action will stop and if a transfer or duplicate mode of operation is in progress, this code will transfer to the record media being prepared at the read/write record media station prior to stopping system action. Furthermore, when a stop code is read during a skip mode, the same effectively acts to terminate or cancel the mode while a transferring stop (T STOP) does not terminate the mode. The switch code associated with the five (5) key is also a recordable code which may be inserted in textural data to provide programed transferring of a play operation taking place in a dual media system to the alternate media station and hence acts in the same manner with respect to the system as if the alternate reader key were depressed. In a record or revise mode this code may be generated upon the depression of the code key 491 and the five (5) key and if code print is on, the relevant symbol (5̸) is printed but the codes have no function when generated. However, when the same are read during a play mode or the like, they are effective to transfer reading to the alternate reader and hence is useful in batch letter operations of the type described in U.S. Ser. No. 429,479.

Due to the differing nature of the recording medium employed, the encoded functions of search, annotated SCH, and switch and search, annotated SW SCH, associated with the 6 and 7 keys in FIG. 9A have no counterpart in the keyboard illustrated in FIG. 9B. The search and switch and search encoded functions indicated in the keyboard of FIG. 9A in association with the 6 and 7 keys within the standard array 490 were described in detail in U.S. Ser. No. 429,479 and hence it is here sufficient to note that each of these encoded functions are recordable functions which are generated by the depression of the code key 491 and the respective one of the 6 or 7 keys. Furthermore, if the code print key is depressed, a six or seven overprinted with a slash will be printed. Upon the entry of the appropriate search or switch and search encoded function, in a record or revise mode, the operator enters a two digit number defining the reference block for which the search is to be conducted. If a 00 digit set is entered from the keyboard, the subsequent search operation will seek the mark reference set at the thumbwheel at the time the search is initiated. The two digit number is recorded during a record or revise mode with the respective search or switch and search code inserted. Neither code is capable of initiating a search operation when generated. However, when read during a play mode of operation with record and revise off, a reading of a search code, (ɸ) will initiate a search operation for the referenced block indicated by the following recorded two digit number in precisely the same manner as a manual search operation, as described aforesaid, is initiated in response to a depression of the search key. Here, however, the search code is read from the medium and the block for which the search operation is to be conducted is also read from the medium rather than being set by the thumbwheels. In the case of a switch and search code (𝑇̸), the active media is de-energized and the alternate record media station is rendered active and thereafter this record media station is searched for reference block recorded on the record media in the same manner as would occur if the operator depressed the alternate reader key and then the search key. Should an end of record character be encountered prior to location of the desired reference mark in the case of either a search code or a switch and search code read during a play operation, an audible indication will be provided to apprise the operator of this condition. These codes are useful in letter batching operations or repetitive print out operations in the manner described in U.S. Ser. No. 429,479, supra.

Although the keyboard embodiment illustrated in FIG. 9B does not provide encoded functions corresponding to the search or switch and search encoded functions described anent FIG. 9A, due to the differing organization of material recorded on a magnetic card, a card repeat, annotated CD RPT encoded function is provided in association with the seven (7) key to provide maximum flexibility with the recording medium for which this embodiment is specially adapted. The card repeat code is generated by a depression of the code key 491 and the 7 key and under conditions where the code print key is depressed, a seven overprinted with a slash (7̸) is printed. The code is recordable and provides the facility for programmed repeating of the playout of a card. Thus, when the code repeat encoded function is generated at the keyboard, it is loaded into the main register M and subsequently classified and identified through comparison operations conducted in the ALU. Once identification thereof has occurred, the system moves the working point in the read/write transport or in the active reader, if record is off to track 01. During a record or revise mode, the block in the read/write buffer 35 is terminated and recorded and thereafter the mode is cancelled. However, when a prerecorded card repeat code is read during a playback operation or the like, the system moves the working point back to the start of track 01 and the play action continues, assuming record is off, i.e., the system is not in a transfer mode of operation. In revise, however, the play action stops without reversion to track 1 while in a transfer mode of operation, i.e., with both play and record depressed, the card loaded at the read only transport is ejected but the card repeat code is not transferred. In a duplicate auto mode however, the code is duplicated and both the read/write and read only cards are ejected. Thus it will be appreciated that in straight play modes of operation, the card repeat code is read and honored while effectively the same as is skipped during transfer or duplicate modes of operation. Accordingly, when the card repeat encoded function associated with the 7 key in FIG. 9B is enabled through the depression of the code key 491 and the 7 key, a recordable function is generated which, when executed, causes the transport to search to track 1 and start again to enable functions such as repeated letter writing or the like. It should be noted that the execution of this code does not involve a researching of the card as the system merely returns to track 1.

The line space encoded function, annotated LSPC and associated with the 8 key, the first line find encoded function annotated FL FIND and associated with the 9 key, the link encoded function annotated LINK and associated with the 0 key, and the precedented hyphen key annotated PREC HY and associated with the hyphen key, are common to both the keyboards illustrated in FIGS. 9A and 9B and were fully described in U.S. application Ser. No. 429,479, supra. Therefore, these functions will merely be briefly described to acquaint a reader with the operation thereof, their detailed functions being disclosed in the aforesaid application. It should be noted that each of these encoded functions are recordable and should the code key be depressed, the alphameric character on the face of the key associated therewith will print and be overprinted with a slash to indicate the presence of the encoded function. When the line space encoded function is enabled through a depression of the code key 491 and the 8 key when the automatic writing system according to the instant invention is in a record or revise mode of operation, the code together with the present setting of the line space selection lever 494 is recorded. The function will print in the aforesaid manner if code print is on. The setting of the line space lever, it will be recalled is inserted within the general purpose registers 83 through the use of locations GB5 and GB4 under such conditions that a One (1) in location GB5 is indicative that the line space lever 494 is set to a double line space setting, a One (1) in the buffer location GB4 is indicative that the line space lever 494 is set to a single space function while Zeros (0's) in both of these locations are indicative that a one and one-half (1 ½) line space function has been selected. Similarly, general purpose register locations GB7 and GB6 are employed to define the line space setting in which the system presently resides in the same manner as locations GB5 and GB4 are utilized to define the setting of the line space lever 494 and it will be appreciated by those of ordinary skill in the art that a duplicate set of register locations for the present setting of the system are necessary since the system may have been set to a line space setting other than that defined by the line space lever 494 due to the reading of a line space code. When a recorded line space setting is read from the record media in a play mode, the system immediately adopts this line spacing in respect to all subsequent carrier returns until a new line space setting is adopted. The new line space setting obtains until either a different recorded line space function is encountered, a different line space setting is coded by a code line space function or if automatic printing action is terminated, the setting of the line space selection lever may be changed through a toggling of the lever 494. When a line space code is detected on the media, the processor automatically shifts to the line spacing set and loads this line spacing into the appropriate storage locations GB7 and GB6 so that the operating line spacing for carriage returns are established. An established line space setting in the system which was adopted through a reading of a code on the media may be deleted by a toggling of the line space lever 494 and a returning of the lever to the desired line space setting.

The first line find encoded function, abbreviated FL FIND, associated with the 9 key operates in conjunction with the first line set abbreviated FL SET encoded function associated with the "*w*" key in the manner described in U.S. application Ser. No. 429,479 and exhibits principal utility in conjunction with the utilization of continuous feed documents. In the instant invention, however, the first line preset number is maintained within storage location 244 of the random access memory means 34 while the first line module counter is established within location 245 of the random access memory 34. Briefly, the operator may preset into the system by means of the first line set encoded function, the form spacing in use which corresponds to the number of platen indexing operations to be performed from the last line of a previous document to the first line, i.e., where printing is to be initiated, on the new document to thus ensure each document printed using continuous forms begins at the same location. To set the form depth, the code key is depressed together with the first line set encoded function key to place the system in a two entry routine. A two digit number is then entered and this number corresponds to the number of line spaces required to step the platen from the first line of a form to the first line of the next form. If code print is on, the relevant symbol together with the two (2) digit number is printed. The form depth remains preset as generated until changed by the generation of a further first line set code. During printing operations, lines of text are counted by the system so that a the completion of printing of a given page, the difference between the count maintained in RAM location 245 and the first line preset number maintained in RAM location 244 corresponds to the number of indexes the automatic writing system according to the instant invention must execute to get to the first line or starting position on a continuous form and in this context the automatic writing system counts carrier returns, indexes, and reverse indexes. At the completion of the page being printed, the operator may enable the first line find encoded function by a depression of the code key 491 and the 9 key to thereby generate the first line find encoded function. If code print is on, the relevant symbol, (⏀) is printed. Additionally, if the automatic writing system according to the instant invention is in a record or revise mode, the code is recorded but causes no function at the time it is generated. When a first line find code is read during a play mode, the system indexes the platen the correct amount to relocate the printing position at the start of the next form by subtracting the count stored in register location 245 from that set in register location 244 and stepping off through index operations the difference therebetween to relocate the print position to the starting point on the next form. Correct functioning depends on the operator setting the initial printing position on the first form at the correct first line position.

The link encoded function associated with the 0 key, as described in U.S. application Ser. No. 429,479, supra, is employed to terminate a line of information in the buffers and cause the recordation thereof without causing the system to execute a carriage return at the printer so that the operation and the buffer may be purposely placed in and out of phase condition with respect to lines of information being recorded. Thus, when the link code is generated through the depression of the code key 491 and the 0 key, in a record or a revise mode, the contents of the read/write buffer 35 are recorded on the record media so that a line of information is delineated thereon, but the carriage at the printer unit is not caused to execute a carriage return operation. The link encoded function will print out with a ∅ symbol if the code print key is depressed and when the same is read in a play mode it will cause the next line of data to be read from the record media without returning the carrier. If a link encoded function is added during a revise mode as the first character in a prerecorded line of information, that line is skipped upon playback.

The precedented hyphen encoded function associated with the hyphen defines a mandatory hyphen which is honored under all conditions. The purpose of such a mandatory hyphen will be appreciated when it is recalled that in margin control modes of operation and the like, ordinary hyphen codes recorded on the record media, are honored when the same appear within the margin zone but are skipped should they appear to the left of the margin zone. Such a result would not be acceptable for cases where a hyphen must appear regardless of the position of the carriage as in the case in words such as "mother-in-law" and the like. Accordingly a depression of the code key 491 and the hyphen key encodes a mandatory hyphen function which is honored in any case. Such mandatory hyphen function will be hereinafter referred to as a precedented hyphen in that the same refers to a hyphen entered in conjunction with the code key 491 and results in a code which is always honored. Similar other mandatory character coding, hereinafter referred to as precedented coding also obtains with respect to the carriage return key, the special carriage return, the tab, and the space; and each precedented function is entered with the code key and results in a code which is honored by the system under all conditions in that the code may not be converted to other functions during automatic reformating operations such as margin control or right justify. For instance, a precedented carriage return is entered by a depression of the code key 491 plus the carriage return key, a precedented special carriage return is a mandatory special carriage return which is entered by a depression of the code key plus the reverse index key (note a normal special carriage return SCR is entered by depression of the code key plus the index key, a precedented tab is entered by a depression of the code key plus the tab key, and a precedented space is entered through a depression of the code key 491 plus the space bar. It should also be noted that for all of the above listed mandatory functions, if the code print key is depressed, a printing symbol indicative of the precedented coding for that function is commonly printed for all of these mandatory functions and the same takes the form of a slashed hyphen in the same manner employed for a precedented hyphen. Of the mandatory or precedented functions herein discussed, only the precedented special carriage return was not employed in U.S. Ser. No. 429,479, supra and this code is employed, as shall be seen hereinafter, when it is desired to fill the buffer with data in that it acts both as a precedented carriage return which is always honored and a special carriage return which causes the printer carriage to return but does not cause the line of information being accumulated in the read/write buffer 35 to be recorded on the record media. It should additionally be noted that any of the mandatory functions mentioned above which are repeatable in their non-mandatory form such as hyphens or space codes, are also repeatable functions in the mandatory format enabled through the use of the code key 491.

The one-half unit encoded function associated with the equal (=) sign key and indicated by the arrow and the one-half mark present on the aslant portion thereof, is provided in both the keyboard embodiments illustrated in FIGS. 9A and 9B to enable a centering function to be implemented during proportionally spaced modes of printing. More particularly, the ½ half back space encoded function, is a recordable code which is enabled by the depression of the code key 491 and the equal sign (=) key which will cause the automatic writing system according to the instant invention to cause the printer unit to back up by one increment or one-half unit which corresponds, as aforesaid, to 1/120th of an inch. This code is recordable and if the code print key is depressed a slashed hyphen sign (‡) will print as symbolic representation therefor. The half unit or increment back space function is only active in proportionally spaced printing modes in that it is only for this printing mode that incremental or half unit backspacing is required to precisely center a print position with respect to a previously printed character. When the code is entered at the keyboard, it is loaded into the main register M and subsequently classified within the arithmetic logic unit 84. Upon classification, a constant is read from the read only memory 80 loaded into the main register M and employed to forward an incremental or half unit backspace displacement code to the printer unit to cause the same to be backed up through an increment equal to 1/120th of an inch. The code is recordable and if the same is read from the record media, the same backspacing functions obtain as if the code were inserted at the keyboard. In all cases the automatic writing system according to the instant invention is only responsive to the half unit backspace code is the system is established in a proportionally spaced printing mode. For other modes of printing such as twelve pitch or ten pitch, the code is classified and subsequently ignored. The half unit backspace code thereby allows an operator to precisely center the print position under a character which has been previously printed in a proportionally spaced print mode.

The backspace key is also provided with a precedented or mandatory function which is implemented through a depression of the code key 491 and the backspace key. This precedented function associated with the backspace key takes precisely the same form of memory backspace described in U.S. application Ser. No. 429,479, supra in that code is entered which causes the system to record backspace function and at the same time cause the carriage at the printer unit to back up through the entire width of the previously printed character regardless of whether such character was printed in a ten (10) pitch mode, i.e., six units, a twelve (12) pitch mode i.e. five units, or a proportionally spaced mode whose unit value will vary, as aforesaid, with the nature of the character struck. The previously entered character, however, remains in the buffer and hence, the memory or precedented backspace function, unlike the normal backspace function, may be used for underlining operations and the like as it does not cause the erasure of previously inserted information. The normally backspace function as will be appreciated upon a perusal of U.S. Ser. No. 429,479, supra, is a correction feature in that whenever the key is struck by itself, the system will back up through the width of the previously inserted character regardless of whether such character was inserted in a ten pitch, twelve pitch or proportionally spaced printing mode. Here, however, the character is effectively erased from the read/write buffer so that the backspace function which attends the mere depression of a backspace key effectively affects a character deletion function in the buffer and hence may not be employed where backspacing is desired to attend an underlining function or the like. The mandatory or precedented backspace function is a repeatable function in that if the same is held pressed for more than 500ms, the code generated and hence, the backspacing function which occurs both at the printer unit and with respect to the pointer within the read/write buffer means 35 will automatically repeat itself. The character width backspacing which attends both a depression of the backspace encoded function and the normal backspace function is highly convenient in that no complex carriage positioning is requied for the operator to either enter a new character if the attendant erase function is utilized or to cause precise underlining if the precedented function is relied upon. This is accomplished, automatically, under program control in that upon the striking of the backspace key, with or without the code key 491, a code will be loaded into the main register M and subsequently classified within the arithmetic logic unit 84. If the code is ascertained to be a precedented backspace function, a branch operation will be inititated which tests the print condition set for the system and if ten pitch or twelve pitch printing is operative, a constant will be read from tne ROM which causes the printer unit to back up either through the five unit or six unit width associated therewith. If proportionally spaced printing is operative, the last character inserted into the read/write buffer 35 is read and this character information is employed to address the printer data ROM 43. The twelve (12) bit character information thus read from the printer data ROM 43 is then employed, more particularly, the three bits of width defining character width therein, are thus used to cause the printer unit to back up through a distance equal to the character width of the last character printed. If a nonprecedented backspace function is entered, a similar effect obtains with regard to the backing up of the printer. Here, however, the pointer within the read/write buffer 35 is backed up through one character position so that the previously inserted character is effectively erased. Thus, in this manner both memory and non-memory backspace functions are provided within the instant invention in such a manner that the printer unit is caused to automatically back up through a character width equal to that associated with the last character printed regardless of the pitch printing mode selected to provide a highly convenient operating feature to an operator. The half space backspace is also a memory backspace function in that no erasure of character information occurs.

The special carrige return encoded function provided in association with the reverse index key 498, is the analog to the link code in that it causes the printer unit to perform a carriage return without recording the contents of the read/write buffer. This occurs in essentially the same manner described in U.S. ser. No. 429,479, and allows the buffer to be packed with data while relatively short lines such as occur in address information and the like are properly printed at the printer unit. Similarly, the precedented special carriage return encoded function annotated PSCR associated with the index key 499 is an encoded function which acts in the same manner as a precedented carriage return function in that it is always honored for margin control purposes and the like but in addition thereto causes the carrier at the printer to return without causing the contents of the buffer to be recorded in much the same manner as a special carriage return. Thus, through the use of this code, address information may be packed within the buffer while the carriage return codes associated therewith, if precedented special carriage return codes and employed, are always honored in justification and margin control modes of operation.

The format encoded function associated with the Q key is an encoded function which permits a format block to be recorded in the manner briefly described above. More particularly, upon the depression of the code key 491 and the "Q" key, the automatic writing system according to the instant invention enters a format and file header entry mode for the entry of information to be printed out in the autolog printout mode of operation described above. This encoded function, thus gives the system the capability of recording margin settings, tab settings and file header information on the media so that when the same is read during a play mode, the system will automatically adopt the new margins and tab set while the autolog printout and thus provide an operator with a list definitive of both the content and format of information present on the record media. The format encoded function associated with the "Q" key may be implemented any time the system is in a record or revise mode and if the code print key is depressed, a Q with a slash therethrough (Q̸) together with any margin, tab and file header information inserted subsequent to the depression of the code key 491 and the Q key will be printed. When the code key 491 and the Q key are depressed key, this code is loaded into the main register M and classified in the arithmetic logic unit 84. Upon classification of the code as a format code, the carrier at the printer is displaced to the left most or 00 column position and the present settings of the margin and tabs, if any, are retained in storage. If the operator wishes to change any of the present settings, spacing or tabbing to any desired column and a setting or resetting and/or tab setting or clearing may occur and it will be appreciated by those of ordinary skill in the art that those margin and tab settings not changed are retained. Total tab clear is also available if necessary through a depression of the code key and the tab clear lever. In this mode, tab operations will access special tab positions as well as normal tabs wherein special tabs are indicated by a momentary lifting of the ribbon. If it is desired to add file header information, a special carriage return character is now entered, automatic printing of the format information may now take place. Text can be entered as a file header such as a reference title for the information contained in subsequent lines of data recorded on the record media. The amount of data in the file header entered may not exceed 150 characters less the space employed for format information. The system acts to warn the operator when only ten character spaces remain. Special carriage return codes must be used to format the file header into lines of text, it being noted that the file header entered is printed whether or not the code print key is depressed. The code format procedure is terminated by the entering of a carriage return character which causes the margin, tab and file header information then established, if any, to be recorded on the record media. It should be noted that the difference between the format encoded function associated with the Q key and the format print encoded function associated with the 1 key is that the former is a recordable entry mode employed for both the purposes of autolog printout search operations and setting format information as a function of information recorded on the record media while the latter merely acts to cause the system to printout the current margin and tab information established within the automatic writing system by any means.

The page end function is common to both keyboard embodiments illustrated in FIGS. 9A and 9B and is the same as that described in U.S. application Ser. No. 429,479, supra. Thus in brief, the page end function, abbreviated PG END is an encoded function associated with the E key which is implemented through a depression of the code key 491 and the E key. The page encoded function is a non-recordable code which permits automatic counting of the number of lines on a page of text so that a preset maximum is not exceeded. When the page encoded function is generated through a depression of the code key 491 and the E key, the system, upon a classification of this code, enters a two digit entry routine whereupon an operator enters a two digit number from the keyboard which two digit number corresponds to the desired maximum number of text lines on a page assuming that the lines of text are spaced normally. If code print is on, the E symbol overprinted with a slash (E̸) is printed together with the two digit number entered. Subsequent to the entry of the page end function, carriage return, index or reverse index operations are counted, whether or not the same originate from the keyboard or media and are logged by the system which maintains a count of vertical space remaining on the page through the use of counters established in RAM locations 246 and 247 wherein the counter at RAM location 246 maintains the number of lines preset into the system while the counter maintained at 247 maintains a count of the number of carriage return, index or reverse index operations which have been implemented for a given page. When the space remaining is reduced to zero (0), the automatic writing system according to the instant invention logs and will not permit further entries from any source until the character/stop key is depressed to clear the system and reset it to the original maximum text line number and this will normally occur at the completion of a given page of text. Upon a power up operation, the number 00 is automatically set into. RAM location 246 so that the page end counter is normally set for an unlimited page length. Similarly, 00 may be set into the system at any time through a manual page end function to cancel any previously established end number. It should be noted that since the page end encoded function is not a recordable function, it is always operative regardless of whether or not a medium is loaded but must be set by an operator each time a power up operation is initiated.

Referring particularly now to FIG. 9A, it will be seen that the encoded functions associated with the R and T keys therein have no counterpart in the keyboard embodiment illustrated in FIG. 9B and that these encoded functions are related in nature to the searching and switching encoded functions provided in association with keys 6 and 7 in FIG. 9A which also have no counterpart in FIG. 9B. More particularly, the skip off, annotated SK OFF and the switch and skip annotated SW/SK encoded functions associated with the R and T keys are special purpose encoded functions designed to permit an operator who has employed a batched letter writing operation utilizing such encoded functions as switch, search, and/or switch and search, to modify the variable information record media prepared during such batched letter operation. In such a batched letter operation, it will be appreciated by those of ordinary skill in the art, that an operator would ordinarily prepare two record media prepatory to the initialization of a high speed batched letter operation wherein a common letter is prepared for a plurality of addressees and each letter prepared is individually addressed. Under these circumstances, one record media, generally referred to as the constant record media would contain common information to be contained in each letter prepared, thus for instance, the constant tape would contain sender address information, if any, the "Dear" portion of the salutation, the textural material making up the body of the letter exclusive of any numbers, prices or remarks which are exclusive to an individual addressee and the closing portion of the letter. Conversely, the variable record tape, would contain name and address information for each addressee, the portion of the salutation for that addressee which is to follow the word "Dear" and any number or pricing information unique to that addressee. The batched letter operation could then be implemented by loading both the variable and constant record mediums within the automatic writing system and relying upon the switching, search and/or switch and search codes recorded on each medium to cause playback for individual letters to proceed from both the variable and constant record mediums so that a personalized letter having a common content is prepared for each addressee listed on the variable program tape, under program control, in the manner described in U.S. application Ser. No. 429,479. Normally, envelops of the type having windows therein for displaying the inside addressee address information would be employed for mailing purposes and hence further action would be unnecessary. However, there will be times when individually printed labels or envelopes specifying address information for each letter is required. Under these circumstances, the switch and skip and skip off encoded functions associated with the T and R keys may be employed to achieve printing of address information from the variable record tape and thus avoid a re-recording of the address information thereon.

The skip off and switch and skip encoded functions, like the switch, and switch and search encoded functions are all recordable codes which may be inserted in textural material recorded on a record media to provide a programmed transferring of a play operation taking place in a multirecord media system to an alternative record media station. In record, or revise mode, each code may be generated by the depression of the code key 491 together with the relevant alphameric key (R or T) and if the code print key is depressed, the alphameric symbol overprinted with a slash is printed; however, none of these codes will perform a function when generated. Upon a reading of a switch and a skip code during a play mode of operation, the classification and identification of this code will cause the reading operation to transfer to the alternate reader or alternate record media station provided that the same is loaded and the system is not in a record or revise mode in the same manner as occurs when a switch or switch and search encoded function is read. Here, however, once switching occurs, the play mode is cancelled and reading from the alternative media station occurs in a skip mode. All data, reference marks and system control codes are skipped until a Skip Off code is detected. The skip operation takes place in much the same manner as does a normal skip mode of operation in association with an action key in that each character is read, loaded into the main register M, classified as to whether or not it constitutes a code which terminates the desired action, i.e., in this case a Skip Off code, and no further action is taken. When a Skip Off code is read, the system acts, under program control, to resume the play mode and continues such mode until additional information on the record media causes a modification in the defined play action such as a new switch code which returns action to the other record media. Of course, should a switch and search, switch reader or switch and skip code be read during a play mode when only a single record media is loaded or in a single record media configuration, an error indication is preferably provided to an operator through visual or audible indicia or the like. Similarly, if the system is in a record or revise mode in which transfer of data is taking place, or similarly in a duplicate mode, the reading of switch and search, switch reader, switch and skip and switch off codes will cause such codes to be transferred and rerecorded; however, their attendant play mode functions are not initiated. Thus it will be appreciated that the purpose of the switch and skip encoded function is to shift playback from one record media to the other and when such program switching has been implemented to cause the automatic writing system according to the instant invention to proceed in a skip mode until a skip off character is read.

The Switch and Skip and Skip Off encoded functions may be employed for preparing envelopes or labels subsequent to a batched letter operation by the preparation of a new constant record media and a modification of the previous variable record media employed so that only the address information thereon is printed out while a new entry of such address information is avoided. More particularly, it will be recalled that the variable program tape would typically contain the three lines defining the addressee and his address, which would be followed by a switch code which would cause play action to transfer back to the constant tape so that appropriate line spacing and the printing out of the word "Dear" would occur. This would be followed by the portion of the addressee's name employed in the salutation which would be utilized in a playback mode and accessed through the use of a switch code following the word "Dear" on the constant tape. This portion of an addressee's name would be followed by a switch code which would return playback to the constant record media for the playback and printing of the colon, appropriate spacing information, and the initial portions of the letter which portions are constant. Subsequent portions of the variable record media would contain additional address information and salutation information configured in the manner outlined above but new addressee information would be provided. To employ this variable record media for addressing envelopes, labels or the like, the same is modified in a revise or transfer mode so that a skip off code is inserted prior to the first line of each address so that, in effect, each time a switch and skip code is read on the other record media, playback will switch to the now modified variable record media and skipping will occur until the newly inserted skip off code is read. Thereafter, the three lines of address information, i.e., name, street address, city and state, would be played and printed and thereafter, the previously recorded switch code would return playback to the constant record media. After the variable record media is revised in the foregoing manner, a new constant record media is prepared for the sole purpose of label or envelope addressing functions. This constant record media would be configured so as to include a reference code and code format so that the address will position correctly on the envelopes or label, a Switch and Skip encoded function, a carrier return, and a Transfer Stop to allow time for changing envelopes or labels and this information would be followed by a Seach code to return playback to the beginning point on the constant record media defined by the initial reference code recorded. In operation, playback would start at the constant record media wherein the reference code and code format would be read to cause the envelop or lable to be properly positioned and it should be noted that if continuous envelope or label forms are employed, a first line function may also be included to assist in obtaining appropriate line indexing. Thereafter, the Switch and Skip function (Ŧ) would be read and playback would switch to the variable record media. If this occurred at the beginning of the variable record media, the first code that would be read would be a Skip Off code so that the name, street address, city and state information associated with the first address would playback. Thereafter, a Switch code would return playback to the constant record media. Since reading at the constant record media terminated upon the reading of the Switch and Skip code, it will be seen that the carriage return code recorded thereon will be read followed by the Transferring Stop code. This will cause playback action to stop to allow the insertion of a new envelope or label and will be reinitiated upon the depression of the character/action key by the operator. Thereafter, the search code thereon will be read to return playback to the beginning portion of the constant record media so that the reference code and code format will be ready to appropriately position the newly loaded envelope or label and then the Switch and Skip code is read. When the Switch and Skip code is read, the variable record media will become active at a point on the record media prior to the recorded Skip Off code wherein the portion of the name in the address employed in association with the salutation occurs. This information is all skipped until a Switch Off code is again read which appears in the modified variable record media just prior to the first line of the new address. Therefore, this new three line address will be read, played and printed and then playback will transfer to the constant record media station in much the same manner described above. Accordingly, it will be appreciated by those of ordinary skill in the art that the Skip Off (Ꝁ) and Switch and Skip (Ŧ) encoded functions may be employed in a highly effective manner to cause the printing of envelopes, labels or the like from a previously prepared variable record media without the need for a retyping of such address information.

The column center encoded function, abbreviated COL CTR associated with the Y key is an encoded function which causes the automatic writing system according to the instant invention to automatically center material within or over columns defined by an operator in such manner that during a record mode, the operator need merely define the columns, and thereafter for each line of information containing data to be centered with a column, the operator need only enter the center column encoded function, tab to the appropriate column and enter the data to be centered flush to the left edge of the column. However, when the record media is played back, the entered material is printed in a manner such that the columnar data defined is automatically centered within each column established for each line in which columnar data was submitted. Furthermore, a related function is provided under program control wherein statistical data inserted at the left hand portion of each column defined by an operator is automatically played back in such manner that it is entered flush to the right hand portion of the defined column to additionally provide another automatic formatting feature within the instant invention. Columns may be defined within the instant invention, for purposes of right flushing and/or column centering of data by the entry of a tab at a column position corresponding to the left hand limit of the defined column and a special tab, entered by the depression of the code key 491 and a depression of the tab lever at column positions corresponding to the right hand limit of a defined column. For columns which start at the margin, the left hand margin will suffice to define the left hand limit of a column.

Since both column centering and right flush functions are actually implemented by the automatic writing system according to the instant invention in a playback mode, it will be appreciated by those of ordinary skill in the art that the definition of columns through the entry of tabs and special tabs should occur as a recorded function associated with a format block so that should playback occur at a time after previously established special tabs and margins have been changed, the playback of the recorded media will act to automatically load appropriate column definitions through the reading of a format block into the automatic writing system according to the instant invention. Tabs and special tabs, it will be recalled are stored within the general storage portion of the random access memory 34. Although the manner in which the columns centering and right flush programmed functions operate under program control are set forth in great detail in conjunction with the flow chart for these programs set forth in FIG. 26, a brief review of operator implementation at the keyboard and the result which occurs in a playback mode will here be set forth to acquaint the reader with the operation thereof associated with the keyboard.

In a record or a revise mode, an operator desirous of implementing either the column center encoded function associated with the "Y" key or the column right flush function for statistical data, which is an automatically implemented function once columns are defined, would define columns through the setting of tabs and special tabs and preferably the recording of the same in a format block in the manner outlined above. Thus, once columns have been defined through the recording of tabs and special tabs, the automatic writing system according to the instant invention is in a condition to column center data or right flush statistical data upon the appropriate entry thereof. To implement the column centering encoded function which is employed to center headings or the like over or in each column defined, an operator would begin a line which includes data to be centered within a column by the entry of the column center encoded function which involves a depression of the code key 491 together with a striking of the Y key in much the same manner as any other encoded function is entered. If the code print key is depressed, a Y overprinted with a slash will be printed. Thereafter, the operator would tab to each column in which character information is to be centered and thereafter enter such information at the keyboard. As will be appreciated by those of ordinary skill in the art, what is effectively occurring is that a column center code is entered at the beginning of the line, and then the operator tabs to the beginning of each column which is to contain centered information and enters such information at the keyboard in such a manner that the beginning point of the entered data corresponds to the start of the column. At the completion of the entry of data for a given column, the operator would tab to the next column for the entry of additional data and at the completion of the line would perform a carriage return operation at the keyboard. If the next line of data to be entered is to contain column centered information, the process would be repeated while if column centered information is not to be inserted, no column centering code would be entered at the beginning of the line. The only restrictions imposed on column centered information in the entry mode being described is that the width of such information not exceed the width of the column defined; however, if the columns defined are deficient in this respect, the record media may be corrected through revise operations or the like. On playback of the recorded medium, all columnar material on a line following a column center code will be automatically centered. Effectively, when the column center code is read and classified within the microprocessor, a flag is set in register location G5. Once set, the microprocessor goes from tab to tab and centers the character information which has been recorded between a column which is defined as having a base width from the closest tab setting to the left of the carriage position to the next special tab setting to the right of the carriage position. The actual centering is implemented through an interchange of data within the ALU 83 and the general purpose register. Thus, the program, as will be illustrated in greater detail below, effectively acts to calculate the width of the column from the tab location and special tab location defined, then adds the width of data inserted in a left flush manner therefor, subtracts the difference therebetween and defines the resultant difference by two (2) to get the starting print position for that column. Thus, in this manner, data entered in a left flush manner on a column is automatically played back in a centered manner with no onerous impositions made on the operator.

Similarly, the right flush function, which ordinarily operates in conjunction with the column center function may be employed by an operator to automatically right flush statistical data entered in a column upon playback. The right flush column encoded function of the instant invention is operative under program control to play back statistical data which has been recorded starting at the left most column position in such manner that it is printed, upon playback, so that the lowest significant digit thereof is printed flush to the right hand margin. More particularly, once columns have been defined by an operator by the insertion of tab and special tab information in the manner described above, statistical data may be entered by an operator by merely a tabbing to a desired column location and thereafter an entry of statistical data from the keyboard. The number of digits and related alphameric characters corresponding to such statistical data should not exceed the column width and all statistical data for a given column should have a corresponding number of significant digits so that appropriate column digit correspondence will obtain. More particularly, since the instant invention merely acts to detect the presence of a defined column and the entry of statistical data therein, and print out upon playback such statistical data in such manner that the right most digit is printed flush to the right hand portion of the column defined, each statistical entry on a line within a corresponding column must have the same number of significant digits as the automatic writing system according to the instant invention does not discriminate with respect to the decimal point and hence, if appropriate correspondence with respect to the decimal point of all entries within a column is to obtain, the same number of significant digits must be associated with each entry in a column. It should be noted that the right flush column function does not require the entry of an encoded function as none is recorded therefor; however, entry must occur by the operator tabbing to the column left hand limit followed by the entry of statistical data and such statistical data may not exceed the width of the column. Thus typically, in a record or a revise mode, the operator would tab to the beginning portion of each column in a line and enter the statistical data therefor. At the end of the line a carrier return would be executed, and this function would be repeated for the next line and all succeeding lines in which statistical data for the insertion in columns is required. Statistical data as defined for the purposes of the right flush mode of operation will correspond to digits 0 through 9 at the keyboard, as well as the alphameric characters corresponding to the ampersand (&) sign, the equal (=) sign, the slash (/), the parenthesse, the dash (—), the period (.), the comma (,), the colon (:), precedented space, precedented hyphen, underscore, index, reverse index, all expanded characters and expanded spaces except for the parentheses.

In embodiments of the invention specifically suited for use within the United States, the at sign (@), the plus sign (), the semicolon (;) and the ½ sign also qualify as columnar or statistical data while in embodiments of the invention set up for use in certain foreign countries, these characters as well as the ¾ sign, the ⅓ sign and the ⅜ sign will also qualify as statistical or column data. It should be noted that entry of statistical data must occur by tabbing to the column position and it may be additionally noticed that should entry occur through a precedented tab column, the right flush function for that column will be negated. The right flush function is implemented during a playback of a record media recorded in the foregoing manner through a look ahead function assuming the automatic writing system is neither in a justify or margin control mode of operation which special modes of operation preclude the operation of the right flush function. More particularly, the automatic wiring system according to the instant invention when in a playback mode ascertains whether or not it is in a column by determining whether or not it is at the left hand margin or at an executed tab position. If either condition obtains, the automatic writing system continues to look ahead to ascertain whether or not a special tab has been set following the left hand margin or tab position. If the same is present, a column location has been defined. Whenever a column location is detected in the foregoing manner, the data to be printed therein is reviewed to ascertain whether or not the same corresponds to columnar or statistical data of the kind set forth above. If no columnar data is present, even though a column was detected and a column bit set, the data which may comprise alphameric characters or the like is printed at the tab. However, if columnar data is present, all characters in sequence are reviewed through a review of the contents of the buffer and the width thereof is calculated. If the width fits within the column defined, the print position required to print it in a right flush manner, i.e., so the last character thereof is printed at the column position just prior to the special tab set is calculated and a printing of the columnar data in a right flush manner is initiated so that, as will be appreciated by those of ordinary skill in the art, statistical data is automatically printed upon playback in a right flush manner without the operator going through special spacing functions or the like. In this manner, statistical data may be printed in a columnar format without an operator going through either a multitude of calculating functions or the precise spacing and formatting operation which have heretofore been required to be manually implemented. Whenever all of the character information associated with the tab set has been printed, the column bit is reset and normal playback continues.

The centering code associated with the I key is an encoded function indicated as CENTER, which enables an operator to enter heading information or the like at a desired location on a line without manual spacing operations or the like and causes the same to be automatically centered in a desired manner upon a playback of the record media. Furthermore, as shall be seen below, the center encoded function is provided with a highly flexible program format as detailed in connection with FIGS. 25A and 25B, which permits an operator to center a plurality of headings or the like about a plurality of columns within a line and additionally, provides the operator with a backspacing function, which is ignored on playback, so that materials in draft stages may be centered manually during the recording or revision of a record media and automatically centered upon playback. Although the program function associated with the centering encoded function will be described in great detail in connection with FIGS. 25A and 25B, a brief description of the operator's utilization of this encoded function at the keyboard together with the results achieved upon playback will here be set forth to familiarize the reader with keyboard operation. More particularly, the automatic writing system according to the instant invention will act in response to the center encoded function to automatically center heading information or the like between margins established during a print mode of playback when such heading information was recorded with an individual centering code. Similarly, when a plurality of centering codes are entered and each centering code is followed by textural material to be centered, the automatic wiring system according to the instant invention will act, upon playback, to center the textural material provided about the column position at which the centering code associated therewith was entered. However, should a series of centering codes be entered in succession without intervening textural material, the automatic writing system according to the instant invention, when in a record or revise mode of operation assumes, under program control, that the operator is desirous of manually centering the textural material being inserted in a record or a revise mode and hence, for each centering code subsequent to the first in a string, the automatic writing system is responsive thereto to back up the carriage in the same manner as if backspace codes were inserted whereupon succeeding textural material will be printed in a centered manner set by the operator. However, succeeding centering codes in the string are not recorded and hence are effectively ignored so that an automatic mode of centering in response to the initial code in a string is achieved during playback. Accordingly, when the automatic writing system according to the instant invention is in a record or a revise mode, a center or centering code may be entered by a depression of the code key 491 and the I key. If code print is depressed, the symbol I overprinted with a slash is produced. Text to be centered is entered following the code so that in a typical case where a single heading is to be centered midpoint in a line, the center encoded function is inserted followed by textural material representing the heading to be centered and upon a completion of the entry of such textural material, a carriage return is entered to return the carriage to a new line for printing. Thus, in this case only a single centering code followed by text and a carriage return are recorded and in response to such a series of data the automatic writing system according to the instant invention will, upon playback of the recorded media, act to center the text about the center column position in the line as defined by the distance between the right hand and left hand margin established for playback purposes. At least one center code must be used in each line whose contents are to be centered, and it should be noted that automatic centering occurs upon playback and that the centering function which is achieved is responsive to the format conditions, i.e., the left and right margin set at the time of playback. Where more than one center code exists on a line or other text precedes the center code, the text string following the center code is centered upon playback about the column position, relative to the left margin, at which the carrier was located when the center code is entered. If ordinary spaces are entered after the center code, prior to text to be centered, they are ignored during the centering process upon playback. Similarly, ordinary spaces entered after the text to be centered but prior to the carriage return terminating the line are ignored. Thus, where an operator is desirous of centering a plurality of headings on a line and does not wish to implement this function through the definition of columns together with the use of the column centering function, a centering code, may be entered at each column position at which a heading or the like is to be centered and immediately followed by the textural material to be centered.

When this mode of entry of employed, the column position as maintained in storage location HA of the general purpose registers is recorded with the centering code and upon playback, each textural heading recorded is centered about a column position relative to the margin so that a plurality of headings may be recorded together with a centering code which also defines the column position about which centering is to occur and upon playback, each group of text forming a heading would be automatically centered about the column position at which the centering code was inserted. Thus, under these conditions, an operator would tab or otherwise locate the carrier at the desired column position, enter a centering code followed by textural material and continue performing this function until each heading for a given line was entered. Thereafter, a carriage return operation would be initiated to return the carrier and terminate the centering functions for that line.

A further operator initiated function at the keyboard is also available should the operator desire to center text on the draft document being recorded. In essence, the automatic writing system according to the instant invention is responsive to successively entered centering codes to backspace the carrier through one column positive so that subsequent to the initial center encode entered in a string during a record or a revise mode, the automatic writing system according to the instant invention will back up one column position for each succeeding centering code entered in a string in the same manner as if a precedented backspace code were entered. Therefore, if an operator is desirous of centering a heading during the preparation of a draft document in a record mode, an initial center code might be entered at the center of the page followed by one centering code for every two characters in the heading to be centered. The automatic writing system according to the instant invention would thereby back up one column position for each additional column centering code entered in the string so that upon the entry of the textural material to be centered the same would be printed in a standard manner on the draft document. However, as to information recorded the succeeding centering code characters in the string would be ignored so that the centering process would operate under program control in the same manner as if the operator had not performed special formatting on the draft document. The centering function may be employed with any pitch setting employed for printing; however margin control is disabled during playback or entry of a centered text line so that the centering function is not defeated.

Underscoring of textural material may be accomplished within the instant invention using one of up to three distinct procedures to provide an operator with maximum flexibility for conditions which are presented. The first procedure available for implementation at the keyboards illustrated in FIGS. 9A and 9B is a manual mode of underscoring which is highly reminiscent of that which obtains in normal typewriting equipments and is best suited for printing functions wherein individual characters are to be underscored. In this manual mode of underscore, the operator, when in a plain printing mode of operation or one of the various recording modes such as record, revise, transfer or the like would enter the one or more characters to be underscored and thereafter, precedented backspaces would be entered through a depression of the code key 491 and the backspace key to back up the carriage at the printer to a position beneath the first character to be underscored. Thereafter, underscore codes are entered at the keyboard through a depression of the shift key and hyphen key in the traditional manner. When underscoring occurs in this manner, although the underscores are correctly placed with respect to the relevant characters printed at the printer unit, they exist as separate characters within the buffer and on the media. Hence, editing functions manipulating characters originally underscored in this manner may not act simultaneously upon the underscore codes but instead, such editing functions must be duplicated with respect to the underscore characters inserted.

The instant invention also provides two distinct modes of underscoring wherein underscoring is accomplished under program control and the character codes associated with the character underscored are modified to reflect the underscored status thereof. More particularly, it will be recalled that all printable characters employed within the instant invention have an eight (8) bit character code assigned thereto in such manner that the eighth bit position thereof, is in a Zero (0) state. This convention has been here employed so that the condition of the eighth bit may be modified to a One (1) condition to thereby indicate an underlined or delineated status for that character which is much more efficient from the standpoint of data processing so that all editing, manipulating and calculation functions performed with respect to the character may also be performed, when appropriate, with respect to the delineation code associated the rewith so that repititious calculations may be avoided. The automatic underscoring features of the instant invention thus act to change the character codes associated with a delineated character to the modified status so that the Zero (0) bit in character position eight $DB_7$ is changed to a One and hence the delineated nature of this character may readily be recognized by the data processing equipment.

The first automatic underscoring feature available within the instant invention is the word underscore encoded function which is associated with the "U" key and is typically employed to cause the automatic delineation of a word or under special circumstances, a series of words who have had the space codes therebetween modified. In typical use, the operator would first enter a word in the traditional manner and at the end of such entry, and prior to an insertion of the space code or punctuation and space code following the word, would depress the code key 491 plus the word underscore encoded function key to cause the system to underscore the word. The manner in which this encoded function operates under program control is detailed in connection with FIGS. 20A and 20B; however, it is here sufficient to appreciate that upon detection and classification of the word underscore character, the automatic writing system according to the instant invention acts to cycle through the characters inserted in the buffer until a non-printing character such as a space code is detected. During the cycling through of the contents of the buffer, the width of each character recorded therein is accumulated within general purpose register locations G0 and G1. Once a non-printing character such as a space, tab or other non-underscorable character is detected, the microprocessor causes the printer unit to back up to a position corresponding to the character position following the space, tab or other non-underscorable character detected and causes an automatic underscore routine to be entered wherein each of the characters located between its starting position and the non-underscorable character code are underlined. In addition, each character code in the read/write buffer 35 which was cycled through in the reverse search conducted for the space code or the like is modified so that the status of its eighth bit, is changed from a Zero (0) to a One (1) so that an underscored status is reflected therefor and hence no backspace or underscored characters need be separately recorded. During playback routines, under conditions where such characters as occur in response to the entry of a word underscore encoded function result, the microprocessor will cause printing of each character read in the traditional manner; however, when characters whose eighth bits are in a One (1) condition are determined, the first character having its eighth bit in this condition has its position noted until a non-underscored character is detected. Thereafter, as explained in greater detail in connection with FIG. 20B, the microprocessor causes the printer to back up to the position at which the first underscored character was printed and causes delineation of all characters until a point is reached where new character information from the buffer is again processed. As was mentioned, the word underscore routine associated with the word underscore encoded function operates through a reverse search of the buffer until a non-underscoreable code such as a space, tab or the like is detected and acts to underscore each character between this point and its starting point in a forward direction. If the operator is desirous of underscoring more than one word in this manner, the word underscore encoded function may be entered subsequent to each word to be underscored or alternatively, intervening space codes may have their status modified so that they will effectively not stop the search conducted under program control. This may be done by an operator in one of two ways. Thus, for instance, an operator may enter a precedented space code rather than a normal space code and under these conditions, the automatic writing system according to the instant invention will note the precedented space code, and change its status to a non-precedented underscored space code and keep going until a normal space code, tab or other non-underscorable character is detected and in this manner cause the word underscore function to extend through more than one word of text.

Alternatively, the operator may depress the space expand key for spaces between words which are desired to be delineated. An expanded space, like a precedented space, is treated as an underscorable character and hence will not stop the search in the reverse direction conducted by the microprocessor through the contents of the read/write buffer 35 when a word underscore encoded function is detected. Thus, in this manner too, more than one word may be automatically underscored through use of the word underscore encoded function. Thus, in order to underscore continuously under a group of words precedented spaces must be used in place of sapces which are to be underscored or alternatively, the text may be entered with space expand on. In response to a word underscore encoded function, as explained above, the system will backspace until a non-printing code except for a precedented or expanded space is found and then will underscore starting with the character just to the right of that point. Termination of underscore will occur when the carrier reaches its original position. The word underscore function is not entered into the buffer as each character involved has its code modified in the buffer to reflect its underscored status. During playback, the system first prints the group characters to be underscored, backspaces and then underscores them at a high rate of speed. The system will however automatically assign the underscore to each character so that during editing or re-formatting operations the underscore can be skipped or maintained automatically without operator intervention. In margin control modes of operation, a carriage return character inserted within a group of underscored characters will cause the characters on that line to be underscored prior to the carriage return. Those underscored characters which are displaced to the next line will also be underscored; however, an underscored precedented space will be converted to a carriage return in the margin zone when in a margin control mode. As underscoring occurs at a high rate of speed, carriage displacement and escapement associated with undescoring is modified in a manner to cause the underscore characters to be overlapped to ensure a highly uniform result despite the high rate of speed in which underscoring obtains. More particularly, to avoid a ragged look in the resulting automatic delineation, in ten pitch, the carriage is only advanced by four units during a forward underscoring routine which corresponds to about one-third of the standard character width. This causes an effective overlap between underscored characters of two-thirds of a character advance. Similarly, in twelve pitch, printer advance is limited to one-half of a character width so that a onehalf overlap in the underscore character occurs while in proportional spaced printing modes, carriage advance is limited to four units to ensure position overlapping of the underscore codes to provide a highly uniform result. In addition, as shall be seen below, the underscore routine is appropriately modified to ensure an appropriate starting and stopping relationship with respect to the beginning and ending characters of a string of characters to be underscored. Additional economies may be employed with respect to an overlapping relationship in the ribbon advance employed.

An additional mode of automatic underscoring referred to as line underscore or continuous underscore is provided as an encoded function associated with space expand key 500 and indicated on the aslant portion thereof by the abbreviation L UNSC. This mode of underscoring may be employed when a series of words or a line are to be underscored and the operator desires to achieve this result through program control. It should be noted at the outset, that the line or continuous underscore function is not a separate program routine from the word underscore encoded function, but instead is a modification of the word underscore encoded function to achieve the result of continuously underscoring a group of characters in succession even though non-underscorable character codes such as space codes or the like may periodically intervene in the group of characters to be underscored. More particularly, it was seen in association with the description of the word underscore encoded function that a plurality of underscored words could be achieved with a single depression of the word underscore encoded function provided that the space codes intervening between the words to be underscored were modified to precedented or expanded spaces rather than normal spaces which would serve to stop the reverse search conducted. The continuous or line underscore encoded function may be used for any group of words or the like for which continuous underscoring is desired and this code, as distinguished from the word underscore code is entered prior to the printing of any of the words to be underscored. Thus, if it is desired to underscore a line of data to be entered at the keyboard, the code key 491 and the space expand key 500 are depressed and thereafter, the code key is released with the space expand key 500 remaining in a down position. This will cause the automatic writing system to enter a continuous underscore mode and preferably, the space expand key is provided with a visual indication that the encoded function has been enabled through a visual indicator such as a lamp associated with that key. With the line underscore or continuous underscore encoded thus enabled, no space expand function associated with succeedingly entered character obtains. Once the encoded function is enabled, data to be underscored in a continuous manner is entered from the keyboard. All printable characters entered in this manner are recorded in the usual manner. However, all space codes which are entered are inserted as precedented space codes so that the same will not stop the reverse search conducted in the word underscore routine. Upon a second depression of the space expand or a carriage return or tab, the word underscore routine described above is effectively triggered. Thus, under these conditions, the word underscore routine will go all the way back through data in the read/write buffer 35 until the left hand margin is detected or alternatively until a space code inserted prior to the insertion of the line underscore or continuous undescore encoded function is detected. Thereafter, the same word underscore routine described above will cause the modification to underlined status of all character information cycled through in the read/write buffer, a backspacing of the carriage at the printer and the high speed delineation of all intervening characters until the starting point is again reached. Thus it will be seen that the line underscore encoded function is not a separate routine within the instant invention but merely a program modification of the word underscore routine described above which is provided as a convenience to the operator. As such, it will be appreciated by those of ordinary skill in the art that the same may be used for any successive group of words within a line because while the word underscore routine will stop at the left margin, it will also stop prior to the entry point of the line underscore code as prior space codes will not have been appropriately modified. Similarly, while a carriage return or tab code will trigger the routine as far as buffer modification and underlining is concerned, while the program modification is continued for succeeding lines, a second depression of the space expand code will effectively terminate the program modification of space codes here carried out so that the line underscore encoded function may be employed within any group of words on a given line as well as for a plurality of lines. Thus it will be appreciated by those of ordinary skill in the art that the various modes of automatic underscoring provided to an operator within the instant invention allow this function to be performed in one of several manner depending upon the nature of the material to be underscored so that highly convenient and efficient data processing techniques are provided to enhance operator ease and efficiency.

Although a plurality of encoded functions of the keyboards illustrated in FIGS. 9A and 9B have been described, it will be appreciated by those of ordinary skill in the art that in essence, an encoded function is available for each of the keys within the standard keyboard array enclosed within the dashed block 490 and hence, such availability, when coupled with suitable program control therefor may be appropriated in the implementation of additional features which are deemed to be desireable in automatic writing systems according to the instant invention without any substantial deviation from the concept of the invention set forth thus far. Accordingly, additional features may be supplied in conjunction with the instant invention through the use of appropriate program control and encoded functions at the keyboard will readily occur to those of ordinary skill in the art and will be particularly apparent when specialized applications of the instant invention are considered in depth. Therefore, it will be appreciated by those of ordinary skill in the art that such specialized encoded functions may be readily implemented in the instant invention without substantial deviations from the teachings regarding the specific embodiments disclosed herein.

KEYBOARD INTERFACE

Referring now to FIG. 10, there is shown an exemplary embodiment of a suitable interface for the embodiments of the keyboard configurations illustrated in FIGS. 9A and 9B. The keyboard interface illustrated in FIG. 10 controls the bi-directional transfer of information between the keyboard and the common data bus 19 in response to sixteen (16) bit instruction words received from the read only memory 80 through the common instruction word bus 20 and the sixteen bit instruction words issued to the keyboard interface 26 are issued, as in the case of any peripheral utilized within the instant invention, pursuant to the program sequence then in progress and the status indications provided to the microprocessor indicated by the dashed block 16 through the common status bus 21. Therefore, as is the case for each of the interfaces employed in the instant invention, the keyboard interface 26 as illustrated in detail in FIG. 10 provides three essential functions within the automatic writing system according to the present invention. The first such function is to control the transfer of information between the keyboard illustrated in FIGS. 9A and 9B and the common data bus so that information which is transferred, here in a bi-directional manner, may be appropriately processed. For the purposes of appreciating the operating of the instant invention, information which is selectively transferred between the keyboard and the common data bus through the keyboard interface depicted in FIG. 10 may be considered to comprise two distinct types of information. More particularly, the information which is transferred may comprise information relating to the condition of the thumbwheels 506 and information developed upon the depression of one of the keys or actuation of selected ones of the levers at the keyboard; it being noted that the character codes generated by a depression of a key at the keyboard will vary not only with respect to the code assignments associated with the individual keys thereon, but with respect to certain of such keys, whether or not the code key 220 or the shift or shift lock keys are depressed to provide the encoded or shift code assignment therefor. Thus, with respect to the bi-directional transfer of information, the information transferred may be classified as to information developed from the depression of a key on the keyboard or information associated with the condition of the thumbwheels 506 or more particularly, the rotary switches associated therewith as described above.

The second distinct function of the keyboard interface depicted in FIG. 10 is to selectively gate information pertaining to the status of the keyboard to the common status bus 21 in response to commands therefor issued by the microprocessor indicated by the dashed block 16. The status conditions of the keyboard which may be monitored and selectively applied to the common status bus 21 may comprise status indications which identify whether or not an eight (8) bit character has been inserted at the keyboard, the margin release has been depressed, the nature of the line spacing being utilized, the pitch selected for printing, or if a stop operation has been initiated by the depression of the character/stop action key.

The third remaining generalized function of the keyboard interface depicted in FIG. 10 is to decode sixteen (16) bit instruction words received from the read only memory and to respond thereto in such a manner that the operations specified thereby are performed. For instance, the sixteen (16) bit instruction words received by the keyboard interface 26 from the read only memory 80 through the common instruction word bus 20 may designate whether thumbwheel 506 or keyboard information is to be gated between the keyboard interface and the common data bus 19. Additionally, other generalized instructions may be issued by the read only memory in response to conditions which have been detected to generate a control level to cause a change in the condition of a peripheral through the application of such control level thereto. For instance, when the alternate reader key is depressed, at one of the keyboards illustrated in FIGS. 9A or 9B, an eight bit character is applied through the common data bus and loaded into the main register M. When this character is classified, as a character code associated with the depression of the alternate reader key, a command may be issued from the read only memory 80 to the keyboard interface illustrated in FIG. 10 which is decoded and results in the generation of a switch command level on an independent line whose function is to change the status of the active reader from one transport to the other provided all appropriate conditions therefor are met. Alternatively, the sixteen (16) bit instruction words received from the read only memory 80 may designate which of a plurality of status indications from the keyboard are to be applied to the common status bus 21, as well as providing a timing sequence therefor so that the program operation then in progress may proceed. Thus it will be appreciated by those of ordinary skill in the art that with respect to the third general function of the keyboard interface depicted in FIG. 10, the keyboard interface must respond to commands issued thereto by the microprocessor to properly provide and space designated information in transfers between the keyboard and the common data bus 19 and to apply predetermined ones of the status conditions monitored at the keyboard to the common status bus 21 so that the program sequence then in operation may be continued. Accordingly, it will be appreciated that the keyboard interface acts as an itermediatery between the keyboard peripheral associated therewith and the remaining portions of the automatic writing system according to the present invention so that information is selectively gated between the keyboard and the common data bus in an appropriately spaced manner and in a sequence defined by the program then in progress, while status indications are provided on a command basis to the common status bus 21 to enable the program operation then in progress in the microprocessor indicated by the dashed block 16 to be appropriately modified through jump and branch routines to accommodate conditions which obtain at the keyboard peripheral as well as the remaining peripherals in the system which are active.

The keyboard interface illustrated in FIG. 10 is suitable for any of the embodiments of the instant invention disclosed herein and thus, as will be appreciated by those of ordinary skill in the art, regardless of whether a cassette or record card embodiment of the instant invention is employed, and hence, whether or not the keyboard embodiment of FIG. 9A or 9B is relied upon therein, will not matter a wit with regard to the functions of the keyboard interface herein disclosed. These conditions obtain, as will be appreciated by those of ordinary skill in the art, because the variations associated with the differing nature of the record media employed in these exemplary embodiments are fully taken care of by the differing nature in the programs employed for each embodiment and differing characteristics of other peripherals employed. Furthermore, a review of U.S. application Ser. No. 429,479 supra, will reveal that the keyboard interface disclosed herein is the same in many respects as the keyboard interface there disclosed and described in detail and in fact, the only differences therebetween relate to minor differences associated with different status conditions provided within the keyboards of the instant invention as well as the generation and substitution of codes within the instant invention for certain conditions for which binary switch conditions were previously utilized. Therefore, to avoid undue repetition of previously disclosed subject matter, the keyboard interface illustrated herein will be only briefly described to provide a functional description therefore while any areas for which a detailed discussion is required, may be found in the indepth disclosure of U.S. application Ser. No. 429,479, supra.

THE STATUS CONDITIONS MONITORED

The exemplary embodiment of the keyboard interface depicted in FIG. 10 comprises a keyboard status multiplexer 520, a keyboard output demultiplexer 522, and input/output buffers 524 and 525. The keyboard status multiplexer 520 may take the form of a conventional eight (8) input, single output multiplexer device such as a 74151 MSI device available from Texas Instrument Corporation. The single output of the keyboard status multiplexer 520 is connected through conductor 526, corresponding to conductor 30 in FIG. 2 to the common status bus 21 and it will be appreciated by those of ordinary skill in the art that whenever a strobe pulse is applied to the keyboard status multiplexer 520, the condition of a selected one of the eight inputs thereto is gated through the output conductor 526 to the common status bus 21. Eight status inputs are provided to the keyboard status multiplexer 520 through input conductors 527 - 533 and such inputs, as shall be readily appreciated by those of ordinary skill in the art, are obtained either directed from an elected one of the keyboard embodiments illustrated in FIGS. 9A or 9B or through appropriate latching devices which serve to retain a transitory keyboard output condition until the same may be sampled by the program cycle of operation in process. Thus, as indicated by the annotations in FIG. 10, the condition of the line space lever 494 is supplied through conductors 527 and 528 to the keyboard status multiplexer 520 in such manner that a One (1) on conductor 527 is indicative of a double line spacing setting at lever 494, a One (1) on conductor 528 is indicative of a single line spacing setting on lever 494 and the Zero (0) on both conductors 527 and 528 are indicative of a one and one-half (1½) line spacing setting for the lever 494. Similarly, printing pitch as selected by the setting of the lever 495 in either FIGS. 9A or 9B is supplied through conductors 529 and 530 to the keyboard status multiplexer 520 in such manner that a One (1) on conductor 529 is indicative that twelve pitch setting has been selected, a One (1) on conductor 530 is indicative that ten (10) pitch printing has been selected and additionally, a Zero (0) on both conductors 529 and 530 acts to indicate that proportional space printing has been selected by the condition of lever 495. Furthermore, as shall be seen in connection with FIG. 12, the selection of a proportionally spaced printing mode is directly indicated through a status multiplexer located at the program time delay peripheral set forth in that figure due to the practical availability of an input at that multiplexer. As none of the inputs supplied on conductors 527 - 530 are transitory in nature, being associated with the setting of a letter condition which is retained in a common position for a sufficient length of time to allow the microprocessor when in an idle loop to periodically sample the same and set the condition associated therewith as indicated on the common status bus 21 into the requisite G or H register location, no latch setting for any of these inputs is required.

The input applied to the keyboard status multiplexer 520 on input conductor 531 is associated with the margin release key at either of the keyboards illustrated in FIGS. 9A or 9B. This input, as generated at the keyboard is essentially transitory in nature; however, as the margin release key represents a standard keyboard input its condition is latched at the keyboard per se and hence, once depressed is available until clearing occurs upon the generation of a carriage return character or the like. Furthermore, any time a printing routine is in progress, the carriage position is reviewed in terms of the right hand margin established and if such carriage position is found to reside at the margin, the condition of the margin release key is immediately checked so that the condition of the margin release key 497 would ordinarily be sampled on the common status bus during an interval when it could be assumed to be depressed, if such action was to occur.

The strobe input applied to the keyboard status multiplexer 520 on conductor 532 is representative of a flag condition set at the keyboard each time a character is generated thereat. More particularly, it will be appreciated that since both the keyboard embodiments illustrated in FIGS. 9A and 9B represent conventional electronic keyboards, each time a key is struck therein, an eight (8) bit ASCII code is generated thereat in parallel in the conventional manner. As manufacturers of electronic keyboards must design such keyboards for utilization with all types of input equipments, an eight (8) bit buffer is generally provided so that each eight (8) bit ASCII character generated thereat may be loaded into such buffer for holding purposes prior to its subsequent utilization. The eight (8) bit buffer conventionally takes the form of a gated buffer which is clocked each time a key is depressed so that only eight (8) bits associated with the struck key will be loaded into the buffer. Thus, not only is an eight (8) bit character generated each time a key at the keyboard depicted in FIGS. 9A and 9B is struck but in addition thereto a clock pulse is generated indicating that a key has been struck and hence that a character is being loaded into the eight bit buffer so that the same will be available for further processing. As a clock pulse is generated each time a key is struck, the clock pulse may be employed to not only load the eight (8) bit buffer but in addition the same may be relied upon to set a flag indicating that a character has been generated at the keyboard and is ready for presentation to the remaining portions of the automatic writing system according to the present invention. This clock pulse is thus applied through conductor 534 of the keyboard interface illustrated in FIG. 10 and acts, in a manner well known to those of ordinary skill in the art to set a flip flop 535 whose set condition as reflected as a One (1) at the Q output of the flip flops as supplied through input conductor 532 and acts as a strobe flag. Thus, whenever the flip flop 535 is set, a strobe indication is available for application to the common status bus 21 to indicate that a character is ready at the keyboard for gating onto the common data bus 19. Furthermore, as shall be seen below, once the character is actually gated onto the common data bus 19, a clearing pulse is suppled through conductor 536 to clear the state of the flip flop 535 and hence ready the same for setting upon the generation of the next character at the keyboard. Accordingly, it will be appreciated by those of ordinary skill in the art that any time a key is depressed at the keyboard a strobe flag indicative of this condition is applied to input conductor 532 of the keyboard status multiplexer 520 so that, this condition may be ascertained by the microprocessor during the various stages in the program when this status condition is checked and upon a gating of the character generated onto the common data bus 19, the flip flop 535 is cleared to clear the strobe indication on input conductor 532.

A further status indication indicative of the depression of the character/stop key is provided to the keyboard status multiplexer 520 on input conductor 533. When a One (1) level resides on the status input conductor 533 and this level is applied to the output of the keyboard status multiplexer 520, the One (1) level thereby established on the common status bus 21 is employed to cause a branch operation to an idle program routine from the program sequence presently in progress. When a Zero (0) level is applied to the status input conductor 533 and gated through to the common status bus 21, the Zero (0) level thereby established indicates that the character/stop action key at the keyboard has not been depressed, and hence, that no branch operation calculated to stop the processing then in progress and place the microprocessor indicated by the dashed block 16 into an idle sequence is necessary. Therefore, when a Zero (0) level resides on the status input conductor 533, the program sequence then in progress is stepped along in sequence as processing continues; however, a One (1) level on the status input conductor 533 is indicative that a manual stop has been inserted by the operator at the keyboard and hence, the processing is to be stopped and a branch operation to an idle routine initiated. As the depression of the character/stop action key is a transitory condition which the microprocessor may not have time to sample at the instant of generation, due to possible involvement in the completion of routines which may be somewhat lengthy or complex, an indication from the keyboard that the character/stop key has been depressed is employed to set a flag on the input conductor 533 to ensure the persistance of this indication for an interval which is sufficient to ensure that the microprocessor will have time to sample this condition in one of the periodic checks of the various status conditions of the various peripherals conducted during each program cycle of operation. More particularly, when the character/stop key at the keyboard is depressed, an eight (8) bit code is generated thereby which acts to apply a high level to input conductor 537 as illustrated in FIG. 10 as well as resulting in the gating of an eight (8) bit character onto the common data bus 19. The eight (8) bit character loaded onto the common data bus 19 is loaded into the main register M, classified through comparison operations with constants in the arithmetic logic unit 83 and upon the determination that a character/stop code has been generated, a flag is set within the general purpose register location GF 4. Thus, the character generation resulting from the depression of the character/stop key results in the setting of a flag within the general purpose registers 84, while in addition thereto, a status flag is set at the input to the keyboard status multiplexer 520 so that this condition will be maintained for a sufficient duration to allow the microprocessor to obtain this status condition upon its periodic sampling of the keyboard status conditions monitored.

The high level generated on conductor 537 is supplied directly to the flip flop 538 to cause the setting of the same and hence, the establishment of a high at the Q output thereof which is connected to conductor 539. The conductor 539 is connected to the D input of a clocked flip flop 540 which acts in the well known manner to follow the condition of the D input thereof upon the appearance of a clock input thereto. The condition of the Q output of the clock flip flop 540 is connected through conductor 533 to the stop flag input of the keyboard status multiplexer 520 and hence the clock flip flop 540 effectively acts to set the flag condition indicative of the depression of the character/stop key in response to the condition of the flip flop 538.

The clocked input to the clocked flip flop 540 is supplied through conductor 541 from a terminal annotated CLOCK. This terminal, as shall be readily appreciated by those of ordinary skill in the art, receives clock subphase CB of the four phase clock described above and hence, the clocked flip flop 540 is clocked at the beginning of each instruction cycle so that the same may set a flag indicative of the depression of th character/stop key if the flip flop 538 has been set. Accordingly, the clocked flip flop 540 is set at the beginning of the instruction cycle in response to the condition of the flip flop 538 and thereby acts to maintain a stop flag at the input to the keyboard status multiplexer 520 until the condition of the flip flop is cleared. A clearing of the condition of the flip flop 540 occurs, as shall be seen below, in response to a strobing of the keyboard status multiplexer 520 under conditions where the stop flag input is gated onto the common status bus 21 and hence the flag set by the clocked flip flop 540 is only cleared after the same has bee sampled by the microprocessor to ensure the same persists until sampling has occurred.

The clear input to the clock flip flop 540 as well as the flip flop 538 is connected through conductors 542 and 543 to the output of an AND gate 544. The AND gate 544 may take any of the conventional forms of this well known class of device which is here illustrated as a four input device and hence acts in the well known manner to provide a high or clearing level at the output thereof only when all of the inputs thereto are high. The lowest input to the AND gate 544 is connected to conductor 533 and hence, this AND gate is only conditioned for clearing operations when a stop flag has been set by the clocked flip flop 540. A second input to the AND gate 544 is connected through conductor 545 to an input annotated multiplexer (MPX) strobe which is, as shall be more appreciated below, an inversion of the status multiplexer strobe applied to the keyboard status multiplexer 520 as a result of a decoding of a instruction carrying the keyboard module address which has ROM bits $B_{11}$, $B_9$, and $B_7$ in a One (1) condition while ROM bits $B_{10}$ and $B_8$ are low. Similarly, a third input to the AND gate 544 is connected through conductor 546 to a terminal annotated $\overline{B_6} \cdot B_5 \cdot B_4$ which, as will be appreciated from Appendix C are an ANDing of the ROM bit conditions appropriate for the selection of the stop flag at the keyboard status multiplexer 520. Accordingly, it will be appreciated by those of ordinary skill in the art that the inputs to the AND gate 544 connected to input conductors 545 and 546 will ensure that the AND gate 544 is only conditioned to clear the flip flops 538 and 540 once the condition of the stop flag has been selected by the select inputs to the keyboard status multiplexer 520 and the same has been strobed to cause it to be applied to the output thereof on conductor 526 and hence the common status bus 21. The remaining input to AND gate 544 is connected through conductor 547 to a terminal annotated 2CL which here reflects clock subphase 7 which occurs when clock subphase CA is high and clock subphase CB is low at the end of the instruction cycle. Thus it will be seen by those of ordinary skill in the art that the clocked flip flop 540 is clocked to follow the D input thereof at the beginning of the instruction cycle and cleared at the end of an instruction cycle where the condition of the stop flag was high and the same was gated onto the common status bus. Accordingly, when all of the inputs to the AND gate 544 are high, a high level output is generated on conductors 542 and 543 which serves to reset both of the flip flops 538 and 540 and thus clear the stop flag set upon a depression of the character/stop key.

The status select inputs to the keyboard status multiplexer 520, as indicated in FIG. 10 define which of the eight inputs thereto are to be gated onto the common output thereof on conductor 526 in the presence of a strobe input. The select inputs to the keyboard status multiplexer 520 are connected, as clearly indicated in FIG. 10, to individual conductors within the common instruction word bus 20 which convey the bit conditions of ROM bits $B_4 - B_6$ respectively. Thus, as three select bits are sufficient to define one of up to eight (8) conditions, it will be appreciated by those of ordinary skill in the art that the conditions of ROM bits $B_4 - B_6$ here define a selected input to the keyboard status multiplexer 520 in the same manner as these ROM bits are employed as select bits for various multiplexers employed in the various other peripherals illustrated in the exemplary embodiments according to this invention.

The strobe input to the keyboard status multiplexer 520 is connected to the output of a NAND gate 548 which acts to decode keyboard status multiplexer strobe conditions from the various instructions issued on the common instruction word bus 20. The NAND gate 548 is a five input NAND gate which acts in the conventional manner to produce a low or strobing output for the keyboard status multiplexer 520 whenever all of the inputs thereto are high. As plainly indicated in FIG. 10, the five inputs to the NAND gate 548 are connected to various ones of the ROM bit inputs provided to the keyboard interface from the common instruction word bus 20. More particularly, an inspection of the input conditions for NAND gate 548 will readily reveal that this NAND gate is only enabled to provide a strobe output to the keyboard status multiplexer 520 and thus enable a selected input to be gated onto conductor 526 when the terminal annotated KBD is high as well as the terminals connected to ROM bit inputs $B_{11}$, $\overline{B_9}$, $\overline{B_8}$, and $\overline{B_7}$. The terminal indication KBD stands for the module address of the keyboard interface which is Zero (0) and, as may be plainly seen upon an inspection of the Operand List attached hereto as Appendix C, obtains when ROM bits $B_{15} - B_{12}$ are all in a Zero (0) condition. Accordingly, it will be appreciated by those of ordinary skill in the art that NAND gate 548 will generate the low output or strobing level for the keyboard status multiplexer 520 whenever an instruction is received thereby containing a module address equalled to Zero (0) and having ROM bit 11 in a One condition while ROM bits $B_9$ – $B_7$ are all in a Zero (0) state. Accordingly, it will be appreciated that the keyboard status multiplexer 520 acts to monitor the condition of a plurality of status conditions at the keyboard and selectively gate such status conditions onto the common status bus on a command basis, while providing latching for various ones of the status conditions which are transitory and for which no latching input is provided at the keyboard. As only seven of the eight available inputs for the keyboard status multiplexer 520 have been illustrated as employed in FIG. 10, it will be appreciated by those of ordinary skill in the art that the remaining input may be employed to monitor the condition of various other inputs whose status warrants periodic attention by the microprocessor. For instance, should audible or visual indicia be provided at the keyboard, the condition of an oscillator for driving the same may be employed.

As was described in connection with the embodiments of the keyboard illustrated in FIGS. 9A and 9B, certain of the standard keys therein are repeatable and when any of these keys are struck, in addition to the loading of an eight (8) bit character representative of the key struck onto the common data bus 19, a level is generated at the keyboard to indicate that one of the repeatable keys has in fact been struck. This level is applied to the keyboard interface ilustrated in FIG. 10 and more particularly to input conductor 549 therein as indicated by the terminal annotated REPEAT KEY. The repeat keys employed within the instant invention, as aforesaid, function upon being held for one-half second or 500ms to automatically repeat the character generation and any displacement associated therewith. The timing function therefor is accomplished at the keyboard interface; however, as will be appreciated by those of ordinary skill in the art, other data processing techniques such as a detection of the character struck and actual timing through a real time counter may be employed as well. In the instant case, the input conductor 549 is connected to one input of an AND gate 550 and through conductor 551 to the input of a monostable multivibrator 552. Thus, whenever a repeatable key at the keyboard is struck, the level on input conductor 549 goes high and stays high until the same is released. The AND gate 550 may take a conventional form of two input AND gate whose output, connected to conductor 553 goes high only when both of the inputs thereto are high. Thus, when a repeatable key is struck, one input to AND gate 550 which is connected to conductor 549 goes high immediately and stays high until the repeatable key is released. The monostable multivibrator 552 may taken any conventional form of this well known class of device and here exhibits a duty cycle of 500ms. Thus, as will be appreciated by those of ordinary skill in the art, as soon as the input conductors 549 and 551 go high, in response to the striking of a repeatable key, the monostable multivibrator 552 is set and will stay set throughout the duration of its duty cycle of 500ms. Upon the setting of the monostable multivibrator 552, the Q output thereof (not shown) goes high while the $\overline{Q}$ output thereof which is connected through conductor 554 to the second input of AND gate 550 goes low. However, upon the expiration of the 500ns duty cycle of the monostable multivibrator 552, the monostable will revert to its initial state whereby the $\overline{Q}$ output thereof connected to conductor 554 again goes high. This means, that whenever a repeatable key is struck, the input of AND gate 550 connected to conductor 549 goes high while the input thereof connected to conductor 554 goes low whereupon the AND gate 550 continues to generate a low level at the output thereof connected to conductor 553. If, however, the repeatable key is still in a down condition when the duty cycle of the monostable multivibrator 552 terminates, both inputs to the AND gate 550 will be high so that the AND gate 550 will now generate a high level on its output conductor 553. Accordingly, it will be seen that the conjoint action of a direct input to the AND gate 550 and the second input through a 500ms timing device acts to provide a timing feature for the repeat keys in that a high level output is not generated on output conductor 553 until a repeatable key has been held depressed for more than ½ a second to thereby generate a repeat command. The repeat command, as indicated in FIG. 10, is supplied to the program time delay peripheral, illustrated in FIG. 12, and as shall be seen therein is employed as a status input which may be selectively gated onto the common status bus to thereby indicate a timing out of a repeatable function.

THE DATA CONVEYED TO AND FROM THE COMMON DATA BUS

The keyboard output demultiplexer 522 as shown in FIG. 10 may take the form of a conventional demultiplexer device which acts in the well known manner to enable one of a plurality of output conductors in response to information defining the output conductor to be selected and a strobe pulse which acts to define the instant at which such output is to be enabled. For instance, the keyboard output demultiplexer 522 may comprise a conventional SN74155 demultiplexer device as conventionally available from the The Texas Instrument Corporation. The function of the keyboard output demultiplexer 522 is to selectively decode instructions issued by the read only memory 80 and to provide output signals for gating information within the automatic writing system according to the instant invention. More particularly, the keyboard output demultiplexer 522 acts in response to commands issued by the read only memory to decode dump return instructions switch command instructions, as well as commands to cause gating of thumbwheel or keyboard data from the keyboard to the common data bus or to allow information to be gated from the common data bus to the keyboard. The decoding function is here implemented through the generation of a strobe to the keyboard output demultiplexer, as shall be seen below, and when such strobe is generated, the output conductor defined by the select inputs to the keyboard output demultiplexer 522 which is also contained in that instruction, will go high to enable the function associated therewith. More particularly, the strobe input to the keyboard output demultiplexer 522 is provided at the output of a six (6) input NAND gate 554 whose output goes low to strobe the keyboard output demultiplexer 522 only when all of the six inputs thereto are high. The lower input to the six input NAND gate 554 on conductor 555 as plainly indicated in FIG. 10 decodes the four bits of the instruction which contain the module address for the keyboard which, as aforesaid, involves an ANDing of ROM bits $B_{15}$ – $B_{12}$ to produce a high level on conductor 555 when all of those ROM bits are in a Zero (0) state to thus define a keyboard instruction. Additionally, the input on conductor 555 is ANDed with two clock subphases which in this case results from an ANDing of clock subphases $\overline{CB}$ and $\overline{CC}$ so that, in effect, whenever an instruction is issued which bears a keyboard or module zero (0) address, conductor 555 will go high during the last three subclock phases of the instruction cycle representing an interval of 375ns. The remaining five (5) inputs to the NAND gate 554 are individual ROM bit decodes which act to fully define instructions for which the generation of a strobe pulse to the keyboard output demultiplexer 522 is appropriate. Thus, as clearly shown in FIG. 10, the remaining five inputs to AND gate 554 will go high for instructions containing ROM bits $B_{11}$, $B_3$, $B_2$ and $B_0$ in a Zero (0) state and additionally having ROM bit $B_1$ in a One (1) state. Accordingly, when all of these ROM bit conditions are present and the keyboard is defined by the module address, the output of NAND gate 554 will go low to strobe the keyboard output demultiplexer during the portion of the instruction cycle when clock phases CB and CC are both low corresponding to the last 375 ns interval of the instruction cycle.

When a strobe pulse is generated at the output of NAND gate 554, the keyboard output demultiplexer 522 will provide a high on the output conductor defined by the three select inputs thereto. The select inputs for the keyboard output demultiplexer 522 as plainly indicated in FIG. 10 are defined by the condition of ROM bits $B_{10}$ - $B_8$ in the instruction decoded for the strobe pulse and hence, the high on the output line defined thereby will persist for the 375 ns portion of the instruction cycle for which the strobe pulse generated by the NAND gate 554 persists. Although only four outputs from the keyboard output demultiplexer 522 have been illustrated in FIG. 10, it will be appreciated by those of ordinary skill in the art that up to eight discrete outputs are available and may be defined by the three select inputs provided thereto. Thus, in cases where embodiments of this invention provide operator advisory indicia at the keyboard in the form of selectively lighted keys and/or audible indicators, remaining available outputs of the keyboard output demultiplexer 522 may be employed to gate the keyboard to accept information for lighting the defined keys, actuating buzzers or the like.

The four outputs of the keyboard output demultiplexer illustrated in FIG. 10 are annotated DUMP RETURN, SWITCH COMMAND, GATE THUMBWHEELS TO DATA BUS, and GATE KEYBOARD TO DATA BUS and are associated with the output conductors 556 - 559. At the outset, it should be noted that both the dump return command generated on output conductor 556 and the switch command output generated on conductor 557 are not, in reality, associated with the keyboard; however, the availability of outputs of the keyboard output demultiplexer 522 makes the decoding of these commands at the keyboard interface desireable.

The dump return command generated from the output of the keyboard output demultiplexer 522 results as a function of microprocessor actions. More particularly, from a description of the microprocessor and more particularly, the portion of that discussion associated with branch and return instructions, it will be appreciated that the mode of programming employed herein contains the ability to jump to a new instruction set and store the instruction from which the jump was initiated so a return operation may be implemented through the storage facility provided by the return address stack illustrated in FIG. 4 upon a completion of one or more jump routines. However, it will also be appreciated by those of ordinary skill in the art that when a sequence of return instructions have been stored, the outcome of succeeding jump routines may mandate that a previously stored return address is unnecessary or that a return to the top address in favor of a return to a lower address is appropriate in light of the results of the jump routine process. Under these conditions, the microprocessor will issue a dump return instruction which is decoded at the keyboard output demultiplexer in that such instructions will have the appropriate ROM bit content to cause the generation of a strobe pulse to the keyboard output demultiplexer and the selection of a high on the output conductor 556 thereof. When this command is generated, it is applied to the microprocessor and more particularly to the dump return input for the return address stack illustrated in FIG. 4 so that the pointer for the push down stack has the current address modified. Thus in this manner, the keyboard output demultiplexer 522 acts to decode dump return instructions issued by the microprocessor and causes the appropriate action to obtain in the return address stack illustrated in FIG. 4.

Similarly, the keyboard output demultiplexer 522 is also employed to decode switch commands issued by the microprocessor and to provide a high on the output conductor 557 each time such a command is issued and decoded thereby. More particularly, the discussion of the keyboard embodiments illustrated in FIGS. 9A and 9B will make it manifest that in multirecord transport embodiments of the instant invention, switching to the alternate record media station from that presently activated may occur as a result of several functions. Thus for instance, the operator may depress the alternate reader key or alternatively, a switch, switch and search, or switch and skip code may be read from a record media presently being played. All of these conditions cause a requisite code to be applied through the common data bus 19 into the main register M whereupon such code is classified by the action of the microprocessor. Regardless of the code employed, a switch command must be generated to cause the activation of the new record media and a deactivation of the alternate record media. This is done, in effect, by the issuance by the read only memory of an instruction which is decoded by the keyboard output demultiplexer 522 and results in the generation of a high or switch command on the conductor 557. This switch command is applied to the record media transport control apparatus illustrated in FIGS. 15A and 15B to cause the appropriate action provided requisite conditions therefor are present. Thus it will be appreciated that the keyboard output demultiplexer 522 here acts to decode instructions issued by the read only memory and to provide a switch command on output conductor 557 in the form of a high level thereon when appropriate ROM bit conditions are present in the command being decoded.

The remaining two outputs of the keyboard output demultiplexer 522 on output conductors 558 and 559 are identical to corresponding outputs of the keyboard interface described in U.S. application Ser. No. 429,479 and hence shall not be here discussed in detail. However, their function will be briefly summarized for the convenience of the reader. The keyboard is capable of providing two discrete sets of information as the same is provided with both keys for character generation as described in connection with the keyboard embodiments illustrated in FIGS. 9A and 9B and thumbwheels which act to define a desired block or line settings on the record media. Accordingly, the keyboard output demultiplexer 522 acts to decode the thumbwheels to data bus or gate the keyboard to data bus instructions from the microprocessor and to supply high levels representative thereof to the keyboards through conductors 558 and 559 to achieve the requisite function. In addition, as this action will cause the application of an eight (8) bit character from the appropriate source to the common data bus, either a high on conductor 558 or a high on conductor 559 will cause an OR gate 560 to be enabled and apply a high to output conductor 561. This output conductor acts in a plurality of manners to cause a gating of the main register M, so that the same may accept information from the common data bus as well as to enable the input buffers 524 so that eight (8) bit character information may be supplied from the keyboard to the common data bus. Accordingly, the annotation on conductor 561, DB to M is indicative of the gating signal applied to the main register M to enable the same to accept information from the common data bus while this same enable level applied through conductor 562 will enable the input buffer 524 to convey information from the keyboard to the common data bus. Additionally, it may be noted that the output buffers 525 are conversely disabled by this signal so that information may not be conveyed from the common data bus to the keyboard. More particularly, the cable 563, corresponds to the bi-directional cable 23 in FIG. 2 and acts to gate both eight (8) bit data from the keyboard to the common data bus and conversely gates data from the common data bus to the keyboard depending on which of the input/output buffers 524 and 525 are enabled. Thus, as will be appreciated by those of ordinary skill in the art, the cable 563 may take the form of eight (8) bit conductors connected between the common data bus 19, as indicated by the annotations DB0 - DB7 and the inputs to the input/output buffers at the keyboard as indicated by the bit conductor indications $DBX_0$ - $DBX_7$. In addition, interposed in each bit line are a pair of oppositely directed AND gates which may form the eight (8) AND gates associated with the input buffer 524 and the output buffer 525 which are separately enabled so that depending on whether or not the input buffer 524 or the output buffer 525 is enabled, data flow through the bi-directional bus established will be from the keyboard to the common data bus 19 or conversely from the common data bus 19 to the keyboard. When a high is present on either output conductors 558 or 559 of the keyboard output demultiplexer 522, the input buffer 524 is enabled so that information may be gated from the keyboard to the common data bus and whether this information comprises character information associated with the keys or thumbwheels information will depend upon whether the gating signal is applied on conductor 558 or 559 to the keyboard. Conversely, in the absence of either condition, the output buffer 525 is enabled through the operation of the inverter 564 from the output of the OR gate 560 so that data translation in the absence of a command level generated by the keyboard output demultiplexer 522 is from the common data bus to the keyboard. Furthermore, it should be noted that whenever a gate keyboard to data bus command is issued on conductor 559, this high level is conveyed through conductor 536 to clear the flip flop 535 which acts to set a flag for the ready strobe generated at the keyboard.

Accordingly, it will be appreciated by those of ordinary skill in the art that the keyboard interface illustrated in FIG. 10 acts to provide status indications of status conditions monitored at the keyboard to the common status bus on a command basis, as well as to generate and implement the translation of data between the common data bus 19 and the keyboard array. Additionally, the interface acts to decode instructions and to provide a plurality of command levels which are employed at the keyboard, the interface, as well as various other portions of the automatic writing system according to the instant invention.

THE RAM PERIPHERAL

Referring now to FIG. 11, there is shown the random access memory and the related circuitry therefor, as was generally described in connection with FIG. 2, block 17, for providing the read/write buffer 35, the read only buffer 36, and the general storage locations indicated at 37 within FIG. 2. The RAM peripheral illustrated in FIG. 11 comprises a random access memory 575, address latch means 576, address counter means 577, multiplexer means 578, an output gating array 579, and a zero decoder means 580. As was described in connection with FIG. 2, the read/write buffer 35 is employed for the purposes of accumulating information to be recorded on a record media so that such information may be recorded a line at a time. The information entered into the read/write buffer may originate at the keyboard, or from a record media being played back and is accumulated in the read/write buffer and manipulated for purposes such as underscore, and the like until a full line of information has been recorded or a code such as a link code which mandates a recording of the contents of the read/write buffer has been entered. Thereafter, the contents of the read/write buffer 35 are read out on a per character basis, forwarded through the common data bus 19 and loaded into the main register M for subsequent gating back onto the common data bus 19 and recording at the read/write record media station. Similarly, the read only buffer 36 is employed to accumulate character information read from an active media on a per line basis so that a full line of information may be read from the record media each time the same is energized. Once a line of information has been read from a record media in a playback mode and loaded into the read only buffer 36, the same may be selectively read therefrom as a function of the various action keys depressed and loaded into the read/write buffer 35 to achieve such purposes as playback, editing, revision and other of the powerful modes of selective playback available within the instant invention. General storage area 37 indicated in FIG. 2 is relied upon for such general storage functions as tab storage, the formation of a keyboard stack, margin information,line counter information, the printer stack and other necessary and appropriate storage functions such as are set forth in detail in Appendix G which defines the storage locations associated with the random access memory 575. However, as shall become more apparent as this disclosure proceeds, the RAM peripheral illustrated in FIG. 11 is merely a random access storage device whose storage locations have been divided therein to form both the read/write and read only buffers as well as the general storage area 37 and it will be clearly seen that the ease of addressing and inserting information from the common data bus as well as the speeds with which accessing and writing of information therein may be achieved completely obviates the need for separate buffers as was employed in U.S. application Ser. No. 429,479 as well as providing 512 eight (8) bit storage locations for the purposes of general storage. Therefore, although a functional appreciation of the instant invention requires an understanding that a distinct read/write buffer 35 and a distinct read only buffer 36 are employed for processing functions while additional general storage in addition to that provided by the general purpose registers 83 is here required, the RAM peripheral illustrated in FIG. 3 is merely a random access memory whose storage locations are specifically assigned and hence the portion of the peripheral being employed as well as the mode in which the same is employed is operative solely as a function of the program routines enabled at a given time. Therefore, the following disclosure of the RAM peripheral illustrated in FIG. 11 will proceed to initially set forth the structural details of the random access peripheral employed in the exemplary embodiment while specific operation associated with given sections thereof will be mentioned in passing it being understood that reading and writing operations are conducted in a similar manner regardless of the specific nature of the function being employed.

The random access memory 575 may take any of the conventional forms of random access memory devices available in the marketplace. In the embodiment of the RAM peripheral illustrated in FIG. 11, the random access memory 575 has been selected to contain 1,024 eight (8) bit storage locations and hence may be generally described as a random access memory having storage locations for IK words wherein each word is eight (8) bits wide. Typically, the same may be formed by eight (8) Intel 2102-2 Static MOS Rams wherein each individual RAM contains IK storage locations and is only one bit wide. Each of the eight (8) RAMS are interconnected so as to be commonly addressed and to accept only one bit of each eight (8) bit words on the data bus so that when the RAMS are enabled for writing or reading each RAM will accept one bit of each 8 bit word on the common data bus 19 or conversely, read out one bit of each eight (8) bit word to be applied thereto. Therefore, for ease of understanding and illustration, the random access memory 575 has been illustrated as a single block adapted to receive eight (8) bits $D_0 - D_7$ in parallel for purposes of writing operations and the like while providing eight (8) outputs $O_0 - O_7$ for providing the eight (8) bits of an address storage location upon a reading operation. The address inputs to the random access memory 575 are indicated by the terminal notations $A_0 - A_9$ while the read/write enable therefor has been indicated by the annotation R/W thereon.

As the random access memory 575 illustrated in FIG. 11 contains 1,024 eight (8) bit storage locations therein, it will be appreciated by those of ordinary skill in the art that a ten (10) bit address applied at terminals $A_0$-$A_9$ is required to uniquely define an individual storage location therein and once such storage location is defined, the data contained therein may be read out in parallel at terminals $O_0 - O_7$ or data present at terminals $D_0$ -$D_7$ may be written therein depending upon the condition of the read/write input R/W. Storage within the random access memory 575 has been organized for the purposes of the instant invention into quarters containing256 storage locations which are thus addressed by the two most significant bits of the address as presented on terminals $A_8$ and $A_9$. Each quarter is generally employed for unique functions assigned to that quarter and is addressed as shall be seen more in detail below, by two bits of instructions read from the read only memory 80. Thus, a first quarter of the random access memory 575 is employed to form the read/write buffer 35 and is addressed by a 00 condition on terminals $A_8$ and $A_9$ while a second quarter of the random access memory 575 is employed to form the read only memory 36 and its addressed by a 01 condition on terminals $A_9$ and $A_8$. Thus, in this manner two unique buffers which may be addressed as a function of an instruction are formed and each buffer contains 256 storage locations which are eight bits wide and hence have the requisite length and depth for the storage requirements of the read/write and read only buffers 35 and 36. The remaining two quarters of the random access memory 575 are employed for the general storage functions mentioned in passing above and set forth in specific detail in Appendix G and are addressed by a 10 and 11 input condition at address terminals $A_9$ and $A_8$. Thus it will be seen that the quarter within the random access memory 575 which is to be address is defined by the One (1) or Zero (0) bit conditions at terminals $A_8$ and $A_9$ while the remaining portion of the address within that quarter is defined by the bit conditions at address terminals $A_0$ – $A_7$. Furthermore, as shall be seen below, these portions of the RAM are addressed as a function of data contained on the common data bus 19 so that the powerful manipulation and processing functions of the arithmetic logic unit 83 may be employed therefor without a requirement for redundant structure. Although two quarters of the RAM are available for the purposes of general storage, an inspection of Appendix G will reveal that the last quarter of the RAM, i.e., that bearing an address of 11 at address terminals $A_8$ and $A_9$ is not presently employed; however, the same is available for purposes of expansion.

The random access memory 575 is selectivity enabled for reading or writing operations at the terminal annotated read/write (R/W). More particularly, the random access memory 575 is normally enabled for a read operation when a high level resides at terminal R/W while being selectively enabled for writing purposes when a low level appears thereon. Thus, in the absence of a low level being applied to the terminal R/W, any currently addressed storage location within the random access memory 575 will be read out and the bit conditions of the addressed storage location will be reflected at output terminals $O_0 - O_7$. The read/write enable input to the random access memory 575 is connected through a conductor 581 to the output of a NAND gate 582. The NAND gate 582 may take any conventional form of this well known device which acts to provide a low level output to enable a write operation only when all of the inputs thereto are high while providing a high level or read level output conditions for any other set of input conditions. The three inputs to NAND gate 582 are individually connected through conductors 583 - 585 to the terminals annotated BASIC RAM, B3 and $\overline{CA.CC}$ and it will be appreciated by those of ordinary skill in the art that the random access memory 575 is only enabled for write operations when the inputs on each of conductors 583–585 are high. These conditions are obtained for all RAM write instructions and may be decoded by simple AND gate decoding techniques well known to those of ordinary skill in the art. More particularly, reference to the Operand List set forth in Appendix C will reveal that the random access memory peripheral illustrated in FIG. 11 shares the common module address 0011 associated with ROM bits $B_{15}$ - $B_{12}$ with the language translator peripheral disclosed in U.S. Ser. No (P/2741) as filed on equal date herewith while it uniquely contains ROM bits $B_8$ - $B_{11}$ in a Zero (0) condition. Hence, this decode of ROM bits $B_8$ - $B_{15}$ is employed to uniquely define instructions devoted to the random access memory peripheral illustrated in FIG. 11. Accordingly,it will be appreciated that a generalized instruction for the random access memory peripheral illustrated in FIG. 11 may be represented as follows:

| Bit | 15 14 13 12 | 11 10 9 8 | 7 6 5 4 | 3 2 1 0 |
|---|---|---|---|---|
| | 0 0 1 1 | 0 000 | x x 0 x | x x x x |

wherein the *x*'s inserted in the exemplary instruction may be 1 or 0 depending upon the particular function to be carried out. Thus, the input to NAND gate 582 on conductor 583 will go high any time an instruction having the foregoing basic make up is decoded.

As indicated by the second input to the NAND gate 582, whether or not a write instruction is issued to the random access memory 575 for a specific RAM instruction or the same is maintained in its normally enabled read mode will be determined by the condition of ROM bit $B_3$ contained in such instruction. Thus, ROM bit $B_3$ whose condition is applied to conductor 584 of the NAND gate 582 controls the read/write operation in that when ROM bit $B_3$ is high in an instruction addressing the RAM, the NAND gate 582 will be enabled for the production of a low level pulse on output conductor 581 to enable a write operation during the clock interval associated with the input on conductor 585 of NAND gate 582. More particularly, as indicated by the terminal annotation $\overline{CA} . \overline{CC}$, the NAND gate 582 is enabled for the production of a low level output, assuming appropriate input conditions are present, when clock subphases CA and CC are low which corresponds to intervals 5 and 6 of the eight (8) phase clock. Thus, when an appropriate write instruction has been issued to the RAM and decoded at input conductors 583 and 584 of the NAND gate 582, the random access memory 575 will be enabled to write data present at input terminals $D_0$ - $D_7$ into an addressed storage location during the clock interval 5 and 6. Of course, should the condition of ROM bit $B_3$ be low, the addressed storage location will be read as the output of NAND gate 582 will remain high to continue the normally enabled read state for the random access memory 575.

The ten (10) bit address required to uniquely define one of the 1,024 eight (8) bit storage locations within the random access memory 575 is effectively divided, as aforesaid, into a two bit address defining the most significant bits of the ten (10) bit address required to define the quarter of the random access memory 575 in which an operation is to occur and an eight (8) bit address which uniquely defines a desired storage location within that quarter. Furthermore, addressing is segregated in such manner that the two most significant bits in an address which defines the quarter are obtained from the current instruction and latched while the remaining eight (8) bits of the address are obtained from the common data bus and where appropriate, the same may be manipulated at the peripheral to achieve cycling through all addresses within a quarter or portions of a quarter such as is appropriate for clearing operations associated with the clearing of a given buffer prior to write operations therein or push up stack functions such as are associated with the keyboard stack. The two most significant bits in the address which are applied to terminals $A_9$ and $A_8$ are provided by the address latch means 576. The address latch means 576 may take the form of a conventional two bit latch which acts in the well known manner to store and hold two bits of information presented at the inputs thereto during the presence of a load pulse and to continuously reflect the latched condition thereof at the outputs thereof until a new set of conditions have been loaded therein. The address latch means 576 as illustrated in FIG. 11 may typically take the form of a SN7475 bi-stable latch available from Texas Instruments Corporation. The two inputs to the address latch means 576 which are here employed are connected through conductors 583 and 584 to a pair of terminals annotated $B_7$ and $B_6$ and it will be appreciated by those of ordinary skill in the art that conductors 583 and 584 receive the bit conditions of ROM bits $B_6$ and $B_7$ as issued in each instruction. Thus, when the condition of ROM bits $B_7$ and $B_6$ are loaded into the address latch means 576 for a particular instruction, the 00, 01, 10, or 11 condition thereof are latched and maintained at the outputs of the address latch means 576 so that the same may continuously be employed to define an addressed quarter of the random access memory 575 until a new set of conditions have been loaded therein. The outputs of the address latch means 576 are connected through conductors 585 and 586 to the address terminals of the random access memory 575 annotated A9 and A8 so that the latched condition of the address latch means 576 acts to define the quarter of the RAM presently being addressed. The load input to the address latch means 576, annotated LD, acts in the well known manner to cause the loading of a pair of inputs on conductors 583 and 584 into the address latch means 576 whenever a high condition is present thereon while a low condition effectively acts to lock out such inputs. The load input to the address latch means 576 is connected through conductor 587 to the output of an AND gate 588. The AND gate 588 may take any of the well known forms of this conventional class of device which acts to produce a high or low input on conductor 587 only when all of the inputs thereto are high, while providing a low level at the output thereof for all other sets of input conditions. The AND gate 588 as shall be seen below, acts to generate an appropriately timed load pulse for the address latch means 576 as well as the address counter means 577 for instructions issued to the RAM peripheral which have ROM bit $B_2$ in a One (1) state. Thus, a first input to the AND gate 588 through conductor 589 receives the basic RAM peripheral decode as described in conjunction with input 583 to NAND gate 582 while a second input to AND gate 588 on conductor 590, as indicated by the terminal annotated $B_2$, directly receives the condition of ROM bit $B_2$ as issued in each instruction. Therefore, it will be appreciated by those of ordinary skill in the art that whenever an instruction is issued to the RAM which contains ROM bit $B_2$ in a One (1) state, the AND gate 588 will be enabled for the generation of a high or low pulse to the address latch means 576 upon the occurrence of the appropriate point in the instruction cycle as here defined by the input to the AND gate 588 on conductor 591 which is annotated $\overline{CC}$.CD and defines a portion in the instruction cycle when clock subphase CC is 0 and clock subphase CD is high to define clock subphase 5 in the instruction cycle. Thus, the condition of ROM bit $B_6$ and $B_7$ will be latched into the address latch means 576 for instructions directed to the RAM peripheral which contain ROM bit $B_2$ in a One (1) condition during the 125ns interval associated with subclock phase 5.

The remaining eight (8) bits of each address supplied to the random access memory 575 is provided by the address counter means 577 as a function of data issued on the common data bus 19. The address counter means 577 may take the conventional form of an eight (8) bit up/down counter which acts in response to the presence of a load pulse to load in parallel the eight (8) bits provided at the inputs thereto and may additionally act in response to appropriate decrement or enable levels to increment or decrement the current state of the count present therein. The address counter means 577 may thus take the conventional form of a pair of SN 74193 four (4) bit up/down counters conventionally available from the Texas Instrument Corporation which are inter-connected to form a conventional eight (8) bit up/down counter in the well known manner. The eight (8) inputs to the address counter means 577 are connected through conductors 592 – 599 to respective ones of the individual bit conductors within the common data bus 19 as indicated by the terminals annotated $DB_0$ - $DB_7$ and hence it will be appreciated by those of ordinary skill in the art that any eight (8) bit word present on the common data bus 19 is available at the inputs to the address counter means 577 and hence may be gated thereinto by an appropriate load enable level. Additionally it should be noted that each of the conductors associated with the inputs to the address counter means 577 is connected through an associate one of conductors 600 - 607 to one of the data input terminals $D_0$ - $D_7$ of the random access memory 575. Accordingly, it will be appreciated by those of ordinary skill in the art that eight (8) bit character information present on the common data bus 19 may be selectively gated into the address counter means 577 upon the appropriate application of a load pulse thereto and/or gated into an addressed one of the eight (8) bit storage locations of the random access memory 575 upon the presence of a low going write enable signal on conductor 581. The eight outputs of the address counter means 577 are connected through conductors 608 - 615 to respective ones of the address inputs $A_0$ - $A_7$ of the random access memory 575 so that the eight (8) bits representing the state within the count of the address counter means 577 may be applied therethrough to form the lowest eight (8) significant bits of an address while the highest two significant bits defining the quarter are generated from the output of the two bit latch on conductors 585 and 586. The load input to the address counter means 577 is connected through the conductor 616 and 587 to the output of the AND gate 588 which acts, as aforesaid, to apply a load input to the address latch means 567 whereupon the latch address means 567 and the address counter means 577 may be loaded simultaneously to thereby a ten (10) bit address to the random access memory 575.

In addition to merely loading data from the common data bus 19, the address register means 577 has the ability to increment or decrement an address which has previously been loaded therein either during a prior instruction or during a prior portion of the present instruction cycle so that while simultaneous loading and an incrementing or decrementing of an address is not available, the same may be accomplished during a single instruction cycle. The incrementing or decrementing of the address counter means 577 without a loading of a new address into the address latch means 576 and the address counter means 577 will result in an incrementing or decrementing of the lower eight (8) bits of an address since the output of the address latch means 576 will not change. Through this approach, addressing of each storage location for a quarter of the random access memory 575 defined by the address latch means 576 is available for such actions as reviewing, updating, or clearing the entire contents of a given buffer or one of the stacks employed in the general storage portion of the random access memory 575. However, the employment of the address counter means 577 for the lower eight (8) bits of an address precludes an incrementing or decrementing function which causes the address to be changed between sections of the random access memory 575. Although the use of the incrementing and decrementing function of the address counter means 577 provides a wide ambit of flexibility through which address manipulations may be achieved, the majority of address manipulations employed for reading and storing information from the common data bus are achieved through the employment of the arithmetic logic unit 83 and the main register M.

The increment input annotated UP, to the address counter means 577 is connected through conductor 617 to the output of an AND gate 618 and is enabled to cause the incrementing of an address present in the address counter means 577 when a high level is present thereon. The AND gate 618 may take the conventional form of a two input AND gate which acts to produce a high level output on conductor 618 to enable the increment input to the address counter means 577 only when both of the inputs thereto are high while producing a low or disable level on conductor 617 for all other sets of input conditions. A first input to the AND gate 618 is connected through conductor 619 to a terminal annotated $B_1$ which is indicative that this input to the AND gate receives the bit condition of ROM bit $B_1$ in each instruction issued on the common instruction word bus 20. Thus it will be seen that whenever an instruction is issued with ROM bit $B_1$ in a One (1) condition, the AND gate 618 will be enabled to produce a count up or increment enable level on output conductor 617 provided, as will be seen below, such instruction is appropriately directed to the RAM and hence for the generalized RAM instruction set forth above, it will be understood that the condition of ROM bit $B_1$ is the controlling bit regarding whether or not the address counter means 577 is conditioned to increment an eight (8) bit address portion stored therein. The second input to the AND gate 618 is connected through conductors 620 and 621 to the output of an AND gate 622. The AND gate 622 may take the same conventional form as AND gate 618 and here functions to ensure that the enabling of AND gate 618 in response to an instruction having ROM bit $B_1$ in One (1) condition occurs in a properly timed manner during an instruction having the basic RAM peripheral decode. Accordingly, a first input to the AND gate 622 is connected through conductor 589 to the terminal annotated BASIC RAM, which as described in connection with AND gate 588, is a decode of instructions containing the basic RAM address, i.e., ROM bits 8 - 11, 14 and 15 in a Zero (0) condition while ROM bits $B_{13}$ and $B_{12}$ are in a One (1) condition. Thus, this input to AND gate 622 ensures that a instruction devoted to the RAM peripheral has issued. The second input to AND gate 622 on conductor 623 is connected to a terminal annotated $\overline{CC}.\overline{CB}$ and results from an ANDing of clock subphases CC and CB when the same are in a Zero (0) state to thereby define subphases 5 - 7 of the eight (8) phase clock employed within the instant invention. Therefore, it will be appreciated by those of ordinary skill in the art that the output of AND gate 622 will go high only during clock phases 5, 6 and 7 of an instruction cycle wherein an instruction having the basic RAM decode has issued. Similarly, the output of AND gate 618 will go high in response to an enabling by the output of AND gate 622 only for instructions containing ROM bit $B_1$ in a One (1) condition. This means, that the increment or count up input to the address counter means 577 will be enabled to increment an address loaded therein only during clock phases 5, 6 and 7 of an instruction devoted to the RAM peripheral which has ROM bit $B_1$ in a One (1) condition. Accordingly, for a load and increment instruction a new address will be loaded during clock subphase 5 and incremented during the remaining portion of that instruction.

The output of the AND gate 622 is also connected through conductors 621 and 624 to one input of an AND gate 625. The AND gate 625 may take the same form as AND gate 618 but here acts to control the enable level for the decrement input, annotated DN, to the address counter means 577. More particularly, the decrement input to the address counter means 577 is connected through conductor 626 to the output of AND gate 625 and is enabled in response to a high level imposed thereon to decrement the state of an address present therein. The decrement state for the address counter means 577 is controlled by ROM bit $B_0$ in instructions devoted to the RAM peripheral. Therefore, as may be readily seen in FIG. 11, a first input to the AND gate 625 is connected through conductor 627 to a terminal annotated $B_0$ which reflects the condition of ROM bit $B_0$ issued in any instruction and acts to enable this input to AND gate 625 any time any instruction contains ROM $B_0$ in a One (1) state. Therefore, as the output of AND gate 622 produces a high level to the second input to AND gate 625 during clock phases 5, 6 and 7 of any instruction bearing a basic RAM decoding, it will be seen that the decrement input connected to conductor 626 will go high or be enabled during clock phases 5, 6 and 7 of a basic RAM instruction which contains ROM bit $B_0$ in a One (1) state. Accordingly, it will be appreciated by those of ordinary skill in the art that the address counter means 577 may accept the lowest significant eight (8) bits of an address from the common data bus 19 whenever a load input is provided thereto and will provide these lower eight (8) bits to the address inputs $A_0$ - $A_7$ of the random access memory 575 through conductors 608 - 615. Furthermore more, in response to appropriate instructions on the common instruction word bus, the previously loaded address within the address counter means 577 may be incremented or decremented by enable levels in the form of highs provided on conductor 617 or 626.

The eight (8) bits of address provided at the output of the address counter means 577 to the low order eight (8) address inputs $A_0$ - $A_7$ of the random access memory 575 are additionally applied through conductors 628 - 635 to address inputs of the multiplexer means 578. The multiplexer means 578 here takes the form of a two to one multiplexer means which may accept two sets of eight bits in parallel at the inputs thereof and will provide a selected set of such eight (8) bit inputs to the outputs thereof depending upon the state of the select input thereto. The multiplexer means 578 here functions to selectively supply either the current address present at the output of the address counter means 577 or the eight (8) bit word read from the storage location within the random access memory 575 which is accessed by that address. Thus, the current address supplied by the address counter means 577 is applied to input terminals $A_0$ - $A_7$ of the multiplexer means 578 in parallel through conductors 628 - 635 while the content of the currently addressed storage location within the random access memory 575 is applied from the output thereof at terminals $O_0$ - $O_7$ through conductors 636 - 643 in parallel to input terminals $O_0$ - $O_7$ of the multiplexer means 578. The select condition for the multiplexer means 578 is defined at the S input thereto which is connected as indicated in FIG. 11 to a terminal annotated $B_6$ and it will be appreciated by those of ordinary skill in the art that this terminal reflects the One (1) or Zero (0) condition of ROM bit $B_6$ in each instruction. The select conditions established for the multiplexer means 578 are such that a high or One (1) level applied to the select input of the multiplexer means 578 will cause the current address applied at inputs $A_0$ - $A_7$ to be reflected at the output of the multiplexer means as indicated by terminals $F_0$ - $F_7$ while a low level on the select input thereto will cause data read from the address location within the random access memory 575 to be applied to output terminals $F_0$ - $F_7$. Accordingly, it will be appreciated by those of ordinary skill in the art that the One (1) or Zero (0) condition of ROM bit $B_6$ and hence, the select input to the multiplexer means 578 will be determinative whether or not data from a currently addressed storage location within the random access memory 575 or the current address itself is applied to the output terminals $F_0$ - $F_7$ of the multiplexer means 578.

The output terminals $F_0$ - $F_7$ of the multiplexer means 578 are connected through conductors 636 - 643 to the inputs of the output gating array 579. The output gating array 579 may take the conventional form of eight (8) commonly enabled AND gates which act upon the presence of an enable level supplied on conductor 644 to selectively gate the eight (8) bits supplied thereto in parallel on conductor 636 - 643 to the common data bus as indicated by the output terminals annotated $DB_0$ - $DB_7$. The output gating array 579 here functions to selectively gate either data or address information selected at the multiplexer means 578 to the common data bus so that reading operations associated with the contents of the RAM may be performed or alternatively so that current address information may be manipulated. The common enabling for the output gating array 579 is supplied through conductor 644 and 645 from the output of a three input AND gate 646. As will be appreciated from the input conditions on this gate, the output of AND gate 646 will go high during clock subphases 5, 6 and 7 of an instruction bearing the basic RAM decode and having ROM bit $B_4$ in a One (1) condition. Therefore, it will be appreciated that the condition of ROM bit $B_4$ in RAM instructions is determinative as to whether or not data or address information is supplied from the output gating array 579 to the common data bus. Furthermore, as any data gated onto the common data bus from a peripheral is to be loaded into the main register M, the annotation DB to M associated with conductor 645 is indicative that the output of this AND gate serves both to enable the output gating array 579 and to supply a gating signal to the main register M so that the same may accept data from the common data bus 19.

The output of the multiplexer means 578 is also supplied through conductors 647 - 654 to the input of the Zero (0) decoder means 580. The Zero (0) decoder means here takes the form of an eight (8) input AND gate whose inputs are inverted and which acts in the well known manner to produce a high level only when all of the inputs thereto are low. The function of the Zero (0) decoder 580 is to provide a status indication on output conductor 655 to thereby indicate a condition where all of the outputs of the multiplexer 578 are low. This status condition is employed to find an end of data in either the read/write buffer 35 or the read only buffer 36 in that prior to storage all Zero's are written into each of the storage locations thereof and hence when an all Zero (0) condition is indicated by the output of the Zero (0) decoder 580 when data within the randome access memory 525 is being read and has been selected at the output of the multiplexer 578, and end of data condition is indicated. This condition provides a convenient status indication for locating the end of the buffer for such operations as underscore and the like where reading to the point at which data insertion terminated are frequently performed. The memory Zero (0) status indication on conductor 655 is utilized at the printer interface as was described in connection with FIG. 7.

The RAM peripheral illustrated in FIG. 11 is functionally divided for use within the instant invention into four quarters wherein the first two hundred fifty-six (256) eight (8) bit words therein associated with the first quarter, storage locations 000–OFF defined in Appendix G, are employed as the read/write buffer 35, while the two hundred fifty-six (256) eight (8) bit words within the second quarter, storage locations 100–1FF, are employed as the read only buffer 36. Similarly, the remaining 512 storage locations within the third and fourth quarters of the random access memory 575 may be employed for general storage purposes; however, as may be seen in greater detail in Appendix G, only the third quarter of the random access memory 575 is actually relied upon as indicated by storage location assignments associated with locations 200–2EF. However, it will be appreciated by those of ordinary skill in the art that should additional storage be required for purposes of either expanding any of the assignments set forth in Appendix G or adding new register pointers or stacks for alternative purposes, the unassigned portion of the third quarter of the RAM and the entire fourth quarter of the RAM may be devoted to these purposes. From the mode or organization of the random access peripheral already set forth, it will be appreciated by those of ordinary skill in the art that the read/write buffer or the first quarter of the RAM is generally addressed by a 00 condition at address inputs A9 and A8 which derive, as aforesaid, from the condition of ROM bits B7 and B6 is a given instruction while individual storgage locations within this quarter of the RAM are defined by address inputs $A_0$ - $A_7$ which are derived from the common data bus 19. Similarly, the read only buffer portion of the RAM as present within the second quarter of the random access memory 575 is generally addressed by a 01 condition at address inputs A9 and A8 respectively which represents a 01 condition for ROM bits $B_7$ and $B_8$ in a given instruction while individual locations within the read only buffer are defined by the address bits $A_0$ - $A_7$ as obtained from the common data bus 19. The third quarter of the random access memory 575 is, in a similar manner, generally addressed by a 10 input condition on address inputs $A_9$ and $A_8$ as defined by the bit conditions of ROM bits $B_7$ and $B_6$ respectively while individual ones of the various storage locations employed in the manner set forth in Appendix G are defined by the address supplied to address inputs $A_0$ - $A_7$ through the common data bus 19.

Although the mode of employment of the red/write buffer 35, the read only buffer 36, and the individual ones of the specialized storage location in the third quarter of the RAM as set forth in detail in Appendix G will be apparent from the various modes of operation set forth above as well as the detailed and specific programs and flow charts set forth in conjunction herewith, exemplary modes of operation of the RAM peripheral illustrated in FIG. 11 are briefly set forth below to provide the reader with a brief appreciation for the manner in which this peripheral is relied upon within the instant invention. It should be noted however, that the detailed manner and use of each of the locations thereof may best be appreciated upon a review of the flow charts and programs set forth in conjunction with the instant application and the detailed analysis thereby available of each of the modes of operation which may be enabled under program control. However, prior to setting forth this material, the information column listed in Appendix G will be briefly discussed so that the abbreviation set forth therein is rendered apparent to the reader. Accordingly, referring briefly to Appendix G is will be seen that storage location 000 through 2EF within the first three quadrants of the random access memory 575 are listed and grouped according to the information stored therein while such information as is stored is listed in the right hand column opposite the storage locations employed for that purpose. The storage locations are defined in terms of a twelve bit Hex code wherein the last two digits of each three digit code listed corresponds to the eight (8) address bits supplied on the common data bus while the first digit of each three (3) digit Hex code set forth corresponds to the first two bits defining a quarter as supplied by ROM bits $B_7$. Accordingly, it will be seen upon an inspection of Appendix G that storage location 000-OFF which define the first quarter of the RAM which includes 256 eight (8) bit storage locations are devoted to the read/-write buffer 35 while the second quarter of the RAM are devoted to the read only buffer 36. Thereafter, the third quarter of the RAM which is divided into specialized storage registers, counter stacks, pointers and the like are specifically set forth in association with the storage locations assigned thereto. More specifically, storage locations 200 - 227 define forty character locations employed for tab storage. Therefore, as each storage location is eight (8) bits wide while tabs, as aforesaid, only require two bit locations for the storage of a tab, no tab, or special tab condition, it will be appreciated by those of ordinary skill in the art that 156 storage locations on a line may be defined within this portion of the RAM and hence, a tab, no tab, or special tab condition is defined for each column at which the printer may reside and be utilized in much the same manner as described in U.S. application Ser. No. 429,479 even though a separate tab register was utilized therewith.

Similarly, storage 228 - 23F are employed within the random access memory 575 to form a keyboard stack for the purposes of providing an N key rollover function. Thus, the last eight (8) bit register, i.e., 23F is employed as a pointer counter for the keyboard stack and any character entered from the keyboard which can not be immediately processed is loaded therein and subsequently processed on a first in first out basis to provide an N key rollover function.

The eight (8) bit storage locations 240 and 241 are employed for the purposes of storing left and right margin information respectively while storage locations 242 and 243 are utilized to store the read/write and read only block numbers or track numbers for the read/write and read only record media stations depending upon whether or not cassette or magnetic card embodiments of the instant invention are being employed. Storage locations 244 and 245 are employed for the first line preset number established at the keyboard and an eight (8) bit first line counter respectively which acts to count lines entered in association with the line function as aforesaid. Similarly, storage locations 246 and 247 are employed for the maintenance of the page end preset number and the page end counter associated with the page end function defined at the keyboard by the operator. Storage locations 248 - 287 are utilized for storage of temporary tabs, while storage locations 288 and 289 are employed for the purposes of temporary left hand and right hand margin information as is necessary for purposes of saving current settings when new settings are being read from a record media.

Register locations 290 - 2C2 are employed for the storage of a text string search queue as inserted by an operator at the keyboard during a text string search mode of operation while storage location 2C3 is employed as a pointer therefor. Finally, storage locations 2C6 -2EF are employed to form a printer stack used in the high speed print routine while storage locations 2C4 and 2C5 are employed to form input and output pointers therefor it being recognized that during the high speed print routine, as shall be developed in greater detail below, the printer stack employed is loaded from the bottom and read from the top so that two pointers are required therefor. In addition to the specialized storage facility provided in the third quarter of the RAM other specialized storage locations employed for the setting of flangs, pointers as well as general storage locations are present in the G and H registers so that to a certain extent, the assigned location of general purpose and specifically assigned storage locations between the G and H registers and the third quadrant of the RAM peripheral is somewhat arbitrary. For instance, while the read/write and read only buffers are established in the first and second quarters respectively of the RAM peripheral 575, pointers for each of these buffers are located within the eight (8) bit storage locations GD and GE within the general purpose registers as may be quickly seen upon an inspection of Appendix D.

The manner in which generalized storage and retrieval operations within the random access memory 575 are conducted under program control may best be appreciated upon a consideration of several exemplary cases. However, it should be recognized at the outset, that the specific operations which occur within the RAM for the purposes of reading and writing are determined to a great extent by the specialized furctions associated with that portion of the random access memory 575. Thus, for instance, the first and second quarters of the RAM are devoted to storage associated with the read/write and read only buffers 35 and 36. Therefore, the manner in which storage occurs within these portions of the RAM is effectively made a function of the matter in which the read/write and read only buffers are operated. More particularly, it will be recalled that each time line information is inserted at the keyboard, the same is loaded on a first in, first out basis within the read/write buffer 35 so that a line in formation as defined by the insertion of a carriage return character is assembled therein. Thereafter, once a line has been accumulated, the contents of the buffer are read out in a first in first out manner, inserted within the main register M on a per character basis and recorded on the record media. Subsequently, the read/write buffer is cleared by the writing of Zero's in each of the storage locations thereof so that a new line of information may be accumulated, it being noted that the writing of Zero's (0's) into each storage location prior to the writing of actual information therein is necessary because an all zero condition must be frequently employed to define the end of the contents of the buffer and hence a writing over technique would be insufficient in cases where a previous line was longer than the present line accumulated. Similarly, information read from an active record media on a line basis is inserted a character at a time into the main register M and thereafter loaded on a first in, first out basis into the read only buffer until an entire line of information has been read from the record media. Thereafter, character information is selectively read on a first in, first out basis from the read only buffer for such purposes as accumulating new line information in the read/write buffer as well as the printing of same through the various editing techniques available at the keyboard. Thus, a clearing operation where Zero's (0's) are written in each storage location here too attends the writing of new information as the end of the contents of the buffer must be well defined and available through the output of the Zero decoder. Thus, for this reason, storage and retrieval of information within the read only buffer 36 formed within the second quadrant of the random access memory 575 is achieved in much the same manner as that which occurs for the read/write buffer 35.

Conversely, with regard to the specialized storage locations employed within the third quadrant of the RAM, it will be appreciated by those of ordinary skill in the art that information is typically stored therein and maintained through periodic readings and the like until the same is updated in its entirety either through the writing of new information or the updating of the pointer defining the contents thereof. Thus, clearing operations typically do not occur for such storage locations; however, as shall be seen in detail below, the contents of a stack may be selectively pushed up or pushed down under program control as well as being controlled by the state of a pointer counter.

An exemplary writing operation will be now described for the read/write buffer 35 to acquaint the reader with the manner in which the read/write buffer is cleared and information is stored therein and following this discussion, the manner in which information is read and otherwise manipulated will be briefly described. These same operations are implemented in the manner described below in the read only buffer 36; however, as will be appreciated by those of ordinary skill in the art, the pointer maintained in register location GD is relied upon while the second quarter of the RAM is addressed and latched. Prior to writing any information in the read/write buffer 35, the buffer is cleared through an adjustment to the end of the buffer through a clear cycle routine. To achieve this function, the contents of the main register M are set to 0 so that eight Zero (0) bits on the common data bus may be employed to initiate addressing as well as character/storage within the 256 eight (8) bit storage locations of the read/write buffer 35. The main register M is thus set to an all zero condition through a CALR instruction or the like as defined in the Operand List attached hereto as Appendix C. Once the main register M is set to a Zero (0) condition, this address is loaded within the address counter means 577 and the load instruction includes ROM bits $B_6$ and $B_7$ in an all Zero (0) state so that the resulting address loaded into the address latch means 576 and the address counter means 577 is an all Zero (0) address defining the initial storage location of the first quarter of the random access memory 575 which thus corresponds to the first storage location within the read/write buffer 35. The loading of the contents of the M register which have now been set to zero may be achieved through a memory control instruction, as listed in Appendix C, A1N and under the conditions here being discussed, ROM bits $B_6$ and $B_7$ would be in a 00 state. Accordingly, it will be appreciated by those of ordinary skill in the art, that upon the completion of this instruction, Zero (0) bits are present at address inputs $A_0 - A_9$ while all Zero (0) bits reside at the outputs of the main register M and hence remain available on the common data bus and hence input terminals $DB_0 - DB_7$ connected to conductors 592 - 599. This means, that the initial storage location of the read/write register 35 is being addressed and all Zero (0) bits currently reside on data inputs $D_0 - D_7$ of the random access memory 525 so that the same are available for loading therein.

The next step is to load the data and increment the address so that the next storage location in the read/write buffer may be treated. This is accomplished by a single instruction annotated MINI of the memory control instructions listed in Appendix C and it will be appreciated by those of ordinary skill in the art that this instruction causes the all Zero (0) character present at data inputs $D_0 - D_7$ of the random access memory to be loaded into the all Zero (0) storage location presently addressed through an application of a write level on conductor 581 and thereafter, the contents of the address counter means 577 are incremented through an enabling of the increment UP input of the address counter 577 connected to conductor 617. Thus, at this juncture, a One (1) level resides on the address conductor $A_0$ while all Zero's (0's) remain on address inputs A1 - A9 as well as the data inputs $D_0 - D_7$ associated with the content of the common data bus 19 commected to the output of the main register M. Accordingly, at this juncture in the clear cycle, a Zero (0) has been written into the initial address of the read/write buffer 35 and the address defined by the address counter means 577 has been incremented. The next step in the clear cycle is to ascertain whether or not the current address of the current address counter means 577 is in a Zero (0) state. Although this function may be achieved in a plurality of ways, the same is here implemented through a reading of the condition on the common status bus to avoid added instructions necessary to achieve comparison operations with the constants read from the read only memory 80. More particularly, an instruction is read which causes the current address of the address counter means 577 to be gated to the output of the multiplexer means 578 and the status condition at the output of the Zero (0) decoder 580 is sampled at the printer interface. The Zero (0) decoder output will only go high when all Zero's (0's) are present at the inputs thereto and hence when address bits $A_0 - A_7$ are gated to the outputs thereof on conductors 647-653 a Zero (0) address will be ascertained on the common status bus when this status condition at the printer interface is gated thereon. More particularly, the instruction issued is branched if the status bus is high and the branch indicates the completion of the clear operation to condition a writing operation. For the single cycle of the clear operation herein being discussed, the status condition will not be One (1) and hence another MINI instruction will issue which causes the data conditions on inputs $D_0 - D_7$ of the RAM memory 575 to be loaded into the address storage location and thereafter, the address loaded in the address storage location and thereafter, the address loaded in the address counter means 577 is incremented. Thereafter, the address of the address counter means is again checked to ascertain whether or not the same is Zero (0) and the two instruction loop is continued until a Zero (0) address condition obtains. As will now be appreciated by those of ordinary skill in the art, once an indication that the address of the address counter means 577 is Zero (0) is obtained from the output of the Zero decoder 580 it will be appreciated that the address of the address counter means 577 will have been incremented through all 255 states thereof and returned again to zero and through each step of this two instruction loop the address is first employed to cause the writing of an all Zero (0) character into the address location and thereafter the same is incremented so that it will be seen that when the addressing is incremented to Zero (0), Zero (0) characters will have been written into each of the 256 storage locations of the read/write buffer 35 and hence, the clear operation has been completed.

Upon completion of the clear operation, characters entered at the keyboard are ready for insertion into the address storage locations within the read/write buffer 35. The writing of data within the read/write buffer 35 occurs in a first in, first out manner it being appreciated by those of ordinary skill in the art that the function of the read/write buffer is to accumulate a line of information to be recorded so that recording of information on a per line basis may be achieved. A pointer for the read/write buffer address is maintained in storage location GD of the general purpose registers 83 while a pointer for the read only buffer address is maintained in storage location GE. Therefore, the instant description of the writing of information within the read/write buffer 35 will proceed upon the basis that any succeeding character in a series of entered characters is being written into the read/write buffer and it will be appreciated by those of ordinary skill in the art that if such character corresponds to the first character of a line, an initial address, i.e., all Zero's (0's) will reside in storage location GD which forms the pointer address for the read/write buffer address. Furthermore, as the focus of this discussion centers on storage within the read/write buffer 35, the principal focus of this discussion will be devoted to the entry of keyboard data into the read/write buffer and various processing operations which precede or follow the entry of such data into the buffer, as may be associated with the classification and printing of such character information will here be ingnored. Typically, when keyboard data is entered, it is loaded through the common data bus 19 and entered into the main register M. Subsequently, the same is forwarded to a generalized holding location within the HB storage location of the general purposes registers 83 so that the same may be held pending appropriate addressing functions attending the processing of such information. It should be noted that the processing location in register location G7 is here not employed as other pertinent data may be loaded therein. Once the keyboard data has been gated from the main register M to the general holding location HB, the contents of the pointer for the read/write buffer 35 is fetched from storage location GD and this address is loaded into the main register M as the pointer maintained within storage location GD is indicative of the last storage position in which information was written. Once the same has been written into the main register M, it is incremented by One (1) through an arithmetic operation performed by the arithmetic logic unit 83. Thereafter, the new address is written back into the GD register by transferring the contents of the main register M back into GD. Accordingly, the contents of the pointer counter GD now reflects the current location in which a character is to be written in the read/write buffer 35 and this eight (8) bit address is retained for use in the main register M and hence is available on the common data bus 19. Thereafter, a AxIN instruction is issued, as listed in the memory control section of Appendix C, to cause the contents of the register M to be loaded into the address counter means 577 and ROM bits $B_6$ and $B_7$ in that instruction are appropriate to cause the addressing of the first quarter of the random access memory 575 in which the read/write buffer resides. Once the appropriate address has been loaded into the latch means 576 and the address counter means 577 in the foregoing manner, the contents of holding register HB, containing character information inserted at the keyboard are loaded into the main register M so that the same are reflected at inputs 600 - 607 of the random access memory 575 and hence are available for writing purposes on data inputs $D_0$ - $D_7$. Thereafter, an input memory from M instruction is issued, listed as MIN in the Operand List attached hereto as Appendix C, which causes the character information now to be loaded into the random access memory 575. It will thus be appreciated by those of ordinary skill in the art that character information entered from the keyboard was written into the next adjacent storage location within the read/write buffer 35 while the pointer counter for the read/write buffer maintained in storage location GD was appropriately incremented to indicate the current storage location within the read/write buffer 35. It will be further noted that unlike the clearing operation initially described, incrementing of the address was here performed by the manipulation of data loaded into the main register M in the ALU while the incrementing or decrementing function of the address counter means 577 was not employed.

Upon the detection of a carriage return character entered from the keyboard the same would be written into the read/write buffer 35 in the foregoing manner. Thereafter, various processing steps would be completed, the record media at the read/write transport brought to speed and a reading of the contents of the read/write buffer would occur in much the same manner described above "using output memory to M" instructions. For operations wherein the backspace key is struck and effectively, the buffer is backed up and the last character is erased, the current address maintained in register GD would be fetched, a zero (0) character stored in the memory location addressed thereby and thereafter, that address would be decremented to effectively back up the contents of the read/write buffer 35 to a writing of new information. Similarly, in cases such as word underline operations and the like, when the function is triggered by the insertion of an encoded function or the like, the buffer is backed up through effectively using the current address to read the contents of the character location, classifying and otherwise examining the character to determine if a space, tab or similar non-underscored character is present and decrementing the address maintained in register location GD until the appropriate space character, etc. is detected. Thereafter, pointer counter GD is employed to address the read/write buffer 35 and the character addressed is read to ascertain whether or not a Zero (0) character is present. If the same is not present, the character read has its eighth bit modified to a One (1) to reflect a delineated status, reinserted back into that storage location within the read/write buffer and thereafter the address is incremented. This will continue until an end of data is defined by the presence of an all Zero (0) character whereupon keyboard entry of data or other normal processing operations may be continued. Accordingly it will be appreciated by those of ordinary skill in the art that both the read/write and read only buffers provided within the first and second quadrants of the random access memory 575 employ highly versatile data buffers devoted to the accumulation of line information and the like while providing highly versatile and flexible modes through which data may be manipulated, edited, revised and returned to.

When information is stored in the third quadrant of the random access memory 575 pursuant to the housekeeping, special function, or stack facilities provided within the specialized storage locations 200 - 2EF as specifically defined in Appendix G, pertinent information is stored in the appropriate location therefor, under program control, whenever the function is implemented so that such information may be accessed again under program control when the same is needed. Thus, tab information as well as left and right hand margin information is stored, cleared and monitored as a function of occurrences at the keyboard so that the printer displays operating characteristics highly reminiscent of those of an ordinary typewriter even though no mechanical detents are provided. For instance, it will be recalled that an operator enters tabs by essentially spacing the daisy wheel print element carriage at the printer to a desired tab location and thereafter depressing the tab key. The column position at which the printer resides is constantly maintained in register location HA as set forth in Appendix E. Therefore, whenever the tab function is implemented, the current column position of the printer is employed to store the tab set as a two bit indication in the portion of the tab storage assigned to that column position so that either a tab, no tab, or special tab bit pair is set for each column position at the printer unit. More particularly, it will be recalled that storage locations 200 - 227 provide 40 eight (8) bit character locations for tab storage and that tabs are stored as bit pairs. Therefore, there are 156 bit pairs available in storage locations 200 - 227 for tab storage or one bit pair for each column position at the printer. Therefore, when a tab or special tab is set at the keyboard, the microprocessor acts under program control to withdraw the current carrier position from register location HA and to divide the same by four. Thereafter, 200 corresponding to the start of the storage position within the third quadrant of the random access memory 575 is added to the result so that the whole number obtained thereby defines the word location at which the appropriate storage for that column resides and the remainder defines the two bit pair within that word location. After the address is obtained, the random access memory 575 is addressed and the tab or special tab indication set by the operator is loaded therein by placing the One (1) or Zero (0) combination on the appropriate bit conductors within the columnar data bus. In actuality, previous storage within that word is first obtained by reading out the word in which the individual bit pair address resides and merely modifying the contents of that word to reflect the tab set within the bit pair specifically defined therein. Thus in this manner, a tab, no tab, or special tab indication is set for each column position at which printing may occur.

Similarly, right and left margin information is similarly set in that the first margin setting established is defined as the left hand margin setting and the current position of the printer as defined in register location HA is set into storage location 240 within the random access memory 575 while a similar result occurs for the right hand margin stored as an eight (8) bit word in location 241. In a like manner, when various conditions are set such as the first line preset number set in storage location 244 or the like counter preset number set in 246, this location is addressed and the eight (8) bit word corresponding to the count set by the operator is loaded therein. Thereafter, each time a carriage return operation occurs, the counter modules established in storage locations 245 and 247 are incremented to thereby maintain the number of lines actually employed for printing and various comparisons are run by the microprocessor indicated by the dashed block 16 to compare the counts maintained in the counters with the permissible counts set forth. Furthermore, it will be appreciated by those of ordinary skill in the art that corresponding loading techniques are maintained for registers employed to merely accept information such as are present for the text string search queue, the block or track storage areas and the temporary tab, left hand and right hand margin locations while pointers and the like are incremented or decremented as a function of comparisons being run by the microprocesso indicated by the dashed block 16.

By their nature, the use and function of the stacks are somewhat differently implemented and for this reason, an exemplary mode of operation for the keyboard stack will be briefly set forth while the utilization and mode of operation of the printer stack will be readily appreciated from the description of the flow chart associated with the high speed print routine set forth below. The purpose of the keyboard stack is to provide an N key roll over function for character information entered at the keyboard which may not be immediately processed. As the last storage location, i.e, 23F defined for the keyboard stack in Appendix G, is employed as a pointer for the keyboard stack, it will be appreciated by those of ordinary skill in the art that the keyboard stack per se is 24 characters deep and hence may provide a N key rollover function for up to 24 characters entered from the keyboard which can not be immediately processed. The loading of the keyboard stack within the RAM 575 is implemented in sequence in that the first character entered which can not be processed is stored in the top of the stack, i.e., storage location 228 and each succeeding character entered is stored in the next succeeding character location wherein the keyboard stack pointer maintained in storage location 23F is employed for the purposes of addressing the keyboard stack and keeping track of the last character loaded therein. More particularly, when the keyboard stack is empty, the keyboard pointer counter has a count 27 therein corresponding to storage location 277 or the 40th storage location in the third quarter of the random access memory 575. When a character is to be stored in the keyboard stack, the pointer counter is incremented and the incremented address together with the third quarter address provided through ROM bits B6 and B7 is employed to address the pointer counter and achieve a writing in the top storage location, i.e., 228 of the keyboard stack. Succeeding entries from the keyboard which are stored in the stack are stored in the same manner so that the technique of reading the pointer counter and incrementing the address therein prior to storing will sequentially fill the stack with entries from the keyboard and it will be appreciated by those of ordinary skill in the art that this operation may continue for up to 24 keyboard entries or until such time as the stack is full. The reading of the keyboard stack and the processing of information therefrom occurs in a somewhat different manner in that the stack is read on a first in first out basis so that the operation which occurs effectively takes the form of reading the contents of the top location in the stack and upon completion of the reading operation, pushing up the contents of each succeeding storage location in the stack through one address so that the next keyboard entry now occupies the top position in the stack. More particularly, when the processor is available to process new data from the keyboard, it first addresses the keyboard stack to ascertain whether or not information had been stored therein during previous processing operations. This is accomplished, as will be appreciated by those of ordinary skill in the art, by addressing the pointer location within the stack and causing the contents thereof to be read. The contents read from the pointer location, i.e. 23F are then inspected to ascertain whether or not a 27 corresponding to storage location 227 was stored therein. If the contents of the pointer are 27, it will be appreciated that the stack is empty and no information had been stored therein during a previous processing operation. However, if the contents of the pointer stack are not at 27, information has been stored in the stack and hence the same must be processed prior to processing any new information from the keyboard. Under these circumstances, where information is known to reside in the stack, the first character present in the top of the stack, i.e., address location 228 is addressed, read into the main register M and placed in a holding register so that the contents of the stack may be adjusted up one location prior to processing of the information. The stack is adjusted up through an adjustment routine which corresponds to a five instruction do loop.

In essence, the pointer address is read from storage location 23F and again checked to ascertain whether or not the same is at 27. If it does not reside at 27, this address is decremented and written back into the keyboard stack pointer at location 23F so that in essence, the pointer has been decremented. Thereafter, the contents of storage location 229 within the stack are addressed through a CHEM A2IN instruction and this instruction is followed by an M out and decrement instruction so that the character stored in location 229 is read out, loaded into the main register M and the address reflected at the output of the address counter 577 is decremented so as to now address location 28 corresponding to location 228 within the stack. Accordingly, it will be appreciated by those of ordinary skill in the art that the contents of storage location 29 have now been loaded into the main register M while the address reflected at the outputs of the counter 577 has been decremented so that the same is now addressing storage location 28. Under these conditions, an instruction memory in and increment is read to cause the contents of the main register M to be loaded into storage location 28 and thereafter the address reflected by the address counter means 577 is incremented so that the counter means 577 is now addressing storage location 29. Thereafter, an address out and increment instruction is read so that the address for storage location 29 is loaded into the main register M for inspection purposes while the address at the address counter means 577 is incremented so as to cause the same to now address storage location 2A. The address now loaded into the main register M is inspected to ascertain whether or not the same corresponds to 3E which is the last location of the keyboard stack. If the same is not present, the previous five instruction due loop just explained is continued until location 3E is loaded into the main register M to indicate that we have progressed this loop until the end of the keyboard stack has been addressed and the contents therein moved up to storage location 29. Thereafter, the character from the top of the stack may be processed in the normal manner, followed by a checking of the address pointer to see if the same is 27 indicating that the stack has now been emptied. If a 27 results, normal processing from the keyboard may be resumed; however if the address of the pointer stack is not 27, the whole process is repeated followed by an adjustment of the stack until the same has been emptied as indicated by the decremented state of the pointer counter indicating a 27 or a position prior to the first position of the keyboard stack. Thus, in this manner, the keyboard stack is effectively operated in the same manner as a push down stack. The foregoing demonstrates one mode of stack operation within the random access memory 575. The implementation of a circulating stack will be discussed in association with the printer stack operation set forth in conjunction with the flow charts for the high speed print operation.

The discussion of the RAM peripheral set forth above in conjunction with FIG. 11 has rendered it manifest that the same provides a highly versatile, fast adding memory specifically devoted to the purposes the read/write buffer, the read only buffer, and general purpose storage maintained within the third section of the RAM while additional storage therein is available should the same be necessary for additional functions. Thus, although a plurality of independent storage devices may be relied upon to independently achieve the specific functions supplied by the unitary RAM peripheral illustrated in FIG. 11, the illustrative embodiment of the RAM peripheral efficiently achieves all functions required with a minimum of equipment cost. Furthermore, it will be seen that specialized functions such as incrementing addresses may be implemented directly within the RAM peripheral or through the conjoint action of the arithmetic unit and the main register M to achieve highly reliable operation using the most convenient and reliable instruction formats. Thus it will be appreciated by those of ordinary skill in the art that specific exemplary instruction formats set forth may be varied to a great extent to meet choice of design requirements as well as implementation preferences of a designer or programmer. Therefore, it will be appreciated by those of ordinary skill in the art that the functions and implementation of the RAM peripheral set forth herein may be widely varied without deviation from the basic concepts set forth within the instant invention.

PROGRAM TIME DELAY

A preferred embodiment for the program time delay indicated by the dashed block 16A in FIG. 2 is shown in detail in FIG. 12. The function of the program time delay peripheral illustrated in FIGS. 2 and 12 is to provide the availability of real time delay intervals within the automatic writing system according to the instant invention so that the same may be employed for such functions as timing the length of gaps on the record media so that end of record, block, and intraline gaps as explained in detail in U.S. application Ser. No. 429,479, may be ascertained through a timing of an interval in which no flux transitions occur. Additionally, real time delays are necessary to the programmed function of the instant invention to ascertain intervals since the last keyboard entry has been made so that artificial escapement to accommodate the operator may be initiated, in loading card embodiments of the instant invention to ensure that a card has been properly loaded, in processing functions associated with the turning off of the skip key if no function initiation has occurred as well as in searching functions or in the provision of audible or visual operator indicia for predetermined intervals of time. Although the real time intervals necessary to the provision of these timing functions could have been provided by the establishment of various counter routines within available memory, the great number of real timing functions within the instant invention has rendered the provision of the program time delay peripheral 16A a highly expedient design feature. The program time delay indicated by the dashed block 16A within FIG. 2 is independently connected to the common data bus 19, the common instruction word bus 20 and the common status bus 21 and hence, is best treated for the purposes of explanation as an independent peripheral even though its dedicated manner of utilization and the manner in which its functions are completely tied to the program would technically render it a part of the microprocessor indicated by the dashed block 16 per se. Accordingly, although the program time delay indicated by the dashed block 16A is herein discussed as an independent peripheral, it will be appreciated by those of ordinary skill in the art that for the purpose of appreciating the architecture of the instant invention the same is more properly classifiable as a portion of the microprocessor 16 and for this reason, the dashed block 16A has been given a numerically related annotation.

Referring now to FIG. 12, it will be seen that the exemplary program time delay peripheral illustrated therein principally comprises a timer function decode circuit indicated by the dashed block 660, a half-second delay counter 661, a two millisecond (2ms) delay counter 662 and a delay status multiplexer means 663. The timer function decode circuit indicated by the dashed block 660 comprises a plurality of AND gates 664 - 667 which act in a manner which will now be apparent to those of ordinary skill in the art to decode the ROM bits issued in each instruction conveyed on the common instruction word bus and to provide enable or load levels to th half second delay counter 661 and the 2ms delay counter 662 upon a decoding of appropriate instructions. More particularly, the AND gate 664 is a conventional three input AND gate which acts to provide a high level output only when each of the three inputs thereto go high. The input to AND gate 664 on conductor 668 as indicated by the annotations associated therewith receives a decode of the ROM bits in an instruction which basically acts to define the peripheral per se. This decode of an instruction applied to the terminal 668 goes high for instructions containing ROM bits $B_{15}-B_6$, $B_3$ and $B_2$ in a Zero (0) condition and ROM bit $B_0$ in a One (1) condition, during an interval when clock phases CC and CB are low which define the clock subphase intervals 5, 6 and 7 within the eight (8) phase system clock. This ROM bit decode, it will be recalled, is the same decode of instructions employed in the addressing of the printer data ROM peripheral indicated by the dashed block 14 in FIG. 2 and in actual embodiments of the instant invention since neither the program time delay peripheral 16A or the printer data ROM peripheral 14 employs sufficient circuitry to occupy a complete card, both peripherals may be formed on a single card which is thus addressed by a common instruction decode. Accordingly, it will be seen that conductor 668 goes high during clock phases 5, 6 and 7 in an instruction wherein ROM bits $B_{15}-B_6$, $B_3$ and $B_2$ are in a Zero (0) state while ROM bit $B_0$ is in a One (1) condition. A second input to AND gate 664 on conductor 669 receives a decode of clock subphase CA when the same is low and hence, conductor 669 is high during clock subphase $\overline{CA}$. The ANDing of clock phase $\overline{CA}$ with clock phases $\overline{CC}$ and $\overline{CB}$ as contained in the basic instruction decode acts to reduce the interval during which AND gate 664 may go high to clock phases 6 and 7 rather than clock phases 6, 7 and 8 as available from the basic P ROM decode on conductor 668. The third input to AND gate 664 as applied thereto on conductor 670 is connected to a terminal annotated $B_1$ and hence, as will be appreciated by those of ordinary skill in the art receives the condition of ROM bit $B_1$ in each instruction issued and the decoding arrangement for AND gate 664 as thus established is such that instructions containing the basic program time delay and printer data ROM decode are directed to the program time delay portion of the card employed only when such instructions contain ROM bit $B_1$ in a One (1) condition. Accordingly whenever an instruction issues with ROM bits $B_{15}-B_6$, $B_3$ and $B_2$ in a Zero (0) condition and ROM bits $B_1$ and $B_0$ in a One (1) condition, the output of AND gate 664 will go high for the clocking interval defined by clock phases 5 and 6. The output of AND gate 664 is coupled through conductor 671 to a first input of AND gate 665.

The AND gate 665 may take the conventional form of AND gate previously described herein, which in this case provides a high or gating output level on conductor 672 only when both of the inputs thereto are high. A second input to AND gate 665 receives the condition of ROM bit $\overline{B_5}$ and hence the output of AND gate 665 will go high during clock phases 5 and 6 of an instruction directed to the program time delay peripheral if ROM bit $B_5$ in that instruction is low. The output of AND gate 665 is connected through conductor 672 to a common input of AND gates 666 and 667. The AND gate 666 and 667 act upon a further decoding of the instruction being issued to ascertain whether or not the half second delay counter 661 or the 2ms delay counter 662 is to be loaded.

More particularly, AND gate 666 and 667 both act to decode the condition of ROM bit $B_4$ in an instruction which results in the output of AND gate 665 going high and depending upon the condition of ROM bit $B_4$ will cause an enable level or properly timed load level to be applied to one of the counters 661 and 662 so that a counting interval may be loaded from the common data bus 19 thereinto. Thus, AND gate 666 receives the condition of ROM bit $B_4$ at the second input thereto and hence, for instructions resulting in a high level on conductor 672 wherein ROM bit $B_4$ is in a Zero (0) condition, the output of AND gate 666 will go high on conductor 673 to cause a new count down level to be loaded into the 2ms delay counter 662 and a clearing of a latch which gates the previous state of the 2ms delay counter 662 to the delay status multiplexer 663. Similarly, for instructions resulting in a high level on a conductor 672, the input of AND gate 667 as applied to conductor 674 will go high whenever that instruction contained ROM bit $B_4$ in a high condition.

The output of AND gate 667 is connected through conductor 674 to a load input of the half second delay counter 661. The half second delay counter 661 may take the conventional form of a four bit up/down counter, such as an SN 74193 counter available from Texas Instrument Corporation. In the instant embodiment of the present invention, the counter is employed solely in a count down mode and hence, its count up input would be disabled in the conventional manner. The half second delay counter 661 acts in response to a load input on conductor 674 to load a count state delivered thereto from the common data bus at inputs A - D and thereafter will act to count down the state of the input in response to count impulses provided to the CD input thereof and upon a decrementing of the loaded count to Zero (0) will generate a high level indicative of this state at the borrow output thereof (BOR). Accordingly, whenever a load input is provided by the output of AND gate 667 on conductor 674, the half second delay counter 661 will act to load whatever four bit set of inputs are presented at the inputs A - D thereof. The A - D inputs to the half second delay counter 661 are connected through conductors 675–678 to respective bit conductors $DB_0-DB_3$ on the common data bus as plainly indicated in FIG. 12. Thus it will be seen that whenever a load input is applied to conductor 674, the bit content on the low order four bits of the common data bus 19 will be loaded through conductors 675–678 into the half second delay counter 661, it being appreciated by those of ordinary skill in the art that whatever this instruction has been issued by the read only memory 80, an appropriate constant will have been placed into the main register M from the read only memory 80 in a previous instruction to establish a count cycle of appropriate duration within the half second delay counter 661.

Once the appropriate state of the count has been loaded into the half second delay counter 661, the count state loaded will be counted down in response to count down pulses applied to the count down input (CD) of the half second delay counter 661. The count down input to the half second delay counter 661 is connected through conductors 679, 681, 683, 687 and 686 as well as the inverter 680, OR gate 682, and frequency division networks 684 and 685 to a terminal annotated 1khz Delay Oscillator which is connected, as will be apparent from the annotation, to a free running delay oscillator which provides a 1khz signal, more exactly a 1.04khz signal, to the input conductor 686. Thus, once the state of the count is set within the half second delay counter 661, the half second delay counter 661 is responsive to the negative going trailing edge of count down pulses, to decrement the state of the count therein each time a count down pulse is received on conductor 679 and to provide a borrow output when the state of the count has been decremented to Zero (0). The 1khz signal provided on input conductor 686 is divided down by the frequency division networks 685 and 684 to provide pulses having a repetition rate of one half a second or 500ms on conductor 683.

Each time one of these pulses is generated at the output of the frequency network 684, it is applied through the OR gate 682 and through inverter 680 to conductor 679 whereupon the negative trailing edge of the pulse produced will act to cause the half second delay counter 661 to decrement by one the state of the count therein. The 1khz signal applied on conductor 686 is initially divided into a 500hz signal by the frequency division network 685 which may take the form of a conventional flip flop which is set and re-set in the conventional manner by each pair of pulses applied thereto so as to provide an output on conductor 687 which is generated at a repetition rate of 500 cycles. This 500 hz signal is then applied through conductor 687 to the frequency division network 684, which, as indicated in FIG. 12, may take the conventional form of an eight (8) bit counter which acts in the traditional manner to count 256 input pulses and upon reaching a state of the count equal to 255 will produce an output on conductor 683. This means, that the 500 hz. signal provided at the input of the frequency division network 684 is effectively divided by 256 in the well known manner so that a 2hz signal is generated at the output thereof and applied to conductor 683 whereupon the count down pulse is provided to the half second delay counter 661 at a rate equal to one pulse for each 500ms or each half second. The pulses applied to conductor 683 are gated through the OR gate 682 and through an inverter 680 so that when a pulse is being applied to conductor 683, the output of OR gate 682 is high and the output of inverter 680 on conductor 679 is low whereupon the half second delay counter 661 will decrement upon the termination of the pulse generated by the frequency division network 684. Thus, once a selected count has been loaded into the half second delay counter 661, the borrow output of the counter on conductor 687 wil go low and stay low until the state of the count is decremented to Zero (0) while actual decrementing of count within the half second delay counter 661 occurs as a function of the number of count down pulses applied to conductor 679 at a 500ms rate. When the state of the half second delay counter 661 has been decremented to Zero (0) the borrow output thereof connected to conductor 687 will go high to provide a status indication to the delay status multiplexer 663. Additionally, this high is applied through conductor 688 to the second input of OR gate 682 where the output thereof is locked in a high position and the output of the inverter and hence, the level at the countdown input to the half second delay counter 661 is clamped at a low level to prevent the application of further countdown pulses, which here take the form of a negative trailing edge, due to the action of the frequency division network 684 and 685 in response to the oscillator signal provided on conductor 686. This means, as will be appreciated by those of ordinary skill in the art, that once a state of the count has been loaded and subsequently decremented to Zero (0) at a half second rate, a borrow signal will be generated on conductor 686 to indicate a timing out of delay interval set while this same borrow signal acts to block out a further decrementing of the half second delay counter 661 and hence an alteration in the condition of the borrow output until a new state of the count has been loaded therein. Accordingly, it will be appreciated by those of ordinary skill in the art that the half second delay counter means 661 may be set with a condition to be counted as a function of the count condition set on the low order four bits of the common data bus and the same employed to generate a signal indicative of the timing out of the rather lengthy intervals enabled thereby on the common status bus as the borrow input to the delay status multiplexer 663 may be gated thereto in a manner to be described below.

The output of the AND gate 666 within the common function decoder circuit 660 acts to control the operation of the 2ms delay counter 662 in much the same manner as the output of the AND gate 667 controls the operation of the half second delay counter 661. More particularly, the output of AND gate 666 is connected through conductor 673 and 689 to the input of an AND gate 690 and the reset input to a latch 691. The function of the latch 691 as shall be seen below, is to latch the borrow output from the 2ms delay counter 662 as a status input to the delay status multiplexer 663 until a new count condition has been loaded. Therefore, the output of AND gate 666 which is employed to cause the loading of the 2ms delay counter 662 is also employed to reset the latch 691 so that a previously generated borrow output from the 2ms delay counter 662 may be cleared. The AND gate 690 functions to generate a load input to the 2ms delay counter 662 each time a load input is generated at the output of AND gate 666; however, this input to AND gate 690 is ANDed with a clock subphase CD of the four phase clock to restrict the generation of a load pulse at the output of AND gate 690 to clock subphase interval 5. Thus, as it will be recalled that the interval during which the AND gate 660 may go high occurs during clock phases $CL_5$ and $CL_6$, the input to AND gate 690 connected to the terminal CD acts to restrict the high level generated at the output of AND gate 666 and applied thereto through conductor 689 to an interval limited only to clock phase CL5. Thus, whenever a high level resides on conductor 689, the AND gate 690 will generate a high on the output thereof connected to conductor 692 which connects to the load input of the 2ms delay counter 662. The 2ms delay counter 662 may comprise any conventional form of eight (8) bit counter and in fact may be formed by a pair of conventional 74 193 counter chips available from the Texas Instruments Corporation, interconnected in such manner that the borrow output of one chip is connected to the countdown input of the other chip so that an eight (8) bit counter results from the interconnected pair of four bit counters. Thus it will be appreciated that the 2ms delay counter 662 is highly similar to the half second delay counter 661 except that the same is adapted to receive an eight (8) bit input at terminals A – D whenever the load input is pulsed while acting in the same manner as the half second delay counter 661 to decrement the state of the count therein each time a negative going edge is applied to the count down (CD) input thereof and generating a borrow signal at the borrow output (BOR) thereof when the state of the count therein has been decremented to Zero (0). The data inputs A – D of the 2ms delay counter 662 are connected, as plainly indicated in FIG. 12, directly to the eight individual bit conductors of the common data bus 19 so that an eight (8) bit character representative of the count to be timed out at 2ms intervals may be directly loaded wherein after the same have been read as constants from the read only memory 80 and loaded into the main register M. Similarly, the count down input to the 2ms delay counter 662 is connected through conductor 693 to the output of the frequency division network 685.

Thus, as it will be recalled that the frequency division network 685 receives a 1khz input and in response thereto generates a 500hz output, it will be seen that pulses are applied through conductor 693 to the count down input of the 2ms delay counter 662 at a rate of one pulse each 2ms. Thus, the 2ms delay counter 662 has the state of the count decremented at a rate of 2ms and thus acts to count down any count condition loaded from the common data bus 19 at this rate and generate a borrow output at the terminal BOR whenever the state of the count therein has been decremented to Zero (0).

The borrow output of the 2ms delay counter 662 is connected through conductor 694 to the set input of the latch 691. The latch 691 may take the conventional form of a flip flop or other well known form of latch device which acts in response to a high level on conductor 694 to be set and thus produce a One (1) at the output thereof connected to conductor 695 whenever the said input thereof is high and to retain this condition until the latch is reset. The output of the latch 691 is connected through conductor 695 to a status input of the delay status multiplexer means 663 where the same, as shall be seen below, may be selectively gated onto the common status bus to indicate the expiration of a predetermined delay interval set into the 2ms delay counter. Thus, it will be appreciated by those of ordinary skill in the art that once an interval has been set into the 2ms delay counter 662 and counted down to Zero (0), a borrow level is generated on conductor 694 and latched by the latch means 691 so that the same is maintained available at a status input to the delay status multiplexer 663. When a new delay interval to be timed out by the 2ms delay counter 662 is loaded therein by one generation of a output on conductor 673 and 689, this same load input is applied to the reset input of the latch means 691 to reset the same and hence clear the status conditions on conductor 695. Accordingly, it will be appreciated that the half second delay counter 661 and the 2ms delay counter 662 act to provide the instant invention with the capability of providing real time delay intervals through which both long and short delays may be set and timed out to ascertain the presence of gaps on the record media, proper loading of cards, absence of action at the keyboard for predetermined intervals and suitable other desireable timing intervals required at periodic intervals by the program in process.

The delay status multiplexer 663 may take the conventional form an eight (8) input, single output multiplexer device such as has been described in association with each peripheral heretofore disclosed. Thus, the delay status multiplexer 663 may take the conventional form of a SN 74151 multiplexer device, as available from Texas Instrument Corporation which acts in the well known manner to gate a status input defined by one of the select inputs thereto to the output thereof connected to the common status bus whenever a strobe level is applied thereto. In the instant case, the select inputs plainly indicated in FIG. 12 are connected to terminals associated with ROM bit conditions $B_4$ – $B_6$ in the same manner as each multiplexer device employed within the instant invention so that the status conditions of ROM bits $B_6$ – $B_4$ define which of the select inputs thereto are to be gated onto the common status bus. Similarly, the delay status multiplexer 663 is strobed as a function of the occurrence of a low at the output of NAND gate 695 which occurs in response to a decoding of instructions having ROM bit $B_8$ in a Zero (0) condition while ROM bits $B_7$ and $B_1$ are in a One (1) condition. Thus, whenever a strobe pulse is provided on conductor 696 a status input defined by select ROM bits $B_4$ - $B_6$ is gated to the output of the delay status multiplexers 663 on conductor 696 and from this conductor onto the common status bus 21.

Although eight status inputs are available at the delay status multiplexer 663 only six of the available status inputs are employed and hence, should the testing of oscillator inputs or the like, as utilized to provide visual or audible indications to the operator be desired, the testing of such inputs and selective application thereof to the common status bus may be here achieved. The first two status inputs provided to the delay status multiplexer 663, as previously described, are provided as a function of the outputs of the half second delay counter 661 and the 2ms delay counter 662 to indicate a timing out of the delay condition established therein. More particularly, the borrow output of the half second delay counter 661 is applied to the delay status multiplexer 663 through conductor 687 and as the same is effectively latched by the action of OR gate 682 and inverter 680 as aforesaid, this condition, once established, is available, as an input to the delay status multiplexer 663 for selective gating onto the common status bus until a new delay condition is loaded into the half second delay counter 661. Similarly, the latched borrow output of the 2ms delay counter 662 is applied to the appropriately annotated input of the delay status multiplexer 663 through conductor 685 and hence, whenever a delay interval set into the 2ms delay counter 662 has timed out, this condition is indicated on conductor 695 and hence is available as a gated condition on the common status bus until a new interval is loaded into the 2ms delay counter 662.

The remaining status inputs to the delay status multiplexer 663 are provided on conductors 697 through 700. More particularly, the status of the 500 hz oscillator associated with the output of the frequency division network 685 is applied through conductor 697 to a status input of a delay status multiplexer 663 so that the operative condition thereof may be periodically tested on the status bus in the various monitoring operations conducted by the microprocessor acting under program control. The status condition applied to the delay status multiplexer 663 on conductor 698, as annotated repeat CMD is an indication that a repeatable key has been depressed and held depressed for a sufficient interval to cause the program to repetitiously repeat the character indication thereof. This repeat command is generated at the keyboard interface illustrated in FIG. 10 and hence is applied to the delay status multiplexer 663 for selective application to the common status bus as an available input is here presented. Similarly, the input to the delay status multiplexer 663 on conductor 699 is connected to a terminal annotated PS and is indicative that a proportional spaced printing mode has been selected at the keyboard. This indication is generated at the keyboard in the same manner as the ten pitch and twelve pitch status inputs described in conjunction with the keyboard interface illustrated in FIG. 10 but is here provided to the delay status multiplexer 663 due to the availability of the input. Finally, a write oscillator input is provided to the delay status multiplexer 663 through input conductor 700. This input is indicative that the write oscillator is operative and enabled. The write oscillator as will be appreciated by those of ordinary skill in the art is applied at read/write transport during a write operation to provide appropriate bias for the writing of digital information on the record media. Therefore, prior to a write operation, the write oscillator is gated to the head and the appropriate availability thereof is gated through the delay status multiplexer 663 to the common status bus 21 so that the same may be tested prior to actually enabling a write operation. Accordingly, it will be appreciated that the delay status multiplexer 663 serves to provide on a command basis, indications as to whether the timing intervals which may be established on a real time basis in the program time delay peripheral illustrated in FIG. 12 has timed out as well as enabling the sampling of the condition of the 500 hz oscillator, the repeat command, the proportional space mode select key and the write oscillator on the common status bus. Additionally, it will be appreciated that the remaining available inputs to the delay status multiplexer 663 may be employed to selectively gate other desired conditions onto the common status bus 21 should additional status conditions be desired and such status conditions may take the form of operator indica or driving circuits therefor.

RECORD MEDIA TRANSPORT STATIONS

The portions of the automatic writing system according to the present invention which have been heretofore described have rendered it apparent that whenever character information, whether it be presented from the keyboard, the read only or read/write record media transport stations, the read only buffer 36 or other peripherals which could be employed in connection with the instant invention, is accumulated in the read/write buffer 35 until a full line of information corresponding to a line of information printed on a document has been received thereby. Thereafter, the read/write record media transport station is energized, the record media thereat is brought to speed, and character information is applied on a per character basis from the read/write buffer 35 to the main register M and subsequently gated back onto the common data bus 19 for application to the read/write record media station so that the entire accumulated contents of the read/write buffer 35 are recorded on the record media in a serial manner and on a per line basis. Thus, each time a line of information is accumulated in the read/write buffer 35 the record media is brought to speed and a line of character information is recorded in a serial manner thereon prior to the stopping of the record media to await the new accumulation of a line of information in the read/write buffer 35.

THE RECORD MEDIA WRITE APPARATUS

In the embodiments of the automatic writing system depicted in FIG. 2, only a single read/write station has been illustrated even though a plurality of such stations could be employed in the instant invention. A typical embodiment of record media write apparatus which may be employed to record the character information forwarded to the read/write station is shown in FIG. 13, which schematically illustrates record media write apparatus suitable for use in the embodiment of the automatic writing system depicted in FIG. 2. More particularly, the exemplary embodiment of the record media write apparatus shown in FIG. 13 comprises a parallel to serial converter 750, counter means 751, a digital encoder 752 and a write head 753 which may be a part of a composite read/write head as will be readily appreciated by those of ordinary skill in the art. The parallel to serial converter 750 may comprise a conventional parallel in, serial out eight (8) bit shift register such as a conventional SN 74165 chip conventionally available from the Texas Instrument Corporation. The parallel to serial converter 750 acts in the conventional manner to accept an eight (8) bit parallel input whenever a load input is received thereby and to provide an eight (8) bit serial output in response to clock pulses which act to shift each of the eight (8) bits loaded therein to the output thereof. The eight parallel data inputs to the parallel to serial converter 750 are connected, as indicated in FIG. 13, to the conductors annotated $DB_0$ - $DB_7$ and hence through the individual bit conductors in the eight (8) bit data cable 57, shown in FIG. 2, to the individual data conductors within the common data bus 19. Therefore, as will readily be appreciated by those of ordinary skill in the art, the eight (8) parallel inputs to the parallel to serial converter 750 are connected to the common data bus 19 in such a manner as to have each bit of any eight (8) bit character applied to the common data bus 19 applied thereto and hence, available for loading in parallel into the eight stages thereof should a load pulse be applied to the parallel to serial converter 750. The load input to the parallel to serial converter 750 is applied through conductor 754 from the output of AND gate 755 and acts in the well known manner to gate any character applied to the data inputs of the parallel to serial converter 750 into the eight (8) stages thereof. Accordingly, the load input to the parallel to serial converter 750 acts as a gating input therefor and hence, the eight (8) parallel inputs thereof may be connected directly through the eight (8) bit data cable 57 to the individual bit conductors within the common data bus 19 without the need to provide individual gates therefor.

The AND gate 755 may take the form of a conventional AND gate which acts in the well known manner to produce a high level output when all of the inputs thereto are high while producing a low level output whenever any of the inputs thereto are low. Thus, when all of the inputs to the AND gate 755 are high, a high level output will be produced thereby and applied through conductor 754 to the load input of the parallel to serial converter 750 whereupon character information then present on the data input conductors $DB_0$ - $DB_7$ will be loaded in parallel thereinto. A first input to the AND gate 755 is applied on conductor 756 and takes the form of a clock input which may be supplied by either a conventional clock pulse generator or the system clock. The clock input applied on conductor 756 may be viewed as taking the form of an ANDing of clock subphases CA and $\overline{CB}$ to thereby produce a one hundred twenty-five nanosecond (125 n sec) pulse during clock subphase $CL_7$ and hence acts to time the load input applied to the parallel to serial converter 750 in such a manner that the load input is produced only during the last clock subphase of the instruction cycle during which eight (8) bit data characters from the main register M would normally be expected to be applied to the common data bus 19 for application to the parallel to serial converter 750. A second input to the AND gate 755 is applied through conductor 757 and takes the form, as indicated in FIG. 13, of a command strobe issued by the read only memory 80. The command strobe applied on conductor 757 is essentially a load as data is applied command which results from a decoding of selected ROM bits contained in each instruction issued by the read only memory 80. The command strobe results from a conventional decoding of ROM bits $B_{15}$ – $B_8$ wherein ROM bits $B_{12}$ – $B_{15}$ represent the modular 2 address of all record media transports employed within the automatic writing system according to the present invention while ROM bits $B_8$ – $B_{11}$ represent qualifiers employed to uniquely designate the read/write transport as the particular transport to be energized as well as defining information relied upon to designate enable levels to the write electronics. In addition, an aspect of the active reader command is also decoded within the command strobe logic so that the result thereof is that the read/write record media transport and associated electronics are addressed and enabled. The decoding arrangement employed to decode the command strobe as present within given instructions from the read only memory 80 may again take the form of a conventional array of AND gates as described in association with other decoding arrangements for ROM bits utilized to selectively initiate the operation of designated ones of the peripherals employed within the instant invention. Thus, as will be appreciated by those of ordinary skill in the art, the block annotated COMMAND STROBE connected to conductor 757 may be considered to comprise a logical decoding network which connects through the sixteen (16) bit instruction word cable 65 and the cable 59 to the common instruction word bus 20 and more particularly, to the individual bit conductors therein associated with ROM bits $B_8$ – $B_{15}$. The remaining input to AND gate 755 is applied on conductor 758 and, as indicated in FIG. 13, reflects the condition of ROM bit $B_5$ as read in each instruction cycle of the read only memory 80. This ROM bit is a qualifier bit for the command issued which here acts, in essence, to enable the write section of the circuitry associated with the read/write record media transport rather than the read section thereof. The conductor 758, as will be appreciated by those of ordinary skill in the art is directly connected through cables 59 and 65 to the common instruction word bus 20 and more particularly to the individual bit conductors therein devoted to ROM bit $B_5$. Therefore, the ONE (1) or ZERO (0) condition of ROM bit $B_5$ as read in each instruction from the read only memory 80 is directly reflected thereat. Thus, whenever a command strobe is decoded from an instruction issued by the read only memory 80, and such instruction includes a ONE (1) in bit position $B_5$, a load input will be applied through conductor 754 from the output of AND gate 755 to the load input of the parallel to serial converter 750 for the duration of the clock pulse applied on conductor 756. During this interval, any eight (8) bit character applied from the main register M to the common data bus 19 and hence, present on conductors $DB_0$ – $DB_7$ will be loaded in parallel into the parallel to serial converter 750 and in this manner the contents of the common data bus 19 are selectively gated into the parallel to serial converter 750 present within the read/write record media station. Thus, the selectively timed and enabled load input to the parallel to serial converter 750 acts to selectively enable the inputs thereto to be loaded in parallel theretinto whereupon character information may be selectively applied from the main register M through the common data bus 19 and loaded in parallel into the parallel to serial converter 750.

As each character loaded into the parallel to serial converter 750 from the common data bus 19 is received in parallel, it must be read out in series and forwarded to the write head for recording purposes. In the instant shift register configuration once a character has been loaded therein, the same may be read out in series by applying a number of shift pulses thereto equal in number to the number of bits in the character loaded. In the instant case of the parallel to serial converter 750, it will be readily appreciated by those of ordinary skill in the art that as each character is loaded in parallel from the common data bus 19, a sequence of eight (8) shift or clock pulses must be applied to the parallel to serial converter 750 so that this character may be read out in series therefrom prior to the insertion of a new eight (8) bit character from the common data bus 19. Shift pulses for reading character information from the parallel to serial converter 750 are applied to the clock input through conductor 759. Thus, as will be appreciated by those of ordinary skill in the art, the contents of the parallel to serial converter 750 will be advanced one bit position with each clock pulse applied to conductor 759 and hence, after eight (8) clock pulses have been applied thereto the previous character inserted in parallel therein will have been read therefrom in series whereby the parallel to serial converter 750 is again in a condition to accept new character information in parallel from the common data bus 19. The conductor 759 is connected, as indicated in FIG. 13, to the output of AND gate 760 which provides a clock or shift input thereto. The AND gate 760 may take the same form as AND gate 755 except that only a two input device is employed and hence AND gate 760 acts in the well known manner to produce a high level output when both of the inputs thereto are high while producing a low level output when either of the inputs thereto are low. A first input to AND gate 760 is applied through conductor 761, as indicated in FIG. 13, to a source of clock pulses employed for the write clock while the conductor 762, as further indicated in FIG. 13, is connected to a write enable input which may be derived as a function of decoded ROM bits in the instructions issued by the read only memory 80 or alternatively, as will be apparent to those of ordinary skill in the art, may be derived as a function of the condition of the digital encoder 752. Thus, whenever the enable level applied on conductor 762 is high, the write clock applied on conductor 761 will be gated through AND gate 760 and applied to conductor 759 to act as a shift pulse source for the parallel to serial converter 750; however, whether or not the AND gate 760 acts to directly gate the write clock pulses applied on conductor 761 to the output thereof, or is further utilized to modify the timing thereof as a function of the enable level on conductor 762 will vary in accordance with the choice of a designer thereof as well as the technique employed in deriving the enable level applied to conductor 762. In any event, the AND gate 760 may be viewed when enabled as applying twenty-five (25) kilohertz clock pulses to conductor 759 whenever it is in an enabled condition although this frequency may be widely varied to meet design and record media requirements and it will be appreciated by those of ordinary skill in the art, that the enable level applied on conductor 762 may be relied upon to merely enable the AND gate 760 so that the write clock applied on conductor 761 is gated to the output thereof or alternatively may be utilized to further modify by way of division or multiplication the frequency associated with the write clock applied to the conductor 761. Therefore when the AND gate 760 is enabled a twenty-five kilohertz (25 Khz) clock will be applied through conductor 759 to the clock input of the parallel to serial converter 750 and the receipt of eight (8) of such clock pulses on conductor 759 will act in the conventional manner to shift a previously loaded eight (8) bit character in series to the output thereof whereupon the parallel to serial converter 750 is again in a condition to receive a new eight (8) bit character in parallel from the common data bus 19.

Each shift pulse applied to the clock input of the parallel to serial converter 750 through conductor 759 is also applied, as indicated in FIG. 13, through conductor 763 to the input of the counter means 751. The counter means 751 may take the form of a conventional binary counter, such as an SN 7493 MSI counter chip available from the Texas Instrument Corporation, which here acts as a divide by eight counter to produce an output pulse for each eight (8) input pulses received thereby. Thus, as is well known to those of ordinary skill in the art, the counter means 751 will produce an output pulse whenever eight (8) input pulses, which here take the form of clock or shift pulses applied to the parallel to serial converter 750, are applied thereto. In this manner, the counter means 751, will produce an output pulse each time a sufficient number of shift pulses have been applied to the parallel to serial converter 750 to shift an eight (8) bit character therethrough and hence will provide an output level whenever a sufficient number of shift pulses have been applied to the parallel to serial converter 750 to clear the contents thereof and place it in a condition to receive a new character from the common data bus 19. The output of the counter means 751 is connected through conductor 764 to the input of a flip flop 765 and one input of an AND gate 766. The flip flop 765 may take any of the conventional forms of this well known class of devices which act to provide a ONE (1) level at the output thereof when an input is provided thereto while providing a ZERO (0) level at the output thereof when the device is in a cleared condition. Therefore, as will be appreciated by those of ordinary skill in the art, whenever a ONE (1) level resides at the output of the counter means 751, indicating that eight (8) shift pulses have been counted thereby, the flip flop 765 will be in a set condition to provide a high logic level at the output thereof which is here connected to conductor 767. The clear input to the flip flop 765 is connected through conductor 768 to the output of AND gate 755 on conductor 754. Therefore, as will be appreciated by those of ordinary skill in the art, the flip flop 765 will be placed in a cleared condition whenever the output of AND gate 755 is high while once a cleared state is present, the flip flop 765 may be set to produce a ONE (1) level on the output conductor 767 whenever the state of the counter 751 is such that eight (8) shift pulses have been counted thereby. Thus, as it will be recalled that the output of AND gate 755 will go high whenever an eight (8) bit data character from the common data bus 19 is loaded into the parallel to serial converter 750, while the output of the counter means 751 goes high whenever eight (8) shift pulses have been applied to the clock input of the parallel to serial converter 750, it will be seen that the flip fop 765 is placed in a cleared condition whenever an eight (8) bit data character is loaded into the parallel to serial converter 750 from the common data bus 19 and the flip flop 765 is placed in the set condition whenever that output character has been completely shifted through to the output of the parallel to serial converter 750. The flip flop 765 thereby acts as a flag to provide a ONE (1) level at the output thereof whenever the state of the parallel to serial converter 750 is such that a new data character may be inserted therein while a ZERO (0) is provided whenever an eight (8) bit data character has been inserted in parallel into the parallel to serial converter 750 and is being shifted therethrough or is in any other condition wherein the insertion of new information would cause the destruction of a previously inserted character which has not been fully processed.

The output of the flip flop 765 as applied to conductor 767 thus provides a status indication as to the condition of character information being processed in the parallel to serial converter 750. This status condition, as indicated on conductor 767, is applied to the common status bus 21 in a manner to be further described in conjunction with FIGS. 15A and 15B. Here, however, it is sufficient to appreciate that a ONE (1) level is provided whenever new information from the common data bus 19 may be inserted into the parallell to serial converter 750 while a Zero (0) level is provided at the output thereof on conductor 767 when new character information may not be presented to the parallel to serial converter 750. Accordingly, the flip flop 765 is placed in a clear condition whenever character information from the common data bus 19 is inserted into the parallel to serial converter 750 by the application of a load pulse thereto through conductor 768 and is subsequently placed in a set state after eight (8) shift pulses have been applied to the parallel to serial converter 750 as indicated by an output from the counter 751 on conductor 764. Similarly, the counter means 751 is reset each time eight (8) shift pulses have been counted thereby or alternatively each time an eight (8) bit data character has been loaded from the common data bus 19 into the parallel to serial converter 750. The resetting of the counter means 751 is accomplished in the conventional manner by the application of a One (1) level to the clear input thereof as plainly indicated in FIG. 13.

For the purposes of resetting in response to the loading of an eight (8) bit data character into the parallel to serial converter 750, the output of the AND gate 755 is applied through conductor 768 to the input of an OR gate 769. The OR gate 769 may comprise a conventional logic device of this well known class which acts in the usual manner to produce a high level at the output thereof whenever either of the inputs thereto are high. Thus, as one input to OR gate 769 is connected through conductors 770 and 763 to the output of the AND gate 755, which as will be recalled produces the load pulse for the parallel to serial converter 750, it will be appreciated by those of ordinary skill in the art that the counter means 751 is placed in a cleared condition each time a character is loaded into the parallel to serial converter 750 so that the shift pulses counted by the counter means 751 initiate the incrementing of the counter in such a manner to correspond to the shifting of new character information through the parallel to serial converter 750. In addition, the contents of the counter means 751 are cleared each time eight (8) shift pulses have been applied thereto and more particularly at an instant which corresponds to the application of the ninth shift pulse thereto so that the contents thereof are automatically cleared to initiate a new counting cycle. This function is accomplished by the AND gate 766 which may take the form of a conventional AND gate which acts in the well known manner to produce a high level output each time both of the inputs thereto are high. The output of the AND gate 766 is connected through conductor 771 to the second input of OR gate 769 and hence, whenever the output of AND gate 766 goes high, a high level output will be applied by the OR gate 769 to the clear input of counter means 751.

A first input to the AND gate 766 is connected through conductor 772 to the output of the counter means 751 through conductor 764. The second input to the AND gate means 766 is connected through conductor 773 to the output of the AND gate 760 on conductor 763 so as to receive each shift pulse applied therefrom to the input of the counter means 751. This arrangement results, as will be readily appreciated by those of ordinary skill in the art in the clearing of the counter means 751 upon the application of the ninth shift pulse to the counter means 751 because after eight (8) shift pulses have been applied to the counter means 751 a high level will reside at the output thereof and hence, on the input to AND gate 766 on conductor 772. Therefore, when the next shift pulse is applied to the counter means 751 on conductor 763, the second input to AND gate 766 connected to conductor 773 will go high causing the output thereof to go high thereof causing the OR gate 769 to apply a high level output to the clear input of the counter means 751 to place the same in a cleared condition. This means that the counter means 751 will be placed in a clear condition either upon the application of the ninth shift pulse in a given series to the counter means 751 or when a new character is loaded into the parallel to serial converter 750 by the application of a load pulse thereto by the AND gate 755. Thus, in this manner, the counting operation of the counter means 751 is forced to coincide with the shifting of previously inserted character information through the parallel to serial converter 750 even though a possible error might result with regard to the shifting out of the contents of the parallel to serial converter 750 with respect to a previously loaded character. Therefore, the processing state of character information shifted into the parallel to serial converter 750 and in the process of being transformed into a serial format is fully monitored by the counter means 751 and an indication as to the availability of the parallel to serial converter 750 for the insertion of new character information from the common data bus 19 is reflected at the output of the flip flop 765 as a function of the state of the count in the counter means 751. Accordingly, as each eight (8) bit character from the common data bus 19 is shifted into the parallel to serial converter 750 in parallel and thereafter serially outputted therefrom in response to clock pulses applied to conductor 759, the condition of the information being shifted therethrough is indicated to the common status bus 21 by the write data ready flag set by the flip flop 765.

The output of the parallel to serial converter 750 is applied through conductor 774 to the input of the digital encoder 752. Therefore, as each clock pulse is applied to the parallel to serial converter 750 a bit of information of the eight (8) bit character inserted in parallel into the parallel to serial converter 750 is placed in a serial manner through the conductor 774 to the digital encoder 752. The digital encoder 752 may take any of the well known forms of encoder devices conventionally employed in digital recording techniques to appropriately modify the One (1) and Zero (0) information applied thereto into a form suitable for recording on a magnetic medium or the like. For example, conventional bi-phase, ratio recording, variable pulse width, NRTZ, INRTZ or restore to zero recording techniques may be employed for the serial information to be recorded on the record media and accordingly, the digital encoder 752 would take the conventional form of encoding device well known to those of ordinary skill in the art for modifying the One (1) and Zero (0) bit information applied thereto in series into one of these formats suitable for recording onto a magnetic media. Furthermore differing recording techniques may be used in embodiments of the instant invention employing cassette and magnetic card record media to best suit the recording requirements of that media. Although the precise form of digital encoder 752 selected for use in accordance with the examplary embodiment of the automatic writing system set forth herein is not a part of the instant invention and hence, selection may occur on the basis of designer preference for a particular system it is preferable that inexpensive transports be employed for economy purposes and therefore that the digital encoder selected display characteristics with respect to information to be recorded such that the data encoded there by may be recorded and subsequently recovered with a substantial degree of insensitivity to wow and flutter variations induced by the transport. For this reason, the selection of a digital encoder 752 which would enable the information modified thereby to be accurately recorded within reasonable speed variations of a conventional, low cost record media transport would be preferred. As each bit of information from each character read from the parallel to serial converter 750 is applied to the digital encoder 752 it is encoded in accordance with the encoding technique selected and thereafter applied through conductor 775 to the write head 753 for recording on the record media. The write head 753, as described above, would preferably be part of a composite read/write head wherein the write portion thereof is formed by one gap in a single head and the read portion thereof is formed by a second gap therein located with respect to the write gap in such a manner that data which is written on the record media may subsequently be played back by the read portion thereof when the record media is being displaced in the normal direction in which reading and writing take place. Although not shown in FIG. 13 it will be appreciated by those of ordinary skill in the art that suitable driver and amplifying stages may be interposed in conductors 774 and 775 intermediate the parallel to serial converter 750 and the digital encoder 752 as well as between the digital encoder 752 and the write head 753 so that bit information, either in the form from which it was read from the parallel to serial converter 750 or the digital encoder 752, is raised to appropriate logic levels prior to the encoding and/or recording. In addition, the gap for the write portion of the write head 753 should be selected to exhibit appropriate signal to noise levels and to accept input levels appropriate to the output of the digital encoder 752. Thus, as will be appreciated by those of ordinary skill in the art, each eight (8) bit character applied to the parallel to serial converter 750 is serialized so that an eight (8) bit character in serial format is applied to the digital encoder 752 and is thereafter modified in accordance with the digital recording techniques selected and applied to the write head 753 where the same is recorded on the record media. Although not described in conjunction with FIG. 13, it will be appreciated by those of ordinary skill in the art that prior to the application of character information associated with a given line of data to the parallel to serial converter 750, the read/write record media transport is brought to speed so that the record media is being displaced at the selected recording speed, i.e., twenty inches per second (20 ips) prior to the application of the first character to parallel to serial converter 750.

In the operation of the record media write apparatus depicted in FIG. 13 it will be appreciated from the descriptive portions of this specification set out heretofore that prior to actual recording on the record media, a complete line of information is accumulated in the read/write buffer 35 and aligned therein for output purposes in such manner that the first character inserted will be the first character read. In addition, the same programmed sequence of operation which causes the realignment of the read/write buffer 35 for output purposes will energize the read/write record media station so that the record media upon which recording is to take place is brought to speed prior to the outputting of the first character from the read/write buffer 35. Thereafter, under program control, each character which has been accumulated in the read/write buffer 35 for the now completed line of information inserted at the keyboard or from another peripheral is read on a per character basis through output and step operations from the read/write buffer 35 and is applied through the common data bus 19 to the main register M. As each character is read and applied to the main register M it is inspected as necessary under program control and again returned to the common data bus 19 for application to the write portion of the read/write record media transport and this application of the character onto the common data bus 19 occurs prior to the reading out of the next character from the read/write buffer 35. Each character thus applied to the common data bus 19 for recording purposes is applied to the parallel inputs to the parallel to serial converter 750, annotated $DB_0$ - $DB_7$, and is loaded in parallel thereinto upon the production of a load pulse by the AND gate 755. The load pulse produced by the AND gate 755 will occur, as aforesaid, in response to the receipt of a clock pulse on conductor 756 and a Load As We Load command strobe on conductor 757 which results from a decoding of an appropriate load the parallel to serial converter command read from the read only memory 80 in an instruction where ROM bit $B_5$ is a One (1). The sixteen (16) bit instruction word read from the read only memory 80 to cause the generation of a load pulse by the AND gate 755, as will be more fully appreciated in connection with a description of FIGS. 15A and 15B, results under program control after the common status bus 21 has been sampled while the condition of the flip flop 765 has been gated thereon and hence, the load pulse generated by the AND gate 755 will result from a branch operation which occurs in response to a sampling of the common status bus 21 and the consequent detection of a write data ready flag thereon which causes a branch condition for the ROM address register 81. Thus, among other status conditions which are sampled, the initial eight (8) bit character for a line of information being read from the read/write buffer 35 will only be returned to the common data bus 19 and subsequently gated into the parallel to serial converter 750 in response to an indication from the common status bus 21 that a write data ready flag has been set by the flip flop 765 and this condition will be rechecked for each character read from the main register M as each character is loaded therein from the read/write buffer 35.

Once the initial eight (8) bit data character has been loaded into the parallel to serial converter 750, the AND gate 760 will be enabled whereupon a twenty-five kilohertz (25 Khz) write clock will be applied through conductor 759 to the clock input thereof. As each clock pulse is applied to the parallel to serial converter 750, the eight (8) bit character loaded in parallel therein will be shifted down through one of the eight (8) bit positions therein in such a manner that one bit will be applied to the conductor 774, thereafter encoded in the digital encoder 752 and subsequently applied through conductor 775 to the write head 753 where it is recorded on the record media in the well known manner. In addition, each clock pulse applied to the parallel to serial converter 753 is applied through conductor 763 to the input of counter means 751 to increment the same. As the counter means 751 was placed in a clear condition when the load pulse was generated by the AND gate 755 due to the application of this pulse through conductor 768 and the OR gate 769 to the clear input thereof and in addition as the flip flop 765 was similarly cleared by the application of the load pulse to remove the write data ready flag output on conductor 767, it will be seen that the first shift pulse applied to the parallel to serial converter 750 not only results in the recording of the first bit of information read from the parallel to serial converter 750 onto the record media but in addition thereto results in the incrementing of the counter means 751 and the retention of the flip flop 765 in a cleared condition. Each subsequent shift pulse applied to the parallel to serial converter 750 similarly results in the reading out of one bit of the eight (8) bit character recorded in the parallel to serial converter 750 and the recording of the same on the record media as well as the attendant incrementing of the state of the count of the counter means 751 while the flip flop 765 remains in a cleared condition and this will continue until the eighth shift pulse applied to the parallel to serial converter 750 causes the last bit of the eight (8) bit character loaded therein to be read out and recorded. When this eight bit is thus read out and recorded, the eighth shift pulse applied to the counter means 751 will have incremented the state of the count therein to a state where an output is produced on conductor 764. This output causes the flip flop 765 to toggle placing it in its set state whereupon a One (1) level or write data ready flag again resides on the output conductor 767.

The next shift pulse applied to the conductor 763 will cause the output of the AND gate 766 to go high whereupon the state of the count in the counter means 751 is again cleared by the high produced at the output of the OR gate 769; however, in the previous clock pulse interval, the production of the write data ready flag on conductor 467 would allow the next character to be read from the read/write buffer 35, inserted into the main register M and applied to the common data bus 19 for application to the parallel to serial converter 750 so that the ninth clock pulse would not ordinarily occur but instead a load pulse produced by AND gate 775 for loading the second character would be normally present to clear the contents of the counter means 751. In either event, this operation wherein each character read from the read/write buffer 35 is loaded into the main register M, thereafter loaded in parallel into the parallel to serial convertr 750, subsequently read therefrom in series, encoded and recorded would be maintained on a continuous basis until the entire contents of the read/write buffer 35 were read and the end of the character information therein indicated by the status condition produced by the zero decoder 580. In this manner, the entire contents of the read/write buffer 35 would be recorded in series on the record media at a rate which is consistent with the recording speed for the record media utilized while each character is gated into the parallel to serial converter 750 at a rate controlled by the read only memory 80 responding to the flag conditions set by the flip flop 765 and provided thereto through the common status bus 21. After the last character in the read/write buffer 35 has been recorded, the record media loaded at the read/write record media transport would be stopped to await the new accumulation of additional line information in the read/write buffer 35.

Thus, the record media write apparatus depicted in FIG. 13 responds to sixteen (16) bit instruction words read from the read only memory 80 and eight (8) bit data characters applied to the common data bus 19 from the main register M and applied in parallel thereto to record, on a serial basis, each character of the line of information accumulated in the read/write buffer 35 and this operation occurs at a rate which is consonant with the recording speed and record media selected for the read/write record media transport station. Accordingly, it will be seen that the record media write apparatus depicted in FIG. 13 allows information which is normally propagated through the automatic writing system according to the instant invention on a parallel, per character basis to be recorded on a serial basis on the record media in such a manner that the read/write record media transport is energized and the record media loaded thereat brought to speed prior to the reading of any charaacter information from the read/write buffer 35. Thereafter, each character accumulated in the read/write buffer 35 is applied to the record media write apparatus, serialized, encoded and recorded on the record media by the write head 753 and the rapid rates at which data may be propagated between the read/write buffer 35 and the main register M allow the entire contents of the read/write buffer 35 to be recorded in this manner as if a continuous line of information were being supplied. After the accumulated contents of the read/write buffer 35 have been recorded on the record media in the foregoing manner the recording operation is terminated and the read/write record media transport is stopped so that effectively the only portions of the record media which are not utilized for recording purposes but are wasted due to the need for starting, bringing the record media to speed, as well as stopping the record media at the end of the line of information are the portions thereof which precede and end the line of information recorded.

THE RECORD MEDIA READ APPARATUS

The instant embodiment of the automatic writing system according to the present invention employs, as was previously described, a read/write record media station and a read only record media station wherein each of said record media stations has the capability to read information from a prerecorded record media and apply such information to the common data bus 19 for loading into one of the buffers for processing and subsequent utilization in the instant invention. Furthermore, as will be apparent to those of ordinary skill in the art from the mode of organization relied upon in the instant invention, additional read/write or read only record media stations could be employed to enhance the capabilities of the instant invention with regard to specialized multi-media recording functions or accessing prerecorded information from additional record media for performing specialized merged or batched document functions. In the embodiment of the instant invention described above, it will be appreciated that parallel character conveyancing was employed through the common data bus 19 and in the majority of peripherals in such manner that the instant invention, when viewed from the standpoint of standardized data processing criteria, may be considered to be a parallel organized data processing system. However, although a parallel recording technique could be employed, as will be apparent to those of ordinary skill in the art, the instant embodiment, of the present invention rely upon a serial recording technique as such technique avoids a requirement that a multitrack record media for the recording of lines of information be used and hence enables readily available cassette or card media which are recordable in a serial manner to be employed. A typical embodiment of record media read apparatus which may be utilized in both the read only and read/write record media stations relied upon in the instant invention is illustrated in FIG. 14, it being appreciated by those of ordinary skill in the art that once a suitable record media read system is selected such system would be employed at each record media station where a reading function is performed to standardize the fabrication of the automatic writing system according to the present invention.

The record media read apparatus illustrated in FIG. 14 comprises a read head 780, a digital decoder 781, a serial to parallel converter 782, an eight (8) bit character output gating arrangement 783, an eight (8) bit counter 784 and a flag generator 785. The read head 780 may comprise a conventional magnetic playback head which, as aforesaid, may be formed by an independent gap within a composite read/write head. The read head 780 thus acts in the conventional manner to reproduce One (1) and Zero (0) information which has been prerecorded on a record media when the read head 780 and the prerecorded record media are placed in relative motion with respect to one another. Therefore, as was explained in conjunction with FIG. 13, the prerecorded line information on the record media which was digitally encoded by means of the digital encoder 752 will be read and hence a digitally encoded output waveform will be reproduced by the read head 780 in response to the flux changes detected on the record media as reading proceeds. Furthermore, as will be apparent to those of ordinary skill in the art, since the prerecorded media was recorded on the basis of a line of serial character information which is separated from adjacent lines of serial character information by either independent tracks or interrecord gaps whose length is appropriate for the starting and stopping of the record media transport, the reading operation conducted by the record media read apparatus depicted in FIG. 14 will be such that the actual record media transport will be energized and the record media brought to speed during a portion of the playback interval when the interline interrecord gap underlines the read head 780 or prior to a data portion of a track and thereater, when the record media has reached appropriate playback speed, the entire line of serial recorded character information will be read and subsequently the record media transport will be deenergized.

The digitally encoded serially recorded character information read from the prerecorded media by the read head 780 will be transduced into an electrical waveform characteristic of the serial recorded digitally encoded character information. Thereafter, each bit of digitally .encoded information read by the read head 780 from the prerecorded record media is applied through a driver stage 786 and conductors 787 and 788 to the digital decoder 781. The driver stage 786 may comprise a conventional amplifier or other suitable driver stage which is AC coupled to the output of the read head 780 to reduce spurious outputs therefrom and acts in the well known manner to raise the output signals produced by the read head 780 to suitable logic levels for subsequent processing. The digital decoder 781 may comprise conventional decoder apparatus which acts to perform the inverse functions performs by the digital encoder 752 selected so that the digitally encoded output of the read head 780 as applied thereto through conductor 788 is transformed into a conventional binary signal wherein One (1) information is represented by a first logic level and Zero (0) information is represented by a second logic level. Thus, if a biphase or a ratio recording technique was implemented through the use of the digital encoder 752, the digital decoder 781 may comprise a counter or similar device capable of evaluating the duration of the various periods between transitions within each bit of encoded information provided thereto and depending upon the durations detected will supply a One (1) or Zero (0) level at the output thereof which is connected to the conductor 789. Similarly, if the digital encoder 752 effected encoding for an NRTZ, INRTZ or restore to zero recording technique, the digital decoder represented would act to implement the various well known decoding techniques for these recording schemes so that the original information encoded was recovered on conductor 789. Thus, the output of digital decoder 789 will take the form of an electrical signal having a plurality of ONE (1) and Zero (0) bits therein and it will be appreciated by those of ordinary skill in the art that each group of eight (8) bits of such One (1) and Zero (0) information will represent one character as originally propagated through the automatic writing system according to the present invention in parallel and thereafter serially recorded on the record media which is presently being read. The output of the digital decoder 781 is connected through conductor 789 to the input of the serial to parallel converter 782.

The serial to parallel converter 782 may take the form of a conventional serial in, parallel out shift register whose first and last stages are serially interconnected to enable shifting to take place in either the forward or the reverse direction. The function of the serial to parallel converter 782 is to transform each eight (8) bit character read in series from a prerecorded record media and applied in a serial format thereto into an eight (8) bit character having a parallel format so that the same may be conveyed in parallel through the remaining portions of the automatic writing system according to the present invention. For this reason the shift register utilized to form the serial to parallel converter 782 should comprise an eight (8) bit register which may be formed, for instance, by connecting a pair of conventional SM7495 four (4) bis MSI shift register chips available from the Texas Instrument Corporation in series. The serial to parallel converter 782 acts in the conventional manner to shift each bit of information applied thereto through the eight (8) stages thereof as clock pulses are received at the clock input thereto indicated in FIG. 14. However, whether such shifting of the received bit information takes place in the forward or reverse direction will depend upon the logic level applied to the control input thereof connected to the conductor 790, annotated REVERSE in FIG. 14. Whether shifting is to take place in the forward or reverse directions is determined as a function of the direction in which the prerecorded record-media is being read and hence, if reading is to take place in the normal direction of displacement in which the prerecorded record media was recorded and hence is to be read, shifting should take place in the forward direction so that the first bit of a given character read in series is loaded into stage 1 of the serial to parallel converter 782 after eight (8) clock pulses have been received while the last bit read in the serial character being considered is loaded into the eighth stage thereof. Conversely, if the prerecorded record media is being read in a reverse direction from that in which the record media was displaced during the write operation, a high level would be provided on conductor 790 so that the shifting of information within the serial to parallel converter 782 would take place in the reverse direction whereupon the fist bit of a given eight (8) bit character read in the reverse direction from the prerecorded record media would be loaded into the eighth stage of the serial to parallel converter 782 after eight clock pulses have been received while the last bit of the eight bit character being read would be loaded into the first stage thereof so that when the shifting operation associated with the reading of a given character is completed each bit of that character would reside in a stage of the serial to parallel converter 782 corresponding to the appropriate position of that bit within the character read regardless of whether or not the reading of the record media took place in the forward or reverse direction. Thus, as will be appreciated by those of ordinary skill in the art, the ability to cause each bit of information being loaded into the serial to parallel converter 782 to be shifted in either the forward or reverse direction enables the instant invention to read selected characters present upon a prerecorded record media in either a forward or reverse direction by simply applying an appropriate logic level to the conductor 790 of the serial to parallel converter 782. Although the ability of the serial to parallel converter 782 to shift in either a forward or reverse direction might be fully utilized to enable the reading of character information from the prerecorded record media in either direction, this attribute of the instant invention is here only employed in embodiments of the invention utilizing card record media to permit verification of previously read data in a second pass made in a reverse direction.

The serial to parallel converter 782 will thus normally be in a condition to shift in the forward direction whenever a record media is actually being read while it will be specially enabled for shifting in the reverse direction for those embodiments of this invention where its utilization is deemed desirable. However, as the actual operation of the serial to parallel converter 782 is best controlled by a decoding of ROM bits associated with the initiation of various reading and recording operations, the selective enabling of the serial to parallel converter 782 for reverse mode shift operations may be achieved where desired as a function of the logical signals which control the direction in which the rotation of the record media transport is initiated. Here, however, it is sufficient for an application of the operation of the serial to parallel converter 782, to note that should it be desired to effect reverse shifting the card media, the record media transport is enabled for operations in the reverse direction, a One (1) level is applied to the conductor 790 to cause shifting to take place in the reverse direction while when the record media transport is enabled for operation in the forward direction, a Zero (0) level is applied to the conductor 790 to cause shifting to occur in the forward direction. Thus, whenever a Zero (0) level is applied to the conductor 790, each bit of information applied to the serial to parallel converter 782 will be clocked through the various stages thereof in the forward direction in response to each shift or clock pulse received while if a One (1) level is applied to the conductor 790 shifting in response to clock pulses will occur in the reverse direction.

The operation of the serial to parallel converter 782 is the same as the operation of any shift register in that whenever a clock pulse is applied to the clock input thereof connected to conductor 791 the ONE (1) or ZERO (0) condition on conductor 789 will be written into the input stages thereof while previously written bits of information stored therein will be advanced by one stage. Thus, when a clock pulse is applied on conductor 791, if a one (1) level resides on conductor 789 such ONE (1) level is clocked into the input stage thereof and conversely should a ZERO (0) level reside on the conductor 789, a ZERO (0) will be written into the first stage of the shift register while the previously stored contents thereof will be moved down through one stage. The contents of the eight (8) stages of the serial to parallel converter 782 are reflected on the outputs thereof connected to the conductors $RR_1$ - $RR_8$ as illustrated in FIG. 14 and hence, as each eight (8) bit character is read from the pre-recorded record media and decoded, it will be inserted in series into the serial to parallel converter as each clock pulse is applied to the conductor 791 and be presented at the eight outputs thereof on conductors $RR_1$ - $RR_8$.

The clock pulses applied to the clock input of the serial to parallel converter 782 are applied from the output of an AND gate 793 to the conductor 791 through a standard driver stage 792. The driver stage 792 may take the same form as the driver stage 786 and hence acts in the conventional manner to rise the clock inputs applied from the output of AND gate 793 to conventional logic levels. The AND gate 793 may take the form of a conventional two input AND gate which acts in the well known manner to provide a high level output when both of the inputs thereto are high while providing a low level at the output thereof under all other inputs conditions and, it will be appreciated by those of ordinary skill in the art that the periodic production of a high level from the output of the AND gate 793 represents a clock pulse input to the serial to parallel converter 782. A first input to the AND gate 793, as indicated in FIG. 14, is applied through conductor 794 from a clock pulse generator, not shown. The clock pulse generator connected to the conductor 494 may take the form of clock subphase CD or any other conventional clock pulse generator may be employed. Thus, whenever the AND gate 793 is otherwise enabled the output thereof will vary as a function of the clock pulses applied to conductor 794 and hence cause bit information applied to conductor 789 to be shifted in series through the serial to parallel converter 782. The second input to the AND gate 793, as connected to conductor 795, is an input devoted to indicating whether or not valid character information is presently being read by the read head 780 and hence whether or not the present output of the digital decoder 781 should be inserted into the serial to parallel converter 782 through the action of clock pulses applied to the conductor 791. Thus, when valid information is being read by the read head 780, the level on conductor 795 will go high to thereby enable the output of the AND gate 793 to vary as a function of the clock pulses applied to conductor 794 while when no valid information is present at the output of the digital encoder 781, the level on conductor 795 will be low to thereby disable the AND gate 793 and prevent the application of the clock pulses applied on conductor 794 to the clock input of the serial to parallel converter 782.

The precise nature of the bit start input applied to conductor 795 will vary as a function of the type of encoding scheme used in recording the pre-recorded record media and hence, may be derived as a function of the output of the digital decoder 781 if certain recording techniques are employed or alternatively, the presence of start or stop characters which might be utilized to initiate and terminate each line of recorded character information might be detected at the output of the digital decoder 781 and employed to control the level on the conductor 795. More particularly, if a ratio recording technique were employed in the recordation of the record media each bit of information, as well known to those of ordinary skill in the art, would include at least one high-low transition and such transition within each bit could be utilized to detect that valid bit information is presently being read and hence that the AND gate 793 should be enabled so that the clock ulses applied to conductor 794 could be further applied to the clock input of the serial to parallel converter 782. Furthermore, in such a bi-phase or ratio recording format, a determination as to the presence of valid information could be made on a per bit basis by a pair of flip flops arranged to detect such transitions and hence the bit start indication provided on conductor 795 from the detection thereof could be employed to also modify the duration of the clock pulses applied on conductor 794. Alternatively, should it not be desired to detect intrabit flux transitions, a specialized start character could be employed at the beginning of each line of recorded character information and a stop character could be used to terminate each line of character information. Under these conditions as would be necessary for instance should an NRTZ recording scheme be employed, a decoder could be provided at the output of the digital decoder 781 to detect the presence of the start character while a second decoder such as an AND gate array could be employed to detect the presence of a stop character. The output of the start character decoder could then be employed to set a flip flop and the output of the stop character decoder could be employed to clear a flip flop whereby the output of such a flip flop may be connected directly to the conductor 795 to produce an appropriate bit start level on conductor 795 only during such interval as valid information is being read by the read head 780 and hence decoded by the digital decoder 781. Thus, under these conditions, clock pulses would be applied from the output of the AND gate 793 to the clock input of the serial to parallel converter 782 only at such times when a start character has been detected so that the start character and the subsequent character information would be inserted into the serial to parallel converter 782 and this would continue until the detection of the stop character. whereupon the AND gate 793 would be disabled and no further information would be shifted into the serial to parallel converter 782. Accordingly, the bit start signal applied on conductor 795 acts to assure that valid character information is being clocked into the serial to parallel converter 782 rather than spurious outputs which might appear at the output of read head 780 when the record media is displaced during starting and stop operations.

The output of each of the eight stages within the serial to parallel converter 782 are applied through the conductors $RR_1 - RR_8$ to eight (8) parallel inputs of the eight (8) bit character output gating arrangement 783 so that as the various bits of the characters read from the record media are shifted through the serial to parallel converter 782, the ONE (1) or ZERO (0) condition of a particular bit loaded into each of the stages of the serial to parallel converter 782 are applied through the output conductor $RR_1 - RR_8$ associated therewith to a corresponding input of the eight (8) bit character output gating arrangement 783. The eight (8) bit character output gating arrangement 783 may take the form of a conventional eight (8) bit buffer array or an AND gate array which comprises eight (8) AND gates each of which has one input connected to a corresponding one of the input conductors $RR_1 - RR_8$ and a second input which is commonly connected to an enable line. The outputs of the eight (8) AND gates present within the eight (8) bit character output gating arrangement 783 or the conventional buffer used therefor are each connected to an associated one of the bit conductors present within the common data bus 19 as indicated by the annotations $DB_0 - DB_7$ present within FIG. 14. Such connection of the eight (8) outputs of the eight (8) bit character output gating arrangement 783, as will be apparent to those of ordinary skill in the art, to the individual bit conductors $DB_0 - DB_7$ within the common data bus 19 would be implemented through either the eight (8) bit data cable 63 or 67, as shown in FIG. 2, depending on whether the record media read apparatus depicted in FIG. 14 was employed in the read/write or the read only record media station. Thus, whenever the eight (8) bit character output gating arrangement 783 is enabled, the eight (8) bit character presently loaded into the serial to parallel converter 782 is applied through conductors $RR_1 - RR_8$ and the eight (8) bit character output gating arrangement 783 to the individual bit conductors $DB_0 - DB_7$ associated therewith as present in the common data bus 19 so that character information read from the record media on a serial basis is applied in parallel on a per character basis to the common data bus 19.

Since the function of the eight (8) bit character output gating arrangement 783 is to gate eight (8) bit characters in parallel onto the common data bus 19 while the bit information applied to the serial to parallel converter 782 is not segregated as to characters, the eight (8) bit character output gating arrangement 783 must be enabled at intervals which correspond to the presence of a complete character within the serial to parallel converter 782 because if such timing was not present, the eight (8) bits which might be gated onto the common data bus 19 might comprise bits from more than one character displaced with regard to their appropriate position within the character recorded. The eight (8) bit character gating arrangement 783 is selectively enabled by the application of a ONE (1) level to conductor 796 which connects to the enable input thereof. This input results from a decoding of ROM bits which issue in an instruction in a program sequence which follows a sampling of the common status bus 21 and an indication that a character has been loaded into the serial to parallel converter 782. The actual ROM bits which are decoded are ROM bits $B_{15} - R_{12}$ which define the modular address, $B_{11} - B_8$ which are status line qualifiers and $B_4$ as well as an active reader input. Furthermore, it is sufficient for the purposes of the instant description to appreciate that during a programmed sequence in which a record media is read, prior to the enabling of the eight (8) bit character output gating arrangement 783, the common status bus 21 is tested to indicate whether or not an eight (8) bit character is ready for application to the common data bus 19 and if such an indication, referred to as a read data ready flag, is present a branch operation is initiated wherein the eight (8) bit character output gating arrangement 783 is enabled so that the character presently loaded in the eight (8) stages of the serial to parallel converter 782 is gated onto the common data bus 19. The read data ready flag which represents the input to the common status bus 19 which causes a branch operation that results the application of a ONE (1) level to conductor 796 and hence the enabling of the eight (8) bit character output gating arrangement 783 is generated, in a manner to be described below, in the record media read apparatus illustrated in FIG. 14, however, the application of such read rata ready flag to the common status bus 21 is achieved through multiplexer apparatus in a manner to be described in conjunction with FIGS. 15A and 15B.

The clock pulses applied through the enabled AND gate 793, the driver stage 792 and the conductor 791 to the clock input of the serial to parallel converter 782 are additinally applied through conductor 797 to the input of the eight (8) bit counter 784. The eight (8) bit counter 784 may comprise conventional counter apparatus which acts in the well known manner to count each of the input pulses applied thereto until eight (8) input pulses have been received. Thereafter, an output pulse is provided thereby and the counter is automatically reset so as to be in condition to be incremented to a one state of the count upon the application of the next input pulse thereto. Thus, the eight (8) bit counter 784 acts to count each eight (8) input pulses applied thereto and provides an output indicative that eight (8) input pulses have been received whereupon resetting takes place. Accordingly, it will be appreciated by those of ordinary skill in the art that the eight (8) bit counter 784 may comprise a conventional divide by eight counter which may be formed, for instance, by a pair of four (4) bit binary counters such as MSI TTL high speed ripple through counter chips SN7493 conventionally available from the Texas Instrument Corporation. The output of the eight (8) bit counter 784 is connected to the conductor 798 and the function of the eight (8) bit counter 784, as will be appreciated by those of ordinary skill in the art, is to monitor the bits of information applied from the digital decoder 781 and shifted into the serial to parallel converter 782 so that the bits associated with a given character may be segregated from those associated with adjacent characters to enable each character recorded within a given line of information to be accurately recovered.

More particularly, it will be recalled from the preceding portions of the description of the record media read apparatus depicted in FIG. 14 that clock pulses applied to conductor 791 are relied upon to shift each bit of information recovered by the digital decoder 781 from a reading of the record media into the serial to parallel converter 782. Furthermore, due to the bit start enable level applied to the AND gate 793 through conductor 795 such clock pulses as are required to shift information into the serial to parallel converter 782 are only produced in response to the reading of valid information by the read head 780 and the decoding of the same by the digital decoder 781. Therefore, each clock pulse applied to the serial to parallel converter 782 will indicate that a valid bit of data has been shifted into the serial to parallel converter 782 and hence each eight (8) clock pulses applied to the serial to parallel converter 782 will indicate that a valid character comprising eight (8) bits of information has been loaded therein, so long as the first clock pulse is produced when the first bit of a character on the portion of the record media being read is present at the output of the digital decoder 781. Furthermore, so long as one clock pulse is provided to the clock input to the serial to parallel converter 782 for each bit subsequently read from the record media, each eight (8) clock pulses will represent the loading of one legitimate eight (8) bit character into the serial to parallel converter 782 and hence each time eight (8) clock pulses are applied to the serial to parallel converter 782 the character present therein may be gated through the eight (8) bit character output gating arrangement 783 onto the common data bus 19. Therefore, as will be appreciated by those of ordinary skill in the art, since the bit start enable level applied to conductor 795 ensures that one clock pulse will be applied for each bit of information read from the record media and decoded by the digital decoder 781, it will be seen that the first clock pulse applied to the serial to parallel converter 782 will correspond to the first bit of information read from the record media in the line of characters presently being read and that one clock pulse will be applied for each bit of the characters subsequently read and applied to the digital decoder 781. Thus, as the eight (8) bit counter 784 acts to count each clock pulse which is applied to the serial to parallel converter 782 and to produce an output each time eight (8) such clock pulses have been applied to the serial to parallel converter 782, it will be seen that each time an output is produced by the eight (8) bit counter 784, a legitimate data character read from the prerecorded record media will have been loaded into the serial to parallel converter 782 and therefore is in an appropriate condition with respect to the presence of each bit therein in the appropriate stage thereof for gating onto the common data bus 19 to be initiated.

The output of the eight (8) bit counter 784 is connected through conductor 798 to the input of the flag generator 785. The flag generator 785, as indicated in FIG. 14, may comprise a conventional flip flop connected in such a manner that the output thereof will follow the input thereto and hence, be placed in a ONE (1) state whenever a high level is applied to conductor 798 and conversely be reset to a ZERO (0) state whenever a low level resides on the conductor 798. Therefore, as will be appreciated by those of ordinary skill in the art, the output of the flag generator 785 will be high whenever the eight (8) bit counter 784 applies a ONE (1) to the conductor 798 to thereby indicate that eight (8) clock pulses have been counted thereby while being low whenever the state of the count in the eight (8) bit counter 784 is other than eight and further that the flag generator 785 will be reset whenever the counter counting configuration employed in the eight (8) bit counter 784 causes the state of the count therein to shift from eight to zero. The output of the flag generator 785 is connected to conductor 799 and serves to provide, as will be seen below, a read data ready flag for application on a demand basis to the common status bus 21. Thus, the flag generator 785 serves to produce a flag indicative of a status condition in the record media read apparatus depicted in FIG. 14 and more particularly a status indication that an eight (8) bit character has been loaded into the serial to parallel converter 784 and is ready for application to the common data bus 19.

The application of the read data ready flag produced by the flag generator 785 to the common status bus 21 occurs by the selective gating of a status multiplexer which is illustrated and described in conjunction with FIGS. 15A and 15B. However, it is here sufficient for an appreciation of the record media read apparatus depicted in FIG. 14 to appreciate that in a read operation, the status condition of the read data ready flag is initially sampled and whenever a ONE (1) level resides thereon a branch operation is initiated which causes an instruction to be read from the read only memory 80 which, among other functions, causes a ONE (1) level to be applied to conductor 796 to thereby enable the eight (8) bit character output gating arrangement 783 so that the eight (8) bit character loaded into the serial to parallel converter 782 is selectively gated through conductors RR1 - RR8 and the eight (8) bit character output gating arrangement 783 to the common data bus 19 for insertion into the main register M. In addition, as indicated in FIG. 14, the same enable level applied to conductor 796 for the selective gating of each character onto the common data bus 19 supplies an enable level on the conductor annotated DB to M to the main register M so that each character thereby applied to the common data bus 19 may additionally be gated therefrom into the main register M for inspection and subsequent processing. Accordingly, it will now be seen that each eight (8) bits applied from the output of the digital decoder 781, after an indication that valid data is present, is loaded into the serial to parallel converter 782 and hence, represent one character of information in the recorded line of information presently being read. Furthermore, the presence of this valid character within the serial to parallel converter 782 is indicated by the flag generator 785 and in response to such an indication the program sequence then in process initiates a branch operation to cause such eight (8) bit character to be gated onto the common data bus 19 through the eight (8) bit character output gating arrangement 783 and at the same time enables the main register M so that such character may be loaded thereinto.

In the operation of the record media read apparatus depicted in FIG. 14 it will be appreciated that the active record media transport station is energized and the record media is brought to speed in the interrecord gap established, as shall be seen below, intermediate each line of recorded characters. Thereafter, a reading operation is initiated wherein the entire line of recorded character information, corresponding to a line of printed material on the document or a line of character information which has been modified through a revise operation or the like, is transduced in the serial bit manner in which such information was recorded by the record media write apparatus depicted in FIG. 13. As reading takes place, the read head 780 will sense the flux transitions on the record media and provide an electrical signal on conductor 787 representative thereof. This electrical signal is amplified by the driver stage 786 and applied through conductor 788 to the digital decoder 781. The digital decoder 781 acts in the well known manner to decode the bit information being read in a converse manner to the digital encoding carried out during the recording operation so that traditional binary ONE (1) and ZERO (0) information representing each bit of data read is produced thereby on conductor 789. In addition, the digital decoder 781 or the various start and stop decoding arrangements associated therewith will provide an enable level on conductor 795 to selectively enable the AND gate 793 upon the appearance of valid data. This means that as each valid bit of data is read from the record media, decoded in the digital decoder 781 and applied to the input of the serial to parallel converter 782 through conductor 789, a clock pulse will be applied to the clock input of the serial to parallel converter 782 to cause each bit of data read from the record media and decoded to be shifted in series into the serial to parallel converter 782. As each bit of information is shifted into the serial to parallel converter 782 by the clock pulses applied from the AND gate 793 to the conductor 791, the clock pulses are counted by the eight (8) bit counter 784. The eight (8) bit counter 784 provides an output each time eight (8) shift pulses have been applied thereto and hence, provides an output which corresponds to the loading of a character into the serial to parallel converter 782 wherein the eight (8) bit character loaded corresponds in content to the eight (8) bit character originally recorded on the record media. This output of the eight (8) bit counter 784 is applied through conductor 798 to the flag generator 785 whose output follows the input thereto. Thus, a flag output is provided on conductor 799 for sampling on the common status bus 19 each time an eight (8) bit character is loaded into the serial to parallel converter 782. This status indication is utilized to indicate a branch operation at the read only memory 80 which causes an enable level to be applied to the conductor 796 connected to the enable input of the eight (8) bit character output gating arrangement 783. Accordingly, whenever an eight (8) bit character has been loaded into the serial to parallel converter 782, an enable level is provided on conductor 796 to gate this eight (8) bit character through conductors $RR_1 - RR_8$ and the eight (8) bit character output gating arrangement 783 onto the common data bus 19 and in addition the enable level applied to conductor 796 provides an enable level for the main register M so that each character applied to the common data bus 19 may be loaded thereinto. Thus, as each character is read from the record media in series it is transformed into a parallel format by the serial to parallel converter 782 and applied to the common data bus 19 for insertion into the main register M and subsequent insertion, as will be recalled, into the buffer being employed for the operation in progress. This operation continues until each of the characters in the line of information on the record media has been read, transformed into a parallel format and inserted through the common data bus 19, the main register M, and the common data bus 19 into the requisite buffer which acts, as aforesaid, to accumulate the entire line being read. In this manner the entire line of character information recorded in a serial manner onto the record media is read, transformed into a parallel format and accumulated in the buffer being utilized for the operation taking place and the entire operation takes place at a rate which is governed by the reading rate.

After the entire line of prerecorded information has been read, the reading operation is terminated and the active transport is stopped at a portion of the interrecord gap intermediate the line of information which has been read and the next adjacent line of information which will be read during the next read operation. The line of information which has been read by the record read apparatus depicted in FIG. 14 has now been loaded or accumulated in the buffer associated therewith for the operation then taking place and may thereafter be processed in a manner consistent with the overall mode of operation of the automatic writing system initiated at the keyboard. As the record media read apparatus depicted in FIG. 14 may be present at either the read only or read/write record media stations it will be appreciated by those of ordinary skill in the art that the buffer relied upon to accumulate the information read may vary depending upon the active reader being utilized and the mode of operation initiated at the keyboard. For instance, if the active reader is the read only record media station the read only buffer 36 is employed to accumulate each line of information read. However, if the active reader is the read/write record station the buffer employed to accumulate the information thus read could vary depending upon the mode of operation initiated. In the present embodiment of the instant invention, the read only buffer 36, as shall be seen below, is always employed for the insertion of data read from a media regardless of which station is active. However, additional operational flexibility could be provided by utilizing the read/write buffer 35 under special situations. For example, if a multi-media play operation is initiated line information read from a record media loaded at the read/write record media station could be directly inserted into the read/write buffer 35 for ultimate application to the printer so that both buffers could be selectively employed for playback purposes in the merger of line information. Accordingly, it will be appreciated by those of ordinary skill in the art that the record media read apparatus depicted in FIG. 14 acts to transduce prerecorded information recorded in a serial format on a record media, to decode the information read, to transform such information into a parallel format and thereafter to provide an indication that a character is ready for application to the common status bus 19 so that such character information may be gated on a per character basis onto the common data bus 19 while the record media read apparatus illustrated in FIG. 14 continues to read the entire line of information recorded in a serial format.

RECORD MEDIA TRANSPORT CONTROL APPARATUS

Referring now to FIGS. 15A and 15B there are shown exemplary record media transport control apparatus suitable for utilization in the generalized embodiment of the automatic writing system illustrated in FIG. 2, wherein FIG. 15A depicts record media transport control apparatus specially adapted for embodiments of the invention employing record media in the form of a cassette, tape or the like while FIG. 15B illustrates record media transport control apparatus configured for embodiments of this invention employing a magnetic card or the like as the record media. Thus, FIGS. 15A and 15B schematically illustrate exemplary embodiments of record media transport control apparatus which may be employed for the manipulation and displacement of a record media at either or both the read only or read/write record media stations employed in the present invention. In addition, since it is manifest that additional or auxiliary record media stations may be employed in addition to those illustrated in FIG. 2, it will be readily appreciated by those of ordinary skill in the art that the exemplary record media transport control apparatus depicted in FIGS. 15A and 15B may be relied upon for any additional or auxiliary transports employed in connection with the instant invention. The exemplary embodiments of the record media transport control apparatus depicted in FIGS. 15A and 15B include all appropriate inputs required should such record media transport control apparatus be employed in either a read only or read/write record station and hence, it will be apparent that where control inputs are specified and described in unique association with a write function these inputs would normally be disabled where the exemplary record media transport control apparatus illustrated in FIGS. 15A and 15B utilized to control the winding and reeling or other displacement of a record media at a read only record media station.

The record media transport control apparatus depicted in FIGS. 15A and 15B are highly similar, differing only in areas associated with the unique characteristics of the record media employed and the appropriate transports therefor. Furthermore, the record media transport control apparatus illustrated in FIGS. 15A is highly similar to that disclosed in U.S. Ser. No. 429,479 which is incorporated by reference herein, as aforesaid. Accordingly, the disclosure of the record media transport control apparatus depicted in FIGS. 15A and 15B shall proceed by way of an abbreviated description of the record media transport control apparatus depicted in FIG. 15B, the disclosure of U.S. Ser. No. 429,479 being relied upon for additional detail, while differing structure in the record media transport control apparatus illustrated in FIG. 15B is subsequently described and common structure therein is merely noted by corresponding reference numerals.

FIG. 15A

The exemplary embodiment of the record media transport control apparatus schematically illustrated in FIG. 15A comprises an eight (8) bit display latch configuration 810, first and second transport status multiplexers 811 and 812, and transport control flip flops 813 - 817. The eight (8) bit display latch configuration 810 may comprise a pair of conventional four (4) bit latches connected in series which act, when enabled, to accept an eight (8) bit input applied in parallel thereto and to retain each bit of the input supplied during the enable interval until a new enable pulse is applied whereupon additional information may be inserted in parallel thereinto. The eight (8) bit latch configuration 810 acts to receive, as will be appreciated by those of ordinary skill in the art, block designations from the common data bus 19 or track number designations in the case of FIG. 15B and to retain such block designations in storage therein to drive the eight (8) bit digital display 11 or 12 associated with the read/write or read only record media transport station, as shown in FIG. 1, for which the exemplary embodiment of the record media transport control apparatus depicted in FIGS. 15A and 15B is being employed. Thus, the eight (8) bit display latch configuration 810 may comprise a conventional pair of MSI four (4) bit bistable latches such as the SN 7475 MSI latch chips conventionally available from the Texas Instrument Corporation.

The eight (8) bit display latch configuration 810 is connected through an eight (8) conductor data cable 8181 to the common data bus 19 and hence, is adapted to receive any eight (8) bit character information thereon. Similarly, the outputs of the eight (8) bit display latch configuration 810 are connected through an eight (8) conductor data cable 819 to the inputs of the conventional digital display 11 or 12 for the record media station in which the illustrated record media transport control apparatus is employed. Thus, as will be readily appreciated by those of ordinary skill in the art, whenever an eight (8) bit character representing a block address or track number is present on the common data bus 19 each bit of this eight (8) bit character is applied through the eight (8) conductor data cable 818 and will be loaded in parallel into the eight (8) bit display latch configuration whenever it is enabled. Thereafter, this eight (8) bit character will be maintained on each of the eight (8) outputs of the eight (8) bit display latch configuration 810 until a new character is inserted therefor from the common data bus 19. Accordingly, once a block address in the form of an eight (8) bit data character has been loaded into the eight (8) bit display latch configuration 810, this character will be reflected on the outputs thereof and hence be applied through the eight (8) conductor data cable 819 to the eight (8) inputs of the digital display indicia 11 or 12 associated therewith so that this display may be continuously driven until new block information has been inserted into the eight (8) bit display latch configuration 810. In this way, each time a block address is inserted at the keyboard or read from the record media and applied to the common data bus 19, the digital display 11 or 12 for the active record media will provide a visual indication as to the current block address and this indication will be maintained until a new block address is applied to the common data bus 19 and loaded into the eight (8) bit display latch configuration 810. Thus, it will be appreciated by those of ordinary skill in the art that the conventional eight (8) bit digital displays 11 and 12 as illustrated in FIG. 1 may be continuously provided with an output representing the current block address and updated as new block addresses are received.

The enable input to the eight (8) bit display latch configuration 810 is provided on conductor 820 from a decoder, not shown, which acts to decode ROM bits read from the read only memory 80 and applied to the record media transport control apparatus depicted in FIGS. 15A and 15B through the common instruction word bus 20 and the sixteen (16) bit instruction word cable 65 or 72 associated with the record media transport in which the record media transport control apparatus resides. This instruction is read from the read only memory 80 each time the application of a block address is detected by the microprocessor indicated by the dashed block 16 so that an enable level is applied to conductor 820 whereupon the block address displayed in the digital display indicia 11 or 12 may be updated. The enable level applied to conductor 820 acts as a clock input to the eight (8) bit display latch configuration 810 so that whenever this clock is present any eight (8) bit character information present on the eight (8) conductor data cable 818 will be gated into the eight (8) bit display latch configuration 810, as aforesaid. The ROM bits which are decoded from a sixteen (16) bit instruction word read from the read only memory 80 to provide an enable level on conductor 820 include ROM bits $B_{15}$ – $B_8$ and $B_1$, an active reader indication received from the keyboard and two phases of the four phase system clock described above which thereby provide appropriate cycle timing. Thus, the ROM bits decoded to cause information on the common data bus 19 to be gated into the eight (8) bit display latch configuration 810 include, essentially, the same ROM bits relied upon the decoding of the command strobe described in conjunction with the record media write apparatus illustrated in FIG. 13 as well as ROM bit $B_1$ and appropriate timing information supplied from two phases of the system clock. Accordingly, whenever block or track address information is applied to the common data bus 19 for insertion into the main register M and detected by the microprocessor indicated by the dashed block 16, a branch operation is initiated to enable the eight (8) bit display latch configuration 810 so that the block or track address information subsequently gated back onto the common data bus 19 may be utilized to update the display indicia 11 or 12 associated with the active read which has read or is receiving the new block address information and in this manner the appropriate digital displays 11 or 12 are continuously updated to plainly manifest the address of the current block of data being processed at the active record media station or stations.

The first and second transport status multiplexers 811 and 812 may each take the conventional form of eight (8) input, single output multiplexer devices of the type described above in regard to both the keyboard and printer interfaces and act in the well known manner to apply a selected one of the inputs thereto the single output thereof whenever a strobe pulse is received thereby. In the case of the record media transport control apparatus illustrated in FIGS. 15A and 15B, a rather substantial number of status conditions associated with the record media read, write, transport, and housing apparatus are monitored and hence two eight (8) input multiplexer devices 811 and 812 are required to appropriately achieve the function of monitoring the selected status indications within the active record media station and providing such status indications to the common status bus 21 on a demand basis so that branch operations may be initiated by the ROM address register 81 in response thereto and the additional processing instructions required by the status indication furnished read from the read only memory 80. Although two status multiplexer devices are illustrated in FIGS. 15A and 15B it will be appreciated by those of ordinary skill in the art that more or fewer status indications could be employed in simplified or more sophisticated embodiments of the instant invention and hence the number of multiplexers indicated in the exemplary embodiment of the record media transport control apparatus depicted in FIGS. 15A and 15B is a function of the number of status inputs sought to be monitored. More particularly, the eight (8) inputs of the first transport status multiplexer 811 are connected to the conductors 821 – 828 which each receive a unique status indication and hence when an appropriate one of such inputs is selected and a strobe pulse received, the first transport status multiplexer 811 will cause the selected input to be applied to the common status bus 21 in a manner to be further described below.

The status input connected to conductor 821, as indicated by the annotations in FIGS. 15A and 15B, is a read data ready input which is developed as a function of the read data ready flag produced by the flag generator 785 in the record media read apparatus depicted in FIG. 14. As will be recalled from the description of the record media read apparatus depicted in FIG. 14, a read data ready flag is produced by the flag generator 785 each time a data character read from the record media has been properly loaded into the serial to parallel converter 782 and hence is in an appropriate condition for selective gating onto the common data bus 19. Thus, when the read data ready flag condition on the conductor 821 is high and this status condition is gated onto the common status bus 21 on command from the read only memory 80, a branch operation is initiated to cause an enable input for the eight (8) bit character output gating 783 as illustrated in FIG. 14 so that such eight (8) bit character may be gated through the common data bus 19 and into the main register M and thereafter the next step in the program sequence initiated will cause the eight (8) bit character loaded into the main register M to be inserted through an input and step operation into the read only or read/write buffer 36 or 35 which is currently accepting character information read on a line basis from the record media. Conversely, the input conductor 822 to the first transport status multiplexer 811, as indicated in FIGs. 15*a* & *b* is connected to receive the write data ready flag produced by the flip flop 765 with the record media write apparatus depicted in FIG. 13. A write data ready flag is produced by the flip flop 765, it will be recalled, whenever an eight (8) bit data character applied to the record media write apparatus has been serialized and applied through the digital encoder 752 to the write head 753 and recorded. This means, that whenever the write data ready input on conductor 722 is high a new eight (8) bit character may be read from the read/write buffer 35 through an output and step operation and applied to the main register M for application to the serial to parallel converter 750 within the record media write apparatus depicted in FIG. 13. Therefore, whenever the write data ready input on conductor 822 is high and this input is seledted and gated onto the common status bus 21 in response to the decoding of a sixteen (16) bit instruction word read from the read only memory 80 in a manner to be described below, a branch operation from the indication on the common status bus 21 will be initiated which will cause the ROM address register 81 to cause the reading of sixteen (16) bit instructions from the read only memory 80 calculated to cause the next eight (8) bit character of a line of data accumulated in the read/write buffer 35 to be read therefrom and applied through the main register M to the record media write apparatus depicted in FIG. 13 and more particularly, to the parallel to serial converter 750 so that the same may be loaded therein subsequently serialized and recorded on the record media present in the read/write record media station. Alternatively, operational consideration associated with the continuous recording techniques employed the periodic recirculation of the buffer, may render it more desirable to have temporary character storage in a scratch pad memory so that one character is always ready for recording while the next character is read from the buffer.

The status input applied to the conductor 823 of the first status multiplexer 811, as indicated in FIG. 11 is a read data not input which may be developed directly from the output of the read head illustrated in FIG. 14 and hence may be viewed as connected to the output conductor 788 from the driver stage 786. The purpose of this status input is to apprise the microprocessor indicated by the dashed block 16 whether or not character information is still being read from he record media located at the read station with which the record media transport control apparatus depicted in FIG. 14, is associated or whether the character information associated with the line being read has been exhausted and reading in the interrecord gap between lines has been initiated. As a not input is supplied to the conductor 823, as indicated by the bar annotation employed and obtainable by an inversion of the output of the driver stage 786 in the conventional manner, a ONE (1) level residing on the conductor 823 will be indicative that the character information within the line of character information presently being read from the record media has been exhausted and the initial portion of the interrecord gap has been entered. Thus, whenever the status condition on conductor 823 is sampled and is high this ONE (1) input on the common status bus 21 will cause a branch operation which terminates the reading operation being conducted at the active reader and initiates the processing of the character information from the line read which has now been accumulated in one of the buffers 35 or 36. Conversely, the write current not input on conductor 827 to the first transport status multiplexer 811 indicates that write current is not being applied to the write head 753 in the record media write apparatus illustrated in FIG. 13. This input to the first status multiplexer 811 may be obtained by inverting the input to the write head 753 on conductor 775 as illustrated in FIG. 13 for the record media write apparatus shown therein. Therefore, whenever a ONE (1) level resides on the write current not input on conductor 827 it will indicate a condition wherein legitimate eight (8) bit data characters are no longer being supplied to the write head for recording purposes. Therefore, when the write current not input is gated onto the common status bus 21 and a ONE (1) level input is indicated thereby a branch operation to terminate the write operation for the read/write record media station may be initiated.

The media loaded input applied to the first transport status multiplexer 811 on conductor 824 is indicative that a suitable record media has been loaded at the record media station associated with the record media transport control apparatus depicted in FIGS. 15A and 15B. The precise nature of this input will vary in accordance with the type of record media employed. However, as will be obvious to those of ordinary skill in the art, such an input will generally take the form of a switch, microswitch, or output from a light responsive device, positioned in such a manner to detect the insertion of a record media within the transporthousing. Thus, if digital cassettes were employed in connection with FIG. 15A a microswitch could be positioned to be closed whenever such a cassette was loaded on the transport spindles and the door was closed while in magnetic card apparatus such as associated with FIG. 15B, the photoelectric input to a light responsive transducer could be broken whenever a magnetic card was inserted into the transport and either used to generate this input directly or to set a flip flop which is reset when the magnetic card is ejected. In any event, a ONE (1) level will be supplied to the conductor 825 whenever a record media is appropriately loaded within the record media transport associated with the control apparatus depicted in FIGS. 15A and 15B, and when this input is selected and applied to the common status bus 21 an indication will be supplied to the microprocessor indicated by the dashed block 16 that a branch operation appropriate to the energization of the record media transport for reading, writing or searching purposes may be initiated. However, when a Zero (0) level resides on the conductor 824 and the same is gated onto the common status bus 21 by the periodic sampling of this condition which takes place during the various program sequences, no actuation or energization of the record media transport associated with the control apparatus depicted in FIGS. 15A or 15B will be initiated and should such transport apparatus have been previously energized it will be immediately disabled and an appropriate alarm will be sounded under program control.

The input to the first transport status multiplexer 811 on conductor 825 indicates whether or not the record media loaded at the transport associated therewith has been brought to speed so that an appropriate read, write or search operation may be initiated. As will be recalled, the record media to be read or recorded is displaced in such a manner that a portion of the record media corresponding to the interrecord gap between lines of recorded information is relied upon in bring the record media to speed so that a reading or writing operation may be initiated at the end of such interrecord gap. Similarly, in magnetic card embodiments such as shown in FIG. 15B, recording and reading occurs from designated tracks; however, the magnetic card and head must be in relative motion at a selected displacement rate. Therefore, in either case, a status indication is supplied on conductor 825 to indicate when the record media has been effectively brought to an appropriate recording, reading or search speed. This input may be developed, in a manner well known to those of ordinary skill in the art, by a sampling of the capstan, spindle, or drive roller speeds which are employed to displace the record media selected. The precise mode of speed detection employed will vary to a large degree with the precise nature of the transport employed and hence, as the transport utilized forms no part of the instant invention a precise mode of detecting a point when the record media has been brought to speed is not specified. It should be noted however that if the highly accurate and sensitive transport apparatus disclosed in U.S. application Ser. Nos. 329,054 - 329,056 are employed, as aforesaid, the speed detection appropriate to the provision of an input on conductor 825 may be derived as a function of the error signal. More particularly, in the highly accurate and sensitive transport apparatus disclosed in those applications an error signal supplied to a dead band amplifier is utilized to control the speed thereof wherein when the error signal falls within the dead band of the amplifier an appropriate speed for driving purposes has been attained and deviations without the dead band are quickly corrected by the error signal. Therefore, when transport apparatus of this type is employed, the media at speed input to the conductor 825 may be derived as a function of the error signal or of the output of the dead band amplifier. When a low or ZERO (0) level resides on the input conductor 825 and this input is applied to the common status bus 21 by the first transport status multiplexer 811, it provides an indication that the record media is not at speed and hence no branch operation to the write, read, or search program defined by the operator at the keyboard may be initiated. However, when a ONE (1) level resides on the media at speed input on conductor 825 and the same is gated through the first transport status multiplexer 811 to the common status bus 21 upon command, a branch operation at the read only memory 80 will take place to initiate the writing, reading or search operations designated by the operator.

The write permit status input applied, as indicated in FIG. 15A, to the conductor 826 is a specialized input whose functions will generally only be available in embodiments of the instant invention which employ standard Phillips digital cassettes for the record media and hence the associated transport apparatus therefor. These standard cassettes, as will be appreciated by those of ordinary skill in the art, are provided in the rear portion thereof with an aperture which is foreclosed by a tab. In a corresponding manner conventional transport apparatus for cassettes of this type are equipped with a housing which is so configurated that when such a cassette is mounted therein a plunger or the like is arranged to enter the aperture when the same is not foreclosed by the tab provided. This plunger effectively operates a pair of switch contacts which will disable the write function in a normal cassette transport when the plunger is extended while when such plunger is blocked by the tab provided the write function is enabled. In the instant invention the switch contacts associated with the plunger are employed to provide a logic input on conductor 826 and hence when the plunger is foreclosed from entering the aperture, a ONE (1) level will reside on the conductor 826 while when the tab is removed and the plunger is allowed to extend therein a ZERO (1) level will be provided on the conductor 826. The purpose of this input is to allow an operator to designate that certain cassettes have recorded material thereon which is to be permanently retained and hence once such material has been recorded on these cassettes the tab is manually broken by the operator and from that time forward no write operation will be initiated when such a cassette is loaded into an active read/write transport. Thus, whenever a ONE (1) is present on the conductor 826 and the same is gated through the first transport status multiplexer 811 to the common status bus 21 on command from the read only memory 80 a branch operation will be initiated to cause a write operation specified at the keyboard to occur or further status conditions will be sampled in the various status sampling cycles which obviously occur prior to the initiation of a write operation. Should a ZERO (0) be present on the conductor 826, however, this ZERO (0) input when gated on command to the common data status bus 21 will cause an alarm to be sounded and prevent a branch to a write operation from taking place. The status input supplied on conductor 828 defines the direction in which the transport is driving a media in terms of either the forward or reverse direction so that this condition can be monitored on the common status bus 21. This input, as shall be seen below, is developed from the output of Direction Flip Flop 815. Of the eight (8) status inputs applied on conductors 821 - 827 to the first transport status multiplexer 511, three (3) of such inputs are unique to a write function and hence would be disabled or connected to a common ZERO (0) level should the record media transport control apparatus depicted in FIG. 11 be employed in conjunction with a read only record media transport station.

The first transport status multiplexer 811 acts, as described above, to apply a selected one of the inputs applied thereto to the output thereof upon the appearance of an appropriate pulse at the strobe input thereto. The selected output of the first transport status multiplexer 811 is applied, as indicated in FIGS. 15A and 15B to the output conductor 829 while the one of seven inputs thereto is selected by the binary conditions of the three (3) select inputs on conductors 830 - 832. The inputs to conductors 830 - 832, as indicated in FIGS. 15A and 15B, are supplied by ROM bits $B_4$ - $B_6$ as read from each sixteen (16) bit instruction word read from the read only memory 80 and these are the same three (3) select inputs which are employed for each status multiplexer employed in the instant invention. The ROM bit inputs to conductors 830 - 832 are supplied by connecting the three (3) individual conductors thereof to the individual bit conductors within the sixteen (16) bit instruction word cable 72 or 65 to the individual bit conductors within the common instruction bus 20 associated with the ROM bits $B_4$ - $B_6$. Accordingly, as each sixteen (16) bit instruction word is read from the read only memory 80 the eight (8) possible code combinations available from the various combinations and permutations of the ONE (1) and ZERO (0) states associated with ROM bits $B_4$ - $B_6$ will act in the conventional manner to select a given one of the inputs to the first transport status multiplexer 811 for application to the output thereof upon the receipt of an appropriate strobe input thereby. It should also be noted that the select inputs on conductors 830-832 are also supplied to the select inputs of the second status multiplexer 812 and act in a corresponding manner to select one of the inputs thereto for application to the output thereof upon the receipt of an appropriate stroke input. Thus, it will again be seen that common select inputs for all the status multiplexers employed in the instant invention are relied upon while a strobe input is utilized to uniquely define a given status multiplexer to cause a selected one of the inputs thereto to be applied to the output thereof and subsequently on to the common status bus 21.

The strobe input to the first transport status multiplexer 811, as indicated in FIGS. 15A and 15B, is applied through conductor 834 from the output of NAND gate 835 and acts in the conventional manner to gate a selected one of the inputs to the first transport status multiplexer 811 to the output thereof connected to conductor 829. The NAND gate 835 may comprise a conventional two input NAND gate which acts in the well known manner to provide a low level or strobe output whenever both of the inputs thereto are high while providing a high level output whenever any other set of input conditions are present. Thus, whenever both of the inputs to the NAND gate 835 are high, a negative strobe pulse will be applied thereby to conductor 834 so that a selected one of the inputs to the first transport status multiplexer 811 will be gated onto conductor 829. A first input to the NAND gate 835 is supplied on conductor 836 and is developed, as indicated in FIGS. 15A and 15B, by a decoding of the ROM bits associated with the record media transport control address which is a modular two address developed from a decoding of ROM bits $B_{15}$ - $B_{12}$, $B_9$, and $B_8$ as well as an active reader input. The ROM bits may be decoded, in the conventional manner through a decoding arrangement formed of conventional AND and OR gates, while the ROM bits to be decoded are supplied to the record media transport control apparatus depicted in FIGS. 15A and 15B through the common instruction word bus 20 and the sixteen (16) bit instruction word cable 72 or 65 associated with the station in which the illustrated record media transport control apparatus resides. Thus, in a manner which typifies the operation of each of the status multiplexer devices described above in conjunction with the various peripherals employed within the instant invention, a unique address is assigned to the peripheral in which a given status multiplexer is located and a strobe input is developed as a function of the address which is assigned to that peripheral. A second input is applied to the NAND gate 835 through the conductor 837 as indicated in FIG. 11. This input to the AND gate 835 is developed in response to the complemented condition of the ROM bit $B_7$ contained within each sixteen (16) bit instruction word read from the read only memory 80. This input to AND gate 835 determines whether the first transport status multiplexer 811 or the second transport multiplexer 812 will be enabled in response to an appropriate decoding of the address therefor as will be seen more clearly below. More particularly, the strobe pulse applied to the first status multiplexer 811 is developed as a function of the record media transport address applied to conductor 836 and a similar input to the second transport status multiplexer 812 as well as the condition of ROM bit $B_7$. Thus, as indicated in FIGS. 15A & 15B the second input to the NAND gate 835 on conductor 837 is the inverted or complemented condition of ROM bit $B_7$ and hence whenever an instruction is read from the read only memory 80 which contains the appropriate address for the record media transport and in addition has ROM bit $B_7$ in a ZERO (0) condition, the $B_7$ not input applied to conductor 837 will be high. Under these conditions both of the inputs to AND gate 835 will be high whereupon a low or strobe pulse will be applied from the output thereof on conductor 834 to the strobe input of the first transport status multiplexer 811. As shall be seen below, the strobe input to the second transport status multiplexer 812 results from an ANDing of the address associated with the record media transport apparatus and the condition of ROM bit $B_7$ rather than the complement thereof. Thus, when ROM bit $B_7$ is in a ONE (1) condition and the appropriate address is present, the second transport status multiplexer 812 will be strobed while when ROM bit $B_7$ is in a ZERO (0) condition so that the complement thereof will be high, the first transport status multiplexer 811 will be strobed. The input to the NAND gate 835 on conductor 837 may, as will be appreciated by those of ordinary skill in the art, be connected through either of the sixteen (16) bit instruction word cables 72 or 65, depending on the record media station in which the depicted record media transport control apparatus is being employed, directly to the common instruction word bus 20 so that the condition of ROM bit $B_7$ as read in each instruction cycle may be applied thereto; it being noted that the $B_7$ input on conductor 837 is inverted prior to its application thereto. Thus, whenever a negatively directed strobe pulse is applied at the output of AND gate 835 to conductor 834 a particular one of the inputs to the first transport status multiplexer 811 as selected by the condition of the select inputs to the first transport status multiplexer 811, which are controlled by ROM bits $B_4$ - $B_6$, will be applied to the output thereof connected to the conductor 829.

The second transport status multiplexer 812 supplies additional multiplexing capability for the remaining status conditions which are monitored in the record media transport control apparatus depicted in FIGS. 15A and 15B. Furthermore, the various status inputs to the second transport status multiplexer 512 tend to be associated with the media and hence differ in regard to FIGS. 15A and 15B. At the outset it should be noted that the same select inputs that are supplied through conductors 830 - 832 to the select inputs of the first transport status multiplexers 811 are similarly connected to the select inputs of the second transport status multiplexer 812 so that each time an instruction is read from the read only memory 80 the application of ROM bits $B_4$ - $B_6$ to conductors 830 - 832 will result in the selection and application of one of a plurality of inputs to the second transport multiplexer 812 to the output thereof when an appropriate strobe input is received. Thus, the first and second transport status multiplexers 811 and 812 are supplied with common select inputs; it being appreciated by those of ordinary skill in the art that the particular multiplexer which has one of its inputs applied to the output thereof is enabled as a function of the strobe pulse supplied thereto. The second transport status multiplexer 812 may be identical in form and function to the first transport status multiplexer 811 in that it is capable of accepting up to eight (8) status inputs and will supply one of such inputs to the output thereof as a function of the select inputs received and a strobe pulse which results in the enabling of the multiplexer. The status inputs to the second transport status multiplexer 812, as indicated in FIG. 11, are supplied through conductors 839–846.

The status input supplied to the second transport status multiplexer 812 on the conductor 839 as indicated in FIG. 15A is an End of Media input which is supplied from the transport when either a clear leader or foil portion of the record media has been detected near the write head to indicate that the recording media has been exhausted. This status input to the second transport status multiplexer 812 may be obtained at or near the recording head by conventional clear leader detection apparatus such as a photodetector or by a pair of contacts which are adapted to be shorted by a foil strip on the record media which appear in the well known manner at the head location when the end of the record media has been reached. This status indication, when applied to the common status bus 21 during the periodic sampling of the various status conditions monitored at the record media transport station prior to each reading or recording of a line of information will result in the initiation of a branch operation at the read only memory 80 which initiates, under program control, the locking up of the keyboard and a visual and/or audible alarm to indicate to the operator that the end of the record media has been reached and no further recording may take place. When such an alarm occurs during a recording operation, no end of record character may be recorded and hence, the usual procedure which is initiated in response thereto by an operator is the depression of the line correct key which causes a backing up of the record media, as aforesaid, and then a termination of recording for that media so that an effective end of record mark is recorded. In a playback mode of operation, detection of the end of media should normally not occur, as a detection of an end of record mark on the media would usually automatically terminate the play or similar operation then in process. However, when an end of media input is supplied on conductor 839 to the second transport status multiplexer 812 and this input is caused to be applied to the common status bus 21, the detection of such an input will cause a branch operation to occur and a new portion of the program initiated to ensure operation that is consistent with the detection of the end of the record media while when a ZERO (0) resides on conductor 839 and this level is applied to the common status bus 21 normal processing operations will continue.

The status input applied to the conductor 840, as indicated in FIG. 15A is a servo disable not input which indicates, as will be appreciated by those of ordinary skill in the art, whether the record media transport and more particularly the servo drive system therein is in a condition to receive appropriate drive instructions for the displacement of the record media which must attend any writing, reading or searching operation. Specifically, in the record media transport system employed in conjunction with the instant invention, as is the case for any digital record media transport system, the record media is tensioned upon its loading into the transport so that stretching or breaking of the record media will not result when the transport responds to subsequently received displacement instructions. This may be typically achieved in a reel to reel system such as might be employed in cassette versions of the instant invention by the application of equal and opposite drive torques to the motor associated with the driving of each reel. Furthermore, such equal and opposite drive torques would normally be applied for a predetermined interval when the record media is loaded and thereafter it would be assumed that appropriate tension has been placed on the web to effectively remove any slack therein which might have been present when the record media was loaded. In a cassette version of the instant invention it may be assumed, as will be appreciated by those of ordinary skill in the art, that a reel to reel servo drive system is employed such as that disclosed in the referenced record media transport applications, Ser. Nos. 329,054–329,056, supra, and that a timer is employed to appropriately tension the record media when the same is loaded to take up any slack in the cassette loaded. After a selected interval the timer is disabled and the transport is in a condition to receive appropriate drive instructions so that the same may be displaced in an appropriate direction and at an appropriate speed to accomplish recording, play and search operations; however, during the interval that opposite torque is being applied to the servo system under the control of the motor, such drive instructions as are necessary for a desired play, record or search operation may not be implemented. Therefore, whenever the timer is enabled when the record media is loaded so as to oppositely torque each reel and hence remove any slack within the record media so that the same will not be stretched or broken upon the receipt of subsequent drive instructions, a servo disable signal is produced by the timer and after suitable inversion to achieve a servo disable not input, as indicated in FIG. 15A, aplied to the input conductor 840. This input, to the second transport status multiplexer 812 is sampled under program control prior to the application of any drive instructions to the record media transport system with which the record media transport control apparatus depicted in FIG. 15A is associated and when a ZERO (0) level is present on conductor 840, indicating that the timer is still energized and the servo transport system must be viewed as disabled, a monitor operation is initiated under program control so that the system will await the timing out of the timer before issuing any drive instructions to the transport system. When, however, a ONE (1) level resides on the conductor 840, as will be appreciated by those of ordinary skill in the art such a ONE (1) level is indicative that the timer has been timed out and hence that drive instructions may be issued to the record media transport apparatus with which the depicted record media transport control apparatus is associated. Under these conditions, when the ONE (1) level on conductor 840 is selected and applied to the common status bus 21 by the application of a strobe input to the second transport status multiplexer 812, a branch operation will occur at the read only memory 80 so that a program sequence is initiated in which drive instructions consonant with the record, play or other instructions which might have been designated at the keyboard occur as a function of the sixteen (16) bit instruction words read from the read only memory 80.

The input to the second status multiplexer 812 applied to conductor 841, as indicated by the annotations associated therewith in FIGS. 15A and 15B, is an active reader input which will be high when the record media transport station with which the record media transport control apparatus depicted in FIGS. 15A or 15B is associated has been selected at the keyboard. In the instant embodiment of the present invention described in conjunction with FIG. 2, it was seen that two record media transport stations are employed wherein a first record media station is designated the read only station while the second record media station is designated the read/write record media station and all write operations are carried out at the read/write record media transport station. Furthermore, it will be recalled that read operations as well as write operations may be carried out at the read/write record media station and hence depending upon the mode of operation in which the instant invention is being employed either of the record media transport stations therein may be active so that an active reader indication is provided to the common status bus 21 to indicate this status condition as it attaches to a particular one of the record media transport control apparatus depicted in FIGS. 15A and 15B. Accordingly, as will be appreciated by those of ordinary skill in the art, the status input condition on conductor 841 is indicative as to whether or not the record media transport station associated with the record media transport control depicted in FIGS. 15A or 15B is the active reader so that whenever a ONE (1) level resides thereon a branch instruction will be issued to the ROM address register 81 whereupon a branch operation will be initiated at the read only memory 80 to cause the processing of information at the record media transport associated with the apparatus depicted in accordance with the operations specified by the operator at the keyboard.

The conductor 841, as indicated in FIGS. 15A and 15B is connected to a gating arrangement 847 which provides an active or inactive (ONE or ZERO) reader indication to the record media transport control apparatus depicted in FIGS. 15A and 15B as well as to the record media transport control apparatus associated with the other record media transport stations. Thus, the gating arrangement 847 will provide a ONE (1) or ZERO (0) indication on conductor 841 to provide an indication as to the active or inactive reader status of the record media transport station with which the depicted record media transport control apparatus is associated as well as a second ONE (1) or ZERO (0) indication on the conductor 848 to indicate the active or inactive reader status of the second record media transport station employed in the instant embodiment of the present invention and it will be appreciated by those of ordinary skill in the art that if additional auxiliary record media transport stations are employed appropriate outputs therefor would also be provided by the gating arrangement 847. The gating arrangement 847 may take the form of a conventional decoding arrangement formed with conventional AND and OR gates which effectively acts to provide ONE (1) or ZERO (0) indications on conductors 841 and 848 reflecting the active reader status in terms of the various input conditions supplied thereto as evaluated in terms of the rules governing an active reader condition established in the design of the instant invention. Prior to describing the actual input of the gating arrangement 847, a description of the rules for evaluating which record media station is to be active will be set forth since even though the instances in which the various read/write and read only stations are active have been inferentially described in conjunction with the various modes of operation available, they were not set forth in combination so as to be readily appreciated by a reader. When only one record media is loaded into the automatic writing system according to the present invention such media will be loaded at the read/write station and this station will be periodically enabled in a read mode regardless of whether or not a play, record or revise mode of operation is being employed, it being noted that any recording operation which takes place must effectively take place at such read/write record media station. When, however, a record media has been loaded at both the read only and read/write record media station both record media stations may be simultaneously in an enabled condition such as when a transfer or duplicate mode of operation is being employed wherein the contents of one prerecorded record media is being recorded, in whole or in part, on a second record media loaded at the read/write station. Conversely, each record media station, when loaded, could be alternatively enabled as readers such as when an operator or switch code character is causing information from each of two prerecorded record media to be alternately read in such a manner that the recorded information therefrom is merged such as in the batched letter operation described above. Under these conditions of operation the active or inactive reader status of the record media transports employed in the instant embodiment of the present invention must initially be controlled as a function of whether a record media has been loaded, and thereafter as a function of the operations specified at the keyboard. Thus it will be seen that whenever a record media is loaded into the read/write record media station this station may or may not be an active reader and the same rules hold true whenever a record media has been loaded into the read only station; however, when a record media has been loaded into both the read only and read/write record media stations these stations may be active in an alternate manner unless a recording operation is to take place at the read/write record media station. Therefore, inputs representing these status conditions are applied to the gating arrangement 847 and are appropriately evaluated thereby so that active reader status condition; may be supplied on conductors 841 and 848 to indicate which of the record media stations employed in this embodiment of the present invention are active at a given interval.

From the foregoing rules concerning the operation of the read only and read/write record media stations in the various modes of operation which may be initiated by an operator at the keyboard, it will be appreciated that whether or not a given record media transport station is to be an active reader will depend on a plurality of input conditions. The first input condition associated with a decision as to whether or not a given record media transport station may act as an active reader turns upon whether or not a record media has been loaded thereat since when no record media has been loaded the associated record media transport station may not act as an active reader regardless of the operation defined at the keyboard. Thus, in the well known manner the record media transport stations contains a pair of switch contacts or sensors which are activated whenever a record media has been loaded therein while being deactivated to an open condition whenever a record media is absent. These inputs are applied to the gating arrangement 847 through conductors 849 and 850 and it will be appreciated by those of ordinary skill in the art from the annotations associated with the blocks 851–852 that the conductor 849 conveys an indication as to whether or not a record media has been loaded at the read/write record media station while the conductor 850 conveys an indication as to whether or not a record media has been appropriately loaded at the read only record media transport station. Therefore, when a ONE (1) level resides on conductor 849 such ONE (1) level indicates that a record media is properly in place at the read/write record media transport station and hence that the read/write record media station may be the active reader although the actual role played thereby will be further determined by the operative conditions defined at the keyboard by the operator. Similarly, when a ONE (1) level resides on conductor 850 it will be indicative that a record media has been appropriately loaded at the read only record media station and hence the read only record media station may be the active reader although the actual role played thereby will again be further determined by the operative condition specified at the keyboard. Conversely, when a ZERO (0) level resides on either conductor 849 or 850 the record media stations associated therewith may not be employed as the active reader and hence, a ZERO (0) level will be produced by the gating arrangement 847 on the conductor 841 and/or the conductor 848 to specify that the record media transport control apparatus associated with that transport station may not be employed as the active reader. The apparatus indicated by the blocks 851 and 852 may derive directly from the switch inputs located at the associated record media transport stations as aforesaid; however, it is preferred that such switch inputs be employed to set the logical output of flip flops associated therewith so that appropriate logic levels may be readily achieved. Thus, it will be appreciated by those of ordinary skill in the art that a threshold determination is made by the gating arrangement 847 as to whether or not a given transport station may be employed as the active reader and such threshold determination is governed by the input conditions on conductors 849 and 850. Therefore, if it is assumed that the record media transport control apparatus depicted in FIGS. 15A and 15B is associated with the read/write station while the conductor 848 is similarly connected to record media transport control apparatus associated with the read only station; if a ONE (1) level resides on conductor 849, a ONE (1) level may also be provided on conductor 841 depending upon the input conditions specified at the keyboard by the operator and similarly if a ONE (1) condition resides on conductor 850 a ONE (1) may also be provided by the gating arrangement 847 on conductor 848 assuming appropriate operational conditions have been set. However, if a Zero (0) resides on the input conductor 849, the gating arrangement 847 will provide a ZERO (0) on conductor 841 regardless of what input conditions have been set by the operator and similar results will obtain with respect to conductors 850 and 848 which have been assumed to be associated with the read only record media transport station.

The operational conditions for the instant embodiment of the automatic writing system according to the present invention as specified above, will also render it apparent that whenever the record mode key is depressed on the keyboard by an operator, the record media located at the read/write station may only be employed for recording purposes and hence may not be read in a manner to supply character information as an input to the instant invention. Therefore, even though a record media will have normally been appropriately loaded at the read/write record media transport station, the read/write record media transport station may not be employed as the active reader when the record mode key is depressed. As will be recalled from the initial portions of the description of the instant invention, whenever a particular mode of operation such as recording is initiated by the operator by the depression of the appropriate mode control key at the keyboard unit depicted in FIGS. 9A & 9B the mode of operation specified is conveyed to the main register M through the common data bus 19 and stored in the G register for reference purposes by the setting of a bit position within one of the rows of storage locations therein, so that the same will be readily available when required for reference purposes by the various modes of program control initiated by the operation of the read only memory 80. This indication that the automatic writing system is in a record mode of operation is also employed to provide an input to the gating arrangement 847 so that whenever the automatic writing system is in a record mode of operation the read/write record media transport station may not be utilized as the active reader. This may be achieved by employing the record mode indication stored in the G register to set a flip flop 853 in a complementary manner, as indicated in FIGS. 15A and 15B, so that whenever the automatic writing system is in a record mode a ZERO (0) will be applied through conductor 854 to an input to the gating arrangement 847 while when the automatic writing system is not in the record mode a ONE (1) level will reside on conductor 854. Alternatively, as shall be seen below, as an indication of a record mode of operation is employed to set the write flip flop 816, the condition of write flip flop 816 may be relied upon as an input on conductor 854. Thus, the gating arrangement indicated by the block 847 may effectively act to AND the inputs on conductors 849 and 854 so that an active reader indication can be supplied to the read/write record media transport station and more particularly the second transport status multiplexer 812 therein if a record media has been loaded thereat and the automatic writing system is not in a record mode and additionally provided that the input conditions are otherwise appropriate for the utilization of the read/write record media transport station as the active reader. Therefore, if it is again assumed that the record media transport control apparatus depicted in FIGS. 15A and 15B are associated with the read/write record media station while the conductor 848 connects to corresponding apparatus located at the read only record media station under the conditions heretofore described, a ONE (1) level may reside on conductor 841 if a ONE (1) level indicating that a record media has been appropriately loaded is present on conductor 849 while a ONE (1) level indicating that the automatic writing system is not in a record mode is present on conductor 854. Similarly, a ONE (1) level indicating that the read only record media station is the active reader may be present on the conductor 848 at the input of the gate arrangement 847 provided that a ONE (1) level is present on conductor 850 indicating that a record media is properly in place at this record media station. However, when a ONE (1) level resides on both conductors 849 and 850 indicating that record media have been loaded at both the read/write and read only record media stations while a ZERO (0) level resides on conductor 854, indicating that the record mode key has been depressed at the keyboard, a ZERO (0) would always be applied by the gating arrangement 847 to the conductor 841 which serves as an input to the second transport status multiplexer 812 while a ONE (1) level may be applied thereby to conductor 848 to provide a status indication to the second transport status multiplexer located at the read only record media station if the input conditions set at the keyboard, such as by the depression of the play mode key, are appropriate to cause a reading operation to occur from the read only record media station while a recording operation takes place at the read/write record media station.

The condition of the flip flop 853 is set, in response to an indication as to whether or not the record key at the keyboard has been depressed wherein such indication is stored in an appropriate bit location devoted thereto within the G register. The actual setting of the flip flop 853 is achieved however by a decoding of pertinent ROM bits read from the read only memory 80 within a branch instruction which results from a comparison operation indicating that the record mode of operation has been set and applied to the flip flop 853 through the common instruction word bus 20. Thus, whenever a record mode condition is stored in the G register and a program sequence of operations is initiated to test the state thereof, the condition of the flip flop 853 will be set to a ZERO (0 ) level to prohibit the application of a ONE (1) on the active reader input on conductor 841 to the second transport status multiplexer 812. Although the condition of the flip flop 853 may be set to prohibit the application of an active reader status input to the second transport status multiplexer 812 located at the read/write station soley in response to the condition of the record mode key as indicated by the condition of the bit in the G register devoted thereto, it will be appreciated by those of ordinary skill in the art that there are several additional modes of operation which may be designated at the keyboard which effectively act to place the read/write record media station in a record condition and hence should also be utilied to cause the application of a ZERO (0) on conductor 854 whenever such modes of operation have been selected. For instance, when record media have been loaded at both the read only and read/write record media stations and the duplicate mode key has been depressed at the keyboard, it will be recalled from the description of this mode of operation that the record media located at the read only record media station is essentially copied in whole or in part onto the record media located at the read/write record media station. Thus, whenever the duplicate mode of operation is initiated, it will be seen that the record media located at the read only record media station is read and recorded onto the record media located at the read/write station so that the read/write station is effectively operating in a record mode although automated and effectively limited to the output of the read only record media transport station by the logical sequence of program instructions initated by the duplicate mode of operation established and the subsequent actuation thereof by the depression of the various action keys which may be selected in this mode of operation. Therefore, whenever a duplicate mode of operation has been designated at the keyboard and record media have been properly loaded at both the read only and read/write record media stations it will be seen that an active reader application should be provided by the gating arrangement 847 on conductor 848 so as to be applied to the record media transport control apparatus associated with the read only record media transport station while a ZERO (0) status condition should be applied to conductor 841 to prevent the read/write record media station from acting as the active reader. For this reason, whenever a duplicate mode of operation has been selected by the operator by the depression of the duplicate mode key at the keyboard, this indication, as stored in an appropriate bit location within the G register, is also employed to set the flip flop 853 so that a ZERO (0) level is applied to conductor 854 to again place a ZERO (0) level on the output of the gating arrangement 847 connected to the conductor 841 while if a ONE (1) level resides on conductor 850, indicating that the record media is properly in place at the read only record media transport station, a ONE (1) level will be provided to conductor 848 to thereby provide an active reader status indication to the second transport status multiplexer associated therewith.

Similarly, when a transfer operation which is a two record media form of revise or any other form of selective or non-selective transfer operation from a record media located at the read only record media station to a record media loaded at the read/write record media station is employed, both the play and record mode keys will be depressed so that, depending upon the action keys utilized in association therewith, character information may be selectively read from the record media loaded at the read only record media station, loaded into the read only buffer 36, and transferred either directly or in conjunction with information inserted at the keyboard into the read/write buffer 35 for subsequent application and recording on the record media loaded at the read/write record media transport station. Under these conditions the record mode key will be depressed and hence the flip flop 853 will be placed in a set condition whereupon a ZERO (0) will be applied by the gating arrangement 847 to the conductor 841 to thereby specify that the read/write record media station is not the active reader while if a record media has been appropriately loaded at the read only station, so that a ONE (1) level resides on conductor 850, a ONE (1) level will be applied by the gating arrangement 847 to the conductor 848 to thereby provide an active reader status indication to the second transport status multiplexer located at the read only record media station.

In a revise mode, it will be recalled by those of ordinary skill in the art from the description thereof set forth above, that in essence, a prerecorded record media is loaded at the read/write record media station and read on a per line basis so that each line of information read therefrom is loaded into the read only buffer 36. Thereafter, the line of information loaded into the read only buffer 36 is selectively transferred to the read/write buffer 35 in such a manner that character information to be deleted is skipped while character information to be added in achieving the intended revision of the prerecorded line of character information is entered from the keyboard. After the line of revised information has been appropriately loaded into the read/write buffer 35, it being noted that only fifty (50) additional characters may be utilized in this single record media form of revise, the entire contents of the read/write buffer are recorded onto the record media loaded at the read/write station on the portion thereof which was utilized for the line of information originally read and loaded into the read only buffer 36 so that effectively the prerecorded line of information is revised so as to manifest a character content corresponding to the character content of the line of information accumulated in the read/write buffer 35 in response to the selected insertion of character information therein from the read only buffer 36 and the keyboard. Thus, in essence, the revise mode of operation employs the record media loaded at the read/write record media station in both a reading and recording application. Therefore, as will be appreciated by those of ordinary skill in the art, an active reader status indication or ONE (1) should be provided on conductor 841, again assuming that the record media transport control apparatus depicted in FIG. 11 is associated with the read/write record media transport station, during the intervals in a revise operation in which the record media loaded thereat is being read while a ZERO (0) or inactive status indication should be applied to conductor 841 whenever a recording operation is taking place. The revise mode presently being discussed is initiated by the operator by the loading of a pre-recorded record media at the read/write record media station and the depression of the revise key at the keyboard. In addition, as will be appreciated from the discussion thereof set forth above, once the prerecorded record media has been properly manipulated to the block of information to be acted upon, the reading thereof is initiated by the operator by additionally depressing the play key and thereafter action keys which are appropriate for selectively reading the content of the read only buffer 36 which are desired to be retained and hence inserted into the read/write buffer 35. In addition, the skipping of information to be deleted from the line of information loaded into the read only buffer 36 is accomplished by the operator depressing the skip key, and thereafter the depression of action keys appropriate to the skipping of the desired character information. Thereafter, the normal play mode is reestablished by depressing the play key whereupon the operator may add new information inserted at the keyboard or continue the transfer of character information from the read only buffer 36 to the read/write buffer 35. When the newly revised line of information has been completely accumulated in the read/write buffer 35 as indicated by the insertion of a carriage return character therein, a program sequence is initiated by the detection of this carriage return character which causes the contents of the read/-write buffer 35 to be recorded onto the record media on the portion thereof previously occupied by the line of information initially read into the read only buffer 36. Thus in this manner a revised line of character information is accumulated in the read/write buffer 35 and substituted for that previously recorded on the record media on the same portion thereof occupied previously by the original line.

In the revise mode of operation, as will be readily appreciated by those of ordinary skill in the art, a record mode of operation is initiated under program control, when a carriage return character is detected and inserted into the read/write buffer 35 except that in the revise mode of operation fifty (50) redundant characters for subsequent utilization are not recorded onto the record media as is the case in an actual record mode, of operation, as aforesaid. However, for all other practical purposes a record mode of operation is carried out at the record media loaded at the read/write record media station when a carriage return character is loaded into the read/write buffer 35 and the presence thereof is detected by the microprocessor indicated by the dashed block 16. Therefore, the same branch operation which causes the recordation of the new line of character information loaded in the read/-write buffer onto the record media will cause the flip flop 853 which may be identical to the write flip flop 816, as aforesaid, to be set for the duration of the recording operation initiated so that the active reader indication which was previously supplied on the conductor 841 during the portion of the revise mode of operation devoted to playing back the prerecorded material is terminated and an inactive reader status indication provided on conductor 841 to the second transport status multiplexer 812 for the duration of the recording interval in the revise mode of operation heretofore described. Thus it will be appreciated by those of ordinary skill in the art, that when a revise mode of operation is initiated by an operator, the loading of the record media in the read/write record media station will cause a ONE (1) level to be applied to conductor 849 while the absence of a record mode of operation designation within the G register will cause a ONE (1) level to reside on conductor 854 whereupon the gating arrangement 847 will apply an active reader status indication to the second status multiplexer 812 through conductor 841; however, this active reader status indication will be periodically disabled by the setting of the flip flop 853 when a recording operation is initiated under program control in response to the detection of the insertion of a carriage return character into the read/write buffer 35 for the revised line of information being accumulated. Accordingly, it will be appreciated by those of ordinary skill in the art that the inputs on conductors 849, 850 and 854 to the gating arrangement 847 act in combination to assure that an active reader status indication will be supplied on conductor 841 for the read/write record media transport whenever a record media is loaded only at the read/-write record media station and no record mode, or its equivalent has been specified or is in process. However, when a record media has been loaded at both the read only and read/write record media transport stations and a duplicate or record mode of operation has been initiated at the keyboard, an inactive reader status indication will be provided on conductor 841 while an active reader status indication will be provided on conductor 848 so that the transfer of information present on a prerecorded record media loaded at the read only record media transport station to a record media loaded at the read/write record media transport may proceed.

Although the inputs on conductors 849, 850, and 854 to the gating arrangement 847 may be logically operated upon through AND gate arrangement to provide appropriate active reader status indications on conductors 841 or 848 to accommodate the operational modes initiated by the operator which have been described above, other modes of operation may be initiated which may not be similarly accommodated by the three inputs to the gating arrangement 847 supplied on conductors 849, 850 and 854. Such additional modes of operation would be present, in essence, whenever record media are loaded at both the read/write and read only record media transport stations and no record mode of operation or corresponding recording operation is initiated in response to the mode of operation designated by the operator. Typical examples of such modes of operation would be encountered whenever record media are loaded at both transport stations and a search or play mode of operation is initiated at the keyboard. Under these conditions, either the read/write or read only record media transport station could be selected as the active reader and the inputs to conductors 849, 850, and 854 will not serve to further express the operator's selection when these conditions obtain. Thus, it may be desired to search either or both of the record media loaded for specified block addresses or alternatively the selected reading of both record media in a manner to achieve the merging of information therefrom may be desired. For operations of this type, however, it will be recalled from the description set forth in conjunction with the keyboard illustrated in FIGS. 9A and 9B that a requirement is necessary that the operator designate which reader is active by inspecting the active reader indication provided by the illuminated digital display 11 or 12 associated with the reader which is presently active and should the record media loaded in the record media transport station associated therewith not be desired as the active reader the operator is required to depress the alternate reader key at the keyboard to change the other reader to the active reader. Furthermore, it will be recalled that whenever the alternate reader key is depressed an eight bit code representative thereof is applied through the common data bus 19 to the main register M and upon the subsequent classification of this character, a branch instruction is read from the read only memory 80 to provide a switch commond on the output of the keyboard output demultiplexer 522 on conductor 557 as shown in FIG. 10. In response to the switch command provided on conductor 557 the active reader indication provided by the digital displays 11 and 12 is changed from that which previously obtained and the search operation may be initiated by the depression of the search action key whereupon a search for the block address specified by the setting of the thumbwheels 506, as shown in FIGS. 9A and 9B, is initiated. Similarly, where a batching operation wherein information is merged from prerecorded record media loaded at both the read only and the read/write record media transport stations is initiated, information may be selectively read from predetermined ones of said record media in a normal play mode in response to switch or switch and search commands recorded on the record media when such prerecorded record media were initially set up in the initial recording operation carried out by the operator. More particularly, whenever a switch or switch and search code is read from the prerecorded record media by the insertion of the line of information in which such code resides into the read/write or read only buffer 35 or 36 associated with the active transport, and such switch or switch and search code is thereafter outputted therefrom and inserted into the main register M, the subsequent classification of this switch or switch and search command will result in the application under program control of a switch command at the output of the keyboard output demultiplexer 522 on conductor 557, as shown in FIG. 10. The switch command provided in response to the switch or switch and search codes recorded will result in a change of the active reader whereupon playback therefrom will be initiated in accordance with the instructions received and hence information recorded thereon will be printed until a new switch or switch and search command is again received. Thus, regardless of whether the switch command provided on conductor 557 at the output of the keyboard output demultiplexer 522 is authored by the depression of the alternate reader key at the keyboard or results from the reading of a switch or switch and search code prerecorded on the record media, the switch command provided on conductor 557 will result in a changing from one active reader to the other.

The change in the active reader in response to a switch command on the output of the keyboard output demultiplexer 522 applied to the conductor 557 is achieved, as now will be apparent to those of ordinary skill in the art, by the application of an active reader status input by the gating arrangement 847 to the appropriate one of the read/-write or read only record media transport stations on one of conductors 841 or 848 as shown in FIGS. 15A and 15B. More particularly, the switch command output conductor 557 is connected to the recod media transport control apparatus illustrated in FIGS. 15A and 15B and specifically to the clock (CK) input of a clocked flip flop 855 which provides an input through conductor 856 to the gating arrangement 847. The flip flop 855 may comprise any conventional form of clocked flip flop and acts in the well known manner to load the state of the D input thereto in the presence of a clocking pulse. The D input to flip flop 855 is connected to receive the condition of data bit $Db_4$ from the common data bus 19, as indicated in FIGS. 15A and 15B and the condition of the data bit $Db_4$ specifies which reader is selected as active by the switch reader command. The ONE (1) or ZERO (0) condition of data bit $Db_4$ is set as a constant read from the Read Only Memory 80 as a part of the switch command generated and effectively acts to toggle or change the state of the flip flop 855 each time a switch command is generated so that a desired transport is selected. Therefore, when a first switch command is recieved by the flip flop 855 a ONE (1) may be provided at the output thereof connected to conductor 856 while the second switch command pulse received thereby will result in the application of a ZERO (0) to the output conductor 856 and alternate toggling of the state of the output of the flip flop 855 under processor control will continue with each switch command received thereby. Thus, regardless of whether the switch command provided on conductor 557 result as a function of the depression of the alternate reader key at the keyboard or from the reading of switch or switch and search codes from a prerecorded record media each switch command pulse produced at the output of the keyboard output demultiplexer 522 will cause the flip flop 855 toggle by following the condition of data bit $Db_4$ and hence will result in a change in the input condition to the gating arrangement 847 applied on conductor 856.

The decoding arrangement provided by the gating arrangement 847 is such that the inputs thereto provided on conductors 849, 850 and 854 will have priority over the output of the flip flop 855 provided as an input thereto on conductor 556. This can be achieved, as will be readily appreciated by those of ordinary skill in the art by ANDing the output of the flip flop 855 with the previously gated or ANDed inputs on conductors 849, 850 and 854 in such a manner that the output of the flip flop 855 will only act to control the output of the gating arrangement 847 when a ONE (1) condition resides on each of the input conductors 849, 850 and 854. This means that the output of the flip flop 855 will only control the output of the gating arrangement 847 when a search or multimedia play operation has been initiated because the requirements of ONE (1) inputs on each of conductors 849, 850 and 854 are such that a record media must have been loaded in both the read only and read/write record media stations and a record condition as either specified by a depression of the record key or the utilization of a mode of operation where actual record operations take place at the read/write station is absent. When these input conditions obtain on conductors 849, 850 and 854, the gating arrangement 847 will follow the input thereto provided on conductor 856 such that the active reader status indication, as indicated by a ONE (1) on one of the conductors 841 or 848 is alternated in response to the ONE (1) or ZERO (0) condition of the input of the flip flop 855. Thus, for instance, whenever a ONE (1) is present on conductor 856 a ONE (1) may be applied to conductor 841 while a ZERO (0) is applied to conductor 841 while a ZERO (0) is applied to conductor 848 and conversely when a ZERO (0) resides at the output of the flip flop 855 on conductor 856, a ZERO (0) may reside on conductor 841 at the output of the gating arrangement 847 and a ONE (1) resides on the conductor 848. Accordingly, it will be appreciated that whenever a record media is located in both the read only and read/write record media transport stations and a search or multimedia play operation is initiated by the operator, the active reader status indication provided by the gating arrangement 847 on conductor 841 or 858 will vary as a function of the condition of the flip flop 855 which toggles in response to each switch command pulse provided thereto by the keyboard output demultiplexer 522 acting under program control. When an active reader status input is provided to the second transport status multiplexer 812 for the read/write record media transport station or when the corresponding active reader input is provided to the second transport status multiplexer associated with the read only record media transport station and this status condition is sampled under program control on the common status bus 21 in a manner to be described subsequently, it will cause a branch operation to be initiated so that the single address programming technique employed in the instant invention branches or shifts the program to a mode of sequencing wherein the read operation at the designated active reader will be initiated in conjunction with the mode of operation otherwise specified at the keyboard. Therefore, as will be appreciated by those of ordinary skill in the art, the active reader status inputs supplied by the gating arrangement 847 will cause a read operation at a designated active reader within the automatic writing system according to the present invention to correspond to the mode of operation designated by the operator at the keyboard provided such mode of operation is initiated in conjunction with the appropriate loading of record media at the various record media transport stations employed and that consistent modes of operation have been specified.

The input provided to the second transport status multiplexer 812 on conductor 842, as indicated by the annotations associated therewith in FIGS. 15A and 15N is a status input indicative of whether or not the rewind/eject button 9 or 10 at the console associated with the read only or read/write record media transport system in which the record media transport control apparatus depicted in FIGS. 15A and 15B is associated has been depressed. More particularly, it will be recalled that the rewind/eject buttons 9 and 10 provided at the console, for operator control, as shown in FIG. 1, are such as to enable the operator to reject a magnetic card or to remove in a rewound condition record media loaded at the read only or read/write record media transport stations. Thus, in the case of the cassette transports, when either of the rewind/eject keys 9 or 10 are depressed a record media located at that station would be rewound and thereafter the door to the transport would be opened while the media is ejected so that the same could be readily removed by the operator. Conversely, where a magnetic card is employed, the depression of corresponding eject and rewind buttons would result in the ejection of the record media previously loaded. As will be appreciated by those of ordinary skill in the art no reading, recording, search or other manipulation operations associated with a given record media transport station may occur when either the rewinding or ejection of the media is taking place or in the case of a cassette embodiment when the door to the record media transport is in an opened condition. Furthermore, as the rewinding and ejection of the record media occurs as a function of the mere depression of the eject/rewind buttons 9 and 10, the presence of this condition must be available for sampling to the program sequence in operation prior to the initiation of any operation at the record media transport station associated therewith. Accordingly, in the case of cassette embodiments of the instant invention, the eject/rewind keys 9 and 10 and the cover to the respective transport associated therewith may be provided with an additional set of contacts to provide a status indication as to whether or not the eject/rewind button has been depressed or the door to the record media transport station is in an opened condition. These sets of contacts may be employed to provide a logical indication through the setting of a flip flop or the like to the second transport status multiplexer 812, on conductor 842, so that the presence or absence of this condition may be selectively gated onto the common status bus 21 for sampling prior to the initiation of various operational program sequences by the microprocessor indicated by the dashed block 16. As should now be appreciated by those of ordinary skill in the art, one mode of addressing, employed in the instant invention, is such that when a ONE (1) condition is applied to the common status bus 21 in response to a command gating of the status input on conductor 842 thereto, a branch operation will be initiated to further promote the operational sequence specified at the keyboard while when a ZERO (0) is provided thereto a monitoring sequence is initiated wherein this status condition is monitored until an appropriate status indication indicating that the rewind/eject button is not depressed is received. Therefore, in order that appropriate ONE (1) and ZERO (0) information indicative of the respective conditions sought to be monitored are provided to the common status bus 21, the switch conditions monitored on conductor 842 is a NOT condition and hence whenever a ONE (1) level resides on conductor 842 it will be indicative that the door to the record media transport stations associated therewith is closed and that the rewind/eject button or card eject button is not depressed. Conversely, when a ZERO (0) level resides on conductor 842 it is indicative that either the door is opened or rewind/eject button is depressed. Thus, when the status condition associated with the input on conductor 842 is selectively gated onto the common status bus 21, a ONE (1) thereon will cause a branch operation to continue program instructions calculated to further promote the operations specified at the keyboard while a ZERO (0) thereon results in a monitoring routine wherein no further action is taken with regard to the record media transport station associated therewith until an appropriate ONE (1) condition is subsequently received. Additionally, the detection of the ZERO (0) level on conductor 842 may actively initiate the rewind and/or eject function under program control.

The input to the second transport status multiplexer 812 on conductor 844 is indicative that the record media presently being processed is reaching an end and hence, in a recording operation, an indication should be provided to the operator that only a few more lines of character information may be recorded before the actual end of the record media is reached whereupon no further recording may take place. The actual detection of this portion of the record media may be achieved, in a manner well known to those of ordinary skill in the art, by the provision of an aperture in the record media at a location therein near the end of the useable recording portion of such media. This aperture, is sensed by the magnetic head or photocell employed in the well known manner and whenever such an indication is received it is relied upon to set a flop and hence provide a ONE (1) level on the conductor 844. The detector employed may also take the form of that relied upon to detect the end of media signal associated with clear leader; here, however, such an input may be ANDed with the direction input on conductor 828 to ensure proper time of this level in the forward direction. In a typical recording operation the status condition on conductor 844 is periodically checked by the gating of this input onto the common status bus 21. Whenever a ONE (1) is detected on the common status bus 21 in response to the selection of this status input to the second transport status multiplexer 812, a branch operation is initiated which causes an audible or visible alarm to be issued. This visual or audible alarm acts to apprise the operator that the useable length of the record media being employed in the instant operation is approaching exhaustion and hence only a few more lines of character information may be inserted prior to the stopping of the instant operation and the insertion of a new record media at the record media transport station associated therewith. The significance of this indication to the operator may be appreciated when it is recalled that whenever recording is terminated an end of record character is automatically recorded on the record media so that when a new recording operation employing that record media is subsequently initiated, and the erase key is not depressed, the record media may be automatically searched under program control to detect the end of record character and hence an appropriate point where recording may be resumed without destroying previously recorded information. Should the operator not observe the alarm sounded in response to a ONE (1) level applied on conductor 844 to indicate that the end of the useable portion of the record media is being approached more information than could be recorded may be submitted as each succeeding line of information is accumulated into the read/write buffer 35 prior to recording and even if a full line of the character information therein could be recorded sufficient room at the record media for the recording of an end of record character might not be available. Hence, it is generally good procedure to recommend to the operator that once the near the end of the media alarm is issued, the line of information presently being accumulated should be completed and thereafter the operation should terminate for the loading of a new record media. Therefore, the aperture in the record media employed to indicate this condition should be physically at a point which is sufficiently removed from the beginning of the clear leader to allow sufficient space for the recording of at least two lines of information. Accordingly, it will be appreciated that those of ordinary skill in the art, that the near end of media status input applied to the second transport status multiplexer 812 on conductor 844, when gated onto the common status bus 21 under program control, acts to apprise the operator that the end of the useable recording media is being approached and that the recording operation must be terminated so that other record media may be installed within the automatic writing system according to the instant invention.

The servo unsafe not input applied to the second transport status multiplexer 812 on conductor 845 is a status input which serves to monitor the propriety of operation of the record media transport system with which the record media transport control apparatus depicted in FIG. 15A is associated. More particularly, as shall be seen below, the record media transport systems employed within the instant invention, as described in detail in U.S. application Ser. Nos. 329,054–329,056, supra, are energized in a preselected manner by the application of a plurality of logic levels thereto, which logic levels specify the speed and direction with which the associated record media transport system is to operate. Furthermore, as was described above, the nature of the record media transport system employed is such that once it is commanded by the setting of these logic levels to initiate a given operation, no recording or playback will take place until a record media at speed status indication is received on the status conductor 825. This record media at speed status inpt is developed, as was described above, as a function of the error signal utilized to control such record media transport system throughout the duration of its operation. However, the nature of the recording technique employed within the instant invention is such that each line of information recorded or played back is spaced on the record media by an interrecord gap having a substantially fixed duration. This means that the record media transport system employed must bring the record media to speed within a fixed interval measured by ½ the length of the interrecord gap intermediate lines of recorded information or within the lead in portion of a track on a magnetic card so that appropriate recording or playback may take place as soon as the first character associated with a given line of information is reached. This is mandated, as will be appreciated by those of ordinary skill in the art, since if the record media is not at speed when the initial character of a line of recorded information reaches the playback portion of the head, the information associated with such character will be lost or at least highly distorted. Therefore, the record media transport system employed in conjunction with the instant invention is additionally provided with a timer which is initiated each time a motion command is issued to the record media transport system. The timer is disabled by the record media at speed signal developed in a manner described above and applied to the conductor 825. If once the timer is initiated it is subsequently disabled before the timing interval selected therefor is exhausted by the application of a record media at speed signal applied thereto, no output is generated by this timer; however, should the timer time out prior to the receipt of a record media at speed signal, the timer will generate a logic level indicative that the record media has not been brought to speed within the predetermined interval required for a recording or play operation to take place at the portion of the record media which is normally associated with the appearance of the first character for a line of given information. This signal is inverted and applied as a Servo Unsafe Not signal to the conductor 845 which serves as a status inpt to the second transport status multiplexer 812 and when a servo unsafe signal is detected under program control the continuance of instructions causing the recording or playback operation in progress is terminated as the record media was not brought to speed within the predetermined interval after a run command or the like was issued. Thus, a ONE (1) level on conductor 845 will indicate that no servo unsafe condition is present while a ZERO (0) condition on conductor 845 will indicate that the record media transport control associated with the record media transport control apparatus depicted in FIGS. 15A & 15B was not brought to speed within an appropriate interval and hence the instant operation taking place must be terminated and either tried again under program control or alternatively an alarm may be sounded requiring the operator to clear the condition by a depression of the character stop key and a reinitiation of the operation previously attempted. In practical embodiments of the instant invention it is generaly preferably to attempt the reinitation of the recording or play operations specified several times prior to the issuance of an alarm and if after such several occasions an alarm must be issued, instructions are generally provided to the operator that the problem is catastrophic and that a new record media must be utilized. Thus, whenver in the sequence of sampling the various status inputs associated with the first and second transport status multiplexers 811 and 812 a ONE (1) appears on the input conductor 845 and is reflected onto the common status bus 21, a branch operation is initiated in response thereto which acts to further promote the recording or play operations specified while when a ZERO (0) level appears on conductor 845 either the termination of such operation is initiated under program control or a plurality of reinitiations thereof are attempted. Accordingly, the servo unsafe status input provided on conductor 845 to the second transport status multiplexer 812 ensures that the record media is brought to speed within a designated portion of the interrecord gap intermediate lines of information or else the operation specified is terminated or aborted to thereby ensure that fixed intervals for interrecord gaps intermediate lines of prerecprded information are established and hence that a prerecorded record media may be read with propriety at each subsequent utilization thereof and such prerecorded record media may be utilized on other automatic writin systems according to the instant invention than at that which the preparation thereof took place.

The input on conductor 846 to the second transport status multiplexer 812 is a status input which, as indicated by the annotations associated therewith in FIGS. 15A and 15B, monitors the status condition of the run flip flop. The run flip flop, as shall be seen below, is a flip flop which issues one of the logical control signals to the record media transport system associated with the record media transport control apparatus depicted in FIGS. 15A & 15B and more particularly when a logical ONE (1) is issued thereby to the record media transport system, the system is enabled to follow the control signals issued by the speed and direction flip flops associated therewith. Therefore, whenever the run flip flop is enabled, it provides a status indication that displacement commands have been issued to the record media transport system associated with the record media transport control apparatus depicted in FIGS. 15A and 15B. Such a status input is required for the single address program control employed by the instant invention because prior to the issuance of any branch instruction calculated to implement a recording, play, or search operation at a designated record media station, it is necessary to determine whether or not such record media station is presently operative or in an idle condition awaiting the issuance of instructions thereto. Thus, in checking the various status inputs provided to the first and second transport status multiplexers 811 and 812 prior to the issuance of commands causing the energization of a record media transport system, the status input on conductor 846 is gated onto the common status bus 21. If a ZERO (0) resides thereon the program sequence then in process may be initiated to further promote or initiate the record, play or search operation specified at the keyboard. However, if a ONE (1) level resides on conductor 846 a branch operation is initiated causing the microprocessor indicated by the dashed block 16 to monitor the operation of the associated record media transport until such transport is ready to receive new operational commands. Thus, the status input associated with the run flip flop provided on conductor 846 serves to provide an indication on the common status bus 21 as to whether or not the record media transport associated with the record media transport control apparatus depicted in FIGS. 15A and 15B is in a condition to receive command instructions for causing the operation thereof or whether such command instructions must be held in abeyance pending the termination of the present invention being conducted thereat.

The selected one of the various inputs to the second transport status multiplexer 812 is specified by a decoding of ROM bits $B_4 - B_6$ as applied to the select inputs thereto through conductors 830 - 832. These select inputs, as will be appreciated by those of ordinary skill in the art, are the same select inputs employed in the designation of a particular one of the status inputs to the first transport status multipleer 811 and are obtained by a decoding of ROM bits $B_4 - B_6$ issued in each instruction read from the read only memory 80 in the same manner as was discussed above in conjunction with the first transport status multiplexer 811 or for that matter any status multiplexer utilized in any of the peripherals relied upon in the instant invention because, as will now be appreciated by those of ordinary skill in the art, the same ROM bits are employed to define given status inputs at each of the peripherals while the strobe input applied to each multiplexer is utilized to activate that multiplexer and apply a selected status input to the output thereof and hence gate this status input onto the common status bus 21. The strobe input to the second transport status multiplexer 812 is applied through conductor 857 from a NAND gate 858 which acts in the well known manner to gate a selected status input to the output of the second transport status multiplexer 812 connected to conductor 859 in the same manner as was described for the first transport status multiplexer 811. The NAND gate 858 may take the conventional form of a two (2) input NAND gate which acts whenever both of the inputs thereto are high to produce a low or strobe input on conductor 557.

A first input to the NAND gate 858 is applied to conductor 860 and takes the form of an address input defining the record media transport associated with the record media transport control apparatus depicted in FIGS. 15A and 15B. Thus, the input applied to the conductor 860 may take the same form as the input described above in connection with conductor 836 and results from an appropriate decoding of the ROM bits issued in each instruction from the read only memory 80. Therefore, the select inputs to both the first and second status multiplexers 811 and 812 are commonly controlled by ROM bits $B_4 - B_6$ while the enabling of a selected one of such transport status multiplexers is controlled by the application of a strobe pulse thereto; and whenever an appropriate address is contained in an instruction read from the read only memory 80 defining the record media transport system associated with the record media transport control apparatus depicted in FIGS. 15A and 15B, either first or second transport status multiplexer 811 or 812 will be selectively enabled by the application of a strobe pulse thereto and such selective enabling is a function of the condition of ROM bit $B_7$. Thus, if ROM bit $B_7$ is a ONE (1), the output of NAND gate 858 will go low to thereby selectively enable the second transport status multiplexer 812 while if ROM bit $B_7$ is a ZERO (0) the output of NAND gate 835 will go low to selectively enable the first transport status multiplexer 811.

The outputs of the first and second transport status multiplexer 811 and 812 are connected through conductors 829 and 859, respectively, to the first and second inputs of an OR gate 862. The OR gate 862 may take any of the conventional forms of this well known logic device which acts in the conventional manner to provide a high level at the output thereof when either of the inputs thereto are high. The output of the OR gate 862 is connected, as indicated in FIGS. 15A and 15B, to the common status bus 21 through the status conductor 71 or 61 associated with the record media transport station in which the record media transport control apparatus depicted in FIGS. 15A and 15B resides. Accordingly, it will be appreciated by those of ordinary skill in the art that a given one of the inputs to the first and second transport status multiplexers 811 and 812 are selected by the condition of ROM bits $B_4 - B_6$ contained in each instruction issued by the read only memory 80 while when the record media transport system associated with the record media transport control apparatus depicted in FIGS. 15A and 15B is addressed one of the first or second transport status multiplexers 811 or 812 will be selectively enabled by the condition of ROM bit $B_7$ to gate the selected input into the common status bus 21. In this manner, the various status conditions monitored for the record media transport control apparatus depicted in FIGS. 15A and 15B may be sensed on the common status bus 21 during the frequent sampling intervals associated with each instruction sequence and depending on the condition of the status input monitored, the program sequence then in progress may be continued to further promote the operation specified by the operator at the keyboard or alternatively a monitor or other operation may be initiated to await the receipt of an appropriate status condition which must act as a predicate to the further promotion of the operation specified.

The actual control of the record media transport system associated with the record media transport control apparatus depicted in FIG. 15A is achieved by the transport control flip flops 813–817 which respond to ROM bits read from the read only memory 80 with each instruction issued, and respond thereto to provide predetermined control levels to the record media transport system to cause the energization thereof in the manner defined by instructions decoded. Common control characteristics for the card transport are exercised by flip flops 813, 815 and 816 shown in FIG. 15B and hence the disclosure set forth herein extends thereto. More particularly, the record media transport system employed within the automatic writing system according to the present invention is responsive to the condition of the transport control flip flops 813–815 to cause the record media to be driven in a predetermined direction and speed as demanded by each instruction read from the read only memory 80. Thus, as described in the aforesaid U.S. application Ser. Nos. 329,054 - 329,056, for instance, a reference generator or voltage generator located at the record media transport system is responsive to the output of the run transport control flip flop 813 to produce an output level whose polarity and magnitude are governed by the logic levels at the outputs of the transport control flip flops 814 and 815. The output of the reference voltage generator in turn controls the speed and directivity in which the record media is driven within the record media transport system. For instance, in a conventional digital cassette record media transport system the record media may be displaced in either the forward (clockwise) or reverse (counter clockwise) direction at a speed which is either appropriate to a read or play operation or a fast speed which is appropriate to a search operation. The reference voltage generator located in the record media transport system, when enabled by the output of the run transport control flip flop 813 will thereby respond to the output of the direction transport control flip flop 815 to provide an output signal whose polarity will determine the direction with which the record media is displaced and whose magnitude is a function of the speed transport control flip flop 814 which controls the displacement rate of the record media.

In cassette embodiments the record media, may be displaced in either the forward (clockwise) or reverse (counter clockwise) direction at speeds such as twenty inches per second (20 ips) which is appropriate for reading and recording or seventy inches per second (70 ips) which is appropriate for search and rewind operations. Similarly, in magnetic card embodiments, the card is displaced at a relatively constant rate of twenty inches per second (20 ips), however, it is displaced in both a forward (out of the transport), and reverse (into the transport) directions while the head is driven between tracks by a separately driven lead screw. The card is driven by a motor controlled pinch roller whose functions are controlled by the states of flip flops 813 and 815 shown in FIG. 15B while the write control flip flop 816 performs the same functions in FIGS. 15A and 15B. It will thus be seen that the transport control flip flops 813–815 in FIG. 15A and flip flops 813 and 815 in FIG. 15B control the selective enabling of the record media transport system associated with the record media transport control apparatus depicted in FIGS. 15A and 15B in such a manner that not only is such record media transport system selectively enabled by instructions read from the read only memory 80, but in addition thereto, the direction and where applicable the speed with which the record media is displaced is also controlled thereby.

Similarly, the transport control flip flop 816 controls the application of a recording bias to the write head located at the record media transport system associated with the record media transport control apparatus depicted in FIGS. 15A and 15B and hence when this transport control flip flop is selectively enabled, it effectively acts to turn on the write head so that a recording operation is enabled. The remaining transport control flip flop 817, shown only in FIG. 15B, acts to control the selective opening of the door associated with the record media located at the record media transport station so that the removal or loading of a record media in the form of a cassette or the like may take place. In the case of a cassette embodiment, the depression of the eject/rewind buttons 9 and 10, shown in FIG. 1, act to cause both the rewinding of the record media loaded and the opening of the doors to the associated record media chamber upon appropriate completion of the rewind operation. Therefore, the opening of the chamber door, as controlled by the transport control flip flop 817 should not take place until the record media has nbeen completely rewound as indicated by the detection of an end of media, clear leader or foil detection, condition on the common status bus 21 indicating that the rewind operation is completed. The opening of the chamber to the record media transport system is actuated under program control so that the rewind operation is completed prior to the opening of the door to the chamber. Accordingly, the selective enabling of the transport control flip flops 813– 817 by instructions read from the read only memory 80 acts to fully control all aspects of the record media transport system associated with the record media transport apparatus depicted in FIGS. 15A - 15B.

The run transport control flip flop 813 may take the conventional form of a D type edge triggered flip flop such as an SN7474 flip flop conventionally available from the Texas Instrument Corporation. Accordingly, this well known type of flip flop configuration is provided with a clear, clock, and D input as well as direct and complementary outputs and acts in the well known manner to be set on the positive edge of the clock pulse by an input applied to the D input thereof which is thereafter locked out. The clear input to the run transport control flip flop 813 is connected through conductor 864, as are all of the transport control flip flops 813–817, to a clear pulse generator 865. The clear pulse generator 865 may take the form of a conventional pulse generator which is responsive to instructions read from the read only memory 80 to generate a pulse suitable for clearing the run transport control flip flop 813 as well as the remaining transport control flop flops 814–817 to place them in a cleared condition and hence a suitable conditon to be set upon the application of a clock and an input at the D inputs thereto. A clear input is generated under program control by the clear pulse genrator 865 each time the system is initialized during a power on sequence or when the automatic writing system according to the present invention is periodically reset. At other times, however, the condition of the run flip flop 813 will reflect the input applied thereto at the D input during the positive edge of a clock pulse and will retain such condition until the next clock pulse is received unless a clear cycle is initiated. Therefore, as will be appreciated by those of ordinary skill in the art, the run flip flop 513 will manifest an outpt state corresponding to the input applied to the D input thereof during the positive edge of a clock pulse applied thereto and will retain this condition until the next clock pulse is applied, whereupon the state thereof will again follow the input applied to the D input thereof.

The clock input to the run transport control flip flop 813, like the clock inputs to the transport control flip flops 815 and 816, are connected through a conductor 866 to the output of NAND gate 867. The AND gate 867 may take the form of a four (4) input NAND and hence acts in the conventional manner to provide a low output when all of the inputs thereto are high while providing a high level output for all other sets of input conditions. The function of the NAND gate 867, as shall be seen below, is to apply clock pulses to the conductor 866 and hence to the clock inputs to the transport control flip flops 813, 815 and 816 whenever the NAND gate 867 is properly enabled by ROM bits decoded from instructions read from the read only memory 80; it being appreciated that the appropriate ROM bits for otherwise enabling the NAND gate 867 will be present in any instruction read from the read only memory 80 which is devoted to causing the operation of the record media transport system controlled by the record media transport control apparatus depicted in FIGS. 15A and 15B. The first input to the NAND gate 867 is connected through conductor 868 to a decoder network, not shown, which acts to determine the presence of ROM bits defining the modular three address of the record media transport control system and more particularly, the record media transport control system with which the record media transport control apparatus depicted in FIGS. 15A and 15B is associated. The ROM bits which are decoded to provide the address input on conductor 868 are identical to those discussed in connection with the inputs to NAND gates 835 and 858 associated with conductors 836 and 860 respectively; and it will be appreciated by those of ordinary skill in the art that whenever the record media transport system associated with the record media transport control apparatus depicted in FIGS. 15A and 15B is addressed for a particular operation bt the read only memory 80, a ONE (1) level will reside on conductor 868 indicating that the appropriate address therefor has been read from the read only memory 80 as a part of the sixteen (16) bit instruction word utilized in the issuance of instructions to the record media transport control system or for any other peripheral employed within the instant invention. In addition, as plainly illustrated in FIGS. 15A and 15B the second and third inputs to the NAND gate 867, as provided on conductors 869 and 870 are connected to the individual bit conductors within the common instruction word bus 20 associated with ROM bits $B_{10}$ and $B_{11}$ (not) and hence whenever an instruction is read from the read only memory 80 in which ROM bit $B_{10}$ is in a ONE (1) condition and ROM bit $B_{11}$ is in a ZERO (0) condition the inputs provided to the NAND gate 867 on conductors 869 and 870 will be high. Therefore, as will be readily appreciated by those of ordinary skill in the art, the NAND gate 867 will be enabled by the three (3) inputs provided on conductors 868 - 870 whenever an instruction is read from the read only memory 80 in which the record media transport system associated with the record media transport control apparatus depicted in FIGS. 15A and 15B is addressed and ROM bits $B_{10}$ and $B_{11}$ (not) in such instruction are at a ONE (1) level. Thus, when the inputs to conductors 868–870 are in a high condition in response to an instruction read from the read only memory 80 the output of the NAND gate 867 will follow the complement of the remaining input thereto.

The remaining input to the NAND gate 867 is provided through conductor 871 from a clock pulse generator 872. The clock pulse generator 872, like the remaining clock pulse generators described in conjunction with the instant invention may comprise an independent clock pulse generator or alternately may be derived from two subphases of the system clock. For instance, the complements of clock subphases CA and CD may be relied upon in cassette embodiments of the instant invention while the complements of clock subphases CC and CB may be employed in magnetic card embodiments of the instant invention to provide clocking during clock intervals $CL_6$ and $CL_7$, respectively. However, for the purposes of the instant description, clock pulse generator 872 may be assumed to generate a 500 kilohertz clocking frequency wherein each clock pulse generated has a duration of two hundred fifty nanoseconds (250 ns). Therefore, whenever the NAND gate 867 is otherwise enabled by instructions read from the read only memory 80 which provide a high level input on each of conductors 868–870, the clock pulses applied to conductor 871 from the clock pulse generator 872 will result in the output of the NAND gate 867 going low for a two hundred fifty nanosecond (250 ns) interval at a rate of 500 kilohertz. Thus, when the NAND gate 867 is enabled by instructions read from the read only memory 80, clock pulses will be applied in a complementary manner to the conductor 866 from the clock pulse source 872 and the trailing edge of each of the negatively directed pulses gated onto conductor 866 by the NAND gate 867 will act to clock the transport control flip flops 813, and 816 so that the same may follow inputs applied to the D inputs thereof during this duration. Similarly, the output of NAND gate 867 is inverted by invertor I and ANDed with ROM bit $B_4$ at NAND gate 867' so that when ROM bit $B_4$ is equal to a ONE (1), this same clock is employed to clock the transport control flip flops 814 and 815 in FIG. 15A and 815 in FIG. 15B.

The D input to the run transport control flip flop 813 is connected, as indicated in FIGS. 15A and 15B to the bit conductor within the common instruction word bus 20 associated with ROM bit $B_4$ and hence whenever ROM bit $B_4$ is high within a given instruction and clock pulses are being applied to conductor 866 by the NAND gate 867, the run transport control flip flop 813 will be set to its ONE (1) state while whenever ROM bit $B_4$ is in a ZERO (0) condition and clock pulses are present on conductor 866, the output of the run transport control flip flop 813 will be low so that the output of the run transport control flip flop 813 will follow the input applied to the D input whenever a clock pulse is applied to conductor 866 and will retain the state set thereby until a succeeding clock pulse is received and the D input during the rising edge of such clock pulse is in a changed condition. The ROM bits conveyed from the common instruction word bus 20 to the record media transport control apparatus depicted in FIGS. 15A and 15B will be conveyed through either the sixteen (16) bit instruction word cable 72 or 65, as shown in FIG. 2, depending upon the record media transport station associated with the record media transport control apparatus depicted in FIGS. 15A and 15B.

The output of the run transport control flip flop 813 is connected through a conductor 873 to the input of an OR gate 874 in FIG. 15A, directly to the media transport in FIG. 15B, and as indicated in both FIGS. 15A and 15B, to a conductor 846 which connects to the second transport status multiplexer 812 to provide a status input thereto representative of the state of the run transport control flip flop 813. The OR gate 874 may take the same form as the OR gate 862 associated with the common status bus 21 and accordingly, acts in the well known manner to produce a high level at the output thereof whenever either of the inputs thereto are high while producing a low level output when both of the inputs thereto are low. The output of the OR gate 874 is connected to a conductor 875 and hence whenever the run transport control flip flop 813 is in a ONE (1) state the high level placed on conductor 873 will provide an appropriate run status indication to the second transport status multiplexer 812 as well as causing the output of the OR gate 874 to go high whereupon a ONE (1) level is present on conductor 875. Although not illustrated in FIGS. 15A and 15B, the conductors 875 and 873, respectively, as well as the output conductors associated with the remaining transport control flip flops 814–817 are connected to inputs therefor provided on the record media transport system associated with the depicted record media transport control apparatus as described in U.S. application Ser. Nos. 329,054, 329,055 and 329,056, as aforesaid, and more particularly the conductor 875 would connect to an appropriate input on the reference generator thereat to enable such reference generator to respond to the direction and speed inputs provided at the outputs of the transport control flip flops 814 and 815. However, for the purposes of the instant disclosure, it is sufficient to appreciate that whenever a high level is gated onto the conductor 875 from the output of the OR gate 874, the record media transport system utilized in association with the instant invention will be enabled to the extent that it will respond to direction and speed displacement commands to initiate the displacement of the record media in an appropriate manner for the record, play, search or other operation defined. Thus it will be seen that whenever the record media transport system employed in association with the record media transport control apparatus depicted in FIG. 11 is addressed by an instruction read from the read only memory 80 which includes ONE (1) levels in the bit positions associated with ROM bits $B_{10}$, $B_{11}$, and $B_4$, the AND gate 867 will be enabled whereupon clock pulses will be applied to the conductor 866 so that a ONE (1) condition may be loaded into the run transport control flip flop 813. This ONE (1) condition will be reflected at the output thereof on conductor 873 and gated either directly (FIG. 15B) or through the OR gate 874 to the conductor 875 (FIG. 15A) to enable the record media transport system so that such record media transport system is rendered responsive to the speed and direction commands issued in the program sequence initiated in a manner to be described below.

A second input to the OR gate 874 is provided on conductor 876 and, as indicated by the annotations associated therewith, this input to the OR gate 874 corresponds to the near end of media status input applied to the second transport status multiplexer 812 on the conductor 844. It will be recalled from the description of this input to the second transport status multiplexer 812 set forth above, that this input is provided in association with FIG. 15A to indicate to the microprocessor and subsequently to the operator by way of an alarm condition initiated thereby that the useable length of the record media is approaching exhaustion and hence that a recording operation or the like should terminate after the present line of material or possibly the line inserted subsequently thereto has been recorded. Furthermore, it will also be recalled that this indication that the end of the useable length of the record media was being approached is provided by establishing an aperture in the record media and sensing the presence of this aperture as the same passes beneath the sensor therefor which may be the same device employed to sense the clear leader, end of tape condition. In the normal mode of operation of the automatic writing system according to the present invention, it will be appreciated that as the aperture in the record media passes beneath the sensor therefor this condition is detected and an appropriate alarm is sounded; however, recording will continue and in the great majority of instances, such recording will terminate at some point displaced from the presence of the aperture in the record media. It is possible, however, that under some fortuitous circumstances the recording operation will terminate at exactly a point where the aperture associated with the condition to be sensed is directly beneath the sensor therefor and hence rather than being a temporary condition, the near end of media status indication will persist on a continuous basis until the record media is next displaced. This is undesirable because a continuous condition of this sort could cause the operator to misinterpret the meaning of the alarms issued and it might well foul the program sequence of instructions being issued. For this reason, a near end of media status indication input is also applied to the search input of OR gate 874 through conductor 876 and serves to preclude the possibility of the record media being stopped with the aperture associated with the near end of media status condition in a position directly under the sensor therefor. Thus, whenever a near end of media condition in the form of a high is present on conductor 876, the OR gate 874 will produce a high level to continue the run output from OR gate 874 even if the run input from the run transport control flip flop 813 has gone low in response to an instruction commanding a stopping operation. The high level on conductor 876 in response to a near end of media condition will cause a high level to persist on conductor 875 at the output of the OR gate 874 until the record media has been sufficiently displaced through an additional increment to move the aperture associated with the near end of media indication past the sensor provided therefor at the read/write head. Thus, the near end of media input on conductor 876 to the OR gate 874 ensures that the run input to the record media transport system will be enabled for an appropriate interval subsequent to the termination of the run signal provided by the read only memory 80 to clear the near end of media aperture from beneath the sensor therefor under such conditions when the record media displacement is terminated in a manner to position the near end of media aperture directly beneath the sensor. Furthermore, if the same detector is employed to detect a near end of record media condition and a clear leader condition, as aforesaid, the near end of media input to OR gate 874 may be timed, i.e., limited to ten (10) milliseconds, for instance to ensure that the desired result occurs only for the near end of media condition indicated by the aperture but is not maintained indefinitely under conditions where clear leaders is sensed marking the end of the media. For this reason the near end of media condition indicated on conductor 876 is generated through the action of AND gate 890, invertor 891 and delay device 892 as a function of the output of the end of tape (EOT) sensor which is applied to conductor 893. More particularly, when a near end of tape condition associated with an aperture or an end of tape condition associated with clear leader is detected conductor 893 will go high and this high is immediately applied through conductor 894 to the lower input of AND gate 890. As the delay associated with the delay device 892 has not yet expired, the output of inverter 891 will be high so that AND gate 890 will be enabled to apply a high level to conductor 876 to initiate a maintenance of the run signal. As the lower input to AND gate 890 follows the input directly, it will terminate in the case of aperture detection prior to the expiration of the delay associated with the delay device 892. In the case of clear leader detection, the high on conductor 894 will persist, however, upon the expiration of the delay associated with the delay device 892, the output of inverter 891 will go low to disable the AND gate 890 and hence terminate the RUN condition generated on 876 in case a clear leader condition was detected.

The direction input for the record media transport system associated with the record media transport control apparatus depicted in FIGS. 15A and 15B is provided by the direction transport control flip flop 815. The direction transport control flip flop 815 may take the same form of edge triggered flip flop employed for the run transport control flip flop 813 and in similar manner thereto receives clear pulses through conductor 864 and clock pulses through conductor 877. The D input to the direction transport control flip flop 815 is connected to the individual bit conductor within the common instruction word bus 20 associated with ROM bit $B_6$ and such connection may be implemented through either the sixteen (16) bit instruction word cable 65 or 72 associated with the read media transport station with which the apparatus depicted in FIGS. 15A and 15B is employed. Thus, whenever a sixteen (16) bit instruction word read from the read only memory 80 contains the modular address appropriate for the record media transport system associated with the record media transport control apparatus depicted in FIGS. 15A and 15B and additionally when such instruction has ONEs (1s) written into ROM bit positions $B_{10}$, $B_{11}$ NOT, $B_6$ and $B_4$, the direction control flip flop 815 will be set to its ONE (1) state while when only the appropriate address is present together with ONEs (1s) in ROM bit positions $B_{10}$, $B_{11}$ NOT $B_4$ but with a ZERO (0) in ROM bit position $B_6$, the state of the direction transport control flip flop 815 will be set to ZERO (0) and these states will remain until the occurrence of the next clock pulse on conductors 866 and 877 where again the state of the direction transport control flip flop 815 will be set in accordance with the state of ROM bit $B_6$ read in the instruction associated therewith. The direct output of the direction transport control flip flop 815 is applied to the conductor 878 while the complementary output thereof is connected to the conductor 879 in such manner, as will be apparent to those of ordinary skill in the art, that when the direction transport control flip flop 815 is in a ONE (1) state a high level will reside on conductor 878 while a low level resides on conductor 879 and conversely when the direction transport control flip flop 815 is in a ZERO (0) state a low level will reside on conductor 878 while a high level resides on conductor 879. The outputs of the direction transport control flip flop 815 are connected, as indicated to the record media transport system employed in conjunction with the instant invention and more particularly, the reference generator or voltage generator therein which produces a signal whose polarity and magnitude control the direction and speed, respectively at which the record media is driven by the transport system. Additionally, the output of this flip flop may be connected to status multiplexer 811 to provide a direction input thereto.

The speed transport control flip flop 814 acts to control the rate at which the record media is displaced in response to the enabling commands issued by the run transport control flip flop 813 and the directional requirements issued by the direction transport control flip flop 815 in cassette or tape embodiments of the instant invention. The speed transport control flip flop 814 may comprise a conventional edge triggered flip flop similar to that described in conjunction with the transport control flip flops 813 and 815 and thereby includes a clear, clock and D input. The clear input to the speed transport control flip flop 814 is connected through conductor 865 to the clear pulse generator 865 and hence is cleared in precisely the same manner as that described for the transport control flip flops 813 and 815. Similarly, the clock input to the speed transport control flip flop 814 is connected to conductor 877 to the output of NAND gate 867' and hence is clocked in the same manner as the direction transport flip flop 815.

The D input to the speed transport control flip flop 814 is connected, as indicated in FIG. 15A, to the individual bit conductor within the common instruction word bus 20 associated with ROM bit $B_5$. Therefore, it will be appreciated by those of ordinary skill in the art that whenever the run transport control flip flop 813 is selectively set to its ONE (1) state by the condition of ROM bit $B_4$ and the application of clock pulses thereto on conductor 866 the speed transport control flip flop 814 due to the action of NAND gate 867' and ROM bit $B_4$ will be set to a ONE (1) condition if ROM bit $B_5$, as contained in that instruction, is a ONE (1) while it will be set to its ZERO (0) state, under the same conditions, if the ROM bit $B_5$ contained in that instruction is a ZERO (0). The complementary output of the speed transport control flip flop 814 is connected to the record media transport system employed in conjunction with the instant invention. The output level associated with the conductor 858 is a fast NOT level and hence whenever the speed transport control flip flop 814 is in its ZERO (0) state a ONE (1) level will reside on conductor 858 indicating that the record media is to be displaced at a slow speed suitable for recording or playback purposes such as twenty inches per second (20 ips) while when the speed transport control flip flop 814 is in its ONE (1) state a ZERO (0) level will reside on conductor 885 indicating that the record media is to be displaced at a fast or rapid speed suitable for rewinding or search purposes such as seventy inches per second (70 ips). The output on conductor 885 is applied to the reference generator within the record media transport system and acts to control the magnitude of the signal produced thereby so that the record media is displaced in accordance with the magnitude of the signal generated by the reference generator which is a function of the level on the conductor 885. Therefore, the reference generator within the record media transport system employed in conjunction with the instant invention is selectively enabled in response to the output condition of the run transport control flip flop 813 while the direction and speed with which such record media transport displaces the record media is controlled respectively by the polarity signals generated by the direction transport control flip flop 815 and the magnitude of the signal generated by the speed transport control flip flop 814 which controls the magnitude of such signal. Accordingly, it will now be appreciated that the condition of the transport control flip flops 813–815, as set by the condition of pertinent ones of the ROM bits read during each instruction issued by the read only memory 80 will determine the operative or inoperative condition of the record media transport system connected thereto and in addition will also determine both the speed and direction with which the record media is displaced when such record media transport system is enabled by a ONE (1) level on conductor 875. Thus, if ONE (1) levels reside on conductors 875, 879 and 885, the record media will be displaced in a forward direction at a speed which approximates twenty inches per second (20 ips) and hence conditions would be appropriate for a recording or playback operation. However, should a ZERO (0) reside on conductor 885 the record media would be displaced in the forward direction at a speed which approaches seventy inches per second (70 ips) to provide appropriate conditions at the record media transport for a search in the forward direction. Conversely, if a ZERO (0) remained on conductor 885 while a ONE (1) level was present on conductors 878 and 875, a displacement speed of seventy inches per second (70 ips) whould again obtain at the record media transport system; however, the displacement of the record media would occur in a counter clockwise direction and hence the resulting operation which takes place would be appropriate for a searching of the record media in the reverse or counter clockwise direction. Similar considerations also obtain with respect to the transport control apparatus illustrated in FIG. 15B, however, as only one rate of displacement is employed, no speed control flip flip is required for displacement of the media.

The write transport control flip flop 816 is employed, when the record media transport control apparatus depicted in FIGS. 15A and 15B is associated with a read/write record media transport system and this transport control flip flop acts to control the application of write current, i.e., a recording bias, to the write portion of the read/write head so that a recording operation may take place. The write transport control flip flop 816 may take the form of a conventional edge triggered flip flop such as was described in connection with the run transport flip flip 813 and hence acts to follow the D input thereto only when the rising edge of a clock pulse is being applied to the clock input thereof. The clear input to the write transport control flip flop 816 is connected through conductor 864 to the clear pulse generator 865 and hence clearing takes place in the same manner described for each of the transport control flip flops 813–817 in FIG. 15A and transport control flip flops 813–815 in FIG. 15B. Similarly, the clock input to the write transport control flip flop 816 is connected through conductor 877 to the conductor 866 and hence the output of the NAND gate 867 so that clock pulses are applied thereto in the same manner and under the same conditions as for the run transport control flip flop 813. The D input to the write transport control flip flop 816, as indicated in FIGS. 15A and 15B is connected to the individual bit conductor within the common instruction word bus 20 associated with ROM bit $B_7$ and this connection may be provided through the sixteen (16) bit instruction word cable 65 depicted in FIG. 2 associated with the read/write station control 52. Thus, whenever appropriate conditions obtain for the application of clock pulses to conductor 866, the state of the write transport control flip flop 816 will be a function of the condition of ROM bit $B_7$ as read in the sixteen (16) bit instructions from the read only memory 80 which otherwise establishes all conditions for the application of clock pulses to conductor 866 as aforesaid. Therefore, when instructions are read from the read only memory 80 to cause the application of clock pulses to conductor 866, such instructions containing a ONE (1) in the bit position occupied by ROM bit $B_7$ will cause the write transport control flip flop 816 to be set in a ONE (1) state while whenever the condition of this ROM bit is a ZERO (0) the write transport control flip flop 816 will be placed in a ZERO (0) state. Thus, as will be appreciated by those of ordinary skill in the art, instructions read from the read only memory 80 which are associated with a record operation such as may take place during a record, duplicate, or portions of a revise mode of operation, will contain a ONE (1) in the bit position of ROM bit $B_7$ to set the state of the write transport control flip flop 816 to a ONE (1) condition while instructions associated with play, search, or the play portion of a revise operation will contain a ZERO (0) in the position occupied by ROM bit $B_7$.

The output of the write transport control flip flop 816 is connected through a conductor 886 and a conventional amplifier or driver stage 887 to the record media transport system as indicated in FIGS. 15A and 15B and more particularly to the circuitry therein which controls the operation of the write portion of the read/write head. The function of the write transport control flip flop 816, as aforesaid, is to enable the write portion of the read/write head so that a recording operation may take place and such enabling may conveniently be achieved by applying the output of the conductor 886 to one input of an AND gate which acts to supply a recording bias to the write portion of the composite read/write head. As will be appreciated by those of ordinary skill in the art, the second input to such an AND gate may be connected to a conventional recording bias oscillator so that whenever a ONE (1) level resides on conductor 886, recording bias will be applied to the write head whereupon a recording operation in response to the receipt of serialized bit information may take place. Alternatively, the output of the write transport control flip flop 816 may be used to enable an AND gate which acts to receive at the other input thereto bit information to be recorded which has already been appropriately modulated by a recording bias oscillator so that whenever the AND gate is enabled appropriately modulated serial information to be recorded will be applied to the write portion of the composite read/write head. Thus, it will be appreciated by those of ordinary skill in the art that the output condition of the write transport control flip flop 816 acts to control whether an otherwise properly enabled record media transport system is placed in a write or read mode of operation and, as is apparent, when the record media transport control apparatus depicted in FIGS. 15A & 15B is merely associated with a read only record media transport station the write transport control flip flop 816 may be omitted or remain unconnected.

The eject transport control flip flop 817 acts to control the opening of the door to the chamber which accepts the record media at the record media transport station associated with the record media transport control apparatus depicted in FIG. 15A. More particularly, as shall be recalled from the description of FIG. 1, whenever the rewind/eject buttons 9 or 10 are depressed the record media located at the record media transport station associated therewith will be rewound and thereafter the door to the record media chamber will be opened so that the record media may be removed. This particular mode of operation is most appropriate to a cassette version of the instant embodiment of the present invention and hence should magnetic cards or the like be employed in alternative embodiments this input could either be omitted as in the case of FIG. 15B or modified to control a function better adapted to suit the needs of the particular record media transport system employed. However, in the embodiment of the automatic writing system presently being discussed, the condition of the eject transport control flip flop 817 would control a solenoid which acts to open the door to the record media chamber in the record media transport system associated with the record media transport control apparatus depicted in FIG. 15A.

The eject transport control flip flop 817 may take the form of an edge triggered flip flop such as discussed for the other transport control flip flops 813–816 and hence acts in the conventional manner to follow the condition of the D input thereto only when the rising edge of a clock pulse is present. The clear input to the eject transport control flip flop 817 is connected through the conductor 864 to the clear pulse generator 865 and hence this flip flop is cleared in the same manner as the other transport control flip flops 813–816. The clock input to the eject transport control flip flop 817 is connected, as indicated in FIG. 15A through the conductor 881 to receive clock pulses from the NAND gate 882. An inspection of the input conditions on NAND gate 882 will readily reveal that the clock pulses developed therefrom are derived in the same manner as those associated with NAND gate 867 except that the complement of ROM bit $B_{10}$ is employed rather than ROM bit $B_{10}$ per se and the input conditions are ANDed with ROM bit $B_3$. However, whenever this NAND gate is enabled, the same clock pulses described in conjunction with NAND gate 867 are applied to the eject flip flop 817. The D input to the eject transport control flip flop 817 is connected to the individual bit conductor within the common instruction word bus 20 associated with ROM bit $B_2$ and hence whenever instructions are read which are appropriate for causing the application of clock pulses on conductor 881, the state of the eject transport control flip flop 817 will follow the condition of ROM bit $B_2$. Thus, when such conditions are present a ONE (1) in the bit position occupied by ROM bit $B_2$ will cause the eject transport control flip flop 817 to be set to a ONE (1) state and conversely when a ZERO (0) is present in this position, the eject flip flop 817 will be set to a ZERO (0) state and the state of the eject transport control flip flop 817 intermediate the application of clock pulses on conductor 881 will be retained in the condition previously established by the state of the D input when a preceding clock pulse was applied on conductor 881. The complemented output of the eject transport control flip flop 817 is connected, as indicated in FIG. 15A, to the conductor 888 which provides a gate open NOT input to the record media transport system associated therewith. Thus, whenever the eject transport control flip flop 817 has been set to a ONE (1) state by the application of a ONE (1) to the D input thereof when a rising edge of a clock pulse is present, a ZERO (0) level will be applied to conductor 888 to issue a gate open command to the record media transport system associated with the record media transport control apparatus depicted in FIG. 15A. The conductor 888 may be connected at the record media transport control system, not shown, to a solenoid which, when enabled, acts to open the door to the record media chamber in a manner well known to those of ordinary skill in the art. Thus, whenever the eject transport control flip flop 817 is set to a ONE (1) state the ZERO (0) output on conductor 888 will cause the record media chamber door to be opened so that the record media may be removed by an operator.

As the operation of the eject transport control flip flop 817 is associated with the depression of the rewind/eject keys 9 or 10, it will be appreciated by those of ordinary skill in the art that the program control employed to establish the state of the eject transport control flip flop 817 is such that the eject transport control flip flop 817 will be set to its ONE (1) state only in response to the depression of one of the rewind/eject keys 9 or 10, as shown in FIG. 1, and the termination of the rewind operation which is to precede the removal of the record media from the record media transport control system under the various modes of operation established within the automatic writing system according to the instant invention. Thus, when one of such rewind/eject keys 9 or 10 is depressed by an operator, the program sequence of instructions initiated thereby may typically initiate a plurality of tests conducted on the common status bus 21 to ensure that previously established conditions are appropriate for the initiation of a rewind operation and the subsequent opening of the door to the record media chamber at the appropriate record media transport station. Such initial tests of the common status bus 21 as initiated under program control may include a test that the automatic writing system is not in a record mode of operation, which acts to ensure that if a recording operation was taking place the automatic writing system was removed from such mode of operation and in the process thereof an end of record character was recorded, and subsequent tests of the actual status of the selected transport could be initiated to determine whether or not the selected transport was in a run condition and if a record media was in fact loaded thereat. These tests, as will now be apparent to those of ordinary skill in the art, are initiated by causing selected inputs to the first and second transport status multiplexers 811 and 812 to be gated onto the common status bus 21 so that the comparison of the level which resides thereon may cause appropriate branching operations to the next step in the program sequence initiated if an appropriate conditions is in fact present. Thus, if the selected record media transport system is not in a run mode of operation and a record media is in fact present, an instruction for a fast rewind would be initiated which would act to set the transport control flop flops 813 – 815 in the appropriate ONE (1) and ZERO (0) conditions so that a run operation in the counter clockwise direction at a fast speed is initiated thereby. Subsequently, an instruction would issue to gate the end of media input to the second transport status multiplexer 812 on conductor 839 onto the common status bus 29 and such input would be periodically monitored by the monitoring of the common status bus 21 until the presence of an end of media or the detection of a clear leader was indicated by the application of a ONE (1) level to the common status bus 21. Thereafter, the rewind operation would be terminated and an instruction would issue through a branch operation causing the state of the eject transport control flip flop 817 to be set to a ONE (1) condition whereupon the ZERO (0) level aplied to conductor 888 would cause the solenoid associated with the door to the record media at the selected record media transport system to be opened so that the operator may remove the record media therefrom. This sequence of events which takes place under program control in response to the sixteen (16) bit instruction words read from the read only memory 80 would ensure that if a record media were loaded at the record media station associated with the rewind/eject key 9 or 10 which was depressed an end of record mark has been recorded thereon, and a manipulation of such record media is not taking place. Thereafter, the record media would be rewound by the displacement thereof in the counter clockwise direction at a fast rate and upon the completion of the rewind operation, as indicated by the detection of the end of media input to the second transport status multiplexer 812 on the common status bus 21 the door to the record media transport station would be opened so that the record media may be removed by an operator. Furthermore, as will be appreciated by those of ordinary skill in the art, at any point where an inappropriate status condition is monitored an alarm may be sounded to apprise the operator that improper initial conditions have been established for the rewind/eject operation initiated or alternatively a monitoring operation may take place and be continued until a preselected condition is detected on the common status bus 21 which would allow an appropriate branch operation to be initiated. Thus, for instance, if no record media were present at the record media station associated with the rewind/eject key depressed, the door to the record media chamber would be opened by the appropriate setting of the eject transport control flip flop 817 and this may or may not be accompanied by an alarm depending upon what other input conditions are established.

Thus, it will be appreciated by those of ordinary skill in the art that the record media transport control apparatus depicted in FIG. 15A acts to same manner as any peripheral or portion thereof employed in the instant embodiment of the present invention to respond to instructions issued by the read only memory 80 to control its associated peripheral in a manner consonant with such instructions and in addition to monitor a plurality of status conditions which obtain at the associated peripheral and to gate such status conditions on a demand basis onto the common status bus 21 so that the status of particular conditions at that peripheral may be employed to further promote the program sequence of operations initiated in response to instructions entered at the keyborad by the operator. For instance, if it is assumed that the record media transport control apparatus depicted in FIG. 15A is associated with the read/-write record media station and that an operator has inserted a record media therein and is initiating a record operation by the depression of the record key, the following sequence of initial events will take place at the record media transport control apparatus depicted in FIG. 15A in response to the sequence of instructions issued by the read only memory 80 subsequent to any necessary initializing of the automatic writing system according to the present invention in response to the initial energizing of the system. When the automatic writing system according to the present invention is initially placed in a record mode of operation by the depression of the record key at the keyboard, it will be recalled that the read/write record media station is actuated and the record media located thereat is automatically searched for a recordable area wherein such a recordable area is designated on a partially used record media by the presence of an end of record characer in the manner described in U.S. Ser. No. 429,479. Alternatively, a new record media which has not previously been recorded may be employed or a previously utilized record media may be used in conjunction with a depression of the erase key whereupon such previously used record media will be treated as a new record media and recording will be initiated at the initial portions thereof so that new information will be effectively written over or in place of the previous information recorded thereon. Through the use of this initial search for a recordable area on the record media loaded, old data is preserved and new data can be added in an appropriate sequence on the record media loaded at the read/write station. When considred from the standpoint of operations which take place at the record media transport control apparatus depicted in FIG. 15A and the read/-write record media station associated therewith in response to instructions read from the read only memory 80, the initial search for a recordable area on the record media loaded is implemented in the following manner. The record mode instruction inserted at the keyboard by the depression of the record mode key is conveyed to the main register M, is subsequently evaluated and results in a branch operation at the read only memory 80 through the branching of the ROM address register 81. This results in the reading of sixteen (16) bit instruction words that act to control and define the search for a recordable area on the record media which takes place each time this mode of operation is initiated at the keyboard. More particularly, the program routine read from the read only memory in response to an initiation of a record mode of operation, in essence, initially tests to ascertain whether or not a record media has been loaded at the read/write station and whether the transport associated therewith is in a run condition. This is achieved by gating the inputs to the first and second transport status multiplexers 811 and 812 associated with the conductors 824 and 846 onto the common status bus 21 in an appropriate sequence so that the individual testing for each condition may be achieved. If no cassette has been loaded or if the read/write record media transport is in a run condition an alarm is sounded to apprise the operator that present conditions which obtain in the automatic writing system are inappropriate for the initiation of a record mode of operation. However, should the status condition tested on the common status bus 21 indicate that a record media is properly in place at the read/write station and the transport associated therewith is not in a run condition, the program sequence then in process will perform several additional tests on the common status bus 21, which in essence assure that no other mode of operation has been initiated and that a recording operation, to be conducted at the read/write station may be otherwise established. This secondary test would generally include the testing of the write permit status input on the common status bus. Thereafer, an instruction is read to the record media transport control apparatus to test whether or not an end of media input is indicated by status input on conductor 839 to the second transport status multiplexer 812 and gated onto the common status bus 21 by the application of this instruction from the read only memory 80 to the record media transport control apparatus depicted in FIG. 11. As will be readily appreciated by those of ordinary skill in the art, clear leader or foil strips will be present at both the beginning and end portions of a record media which takes the form of a cassette or the like and hence a properly rewound prerecorded media or a new record media will normally provide such an input on conductor 839 as if it was not displaced in storage.

If an end of media input is detected, as reflected on the common status bus 21, a branch operation is initiated which acts to set the record media transport station and more particularly, the transport control flip flops 813, 814 and 815 in a first run forward mode such that the record media will be displaced upon the receipt and appropriate decoding of this instruction at the record media transport control apparatus depicted in FIG. 15A in a forward direction at a rate of seventy inches per second (70 ips). In addition, a two second delay is set to provide an appropriate testing interval for sampling for transitions on the record media being displaced. Thus, during this two second interval the record media loaded at the read/write record media station is displaced in the forward direction at a fast speed and the record media read apparatus depicted in FIG. 14 is energized, under program control, so that the presence of flux transitions may be determined. As will be appreciated by those of ordinary skill in the art, flux variations due to recording on the record media may be detected even though the record mdia is moving at a fast rate by the record head once it is energized even though any flux variations representing digital information recorded thereon might probably not be accurately read due to the wide disparity between the designated reading rate of twenty inches per second (20 ips) and the fast forward rate at which the record media is being displaced. However, all that is necessary is that a determination be made as to whether or not such transitions are present or whether no information is effectively recorded on the record media loaded at the read/write record media station and this will be readily available as a function of the output produced by the record media read apparatus and more particularly the read data ready flag produced thereby. If no flux transitions are thus detected within the two second delay period set it is assumed by the program then in process that a gap is effectively being read from the record media while if flux transitions are effectively detected no gap on the record media loaded may be assumed to be present. Of course, if the erase key was depressed the record media is displaced from the end portion thereof in the same manner as for a new record media but the detection of flux transitions is ignored and hence the treatment is the same as that employed for the gap detection associated with a new record media. If flux transitions are detected the program sequence then in process will immediately branch to a search for an end of record character routine because at the first detection of flux transitions the absence of a gap is confirmed and hence a plain indication that a previously unrecorded or new record media is not present is indicated. The search for an end of record character which will be initiated under these conditions takes place at a fast forward speed since as described in U.S. Ser. No. 429,479, supra, an end of record characer is recorded in a similar manner to a block of information and hence the nature of the gap associated therewith may be readily detected without an accurate reading of the bit information present therein. Once such an end of record character is detected, the search routine initiated therefor will cause the record media to be backed up by the issuance of appropriate instructions to the transport control flip flops 813 - 815 and the end of record character will be obliterated by a writing of information thereover. Thereafter, the write mode is stopped together with the displacement of the record media under program control and a record mode bit is set into the G register so that a plain indication of the propriety of the record mode established is available to the microprocessor indicated by the dashed block 16 whereupon the entry and recording of information entered from the keyboard may proceed.

If no flux transitions are detected during the initial portions of the two second delay which has been set, the program sequence then in process goes into a monitor routine whereupon the search for flux transitions continues for the full two second interval which has been set. Upon the termination of this interval, again assuming that no flux transitions have been detected to cause a branch operation to the search to an end of record character routine, as described above, the program assumes that a previously unrecorded or new record media has been loaded into the read/write station. Therefore, under these conditions, instructions are issued to the record media control apparatus depicted in FIG. 15A to set the transport control flip flops 813 - 815 into a fast run in the reverse or counter clockwise direction and once this condition is established the end of media input to the second transport status multiplexer 812 is gated onto the common status bus 21 and monitored. This effectively acts to back up the loaded record media, which has now been determined to be a previously unrecorded media, to the beginning portion thereof. When the initial portion of the loaded record media is detected as determined by the input to the second transport status multiplexer 812 on conductor 839 going high, the program is branched to cause the record media transport station to displace the record media in the normal forward direction for a distance of approximately 25 inches so that recording is not initiated on the clear leader portion of the record media. This is accomplished, as will be appreciated by those of ordinary skill in the art by appropriately setting the condition of the transport control flip flops 813 – 815 to a fun forward normal mode while in addition an appropriate delay interval is set so that at the expiration of this interval the record media being displaced at a rate of twenty inches per second (20 ips) will have been displaced through an interval of twenty-five (25) inches. Thereafter, the displacement of the record media is stopped, the record media transport is disabled and a record bit is set into the G register to indicate to the microprocessor indicated by the dashed block 16 that a record mode of operation has been set so that data characters inserted at the keyboard may be accumulated and subsequently recorded. When the erase key is depressed for a prerecorded record media, a similar displacement from the clear leader portion of the record media and setting of a record mode bit results.

Thus, it is seen that when a record mode key is depressed, a program sequence of operations is established to ascertain whether appropriate initial conditions for the establishment of a record mode operation are present. If such initial conditions are present the record media loaded at the read/write station is tested under program control to ascertain whether or not a prerecorded or unrecorded record media has been loaded therein or if the erase key has been depressed. If a prerecorded record media has been loaded and the erase key has not been struck, the record media is searched for and end of record character which, as will be recalled, is inserted each time the automatic writing system according to the instant invention is removed from a record mode of operation to provide an indication on the record media of the point in which recording terminated, and when such end of record character is located it is recorded over with information inserted at the keyborad. However, if an unrecorded record media is ascertained by the gap search conducted for an interval of two (2) seconds, the record media is merely rewound until the beginning portions thereof are detected and thereafter run forward for a distance of twenty-five (25) inches so that a recording operation may be initiated at a point thereon displaced from the clear leader. Once either of these conditions has been established, a record mode bit is set into the G register and further manipulations at the read/write station are terminated so that the inputting and subsequent recording of information entered at the keyboard may be initiated. The nature of an end of record character and the manner in which it may be detected will be further discussed below in connection with a description of the techniques employed for organizing and maintaining material recorded on the record media.

Once a record bit has been set into the G register, such bit is indicative to the microprocessor indicated by the dashed block 16 that the automatic writing system has been properly initialized for a record mode of operation and that information entered from the keyboard may be processed under rules established for a record mode operation. More particularly, it will be recalled that in a record mode of operation each character inserted at the keyboard is accumulated in the read/write buffer 35 until an entire line of information, as signaled by the insertion of a carriage return character is indicated. Thereafter, the contents of the read/write buffer 35 are applied on a per character basis to the read/write record media station for recording onto the record media and fifty (50) redundant characters are added thereto to accommodate subsequent revision operations. From the standpoint of the record media transport control apparatus depicted in FIG. 15A, once an entire line of information has been accumulated in the read/write buffer 35, instructions are read from the read only memory 80 which cause the displacement of the record media so that the same is brought to an appropriate recordng speed of twenty inches per second (20 ips) and thereafter character information is supplied to the record media write apparatus depicted in FIG. 13 where the same is serialized and recorded onto the record media loaded at the read/write station. The actual recording operation which takes place at the read/write record media station is initiated under program control through a sequence of instructions which, when viewed with respect to the operations initiated at the record media transport control apparatus depicted in FIG. 15A, cause the following operations to take place. The addressing of the contents of the read/write buffer 35 for output purposes, as described above, is attended by the issuance of sixteen (16) bit instruction words from the read only memory 80 which cause a plurality of the status inputs supplied to the first and second transport status multiplexers 811 and 812 to be sequentially gated onto the common status bus 21 to obtain a determination as to the propriety of the status conditions present at the read/write record media station prior to the application of run instructions to the record media transport control apparatus. Thus, the media loaded and write permit inputs on conductors 824 and 826 are gated onto the common status bus 21 to ensure that a record media has been loaded at the read/write station and that it can be recorded upon the near end of media and end of media status inputs supplied on conductors 844 and 839 are selectively gated onto the common status bus 21 to ensure than an appropriate portion of the record media remains for recording purposes and the run status input on conductor 846 is gated onto the common status bus to ensure that the read/write record media station is not in a run condition and hence may accept instructions adapted to cause the actuation thereof.

As each status condition selected is gated onto the common status bus 21, an appropriate ONE (1) or ZERO (0) condition associated therewith will cause the single address mode of programming employed for the read only memory 80 to issue the next instruction for gating a succeeding desired status condition onto the common status bus 21; while if an inappropriate ONE (1) or ZERO (0) condition is received a branch to an alarm or monitor routine is initiated until an appropriate indication for the status condition then being tested is obtained. After the program sequence has progressed through the testing of each of the status conditions described above, the servo disable NOT input on conductor 840 to the second transport status multiplexer 812 is gated onto the common status bus 21 to ascertain whether or not the read/write record media transport may receive a run instruction or whether such run instruction must be held in abeyance until the read media tensioning operation in process is terminated. If the servo disable NOT input as tested on the common status bus 21 is high, the program sequence then in process branches to a record routine which initiates the actual operation of the read/write record media station. More particularly, the first instruction in this routine, as read from the read only memory 80, will be a run forward at record speed instruction which will cause the transport control flip flops 813 - 815 to control the read/write record media station in such manner to initiate the displacement of the record media in a forward direction at a recording speed of twenty inches per second (20 ips). Thereafter, the program sequence returns to a monitoring operation of the status inputs to the record media transport control apparatus depicted in FIG. 15A to ascertain whether or not the read/write record media transport station has been properly energized and is ready to receive write information from the read/write buffer 35. The status conditions which are tested on an individual basis would include the run flip flop status input on conductor 846 which confirms that the read/write record media transport has been placed in a run mode, the servo unsafe not input on conductor 845 which would indicate that the servo has not brought the record media to speed within the required interval and the media at speed input on conductor 825 which would indicate that the activated read/write record media transport has appropriately brought the record media loaded thereat to an appropriate recording speed of approximately twenty inches per second (20 ips) and hence, as will be apparent to those of ordinary skill in the art, that information to be recorded may now be supplied to the record media write apparatus illustrated in FIG. 13. If the monitoring of any of these status inputs on the common status bus 21 indicates that the read/write record media transport station has not been properly energized to bring the record media loaded thereat to the appropriate speed, a branch instruction to reattempt the proper enabling of the read/write record media station may be initiated for a predetermined number of trials whereupon the system will alarm or alternatively, as will be apparent to those of ordinary skill in the art, immediate alarming may be employed.

If a proper media at speed status input is detected and the other status inputs are maintained in an appropriate condition for the testing cycle initiated, an instruction causing the write transport control flip flop 876 to be set to its ONE (1) state will issue whereupon, as is well known to those of ordinary skill in the art, the write head portion of the composite read/write head located at the read/write record media transport will be enabled. In addition to the enabling of the write transport control flip flop 876, the load input to the parallel to serial converter 750 in the record media write apparatus depicted in FIG. 13 is additionally enabled by instructions read from the read only memory 80 and the first of two (2) preamble characters are read from the read only memory 80, applied to the common data bus 19 and loaded into the main register M for application to the common data bus 19 and hence to the eight (8) parallel inputs to the record media write apparatus depicted in FIG. 13. The loading of the eight (8) bit character into the parallel to serial converter 750 will cause the write data ready flag associated with the flip flop 765 and hence the status input on conductor 822 to the first transport status multiplexer 811 to go low in a manner previously described in conjunction with a discussion of FIG. 13. This status input to the first transport status multiplexer 811 is sampled by the gating thereof onto the common status bus 21 and when a ZERO (0) condition is detected an instruction is read from the read only memory 80 which causes clock pulses to be applied to the parallel to serial converter 750 on the conductor 759 so that the first preamble character which was loaded from the read only memory 80 is read from the parallel to serial converter 750 in series and applied to the write head 753 for recording on the record media at the active transport which is being controlled by the record media transport control apparatus depicted in FIG. 15A. When eight (8) clock pulses have been received by the parallel to serial converter 750 the first eight (8) bit preamble character loaded will have been recorded on the record media whereupon the write data ready flag input to the first transport status multiplexer on conductor 822 again goes high. This status input is again applied to the common status bus 21 and sampled by the microprocessor indicated by the dashed block 16 whereupon a second preamble character is read from the read only memory 80 and recorded onto the record media at the read/write record media transport station. After this second preamble character has been recorded, the write data ready flag input to the first transport status multiplexer 811 will again go high and upon the expiration of a small delay (about four (4) milliseconds) to aid in establishing a preamble gap on the record media, the selective application of the contents of the read/write buffer 35 to record media write apparatus depicted in FIG. 18 may be initiated. Thus, each time that the write data ready status input supplied to the first transport status multiplexer 811 goes high and this status input is sampled by the microprocessor indicated by the dashed block 16 on the common status bus 21, an instruction is issued which results in the reading of one character from the read/write buffer 35 through an output and increment operation, and the gating of this character into the main register M. In the main register M, the character is classified, and subsequently applied back onto the common data bus 19 for application to the parallel to serial converter 750. The character is then serialized by the parallel to serial converter 750 and applied to the write portion of the read/write head where it is recorded on the record media and after each of the eight (8) bits therein have been so recorded, the write data ready flag again goes high whereupon the next eight (8) bit character in the read/write buffer 35 may be recorded through an output and increment operation under the control of the read only memory 80. In this manner, each of the characters associated with the line of information stored in the read/write buffer 35 as well as each of the fifty (50) redundant or no op characters applied during a record mode operation, as aforesaid, is recorded on the record media located at the active reader so that, as will be appreciated by those of ordinary skill in the art, the record media located at the active record media transport station is brought to speed and the entire contents of the read/write buffer 35 recorded thereon while the record media is being continuously displaced.

When the contents of the read/write buffer 35 have been exhausted, as indicated by a ONE (1) level provided at the output of the zero decoder 580, this status condition of the buffer is sampled and the recording operation is terminated under program control by the issuance of sixteen (16) bit instruction words from the read only memory 80 which do not contain appropriate ROM bits for maintaining the transport control flip flops 813 - 816 in an enabled condition. It should be noted however, that prior to the disabling of the read/- write record media transport station a plurality of additional housekeeping characters are recorded onto the record media prior to the actual disabling of the read/write transport so that the contents of the read/write buffer 35 which were recorded are effectively preceeded by two (2) preamble characters and followed by a plurality of housekeeping characters whose nature and purpose are described in U.S. Ser. No. 429,427, supra.

Once the transport control flip flops 813 - 816 are disabled by the failure of the read only memory 80 to issue further instructions for the maintenance of a run condition, the record media transport control apparatus depicted in FIG. 15A will remain disabled until the next line of character information has been accumulated in the read/write buffer 35 and is in an appropriate condition for recording on the record media whereupon the contents of the read/write buffer 35 will be again recorded on the record media by the program initiated operations of the record media transport control apparatus depicted in FIG. 15A. It should also be appreciated that whenever data is being applied to the write head 753 and hence being recorded on the record media, the write current NOT input on conductor 827 to the first transport status multiplexer 811 will be low indicating that data is being applied to the write head. Thus, the periodic sampling of the write data ready input and the write current NOT input on conductors 822 and 827 which are connected to the first transport status multiplexer 811 will act to effectively apprise the microprocessor indicated by the dashed block 16 that a write operation is actually in progress while the write data ready flag provided appropriate timing information for gating each eight (8) bit character from the read/write buffer 35 to the record media write apparatus depicted in FIG. 13. Thus it will be appreciated by those of ordinary skill in the art, that the record mode of operation employed within the automatic writing system according to the present invention relies upon a plurality of status conditions of the record media transport system to apprise the microprocessor indicated by the dashed block 16 that the record media transport system has been actuated, that the record media has been properly loaded and brought to speed and that the record media transport system and associated record media write apparatus, as depicted in FIG. 13, is in an appropriate condition to receive character information on the common data bus 19. In addition, the write data ready status input provides appropriate timing information so that each character to be recorded may be uniquely applied to the common data bus 19 after the previous character applied thereto for serialization and application to the write head 753 has been recorded so that no character information in the process of transfer will be lost. Accordingly, it will be seen that during a record mode operation in the instant embodiment of the automatic writing system according to the present invention, a line of character information is accumulated in the read/write buffer 35 and thereafter, the read/write record media transport system is energized whereupon all of the information accumulated in the read/write buffer 35 is recorded continuously onto the record media at a rate commensurate with the recording speed of the record media transport system employed. After the entire contents of the read/write buffer 35 have thus been recorded, the displacement of the record media is terminated so that in essence, the record media displacement is effectively initiated only upon the accumulation of a complete line of information to be recorded, the line of information is then recorded on a serial basis and thereafter the record media is stopped so that starting and stopping operations of the record media are closely regulated by the microprocessor indicated by the dashed block 16 and are only associated with an entire line of information to be recorded.

Similarly, in a playback mode of operation, the record media is initially displaced to the start of a block of recorded material which is desired to be played in either a play, revise, duplicate or similar mode of operation through a search operation to be described below. Thereafter, the playback mode of operation desired by the operator is selected by the depression of suitable mode control and action keys at the keyboard; it being understood that whether the read only or read/write record media transport system is to be the active reader will depend upon the mode of operation selected by the operator as well as the locations where record media have been loaded and the conditions of the record mode and alternate reader keys at the keyboard. However, if it is assumed that a straight forward play mode of operation is selected wherein the read/write record media transport station is the active reader and prerecorded information is to be read from a record media and merely printed, the operations which take place under program control at the record media transport control apparatus depicted in FIG. 15A may be readily appreciated. When the play operation is initiated at the keyboard, it will be appreciated by those of ordinary skill in the art, that the operation which takes place requires that a line of information be read from the record media, loaded into the read only buffer 36 at a rate which is commensurate with the reading operation from the record media and thereafter, each character so loaded into the selected buffer be applied on a per character basis to the printer peripheral at rates which are consistent with the ability of the printer unit to respond and further process such character information.

From the standpoint of the record media transport control apparatus depicted in FIG. 15A the initiation of the play mode of operation being discussed will cause a plurality of status indications directed to the current condition of the read/write record media transport system to be sampled on the common status bus 21 so that the designated play operation may be implemented or alarms issued indicating that the record media transport control system to be actuated is not in an appropriate condition for the operation specified. The status conditions initially tested to provide appropriate inputs on the common status bus 21 are the media loaded status input supplied on conductor 824 to the first status multiplexer 811, the read data NOT status input which is applied on conductor 823 to the first status multiplexer 811, the end of media status input supplied on conductor 839 and the run status input supplied on conductor 846. The media loaded status input, when tested, provides, a status indication indicative of whether or not a record media has been loaded at the read/write record media station and hence whether this station is in an appropriate condition for the play operation specified. The read data NOT status input on conductor 823 to the first transport status multiplexer 811 will indicate whether or not data is presently being read by the record media transport station associated with the record media transport control apparatus depicted in FIG. 15A and hence a ONE (1) level on this conductor will indicate that no such operation is presently in process and that a play operation may be initiated assuming that the other status conditions to be tested provide appropriate ONE (1) and ZERO (0) levels on the common status bus 21. In a like manner, the end of media status input supplied on conductor 839 will provide a status indication as to whether or not the portion of the record media for which a play operation is to be initiated can effectively be read or the end of the recorded material, which is not suitable subject matter for a play operation, is present. The run input on conductor 846 to the second transport status multiplexer 812 acts to apprise the logic as to whether or not the record media transport station to be activated is in a run condition whereupon no play operation may take place, or conversely, if this status input is low, to apprise the logic that the record media transport system associated with the record media transport control apparatus depicted in FIG. 15A is not presently enabled and hence may be suitably enabled at the initiation of a play operation.

Each of these status conditions is tested in sequence and the status condition associated therewith is gated onto the common status bus 21, so that the single address mode of operation of the microprocessor indicated by the dashed block 16 may proceed via step or various branch and jump routines through the various instructions necessary to properly initiate the play operation specified at the keyboard. If it is assumed that each of the status inputs is at an appropriate level for the further promotion of the instructions specified at the keyboard, the play operation initiated will further process while if such status inputs apprise the logic that appropriate status conditions are not present for the play mode of operation specified, alarm indications may be issued, through the various branch routines initiated by inappropriate ONE (1) or ZERO (0) levels on the common status bus 21. If it is assumed, however, that the intitial status conditions tested provide appropriate sequencing of the sixteen (16) bit instructions issued by the read only memory 80 to further promote the play operation specified, the next instruction read from the read only memory 80 with respect to the record media transport control apparatus depicted in FIG. 15A will be to test the servo disable status indication provided on conductor 840 to the second transport status multiplexer 812 to determine whether or not the record media transport station associated therwith is in a creep mode to properly tension the record media or whether this record mdia transport system is presently in condition to receive run instructions required for the play mode of operation defined. If the servo disable NOT input on conductor 840 is low, the logic will be apprised that a creep mode of tensioning is presently taking place and hence this input will be monitored until it goes high. Conversely, if a high is initially detected, or if upon the monitoring thereof this input subsequently goes high as it must at the termination of the tensioning operation employed, the ONE (1) level provided on the common status bus 21 will cause the read only memory 80 to be branched so that a run forward at slow speed command is issued thereby. This command, when decoded at the record media transport control apparatus depicted in FIG. 15A will cause the run, speed and direction transport control flip flops 813 – 815 to be set in their appropriate ONE (1) and ZERO (0) states to enable the read/write record media transport system for a run mode of operation in which the record media is displaced in the forward directon at a speed which approximates twenty inches per second (20 ips).

After the issuance of these instructions, the run, servo unsafe, and media at speed status inputs to the first and second transport status multiplexers 811 and 812 are periodically sampled so that status conditions indicative as to the operation of the now enabled record media transport station are obtained. If the servo unsafe NOT input on conductor 840 provides a low level on the common status bus 21 when this input is sampled, it will be indicative, as aforesaid, that the record media transport station was not brought to an appropriate recording speed within the predetermined interval established, and hence the record media is backed up, and this operation is tried one or more additional times until an appropriate media at speed status input is obtained or the number of secondary attempts programmed are exhausted and an alarm signal is issued to apprise the operator that the elected operation may not be accomplished due to the defect in the record media loaded or the present improper operation of the automatic writing system. Conversely, if a media at speed status input is obtained on conductor 825 to the first transport status multiplexer 811 and gated onto the common status bus 21 such an indication will apprise the microprocessor indicated by the dashed block 16 that the play mode of operation specified may proceed and more particularly, that the reading of the record media by the read portion of the composite read/write head may be initiated. Thus, when a media at speed status indication is obtained, the read only memory 80 will be branched to a read command which causes the record media read apparatus depicted in FIG. 14 to begin the processing of character information read.

In response to the record media at speed status indication provided on conductor 825, a branch operation is initiated whereupon the record media read apparatus illustrated in FIG. 14 is enabled by sixteen (16) bit instruction words read from the read only memory 80, it being noted that each of the instructions read from the read only memory 80 to cause the actuation of the record media read apparatus will additionally contain the appropriate ROM bits for maintaining the enabled state of the record media transport system associated with the record media transport control apparatus depicted in FIG. 15A in a run forward slow speed. As the record media read apparatus depicted in FIG. 1 begins to process information read from the record media loaded in the active read/write record media station, each eight (8) bit character read in series thereby will be loaded into the serial to parallel converter 782 in response to the clock pulses issued at the output of AND gate 793 and in addition, as will be recalled from the description of the record media read apparatus depicted in FIG. 14, each time eight (8) such clock pulses are received the eight (8) bit counter 784 will be set to cause the flip flop 785 to set a read data ready flag at the status input to the first transport status multiplexer 811 connected to conductor 821. In addition, the read data NOT status input on conductor 823 to the first transport status multiplexer 811 will go low.

The operation of the read data ready flag is such, as will be recalled from a description of FIG. 14, that each time an eight (8) bit character has been loaded into the serial to parallel converter 782, this status input will be high while whenever an eight (8) bit character is in the process of being loaded through the application of clock pulses to the serial to parallel converter 782 this status input will be low. Therefore, as the reading operation being conducted proceeds, the status input on conductor 821 to the first transport status multiplexer 811 is periodically tested and each time a high level is detected on the common status bus 21, the eight (8) bit output gating arrangement 783 as shown in FIG. 14 is enabled by an appropriate instruction issued by the read only memory 80 whereupon the eight (8) bit, parallel output thereof is gated onto the common data bus 19 and into the main register M. Subsequently, this character is loaded on a first in, first out basis into the read only buffer 36 so that the line of data presently being read from the record media loaded at the read/write record media station is accumulated in the read only buffer 36 at a rate governed by the reading rate of the read/write record media transport station. Thus, in this manner the entire line of material at the record media is accumulated in the read only buffer 36 and upon the end of such line of material, as determined by the loading of housekeeping characters, to be described below, associated therewith into the main register M, a branch operation is initiated at the read only memory 80 to terminate the displacement and reading of the record media. Accordingly, it will be appreciated by those of ordinary skill in the art, that whenever a play operation is initiated under such conditions where the read/write record media transport station is the active reader, the record media will be read on a line basis and each character read therefrom will be inserted into the main register M and subsequently applied to the read/write buffer 35 for accumulation therein.

After a line of pre-recorded characters has been accumulated in the read only buffer 36 the buffer will be aligned in a manner described above, and then each character is read therefrom through output and step operations for application to the printer unit. A reading operation conducted at any record media transport station would be carried out in substantially the same manner outlined above regardless of whether or not the read/write or read only record media stations were utilized except that the destination peripheral for the initial accumulation of line information, i.e., the read/write or read only buffers 35 and 36, may vary in accordance with the nature of the operation specified in alternate modes of design. However, the exemplary play mode operation set forth from the standpoint of events which occur at the record media transport control apparatus depicted in FIG. 15A is sufficient to acquaint one of ordinary skill in the art with the nature of the displacement operations which are initiated under program control by the record media transport control apparatus depicted in FIG. 15A and the manner in which the plurality of status conditions monitored thereat are selectively gated, on a demand basis, onto the common status bus 21 so that the microprocessor indicated by the dashed block 16 may be apprised of the various operational and character ready states which obtain at the active record media transport station and respond thereto through branch, jump or incremented instructions to further promote the operation then in progress.

A search operation with respect to the events which take place at the record media transport control apparatus depicted in FIG. 15A takes place in much the same manner as described in the exemplary read and record operations set out above with two (2) important distinctions. The first distinction is that rather than a recording or play speed of twenty inches per second (20 ips) a search operation takes place at a fast speed of seventy inches per second (70 ips) and hence when the speed transport control flip flop 814 is selectively enabled in response thereto it is set to its ONE (1) state by the ROM bits decoded in the displacement instruction which issues and this condition is maintained until the search operation terminates. In addition, the direction of the displacement will vary as a function of the direction indicated by the difference in the block address set at the thumbwheels 506 and the present block address as indicated in the digital dislays 11 or 12 associated with the transport station. Thus, if the block address set at the thumbwheels 506 is higher than the present location of the record media in the active reader, as indicated by the digital display 11 or 12 associated therewith, the search operation will proceed under program control in the forward direction until the block address set at the thumbwheels 506 corresponds to the block address read from the record media, as determined by the comparison operations conducted in the microprocessor, and indicated at the digital display associated with the active record media transport station. If no comparison is obtained before an end of record character is detected, a branch operation will be initiated to cause the system to alarm indicating a failure to implement the search specified in the search operation initiated.

Conversely, if the block address set into the thumbwheels 506 is less than the block address at which the record media is presently positioned as indicated by the digital display associated therewith, the instructions issued by the read only memory 80 will be such that the record media is displaced in the counter clockwise direction at a fast speed and this operation will continue until the block address read from the record media and forwarded to the main register M for comparison purposes compares to that set into the thumbwheels 506. Due to the manner in which block addresses are recorded on the record media, as shall be described below, the presence of a block address on the record media, when the same is being displaced at a rate of seventy inches per second (70 ips), is readable by the record head even though the block address recorded therewith is not readable with a high degree of accuracy. Therefore, as was described above, each time a block address is detected when the automatic writing system is in a search mode, the state of the count in a comparison register is decremented until a ZERO (0) count condition is obtained. Thereafter, the record media is stopped and the block address is read at a reading speed of twenty inches per second (b 20 ips) to ensure that the counting search initiated produced appropriate results. Therefore, it will be appreciated by those or ordinary skill in the art that when the state of the count becomes ZERO (0), the read only memory 80 is branched so that the high speed search operation terminates, the recording-media may be subsequently displaced either in a forward or reverse direction so that the head is appropriately positioned prior to the block address when viewed from the standpoint of the direction in which the record media is displaced for a normal play operation, i.e., the forward direction, and thereafter a read operation for that address is initiated in the forward direction at a rate of twenty inches per second (20 ips).

The record media transport control apparatus illustrated in FIG. 15A thus allows the record media transport systems employed within the instant invention to be treated as any other peripheral within a data processing arrangement in that the record media transport apparatus illustrated responds to sixteen (16) bit instruction words issued by the read only memory 80 in response to modes of operation specified at the keyboard and monitors on a continuous basis a plurality of status indications so that the microprocessor indicated by the dashed block 16 may test, under program control, the various status conditions sensed and respond thereto through branch operations or the like within the single address mode of operation employed, to further promote the operations specified at the keyboard. In addition, as both serial playback and recording techniques are employed, the status indications provided at the record media transport control apparatus depicted in FIG. 15A acts to monitor, through the read data ready and write data ready flags provided, the decoding and encoding operations associated with the parallel to serial and serial to parallel conversions required at each record media transport station and provide appropriate status indications on a demand basis to the microprocessor indicated by the dashed block 16 as to when an appropriate eight (8) bit character is ready to be gated in parallel onto the common data bus 19 or when a new eight (8) bit character may be accepted therefrom. Furthermore, the record media transport control apparatus depicted in FIG. 15A enables through its responsiveness to the sixteen (16) bit instruction words issued and the status conditions monitored thereby, the recording or playback of entire lines of information from or on the record media to thereby enable the record media to be started and stopped only at the beginning and end of a given line of information whereby the wasted displacements of record media normally attending a per character recording scheme are avoided while the automatic writing system according to the present invention effectively acts to process data on a per character basis. As will now be apparent to those of ordinary skill in the art, the exemplary record media transport control apparatus depicted in FIG. 15A will admit of a plurality of modifications with regard to both its general utility within the instant automatic writing system and specialized uses therefor; however, such modifications and alternatives as are a function of the particular program sequence employed, the record media transports utilized or the overall functions or special applications of the present invention are viewed as wholly within the teachings of the instant invention.

FIG. 15B

The record media transport control apparatus depicted in FIG. 15B is specially adapted, as aforesaid, to operate with embodiments of the instant invention employing record media in the form of a magnetic card or the like and hence, to control transports associated therewith. Thus, although major portions of FIG. 15B, which generally reside in the right hand portion thereof correspond to circuitry already described in conjunction with FIG. 15A, certain portions of the record media transport control apparatus illustrated in FIG. 15B which are principally associated with controlling a transport for displacing a record media in the form of the card are not common and hence will be described hereinafter. These portions of the record media transport control apparatus depicted in FIG. 15B principally involve circuitry illustrated in the left hand portion of the Figure and certain inputs to the transport status multiplexers 811 and 812 and this circuitry, as shall be appreciated by those of ordinary skill in the art, is chiefly associated with the head step mechanism and the like in a card transport. Thus, while in a cassette transport, the heads are generally fixed and only the media is displaced, in a transport devoted to the displacement of a magnetic card or the like, both the card and head are separately displaced, the magnetic medium being displaced for purposes of reading and writing while the head is displaced for the purposes of disposing the same over a discrete track on the card wherein recording or reading is to occur.

Generally, a record medium in the form of a magnetic card would take the size of an 80 column punch card whose surface is coated on one side with a thin layer of ferrous oxide to form a continuous layer having no discrete or designated tracks for the purposes of reading or writing. Therefore, the strip of ferrous oxide on the surface of a card which forms a track employed for the purposes of reading or writing is a function of the read/-write system employed and is defined by the position of the head when the card is placed in relative motion herewith. In the instant embodiment of the present invention, seventy-two (72) discrete tracks that run the lengthwise dimension of the card may be assumed under such conditions that there are 0.042 inches of displacement from track center to track center. As each track is to record a line of defined information in similar manner to that explained for cassette versions of the instant invention, available track length for the recording scheme employed allows up to 150 eight (8) bit characters to be recorded per track. This data is preferably written and read from a stationary head disposed oer the track while the card is displaced therebeneath at a rate of 20 inches per second (20 ips) yielding a recorded bit time of 160ms. As the card track is recorded, the first half inch of card is employed for holding purposes, i.e. being grasped by the drive roller while the second half inch is dedicated to permitting the drive roller to get the card up to appropriate recording speed. Next, 264 ONE's are recorded to enable the read electronics to sync on the recorded data while the next 2 bytes of data (16 bits) consist of ZERO's. This enables the eight (8) bit serial to parallel shift register in the read circuitry illustrated in FIG. 14 to read data in the same eight bit byte configuration in which it was recorded. The next 1200 bits are devoted to data followed by a character of ZERO's, character position information, longitudinal redundancy check information, another character of ZERO's, a character corresponding to a Hex "FB" character, followed by twenty four characters of ONEs. This form of preamble and postamble as is employed in card embodiments of the instant invention, are employed, as will be appreciated by those of ordinary skill in the art, to accomplish essentially the same advantages as are employed in cassette or tape embodiments of the instant invention, as detailed in U.S. Ser. No. 429,479, supra, while lending the additional capability to the system to read the card in a reverse direction which is highly advantageous as a time saving feature within embodiments of the invention record media in the form of a card. Typically, the read/write transport station will employ a read/write head while only transport station will employ only a read only head so that only single head displacement is necessitated.

Although any conventional form of magnetic card transport may be employed, typically, card movement will be controlled by a drive roller actuated by a separate motor whose actuation is controlled by the transport control flip flops 813 and 815 which have already been described. In addition, a photodetector and light source are disposed in such manner that pushing a magnetic card into the transport will block the light to signal the microprocessor which monitors the output of the detector on a periodic basis to enable the drive and pinch roller motor to cause the card to be driven into the transport. The drive roller will drive the card in reverse, into the machine, until the detector is again excited which occurs after the front of the card has passed it. The card is driven by the drive roller pushing it against the pinch roller in the conventional manner while the driver motor speed is controlled by a feedback loop originating at a tachometer which is attached to the drive shaft in the well known manner. In addition, the head is mounted on a lead screw which is driven by a stepper motor which in turn is controlled by the circuitry illustrated in the left hand portion of FIG. 15B. Physically, the head will be displaced through 0.042 inches of lateral motion upon 90° rotation of the lead screw which results as a function of six pulses being supplied to the stepper motor in a manner to be described below. Thus, six pulses to the stepper motor are required to displace the head from one track to the next. The stepper motor may include four coils, having two windings each of which is located 45° apart and a rotor having six extrusions which are located 60° apart. The motor is driven by discrete pulses generated by the record media transport control apparatus depicted in FIG. 15B in a manner which is to be described below.

While the circuitry associated with the transport control flip flops 813,815 and 816, which control the motor for displacing the record media per se, was completely described above in conjunction with FIG. 15A, certain inputs to the status multiplexers 811 and 812 as shown in FIG. 15B have not been explained as they had no counterparts in FIG. 15A. Therefore, a description of omitted status inputs to the transport status multiplexers 811 and 812 will be set forth priot to initiating a description of the stepper motor control circuitry disclosed in the left hand portion of FIG. 15B. The portion of FIG. 15B associated with the latched eight (8) bit display corresponds identically to that set forth in FIG. 15A and hence will not be reiterated.

The only input to the transport status multiplexer 811 not having a counterpart in FIG. 15A is that connected to conductor 890 annotated Head Busy. This status input to the transport status multiplexer 811 is generated, as shall be seen below, in the left hand portion of the circuitry illustrated in FIG. 15B and when the same is high is indicative that the head is being displaced by the stepper motor. This status condition, which is periodically monitored by the microprocessor, is indicative that no read, write, or similar displacement commands may yet be issued to the active transport and hence monitoring should continue until a low level is present on conductor 890 when the same is gated onto the common status bus 21. Similarly, the transport status multiplexer 812, as illustrated in FIG. 15B, principally includes status inputs which have already been discussed; however, those status inputs supplied thereto on conductors 891 – 893 do not include specific counterparts in FIG. 15A and hence, are described at this juncture in the specification. More particularly, the status input on conductor 891, annotated SERVO OK is a status input employed to ascertain whether or not the record media drive motors in the transport have come to speed within a designated inteval after a run command has been issued and thus generally corresponds to the servo unsafe status input described in conjunction with FIG. 15A. In essence, once a run command has been issued together with a directon command by the transport control flip flops 813 and 815, the first half inch on the record media is employed for bringing the record media to speed. Thereafter, actual reading or recording of information may be initiated. For this reason, the error signal developed at the transport, as aforesaid is monitored for a timed interval associated with the first half inch of the record media and if the transport does not come to speed within this interval, the SERVO OK status input will go low.

The calibrate switch input on conductor 892 reflects the output condition of a calibrate switch located in the record media transport. The function of the calibrate switch is to center the head at the transport over track 0 against a head stop. Therefore, when the calibrate switch closes and the head is being stepped to the left, the microprocessor causes stepping to occur at a relatively slow speed so that the head gently positions itself against the stop to cause calibration with track 0 on the record card. Both the calibrate switch and the stop would be adjustable in position so that appropriate synchronism may be achieved.

The status inputs supplied to the transport status multiplexer 812 on conductor 893, as annotated ϕ1 Motor, is a status input relied upon to advise the microprocessor, whether the head presently sits over an odd or even track on the record media. More particularly, as shall be seen hereinafter, the displacement of the head on the lead screw results as a function of the generation of pulses which are employed to cause energizing pulses to be applied to the windings of the stepper motor. Furthermore, the displacement between tracks and the pitch of the lead screw is such that six pulses will cause displacement of the head from one track to the next and these six pulses are applied to a pair of flip flops which generate energizing pulses for the windings of the stepper motor. The pair of flip flops are operated in such manner that their outputs are phase displaced by 90° and although the output states of the flip flops always correspond at the beginning and end of a stepping cycle, they alternate each time six pulses are applied thereto so that effectively, the output state of each flip flop will be high when the head resides over an even track while below low when the head resides over an odd number track. In addition, the order in which transition occurs in these flip flops varies as a function of the direction in which stepping is to occur. Accordingly, by employing the output state of one of these flip flops as the status input on conductor 893, a ONE (1) level on the conductor will indicate to the microprocessor that the head resides over an even track while a ZERO (0) level thereon indicates that the head resides over an odd track. This information, when gated onto the common status bus 21, is employed by the microprocessor to verify proper head movement in ascertaining whether or not the head has been displaced from an odd to even or even to odd track.

The left hand portion of FIG. 15B is principally directed to apparatus for displacing the head through the action of a lead screw which is driven by the stepper motor. More particularly, this portion of the record media transport control apparatus acts to generate stepping pulses at either a fast or slow rate, controls the direction in which stepping is to occur, causes the generation of energizing pulses to be applied to the windings of the stepping motor and in addition thereto generates a plurality of status conditions which may be applied to the transport status multiplexers 811 and 812 as aforesaid. The circuitry illustrated in the left hand portion of FIG. 15B, which is principally associated with the control of the stepping motor, comprises the card in flip flop 895, the stepper motor control flip flops 896 - 900 as well as the various circuit components associated therewith. The card in flip flop 895 may take the form of a conventional clocked flip flop which in this case is set and reset under microprocessor control and functions to generate a status input as to whether or not a record media, in the form of a magnetic card is presently loaded at the transport. More particularly, as was stated above, the card transport includes a photodetector and light source disposed at a position where cards are loaded into the transport. Furthermore, the output of the photodetector is monitored on a periodic basis by the microprocessor, and the light input thereto will be blocked when a card is pushed into the transport. Upon blockage of light to the photodetector, the microprocessor assumes a card is to be loaded and activates the transport in a reverse direction to cause the card to be fully loaded. In addition, to keep track of this condition, the card in flip flop 895 is set. Conversely, when a card is to be ejected, the transport is activated in a forward direction for a sufficient interval to ensure that the card will be ejected and upon expiration of this interval, the card in flip flop is placed in a reset condition. The set or reset condition of the card in flip flop 895, is applied to conductor 905 and thus may serve as a direct input to the card in status input on conductor 824 to the transport status multiplexer 811.

The card in flip flop 895 is a clocked flip flop which acts in the well known manner to follow the state of the D input thereto during the presence of a clock input. Furthermore, the set or reset condition of the card in flip flop is governed solely by the microprocessor under program control as a function of conditions monitored at the transport or alternatively in response to the delay associated with an eject the card routine. The D input to the card in flip flop 895 is connected through conductor 906 to a terminal annotated $B_0$ and accordingly, it will be seen that the set or reset condition of this flip flop will be governed by the ONE (1) or ZERO (0) condition of ROM bit $B_0$ in instructions which cause thecard in flip flop 895 to be clocked. The terminal annotated $B_0$, as will now be appreciated by those of ordinary skill in the art may be connected directly to common instruction word bus 20. Thus, whenever an instruction issues which causes the card in flip flop 895 to be clocked, a ONE (1) in ROM bit position $B_0$ will cause the card in flip flop to be placed in a set condition to indicate that a card has been loaded within the transport while a ZERO (0) in ROM bit position $B_0$ will cause a card in flip flop 895 to be reset indicating that no card is present therein.

The clock input to the card in flip flop 895 is connected through conductor 907 to the output of an AND gate 908 which thus controls clocking. The AND gate 908 acts in the well known manner to generate a high level or clocking input for the card in flip flop 895 whenever both of the inputs thereto are high. A first input to AND gate 908 is connected through conductor 909 to a terminal annotated $B_2$ which reflects the condition of ROM bit $B_2$ in any instruction issued. The second input to AND gate 908 is connected through conductor 910 to the output of a second AND gate 911. The AND gate 911 will generate a high or enabling level for AND gate 908 when all of the inputs thereto are high. The four inputs to AND gate 911 comprise a media decode, the condition of ROM bits $B_{10}$ and $\overline{B_{11}}$ as well as the complements of two phases of the system clock. These input conditions for AND gate 911 are thus identical to the inputs provided to NAND gate 867 and hence it will be appreciated by those of ordinary skill in the art that they represent a properly timed decode of instructions directed to the record media transport apparatus. Accordingly, it will be appreciated that any time an instruction issues which is directed to the record media transport apparatus in which ROM bit $B_2$ is in a ONE (1) condition, the output of AND gate 908 will go high to clock the card in flip flop 895 to cause the same to follow the condition of its D input or the condition of ROM bit $B_0$ in that instruction. Thus, in this manner the card in flip flop 895 is set or reset to maintain a status condition representative of whether or not a record media has been loaded within the transport. A clear input to the card in flip flop 895 is connected through conductor 912 to the clear pulse generator 913. The clear pulse generator will act to generate a clear pulse under program control which here occurs during power up, reset or similar other operations to control the initial state established withinthe card in flip flop 895 and also the stepper motor control 898 which is connected thereto through conductor 914. Thus, in this manner, the card in flip flop 895 is set, reset, and cleared under program control to maintain a status indication indicative of whether or not a record media is loaded within the automatic writing system.

The remainder of the circuitry illustrated in the left hand portion of FIG. 15B is devoted to the actual control of the stepper motor so that the head is displaced to a precise track position defined by instructions issued by the microprocessor indicated by the dashed block 16. The speed with which displacement of the head occurs is controlled as a function of the frequency established by the speed control flip flop 896. The speed control flip flop 896 may take any of the well known forms of this conventional class of bi-stable device which acts to be set and hence apply a ONE (1) to the Q output thereof whenever a ONE (1) is applied to the D input thereof connected to conductor 915 and conversely to be reset and hence apply a ONE (1) to the $\overline{Q}$ output thereof whenever a ZERO (0) is applied to the D input thereof connected to conductor 915. A ONE (1) or high level is applied to the D input to the speed control flip flop 896 on conductor 915 in accordance with logical conditions decoded at the transport. The manner in which these conditions are decoded will be described below; however, it is here sufficient to appreciate that a fast stepping rate is normally employed in the stepping of the stepper motor unless one of two conditions obtain.

The first condition is that the calibrate switch on the transport is closed and it is thus desired to move the head slowly against the stop. The second condition arises during the first few steps applied to the stepper motor wherein a change in direction of the head is being initiated and this condition is desirable, as will be appreciated by those of ordinary skill in the art, to overcome effects associated with the inertia of the head and motor or the like. At any rate whenever a ONE (1) or step slow signal is applied to conductor 915, the speed control flip flop 896 is placed in a set state whereupon a ONE (1) level is applied to the Q output thereof connected to conductor 916 while when the speed control flip flop 896 is in a reset condition, a ONE (1) level resides at the $\overline{Q}$ output thereof connected to conductor 917. The conductor 916 is connected to a first input of the AND gate 918 while the conductor 917 is connected to a first input of the AND gate 919 and it will be appreciated by those of ordinary skill in the art that one of the AND gates 918 or 919 are selectively enabled in response to the set or reset condition of the speed control flip flop 896. The second input to the AND gate 919 is connected through conductors 920 and 921 to an oscillator input from a 312.5 Hz source. Accordingly, it will be appreciated by those of ordinary skill in the art that whenever AND gate 919 is enabled by a high on conductor 917, the output thereof will follow the input thereto on conductors 920 and 921 which oscillates at a controlled rate of 312.5 Hz. Thus, when enabled, the output of AND gate 919 will generate step fast pulses at the oscillator rate of 312.5 Hz. In a similar manner, the second input to the AND gate 918 is connected through conductor 922 to the output of a divide by four counter 923 whose innput is also connected to the source of oscillation through conductor 921. The divide by four counter 923 may take any conventional form of this well known class of device such as a Model SN 7493 chip available from Texas Instrument Corporation. At any rate, the divide by four counter 923 acts in the well known manner to generate one pulse at the output thereof for each four pulses applied thereto and since the input thereto is connected to the source of 312.5 Hz oscillations as aforesaid, the output of the divide by four counter 923 will oscillate at a rate of 78 Hz. Accordingly, whenever the AND gate 918 is enabled due to the slow set condition of the speed control flip flop 896, the output thereof will oscillate at a 78 Hz. rate to thus supply separate pulses at a slow rate whichis one-fourth the faast step rate defined by the output of AND gate 919. The output of the AND gates 918 and 919 are applied through conductors 924 and 925, respectively to the inputs of the OR gate 925A.

The OR gate 925A may take any of the conventional forms of this well known device which acts to develop a high level at the output thereof whenever either of the inputs thereto go high. Accordingly, it will be appreciated by those of ordinary skill in the art that regardless of which of the AND gates 918 or 919 is enabled, the output of OR gate 925A will follow the output thereof to thus apply stepping pulses at either the fast or slow rate defined by AND gates 919 and 918 to the output thereof connected to conductor 926. The output of the OR gate 925A is connected through conductor 926 to the lower input of AND gate 927 and to the count input of the divide by six counter 928.

The divide by six counter 928 may take the form of a conventional counter connected for a divide by six operation such as is available from an SN 7493 MSI chip available from Texas Instruments Corporation. The output of the divide by six counter 928 is connected to conductor 929 and hence the divide by six counter 928 acts to count either the slow or fast rate stepping pulses generated at the output of the OR gate 925A and after six of such pulses have been counted thereby, a high is placed onto the output thereof connected to conductor 929. Therefore, as it will be recalled that six stepping pulses at any rate define the displacement of the head from one track to an adjacent track, it will be appreciated that the divide by six counter 928 acts to count the number of pulses required for stepping to an adjacent track and then generates a high level on conductor 929 to indicate that a sufficient number of pulses for stepping to an adjacent track have been generated. The output of the divide by six counter 928 is connected through conductor 929 to the clear input of the head busy stepper motor control flip flop 897 which acts, as shall be seen below, when set to a ONE (1) condition to generate various stepper motor enable commands while when reset to a ZERO (0) condition to perform various pertinent clearing functions.

The head busy stepper motor control flip flop 897 may take any of the well known forms of this conventional class of device which acts to latch the condition of the present input applied thereto until the device is cleared. For instance, a Model SN 7474 flip flop as conventionally available from the Texas Instrument Corporation may be employed for this purpose under such conditions where both the D and clock inputs thereto are tied to ground. The preset input to the head-busy stepper motor control flip flop 897 is connected through conductor 930 to the output of an AND gate 931. Hence whenever the output of AND gate 931 goes high, the head busy stepper motor control flip flop 897 will be preset to a set condition where a ONE (1) level is generated at the Q output thereof and a ZERO (0) level is generated at the $\overline{Q}$ output. A first input to AND gate 931 is connected through conductor 932 to the output of AND gate 911 which serves, as aforesaid, to decode properly timed instructions devoted to the record media transport and the record media transport control apparatus depicted in FIG. 15B. Similarly, the second input to AND gate 931 is connected, as indicated, to a terminal annotated $B_7$ and hence receives the condition of ROM bit $B_7$ in each instruction cycle. Furthermore, as may be seen upon a perusal of the transport control operands HDL and HDR set forth in the Operand List attached hereto, the condition of ROM bit $B_7$ will be high in any instruction directed to the record media transport wherein stepping between tracks is to occur. Thus, it will be appreciated, that due to the input conditions on AND gate 931, any time an instruction is issued devoted to controlling the stepping of the head at the transport, the head busy stepper motor control flip flop 897 will be preset to a ONE (1) condition and will be retained in this state until cleared by a clear level applied thereto on conductor 929. Accordingly, the head busy stepper motor control flip flop 897 is preset to a ONE (1) condition each time a stepping instruction is issued and cleared due to the action of the divide by six counter means 928 after six stepping pulses at either a slow or fast rate have been generated by the OR gate 925A.

The Q output of the head busy stepper motor control flip flop 927 is connected through conductors 933 – 935 to a second input of the AND gate 927, one input of OR gate 936 and the input of a delay device 937. Thus, when the head busy stepper motor control flip flop 897 is preset to a ONE (1) condition, the ONE (1) level which resides on conductor 933 acts to further enable AND gate 927 so that the output thereof may follow the stepper motor pulses applied to the other input thereof from the output of OR gate 925A through conductor 926. Similarly, a stepper enable level is directly generated as a result thereof by the OR gate 936 and applied to output conductor 938 to enable the stepper motor in the manner indicated by the annotations supplied for this conductor on the right hand portion of FIG. 15B. The second input to OR gate 936 on conductor 939 is developed from the output of the delay device 936. The delay device may take the form of a conventional RC delay which inserts a delay of from 15 to 20ms in the high level generated at the Q output of the head busy stepper motor control flip flop 897. This delayed high output is applied to a second input of the OR gate 936 to ensure that the stepper enable level generated thereby on conductor 938 persists for an interval of from 15 to 20ms after the sixth stepping pulse appears and has been counted so that a rather substantial current is maintained on the windings of the stepper motor to dampen mechanical oscillations after the final step has been completed.

The $\overline{Q}$ output of the head busy stepper motor control flip flop 897 is applied through conductors 940 and 941 to the clear inputs of the counters 923 and 928. From the description of the head busy stepper motor control flip flop 897, it will now be appreciated that this flip flop is preset to a ONE (1) condition when a step command is initiated, and then enables the stepper motor while six stepping pulses are generated by the OR gate 925A. After six step pulses have been generated by the OR gate 925A. The counter 928 will clear the head busy stepper motor control flip flop 897 whereupon a ONE (1) is applied to conductors 940 and 941 to thus clear the condition of the counters 923 and 928 to place the same in a condition to again initiate counting operations in response to a next stepping cycle. Although not illustrated in FIG. 15B, should it be desired to clear the condition of the speed control flip flop 896, the clear level generation on conductor 940 of the head busy stepper motor control flip flop 897 may also be employed for this purpose.

The AND gate 927 receives the stepper pulses generated at the output of OR gate 925A through conductor 926 and is separately enabled by the output of the head busy stepper motor control flip flop 897 through conductors 933 and 934. Thus, once a head step command has been issued and the head busy stepper motor control flip flop 897 has been preset, the output of the AND gate 927 on conductor 942 effectively acts to follow the stepping pulses generated by the OR gate 925A and applied to conductor 926. The output of the AND-gate 927 is connected to conductor 942 to the clock inputs of the Q1 and Q2 stepper motor control flip flops 899 and 900. The stepper motor control flip flops 899 and 900 may take the conventional form of clocked flip flops which act to follow the condition of the D inputs thereto only when a clocking level is present. The Q1 and Q2 stepper motor control flip flops 899 and 900 act to apply pulses directly to the stepper motor and thus provide current pulses to the windings thereof. Accordingly, the output pulses of the Q1 and Q2 stepper motor control flip flops 899 and 900 provide outputs representing the final product of the stepper motor control circuit depicted in the left hand portion of FIG. 15B and the outputs thereof annotated 01 motor and 02 motor respectively are translated into stepper motor drive current which is directly applied to the windings of the stepper motor. The Q1 and Q2 stepper motor control flip flops 899 and 900 are connected, in a manner to be further described below, such that the output current pulses produced thereby are 90° out of phase and in a stepping sequence involving six stepping pulses which are the requisite number of stepping pulses to achieve head displacement to an adjacent track, the outputs of the Q1 and Q2 stepper motor control flip flops 899 and 900 always start out in the same state and end up in the same state; however, for each six step cycle which is associated with a displacement to an adjacent track, the ending state alternates from the starting state so that the output state of either of these flip flops at the termination of a stepping cycle may be employed to define whether or not the head currently resides over an odd or even track. The Q1 and Q2 stepping motor control flip flops 899 and 900 are relied upon to directly generate outputs which are applied to the four coils within the stepper motor where they indicate which of the four coils is to be energized at each step as well as the sequence.

The D inputs to each of the Q1 and Q2 stepping motor control flip flops 899 and 900 are developed as a function of the output of the other flip flop as well as the condition of the direction stepping motor control flip flop 898. More particularly, the direction stepping motor control flip flop 898 may take the form of a clocked flip flop which is similar in nature to the flip flops 899 and 900 and hence each may be conveniently formed by a SN 7474 MSI chip. The clock input to the direction stepping motor control flip flop 898 is connected through conductor 943 to the output of AND gate 931. Accordingly, it will be appreciated that the direction stepping motor control flip flop 898 is clocked to the output of the AND gate 931 each time an instruction devoted to the transport issues which instruction has ROM bit $B_7$ in a ONE (1) condition. Similarly, the direction stepping motor control flip flop 898 is cleared by the output of the clear generator 913 which is applied to the clear input thereto through conductors 912 and 914. The D input to the direction stepping motor control flip flop 898 is connected through conductor 944 to the terminal indicated $B_0$ and hence it will be appreciated that the condition of ROM bit $B_0$ in any instruction issued is applied through conductor 944 to the D input of the direction stepping motor control flip flop 898. The condition of ROM bit $B_0$, as will be apparent from a perusal of the instructions listed for Operands HDL and HDR in the list of Operands attached hereto as Appendix C is employed to define the direction in which stepping is to occur in any head step instruction and more particularly, when ROM bit $B_0$ is in a ONE (1) state stepping is to occur to the right while when this ROM bit is in a ZERO (0) state stepping to the left is defined thereby. Thus, as the direction stepping motor control flip flop 898 is a clocked flip flop, it will be appeciated that this flip flop is set to the condition of the D input thereof on conductor 944 only in the presence of a clock applied on conductor 943. This means that whenever a head step instruction is issued to the transport, the instruction will be decoded through the action of AND gates 911 and 931 to cause a clocking pulse to be generated on conductor 943 while the direction of stepping as defined by ROM bit $B_0$ and applied to the D input on conductor 944 is set into this flip flop in the same instruction cycle. Accordingly, the output of the direction stepping motor control flip flop 898 defines the direction in which stepping is to occur wherein a ONE (1) level defines stepping to the right while a ZERO (0) level defines stepping to the left. The output of the direction stepping motor control flip flop 898 is applied through conductors 945 - 947 to an input of exclusive OR gates 948 - 950.

The exclusive OR gates 948 - 940 may comprise any of the well known forms of this conventional class of logic device such as SN 7486 chips which act in the well known manner to produce a ONE (1) or high level at the outputs thereof only when each of the inputs thereto are in a different condition while producing a ZERO (0) at the outputs thereof when both of the inputs thereto are in a common ONE (1) or ZERO (0) condition. The exclusive OR gate 948, as shall be seen below, acts to control the condition of the slow stepping logic which provides an input to the speed control stepping motor control flip flop 896 through conductor 915 and hence is described hereinafter. The exclusive OR gates 949 and 950 however, act to supply the D input to the Q1 and Q2 stepping motor control flip flops 899 and 900 and this input, as shall be seen hereinafter, is controlled both as a function of the direction set into the direction stepping motor control flip flop 898 and the output state of the alternate Q1 and Q2 stepping motor control flip flop 899 and 900.

More particularly, the exclusive OR gate 949 receives the direction set into the direction stepper motor control flip flop 898 as represented by the output thereof applied thereto through conductors 945 and 946 at the upper input thereto while the lower input thereof receives the complemented output condition of the Q2 stepper motor control flip flop 900 through conductor 951. Similarly, the exclusive OR gate 950 receives the direction bit set by the direction flip flop 898 through conductors 945 and 947 at the lower input thereto while the state of the Q1 stepper motor control flip flop 899 as present at the Q output thereof is applied to the upper input thereto through conductor 952. The output of the exclusive OR gates 949 and 950 are applied to respective ones of the D inputs to the Q1 and Q2 stepper motor control flip flops 899 and 900 through conductors 953 and 954.

In operation of the Q1 and Q2 stepping motor control flip flops 899 and 900, it will be seen that a track step command will have been initially issued which causes a clocking of the direction stepping motor control flip flop 898 and a presetting of the head busy flip flop 897. When the head busy flip flop 897 is preset, a stepper enable level will be generated on conductor 938 while counters 923 and 928 are cleared to permit the generation of stepping pulses by the OR gate 925A. For the purposes of an initial description, it may be assumed that a step right instruction has issued so that the direction stepping control flip flop 898 is set to a ONE (1) condition by the condition of ROM bit $B_0$. Furthermore, it may also be assumed that both the Q1 and Q2 stepper motor control flip flops 899 and 900 are in a reset condition so that a ONE (1) resides on each of the $\overline{Q}$ outputs thereof. Thus, at a time $t_0$, the Q outputs of each of the Q1 and Q2 flip flops are at a ZERO (0) level, the output of the direction stepper motor flip flop 898 is at a ONE (1) level and the AND gate 927 is enabled so that the same may apply stepping pulses to the clocked inputs of the Q1 and Q2 stepper motor control flip flops 899 and 900. In addition, due to these initial conditions, the exclusive OR gate 949 will have ONEs at both of the inputs thereto connected to conductors 946 and 951 so that the output thereof on conductor 953 is low while exclusive OR gate 950 has a ONE (1) on input conductor 947 and a ZERO (0) on input conductor 952 so that its output as applied to conductor 954 is high. Thus, when the first separate pulse is generated by OR gate 925A and applied through AND gate 927 to the clock inputs of flip flops 899 and 900, the Q2 stepper motor control flip flop 900 will be set to a ONE (1) condition upon the leading edge of the gated stepper pulse causing its output on conductor 951 to go low. For a step right instruction, the Q2 flip flop 900 is the first flip flop to be switched. When the Q2 flip flop 900 is switched, the input conditions on the exclusive OR gate 949 change in that the input thereto on conductor 951 goes low while the input thereto on conductor 946 remains high so that the output of the exclusive OR gate 949 now goes high to condition the Q1 flip flop 899 for switching upon the appearance of the leading edge of the next stepping pulse generated. The input conditions at the Q2 flip flop 900 have not changed and hence, since the same is already set no toggling will occur upon the appearance of the second stepping pulse. When the second stepping pulse is gated through AND gate 927, the Q1 flip flop 899 is placed in a set state to generate the ONE (1) on conductor 952 while the Q2 flip flop 900 persists in its set state. Thus, upon the arrival of the second stepper pulse, both the Q1 and Q2 flip flops 899 and 900 are in a commonly set state.

The setting of the Q1 flip flop 899 however, changes the input conditions on the exclusive OR gate 950 in that a ONE (1) now appears on both conductors 947 and 952 so that the output thereof on conductor 954 goes low. Therefore, upon the appearance of the third stepper pulse, the Q2 flip flop 900 is reset to its ZERO (0) state. This resetting of the Q2 flip flop 900 changes the input conditions on the exclusive OR gate 949 so that the Q1 flip flop 899 will be reset upon the appearance of the leading edge of the fourth stepper pulse. Similarly, the Q2 flip flop will be placed in its set state upon the appearance of the leading edge of the fifth stepper pulse while the Q1 flip flop 899 is placed in its set state upon the appearance of the leading edge of the sixth stepper pulse which completes the stepping cycle for a single track and causes a disabling of the AND gate 927. Accordingly, it will be seen that for a step right operation, the Q1 and Q2 flip flops 899 and 900 are switched upon the application of alternate stepping pulses and that the Q2 flip flop is the first flip flop to be toggled. Similarly, after the application of six stepping pulses to complete the stepping cycle required for a single track, the Q1 and Q2 flip flops 899 and 900 will be in a common state; however, this common state is opposite to that which existed upon the initiation of the stepping cycle for the track and hence the ONE (1) or ZERO (0) condition of either the Q1 or Q2 flip flops at the termination of a stepping cycle may be employed to indicate the even or odd condition of the track over which the head resides.

Similarly, for a step left operation, a ZERO (0) bit is loaded into the direction stepper motor control flip flop 898. This changes the initial conditions for the exclusive OR gates 949 and 950 prior to the appearance of the first stepping pulse so that if the Q1 and Q2 flip flops are again assumed to be in a reset state, the Q1 flip flop will undergo transition upon the appearance of the leading edge of the first stepping pulse while the Q2 flip flop is set upon the appearance of the second stepping pulse. Hence, under these conditions, for stepping to the left, a transition is initiated by the Q1 flip flop 899 and is followed during the appearance of even stepping pulses by the Q2 flip flop 900. Of course, should the initial conditions for the Q1 and Q2 flip flops 899 and 900 be assumed to be opposite, i.e., these flip flops initially residing in a ONE (1) or set state, the initial flip flop to be toggled upon the appearance of the first stepping pulse will be opposite to that described above. Thus, when stepping to the right is initiated at a time when the Q1 and Q2 flip flops are in a set state, the Q1 flip flop 899 will lead the Q2 flip flop and conversely for stepping to the left when the Q1 and Q2 flip flops are in a set state, the Q2 flip flop 900 will lead the switching of the Q1 flip flop 899. The complemented outputs of the Q1 and Q2 stepping motor control flip flops 899 and 900 are connected to the stepping motor for the card transport in the manner indicated by the annotations 01 motor and 02 motor connected to conductors 955 and 956 respectively and it will be appreciated by those of ordinary skill in the art that the conductor 955 may also be connected to conducctor 893 on the transport status multiplexer 812 so that an odd or even track indication may be provided to the microprocessor for processing operations and the like.

The exclusive OR gate 948 has a first input connected to the output of the direction stepping motor control flip flop 898 through conductor 945 as aforesaid while the second input thereto is connected through conductur 957 which represents the condition of ROM bit $B_0$ in an instruction which acts to set the direction. The function performed by the exclusive OR gate 948 is to generate a high level output whenever a change in direction from that which previously obtained is commanded by an instruction while a ZERO (0) output is generated thereby whenever no change in direction has been initiated. Therefore, since the output of the exclusive OR gate 948 will only go high in response to different input conditions on conductors 945 and 957, it will be appreciated by those of ordinary skill in the art that the output of the exclusive OR gate 948 will go high only under such conditions when a step right condition has been previously set into the direction flip flop 898 while step left condition has been commanded by the $B_0$ bit present in a current instruction or conversely, when the head step flip flop 898 is set to a step left condition and the condition of ROM bit $B_0$ is associated with a step right condition. Under all sets of input conditions, i.e., those where no change of direction is required, the output of the exclusive OR gate 948 will be zero (0).

The output of the exclusive OR gate 948 is connected through conductor 957 to an input of the AND gate 959. Thus it will be seen that the input to AND gate 959 on conductor 957 will only go high when a change in stepping direction is to be initiated. The second input to AND gate 959 is applied through conductor 958 from the output of the 20ms delay device 937. The output of the delay device 937, it will be recalled, is only high during an initiated stepping operation and persists in a high condition for an interval of 20ms thereafter for the purposes of continuing the stepper enable signal generator on conductor 938. Therefore, the input on conductor 958 will only be high for an interval corresponding to 20ms after a stepping operation and thereafter will go low. As such a 20ms interval is sufficient to assume settling and an end of head inertia which need be overcome by slow stepping its input to AND gate 959 assures that a step slow signal will only be generated in response to a change of direction if the change of direction instruction issued within 20ms of a previous stepping operation. Under these conditions, the output of AND gate 959 will go high. The output of AND gate 959 is connected through conductor 960 to one input of an OR gate 961 while the output of the OR gate 961 is connected through conductor 962 to one input of AND gate 963. The AND gate 963 is connected through conductor 964 to the output of the AND gate 931 which, as aforesaid, goes high upon a decoding of instructions issued to the transport wherein a head step operation, as defined by ROM bit $B_7$ is commanded. More particularly, the timing on this output is such that it will go high during clock phases 5 - 7 of the instruction cycle and hence during this interval a high will reside on conductor 964 to enable the AND gate 963. This means that if the OR gate 961 has generated a step slow output in response to the output of AND gate 959, the output of AND gate 963 connected to conductor 915 will go high to set the fast/slow flip flop 896 to cause the generation of step slow signals for the sixth step interval or at least an initial portion thereof.

It should additionally be noted that a second input to OR gate 961 is connected through conductor 965 to a terminal annotated Calibrate Switch which is the same condition monitored at input 893 of the transport status multiplexer 812. This calibrate switch input is periodically monitored by the microprocesor under program control and should the same go high during an interval when the head is being stepped to the left, i.e., towards the stop, the microprocessor immediately generates a step left instruction. Thus when a high level appears on conductor 965 due to the closing of the calibrate switch, the output of OR gate 961 connected to conductor 962 goes high. Furthermore, if the head was being stepped in a leftward direction, the new step left command issued by the microprocessor will cause an enabling level to again be applied to conductor 964 to cause the AND gate 963 to be enabled to set the speed control flip flop 896 so that slow stepping pulses are again generated and this is here done to cause the head to move gently against the stop for calibration purposes. Accordingly, when either a change in direction is commanded for the stepping of the head within 20ms of the previous stepping instruction or the calibrate switch is closed during a step left operation, slow stepping pulses are generated by OR gate 925 for that stepping cycle.

Other than for the operation of the head stepping circuitry described above, the operation of the Record Media Transport Control apparatus illustrated in FIG. 15B is essentially the same as that set forth in conjunction with FIG. 15A. Therefore, the same need not be here reiterated.

THE FLOW CHARTS

Although system structure, operation, and functions have been described above principally in relation to the overall system schematics set forth in FIG. 2, as well as the detailed schematic diagrams of basic system components set forth in FIGS. 3 - 15B, the modes of operation and function implementation there described proceed essentially in the piecemeal function associated with that which takes place at the given peripheral being discussed or that which is apparent to an operator. The actual processing which takes place within the automatic writing system according to the instant invention may best be appreciated upon a detailed review of the annotated program listings attached hereto as Appendices A and B; however, in order to provide a reader with an overall view of the processing which takes place under program control, the flow charts set forth in FIGS. 16 - 28D are provided and will be hereinafter discussed so that the modes through which word processing is achieved and the manner in which basic functions are implemented may be readily understood. It should be noted however, that the flow charts which are hereinafter described are simplified to a great degree, consistent with the useage of flow charts as relied upon by those of ordinary skill in the art, and hence reference to Appendix A and B should be made for precise details of given ones of the programs described or otherwise employed.

SYSTEM IDLE ROUTINE

Referring now to FIG. 16, there is shown a flow chart illustrating a simplified system idle loop program. More particularly, the idle loop program illustrated in FIG. 16 is entered at various locations any time the automatic writing system according to the instant invention is either powered up or is awaiting the occurrence of a given event through a monitoring function wherein the common status bus 21 is employed to monitor conditions which obtain at various ones of the peripherals. The idle routine illustrated in FIG. 16 is highly reminiscent of the idle routine disclosed in conjunction with FIG. 18 of U.S. Pat. application Ser. No. 430,130, supra, and reference to this disclosure may be had for additional detail. Referring now particularly to FIG. 16, it will be seen that any time a power up operation is initiated, the test indicated by the diamond 1000 produces an affirmative result whereupon the actual routine is entered, while the arrow 1001 annotated NO is indicative of closed loop condition indicating that nothing will happen until a power up operation is initialized and indicated to the sensors. Once a power up operation is initiated as indicated by the arrow 1002 annotated YES, an initialize sequence is entered in the manner indicated by the block 1003 wherein various registers are preset or cleared to establish initial conditions therein, the printer is restored, any record media loaded is rewound or ejected and upon the conclusion of each of these events, an indication that the system is ready to begin processing is preferably provided to the operator. Typical cases of the resetting or presetting of registers in this step of the idle routine may be considered to include such functions as the setting of standard margins in to the RAM as well as the standard margin range, the setting of the pitch, zeroing deferred escapement and the tab counter in the RAM, zeroing the fractional column indicator and setting the language option if one is present to the standard or native version. Additionally, the read only and read/write buffers would be cleared so that processing at the keyboard may be initiated in any manner desired by the operator. Similarly, the flags associated with G register locations G8 and G9 as set forth in Appendix G would be cleared to a ZERO (0) condition together with the remaining functions indicated in the first page of the microprograms attached hereto as Appendix A and B. The initializing functions associated with the block 1003 are continued until all necessary registers and the like have been preset or cleared and until the printer has completed its restore function whereupon an indication to the operator is provided that processing may begin.

Upon completion of the initializing function, the idle routine illustrated in FIG. 16 passes to the entry point indicated by the oval 1004, indicated IDLE 3, and initiates a clearing of the keyboard strobe and keyboard stack as indicated by the rectangle 1005. Thereafter, if passes through the entry point indicated by the oval 1006 and performs a clearing of the stop key in the manner indicated by the rectangle 1007. The clearing operations indicated by the rectangles 1005 and 1007 are necessary, as will be appreciated by those of ordinary skill in the art, because the idle routine whose flow chart is illustrated in FIG. 16 need not only be entered in response to a power up operation but may occur, as shall be seen below, through a reentry after character information from the keyboard has been entered, a stop bit has been set, or the keyboard stack has been filled in response to an automatic processing operation, but such processing operation must be terminated due to the arrival of the printer at the margin zone or the like. Upon completion of the processing steps indicated by the rectangles 1005 and 1007, the idle loop per se is entered where in effect, the system sits back and waits for a given occurrence to be indicated on the common status bus 21. During this waiting operation, a large number of status conditions are selectively gated in a sequential manner onto the common status bus until a condition which causes branching occurs. Similarly, various resetting operations occur to refresh flags, flip flops and the like which may have been subjected to noise. This monitoring function together with the associated resetting functions are generally indicated by the block 1009 which generally indicates that the system is sitting back and monitoring the status bus waiting for an event to occur for which branching and attendant word processing may occur. Furthermore, during such waiting interval, varius housekeeping functions are performed to maintain the systm in a ready role. For instance, it will readily be appreciated by those of ordinary skill in the art that the keyboard status conditions such as the character ready strobe, the stop key, etc. are sequentially monitored on the common status bus so that a data entry condition is detected. Similarly, during the monitoring and resetting operations indicated by the block 1009, previously set flags are updated, previously established tabs are loaded in the read/write buffer so that processing of line information may begin, the block number indicia for an active transport are updated, the status of the line counter is checked, any defered escapement which have been established is executed, the line space switch is monitored, a ribbon down function at the printer is executed together with a multitude of other housekeeping functions which are performed during this monitoring interval where the system is effectively sitting and waiting for some action to be initiated.

After the generalized monitoring functions indicated by the rectangle 1009, the portion of the idle loop, indicated by the oval 1010 is entered wherein, as indicated by the diamond 1011, the detection of a branch condition on the common status bus is tested to ascertain whether or not the same constituted a keyboard entry. In actuality, this test would be part and parcel of the portion of the monitoring function indicated by the rectangle 1009 wherein varius status conditions from the keyboard are monitored and depending upon the status condition test ascertained, further processing through the loop being described or branching therefrom would occur. More particularly, if it is assumed that the keyboard character ready strobe condition is gated onto the common status bus 21 in the manner indicated by the diamond 1011 and no branch condition was indicated thereon as indicated by the arrow 1012 annotated NO, the keyboard monitoring function would then be tested to ascertain whether or not the stop key had been depressed as indicated by a setting of the stop flag set at the keyboard status multiplexer and selectively gated onto the common status bus 21. This test is indicated by the diamond 1013 and should the results thereof be negative as indicated by the arrow 1014, the idle loop is re-entered prior to the rectangle 1009 whereupon the entire subroutine is continued until either a keyboard entry which generates an eight (8) bit code is detected as a function of the keyboard strobe or the stop key is depressed.

If a keyboard entry is detected, as indicated by the arrow 1015 annotated YES, it will result from a setting of a ready strobe at the keyboard status multiplexer 520 and the subsequent gating of this status condition onto the common status bus 21 where the branch condition is tested. The character generated will be taken from the keyboard and applied through the common data bus 19 to the main register M. In addition, as indicated by the diamond 1016, the contents of the general purpose register location GB-3 – GB-0 are tested to ascertain whether or not the automatic writing system is operating in a U.S. format. For the purposes of the instant disclosure, it may be assumed that the automatic writing system is operating in a U.S. format as indicated by the arrow 1017 and hence that the code loaded in the main register M is in a U.S. equivalent ASCII format in the form in which it was generated at the keyboard. However, if an embodiment of the instant invention is provided with a language format where other codes are effectively generated at the keyboard, the code loaded in the main register M is translated, in the manner indicated by the rectangle 1019 into a media compatible code. Since the provision of the instant invention with language options capable of meeting keyboard requirements of foreign nations is not within the scope of the instant application, it is here sufficient to appreciate that should code generation occur according to other language criteria, translation to a media compatible code will occur under software control in the manner indicated by the rectangle 1019. At any rate, regardless of whether or not a U.S. equivalent ASCII code, as indicated by the arrow 1017 is directly generated at the keyboard or whether translation as indicated by the rectangle 1019 occurs, the flow chart is rejoined at a common point indicated by the arrow 1020.

The next step indicated in this branch routine, as indicated by the diamond 1021, is to test whether or not the machine has been established in a justify mode. This test is conducted, as will be appreciated by those of ordinary skill in the art, by testing the contents of general purpose register location G9-2 to ascertain whether or not the justify flag set therein has been established in a ONE (1) condition in response to a previous depression of the justify key at the keyboard. If this flag has been set, as indicated by the arrow 1022 annotated YES, a restricted form of justification keyboard input analysis is initiated, under program control in the manner indicated by the hexagon 1023. The nature of the restricted form of keyboard input analysis initiated when a justify mode of operation has been set will be illustrated in greater detail below, here however, it is sufficient to recall that in a justification mode of operation, the operator is effectively limited to playing back prerecorded information from a record media and hence character information to be printed may not be entered from the keyboard. However, control information may and under certain circumstances must be entered from the keyboard. Therefore, the restricted keyboard analysis indicated by the hexagon 1023 is indicative that the character information loaded in the main register M is analyzed to the limited degree permitted for a justify mode of operation.

If justify has not been set, as indicated by the arrow 1024 annotated NO, the condition of general purpose register location G8-5 is next tested as indicated by the diamond 1025 to ascertain whether or not a margin control mode of operation has been established by the operator. If the answer is affirmative, as indicated by the arrow 1026 annotated YES, any margin control mode conversions, as indicated by the rectangle 1027, are implemented upon the character which has been loaded in the register M. The nature of these conversions will be described in greater detail in conjunction with FIGS. 21 and 22 however it will here be sufficient to appreciate that in the margin zone, space codes and the like are converted to carriage return characters while conversely outside the margin zone carriage return characters and non-mandatory hyphens are converted to space codes or deleted respectively. Thus, the rectangle 1027 is indicative that the character loaded in the main register M is placed in register location G7, compared with various constants for which conversion may be necessary under the conditions which obtain and any necessary code conversions which may be required upon an appropriate comparison are implemented. After any necessary conversions have been initiated as indicated by the arrow 1028 or if the margin control flag has not been set as indicated by the arrow 1029 annotated NO, the character loaded into the main register M is analyzed in the manner indicated by the hexagon 1030 and appropriately processed. The analysis of the keyboard routine indicated by the hexagon 1030 effectively involves the analysis of the content of the character which has been entered at the keyboard through a scanning technique so that the same is initially classified and identified. Thereafter, a character processing routine is entered which operates as a function of the result of the classification test conducted. Thus, once classified, the character entered may be identified as a function only character or not. If a function character has been identified, it is next tested to ascertain whether or not the functional character entered is a result of the depression of an action key. If an action key such as automatic, paragraph, line or word, has been depressed, the play/skip/dup routine described hereinafter in conjunction with FIG. 18 is entered while if the function character detected is not an action key, the appropriate function is executed. Conversely, if no function character is present, the character is next tested to ascertain whether it represents the record mode key and if the same is present, effectively the record mode flag is set and the idle loop associated with oval 1008 is re-entered. If the character classified is not a record mode key indication, it is next tested to ascertain whether it is a record and function key such as a block mark or eject code, a printable character or a character to cause the printer to execute a function. If none of these characters are present, an error indication is provided while if the presence of such a character has been identified, testing is continued to ascertain whether or not a block mark or eject code is present. If such codes are present they are recorded and executed in the proper manner and the idle loop is returned to at the location of oval 1004. If the record and function key is not a block mark or eject code, it is next tested to ascertain whether it is a printable character. If a printable character is present, appropriate escapement is executed, representing one half that associated with a previous character, if entered, and one half that associated with the current character and thereafter printing of the character and an updating of the deferred escapement flag is set whereupon the character is recorded and the idle loop is returned to at idle position 1008. Similarly, if no printing character is present, the printer function associated with the character entered, since it is the last available alternative, is executed, the character is recorded, and the idle loop is returned to at position 1004.

Character fanning associated with the analysis of the keyboard entry indicated by the hexagon 1030 is a fanning technique which first tests the nature of data bit 7 in the character code entered. If the same is a ZERO (0), the code will represent either a record only key, a record and function key, a block mark or eject code, a printing character code or a code which causes a function to be executed at the printer wherein the definition of a record mode character also includes character information which at this juncture is merely to be recorded such as a center code, column heading or the like. If data bit 7 is a ONE (1) a function code may be present. Therefore, the character code loaded next has data bit positions DB4, DB5 and DB6 tested to ascertain whether the same are equal to ZERO (0). If this condition is true, certain function codes will be defined by the character, which function codes may be individually tested for; however, if the condition is false, the condition of data bit DB6 is next tested to ascertain whether or not the same is set to ZERO (0). If this result is true through the fanning approach being employed, additional functions are indicated while if it is false, further analysis of data bits DB5 and DB4 separately occur and in this manner additional groups of function codes may be classified and thereafter separately identified. If neither condition occurs, individual analysis of the code inserted may be employed to finally identify the code inserted from one of the small number of codes which remain. Thus, in this manner, when a keyboard entry is indicated by the arrow 1015, a branch from the idle loop occurs and this keyboard entry is appropriately processed in the manner indicated.

When no keyboard entry is present, as indicated by the arrow 1012 annotated NO, but the stop key was depressed as indicated by the arrow 1031, a STOP bit is set in the manner indicated by the rectangle 1032. This stop bit is set in G register location GF-4 and thereafter, as indicated by the arrow 1033 and the diamond 1034, the condition of the single cycle flag as set in G register location G5-1 is checked to ascertain whether or not the same was set during a margin control mode of operation or the like. If the results of the test indicated by the diamond 1034 are affirmative, as indicated by the arrow 1035 annotated YES, the single cycle bit is reset as indicated by th rectangle 1036 and thereafter, as indicated by the arrow 1037, entry point 1004 of the idle machine routine is returned to. The resetting of the single cycle bit indicated by the rectangle 1036 is here implemented because the presence within the idle loop indicates that we have already stopped and hence, the condition initiated upon the setting of this flag has been satisfied.

If the single cycle bit was not set as indicated by the arrow 1038 annotated NO, the justify flag established in register location G9-2 is tested, in the manner indicated by the diamond 1039 to ascertain whether or not the justify mode has been established. If not set, as indicated by the arrow 1040, processing of the STOP condition will occur within the play/skip/dup routine indicated by the oval 1041 and described in conjunction with FIG. 18. However, if the justify bit was set, as indicated by the arrow 1042, the entry of the stop key character detected is meaningless as presence within the idle loop during this mode is indicative that the system has already stopped. Therefore, it is treated as an erroneous entry whereupon an error buzzer might sound in the manner indicated by the rectangle 1043, and a return to the idle loop at the location indicated by oval 1004 occurs. Accordingly, it will be appreciated from the flow chart illustrated in FIG. 16 that whenever a power up operation occurs or the idle machine routine depicted therein is otherwise entered, predetermined initial conditions are established when appropriate, updating, monitoring and resetting functions are initiated and then the system awaits the entry of keyboard information. If the entry of keyboard information is other than a stop code, the character, function or control information represented thereby is appropriately processed under program control while if the stop key is depressed, operating conditions within the system are ascertained and appropriate processing occurs. If neither condition obtains, cycling within the idle loop continues until such time as a keyboard entry is presented.

ESCAPEMENT AND CHARACTER PRINTING

Referring now to FIG. 17, there is a simplified flow chart illustrating the escapement and character printing program sequence of operation initiated in the automatic writing system according to the instant invention under program control. The escapement and character printing program sequence of operation illustrated in FIG. 17 is entered at a position indicated by the oval 1050 as soon as the analysis of the character at the keyboard has been completed and a character representing printable character information or a printer function has been ascertained. The first step of the escapement and character printing routine, as indicated by the rectangle 1051 is to fetch the weight of the character stored in G7 from the printer data ROM so that appropriate initial escapement of the printer may be initiated. Printer data is stored within the printer data ROM, it will be recalled, in the form of twelve (12) bits wherein 7 of the low order bits define the spoke position of the character, the next three bits define character width while the remaining two bits of information defines the hammer force to be employed for printing purposes. Therefore, the step of fetching the weight of the character indicated by the rectangle 1051 involves multiple addressing of the printer data ROM so that data in two passes is read therefrom and loaded into the main register M. In the first reading, the eight least significant bits from the printer data ROM are obtained. Since the seven least significant bits in this group represents spoke identification information, they are masked off and only the high order bit is retained. This bit is shifted right so that the same represents the last significant bit of the information being assembled and thereafter the four high order bits of printer information are obtained from the printer data ROM. In this case the two most significant bits of the four bits obtained are masked off as the same repesent hammer force to be employed while the two least significant bits are shifted left so that three bits of character width information are obtained and properly ordered. Thereafter, the value 2 is added to the resultant width obtained so that the absolute width of character information for the character identified is defined. Once the weight of the character has been thus obtained in the manner indicated by the rectangle 1051, the condition of the deferred escapement flag established in register location GF-6 is checked in the manner indicated by the diamond 1052 to ascertain whether or not the same is in a set condition.

The deferred escapement flag is set in register location GF-6 any time deferred escapement has been initiated in response to a failure on the part of the operator to enter character information for an interval comprising one hundred milliseconds (100 ms). More particularly, it will be recalled that under general operating conditions, escapement prior to printing of each character occurs wherein the initial escapement associated with the printing of a character represents half the weight of a previously printed character and one half the weight of a newly entered character. However, in order to provide the operator with the appearance of dealing with the normal typewriting function, should the operator hesitate in entering character information for an interval of 100ms, the carriage escapement is initiated at the printer under program control and this carriage escapement is equal to half the width of the character just printed plus one half of the width of a standard character. This width is six units for 10 pitch, five units for 12 pitch and five units for proportionally spaced information and hence the printer unit, under these conditions, yields the appearance of being in position for the printing of new character information which corresponds to that with which an operator is normally acquainted. Whenever deferred escapement is executed in this manner, a flag is set in register location GF-6 to provide an advisory indication to the microprocessor that the normal escapement procedure has been altered. The setting of the deferred escapement bit, under these condition, in register location GF-6 acts to establish a ZERO (0) therein and hence the location of a ZERO (0) in register location GF-6 is indicative that deferred escapement has occured while the location of a ONE (1) therein is indicative that the 100ms interval established for deferred escapement has not yet timed out.

If the test indicated by the diamond 1052 is affirmative, as indicated by the arrow 1053 annotated YES, one-half the character weight or pitch assigned for standard escapement is subtracted, in the manner indicated by the rectangle 1054 from one half the character width obtained by the step indicated by the rectangle 1051. Therefore, as standard escapement has operated, under these conditions, the program step indicated by the rectangle 1054 will produce a displacement increment representing necessary displacement, right or left, to achieve carriage positioning at a location corresponding to one half the escapement associated with the previously printed character plus one half the width of the character just entered in the same manner as if deferred escapement had not operated. Conversely, if the deferred escapement flag had not been set, in the manner indicated by the arrow 1055 annotated NO, the weight or width in units of the last character printed is added to the weight in units of the character to be printed as obtained in program step 1051. This step is indicated by the rectangle 1056 and as character weight set forth in increments, the program step indicated by the rectangle 1056 effectively acts to add one half the width of the character previously printed to that of one half the width of the new character to be printed to assemble an appropriate width for carriage displacement. It should be noted that character widths being discussed will vary only in the case of proportionally spaced printing while if ten (10) pitch or twelve (12) pitch modes of printing have been selected, character width will be common for all characters and although assembled in this manner, such width will be defined in terms of constants read from the read only memory. The data required anent the weight of the last character printed associated with the program step indicated by the rectangle 1056 is maintained in the H register in locations H9-3 – H9-0 so that the same is readily available to the program.

Regardless of whether initial escapement information is assembled through the program step indicated by the rectangle 1054 or that defined by the rectangle 1056, the next step in the program, as indicated by the arrows 1057 and 1058 as well as the diamond 1059 is to test whether or not the resulting escapement information is positive or negative. Positive escapement information indicates a displacement of the carriage to the right which is the normal printing direction while negative escapement information indicates that escapement to the left is required to effectively back up the carriage to accommodate a condition wherein a subsequently entered character is smaller in width than the standard escapement information employed during a deferred escapement. Thus, in a proportionally spaced printing mode, should deferred escapement operate and character information associated with a lower case "i" be subsequently entered at the keyboard, the carriage will effectively have to be backed up to permit the appropriate printing of the subsequently entered character. If the test indicated by the diamond 1059 is affirmative as indicated by the arrow 1060 indicating that a backing up of the carriage is required, the carriage is displaced in the manner indicated by the rectangle 1061 in a leftward direction. This is accomplished, as will be apparent to those of ordinary skill in the art, by forwarding the displacement information assembled in program steps 1054 or 1056 to the printer unit together with a direction bit issued under program control defining leftward escapement. Similarly, if the test indicated by the diamond 1059 is negative in the manner indicated by the arrow 1062, annotated NO, displacement information is issued to the printer unit in the manner indicated by the rectangle 1063 to cause the printer unit to displace a distance in increments equal to the distance assembled by steps 1054 or 1056 but in this case, a direction bit is appended to the displacement information to cause escapement to occur towards the right.

Once escapement has been implemented in the manner indicated by the rectangles 1061 or 1063, the daisy wheel print element carriage located at the printer unit is properly positioned for the printing of the next character. Therefore, as indicated by the arrows 1064 and 1065, the program next proceeds to the testing step indicated by the diamond 1066. The test indicated by the diamond 1066 acts to test whether a print auto flag has been set in register location GA-3 and hence whether or not escapement and character printing is occurring according to a high speed print routine further described in association with FIG. 24 or whether normal escapement and character printing is occurring. Although the high speed print routine will be described hereinafter in detail, at this juncture of the disclosure it is sufficient to recognize that in the high speed print routine, escapement and character printing information is loaded in a printer stack and information is forwarded to the printer as fast as the same may be accepted while in normal print routines escapement and character information is effectively forwarded to the printer unit on an individualized basis. Accordingly, if the print auto flag test indicated by the diamond 1066 is affirmative, as indicated by the arrow 1067 annotated YES, the assembled escapement command as defined by the steps indicated by the rectangles 1061 and 1063 is loaded within the printer stack in the manner indicated by the rectangle 1068. The printer stack, it will be recalled is established within RAM locations 2C6 - 2EF and when loaded, escapement information will generally be interleaved with print information in the form of twelve bit commands ready to be issued to the printer unit in two passes. Upon completion of the program step indicated by the rectangle 1068, the program proceeds in the manner indicated by the arrow 1069 to set up printer data within register locations G1 and G0 in the manner indicated by the rectangle 1070. This involves, as will be apparent to those of ordinary skill in the art, setting up the four high order bits of the print information in register location G1 and the eight low order bits in register location G0; both of said register locations being general purpose locations. Furthermore, it should be additionally noted, that the setting up of the printer data in register locations G1 and G0 in the manner indicated by the rectangle 1070 additionally involves a manipulation of the width information in each twelve bit character in similar manner to the manipulation performed in association with rectangle 1056. Thus, it was seen in conjunction with rectangle 1056 that one half of the width information associated with the character to be printed was added to one half the width of the character previously printed to obtain proper positioning information for the carriage so that the new character could be printed at the location defined. Similarly, in setting up printer data in conjunction with the program step indicated by the rectangle 1070, the three bits of character width information read from the printer data ROMs are modified for purposes of ribbon displacement. Thus, as the ribbon at the printer unit should be displaced an amount equal to one half that associated with the previous character plus one half the amount associated with new character information, so that entirely new ribbon is available for printing, although the same may be modified for conservation purposes, the character width information assembled within register locations G1 and G2 is changed to reflect a displacement corresponding to one half the width of the previously printed character and one half the width of the character to be printed.

If the test indicated by the diamond 1066 is negative, as indicated by the arrow 1071 annotated NO, the program issues a command to the printer unit, in the manner indicated by the rectangle 1072, to displace the carrier and cause the ribbon to be raised to an appropriate print position just prior to printing. This is done, as it will be recalled, that any time printer activity has terminated for one half second, the ribbon is placed in a down position so that the operator's view of the print position is not obscured. Therefore, prior to the actual printing of character information A Raise The Ribbon to A Print Position Command is forwarded to the printer unit to ensure that it is in an up or print position. After the command indicated by the rectangle 1072 has been issued, this branch of the program also proceeds in the manner indicated by the arrow 1073 to the program steps associated with rectangle 1070 so that printer data information is set up in register locations G1 and G0 in the manner described above so that the same may be forwarded to the printer unit or, under appropriate circumstances to the printer stack.

After twelve bits of print information have been assembled in register locations G1 and G0 in the manner indicated by the rectangle 1070, the print auto flag is tested in the manner indicated by the diamond 1074 so it may again be ascertained whether or not a high speed print operation is in progress and hence whether or not the assembled printer data should be forwarded to the printer unit or alternatively must be loaded within the printer stack. If the test indicated by the diamond 1074 is negative, as indicated by the arrow 1075 annotated NO, the assembled printer data may be forwarded to the printer unit as soon as the same is available to process new data in the asynchronous manner in which processing is achieved thereat. However, prior to actually forwarding, various status conditions must be monitored prior to placing twelve bits of printer information on the common data bus 19 in two passes. More particularly, as indicated by the rectangle 1076, status conditions associated with tape motion and keyboard entries are tested on the common status bus to accommodate any data entry condition about to occur. Thereafter, as indicated by the arrow 1077 and the rectangle 1078, the contents of register location G1 associated with the high order bits are placed on the data lines for loading into the printer interface while the contents of register location G0 is loaded into M to place the same in readiness for forwarding to the printer interface in a second pass. Thereafter, as indicated by the arrow 1079 and the diamond 1080, the character busy status condition associated with the printer unit is tested on the common status bus to ascertain whether or not the printer is in a condition to receive print informaton. If the character busy status indication is indicative that the printer unit is still processing previously forwarded data, as indicated by the arrow 1081 annotated YES, the monitoring function associated with rectangles 1076 and 1078 is reentered and continued until the printer unit clears and is in a ready condition to receive and process new print information. When this occurs, as indicated by the arrow 1082 annotated NO, the low order information is forwarded to the printer interface and thereafter, as indicated by the rectangle 1083, a character strobe is forwarded to the printer unit to cause processing of the twelve (12) bit print information which has been loaded at the printer interface. Thereafter, as indicated by the arrow 1084, the weight of the character which has just been processed and now resides in register location G7 is placed into the deferred escapement register, i.e., the lower half of register location H9 to load the same for processing of the next character. In addition, the deferred escapement bit is placed in a ONE (1) condition to effectively clear the flag pursuant to the initiation of a new timing operation. Thereafter, in the manner indicated by the arrow 1086 and the oval 1087, a return to the idle routine is initiated.

If the print auto flag test indicated by the diamond 1074 is affirmative, as indicated by the arrow 1088 annotated YES, a high speed print routine is in progress and hence loading of print information in the printer may not be initiated. Therefore, as indicated by the rectangle 1089, the assembled print information is loaded into the printer stack within the RAM. Thereafter, as indicated by the arrow 1090, the deferred escapement register is loaded and the deferred escapement bit is cleared in the manner indicated by the rectangle 1085 whereupon a return to the idle routine indicated by the oval 1087 may commence.

PLAY, SKIP AND DUPLICATE FUNCTIONS

Referring now to FIG. 18, there is shown a flow chart illustrating the program sequence of operation for play, skip and duplicate modes of operation. The flow chart illustrated in FIG. 18 is entered, as indicated by the oval 1100, if the system has been set up for an automatic mode of operation from an active record media and an action key has been depressed unless the system has been established in a justify mode of operation or a stop entry, exclusive of a margin control single cycle entry is present.

Upon an entry of the play/skip/duplicate routine illustrated in FIG. 18, the program acts, as indicated by the arrow 1101 to initially test whether or not this routine has been entered, as indicated by the diamond 1102, pursuant to a single cycle mode of operation in margin control or has been normally entered in response to the depression of an action key initiating playback, skipping or duplication from an active media. A margin control single cycle bit is set in general purpose register location G5-1 under conditions where a margin control mode of operation has been established and during playback, the margin zone is entered and the look ahead processing of the instant invention, as will be further described in conjunction with FIG. 21, has cycled through the characters to be printed within the margin zone and has not found a character for which a carriage return may be initiated. Under these conditions, the margin control single cycle bit is set at the beginning of the hot or margin control zone and the operator is permitted to play out one character at a time by depression of the character/stop key in order to achieve an appropriate point at which to enter a hyphen and hence cause the automatic return of the carrier within the margin zone established. Accordingly, if the test of the margin control single cycle bit maintained in general purpose register location G5-1 is affirmative, as indicated by the arrow 1103 annotated YES, normal proessing is not occurring and hence the program immediately proceeds to processing under the PSD loop indicated by the dashed rectangle 1104 which, under these circumstances, will cause processing to occur on a per character basis.

If, however, the margin control single cycle bit tested in the step indicated by the diamond 1102 is negative, as indicated by the arrow 1105, annotated NO, normal processing under the play, skip or duplicate conditions imposed is to occur from the active media and the read only buffer which is being loaded therefrom. Therefore, as indicated by the rectangle 1106, the next character to be processed is fetched from the read only buffer and loaded into the main register M, analyzed and if appropriate, inserted into general register location G7 for holding purposes during further processing. Furthermore, as will be apparent, should the read only buffer be empty, the processing step indicated by the rectangle 1106 would include the fetching of the next line of data from the active record media followed by the insertion of the first character thereof into register location G7. In the fetch operation indicated by the rectangle 1106, the line is searched and any spaces or tabs which occur before a centering code or a carriage return are skipped to ensure appropriate formatting. Furthermore, when the initial character fetched and inserted in register location G7 is of a kind with which a second character is normally associated, the second character is also fetched and subsequent to loading in the main register M is stored in register location G4 for holding purposes during processing. Characters of this type might typically include a search code which is followed by a block number or the like and hence is rendered meaningless without the text secton identifier therefor available to the processor. Upon completion of the fetch operation indicated by the rectangle 1106, the program proceeds, as indicated by the arrow 1107 to processing within the PSD loop indicated by the dashed rectangle 1104 per se. The PSD processing loop indicated by the dashed rectangle 1104 is shown in detail in the right hand portion of FIG. 18 where the detailed processing steps thereof are set forth within an enlarged block also annotated 1104. In essence, processing within the PSD loop involves character analysis through a fanning out routine similar to that explained for the keyboard analysis and causes appropriate processing to occur for the certain characters which have been analyzed therein.

More particularly, turning now to the enlarged dashed block 1104, in the right hand portion of FIG. 18, the detailed processing steps associated with the PSD loop will be described. When the PSD loop is entered, as indicated by the arrow 1107, general purpose register location G8-5 is initially tested, as indicated by the diamond 1108 to ascertain whether or not the margin control flag maintained therein has been set upon the establishment of a margin control mode of operation. If the testing of this flag condition, as indicated by the diamond 1108 is negative, as indicated by the arrow 1109 annotated NO, the program immediately proceeds to junction point C, from which normal processing in response to the depression of an action key may proceed. Thus, as indicated by the outgoing arrow 1110 from junction point C, and the hexagon 1111, the program initially proceeds to evaluate the edit and control stop conditions associated with the action key depressed and sets a stop bit if the same is applicable. Thus, if a word key were depressed, this condition would be indicated by a flag set in register location G8-0 and the stop condition associated therewith would be a space code which would cause appropriate termination of automatic processing in response to the depression of the word action keys. Similarly, appropriate stop conditions for the remaining action keys will be apparent from the disclosure set forth above.

After the edit control stop condition has been evaluated and any appropriate stop bit set, the program, as indicated by the arrow 1112, next proceeds to test, as indicated by the diamond 1113, whether or not the mode causing entry into the play/skip/dup routine illustrated in FIG. 18 was the skip key. This test, as indicated by the diamond 1113, is performed by testing the condition of the skip mode flag established in general purpose register location G9-1. If the skip mode has been set as indicated by the arrow 1114, the dump bit is set in the manner indicated by the rectangle 1115 provided a revise mode of operation is established and if processing in an auto mode is occurring and the character in G7 is a stop (non-transferrable), the stop bit is set. The dump and stop bits are set within general purpose register locations GF5 and 4, respectively, and it will be appreciated by those of ordinary skill in the art that the dump bit is set in a revise mode to indicate to the microprocessor that re-recording of the record media with the contents of the read/write buffer must occur. Thus, while in a normal skip mode of operation, the active media which is being read is not normally recorded, the setting of the dump bit is indicative that a modification thereof has occurred and hence re-recording of this line on the media must occur upon the completion of the loading of the read/write buffer. Similarly, the stop bit is set so that a non-transferrable stop recorded on a media being read in the skip mode is honored. Upon completion of the program steps indicated by the rectangle 1115, as indicated by arrows 1116 and 1117, normal processing within the left hand portion of the play/-skip/dup routine illustrated in FIG. 18 is returned to at a location subsequent to that of the dashed block 1104 as indicated by the commonly annotated arrow 1117.

If the skip mode has not been established, the test indicated by the diamond 1113 will be negative as indicated by the arrow 1118 annotated NO. Under these conditions, as indicated by the diamond 1119, the program tests to ascertain whether or not the dup mode has been established. This test is implemented by a testing of the status of the dup mode flag established in general purpose register location G9-0. If the dup mode has not been set, as indicated by the arrow 1120 annotated NO, the presence of a play mode is confirmed. Therefore, under these conditions, the program acts, as indicated by the hexagon 1121 to execute the function of the character being processed, as presently loaded in register location G7. The process step indicated by the hexagon 1121 will generally involve causing the printer to print the character loaded in location G7 assumming of course a printable character is present therein. Thus, the program steps implicit in the step indicated by the hexagon 1121 are highly similar to the keyboard analysis and printer program sequences of operation set forth above, however, additional functions will be here included due to the possible presence of encoded function characters associated with switching record media, switching and searching the record media, skip codes, first line, first line find, and the like.

Conversely, if the test indicated by the diamond 1119 is affirmative, as indicated by the arrow 1122 annotated YES, the duplicate mode of operation is confirmed and hence, no printer execution or multiple transport switching function may be implemented, but instead the mere duplication of character information recorded on one record media to the other is required. Accordingly, for these conditions, the main path of the program is rejoined by the arrow 1122 at the output side of the hexagon 1121 so that regardless of whether or not a printer execution of transport function execution was required, the program may now proceed to an implementation of the recording requirement associated with the character loaded in register location G7 under conditions where either a dup or play mode of operation has been confirmed. Therefore, as indicated by the arrow 1123, the program next proceeds to a recording of the character loaded in register location G7 in the manner indicated by the hexagon 1124. The recording step denoted by the hexagon 1124 here takes the form of an analysis and execution routine wherein a recordable character is identified through a fanning action similar to that employed for keyboard analysis and execution and assuming a recordable character is identified, this character is loaded into the read/write buffer for subsequent recording on the record media upon the completion of an assembly of a line of information. Characters which would not qualify as recordable characters would here take the form of characters which initiate functions of the system such as transport switching, searching, switch and search, first line find or first line establishing characters. Upon implementation of the recording step indicated by the rectangle 1124, the program proceeds as indicated by the arrow 1125 to the testing step indicated by the diamond 1126. As indicated by the note, a stack is established in register locations H4 – H7 for use as temporary storage of insertions or modifications of characters used in response to margin control modes of operation. Therefore, prior to exiting from the PSD loop, the status of this stack is tested to ascertain whether or not the same is empty. If the stack is empty as indicated by the arrow 1117, exit from the PSD loop occurs and a return to the left hand portion of the flow chart depicted in FIG. 18 occurs.

However, if the stack is not empty, as indicated by the arrow 1127 annotated NO, the stack established in register locations H4 – H7 was loaded due to the functions initiated under the margin control mode of operation and hence must be emptied. Accordingly, under these conditions, as indicated by the rectangle 1128, the character at the top of the stack is loaded into register location G7 and the stack is pushed up through one character position. Thereafter, as indicated by the arrow 1129, the junction point C for this portion of the PSD loop is re-entered whereupon that character may be processed in the manner indicated by the hexagons 1111, 1121 and 1124 as well as diamonds 1113, 1118 and 1126 until the stack is emptied and the PSD loop is exited from. While the foregoing discussion of the PSD loop enclosed within the dashed block 1104 proceeded on the basis that junction point C was entered in response to a negative finding from the test indicated by the diamond 1108, junction point C may be entered if other conditions obtain. For instance, if the test anent the margin control mode, as indicated by the diamond 1108 is affirmative, as indicated by the arrow 1130 annotated YES the program next proceeds to test whether or not the centering bit has been set in the manner indicated by the diamond 1131. The test indicated by the diamond 1131 acts to effectively test the condition of the centering bit flag established in general purpose register location G6-6 which is set whenever centering under program control is to occur. If the test indicated by the diamond 1131 is affirmative, as indicated by the arrow 1132 annotated YES, it is indicative that the line of information presently being processed is to be centered and hence even though the margin control mode of operation was established in the manner indicated by the testing in the preceding step of the program, no margin control mode modification should here occur since centering is to take place. Thus, when the centering bit is set as indicated by the arrow 1132, the path of arrow 1109 is joined to immediately shift processing to junction point C whereupon actual processing may be implemented in the manner aforesaid.

If the centering bit has not been set, as indicated by the arrow 1133 annotated NO, the program next tests in the manner indicated by the diamond 1134 whether or not the play mode has been established. This condition is ascertained through testing the play flag established in general purpose register location G9-3 therefor. If the test conducted indicates a negative result as shown by the arrow 1135 annotated NO, the automatic writing system is established in either a skip or dup mode of operation and hence even though the margin control mode may have been set for the bit being processed, no margin control mode modifications are required. Therefore, as indicated by the arrow 1135, junction point C may be immediately entered for processing through to the end of the PSD loop. If however, the test indicated by the diamond 1134 is affirmative, as indicated by the arrow 1136 annotated YES, the margin control mode of operation is established and play modes of operation are being conducted. Therefore, as indicated by the hexagon 1137 analysis and any necessary modification to the character in G7 must occur under the rules for margin control operation established. Although the analysis routines associated with the hexagon 1137 will be described in detail in connection with FIG. 21, it should be appreciated that in essence, the program steps associated with the hexagon 1137 act to test the character loaded in G7 in light of the print position of the printer unit and to modify the character if necessary, in accordance with the rules for the position at which printing is currently occurring. Thus, for instance, if a carriage return character were loaded in G7 and the print position was to the left of the margin zone, a space code would be substituted therefor and inserted into the temporary stack established in register locations H4 – H7. Similarly, should a space code occur at a print position within the margin zone, a carriage return character would be substituted therefor and placed in the stack; however, under most conditions, printable character information would be processed in the same manner that processing would occur were the automatic writing system established in an auto mode except under such conditions where operator intervention in the margin zone were required. Hence for printable characters, normally no modification would occur. Thus, as indicated by the dashed arrow 1138, when no modification of character information is required, a return to junction point C for normal processing through the loop occurs. However, when a character is modified and inserted through the stack, the main body of the PSD loop, as indicated by the arrows 1139 and 1140 is rejoined at the diamond 1126 so processing of this character information from the stack may occur. Thus, this takes place, in the same manner as if the auto key had been depressed and processing within the PSD loop is occurring. Furthermore, an additional alternative may occur as indicated by the arrow 1141 when the analysis and modification step denoted by hexagon 1137 results in a skip operation. This may occur, it will be recalled, for instance, when a non-mandatory hyphen appears to the left of the margin zone and hence is skipped while processing is automatically continued. Thus, under these conditions, re-entry underskip mode conditions directly to the exit point indicated by the arrow 1117 occurs. A similar branching routine to an exit in the manner indicated by the dashed block 1141 is produced when a stop bit is set pursuant to a single cycle mode of operation.

When the PSD loop is exited from in the manner indicated by the arrow 1117, a return to the basic flow chart illustrated in the left hand portion of FIG. 18 occurs. Since the PSD loop indicated by the dashed block 1104 accounts for most actual processing operations for character information, the remaining portions of the flow chart illustrated in FIG. 18 are related to a setting of the Stop Flag if appropriate, ascertaining whether or not the flag is set and performing various clean up routines before the stop flag is executed and a return to the idle loop is initiated. Thus, as indicated by the rectangle 1143, the stop bit is set if the line counter is active and the line count is exceeded. Thereafter, as indicated by the arrow 1144 and the diamond 1145, the stop bit maintained in general purpose register location GF-4 is tested to ascertain whether or not it is set. If the flag has not been set as indicated by the arrow 1146 annotated NO, a return in the loop to fetch the next character in the manner indicated by the rectangle 1106 is initiated for processing of the next character of information. However, if the stop bit has been set as indicated by the arrow 1147 annotated YES, various clean up operations prior to actual stopping are initiated. Thus, as indicated by the rectangle 1148, any pending underscore codes are executed so that complete processing associated with a given character is carried out. Additionally, as indicated by the oval 1149, an entry point is here provided so that exiting from a pending stop code to this portion of the play/skip or dup routine may occur. Thereafter, as indicated by the diamond 1150, the play mode flag established in G9-3 is tested to ascertain whether processing is occurring in a play mode. If an affirmative result occurs, as indicated by the arrow 1151, exiting to the idle 3 position of the idle routine illustrated in FIG. 16 occurs. However, if the results of the test indicated by the diamond 1150 is negative, as indicated by the arrow 1152, a skip or dup mode operation was initiated and has been completed. Therefore, as indicated by the rectangle 1153, a buzzer is initiated for approximately 256ms to advise the operator that the dup or skip mode initiated has been completed. Thereafter, as indicated by the diamond 1154, the skip flag maintained in the general purpose registers G9-1 is tested to establish whether the skip or dup mode of operation was actually in progress. If the result is negative, as indicated by the arrow 1155 annotated NO, immediate exit to the portion of the idle loop indicated by the oval 1156 occurs, since processing took place according to a dup mode of operation. However, if the skip mode was established as indicated by the arrow 1157 annotated YES, a timer, as indicated by the rectangle 1158 is set for a one second interval and thereafter the idle loop is returned to in the manner indicated by the oval 1159. Thus, in this manner, processing will occur whenever an action key is struck when a play, skip or dup mode of operation has been established.

EDIT CONTROL STOP CONDITIONS

Referring now to FIG. 19, there is shown a flow chart illustrating a programmed sequence of events which occur for the edit control stop conditions associated with play, skip and duplicate mode operations. The program represented in FIG. 19 is entered any time the play, skip or duplicate flags are set and an action key at the keyboard depressed and specifically, this routine is entered from the play/skip/dup program illustrated in FIG. 18 at a point within the PSD loop indicated by the hexagon 1111. Accordingly it will be appreciated by those of ordinary skill in the art that the entry point to the edit control stop condition flow chart illustrated in FIG. 19 is entered at a point in the PSD loop shown in FIG. 18 corresponding to the location of hexagon 1111 and any time a return to the main program from the edit control stop condition flow chart illustrated in FIG. 19 is indicated, pick up in the main routine will occur at the output side of the hexagon 1111 shown within the PSD loop at a location indicated by the arrow 1112.

The edit control stop condition flow chart illustrated in FIG. 19 may be entered at a location indicated by the oval flag 1160. At the outset it should be noted that the edit control stop condition program is active each time a character is being processed and relies upon three bits set in the general purpose register as an aid in detecting stop conditions as a function of what has previously occurred. These three bits in the general purpose registers are flags set in locations G6-1, G6-2 and G6-3 which act as may be seen upon a review of the contents of the G register set forth in Appendix G to define, respectively, that a stop condition exists and a stop should be executed before the printing of the next character, at least one printing character has been processed and a potential paragraph stop exists in that the last character processed was either a carriage return or a special carriage return character. Furthermore, while the edit control stop condition chart illustrated in FIG. 19 acts to set the stop bit flag located, as aforesaid, in general purpose register location GF-4, actual stopping in response thereto is implemented within the idle routine.

The edit control stop condition program whose flow chart is illustrated in FIG. 19 is responsive to implement stop conditions associated with the word, line or paragraph action keys only, it being appreciated that stop conditions associated with the character/stop action key and the automatic action key are otherwise executed. Accordingly, when the program is entered at the location indicated by the oval 1160, it initially proceeds in the manner indicated by the arrow 1161 to perform the test for the presence of the word, line or paragraph mode indicated by the diamond 1162. This test is performed as will be appreciated by those of ordinary skill in the art through a testing of the flags for the various action keys set in general register locations $G8_3$ - $G8_0$ as may be seen in Appendix G. If the test is negative, as indicated by the arrow 1163 annotated NO, immediate return to the main program at the point indicated by the arrow 1112 within the PSD loop shown in FIG. 18 occurs as indicated by the return flag 1164.

If the results of the test indicated by the diamond 1162 are affirmative, as indicated by the arrow 1163 annotated YES, it is indicative that operation within the play/skip or dup mode is occurring and more particularly, that one of the word, line or paragraph action keys has been depressed. Therefore, the program proceeds to evaluate the nature of the character presently being processed and when certain possible stop condition characters have been detected, further acts to evaluate that character as a function of which of the three possible action keys have been depressed and events within the processing cycle which have previously occurred as indicated by bits 1 - 3 within general purpose register location G6.

The first test of the character being processed as indicated by the diamond 1166 is to test whether or not this character corresponds to a space code of any type and it will be appreciated by those of ordinary skill in the art that testing of character information to ascertain their precise nature is achieved through direct comparisons with constants read from the read only memory as well as through the fanning techniques disclosed above. If no space is present, as indicated by the arrow 1167 annotated NO, the general or most prevalent definition character for a word termination character is omitted and the program next tests as indicated by the diamond 1168 to ascertain whether or not a printing character is being processed. If the results of the test indicated by the diamond 1168 are affirmative, as indicated by the arrow 1169 annotated YES, the fact that the program is presently processing a printable character is confirmed. Therefore, as indicated by the rectangle 1170, the first printing character flag maintained in register location G6-2 is set so that if a succeeding stop condition is processed, the microprocessor will be advised that stopping is appropriate as previous character information was processed under the influence of the action key guiding the instant operation. Once a printing character has been identified and the first print character flag set, the program, as indicated by the arrow 1171, next proceeds to test whether or not the EC stop bit is set in the manner indicated by the diamond 1172. The EC stop bit flag is maintained in register location G6-1 and is employed to advise the microprocessor that stop conditions associated with a depressed action key have been met. However, the actual setting of the stop bit located in register location GF-4 and the attendant stopping of processing is not to occur until processing of a printable character has at least been initiated so that should, for instance, a word key be depressed at the end of a sentence, stopping does not occur on the first space code inserted after a period, but rather after the second space code so that the initiation of a new action key, processing starts with a printable character. This mode of operation is preferred so that if subsequent processing is initiated in response to the depression of a character/-stop key, an actual character is printed as distinguished from the execution of a secondary space code, carriage return, tab or the like.

If the results of the testing of the EC stop flag indicated by the diamond 1172 are negative, as indicated by the arrow 1173 annotated NO, the potential paragraph stop flag maintained in register location G6-3 is reset in the manner indicated by the rectangle 1174. This is done because, as will be appreciated, a paragraph will be defined by a pair of carriage returns, carriage return and a tab or similar other paired stop conditions and hence the presence of an intervening printing character such as that detected by the diamond 1168 must act to negate the potential condition initiated by this flag. Thereafter, the play/skip/dup routine is re-entered at the location of arrow 1112 in the manner indicated by the return flag 1164 and the arrow 1175.

If the test indicated by the diamond 1172 is affirmative, as indicated by the arrow 1176 annotated YES, it will be appreciated that the stop condition met flag maintained in register location G6-1 has been set and accordingly, the program is merely looking for a printable character so that multiple space codes and the like which appear in succession are processed as a part of the action key condition imposed. Therefore, as the presence of a printable character has been confirmed, the program proceeds in the manner indicated by the arrows 1176 and 1177 to an actual setting of the stop bit flag maintained in register location GF-4 in the manner indicated by the rectangle 1178. This means, upon a return to the main routine, a clean up procedure will be executed and the stop bit conditions executed. Thereafter, as indicated by the arrow 1179 and the rectangle 1180, the read only buffer is stepped back one position so that the printing character which has just been identified is effectively placed at the top of the queue so that it is the first character to be processed after the stop condition is executed and a succeeding action key is depressed. This is done so that playback or the like in response to a new depression of an action key is initiated with the playback of a character which was just identified but not fully processed. Thereafter, as indicated by the arrow 1181 and the diamond 1182, the last character in processing buffer G7 is compared to ascertain whether or not it is the same character queued to the top of the read only buffer stack. If the results of the comparison are affirmative as indicated by the arrow 1183 annotated YES, it is indicative that the character in register location G7, the working or holding location, is the printing character just identified and hence its not-to be processed. Thereafter, as indicated by the arrow 1183 and the oval flag 1184, the main routine may be returned to at a point within the PSD loop therein annotated 1184 for exiting from the loop and clean up procedures associated with the execution of the stop bit. However, if as indicated by the arrow 1185 annotated NO, the last character in register location G7 does not compare to the character at the top of the read only buffer. Further processing within the PSD loop illustrated in FIG. 18 is necessary and hence re-entry occurs at the location indicated by arrow 1112 so that the execution of the character in G7 may be accomplished. This, as will be apparent, would normally involve a character which was converted as a result of a margin control functions or the like.

The portion of FIG. 19 which has just been described assumed that the character processed was a printing character and hence set forth the program sequence of operations which would occur in response to a detection of a printing character under conditions where either the EC stop condition bit maintained in register location G6-1 was in a set or unset condition. Thus it will be seen that when a printing character is detected, the printing character flag maintained in register location G6-2 is set and then the EC stop condition flag is tested. If the stop flag was set, the printing character is placed to the top of the queue in the read only buffer and thereafter the stop condition is effectively executed. However, if the EC stop condition flag was not set, the paragraph stop bit is reset and thereafter processing of the character occurs in the normal manner associated with the PSD loop. Returning now to the test for a space code imposed by diamond 1166 or the test for a printing character associated with diamond 1168, it will be seen that if a space code is detected, as indicated by the arrow 1186 or if no printing character is present as indicated by the arrow 1187, the program next tests to ascertain whether the word action key was depressed in the manner indicated by the diamond 1188. It should also be noted, as indicated by the oval flag 1189, that this point in the program illustrated in FIG. 19, is entered directly for play/skip or dup mode operations where the character being processed is not a printing character. In any event, it will be appreciated that if a space code is present or no space code is present, but a printing character is not present, possible conditions for stopping under a word mode of operation are present. Therefore, the word action flag maintained in register location G8-0 is tested in the manner indicated by the diamond 1188 to actually ascertain whether or not the same is present. If the word key has been depressed, as indicated by the arrow 1190, annotated YES, the character code is next tested, as indicated by the diamond 1191 to ascertain whether or not it is a tab character. If no tab character is present, it has been ascertained that the word key has been depressed, and that either a space code or a non-printing character which is not a tab is presently being processed. Therefore, so long as a previous character has been printed, conditions are appropriate for a setting of the stop condition met bit maintained in register location G6-1. Thus, as indicated by the arrow 1192 annotated NO, and the diamond 1193, the condition of the previous character printed flag maintained in register location G6-2 is tested to ascertain whether the stop condition detected follows the printing of character information. If the results are negative as indicated by the arrow 1194 annotated NO, a return to insertion point 1112 within the PSD loop is initiated as indicated by the oval flag 1164 since stopping subsequent to the depression of the word action key must occur after character information has been printed. However, if the results of the test indicated by the arrow 1193 are affirmative, as indicated by the arrow 1195 annotated YES, the EC stop bit or stop conditions met flag maintained in register location G6-1 is set in the manner indicated by the rectangle 1196 and thereafter, as indicated by the arrow 1197 and the flag 1164, a return to the PSD loop in FIG. 18 will be initiated. It should be noted that although the stop condition met flag is set in the manner indicated by the rectangle 1196, the stop bit maintained in register location GF-4 is not set as this will not occur until a printing character is detected and processing occurs through the steps associated with the diamonds 1168, 1172 and 1182 as well as the rectangles 1170, 1178 and 1180.

If the test for a tab condition indicated by the diamond 1191 was affirmative, as indicated by the arrow 1198, annotated YES, the condition of the tab counter is tested to ascertain whether or not the same is in an opened condition in the manner indicated by the diamond 1199. The condition of the tab counter is maintained as a flag location in general purpose register location G6-0 and it will be recalled that depending upon the state of the tab counter, the treatment of tabs within the instant invention will vary due to the tab control mode of operation employed herein. If the results of the test indicated by the diamond 1199 are negative as indicated by the arrow 1200, the tab character detected under closed counter conditions is treated in the manner indicated by diamond 1193 and/or the rectangle 1196 so that effectively if it follows printing information it is relied upon for a setting of the EC stop bit maintained in register location G6-1 but is otherwise not treated as a stop condition. Similarly, if the results of the testing indicated by the diamond 1199 are affirmative as indicated by the arrow 1201 annotated YES, the condition of the stop condition met flag maintained register location G6-1 is again tested, as indicated by the diamond 1202. If the EC stop bit was not set as indicated by the arrow 1203 and the tab counter is opened and hence this tab must be honored, the EC stop bit is set in the manner indicated by the rectangle 1196 and the PSD loop is returned to regardless of whether or not a previous character was printed. However, if the EC stop bit was already set, as indicated by the arrow 1177 annotated YES, this tab is to be directly honored and hence the stop condition flag maintained in register location GF-4 is set in the manner indicated by the rectangle 1178 and thereafter processing occurs in the manner indicated by the rectangle 1180 and the diamond 1182 whereupon return to the various portions of the PSD loop indicated by the flags 1164 and 1184 is initiated.

Returning now to the test indicated by the diamond 1188 it will be seen that if the word action flag was not set, in the manner indicated by the arrow 1205 annotated a NO, this portion of the program was entered in response to either the detection of a space code or a non-space code which was not a printing character or entry from a non-print routine. Therfore, the remaining action keys for which this program is acting must be tested for. Accordingly, as indicated by the arrow 1205 and the diamond 1206, the condition of the line action flag maintained in register location G8-1 is next tested for to ascertain whether the stop conditions imposed thereby are appropriate for execution within the instant program. If the line action flag has been set as indicated by the arrow 1207 annotated YES, the character is next tested to ascertain whether or not it takes the form of any of the carriage return characters which may be inserted in the manner indicated by the diamond 1208. If the results of this test are negative, as indicated by the arrow 1209 annotated NO, a return to the PSD loop in the manner indicated by the oval 1164 is initiated as appropriate stop conditions for the action mode have not been established. However, if one of the various forms of carriage return characters are present in the manner indicated by the arrow 1210 annotated YES, the EC stop bit is set in the manner indicated by the rectangle 1196 and thereafter the PSD loop is returned to to await the presence of a printing character prior to the actual setting of the stop flag located in GF-4 and the execution of the stop condition.

If the test for the line mode condition indicated by the diamond 1206 is negative as indicated by the arrow 1211 annotated NO, the presence of a paragraph is confirmed and hence processing occurs with a view to implementing the stop conditions therefor. Accordingly, as indicated by the arrow 1211 and the diamond 1212, under these conditions, the program initially acts to test the character being processed to ascertain whether or not a precedented tab is currently being processed. If the results of the test indicated by the diamond 1212 are affirmative, as indicated by the arrow 1213 annotated YES, the program then acts to test whether or not the potential paragraph stop flag maintained in G register G6-3 has been set. Since it will be recalled that a paragraph is defined by a pair of carriage returns, a carriage return and a prec- tab or the like and that the tab information will be the second character of the definition code, if the results indicated by the test initiated by the diamond 1214 are negative, as indicated by the arrow 1215 annotated NO, an immediate return to the PSD loop at a location defined by the oval flag 1164 is mandated and occurs. However, if the results of the test indicated by the diamond 1214 are affirmative, as indicated by the arrow 1216 annotated YES, the precedented tab identified by the test conducted by the diamond 1212 defines a second appropriate character which fully defines the stop condition set for a paragraph action key. Therefore, as indicated by the arrow 1216, the program is rejoined at the input to rectangle 1178 whereupon the actual stop flag is set together with the attendant events associated with the rectangle 1180, and diamond 1182 prior to rejoining of the play/skip/dup program illustrated in FIG. 18.

If the results of the test indicated by the diamond 1212 are negative as indicated by the arror 1217 annotated NO, the program next tests the character being processed to ascertain whether or not the same constitutes a precedented carriage return in the manner indicated by the diamond 1218. If the results of this test are affirmative, as indicated by the arrow 1219 annotated YES, the EC stop bit maintained in register location G6-1 is set in the manner indicated by the rectangle 1220 and thereafter the main program is returned to within the PSD loop as indicated by the arrow 1221 and the flag 1164 so that stopping will occur at the next printing character.

When the test indicated by the diamond 1218 is negative as indicated by the arrow 1222 annotated NO, the program next tests for the presence of a carriage return or special carriage return character in the manner indicated by the diamond 1223. If the test conducted in a manner indicated by the diamond 1223 is affirmative as indicated by the arrow 1124 annotated YES, the condition of the potential paragraph stop bit maintained in register location G6-3 is again tested in the manner indicated by the diamond 1225. If the results of the test indicated by the diamond 1225 are affirmative, in the manner indicated by the arrow 1226 annotated YES, the EC stop bit is again set in the manner indicated by the rectangle 1220 and thereafter the PSD loop is returned to in the manner indicated by the oval flag 1164. It should be noted here that the difference in treatment between the results obtained in a detection for a precedented carriage return and a regular or special carriage return relate to the manner in which the precedented carriage return is treated in that the same may not be ignored and hence may be treated as directly defining the end of a paragraph. Conversely, if the test indicated by the diamond 1225 in negative, the detection of a carriage return or special carriage return character merely provides an initial indication that the first part of the 2 condition definition of the end of a paragraph is present. Therefore, as indicated by the arrow 1227 annotated NO and the rectangle 1228, the potential paragraph stop flag maintained in register location G6-3 is set and thereafter the PSD loop is returned to in the manner indicated by the arrow 1229 and the oval flag 1164.

If the test for a carriage return or special carriage return character indicated by the diamond 1223 is negative, in the manner indicated by the arrow 1230 annotated NO, no suitable character which conforms to the requirements of a second character required to define an end of a paragraph may be present. Therefore, as indicated by the rectangle 1231, the potential paragraph stop condition bit maintained in register location G6-3 is reset. Thereafter, as indicated by the arrow 1232 and the diamond 1233, the condition of the EC stop bit maintained in register location G6-1 is tested to ascertain whether the same has been set. If the results of this test are negative as indicated by the arrow 1234 annotated NO, the PSD loop is returned to in a manner indicated by the oval flag 1164. However, if the EC stop bit has been set, as indicated by the arrow 1235 annotated YES, the stop flag maintained in register location GF-4 is set in the manner indicated by the rectangle 1178 and thereafter processing continues in the manner indicated by the rectangle 1180 and the diamond 1182 to cause re-entry into the PSD loop. Thus, in this manner, edit and control stop conditions in response to the depression of one of the various action keys are evaluated in the manner defined by the flow chart set forth in FIG. 19 during processing within the play/skip/dup program set forth in FIG. 18.

WORD UNDERSCORE

Referring now to FIGS. 20A and 20B, there are shown flow charts illustrating program sequences of operation for word underscore operations wherein FIG. 20A depicts the processing functions which occur when a word underscore is entered at the keyboard while FIG. 20B illustrates processing functions which occur during playback. The word underscore routine illustrated in FIG. 20A is automatically entered at a location indicated by the flag 1235 whenever keyboard analysis indicates that a word underscore encoded function has been inserted. The word underscore encoded function is implemented by the operator, it will be recalled, at the end of the entry of a word to be underscored and acts to automatically back up the carriage at the printer to a position beneath the initial character of that word whereupon underscoring of the whole word entered takes place. Furthermore, it will be recalled that an operator may cause more than one adjacent word to be underlined through an entry of an expanded or precedented space in place of a normal space code. This occurs, because, while normal space codes may not be underlined, when entered as encoded or precedented spaces, the same are modified, under program control, to underlined space codes which are treated as any other character to be underlined. The word underscore routine illustrated in FIG. 20A is also entered at the flag location indicated by the oval 1235 whenever a continuous line underscore encoded function was entered and an index code attending the implementation of a carriage return function should next be executed. Thus, effectively, the word underscore record mode routine illustrated in FIG. 20A is operative both to implement the word underscore encoded function and the continuous line underscore encoded function even though the same is specially defined for only the word underscore encoded function. This convenient dual use of the program illustrated in FIG. 20A may be obtained because, as will be recalled, the continuous line underscore encoded function is entered prior to the entry of the line or portion of the line to be underscored. Upon entry of this encoded function, a flag is set in the general purpose register location GA-2 and thereafter, each space code entered at the keyboard is converted, under program control, to a precedented space code. Upon the entry of a carriage return character defining the end of the line of information, and prior to executing any indexing associated therewith, the program acts to check whether or not the line underscore flag maintained in register location GA-2 has been set. If the same is set, the word underscore program for a record mode operation, as illustrated in FIG. 20A, is entered. As all space codes in this line of information were converted, upon entry, to precedented space codes which may be underlined in the manner indicated below, the word underscore program illustrated in FIG. 20A will go back, in effect, to a point corresponding to the beginning of the first word entered after the continuous underscore encoded function and cause the delineation of all words from that point on to the end of the line using the word underscore routine illustrated in FIG. 20A. In this manner, both word underscore and continuous line underscore encoded functions are implemented using in effect, a single operating routine.

Referring now to FIG. 20A, it will be seen that the word underscore program whose simplified flow chart is illustrated therein, is entered at a location corresponding to the oval flag 1235 whenever a word underscore encoded function is entered from the keyboard or the same is called in association with an affirmative test of the continuous underscore flag prior to the implementation of an indexing operation associated with a carriage return character. The first step of the program as indicated by the rectangle 1236 is to move the carrier at the printer unit to the next standard print position so that effectively, the deferred escapment is executed. Thereafter, as indicated by the rectangle 1237, general purpose register locations G1 and G0 are cleared so that the same may be employed for use in accumulating the data width through which backspacing of the carriage at the printer unit to the position at which the underlining operation is to be initiated may be calculated. Thereafter, character information which has been printed and loaded in the RW buffer is reviewed until the beginning of the word or words at which an underscore operation is to be initiated has been located.

This is implemented, in the manner indicated by the rectangles 1238 - 1240 and the diamond 1241. More particularly, as indicated by the rectangle 1238, the last character is fetched from the read/write buffer and the buffer pointer is decremented so that effectively, the last character printed is loaded into the main register M and the pointer of the buffer is backed up through one character. Thereafter, as indicated by the diamond 1241, the character is tested to ascertain whether or not it is a non-underscored print character or a precedented space code so that the same may be underscored. If the results of this test are affirmative, as indicated by the arrow 1242, the width of the character when printed in the pitch selected is calculated in the manner indicated by the rectangle 1239 through an addressing of the printer data ROM and obtaining the three bits of information defining the width thereof in proportionally spaced print modes or reading with constants from the read only memory 80 should a twelve or ten pitch printing mode be selected. Once calculated, as indicated by the rectangle 1240, this width is added to the contents of the cleared register locations G1 and G0 and thereafter the next character in the read/write buffer 35 is fetched and the pointer is again decremented so that effectively, backing up of the data in the read/write buffer 35 is implemented through the loop defined by the rectangles 1238 - 1240 and the diamond 1241 and the width of each character therein is accumulated until the test indicated by the diamond 1241 locates a character which may not be underscored. Typically, the character located by the tests associated with the diamond 1241 for which underscoring may not be implemented will be a normal space code, tab or the like and hence will define the character position just prior to the word to be underscored.

At any rate, when the test indicated by the diamond 1241 locates a character for which no underlining may be achieved, as indicated by the arrow 1243 annotated NO, the read/write buffer pointer is incremented twice and the character which is thereafter pointed to is loaded into the main register M in the manner indicated by the rectangle 1244. This will cause the buffer pointer to point to the first character of the word for which underlining is to be initiated and cause this character to be loaded into the main register M. Thereafter, as indicated by the diamond 1245, the character is tested to ascertain whether it is equal to ZERO (0) or a hex 00 character which represents a NO operation character or a character which may not be underscored. Under these conditions, as indicated by the arrow 1246 annotated YES, the read/write buffer pointer is decremented, in the manner indicated by the rectangle 1247 and thereafter, the program returns to the idle loop in the manner indicated by the arrow 1248 since, under these conditions, no underscoring of data is required. However, should the test conducted by the diamond 249 be negative in the manner indicated by the arrow 1249 annotated NO, a modification of the data associated for the word to be underscored is initiated wherein, in effect, the most significant bit, i.e. $DB_7$, is changed from a ZERO (0) to a ONE (1) condition indicative of the underscored status thereof.

This is done, in the manner indicated by the diamond 1250 by initially testing to ascertain whether or not the character in M is a precedented space code. This test is appropriate because while normal space codes may not be underscored, precedented space codes can be underscored and the manner in which data manipulation herein occurs is such that precedented space codes are changed to a normal space code having their most significant bit in a ONE (1) condition to effectively cause an underscored space code character to be recorded. Thus, as indicated by the arrow 1251 annotated YES and the rectangle 1252, whenever the test indicated by the diamond 1250 is affirmative, the character code for a precedented space code is converted to that of a normal space code and thereafter, as indicated by the arrow 1253, the routine is returned to at the same location as if the test conducted in association with the diamond 1250 was negative as indicated by the arrow 1254. Thereafter, as we are dealing with a character code which may be underscored, the most significant bit of the character is converted to a ONE (1) to indicate the underscored nature thereof in the manner indicated by the rectangle 1255. Thereafter, the converted character is stored in the read/write buffer at the pointer location defined for the converted character so that a character having the most significant bit in a ONE (1) condition is effectively substituted for that which was previously present. Thereafter, as indicated by the rectangle 1257, the read/write pointer is incremented one position so that it points to the next character in sequence and that character is loaded into the main register M. Thereafter, as indicated by the diamond 1258, the character loaded in M is tested to ascertain whether or not it is an all ZERO (0) character to indicate that we have gone past the end of the word in the read/write buffer which is to be underlined. If the results indicated by the test associated with the diamond 1258 are negative, as indicated by the arrow 1259, this loop is returned to at a location associated with the arrow 1249 so that effectively the steps of character modification and buffer incrementing are continued until the buffer has been returned from a position corresponding to the beginning of the word to be underlined to a position corresponding to the last character in the word to be underlined and each character of the word or words to be underlined has been modified so that the most significant bit thereof, ie, data bit 7 has been changed from a ZERO (0) to a ONE (1) to thus indicate the delineated status thereof.

Once we have reached the end of data in the manner indicated by the arrow 1260 annotated YES, it will be apparent that we have gone through one character position in the read/write buffer past the end of the word to be delineated. Therefore, in the manner indicated by the rectangle 1261, the buffer pointer is decremented by one to bring us precisely to a location pointing to the last character in the word to be delineated. Thereafter, as indicated by the arrow 1262 and the rectangle 1263, the steps associated with calculating a proper displacement for backing up the carriage at the daisy wheel printer and then causing the same to be backed up so that an underscore operation may be initiated are implemented.

More particularly, as indicated by the rectangle 1263, the accumulated character displacements initially accumulated in register locations G1 and G0 are transferred to register locations H7 and G4 so that the same may be operated upon. Thereafter, as indicated by the rectangle 1264, the distance to the left edge or the beginning character point of the word to be underscored is calculated by taking the cumulated width of the character data as stored in register locations G1 and G0, adding one half a standard character width thereto and subtracting one half of the width of the underscore character so that a carriage position corresponding to that of the beginning point of the data is calculated. Once this has been done in the manner indicated by the rectangle 1264, the nature of the underscoring operation about to be implemented must be ascertained. More particularly, it must be determined whether or not a normal word is to be underscored or a particular set of conditions obtains for which additional compensation is required. For instance, if only a single character is to be underscored and that character has a width which is less than that associated with the underscore character, such as in the case of an "i" rather than starting underscoring at the left edge of the first character, it is more desireable to center the underscore character under the letter so that an equal border on each side of the narrow width character is obtained. Therefore, as indicated by the diamond 1265, the width of the underscore character is compared against the width of data to be underscored as previously accumulated and the results of this comparison is employed for the final positioning of the carriage prior to initiation of carriage displacement. Accordingly, if the results of the comparison indicated by the diamond 1265 are negative, as indicated by the arrow 1226 annotated NO, the data to be underscored is of a greater width than the underscore character per se and hence in the manner indicated by the rectangle 1267, deferred escapement is set equal to one half the underscore width so that when deferred escapement is executed, the carriage will move forward from the position obtained in the step indicated by the rectangle 1264 so that the left edge of the underscore character printed is flush with the left edge of the data to be underscored. Thereafter, the main routine is returned to in the manner indicated by the arrow 1268.

However, if the results of the test indicated by the diamond 1265 are affirmative, in the manner indicated by the arrow 1269 annotated YES, the situation is present wherein a character standing alone and having a width which is less than that of the underscore character is to be underlined. Under these conditions, as indicated by the rectangle 1270, the deferred escapement is set to equal one half of the data width so that when the same is executed, the carriage displacement achieved in the step indicated by the rectangle 1264 will be such to cause the printing of an underscored character to be centered beneath the character to be underscored and to exhibit an equal border on each side thereof. In addition, as indicated by the rectangle 1271, the distance through which the carriage is backed up is increased to accommodate the overlap mode of printing of the underscore. Thereafter, the main program is rejoined at the same location indicated by the arrow 1268 as indicated by the arrow 1272.

Upon the completion of the calculation steps indicated by the rectangles 1264, 1267, 1270 and 1271, whichever are appropriate, a command is issued to the printer unit to actually cause the carriage to back up through the calculated displacement so that the same is positioned at an appropriate location for the initiation of the actual underscore operation in the manner indicated by the rectangle 1273.

The remaining portion of the flow chart illustrated in FIG. 20A is directed to the manner in which underscoring in a forward direction is implemented under program control and hence, at this juncture, the underscoring operation associated with a playback mode of operation, as indicated by the oval flag 1274 and the arrow 1275, rejoin the main routine. The flow chart for the playback underscore routine is set forth in FIG. 20B and is described hereinafter. The initial step of the actual underscore operation, as indicated by the rectangle 1276, is to subtract the width of the underscore character from the accumulated width of character information which has been accumulated in register locations G1 and G0 and transferred into register locations H7 and G4 prior to further manipulation of this data. Once this has been done, the resulting value stored in register locations H7 and G4 are tested to ascertain whether or not they are negative in the manner indicated by the diamond 1277. If an affirmative result is obtained, as indicated by the arrow 1278 annotated YES, only a single underscore character need be printed as the results of the test indicated by the diamond 1277 confirm that when this character is printed whatever data has been accumulated in H7 and G4 will be fully underlined with the appropriate overlap. Therefore, when an affirmative result of the test conducted in the manner indicated by the diamond 1277 is affirmative, the underscore character is printed using maximum ribbon advance in the manner indicated by the rectangle 1279 and thereafter, the calling routine is returned to in the manner indicated by the arrow 1280.

When the test indicated by the diamond 1277 is negative, in the manner indicated by the arrow 1281 annotated NO, it is indicative that more data must be underscored than that which may be accommodated by a single stroke. Therefore, as indicated by the rectangle 1282, an underscored character is printed using maximum ribbon advance. Thereafter, as indicated by the rectangle 1283, a modified underscore carrier advance is subtracted from the register locations H7 and G4 to compensate in part for the length of data which was underscored in the step indicated by the rectangle 1282. The subtraction of a modified underscore carrier advance in the manner indicated by the rectangle 1283 is provided rather than a subtraction of the entire length of the underscore character per se so that underscore characters are overlapped to a certain degree to effect a highly uniform printing characteristic at the printer. More particularly, high speed underscoring, when implemnented at a printer which may be instructed to escape rather than having automatic escapement may be carried out with extreme rapidity and uniformity if an overlapping of the underscore strokes are employed to compensate for an uneveness in which the character impacts the ribbon and/or uneveness in wear or ink quality on the ribbon per se. Therefore, in accordance with the teachings of the instant invention, high speed underscoring pursuant to this program routine is achieved by only advancing the carrier through a subtraction carried out in accordance with the step indicated by the rectangle 1283 by an amount corresponding to one third the length of the underscored character so that adjacent underscoring strokes have an overlap equal to approximately two thirds of a character. While the precise amount of overlapping is a matter of choice, the same should be selected with a view to providing a highly uniform result at the printer unit. Thus, for exemplary values, in ten pitch, carrier advancement or the modified underscore carrier advance subtracted in the step indicated by the rectangle 1283 may correspond to four units as opposed to twelve; in twelve pitch, the modified advance may correspond to five units as opposed to ten yielding an overlap of one-half; while in proportional spaced modes of printing, a four unit value may be employed for the overlap.

Once the desired forward displacement of the printer is subtracted from the necessary total displacement recorded in register locations H7 and G4, in the mannner indicated by the rectangle 1283, the total remaining distance within register locations H7 and G4 minus an underscore displacement for an underscore character for a carrier advance is tested in the mannner indicated by the diamond 1284 to ascertain whether or not the value yielded thereby is negative. The test indicated by the diamond 1284 is conducted to ascertain whether or not the last stroke of a required underscoring operation is about to be initiated and if the same is about to be initiated whether or not the right hand portion of the underscore character printed will be flush to the right hand portion of the last character to be underscored. If the results of the test indicated by the diamond 1284 is negative, as indicated by the arrow 1285, additional underscoring must be completed and therefore, in the mannner indicated by the rectangle 1286, the carrier is merely displaced by a distance equal to the modified underscore character advance length and thereafter, as indicated by the arrow 1287, the loop initiated by the rectangle 1282 is returned to initiate the printing of another underscore character.

This will be continued, as will be aprreciated by those of ordinary skill in the art, until the test indicated by the diamond 1284 is indicative that underscoring in association with the last character to be understood has been initiated and more particularly, that we have either complete or are about to initiate the last stroke of the underscore operation. Thus, as indicated by the arrow 1288 annotated YES, the program then proceeds to ascertain whether or not we have completed the underscore operation and if the same has not been completed, to calculate and initiate the width of the last underscore character so that the right hand portion thereof is flush with the right hand portion of the character being underscored. More particularly, as indicated by the rectangle 1289, the length of a modified underscore carrier advance is first added to the value in the registers H7 and G4. Thereafter, as indicated by the diamond 1290, the value which remains in H7 and G4 is tested to ascertain whether or not the value corresponds to ZERO (0). If the test indicated by the diamond 1290 results in an affirmative result as indicated by the arrow 1291 annotated YES, it will be appreciated by those of ordinary skill in the art, that the modified underscore advance added in step 1289 merely served to equalize the amount of the last underscore subtracted in step 1283. Therefore, the program has completed the last stroke of the required underscore operation and hence a return to the calling rountine may be initiated in the mannner indicated by the annotation associated with arrow 1291. However, if the test indicated by the diamond 1290 is negative, as indicated by the arrow 1292, it will be indicative, as also will be appreciated by those of ordinary skill in the art, that no additional underscoring stroke is required which is somewhat smaller in length than that tested for in the manner indicated by the diamond 1284. Therefore, under these conditions, the carrier at the daisy wheel print element printer is displaced forward by an amount equal to that left in register locations H-7 and G-4 in the mannner indicated by the rectangle 1293 and thereafter as indicated by the rectangle 1294 the underscore stroke is printed using maximum ribbon advance. Thereafter, as indicated by the arrow 1295, a return to the calling routine may be initiated as underscoring to the last character of the defined word has been completed. Accordingly, it will thus be seen that when the word underscore key is depressed at the end of one or more words or when the routine illustrated in FIG. 20A is initiated in response to processing associated with a continuous line underscore operation, the buffer is initially backed up for the full length of the word or words to be underscored, the character width for which backing up occurs is recorded and each character through which backing up is initiated in the buffer has its eighth bit modified to reflect an underscored condition. Thereafter, the program illustrated in FIG. 20A acts to back the carriage at the printer unit up and to thereafter underscore in a forward direction until the end of the word for which underscoring was defined is obtained while underscoring is initiated in an overlapped manner so that a highly uniform printed document results. In addition, the program acts to compensate for the overlapping so that underscoring is terminated at a position which is flush with the last character in the word to be underscored.

UNDERSCORING DURING PLAYBACK

Referring now to FIG. 20B, there is shown a simplified flow chart which describes the functions which takes place in an underscore routine initiated in a playback mode of operation wherein characters reflecting a dilineated nature, as indicated by the eighth bit position thereof, are detected. More particularly it was seen in conjunction with the flow chart illustrated in FIG. 20A that when automatic modes of underscoring are initiated under program control, all character information which is underscored is modified such that the eighth bit position, $DB_7$, is changed from ZERO (0) condition to a ONE (1) condition to indicate the delineated status thereof. This unique way of defining an underscored character is relied upon within the instant invention in playback modes of operation to enable automatic, high speed underscoring to be achieved through highly simplified program processing. In essence, any time a character is fetched from the buffer to be printed, an analysis loop is entered wherein the eighth bit position of that character is tested. If a ONE (1) is present therein manifesting a dilineated character, the print position in which printing for this character is to occur is recorded if a previous print position for a delineated character has not been recorded therein and if the system is in a play mode. If a begin underscore position has been recorded, exiting from the routine immediately occurs as in the case if no play mode is present. This continues until a non-underscored character is detected. At this time, assuming a play mode, the program control causes the printer to back up to the beginning of the underscore position which was recorded and thereafter, underscore all of the characters in a forward direction until the print position for which a non-underscored character occurs is achieved. In this manner, high speed underlining for groups of delineated characters is obtained in play modes of operation using highly simplified program techniques.

More particularly, as indicated by the oval flag 1300, the underscore playback routine illustrated in FIG. 20B is entered from a playback routine after each character is fetched from the buffer to be printed. Thereafter, as indicated by the diamond 1301, the eighth bit position of this character is tested to ascertain whether or not it is in a ONE (1) condition indicative of an underscored printing character. If the result is affirmative, as indicated by the arrow 1302 annotated YES, the program then tests to ascertain whether the contents of register locations HE and H9 equal ZERO (0) in the mannner indicated by the diamond 1303. Register locations HE and H9, as will be apparent upon an inspection of Appendix D are employed to store the beginning underscore position as well as certain position information employed in justification modes of operation. Therefore, once an underscored printing character has been determined by the test indicated by the diamond 1301, if the contents of register locations HE and H9 are not equal to ZERO (0), the underscored character detected is not the first of a group of adjacent underscored characters and hence the initial print position for this group of characters has already been recorded therein. Accordingly, as indicated by the arrow 1304 annotated NO, whenever a negative result of the test indicated by the diamond 1303 obtains, the program merely returns to the calling routine since the initial underscore position has already been recorded. When however, the results of the test indicated by the diamond 1303 are affirmative, as indicated by the arrow 1305 annotated YES, the program is dealing with the first character of what may be a group of underscored characters. Accordingly, in the manner indicated by the rectangle 1306, the current carrier position at the printer is fetched from the register location HA devoted thereto, deferred escapement displacement is added thereto and the result is stored in register locations HE and H9 to define the position at which underscoring is to begin. Thereafter, as indicated by the arrow 1307, the calling rountine is returned to as no further processing of underscore information will occur until a non-underscored character is detected to trigger the routine. Thus typically, it will be seen that the tests conducted by the diamonds 1301 and 1303 will detect the first underscored character in a group and cause the present position of the carrier at the printer to be recorded to register location HE/H9 as the beginning point for an underscore print routine in a playback mode. Thereafter, each succeeding underscored character of that group will merely be identified by the test conducted by the diamond 1301 while the test conducted by the diamond 1303 will cause the calling routine to be returned to in the mannner indicated by the arrow 1304 so that at this juncture, the start position for an underscore operation is recorded and thereafter delineated characters are ignored.

When however, the first non-underscored character of a group is detected, the test indicated by the amount 1301 will be negative in the manner indicated by the arrow 1308 annotated NO. Thereafter, as indicated by the diamond 1309, the contents of register locations HE and H9 are tested to ascertain whether the same are set to ZERO (0). If they are set to ZERO (0), the non-underscored character detected does not signify the end of a group of underscored characters and hence the program, as indicated by the arrow 1310 annotated YES, causes a return to the calling routine. If however, a start underscore position has been recorded in register locations HE/H9, the result of the test indicated by the diamond 1309 will be negative as indicated by the arrow 1311 annotated NO. Under these conditions, flag location G9 - 3 is tested in the manner indicated by the diamond 1312 to ascertain whether the system is in a play mode. If the result if negative as indicated by the arrow 1313 annotated NO, register locations HE/H9 are cleared in the manner indicated by the rectangle 1314 and the calling routine is returned to in the mannner indicated by the arrow 1315 as no printing to underscored characters will take place in non-playback modes of operation.

If the results of the test conducted in accordance with diamond 1312 are affirmative, as indicated by the arrow 1316 annotated YES, it will have been established by the simplified processing heretofore set out that the end point for a playback mode underscore operation has been reached while the starting point for this mode of operation has already been recorded in register locations HE and H9. Therefore, automatic high speed delineation of the character group defined may now proceed. Therefore, as indicated by the rectangle 1317, since the last character detected defines the end of a string of delineated characters, the carrier position is fetched from register location HA, deferred escapement is added thereto, and the result is stored in register locations H0/H1 as the end of underscore carriage position. Thereafter, in the manner indicated by the rectangle 1318, the carrier position for starting the underline operation as stored in register locations HE and H9 is subtracted from the end of underscore carrier position as stored in register locations H0 and H1 and the result corresponding to the underscored character width is stored in register locations H7 and G4 in much the same manner as was done in the flow chart illustrated in FIG. 20A at the step indicated by the rectangle 1263. Therefore, as indicated by the diamond 1319, the width of an underscored character is compared to the width of the data stored in register locations H7 and G4 to ascertain if the width of the underscore character exceeds the width of the data to be underscored. This was done in connection with diamond 1265 in FIG. 20A to implement a centering of the underscore character under characters such as "i" that have a lower unit width than the underscored character per se. Thus, if the test indicated by the diamond 1313 is negative, as indicated by the arrow 1320 annotated NO, normal underscoring of characters whose width is equal to or greater than that of the underscore character occurs and hence deferred escapement is set to one half the character width in the manner indicated by the rectangle 1321 and the program is returned to at the position indicated by the arrow 1322. These steps are the same as those described in connnection with rectangle 1267 and arrow 1268 in FIG. 20A. Similarly, if the test indicated by the diamond 1319 produces an affirmative result as indicated by the arrow 1323 annotated YES, the underscore character must be centered under the smaller printing character which here stands alone. Therefore, as indicated by the rectangles 1324 and 1325, the deferred escapement is set to one-half the underscored data width and the underscore start position as recorded in register locations HE and H9 is decreased by one-half the difference between the underscore character width and the width of the data to be underscored in much the same manner as was achieved in FIG.20A by rectangles 1270 and 1271 to thus define a position for which the underscored character will be centered under the smaller width data to be underscored. Therefore, the program is rejoined at a location indicated by the arrow 1326.

As indicated by the rectangle 1327, thereafter the underscore start position recorded in register locations HE and H9 is increased by one-half the underscore character width so that the initial edge of the underscored character and the character to be underscored are apropriately aligned. Then, as indicated by the rectangle 1328, the carrier at the printer is displaced to the underscore start position now assembled in register locations HE and H9 and upon displacement of the carrier in the manner indicated by the rectangle 1328, register locations HE and H9 are cleared as indicated by the rectangle 1329. At this juncture, as indicated by the oval flag 1330, the underscore record routine is joined at a location indicated by the flag 1274 and the arrow 1275 therein so that actual delineation of the recorded information occurs under program control and any adjustment to cause the right hand edge of the last underscored character to align with the right hand edge of the last character to be underscored is made in the mannner detailed in FIG. 20A. Accordingly, it will be appreciated by those of ordinary skill in the art that the modification of the eighth bit position of all printing characters to exhibit their delineated status allows automatic underscoring to be achieved in playback modes of operation in a highly simplified and advantageous manner under program control.

PLAYBACK MODE OF MARGIN CONTROL

Referring now to FIG. 1, there is shown a simplified flow chart depicting normal program sequence operations under a playback mode of margin control. The margin control mode of operation here described occurs in any playback mode wherein information is being read from a prerecorded record media and the operator has placed the system in a margin control mode of operation. The routine functions in close cooperation with the play/skip/dup routine illustrated in FIG. 18 and it will be seen that in many places this routine is entered at a portion of the play/skip/dup routine indicated by the hexagon 1137 in FIG. 18 while re-entry is made to the play/skip/dup routine at entry points C, E or AUTO PSD as indicated whithin the PSD loop. The simplified flow chart for the margin control program routine illustrated in FIG. 21 is highly similar to the flow charts therefor disclosed in U.S. application Ser No. 430,130 and particularly those illustrated in FIGS. 19–24 therein. Accordingly, reference to this application may be had for additional detail or the detailed program listings attached hereto as Appendix A and B may be directly relied upon.

Referring now directly to FIG. 21, the flow chart for the playback mode of margin control illustrated therein is entered from the play/skip/dup routine any time the margin control key has been depressed at a location corresponding to the hexagon 1137 in FIG. 18. In FIG. 21, entry to the flow chart occurs at the location associated with the oval flag 1335 marking the beginning of the routine. The program initially acts to ascertain whether the carriage at the printer unit is at the left hand margin, at the left of the hot zone or in the text zone per se, or written within the hot zone as differing modes of operations and conversions which are essentially different occur at each of these three locations. The first test initiated by the program, as indicated by the diamond 1336 is to ascertain whether or not the carrier at the printer unit is at the left hand margin. This is done because at the left hand margin certain operations are performed solely on the basis of the position of the carrier and the relationship of the text being printed to a first line of a paragraph as determined by whether or not the tab counter is open. Thus, for instance, at the left hand margins, spaces are skipped unless the first line of the paragraph is present under the tab control mode of operation established within the present invention and normally, carriage returns are not converted to spaces as occurs within the text zone per se. Accordingly, as indicated by the arrow 1337, if the test indicated by the diamond 1336 is affirmative, branching to a specialized left hand margin routine occurs. However, if the test indicated by the diamond 1336 is negative, as indicated by the arrow 1338, the carriage position is next tested in the manner indicated by the diamond 1339 to ascertain whether or not the carriage position is to the left of the hot zone.

If the carriage position is not to the left of the hot zone, as indicated by the arrow 1340 annotated NO, branching to a special subroutine associated with the printing of information within the margin zone occurs. However, if the test indicated by the diamond 1339 is affirmative, as indicated by the arrow 1341 annotated YES, it may be safely assumed that we are in the text zone which also requires special treatment.

Prior to branching into a specialized text zone routine, the single cycle bit flag maintained in general purpose register location G5-1 is tested in the mannner indicated by the diamond 1342 to ascertain whether or not this bit is in a set condition as the same should not be set for text zone operation. If the results of the test indicated by the diamond 1342 are negative, in the manner indicated by the arrow 1343 annotated NO, the specialized text zone routine is entered in the mannner indicated by the oval flag 1344. However, if the results of the test indicated by the diamond 1342 is affirmative, as indicated by the arrow 1345 annotated YES, the single cycle bit is reset in the manner indicated by the rectangle 1346 and thereafter location C within the PSD loop illustrated in FIG. 18 is returned to for processing of the character loaded in register location G7 in the mannner indicated by the flag 1347.

The test indicated by the diamond 1336 is conducted by a comparison of the printer carrier position stored in register location HA with the left hand margin position, which has been set in the RAM buffer location 240, any time the playback margin control routine is entered. When the results of this test are affirmative in the manner indicated by the arrow 1337 annotated YES, the character to be processed which is stored in working register location G7 is tested to ascertain whether or not it corresponds to a space code as space codes are normally skipped at the left hand margin unless the tab counter is open indicating the first line of a paragraph. If the test conducted for the presence of a space code, as indicated by the diamond 1348, is affirmative in the manner indicated by the arrow 1349 annotated YES, the condition of the tab counter is next tested in the manner indicated by the diamond 1350 to ascertain whether or not the same is in an open condition. The condition of the tab counter is indicated by a flag therefore maintained in register location G6-0 and when the same is set, it is indicative that we are operating on the first line of a paragraph whereat space code characters should be honored while if the tab counter is closed, subsequent lines of a paragraph are being processed and accordingly space codes which occur at the left hand margin should be deleted. When the test indicated by the diamond 1350 is affirmative, as indicated by the arrow 1351 annotated YES, it is apparent that a space code is present at the left hand margin in the first line of a paragraph. Therefore, the program returns to junction point C within the PSD loop illustrated in FIG. 18 so that the space code is processed rather than being skipped in the manner indicated by the oval flag 1347. However, if the tab counter is closed, as indicated by the arrow 1352 annotated NO, it is apparent that the instant operation at the left hand margin is occurring in a line of a paragraph subsequent to the first and hence the space code identified should be skipped. Therefore, as indicated by the hexagon 1353, the next character in the read only buffer is fetched and loaded into the main register M and subsequently into the working register location G7. Thereafter, as indicated by the arrow 1354, the newly fetched code is tested to ascertain whether or not it is a space code in the manner indicated by the diamond 1348. Accordingly, for conditions where the tab counter is closed, a space code inserted at the left hand margin of a line subsequent to the first in a paragraph is skipped together with all sequential space codes present therein due to the operation of the diamonds 1348, 1350 and the hexagon 1353.

When the test for a space code indicated by the diamond 1348 goes negative, as indicated by the arrow 1355 annotated NO, the character in location G7 is next tested, in the manner indicated by the diamond 1356, to ascertain whether or not the same corresponds to a carriage return or special carriage return character. As it has been established that we are operating at the left hand margin, it will be apparent that a carriage return or special carriage return character has just been executed. Therefore, the occurrence of a second carriage return or special carriage return in the manner tested for by the diamond 1356 will indicate the beginning of a new paragraph. Accordingly, if the test indicated by the diamond 1356 is affirmative, in the manner indicated by the arrow 1357 annotated YES, a return to the PSD loop at junction point C occurs in the manner indicated by the oval flag 1347 so that the carriage return or special carriage return detected is effectively processed. However, if the test indicated by the diamond 1356 is negative, in the manner indicated by the arrow 1358, the program proceeds to text zone processing in the manner indicated by the oval flag 1344.

The text zone portion of the playback margin control routine illustrated in FIG. 21 is indicated by the oval flag 1344 and may be entered either upon an indication that a character at the left hand margin is not a space code, carriage return or special carriage return as indicated by the tests conducted by the diamonds 1348 and 1356 or upon confirmation that processing is not occurring at the left hand margin or the hot zone, as tested for by diamonds 1336 and 1339 and hence operation is occurring in a normal manner within the text zone. The initial step of the text zone routine, as indicated by the diamond 1359 is to ascertain whether or not the character being processed is a precedented carriage return character which always must be honored. If the results of the test indicated by the diamond 1359 are affirmative as indicated by the arrow 1360 annotated YES, the location C within the PSD loop illustrated in FIG. 18 is returned to in the manner indicated by the oval flag 1347 so that this character is processed accordingly.

If the results of the test indicated by the diamond 1359 are negative, as indicated by the arrow 1361 annotated NO, the program next tests to ascertain whether the character being processed is a tab in the manner indicated by the diamond 1362. If a tab is present as indicated by the arrow 1363, the tab is to be honored in the first line of a paragraph and skipped for subsequent lines of a paragraph. Accordingly, in the manner indicated by the diamond 1364, the condition of the tab counter is tested to ascertain whether or not it is in an opened or closed condition. If the tab counter is open, as indicated by the arrow 1365 annotated YES, point C within the PSD loop is returned to so that the tab is processed and honored in the manner indicated by the oval flag. However, if the tab counter is closed in the manner indicated by the arrow 1366, annotated NO, the PSD loop illustrated in FIG. 18 is returned to at a point associated with the oval flag 1184 shown therein, which corresponds to an exit point from the PSD loop and hence this character is not processed but instead the same is skipped.

When no tab is present in the manner indicated by the arrow 1367 annotated NO, the program next tests the character to ascertain whether a carriage return or special carriage return is present in the manner indicated by the diamond 1368. If a carriage return or special carriage return is present, as indicated by the arrow 1369 annotated YES, it is indicative that the end of a line, which may correspond to the end of the first line of a paragraph is present. Therefore, the tab counter is closed in the manner indicated by the rectangle 1370 and thereafter, as indicated by the rectangle 1371, the next character is checked to ascertain whether or not the end of a paragraph is present. When the character is fetched in the manner indicated by the rectangle 1371, it is tested in the manner indicated by the diamond 1372 to ascertain whether or not the character comprises a precedented tab, a center code, or any carriage return. If one of these characters are present, as indicated by the arrow 1373 annotated YES, the end of a paragraph is confirmed and hence, a return to the PSD loop within the location indicated by the junction point C as indicated by oval flag 1347 is initiated so that this carriage return is processed in a normal manner even though it occurs within the text zone in a margin control mode of operation. However, if the end of a paragraph is not confirmed through the test indicated by the diamond 1372, as indicated by the arrow 1374, annotated NO, the carriage return character should be replaced by a space code as processing is occurring within the text zone and the carriage return character does not fall within the hot zone for the margin zone defined. Accordingly, the edit control stop conditions are evaluated in the manner indicated by the hexagon 1375, and more particularly in accordance with the flow chart therefor set forth in FIG. 19, a space code is substituted for the carriage return code in register location G7 in the manner indicated by the rectangle 1376 and thereafter, as indicated by the oval flag 1347, junction point C is returned to within the PSD loop so that the substituted space code is processed in the normal manner. Thus, in this manner, when a carriage return or special carriage return is identified by the test indicated by the diamond 1368, the tab counter is closed, the next character is tested to check whether the initial character identified the end of a paragraph and if no end of paragraph condition is ascertained, a space code is substituted for the carriage return code to be printed in the text zone and thereafter printing of the space code in the text zone occurs.

If the test indicated by the diamond 1368 is negative indicating that no carriage return or special carriage return is present in the manner indicated by the arrow 1377 annotated NO, the presence of a precedented hyphen, which in all cases must be honored, is tested for in the manner indicated by the diamond 1378. If a precedented hyphen is detected, in the manner indicated by the arrow 1379 annotated YES, this hyphen is placed into the top of the margin control stack employed for margin control purposes as described in association with the diamond 1126 and the rectangle 1128 in FIG. 18. Upon the completion of this step, as indicated by the rectangle 1380, the next character is fetched in the manner indicated by the hexagon 1381 so that it may be ascertained whether or not this character should be skipped. For instance, the word "mother-in-law" will always include a precedented hyphen which may not be omitted; however, if the same were recorded at the end of a line such that a carriage return followed the precedented hyphen and the word "law" appeared as the first word of the next line, the appearance of the full term within the text zone would require that the carriage return be deleted. Accordingly, as indicated by the diamond 1382, the next character fetched through the step indicated by the hexagon 1381 is tested in the manner indicated by the diamond 1382 to ascertain whether or not the same corresponds to a carriage return or special carriage return character.

Similarly, if the test conducted for a precedented hyphen as indicated by the diamond 1378 is negative, as indicated by the arrow 1383 annotated NO, the character being processed is next tested, in the manner indicated by the diamond 1384 to ascertain whether or not it is a normal hyphen which is normally skipped in the text zone and honored within the hot zone. If the test associated with diamond 1384 is affirmative, as indicated by the arrow 1385 annotated YES, the next character is again fetched as indicated by the hexagon 1381 to ascertain whether this character as well as the normal hyphen indicated by the arrow 1385 must be skipped. Since the normal hyphen is not placed into a stack, skipping of this character, it will be appreciated, is achieved as soon as the next character is fetched.

Once the next character is fetched in the manner indicated by the hexagon 1381 the character thereby obtained is tested in the manner indicated by the diamond 1382 to ascertain whether or not a carriage return or special carriage return is present. Thus if a precedented hyphen is identified, it is placed in a stack and the next character is fetched while if a plain hyphen is identified, the next character is merely fetched and thereafter the next character thus fetched is tested to ascertain whether or not a carriage return or special carriage return is present. If a carriage return or special carriage return is present as indicated by the arrow 1386 annotated YES, it is indicative of the end of a line. Therefore, as indicated by the rectangle 1387 and the hexagon 1388, the tab counter is closed, the EC Stop conditions are evaluated and thereafter a return to the PSD loop at a point indicated by the oval flag 1389 annotated AUTO PSD is initiated. The entry point to FIG. 18 within the PSD loop annotated AUTO PSD is a location where processing occurs out of the margin control stack while the character loaded in the working location G7 is skipped. This means, that is the case of a precedented hyphen followed by a carriage return of special carriage return, the precedented hyphen is processed out of the stack upon entry into the PSD loop at the AUTO PSD location while the carriage return or special carriage return identified is skipped. However, when entry into this branch of the program occurred through the identification of a hyphen in the manner defined by the diamond 1384, both the hyphen and following carriage return or special carriage return are skipped as no loading within the stack occurred. This is appropriate because in the case of a non-precedented hyphen, the same would have normally been followed by a carriage return or special carriage return to denote an entry point at the end of the line. Therefore, since it is now being printed in the text zone, both characters must be skipped.

When the test indicated by the diamond 1382 is negative, as indicated by the arrow 1390 annotated NO, no carriage return or special carriage return which must be skipped under the foregoing logic is present. Therefore, as indicated by the rectangle 1391, the pointer at the read only buffer is stepped back one character position so as to place the same before the character fetched in step 1381 and tested in step 1382 and thereafter, as indicated by the oval flag 1389, a return to the PSD loop at the AUTO PSD entry point is initiated. Thus, when the character following the precedented or plain hyphen identified is not a carriage return, the buffer pointer is placed back one position so that this character is read as the next character to be processed and then the PSD loop is re-entered at the AUTO PSD location for processing of the precedented hypen out of the stack or a return to the general play/skip/dup mode of operation illustrated in FIG. 18.

When no hyphen or precedented hyphen is identified by the tests indicated by the diamonds 1378 or 1384, in the manner indicated by the arrow 1392 annotated NO, the character being processed is next tested in the manner indicated by the diamond 1393 to ascertain whether or not a punctuation mark is present since inserted punctuation marks require special processing. If no punctuation mark is present in the manner indicated by the arrow 1394 annotated NO, a return to the PSD loop at junction point C as indicated by the oval flag 1347 is initiated so that whatever character is present is processed in a normal manner within the text zone. However, if a punctuation mark is present in the manner indicated by the arrow 1395 annotated YES, this character, once identified, is placed into the stack in the manner indicated by the rectangle 1396. Once the punctuation mark which has been identified is saved by placing it into the stack in the manner indicated by the rectangle 1396, the next character is fetched in the manner indicated by the hexagon 1397 so that the same may be tested. Initially, the next character fetched is tested to ascertain whether or not it comprises double quotation marks in the manner indicated by the diamond 1398. If double quotation marks are present in the manner indicated by the arrow 1399, the steps associated with the rectangle 1396, hexagon 1397 and diamond 1398 are repeated in looped fashion so that the identified double quotes are placed into the stack subsequent to the initial punctuation mark detected, the next character is fetched and thereafter it is tested to ascertain whether or not double quotes are present.

If no double quotes are present in the manner indicated by the arrow 1400 annotated NO, this character is again fetched in the manner indicated by the hexagon 1401 and then tested, as indicated by diamond 1402 to ascertain whether or not a carriage return character is present. If no carriage return character is present, as indicated by the arrow 1403, annotated NO, it is assumed that appropriate punctuation was supplied by the operator during recording as no real character modification here has taken place. Therefore, as indicated by the rectangle 1391 and the oval flag 1389, the buffer is stepped back behind the character fetched and then branching to the PSD loop at the position indicated as AUTO PSD occurs so that processing of the punctuation mark from the stack occurs. However, if a carriage return character was identified by the test associated with the diamond 1402, in the manner indicated by the arrow 1404 annotated YES, special processing is required. More particularly, it will be appreciated that while most margin control operations in the text zone merely require that a carriage return character be replaced by a space code, punctuation marks printed in the text zone, such as a period are normally followed by two spaces under normal formatting rules. Therefore, as the carriage return character identified has followed a punctuation mark, two rather than one space codes must be substituted therefor. Under these circumstances, as indicated by the rectangle 1405 a space code is inserted into the stack, the buffer is stepped back through one position in the manner indicated by the rectangle 1391 and thereafter a return to AUTO PSD within the PSD loop occurs in the manner indicated by the oval 1389. This means that the punctuation mark followed by the space code inserted in the step associated with rectangle 1405 will initially be processed and then the carriage return character will be processed in a margin control mode whereupon it is converted into a space code. Thus it will be seen that under these cirumstances, a punctuation mark followed by a carriage return code in printed text being played back has two space codes substituted therefor when the same is printed under margin control rules of operation within the text zone.

The portions of the flow chart illustrated in FIG. 21 which have been heretofore described are principally directed to operations at the left hand margin or in the text zone per se. The right hand portion of this flow chart, which is described hereinafter, is directed to modes of operation within the margin zone. More particularly, it will be seen that when the margin control routine is entered and the carrier at the printer is identified as not residing at either the left hand margin through the test associated with diamond 1336 or to the left of the hot zone through the test associated with the diamond 1339, presence within the hot zone, as indicated by the arrow 1340 annotated NO is assured. Operation within the hot zone, it will be recalled, has essentially two aspects. Thus, when the hot zone is entered, a look ahead routine is initiated whereupon character information to be printed within the hot zone is reviewed and if a character location is identified for which a carriage return operation may be initiated, processing continues automatically; however, if no such character location is ascertained within the hot zone, the single cycle bit is set at the beginning of the hot zone and the operator is forced to play out a character at a time until a convenient place for the insertion of a hyphen is ascertained. Upon insertion of the hyphen, a carriage return is automatically initiated and automatic processing resumes. Therefore, when the test associated with diamond 1339 indicates that processing is not occuring within the text zone, processing may be occuring either at the beginning of the hot zone or someplace therein. Accordingly, the routine initially acts to test, in a manner indicated by the diamond 1406 whether or not the single cycle bit maintained in general purpose register location G5 – 1 has been set indicating that processing within the hot zone according to a single cycle mode is occurring. If the results of the test indicated by the diamond 1406 are affirmative, in the manner indicated by the arrow 1407 annotated YES, the single cycle routine indicated by the hexagon 1408 is initiated and thereafter the PSD loop is returned to for processing of the character information inserted through the single cycle execution routine associated with the hexagon 1408. More particularly, it will be recalled that in single cycle modes of operation, the depression of any action key acts to clear the single cycle bit and allows one character to be played through the PSD loop illustrated in FIG. 18. Thereafter, the single cycle bit is reset in a manner which shall be described below so that effectively, the operator is allowed to play one character of information out at a time until such time as a hyphen is inserted. As each character is inserted through the single cycle execution routine indicated by the hexagon 1408, a return to junction point C as indicated by the oval flag 1347 is initiated so processing of this single character occurs within the appropriate portion of the PSD loop shown in FIG. 18.

If the test indicated by the diamond 1406 is negative, as indicated by the arrow 1409 annotated NO, processing is occurring either at the initial point of the hot zone or subsequent thereto under such conditions that a location for which a carriage character may be inserted has already been identified. Accordingly, the margin control hot zone routine, as indicated by the oval flag 1410 is entered by the program under these conditions. Upon entry into the margin control hot zone routine indicated by the oval flag 1410, the program first tests the character being processed to ascertain whether or not the same is a hyphen or precedented hyphen which may be followed by a carriage return character. This test is indicated by the diamond 1411 and if it results in an affirmative comparision, as indicated by the arrow 1412 annotated YES, the hyphen or precedented hyphen identified is placed into the margin control stack in the manner indicated by the rectangle 1413. Thereafter all following spaces and tabs adjacent to the identified hyphen or precedented hyphen character are eliminated in the manner indicated by the rectangle 1414 and the first non-tab or space code character is tested, in the manner indicated by the diamond 1415 to ascertain whether or not it is a carriage return character of any form. If no carriage return character is identified in the manner indicated by the arrow 1416 annotated NO, a carriage return character, as appropriate to follow a hyphen within the hot zone, is read from the read only memory 80 and loaded into the main register M in the manner indicated by the rectangle 1417. Thereafter, as indicated by the rectangle 1418, this character is loaded into the margin control stack. Similarly, if the test indicated by the diamond 1415 is affirmative, as indicated by the arrow 1419, annotated YES, the carriage return character which was thus identified is placed into the stack in the manner indicated by the rectangle 1418. Thereafter, as indicated by the oval flag 1347, junction point C within the PSD loop is entered so that the character which in this case is a hyphen or precedented hyphen as identified by the test indicated by the diamond 411 is initially processed and thereafter the processing of the carriage return information placed in the stack occurs. Accordingly, it will be appreciated that when entry into the margin zone results in the detection of a hyphen or precedented hyphen, the same is honored and directly followed by a carriage return character, regardless of whether or not the same is present, to appropriately cause a carriage return operation within the margin zone defined.

When no hyphen or precedented hyphen is identified by the test indicated by the diamond 1411, as indicated by the arrow 1420 annotated NO, the program then acts in the manner indicated by the diamond 1421 to test whether or not the character being processed is a space or tab code character. If this test results in an identification of a space or tab code character, as indicated by the arrow 1422 annotated YES, adjacent space codes and tabs are eliminated in the manner indicated by the rectangle 1414, a carriage return character is placed into the stack in the manner indicated by the rectangle 1418 and thereafter junction point C within the PSD loop, as indicated by oval 1347 is returned to thus implement an appropriate carriage return operation within the hot zone define.

If the test for a space or tab code indicated by the diamond 1421 is negative, as indicated by the arrow 1423 annotated NO, the program next tests in the manner indicated by the diamond 1424 as to whether or not a precedented tab is present. A precedented tab, it will be recalled, must be honored; however, as the same defines a paragraph or the like, a carriage return operation within the hot zone should be initiated prior to be honoring this character. Therefore, if a precedented tab is detected in the manner indicated by the arrow 1425 annotated YES, the read only buffer is stepped back through one position, in the manner indicated by the rectangle 1426 and thereafter a carriage return character is read from the read only memory 80 and loaded into the main register M in the manner indicated by the rectangle 1417. Thereafter, this manufactured carriage return character is placed into the stack in the manner indicated by the rectangle 1418 and the PSD loop is returned to at junction point C so that under these conditions, a carriage return code is executed and thereafter the precedented tab is executed as the first character of a new line.

If the test conducted for a precedented tab, as indicated by the diamond 1424 is negative, as indicated by the arrow 1427, annotated NO, the program next tests the character being processed as to whether or not the same corresponds to any carriage return character in the manner indicated by the diamond 1428. If a carriage return character is detected in the manner indicated by the arrow 1429 annotated YES, this character is placed into the stack in the manner indicated by the rectangle 1418 and thereafter location C within the PSD loop is returned to. Thus, under these conditions, a carriage return character occurring in the hot zone will be honored.

If no carriage return character is identified by the test indicated by the diamond 1428, as indicated by the arrow 1430 annotated NO, the program then tests in the manner indicated by the diamond 1431 as to whether or not a breakpoint character is present. Breakpoint characters as listed in the legend correspond to hyphens, precedented hyphens, space codes, centering codes, first line find codes, carriage return codes, special carriage return codes, precedented carriage return codes, precedented special carriage return codes, tabs and precedented tabs and serve as a convenient location for terminating the line within the hot zone. Therefore, if one of these characters is identified in the manner indicated by the arrow 1432 annotated YES, a carriage return character is loaded into the main register, placed into the stack, and thereafter location C within the PSD loop is returned to for processing in the manner indicated by the rectangles 1417 and 1418 as well as the oval flag 1347.

If no breakpoint is identified by the test associated with diamond 1431, in the manner indicated by the arrow 1433 annotated NO, the program next tests in the manner indicated by the diamond 1434 to ascertain whether or not the stop bit has been set. This bit would normally be set upon an establishment of the single cycle mode after a look ahead routine has been initiated wherein no carriage return location within the hot zone has been ascertained. Once the single cycle bit is set, the stop bit is also set, thereafter cleared each time an action key is depressed to cause a single character to play out and thereafter is reset to maintain the single cycle condition. Thus, if the stop bit is set, the look ahead routine at the edge of the margin zone has already been completed and hence, as indicated by the arrow 1435', the PSD loop may be returned to at location C to return processing to single cycle mode. However, if the stop bit is not set in the manner indicated by the arrow 1435 annotated NO, we are at the edge of the hot zone and hence a scanning of the next character information to be printed within the hot zone must be conducted so that such character information may be reviewed right at the edge of the hot zone to ascertain whether or not automatic processing with a return of the carrier within the hot zone may be continued or whether no breakpoint is present so that the single cycle mode of operation must be established. Accordingly, as indicated by the rectangle 1436, the contents of the read only buffer are scanned forward for a breakpoint, as defined by the legends, within the specified margin zone range and then stepped back through the number of character positions associated with the width of the hot zone. The width of the margin zone is standard at five (5) characters for U.S. versions and seven (7) characters for International versions and may be varied, at the option of the operator through a range of from 0 to 15 character positions. The width of the margin range is maintained within general purpose register locations GF-3 - GF-0 and a scan operation is implemented through a manipulation of the pointer for the read only buffer together with an attendant reading and analyzing of each character which is scanned. If a breakpoint is detected during the operation indicated by the rectangle 1436, a flag is set and thereafter, as indicated by the diamond 1437, the condition of this flag is tested to ascertain if a breakpoint was found within the width of the margin zone. If an affirmative result obtains, as indicated by the arrow 1438, the PSD loop is returned to at location C as indicated by the oval flag 1347 as automatic processing within the hot zone may continue since when the breakpoint character is detected, it will be translated into a carriage return character or a carriage return character will be inserted thereafter in the manner discussed above. However, if no breakpoint character has been detected in the manner indicated by the arrow 1439 annotated NO, the buffer is backed up behind the position of the character now in G7 for which this analysis was conducted in the manner indicated by the rectangle 1440 so that when playback is initiated pursuant to a single cycle mode of operation this character will be the first to be played. Thereafter, as indicated by the rectangle 1441, the single cycle bit maintained in register location GF-1 is set and exiting from the PSD loop occurs in the manner indicated by the oval flag 1442 so that processing pursuant to the single cycle mode of operation, under operator control, may be initiated.

Thus, it will be appreciated by those of ordinary skill in the art that the flow chart illustrating the playback mode of margin control illustrated in FIG. 21 acts to analyze at the outset whether the printer unit is at the left hand margin, within the text zone or about to enter the hot zone. Thereafter, depending upon the location of the printer unit, appropriate conversions are made to character information being processed, when the same are necessary to cause playback to occur in a manner so as to obtain extremely tight margins within the margin zone defined and an otherwise properly formatted document within the text zone.

MANUAL MODE OF MARGIN CONTROL

Referring now to FIG. 22, there is shown a flow chart illustrating a programmed sequence of operation under a manual mode of margin control operative upon an entry of data from the keyboard. The manual mode of margin control whose flow chart is illustrated in FIG. 22 is operative, upon the depression of the margin control mode key to data entered at the keyboard to cause initially entered information to be properly formatted within the right and left margins established without a requirement for an operator to enter carriage return information. Thus typically, an operator would initialize this mode of operation and begin to insert data without regard to the right hand margin defined, except under cases where a lengthy word or the like is inserted at the margin zone which requires hyphenation. Carriage returns, and the like would not be entered except under such conditions where the operator is desirous of defining a paragraph as the manual mode of margin control implemented under program control acts to automatically insert carriage returns at an appropriate location to cause the right hand margin defined to be honored. In many respects, the flow chart for the manual mode of margin control illustrated in FIG. 22 exhibits its operational parameters which are quite similar to those employed for the playback mode of margin control described in conjunction with FIG. 21. Here however, as information is entered at the keyboard rather than from a prerecorded record media or the like, the review techniques employed in the playback mode of margin control illustrated in FIG. 21 must be omitted since the read only buffer is not fully loaded with a line of information from the prerecorded record media. Accordingly, in the manual mode of margin control whose flow chart is illustrated in FIG. 22, no look ahead concepts are available for reviewing character information which is about to be printed in the margin zone and hence, while carriage return characters may be readily substituted for a space code inserted therein, or added upon the detection of a hyphen code, hyphenation must still be performed by an operator. In the manual margin control mode of operation, the size of the margin zone is adjustable between the 0 - 15 character width available for playback modes of margin control with a standard set for U.S. versions at a five character width, while a seven character width is employed for international embodiments. Accordingly, in a manual margin control mode of operation, the operator need merely enter data while the system inserts carriage returns in the hot zone and any carriage return entered is treated as mandatory so that the same defines the end of a paragraph. The system need not be in Record for this mode to operate; however, a record mode of operation therewith is available.

Referring now particularly to FIG. 22, it will be appreciated that the flow chart illustrated therein is entered at the location indicated by the oval flag 1450 indicating a keyboard entry mode of margin control, any time the keyboard input conversion routine is called from idle and this routine is called for all keyboard entry routines unless a justify or margin control single cycle mode of operation has been established. When the routine is entered at the location indicated by the oval flag 1450, the program initially tests in the manner indicated by the diamond 1451 as to whether or not the margin control mode has been selected for the keyboard entry routine in progress. This is done, by testing the condition of the margin control flag in general purpose register location G8–5. If the margin control flag is not set, as indicated by the arrow 1452 annotated FALSE, exiting from this routine occurs since no manual mode or margin control has been established. Accordingly, as indicated by the arrow 1452 and the oval 1453, exiting from this routine and a return to the calling routine is initiated so that the character entered from the keyboard may be normally processed. If the test indicated by the diamond 1451 is affirmative as indicated by the arrow 1454 annotated TRUE, the program then tests in the manner indicated by the diamond 1455 whether or not the centering flag has been set.

The centering bit is maintained in general purpose register location G6–6 and when the same is in a set condition, a centering operation is to occur. Since a margin control mode of operation may not be imposed upon a line for which centering is to occur, if the test indicated by the diamond 1455 is affirmative, as indicated by the arrow 1456 annotated TRUE, a return to the calling routine as indicated by the oval 1453 is initiated since the manual margin control routine depicted in FIG. 22 may not operate on this information.

Should the test for the centering flag indicated by the diamond 1455 prove false as indicated by the arrow 1457 annotated FALSE, the program next tests in the manner indicated by the diamond 1458 to ascertain whether or not bit 7 of the character presently loaded in register location G7, which is the working register location, is equal to a ONE (1). Since printing characters which are not underscored have bit 7 in a ZERO (0) condition, it will be appreciated that if the character in working location G7 has a ONE (1) in the eighth bit position thereof such a character will either represent a control code or possibly an underscored code; however, the latter situation is extremely unlikely in that in a keyboard entry mode, bit 7 of a printing character would not yet have been modified. Therefore, in either case, should the test indicated by the diamond 1458 be affirmative, as indicated by the arrow 1459 annotated TRUE, the calling routine is returned to in the manner indicated by the oval flag 1453 as the character presently loaded in working register G7 should not be processed under manual margin control techniques. It should additionally be noted that as this routine is queued for each keyboard entry, the test indicated by the diamond 1458 will merely cause exiting from the routine for the given character tested while a return thereto under normal processing operations will occur for each succeeding character entered.

If the test indicated by the diamond 1458 is negative, in the manner indicated by the arrow 1459 annotated FALSE, the program next tests in the manner indicated by the diamond 1460 whether or not the character presently being processed constitutes a special carriage return character. Since the operator does not act to enter a carriage return of any type in a manual mode of margin control except for the express purposes of defining an end of a paragraph, it must be assumed that a special carriage return character was entered to define the end of a paragraph without dumping the buffer. Therefore, when the test indicated by the diamond 1460 is affirmative as indicated by the arrow 1461 annotated TRUE, the special carriage return character loaded in working register location G7 is converted, in the manner indicated by the rectangle 1462 to a precedented special carriage return which may not be ignored by the program and hence acts to define a paragraph while not dumping the buffer in the manner associated with a special carriage return. Thereafter, as indicated by the arrow 1463, the calling routine is returned to in the manner indicated by the oval flag 1453 so that the paragraph defining precedented special carriage return now loaded in register location G7 may be appropriately processed.

Similarly, should the test for a special carriage return indicated by the diamond 1460 prove false in the manner indicated by the arrow 1464 annotated FALSE, the program next tests in the manner indicated by the diamond 1465 whether or not the character loaded in register location G7 is a carriage return character. The carriage return character would also be employed by the operator, under these conditions, to define the end of a paragraph but when a carriage return character is entered a dumping of the buffer for recording purposes occurs. Therefore, as indicated by the arrow 1466 annotated TRUE, when a carriage return character has been detected in register location G7, this character is converted to a precedented carriage return character in the manner indicated by the rectangle 1467. Thereafter, as indicated by the arrow 1468 and the oval flag 1453, the calling routine is returned to so that the precedented character now in register location G7 may be appropriately processed to define an end of a paragraph. Of the initial tests conducted within the manual margin control program initiated by the oval flag 1450, it will be seen that the test associated with diamond 1451 acts to ascertain whether or not the margin control mode of operation has been initiated while the tests associated with diamonds 1455 and 1458 act to ascertain whether program processing for the character presently being processed is appropriate. Similarly, the tests indicated by the diamonds 1460 and 1465 act to ascertain whether or not specific paragraph ending character information is present and when such information is loaded in the working register G7, it is translated to a precedented form so that the same may not be ignored and thereafter the manual margin control routine is exited from so that normal processing may continue. Thus, to this juncture in the program, none of the requisite processing relied on printer position information to cause character information being processed to be modified in a variable manner depending upon the position at which the same was to be printed. From this point on however, the manual margin control routine, illustrated in FIG. 22 acts initially to ascertain printer position information and is responsive thereto to perform necessary code translation in response to modifications which may be required due to the current position of the printer.

Accordingly, when the test indicated by the diamond 1465 is negative, in the manner indicated by the arrow 1469 annotated FALSE, processing of character information in the working register G7 is further carried out in the program routine illustrated in FIG. 22 as a function of the position of the carrier at the printer unit. Thus, as indicated by the diamond 1470, the carrier position of the printer as stored in register location HA is tested to see whether the same is at the left hand margin in precisely the same manner as was described in association with diamond 1136 in the flow chart of FIG. 21. If the results of this test are affirmative, as indicated by the arrow 1471 annotated TRUE, a left margin margin control routine is initiated in the manner indicated by the oval flag 1472. However, if the carrier position is not at the left hand margin, as indicated by the arrow 1473 annotated FALSE, the program next tests in the manner indicated by the diamond 1474 whether or not the carrier at the printer is to the left of the margin zone established. This test is conducted in precisely the same manner described in association with diamond 1339 of FIG. 21. If the test indicated by the diamond 1474 produces an affirmative result, as indicated by the arrow 1475 annotated TRUE, a branch to a text zone margin control routine, as indicated by the oval flag 1476, is initiated. However, if the test for positioning of the printer within the text zone indicated by the diamond 1474 is negative, as indicated by the arrow 1477 annotated FALSE, a branch to a hot zone margin control routine, as indicated by the oval flag 1478 is initiated. Accordingly, once the program has determined that a character is present in a manual margin control mode of operation which must be processed as a function of the printer position, the program then tests to ascertain whether or not it is at the left hand margin, within the text zone or within the hot zone in the same manner as described in connection with the playback mode of margin control illustrated in FIG. 21 and then proceeds to separately process such information in accordance with the printer position determined.

When the left margin, margin ccontrol routine is entered in the manner indicated by the oval flag 1472, the program first tests in the manner indicated by the diamond 1479 to ascertain whether or not the character being processed is a space code. If a space code is not present, in the manner indicated by the arrow 1480 annotated FALSE, the text zone margin control routine, indicated by the oval flag 1476, is joined as only spaces are specially treated at the left hand margin under the manual margin control routine here being described. If the result of the test indicated by the diamond 1479 is affirmative as indicated by the arrow 1481 annotated TRUE, a space code has been loaded in working register location G7 and hence will be honored if the same is either an expanded space code or we are processing in the first line of a paragraph. Therefore, as indicated by the diamond 1482, the expand flag located in general purpose register location G8–7 is tested to ascertain whether or not the expand key has been depressed. If an affirmative result occurs, as indicated by the arrow 1483 annotated TRUE, the space code has been inserted with expand mode on for the purposes of lining up numbers or the like and hence the same must be honored regardless of what line the insertion at the left hand margin occured. Thus, once an expanded space code is identified in the manner indicated by the arrow 1483, a return to the calling program occurs for processing in the manner indicated by the oval flag 1453. If the test indicated by the diamond 1482 is negative, as indicated by the arrow 1484 annotated FALSE, the space code entered will only be honored if the same occurs at the first line of a paragraph. Therefore, the condition of the tab counter stored in general purpose register location G6–O is tested in the manner indicated by the diamond 1485. If the test indicated by the diamond 1485 is affirmative in the manner indicated by the arrow 1486 annotated TRUE, processing is occurring at the first line of a paragraph and therefore a space code entered should be honored. Accordingly, as indicated by the arrow 1486, a return to the calling routine indicated by the oval flag 1453 is initiated whereupon the space code is processed from register location G7. If however, the first line of a paragraph is not detected through the test indicated by the diamond 1485, in the manner indicated by the arrow 1487 annotated FALSE, a return to the idle routine, as indicated by the oval flag 1488 occurs so that effectively, the character presently loaded in register location G7, which has been identified as a space code is skipped. Thus, at the left hand margin, if a space code is identified, the same is honored if expand is on or processing is occurring in the first line of a paragraph while the same is skipped for all other conditions. However, if no space code is detected, text zone margin control processing, as indicated by the oval flag 1476 is initiated.

The text zone routine indicated by the oval flag 1476 may be entered directly when the test for a carrier position within the text zone, as indicated by the diamond 1474 is affirmative, or indirectly when processing is occurring at the left hand margin and the first character to be processed does not comprise a space code in the manner indicated by the arrow 1480. The text zone margin control routine indicated by the oval flag 1476 simply acts to test each character to be processed, in the manner indicated by the diamond 1489, to ascertain whether or not the same comprises a hyphen. In a manual mode of margin control, wherein the operator merely enters data from the keyboard, a hyphen would only be entered within the text zone if a mandatory hyphen was intended such as in the term "mother-in-law". Therefore, whenever the test indicated by the diamond 1489 is affirmative, in the manner indicated by the arrow 1490 annotated TRUE, the character currently being processed is a hyphen code which was inserted within the text zone. Therefore, as indicated by the rectangle 1491, the precedented hyphen code is read from the read only memory 80 and inserted into register location G7 so that a precedented hyphen code is present therein for further processing. Once the hyphen code initially loaded into register location G7 has been converted to a precedented hyphen code, the calling routine indicated by the oval 1453 is returned to the manner indicated by the arrow 1492 so that the precedented hyphen code now in register location G7 may be processed. However, if no hyphen was identified by the test indicated by the diamond 1489 as indicated by the arrow 1493 annotated FALSE, the calling routine is returned to so that whatever character has been loaded for processing is processed within the text zone in the normal manner. Thus it will be appreciated that when the text zone manual margin control routine is entered, the program merely looks for a hyphen code and upon the detection of such a code converts the same to a precedented hyphen. Thereafter, the precedented hyphen is normally processed within the text zone as are all other characters which may be inserted at the keyboard.

The hot zone routine indicated by the oval flag 1478 acts essentially to insert carriage return codes into register location G7 so that the right hand margin is honored whenever an opportune location therefor is identified within the character codes inserted for processing within the hot zone. More particularly, the hot zone margin control routine indicated by the oval flag 1478 initially tests as indicated by the diamond 1494 to ascertain whether or not the character being processed within the margin zone is a hyphen. If the result of this test are affirmative, as indicated by the arrow 1495 annotated TRUE, a carriage return point within the margin zone has been identified. Therefore, as indicated by the rectangles 1496, the hyphen is first printed, and thereafter stored within the read/write buffer in the manner indicated by the rectangle 1497. Thereafter, as indicated by the arrow 1498 and the rectangle 1499, a carriage return code is inserted into the working storage location G7 so that in effect, the hyphen is honored and executed and a carriage return character is substituted therefor in the register G7 so that it is next to be processed. Thereafter, as indicated by the arrow 1500, the calling routine is returned to so that the carrige return character now loaded in register location G7 is processed. Thus, when a hyphen code is identified within the text zone, it is honored by the hot zone margin control routine indicated by the oval flag 1478, and a carrige return ccharacter is inserted thereafter to cause the carriage at the printer unit to return to either the left hand margin or an indented left hand margin under a tab control mode of operation.

If the test for a hyphen indicated by the diamond 1494 is negative, as indicated by the arrow 1501, annotated FALSE, the program then tests, as indicated by the diamond 1502 whether or not a precedented hyphen is present. A precedented hyphen must always be honored; however, if the same occurs within the hot zone, it is honored and a carriage return character is inserted subsequent thereto as the same represents an appropriate location for returning the carriage at the printer. Accordingly, if the test for a precedented hyphen indicated by the diamond 1502 is affirmative as indicated by the arrow 1503 annotated TRUE, the hyphen is executed and stored in the read/write buffer in the manner indicated by the rectangles 1496 and 1497 and thereafter, as indicated by the rectangle 1499, a carriage return character is inserted into register location G7 to form the next character to be processed. Thereafter, as indicated by the arrow 1500 and the oval flag 1453, the calling routine is returned to so that the carriage return character is processed.

If the test for a precedented hyphen indicated by the diamond 1502 is negative in the manner indicated by the arrow 1504 annotated FALSE, the program next tests in the manner indicated by the diamond 1505 whether or not the character being processed in the text zone corresponds to a space code. If no space code is present in the manner indicated by the arrow 1506 annotated FALSE, the character being processed does not provide a location at which the carrier at the printer unit may be conveniently returned. Therefore, as indicated by the arrow 1506, the calling routine is returned to in the manner indicated by the oval flag 1453 so that this character is processed and subsequently thereto the processing of the next character may be tested for a convenient carriage return point with the hot zone.

When a space code is indicated by the test associated with the diamond 1505, in the manner indicated by the arrow 1507, annotated TRUE, the program next tests in the manner indicated by the diamond 1508 as to whether or not the space expand flag stored in register location G8-7 has been set. If expand has been set we are dealing with an expanded space code which is normally used to align subsequent character information and hence the same may not be employed for carriage return purposes as the alignment function thereof would be lost. Accordingly, as indicated by the arrow 1509 annotated TRUE, should the expand key be depressed, the space code previously identified is to be treated as an expanded space and hence must be honored. Thus, the calling routine is returned to for processing of the expanded space code in the traditional manner while a review of subsequent characters must be employed within the text zone to ascertain an appropriate return point. If the expand key was not depressed, in the manner indicated by the arrow 1510 annotated FALSE, the identified space code is not an expanded space code and hence may be employed for carriage return purposes. Therefore, under these conditions, the space code loaded in register location G7 is converted to a carriage return character in the manner indicated by the rectangle 1499. Thereafter, as indicated by the arrow 1500, a return to the calling routine denoted by the oval flag 1453 is initiated so that the carrige return code now loaded in register location G7 may be appropriately processed and the carriage at the printer unit automatically returned. Accordingly, it will be seen that within the hot zone any hyphen code which occurs is printed, inserted within the read/write buffer and thereafter a carriage return character is inserted so that an appropriate carriage return operation is initiated within the hot zone. Similarly, whenever a space code is detected, a carriage return character is substituted therefor, unless the expand mode has been set whereupon that space code must be honored. Thus, in the hot zone, each character presented for processing is inspected as to whether or not it constitutes a suitable location for the insertion of a carriage return character and once an appropriate character has been identified, a carrige return character is automatically inserted under program control to cause the printer unit to automatically execute a carrige return operation without operator intervention.

JUSTIFICATION

Referring now to FIGS. 23A - 23C, there are shown flow charts illustrating the programmed sequence of operations relied upon to achieve justification of the right hand margin of printed document information in accordance with the teachings of the instant invention. More particularly, FIG. 23A depicts the normal justification routine, FIG. 23B illustrates the justification breakpoint analysis subroutine and FIG. 23C depicts the justify help routine employed for cases where justification may not be achieved without operator intervention. In justify mode operations, the object is to cause the printing of line information in such manner that each line ends precisely at the right hand margin defined. This accomplished, in essence, by translating character information to be printed from the read only buffer 36 to the read/write buffer 35 in such manner that a line of information representing the appropriate length of character information for printing is accumulated in the read/write buffer 35. When the correct length of character information has been inserted into the read/write buffer 35, the printing of the line occurs in such manner tht inter-word spaces are varied under program control to achieve line termination precisely at the right hand margin. The width of the spaces employed in printing of a given line may vary between the minimum or maximum line spaces set by the operator, those standardized in this mode of operation, or to a greater degree should the operator desire to release the upper limit imposed. However, for a given line of information to be printed, the length of the spaces employed will only vary by one unit wherein the larger spaces are utilized at the beginning portions of the line printed and the smaller spaces are utilized in the remaining portions of the line. Thus, in essence, what here occurs, is that an appropriate length of data is accumulated by reading character information from the read only buffer 36 to the read/write buffer 35. As each character is transferred, it is analyzed and its width is accumulated in a register location with space codes being separately noted and counted. Once the width of data accumulated plus the number of spaces times the minimum space code length defined exceeds the length of the line desired i.e., the right hand margin minus the left hand margin, the system backs the contents of the read/write buffer 35 up to a point just before the next breakpoint of that line which may typically take the form of a space code. As backing up occurs, the weight of the characters through which backing up is initiated is subtracted from the accumulated character length information. Thereafter, the length of character information thus obtained is subtracted from the total length of the line being printed which yields a result corresponding to the displacement distance to be distributed over the number of space codes in the line. The number of space codes accumulated is divided into this amount to yield a displacement distance equal to the smaller number of space spaces employed for that line and a remainder representing the number of initial space codes in the line whose displacement is to be increased by one unit over the displacement defined for the smaller space codes employed. If both the minimum space widths to be employed and the enlarged space codes fit within the maximum and minimum space codes defined by the operator or the standards to be employed, the line is printed in a justify format and remaining character information in the read only buffer is used for the beginning portion of the next line. However, if justification can not be achieved employing spaces within the limits defined by the system or the operator, a help routine as set forth in conjunction with the flow chart of FIG. 23C is implemented. In this manner, the justify mode of operation acts to cause lines of prerecorded information to be printed in such manner that each line is precisely terminated at the right hand margin defined unless earlier termination is mandated by a paragraph and/or the like.

Referring now specifically to FIG. 23A, there is shown a highly simplified flow chart of the overall justification routine employed within the instant invention. The flow chart illustrated in FIG. 23A is entered at a location corresponding to the oval flag 1515 once the justify mode has been established by the operator and thereafter, keyboard information has been entered to cause processing to shift from the idle loop through a keyboard analysis and execution routine to the justify routine illustrated in FIG. 23A. Once the justify routine illustrated in FIG. 23A is entered at the location corresponding to the oval flag 1515, the system initially tests, as indicated by the diamond 1516, whether the subsequent character inserted represents the justify key. If the justify key has been depressed by an operator subsequent to the establishment of the justify mode of operation, as indicated by the arrow 1517, annotated YES, it will be apparent that an instruction is being issued at the keyboard to release the justify mode as operation within this mode has already been established. Thereafter, as indicated by the rectangle 1518 and the arrow 1519, the justify mode is turned off by re-setting the flag associated therewith in register location G9-2 and a return to the idle routine at idle point 3 is initiated in the manner indicated by the oval flag 1520.

If the test for the justify key code indicated by the diamond 1516 is negative, as indicated by the arrow 1521 annotated NO, the system then tests in the manner indicated by the diamond 1522 whther or not the character code inserted is a justify limit code, entered through a depression of the code key and justify key in the manner described in connection with the keyboards illustrated in FIGS. 9A and 9B. If the test indicated by the diamond 1522 produces an affirmative result as indicated by the arrow 1523, the justify limit settings maintained in register locations G5-7 for the lower limit and G8-5 - G8-0 for the upper settings are appropriately modified to conform with the new settings established and thereafter, as indicated by the arrow 1525 and the oval 1520, the idle routine is returned to so that the settings are modified in the same manner as if the justify mode were off and thereafter a return to the idle routine occurs.

When the test indicated by the diamond 1522 produces a negative result, in the manner indicated by the arrows 1526 annotated NO, the character being processed is next tested in the manner indicated by the diamond 1527 to ascertain whether or not it comprises an ERASE, RECORD, TRACK SEEK, SEARCH or HEAD STEP character which may be executed without the purview of the flow chart illustrated in FIG. 23A. When the result of the test indicated by the diamond 1527 is affirmative, as indicated by the arrow 1528 annotated YES, the identified function is executed in the manner indicated by the rectangle 1529 and thereafter, the idle routine is returned to in the manner indicated by the arrow 1530 at the oval flag 1520.

Once propriety tests associated with the diamonds 1516, 1522 and 1527 have been completed, and a negative result has been obtained therefrom as indicated by the arrows 1521, 1526 and 1531 annotated NO, the program tests whether or not an action key which is acceptable to the justify mode of operation has been depressed. Thus, as indicated by the diamond 1532, the character being processed is analyzed to ascertain whether or not it comprises an automatic or paragraph action key insertion. As these are the only two action keys acceptable for justify mode operations, a negative result, as indicated by the arrow 1533 causes an error indication to be provided to the operator and a return to the idle loop in the manner indicated by the oval flag 1534. Furthermore, when an acceptable action key has been depressed, as indicated by the arrow 1535 annotated YES, the system then tests to ascertain whether or not all the requisite conditions for the implementation of processing under the action key depressed have been met in the manner indicated by the diamond 1536. Typically, for the depression of an automatic or paragraph action key, the test associated with the diamond 1536 would be those required to ascertain if a media has been loaded, the play mode has been established therefor and the like. If the test indicated by the diamond 1536 produces a negative result, as indicated by the arrow 1537 annotated NO and the oval 1534, an error indication is provided to the operator to indicate that all conditions precedent to this mode of operation have not been established and a return to the idle loop is initiated. However, if the test indicated by the diamond 1536 produces an affirmative result as indicated by the arrow 1538 annotated YES, the automatic or paragraph action bit flag is set in register locations G8-3 or G8-2 respectively, in the manner indicated by the rectangle 1539 and thereafter, actual processing within the main body of the justify program is initiated in the manner indicated by the arrow 1540.

Once the main body of the justify routine is entered, the program acts, as indicated by the rectangle 1541, to perform general clean up functions prior to actual processing. Thus, as indicated by the rectangle 1541, any deferred escapement which may be pending is executed and if the tab counter is opened, any tabs which are necessary are inserted therein. Thereafter, as indicated by the rectangle 1542, the next character to be processed is fetched from the RO buffer and it should be noted that when the last character in the read only buffer is reached, a new block of data is read thereinto from the prerecorded media loaded. Once a character is actually fetched in the manner indicated by the rectangle 1542, actual processing of information to be printed in a justified manner may begin. Therefore, as indicated by the diamond 1543, the character fetched is tested to ascertain whether or not the same is a breakpoint character as defined for the purposes of the justification routine. The breakpoint characters are listed in FIG. 23A as follows:

| | |
|---|---|
| Tab (provided the tab counter is opened) | Stop Code (either transferrable or non-transferrable) |
| Precedented Tab | Format Code |
| Carriage Return | Centering Code |
| Special Carriage Return | Eject Code |
| Precedented Carriage Return | End of Record Code |
| Space | Block Mark Code |
| Hyphen | First Line |
| Precedented Hyphen | |

If none of these breakpoint characters are present, processing within the main portion of the justify routine illustrated in FIG. 23A is continued and such processing will take one of three essential forms. Thus, any characters which should be skipped for the purposes of justification are skipped. Printing characters are transferred from the read only buffer to the read/write buffer and their width is accumulated as each transfer occurs and specialized function characters are appropriately treated so that they are preserved, immediately executed or cause the program to exit. It should be noted however, that while the width of character information to be justified is here accumulated and effectively recorded within general purpose register locations H4 and H5, the number of spaces encountered are here not treated as they would comprise a defined breakpoint and hence, would result in a branching as a result of the test indicated by the diamond 1543.

Accordingly, when no breakpoint is present in the manner indicated by the arrow 1544, the program next tests in the manner indicated by the diamond 1545 whether or not a tab or track link character has been fetched. If a tab is present, an inspection of the list of breakpoint characters will reveal that the tab counter is closed and hence this tab should be skipped under the rules for tab control imposed by the instant invention as processing is not occurring at the first line of a paragraph. Similarly, a track link is skipped as this code relates to a formatting operation which is ignored in the justify mode of operation. Therefore, if a positive result is indicated from the test for a tab or track link imposed by the diamond 1545, a return of the program, as indicated by the arrow 1546 annotated YES, to the fetching step associated with the rectangle 1542 is initiated so that the tab or track link character identified is skipped and the next character is fetched for processing in this manner.

If no tab or track link character is present in the manner indicated by the arrow 1547 annotated NO, the program next tests for the presence of an immediately executable character in the manner indicated by the diamond 1548. Immediately executable characters, as listed in FIG. 23A, comprise:

| | |
|---|---|
| Search Code | Eject Code |
| Switch Reader Code | Block Mark Code |
| Switch and Search Code | End of Record Code |
| Repeat Code | Switch and Skip Code |

The immediately executable characters tested for the manner indicated by the diamond 1548, are codes which for one reason or another require that processing of character information from the read only buffer terminate and thus processing occur in another manner. For instance, in the case of a switch reader code, the readers must be switched and new information from the alternate reader loaded into the read only buffer. Thus, this code must be immediately executed because the remaining information in the RO buffer is not to be employed. Thus, as indicated by the arrow 1549 annotated NO, if no immediately executable character is present, a character which is to be printed or similar other character information having a width which must be accumulated for purposes of justifying the instant line of information being processed is present. Therefore, as indicated by the rectangle 1550, the character being processed is stored in the read/write buffer 35 and the consumed space or the length of the accumulated text for the line being justified is updated in register locations H4 and H5 to reflect the width of the charactr being processed. This width, in proportional spaced printing operations is obtained from the printer data ROM in the manner described above while for ten pitch or twelve pitch printing operations, the constant values associated therewith are added to the register locations H4 and H5 so that the width of character information to be printed is recorded therein. The register location H4 is employed for the low order information while register location H5 is relied upon for high order information. Thereafter, as indicated by the arrow 1551, the program step associated with rectangle 1542 is returned to so that the next character may be fetched and similarly processed. From this portion of the program, it will be appreciated that if a series of printable characters associated with a word or the like are processed, the entire width of the word will be accumulated in register locations H4 and H5 before the loop associated with rectangles 1542 and 1549 as well as diamonds 1543, 1545, and 1548 is branched from in response to encountering a space code.

If the test indicated by the diamond 1548 is affirmative, in the manner indicated by the arrow 1552 annotated YES, the requisite conditions to ascertain whether or not the function associated therewith may be executed in fact are tested for in the manner indicated by the diamond 1553. Thus for instance, if a switch code were detected, the testing indicated by the diamond 1553 would include testing to ascertain whether both record media stations are loaded so that the switch function between records could in fact be executed. If the result of the testing indicated by the diamond 1553 is negative, as indicated by the arrow 1554, annotated NO, any text which had been accumulated in register locations H4 and H5 is printed in a left justified manner, in the manner indicated by the rectangle 1555 and the idle routine is returned in to the manner indicated by the oval flag 1520. This occurs, as will be appreciated by those of ordinary skill in the art, so that whenever an immediately executable function is present which can not effectively be executed, the justification routine must exit since processing can no longer be continued. Therefore, in an effort to provide appropriate clean up operations prior to exiting in response to an improperly entered or improperly preconditioned function code, any data already transferred into the read/write buffer will be printed flush to the left hand or indented left hand margin defined so that no unprocessed data remains in the read/write buffer and thereafter exiting to the idle routine occurs.

However, if the test indicated by the diamond 1553 is indicative that the immediately executable function identified in association with diamond 1548 may in fact be executed in the manner indicated by the arrow 1556 annotated YES, the routine next tests as indicated by the diamond 1557 whether or not the immediately executable character identified is a block mark, end of record or eject code. The detection of any of these characters, as indicated by the arrow 1558 annotated YES, will require that the function associated therewith be executed and thereafter that the routine be terminated as an end of prerecorded data on the media being played back has effectively been defined. Therefore, as indicated by the rectangle 1559, the block number is updated if appropriate or the card is ejected and thereafter, processing is returned to the idle routine in the manner indicated by the oval flag 1520.

When no block mark, end of record, or eject code is identified by the test indicated by the diamond 1557, as indicated by the arrow 1560 annotated NO, the immediately executable character identified is executed in the manner indicated by the rectangle 1561 and thereafter, as indicated by the arrow 1562, the loop initiated by the rectangle 1542 is returned to so that the next character may be fetched and analyzed in the manner set forth above. Thus it will be appreciated by those of ordinary skill in the art that when character information is being processed within the portion of the justify program associated with the loop formed by the rectangles 1542 and 1550 as well as the diamonds 1543, 1545 and 1548, character information will be evaluated in such a manner that character codes representing adjacent printable characters will have their widths accumulated for justification purposes within register locations H4 and H5 as indicated by the step associated with rectangle 1550 until a breakpoint is actually defined by the test associated with the diamond 1543. Conversely, tabs and track link codes are skipped if the tab register is closed and immediately executable functions are executed or cause branching from the routine. Accordingly, this portion of the routine essentially acts to accumulate character width information exclusive of special instances until a breakpoint is defined by the test indicated by the diamond 1543.

When a breakpoint is identified by the test indicated by the diamond 1543, as indicated by the arrow 1563 annotated YES, the routine branches to the breakpoint analysis routine indicated by the dashed rectangle 1564 in the manner indicated. The breakpoint analysis routine indicated generally by the dashed rectangle 1564 is set out in detail in conjunction with FIG. 22B and hence will be discussed in detail in associated with this figure. However, at the outset it should be appreciated that the detection of a breakpoint by the test indicated by the diamond 1543 necessitates detailed analysis as the same presents a condition which may be determinative of any additional processing required in the line of information being assembled for justification purposes as well as for the subsequent justification and printing thereof. More particularly, it will be appreciated from the description of the justification loop associated with the rectangles 1542 and 1550 as well as diamonds 1543, 1545 and 1548 that width information for character information to be printed and justified has been accumulated in register locations H4 and H5 and therefore the detection of a breakpoint presents a condition at which assembly of the line being justified may be terminated and the accumulated information printed in a justify mode provided the information so far assembled approaches the length of a line defined between the right and left hand margins. Conversely, if the width information accumulated in register locations H4 and H5 does not approach the line length defined by the margin set, the nature of the breakpoint detected must be further analyzed to ascertain whether or not the breakpoint ends a paragraph in which case this line must be terminated in any event or whether the same may be merely treated as a space code and under these conditions the presence of a space whose width may be suitably altered, to accommodate the justify mode of operation occurring, noted. This analysis is considered in detail, in conjunction with FIG. 23B.

Therefore, referring specifically to FIG. 23B, it will be seen that the justified breakpoint analysis routine whose flow chart is shown therein is entered at the location indicated by the oval flag 1565 any time the test for a breakpoint indicated by the diamond 1543 produces the affirmative result indicated by the arrow 1563. When the breakpoint analysis routine is entered at the location indicated by the oval flag 1565, the program initially tests in the manner indicated by the diamond 1566 whether or not too much text has been accumulated. This test is conducted, by testing whether or not the data width recorded in register location H4 and H5 plus the data width of the minimum space width times the number of spaces recorded in register location H6, in a manner to be seen below, exceeds the line length defined by the right hand margin minus the left hand margin. If this condition obtains, in the manner indicated by the arrow 1567 annotated YES, processing of information to be justified for a given line has gone too far. Therefore, as shall be discussed hereinafter, the length of accumulated information must be foreshortened in the manner to be described hereinafter, and once an appropriate length has been obtained, space size may be determined and the actual printing of the line in a justified format may be initiated. However, if the test indicated by the diamond 1566 is negative, in the manner indicated by the arrow 1568 annotated NO, the breakpoint must be further analyzed to ascertain whether or not the same defines an end of a paragraph ("end of paragraph" in this context includes breakpoint requiring preceding text to be printed before analysis can continue, i.e., tab, stop, etc.) or whether it merely need be treated as a space whose presence is at this juncture simply recorded in register location H6 and thereafter a return to the main routine illustrated in FIG. 23A initiated.

When the test indicated by the diamond 1566 is negative in the manner indicated by the arrow 1568 annotated NO, the program tests, in the manner indicated by the diamond 1569, whether the breakpoint represents an end of paragraph. Breakpoints representing an end of paragraph, as listed in FIG. 23B, correspond to the following characters:

| | |
|---|---|
| Tab(if the tab counter is open) | First Line |
| Precedented Tab | Center |
| Two or More Carriage Returns or Special Carriage Returns | Stop (transferrable or non-transferrable) |
| Precedented Carriage Return | Format Code |

A comparision of the breakpoint characters defining an end of paragraph with the complete list of breakpoint characters listed in FIG. 23A together with an exclusion of those breakpoint characters which may be treated as immediately executable characters in the manner associated with diamond 1548, will readily reveal that the only breakpoint characters which remain are those which may be treatable as a space code or are printed as is using the character modification. routines set forth in conjunction with margin control analysis within the text zone. Therefore, if the test for an end of paragraph breakpoint indicated by the diamond 1569 is false in the manner indicated by the arrow 1570 annotated NO, the text zone character thereby identified is modified, under text zone margin control routines in the manner indicated by the rectangle 1571 so that characters such as precedented hyphens or space codes and the like are maintained in their present form while characters such as plain hyphens, carriage return characters and the like are dropped or translated into space code characters. Thereafter, as indicated by the diamond 1572, the character is tested to ascertain whether or not it corresponds to a space code. If a space code is present as indicated by the arrow 1573 annotated YES, the count of variable spaces maintained in register location H6 is incremented in the manner indicated by the rectangle 1574 and thereafter, as indicated by the arrow 1575 and the oval 1576, the calling routine is returned to. Conversely, if the test for a space code conducted in the manner indicated by the diamond 1572 is false as indicated by the arrow 1577 annotated NO, the resulting character, as indicated by the rectangle 1578 is tested to ascertain whether it corresponds to a printable character and if a printable character is present, the character is loaded into the read/write buffer and the consumed space being accumulated in register locations H4 and H5 are incremented to reflect the width thereof. Thereafter, as indicated by the arrow 1579 and the oval 1576, the calling routine is returned to.

Thus it will be seen that when processing occurs through the justify breakpoint analysis routine indicated by the diamonds 1566 and 1569 as well as the rectangle 1571, a variable space breakpoint is either identified and its presence recorded in register location H6 or a printable character is transferred and width information in register locations H4 and H5 is incremented and thereafter, the calling routine is returned to. Accordingly, it will be seen that for these conditions, insufficient character width has been accumulated to cause the printing of a justified line of information. As this is the only location from which a return to the calling routine is initiated, the few remaining items not yet considered in FIG. 23A will now be discussed. Thus, when the main routine depicted in FIG. 23A is returned to in the manner indicated by the oval 1576 illustrated in FIG. 23B or by the arrow 1580 illustrated in FIG. 23A, the main routine acts to test the resulting character in the manner indicated by the diamond 1581 to ascertain whether or not the centering bit has been set. If the centering bit maintained in general purpose register location G6-6 is not set, as indicated by the arrow 1582 annotated NO, the main portion of the basic justify routine is re-entered and after clean up in accordance with the steps indicated by the rectangle 1541 occurs, the fetching of additional character information is continued in the manner indicated by the rectangle 1542 and the widths thereof are recorded in register locations H4 and H6 while breakpoints are detected and analyzed in the manner described above in conjunction with FIG. 23A so that the presence of spaces which may be accorded a variable width are recorded in register location H6. Similarly, if the test indicated by the diamond 1581 is affirmative, in the manner indicated by the arrow 1583, analysis and printing of centered text occurs in the programmed manner indicated by the hexagon 1584 and thereafter the main portion of this routine is returned to in the same manner as if no centering bit occurred. The treatment of centered text is discussed as a separate program associated with the flow charts illustrated in FIGS. 25A and 25B.

Returning now to FIG. 23B, the portion of the breakpoint analysis flow chart therein associated with the detection of a breakpoint defining an end of paragraph will now discussed. When a breakpoint defining an end of paragraph is detected by the test indicated by the diamond 1569 in the manner indicated by the arrow 1586 annotated YES, it will be apparent that all character information which has been transferred into the read/write buffer should be printed from the left hand margin defined because, as an end of paragraph has occurred, justification with the right hand margin should not occur. Therefore, as indicated by the rectangle 1587, all textural information which has been transferred to the read/write buffer 35 is printed from the left hand margin or the indented left hand margin as may have been defined by the tab control mode of operation employed within the instant invention. Thereafter, as indicated by the arrow 1588 and the diamond 1589, the record flag located in register location G9-5 is tested to ascertain whether or not record is on. If the record flag is on as indicated by the arrow 1590 annotated YES, the contents of the read/write buffer are recorded on the media up to a carriage return or to the end of data in the manner indicated by the rectangle 1591. Thereafter, as indicated by the rectangle 1592, the read/write buffer is cleared up to and including the carriage return character, the read only buffer is rolled back as far as possible to correspond to text transferred to the read/wite buffer and thereafter the read/write buffer is wiped out to the point that it corresponds to the read only buffer preparatory to the accumulation of new line information to be justified. Similarly, if record is not on in the manner indicated by the arrow 1593 annotated NO, the step indicated by the rectangle 1592 is again performed; however, recording is omitted. Thus, at the completion of the step indicated by the rectangle 1592, it will be seen that the read only buffer had its pointer displaced to a location to data which corresponds to that not printed in the previous line while the read/write buffer has been cleared so that new character information for the next line to be justified may be accumulated therein. Thereafter, the program tests in the manner indicated by the diamond 1594 to ascertain whether or not the stop key has been depressed. As aforesaid, the stop key is only operative during a justify mode of operation to terminated processing at a point at the end of a line after printing has occurred. This is here required because no printing during a justify mode operation will occur until the end of a line is defined whereupon the entire line is printed at once. Thus, a stop key depression is not entered until the line has been printed so that the operator is provided with an indication as to where processing has terminated. If the stop key has not been depressed as indicated by the arrow 1595 annotated NO, a return to the calling routine depicted in FIG. 23A occurs in the manner indicated by the oval 1576. However, if the stop key has been depressed as indicated by the arrow 1596 annotated YES, the read/write buffer is tested in the manner indicated by the diamond 1597 to ascertain whether or not the same is empty. If the read/write buffer is not empty in the manner indicated by the arrow 1598 and the oval flag 1576, the main routine illustrated in FIG. 23A is returned to so that this information may be processed. However, if the read/write buffer is empty in the manner indicated by the arrow 1599, the stop key entry is here honored through a return to the idle loop in the manner indicated by the oval flag 1520 where the stop flag is actually executed.

Thus it will be appreciated that under conditions where a breakpoint defining an end of a paragraph is defined, whatever information has been transferred to the read/write buffer is printed in a left justified mode, i.e, flush from the left hand margin and thereafter, if applicable, that information is recorded on a record media. Thereafter, the read/write buffer is cleared, the read only buffer is rolled back so as to point to only information which is to be transferred in the formation of a new line of information to be justified and at this juncture return to the main routine will occur or alternatively, if the stop key has been depressed, the same will be honored.

The foregoing discussion of the breakpoint analysis flow chart for justify mode operations, as illustrated in FIG. 23B, has assumed that an insufficient length of data has been accumulated to cause justification of a line of information at the right hand margin to operate. However, when a sufficient length of data has been accumulated as indicated by the arrow 1567 annotated YES, it will be apparent to those of ordinary skill in the art that the width of data accumulated in register locations H4 and H5 plus the number of variable spaces indicated in register location H6 multiplied by the minimum space width therefor defined exceeds the line length defined by the right and left margin set. Under these conditions, as indicated by the arrow 1567, the read only buffer is rolled back before the last breakpoint transferred in the manner indicated by the rectangle 1600 so that typically it would be rolled back to the end of the previous word inserted therein as the current breakpoint caused the branch operation to enter the analysis loop being discussed. Thereafter, as indicated by the rectangle 1601, the read/write buffer is returned to a point prior to the last breakpoint inserted and all textural character information returned through is subtracted from register locations H4 and H5. Thus typically, if ten words had been transferred into the read/write buffer and the width information for the characters therein had been recorded in register locations H4 and H5, the steps associated with the rectangles 1600 and 1601 would cause both the read only and read/write buffers to be returned to the end of the ninth word therein while the data width information loaded in registers H4 and H5 associated with the tenth word is subtracted together with the variable space indication in between the ninth and tenth words recorded in register location H6. Furthermore, as the branch operation associated with arrow 1567 occurred because the data width information in register locations H4 and H5 plus the number of variable spaces times the minimum space width recorded in H6 was too long to fit between the right and left margins defined, it will be seen that the data width now present in H4 and H5 plus the number of variable spaces recorded in register location H6 times some space width which probably exceeds the minimum space width will now fit between the right and left margins defined. Therefore, as indicated by the rectangle 1602, the width of spaces to be employed in justifying the line of information now present in the read/write buffer is calculated. This is done in essence by subtracting the distance for character information loaded in register locations H4 and H5 from the distance between the right and left margins. The difference therebetween will yield a discrete displacement quantity which is then divided by the number of variable spaces counted in register location H6 plus some remainder which may be zero (0). The value of the justified spaces is inserted in register location H5 while the remainder is employed to add one unit to each of the beginning spaces in the line to be justified and thus corresponds to the number of larger spaces, i.e, a justified space plus one unit, which is loaded in register location H4. In justifying, the larger spaces are employed in the beginning portion of the line printed while the smaller or justified spaces determined are employed in the right most portion of the line. Of course, should no remainder result, all the spaces calculated are those having the justified width determined and hence no entry for larger spaces would be inserted into register location H4.

Once the width of the justified spaces as well as the number of larger spaces has been determined through the calculation defined by the rectangle 1602, the value for the justified and larger spaces is tested, in the manner indicated by the diamond 1603 as to whether or not they exceed the maximum space width defined for the pitch or proportional spaced mode of printing selected as determined either by the standard maximum employed or modified maximum limit inserted by the operator under program control. This upper space limit, it will be recalled, is stored in register locations $G8_4$ – $G8_0$ and hence since the program steps associated with rectangles 1600 and 1601 guarantee that the minimum space width is exceeded, if the test indicated by the diamond 1603 is affirmative, automatic justification under program control may be implemented. Thus, for instance, if printing is to occur in a proportionally spaced mode and the standard justification limits are employed, so long as neither the larger nor smaller space widths calculated through the step indicated by the rectangle 1602 do not exceed the width of 7 units, the justification of the line information accumulated may be automatically performed under program control. Under these conditions, as indicated by the arrow 1604 annotated YES, the breakpoint causing entry into this routine is tested in the manner indicated by the diamond 1605 to ascertain whether or not the same comprises a hyphen breakpoint. If a hyphen breakpoint is present as indicated by the arrow 1606 annotated YES, the hyphen in inserted into the read/write buffer in the manner indicated by the rectangle 1607, and thereafter, the space width is recalculated. The recalculation of the space width as indicated by the rectangle 1607 is here necessary since an additional character is inserted into the read/write buffer for the purposes of printing; however, as the width associated with the hyphen inserted is relatively minor and is evenly distributed over all the space codes employed in the line if no larger spaces are employed or removed first from the larger spaces relied upon, no significant change in the parameters of the justified line results. Thereafter, as indicated by the rectangle 1608, a carriage return is inserted into the read/write buffer so as to return the carrier upon printing of the justified line of information.

If no hyphen is detected by the test indicated by the diamond 1605, as indicated by the arrow 1609 annotated NO, the program directly proceeds to an insertion of a carriage return into the read/write buffer in the manner indicated by the rectangle 1608. Thereafter, as indicated by the rectangle 1610, the line of justified information is printed from the read/write buffer up to and including the carriage return in a manner so as to employ the spaces defined by the calculation step associated with rectangle 1602 and now stored in register locations H4 and H5. Furthermore, the printing of this information occurs in a manner such that the larger space widths are employed first, register location H4 being decremented as each space code is utilized and upon a decrementing of register location H4 to ZERO (0), the remaining space codes required in the line are printed employing the width defined by register location H5. Thus in this manner, the line of justified text as calculated above is printed in the manner indicated by the rectangle 1610.

After a line of justified text is printed in the foregoing manner, the information is processed in the manner associated with the diamond 1589 and the rectangle 1591 so that recording of this information takes place if appropriate and thereafter, the read/write buffer is appropriately cleared and the read only buffer backed up in the manner indicated by the rectangle 1592 so that each register is placed in an appropriate condition for calculating and accumulating information to be justified in the next line to be printed. Thereafter, if the stop key has not been depressed, the program returns to the basic justify routine illustrated in FIG. 23A while if the stop key has been depressed, this command is honored at the end of the line and the idle loop is returned to. When an automatic return to the flow chart illustrated in FIG. 23A occurs under these conditions in response to the oval flag 1576, it will be appreciated by those of ordinary skill in the art that character information is generally fetched and the width thereof accumulated together with periodic branching into the breakpoint analysis routine illustrated in FIG. 23B to analyze breakpoints and hence count variable spaces until a sufficient length of data has been accumulated for the justify operation associated with the steps indicated by the rectangles 1600 – 1602 to again operate whereupon the next line of information to be justified is automatically processed.

In the discussion of the test for space width not exceeding the upper limit as indicated by the diamond 1603, it was assumed that the width calculated in the manner indicated by the rectangle 1602 produced larger spaces at a justify space width which fell within the maximum limit established. Thus in the case of a standard setting for proportionally spaced printing mode, this maximum width is set at seven units while the same may be varied under operator control up to a value of 50 units. Under conditions where the last word through which roll back of the RO and RW buffers together with width subtaction in register locations H4 and H5 occurs for a rather lengthy word in the manner indicated by the rectangles 1600 and 1601 and a rather small maximum limit is employed for the space width setting, it is possible that the tests indicated by the diamond 1603 will produce a negative result as indicated by the arrow 1611 annotated NO. Under these conditions, a justify help routine, indicated by the dashed rectangle 1612 will be entered in the manner indicated by the arrow 1611. The justify help routine is detailed in connection with FIG. 28B as described hereinafter. However, at this juncture, it is sufficient to appreciate that in the justify help routine operator assistance is required to complete the justification of the line being processed and thereafter, as indicated by the arrow 1613, the main routine is returned to for insertion of a carriage return, printing of a line of justified text any necessary recording of the justified line of data and thereafter the execution of the stop routine for a return to the basic justified flow diagram illustrated in FIG. 23A. Essentially, the justify help routine acts when entered to displace the carriage to an extreme right position far exceeding the margin where a scrap sheet of paper is normally inserted by the operator. This position corresponds to column position 138 at the printer. Thereafter even though no data has been printed for the line being justified, the word rendering justify impossible with the upper limit imposed is printed in its entirety and a slash is placed after the last character position for which justification is possible under the lower limits set into the system. At this juncture, the operator is provided with several choices as to the manner in which justification for the problem line may be completed. For instance, the operator may backspace from the slash point to any character position in the word printed and insert a hyphen character. Thereafter, the carrier will automatically return and the line of justified information will be printed with the problem word being printed up to and including the hyphen while the remaining portion thereof is employed to begin the next line to be justified. Alternatively, the operator may hit the automatic or paragraph action keys which act to effectively release the upper space maximum limit previously set into the system for this line of information. Under these conditions, the line of justified information may be printed automatically with the problem word omitted and employed as the first word of the next line to be justified. These two options are the most commonly employed operator actions in response to the initiation of the justify help routine indicated by the dashed rectangle 1612. Remaining available operator options will be described in conjunction with this routine per se.

Referring now to FIG. 23C, a simplified flow chart for the justify help routine generally indicated by the dashed block 1612 in FIG. 23B is illustrated in detail. The justify help routine illustrated in FIG. 23C is entered at the location indicated by the oval flag 1615. Upon entry of this routine, the help bit is set, the carrier position of the printer is saved and thereafter the carrier is moved to a scratch pad area associated with column 138 at the printer in the manner indicated by the block 1616. The help bit is set as a flag in register location G5-1 which is the same flag position employed for margin control single cycle modes of operation. However, as a margin control mode and a justify mode are mutually exclusive, the dual use of this position presents no problem. Additionally, the carrier position at which the printer resides is saved in register locations HE and the upper half of of spaces, the printer may be displaced to its initial position whereupon the character information now in a justified format may be printed. The scratch pad area to which the printer is displaced is an area which is sufficiently removed from the document being prepared in the justify mode of operation, so that an operator may conveniently load a second sheet of paper thereat for scratch purposes. It is in this area that the printer acting under instructions issued during the justify help routine will print the word causing the problem to the automatic justification operation illustrated in FIG. 2B with a slash at a position representing the last character which may be justified with the minimum space widths defined. Thereafter, as indicated by the rectangle 1617, the last word in the read/write buffer is printed, the highest breakpoint in the word is calculated, the read/write buffer is aligned to that point and the carriage at the printer is displaced thereto so that a slash may be printed. The last word present in the read/write buffer is the word through which rollback was to occur in the step indicated by the rectangles 1600 and 1601 in FIG. 23B and it will be appreciated by those of ordinary skill in the art that under the terms imposed by the justify help routine illustrated in FIG. 23C this is the word which can not be broken due to the justify limits imposed. More particularly, the breakpoint at the end of the word marked a location at which too much text had been accumulated while the breakpoint preceding the word defined a location at which calculated space width exceeded the upper limit for space width set. Therefore, for the calculation associated with rectangle 1617, every character in the word is treated as a breakpoint and the system employs the minimum spaces available in calculating the character break in the word indicating the maximum point therein for which justification may be obtained. Once this point is calculated, the read/write buffer is aligned thereto, the carriage is displaced to this position at the printer unit and a slash is printed between characters in such manner that all characters to the left of the slash represent character information which may be included under maximum justification conditions for that line while characters to the right of the slash are not permissible under the justify minimum space limit imposed. However, as the program is aware that it is dealing within a word, the slash is positioned in such a location that if the operator there inserts a hyphen, the line may be justified. However, as the slash mark need not necessarily correspond to a syllable break, operator intervention is required to define the manner in which justification is to occur.

After the step indicated by the rectangle 1617 has been completed, as indicated by the arrow 1618, the program waits for the operator to intervene. Thus as indicated by the diamond 1619, the program tests for the entry of a keyboard entry. When no keyboard entry is detected as indicated by the arrow 1620, the test indicated by the diamond 1619 is looped back upon until a keyboard entry is actually detected in the manner indicated by the arrow 1621 annotated YES. When a keyboard entry is detected as indicated by the arrow 1621 annotated YES, the program tests the entry in the manner indicated by the diamond 1622 to ascertain whether or not the character entered is a space or precedented space code. If the results of the test indicated by the diamond 1622 are affirmative as indicated by the arrow 1623 annotated YES, the condition of the read/write buffer is tested to ascertain whether it is at the last character position in the manner indicated by the diamond 1624. If the read/write buffer is at the last character position as defined by the position of the slash and indicated by the arrow 1625 annotated YES, spacing in a forward direction is forbidden as the margin defined may not be exceeded. Accordingly, as indicated by the rectangle 1626 and the oval flag 1627, a buzzer is sounded and a return to the keyboard entry monitoring routine associated with diamond 1619 occurs. This has the effect of apprising an operator that the keyboard entry initially submitted was defective, will not be honored and hence that a new keyboard entry is required.

If the test indicated by the diamond 1624 is negative, as indicated by the arrow 1628 annotated NO, it is indicative that the pointer at the read/write buffer had been previously backed up through the entry of backspace codes or the like and hence a spacing forward operation is permitted. Therefore, in the manner indicated by the rectangle 1629, the read/write buffer is stepped forward by one character and thereafter, the character defined therein is tested to ascertain whether a printing character resides thereat in the manner indicated by the diamond 1630. If no printing character is present as indicated by the arrow 1631, the Help Wait Routine indicated by the oval flag 1627 is returned to whereupon the test indicated by the diamond 1619 again acts to monitor the keyboard for a new entry operation. However, if a print character is present, in the manner indicated by the arrow 1632 annotated YES, the carriage is displaced forward by one character location in the manner indicated by the rectangle 1633 and thereafter the wait routine associated with oval 1627 and diamond 1619 is re-entered in the manner indicated by the arrow 1634 as it is assumed that the operator is positioning the buffer and carriage prior to the entry of a hyphen code and hence, a code definitive of this operation must be awaited.

If the test for a space or precedented space code indicated by the diamond 1622 is negative in the manner indicated by the arrow 1635 annotated NO, the program next tests in the manner indicated by the diamond 1636 as to whether or not the keyboard entry represents the code associated with an automatic or paragraph action key. The insertion of these action codes, it will be recalled, instructs the program to disregard the upper space limits set for the line of information presently being justified and to cause the line information to be printed in a justified manner with the word which was printed in the manner indicated by the rectangle 1617 deleted and used instead as the initial word for the next line. Therefore, if the test indicated by the diamond 1636 is affirmative, as indicated by the arrow 1637 annotated YES, the read/write buffer is returned to the last breakpoint in the manner indicated by the rectangle 1638. This breakpoint, it will be recalled, is the same breakpoint to which rollback initially occurred in association with the step associated with the rectangle 1601 in FIG. 23B and hence corresponds to the same point for which the width calculation indicated by the rectangle 1602 resulted in space character width, which exceeded the upper limit defined. However, as the insertion of an AUTO or PARAGRAPH action code instructs the system to release the upper limit on the space code for this line, processing in this manner is now appropriate. Thereafter, as indicated by the diamond 1639, the character prior to the breakpoint is tested to ascertain whether or not it constitutes a hyphen in precisely the same manner in which this test was performed in the manner indicated by the diamond 1605 in FIG. 23B. If a hyphen is present as indicated by the arrow 1640 annotated YES, the hyphen is inserted into the read/write buffer in the manner indicated by the rectangle 1641 and thereafter, the carriage is returned from the scratch area to its initial point defined in register location HE and the upper half of H9 as was originally saved in the step associated with a rectangle 1616. However, if no hyphen is present in the manner indicated by the arrow 1643, the step of returning the carriage as indicated by the rectangle 1642 is immediately implemented. Thereafter, the width of spaces at this point is recalculated in the manner indicated by the rectangle 1644 in the same manner as was described in association with the rectangle 1602 in FIG. 23B and thereafter as indicated by the arrow 1645 and the oval flag 1646 the help routine is exited from and the FIG. 23B routine is returned to at a location indicated by the arrow 1613 in FIG. 23B. Thus it will be appreciated that whenever the AUTO or paragraph key is entered during the justify help routine illustrated in FIG. 23C, the upper limit on spaces employed for that line is released and justification of the line occurs in the same manner as would have resulted in association with FIG. 23B if the upper limit on spaces had not been exceeded in conjunction with the test indicated by the diamond 1603.

If the test for an auto or paragraph action key code indicated by the diamond 1636 is negative in the manner indicated by the arrow 1647 annotated NO, the program next tests for the entry of a hyphen code in the manner indicated by the diamond 1648. If a hyphen code is present in the manner indicated by the arrow 1649 annotated YES, the program next tests, as to whether or not a hyphen code may be inserted at this point without exceeding the upper and lower limits for the justify mode of operation established in the manner indicated by the diamond 1650. If the results of the test indicated by the diamond 1650 are affirmative in the manner indicated by the arrow 1651, annotated YES, the hyphen is inserted into the buffer, the carriage is returned to its initial point and the width of spaces is recalculated in the manner indicated by the steps associated with rectangle 1641, 1642 and 1644. Thereafter, the justify help routine is completed and hence a return to the calling routine occurs in the manner indicated by the oval flag 1646. However, when the test conducted for a legal hyphen, as indicated by the diamond 1650 is negative in the manner indicated by the arrow 1652 annotated NO, the help error buzzer routine indicated by the oval flag 1653 is entered. This routine, as noted by a commonly designated and annotated oval in the upper central portion of FIG. 23C will cause an error buzzer to sound in the manner indicated by the rectangle 1626 and thereafter, the help wait routine indicated by the oval 1627 is re-entered whereupon a monitoring of the keyboard is conducted in the manner indicated by the diamond 1619.

When no hyphen is detected by the test indicated by the diamond 1648, as indicated by the arrow 1654 annotated NO, the program next tests in the manner indicated by the diamond 1655, as to whether or not a code associated with a depression of the backspace key has been entered. When a backspace character code is detected in the manner indicated by the arrow 1656 annotated YES, the program next tests to see whether or not the read/write buffer is at the last breakpoint in the manner indicated by the diamond 1657. The last breakpoint, is the same breakpoint which caused this routine to be entered and that associated with the rectangle 1638; however, under the conditions associated with the test imposed by the diamond 1657, no release of the upper limit for the spaces has been mandated. Therefore, as backing up to the last breakpoint mandates a violation of the space size limits imposed, whenever the test indicated by the diamond 1657 is affirmative in the manner indicated by the arrow 1658 annotated YES, the error buzzer routine associated with the oval flag 1653 is entered whereupon a buzzer is sounded in the manner indicated by the rectangle 1626 and thereafter the keyboard is again monitored for a new character.

When it has been determined that the read/write buffer is not at the last breakpoint in the manner indicated by the arrow 1659 annotated NO, it is assumed that the operator is positioning the carriage prior to the insertion of a properly positioned hyphen. Therefore, as indicated by the rectangle 1660, the read/write buffer is stepped back by one character position. At this juncture, as indicated by the diamond 1661, the character pointed to in the buffer is tested as to whether or not the same comprises a printing character in much the same manner as was performed in association with the diamond 1630. If a negative result obtains as indicated by the arrow 1662, the keyboard monitoring routine indicated by the oval flag 1627 and the diamond 1619 is again returned to. However, if the test for a printable character is affirmative as indicated by the arrow 1663, the carriage is displaced backward through one character position in the manner indicated by the rectangle 1664 and thereafter in the manner indicated by the arrow 1665, the await help routine is returned to as it is assumed that either further backspace characters or an appropriately positioned hyphen are yet to be inserted.

If the test for a backspace code associated with diamond 1665 is negative as indicated by the arrow 1666 annotated NO, the program next tests to ascertain whether or not the character code inserted corresponds to that associated with a depression of the justify key in the manner indicated by the diamond 1667. If the justify key has not been depressed as indicated by the arrow 1668 annotated NO, the tests heretofore performed have exhausted all options available to the operator. Therefore, as indicated by the oval flag 1653, the error buzzer routine is entered whereupon the error buzzer is sounded to apprise an operator that some other action must be taken and thereafter the help wait routine indicated by the oval 1627 is initiated to again cause keyboard monitoring.

If the test for the justify character code indicated by the diamond 1667 is affirmative as indicated by the arrow 1669 annotated YES, it is indicative that the operator is attempting to turn off the justify mode of operations as none of the available options in the justify help mode of operation appear to have been selected. Under these conditions, the justify help routine depicted in FIG. 23C will attempt to clean up all partially completed processing prior to responding to the keyboard entry. Thus, as indicated by the rectangle 1670, the carriage at the printer unit is returned from the scratch area to the initial position for that line as stored in register locations HE and the upper half of register location H9. Thereafter, the RO buffer is rolled back from the RW buffer as far as possible and this portion of the RW buffer is cleared in the manner indicated by the rectangle 1671. This occurs, as will be appreciated by those of ordinary skill in the art because during translation of character information from the RO buffer to the RO buffer during the processing of accumulated character width information, certain character information undergoes modification in character codes during translation. Therefore, for such characters as are modified, the character content of the RW buffer will not correspond exactly to the content of the RO buffer. Therefore, the step associated with the rectangle 1671 causes the RO buffer to be rolled back to a point where the contents of the RO and RW buffers correspond; however, when a modified character is detected in the RW buffer correspondence between the two buffers no longer obtains and rollback must be terminated. Thereafter, as indicated by the rectangle 1672, what ever information remains in the RW buffer is printed in a left justified manner, i.e, flush to the left or in the indented left hand margin with standard spaces being employed intermediate words. Thus it will be seen that the step associated with the rectangle 1670 - 1672 effectively cause a restoration of conditions prior to the initiation of the justify routine for the instant line undergoing processing and whatever information can not be restored is printed so that the operator may resume processing in any mode desired without a hiatus due to information lost during an incompleted justify mode. Upon completion of the step associated with the rectangle 1672, the justify mode is terminated in the manner indicated by the rectangle 1673 and thereafter the idle loop is returned to in the manner indicated by the rectangle 1674.

Accordingly it wil be appreciated by those of ordinary skill in the art that the justify help routine illustrated in FIG. 23C is implemented only under such conditions wherein the normal justify mode of operation whose flow charts are depicted in FIGS. 23A and 23B may not automatically justify character information within the ambit of the minimum and maximum space code width selected. However, when the justify help routine is implemented, the word which can not be broken is printed at a scratch location with a slash indicating the maximum number of characters which may be printed in order for the line to be justified. Thereafter, the operator is provided with the option of increasing the maximum space limit for that line and having justification of the line automatically completed under program control through an insertion of either an auto or paragraph action key code. Alternatively, the operator may back up to any convenient syllable within the word printed at the scratch location whereupon a hyphen may be inserted and thereafter that line will be automatically justified within the limits for space width initially imposed. Finally, the operator has the option of turning off the justify mode of operation to complete processing in any manner desired and the justify help routine illustrated in FIG. 23 restores to the greatest degree possible conditions which obtain prior to the justification operation for the line under consideration and thereafter prints any remaining character information so no information will be lost due to processing.

HIGH SPEED PRINT MODE OF PLAYBACK

Referring now to FIG. 24, there is shown a flow chart illustrating the program sequence of operations relied upon in a high speed print mode of playback wherein printing takes place in a forward and reverse direction. To simplify the presentation of the flow chart illustrated in FIG. 24, non-justification modes of this fast print routine have been displayed, however, it will be appreciated that this flow chart is readily combinable with those illustrated in FIGS. 23A–23C to achieve this mode of playback with justification. The actual program for these routines however, are set forth in detail in Appendices A and B. The high speed printing routine which is hereinafter referred to as PRINT AUTO, when appropriately entered through a depression of the code and automatic keys at the keyboard, ideally operates to print alternate lines in the opposite direction at the fastest rate at which the printer is capable of operating in response to commands forwarded thereto. The alternation in direction of printing is highly advantageous since the execution of the displacement associated with a carriage return function is one of the most time consuming functions performed at the printer. Whenever this routine is entered, either directly or after a brief termination, the first line is always printed in a forward direction and thereafter the direction of printing is alternated unless either the character content of a line of information is such as to render printing in a reverse direction impractical or the termination of a preceding line which was printed in a forward direction is such that less carriage displacement is required to get to the beginning of the next line to be printed than the end point thereof. The manner in which this is achieved is set forth in detail below; however it is critical to an understanding of this routine to appreciate that no unnecessary intervals for displacement of the printer unit are incurred when the same can be avoided. Similarly, an additional time saving feature is the employment of a deferred space routine whereupon the escapement associated with a space code is effectively deferred so that it is added as part of the appropriate escapement for the next character to be printed. This is achieved by setting a flag each time a space code is encountered and adding the escapement associated therewith to that actually implemented for the printing of the next character to achieve total displacement through a single command cycle. This mode of deferring escapement acts to increase print speed by approximately 8%. In normal printing operations, the record media is normally read while a carriage return operation is being conducted at the printer unit and hence plenty of time consuming operation. However, as such intervals are not available during print auto modes of operation, the print auto routine implements printing in somewhat different manner than described above. More particularly, printing in a forward direction is initiated as a function of the contents of the read only buffer while printing in a reverse direction occurs from the read/write buffer. Typically, the read only buffer is loaded and thereafter a printer stack maintained within the RAM is loaded with all the print escapement and indexing commands required for the line to be printed at a data processing rate. This printer stack, which has both an input and output pointer is then unloaded through a monitoring routine wherein print and escapement information is forwarded to the printer in an independent manner at a rate corresponding to the fastest rate at which the printer may process such data.

Typically, the monitoring routine will monitor the status of the printer at intervals of approximately 3ms and each time a busy flag goes down, a new twelve bit print or escapement command will be forwarded thereto. When the contents of the read only buffer have been fully loaded into the stack, the next line of information is read into the read only buffer and thereafter translated to the read/write buffer if printing in a reverse direction is to occur. However, as printing of the previous line is occurring from the stack, the printer is still busy processing while the next line of information is read, analyzed and translated into the read/write buffer assuming a reverse print operation is to be conducted. When the contents of the printer stack have been fully unloaded indicating a completion of the printing operation for the previous line, the now fully loaded contents of the read/write buffer are loaded thereinto and the process is repeated. Therefore, in this manner, print or escapement information may be forwarded to the stack at the fastest rate at which it may be processed and then forwarded to the printer unit at a rate acceptable thereto. When all data has been processed from the buffer, the actual reading and analyzing of the next line of character information takes place independent of the operation of the stack while the printer and stack are busy processing the previous line of information. Thus, in this manner, extremely high printing rates may be obtained as the same are only limited by the capability of the printer in continuously processing information from a stack.

Referring now to the detailed flow chart illustrated in FIG. 24, the print auto routine illustrated therein is entered at the location indicated by the oval flag 1675 annotated Set Print Auto Flag (SEPA). As will be appreciated by those of ordinary skill in the art whenever a code plus auto entry is made at the keyboard, the keyboard input and analysis routine will identify this code and branch the same into the set print auto routine indicated by the oval flag 1675 in FIG. 24. This routine in essence, acts to ensure that all appropriate conditions for the enabling of the print auto routine are present and thereafter sets the print auto flag maintained in general purpose register location GA-3 whereupon the actual initiation of the print auto routine occurs.

More particularly, when the set print auto flag routine is entered in the manner indicated by the oval flag 1675, the program initially tests in the manner indicated by the diamond 1676 whether or not any of the edit or control modes which are inconsistent to a print auto routine have been set. Thus, the revise, margin control, continuous underscore, code print and record mode flags maintained in the general purpose registers are tested to ascertain whether or not the same have been placed in a set condition. If any of the flags have been set, as indicated by the arrow 1677, annotated TRUE, exiting back to the idle routine as indicated by the triangle 1678 occurs since the high speed print routine illustrated in FIG. 24 may not operate in conjunction with any of these editing or control modes of operation. If no inconsistent mode has been established as indicated by the arrow 1679, the program next tests in the manner indicated by the diamond 1680 whether or not the play mode has been established and the media loaded. The establishment of the play mode and a properly loaded media are prerequisites for operation in the print auto print routine as this is a play mode for prerecorded record information. Thus, as indicated by the arrow 1681 annotated FALSE, if either prerequisite is absent, the program returns to the idle loop in the manner indicated by the triangle 1678.

If the test indicated by the diamond 1680 is affirmative, as indicated by the arrow 1682 annotated TRUE, all the prerequisites for setting the print auto flag maintained in register location GA-3 have been met and therefore, in the manner indicated by the rectangle 1683, the flag is set under program control. Thereafter, as indicated by the rectangle 1684, the printer stack maintained in RAM locations 2C6 – 2EF and the read/write buffer 35 are cleared precedent to actually implementing a print auto forward printing routine. The printer stack maintained with the RAM is 42 characters deep and hence accommodates 21 characters of information. Thus it will be seen that in the print auto routine wherein printing occurs from the stack, the microprocessor may operate ahead of the printer by a full 21 characters to thus achieve time for performing other functions while the printer unit is kept in a high speed mode of operation by character information forwarded by the stack. The printer stack is provided with an input pointer maintained in RAM location 2C4 and an output pointer maintained in RAM location 2C5 so that inputting and outputting operations therefrom may be independently maintained and controlled. Once the print auto flag is set in the manner indicated by the rectangle 1683 and the printer stack and read/write buffer are cleared in the manner indicated by the arrow 1684, the print auto forward calculation routine indicated by the oval flag 1685 is entered in the manner indicated by the arrow 1686.

When the print auto forward calculation routine is entered in the manner indicated by the oval flag 1685, the program acts, in the manner indicated by the rectangle 1687 to fetch the next character code from the RO buffer and if the RO buffer should be empty to read the next line from the prerecorded record media, load the same in the RO buffer and thereafter fetch the first character therefrom. Under conditions where the print auto forward calculation indicated by the oval flag 1685 is entered in the manner indicated by the arrow 1686, the read only buffer 36 may normally be expected to be empty and therefore it will be appreciated that the loading of the buffer from the record media would be normally implemented before an actual fetching of the character therefrom in the manner indicated by the rectangle 1687. Thereafter, as indicated by the diamond 1688, the character information fetched is tested to ascertain whether or not a carriage return code is present. This step occurs, as will be appreciated by those of ordinary skill in the art, because a carriage return code will define the end of the line and hence, the end of information for which the instant calculation is being conducted. If no carriage return character is present in the manner indicated by the arrow 1689 annotated FALSE, the character fetched will be tested to ascertain whether or not the same comprises a stop code in the manner indicated by the diamond 1690. If a stop code is identified as read from the media and subsequently from the read only buffer in the manner indicated by the arrow 1691, this code is honored in the forward direction and the routine exits to the idle routine in the manner indicated by the triangle 1678. If no stop code is read from the media in the manner indicated by the arrow 1692 annotated FALSE, the code which was fetched from the read only buffer is processed in accordance with the play/skip/dup routine and loaded into the printer stack in the manner indicated by the rectangle 1693.

The processing of the code according to the play, skip, and dup routine and the subsequent loading of the processed twelve bit code information into the printer stack occurs in the manner described in conjunction with the flow charts illustrated in FIGS. 18 and 19. More particularly, it will be recalled from the flow chart for the play, skip, and duplicate routine illustrated in FIG. 18 that once a play mode operation is identified within the PSD loop the character function is executed, as indicated by the hexagon 1121 in much the same manner as is illustrated in the escapement and character printing flow chart illustrated in FIG. 17. Furthermore, a review of the escapement and character printing flow chart illustrated in FIG. 17 will readily reveal that once escapement information for a character loaded in register G7 has been calculated and it has been determined that the print auto flag is in a set condition, the escapement information calculated is loaded into the printer stack in the manner indicated by the rectangle 1693 in FIG. 24. Thereafter, the printer data is set up and if the print auto flag is again set, the data assembled in register locations G0 and G1 are again loaded into the printer stack so that for a group of characters fetched in a sequential manner, the printer stack will have escapement information and printer information for each character interleaved therein. Thus it will be appreciated that the step indicated by the rectangle 1693 effectively enters the PSD loop and the escapement and character printing routines to achieve the processing and printer stack functions indicated thereby.

The printer stack is formed within storage locations 2C6 - 2EF of the RAM buffer and hence is 42 characters deep wherein each character location comprises an eight bit location so that effectively storage for 21 characters is provided. The escapement information and print information developed in accordance with the flow chart illustrated in FIG. 17 is loaded therein from the register locations G1 and G0 in exactly the same manner in which the same is to be forwarded to the printer; however, as only twelve bits of the sixteen bits available in each storage location provided within the RAM are required for the storage of information to be forwarded, the four excess bit locations are provided with designators defining the printer information associated therewith, i.e., print information, escapement information or index information. The printer stack maintained within storage locations 2C6 - 2EF within the RAM is loaded by fetching the input pointer for the stack as defined by storage location 2C4 in the RAM, testing the location as to whether or not the same comprises a ZERO (0) and if no ZERO (0) is present, by transferring the high order bits, i.e., those assembled in register location G1, in a first instruction and incrementing the address while the transfer of the low order bits and a second incrementing of the address occurs in a second instruction cycle. Thereafter, the resulting address within the RAM is stored back in the pointer 2C4.

Conversely, the printer stack has a pointer counter maintained for output purposes in RAM location 2C5. Although not illustrated in FIG. 24, a monitoring routine tests the status conditions associated with the printer at 3ms intervals and whenever a print auto operation is in progress will act to cause twelve bit printer information to be forwarded to the printer unit as soon as the printer is in a condition to receive the same and thereafter acts to increment the print stack output pointer maintained in RAM location 2C5. Thus, although the actual forwarding of print, escapement or indexing information to the printer unit is not distinctly illustrated in FIG. 24, as the same is handled under the auspices of another routine, it will be appreciated by those of ordinary skill in the art that through the monitoring function, twelve (12) bit information is forwarded to the printer as fast as such information may be processed. Thus the printer stack is being loaded in the manner indicated by the rectangle 1693 as long as room remains therein while it is being unloaded at a rate corresponding to the fastest rate at which such information may be processed by the printer.

As the loading function is carried out at data processing speeds, the printer stack essentially may be viewed as completely loaded under the auspices of the program step indicated by the rectangle 1693 and thereafter unloaded essentially at a twelve bit rate by the monitoring routine. As each twelve bit character pair is emptied it is refilled in the manner indicated by rectangle 1693 until the end of the R0 buffer, which as shall be seen below corresponds to the detection of a carrier return character, occurs. At this juncture essentially 21 characters will remain in the printer stack for processing by the printer unit. Hence, there is ample time for reading of the next line of information and loading the same into the read only buffer.

Upon completion of the processing of the code fetched and the loading of printer commands into the printer stack in the manner indicated by the rectangle 1693, the next character code is fetched from the read only buffer in the manner indicated by the arrow 1694 and the rectangle 1687. Thereafter, a test for a carriage return and a stop code is conducted in the manner indicated by the diamond 1688 and 1690 and thereafter the new character is processed and twelve bits of escapement information as well as twelve bits of print information are loaded into the printer stack in the manner indicated by the rectangle 1693. This form of loop processing continues until the end of the line in the read only buffer is identified. An end of a line in the read only buffer will here be identified by the detection of a carriage return code which indicates that since an end of the line being processed has been reached, the carriage return and indexing operation would be appropriate actions under normal processing modes where each line is processed in a forward direction and thereafter a carriage return and index code are executed.

Here however, when a carriage return code is detected through the test indicated by the diamond 1688, as indicated by the arrow 1695 annotated TRUE, an index code is forwarded to the printer stack in the manner indicated by the rectangle 1696 so that upon printing of the last twelve bit command associated with print information from the printer stack, an indexing of the printer through the line space set will be executed. Thereafter, as indicated by the rectangle 1697, the deferred carriage return flag maintained in register location GA5 is set to thus complete the processing of line information to be printed in a forward direction as always occurs for the initial line of information printed in a print auto routine as well as each line following a line printed in a reverse direction and those lines which can not be properly printed in a reverse direction.

Although not illustrated in the loop associated with the rectangle 1687 and 1693, as well as the diamond 1688 and 1690, each character fetched from the R0 buffer for printing purposes is also tested to ascertain whether or not the same corresponds to a space code. When a space code is detected, the deferred space flag maintained in register location GA-6 is set, but further processing of the character with regard to a calculation of the escapement information therefore and the loading of this information in the stack does not occur. Instead, as each character fetched from the printer ROM is obtained, the deferred space flag is tested and should the same be in a set condition when escapement information is calculated therefor, escapement information associated with a space code is added thereto so that the twelve bits of escapement information loaded under these conditions into the printer stack represents the total displacement needed between characters and includes any space codes which may be present intermediate the characters of adjacent words. In this manner, the operational speed of the printer is increased to a substantial degree.

Upon a completion of setting the deferred carriage return flag in the manner indicated by the rectangle 1697, the loading of the printer stack with all information appropriate to the printing of a line in the forward direction has been accomplished. Therefore, even though the printer unit will be printing information in the stack in the forward direction, the program may now proceed to read the next line of information from the media into the R0 buffer and test the same to ascertain whether or not it may be printed in a reverse direction so that if an affirmative result is obtained, such information may be loaded into the read/write buffer from which loading of the printer stack for printing in a reverse direction occurs. This entire operation may be completed while the printer unit is still printing information from the previous line from the printer stack, but no new information may be inserted into the stack until the same has been emptied through forwarding operations to the printer. However, as reading of the record media and loading the same involves the greatest expenditure of time, the completion of this function while the printer is still processing at a rate corresponding to the fastest rate available, a substantial increase in overall print speed is obtained as under no conditions is the printer left waiting for data.

The test reverse routine indicated by the oval flag 1699, as entered in the manner indicated by the arrow 1698, acts to read the next line from the record media into the R0 buffer and thereafter to ascertain whether or not the line of data which was fetched may be printed in a reverse direction. If printing in the reverse direction may occur, the character information is translated into the read/write buffer, appropriate calculations are made therefor and upon an emptying of a printer stack, the contents of the read/write buffer are read in a reverse direction and printer information is loaded into the stack to achieve printing in the reverse direction. More particularly, as indicated by the rectangle 1700, the test reverse routine indicated by the oval flag 1699 initially acts to read the next line of data to be printed in a print auto mode from the media and loads the same into the R0 buffer. Thereafter, as indicated by the diamond 1701, the tab register maintained in RAM locations 200 - 227 is tested to ascertain whether any special tabs have been set therein. Since a special tab indicates that data is to be right flushed in the manner described in a portion of the flow chart illustrated in FIG. 26, printing in the reverse direction may not occur. Accordingly, whenever special tabs are detected within the tab register, as indicated by the arrow 1702 annotated TRUE, a return to a print auto forward mode in the manner indicated by the oval flag 1703 is initiated. The print forward mode indicated by the oval flag 1703 will be discussed hereinafter in association with a succeeding print forward operation, here however, it is sufficient to appreciate that any time the program indicated by the test reverse flag 1699 produces a result indicative that data can not be printed in a reverse direction branching to the print forward routine indicated by the oval flag 1703 occurs to cause printing to occur in the normal forward direction.

If no special tab is set in the manner indicated by the arrow 1704 annotated FALSE, the read/write buffer is cleared in the manner indicated by the rectangle 1705 precedent to the translation of data originally read from the record media and loaded into the read only buffer in the manner indicated by the rectangle 1700 into the RW buffer and an inspection of each character translated to ascertain whether or not printing may occur in a reverse direction. Once the read/write buffer has been cleared in the manner indicated by the rectangle 1705, the leading tabs in the line of information in the read only buffer are counted and stored in the tab counter in the manner indicated by the rectangle 1706 to obtain the indent level for the left hand margin for the line of information which may be printed in the reverse direction. Translation of character information from the R0 to the R/W buffer and and inspection of each character translated then begins in the loop defined by the element 1707 - 1710.

More particularly, the next character from the R0 buffer is fetched in the manner indicated by the rectangle 1707 and it will be appreciated that for the beginning of the line the initial fetching operation associated with rectangle 1707 acts to fetch the initial character in the buffer as reading of the R0 buffer always occurs in a forward direction. Thereafter, as indicated by the diamond 1708 the character fetched is tested to ascertain whether a carriage return code defining the end of the line to be printed in a reverse direction is present. If no carriage return code is present in the manner indicated by the arrow 1711 annotated FALSE, the program next tests in the manner indicated by the diamond 1709 whether the code fetched is a code which permits printing of line information in a reverse direction. More particularly, the character fetched is tested against a group of specialized codes which preclude printing in a reverse direction due to their nature as follows:

Tabs (which do not occur in the beginning of the line)
Underscore Routines associated with word or continous underscore; however, underscore codes which do not result in a modification of bit 7 are permitted
Any control codes other than backspace
Precedented Tabs
Format Codes
Column Center or Centering Codes
First Line Find
Search
Switch Switch and Search
Switch and Skip
Skip Off
Stop (either transferring or non-transferring)
Track Link These codes preclude printing in the reverse direction either because the information which will result when the code is executed is unavailable presently in the R0 buffer or the appropriate execution of the code in the reverse would require excessive calculation. Thus, it will be appreciated that tabs in the middle of a line would require rather extensive calculation for appropriate execution in a reverse manner and similarly, if a stop code or switch code is present, the information following that code, which would be printed first in a reverse direction, is not presently loaded in the R0 buffer and hence may not be queued in the read/write buffer. If one of the codes which preclude printing in a reverse direction is detected in the tests indicated by the diamond 1709 in the manner indicated by the arrow 1712 annotated FALSE, the read only buffer is realigned in the manner indicated by the rectangle 1713 so that it is returned to the same condition as if a line had just been read thereinto and no translation to the RW buffer had occurred and thereafter exiting to a print forward subroutine in the manner indicated by the oval flag 1703 is initiated.

When the character inspected in the test indicated by the diamond 1709 does not represent a character precluding printing in a reverse direction, in the manner indicated by the arrow 1714 annotated TRUE, the character inspected is stored in the read/write buffer in the manner indicated by the rectangle 1710. The storing of character information in this manner in the read/write buffer occurs in a normal forward sequence since no character manipulation for reverse printing purposes occurs at this juncture. Thereafter, in the manner indicated by the arrow 1715, the beginning of the loop is returned to so that the next character is fetched from the read only buffer, tested in the manner indicated by the diamonds 1708 and 1709 and if appropriate is stored in the read/write buffer in the manner indicated by the rectangle 1710. This will continue, as will be appreciated by those of ordinary skill in the art until either a character which precludes printing in the reverse direction is detected by the test associated with the diamond 1709 or a carriage return code is detected by the test indicated by the diamond 1708. If a character precluding printing in a reverse direction occurs, the buffer is realigned and printing occurs in a forward direction in the manner indicated by the rectangle 1713 and the oval flag 1703. However, if a carriage return character is detected by the test indicated by the diamond 1708, the end of the line of information will have been reached in the RO buffer and it will be appreciated that an entire line for printing in a reverse direction has been accumulated within the RW buffer in the manner indicated by the rectangle 1710.

When a carriage return code is detected by the test indicated by the diamond 1708 as indicated by the arrow 1716 annotated TRUE, an entire line which may be printed in the reverse direction has been accumulated within the read/write buffer and therefore, the program proceeds to ascertain whether or not printing should occur in a reverse direction and if this condition obtains, the implementation of this object is initiated. Accordingly, once a carriage return code is indicated by the test associated with the diamond 1708 as indicated by the arrow 1716, the program acts, in the manner indicated by the rectangle 1717 to calculate the indented left margin minus one (1). The indented left hand margin is calculated by taking the left hand margin setting and adding thereto the number of tabs initiating the line as loaded into the tab counter in the step associated with the rectangle 1706 and the minus one factor is subtracted from the indented left margin thus calculated to obtain the appropriate start position. Thereafter, as indicated by the rectangle 1718, the indented left hand margin minus one as calculated in the step above is converted to an incremental distance and stored in register locations G0 and G1 to define the position at which a line of information printed in the reverse direction is to terminate as well as to define an incremental length from the ZERO (0) column position which when added to the width of data to be printed will yield the total length of the line from the ZERO (0) column position and hence the position at which printing in a reverse direction is to be initiated.

Thereafter, as indicated by the rectangle 1719, the width of data translated into the read/write buffer is calculated in much the same manner as occurs during underscore modes of operation and added to the incremental distance representing the indented left hand margin minus one stored in register locations G0 and G1 to obtain the left print start carrier position or the position in which printing in a reverse direction is to be initiated. This information is stored in register locations H4 and H5.

As it is an object of this routine to avoid all wasted carrier motion at the printer, once the start position for a reverse printing operation is calculated in the manner indicated by the rectangle 1719, the program tests in the manner indicated by the diamond 1720 whether the present carrier position is closer to the start position of a line, as defined by the indented left hand margin or to the end of the line as defined by the reverse print start position calculated in the step associated with the rectangle 1719. Thus, if the previous line printed consisted of only one or a few words, the carrier position at the printer would be closer to the indented left hand margin than to the start position of a next line to be printed in the reverse directon if such line has sufficient data to approach the right hand margin. Therefore, in order to avoid wasteful carrier escapement at the printer unit if the present carrier position at the printer is closer to the start of a line than to the end as indicated by the arrow 1721 annotated TRUE, printing in a reverse direction should be avoided as it would involve time consuming carrier displacement. Accordingly, under these conditions, the read only buffer is realigned to the start of the line in the manner indicated by the rectangle 1713 and then exiting to a print auto forward routine in the manner indicated by the oval 1703 is initiated. However, if the present carrier position is not closer to the start of the line than to the end in the manner indicated by the arrow 1722 annotated FALSE, reverse printing in this routine is appropriate and hence the accumulation of printer data in the stack may begin as soon as processing of printer information from the stack for the previous line printed is completed.

Under these conditions as indicated by the diamond 1723, the condition of the printer stack is monitored to ascertain whether or not the same is empty, i.e. whether the address indicated by the stack output pointer corresponds to the ZERO (0) position of the stack. The test indicated by the diamond 1723 is appropriate because no new print information may be set into the stack for a new line of information until the processing of information loaded for the previous line being printed in the opposite direction has been completed. Therefore, as indicated by the arrow 1724 annotated FALSE, whenever an indication is obtained that the printer stack is not empty, a monitoring loop wherein the condition of the stack is monitored is continued until such time as an indication that the stack is empty and processing for a reverse print operation may be continued is obtained.

When the stack is empty as indicated by the arrow 1725 annotated TRUE, the program next tests in the manner indicated by the diamond 1726 as to whether or not the stop key has been depressed. In a print auto routine, it will be recalled that the stop key is only honored to terminate processing at the completion of a line being printed as is the case in any other routine such as justify, wherein calculation for a complete line of information is completed prior to any printing of such information and thereafter the entire line of information is printed at once. Thus, after an indication has been obtained that the printer stack has been emptied in the manner indicated by the arrow 1725, it will be apparent that the previous line being printed i the forward direction has been completely processed. Therefore, if during the processing of that line of information or the calculation associated with testing if the next line may be printed in a reverse direction, the stop key was depressed, in the manner indicated by the arrow 1727 annotated TRUE, the same may be honored at this juncture. Furthermore, since a print auto routine when entered will always start the print action in the forward direction, if the stop key has been pressed in the manner indicated by the arrow 1727,the data originally read into the RO buffer and thereafter translated into the read/write buffer must be returned to a condition where the same may be printed in a forward direction. Thus, as indicated by the arrow 1727 annotated TRUE, when an indication is provided that the stop key has in fact been pressed, the read/write buffer is cleared in the manner indicated by the rectangle 1728 and thereafter the pointer for the read only buffer is adjusted back to the start of the line loaded therein in the manner indicated by the rectangle 1729. In addition, the tab counter contained in the RAM is cleared in the manner indicated by the rectangle 1730 and if the deferred carriage return flag has been set, in the manner indicated by the rectangle 1697, the same is executed in the manner indicated by the rectangle 1731 to return the carriage to the left hand margin print position so that printing in a forward direction may be initiated upon the re-initiation of automatic processing in any mode. Finally, the idle routine is returned to in the manner indicated bythe triangle 1678 whereuponthe automatic writing system according to the instant invention awaits new instructions from the keyboard.

If the stop key has not been depressed in the manner indicated by the arrow 1733 annotated FALSE, the program acts in the manner indicated by the rectangle 1734 to set the reverse print or left print flag maintained in general purpose register location GA-4. The setting of this flag, as will be appreciated by those of ordinary skill in the art advises the microprocessor that printing is to occur in a reverse direction and hence that all escapement information loaded into the stack is to have a reversed direction bit associated therewith. Thereafter, in the manner indicated by the rectangle 1735 the carriage is displaced to the start position for reverse printing calculated in association with the step indicated by the rectangle 1719 as defined by the information stored in register locations H4 and H5. Once these steps have been accomplished, information may be fetched in a reverse order from the read/write buffer and print escapement information associated with each character read may be loaded into the printer stack in precisely the same manner disclosed in association with steps 1687 and 1693 in the print forward routine calculation associated with the oval flag 1685 it being noted that all escapement information will have a reverse direction bit due to the setting of the reverse print flag in the step associated with the rectangle 1734.

Accordingly, as indicated by the rectangle 1736, the program next proceeds to fetch the next character from the read/write buffer and decrement the pointer. As the pointer for the read/write buffer had been incremented to the last character position in association with the translation of character information from the read only buffer thereinto, it will be seen that the pointer is set for the first character to be printed in a reverse direction and that the decrementing of the pointer in the manner indicated by the step associated with the rectangle 1736 will cause the pointer address to shift in a sequential manner towards the start of the line of information loaded therein. As each character is fetched from the read/write buffer in the manner indicated by the rectangle 1736, a test is conducted in the manner indicated by the diamond 1737 for a code 0 condition. As the fetching of a character from the read/write buffer and the decrementing of the pointer will be initiated at the position of the last character therein and will continue through all character information loaded past the initial character to the last character position of the buffer, it will be seen that when a code 0 condition is detected by the test associated with the diamond 1737, the initial character position containing beginning line information for the line loaded in the read/write buffer will have been passed and effectively the end of the buffer which should act to close out the routine has been obtained. Thus, under these conditions, as indicated by the arrow 1738 annotated FALSE, if no code 0 condition is detected the code fetched, is processed in the PSD routine and appropriate character and escapement information therefor is loaded into the printer stack in the manner indicated by the rectangle 1739. The loading and unloading of the stack in a manner to cause printer information to be forwarded to the printer unit occurs in precisely the same manner detailed above in conjunction with the rectangle 1693 except, under the implementation of a reverse print routine, the incremental escapement information loaded therein will have a reverse direction bit as defined by the reverse print flag set in step 1734 assigned thereto. After the stack has been loaded in the manner indicated by the rectangle 1739, the next character is fetched from the RW buffer and the pointer therefor is decremented in the manner indicated by the arrow 1740 and the rectangle 1736 so that each character present in the RW buffer is read in reverse direction and printer information is loaded into the stack in the manner indicated by the rectangle 1739 until the end of the buffer has been defined by a code 0 condition as detected in the test associated with the diamond 1737.

When a code 0 condition is detected by the test indicated by the diamond 1737 as indicated by the arrow 1741 annotated TRUE, the processing of informaton to be printed in a reverse direction has been completed and all appropriate print and escapement commands therefor have been loaded into the printer stack in the manner indicated by the rectangle 1739 even though the printer unit is still processing data from the printer stack. Therefore, as indicated by the rectangle 1742, an index code is loaded into the printer stack so that upon printing of the last character of print information in the printer stack and hence, the arrival of the printer carriage at the indented left hand margin for the reverse print routine being conducted, the printer unit will index down so that the carriage is at an appropriate location to begin a line of printed information in a forward direction. Thereafter, as indicated by the rectangle 1743, the deferred carriage return flag maintained in register location GA-5 is set and branching to a print auto forward routine is initiated i the manner indicated by the oval flag 1703 to cause the next line of informaton to be printed in a forward direction as the carriage at the printer unit is appropriately positioned therefor. Thus it is seen that upon entry of the test reverse routine indicated by the oval flag 1699 the next line of information is read from the media into the read only buffer and inspected as to whether or not the same may be printed in a reverse direction. As the inspection precedes translation of each character therein to the read/write buffer occurs and upon full translation into the read/write buffer the beginning point for a reverse print operation is calculated. This point is then checked to ascertain whether or not the carriage position is closer to the beginning of the line than to the end to avoid wasted printer carriage motion and if any of these conditions prevent printing in a reverse direction branching to a print auto forward routine is initiated. However, if the line may be printed in a reverse direction, the contents of the read/write buffer are read in a reverse direction and the printer stack is loaded with all appropriate printing and escapement commands to cause printing to occur in a reverse direction. After the beginning character in the line has been processed and print and escapement information therefor loaded into the printer stack, an index character is loaded into the stack so that the printer carriage, upon arrival at the indented left hand margin will index down one line to be in an appropriate position to start a print operation in the forward direction. Finally, a deferred carriage return flag is set and branching to a print auto forward routine occurs.

Any time branching to a print auto forward routine occurs from the test reverse routine just described, the print auto forward routine indicated by the oval flag 1703 in the upper left hand portion of FIG. 24 is entered. This routine, acts in the manner to be described to cause the next line of information to be read from the media and printed in a forward direction. Thus as indicated by the oval flag 1703, when the print auto forward routine is entered, the program initially acts in the manner indicated by the rectangle 1744 to clear the contents of the read/write buffer so that any information remaining from the last line printed is erased. Thereafter, as indicated by the rectangle 1745, the next line of information is read from the media and loaded into the read only buffer if the same is required therein. As will be appreciated, under normal conditions, a new line of information will be requireó and hence loaded into the read only buffer; however, under certain conditions, data may be present past the last point indicated by the pointer and hence under these conditions, such data as may reside past the pointer will be processed first. Once information to be processed for the next line of information to be printed in a forward direction is loaded in the manner indicated by the rectangle 1745, the program next acts in the manner indicated by the diamond 1746 to ascertain whether or not the printer stack is empty and hence whether the print operation from the stack has terminated. If the stack is not empty in the manner indicated by the arrow 1747 annotated FALSE, loop monitoring occurs as indicated by the arrow 1747 until such time as an empty stack condition is ascertained.

When the stack is empty in the manner indicated by the arrow 1748 annotated TRUE, the program next tests in the manner indicated by the diamond 1749 whether or not the stop key has been depressed. If the stop key has been depressed, as indicated by the arrow 1750, the entry of this code may now be honored because printing of a line has been completed as indicated by the empty printer stack condition detected. Therefore, under these conditions, as indicated by the rectangle 1751, the read/write buffer is cleared and thereafter as indicated bythe rectangle 1752,the read only buffer is adjusted to the start of the line. Additionally, a tab counter is cleared in the manner indicated by the rectangle 1753 and any pending deferred escapement, as indicated by the flag set is executed in the manner indicated by the rectangle 1754. Thereafter, the idle routine is returned to in the manner indicated by the triangle 1678. Thus, if the stop key has been depressed, once the printer stack is empty, initial conditions are restored as far as possible and thereafter a return to the idle condition is initiated.

If the stop key has not been depressed, processing for a print forward operation may be initiated. However, prior to the actual calculation procedures indicated by the print auto forward calculation flag indicated by the oval 1685, appropriate initial conditions and clean up routines must be established. Therefore, when the stop key is not depressed as indicated by the a row 1755 annotated FALSE, the leading tabs in the RO buffer are counted and stored in the tab counter in the manner indicated by the rectangle 1756 so that an initial indent level is obtained. Thereafter, as indicated by the rectangle 1757 if the deferred carriage return flag is set the deferred carriage return is executed. This flag, it will be appreciated, may be set even though the printing of a line of data in a reverse direction was just completed; however, as the carriage position should already be at or close to the initial print position for the line about to be printed, including the appropriate index location, the execution of the deferred carriage return indicated by the rectangle 1757 will not generally involve a substantial displacement of the carriage in that only a restoration thereof from the indented left hand margin from the previous line to the indented left hand margin of the current line is required when the previous line of information was effectively printed in a reverse direction. However, under conditions where the previous line of information was not printed in a reverse direction, a substantial carriage return operation may be required. Upon the completion of the step indicated by the rectangle 1757, the deferred carriage return and reverse print flags located in general purpose storage locations GA-5 and GA-4 are reset to a ZERO (0) condition in the manner indicated by the rectangle 1758. Thereafter, the print auto forward calculation routine indicated by the oval 1685 is entered wherein, as aforesaid, character information to be fetched from the read only buffer is fetched a character at a time, processed according to the PSD routine and thereafter the printer stack is loaded so that printing of this information in a forward direction may proceed until a carriage return character is detected whereupon a branch operation to a test reverse mode is again initiated.

Accordingly, it will be appreciated by those of ordinary skill in the art that the print auto flow chart illustrated in FIG. 24 permits extremely high speed print routines to be implemented in accordance with the teachings of the instant invention when substantial editing modes of operation are not required. These high speeds of operation are enabled by continuously driving the printer from the printer stack at a rate corresponding to the fastest rate at which the printer unit may process data and by avoiding escapement operations at the printer unit which are unnecessary. More particularly, to avoid the escapement of the printer carriage which is normally required in carriage return operations alternate lines of information are generally printed in opposite directions so that no carriage return character is required at the printer when these conditions obtain. In addition, to assure that all due printer carriage escapement is avoided, prior to printing a line which is printable in a reverse direction, the carriage position at the printer is compared to the start and end of line positions and if the carriage resides at a position which is closer to the start of the line than the end, printing in a reverse direction is avoided for that line so that minimum printer escapement is relied upon wherever possible.

LINE CENTERING OPERATIONS

Referring now to FIGS. 25A and 25B, there are shown flow charts illustrating the programmed sequence of operations associated with line centering operations wherein FIG. 25A depicts the program routine initiated in conjunction with the entry of a line centering code from the keyboard and FIG. 25B shows the program routine for implementing line centering. During a record or revise mode of operation, a center code (code + *i*) may be entered prior to text to be centered by the operator to cause following text to be centered either between the margins or about the position at which the centering code was entered during a playback mode of operation. When the code is entered, it is immediately followed by a code designing the current carrier position and thereafter by textual material to be centered. Following entry of a line containing information to be centered in a record mode, as illustrated in FIG. 25A, the entire line of information associated with the centering code is analyzed and it is determined, under program control, whether or not centering between the margins or about the column position of entry is to occur. Thereafter, the column position designator following the center code is modified to reflect this result so that upon playback automatic centering of the textual material may occur. Should the operator be desirous of causing the material entered during the record mode to be printed in a centered fashion prior to the initiation of a playback mode of operation, a multiple depression of the centering code may be employed to achieve backspacing or actual backspace codes may be relied upon to achieve centering upon entry in the traditional manner. Text to be centered is entered following the centering code and provided that the center code is not proceeded by other text on the same line, and that no further text follows the text to be centered prior to the carrier return, the text will be centered upon playback around the midpoint of the printed line as defined by margin formatting information set at the time of playback. A center code must be employed in each line in which centering is to occur. Where more than one centering code occurs on a line, or other text precedes or follows the text to be centered, the text string associated with the center code will be centered, upon playback, around the column position relative to the left margin at which the carrier was located when the center code was entered. Ordinary spaces entered after the center code and prior to the text to be centered are ignored during the centering process on playback and similarly, ordinary spaces entered after the text to be centered but prior to the carriage return are ignored. The centering function may be employed with any pitch setting; however, the margin control mode of operation is disabled during playback or entry of the centered text line.

Referring now to FIG. 25A, the programmed sequence of operations associated with line centering operation during a record or revise mode of operation is detailed in a highly simplified manner to illustrate the analysis and modifications which take place under program control so that information actually recorded during an entry mode results in playback, during a subsequent playback mode of operation, in the centering of text entered subsequent to a centering code in a manner desired by the operator. The flow chart illustrated in FIG. 25A for centering upon keyboard entry is entered at the location indicated by the oval flag 1760 at the idle loop. This program, initially tests in the manner indicated by the diamond 1761 as to whether or not an entry from the keyboard or the keyboard stack is present. If no entry is present in the manner indicated by the arrow 1762 annotated FALSE, a return to the entry loop occurs in the manner indicated. However, if a keyboard entry or entry from the stack is present in the manner indicated by the arrow 1763 annotated TRUE, the program next tests in the manner indicated by the diamond 1764 as to whether or not a centering code is present. If a centering code is present in the manner indicated by the arrow 1765 annotated TRUE, the program branches to the analyzed keyboard centering subroutine indicated by the oval flag 1766. However, if the test for a centering code which is conducted under the auspices of the keyboard entry, analysis and execution routine is negative in the manner indicated by the arrow 1767 annotated FALSE, the routine continues to normally print and store codes in the manner indicated by the rectangle 1768 in the normal manner described above at the keyboard analysis and execution routines. Thereafter, as indicated by the diamond 1769, the code being processed is tested to ascertain whether or not it comprises a recordable code. If no recordable code is present in the manner indicated by the arrow 1770 annotated FALSE, a return to the idle loop is initiated in the manner indicated; however, if a recordable code is present in the manner indicated by the arrow 1771 annotated TRUE, the code being processed is stored in the read/write buffer in the manner indicated by the rectangle 1772. Thereafter, as indicated by the rectangle 1773, the centering flag maintained in register location G6-6 is reset if a centering breakpoint was stored in the read/write buffer and hence is being processed. A centering breakpoint as indicated in FIG. 25A will comprise any tab, any carriage return or any centering code. Thereafter, as indicated by the diamond 1774, the character being processed is tested to ascertain whether or not it defines the end of a recordable line. Character codes defining the end of a recordable line as indicated by annotation 2 may comprise:

| | |
|---|---|
| Carriage Return | Switch and Skip |
| Precedented Carriage Return | Repeat |
| Switch Code | Eject |
| Search Code | Block Mark Format |
| Switch and Search | Track Link Code |

or any other indication that the buffer is full and hence will automatically cause recording of the contents thereof. If the test for the end of a recordable line indicated by the diamond 1774 is negative in the manner indicated by the arrow 1775 annotated FALSE, the entry point to this idle routine is returned to; however, should the test indicated by the diamond 1774 produce an affirmative result as indicated by the arrow 1776 annotated TRUE, the program branches, in the manner indicated, to be analyzed in the read/write buffer centering routine indicated by the oval flag 1777. Thus, it will be appreciated by those of ordinary skill i the art that the idle routine indicated by the oval flag 1760 comprises many aspects of the idle and keyboard analysis and execution routines heretofore described but for the purposes of the instant description may be viewed as performing three essential functions. The most basic of these functions is to cause the analysis of information entered at the keyboard or from the keyboard stack and to assure normal processing of each entry, except under conditions where a centering code is detected or the end of a recordable line is ascertained. If a centering code is detected branching to the analyze keyboard centering routine indicated by the oval flag 1766 is initiated while if the end of a recordable line is detected, in the manner indicated by the arrow 1776, branching to the routine for analyzing the read/write buffer for centering information is initiated. Accordingly, the idle routine indicated by the oval flag 1760 causes normal processing of all information entered from the keyboard except under conditions indicating that a centering code has been entered whereupon a special analysis loop is entered and normal processing occurs until a full line of information had been entered in the read/write buffer. Thereafter, the contents of the read/write buffer are analyzed with respect to the centering codes which may have been loaded therein in the manner indicated by the oval flag 1777 so that, as will readily be appreciated, in the absence of a centering code, normal processing of informaton entered in a record or revise mode occurs.

When a centering code is detected upon entry by the test indicated by the diamond 1764, in the manner indicated by the arrow 1765 annotated TRUE, the analyze the keyboard centering routine indicated by the oval flag 1766 is entered. The function of the analyze the keyboard centering routine indicated by the oval flag 1766 is to properly format each centering code as entered so that the carrier position present upon entry is recorded therewith in the read/write buffer and any additional conditions which the operator may impose under conditions where the operator is attempting to cause a repositioning of the carriage to achieve centering upon recording are properly handled. Thus, upon completion of the analyze the keyboard centering code routine indicated bythe oval flag 1766, informaton associated with the entry of each centering code from the keyboard will be properly formatted so that after the entire contents of a line have been entered, an appropriate analysis of the contents of the read/write buffer may proceed in the manner indicated by the oval flag 1777. More particularly, upon an entry of the analyze keyboard centering routine indicated by the oval flag 1766, the program initially acts, in the manner indicated by the rectagle 1778, to displace the carrier to the nearest full column. It will be recalled that printing is available for operator selection in ten pitch, twelve pitch and proportionally spaced printing modes and while well defined print columns occur for each character printed in either twelve pitch or ten pitch proportional spaced printing occurs at variable widths and hence fractional columns will result. The twelve pitch columns defined are employed to define the column position utilized for proportionally spaced print modes wherein such definition includes a full column designation and a fractional column designation. The fractional column designation being relied upon, under these conditions, being maintained in the top half of general purpose register location GC. Thus to simplify the manner in which line centering operations are handled, upon the detection of a centering code, the carrier is moved to the nearest full column in the manner indicated by the rectangle 1778, it being appreciated that if ten or twelve pitch printing modes are being employed, no displacement occurs while if a proportionally spaced printing mode is being utilized by an operator, the carrier will be displaced to the nearest full column location as defined in twelve pitch modes of printing. Once this has been accomplished, the program acts to store the carrier position, in the manner indicated by the rectangle 1779 in storage location G4 of the general purpose register. Furthermore, as indicated within the rectangle 1779,the carrier position is stored relative to the left hand margin so that should the operator subsequently change margins for a playback mode of operation, centering about a column position, if this is the mandated mode of centering, will occur with respect to the newly established left hand margin. Thus for instance, if upon entry, the left hand margin was set at column 10 while the entry occurred at column position 50, a number 40 would be stored in register location G4 so that the column designator recorded after the centering code would be relative to the left margin should centering about a column occur. Thereafter, as indicated by the rectangle 1780, the centering code entered (hex 13) and now in register location 7, which is the working register, is changed or modified to a temporary centering code (hex 14) so that, as shall be seen below, a temporary centering code is stored in the read/write buffer until the analysis of the read/write buffer in the manner indicated by the oval flag 1777 acts to determine whether the column location following the centering code is to define centering between the left and right hand margins or centering about a column position per se.

Once the entered centering code has been converted to a temporary centering code in the manner indicated by the rectangle 1780 and the carrier position relative to the left hand margin has been loaded into register location G4 in the manner indicated by te rectangle 1779, the temporary centering code in G7 is stored in the read/write buffer followed by the column locations stored in register location G4 in the manner indicated by the retangle 1781. Thereafter, the centering flag is set in general purpose register location G6-6 in the manner indicated by the rectangle 1782. Accordingly, it will be seen that upon the detection of an initial centering code in the manner indicated by the diamond 1764, the analyzed keyboard centering routine indicated by the oval flag 1766 is entered whereupon the column position relative to the left margin of the carrier is ascertained and loaded into register G4, the centering code is changed to a temporary centering code and thereafter both the temporary centering code followed by the column position determined are loaded into the read/write buffer so that coded information is present in the read/write buffer upon the initial entry of a centering code which defines the condition that a centering code has been entered, but the manner in which centering is to be achieved has not yet been determined and in addition thereto, the second character recorded in the read/write buffer with this code defines the column position associated with the centering code in case centering is to occur about that column position. Upon a completion of these steps the analyzed keyboard centering routine indicated by the oval flag 1766 enters the evaluate the keyboard centering routine indicated by the oval flag 1783.

The purpose of the evaluate the keyboard centering routine indicated by the oval flag 1783 is to determine what information the operator has entered following an initial centering code so that if text to be centered has been entered, a return to the idle routine for apropriate processing thereof may be initiated while if the operator is entering subsequent centering codes or space codes to achieve appropriate carrier position so that centering may be achieved in the printing operation associated with the recording of this information such centering is implemented but is ignored with respect to the data which is inserted into the buffer so that the same will not impede the analysis of the read/write buffer centering codes which occurs in association with the oval flag 1777. Upon entry, it will be appreciated that the first centering code entered has been already processed in the manner indicated by the analyzed centering routine indicated by the oval flag 1766. Therefore, the evaluate keyboard centering routine indicated by the oval flag 1783 is acting upon keyboard entries inserted subsequent to the initial centering code treated in the analyze keyboard centering routine above.

Upon entry, the evaluate keyboard centering routine indicated by the oval flag 1783 initially acts in the manner indicated by the diamond 1784 to monitor the keyboard. If no entry from the keyboard is indicated in the manner indicated by the arrow 1785 annotated FALSE, the program then tests in the manner indicated by the diamond 1786 to ascertan whether or not the stop key has been depressed. If the stop key was not depressed in the manner indicated by the arrow 1787 annotated FALSE, monitoring for the purposes of detecting a keyboard entry is continued in the manner indicated by the loop formed. If the stop key has been depressed, as indicated by the arrow 1788 annotated TRUE, the top latch is reset in the manner indicated by the rectangle 1789 and thereafter as indicated by the arrow 1790, a return to the idle routine indicated by the oval flag 1760 is initiated.

If a keyboard entry is detected in the manner indicated by the arrow 1791 annotated TRUE, the program next acts in the manner indicated by the diamond 1792 to test whether or not the space code has been entered from the keyboard. If a space code has been entered in the manner indicated by the arrow 1793 annotated TRUE, it is assumed that the operator is trying to position the carriage for the purposes of centering upon entry. Therefore, in the manner indicated by the rectangle 1794, the carriage is displaced right one full column so that the space code entered is honored with respect to the operator and thereafter as indicated by the arrow 1795, the monitoring routine is re-entered. Accordingly, it will be seen that when a space code is entered it is assumed that the operator is trying to position the carrier and hence the carrier is displaced in accordance therewith but the code is effectively ignored for the purposes of insertion in the read/write buffer and hence with respect to the informaton therein which is to undergo subsequent analysis and recording, the space code entered is treated as if the same were never inserted.

Similarly, when the test indicated by the diamond 1792 is false in the manner indicated by the arrow 1796, the program then tests in the manner indicated by the diamond 1797 whether a precedented backspace or centering code is present. It will be recalled that centering codes successively entered after the first will cause the printer to back up in the same manner as a precedented backspace and hence when either of these conditions obtain in the manner indicated by the arrow 1798 annotated TRUE, the carrier is displaced left one full column as indicated by the rectangle 1799 so that the positioning function which the operator desires to implement is executed. Thereafter, as indicated by the arrow 1800, the monitoring routine is again re-entered so that both a space code or a centering code entered subsequent to the initial centering code is treated merely as positioning information which is not relevant for the purposes of information accumulated in the read/write buffer and hence although the positioning function which the operator desires to achieve is executed, the code is not otherwise implemented within the system.

If neither a space code, precedented backspace nor subsequent centering code is present in the manner indicated by the arrow 1801 annotated FALSE, it is assumed that a character which may be further processed within the idle routine is present. Therefore, this character is placed in the keyboard stack in the manner indicated by the rectangle 1802 and thereafter the idle routine is returned to in the manner indicated by the arrow 1803 so that processing of this character from the stack may be appropriately completed therein. Accordingly, it will be seen that when a centering code is detected while information is being processed through the idle routine indicated by the oval flag 1760, branching to the analysis keyboard centering routine indicated by the oval flag 1766 is initiated whereupon the temporary centering code and the column position at which entry occurred is recorded in the read/write buffer. Thereafter, an evaluate keyboard centering routine, as indicated by the oval flag 1783 is initiated whereupon entries from the keyboard subsequent to the initial centering code analyzed are further analyzed to ascertain whether or not they comprise positioning information which is to be executed at the printer and otherwise ignored or information which should be further processed within the idle routine whereupon a return to the idle routine occurs.

Processing within the idle routine will continue in this manner with appropriate branching to the analysis of keyboard centering routine indicated by the oval flag 1766 each time an initial centering code within a sequence is detected until such time as the end of a recordable line of information tested for in the manner indicated by the diamond 1774 is ascertained and branching to the analysis of the read/write buffer for centering purposes is implemented in the manner indicated by the arrow 1776 and the oval flag 1777. Accordingly, it will be appreciated by those of ordinary skill in the art that when an end of a redordable line is detected and the analysis routine for the read/write buffer for centering purposes is initiated, the condition of the contents of the read/write buffer for the line processed may take several forms. Where only a group of words is to be centered, the contents of the buffer might take the form of a temporary centering code followed by column position information which in turn is followed by the textural material to be centered. Alternatively, a group of centering codes each of which is followed by a column position and textural material to be centered may be present whereupon the centering of each group of text is to occur about the column at which the centering code was inserted. Another typical variation is that the contents of the read/write buffer might take the form of textural material not to be centered which is then followed by a centering code, column designating code and textural material to be centered. Further variations and combinations of data involving temporary centering codes which have now been inserted into the read/write buffer will be readily apparent to those of ordinary skill in the art and hence it will be appreciated that the analysis routine indicated by the oval 1777 must act to isolate cases where centering between the margins is to occur as distinguished from those cases where centering of material about a column position is required. From the typical cases illustrated above, it will be apparent that under only one set of conditions may centering between margins occur and that set of conditions obtains when the only data in the buffer is a centering code followed by a column designator which is turn is followed by textural material to be centered because for all other conditions, textural material is present which is to be processed in a normal manner and hence the textural material associated with a centering code must be centered about the position in which the centering code was entered. The analysis for these conditions conducted by the routine indicated by the oval flag 1777 proceeds to conduct this analysis by employing register location G2 as a flag which is set any time data is found in a review of the content of the read/write buffer which violates one of these conditions. Toward the end of the routine, if G2 remains in a 00 state, centering between the margins is assumed; however, if register G2 is ever placed in a non zero state, a centering location is defined about the column position of entry so that centering upon playback will proceed about the column location defined.

The routine for analyzing the contents of the read/write buffer for centering purposes as indicated by the oval flag 1777 initially acts, in the manner indicated by the rectangle 1804 to set register location G2, which is here employed as the flag for this routine, equal to the contents of register location H3 which contains the carriage position at the printer under conditions where the read/write buffer is empty. Furthermore, this carriage position is set in terms of the left hand margin so that the step associated with the rectangle 1804 effectively acts to set the flag G2 to a ZERO (0) condition unless H3 is not equal to ZERO (0). This would occur for conditions when there is data preceding the information inserted into the read/write buffer on the same line as might occur should the loading of the read/write buffer have occurred in response to a track link code, a switch code or the like. Hence, the step of setting $G_2$ equal to the condition of H3 in the manner indicated by the rectangle 1804 effectively acts to zero the G2 flag except under conditions where data preceded the loading of the read/write buffer on the same line as information being loaded therein. Once the G2 register location has been set in the manner indicated by the rectangle 1804, the pointer for the read/write buffer is set to the start of data in the manner indicated by the rectangle 1805, so that initial conditions are established for the examination of all data in the read/write buffer and a setting or resetting of the flag maintained in register location G2 in response to the conditions ascertained.

Once the initial conditions associated with the rectangles 1804 and 1805 have been established, the routine first seeks to ascertain whether or not textural material is present in the buffer which precedes a temporary centering code. This is accomplished, as indicated by the rectangle 1806 by fetching the next character in sequence from the read/write buffer and initially testing that character in the manner indicated by the diamond 1807 to ascertain whether a printing character, space code or precedented tab is present. Any of these characters, it will be appreciated, will represent the presence of character information in the read/write buffer preceding the appearance of a temporary centering code. Therefore, in the manner indicated by the arrow 1808 annotated TRUE and the rectangle 1809, should one of these characters be detected, the register location G2 is immediately set to a non-zero condition indicating other data in the read/write buffer prior to the centering code. Once G2 is set to a non-zero condition in the manner indicated by the rectangle 1809, a return to the start point for this loop, as indicated by the arrow 1810 is initiated so that the next character may be fetched in the manner indicated by the rectangle 1806.

If a negative result is obtained from the test indicated by the diamond 1807 in the manner indicated by the arrow 1811 annotated FALSE, the character fetched is next tested to ascertain whether it is a code hex 00 character indicating an end to the data in the read/write buffer in the manner indicated by the diamond 1812. If an affirmative result is obtained in the manner indicated by the arrow 1813 annotated TRUE, all data in the read/write buffer has been appropriately analyzed and, as shall be seen hereinafter, all appropriate conversions have been made. Therefore, in the manner indicated by the rectangle 1814, the contents of the read/write buffer are recorded on the media and the read/write buffer is cleared precedent to the accumulation therein of new line information to be recorded. Thereafter, as indicated by the oval flag 1815, the idle loop is returned to.

If the test indicated by the diamond 1812 is negative, as indicated by the arrow 1816 annotated FALSE, the character being tested does not represent character data preceding a centering code or the end of the buffer. Therefore, as indicated by the diamond 1817, the character fetched is tested to ascertain whether or not it is a special carriage return character. If a special carriage return character is present, it will be appreciated that although we are not at the end of the read/write buffer, the printer has been instructed to execute a carriage return at this point. Therefore, for the purposes of centering code analysis, a new line of information is being started. Accordingly, if the test indicated by the diamond 1817 is affirmative in the manner indicated by the arrow 1818 annotated TRUE, the G2 flag is set to 00 in the manner indicated by the rectangle 1819 in recognition of the start of a new line and thereafter the loop is returned to in the manner indicated by the arrow 1820 so that the next character may be fetched from the read/write buffer and processing continued. If no special carrier return character is indicated by the test conducted in association with the diamond 1817 in the manner indicated by the arrow 1821 annotated FALSE, the program next acts in the manner indicated by the diamond 1822 to test whether or not the character being processed is a temporary centering code. If no temporary centering code is present in the manner indicated by the arrow 1823 annotated FALSE, a return in the loop is initiated so that processing of the next character may continue. However, if a temporary centering code is detected in the manner indicated by the arrow 1824 annotated TRUE, we have completed the analysis of any data which may precede this centering code and the condition of flag G2 will reflect whether or not data had been found in the buffer prior to the centering code detected and hence whether or not centering must be conducted with respect to this centering code between the margins or about the column position in which it was entered.

Therefore, the program next proceeds to analyze conditions following the centering code detected. Accordingly, as indicated by the arrow 1824 annotated TRUE and the rectangle 1825, the next character is fetched from the read/write buffer 35. Once fetched, this character is tested in the manner indicated by the diamond 1826 to ascertain whether or not it represents a temporary centering code or a center code breakpoint defined, as indicated in FIG. 25A by a tab, any carriage return code or a centering code. If the results of the test indicated by the diamond 1826 are negative as indicated by the arrow 1827 annotated FALSE, the program next tests in the manner indicated by the diamond 1828 whether or not the character fetched represents an end of data. If no end of data condition, as indicated by a hex 00 code is ascertained, the program returns to the fetching step associated with rectangle 1825 in the manner indicated by the arrow 1829 so that the next character is fetched from the buffer and analyzed as to whether or not a breakpoint or the end of the buffer is reached. Thus, as will be apparent to those of ordinary skill in the art, the looped operation associated with the rectangle 1825 and diamonds 1826 and 1828 acts to inspect each character in the read/write buffer after a centering code to find either the first centering breakpoint or the end of the buffer, it being appreciated that all data which appears between the temporary centering code ascertained by the test associated with the diamond 1822 and either a centering breakpoint as ascertained by the diamond 1826 or an end of data ascertained by the diamond 1828 will represent data which can be centered and hence is effectively non-determinative of whether or not centering between the margins or about the column position is to occur. However, once an end to centered data is indicated by either the tests associated with the diamond 1826 or the diamond 1828, conditions subsequent to the centering code, its column position, and the centered data associated therewith may be determined. Further, it will also be appreciated that as an end of data as detected in the test associated with the diamond 1828 is indicative that no subsequent conditions to those previously analyzed may be present in the buffer, direct branching to a conversion routine for the centering codes in the read/write buffer, as indicated by the oval 1830 may be initiated. Thus, as indicated by the arrow 1831 annotated TRUE, whenever a hex 00 condition is ascertained by the test conducted in association with diamond 1828 branching to the conversion routine for centered data within the read/write buffer is initiated in the manner indicated by the arrow 1831.

When the test for a breakpoint indicated by the diamond 1826 is affirmative in the manner indicated by the arrow 1832 annotated TRUE, the breakpoint and thereafter the data subsequent thereto is analyzed to ascertain whether or not this data mandates against centering between the margins and hence requires that the register G2 be set to a non-zero condition. Accordingly, as indicated by the arrow 1832, once a breakpoint or temporary centering code is detected, the program next tests in the manner indicated by the diamond 1833 whether that breakpoint or as shall be seen below, data thereafter, corresponds to a printing character, a space code or a precedented tab.

If the test indicated by the diamond 1833 produces an affirmative result in the manner indicated by the arrow 1834 annotated TRUE, there is a clear indication that data exits past the breakpoint and hence, in the manner indicated by the rectangle 1835, the flag represented by the G2 register is set to a non-zero condition to advise that it is necessary to center the data about the column position inserted with the temporary centering code. However, if the test indicated by the diamond 1833 is false in the manner indicated by the arrow 1836 annotated FALSE, the program next tests to ascertain whether the end of the line or the end of the buffer has been reached in the manner indicated by the diamond 1837. Thus, as indicated by the diamond 1837, the character being processed is tested to ascertain whether it corresponds to a carriage return code indicating the end of the line or a hex 00 character indicating the end of the buffer. When either of these conditions are present G2 has already been set to a condition representing the appropriate centering condition and hence in the manner indicated by the arrow 1838 annotated TRUE, a branch to the conversion routine for centering codes in the read/write buffer may be initiated. However, should the test indicated by the diamond 1837 be false as indicated by the arrow 1839, the next character is fetched from the read/write buffer in the manner indicated by the rectangle 1840 and thereafter the testing step associated with diamond 1833 is returned to in the manner indicated by the arrow 1841 so that the processing through to the end of the buffer or the end of the line may continue until an affirmative indication results from the test indicated by the diamond 1837. Thus in the manner described, the loop associated with the diamonds 1833 and 1837 as well as rectangles 1835 and 1840 processes information from the breakpoint to the end of the buffer or the end of the line to ascertain the conditions which occur subsequent to the breakpoint.

Once the data subsequent to the breakpoint detected in the test associated with diamond 1826 has been analyzed to the end of the line or the end of the buffer in the manner indicated by the arrow 1838 or data following a centering code as determined in the step indicated by the diamond 1822 has been analyzed to the end of the buffer in the manner indicated by the diamond 1828 and the arrow 1831, the conversion routine for centering codes in the read/write buffer indicated by the oval flag 1830 is entered. Upon entry of this routine as indicated by the rectangle 1842, the pointer for the read/write buffer is set to a start of data condition so that the contents of the buffer may be received to locate the temporary centering codes which reside therein and replaced with permanent centering codes together with an indication of where centering is to occur or else the fetching routine associated with rectangle 1806 returned to so that processing may continue in the manner indicated above for the location and treatment of any additional centering codes which may be present. Thus this will continue until the actual end of the buffer is detected.

If the pointer for the read/write buffer has been set to a start of data in the manner indicated by the rectangle 1842, the character pointed to is fetched from the read/write buffer in the manner indicated by the rectangle 1843 and thereafter it is tested in the manner indicated by the diamond 1844 to ascertain whether or not it comprises a temporary centering code. If no temporary code is found in the manner indicated by the arrow 1845 annotated FALSE, the fetching step associated with rectangle 1843 is returned to so that characters are fetched in sequence until a centering code is actually ascertained by the test indicated by the diamond 1844.

When a centering code is detected in the manner indicated by the arrow 1846 annotated TRUE, the program acts in the manner indicated by the rectangle 1847 to replace the temporary centering code in the read/write buffer with a permanent centering code. Thereafter, as indicated by the diamond 1848, the condition of the flag G2 is tested to ascertain whether or not it is in a 00 condition indicating that centering is to occur between he left and right margins as aforesaid. If the test indicated by the diamond 1848 is affirmative in the manner indicated by the arrow 1849 annotated TRUE, the program then acts to replace the second character of the centering code, which defines the column location as aforesaid with a hex A0 code in the read/write buffer to indicate that centering is to occur between the margins. This is done in the manner indicated by the rectangle 1850 and thereafter the initial portion of the program associated with the rectangle 1806 is returned to. Similarly, if the test indicated by the diamond 1848 is false in the manner indicated by the arrow 1852 annotated FALSE, immediate return to the portion of the program associated with the rectangle 1806 occurs since the temporary centering code has already been replaced with a permanent centering code and the column position about which centering is to occur is already present and in light of the condition of the G2 flag is appropriate. Processing in this manner will continue through the steps associated with the rectangle 1806 and diamonds 1807 and 1812 etc., until such time as the end of the buffer is ascertained by a detection of a hex 00 condition in the manner indicated by the diamond 1812. At that time, the contents of the buffer are recorded in the manner indicated by the rectangle 1814 and a return to the idle condition is initiated as indicated by the oval flag 1815.

Accordingly, it will be seen that the line centering program associated with keyboard input operations in a record or a revise mode as depicted in FIG. 25A acts in response to the entry of a centering code to appropriately insert a temporary centering code followed by the column position at which the same was entered for each initial centering code entered in a line of data from the keyboard. However, additional centering codes which are entered in sequence or space or precedented backspace codes associated therewith which the operator has entered to achieve appropriate character positioning during a record mode of operation are executed from the standpoint of appropriately positioning the carriage in the manner with which the operator desired; however are not placed into the read/write buffer as the same do not represent relevant information. This continues until the end of of a line of recordable information is indicated. Thereafter, the.entire contents of the read/write buffer are repeated with a view to detecting whether or not the centering codes inserted therein are to cause automatic centering upon a playback mode of operation to occur between the left and right margins established at the time the playback operation occurs or whether or not centering is to occur with respect to the column position adjusted for the current left hand margin. The analysis of the contents of the read/write buffer is performed in such a manner that if any data precedes or follows the group of data defined by the centering code, its column position and the data to be centered, centering occurs about the column position while if no data precedes the centering code or follows centered text, centering is to occur between the margins. Once these determinations are made, a permanent centering code is substituted for the temporary centering code initially placed in the buffer and the column defining character about which centering is to occur is retained if in fact centering is to occur about this column while if centering is to occur between the margin, the hex code A0 is substituted therefor. Thus, in subsequent playback modes of operation, the centering code, the place about which centering is to occur and centered data is well defined for the processing routine which occurs in a playback mode of operation.

LINE CENTERING UPON PLAYBACK

The program routine for implementing line centering upon playback is illustrated in a simplified flow chart format in FIG. 25B. The program routine illustrated in FIG. 25B is implemented upon the detection of a permanent centering code when a prerecorded record media is being played back. Referring now particularly to FIG. 25B, the flow chart illustrated therein is entered at the location indicated by the oval flag 1855 annotated Move Carrier for Centering. This routine is entered from the PSD loop within the play/skip/dup routine illustrated in FIG. 18 any time a centering code is detected in response to the requirement associated with the hexagon 1121 that execution of the function of the character in G7 be implemented. Upon an entry of the flow chart illustrated in FIG. 25B, the program initially acts in the manner indicated by the rectangle 1856 to set the centering flag which is maintained in register location G6-6. Thereafter, as indicated by the rectangle 1857, the deferred escapement flag maintained in general purpose location GF-6 is cleared so that the same is not pending after the completion of this routine. Furthermore, the clearing of this flag is here appropriate as the routine will require that the carrier at the printer unit be moved for the purposes of centering and hence appropriate displacement occurs in any event. After the flag setting and clearing operations associated with rectangles 1856 and 1857 have been completed, the program next acts to accumulate the width of data to be centered. This is done in the manner indicated by the rectangle 1858, the diamond 1859 and the rectangle 1860. More particularly, the next character is fetched from the read only buffer in the manner indicated by the rectangle 1858. Thereafter, the code is tested to ascertain whether it comprises a hex 00, standing for an end of data or a centering breakpoint code as defined in conjunction with FIG. 25A in the manner indicated by the diamond 1859. If none of these conditions are present in the manner indicated by the arrow 1861 annotated FALSE, the program has not reached the end of data to be centered. Therefore, as indicated by the rectangle 1860, the width of the character fetched is obtained fromthe printer data ROM in increments of 1/120th of an inch and accumulated within register locations H5 and H4. Thereafter, a return to the fetching step as indicated by the arrow 1862 is initiated so that a closed minor loop operation which acts to fetch the next character, ascertain whether an end of data or centering breakpoint is present and thereafter, if an end of data is not detected by this test, the width of the character fetched is accumulated in registers H4 and H5 the loop is continued. The manner in which the width of the character information is fetched and stored away in register locations H4 and H5 is precisely the same as was described in conjunction with the underscore flow charts and hence will not be reiterated here.

When a breakpoint is detected by the test indicated by the diamond 1859, the end of data has been ascertained. Therefore, as indicated by the arrow 1863 annotated TRUE, the pointer for the read only buffer is decremented by one so that it again reflects the address of the breakpoint in the manner indicated by the rectangle 1864. Once this has been accomplished, the pointer is backed up to a position corresponding to the centering code. This is done as indicated by the rectangle 1865 by decrementing the read only buffer pointer and fetching the character code addressed thereby. Thereafter, as indicated by the diamond 1866, the character fetched is tested to ascertain whether or not it corresponds to a centering code. If no centering code is identified in the manner indicated by the arrow 1867 annotated FALSE, the decrementing step associated with rectangle 1865 is returned to so that the decrementing of the buffer pointer is continued in a reverse direction until the location of the centering code is actually returned to.

Once the centering code has been detected in the manner indicated by the arrow 1868 annotated TRUE, the centering code and the second character is stored in register locations G7 and G4, it being recalled that the second character now stored in G4 will represent either a column position about which centering is to occur or the character hex A0 indicating that centering is to occur between the left and right hand margins. Once this has been accomplished, register locations G1 and G0 are set to a negative quantity corresponding to one-half the width of the information to be centered as accumulated in register locations H4 and H5. Thus, at this juncture, the centering code is stored in working register G7, the column position about which centering is to occur or the A0 code is stored in location G4 while a negative quantity representing one-half the width of the data to be centered is stored in register locations G1 and G0. Thereafter, as indicated by the diamond 1871, the column position code stored in register location G4 is tested to ascertain whether or not it is equal to the hex A0 code defining centering between the right and left margins.

If centering is to occur between the right and left margins in the manner indicated by the arrow 1872 annotated TRUE, the program next acts in the manner indicated by the rectangle 1873 to calculate the center position from which centering is to occur in increments of 1/120th of an inch. In the case of centering between the left and right margins this is calculated by taking one-half the sum of the right and left margins times a quantity equal to the width of a column in increments in the manner indicated by the rectangle 1873. Similarly, if the test for centering between margins conducted by the diamond 1871 is false in the manner indicated by the arrow 1874, the position about which centering is to occur is calculated in the manner indicated by the rectangle 1875. Thus, as indicated by the rectangle 1875, the center position is calculated in increments of 1/120th of an inch by adding the position about which centering is to occur to the left hand margin as the same was initially set with respect to the left margin and multiplying the quantity obtained by the column width in increments.

Once the center position is calculated by either of the techniques indicated by the rectangles 1873 and 1875, the print start carrier position is calculated in the manner indicated by the rectangle 1876. This is done as indicated by taking the center position as calculated in either of the steps 1873 or 1875 above and subtracting therefrom one-half the center data width now stored in register locations G1 and G0 in the step indicated by the rectangle 1870. As this quantity was stored as a negative value, it may be subtracted directly without a change in sign. Thereafter one-half the width of a column is added to the resulting value obtained to adjust for the "half character width" difference between the initial carrier position and the leading edge of the character printed at that position. Subsequently, in the manner indicated by the rectangle 1877, the carrier is displaced to the start point position, calculated in accordance with the step indicated by rectangle 1876 and thereafterin the manner indicated by the oval flag 1878, a return to the PSD loop occurs.

Upon return to the PSD loop, the centering code loaded in register location G7 will have been processed and hence the processing of actual text to be centered occurs in the usual manner; however, as the carrier at the printer has already been displaced to the start position therefor, this data will be printed in an appropriately centered way. Should subsequent centering codes be encountered for the line, branching will again occur to the playback centering routine illustrating in FIG. 25B. Accordingly it will be seen that whenever a centering code is encountered during processing within the play/skip/dup mode of operation described in conjunction with FIG. 18, branching to the flow chart illustrated in FIG. 25B occurs. Once this routine is entered, the width of data to be centered is calculated, the centering point is defined and thereafter a start print position for the printing operation associated with the data to be centered is calculated. At this juncture the carrier is displaced to the start print position calculated and thereafter processing within the PSD loop continues so that the data to be centered is appropriately printed in a centered manner.

COLUMN CENTERING AND RIGHT FLUSH

Referring now to FIG. 26, there is shown a flow chart depicting a programmed sequence of operations for centering data and presenting statistical data in a right flush format during playback modes of operation. Both the column centering and right flush formatting features according to the instant invention permit an operator to enter data to be right flushed or column centered during a record mode of operation at a location corresponding to the left hand portion of a column defined so that no time consuming backspacing operation to achieve appropriate position at entry are required. Thereafter, when the record media is played back the material to be right flushed or column centered within the columns defined is automatically formatted in accordance with the program routine illustrated in FIG. 26 so that the columnar data defined is presented in a desired arrangement without a requirement for detailed formatting steps by the operator. As column centering and right flush formatting functions are mutually exclusive within a given line of information, the single flow chart illustrated in FIG. 26 may be employed to illustrate both routines.

For both the right flush and column center functions the operator, it will be recalled, must initially define columns by setting regular tabs to define the left side of each column and setting special tabs by the depression of the code and tab keys to define the right side of each column. Additionally, it will be recalled that the left hand margin may also be employed to define the left side of the column. Once the columns have been defined in the foregoing manner, the recording of information to be printed according to the column centered or right flushed format in a play mode may be simply entered by the operator without any time consuming operations associated with spacing, backspacing or the like. More particularly, for any line in which a column centering function is to occur, the operator need only define the column centering code, i.e., code key plus by at the left hand margin. Thereafter, a depression of the tab key appropriately positions the carrier at the beginning of the column and the data to be column centered is entered therefrom in such manner that it is flush to the left hand portion of the column defined. Thus, under these conditions, the operator need merely enter the column center code, tab to a column, enter data and tab to the next column. Similarly, for right flush functions, no specialized code need be entered at the beginning of the line and hence the operator need merely tab to the beginning of the column, enter columnar data to be subsequently right flushed at the left edge of the column defined and then proceed to tabbing to the next column where a similar operation occurs until all columns within that line have had columnar data entered therein in a right flush manner. As the right flush function is principally directed to a formatting of statistical data from the right edge of the column defined in a leftward direction, operator's attention is required in that all numerical data must effectively have the same number of significant digits in each column to achieve an appropriate display function. However, this detail is associated with the nature of the data inserted and hence since the insertion point occurs at the left edge of each column defined, no operator attention associated with the backspacing or space functions required to format the data within the column per se is required. Thus, in either case, the operator merely tabs to the beginning of the column and enters data and upon playback of the prerecorded record media such data is appropriately displayed within the column in either the centered manner associated with the column centering code or the right flush manner required by statistical information and this is accomplished directly as a result of the program routine illustrated in FIG. 26.

Therefore, turning now to FIG. 26, it will be appreciated that the flow chart illustrated therein is entered at the portion indicated by the oval flags 1880 annotated Move Right Flush. The actual entry point in this routine occurs during processing within the PSD loop of the play, skip and duplicate routine at a location associated with the end portion of the program steps indicated by the hexagon 1111 wherein the edit conrol stop conditions are evaluated. Thereafter, the program reviews the conditions associated with the flow chart illustrated in FIG. 26 and then moves on for purposes of evaluating underscore operations and the like.

When the flow chart illustrated in FIG. 26 is entered at the location indicated by the oval 1880, the program initially acts in the manner indicated by the diamond 1881 to test whether or not the column centering flag has been set for the line of information being processed. It will be recalled that for column centering modes of operation, a column centering encoded function is entered at the beginning of each line for which data to be column centered is entered while for right flush modes of operation, no definition character at the beginning of the line is required. Furthermore, whenever a column centering encoded function is processed during a play mode of operation, the column centering flag located in general purpose register location G6-6 is set. Thus, the test indicated by the diamond 1881 is definitive as to whether or not processing within the routine illustrated in FIG. 26 is to occur in accordance with the conditions imposed for a column centering routine or a right flush processing routine. Therefore, as indicated by the arrow 1882 annotated FALSE, if no column centering flag has been set, processing occurs in accordance with the right flush mode of operation while, as indicated by the arrow 1883 annotated TRUE, if the column centering flag has been set, processing occurs according to a columm centering routine and, as shall become more apparent below, once the tests associated with the diamond 1881 has been conducted, processing for the purposes of right flushing information or column centering information tends to proceed along wholly independent lines.

The column centering routine will be initially discussed herein and thereafter attention will be directed to the right flush routine associated with the arrow 1882 annotated FALSE. When the test for the column centering flag setting, as indicated by the diamond 1881 produces an affirmative result as indicated by the arrow 1883 annotated TRUE, the column centering program initially acts to ascertain whether or not it is at the beginning of a columm whereupon processing according to a column centering routine may be required. If processing is not yet occuring at the beginning of a column exiting from the column centering routine may immediately occur until such time as the edge of a column is effectively detected. Thus, as indicated by the rectangle 1884, the last character executed from the read/write buffer is fetched and tested in the manner indicated by the diamond 1885 to ascertain whether this code was a tab which acts to define the left column position. Additionally, though not illustrated in the diamond 1885, a centering code (COL) or left hand margin will also act to define the edge of a column and hence if either of these codes are present, the test indicated by the diamond 1885 will produce an affirmative result.

If the test indicated by the diamond 1885 produces a negative result in the manner indicated by the arrow 1886 annotated FALSE, it is clear than no entery af the left portion thereof has occured. Therefore, as indicated by the arrow 1886 and the oval 1887, exiting and return to the play/skip/dup mode for further analysis and the execution of the character in G7 may occur. However, if the test indicated by the diamond 1885 produces an affirmative result as indicated by the arrow 1888 annotated TRUE, the left hand portion of a column may have been entered. Therefore, as indicated by the rectangle 1889, the last character code read from the read only buffer is fetched in the manner indicated by the rectangle 1889. This is done to ensure that the last executed code from the read/write buffer which was fetched in step 1884 and tested in the manner indicated by the diamond 1885 to indicate that a column may have been entered was effectively read from the record and subsequently from the RO buffer rather than being a character which was inserted from the keyboard. Thus, once this character is fetched in the manner indicated by the rectangle 1889, it is tested in the manner indicated by the diamond 1890 to ascertain whether the same corresponds to a tab character or a centering code or the left hand margin as mentioned above with respect to the test indicated by the diamond 1885. If the tab ascertained in association with the diamond 1885 was inserted from the keyboard, the test indicated by the diamond 1890 will produce a negative result as indicated by the arrow 1891 and therefor, the character being processed does not define the beginning portion of a column as defined during the record mode of operation. Accordingly, under these conditions, as indicated by the arrow 1891 and the oval flag 1887, a return to the play/skip/dup routine for further analysis and execution of the character in G7 is initiated.

However, if the last code read from the read only buffer was a tab code or the like, the test indicated by the diamond 1890 will produce an affirmative result as indicated by the arrow 1892 annotated TRUE. Under these conditions, the column centering routine proceeds to perform additional tests calculated to ensure that only compatible processing modes have been established for the processing operation and then acts to ascertain whether or not processing is in fact occurring within a column. More particularly, as indicated by the diamond 1893, the program next tests to ensure that a play mode of operation has in fact been established and hence that processing within the play/skip/dup routine was not initiated as a function of a skip or dup mode of operation. If the test indicated by the diamond 1893 is negative as indicated by the arrow 1894 annotated FALSE, a return to the play/skip/dup routine, as indicated by the oval flag 1887 is initiated. However, if the play mode has been established as indicated by the arrow 1895 annotated TRUE, the program next tests to ascertain whether the play mode is taking place in a justify or margin control editing mode as indicated by the diamond 1896. As either of these modes are inconsistent with a column centering or for that matter a right flush playback mode of operation, if an affirmative result occurs, as indicated by the arrow 1897 annotated TRUE, return to the calling routine in the manner indicated by the oval 1887 occurs. However, if neither a justify or margin control mode of operation is active, in the manner indicated by the arrow 1898 annotated FALSE, the routine next proceeds to ascertain whether or not processing within a column is actually occurring.

This is done in the manner indicated by the rectangle 1899 by fetching the next tab or special tab stop from the tab register maintained within the RAM to the right of the present carrier position. The tab register is maintained within storage locations 200 - 227 of the RAM peripheral and it will be appreciated that if the next tab location identified is that associated with a special tab, processsing is currently occurring within a column defined on the left by a tab, column centering code or the left hand margin and the special tab defined to the right of the location where processing is presently occurring. Once the next tab or special tab stop set to the right of the present carrier position is fetched in the manner indicated by the rectangle 1899, the bit pair obtained is tested in the manner indicated by the diamond 1900 to ascertain whether a special tab code is present. If no special tab code is identified in the manner indicated by the arrow 1901 annotated FALSE, processing is not occurring within a column and therefore the calling routing is returned to in the manner indicated by the oval 1887. However, if a special tab is present in the manner indicated by the arrow 1902 annotated TRUE, a column has effectively been defined and hence the width of the information to be centered therein must be ascertained.

This is done by first decrementing the RO buffer pointer behind the character being processed in the manner indicated by the rectangle 1903 and thereafter incrementing the read only buffer pointer and fetching a character in the manner indicated by the rectangle 1904. Once the character is fetched it is tested in the manner indicated by the diamond 1905 to ascertain whether or not a centering breakpoint is present. Centering breakpoints may be defined for the purposes of the instant discussion as any carriage return, any tab, or a centering code and it will be appreciated by those of ordinary skill in the art that the detection of a centering breakpoint or a hex 00 code which indicates the end of the contents of the buffer will define the end of data to be centered. If no centering breakpoint or th end of data is indicated by the test associated with the diamond 1905 as indicated by the arrow 1906 annotated FALSE, the character width for the character fetched is calculated in the manner indicated by the rectangle 1907 and stored within register location H5 and H4 in precisely the same manner as this step was implemented in conjunction with the underline or line centering routines described above. Once this has been accomplished, as indicated by the arrow 1908, the step associated with rectangle 1904 is returned to so that the RO buffer pointer may again be incremented and the character pointed to fetched and tested. Through this loop operation it will be appreciated that in effect the RO buffer is scanned forward from the beginning of the column to a centering breakpoint or the end of the buffer and as each character is scanned and fetched the width thereof is calculated and stored within register locations H4 and H5 in the manner indicated by the rectangle 1907. Therefore, upon the detection of a centering breakpoint or the end of the contents in the buffer in the manner tested for by the step associated with diamond 1905, the entire width of data to be centered within the column will have been calculated and stored in register locations H4 and H5.

Accordingly, when a centering breakpoint or the end of character information in the buffer is ascertained by the step indicated by the diamond 1905, as indicated by the arrow 1909 annotated TRUE, the entire width of data to be centered will have been calculated and stored within register locations H5 and H4.

After the centering breakpoint or end of data has been determined, as indicated by the arrow 1909 the start print position for printing data to be centered in a centered format within the column defined must be calculated and thereafter the carrier displaced to the start print position so that processing within the PSD loop may be returned to. This is done by initially restoring the pointer for the read only buffer, in the manner indicated by the rectangle 1910 to the position of the character being processed or the initial position at which the pointer counter resided prior to the calculation of the width to be centered in the column indicated by the rectangles 1904 and 1907 as well as the diamond 1905. Once the pointer for the RO buffer is restored, in the manner indicated by the rectangle 1910, one half the width of the information to be centered within the column as presently stored in register location H5 and H4 is loaded into register locations G1 and G0 in the manner indicated by the rectangle 1911. Thereafter, as indicated by the diamond 1912, the width of the data to be centered, as loaded in register locations H5 and H4 is tested to ascertain whether or not such width is equal to 0. If the width of data to be centered is equal to 0 in the manner indicated by the arrow 1913 annotated TRUE, no data is to be centered within the column ascertained. Therefore, as indicated by the arrow 1913 and the arrow 1914 a return to the calling routine indicated by the oval 1887 is initiated.

If data is to be centered in the manner indicated by the arrow 1915 annotated FALSE, the start position for printing of the data to be centered must now be calculated. This is done by initially fetching the special tab carrier position, subtracting one and storing the result as the end of the column position in register location G2 in the manner indicated by the rectangle 1916. In the calculation indicated by the rectangle 1916, it should be noted that a one is subtracted from the carrier positions associated with the special tab as the assumed intent imposed on the operator by the logic is that the actual end of the column position is treated as the special tab and hence one position therebefore is the last position to be considered for centering purposes as no actual printing would be intended to occur at the end point of the column. Once the end position of the column is calculated and stored in register location G2 in the manner indicated by the rectangle 1916, the program then proceeds to calculate the center position by taking one half the quantity of the column end position as stored in register location G2 plus the column beginning position as indicated by the tab which corresponds to the present position of the carrier as stored in register location HA multiplied by the width of the column in increments in the manner indicated by the rectangle 1917. Once the center position for the column has been calculated in the manner indicated by the rectangle 1917, the start print carrier position is calculated in the manner indicated by the rectangle 1918 by subtracting one half the data width as stored as a negative quantity in register location G2 from the center position and adding thereto one half the column width for the appropriate pitch being employed. Thereafter, as indicated by the rectangle 1917, the carrier is displaced to the start print position calculated in the manner indicated by the rectangle 1918. As the carrier position for centering the data width in the column has now been achieved, the program now returns, in the manner indicated by the arrow 1920 to the PSD loop indicated by the oval flag 1887 so that actual printing of the data centered may be implemented therein.

Accordingly, it will be appreciated that the portion of FIG. 26 devoted to column centering data acts in response to a column centering flag inserted at the beginning of a line to ascertain whether or not the printer may be at the beginning portion of a column defined. Once it is ascertained that the beginning portion of a column defined may be present, the read only buffer is checked to ascertain that the tab character or the like employed to define this position was read therefrom rather than the keyboard and thereafter acts to ascertain whether a column in fact has been provided. Once it is ascertained that a column has been established, the width of data to be centered within that column is calculated as is the center position of the column in which centering of data is to occur. Once these steps have been implemented the start position for printing data to be centered in a centered format within the column defined is calculated and the carrier at the printer is displaced to this position so that printing of centered data in a playback mode of operation is automatically achieved under program control without a requirement that the operator perform detailed positioning steps during the record mode of operation as the operator need merely tab to the beginning portion of the column and thereafter insert the data to be centered at the beginning of the column position defined.

The portion of the flow chart illustrated in FIG. 26 which is devoted to right flush routines upon playback will now be described. Whenever the flow chart illustrated in FIG. 26 is entered from the PSD loop at the location indicated by the oval flag 1880 and the tests indicated by the diamond 1881 for a set condition of the column centering flag is negative in the manner indicated by the arrow 1882 annotated FALSE, processing may occur according to a right flush mode of operation if columns have been defined and appropriate columnar data was inserted during a record mode of operation for the purpose of printing in a right flush manner therein.

Once the right flush routine is entered in the manner indicated by the arrow 1882, the right flush playback routine initially acts to ascertain whether or not processing is occurring or may be occurring within a defined column. Processing is occurring within a column if the right flush column flag, as located within general purpose storage location GA-1 is set while a column may be present if the carrier is at the left hand margin or the last character executed was a tab. Accordingly, as indicated by the diamond 1922, the condition of the right flush column flag is tested to ascertain whether or not the same is in a set condition. Although no specific code is required to define a right flush program sequence of operation in a play or record mode, the right flush column flag is set under program control in a manner to be described hereinafter once it has been ascertained that a column for the purposes of right flush operation is present. Similarly, this flag, as shall also be seen below, is reset each time the program ascertains that no right flush column is present or a mode of operation has been implemented which is inconsistent with a right flush playback mode. If the right flush flag has been set in the manner indicated by the arrow 1923 annotated TRUE, presence within a column is confirmed and hence branching occurs in the manner indicated by the arrow 1923 to a portion of the program routine at which actual or possible presence within or at the start of a column is confirmed. Conversely, if the right flush column flag has not been set in the manner indicated by the arrow 1924 annotated FALSE, the program next tests in the manner indicated by the diamond 1925 whether the carrier at the printer is at the left hand margin. If the carrier is at the left hand margin as indicated by the arrow 1926 annotated TRUE, branching into the path of the arrow 1923 is joined as this is sufficient to define possible presence within a column as the left hand margin may act to define the left hand portion of a column. However, if neither the right flush column flag is set nor the carrier is at the left hand margin, testing the last character executed to ascertain whether or not the same is a tab character and thereafter ensuring that this character came from the read only buffer is reqyired to ascertain whether or not the beginning portion of a column may be present. Thus, as indicated by the rectangle 1928, the last character executed is fetched from the read/write buffer and tested in the manner indicated by the diamond 1929 whether or not the same comprises a tab code. If the presence of a tab code is confirmed in the manner indicated by the arrow 1930 annotated TRUE, the last code read from the read only buffer prior to that being executed is fetched in the manner indicated by the rectangle 1931 and then tested in the manner indicated by the diamond 1932 to ascertain whether or not a tab code is present to ensure that the tab identified in association with the diamond 1929 was in fact read from the read only buffer rather than being inserted from the keyboard. The steps associated with the rectangles 1928 and 1931 as well as diamonds 1929 and 1932 are performed in the same manner to obtain the same result as the processing steps associated with rectangles 1884 and 1888 as well as diamonds 1885 and 1890 in the portion of this flow chart devoted to column centering and hence the manner in which they are implemented as well as their purpose need not be reiterated. Thus it is sufficient to appreciate that the steps indicated by the rectangles 1928 and 1931 as well as diamonds 1929 and 1932 act to define the possible presence of a column by testing whether a tab is present to define the left hand portion of that column and once a tab is defined the program acts to test in a manner to ascertain whether or not that tab came from the read only buffer rather than being inserted from the keyboard.

If either the test for a tab associated with diamond 1929 or the test for a tab read from the read only buffer associated with diamond 1932 is false in the manner indicated by the arrows 1933 or 1934 annotated FALSE, processing is not occurring at a position which may define the beginning portion of a column and hence in the manner indicated by the arrows 1933 and the arrow 1935, the right flush column flag is reset, even if it were never set, in the manner indicated by the rectangle 1936 and thereafter, in the manner indicated by the arrow 1937, a return to the calling routine in the manner indicated by the oval flag 1887 is initiated.

When the results of the test indicated by the diamond 1932 are affirmative in the manner indicated by the arrow 1938 annotated TRUE, the presence of a possible column for the purposes of right flush is confirmed and this same point in the program is directly obtained whenever a testing of the right flush column flag setting is affirmative in the manner indicated by the diamond 1922 and the arrow 1923 or a testing of the carrier position in the manner indicated by the diamond 1925 indicates its presence at the left hand margin. Thereafter, as indicated by the diamonds 1939 and 1940 the system modes operative are tested to ensure that the system is in the play mode and neither the justify or margin control modes are operative. The tests indicated by the diamonds 1939 and 1940 are performed in the same manner and for the reasons described in association with the tests indicated by the diamonds 1893 and 1896 in the column centering portion of this flow chart and here it is sufficient to appreciate that if the test indicated by the diamond 1939 is false in the manner indicated by the arrow 1941 or the test indicated by the diamond 1940 is true in the manner indicated by the arrow 1942, the right flush column flag is reset in the manner indicated by the arrow 1935 and the rectangle 1936 and thereafter as indicated by the diamond 1937 and the oval flag 1887, the calling routine is returned to. However, if the play mode is active in the manner indicated by the arrow 1943 and the justify or margin control mode has not been established in the manner indicated by the arrow 1944 the program then acts to confirm processing presence within a column.

This is done in the manner indicated by the rectangle 1945 by fetching the next tab or special tab stop from the tab register maintained in the RAM which is set to the right of the present carrier position and thereafter testing in the manner indicated by the diamond 1946 whether or not it is a special tab stop. These steps correspond to the steps associated with rectangle 1899 and diamond 1900 in the portion of this routine devoted to column centering and hence it will be appreciated that these steps are performed to confirm the presence of a column for right flush purposes. If no special tab is ascertained in the manner indicated by the arrow 1947 annotated FALSE, the right flush column flag is reset in the manner indicated by the rectangle 1936 and the a return to the calling routine occurs in the manner indicated by the oval flag 1887. However, if the presence of a special tab defining a column for right flush purposes is confirmed in the manner indicated by the arrow 1948 annotated TRUE, the right flush column flag is set in register location GA-1 in the manner indicated by the rectangle 1949. Thereafter, the program may proceed to calculations associated with defining the width of columnar data to be right flushed.

Accordingly, once the right flush column flag is set in the manner indicated by the rectangle 1949, as indicated by the arrow 1950, the program proceeds to decrement the pointer for the read only buffer behind the character being processed so that an appropriate start position for the calculatin of the width of columnar data to be right flushed is obtained in the same manner as this step was employed in the column centering portion of this routine in association with the rectangle 1903. Thus, as indicated by the rectangle 1951 the pointer for the read only buffer is decremented behind the character being processed and thereafter the routine proceeds to a calculation of the width of columnar data to be right flushed. Columnar data is defined as any space, hyphen, numerical character including fractions and any of the following symbols:

/ . , + ( & : ; = _ @ as shown in FIG. 26. Thus, as non-columnar as well as columnar data may have been input into a column by the tabbing operation conducted, the width calculation for columnar data must proceed only with respect to columnar data and must cause a branch operation and a return to PSD loop processing any time non-columnar data is found within a column and no columnar data had been previously inserted. This may occur in a typical situation where the operator is inserting dollar values or the like within a column. Under these conditions, the operator might tab to the beginning of a column location, insert a dollar sign and thereafter the numerical figures including a decimal representative of the amount. As the dollar sign would not correspond to columnar data, the appropriate print routine would cause the dollar sign to be printed at the beginning of the column while the figures representing the amount should be right flushed from the right hand portion of this column and this result, as shall be seen below, is implemented by the calculation routine for columnar data employed within the instant flow chart.

More particularly, the calculation of the width of columnar data is initiated, in a manner indicated by the rectangle 1952 by incrementing the read only buffer pointer and fetching the character therein which it is pointed to. Thereafter, as indicated by the diamond 1953, the character fetched is tested to ascertain whether or not it constitutes columnar data. If columnar data is present in the manner indicated by the arrow 1954 annotated TRUE, the width of this data is calculated and added to the register locations H5 and H4 wherein accumulation is occurring in the same manner as was described in conjunction with rectangle 1907 within the columnar centering routine. Thereafter, as indicated by the arrow 1956, the step associated with the rectangle 1952 is returned to, the character is read and tested to ascertain whether columnar data is present in the manner indicated by the diamond 1953. In this manner, the width of columnar data is accumulated in register locations H4 and H5 until the test indicated by the diamond 1953 indicates that a character not representing columnar data has been read.

When the test associated with diamond 1953 indicates that the character being tested does not represent columnar data in the manner indicated by the arrow 1957 annotated FALSE, the pointer for the read only buffer is restored to its initial position in the manner indicated by the rectangle 1958 so that the processing position therein is restored in the same manner as was described in association with the rectangle 1910 in the column centering portion of this flow chart. As the test for columnar data may prove to be negative if no columnar data is to be centered, if the first character is not columnar as in the dollar sign example illustrated above or at the end of actual columnar data which has had its length accumulated in register locations H4 and H5, as aforesaid, the program next tests in the manner indicated by the diamond 1959 whether the width of columnar data accumulated in register locations H4 and H5 is equal to ZERO (0). If the results of the test indicated by the diamond 1959 are affirmative, as indicated by the arrow 1960 annotated TRUE, a return to the calling routine in the manner indicated by the oval flag 1887 occurs so that further processing of right flush data will not occur within this routine. An affirmative result, as indicated by the arrow 1960 may mean that no columnar data is present in the column defined or merely that the initial one or more characters inserted within the column represent non-columnar data as in the case of the dollar sign example. However, as the right flush column flag is not reset under these conditions and re-entry into this loop will occur for each character processed in th PSD loop, as aforesaid, if no columnar data is present, character information will be printed as if no column existed wherein placement is defined by the point of insertion in the record mode while in the dollar sign example above, the dollar sign will be printed at the start of the column defined by the tab and thereafter when actual columnar data is processed its width will be accumulated and it will be processed in a right flush manner during succeeding re-entries into this routine.

If the width of data accumulated in H5 and H4, representing the width of columnar data, is not 0 in the manner indicated by the arrow 1961 annotated FALSE, the program then proceeds to calculate the starting point for the columnar data to be right flushed and then to displace the carrier to an appropriate start position therefor. Thus, as indicated by the rectangle 1962, the condition of the deferred escapement flag maintained in register position GF-6 is tested and if the same has been set, the deferred escapement width is added to the data width stored in register locations H5 and H4 to appropriately increment the data width stored for columnar data to reflect the width of the character whose last escapement portion has not been executed. Thereafter, as indicated by the rectangle 1963, the position information associated with the special tab defining the right hand portion of the column is fetched and stored in register location G2. Once this is done, the start print carrier position is calculated in the manner indicated by the rectangle 1964 by taking the carrier position defined by the special tab location now stored in G2 and subtracting therefrom the width of data to be right flushed and addin one-half the print column width to achieve appropriate positioning of the data to be right flushed.

Once the start print position for the data to be right flushed is calculated in the manner indicated by the rectangle 1964, the start print position ascertained is tested against the present carrier position in the manner indicated by the diamond 1965 to ascertain whether or not the start print position is to the left of the present carrier position. If the test indicated by the diamond 1965 produces an affirmative result as indicated by the arrow 1966 annotated TRUE, a return to the calling routine as indicated by the arrow 1967 and the oval flag 1887 is initiated. This occurs, as it will be recalled that the present carrier position represents the position which was initiated upon the execution of the tab last executed and hence if the start point is to the left of the present carrier position, the columnar data width exceeds the width of the column defined therefor. Under these circumstances, right flushing of the data will not occur as it is assumed an erroneous entry has been made. However, if the start point calculated is not to the left of the present carrier position in the manner indicated by the arrow 1968 annotated FALSE, the carrier is displaced to the start print position set in register locations G1 and G0 in the manner indicated by the rectangle 1969 and thereafter in the manner indicated by the arrow 1970 and the oval loop 1887, a return to the calling routine is initiated so that the columnar data to be right flushed may be printed in the PSD routine from the start point calculated and hence printed in a right flush manner.

It will be seen that whenever the right flush portion of the flow chart illustrated in FIG. 26 is entered, the actual or possible presence of a column is tested for and then confirmed. Thereafter, the width of columnar data is calculated in such manner that if non-columnar data is present, it is ignored through an exiting from the routine and thereafter a return thereto when columnar data is present so that the width of actual columnar data to be right flushed may be calculated once the width of columnar data is calculated, a start point for printing the columnar data flush to the right portion of the column defined is calculated and if the start point does not exceed the width of the column defined, the carrier is displaced to the start point and the play/skip/dup routine is re-entered. Upon re-entry of the play/skip/dup routine, the columnar data is printed in the traditional manner and due to the start position calculated under program control, the last character of the columnar data is printed adjacent to the right hand side of the column defined. In this manner, columnar data such as statistical data may be automatically formatted flush to the right hand portion of a column without detailed positioning operations being performed by an operator. Both the right flush and column centering routines described in conjunction with FIG. 26 are operative to appropriately position the data formatted therein regardless of whether printing has been selected to occur in ten pitch, twelve pitch or porportionally spaced printing modes of operation.

"AUTO LOG" PRINTOUT MODE

Referring now to FIG. 27, there is shown a flow chart depicting a programmed sequence of operations for an auto log printout mode of operation wherein format information and descriptive information recorded in format blocks is selectively printed. During any record operation, a format block which contains margin, tab and file header information may be recorded on the record media to appropriately apprise the operator of the content and format of the actual document information recorded in the block subsequent thereto. This is done in cassette versions of the instant invention by initially recording a block mark or reference code and thereafter recording a format code (code key +q), thereafter margins and tabs are set in the traditional manner, a special carriage return is entered to return the carrier to the left margin and any file header information desired such as a precis defining the nature of the information to be subsequently entered may be recorded within that format block. In card versions of the instant invention, reference codes are not employed; however, the format block must be entered at a location corresponding to the left hand margin so that it initiates the contents of the line recorded. Normally, the contents of the format block will not be printed unless the code print key is depressed. However, when a format block is read, the margin and tab information therein is utilized to insert new margin and tab settings into the system. Thus the techniques for recording a format block are highly advantageous both from the standpoint of inserting margin and tab settings from the record media as well as for describing the content of a given block of information recorded on that record media.

The auto log printout mode of operation which may be initiated, under program control, in accordance with the teachings of the instant invention relies upon the format and file header information, recorded in a format block subsequent to a block mark and prior to printed text to provide a log or list of the contents of a prerecorded media as a function of the information recorded in format blocks therein. Thus, if an operator records a format block containing appropriate file header information each time the content of the record media is changed and precedes the format block by a block mark or initiates the same at the left hand margin in card versions of the instant invention, the auto log printout routine whose flow chart is illustrated in FIG. 27 may be relied upon to provide an operator with a detailed listing of the information contained on a given record media. Thus, should the operator desire to have a listing of the contents of a prerecorded record media on which format blocks are appropriately recorded, the auto log printout mode of operation may be initiated to cause the contents of each format block following a block mark to be printed out in a listing so that the operator may readily discern the contents of the prerecorded record media without actually causing the contents thereof to be played back.

To initiate an auto log printout routine, the operator would set the thumbwheels at the keyboard to ZERO (0), depress the code print key and strike the search key to cause the auto log printout routine to be entered. In card embodiments of the instant invention, the auto log printout routine will start from the first track of information regardless of the present position of the head; however, in tape embodiments of the invention the auto log printout routine starts from the current positon of the media and hence to obtain an auto log printout for the entire media, a search to the initial reference code for a rewinding of the entire media must be conducted. The format block recorded on the media will typically take the form of a 10 format code which identifies the information as a format block and thereafter left hand and right hand margin information will be read from the RAM and recorded followed by tab information read from the RAM. The end of the tab information is indicated by the code 9F which here acts to define the end of the tab field. Special tabs printed with slashes are subsequently read from the RAM and recorded and again followed by the code 9F. Thereafter, header information is recorded and then a carriage return code is entered which completes the format block through the insertion of a 00 defining an end of data. During entry of any information contained in the format block, special carriage return characters must be employed to return the carriage to the left hand margin as the entry of a normal carriage return code terminates the block.

Referring now particularly to FIG. 27, it will be seen that the flow chart for the auto log printout routine illustrated therein is entered at the location of the oval flag 1970 annotated Execute Search. The routine is entered from a keyboard input analysis and execution routine upon a depression of the search key after the initial conditions for this special processing routine have been established. When the routine is entered in the manner indicated by the oval flag 1980 it initially tests as indicated by the diamond 1981 to ascertain whether a media is active and not running, i.e., not being displaced. If the results of this test are negative, as indicated by the arrow 1982 annotated FALSE, the search routine initiated at the keyboard may not yet be executed and hence, in the manner indicated by the triangle 1983 an error buzzer is sounded and a return to the idle loop is initiated for a reinitiation of the routine upon termination of the displacement of the active record media. If a media is active and that media is not being displaced in the manner indicated by the arrow 1984 annotated TRUE, the search flag maintained in register location G9-7 is set in the manner indicated by the rectangle 1985. Thereafter, as indicated by the diamonds 1986 and 1987, the initial conditions required to be established for an auto log printout routine are checked to assure that all conditions precedent have been established. Thus, as indicated by the diamond 1986, the setting at the thumbwheels are checked to ascertain if a 00 setting has been established. If no 00 setting has been established, in the manner indicated by the arrow 1988 annotated FALSE, a branch to a normal searching routine for the block number actually set at the thumbwheels is initiated in the manner indicated by the triangle 1989 as the initial conditions for an auto log printout routine have not been established. However, if the thumbwheels have been set to a 00 condition as indicated by the arrow 1990 annotated TRUE, the condition of the code print key is tested in the manner indicated by the diamond 1987 to ascertain whether or not the same has been depressed. If the code print key has not been set in the manner indicated by the arrow 1991 annotated FALSE, a branch to a search to the end of the record (EOR) routine is initiated in the manner indicated by the triangle 1992 since absent a depression of the code print key setting the thumbwheels to 00 and pressing the search or track set key will define this mode of operation.

If the thumbwheels are set to 00 and the code print key has been depressed in the manner indicated by the arrow 1993 annotated TRUE, the auto log printout routine has been properly defined and preconditioned. Therefore, prior to actually entering the routine, the present margin and tab settings set in the RAM at locations 200 - 227 for tabs and locations 240 and 241 for the left and right margins respectively are transferred into temporary format storage locations 248 - 287 for tabs and 288 and 289 for the left and right margins, respectively, so that the same may be saved for subsequent use and a restoration of current conditions when the auto log printout routine terminates. This is done in the manner indicated by the rectangle 1994 and thereafter the auto log print flag maintained in register GA-0 is set in the manner indicated by the rectangle 1995. Once all of these initial conditions have been established in the manner indicated by the rectangles 1994 and 1995, actual processing within the auto log printout routine occurs.

Processing according to the auto log printout routine, is initiated by testing, in the manner indicated by the diamond 1996 whether or not the last record read from the RO buffer was a block mark. If a block mark was read in the manner indicated by the arrow 1997 annotated TRUE, the read only buffer is cleared in the manner indicated by the rectangle 1998 precedent to loading the read only buffer from the active record media. Thereafter, as indicated by the arrow 1999, the read auto log character routine, indicated by the oval flag 2000 is entered. Conversely, when the last character read from the RO buffer was not a block mark, in the manner indicated by the arrow 2001 annotated FALSE, the next block mark on the record media is searched for and thereafter the read auto log character routine indicated by the oval flag 2000 is entered. Thus, as indicated by the arrow 2001 annotated FALSE, whenever the last character read from the read only buffer is not a block mark, the record media is searched forward, at high speed to the next block mark in the manner indicated by the rectangle 2002.

The search of the record media for a block mark in the manner indicated by the rectangle 2002 is conducted at 70 ips, it being appreciated that block marks are recorded with a sufficient interrecord gap so that they may be defined by a timed interval in which no flux transitions are read from the media in the manner described in U.S. patent application Ser. No. 429,479, supra. Once a block mark has been located in the manner indicated by the rectangle 2002, the system tests to ascertain whether or not the stop key was depressed in the manner indicated by the diamond 2003. If the stop key was depressed as indicated by the arrow 2004 annotated TRUE, a return to the idle loop as indicated by the triangle 2005 is initiated so that the stop code is executed and honored therein. If the stop key was not depressed in the manner indicated by the arrow 2006 annotated FALSE and the arrow 2007, the read auto log character routine associated with the oval flag 2000 is entered in the manner indicated. Accordingly, if a block mark was the last character read from the RO buffer, the RO buffer is cleared and the read auto log character routine indicated by the oval flag 2000 is directly entered, while if the last character read from the RO buffer was not a block mark, a high speed search is conducted for a block mark in the manner indicated by the rectangle 2002. Thereafter, if the stop key was not depressed, the read auto log character routine indicated by the oval flag 2000 is entered so that in either event, a block mark is ascertained and then processing in conjunction with the read auto log character routine is initiated.

Once the read auto log character routine indicated by the oval flag 2000 is entered, the next character is fetched from the RO buffer and if the RO buffer is empty, the next line from the media is read and loaded therein in the manner indicated by the rectangle 2008. The character read from the read only buffer in the manner indicated by the rectangle 2008 is next tested in the manner indicated by the diamond 2009 to ascertain whether a format code was read. If no format code was read in the manner indicated by the arrow 2010 annotated FALSE, as would be the case when a block mark had just been searched for and then the block associated therewith is read into the RO buffer, the program next tests in the manner indicated by the diamond 2011 to ascertain whether a block mark code was read. Under conditions where a block mark was just searched for and then loaded into the RO buffer, the test indicated by the diamond 2011 would produce an affirmative result as indicated by the arrow 2012 annotated TRUE.

When a block mark is ascertained in the manner indicated by the arrow 2012, it is to be printed together with the reference code associated therewith and thereafter any format information which may be present is also printed. Accordingly, when a block mark is ascertained in the manner indicated by the arrow 2012, the carrier is first displaced to the left hand margin in accordance with the margin defined within temporary RAM location 288 and then the paper is indexed three times to provide an appropriate break between character information printed from the last format code, if any, in the manner indicated by the rectangle 2013. Once the carrier at the printer has been appropriately displaced in the manner indicted by the rectangle 2013, the block number storage and the block number display are updated to reflect the reference code just read in the manner indicated by the rectangle 2014. Thereafter, in the manner indicated by the rectangle 2015, the block number is printed and the RO buffer is carried in the manner indicated by the rectangle 2016. Thereafter, as indicated by the diamond 2017, the condition of the stop key is then tested. If the stop key has been depressed in the manner indicated by the arrow 2018 a branch to the idle routine indicated by he triangle 2005 occurs whereupon the stop key is executed.

If the stop key has not yet been depressed, as indicated by the arrow 2019 annotated FALSE, a return to the read auto log character routine indicated by the oval flag 2000 is initiated in the manner indicated by the arrows 2019 and 2007. When this routine is again entered, in the manner indicated by the rectangle 2008, the next character is fetched from the RO buffer in the manner indicated by the rectangle 2008 and then tested as to whether or not a format code is present in the manner indicated by the diamond 2009. Assuming that a block mark was just read and processed in the manner indicated by the rectangles 2013 - 2016, the read only buffer will have been cleared and thereafter loaded with the format block. Therefore, under these conditions, the test indicated by the diamond 2009 will produce an affirmative result as indicated by the arrow 2020 annotated TRUE. When this occurs, the processing and printing of actual format information will begin. Thus, as indicated by the rectangle 2021, the format information is read from the read only buffer and stored in the normal printer format storage locations whose original contents were placed in the temporary format storage locations in the manner indicated by the rectangle 1994. Thus, margin information will be inserted in RAM locations 240 and 241 while tab information will be stored in RAM locations 200 - 227 in the manner indicated by the rectangle 2021. Thereafter, the format information loaded into the RAM is printed in the manner indicated by the rectangle 2022. More particularly, the carrier is displaced to the left hand margin position and to indicate format is printed followed by capital MG: standing for margins. Thereafter, the column positions defined for the left and right margins of the format block are read from RAM locations 240 and 241 respectively into the main register M and printed. Subsequently, the carrier is displaced to the same left hand margin and indexed and then the term TB: is printed standing for tabs and thereafter the column positions for the tabs defined in RAM locations 200 - 227 are printed. If special tabs have also been set, the term T̸ B̸ is printed following the term TB and after the colon, tab column positions associated with regular tabs are normally printed while column positions associated with special tabs are printed and overprinted by a slash to indicate that they are special tabs. Thereafter, the carrier is again returned to the left hand margin and indexed.

Upon completion of the printing of the actual format information in the manner described in association with the rectangle 2022, actual header information, if present, is printed from the remainder of the RO buffer in the manner indicated by the rectangle 2023. Such header information may take any appropriate message form which is advisory in nature and defines the subject matter recorded in subsequent lines in the block. A typical block mark and format print out is illustrated in the lower portion of FIG. 27 to illustrate the nature of the information printed. Thus, the z̸ followed by the characters 04 indicate that block mark 4 is being printed and thereafter three lines of format information are set forth wherein the E̸ indicates format printout, MG: stands for margins and 12 and 84 indicate the left and right hand margin set in data format block respectively. Similarly, TB stands for tabs, while T̸B̸ stands for special tabs and the printout is indicative that special tabs have been set at column positions 24, 42, 57 and 72 while regular tabs have been established at column positions 32, 47 and 62. The last line of information printed as Financial Report represents the header which was inserted in the format block indicating the nature of the following passage. Once the format block is printed in the manner indicated by the rectangles 2021 - 2023, the normal margin and tab settings present in temporary format storage within locations 248 - 289 of the RAM are restored to the normal tab locations storage provided in RAM locations 200 - 227 as well as to the normal storage for the left and right hand margins at RAM locations 240 and 241 in the manner indicated by the rectangle 2024.

Once the original margins and tabs have been restored in the manner indicated by the rectangle 2024, the carrier is displaced to the left hand margin established in temporary storage location 288 which here would correspond to the left hand margin just restored in connection with the step indicated gy the rectangle 2024 and thereafter the paper is indexed three times to provide an appropriate displacement for the next group of format information to be printed in the manner indicated by the rectangle 2026. Thereafter, as indicated by the rectangle 2002, the media is searched in a forward direction at high speed until a new block mark is ascertained and thereafter the condition of the stop key is tested in the manner indicated by the diamond 2003. If the stop key has not been depressed, the read auto log character routine indicated by the oval flag 2000 is re-entered in the manner indicated by the arrows 2006 and 2007 so that the next block mark and any following format code may be obtained and printed in the manner previously indicated.

Although format blocks may be inserted on a record media at a position which does not fall between a block mark, and the first printing text in the block, the portion of the flow chart illustrated in FIG. 27 described above will render it apparent that any format block thus recorded on the record media will not print in an auto log routine. Similarly, although block marks will be periodically recorded on the record media, format blocks would not necessarily follow each block mark so recorded. Under these conditions, when the read auto log character routine associated with the oval 200 is entered after the printing of a block mark and the next character is fetched in the manner indicated by the rectangle 2008, both the test indicated by the diamonds 2009 and 2011 would be false in the manner indicated by the arrow 2028, indicating that no format block follows the block mark code. Under these conditions as indicated by the diamond 2029, the code read from the read only buffer is tested to ascertain whether or not it constitutes an end of record code. If this code is present in the manner indicated by the arrow 2030 annotated TRUE, the block number storage and block display is updated in the manner indicated by the rectangle 2031 and a code print indicative of the end of the record is printed in the manner indicated by the rectangle 2023. Thereafter, as indicated by the arrow 2033 and the triangle 2005, a return to the idle loop is initiated as an end of the media has been ascertained and hence a completion of the auto log printout routine has been accomplished. Although this sequence of events has been described in conjunction with a set of conditions where no format code block follows a block mark it will be apparent that the same result obtains any time the end of the media is reached in an auto log printout routine.

If the test indicated by the diamond 2029 is negative, as indicated by the arrow 2034 annotated FALSE, the program next tests in the manner indicated by the diamond 2035 whether or not a space or printing character has been read. If the results of the test indicated by the diamond 2035 are negative, as indicated by the arrow 2036 annotated FALSE, a return to the read auto log character routine indicated by the oval flag 2000 is initiated in the manner indicated by the arrows 2036 and 2007. However, if a space or printing character is ascertained in the manner indicated by the arrow 2037, no format code has been recorded between the block and the first text. Therefore, under these conditions, the carrier is displaced to the left hand margin and indexed three times in the manner indicated by the rectangle 2026 and a search forward on the media to the next block mark is initiated in the manner indicated by the rectangle 2002. Thereafter, the condition of the stop key is tested in the manner indicated by the diamond 2003 and if the stop key has not been depressed, the read auto log character routine indicated by the oval flag 2000 is returned to so that block marks followed by any following format blocks will be printed out in the manner described above until an end of the record is ascertained.

Accordingly, it will be appreciated that the auto log printout routine illustrated in FIG. 26 acts to provide an operator with a printed record of information recorded in format blocks following block marks on a record media so that if appropriate header information was recorded, a log of the information on that record media may be read out and printed in a summary fashion.

PRINT TEXT STRING SEARCH

Referring now to FIGS. 28A - 28D, there are shown flow charts depicting the program cycle of operations wherein data is entered from the keyboard and the record media is searched therefor. FIG. 28A illustrates the initial portion of this routine and FIGS. 28B and C illustrate forward and reverse portions respectively of the searching routines, while FIG. 28D shows the comparison routine initiated per se. The function of the text string search routines provided within the instant invention is to permit the operator to identify text which has been previously recorded on the media and which is desired to be located by entering a sufficient number of characters from the keyboard to uniquely define the text which is desired to be located. Once this is done, the record media is automatically searched under program control until the string of defined text thereon is ascertained. Thereafter, the system is placed in a position so that upon the initiation of a normal playback routine, the beginning point of the string of identified text plays out. The text string search procedures are initiated at the keyboard by an operator loading a record media and in the case of a cassette embodiment, searching such media to the block location in which the desired text resides. Once the appropriate block is identified through appropriate search procedures, the code key and search key are depressed providing the operator with access to a text string search stack in which data corresponding to the information to be searched for may be queued by insertion thereof at the keyboard. Only a sufficient number of characters touniquely identify the string of text to be searched need to inserted; however, sufficient space in the stack is provided so that up to 50 characters may be inserted. The text string search queue may be inserted at the keyboard through blind typing; i.e., where no printout occurs, or if the code print key is depressed, the string of text to be located, as defined at the keyboard, will be printed out.

Once the string of text has been identified through insertion at the keyboard, the direction in which the search is to be conducted within the block of information at which the automatic writing system resides is defined through the entry of either a carriage return or precedented carriage return character. A carriage return character defines a search in a forward direction while a precedented carriage return code defines searching in a reverse direction. Once these entry procedures have been completed, the automatic writing system according to the instant invention will conduct the search at a skip rate and provide an indication to the operator when a defined search has been completed.

Referring now specifically to FIG. 28A, the initial portion of the text string search routine flow chart is illustrarted and this portion of the routine is specificaly devoted to ascertaining that appropriate input conditions for the text string search routine exist; accepting, accumulating, and thereafter establishing the text string queue inserted at the keyboard and finally setting the appropriate search forward or search reverse direction flag so that the search forward or search reverse search routines illustrated in FIG. 28B and FIG. 28C, respectively, may be entered. The entry point for the flow chart illustrated in FIG. 28A is indicated by the oval flag 2050 annotated Text SCH and it will be appreciated by those of ordinary skill in the art that this routine is entered from the keyboard input analysis and execution routine when a code search input is identified and a 00 condition does not reside at the thumbwheels.

Once the routine is entered in the manner indicated by the oval flag 2050, the condition of the system is tested in the manner indicated by the diamond 2051 to ascertain whether the play mode has been established and a media is loaded and active. Sinch both the establishment of the play mode of operation and the presence of an active media are requisite to the text string search routine depicted, if the test indicated by the diamond 2051 is negative in the manner indicated by the arrow 2052 annotated FALSE, an error buzzer is sounded in the manner indicated by the rectangle 2053 to apprise the operator that the search cannot be executed and thereafter as indicated by the triangle 2054, the idle routine is returned to to await the insertion of new instructions from the keyboard. If both the play mode has been established and a media is active in the manner indicated by the arrow 2055 annotated TRUE, the program next tests in the manner indicated by the diamond 2056 whether or not a revise mode of operation has been established.

Although the text string routine may be initiated while the system is in a revise mode, if the revise key has been depressed the text string search routine wll only be initiated at a point where the revision of a given line has been appropriately completed. More particularly, when the revise mode has been established as indicated by the arrow 2057 annotated TRUE, the system next tests in the manner indicated by the diamond 2058 whether or not the revise limits have been exceeded. Thus, it will be recalled that in a revise mode of operation, an operator may add up to 50 characters to the original line length recorded or a sufficient number of characters to fill the track in card embodiments to achieve a revision of the information thereon in a desired manner. However, during entry, no limiting condition is imposed on the number of characters added to a line during entry because it is assumed that if more than 50 characters are added, subsequent information in the line will be skipped and hence no error indication is provided until a recording operation for the revised line of information is initiated. However, it is conceivable that an operator may have added more than 50 characters to a line being revised and may then attempt to initiate a text string search prior to skipping additional information or the recording of the line as in a typical case, when the operator is dissatisfied with the nature of the revision accomplished, searching to a new entry point under a text string search condition may be implemented. For this reason, whenever the test indicated by the diamond 2058 is indicative that the revise limits have been exceeded in the manner indicated by the arrow 2059, the error indication is initiated in the manner indicated by the rectangle 2053 and thereafter idle is returned to in the manner indicated by the triangle 2054. However, if the revise limits have not been exceeded in the manner indicated by the arrow 2060 annotated FALSE or if revise is not on in the manner indicated by the arrow 2061 annotated FALSE, processing within this routine may proceed.

Therefore, as indicated by the rectangle 2062, the position of the carrier at the printer is saved within register locations HE and H9. This is done so that should the entry of the queue be attended by the depression of the code print key wherein the operator is desirous of printing out the information to be searched for as inserted at the keyboard, the carrier at the printer unit may be returned to its initial position upon the termination of the entry or at the completion of a successful search. Once this is done in the manner indicated by the rectangle 2062, the text string search queue maintained within RAM locations at 290-2C2 is cleared in the manner indicated by the rectangle 2063 so that the same is placed in an appropriate condition for the entry of the text string to be searched at the keyboard. Thereafter, the condition of the stop key is tested in the manner indicated by the diamond 2064 so that if the stop key has been depressed it can be honored prior to the initiation of the actual text string routine which will next involve the accumulation of the string of text inserted at the keyboard and the establishment of a queue therefor within the text string search queue maintained within the RAM. Accordingly, if the stop key has been depressed in the manner indicated by the arrow 2065, a return to the idle loop indicated by the triangle 2054 is initiated so that the stop code may be executed. However, if the stop key has not been depressed as indicated by the arrow 2066 annotated FALSE, monitoring of the keyboard may be initiated together with the accumulation of text string information to be located whenever the same is inserted.

Accordingly, as indicated by the diamond 2067, the program next monitors the keyboard to ascertain whether or not a keyboard entry has occurred. if no keyboard entry has occurred in the manner indicated by the arrow 2068 annotated FALSE in the manner indicated by the arrow 2069 a return to the test associated with the diamond 2064 is initiated, so that the stop key is again tested and the keyboard input then monitored. This cycling will continue until an actual keyboard entry is ascertained.

When a keyboard entry is ascertained as indicated by the arrow 2070 annotated TRUE, the entry is tested to ascertain whether or not it corresponds to the entry of a line correct code in the manner indicated by the diamond 2071. If a line correct code is present in the manner indicated by the arrow 2072 annotated TRUE, the queue maintained within RAM locations 290 - 2C2 is cleared in the manner indicated by the rectangle 2073 as it is assumed that the operator made an error and is desirous of clearing the whole queue through the entry of a line correct code. Thereafter, as indicated by the arrow 2074 and 2069, a checking of the condition of the stop key followed by a keyboard input monitoring routine is returned to so that further or new information for the text string queue to be assembled may be detected.

When no line correct code is present as indicated by the arrow 2075 annotated FALSE, the input code detected is text tested to ascertain whether or not it corresponds to a character correct code in the manner indicated by the diamond 2076. If a character correct code has been entered, in the manner indicated by the arrow 2077 annotated TRUE, the last character accumulated within the text string search queue is cleared in the manner indicated by the rectangle 2078 and thereafter in the manner indicated by the arrow 2079 a return to monitoring the condition of the stop key and keyboard is returned to so that the new character entered from the keyboard may be detected and properly inserted within the queue. The step indicated by the rectangle 2078 is implemented, as will be appreciated by those of ordinary skill in the art by decrementing the address of the text search queue pointer maintained in RAM location 2C3 and thereafter clearing the character which has been stored in the decremented position in a manner which typifies all stack operations within the instant invention. In both steps 2073 and 2078, the carrier is returned through the appropriate number of character positions if code print was on and the queue inserted was printed.

If no character correct code has been entered in the manner indicated by the arrow 2080 annotated FALSE, the character entry is tested to ascertain whether or not the entry is a printing character or a space code in the manner indicated by the diamond 2081. If a printing character or space code is present, in the manner indicated by the arrow 2082 annotated TRUE, it may be assumed that this information is part of the information being inserted by the operator to define the text string to be located and hence is appropriate for insertion in the queue; however, if not printing character or space code is ascertained by the test indicated by the diamond 2081 in the manner indicated by the arrow 2083 annotated FALSE, the end of the queue may be being defined or an error condition may exist.

When a printing character or space code is detected by the test indicated by the diamond 2081 in the manner indicated by the arrow 2082 annotated TRUE, the character is assumed to be part of the text string being defined by the operator at the keyboard and hence should be inserted within the text string search queue if appropriate conditions obtain. Therefore, as indicated by the diamond 2084, the pointer for the text string search queue maintained in RAM location 2C3 is tested to ascertain whether the queue is full. If the queue is full in the manner indicated by the arrow 2085 annotated TRUE, an error buzzer is sounded in the manner indicated by the rectangle 2086 and thereafter as indicated by the arrows 2087 and 2069, the stop key and keyboard monitoring functions are returned to since, the operator has been advised that no further information can be inserted in the queue and therefore, the direction in which the search must be conducted must now be defined through the entry of a carriage return or precedented carriage return code. If the queue is not full in the manner indicated by the arrow 2088 annotated FALSE, the condition of the pointer is tested in the manner indicated by the diamond 2089 to ascertain whether or not the queue is within five characters of being full. If this condition obtains as indicated by the arrow 2090 annotated TRUE, a warning to the operator is provided in the manner indicated by the rectangle 2091, and thereafter conversions precedent to entry of the information in the queue are initiated in the manner indicated by the rectangle 2092. However, if the queue is not within five characters of being full as indicated by the arrow 2093 annotated FALSE, the conversion step associated with the rectangle 2092 is immediately entered.

The conversion step associated with the rectangle 2092 is performed to provide automatic corrections for errors in entry of the queue which may be anticipated. Thus, for instance, characters such as space codes or hyphens are printed as such regardless of whether or not the same were entered in the normal form or in a precedented form. Accordingly, to avoid conditions where the operator is entering a queue involving space codes and hyphens and in error enters either a precedented or normal code when the converse was entered on the media, all space codes and hyphens entered from the keyboard for insertion in the queue are converted to normal space codes and normal hyphens prior to entry into the queue and as shall be seen hereinafter, when the actual search is being conducted for character information on the media, all space codes and hyphens read therefrom are converted to normal form so that a comparison will result even if the code recorded on the media is a precedented space code while the operator actually enters a normal space code in the insertion of the text string to be searched. Thus, as indicated by the rectangle 2092, if the code entered was a precedented space it is translated to a normal space code and if the code entered was a precedented hyphen, it is translated to a normal hyphen so that appropriate comparison regardless of operator error will occur.

Similarly, as indicated by the rectangle 2094, character codes which vary at the keyboard but print the same and hence have the same printer data ROM address are translated to their printer data ROM address and stored in the queue so that the entry of a different code which print the same will result in an appropriate comparison when the actual search is conducted regardless of operator error. Thus for instance, it will be seen that both a capital and lower case period may be entered at the keyboard and will result in the printing of the same character. Therefore, as this is an area wherein operator error would be common upon entry of the queue by reviewing printed media, the printer data ROM address for a period is inserted into the queue so that a comparison will result regardless of whether the operator error occurs. Thereafter, as also indicated by the rectangle 2094, the code inserted after appropriate conversion in the manner indicated by the rectangles 2092 or 2094 is inserted into the queue. After the conversions associated with the rectangles 2092 and 2094 have been implemented and the code is stored in the queue together with a subsequent implementing of the pointer address therefor, the program next proceeds in the manner indicated by the rectangle 2095 to print the character if code print is on. This printing, is directed to printing of information entered into the queue from the keyboard and will only occur if the operator has depressed the code print key. Otherwise, entry is blind and hence no printing occurs.

Upon completion of the step indicated by the rectangle 2095, as indicated by the arrow 2096, and 2069, a return to the monitoring of the stop key and detection of keyboard inputs occurs so that the text string search queue maintained within RAM locations 290 - 2C2 has each character inserted by the operator at the keyboard which appropriately defines the text string to be searched loaded therein in the same manner indicated by the diamonds 2084 and 2088 as well as rectangles 2092, 2094, and 2095. In this manner, sufficient information within the text string queue will be accumulated to uniquely define the string of data on the media to be searched.

When the operator has completed the insertion of information at the keyboard which is necessary to define in a unique manner the text string search to be located, it being appreciated that only sufficient information is generally inserted to uniquely define the string of text, the operator then must enter a carriage return or precedented carriage return to define whether or not the search to be conducted is to be conducted in a forward or reverse direction. When a carriage return character is inserted, it will be processed through the test associated with the diamonds 2071, 2076 and 2081 providing a false indication in each case. Thereafter, as indicated by the arrow 2083 annotated FALSE, the code will be tested to ascertain whether or not a carriage return is present in the manner indicated by the diamond 2097. If a carriage return character is present in the manner indicated by the arrow 2098 annotated TRUE, the text search flag maintained in register location G9-7 is set in the manner indicated by the rectangle 2099, a carriage return is executed if code print is on in the manner indicated by the rectangle 2100 and thereafter exiting to the search forward routine depicted in FIG. 28B occurs in the manner indicated by the oval flag 2101. Conversely, if a precedented carriage return was inserted to indicate a search in a reverse direction, the test associated with the diamond 2097 will provide a negative result as indicated by the arrow 2102 annotated FALSE. Under these conditions, the character will be tested in the manner indicated by the diamond 2103 to ascertain whether or not a precedented carriage return is present. If a precedented carriage return code is present in the manner indicated by the arrow 2104 annotated TRUE, the search flag is set in the manner indicated by the rectangle 2105 and thereafter a carriage return is executed at the printer unit if code print was set in the manner indicated by the rectangle 2106. Here, however, as indicated by the oval flag 2107, exiting to a reverse search routine as illustrated in FIG. 28C occurs. If not precedented carriage return is detected under these conditions, as indicated by the arrow 2108 annotated FALSE, the error buzzer is sounded in the manner indicated by the rectangle 2086 and thereafter as indicated by the arrows 2087 and 2069 a return to monitoring the stop key and keyboard occurs to await the entry of an appropriate character from the keyboard.

Accordingly, it will be appreciated that the flow chart illustrated in FIG. 28A acts to ascertain that appropriate conditions are present for initiating a text string search, and thereafter, is responsive to codes entered at the keyboard to accumulate a string of text which is sufficient to uniquely define the text to be searched for within the text string search queue maintained within the RAM. During such accumulation, any characters which could be readily confused during entry by the operator are translated in an appropriate manner so that the same will result in a definite comparison during the search routine regardless of whether or not error during entry was made. Thereafter, upon the specification by the operator whether the search is to occur in a forward or reverse direction, the search flag is set, a carriage return character is executed, if code print was on, to return the carrier to its position prior to the printing of the text string inserted for search purposes and thereafter branching to either a search forward or search reverse routine as depicted in FIGS. 28B or 28C is initiated.

Referring now to FIG. 28B, the flow chart for a search operation conducted in a forward direction is disclosed. The flow chart illustrated in FIG. 28B is entered once the operator has completed entering the string of text to be searched and has specified that a search in the forward direction is to be initiated by entering a carriage return character at the end of the string of text which has now been loaded in queue to uniquely define the string of text on the media for which a search is to be conducted. The search routine for searching in a forward direction as illustrated in FIG. 28B is entered at the portion thereof indicated by the oval flag 2110. When entered, the program initially tests in the manner indicated by the diamond 2111 as to whether or not processing has been initiated at the beginning of the read only buffer. If the beginning of the read only buffer is pointed to by the pointer therefor as indicated by the arrow 2112 annotated TRUE, the program next tests to ascertain whether or not the stop key has been depressed as indicated by the diamond 2113. If the stop key has been depressed as indicated by the arrow 2114 annotated TRUE, a return to the idle loop where the stop key is executed occurs in the manner indicated by the triangle 2115. If the stop key has not been depressed in the manner indicated by the arrow 2116 annotated FALSE, or if the read only buffer is at some intermediate data condition as indicated by the arrow 2117 annotated FALSE, the next character is fetched from the read only buffer in the manner indicated by the rectangle 2118 and of course should the read only buffer be empty, the next line is read from the record media.

Once the character is fetched in the manner indicated by the rectangle 2118, it is tested in the manner indicated by the diamond 2119 as to whether the character comprises a format code. If a format code is present in the manner indicated by the arrow 2120 annotated TRUE, the tab and margin information present in the format code is inserted into the appropriate RAM locations in the manner indicated by the rectangle 2121 so that the automatic writing system is updated with regard to format information as format blocks are read. In addition, as indicated by the rectangle 2121, the format block is transferred to the read/write buffer and if the record key is depressed, the contents of the read/write buffer will be recorded. Thereafter, the read only buffer is cleared in the manner also indicated by the rectangle 2121 and, as indicated by the arrow 2122, the entry portion to the routine is returned to so that the next line of data may be processed in similar manner.

If no format code is present in the manner indicated by the arrow 2123 annotated FALSE, the character fetched is tested to ascertain whether or not a block mark or end of record code is present in the manner indicated by the diamond 2124. If a block mark or end of record code is present, it will be recalled that an inpermissible condition has occurred since text string search in cassette versions of the instant invention are limited to the block defined by the operator. Therefore, if a block mark or end of record code is present in the manner indicated by the arrow 2125 annotated TRUE, skipping back behind the present record to allow a reverse search occurs in the manner indicated by the rectangle 2126 so that data is conditioned for searching in this direction in the previous block. However, as this condition must await the entry of a precedented carrier return, an error buzzer is sounded in the manner indicated by the rectangle 2127 and thereafter the idle routine is returned to in the manner indicated by the triangle 2115.

If neither a format code nor a block mark or an end of record code is present in the manner indicated by the arrow 2128 annotated FALSE, the character read from the read only buffer must be compared with the first character of the text string queue inserted within the RAM by the operator to ascertain whether or not the first character read may be the start of the text string queue defined. This step is indicated generally by the dashed block 2129 and the detailed manner in which the comparison occurs is illustrated in detail in the flow chart illustrated in FIG. 28D. The manner in which the text string comparison routine operates will be discussed immediately below to fully acquaint the reader with the modes of operation employed therein. However, at this juncture it is sufficient to appreciate that if a comparison does not obtain, the character compared, as indicated by the arrow 2130 annotated FALSE is transferred to the read/write buffer in the manner indicated by the rectangle 2131 and thereafter the initial point of this routine is returned to in the manner indicated by the arrow 2122 so that a next character may be fetched from the RO buffer and compared with the first character in the text string search queue. Conversely, if the first character read from the read only buffer in any given sequence through the search forward routine compares with the first character in the queue as determined by the text string comparison operation associated with the dashed block 2129, the next character in the RO buffer is compared with the succeeding character in the text string queue to ascertain if these two characters compare. If a favorable comparison results, this operation is continued until a comparison to the end of the search queue established is obtained or until a comparison with the entire group of characters read from the RO buffer in sequence compares identically with the sequence of characters loaded into the text string search queue. When these results obtain as indicated by the arrow 2132 annotated TRUE, a successful text string search has been completed. Therefore, in the manner indicated by the rectangle 2133, the contents of the RO buffer prior to the first character of the text string compared are transferred into the read/write buffer so that upon initiation of a return to an idle loop and a subsequent play mode operation, the string of text identified is played from the read only buffer. Thereafter, as indicated by the rectangle 2134, an indication is provided to the operator that a successful search has been completed and a return to the idle loop occurs in the manner indicated by the triangle 2115.

Even though a group of characters may be successfully compared in the text string comparison operation indicated by the dashed block 2129 if any succeeding character in a group being tested does not conform to that loaded within the text string queue, a false indication is obtained in the manner indicated by the arrow 2130. Furthermore, as the read only buffer pointer is restored to the first character in a sequence tested, only the first character is transferred to the RW buffer in the manner indicated by the rectangle 2131 and hence, when a new entry to the routine occurs in the manner indicated by the arrow 2122, the sequence of testing will only be moved up through one character position even though a plurality of characters were initially tested and the failure to compare occurred in a succeeding character. Furthermore, as will be seen in association with the text string comparison operation illustrated in FIG. 28D, control codes and the like which the operator would not normally insert into the queue are skipped during the comparison.

Thus for instance if a center code fell within a group of text to be compared, the centering code would be skipped during the comparison operation indicated by the dashed block 2129. Therefore, if a successful comparison is obtained in the manner indicated by the arrow 2132 annotated TRUE, not only would all information prior to the restored pointer of the RO buffer be translated into the read/write buffer, but in addition thereto, the control codes which occur after the pointer but prior to the first printing character would also be transferred thereinto. Thus it will be seen that in the search forward routine illustrated in FIG. 28B, a character is fetched from the RO buffer, tested to ascertain whether or not a format code, block mark or end of record code is present and when none of these conditions exist, this first character is compared against the first character established in the text string queue. If a faulty comparison is obtained, the character tested is transferred into the RW buffer and the next character is read from the RO buffer to ascertain if a comparison occurs. Any time an initial comparison occurs, the entire queue is compared against a sequence of characters starting with the initial character which compared and any time a faulty comparison occurs, the initial character compared is transferred into the read/write buffer in the manner indicated by the rectangle 2131 and the next character in the RO buffer is put through a similar procedure until a comparison of a sequence of characters within the RO buffer compares identically to the sequence of characters loaded in the text string queue. Thereafter, everything prior to this sequence of characters in the RO buffer is transferred to the RW buffer so that a subsequent reading operation from the RO buffer starts at a point corresponding to the start of the text string defined. Thereafter, a buzzer indication is provided to advise the operator as to the occurrence of a successful search and the idle routine is returned to in the manner indicated by the triangle 2115.

The text string comparison operation indicated generally by the dashed block 2129 shown in FIG. 28B is illustrated in detail in FIG. 28D. Therefore, referring now to FIG. 28D, it will be seen that when the text string comparison routine, as indicated by the oval flag 2135 is entered, the program initially acts to save the RO buffer pointer in the manner indicated by the rectangle 2136 so that it may be restored in the case of a faulty comparison so that the initial character compared may be stored in the read/write buffer in the manner indicated by the rectangle 2131 as well as being restored upon a successful comparison so that the copying step associated with rectangle 2133 may be achieved. Thereafter, as indicated by the rectangle 2137, the pointer for the search string pointer queue is initialized by setting the pointer maintained in RAM location 2C3 to a hex 90 address which defines the beginning of the queue.

Once the initial conditions associated with rectangles 2136 and 2137 have been established upon an entry of the test text string comparison program illustrated in FIG. 28D, the actual comparison is run in closed loop fashion to ascertain whether succeeding characters read from the read only buffer identically compare with succeeding characters loaded in the text string queue until either a failure to compare obtains or the end of the text string queue is reached. This loop operation is initiated in the manner indicated by the diamond 2138 which tests to ascertain whether the end of the text string queue is present. This is done, by reading the current character in the queue which is addressed and testing the same to ascertain if a hex 00 code resides therein. As a hex 00 code is indicative of an absence of character information, it will be appreciated that the end of the queue has been reached regardless of whether the operator had employed only a few or all 50 characters which may be inserted into the queue to uniquely define the string of text to be located within this search mode of operation. Thus, although the test indicated by the diamond 3138 is, in effect, present at the beginning of the loop search procedure employed, it acts to effectively close out the comparison operation by indicating that the end of the queue has been reached. Accordingly, whenever the test indicated by the diamond 2138 produces an affirmative result, as indicated by the arrow 2139 annotated TRUE, the saved address of the buffer pointer is restored in the manner indicated by the rectangle 2140 and a comparison true result is provided in the manner indicated by the arrow 2132 so that the search forward routine is returned to its commonly defined position.

If the end of the text string queue is not identified by the test indicated by the diamond 2138, as indicated by the arrow 2141, annotated FALSE, the character code is fetched from the RO buffer and the pointer thereof is incremented in the manner indicated by the rectangle 2142. Thereafter, as indicated by the diamond 2143, the code fetched is tested to ascertain whether or not it corresponds to a hex 00 code denoting the end of the RO buffer. If the end of the RO buffer is ascertained prior to a full comparison, as indicated by the arrow 2144 annotated TRUE, the RO buffer pointer is restored in the manner indicated by the rectangle 2145 and thereafter a false comparison indication is provided and the calling routine illustrated in FIG. 28B is returned to at the location indicated by the arrow 2130 so that the next line of information may be read from the media, loaded into the RO buffer and then a comparison operation therefor initiated.

If the end of the buffer has not been reached as indicated by the arrow 2146 annotated FALSE, the character fetched is tested, in the manner indicated by the diamond 2147 to ascertain whether or not it comprises a printing character or space code. If no printing character or space code is ascertained in the manner indicated by the arrow 2148 annotated FALSE, the incrementing of the RO buffer and the fetching if the next character takes place in the manner indicated by the rectangle 2142 so that effectively, control codes and the like are skipped for the purposes of comparison and thus if a center code or the like occurs in a string of text to be compared, it is skipped by the comparison operation in the manner indicated by the arrow 2148 and hence if a comparison should be obtained in the manner indicated by the arrow 2132 in FIG. 28B, such control codes would also be copied into the RW buffer prior to queuing the located string of text in the RO buffer in the manner indicated by the rectangle 2133.

If a spacing character or space code is present in the manner indicated by the arrow 2149 annotated TRUE, the code is tested to ascertain whether or not it corresponds to a precedented space or precedented hyphen code and if either code is present, it is translated to a normal space or normal hyphen code in the manner indicated by the rectangle 2150. This is done to complement the translation of text string queue information achieved in conjunction with the rectangle 2092 in FIG. 28A so that effectively, regardless of whether precedented spaces or precedented hyphens are present in either or both the prerecorded information or the text string queue established, regular space codes and hyphens are effectively compared so that in areas where the operator may be expected to cause an error to occur, the error is compensated for by the program routine.

Similarly, as indicated by the rectangle 2151, the code being tested is converted to a printer data ROM address so that for cases such as the upper and lower case period where more than one keyboard code is present for a character having a single printer ROM address, the entry of the wrong keyboard code will not effect the validity of the resultant comparison due to operator error. Thus this step complements step 2094 in FIG. 28A associated with establishing the queue so that the same material is compared in each case.

Once the presence of a printing character or space code has been confirmed and any necessary conversions associated therewith have been implemented in the manner associated with rectangles 2150 and 2151, the actual comparison of the character fetched with the character in the queue pointed to by the printer thereof is compared in the manner indicated by the diamond 2152. If a comparison does not result, in the manner indicated by the arrow 2153 annotated FALSE, the RO buffer pointer is restored in the manner indicated by the rectangle 2145 and thereafter a return to the calling routine under a compare false condition is initiated in the manner indicated by the arrow 2130. It should be noted that a negative comparison may obtain from the step associated with diamond 2152 at an initial character test or any subsequent character test in the string of information to be compared and hence regardless of what juncture the failure to compare is obtained, the buffer pointer is restored in the manner indicated by the rectangle 2145 to the saved location indicated by the rectangle 2136. Thus, any time a failure to compare obtains, only one character is translated to the read/write buffer in the manner indicated by the rectangles 2131 in FIG. 28B and thereafter a new starting point in the search forward operation incremented by only one character position in the read only buffer occurs.

If the results of the comparison indicated by the diamond 2152 is affirmative in the manner indicated by the arrow 2154 annotated TRUE, the pointer counter for the text string queue is incremented in the manner indicated by the rectangle 2155. Thereafter as indicated by the arrow 2156, the entry point to the loop initiated by the diamond 2138 is returned to. This means, as will be appreciated by those of ordinary skill in the art that the loop testing routine associated with diamonds 2138, 2147 and 2152 as well as rectangles 2142, 2150 and 2151 will continue until one of two conditions occur. That is, when a failure to compare occurs in the manner indicated by the arrow 2153 whereupon the buffer pointer counter is restored and the search forward routine illustrated in FIG. 28B is returned to under conditions where a new search routine is initiated as a start position which is incremented by one character or a favorable comparison for all characters in the queue until the end of the queue is defined by an affirmative result from the test indicated by the diamond 2138 whereupon the RO buffer pointer is restored in the manner indicated by the rectangle 2140 and thereafter a return to the searching routine occurs in the manner indicated by the rectangle 2133 in FIG. 28B. Under these conditions, the contents of the RO buffer prior to the first point in the compared string of text are translated into the RW buffer and thereafter, an indication is provided to the operator that a successful comparison operation is achieved. Thus in this manner for forward search operations, the programs illustrated in FIGS. 28B and 28D will test text in sequence recorded within each line of an identified block of information with that established in the queue and if the defined text is present therein, will queue the text for reading purposes and thereafter advise the operator that a successful search has been completed.

The reverse search procedure is illustrated in FIG. 28C and it wil be appreciated that the reverse search routine whose flow chart is illustrated therein is entered whenever the operator has defined that searching through the block is to occur in the reverse direction thrugh the entry of a precedented carriage return. Accordingly, once the routine illustrated in FIG. 28A has been completed and the text string queue necessary to identify the information to be located has been loaded therein, a precedented carriage return following the last character of the search queue will define to the microprocessor that searching is to occur in a reverse direction and hence exiting to the flow chart illustrated in FIG. 28C is initiated. The search routine for the search reverse flow chart illustrated in FIG. 28C is entered at the point indicated by the exit search reverse flag annotated 2160. Once entered, the routine tests in the manner indicated by the diamond 2161 whether or not a beginning media condition exits at the record media. If this condition exists in the manner indicated by the arrow 2162 annotated TRUE, the error buzzer is sounded in the manner indicated by the rectangle 2163 and a return to the idle loop in the manner indicated by the triangle 2115 occurs since a reverse search mode of operation may not occur from the beginning of the media. If the start of the media is not present as indicated by the arrow 2164 annotated FALSE, the routine next tests to ascertain whether or not the record mode has been established in the manner indicated by the diamond 2165. If the record mode tests affirmatively, in the manner indicated by the arrow 2166 annotated TRUE, the error buzzer is sounded in the manner indicated by the rectangle 2163 and thereafter a return to the idle loop occurs in the manner indicated by the triangle 2115 since no record mode of operation may occur during a search reverse portion of a text string search operation. If the record mode has not been established in the manner indicated by the arrow 2167 annotated FALSE, the routine next tests to ascertain whether or not a revise mode of operation has been established. If the revise mode of operation has been established, as indicated by the arrow 2169 annotated TRUE, the revised line of information is re-recorded in the manner indicated by the rectangle 2170 if required. Thereafter, in the manner indicated by the rectangle 2171, the read/write buffer 35 is cleared so that the transfer of information from the read only buffer may be initiated for the character information not identified as part of the text string search to be located. Thereafter, in the manner indicated by the arrows 2172 and 2173, fetching of character information from the read only buffer may begin in the manner indicated by the rectangle 2174. Similarly, if the test for the revise mode indicated by the diamond 2168 is false, as indicated by the arrows 2175 and 2173, the fetching of the first character from the read only buffer may begin in the manner indicated by the rectangle 2174.

As the flow chart depicted in FIG. 28C is directed to searching of the contents of the RO buffer in a reverse direction pursuant to the location of a defined text string therein, the operation proceeds by fetching a character from the read only buffer and thereafter decrementing the pointer for the read only buffer in the manner indicated by the rectangle 2174. However, it should be noted at the outset that both the characters read from the read only buffer and the text string compared therewith are compared in a forward direction. However, as the decrementing of the buffer after each fetching step in the manner indicated by the rectangle 2174 effectively causes an earlier entered character to initiate the string of text being compared even though the comparison routine act to compare text read from the read only buffer and the text string in a forward direction, the search operation is effectively occurring by reading the read only buffer in a reverse direction to obtain the initial character while subsequent comparison within the text string compare routine illustrated in FIG. 28D causes the buffer to be read in a forward direction and compared in a forward direction with the text string search queue established within the RAM.

Once an initial character is fetched from the read only buffer and the pointer for the read only buffer is decremented in the manner indicated by the rectangle 2174, the program acts in the manner indicated by the diamond 2176 to test the code fetched by the step indicated by the rectangle 2174 and to ascertain whether or not a code 00 is in the position read. If the character fetched is not a code 00 in the manner indicated by the arrow 2177 annotated FALSE, the text string compare operation indicated by the dashed block 2129 and described in detail in connection with FIG. 28D is entered. From the description of this routine set forth above, it will be appreciated that, in effect, the first character entered is compared with the first character of the text string search queue loaded within the RAM and if ths character compares, the address of the read only buffer is incremented and the next character is fetched and compared with the next character in the text string search queue until one of two conditions occur. That is, a character which does not compare is ascertained or the end of the text string search queue is reached under conditions where all preceding characters compared resulted in an affirmative comparison. Furthermore, any time a failure to compare resulted, the original address of the pointer for the read only buffer which was saved at the beginning of the routine illustrated in FIG. 28D is restored. Thus, whenever a false result is obtained from the text string comparison operation generally indicated by the dashed block 2129, in the manner indicated by the arrow 2178 annotated FALSE, the fetching of a character from the read only buffer and the decrementing of the buffer pointer in the manner indicated by the rectangle 2174 is re-initiated so that in effect, the start position for the string of text being read from the read only buffer and subsequently compared with the text string queue stored in the RAM is backed up through one character position.

Whenever the text string comparison operation indicated by the dashed block 2129 results in an affirmative comparison as indicated by the arrow 2179 annotated TRUE, a queue of text within the RO buffer has been identified as comparing identically with the string of text loaded in the text string search queue within the RAM. Therefore, since searching occurred in a reverse direction and only the information in the RO buffer at a position corresponding to the character pointed to by the pointer for the RO buffer and those characters subsequent thereto in the RO buffer, the portion of the RO buffer in front of the pointer is transferred into the RW buffer in the manner indicated by the rectangle 2180. Thereafter, a successful search indication is provided in the manner indicated by the rectangle 2181 and a return to the idle mode is initiated in the manner indicated by the triangle 2115. Accordingly, it will be appreciated by those of ordinary skill in the art that under these conditions, the start character position pointed to by the pointer for the read only buffer corresponds to the start of the text string search queue to be located and all information previous thereto in the buffer which would normally be read prior thereto in a normal playback mode of operation has been transferred into the read/write buffer so that processing at the start of the queue may proceed in a normal manner in any mode selected by the operator.

Under the conditions where the test indicated by the diamond 2176 results in an indication that the last character fetched is a 00 code, i.e., an end of data, in the manner indicated by the arrow 2182 annotated TRUE, it will be apparent that the first character in the RO buffer has been read and the pointer has been incremented around to the end of the buffer. Therefore, under these conditions, a new line of information must be loaded into the read only buffer 35. Therefore, in the manner indicated by the arrow 2182, the condition of the stop key is checked in the manner indicated by the diamond 2183. If the stop key has been depressed in the manner indicated by the arrow 2184 annotated TRUE, it is honored at this time since the contents of the RO buffer have been completely processed. Accordingly, as indicated by the arrow 2184, a return to the idle routine as indicated by the triangle 2115 occurs. If the stop key has not been depressed in the manner indicated by the arrow 2185 a line of information is read from the record media for the purposes of loading into the RO buffer. However, as the search operation here being described is occurring in the reverse direction, reading occurs in the manner indicated by the rectangle 2186. More particularly, as the record media is sitting at an interrecord gap after the line of information which had been previously read into the read only buffer and processed, the record media is displaced two lines in the reverse direction and then one line is read in the forward direction. This is done, as will be appreciated by those of ordinary skill in the art because moving the record media through one line in the reverse direction positions it at a interrecord gap associated with the line which had been previously read into the RO buffer and processed while displacing through a second line in a reverse direction positions it at an interrecord gap at the beginning of the next line to be loaded into the read only buffer for processing in a reverse direction. Thereafter, this line is read in the forward direction and loaded into the read only buffer in the usual manner.

While processing is occurring in the manner indicated by the rectangles 2186, a test for the beginning of the media is conducted in the manner indicated by the diamond 2187 to ascertain if the readig step indicated by the rectangle 2186 may be accomplished. If a beginning of the media condition is ascertained in the manner indicated by the arrow 2188 annotated TRUE, an error indication is provided to advise the operator that a successful search may not be conducted under the conditions imposed. This is indicated by the step associated with rectangle 2189 and thereafter a return to the idle routine occurs in the manner indicated by the triangle 2115.

If the beginning of the media is not detected in the manner indicated by the arrow 2190 annotated FALSE, the line printed in the forward direction is tested to ascertain whether or not it comprises a block mark. Since the test string search routine is limited to forward and reverse searches within a block, as aforesaid, if a block mark is detected in the manner indicated by the arrow 2192 annotated TRUE, an error indication is provided in the manner indicated by the rectangle 2189 and thereafter a return to the idle loop occurs in the manner indicated by a triangle 2115. If no block mark is present in the manner indicated by the arrow 2193 annotated FALSE, a test for the presence of a format block within the read only buffer is conducted in the manner indicated by the diamond 2194. If a format block is present as indicated by the arrow 2195 annotated TRUE, the format defined in this block is set into the appropriate margin and tab locations within the RAM to maintain the automatic writing system in an updated condition and thereafter, the read only buffer is cleared in the manner indicated by the rectangle 2196. Thereafter, as indicated by the arrow 2197, a new line of information is loaded into the RO buffer in the manner indicated by the rectangle 2186. It should be noted however, that if the format code was properly recorded in that the same follows a block mark, the new line of information loaded into the RO buffer will cause an affirmative result in association with the test indicated for a block mark associated with diamong 2191. Thus, under these conditions, an unsuccessful search will be indicated in the manner indicated by the rectangle 2189 and thereafter a return to the idle loop will occur.

When the new line loaded into the read only buffer does not comprise a format line in the manner indicated by the arrow 2198 annotated FALSE, the condition of the read only buffer pointer is adjusted to the last character position within the read only buffer in the manner indicated by the rectangle 2199 so that the pointer is in a condition to address the last loaded character position therein. Thereafter, the fetching step and the decrementing of the pointer in the manner indicated by the rectangle 2174 is again initiated so that searching in a reverse direction may be continued. Thus it will be appreciated that the reverse search routine illustrated in FIG. 28C acts to read lines of information from the record media in a reverse direction through a backing up of the media to the beginning of a line preceding that line just read and thereafter reading the line in a forward direction and inserting the same in the RO buffer. Similarly, the initial character of a string of test to be compared from the RO buffer with the string of text loaded in the text string search queue is obtained through a decrementing of the address pointer for the read only buffer so that reading and comparison operations occur in a forward manner, the character addressed for the start point of each succeeding group of characters to be compared effectively occurs in a reverse direction.

Through the text string search procedures illustrated in FIGS. 28A - 28D, an operator may define the string of prerecorded information to be loaded by entering the same blindly at the keyboard or causing it to printout through the depression of the code print key. Thereafter, by specifying whether the search for the string of text is to be conducted in a forward or reverse direction, the program control exercised under this mode of operation will cause the system to search in the defined direction throughout the block of information defined for the string of text inserted and either advise the operator that a successful search can not be achieved under the conditions imposed or alternatively, advise the operator that a successful search has been completed and queue the located text within the RO buffer in such manner that reading of information in a subsequently initiated play mode will start at the beginning character of the string of text defined. This is highly advantageous as it provides an operator with maximum ability for rapidly locating predetermined groups of character information within a defined block of information.

CONCLUSION

In the automatic writing system according to the present invention, a microprocessor is employed for the manipulation and translation of data among a plurality of peripherals which include a keyboard, a printer, a record media station means, storage means in which buffers are formed and a printer data read only memory. Processing operations may be implemented in 10 pitch, 12 pitch or proportionally spaced modes which are selectable by the operators and all data is translated from an origin peripheral to a destination peripheral by gating the same into and from a holding register within the microprocessor. The status of all peripherals is monitored by the microprocessor which also acts to control the operation of each peripheral as a function of the program in process, the status conditions of the peripheral and the data being translated.

This arrangement together with the program provided within the microprocessor establishes a highly advantageous word processing system which optimizes operator efficiency and convenience while substantially increasing the speed with which draft documentation is transformed into final copy. Thus, the automatic writing system according to the present invention provides a memory backspace function which acts to automatically reposition the printer to a location corresponding to an appropriate entry position for the next character to be entered as well as automatic underscoring functions for designated groupings of information during an entry mode of operation and each function is fully operable in any printing mode selected. To assist in the initial preparation of documentation, an entry mode of margin control is provided which is responsive to data entered from the keyboard to cause such data to be printed and formatted in accordance with established margins. In addition, line information entered from the keyboard without special placement and recorded may be appropriately centered upon playback while information inserted during recording at the left edge of a defined column, may be automatically centered within that column upon playback or if data of a statistical nature is entered it may be printed flush to the right side of the defined column upon playback to obviate the need for the operator to perform detailed positioning operations.

In order to provide rapid access to recorded information, the automatic writing system according to the instant invention is capable of recording format and header information within blocks of format information and upon initiation of a special playback mode to cause printing of only location information and information contained in said blocks of format information to thus provide a log of recorded information. Additionally, an extremely high powered search mode is provided wherein a string of previously recorded text may be defined at the keyboard and thereafter a block of recorded information is automatically searched to the beginning of the text string defined. In embodiments of this invention relying upon track recording techniques a search capability to a given track as well as a stepping capability to adjacent tracks is provided to improve information access and the track number in which information is recorded may be selectively printed.

Specialized playback modes of operation are also provided for specialized document formating or high speed document production. Thus where large scale editing is not required a high speed printing mode of operation is provided wherein alternate lines of information are ordinarily printed in opposite directions to avoid time consuming carrier return operations and the like. Furthermore print speed is enhanced by deferring the execution of carriage escapement in response to space codes and the like until a next alphameric character is entered whereupon total displacement associated with both the space code character and that required for the printing of the alphameric character may be executed at once to avoid repetative operations. Printing of recorded information in a justified format is also available under program control regardless of whether a 10 pitch, 12 pitch or proportionally spaced printing mode is relied upon. In addition, for providing maximum flexibility in merging information from a plurality of recorded media, the instant invention is provided with recordable switch and skip and skip-off codes and is responsive thereto to shift a playback operation from one record media to another and to skip over the information recorded thereon until a skip-off code is read whereupon playback and printing is resumed.

Although the present invention has been disclosed in conjunction with rather specific exemplary embodiments thereof which serve to further amplify the basic structure and modes of operation of the apparatus depicted, many modifications and alternatives to these specifically described embodiments will be apparent to those of ordinary skill in the art. Thus, depending upon the applications contemplated for an automatic writing system according to the instant invention, the capabilities of the basic structural arrangement thereof illustrated in FIG. 2 may be varied, enhanced, or restricted to better admit of specific applications. For instance, in applications where several automatic writing systems are available, the multirecord media system illustrated in FIG. 2 could serve as the prime recording and editing system while automatic writing systems having lesser capabilities are employed for playback and possibly revision purposes. Under these conditions, additional automatic writing systems according to the instant invention could be provided with only one record media station which would provide less in the way of editing capabilities since no transfer or duplicate functions would be available; however, if such a single record media station employed both a read only and read/write buffer, revise mode operations would be available while if only a read/write buffer was employed, only paper revisions of the document being prepared could be achieved. Thus, in situations where a plurality of automatic writing systems according to the instant invention were provided, the capabilities of the individual systems employed could very well be graduated whereby a two record media station was employed for the initial recording and editing of record media to place such record media in final form and thereafter simpler automatic writing systems would be relied upon to play back the previously prepared record media for subsequent document production.

In addition, the capabilities of the embodiments of the automatic writing system disclosed herein could be enhanced by providing additional or auxiliary record media transport stations together with appropriate buffer and program controls therefor. This would enhance the operation of the automatic writing system according to the instant invention is that merged or batched letter operations from more than two prerecorded record media could be employed and alternatively, prerecorded record media could be prepared from the merger of information contained on more than one record media. Furthermore, although only a limited number of special function peripherals were disclosed in conjunction with the embodiment of the instant invention depicted in FIG. 2, it will be appreciated by those of ordinary skill in the art that additional peripherals together with the programming therefor could be readily provided to meet special functions since the read only memory 80 is readily expandable and any peripheral could be added to the instant invention by merely providig the programming sequences therefor and the interconnection of the added peripheral to the common status bus, the common data bus, and the common instruction word bus. For instance, where a telecommunications capability were desired, high and/or low speed digital modems could be provided so that a prerecorded media located at one automatic writing system could be duplicated at a remotely located automatic writing system or alternatively, a keyboard to printer or record media to printer exchange could be initiated. It will be appreciated by those of ordinary skill in the art that the unique manner in which the buffer apparatus employed within the instant invention is enabled to provide or receive characters at the maximum processing rate of the destination or originating peripheral would be highly advantageous in such a telecommunication embodiment of the instant invention. Similarly, data exchanged with a remotely located computer would also be readily available so that automatic writing systems equipped in this manner could serve as a message distribution center for messages issued by a remotely located data complex. Furthermore, a CRT could be added to provide a display feature for achieving final formating prior to printing.

In the embodiments of the instant invention set forth, code conversion associated with data translation, has been held to a minimum in order to set forth the instant invention in its simplest mode. However, it will be readily appreciated by those of ordinary skill in the art, that where given peripherals, conventionally available in the market place, require specific codes for input and output purposes, code conversions may be readily accomplished at the interfaces provided therefor or within the microprocessor indicated by the dashed block 16 through an inspection and conversion function which would be implemented as each character is loaded into the main register M. For instance, keyboards could be employed which provide a serial output or alternatively a conventional ASCII code provided at the output of a keyboard could be transformed into a BCD code prior to further propagation within the automatic writing system in the manner well known to those of ordinary skill in the art.

Although specific logic configurations have been illustrated and described for the embodiment of the automatic writing system set forth herein, it will be appreciated by those of ordinary skill in the art that any conventional logic arrangements which are calculated to achieve the same purpose may be substituted for the specific configurations shown while specific logic components may be varied at will to meet the choice of design. Thus, although conventionally available LSI and MSI logic is generally preferred due to its availability, the logic described herein may be implemented through the use of conventional components and greater or lesser degrees of integrated circuit implementation may be employed to take advantage of apparatus available in the market place and current production techniques. In addition, it will be readily appreciated by those of ordinary skill in the art that although positive logic conventions have been here employed, negative logic may be alternatively utilized wherein a ONE (1) level corresponds to a first level and a ZERO (0) level corresponds to some level more positive than such first level and such negative logic is frequently preferred for certain design conditions and/or to take advantage of available integrated circuit components. Additionally, although specific logic components and associated conditions necessary for the operation thereof have been mentioned herein in order to describe an exemplary embodiment of the present invention, similar complementary logic configurations to those mentioned may alternative be employed and the associated operating conditions therefor may be substituted or altered without any deviation from the concepts of the invention disclosed.

While the invention has been described in connection with an exemplary embodiment thereof, it will be understood that many modifications will be readily apparent to those of ordinary skill in the art; and this application is intended to cover any adaptations or variations thereof. Therefore, it is manifestly intended that this invention be only limited by the claims and the equivalents thereof.

CASSETTE APPENDIX A

```
15SP81065    013    900 STS TAPE ASSEMBLY LISTING     EDITAPE   15:32 MAY 05,'75

ADDR CODE NUMER LABEL    CMND NEXTADDR OPERAND                  COMMENT

                       *********************************************************
                       *
                       * RANK XEROX EXODUS PROPORTIONAL SPACED MAG TAPE SYSTEM
                       *
                       *********************************************************


                       ******************GENERAL PURPOSE REGISTER ASSIGNMENT*****************

                       *********************************************************
                       *                            ****BIT****
                       ********7******6*******5*******4*******3*******2*******1*******0****
                       *G0 --------------------GENERAL USE-----------------------------*
                       *G1 --------------------GENERAL USE-----------------------------*
                       *G2 --------------------GENERAL USE-----------------------------*
                       *G3 --------------------GENERAL USE-----------------------------*
                       *G4 --------------------SECOND CHARACTER AND MISC.--------------*
                       *G5 *LOWER   *RW     *RD     *GENERAL USE-------------*MGC SC *COLUMN *
                       *   *LIMIT   *REWIND *REWIND *                        *J HELP *CENTER *
                       *
                       *G6 *PROP.   *CENT.  *INSERT *SWITCH *POTPARA*FIRST   *STOP   *TAP CTR*
                       *   *SPACE   *       *TAB    *READER *STOP   *PRTCHAR *CONDMET*OPEN   *
                       *
                       *G7 --------------------CHARACTER BEING PROCESSED----------------*
                       *
                       *G8 *XPAND   *PRTC   *SC     *PLY    *AUTO   *PARA   *LINE    *WORD   *
                       *
                       *G9 *SEARCH  *SEARCH *RECORD *RECORD *PLAY   *JUST   *SKIP    *DUP.   *
                       *   *        *LOCE   *       *FLASH  *
                       *
                       *GA *COMP    *DEFD   *DEFD   *LEFT   *PRINT  *LINE   *RTFLUSH *AUTO   *
                       *   *        *SPACE  *CR     *PRINT  *AUTO   *UNDSCR *COL     *LOC    *
                       *
                       *GB *SYSTEM  *SYSTEM *SWITCH *SWITCH *LANGUAGE OPTION----------------*
                       *   *LS2     *LS1    *LS2    *LS1    *
                       *
                       *GC ---FRACTIONAL COLUMN-----------------TAB COUNTER--------------*
                       *
                       *GD -----------------------RW BUFFER ADDRESS----------------------*
                       *
                       *GE -----------------------RD BUFFER ADDRESS----------------------*
                       *
                       *GF *TWELVE  *DEFD   *LCMP    STOP   *-------RIGHT MARGIN RANGE-------*
                       *   *PITCH   *ESC    *
                       *H0 ----------GENERAL USE-----------------------------------------*
                       *
                       *H1 ----------GENERAL USE-----------------------------------------*
                       *
                       *H2 ----------# OF CHARACTERS REMAINING IN BLOCK------------------*
                       *
                       *H3 ----------CARRIAGE POSITION ON EMPTY RW BUFFER----------------*
                       *
                       *H4 ----------JUSTIFY: CONSUMED SP AND NUM. OF LARGER SPACES (LOW)--*
                       *
                       *H5 ----------JUSTIFY: CONSUMED SP AND WT OF J SPACE  (HIGH ORDER)--*
                       *
                       *H6 ----------JUSTIFY: ACCUMULATED # OF VARIABLE SPACES-----------*
                       *
                       *H7 ----------JUSTIFY: DISTANCE (IN RWB) TO LAST BREAKPOINT--------*
                       *
                       *H8 *BELL AT RHT MGN*JUSTIFY: SPACE UPPER LIMIT--------------------*
                       *   *INIT.    IN PROG*
```

```
·········7·········6········5········4········3········2········1········0····
·
*H9 *BEGIN UNDSC FRACTIONAL COLUMN----------DEFERRED ESCAPEMENT------
*HA ----------PRINTER CARRIER POSITION-----------------------------------
*HB ----------GENERAL USE------------------------------------------------
*HC *USED IN TAB ROUTINES--DO NOT USE IN PRT ROUTINES BECAUSE OF FNT-
*HD ----------GENERAL USE------------------------------------------------
*HE *BEGIN UNDERSCORE POSITION AND RETN CARRIAGE POSITION FOR J.HELP-
*HF ----------JUSTIFY. # OF RWB CHAR. ALREADY PROCESSED-------------

ADDR CODE NUMBR LABEL    OPCD NEXTADDR OPERAND         COMMENT

0000 C0C0 00085 EXTAPE   NOOP                     PROGRAM START LOCATION


         * PROGRAM START - SETS RW AND RO BUFFER TO ZERO.SETS GP REGISTERS TO INITI
         * VALUES AND ELECTS RO AND RW MEDIA .RESTORE PRINTER

0001 C01A 00095 INITSYS  UJEFR SEGP
0002 CEAE 00096          UJEFR CLRO
0003 CDL2 00097          UJEFR CLRW
0004 BFFF 00098          CALF         M=FF
0005 E3C0 00099          UJEFR SEBNRO          RESET RO AND
0006 E5C0 00100          UJEFR SEBNRW          RW BLOCK NUMBERS
0007 C0C0 00099          UJEFR MO              2<  BR. TO MONITOR
0008 C01C 00100          CKED         BUZZ=3       TURN BUZZER ON
0009 1CF0 00101 RLSTORE  BPRT -2      PRBY=1   2>  BR. IF PRINTER BUSY
000A 0702 00102          CKED         BUZZ=0       TURN OFF BUZZER
000B C0CE 00103          UJEFR REPRINT             BR. TO RESTORE PRINTER
000C C014 00104          UJEFR TAKESLAK            BR. TO TAKE UP CASS. SLACK
000D 80FF 00105          UJEFU BZ13

         * RESTORE PRINTER . INITIALIZE HA TO 0.MOVE CARRIAGE TO LEFT MARGIN

000E 1206 00110 REPRINT  CPRT         RSET     RESTORE PRINTER          CC020
000F F1A4 00111          CALH         HA=0     CLEAR CARR
0010 1010 00112          CPRT         RBUF
0011 C2EF 00113          UJEFR MVCRLM
0012 1010 00114          CPRT         RBLN
0013 A200 00115          UJEPU CLKBKSRG


         *TAKE UP SLAK - CHECKS FOR RW & RO TRANSPORT ELECTRONIC INTERFACE INSTALL.
         *              AND WAITS FOR THEIR RESPECTIVE SERVOS TO BECOME ENABLED
         *               (MOVES TAPE UNTIL TENSE)

0014 C0BE 00125 TAKESLAK UJEFR BIGMO
0015 2AF1 00126          BRWT +1      TCI=0    1>  BR. IF RW TAPE CARD NOT IN
0016 2AE0 00127          BRWT -2      SEN=0    2>  BR. IF SERVO (RW) NOT ENABLED
0017 2AF1 00128          BROT +1      TCI=0    1<>3BR. IF RO TAPE CARD NOT IN
0018 2AE0 00129          BROT -4      SEN=C    2>  BR. IF RO SERVO NOT ENABLED
0019 C0DF 00130          RETN                  3<

         * CLEAR THEN INITIALIZE ALL GP REGISTERS

001A B164 00135 SEGP     CALG         G5=0     RESET GP REG G5
001B B164 00136          CALG         G6=0     RESET GP REG G6
001C B164 00137          CALG         G8=0     RESET GP REG G8
001D B164 00138          CALG         G9=0     RESET GP REG G9
001E B1A4 00139          CALG         GA=0     RESET GP REG GA
001F B1E4 00140          CALG         GB=C     RESET GP REG GB
0020 B1C4 00141          CALG         GC=0     RESET GP REG GC
0021 1A02 00142          BPRT +2      LXL=0    BRANCH IF TRANSLATOR NOT IN
0022 C1C7 00143          UJEFR FESTOLAN
0023 E3EA 00144          UJEFR SEGB
0024 B0CF 00145          CALR         M=05
0025 1A01 00146          BPRT +1      LXL=0
0026 B01A 00147          CALR         M=M+02
0027 [illegible] 00148   BRED +1      NICF=0   BRANCH IF 10 PITCH
0028 [illegible] 00149   CALR         M=M+80
0029 [illegible] 00150   CALG         GP=M     SET PITCH=10 OR 12
002A [illegible] 00151   CALR         M=C8
002B F1A4 00152          CALH         H6=M     SET SPACE UPPER LIMIT
002C F1A4 00153          CALH         H3=0
002D F1A4 00154          CALH         HA=0     RESET CARR
002E F0A4 00155          CALH         H9=M     SET DEFERRED ESCAPEMENT TO 8
002F F1C4 00156          CALH         HC=0     RESET GP REG HC
0030 F1E4 00157          CALH         HE=0     RESET GP REG HE
0031 B0CF 00158          CALR         M=C0
0032 [illegible] 00159   [illegible]  A2IN
0033 [illegible] 00160   [illegible]  MINI
0034 1AF1 00161          BPRT +1      WAZ=0
0035 E0[illegible] 00162 UJEFT CLKBPSRG
0036 [illegible] 00163   UJEFR FESTLM          FETCH STANDARD MARGIN SETTINGS
0037 E0[illegible] 00164 UJEFR SELM
0038 C[illegible] 00165  UJEFR FESTRM
0039 A[illegible] 00166  UJEPU SERM
```

```
ADDR CODE NO. P LABEL    OPND NEXTADD+ OPERAND               COMMENT

                 * UPDATE BITS IN GENERAL PURPOSE REGISTERS USED AS FLAGS IN PROGRAM

003A FEBL 00172 UPFLAGS  EALG +2        M=1         1>
003B B1IF 00173          CALR           M=02            MASK
003C E7D2 00174          JEPR REG9                      BR. TO RESET SKIP BIT
003D B10F 00175          CALR           M=10        1<  MASK
003E 27BF 00176          JEPR REGF                      BR. TO RESET STOP BIT
003F BA52 00177          CALG           M=G5
0040 B01D 00178          CALR           M=M.02
0041 9710 00179          EALG +5        M=01        2> BRANCH IF MCC SINGLE CYCLE
0042 F1E1 00180          CALR           M=OE            MASK
0043 E7?? 0018?          JEPR REGE                      BR. TO RESET POT. PARA. STOP. 1ST

0044 C?9C 00183          JEPR MOPCHPRT                  BR. TO MONITOR PITCH AND PRINT
0045 B0FF 00184          CALR           M=OF            MASK
0046 E797 00185          JEPR REGo                      RESET WORD.LINE.AUTO.PARA
0047 B09F 00186          CALR           M=00        2<
0048 E1B2 00187          JEPR REG9
0049 B1?F 00188          CALR           M=19        RESET AUTO US. LEFT PRINT. AUTO LOG
004A A7B7 00189          JEPU REGA

                 * ANALYZE LAST KEYBOARD INPUT PRESENTLY IN G7. IF IN JUSTIFY.MARGIN
                 * CONTROL.UNDERSCORE.THEN ANALYZE IN THOSE KEYBOARD MODES OTHERWISE
                 * DO A NORMAL KEYBOARD ANALYSIS

004B B074 00196 ANG7IDL  CALG           G7=M
004C BA92 00197 ANMODIDL CALG           M=G9
004D 1A21 00198          BPRT +1        DB2=0       A>   BRANCH IF NOT JUSTIFY.
004E ABA4 00199          JEPU ANKBJ                      ANALYZE KB INPUT IN JUSTIFY.

004F BA52 00201          CALG           M=G5        A<
0050 1A11 00202          BPRT +1        DB1=0       B<   BRANCH IF NOT MARGIN CONTROL S.C.
0051 B24E 00203          JEPU TEMODE                     ANALYZE KB INPUT IN MG CCNT  S.C.

0052 C1C4 00205          JEPR CVG7KBMC              B<   CONVERT CHAR AS REQD IF MG. CONT.
0053 B047 00206          CALR           M=04
0054 92A7 00207          EALG +7        M.CA=0      BR IF NOT IN US
0055 BA72 00208          CALG           M=G7
0056 1E7A 00209          BPRT -4        DB7=1       BR IF BIT 7 AND DO US
0057 99A1 00210          EDAT +4        M=1A        BR IF FHY
0058 9947 00211          EDAT +3        M=14        BR IF WUN
0059 1E?2 00212          BPRT +2        DB6=1       BR IF FC OR..
005A 1E?1 00213          BPRT +1        DB5=1       ..SPACE
005B E0?3 00214          JEPR USKB                  DO UNDERSCORE
005C C2E0 00215          JEPR ANKB                       ANALYZE KB INPUT  (NORMAL)
005D C2?8 00216          JEPR RCCHKB                     STORE CHAR IN RW BUFFER FOR RECORD
005E E062 00217          JEPU IDL

                 *IDLE LOOP : NORMAL LOOP OF NON-BUSY MODE - ANY OPERATOR INTERACTION
                 *WITH SYSTEM IS DETERMINED AND EXECUTED HERE

005F E31? 00223 BZI3     JEPR BZ                    1/4 SECOND BUZZER
0060 E25? 00224 REKBIDL  JEPR CLKBKSRG              CLEAR KB & KS
0061 0C3F 00225 RESTPIDL BRBD -0         STOP=1     CLEAR THE STOP KEY
0062 BAA2 00226 IDL      CALG            M=GA
0063 1A72 00227          BPRT +2         DB7=0
0064 C71F 00228          JEAA            EA1
0065 8033 00229          JEPJ C?03

0066 C525 002?1          JEPR MVCARDE
0067 C??? 002?2          JEPR MCLINCTR                   BR. TO MONITOR THE LINE COUNTER
0068 C??? 00233          JEPR MOLINCTR
0069 C?LE 002?4          JEPR BICMO
006A C0E0 002?5          JEPR REBZ                       BR. TO RESET BUZZER
006B C501 002?6          JEPR LOTBRW                     BR  TO SET RW TABS
006C C??D 00237          JEPR FIN PA
006D C0?? 002?8          JEPR UPFLAGS
006E 1??? 00239          CFRT            RPDN
006F 31?? 00??0          CNEM            IDLE
0070 C?E? 00??1          JEPR MORWLOOP           2<  BR. TO MONITOR RW LOOP
0071 C??? 00242          JEPR MOLSSW                     BR. TO MONITOR LINE SPACE SWITCH
0072 C0?0 00243          JEPR SEACMED                    BR. TO SELECT THE ACTIVE MEDIA
0073 E7EF 002?4          JEPR EJRW REW                   EJECT RW CASS. AFTER REWIND
0074 E61? 002?5          JEPR EJRO REW                   EJECT RO CASS. AFTER REWIND
0075 E3?? 002?6          JEPR UPBELL                     BR. TO BELL UPDATE
0076 2EA1 00247          BRWT +1         SOK=1   1> BR RW SERVO OK
0077 BBC5 00248          JEPU RWSNOK                     BR. TO RW SERVO NOT OK

0078 29F2 00250          BROM +2         TC1=0   1<2> BR IF SINGLE TRANSPORT
0079 2DA1 00251          BROM +1         SOK=1   3> BR. IF R/O SERVO OK
007A BCC6 00252          JEPU ROSNOK

007B 821F 00254          JEPJ TEKBIDL            3<2<

                 * THIS ROUTINE MONITORS THE PRINTER.LAMPS. EJECT SWITCHES.TRANSPORT HEADS
                 *AND MAG. CARDS FOR ANY CHANGE IN STATUS

007C E5AB 00261 MO       JEPR TEPRT
007D C??C 002?2          JEPR LDPRTPA
007E BA?2 002?3          CALG            M=G9
007F E?BF 002?4          JEPR SML2                       BR. TO SHIFT G9 LEFT TWICE
0080 B1?D 002?5          CALR            M=M.1D
0081 ???2 002?6          EALG +2         M=01        BR IF JUSTIFY ON
0082 B?A? 002?7          CALG            M=GA
008? E??? 00??8          CALR            M=M.?D
```

```
ADDR CODE NUMBR LABEL      CMND NEXTADDR OPERAND            COMMENT

0084 ...  00269            CALC          LDR3          LOAD LAMP REG.3 W/ M R
0085 B...  00270           CALG          M=G3          MASK:SCH,REC,FLASH,PLAY,SKIP,DUP
0086 B... 00271            CALR          M=M BB
0087 C... 00272            CI.ED         LDR2          LOAD LAMP REG2 W/ M
0088 B..F 00273            CALR          M=DC
0089 ...4 00274            BALD +4       2HZ=1
008A ...5 00275            BALG +3       M.GA=0        BR IF NOT US OR PA
008B B..F 00276            CALR          M=C4
008C ...1 00277            BALG +1       M GA=0
008D B..F 00278            CALR          M=BC
008E B932 00279            CALG          M=M GB
008F BUCC 00280            CALR          M=M+DC
0090 C102 00281            CIED          LDR1
0091 825F 00282            JEPU MOTAPE

*
* MONITOR FOR A PITCH CHANGE FROM THE KEYBOARD AND
* SET SYSTEM STATUS BITS ACCORDINGLY
*

0092 B..F 00290 MOPCHPRT CALR            M=8D          PCH/PRT MONITOR
0093 ...  00291            BALG +5       M.GF=C
0094 ...  00292            BKBD +5       N10P=0
0095 ...2 00293            BKBD +2       N12P=0
0096 ...1 00294            BKBD +1       NPS=1
0097 A75C 00295            JEPU SEG6
0098 A7.. 00297            JEPU RECC

0099 C..E 00299            B...  +1      N10P=C        RESTORE PRINTER TO NEW MARGINS
009A C... 00300            JEPR CLDENVG
009B 1..1 00301            BPRT +1       GK=0
009C 1CDE 00302            BPRT +1       CMBY=1
009D C..2 00303            JEPR TESTDMG
009E BOCF 00304            CALR          M=B0
009F B3F2 00305            CALG          M=M GF
00A0 B0F4 00306            CALG          GF=M
00A1 B00E 00307            JEPU REPRINT

*
* TEST AND COMPARE STANDARD LEFT MARGIN WITH THAT STORED IN RAM IF
* DIFFERENT RETN IF SAME SET UP STANDARD MARGINS
*

00A2 E3AC 00315 TESTDMG  JEPR FELM                     FETCHES STANDARD LEFT MARGIN FROM RAM
00A3 B... 00316            CALG          GO=M
00A4 C.7A 00317            JEPR FESTLM                 COMPARE STORED LEFT MARGIN WITH STLM
00A5 9... 00318            BALG +1       M-GO=0
00A6 ...  00319            RETN
00A7 ...E 00320            JEPR FERM                   FETCH STANDARD RIGHT MARGINS
00A8 ...  00321            CALG          GO=M
00A9 C... 00322            JEPR FESTRM
00AA ...  00323            BALG +1       M-GO=0
00AB ...F 00324            RETN
00AC B..F 00325            CALR          M=80          TOGGLE 12 PITCH BIT IN GF
00AD B.F2 00326            CALG          M=M GF
00AE B... 00327            CALR          GF=M
00AF F... 00328            CALH          HC=0
00B0 C..6 00329            JEPR FEXTBHC+
00B1 ...  00330            BALC +4       (M=0)'        BRANCH IF ANY TABS SET
00B2 C.74 00331            JEPR FESTLM                 STORE ST. LEFT MARGIN
00B3 E33D 00332            JEPR SELM
00B4 C..1 00333            JEPR FESTRM                 STORE ST. RIGHT MARGIN
00B5 E.CC 00334            JEPR SERM
00B6 ...  00335            RNOP
00B7 600E 00336            JEPU REPRINT

* EXECUTE AN RW SEARCH IF TAPE GOING FORWARD AND RUNNING

00B8 CAC2 00341 MORWSCH  BRAT +2         RUN=0     1>  BR. IF TAPE NOT RUNNING (RO)
00B9 7ECE 00342            BRAT +2       TFWD=1         BR. TO RW FAST READ FORWARD
00BA ECF1 00343            JEPU RWFRR

00BB BCE. 00346            JEPU MORWLOOP           1<  BR. TO MONITOR RW LOOP

00BC 2.30 00347            CRWT          FPF
00BD 000F 00348            RETN
*
* DO A TOTAL MONITOR OF THE WHOLE SYSTEM
*

00BE COE. 00355 BIGMO    JEPR MORWLOOP                  BR. TO MONITOR RW LOOP
00BF 807C 00356            JEPU MO                      BR. TO MONITOR

*
* MONITOR THE LINE SPACE SWITCHES AND SET OR RESET REG GB DB 7.6.5.4
* DEPENDING ON THE CHANGE IN STATUS
*

00C0 EADD ...  MOLSSW    CALG          M=GB
00C1 1E4. 00...            BPRT +6       DE4=1     A>   BR IF SW WAS SINGLE SPACE
00C2 1EE3 00346            BPRT +3       D35=1     B>   BR IF SW WAS DOUBLE SPACE
00C3 C... 00347            BKBD +5       NLS1=0    C>   BR IF SW CHANGED TO SINGLE SPACE
00C4 F... 00349            BKBD +4       NLS2=0    C>   BR IF SW CHANGED TO DOUBLE SPACE
00C5 000F 00350            RETN                       D<
```

```
ADDR CODE NUMBR LABEL     CMND NEXTADDR OPERAND         COMMENT

00C6 [illegible]                BRBD +1     NLS2=0      B<     BR IF STILL DOUBLE SPACE
00C7 [illegible]                [illegible] +1
00C8 [illegible]                BR[illegible] +3      NLS1=0      A< D>  DR IF STILL SINGLE SPACE
00C9 B[illegible]      SELSECSW CALR        M=FO        C<     RESET SW & SYSTEM BITS
00CA [illegible]                JEPR REGD
00CB B[illegible]               CALR        M=AO
00CC [illegible]                BRBD +2     NLS2=0      D>
00CD B[illegible]               CALR        M=50
00CE [illegible]                BR[illegible] +3      NLS1=1
00CF A7[illegible]              JEPU SEG3                E<

          * DETERMINES THE TRANSPORT THAT SHOULD BE THE ACTIVE READER

00D0 B1CF 00[illegible]5 SEACMED CALR       M=10
00D1 2[illegible] 00386         BR[illegible] +6     CIN=0
00D2 2A[illegible] 00387        BR[illegible] +5     CIN=0
00D3 B[illegible] 00388         CALR        M=20
00D4 BE12 00389         CALG        M=M.G9
00D5 9701 00390         BALG +1     (M=0)'
00D6 B[illegible] 00391         CALG        M=G6'
00D7 B[illegible]2 00392        CALG        M=M'
00D8 D4[illegible] 00393        CRBD        ARDP
00D9 [illegible]F 00394         RETN
00DA 2E[illegible]C 00395       BR[illegible] +5     CIN=1
00DB A7[illegible] 00396        JEPU REG6

          * EXECUTE RW LOOP MONITOR UNLESS SEARCH AND RECORD FLASH BITS ARE SET
          * THEN DO A RW SEARCH MONITOR
          *

00DC B91F 00403 MO2WAY  CALR        M=90        MASK
00DD 9291 00404         BALG +1     M.G9=0      BR. IF SCH.. AND RECD. FLASH BITS OF
00DE 80B8 00405         JEPU MORWSCH

00DF 80E5 00407         JEPU MORWLOOP

          * RESETS THE BUZZER FLAGS IN G9 AND H8

00E0 B40F 00413 REBZ    CALR        M=40        MASK
00E1 FEB2 00414         CALH        M=M.H8
00E2 9701 00415         BALG +1     (M=0)'      1>  BR. IF BUZZER NOT IN PROG.
00E3 0702 00416         CKBD        BUZZ=0          TURN OFF BUZZER
00E4 000F 00417         RETN                    1>

          *STOPS MOTION,TESTS REC.,RW REWIND AND INHIBIT RW RUN BITS
          **STARTS MOTION

00E5 B20F 00423 MORWLOOP CALR       M=20            MASK
00E6 2ECE 00424         BRRM +5     RUN=1       1>  BR. IF RW TAPE RUNNING
00E7 9292 00425         BALG +2     M.G9=0      2>  BR. IF REC. BIT NOT SET
00E8 2[illegible]60 00426       CRRM        SWR             STOP WRITE
00E9 000F 00427         RETN

00EA 2[illegible] 00429         CRRM        SRD         2<  STOP READ
00EB 000F 00430         RETN
00EC 2A[illegible] 00431        BRRM +2     TFWD=0      1<>3BR. IF TAPE NOT GOING FWD.
00ED 2[illegible]10 00432       CRRM        NRF             NORMAL READ FWD.
00EE 000F 00433         RETN

00EF B48F 00435         CALR        M=48        3<  MASK
00F0 9252 00436         BALG +2     M.G5=0      4>  BR. IF RW RWD &INH. RUN BITS NOT SET
00F1 2[illegible]70 00437 RWFRR CRRM        FRR         FAST READ REVERSE
00F2 000F 00438         RETN

00F3 2[illegible]50 00440       CRRM        NRR         4<  NORMAL READ REVERSE
00F4 000F 00441         RETN

          * MONITORS FOR TRACK 72  BUZZ SET  AND FOR PASSAGE THROUGH RIGHT MARGIN

00F5 B40F 00447 MOBZ    CALR        M=40            MASK
00F6 D2[illegible] 00448        BRLH +3     M.H8=0      1>  BR. IF BELL IN PROG BIT INACTIVE
00F7 08C2 00449         BRBD +2     2HZ=0       1>  BR. IF OSC. EQ. 0
00F8 0702 00450         CKBD        BUZZ=0          TURN OFF BUZZER
00F9 A7C4 00451         JEPU RCH8                   BR. TO RESET H8

00FA 0AF2 00453         BCOM +2     COM=0       1<2> BRANCH IF NOT COMMUNI CATIONS
00FB 071F 00454         JEXA        EA1
00FC 8001 00455         JEPU 00D1
00FD 000F 00457         RETN                    1<

          * MONITOR RO  TAPE
          **FETCH AND DISPLAY RO BLOCK NUMBER, TEST RUN, SERVO ENABLE, SERVO OK
          * STATUS . IF REWIND SWITCH ACTIVE THEN EXECUTE RO REWIND

00FF E25D 00464         -CHECK WORD-
0100 BFFF 00464 MOROTAPE CALR       M=FF
0101 2934 00465         BROM +4     CIN=0           BR  IF CASS. (RO) NOT IN
0102 E3B2 00466         JEPR FEDNRO
0103 BFF9 00467         CALR        M=FF-M
0104 9702 00468         BALG +2     (M=0)'
0105 E9CB 00469         JEPR REWINDRO
0106 E3C6 00470         JEPR SEBNRO                 DEP. BNO
```

```
ADDR CODE NUMBR LABEL    CMND NEXTADDR OPERAND            COMMENT

0107 E3B2                JEPR FEBNRO                      FETCH RO BNO
0108 E3D7                JEPR CVFFOO                      CONVERT FF TO 00
0109 2102                CROM           BNO               TRANSFER M TO BNO DISPLAY
010A 29C4                BROM +4        RUN=0          3> BR. IF TAPE NOT RUNNING (RO)
010B 29E3                BROM +3        SEN=0          3> BR. IF SERVO NOT ENABLED (RO)
010C 29A2                BROM +2        EOT=0          3> BR. IF AT EOT
010D 29A1                BROM +1        SOK=0          3> BR. IF SERVO NOT OK
010E EF8C                JEPR STPREWRO                    BR. TO END RO REWIND
010F B20F                CALR           M=20           3< MASK
0110 2106                CROM           REJT              RESET EJECT
0111 20C1                BROM +1        RUN=1          4> BR. IF RO TAPE RUNNING
0112 9251                BALG +1        M.G5=0         5><7BR. IF RO REWIND BIT NOT ACTIVE
0113 80F5                JEPU MCBZ                     4< BR. TO BUZZER MONITOR

0114 29BE                BROM -1        KPEW=0         5<>4BR. IF REWIND SW. INACTIVE
0115 29D2                BROM +2        ACT=0          6> BR. IF RO INACTIVE
0116 E555                JEPR TESCH&AC                    BR. TO TEST SCH AND FLASH BITS
0117 970B                BALG -4        (M=0)'         7><9BR. IF NOT SCH OR FLASH
0118 2D91                BROM +1        EOT=1          6<>8BR. IF AT EOT
0119 2570                CROM           FRR               FAST READ REVERSE
011A B20F                CALR           M=20           8< MASK
011B BB52                CALG           M=M+G5            SET RO REWIND BIT
011C B054                CALG           G5=M              SET G5
011D B00F                CALR           M=00
011E E3C6                JEPR SEBNRO                      DEP. 0 TO BNO
011F 29D3                BROM -C        ACT=0          5> BRANCH IF RO IS INACTIVE
0120 8EAE                JEPU CLRO                        BR. TO CLEAR RO

             *
             * TEST CHARACTER IN G3 FOR EXPANDED
             *

0121 BA32      TEG3=EX   CALG           M=G3
0122 99A2                BDAT +2        M=1A              BR IF PRECEDENTED HYPHEN
0123 BF8D                CALR           M=M.F8            MASK OFF 3 LSB
0124 9981                BDAT +1        M=18              BRANCH IF CHAR IN COL 1 OR 9 & B3=1
0125 A724                JEPU CLM                         CHAR IS NOT AN EXPANDED CHAR.
0126 A726                JEPU SEM=FF                      CHAR IS AN EXPANDED CHAR.

             * FETCH STANDARD LANGUAGE AND RETURN WITH IT ON M

0127 C140      FESTDLAN  JEPR FELXLSTD
0128 B0FD                CALR           M=M.OF
0129 000F                RETN

             *
             *PRINT CHARACTER CONVERSTION
             ** ASSUMES G3 CONTAINS A PRINTING  CHAR & CONVERTS THIS CHAR TO CODE REQD
             *   TO LOOK UP PRINTER DATA. RETURNS WITH CODE ON M ONLY.
             ***   USES REG G2.

012A C121      CVG3TOPC  JEPR TEG3=EX
012B 9303                BALG +3        M=0               BRANCH IF NOT EXPANDED CODE
012C BA32                CALG           M=G3
012D B1CA                CALR           M=M+10            CONVERT EXPANDED CODE TO NON EXPANDED
012E 8135                JEPU CVG3PCC

012F 3110                CMEM           ALIN              SET LANGUAGE=00
0130 1AD3                BPRT +9        LXL=0
0131 B10F                CALR           M=10
0132 B000                CALG           M=M-1
0133 F004                CALH           HO=M
0134 31CA                CMEM           AMIN                    REQUIRES CONVERSION.
0135 3120                CMEM           XOUT
0136 B631                CALG           M=M-G3
0137 9805                BDAT +5        M=00
0138 FA02                CALH           M=HC
0139 9708                BALG -7        (M=0)'            BRANCH IF TEST NOT COMPLETE
013A BA32      CVG3PCC1  CALG           M=G3              TEST COMPLETE NO CONVERSION
013B B7FD      CVG3PCC   CALR           M=M.7F            MASK OFF UNDERSCORE BIT.
013C 000F                RETN

013D BAB2                CALG           M=GB              FETCH LANGUAGE
013E 3110                CMEM           ALIN              XFER LANG TO ADDRESS OF LANG  XLATOR.
013F 8144                JEPU XOUT

0140 B0DF      FELXLSTD  CALR           M=OD
0141 3110                CMEM           ALIN
0142 B0FF                CALG           M=OF
0143 3109                CMEM           AKIN
0144 3120      XOUT      CMEM           XOUT
0145 000F                RETN

             *CONVERTS CODE IN G7 TO ITS EXPANDED EQUIVALENT IF CODE IS ECPANDABLE AND
             **EXPAND IS ON. RETURNS WITH NEW CHARACTER IN G7
             ***G3

0146 BA92      CVKBEXCH  CALG           M=G8
0147 1A73                BPPT +3        DB7=0             RETURN IF EXPAND NOT ON
0148 BA72                CALG           M=G7
0149 1E71                BPRT +1        DB7=1             CHAR IS NOT EXPANDABLE IF BIT 7=1
014A 8165                JEPU TEG7EXCV                    JUMP TO CONTINUE CONVERSION BELOW

014B 000F                RETN
```

```
ADDR CODE NUMBR LABEL    CMND NEXTADDR OPERAND          COMMENT

014C BA72 00572 CVTZKBMC CALG          M=G7
014D 9AD1 00573          BDAT +1       M=2D       A>    BRANCH IF HYPHEN
014E 000F 00574          RETN

014F B1AF 00576          CALR          M=1A       A<    CONVERT HYPHEN TO PREC HYPHEN.
0150 A70A 00577          JEPU XFG7=M


                * CONVERT CHAR IN HO IF FOUND IN ROW HB BETWEEN
                * COLUMN XO (HEX) AND COLUMN M-1. (INCLUDES END
                *POINTS).

0151 FAC2 00585          CALH          M=HC       B<
0152 8110 00586 CONVERT  CALG          M=M-1            DEC COLUMN POINTER
0153 FOCA 00587          CALH          HC=M
0154 3109 00588          CMEM          AKIN             SELECT COLUMN
0155 3120 00589          CMEM          XOUT
0156 D004 00590          BALH +4       M-HO=0     A>    BR IF CHAR TO BE CONVERTED
0157 FAC2 00591          CALH          M=HC
0158 80FD 00592          CALR          M=M.OF
0159 9707 00593          BALG -8       (M=0)'     B>    BR IF SEARCH NOT COMPLETE
015A 000F 00594          RETN

015B FA32 00596          CALH          M=HB       A<
015C F01C 00597          CALH          M=M+H1           NEW CHAR FOUND AT COLUMN HC AND
015D 3110 00598          CMEM          ALIN             NEW ROW = PRESENT ROW + H1.
015E 3120 00599          CMEM          XOUT
015F BAE0 00600          JEPU XFHO=M


0160 BCFA 00604          CALR          M=M+0F     ADD TOTAL OF FF TO G7 IF G7=SPACE
0161 B10A 00605 CNV.OR-  CALR          M=M+10     ADD TOTAL OF FO TO G7 IF G7=.-()
0162 BECA 00606          CALR          M=M+EO     ADD A TOTAL OF EO IF 67 CHAR IS UC. UC.
0163 8074 00607          CALG          G7=M
0164 000F 00608          RETN

                *TEST REG G7 FOR CONVERSION TO EXPANDED CODE

0165 9BEC 00612 TEG7EXCV BDAT -3       M=3E       BR IF UC.
0166 9A09 00613          BDAT -6       M=20       BR IF SPACE
0167 9A59 00614          BDAT -6       M=28       BRANCH IF LEFT PARENTHESIS
0168 9A96 00615          BDAT -7       M=29       BRANCH IF RIGHT PARENTHESIS
0169 9AC7 00616          BDAT -8       M=2C       BRANCH IF COMMA
016A EC3C 00617          JEPR EXPNDFIX
016B 8034 00618          CALG          G3=M
016C C13A 00619          JEPR CVG3TOPC             CONVERT PRINT CHAR TO UNIQUE CODE
016D 92C4 00620          BDAT -B       M=3C       BR IF UC.
016E 000F 00621          RETN


016F BA72 00624 CVLMKBMC CALG          M=G7
0170 9A01 00625          BDAT +1       M=20       A>    BRANCH IF SPACE
0171 814C 00626          JEPU CVTZKBMC

0172 BA32 00628          CALG          M=G8       A<
0173 1E73 00629          BPRT +3       DB7=1      B>    BRANCH IF EXPAND ON
0174 BA62 00630          CALG          M=G6
0175 1E01 00631          BPRT +1       DB0=1        C>  BRANCH IF TAB COUNTER OPEN.
0176 8061 00632          JEPU RESTPIDL                  JUMP TO IDLE (SKIP SPACE AT LM).

0177 000F 00634          RETN                     B<C<


                * ANALYZE KEYBOARD INPUT FOR PRINTING CHARACTER

0178 1308 00640 ANPRCHKB CPPT          RBUP       KB PRT. CHAR.              CD060
0179 C146 00641          JEPR CVKBEXCH
017A C780 00642          JEPR PR&MVG7
017B E24D 00643 FACEKBID JEPR MOBELL              KB WAIT LOOP               CD060
017C CBA5 00644          JEPR RCCHKB
017D C501 00645          JEPR LDTBRW
017E B32F 00646          CALR          M=32
017F C1B9 00647          JEPR TEPACEKB
0180 C5?5 00648          JEPR MVCARDE
0181 B19F 00649          CALR          M=19
0182 C1B9 00650          JEPR TEFACEKB
0183 8060 00651          JEPU REKBIDL


0184 0003 00654 SEPACEKB CKBD          2MDLY
0185 E06D 00655          JEPR MOKB&MED
0186 E0FD 00656          JEPR TEKS
0187 9704 00657          BALG +4       (M=0)'
0188 C2A1 00658          JEPR TEKBRP
0189 9701 00659          BALG +1       (M=C)'
018A CCAA 00660          BKBD -5       NM=1
018B 000F 00661          RETN

018C 81A9 00663          JEPU CVKBINP


                * EXECUTE KEYBOARD SPACE

018D C146 00668 SPKB     JEPR CVKBEXCH
018E C4A9 00669          JEPR SP
018F 8175 00670          JEPU PACEKBID
```

```
ADDR CODE NUMBR LABEL     CMND NEXTADDR OPERAND              COMMENT

        * CONVERT A CHARACTER FROM THE KEYBOARD IF IN THE MARGIN ZONE

0190 BA12 00677 CVMZKBMC CALG          M=G7
0191 9A0. 00678          BDAT +6       M=2D        A>    BRANCH IF HYPHEN
0192 9EA. 00679          BDAT +6       M=1A        B>    BRANCH IF PREC HYPHEN
0193 9A.1 00680          BDAT +1       M=20        C>    BRANCH IF SPACE
0194 000F 00681          RETN

0195 BA02 00683          CALG          M=G8        C<
0196 1A75 00684          BPRT +5       DB7=0       D>    BRANCH IF EXPAND ON
0197 000F 00685          RETN

0198 C146 00687          JEPR CVKBEXCH             A<    EXPAND CONVERSION
0199 13.6 00688          CPRT          RBUP        B<
019A C7.. 00689          JEPR PRSMVG7                    PRINT HYPHEN OR PREC HYPHEN
019B CBA. 00690          JEPR RCCHKB                     RECORD HYPHEN OR PREC HYPHEN
019C B07F 00691          CALR          M=07        D<    CONVERT G7 TO CR.
019D A7CA 00692          JEPU KFG7=M


019E C411 00696 BSKB     JEPR BS                   KB BS                 CD080
019F E176 00697          JEPU PACEKBID

        * ANALYZE KEYBOARD ENTRIES FOR CENTER CODE. UNDERSCORE.PREC. HYPHEN.
        *PRINTING CHARACTERS . AND NOW ACTION CODES

01A0 9937 00703 ANKB1    BDAT +7       M=13            BR. CEN
01A1 9947 00704          BDAT +7       M=14            BR. WORD U-SC
01A2 98A6 00705          BDAT +8       M=1A            BR. PREC HYPHEN
01A3 B.0D 00706          CALR          M=M.60
01A4 97.. 00707          BALG +6       (M=0)'          BR. IF PRINT CHAR
01A5 B1BF 00708          CALR          M=1B
01A6 91.5 00709          BALG +5       M>G7            BR. IF NOT ACTION KEY
01A7 B247 00710          JEPU ACTION

01A8 BF5F 00712          JEPU ANKBCENT             EXECUTE KB CENTRE

01A9 E033 00714          JEPR USKB                 EXECUTE WORD UNDERSCORE
01AA BA43 00715          JEPU RETNAEID

01AB 8178 00717          JEPU ANPHCHKB             EXECUTE PRINTING OF CHAR

01AC 8A44 00719          JEPU BZERI3               ERROR BUZZ AND REVERT TO IDLE 3

        *PRINT G7 CHAR AND DELAY 100 MS BEFOR ESCAPING AND AN ADDITIONAL
        *50 MS BEFOR RBDN  EXIT WITH CHAR ANYTIME DURING DELAYS

01AD B19F 00725 PRG7PACE CALR          M=19
01AE E369 00726          JEPR DLY MSKB
01AF C780 00727          JEPR PR6MVG7
01B0 B32F 00728          CALR          M=32
01B1 C164 00729          JEPR SEPACEKB
01B2 9705 00730          BALG +5       (M=0)'
01B3 C525 00731          JEPR MVCARDE
01B4 B19F 00732          CALR          M=19
01B5 C164 00733          JEPR SEPACEKB
01B6 9701 00734          BALG +1       (M=0)'
01B7 1309 00735          CPRT          RBDN
01B8 000F 00736          RETN

        * TEST KEYBOARD STACK EXECUTE IF ANY ENTRY WAS MADE

01B9 C184 00741 TEPACEKB JEPR SEPACEKB
01BA 9701 00742          BALG +1       (M=0)'
01BB 000F 00743          RETN

01BC E533 00745          JEPR TEMPCSP
01BD 9351 00746          BALG +1       M=0
01BE B06. 00747          JEPU RESTPIDL

01BF 621F 00749          JEPU TEKBIDL


01C0 BFCA 00752          CALR          M=M+FC
01C1 B01A 00753          CALR          M=M+01
01C2 B074 00754          CALG          G7=M        A<
01C3 000F 00755          RETN                      B<
        * CONVERT CHARACTER IN G7 TO SPECIAL CODES IF NECESSARY IN MARGIN CONTROL

01C4 BA82 00759 CVG7KBMC CALG          M=G8
01C5 1AED 00760          BPRT -2       DB5=0       B>
01C6 BA62 00761          CALG          M=C6
01C7 1ELB 00762          BPRT -4       DB6=1
01C8 BA72 00763          CALG          M=G7
01C9 1E7. 00764          BPRT -6       DB7=1       B<
01CA 9892 00765          BDAT -A       M=09        C>    SCR
01CB 9B7. 00766          BDAT -A       M=07        D>    CR
01CC C111 00767          JEPR TELM                 TEST LEFT MARGIN
01CD 9701 00768          BALG +1       (M=0)'      E>    BRANCH IF NOT AT LEFT MARGIN
01CE 81.F 00769          JEPU CVLMKBMC                   MAKE CONVERSION REQD IF @ LEFT MG

01CF E2B3 00771          JEPR TERM                 E>
01D0 9211 00772          BALG +1       M.G1=0      F>    BRANCH IF @ OR RT OF RIGHT MARGIN
```

```
ADDR CODE NUMBR LABEL     CMND NEXTADDR OPERAND                COMMENT
0101 814C 00773           JEPU CVTZKBMC                  MAKE CONVERSION REQD IF TEXT ZONE
0102 8190 00775           JEPU CVMZKBMC           F<     MAKE CONVERSION REQD IF MARGIN
               * TEST KEYBOARD FOR ENTRY AND CHECK KEYBOARD STACK FOR CONTENTS
01D3 804F 00780 TEKB&KSJ CALR            M=04      TEST FOR KEYBOARD ENTRY
01D4 9291 00781          BALG +1         M.G9=0    ONLY WHEN IN JUSTIFY OTHERWISE
01D5 829D 00782          JEPU TEKB                 TEST FOR KEYBOARD ENTRY OR
01D6 8209 00784          JEPU TEKB&KS
               * PRINT  R SLASHED .COLON. 2 DIGITS OF  LANGUAGE INFORMATION
01D7 1ED1 00759 PRLNG    DPRT +1         LXL=1     BR IF LANGUAGE TRANSLATOR IN
01D8 000F 00790          RETN
01D9 B52F 00792          CALR            M=52
01DA C5D4 00793          JEPR ESC&PPM/             PRINT R SLASED
01DB B3AF 00794          CALR            M=3A
01DC C4E0 00795          JEPR ESC&PPM              PRINT:
01DD C4EC 00796          JEPR SPSTD
01DE 8AB2 00797          CALG            M=GB
01DF BCFD 00798          CALR            M=M.CF
01E0 C52E 00799          JEPR PRMBIN
01E1 81F1 00800          JEPU MVLM&PF
               *
               * SET THE CODE PRINT FLAG
               *
01E2 BAEF 00807 SEPC     CALR            M=AE      TEST G7 CHARACTER FOR CODE PRINT
01E3 8171 00808          CALG            M=M-G7    IF NOT CODE PRINT RETURN TO CALLING
01E4 9703 00809          BALG +3         (M=0)'    ROUTINE IF IT IS CODE PRINT
01E5 B40F 00810          CALR            M=40      TOGGLE THE CODE PRINT FLAG
01E6 B982 00811          CALG            M=M-GB
01E7 B084 00812          CALG            G8=M
01E8 000F 00813          RETN
               * MOVE CARRIAGE TO LEFT MARGIN AND EXECUTE 3 PAPER FEEDS
01E9 C1F4 00818 MVLM&PF3 JEPR MVLM&PF
01EA C1F4 00819          JEPR MVLM&PF
01EB 81F4 00820          JEPU MVLM&PF
               * SET  COLUMN CENTERING FROM KEYBOARD
01EC 8A62 00826 SECOLKB  CALG            M=G8      TEST MGC FLAG
01ED 1A51 00827          BPRT +1         DB5=0     BRANCH IF NOT SET
01EE 8A44 00828          JEPU BZERI3
01EF B01F 00830          CALR            M=01
01F0 9252 00831          BALG +2         M.G5=0    BRANCH IF COLUMN CENTER NOT SET
01F1 C5CC 00832          JEPR MVCR-1
01F2 8060 00833          JEPU REKBIDL
01F3 A78B 00835          JEPU SEG5
               * INCR. BILLING CLOCK. RESET BIT 1 IN REG. G5 (MARGIN CCONTROL SINGLE
               *      CYCLE. JUST. HELP ZONE) COL. DATA.
               * RETURN TO LEFT MARGIN & PAPER FEED
01F4 E391 00842 MVLM&PF  JEPR BILL                 GO LM WITH P.F.          C0090
01F5 C62C 00843 MVFNTLM  JEPR RECOL
01F6 C3F1 00844          JEPR MVLM/TLM
01F7 8351 00845          JEPU AJV+1
               * IF DEFFERED SPACE FLAG IS SET ADD THE WIDTH OF A SPACE TO
               *    GO AND G1
01F8 B40F 00851 ADDESP   CALR            M=40
01F9 92A3 00852          BALC +3         M.GA=0    A> BR IF DEFD SPACE FLAG NOT SET
01FA E7B7 00853          JEPR REGA
01FB C44D 00854          JEPR FESPCS
01FC A667 00855          JEPU ADM+G10                ADD SPACE WIDTH TO G1/0
01FD 000F 00857          RETN                A<
               ** ANALYSES KB I/P FOR PRINTER FORMAT CODES
               *** USES GP REG H8
01FF 291D 00853          *CHECK WORD*
0200 C5D8 00863          JEPR MVCRCOL
0201 B444 00864          JEPU SETBMCA            H<
0202 842F 00866          JEPU CLTBSTEC           A<
0203 8420 00868          JEPU CLALLTB            B<
0204 8230 00870          JEPU FLS/LCS            C<D<
0205 8303 00872          JEPU SEMR               E<
0206 AB43 00874          JEPU SEJ&JLMT           F<
0207 833D 00876          JEPU SELNG              G<
```

```
ADDR CODE NUMBR LABEL     CMND NEXTADDR OPERAND              COMMENT

0208 9819 00878 ANPFTCKB BDAT -6        M=B1      A>  BRANCH IF TBC
0209 9B19 00879          BDAT -6        M=B3      B>  BRANCH IF TTC
020A 9D[illegible] 00880          BDAT -6        M=B6      C>  BRANCH IF FLS
020B 98[illegible] 00881          BDAT -7        M=B7      D>  BRANCH IF LCS
020C 9B89 00882          BDAT -7        M=B8      E>  BRANCH IF SMR
020D 9898 00883          BDAT -7        M=B9      F>  BRANCH IF JLT
020E 98AB 00884          BDAT -7        M=BA      G>  BRANCH IF LNG
020F 9B0C 00885          BDAT -F        M=B0      H>  BRANCH IF TBS
0210 9824 00886          BDAT +4        M=B2      I>  BRANCH IF STS
0211 9BB5 00887          BDAT +5        M=BB      J>  BRANCH IF PFT
0212 9B56 00888          BDAT +6        M=B5      K>  BRANCH IF RMS
0213 9B49 00889          BDAT +9        M=B4      L> BRANCH IF LMS
0214 A724 00890          JEPU CLM

0215 C508 00892          JEPR MVCRCOL             I<
0216 8440 00893          JEPU SESTB-CA

0217 E424 00895          JEPR PRFMTLNG
0218 8060 00896          JEPU REKBIDL

0219 B90F 00898          CALR           M=60      K<
021A E7C5 00899          JEPR SEH8
021B C3A6 00900 SERMCA   JEPR FECA+1
021C A3C0 00901          JEPU SERM
021D E3A8 00902 SELMCA   JEPR FECA+1
021E A3BD 00903          JEPU SELM

              *
              * TEST KEYBOARD AND KEYBOARD STACK FOR AN ENTRY
              * USES G5,G7,G9
              *

021F C1D3 00911 TEKBIDL  JEPR TEKB&KSJ            3<  BR. TO NEW KBD AND STACK ENTRY
0220 970C 00912          BALG +C        (M=0)'
0221 083D 00913          BRBD +D        STOP=0
0222 E5ED 00914          JEPR CKPRBUSY                CK. IF END OF RIBBON AND PRT. BUSY
0223 E473 00915          JEPR SESTOP                  BR. TO TEST STOP KEY AND BIT
0224 CF93 00916          JEPR ANAUTUS
0225 B02F 00917          CALR           M=02          MASK
0226 9262 00918          BALG +2        M.G5=0    4>  BR. IF NOT IN JUST OR MGC.
0227 E780 00919          JEPR REGE
0228 606C 00920          JEPU REKBIDL

0229 B04F 00922          CALR           M=04      4<  MASK
022A 9291 00923          BALG +1        M.G9=0        BR. IF NOT IN JUST. MODE
022B 8A44 00924          JEPU BZER13

022C 624E 00926          JEPU TEMODE                  BR. TO TEST MODE

022D E5ED 00928          JEPR CKPRBUSY            5<  CK. IF RIBBON END AND PRT BUSY.
022E 804B 00929          JEPU ANG7IDL
022F 8062 00931          JEPU IDL

              *          FIRST LINE SET AND FIRST LINE COUNT SET.
              **SETS NUMBER OF LINES BETWEEN FIRST LINES AND NUMBER OF LINES
              **PER PAGE.
              *** G4,G7

0230 C311 00939 FLS/LCS  JEPR ANKB2DIG                FETCH TWO DIGIT ENTRY
0231 BA69 00940          CALR           M=A6-M         BRANCH IF CHC
0232 930A 00941          BALG +A        M=0       A>
0233 C5AE 00942          JEPR CPG7                     CODE PRINT FLS/LCS
0234 C5D0 00943          JEPR PR2DIG
0235 BA72 00944          CALG           M=G7
0236 BB79 00945          CALR           M=B7-M
0237 9306 00946          BALG +6        M=0       B>  BR IF LCS
0238 B00F 00947          CALR           M=00
0239 E3CC 00948          JEPR SEFLCTR                  RESET FL COUNTER ADDRESS 245
023A BA42 00949          CALG           M=G4
023B B940 00950          CALG           M=M+G4         DOUBLE FL SETTING FOR INDEX
023C E3C9 00951          JEPR SEFLPRE                  SET FIRST LINE PRESET ADDRESS 244
023D 8060 00952          JEPU REKBIDL             A>   RETURN TO IDLE 3.
023E B00F 00953          CALR           M=00      B>
023F E3D2 00954          JEPR SELCCTR                  RESET LINE COUNTER ADDRESS 247
0240 BA42 00955          CALG           M=G4
0241 B940 00956          CALG           M=M+G4         DOUBLE LINE COUNT
0242 9301 00957          BALG +1        M=0       C.
0243 B000 00958          CALG           M=M-1          DECREMENT LC IF SETTING NOT 0
0244 E3CF 00959          JEPR SELCPRE             C>  SET LINE COUNT PRESET ADDRESS 246
0245 8060 00960          JEPU REKBIDL                  RETURN TO IDLE 3.

              * DETERMINE IF SYSTEM IS IN AN ACTIVE MODE. EXECUTES AND RETURNS
              * TO IDLE

0246 8A44 00967          JEPU BZER13
0247 C2B5 00968 ACTION   JEPR SEACTION            ACTION                   CD110
0248 B01F 00969          CALR           M=01
0249 9294 00970          BALG +4        M.G9=0    BRANCH IF DUP FLAG NOT SET
024A B0BF 00971          CALR           M=0B
024B 9282 00972          BALG +2        M.G8=0    BRANCH IF AUTO FLAG NOT SET
024C E53F 00973          JEPR TETW
024D 9708 00974          BALG -7        (M=0)'    BRANCH IF TW LESS THAN BNO
024E B0BF 00975 TEMODE   CALR           M=0B
024F 9295 00976          BALG -9        M.G9=0    BRANCH IF NOT PLAY,SKIP,OR DUP
0250 3D01 00977          SEPT +1        XLX=1
```

```
ADDR CODE NUMBR LABEL     CMND NEXTADDR OPERAND           COMMENT

0251 E5F0 00978           JEPR TEACMED
0252 C75E 00979           JEPR PSD
0253 CFB9 00980           JEPR USPART
0254 B80F 00981           CALR           M=80
0255 E7C6 00982           JEPR SEH8                 SET BELL INITIATED FLAG
0256 B03F 00983           CALR           M=03
0257 9296 00984           BALG +6        M.G9=0     BRANCH IF NOT SKIP OR DUP
0258 E313 00985 BZSK      JEPR BZ                   SKIP BZ & WAIT             CD110
0259 B02F 00986 SESKDLY   CALR           M=02       SKIP EXIT                  CD110
025A 9293 00987           BALG +3        M.G9=0     BRANCH IF NOT SKIP
025B B041 00988           CALR           M=04
025C 0013 00989           CKBD           HSDLY      SET A 2 SECOND DELAY
025D 8062 00990           JEPU IDL

025E 8060 00992           JEPU REKBIDL

     * RW TAPE MONITOR THAT EXITS TO RO TAPE MONITOR IF RW NOT ACTIVE
     * FETCH AND DISPLAY RW BLOCK NUMBER . TEST STATUS LINES . EXECUTE
     * RW REWIND IF CONDITIONS ARE MET

025F BFFF 00999 MOTAPE    CALR           M=FF
0260 2A54 01000           BRWM +4        CIN=0      BRANCH IF NO CASSETTE R/W MEDIA
0261 E380 01001           JEPR FEBNRW
0262 BFF9 01002           CALR           M=FF-M
0263 D702 01003           BALH +2        (M=0)'
0264 E9C0 01004           JEPR REWINDRW
0265 E3C5 01005           JEPR SFBNRW
0266 E380 01006           JEPR FEBNRW
0267 E5C7 01007           JEPR CVFF00                 CONVERT FF TO 00
0268 2202 01008           CRWM           BNO          TRANSFER M TO BLOCK NO. DISPLAY
0269 2AC5 01009           BRWM +5        RUN=0     4> BR. IF TAPE NO RUNNING
026A 2AE4 01010           BRWM +4        SEN=0     4> BR. IF SERVO NOT ENABLED
026B 2A93 01011           BRWM +3        EOT=0     4> BR. IF NOT AT EOT
026C 2A42 01012           BRWM +2        SOK=0     4> BR. IF SERVO NG
026D 2A51 01013           BRWM +1        READ=0    4> BR. IF WRITE CURRENT ON
026E E368 01014           JEPR STPREWRW               TERMINATE RW REWIND
026F 2208 01015           CRWM           REJT      4< RESET EJECT
0270 E5A8 01016           JEPR TERV                   TEST REVISE MODE
0271 9704 01017           BALG +4        (M=0)'    5> BR. IF NOT IN REVISE
0272 2A53 01018           BRWM +3        READ=0    5> BR. IF WRITE CURRENT ON
0273 2EC2 01019           BRWM +2        RUN=1     5> BR. IF TAPE RUNNING
0274 B40F 01020           CALR           M=40         MASK
0275 9251 01021           BALG +1        M.G5=0    6> BR. IF RW REWIND BIT NOT SET
0276 8100 01022           JEPU MOROTAPE            5< BR. TO MONITOR RO TAPE

0277 2AB3 01024           BRWM +3        KREW=0    6<>7BR. IF REWIND SW NOT ACTIVE
0278 2AD3 01025           BRWM +3        ACT=0     8> BR. IF RW NOT ACTIVE
0279 E5EB 01026           JEPR TESCH&AC               TEST SCH. AND RECD FLASH BITS
027A 9301 01027           BALG +1        M=0          BR. IF NEITHER SET
027B 8100 01028           JEPU MOROTAPE            7< BR. TO MONITOR RO TAPE

027C 2E91 01030           BRWM +1        EOT=1     8<>9BR. IF AT EOT
027D 2170 01031           CRWM           FRR          FAST READ REVERSE
027E B40F 01032           CALR           M=40      9< MASK
027F BB52 01033           CALG           M=M$G5       SET RW REWIND BIT
0280 B054 01034           CALG           G5=M         SET G5
0281 B00F 01035           CALR           M=00       0 TO BNO
0282 E3C3 01036           JEPR SEBNRW                 BR. TO DEF RW BNO
0283 2AD1 01037           BRWM +1        ACT=0     A> BR. IF RW NOT ACTIVE
0284 BEAE 01038           JEPU CLRO

0285 8100 01040           JEPU MOROTAPE            A< BR. TO MONITOR RO TAPE

     * SET PLAY SKIP OR DUPLICATE MODE

0286 BA72 01045 SEPSD     CALG           M=G7
0287 99F6 01046           BDAT +6        M=9F       BRANCH IF EXPANDED SPACE
0288 B04F 01047           CALR           M=04
0289 E7B7 01048           JEPR REGA                 RESET LINE UNDERSCORE FLAG
028A BA72 01049           CALG           M=G7
028B 99E3 01050           BDAT +3        M=9E       BRANCH IF EXPANDED PERIOD
028C 2A52 01051           BRWM +2        READ=0
028D A724 01052           JEPU CLM
028E BA4F 01053           CALR           M=A4
028F B64A 01054           CALR           M=M+64
0290 BB92 01055           CALG           M=M$G9
0291 B0BD 01056           CALR           M=M.OB
0292 B302 01057           CALG           M=M-G9
0293 B094 01058           CALG           G9=M
0294 1E11 01059           BRRT +1        DB1=1      BRANCH IF SKIP SET
0295 A72B 01060           JEPU SEM=FF
0296 B04F 01061           CALR           M=04
0297 0013 01062           CKBD           HSDLY
0298 A728 01063           JEPU SEM=FF

     * CHECK KEYBOARD STACK AND EXECUTE CONVERSION ON CODE IF NECESSARY

0299 E0FD 01068 TEKB&KS   JEPR TEKS
029A 9302 01069           BALG +2        M=0        BRANCH IF NOTHING IN KEYBOARD STACK
029B E26D 01070           JEPR AJKS+1
029C 81A9 01071           JEPU CVKBINP

     * FETCH ALL ENTRIES FROM KEYBOARD HERE

029D 0C41 01075 TEKB      BKBD +1        STROBE=1   KEYBD ENTRY                CD160
029E B2A1 01076           JEPU TEKBRP
```

```
ADUS CODE NUMBR LABEL      CMND NEXTADDR OPERAND                 COMMENT

029F C062 01078 FECVKB     CKBD           KBST        KEYBD FETCH                       CD160
02A0 8 A9 01079            JEPU CVKBINP
02A1 0891 01080 TEKBRP     BKBD +1        NRPT=0      RPT FETCH                         CD160
02A2 A724 01081            JEPU CLM

02A3 C29F 01083            JEPR FECVKB
02A4 8556 01084            JEPU TEHORPCH

             * EXECUTE  UNIT BACK SPACE

02A5 B80F 01089 UBS        CALR           M=80        KB UBS                            CD100
02A6 9267 01090            BALC -7        M.G6=0      BRANCH IF NOT PROPORTIONAL SPACE
02A7 B01F 01091            CALR           M=01
02A8 C 12 01092            JEPR TECR=M                BRANCH IF CARR = TO M
02A9 9302 01093            BALG +2        M=0
02AA B8CF 01094            CALR           M=80
02AB 9211 01095            BALG +1        M.G1=0      BRANCH IF NOT UNDERSCORED CHARACTER
02AC 00CF 01096            RETN

02AD 835A 01099            JEPU MVCR-INC

02AE 955E 01100            JEPR TEACMODE
02AF 970C 01101            BALG -5        (M=0)'      BRANCH IF STOP BIT NOT SET
02B0 8060 01102            JEPU REKBIDL

             *                        SET  ACTION
             * SETS SYSTEM TO WORD. LINE. PARA. OR AUTO MODE FOR PSD

02B1 B01F 01108            CALR           M=01
02B2 A795 01109            JEPU SEGB                  SET THE WORD FLAG

02B3 B02F 01111            CALR           M=02
02B4 A795 01112            JEPU SEGB                  SET THE LINE FLAG

02B5 B0FF 01114 SEACTION   CALR           M=0F        SET ACTION                        CD120
02B6 E797 01115            JEPR REGB
02B7 BA72 01116            CALG           M=G7
02B8 99C8 01117            BDAT -7        M=1C        BRANCH IF WRD
02B9 9503 01118            BDAT -6        M=1D        BRANCH IF LIN
02BA B10F 01119            CALR           M=10
02BB 9291 01120            BALG +3        M.G8=0      BRANCH IF NOT REVISE
02BC B02F 01121            CALR           M=02
02BD 9291 01122            BALC +1        M.G9=0      BRANCH IS SKIP NOT SET
02BE 8A44 01123            JEPU BZERI3
02BF BA72 01124            CALG           M=G7
02C0 99E2 01125            BDAT +2        M=1E        BRANCH IF PAR
02C1 B08F 01126            CALR           M=08
02C2 A795 01127            JEPU SEGB                  SET AUTO
02C3 B04F 01128            CALR           M=04
02C4 A795 01129            JEPU SEGB                  SET PARA

             * TURN  MARGIN CONTROL ON AND OFF

02C5 A724 01134            JEPU CLM
02C6 B20F 01135 SEMC       CALR           M=20        MGC ON/OFF                        CD140
02C7 9283 01136            BALG +3        M.G8=0      BRANCH MGC NOT SET
02C8 E797 01137            JEPR REGB
02C9 E4E6 01138            JEPR LKTC
02CA A726 01139            JEPU SEM=FF

02CB E5A8 01141            JEPR TERV
02CC 9708 01142            BALG -7        (M=0)'      BRANCH IF REVISE
02CD BA82 01143            CALG           M=G8
02CE B7FD 01144            CALR           M=M.7F      RESET XPAND
02CF B20E 01145            CALR           M=M+20      SET LINE
02D0 B084 01146            CALG           G8=M
02D1 A4E0 01147            JEPU RETC

             ** ANALYSES KB I/P CODES. BRANCHING TO EXECUTE PRINTER CONTROL CODES. PRIN
             ** FUNCTION CODES. ACTION CODES. PRINTING OF CHARACTERS OR CODES HAVING B7

02D2 847C 01153            JEPU ANKBB7                ANALYSE KB CHAR HAVING B7=1.IE MEDIA CC.

02D3 8470 01155            JEPU TB                    EXECUTE TAB

02D4 8C24 01157            JEPU CRKB                  EXECUTE CRN

02D5 816D 01159            JEPU SPKB                  EXECUTE SPA

02D6 BA72 01161 ANKB       CALG           M=G7
02D7 1E7A 01162            BPRT -5        DB7=1          BR. IF CHAR. IN RH OF MATRIX
02D8 9CAA 01163            BDAT -5        M=0A           BR. TAB
02D9 9889 01164            BDAT -6        M=0B           BR. PREC. TAB
02DA 9879 01165            BDAT -6        M=07           BR. CRN
02DB 9898 01166            BDAT -7        M=08           BR. PREC. CRN
02DC 9897 01167            BDAT -8        M=09           BR. SPEC. CRN
02DD 9B6 01168             BDAT -9        M=06           BR. PSCR
02DE 9A06 01169            BDAT -9        M=20           BR. SPACE
02DF 9EF5 01170            BDAT -A        M=7F           BR. PREC. SPACE
02E0 98C7 01171            BDAT +7        M=0C           BR. INDEX
02E1 98D7 01172            BDAT +7        M=0D           BR. REV. INDEX
02E2 98E7 01173            BDAT +7        M=0E           BR. BACKSPACE
02E3 98F7 01174            BDAT +7        M=0F           BR. PREC BS
02E4 9907 01175            BDAT +7        M=10           BR. FORMAT
02E5 9917 01176            BDAT +7        M=11           BR. COLUMN HDNG.
02E6 9927 01177            BDAT +7        M=12           BR. IF FIRST LINE FIND
02E7 81A0 01178            JEPU ANKB1
```

```
ADDR CODE NUMBR LABEL     CMND NEXTADDR OPERAND            COMMENT

02E8 8353 01180           JEPU IX                          EXECUTE INDEX

02E9 8336 01182           JEPU RIX                         EXECUTE REV INDEX

02EA 82A5 01184           JEPU UBS                         EXECUTE UNIT BS

02EB 819E 01186           JEPU BSKB                        EXECUTE PREC. BS

02EC A506 01188           JEPU FMTMODE                     EXECUTE FORMAT PRINT

02ED 81EC 01190           JEPU SECOLKB                     SET COL CENTER FROM KEYBOARD

02EE 854C 01192           JEPU CPFL                        CODE PRINT LANGUAGE

             * THIS ROUTINE MOVES THE CARRIER FORWARDS AND REVERSE; ENTRY POINTS FOR
             * MOVING TO LEFT MARGIN, MOVING DISTANCE SPECIFIED ON M, MOVING
             * DISTANCE SPECIFIED BY G0 AND G1

02EF E3AC 01199 MVCRLM    JEPR FELM                        MOVE TO LM
02F0 B104 01200 MVCRM     CALG           G0=0              MOVE TO M                CE010
02F1 B024 01201 MVCRM+FR  CALG           G2=M              MOVE TO M + FRACT        CE010
02F2 E3A3 01202           JEPR FEPITCH
02F3 BC0D 01203           CALG           SML
02F4 E3D7 01204           JEPR XMG2+G0
02F5 C517 01205           JEPR CLDE
02F6 8363 01206           JEPU MVCRG10

             * WAIT FOR KEYBOARD ENTRY OR FOR STOP KEY DEPRESSION

02F7 1309 01211 WTKB      CPRT           RBDN              KB WAIT W. STOP          CD190
02F8 CC3E 01212           JEPR BIGMO
02F9 0841 01213           BKBD +1        STROBE=0          BRANCH IF NO STROBE
02FA 829F 01214           JEPU FECVKB
02FB 083C 01215           BKBD -3        STOP=0            BRANCH IF NO STOP KEY
02FC BA6F 01216           CALR           M=A6              PUT CHAR CORRECT CODE IN H0
02FD F004 01217           CALH           H0=M
02FE A38E 01218           JEPU RETN2

             ** ANALYSES 2 DIGIT ENTRY FROM KB DEFINING MARGIN RANGE. UPDATES STORED
             ** MARGIN RANGE AND SETS MGC

02FF E07A 01224           *CHECK WORD*
0300 B0FF 01224           CALR           M=0F
0301 B044 01225           CALG           G4=M
0302 0805 01226           JIPU +5
0303 C311 01227 SEMR      JEPR ANKB2DIG                       2 DIG ENTRY. RETURN WITH MR NO. SET
0304 BA69 01228           CALR           M=A6-M
0305 9306 01229           BALG +8        M=0
0306 EF0F 01230           CALR           M=F0               ...IN G4
0307 9748 01231           BALG -7        M=M+G4C         A> BRANCH IF G4 > 1K
0308 BF0F 01232           CALR           M=F0
0309 BEF2 01233           CALG           M=M.GF               TRANSFER GF.B7-B4 TO M (B3-B0=0
030A BB42 01234           CALG           M=M@G4               TRANSFER MR FROM G4 TO M.B3-B0
030B B0F4 01235           CALG           GF=M                 SET GF=M. THEREBY STORING NEW MR
030C B2CF 01236           CALR           M=20
030D 9281 01237           BALG +1        M.G8=0          B> BRANCH IF MGC NOT SET
030E A728 01238           JEPU SEM=FF

030F 82C6 01240           JEPU SEMC                      B< JUMP TO SEMC

             * ENTER 2 DIGITS  FORM KEYBOARD AND PUT DIGITS IN G4

0310 E30D 01245           JEPR BZERROR
0311 C3B3 01246 ANKB2DIG  JEPR ANKBDIG                     2 DIGIT ENTRY            CD180
0312 930D 01247           BALG -2        M=0               BRANCH IF NOT VALID HEX CHARACTER
0313 E3D7 01248           JEPR CVFF00
0314 B024 01249           CALG           G2=M
0315 C3B3 01250           JEPR ANKBDIG
0316 9702 01251           BALG +2        (M=0)'            BRANCH IF VALID HEX CHARACTER
0317 E30D 01252           JEPR BZERROR
0318 080C 01253           JIPU -3
0319 E3D7 01254           JEPR CVFF00
031A B004 01255           CALG           G0=M
031B EC87 01256           JEPR X10G2+G0
031C B044 01257           CALG           G4=M
031D A724 01258           JEPU CLM

             * MOVE  CARRIAGE FORWARD  OR  REVERSE  THE DISTANCE  SPECIFIED  IN  GA

031E B10F 01263 FAKEAS    CALR           M=10
031F C3CB 01264           JEPR XFG01PR
0320 BAA2 01265 MVCR      CALG           M=GA
0321 1E34 01266           BPRT +4        DB3=1             BRANCH IF POWER PRINT MODE
0322 C3E2 01267           JEPR XFG01PIF
0323 1CDE 01268           BPRT -1        CMBY=1            BRANCH IF CARRIAGE BUSY
0324 1202 01269           CPRT           CMST
0325 C801 01270           JIPU +1
0326 C31E 01271           JEPR FAKEAS
0327 B08F 01272           CALR           M=08
0328 9213 01273           BALC +3        M.G1=0            BRANCH IF CARRIAGE MOTION POSITIVE
0329 B912 01274           CALG           M=M'.G1
032A B014 01275           CALG           G1=M
032B E72A 01276           JEPR NEG G10
032C C3EB 01277           JEPR ADG10CA
```

```
ADDR CODE NUMBR LABEL     CMND NEXTADDR OPERAND                    COMMENT

032D E2?7 01278           JEPR FE2PCH
032E C7?C 01279           JEPR DIG1/M
032F BA12 01280           CALG          M=G1
0330 F?A? 01281           CALH          HA=M
0331 BAC2 01282           CALG          M=GC
0332 E?BD 01283           JEPR SML4
0333 BB?2 01284           CALG          M=M?GO
0334 E?CE 01285           JEPR RML4
0335 A?2E 01286           JEPU XFGC=M

               * EXECUTE REVERSE INDEX

0336 C4C2 01291 RIX       JEPR CAG7LS                 EXEC RIX                  CE030
0337 B024 01292 MV-V      CALG          G2=M          MOVE PAPER BACKWARD
0338 C?51 01293           JEPR UPLCRVS
0339 80?F 01294           CALR          M=08
033A 6B12 01295           CALG          M=M?G1
033B B014 01296           CALG          G1=M
033C B3BE 01297           JEPU MVV

               *            SET LANGUAGE
                [illegible] OF NO GREATER THAN 12 TO SPECIFY
                [illegible] TO BE USED.

[illegible]                             [illegible]=1 BRANCH IF LANGUAGE CARD IN
                          [illegible]

[illegible]               [illegible] AN?B2D?L        ENTER TWO DIGITS
[illegible]                             M=AE-M        COMPARE ENTRY FOR CHARACTER CORRECT
[illegible]                    +C       I=0           BRANCH IF CHC
[illegible]                             M=G4          FETCH ENTRY
[illegible]                    +?       (M=0)'
[illegible]                    FESTDLAN               FETCH STANDARD LANGUAGE
[illegible]                             G4=M          SET G4=STANDARD LANGUAGE
[illegible]                             M=F3
[illegible]                    +7       M=M+G4C       BRANCH IF ENTRY GREATER THAN 12 (HEX OC)
[illegible]                    CPG7                   CODE PRINT G7
[illegible]                    FRIDIG                 AND ENTRY
[illegible]               CALR          M=OF
[illegible]               JEPR REGB                   RESET LOWER 4 BITS OF GB
[illegible]               CALG          M=G4
[illegible]               JEPR SECB                   SET LOWER 4 BITS OF GB TO LANG OPTION
[illegible]               JEPU FEKBIDL                RETURN TO IDLE 3
[illegible]               JEPR BZERROR                SET BUZZER
[illegible]               JEPU SELNG                  ALLOW NEW LANG. ENTRY

               * EXECUTE A PAPER FEED OR A LINE SPACE AS DEFINED BY THE SWITCHES

[illegible]               CALR          M=02          SPEC PF                   CE030
[illegible]               JEPU +1
[illegible]         IX    JEPR CAG7LS                 EXEC INDEX                CE030
[illegible]         MV+V  CALG          G2=M          PF
[illegible]               JEPR UPLCFWD
[illegible] B3BE [illegible] JEPU MVV

               *
               * THIS SET OF ROUTINES PERFORMS ALL CARRIAGE MOVEMENTS.
               * USES G1.GO AS TEMPORARY WORKING REGISTERS
               * USES H1.HO AS TEMPORARY WORKING REGISTERS
               *

[illegible] B[illegible] A CR+M  CALG       G1=0          SHORT MOVER.              CE010
[illegible]               CALG          GO=M
[illegible]               JIPU +4
[illegible]         MVCR-INC CALR       M=01          1 INCR LEFT
[illegible]         ACCR-M CALG         G1=0          SHORT MOVE L              CE010
[illegible]               CALG          GO=M
[illegible]         MVCR- JEPR NEG G10                MOVE LEFT                 CE010
[illegible]         MVCR+ JEPR ADDESP
035F [illegible] CALG          M=GA
0360 1A4? 013?3           EHRT +1       DB4=0
[illegible]
[illegible]                             M=06          MOVE CARRIAGE TO POSITION INDICATED
[illegible]                             H1=[illegible] IN G1.GO. IF CARRIAGE IS TO RIGHT
[illegible]                             M=31          OF THAT POSITION MOVE DISTANCE TO
[illegible]                             HO=M          THE LEFT (NEGATIVE) IF CARRIAGE TO
[illegible]                    CCC1OH10               THE LEFT MOVE CARRIAGE RIGHT (POSITIVE)
[illegible]                    +5       M=0           BRANCH IF GO.G1 COMPARE TO HO.H1
[illegible]                             M=G1
[illegible]                             DB7=0
[illegible]                    [illegible]CP01

[illegible]                    [illegible]
[illegible]               JEPR [illegible] GO
[illegible]               JEPR NEG G10
[illegible]                    ADG1OCA
[illegible]                             M=C8
[illegible]                    +2       M.G1=0        BRANCH IF NOT A NEGATIVE MOVEMENT
[illegible]               JEPR NEG G10
[illegible]                    MVCR
[illegible]                             M=M-G1
[illegible]                             G1=M
[illegible]                             M=M.07
[illegible]                             M=M.GO
[illegible]                    +5       (M=0)'        BRANCH IF MOTION REQUIRED
[illegible]
```

```
ADDR CODE NUMBR LABEL    CMND NEXTADDR OPERAND          COMMENT

                 * ANALYZES KB I/P FOR MODE CODES, MODE MODIFIER CODES AND MEDIA CONTROL C
                 ** BRANCHES TO ANPFTCKB TO DECODE PRINTER FORMAT CODES.
                 ** USES GP REGS GB

[illegible]           ANPFTKB  BPRT +4       DB5=1       BRANCH IF CHAR IN COLS A OR B OF CODE MA
[illegible]                    CALR          M=9C
[illegible]                    BALG +1       M>G7        BRANCH IF ERROR
[illegible]                    JEPU SEPSD

[illegible]                    JEPU CLM

[illegible]                    NOOP
[illegible]                    BPRT +B       DB4=0       BRANCH IF NOT PRINTER FORMAT CODES
[illegible]                    JEPU ANPFTCKB             JUMP TO ANALIZE COL B FORMAT CODES)

[illegible]                    JEPU TEXT SCH

03[illegible] 8[illegible] 01[illegible]9      JEPU ERASE

03[illegible]4 A[illegible] 0140[illegible]    JEPU LCOR

0385 ABJ1 01403                JEPU SEJ

0386 B2C6 01405                JEPU SEMC

0387 BA55 01407                JEPU SERC

0388 BC7F 01409                JEPU SERV

0389 9A28 01411                BDAT -7       M=A2        BRANCH IF TSS
038A 9A48 01412                BDAT -7       M=A4        BRANCH IF ERASE
038B 9A58 01413                BDAT -7       M=A5        BRANCH IF LCR
038C 9A98 01414                BDAT -7       M=A9        BRANCH IF JST
038D 9AA8 01415                BDAT -7       M=AA        BRANCH IF MGC
038E 9AE8 01416                BDAT -7       M=AE        BRANCH IF REC
038F 9AC8 01417                BDAT -7       M=AC        BRANCH IF REV
0390 9AF8 01418                BDAT +8       M=AF        BRANCH IF ARD
0391 9AE8 01419                BDAT +8       M=AE        BRANCH IF CDP
0392 9A69 01420                BDAT +9       M=A6        BRANCH IF CHC
0393 9ADB 01421                BDAT +B       M=AD        BRANCH IF SPX
0394 9AC1 01422                BDAT +1       M=AC        BRANCH IF SER
0395 A724 01423                JEPU CLM                  *CLEAR M INDICATES ERROR

0396 BA82 01425                CALG          M=G8
0397 1E4D 01426                BPRT -2       DB4=1       BRANCH IF IN REVISE
0398 BC0C 01427                JEPU EXSCH

0399 A48F 01429                JEPU SW

039A C1E2 01431                JEPR SEPC
039B BC50 01432                JEPU REKBIDL

039C E240 01434                JEPR PACEKB
039D E204 01435                JEPR C CHAR
039E 8001 01436                JEPU RESTPIDL

                 * ANALYZE EXPANDED SPACE FOR AUTO UNDERSCORE FEATURE
                 * CHECK FLAG BIT 2 REG. GA

039F BAA2 01441 ANSPX/US CALG          M=GA
03A0 1E2C 01442                BPRT +C       DB2=1       BR IF AUTO-US ON
03A1 BA82 01443                CALG          M=G8
03A2 1E7A 01444                BPRT +A       DB7=1       BR IF SPACE EXP ON
03A3 BC7F 01445                CALR          M=C7
03A4 9075 01446                BALG +5       M-G7=0      BR IF AUTO-US
03A5 BA82 01447                CALG          M=G8
03A6 1A51 01448                BPRT +1       DB5=0       BR IF MGC OFF
03A7 8A44 01449                JEPU BZERI3

03A8 B80F 01451                CALR          M=80
03A9 A795 01452                JEPU SEG8                 SET THE EXPAND FLAG

03AA E033 01454                JEPR USKB
03AB B04F 01455                CALR          M=04
03AC A7B5 01456                JEPU SEGA                 SET THE LINE UNDERSCORE FLAG

03AD B80F 01458                CALR          M=80        RESET EXPAND AND LINE UNDERSCORE FLAGS
03AE E797 01459                JEPR REG8
03AF B04F 01460                CALR          M=04
03B0 E7B7 01461                JEPR REGA
03B1 A728 01462                JEPU SEM=FF

                 * ALLOWS ENTRY OF A HEX CHARACTER FROM KEYBOARD AND CHARACTER CORRECT

03B2 A38F 01467                JEPU RETN1

03B3 C2F7 01469 ANKBDIG  JEPR WTKB                   DIGIT ENTRY              CD200
03B4 BA6F 01470                CALR          M=A6
03B5 D00C 01471                BALH -3       M-HO=0      BRANCH NOT VALID HEX CHARACTER
03B6 BC6F 01472                CALR          M=C6
03B7 D105 01473                BALH +5       M=M+HOC
03B8 B2FF 01474                CALR          M=2F
03B9 D103 01475                BALH +3       M>HO        BRANCH NOT VALID HEX CHARACTER
03BA B0FF 01476                CALR          M=0F
03BB FE02 01477                CALH          M=M.HO
03BC A30B 01478                JEPU CVOOFF

03BD A724 01480                JEPU CLM

                 * LOAD PRINTER INTERFACE REGISTER AND EXECUTE PAPER MOTION
```

```
ADDR CODE NUMBR LABEL   CMND NEXTADDR OPERAND          COMMENT

03BE 0..F 01485 MVV     CALR          M=07      EXEC PM                   CE030
03BF 8E12 01486         CALG          M=M.G1
03C0 BE12 01487         CALG          M=M+GQ
03C1 9304 01488         BALG +4       M=0       BRANCH NO MOTION REQUIRED
03C2 840F 01489         CALR          M=40
03C3 C3CD 0149C         JEPR XFG01PR
03C4 1CCE 01491         BPRT -1       PFBY=1    BRANCH PAPER FEED BUSY
03C5 1204 01492         CPRT          PFST
03C6 000F 01493         RETN

                 *  MOVE CARRIAGE TO INDENTED LEFT MARGIN

03C7 CACA 01499 MVINDLM JEPR CAINDENT            MOVE TO INDENTED LM
03C8 62FC 01500         JEPU MVCRM

                 * CLEAR THE DEFERRED ESCAPEMENT AND MOVE THE CARRIAGE TO THE 0 POSITION

03C9 900F 01505 CLDEMVO CALR          M=00 .    MOVE TO COLUMN 0
03CA 82F0 01506         JEPU MVCRM

                 * TRANSFER THE CONTENTS OF REGISTER PAIR GO.G1 TO THE PRINTER INTERFACE
                 * HO TEMPORARY

03CB F004 01512 XFG01PR CALH          HO=M      TRANSFER GO.G1 CONTENTS TO PRINTER
03CC 80FF 01513         CALR          M=0F      INTERFACE IF NOT POWER PRINT OTHER-
03CD BE12 01514         CALG          M=M.G1    WISE PUT IN PRINTER STACK
03CE FBC2 01515         CALH          M=M+HO
03CF F004 01516         CALH          HO=M
03D0 8AA2 01517         CALG          M=GA
03D1 1E31 01518         BPRT +1       DB3=1
03D2 83E2 01519         JEPU XFG01PIF

03D3 0002 01521         RNOP
03D4 8C4F 01522 XFPSWAIT CALR         M=C4
03D5 E3BB 01523         JEPR FEA2RAM
03D6 E3BB 01524         JEPR FEA2RAM
03D7 9303 01525         BALG +3       M=0
03D8 C48F 01526         JEPR TEPRTOK
03D9 C07C 01527         JEPR MO
03DA 83D4 01528         JEPU XFPSWAIT
03DB FAC2 01529         CALH          M=HO
03DC 300A 01530         CMEM          MINI
03DD 8AC2 01531         CALG          M=GO
03DE 300A 01532         CMEM          MINI
03DF 8C4F 01533         CALR          M=C4
03E0 C5A3 01534         JEPR INC PSPT
03E1 E07C 01535         JEPU MO

                *TRANSFER GO AND G1 TO PRINTER REG. IF  RIBBON AND PRINTER OK

03E2 E05D 01540 XFG01PIF JEPR MOKB&MED           LOAD DATA                 CE050
03E3 803F 01541         CALR          M=03      TRASFER PRINTER DATA TO PRINTER
03E4 9405 01542         BALG +5       M=M-1=0   IF PRINTER NOT BUSY
03E5 1CFE 01543         BPRT -1       PRBY=1
03E6 BA12 01544         CALG          M=G1
03E7 1210 01545         CPRT          LHDB
03E8 8A02 01546         CALG          M=GO
03E9 000F 01547         RETN
03EA A4EE 01548         JEPU INT PRT

                * ADD        GO AND G1 TO CARRIAGE POSITION CONTAINED IN HA AND FRACTION
                * IN  GC

03EB E3A0 01555 ADG1OCA JEPR FEFR                G1/GO+CARR                CE060
03EC E 67 01556         JEPR ADM+G10
03ED E297 01557         JEPR FE2PCH
03EE B024 01558         CALG          G2=M
03EF FAA2 01559         CALH          M=HA
03F0 A108 01560         JEPU XMG2+G10

                * MOVE TO THE LEFT MARGIN AND TEST THE LEFT MARGIN

03F1 8AA2 01565 MVLM/TLM CALG         M=GA
03F2 1E01 01566         BPPT +1       DB0=1     BRANCH IF IN AUTO-LOG PRINT
03F3 52EF 01567         JEPU MVCRLM

03F4 CE17 01569         JEPR CLDE
03F5 BB1F 01570         CALR          M=B8
03F6 E3BB 01571         JEPR FEA2RAM            FETCH TEMPORY LEFT MARGIN
03F7 62F0 01572         JEPU MVCRM              MOVE TO TEMP LM

                *FETCHS NEXT TAB STOP PAST PRESENT CARRIER POSITION OR PAST POSITION
                **STOPED IN HC. RETN WITH M=0 INDICATES NO TAB SET.
                ***HC

03F8 C43A 01579 FETSCA+ JEPR XFCAHC               TRANSFER CARRIER POSITION TO HC
03F9 C4.. 01580 FETSHC+ JEPR FEXTBHC+          B< FETCH NEXT TAB OR STB
03FA 9302 01581         BALG +2       M=0       A> BRANCH IF NO TABS
03FB 1AC0 01582         BPPT -2       DB0=0     B> BRANCH IF STB
03FC FAC2 01583 X'M=HC  CALH          M=HC
03FD 000F 01584         RETN                    A<
```

```
ADDR CODE NUMBR LABEL    CMND NEXTADDR OPERAND              COMMENT

                * CALCULATE LINE SPACE IF CHARACTER IN G7 IS CARRIAGE RETURN
                * OTHERWISE EXIT WITH M=1 IF IX OR R1X OR M=0 IF NOT CR

03FE 17E0 01590          *ADJUST WORD*
03FF B27E 01590          *CHECK WORD**
0400 B01F 01590          CALR          M=01       B<C<
0401 000F 01591          RETN

0402 EA72 01593 CAS7LS   CALG          M=G7
0403 1E7E 01594 CAMLS    BPRT +4       DB7=1      A>
0404 9C0C 01595          BDAT -4       M=0C                 INDEX
0405 9C0A 01596          BDAT -5       M=0D                 REVERSE INDEX
0406 E520 01597          JEPR TEMCR
0407 9301 01598          BALG +1       M=0
0408 A72A 01599          JEPU CLM                 A<

0409 BAB2 01601          CALG          M=GB       D<E<F<
040A BC00 01602          CALR          M=M.C0               MASK OUT SYSTEM LINE SPACE BITS
040B 9303 01603          BALG +3       M=0        G>        BRANCH IF 1 1/2 LINE SPACE
040C 1A61 01604          BPRT +1       DB6=0      H>        BRANCH IF 2     LINE SPACE
040D B7EF 01605          CALR          M=7E                 7E +81 + 03 = 02 (1 LINE SP)
040E 881A 01606          CALR          M=M+81               80 + 81 + 03 = 04 (2 LINE SP)
040F 803A 01607          CALR          M=M+03     G>        C0 + 03 =03 (1 1/2 LINE SP)
0410 000F 01608          RETN

0411 802F 01611 BS       CALR          M=02       TEST FOR COLUMN 2
0412 C112 01612          JEPR TECR=M
0413 BA12 01613          CALG          M=G1
0414 1A71 01614          BPRT +1       DB7=0      BRANCH IF CHAR IS RIGHT OF COLUMN 2
0415 A070 01615          JEPU MVCR01
0416 C525 01617          JEPR MVCARDE
0417 E287 01618          JEPR FE2PCH
041B B0C4 01619          CALG          G0=M
0419 B114 01620          CALG          G1=0
041A 835D 01621          JEPU MVCR-

                * SET ADDRESS IN THE 2ND SECTION OF RAM

041B FAC2 01626 SETRADDR CALH          M=HC       SET ADDRESS IN 2 SECTION OF RAM
041C E18C 01627          JEPR RML6
041D 83FD 01628          CALR          M=M.3F
041E 3084 01629          CMEM          A2IN
041F 83FC 01630          JEPU XFM=HC

                * CLEAR ALL TABS FROM THE TABS STORAGE AREA

0420 B28F 01635 CLALLTB  CALR          M=28
0421 3084 01636          CMEM          A2IN                ADDRESS END OF TAB REGISTER + 1
0422 B00F 01637          CALR          M=00
0423 3001 01638          CMEM          ADEC       A<       DEC TAB REGISTER ADDRESS
0424 30C8 01639          CMEM          MIN                 CLEAR TAB REG BEING ADDRESSED
0425 1AFD 01640          BPRT -2       MAZ=0      A>       BRANCH IF NOT AT BEGIN OF TAB REG.
0426 A728 01641          JEPU SEM=FF

                *FETCHS NEXT TAB OR SPECIAL TAB STOP PAST PRESENT CARRIER POSITION OR
                **POSITION STORED IN HC. RETN WITH M=00 INDICATES NO TABS SET. M=01
                **INDICATES NO RMAL TAB STOP. M=02 INDICATES SPECIAL TAB STOP. LOCATION
                **OF TAB IS IN HC.
                ***HC

0427 C45A 01650 FEXTBCA+ JEPR XFCAHC                      TRANSFER CARRIER POSITION TO HC
0428 E740 01651 FEXTBHC+ JEPR INCHC158           C<       INCREMENT HC MODULO 158
0429 9304 01652          BALG +4       M=0        A>       BRANCH IF NO TABS SET.
042A C4C4 01653          JEPR FEXTBHC                      FETCH CONTENTS OF TAB STORE REG CHC
042B 1E01 01654          BPRT +1       DB0=1      B>       BRANCH IF NORMAL TAB SET & LOC HC
042C 1A1B 01655          BPRT -4       DB1=0      C>       BRANCH IF NO TAB SET @ LOC HC
042D 803D 01656          CALR          M=M.03     B<       MASK OFF IRRELAVENT BITS.
042E 000F 01657          RETN                     A<

                *CLEAR TAB OR SPECIAL TAB AT CARRIER POSITION OR LOCATION SPECIFIED IN HC
                ***HB.HC

042F C45A 01663 CLTBSTBC JEPR XFCAHC
0430 C434 01664          JEPR CLTB=HC                       CLEAR TAB AT HC
0431 C48E 01665 CLSTB=HC JEPR FETBMASK                      FETCH TAB AMSK
0432 BC01 01666          CALG          RML                  ADJUST MASK FOR STB
0433 C801 01667          JEPU +1                  A>
0434 C48E 01668 CLTB=HC  JEPR FETBMASK                      FETCH TAB MASK
0435 F084 01669          CALH          HB=M       A<        STORE MASK IN HB
0436 C41B 01670          JEPR SETRADDR                      SET TAB REGISTER ADDRESS
0437 3010 01671          CMEM          MOUT
0438 FDB2 01672          CALH          M=M.HB'              RESET TAB BIT DICTATED BY MASK.
0439 844D 01673          JEPU WRRAM                         STORE IN RAM.

                *FETCHS NEXT SPECIAL TAB STOP PAST PRESENT CARRIER PSOITION OR PAST
                **POSITION STORED IN HC. RETURN WITH M=0 INDICATES NO STB SET.
                ***HC

043A C45A 01680 FESTBCA+ JEPR XFCAHC                      TRANSFER CARRIER POSITION TO HC
043B C428 01681 FESTBHC+ JEPR FEXTBHC+           B< FETCH NEXT TAB OR STB
043C 9302 01682          BALG +2       M=0       A> BRANCH IF NO TABS
043D 1A1D 01683          BPRT -2       DB1=0     B> BRANCH IF NORMAL TAB.
043E FAC2 01684          CALH          M=HC
043F 000F 01685          RETN                    A<
```

```
ADDR CODE NUMBR LABEL     CMND NEXTADDR OPERAND                COMMENT

               *SET TAB OR SPECIAL TAB AT CARRIER POSITION OR LOCATION SPECIFIED IN HC
               ***HD,HC

0440 C4EA 01691 SESTB CA  JEPR XFCAHC
0441 C4EE 01692 SESTB HC  JEPR FETBMASK                         FETCH TAB MASK
0442 BC   01693           CALG.         RML                     ADJUST TAB MASK FOR STB
0443 C9   01694           JIPU +3                     A>
0444 C4EA 01695 SETB CA   JEPR XFCAHC
0445      01696           BALG +6       M=0           B>
0446 C4EE 01697 SETB HC   JEPR FETBMASK                         FETCH TAB MASK
0447 F2B4 01698           CALH          HB=M          A<        STORE TAB MASK IN HB
0448 C415 01699           JEPR SETRADDR                         SET TAB REGISTER ADDRESS
0449 3010 01700           CMEM          MOUT
044A FB32 01701           CALH          M=M+HB                  SET TAB
044B 3030 01702 WRRAM     CMEM          MIN                     STORE IN RAM.
044C A728 01703           JEPU SEM=FF                 B<

               * FETCH  SPACE CODE  AND ADJUST  ACCORDING TO MODE AND JUSTIFY

044D 0000 01708 FESPCS    NOOP
044E 0000 01709           NOOP
044F B04F 01710           CALR          M=04
0450 9207 01711           BALG +7       M.G9=0
0451 FA40 01712           CALH          M=H4
0452 9  0 01713           BALG +3       M=0           B      BR IF NO MORE LARGE SPACES
0453 B0 0 01714           CALS          M=M-1
0454 F044 01715           CALH          H4=M                 DECREMENT NO OF LARGE SPACES
0455 B01F 01716           CALR          M=01
0456 F950 01717           CALH          M=M+H5        B      FETCH JUSTIFY SPACE WIDTH
0457 000F 01718           RETN

0458 E3F3 01720           JEPR FESTDSP                FETCH NON JUSTIFY SPACE WIDTH
0459 AEC0 01721           JEPU SML1

                 CARRIAGE POSITION TO HC IN TAB SET ROUTINES

                            FEPR
                                        HC=M
                            FEDE
                                        M=M+HC
                                        HC=M
                                        M=GF
                            +6          DEG=0         BRANCH IF DEFERRED ESCADE FLAG NOT SET
                            FLPITCH
                            +3          M=M-HC>0
                          CALH          M=HA
                          CALS          M=M+1
                            +2
                          BALG -3       M=0
                          CALH          M=HA
                          JEPU XFHC=M

               EXECUTE SPACE IF ACTIVE MODE & SET DEFFERED SPACE FLAG IF NOT

                      SPC JEPR TEACMODE
                          BALG +2       M=0           A  BR IF NOT ACTIVE MODE
                          CALR          M=40
                          BALG +2       M.GA=0        BRANCH IF DEFERRED SPACE NOT SET
                          JEPR FESPCS
                          JEPU AJCR+M

                          JEPU SEGA                   B  SET DEFD SPACE FLAG

               * RESET RIGHT FLUSH, TEST FOR PRECEDENTED TAB AND JUSTIFY, EXECUTE TAB
               * CODE PRINT TAB IS CODE PRINT IS ON

          01759 TB        JEPR RERF
          01759           JEPR TEMC&J
          01760           BALG +1       M=0           BRANCH IF NOT MARGIN CONTROL OR JUSTIFY
          01761           JEPR EVPTB
          01762 TAB       JEPR MVCARDE                DO TAB
          01763           JEPR FETBCA+
          01764 MVTAB     JEPR TBCRASH
0477      01765           CALS          G4=M
0478      01766           JEPR CPPRECPF
          01767           JEPR CLTBCR
          01768           CALS          M=G4
047B      01769           JEPU MVCRM

               * ANALYSES KB I/P CODES WITH B7=1. WHEN LSP CODE IS DETECTED THE SETTING
               ** THE LINE SPACE SWITCH IS ANALYSED AND THE APPROPRIATE SYSTEM CODE IS EN
               ** INTO G7.
               *** USES GP REGISTER G7

                                        M=M.70
                                        M=0           BR. IF CHAR. NOT IN COL. 8
                            2NPBB
                                        M=G7
                                        M=89          BR. SWS
                            +3          M=8C          BR. BMK
                                        M=87          BR. SCH
                                        M=M.F8
                                        M=8B          BR. SWR, SSK, SKF, HLT, NRS, TRL
                            B2FRI3

                          JEPR ANKB2D13
                                        M=AG-M
```

```
ADDR CODE NUMBR LABEL     CMND NEXTADDR OPERAND              COMMENT

                          [illegible] +4      M=0          BRANCH IF CODE IS BACKSPACE
                          [illegible] [illegible]

                          JEPU REKBIDL

                          [illegible]         M=20
                          [illegible] +7      M.G9=0       BRANCH IF NOT IN RECORD
                          RETN

          [illegible] BIT IN M CORRESPONDING TO TAB REGISTER LOCATION SPECIFIED BY
          B0 & B1 OF H7.

                    [illegible]TEMASK CALH    M=HC
                          CALR                M=M.03
                          BPNT +2             DB1=1        A>
                          BPNT +5             DB0=0        B>
                          JIFU +3                          C>
                          BPNT +1             DB0=0        A< D>
                          CALR                M=32                  SET M=40 IF DB1=1 & DB0=1
                          CALR                M=M+OB             D< SET M=10 IF DB1=1 & DB0=0
                          CALR                M=M+02       C<       SET M=04 IF DB1=0 & DB0=1
            [illegible] 01812 CALR            M=M+01       B<       SET M=01 IF DB1=0 & DB0=0
            [illegible] 01813 RETN

          TEST TAB COUNTER IN JUSTIFY MODE TO DETERMINE IF A LAB SHOULD
        * BE EXECUTED AT BEGINNING OF LINE.

[illegible] 01819 TETEINS JEPR TEMC&J                      TB INS TEST            CE130
[illegible]               BALG +2             M=0          BRANCH IF NOT MARGIN CONTROL OR JUSTIFY
[illegible] 01821         CALR                M=01
[illegible]               BALG +1             M.G6=0       BRANCH IF TAB COUNTER NOT OPEN
[illegible]               RETN
[illegible] 01824         CALR                M=20
D49F A[illegible]C 01825  JEPU SEGG                        SET STOP CONDITION FLAG

        * PRINT  CHARACTER  ,  CODE IN  G7 . CODE MAY BE ON M. OR PRINTER

[illegible]                                   [illegible]7  PRINT G7               CE160
[illegible]                                   [illegible]   PRINT M                CE160
[illegible]
[illegible]                                   M=20
[illegible]
[illegible]                                   CHBY=1       BRANCH CHARACTER PRINTING IN PROGRESS
[illegible]                                   CHST

          [illegible] WORD AND DEFERED SPACE FLAG SET EXECUTE SPACE.
          [illegible] A SPACE CODE (20) EXECUTE SPACE.
          [illegible] THE SPACE IF CODE PRINT BIT 6 IN G8=1

[illegible]               [illegible]         M=04
[illegible]               [illegible] +4      M.GA=0       BRANCH NOT PARA MODE
[illegible]               [illegible]         M=G7
[illegible]               [illegible] +[illegible]  M=1F   BRANCH IF EXPANDED SPACE
[illegible]               [illegible]         M=7F
[illegible]               [illegible]         G7=M
[illegible]               [illegible]         M=G7
[illegible]               [illegible]         C3=M
[illegible]               [illegible] +4      M=20         BRANCH IF SPACE
[illegible]               [illegible] +2      M=7F         BRANCH IF PRECEDENTED SPACE
[illegible]               JEPR FEDSWT
[illegible]               JEPU MVCR+2M

[illegible]               CALR                M=40
[illegible]               BALG +3             M.G8=0       BRANCH IF LINE UNDERSCORE FLAG NOT SET
[illegible]               JEPR MVCRG7CS
[illegible]               CALR                M=2D
[illegible]               JEPR PRM
[illegible]               JEPR PR/WORB
[illegible]               JEPU ADG7DE
[illegible]               JEPU SPC

         *CLEARS HIGH ORDER CMND FROM STACK AND FETCHS LOW ORDER IF OK
         *TO PRINT

[illegible] XITSPIF       JEPR TEPRTOK
[illegible]               CNEW                MIN1                  CLEAR HIGH ORDER PRINT CMND
[illegible]               JEPU MOUT                        FETCH LOW ORDER PRINT CMND

        * TEST PRINTER TO SEE IF ITS OK TO PRINT

[illegible] 01879 TEPRTOK CALR                M=04
[illegible] 01880         BALG +2             M=M-1=0      B>       BR IF PRINTER BUSY FOR 12 MICROSEC
C4U1 [illegible] 01881    BPPT -1             PRBY=1                BR IF PRINTER BUSY

[illegible]                                                         RETN M=00 IF OK TO

[illegible]               [illegible] PRT                  B<

                          [illegible] M HC
```

```
ADDR CODE NUMBER LABEL      OPND NEXTADDR OPERAND          COMMENT

                                 DB1=1          A>
                                 DSC=0          B>
                                 MOUT
                                                SHIFT DB3&DB2 TO POS DB1 & DB0
                                 MOUT+          B<
                                 DB0=1          A< C>
                                 MOUT
                                                SHIFT DB5 & DB4 TO POS DB2 & DB0
                                 MOUT           C>
                                                SHIFT DB7 & DB6 TO POS DB2 & DB0

         PRECEDENTED TAB . IF TAB COUNTER CLOSED OR AT LEFT MARGIN
         ... FIND LAST NON-TAB CHARACTER
         IN THE BUFFER AND CLEAR OUT ALL THE TAB BETWEEN

                     CALR        M=0B           EVALUATE PTB
                     BALG +1     M-G7=0         BRANCH IF PRECEDENTED TAB
                     JEPU INC TC
                     CALR        M=01
                     CALG        M=M.G6
                     BALG +2     (M=0)'         BRANCH IF TAB COUNTER OPEN
                     JEPR TELM
                     BALG +1     M=0            BRANCH IF CARRIAGE AT LEFT MARGIN
                     RETN
                     JEPR FECHRW-
                     CALR        M=0A-M
                     BALG -2     M=0            BRANCH IF TAB
                     JEPR FECHRW+
                     JEPR CLRXEOD
                     JEPR RETC
                     JEPU MVCRLM

         PRINT CHARACTER SPECIFIED BY THE CODE IN M AND EXECUTE
         DEFFERED ESCAPEMENT

         01931 ESC&PRM CALG      G3=M           ESC & PRT M          CE190
0AE1 C1E2 01932      JEPR MVCRMCS
0AE2 EA12 01933      CALG        M=G3
0AE3 C441 01934      JEPR PRM
                                 M=G3
                         URDEM

         ... CARRIAGE THE DEFFERED ESCAPEMENT OF G7 OR M

                                 M=G7           EXECUTE G7 ESCAPEMENT
                          FEMAIDTH              EXECUTE M ESCAPEMENT
                                 G0=M
                     CALG        G1=0
                     JEPR ADDE+C10
                     JEPU MVCR+

         EXECUTE A STANDARD SPACE ESCAPEMENT

                     JEPR FESTDSP               EXECUTE STANDARD SPACE
               -2M   CALG        SML            MOVE CARRIAGE 2M
                     JEPU AJCR+M

         TEST TAB FOR A STOP POSITION PAST THE CRASH STOP ON THE CARRIER

               TBCRASH CALR      M=B0           HC TAB CRASH EVALUATION
                     BALG +3     M.GF=0         BRANCH IF NOT TWELVE PITCH
                     CALH        M=HC
                     BALG +3     M=0            BRANCH NOT LAST TAB
                     RETN
                     CALR        M=B4
                     BALH -4     M>HC
               ANTBSTOP CALR     M=B0           TEST MAXIMUM CARRIER POSITION
                     BALG +1     M.GF=0         MAX TB STOP          CE110
                     CALR        M=9A           BRANCH NOT TWELVE PITCH
                     CALR        M=M+04
         01969       RETN

         FETCH DEFERED ESCAPEMENT FROM H9

0AFB B0FF 01974 FEDE CALR        M=0F           FETCH DEFD ESC       CE210
0AFC FE92 01975      CALH        M=M.H9
0AFD C0FF 01976      RETN

         CHECK RECORD FOR TAB INSERT

          01961          *CHECK WORD*
          01981 RCCHINTB JEPR RCCHCP            CH RECD W TB INS     CE140
          01982 LDTERW   CALR    M=20           INSERT TABS          CE140
          01983          BALG +5 M.G6=0         BRANCH NOT STOP CONDITION
          01984          JEPR REG6
0B04 B0AF 01985 LDTERAC  CALR    M=0A
0B05 B07A 01986          CALG    G7=M
```

```
ADDR CODE NUMBR LABEL     CMND NEXTADDR OPERAND              COMMENT

0506 B0FF 01987           CALR           M=OF
0507 BEC2 01988           CALG           M=M.GC
0508 9302 01989           BALG +5        M=0        BRANCH IF NOTHING IN TAB COUNTER
0509 B04 01990            CALG           G4=M
050A CBAA 01991           JEPR RCCHCP
050B BA42 01992           CALG           M=G4
050C B0C0 01993           CALG           M=M-1
050D 970B 01994           BALG -4        (M=0)      BRANCH SECOND CHARACTER ZERO
050E 00FF 01995           RETN

   • UPDATE THE DEFERRED ESCAPEMENT BY THE VALUE OF THE WT OF THE CHARACTER
   • IN G7 OR M AND SET THE DEFERRED ESCAPEMENT FLAG

050F BA72 02001 ADG7DE    CALG           M=G7       G7 UPD DEFD ESC          CE210
0510 E4CA 02002 UPDEM     JEPR FEMPCWT              M UPD DEFD ESC           CE210
0511 F092 02003 SEDE      CALH           M=M+H9     DEFD ESC=M               CE210
0512 B0F0 02004           CALR           M=M.OF
0513 F992 02005           CALH           M=M+H9
0514 F094 02006           CALH           H9=M
0515 B40F 02007           CALR           M=40
0516 47C1 02008           JEPU SEGF                 SET DEFERRED ESCAPEMENT FLAG

   • CLEAR THE DEFERRED ESCAPE AND THE DEFERRED SPACE FLAGS

0517 B40F 02013 CLDE      CALR           M=40       CLEAR DEFD ESC           CE210
0518 E:E7 02014           JEPR REGA
0519 B40F 02015           CALR           M=40
051A A73F 02016           JEPU REGF

   • ADD DEFERED ESCAPEMENT TO THE CONTENTS OF G0 AND G1; ADD SPACE
   • IF DEFERED SPACE BIT SET IN CA

051B BAA2 02023 ADDEFG10  CALG           M=GA
051C 1AC. 02024           BP.. +2        DB6=0      BRANCH DEFERRED SPACE NOT SET
051D C44D 02025           JEPR FESPCS
051E E067 02026           JEPR ADM+G10
051F B40F 02027 ADDE+G10  CALR           M=40       ADD DEFD ESC             CE210
0520 92F2 02028           BALG +2        M.GF=0     BRANCH DEFERRED ESCAPEMENT FLAG NOT SET
   •REWIND THE ACTIVE TRANSPORT AND CLEAR M

0521 C4F5 02031           JEPR FEDE
0522 A767 02032           JEPU ADM+G10
0523 E3A3 02033 SUDEG10   JEPR FEPITCH              SUBTR DEFD ESC           CE210
0524 A7CA 02034           JEPU SUMG10

   • IF DEFERED ESCAPEMENT BIT IN GF IS TRUE : FETCH AND EXECUTE
   • DEFERED ESCAPEMENT

0525 B40F 02040 MVCARDE   CALR           M=40       EXEC DEFD ESC            CE210
0526 BEF2 02041           CALG           M=M.GF
0527 9205 02042           BALG +5        M=0        BRANCH DEFERRED ESCAPEMENT NOT SET
0528 E7BF 02043           JEPR REGF                 RESET DEFERRED ESC. FLAG
0529 C4F5 02044           JEPR FEDE
052A B00 02045            CALG           G0=M
052B E3A3 02046           JEPR FEPITCH
052C B9 0 02047           CALG           M=M+G0
052D 3057 02048           JEPU AJCR+M

   • PRINT THE TWO 4 BIT BINARY CHARACTERS IN M OR IN G4

052E B044 02053 PRMBIN    CALG           G4=M.      BIN 2/3 DIG PRT          CE270
052F B 3F 02054 PRBING4   CALR           M=63       G4 BIN 2/3 DIG PRT       CE270
0530 9142 02055           BALG +2        M>G4       TEST IF GREATER THAN 100
0531 B31F 02056           CALR           M=31       PRINT A ONE
0532 C4E0 02057           JEPR ESC&PRM
0533 BA42 02058           CALG           M=G4
0534 E15A 02059           JEPR DIM/10
0535 E15A 02060           JEPR DIM/10
0536 BA02 02061           CALG           M=G0
0537 E B3 02062           JEPR CVHXASC
0538 C4E0 02063           JEPR ESC&PRM
0539 BA42 02064           CALG           M=G4
053A E1 A 02065           JEPR DIM/10
053B BA 2 02066           CALG           M=G0
053C E1B3 02067           JEPR CVHXASC
053D B4E0 02068           JEPU ESC&PRM

   •C&C CODE PRINT - TESTS FOR DUP ACTION. PRINTS G7. TESTS FOR TE.
   ••              CEN. CODE.

053E E5.F 02075 PR CD     JEPR TEDUP                BR. TO TEST DUP. ACTION
053F C6AE 02076           JEPR CPL7                 BR. TO CODE PRINT G7
0540 E71A 02077           JEPR TETENCEN             BR. TO SUPER CENTER TEST
0541 9303 02078           BALG +9        M=0    1>
0542 E4C7 02079           JEPR TEG72CH              BR. TO ANAL. 2ND CHAR.
```

```
ADDR CODE NNNJP LABEL    CMN. NEXTADDR OPERAND          COMMENT

0543 97.7 0214C             BALS +7        1V=01'
0544 C0C0 02151             JEFR PR2DIG                 BR. TO PRINT 2DIG.
0545 BA72 02082             CALG           M=G7
0546 9472 02083             BDAT +2        M=87      BR. IF SCH
0547 9891 02084             BDAT +1        M=89      BR. IF SWS
0548 C00F 02085             RET.
0549 E177 02086 G4BCD       JEFR CVBIGLG4
054A B544 02087             CALG           G4=M
054B C00F 02088             RETN                     1<

                 * CODE PRINT THE NATIVE LANGUAGE

054C BA.2 02092 CPFL        CALG           M=G8
054D 1E.1 02094             BFRT +1        DB6=1     A>  BRANCH IF PRINT CONTROL IS ON.
054E C00F 02095             RETN

054F B39F 02097             CALR           M=39      A<  39 IS CODE FOR "9"  (USO FL)
0550 1AD1 02098             BFRT +1        LAL=0     E>  BRANCH IF USO SYSTEM
0551 B55F 02099             CALR           M=55          55 IS CODE FOR "U"
0552 85E4 02100             JEPU ESC&PRM.            B<

                 *REPEAT TEST - TESTS FOR REPEATABLE CHARACTERS
                 ***HO.

0553 9A61 02106             BDAT +1        M=A6      BRANCH IF BACKSPACE
0554 A724 02107             JEPU CLM

0555 C00F 02109             RETN

                 * TEST HO FOR  REPEAT CHARACTER . RETURN WITH  M=O IF  NOT  REPEAT

0556 1E7C 02113 TEHORPCH BFRT -3           DB7=1
0557 9C.D 02114             BDAT -2        M=C8      2>  BR. IF PREC CR
0558 9E7C 02115             BDAT -3        M=C7      2>  BR. IF CARR RETN
0559 9FFB 02116             BDAT -4        M=CF      2>  BR. IF PREC BS
055A 9CCA 02117             BDAT -5        M=0C      2>  BR. IF INDEX
055B 9DD9 02118             BDAT -6        M=0D      2>  BR. IF REVERSE INDEX
055C 9A08 02119             BDAT -7        M=20      2>  BR. IF SPACE
055D 9E97 02120             BDAT -8        M=09      2>  BR. IF SPEC. CARR. RETN
055E 9DF6 02121             BDAT -9        M=5F      2>  BR  IF -
055F 9C65 02122             BDAT -8        M=C6      2>  BR. IF PSCR
0560 9A97 02123             BDAT +7        M=2D      2>  BR. IF -
0561 9E56 02124             BDAT +6        M=3E      2>  BR. IF UC .
0562 9AE5 02125             BDAT +5        M=2E      2>  BR IF LC .
0563 9D54 02126             BDAT +4        M=5B      2>  BR. IF UC X
0564 9F83 02127             BDAT +3        M=78      2>  BR. IF LC X
0565 91A2 02128             BDAT +2        M=1A      2>  BR IF PREC. HYPHEN
0566 9FF1 02129             BDAT +1        M=7F      3>  BR. IF PROPORTIONAL SPACE
0567 A724 02130             JEPU CLM                     BR. TO CLEAR M

0566 C00F 02132             RETN                     3<

                 * CODE PRINT PRECEDENTED HYPHEN IF CODE PRINT FLAG SET IN C8

0569 B40F 02137 CPPHYPSP CALR              M=40      PHY/PSP C.P.           CE290
056A 92E2 02138             BALS +2        M.C8=0    BRANCH IF PARA NOT SET
056B BA72 02139             CALG           M=G7
056C 99A1 02140             BDAT +1        M=1A      BRANCH IF PRECEDENTED HYPHEN.
056D C00F 02141             RETN
056E B2FF 02142 PR/WORB  CALR              M=2F
056F 84A1 02143             JEPU PRM

                 *LOADS GO &G1 WITH DATA REQUIRED BY THE PRINTER TO PRINT THE CHAR ON M
                 ***GO.G1.G3

0570 B304 02149             CALG           GO=M
0571 A7A5 02150             JEPU XFG1=M

0572 BL.. 02152 SEGO1PR  CALG              G3=M
0573 C..4 02153             JEFR CVG3TOPC            CONV G3 TO UNIQUE PRINTING CHAR CODE
0574 E307 02154             JEPR CVFFOO
0575 9..A 02155             BALS -5        M=0
0576 1A75 02156             BFRT +5        DB7=0     BRANCH IF CONSTANT SPOKE CHAR
0577 A1.C 02157             CREW           APIN
0578 BA52 02158             CALG           M=GB
0579 3110 02159             C..            ALIN
057A .... 02160             C...           XOUT      OUTPUT SPOKE POSITION FOR VARIABLE
057B C.01 02161             JIPU +1
057C C.7A 02162             JEFR XL
057D .... 02163             CALG           GO=M       SPOKE CHAR
057E E..D 02164             JEPR FEG3PCWT            FETCH G3 PRINTING CHAR WT IN UNITS.
057F B0.4 02165             CALG           G1=M
0580 C.FD 02166             JEPR FEDE                FETCH PRINTING CHAR WT OF LAST CHAR.
0581 BFC4 02167             CALR           M=M+FC    SUBTRACT 4
0582 B31. 02168             CALG           M=M+G1
0583 E..C 02169             JEPR RWL6
0584 B... 02170             CALG           G1=M      G1=(WT PREV + WT PRESENT-4)/2 WITH
0585 C..D 02171             CALR           M=M.6C     LSB & REMAINDER IN  MSB POSITIONS.
0586 5B.D 02172             CALG           M=M+GO
0587 B..4 02173             CALG           GO=M      PLACE LSB OF RIB ADV IN MSB OF GO
```

```
ADD- CODE NOTES LABEL    CMND NEXTADDR OPERAND         COMMENT

0588 E4AF 02174          JEPR FEG3HI                   FETCH HAMMER FORCE IN BITS 2&3 OF M.
0589 B012 02175          CALG           M=M+G1
058A A7A5 02176          JEPU XFG1=M

        * LOAD POINTER FROM THE PRINT STACK IF IN THE REVERSE PRINT MODE

058B 000F 02181          RETN                          A<

058C BA0C 02183 LDPRTPA  CALG           M=CA
058D 1A20 02184          BPRT +2        DB3=0          A>    BR IF PRINT AUTO NOT SET
058E E5A0 02185          JEPR TEPRTSTK
058F 9300 02186          BALG +4        M=0            A>    BR IF PRINT STACK EMPTY
0590 1210 02187          CPRT           LFDB
0591 1A44 02188          BPRT +4        DB4=0          B>    BR IF NOT CARRIAGE MOTION CMND
0592 1CDA 02189          BPRT +A        CHBY=1         C>    BR IF BUSY
0593 C4E0 02190          JEPR XFPSPIF                          FETCH LOW ORDER PRINTER DATA
0594 1200 02191          CPRT           CHST
0595 85A0 02192          JEPU CL&INCPS                       CLR LAST COMMAND & INC POINTER

0596 1A5E 02194          BPRT +5        DB5=0          B< D> BR IF NOT PRINT COMMAND
0597 1CE5 02195          BPRT +5        CHBY=1         C>    BR IF BUSY
0598 1308 02196          CPRT           RBUF
0599 C4E0 02197          JEPR XFPSPIF                          FETCH LOW ORDER PRINTER
059A 1201 02198          CPRT           CHST

059B 85A0 02199          JEPU CL&INCPS                 CLR LAST COMMAND & INC POINTER

059C 1AC1 02201          BPRT +1        FFBY=0         E> D< BR IF NOT BUSY
059D 000F 02202          RETN                          C<

059E C4E0 02204          JEPR XFPSPIF                  E<    FETCH LOW ORDER PRINTER DATA
059F 1200 02205          CPRT           PFST
05A0 B  F 02206 CL&INCPS CALR           M=D0
05A1 0000 02207          CMEM           MIN                        CLEAR LAST CMND FROM PRINT STACK
05A2 B0C5 02208          CALR           M=C5
05A3 E5B0 02209 INC PSPT JEPR FEA2RAM                               INCREMENT OUTPUT POINTER
05A4 0EE0 02210          CALR           M=EE-M
05A5 9000 02211          BALG +1        M=0            BRANCH IF PAST LAST POSITION PRINT STK
05A6 B02A 02212          CALR           M=2A+M
05A7 EC6A 02213          CALR           M=M+C6         F<
05A8 A2AA 02214          JEPU MIN


05A9 C450 02218 PRM/WORB JEPR ESC&PRM
05AA E5EE 02219          JEPU PR/WORB


        *TEST IF IN REC. MODE, CONVERTS G3 CODE PRINT.
        ***G3

        * CODE PRINT CHARACTERS IF IN ACTIVE MODE AND NOT RECORD

05AB B20F 02228 CPNRC    CALR           M=20
05AC 9201 02229          BALG +1        M.G9=0         1>  BR. IF NOT IN REC. MODE
05AD 000F 02230          RETN

05AE BA70 02232 CPG7     CALG           M=G7           1<
05AF B    02233 CPM      CALG           G3=M
05B0 B40F 02234          CALR           M=40
05B1 92   02235          BALG +6        M.G5=0         2>  BR. IF NOT PRTC
05B2 C5DC 02236          JEPR CVG3CP
05B3 9    02237          BALG +4        M=0            2>
05B4 C4E0 02238 ESC&PRM/ JEPR ESC&PRM                      BR. TO ESCAPE & PRINT M
05B5 B2FF 02239 PR/      CALR           M=2F
05B6 C3A1 02240          JEPR PRM                          BR. TO PRINT M
05B7 1309 02241          CPRT           RBON
05B8 000F 02242          RETN                          2<


05B9 B044 02245 PRMBIN/  CALG           G4=M
05BA B  F 02246          CALR           M=G3
05BB 9142 02247          BALG +2        M>C4           TEST IF M GREATER THAN 100
05BC B21F 02248          CALR           M=31           IF SO PRINT A ONE
05BD C549 02249          JEPR PRM/WORB
05BE BA42 02250          CALG           M=G4
05BF E  A 02251          JEPR DIM/10
05C0 E  A 02252          JEPR DIM/10
05C1 BA   02253          CALG           M=G0
05C2 E    02254          JEPR CVHXASC                  CONVERT HEX TO ASCII
05C3 C5   02255          JEPR PRM/WORB
05C4 BA   02256          CALG           M=G4
05C5 E    02257          JEPR DIM/10
05C6 BA 2 02258          CALG           M=G0
05C7 E    02259          JEPR CVHXASC                  CONVERT TO ASCII
05C8 85A9 02260          JEPU PRM/WORB
```

```
ADDR CODE NUMBER LABEL     OPND NEXTADDR OPERAND                COMMENT
                 **MOVE CARRIER FORWARD OR REVERSE ONE SPACE

05C9 FAA2 02265 MVCR+1     CALH         M=HA        MOVE TO CARR+1
05CA B... 022..            CALG         M=M+1
05CB 62F. 02267            JEPU MVCRM

05CC FAA2 022.. MVCR-1     CALH         M-HA        MOVE TO CARR-1
05CD 9... 02270            BALG +1      M=0         BRANCH IF CARR. AT POSITION 0
05CE B... 02271            CALG         M=M-1
05CF 62F. 02272            JEPU MVCRM

                 * PRINT THE TWO 4 BIT BINARY CHARACTERS IN G4 IF CODE PRINT ON

05D0 5..F 02277 PR2DIG     CALR         M=40        2 DIGIT PRINT              CE260
05D1 .... 02...            BALG +4      M.G8=0
05D2 C..F 02...            JEPR PRBINC4
05D3 1... 02...            CPRT         RBDN
05D4 B..F 02..1            CALR         M=8C
05D5 .... 02292            BALG +1      M-G7=0      BRANCH IF G7 HAS BLOCKMARK
05D6 C..F 022..            RETN
05D7 B.F. 02294            JEPU MVLMARF

                 ** MOVE CARRIAGE TO THE CALCULATED NEAREST COLUMN

05D8 C5F. 02289 MVCRCOL    JEPR CANEARCO            MOVE TO COL                CE350
05D9 B2.. 02290            JEPU MVCRM

                 *CODE PRINT CONVERSION
                 ** LOOKS UP CODE PRINT CHAR CORRESPONDING TO CODE IN G7 AND RETURNS WITH
                 ** CHAR ON M. 00 ON M INDICATES CODE DOES NOT CODE PRINT.
                 *** USES CP REG G3

05DA BA72 02298 CVG7CP     CALG         M=G7
05DB ..34 02299 CVMCP      CALG         G3=M
05DC E5.E 02300 CVG3CP     JEPR TEACMODE
05DD 93.. 02301            BALG +*      M=0         BRANCH IF CHAR NOT FROM MEDIA
05DE B..F 02..2            CALR         M=04
05DF BC.A 02..3            CALR         M=M+CC
05E0 F..4 02304            CALH         HO=M        BEGINNING ADDRESS OF C. PC CONV ROM TO H
05E1 FA.2 02305            CALH         M=HO        START COMPARE TEST LOOP TO SEE IF CHAR
05E2 C..A 02306            JEPR XL
05E3 9... 02307            BALG +4      M-G3=0      BRANCH IF CHAR IN G3 REQUIRES CONV
05E4 E..A 02309            JEPR INC HO              INCREMENT ADDRESS OF C.P. CONV
05E5 BD43 02309            CALR         M=D4-M
05E6 970A 02310            BALG -5      (M=0)*      BRANCH TO BEGIN TEST LOOP IF(G2)LESS THA
05E7 C..F 02311            RETN                     ...HEX D3. RETURN WITH M=0 INDICATES NO

05E8 FA.2 023.3            CALH         M=HO
05E9 B3.A 023..            CALR         M=M+33
05EA 1..2 023.5            SPRT +2      DB7=0       BRANCH IF (G2)"GE"HEXCC.(CP USO=CP RANK)
05EB 1..1 023.6            BPRT +1      LXL=0       BRANCH IF USO SYSTEM
05EC B1.A 023.7            CALR         M=M+14      ADJUST ADDRESS TO LOCATION CONTAINING
05ED 6E1A 023.8            CALR         M=M+E1      ...CONVERTED CODE
05EE B.7A 023.9            JEPU XL                  RETURN WITH RESULT ON M

05EF C78D 02322 ANCHPA     JEPR ANCHPSD
05F0 C0CF 02323            RETN

                 * SET PRINT FROM RIGHT TO LEFT FLAG BIT.4 GA

05F1 810F 02329 SERP       CALR         M=10
05F2 A7E5 02330            JEPU SEGA

                 * CALCULATE THE NEAREST COLUMN TO THE PRESENT CARRIAGE POSITION WHEN
                 * IN PORP. SPACE AND NOT ON A 1 UNIT COLUMN.

05F3 E3A3 02336 CANEARCO   JEPR FEPITCH             CALC NEAR COL              CE360
05F4 F..4 02337            CALH         HO=M
05F5 E3A3 02338            JEPR FEPR
05F6 D..2 02339            BALH +2      M>HO
05F7 FAA2 02340            CALH         M=HA
05F8 C0CF 02341            RETN
05F9 FAA2 02342            CALH         M=HA
05FA BF01 02343            CALG         M=M+1
05FB 00.F 02344            RETN

                 * RESET RECORD AND RECORD FLASH FLAGS

05FC B20F 023E0 RESET RC   CALR         M=30        BIT MASK FOR REC. AND RCD FLASH
05FD A7B2 02351            JEPU REG9

                 *CHECK LINE COUNTER FOR END OF PAGE INDICATION.
                 ***HO

05FF E.9B 02357            *CHECK WORD*
```

```
ADDR CODE NUMBR LABEL     CMND NEXTADDR OPERAND               COMMENT

0600 C0CF 02357           RETN                          A<B<C<
0601 E0EA 02358 POLINCTR  JEPR FELCCTR
0602 F000 02359           CALH               HO=M
0603 5380 02360           JEPR FELCPRE
0604 9005 02361           BALG -4            M=0        A>      BRANCH IF LINE CTR NOT PRESENT.
0605 D01A 02362           BALH -5            M>HO         B>    BRANCH IF LINE CTR LE PRESET NO.
0606 B0AF 02363           CALR               M=0A
0607 D0F6 02364           BALH -7            M=M+HOC        BR. IF LINE COUNT =0
0608 B002 02365           CALG               M=G9
0609 1A00 02366           BPST +4            DS2=0          BR. NOT IN JUST.
060A EA10 02367           JEPR AJRWBPJ
060B B0FF 02368           CALR               M=00
060C E302 02369           JEPR SELCCTR
060D A3E5 02370           JEPU LKM=G9

060E E470 02372           JEPR EVSTOP                   D<
060F 930B 02373           BALG -4            M=0        BRANCH IF NOT STOP CONDITION
0610 A473 02374           JEPU SESTOP

               * TEST IF THE POSITION OF CARRIER CORRESPONDS TO THE COLUMN SPECIFIED IN
               * G2

0611 CACA 02380 TELM      JEPR CAINDENT                 LM TEST                   CE390
0612 B0C3 02381 TECR=M    CALG               G2=M       M COL TEST                CE390
0613 E287 02382           JEPR FE2PCH
0614 E1D6 02383           JEPR XMG2
0615 C5C3 02384           JEPR SUBEG10
0616 E72A 02385           JEPR NEG G10
0617 C51E 02386           JEPR ADDEFC10
0618 C5EB 02387           JEPR ADG10CA
0619 BA12 02388           CALG               M=G1
061A E0C2 02389           CALG               M=M.G0
061B C0CF 02390           RETN

               * FINISH PRINTING WHEN IN THE REVERSE PRINT MODE

061C C0CF 02395           RETN

061D BAA2 02397 FIN PA    CALG               M=GA
061E 1A30 02398           BPST -2            DB3=0      BRANCH AUTO-PRINT FLAG NOT SET
061F BA92 02399           CALG               M=G9
0620 1E21 02400           BPST +1            DB2=1
0621 E4E9 02401           JEPR CLTC
0622 C0FA 02402           JEPR CRPACR
0623 87A1 02403           JEPU ENDLINPA

               * EXECUTE CARRIAGE RETURN FROM KEYBOARD BY MOVING
               * CARRIAGE TO LEFT MARGIN, EXCUTING AN INDEX, AND INSERTING A
               * TAB IF JUSTIFY AND TAB COUNTER CLOSED.

0624 0C59 02410 CRKB      BKED +9            NMRL=1     BRANCH IF MAR REL KEY DEPRESSED
0625 C 41 02411           JEPR CPPRECPF
0626 B01F 02412           CALR               M=01
0627 C2F0 02413 CR        JEPR MVCRM                    EXEC CR                   CE080
0628 C253 02414           JEPR IX
0629 E4EB 02415           JEPR CLTBCR
062A C49- 02416           JEPR TETBINS
062B EBDD 02417           JEPR CHKEORIB
062C B01F 02418 RECOL     CALR               M=01
062D A78D 02419           JEPU REG5

               * EXECUTE AUTOMATIC CARRIAGE RETURN IF CR OR PCR CODE, OR IF MANUAL
               * MARGIN CONTROL CONVERSION TO CR IS REQUIRED.

062E E391 02424 CRAC      JEPR BILL                     EXEC AUTO CR              CE080
062F BA72 02425           CALG               M=G7
0630 9565 02426           BDAT +3            M=06       BR IF PSCR
0631 9584 02427           BDAT +4            M=08       BR IF PCR
0632 C 11 02428           JEPR TELM
0633 9302 02429           BALG +2            M=0        BRANCH IF AT LEFT MAR
0634 B8OF 02430           CALR               M=80
0635 9214 02431           BALG +4            M.G1=0
0636 C141 02432           JEPR CPPRECPF
0637 E4E0 02433           JEPR RETC
0638 E3AC 02434           JEPR FELM
0639 8127 02435           JEPU CR

063A B40F 02437           CALR               M=40
063B BE62 02438           CALG               M=M.G6
063C 9769 02439           BALG -6            (M=01)'    BRANCH IF CENTER FLAG SET
063D C 41 02440           JEPR CPPRECPF
063E E4E0 02441           JEPR LKTC
063F CACA 02442           JEPR CAINDENT
0640 8127 02443           JEPU CR

               *CODE PRINT PRECEDENTED CARRIER RETURN, PRECEDENTED TAB, AND SPECIAL
               **CARRIER RETURN.

0641 BAB2 02449 CPPRECPF  CALG               M=GB
```

```
ADDR CODE NUMBR LABEL    OPNC NEXTADDR OPERAND                        COMMENT

0642 1A   02450           DBRT +6        DB6=0          A>       BRANCH IF NOT PRINT CONTROL
0643 BA12 02451           CALG           M=G7
0644 1E71 02452           BPRT +4        DB7=1          B>
0645 9C   02453           BDAT +6        M=06                    BRANCH IF PREC SCR
0646 9    02454           BDAT +8        M=0B           C>                 PREC TAB
0647 9    02455           BDAT +6        M=0B           D>                 PREC CARRIER RETN
0648 9    02456           BDAT +1        M=09           E>                 SPECIAL CARRIER RETURN
0649 C0 F 02457           RETN

064A 1ED1 02459           DBRT +1        LXI=1          E< F>    BRANCH IF INTERNATIONAL SYSTEM
064B B11A 02460           CALR           M=M+11                  09+11+14+03+22=53=CODE FOR "S"
064C C0 C 02461           NOOP
064D B14A 02462           CALR           M=M+14            F<    09+14+03+22=    42=CODE FOR "U"
064E B1 A 02463           CALR           M=M+03         D<       08+03+22=       2D=CODE FOR "-"
064F B22A 02464           CALR           M=M+22         C<       08+22=          2D=CODE FOR "-"
0650 85A9 02465           JEPU PRM,WORD


          *UPDATE COUNTERS WHICH KEEP TRACK OF VERTICAL PAPER POSITION FOR PAGE END
          *AND FIRST LINE FIND FEATURES WHEN MOVING PAPER REVERSE.
          ***HO

0651 E5C9 02472 UPLCRVS   JEPR FELCPRE
0652 9305 02473           BALG +3        M=0            A>       BRANCH IF PAGE END NOT SET.
0653 E1 4 02474           JEPR FELCCTR
0654 B 21 02475           CALG           M=M-G2                  SUBTRACT VERTICAL MOVEMENT
0655 3    02476           CMEM           MIN
0656 E 84 02477           JEPR FEFLPRE                  A<
0657 9305 02478           BALG +5        M=0            B>       BRANCH IF FIRST LINE NOT SET
0658 F0   02479           CALH           HO=M
0659 E3B  02480           JEPR FEFLCTR
065A 9522 02481           BALG +2        M=M-G2>0         C>     ADJUST COUNT & BR IF RESULT GE 00
065B D  1 02482           BALH +1        M=M+HOC        E<  D>   ADJUST COUNT MODULO FL PRESET #
065C 9    02483           JIPU -1                       E>
065D F0 4 02484           CALH           HO=M           B<C<D<
065E E326 02485           JEPR FEFLCTR
065F FA0  02486           CALH           M=HO
0660 30   02487           CMEM           MIN                     SET FIRST LINE COUNTER TO NEW VAL
0661 B04F 02488           CALR           M=04
0662 A 06 02489           JEPU XMG2                              MULT G2 BY 04 IN PREPARATION FOR


          *UPDATE COUNTERS WHICH KEEP TRACK OF VERTICAL PAPER POSITION FOR PAGE END
          *AND FIRST LINE FIND FEATURES.
          ***HO

0663 B12F 02496 UPLCFWD   CALR           M=12
0664 F07  02497           BALG +3        M-G7=0                  BRANCH IF "FIRST LINE FIND" CODE
0665 E1 4 02498           JEPR FELCCTR
0666 B    02499           CALG           M=M-G2                  ADD VERTICAL MOVEMENT
0667 E352 02500           JEPR SELCCTR
0668 E3E4 02501           JEPR FEFLPRE                  A<
0669 9305 02502           BALG +5        M=0            B>       BRANCH IF FIRST LINE NOT SET.
066A F0 4 02503           CALH           HO=M
066B E3B6 02504           JEPR FEFLCTR
066C B920 02505           CALG           M=M+G2                  ADD VERTICAL MOVEMENT
066D E3CC 02506           JEPR SEFLCTR
066E D  9 02507           BALH -1        M=M-HO>0
066F B04F 02508           CALR           M=04
0670 A 06 02509           JEPU XMG2                     B<       MULTIPLY G2  BY 04 IN PREPARATION
                                                                   FOR PRINTER  COMMAND.

          * FETCH THE STANDARD RIGHT AND LEFT MARGINS

0671 B80F 02514 FESTRM    CALR           M=80                SET MASK TO TEST BIT 7
0672 92F6 02515           BALG +6        M.GF=0              IS PITCH SET AT 10 OR 12
0673 C8 4 02516           JIPU +4                            IF PITCH SET AT 12 JUMP AHEAD 4 INST.
0674 B8CF 02517 FESTLM    CALR           M=80                SET MASK TO TEST BIT 7
0675 92F1 02518           BALG +1        M.GF=0              IS PITCH SET AT 10 OR 12
0676 BFC  02519           CALG           M=M+1               NEXT 4 INST. CALCULATE XLATOR ADDRESS
0677 BF 1 02520           CALG           M=M+1
0678 BFC1 02521           CALG           M=M+1
0679 B7CA 02522           CALR           M=M+7C
067A C0   02523 XL        CPED           XL=M                GATE ADDRESS TRANSLATOR TO RCM
067B C0   02524           CPED           M=XL                GATE DATA TO M
067C 00 F 02525           RETN                               RETURN TO MAIN ROUTINE


          * IF NOT IN JUSTIFY SET GO & G1 EQUAL TO CARRIAGE POSITION IN HA
          * IF IN JUSTIFY EXECUTE A CR IF DEFERED CR FLAG TRUE AND IF IN
          * HELP MODE SET GO & G1 UP FOR HELP,PRINTING BEYOND RIGHT MARGIN

067D B 04 02532 XFCAG10   CALG           G0=0                G1/G0=CARR                CE370
067E B1 4 02533           CALG           G1=0
067F B04F 02534           CALR           M=04
0680 929E 02535           BALG +E        M.G9=0              BRANCH IF JUSTIFY FLAG NOT ON
0681 BA 2 02536           CALG           M=CA
0682 1A 2 02537           BPRT +2        DB5=0               BRANCH IF DEFEERED CARRIAGE RET NOT SET
0683 CACA 02538           JEPR CAINDENT
0684 C807 02539           JIPU +7
0685 B02F 02540           CALR           M=02
```

```
ADD- CODE NUMBER LABEL    CMND NEXTADDR OPERAND            COMMENT

0686 9..8 02541           BALG +8       M.G5=0     BRANCH IF MARGIN CONTROL SC NOT SET
0687 BFOF 02542           CALR          M=FO
0688 FE92 02543           CALH          M=M.H9
                * IF POWER PRINT CLEAR TAB COUNTER IF NOT JUSTIFY AND EXECUTE
                * CARRIAGE RETURN IF DEFERED CR FLAG TRUE AND END LINE POWER PRINT

0689 E .E 02547           JEFR RML4
068A B0.. 02548           CALG          GO=M
068B FAE2 02549           CALH          M=HE
068C B02. 02550           CALG          G2=M
068D E..7 02551           JEFR FE2PCH
068E A.D. 02552           JEPU XMO2+CO
068F 83E. 02553           JEPU ADG1OCA

                * UPDATE DEFERED ESCAPEMENT IF G7 CODE IS PRINTING CHARACTER

0690 BA72 02558 AJDEHO    CALG          M=G7
0691 E532 02559           JEFR TEMPC
0692 9709 02560           BALG +9       (M=O)'     BRANCH IF (M) NOT A PRINT CHARACTER
0693 C4FE 02561           JEFR FEDE
0694 B0.4 02562           CALG          GO=M
0695 BA72 02563           CALG          M=G7
0696 E49A 02564           JEFR FEMPCWT
0697 B900 02565           CALG          M=M+GO
0698 B004 02566           CALG          GO=M
0699 BA72 02567           CALG          M=G7
069A C510 02568           JEFR UPDEM
069B AC89 02569           JEPU XFM=GO

069C A724 02571           JEPU CLM

                *CALCULATE STARTING CARRIER POSITION TO LEFT PRINT DATA IN
                *PW BUFFER

069D CDE7 02577 CALPST    JEFR ACRAST
069E CACA 02578           JEFR CAINDENT
069F B0.. 02579           CALG          M=M-1
06A0 A1DE 02580           JEPU CARAHZM                        ADD RW DATA WIDTH TO INDENTED LM-1

                * IF POWER PRINT AUTO EMPTY PRINTER STACK AND THEN EVALUATE STOP
                * CONDITIONS. IF NOT PPA EVALUATE STOP CONDITIONS ONLY

06A1 BAA2 02586 ENDLINPA CALG           M=GA
06A2 1A.. 02587           BPRT +3       DB3=0      BRANCH PRINT-AUTO FLAG NOT SET
06A3 C070 02588           JEFR NO
06A4 E54D 02589           JEFR TEPRTSTK
06A5 970D 02590           BALG -2       (M=O)'     BRANCH IF PRINT STACK HAS CHARACTER
06A6 EBDD 02591           JEFR CHKEORIB
06A7 A470 02592           JEPU EVSTOP

                *KEYBOARD INPUT CONVERSION--ASSUMES CHAR TO BE CONVERTED IS ON M
                ***HO,H1,HB HC

06A8 C03F 02596           RETN

06A9 F004 02600 CVKBINP   CALH          HO=M
06AA 1AT. 02601           BPRT +4       DB7=0      BRANCH IF POSSIBLE PRINT CHACTER
06AB 90.. 02602           BOAT +1       M=C6       BRANCH IF CODE REVERSE INDEX
06AC 9..2 02603           JIPU +2
06AD B06F 02604           CALR          M=06       CONVERT PSCR
06AE F0.. 02605           CALH          HO=M
06AF 1ADC 02606           BPRT -7       LXL=0      BRANCH IF NOT INTERNATIONAL SYSTEM
06B0 0000 02607           NOOP
06B1 C140 02608           JEFR FELXLSTD
06B2 BFOD 02609           CALR          M=M.FO
06B3 E .E 02610           JEFR RML4
06B4 F01. 02611           CALH          H1=M                 H1 IS CONVERSION DELTA
06B5 9309 02612           BALG +9       M=0        A>        BR IF 1ST CONV NOT REQ'D
06B6 D04F 02613           CALR          M=C4
06B7 B.00 02614           CALG          M=M-1      B<
06B8 F0B4 02615           CALH          HB=M                 HB IS ROW TO BE SEARCHED
06B9 3110 02616           CMEM          ALIN
06BA B18F 02617           CALR          M=18                 SET M=END OF SEARCH COL +1
06BB C1.2 02618           JEFR CONVERT
06BC 97C2 02619           BALG +2       (M=O)'     A>        BR IF CONV WAS MADE
06BD FAB2 02620           CALH          M=HB
06BE 9709 02621           BALG -7       (M=O)'     B>        BR TO SEARCH ANOTHER ROW.
06BF B02F 02622           CALR          M=O2       A<
06C0 F01. 02623           CALH          H1=M                 SET CODE CONV DELTA
06C1 BOEF 02624           CALR          M=OE
06C2 B.00 02625           CALG          M=M-1      D<
06C3 F0B4 02626           CALH          HB=M
06C4 3110 02627           CMEM          ALIN                 SELECT ROW TO BE SEARCHED
06C5 B18F 02628           CALR          M=18                 SET M=END OF SEARCH COL +1
06C6 C1.2 02629           JEFR CONVERT
06C7 9..2 02630           BALG +2       (M=O)'     C>        BR IF CODE CONV COMPLETE
06C8 FAB2 02631           CALH          M=HB
06C9 9.DB 02632           BOAT -7       M=OD       D>        BR TO SEARCH ROW C
```

```
ACC  CODE NO   F LABEL    CMND NEXTADDR OPERAND                  COMMENT
06CA B0CF 02633           CALR          M=0C       C<
06CB F0D1 02634           CALH          HB=M             SELECT ROW TO BE SEARCHED
06CC 3110 02635           CMEM          ALIN
06CD B10F 02636           CALR          M=10             SET M=END OF SEARCH COL +1
06CE C112 02637           JEFR CONVERT
06CF 0000 02638           NOOP
06D0 9705 02639           BALG +5       (M=0)'     E>    BR IF CONV COMPLETE
06D1 B0DF 02640           CALR          M=0D
06D2 F0B4 02641           CALH          HB=M
06D3 3110 02642           CMEM          ALIN             SELECT ROW TO BE SEARCHED
06D4 B0FF 02643           CALR          M=0F             SET M=EBD OF SEARCH COL +1
06D5 C112 02644           JEFR CONVERT
06D6 C127 02645           JEFR FESTDLAN            E<
06D7 B010 02646           CALS          M=M-1
06D8 3110 02647           CMEM          ALIN
06D9 F0B4 02648           CALH          HB=M
06DA B 51 02649           CALS          M=M-GB
06DB BFF9 02650           CALR          M=FF-M
06DC F014 02651           CALH          H1=M              MINUS STANDARD LANG.
06DD B10F 02652           CALR          M=10             SET M= END OF SEARCH COL +U
06DE C150 02653           JEFR CONVERT
06DF 8A01 02654           JEFU XFM=HC

        *PUTS SYSTEM IN DEDICATED PRINT MODE IF IN PLAY, NOT REVISE,
        * NOT RECORD, NOT CODE PRINT, NOT MARGIN CONTROL

06E0 BA32 02660 SEPA      CALG          M=GB
06E1 5100 02661           CALR          M=M.70
06E2 9201 02662           DALG +1       M=0        A>    ER IF NOT MGC.REV. NOR CODE PRINT
06E3 8A44 02663           JEPU BZERI3              B<

06E4 BA92 02665           CALG          M=G9       A<
06E5 140D 02666           BPRT -2       DB3=0      B>    BR IF NOT PLAY
06E6 1E5C 02667           BPRT -3       DB5=1      B>    BR IF RECORD
06E7 2805 02668           BACM -4       ACT=0
06E8 BAA2 02669           CALG          M=GA
06E9 1E29 02670           BPRT -6       DB2=1      B<    BR IF AUTO US
06EA B08F 02671           CALR          M=08
06EB E785 02672           JEPR SEGA                      SET PRINT AUTO MODE
06EC B0EF 02673           CALR          M=0E
06ED E795 02674           JEFR SEGB
06EE B04F 02675           CALR          M=C4
06EF 0014 02676           CMEM          A2IN
06F0 B06F 02677           CALR          M=C6
06F1 300A 02678           CMEM          MINI             INIT PRT STACK INPUT POINTER
06F2 300A 02679           CMEM          MINI             INIT PRT STACK OUTPUT POINTER
06F3 B0CF 02680           CALR          M=C0       C<
06F4 300A 02681           CMEM          MINI             CLEAR PRINT STACK
06F5 3000 02682           CMEM          AOUT
06F6 BF00 02683           CALR          M=F0-M
06F7 970D 02684           BALS -4       (M=0)'
06F8 CDE2 02685           JEFR CLRW
06F9 45FC 02686           JEPU TEACMED

        * IF DEFERED CR FLAG TRUE, EXECUTE CR AND RESET FLAG

06FA B20F 02691 CRPACR    CALR          M=20
06FB 9242 02692           BALG +2       M.GA=0     A>    BR IF NO DEF'D CR.
06FC E787 02693           JEPR REGA
06FD 83C7 02694           JEPU MVINDLM

06FE C00F 02696           RETN                     A<

        * ROUTINE PRINTS REVERSE NO CONDITION EXISTS TO STOP

06FF B0E0 02701           *CHECK WORD-
0700 C7A1 02701 HAYOK     JEPR ENDLINPA                  FINISH PRINTING FROM STACK
0701 9305 02702           BALG +5       M=0        A>    BR IF STOP FLAG NOT SET
0702 CDE2 02703           JEFR CLRW
0703 C73C 02704           JEPR AJROLNST                  ADJUST RCB TO START OF LINE
0704 E8E9 02705 END PA    JEPR CLTC                      CLEAR TAB COUNTER
0705 C FA 02706           JEFR CRPACR                    RETURN CARRIER TO LEFT MARGIN
0706 B00C 02707           JEFU REKBIDL

0707 C5F1 02709           JEFR SERP
0708 E715 02710           JEPR XFH45H01
0709 E70C 02711           JEPR XFH 1G01                  FETCH LINE END (LP START) POSITION
070A E010 02712           JEFP MVRAHZ                    MOVE TO NEW START PRINT POSITION.
070B CF1D 02713 PARVSC    JEPR FECHFW-                   FETCH NEXT CODE TO BE EXECUTED
070C 9702 02714           BALG +2       (M=0)'     B>    BR IF NOT END OF LINE.
070D C70A 02715           JEPR CRPAIX
070E 8717 02716           JEFU PAFND                     PRINT NEXT LINE FORWARD

070F E30A 02718           JEPR XFH10G47            B<
0710 E300 02719           JEPR FES7ACWT            C<
0711 9703 02720           BALG +3       (M=0)'     D>    BR IF ACCENT CODE
0712 C5EF 02721           JEPR ANCHPA                    CONTINUE' ANALYSIS OF PRESENT CODE
0713 C070 02722           JEPR MO
0714 870B 02723           JEPL PARVSC                    FETCH & ANALYZE NEXT CODE

0715 C4A0 02725           JEPR PRG7                D<    PRINT ACCENT
0716 870B 02726           JEFU PARVSC                    FETCH & ANALYZE NEXT CODE
```

```
ADDR CODE NUMBR LABEL     OPND NEXTADDR OPERAND                 COMMENT

                 *INITIALIZES TO BEGINING OF LEIN AND PRINTS FORWARD FOR AUTO
                 *PRINT MODE

0717 CDE2 02732 PAFWD     JEPR CLRW
0718 CEEE 02733           JEPR TEROB1                           READ NEXT BLOCK IF REQD
0719 C131 02734           JEPR ENDLINPA                         FINISH PRINTING FROM STACK
071A 9301 02735           BALG +1          M=0         A>       BR IF STOP NOT SET
071B 6704 02736           JEPU END PA

071C C72D 02738           JEPR CTROTBS                 A<       COUNT LEADING TABS
071D C7F4 02739           JEPR CKPACR
071E B10F 02740           CALR             M=10
071F E7B7 02741           JEPR REGA                             RESET REVERSE PRINT FLAG
0720 CF06 02742 PAFWDC    JEPR FECH                             FETCH CHAR TO BE PRINTED
0721 E700 02743           JEPR XFH10G47
0722 E500 02744           JEPR TEMCR
0723 9703 02745           BALG +3          (M=0)'
0724 C73A 02746           JEPR CRPAIX
0725 87BC 02747           JEPU TEHAY

0726 000F 02749           RETN

0727 B8DF 02751           CALR             M=8D
0728 970D 02752           BALG -2          M-G7=0
0729 C6EF 02753           JEPR ANCHPA                  B<       EXECUTE CHARACTER
072A C07C 02754           JEPR NO
072B CBAD 02755           JEPR RCCH
072C 8725 02756           JEPU PAFWDC                           LOOP TO EXECUTE NEXT CHARACTER

                 * CLEAR ALL TABS FROM THE RO BUFFER

072D E4EB 02761 CTROTBS   JEPR CLTC
072E CED8 02762 CTROTBSC  JEPR FERO+
072F E500 02763           JEPR TEMTB
0730 9702 02764           BALG +2          (M=0)'      BRANCH IF NOT TAB
0731 E 29 02765           JEPR INC TCC
0732 872E 02766           JEPU CTROTBSC

0733 8E5C 02768           JEPU AJRO-

                 *ADJUST READ ONLY BUFFER POINTER BACK TO BEGINNING OF LINE
                 *(BEGINNING OF BUFFER OR CARRIAGE RETURN CODE)

0734 CF0E 02774 AJROLNST  JEPR FECHRO-                 B<
0735 CFCE 02775           JEPR FECHRO-
0736 9302 02776           BALG +2          M=0         A>       BR IF BEGINNING OF BUFFER
0737 E520 02777           JEPR TEMCR
0738 970C 02778           BALG -3          (M=0)'      B<       BR IF NOT CARRIAGE RETURN CODE
0739 8F30 02779           JEPU FECHRO+                 A<

                 * DETERMINES IF UNDERSCORE CHARACTER IN G7. INCREMENTS THE BILL COUNTER.
                 * CLOSES TAB COUNTER. CLEARS BUFFER OF TABS AND CR. TEST FOR TABS TO
                 * BE INSERTED IN JUSTIFY. INDEXES PAPER. AND SETS DEFERED CR FLAG.

073A B07F 02787 CRPAIX    CALR             M=07
073B B074 02788           CALG             G7=M
073C CFB1 02789           JEPR ANG7US
073D E395 02790           JEPR BILLC
073E E4E6 02791           JEPR LKTC
073F E4EB 02792           JEPR CLTECR
0740 C499 02793           JEPR TETBINS
0741 C72C 02794           JEPR RECOL
0742 C353 02795           JEPR IX
0743 B20F 02796           CALR             M=20
0744 A785 02797           JEPU SEGA                    SET RT FLUSH COL FLAG

                 *MOVE CARRIER TO BEGINNING OF COLUMN HEADING IF REQUIRED.
                 **H0,H1,H4,H5,G0,G1,G2

0745 E23B 02803 MVCRCOLU  JEPR CLH4-H7
0746 CFCE 02804           JEPR FECHRO-
0747 4503 02805           JIFU +3
0748 F002 02806           CALH             M=H0         C<
0749 CFAD 02807           JEPR CAMCSCEN
074A E9CA 02808           JEPR ADCSH54
074B CF00 02809           JEPR FECHRO+                 A>       BEGIN LOOP TO CALC CONS SPACE
074C 9302 02810           BALG +2          M=0         D>       BRANCH OUT OF LOOP IF END OF DATA.
074D E0D2 02811           JEPR TEMCENBP
074E 9C09 02812           BALG -C          (M=0)'      C>       BRANCH IF NOT END OF COL HEADING.
074F CFCE 02813           JEPR AJROTOTB                B<       REALIEN BUFFER TO BEGIN OF COLUMN.
0750 E715 02814           JEPR XFH45HC1
0751 E7A0 02815           JEPR SHH10R                           DIVIDE TOTAL CS BY 2.
0752 E700 02816           JEPR XFH01G01
0753 B502 02817           CALG             M=M/G0
0754 9701 02818           BALG +1          (M=0)'      D>       BRANCH IF CS NOT EQUAL 0.
```

```
ADDR CODE NUMBR LABEL    OPND NEXTADDR OPERAND          COMMENT
0755 000F 02819           RETN

0756 E73A 02821           JEPR NEG G10          D<    NEGATE CONSUMED SPACE /2
0757 E14C 02822           JEPR CACOLCEN               COLUMN CENTER TO G2.
0758 A077 02823           JEPU MVCRCENC               COMPLETE COMPUTATION & MOVE

                 * SET COLUMN CENTERING BIT IF NOT MC OR JUSTIFY

0759 E59F 02828 SECOL     JEPR TEMC&J
075A 9301 02829           BALG +1       M=0     A>    BRANCH IF NOT MARGIN CONT OR JUSTIFY
075B 000F 02830           RETN

075C 801F 02832           CALR          M=01    A<
075D A78B 02833           JEPU SEG5

                 * CONTROL ROUTINE FOR PLAY, SKIP AND DUPLICATE MODES

075E 802F 02838 PSD       CALR          M=02
075F BE52 02839           CALG          M=M.G5
0760 970C 02840           BALG +C       (M=0)'
0761 3001 02841           BPRT +1       XLX=1
0762 C70C 02842           JEPR ANNBAC
0763 CF03 02843           JEPR FECH
0764 E706 02844           JEPR XFH10G47
0765 3011 02845           BPRT +1       XLX=1
0766 E47A 02846           JEPR SKSPTBAJ
0767 C0BE 02847           JEPR BICYO
0768 C674 02848           JEPR ANMOPSD
0769 C101 02849           JEPR MOLINCTR
076A E47C 02850           JEPR EVSTOP
076B 9305 02851           BALG +A       M=0
076C E30D 02852           JEPR FEG7ACWT
076D 9703 02853           BALG +C       (M=0)'
076E 000F 02854           RETN

                 * ANALYZE FOR A HYPHEN IN TEXT ZONE IN MARGIN CONTROL. IF M=0
                 * WHEN RETURN THEN PLACE THE CR OR SCR IN G7 ON KEYBOARD STACK
076F C859 02860 ANHYTZMC JEPR ANHY
0770 9301 02861           BALG +1       M=0           BRANCH IF HYPHEN
0771 8617 02862           JEPU ANECSTOP               B<

0772 E4E0 02864           JEPR RETC
0773 BA72 02865 XFG7STK   CALG          M=G7
0774 A261 02866           JEPU XFMKS                        XFER CR/SCR TO KB STACK

                 * IF NOT IN REVISE OR RECORD CODE PRINT G7 SWITCH TRANSPORT
                 * IF BOTH TRANSPORTS DO NOT HAVE CARDS BUZZ.
0775 E5A5 02872 SWPLAY    JEPR TERVRC                 PLAY SWR                  CT015
0776 9704 02873           BALG +4       (M=0)'        BRANCH IF RECORD OR REVISE
0777 C0C2 02874           RNOP
0778 C55E 02875           JEPR PR CD
0779 E46F 02876           JEPR SW
077A 9301 02877           BALG +1       M=0           BRANCH IF SWITCH RPR BIT SET IN REC ORR
077B 000F 02878           RETN
077C A34D 02879           JEPU LOCK ERR

                 * PRINT AND MOVE THE DISTANCE OF CHARACTER IN G7
077D 000F 02883           RETN

077E BA92 02885 PRCH      CALG          M=G9
077F 1A3D 02886           BPRT -2       DB3=0   A>
0780 E529 02887 PR&MVG7   JEPR TEG7SP
0781 9701 02888           BALG +1       (M=0)'        BRANCH IF NOT SPACE CODE
0782 84A0 02889           JEPU SP                     JUMP TO "SPACE" ROUTINE

0783 BA72 02891           CALG          M=G7    B>
0784 E307 02892           JEPR CVFF00
0785 9308 02893           BALG +8       M=0     C>    BRANCH TO RETN IF G7=00 OR FF
0786 C4E7 02894           JEPR MVCRMCS                MOVE CARRIER TO NEXT PRINT POS.
0787 C559 02895           JEPR CPPHYPSP               CODE PRINT IF PREC HY OR PREC SP.
0788 C4A0 02896           JEPR PRG7                   PRINT CODE DESIGNATED IN G7.
0789 C517 02897           JEPR CLDE                   CLEAR DEFERRED ESCAPEMENT
078A E30D 02898           JEPR FEG7ACWT               FETCH WEIGHT IF ACCENT
078B 9701 02899           BALG +1       (M=0)'  D>    BRANCH IF ACCENT
078C B50F 02900           JEPU ADG7DE                 SET DEFERRED ESCAPEMENT

078D 9871 02902           BDAT +1       M=07    D<  E> BRANCH IF WEIGHT=07
078E C00F 02903           RETN                  A<C<

078F 802F 02905           CALR          M=02
0790 B353 02906           JEPU AJCR-M                       AJ CARRIER TO CENTER OF STD CHAR.
```

```
ADDR CODE NUMBER LABEL     CMND NEXTADDR OPERAND            COMMENT

               * TEST FOR CENTER FLAG FALSE AND PLAY TRUE. THEN ANALYZE CHARACTER
               * IN G7 FOR CONVERSION IN MARGIN CONTROL. TEST KEYBOARD STACK FOR NEW
               * ENTRY AND EXECUTE DEFERED TRACK PRINT IF NOT

0791 B40F 02913 LDASPSD  CALR           M=40      AUTO PSD RETN          CF040
0792 9261 02914          BALG +1        M.G6=0    BRANCH FIRST PRINT CHAR FLAG NOT SET
0793 000F 02915          RETN

0794 B0FF 02917          CALR           M=08
0795 9C30 02918          BALG -2        M.G9=0    BRANCH IF PLAY NOT SET
0796 C2C3 C2919          JEPR ANG7MZ
0797 ECFD 02920 TEKSPSD  JEPR TEKS
0798 9701 02921          BALG +1        (M=0)'    BRANCH IF DATA IN KYBD STACK
0799 A3BF 02922          JEPU RETN1

079A B144 C2924          CALG           G4=0
079B B074 C2925          CALG           G7=M
079C A26D 02926          JEPU AJKS+1

               ** ANALYSES CHARACTERS IN PLAY. SKIP OR DUP MODES. BRANCHES ACCORDING TO
               ** WHETHER CHARACTER IS PRINTING OR NON-PRINTING

079D C867 02932 ANCHPSD  JEPR MVRFLUSH
079E CFB1 02933          JEPR ANG7US
079F E52F 02934          JEPR TEG7PCSP
07A0 9707 02935          BALG +7        (M=0)'    BR IF PC OR SPACE
07A1 B04F 02936          CALR           M=04
07A2 92A4 02937          BALG +4        M.GA=0    BRANCH IF LINE UNDERSCORE FLAG NOT SET
07A3 B7FF 02938          CALR           M=7F
07A4 BE72 02939          CALG           M=M.G7
07A5 B074 02940          CALG           G7=M
07A6 E1F3 02941          JEPR CLHE9
07A7 877E 02942          JEPU PRCH

07A9 CF93 02944          JEPR ANAUTUS
07A9 8B76 02945          JEPU ANNPCPSD

               *ANAL  FOR SSK AND SKF AND FMT
               **PROC. EOR OR BMK
               ***HO

07AA 1A72 02952 TESW&SK  BPRT +2        DB7=0     1>
07AB 9882 02953          BDAT +2        M=0B      2>  BR. IF SKF (SKIP OFF CODE)
07AC 98A2 02954          BDAT +2        M=0A      3>  BR. IF SSK (SWITCH & SKIP)
07AD A3BF 02955          JEPU RETN1               1<  BR. TO PUSH STACK UP

07AE 000F 02957          RETN                     2<

07AF E48F 02959          JEPR SW                  3<  BR. TO EXECUTE SWITCH
07B0 9702 02960          BALG +2        (M=0)'    4>  BR. IF ACT. RECORD SWITCHED
07B1 8775 02961          JEPU SWPLAY                  BR. TO SWITCH PLAY

07B2 CEAE 02963          JEPR CLRO                5<  BR..TO CLEAR RO
07B3 CB3A 02964          JEPR FSTNEXT             4<
07B4 900E 02965          BALG -1        M=0       4>  BR. IF SKIP OFF
07B5 990C 02966          BDAT -3        M=10      5>  BR. IF FMT CODE
07B6 CAEF 02967          JEFR XFROBNAC                BR. TO PROC. EOR
07B7 FA02 02968          CALH           M=HO
07B8 1A71 02969          BPRT +1        DB7=0     6>  BR. IF MSB OFF
07B9 99C9 02970          BDAT -6        M=0C      4>  BR. IF BMK
07BA A3BE 02971          JEPU RETN2               6<  PUSH STACK UP

               * TEST RO BUFFER TO SEE IF REVERSE PRINTING SHOULD CONTINUE

07BB 8717 02976          JEPU PAFWD

07BC CEEE 02978 TEHAY    JEPR TEROB1                   FETCH NEXT BLOCK IF REQD
07BD F1C4 02979          CALH           HC=0
07BE C43B 02980          JEPR FESTBHC+
07BF 97DB 02981          BALG -4        (M=0)'    BRANCH IF STD TAB SET
07C0 CDE2 02982          JEPR CLRW
07C1 C72D 02983          JEPR CTROTBS
07C2 CF30 02984 TEROHAY  JEPR FECHRO+
07C3 E7C6 02985          JEPR XFH10G47
07C4 E520 02986          JEPR TEMCR
07C5 9305 02987          BALG +5        M=0       A>   BR IF END OF LINE (CR)
07C6 E5E3 02988          JEPR TEG7HAY
07C7 9001 02989          BALG +1        M=0       B>   BR IF OK TO PRINT CHAR BACKWARDS
07C8 87DA 02990          JEPU HAYWIRE                  LINE CAN'T BE PRINTED REVERSE
07C9 C685 02992          JEPR XFG74RW             B<   STORE CHAR(S) IN RW BUFFER
07CA 87C2 02993          JEPU TEROHAY                  LOOP TO TEST NEXT CODE

07CB C19D 02995          JEPR CALPST              A<   CALCULATE LEFT PRINT START POINT
07CC E71C 02996          JEPR XFG01H45
07CD E287 02997          JEPR FE2PCH
07CE E70B 02998          JEPR DIG1/M
07CF BA12 02999          CALG           M=G1           G1=LEFT PRINT START COLUMN
07D0 D5A1 03000          BALH +1        M=M-HA>0  C>   BR IF CARRIER TO LEFT OF LP START
07D1 8700 03001          JEPU HAYOK               F<   OF TO LEFT PRINT (LP)
```

```
ADDR CODE NUMBR LABEL        CMND NEXTADDR OPERAND            COMMENT

07D2 80C4 03003              CALG          G0=M        C<     C0=CARRIER DISTANCE FROM LP START
07D3 CACA 03004              JEPR CAINDENT                    CALCULATE LEFT EXTREMITY OF LINE
07D4 B014 03005              CALG          G1=M·              G1=LP END
07D5 F4A2 03006              CALH          M=HA               HA=PRESENT CARRIER POSITION
07D6 9511 03007              BALG +1       M=M-G1>0    D<     BR IF CARRIER TO RT OF LP END
07D7 0901 03008              JIFU +1                   E<
07D8 9108 03009              BALG -7       M>G0        D< F>  BR IF CARRIER CLOSER TO LP START
07D9 CF0E 03010              JEPR FECHRO-              E<
07DA C734 03011 HAYWIRE      JEPR AUROLNST                    ADJUST ROB TO START OF LINE
07DB 8717 03012              JEPU PAFWD                       PRINT AUTO FORWARD

        ** ANALYSES ENTRIES FROM THE KB IN PLAY/SKIP/DUP MODES IN ORDER TO
        *  DETECT ACTION KEY OPERATIONS

07DC C29D 03018 ANKBAC       JEPR TEKB
07DD 8074 03019              CALG          G7=M               TRANSFER INPUT CHARACTER TO G7.
07DE C1E2 03020              JEPR SEPC
07DF BA72 03021              CALG          M=G7
07E0 BA43 03022              CALR          M=AA-M
07E1 9307 03023              BALG +7       M=0                BRANCH IF MGC KEY
07E2 B0FF 03024              CALR          M=08
07E3 9294 03025              BALG +4       M.G9=0             BRANCH IF NOT IN PLAY MODE
07E4 B03F 03026              CALR          M=03
07E5 B872 03027              CALG          M=M^.G7
07E6 B1C9 03028              CALR          M=1C-M
07E7 9307 03029              BALG +7       M=0                BRANCH IF ACTION KEY
07E8 000F 03030              RETN

07E9 B20F 03032              CALR          M=20
07EA 9281 03033              BALG +1       M.G8=0             BRANCH IF NOT IN MARGIN CONTROL
07EB 82C6 03034              JEPU SEMC

07EC B02F 03036              CALR          M=08
07ED 9299 03037              BALG -6       M.G9=0             BRANCH IF NOT IN PLAY MODE
07EE 82C6 03038              JEPU SEMC

07EF 8285 03040              JEPU SEACTION

        * TEST FOR MEDIA TRANSLATOR NOT IN, IF REVISE AND PLAY CHECK FOR
        * DUMP OF BUFFER. TEST FOR AN EDIT STOP CONDITION IF NONE
        * BUZZ. IF IN REVISE READ THE NEXT CHARACTER IN THE BUFFER

07F0 E59C 03047 FEDA         JEPR TEXLX
07F1 B10F 03048              CALR          M=10
07F2 9287 03049              BALG +7       M.G8=0             BRANCH IF REVISE NOT ON
07F3 CEEC 03050              JEPR AURO-
07F4 B03F 03051              CALR          M=08
07F5 9291 03052              BALG +1       M.G9=0             BRANCH IF JUSTIFY NOT ON
07F6 8CDC 03053              JEPU TECUMPRV
07F7 B02F 03054              CALR          M=02
07F8 9262 03055              BALG +2       M.G6=0             BRANCH IF NO STOP CONDITIONS MET
07F9 8258 03056              JEPU BZSK
07FA 8B2A 03057              JEPU RDFWD3
07FB E30D 03058              JEPR BZERROR
07FC 8259 03059              JEPU SESKDLY

        * IF AT LEFT MARGIN ALALYZE G7 FOR MARGIN CONTROL AT LEFT MARGIN, IF IN
        * MARGIN ZONE TOGGLE THE SINGLE CYCLE BIT.

07FE CECA 03065              *ADJUST WORD*
07FF 21F5 03065              *CHECK WORD**
0800 CC11 03065 ANMCZONE     JEPR TELM                        MGC ANAL                  CG080
0801 9702 03066              BALG +2       (M=0)'             BRANCH IF NOT AT LEFT MARGIN
0802 BA72 03067              CALG          M=G7
0803 8608 03068              JEPU ANG7MCLM
0804 E28D 03069              JEPR TERM
0805 9214 03070              BALG +4       M.G1=0             BRANCH IF AT RIGHT MARGIN
0806 B02F 03071              CALR          M=02
0807 9256 03072              BALG +6       M.G5=0             BRANCH IF MC SC NOT SET
0808 C42A 03073              JEPR RESC
0809 A18C 03074              JEPU RETN4
080A 0002 03075              RNOP
080B B02F 03076              CALR          M=02
080C 9251 03077              BALG +1       M.G5=0             BRANCH IF MC SC NOT SET
080D 8A1F 03078              JEPU SC
080E 000F 03079              RETN

        * SET RECORD - STOP WRITE AND SET RECORD BIT (5) IN REG. G9

080F 278C 03084 SEREC        CRWM          SWR                STOP WRITE
0810 B28F 03085              CALR          M=28
0811 E359 03086              JEPR DLY MSKB                    SET MS DELAY BRANCH
0812 B20F 03087              CALR          M=20               BIT MASK FOR REC
0813 E78C 03088              JEPR SEG9
0814 CD9E 03089              JEPR ENDRERV
0815 8060 03090              JEPU REKBIDL

        * TEST CHARACTER IN G7 FOR STOP CONDITION FOR PRESENT OPERATING MODE
        * OF SYSTEM (WORD,LINE,PARAGRAPH) IF STOP CHARACTER SET
        * SET EDIT CONTROL STOP MET FLAG
```

```
ADDR CODE NUMBR LABEL    CMND NEXTADDR OPERAND            COMMENT

0816 C00F 03097          RETN
0817 B27F 03098 ANECSTOP CALR            M=07        EC STOPS                        CG010
0818 9200 03099          BALG +1         M.G8=0      BRANCH IF PARA.LINE.WORD NOT SET.
0819 E8E1 03100          JEPR TEG7PC
081A 9[illegible] 03101          BALG +1         M=0         BRANCH IF G7 NOT PRINT CHARACTER
081B 8[illegible] 03102          JEPU ANNPCEC
081C E5[illegible] 03103          JEPR TEG7SP
081D 900D 03104          BALG +1         M=0         BRANCH IF SOME TYPE SPACE CODE
081E B04F 03105          CALR            M=04
081F [illegible] 03106          JEPR SEG5
0820 [illegible] 03107          CALR            M=M.02
0821 [illegible] 03108          BALG +2         (M=0)'      BRANCH IF STOP CONDITION
0822 B0.F 03109 RESPSTOP CALR            M=03        RESET PF STOP                   CG010
0823 A7[illegible]2 03110          JEPU REG5
           * SET EDIT CONTROL STOP IF NOT IN MARGIN CONTROL OR JUSTIFY HELP

0824 B0.F 03113 SEECSTOP CALP            M=02
0825 9[illegible]1 03114          BALG +1         M.G5=0      BRANCH IF NOT MC SC
0826 A292 03115          JEPU REG6                   RESET STOP CONDITION FLAG

0827 E473 03117          JEPR SESTOP
0828 CF0E 03118          JEPR FECHRO-
0829 9071 03119          BALG +1         M-G7=0
082A 8F50 03120          JEPU FECHRO+&
082B A38F 03121          JEPU RETN1

           * ANALYSES CARRIAGE RETURN IN TEXT ZONE OF MARGIN CONTROL MADE
           * REPLACE CR WITH SPACE IF IN TEXT ZONE

082C 0302 03128 ANCRTZMC PMP                         TZ CR                           CG010
082D E1F. 03129          JEPR LKTC
082E CEEE 03130          JEPR TER061
082F B.39 03131          CALR            M=CB-M      TEST FOR PTB
0830 93.8 03132          BALG +8         M=0
0831 E781 03133          JEPR SKSPTBRC
0832 CE5C 03134          JEPR AJRO-
0833 E000 03135          JEPR TEMCRCE
0834 900- 03136          BALG +4         M=0         BR IF ANY CR OR CEN
0835 C93B 03137          JEPR ANNPCEC
0836 B20F 03138          CALR            M=20        SET G7 TO SPACE CODE
0837 B.74 03139          CALG            G7=M
0838 C00F 03140          RETN

0839 A4E0 03142          JEPU RETC

           * FETCH NEXT CHARACTER AND TEST FOR SKIP OFF . FM7. EOR.OR BMK CODE

083A C0EE 03147 F&TNEXT  JEPR BIGMO                  BR  TO BIG MONITOR
083B CF05 03148          JEPR FECH                   BR. TO FETCH CHAR.
083C 8989 03149          CALR            M=8B-M
083D 9701 03150          BALG +1         (M=0)'    4>  BR. IF NOT SKF CODE (SKIP OFF)
083E A38F 03151          JEPU RETN1                    PUSH STACK

083F FA02 03153          CALH            M=H0
0840 1E72 03154 TEFMT/BM BPRT +2         DB7=1
0841 9904 03155          BDAT +4         M=10        BRANCH IF FMT
0842 A724 03156          JEPU CLM

0843 9202 03158          BDAT +2         M=80        BRANCH IF EOR
0844 96C1 03159          BDAT +1         M=BC        BRANCH IF BMK
0845 A724 03160          JEPU CLM

0846 000F 03162          RETN

           *ANAL  & EXEC. BMK / EOR

0847 A724 03167          JEPU CLM

           * ANALYZE CHARACTER IN  G7 FOR BLOCK MARK CODE BC
           * IF TRUE FETCH NEXT CHARACTER FROM  RO BUFFER  AND STORE IN G4
           * CLEAR THE RO BUFFER  THEN CODE PRINT THE BLOCK MARK AND BLOCK NUMBER

0848 BA72 03173 ANBM/EOR CALG            M=G7
0849 89C9 03174          CALR            M=BC-M
084A 9302 03175          BALG +2         M=0         BRANCH IF BLOCK MARK
084B 80C9 03176          CALR            M=0C-M
084C 970A 03177          BALG -5         (M=0)'      BRANCH IF CODE NOT INDEX
084D 3D09 03178          BPRT -6         XLX=1       BRANCH IF LANGUAGE TRANSLATOR IN
084E CED9 03179          JEPP FERO+
084F E2D7 03180          JEPR CVFF00
0850 B044 03181          CALG            G4=M
0851 E85A 03182          JEPR SEENAC
0852 CEAE 03183          JEPR CLRO
0853 2A01 03184 CPBM/EOR BPLM +4         READ=0      BRANCH IF WRITE CURRENT ON
0854 C5AE 03185 CPBCD    JEPR CPG7
0855 E3FC 03186          JEPR G4BIN
```

```
ADDR CODE NUMBR LABEL      CMND NEXTADDR OPERAND                 COMMENT

0856 C5DC 03187            JEPR FR2DIG
0857 C549 03188            JEPR G4BCD
0858 A559 03189            JEPU XFM=G7

                 *ANALYZES DATA FOLLOWING HYPHEN FOR CONVERSION IN MARGIN CONTROL TEXT
                 *ZONE   CR FOLLOWING HYPHEN IS SKIPPED EXCEPT AT END OF PARAGRAPH.

0859 CF06 03196 ANHY       JEPR FECH
085A E516 03197            JEPR TEMCRSCR
085B 9303 03198            BALG +3         M=0          BR IF CHAR FOLLOWING HYP = CR/SCR
085C C002 03199            RNCP
085D FA02 03200 AJRO-/HO   CALH            M=HO
085E 8F01 03201            JEPU AJROBM                  ADJUST BACK BEHIND CHAR IF NOT CR

                 * ANALYSES CHARACTER IN G7 IN MARGIN ZONE MODE OF MARGIN CONTROL. IF
                 * A BREAK POINT CHARACTER IS DELECTED INSERT A CARRIAGE RETURN
                 * IF NOT TEST FOR SETTING OF SINGLE CYCLE MODE.

085F E4D6 03207 ANCRMC     JEPR LKTC
0860 FA02 03208            CALH            M=HO
0861 B074 03209            CALG            G7=M
0862 CEEE 03210            JEPR TEROB1                  TRANSFER CR/SCR TO G7
0863 1E73 03211            BPRT +3         DB7=1    B<  FETCH NEXT CHAR & ADJ BEHIND IT
0864 95B1 03212            BDAT +1         M=0B         BR IF BIT 7. CRS&PTB DONT H
0865 A0D3 03213            JEPU TEMCRCE                 BR IF PTB

0866 A724 03215            JEPU CLM

0867 000F 03217            RETN

                 * ANALYZE THE CODE IN G7 FOR PUNC. CHARACTER. TRANSFER TO STACK IF
                 * TRUE. IF NEXT CODE IS CARRIAGE RETURN REPLACE WITH A SPACE

0868 C993 03223 ANPUNCTZ   JEPR TEG7PUNC                G7 PUNCTUATION TEST
0869 9701 03224            BALG +1         (M=0)'       BRANCH IF PUNCTUATION
086A A38F 03225            JEPU FETN1
086B E261 03226            JEPR XFMKS
086C CF50 03227            JEPR FECHPO+&
086D 9A2D 03228            BDAT -2         M=22         BRANCH IF DOUBLE QUOTATION MARKS
086E E47A 03229            JEPR SKSFTBAJ
086F E520 03230            JEPR TEMCR
0870 9702 03231            BALG +2         (M=0)'       BRANCH IF NOT A CR
0871 B20F 03232            CALR            M=20         PUT A SPACE IN STACK
0872 E261 03233            JEPR XFMKS
0873 8F00 03234            JEPU AJROBG7

                 ** MONITORS STATUS OF PLAY/DUP. MAINTAINS LOOPING VIA ANCHPSD AND
                 ** RCHINTB SUBROUTINES WHILST PLAY/DUP SET. BRANCHES WHEN PLAY DUP
                 ** RESET TO MONITOR AUTO STATUS AND. IF AUTO ON. LOOKS FOR NRS CHAR.

0874 E27E 03242 ANMDPSD    JEPR CLKS
0875 820F 03243            CALR            M=20
0876 9281 03244            BALG +1         M.G8=0       BRANCH IF MGC OFF
0877 C791 03245            JEPR LDASPSD
0878 C617 03246            JEPR ANECSTOP
0879 C79D 03247            JEPR ANCHPSD
087A 809F 03248            CALR            M=09
087B 9293 03249            BALG +3         M.G9=0       BRANCH IF NOT IN PLAY OR DUP
087C C5C0 03250            JEPR RCCHINTB
087D C797 03251            JEPR TEKSPSD
087E C809 03252            JIPU -6
087F E487 03253            JEPR SEDUMPRV
0880 808F 03254            CALR            M=C8
0881 9282 03255            BALG +2         M.G8=0       BRANCH IF AUTO OFF
0882 B8EF 03256            CALR            M=8E
0883 9071 03257            BALG +1         M-G7=0       BRANCH IF NRS CHAR
0884 000F 03258            RETN

0885 A473 03260            JEPU SESTOP

                 *CALCULATES BEGINNING POSITION OF RIGHT FLUSH COLUMN & MOVES THERE IF REQ.
                 ***GO

0886 000F 03266            RETN

0887 200E 03268 MVRFLUSH   BPRT -1         XLX=1        BRANCH IF LANG XL IS IN
0888 BA52 03269            CALG            M=G5
0889 1A03 03270            BPRT +3         DB0=0        BRANCH IF COL CEN FLAG NOT SET
088A E 04 03271            JEPR TECOL
088B 1A1A 03272            BPRT -5         DB1=0
088C B745 03273            JEPU MVCRCOLU

088D E700 03275            JEPR TERF
088E 1A17 03276            BPRT -8         DB1=0        BRANCH IF RT FLUSH FLAG NOT SET
088F E21E 03277            JEPR CLN4-H7                 B<
```

```
ADDR CODE NUMBR LABEL     CMND NEXTADDR OPERAND              COMMENT

0890 CF1F 03278           JEPR FECHRO-
0891 CF20 03279           JEPR FECHRO+              C<
0892 E?3? 03280           JEPR TEMCOLDA
0893 9707 03281           BALG +7      (M=0)'       C>   BR IF NOT COLUMAR DATA
0894 E7?B 03282           JEPR INC H6                    COUNT CHAR TO BE FLUSHED
0895 BA52 03283           CALG         M=G3
0896 CFAD 03284           JEPR CAMCSCEN
0897 E?24 03285           JEPR ADCSH54                   ACCUMULATE WIDTH OF DATA
0898 9?0? 03286           JIPU -7                   D>
0899 CF1E 03287           JEPR FECHRO-              E<   REALIGN RO BUFFER
089A E76D 03288           JEPR DEC H6
089B FA62 03289           CALH         M=H6         C<
089C 97?? 03290           BALG -3      (M=0)'       E>   BR IF RO NOT YET REALIGNED
089D E715 03291           JEPR XFH45H01
089E E70? 03292           JEPR XFH01G01                  TOTAL WIDTH TO G10
089F 8B02 03293           CALG         M=M+G0
08A0 9701 03294           BALG +1      (M=0)'       F>   BR IF TOTAL WIDTH NOT ZERO
08A1 000F 03295           RETN

08A2 C51B 03297           JEPR ADDEFG10
08A3 C523 03298           JEPR SUDEG10
08A4 E72A 03299           JEPR NEG G10              F<   NEGATIVE OF G10 TO G10
08A5 C43A 03300           JEPR FESTBCA+                  FETCH END OF COLUMN.
08A6 B000 03301           CALG         M=M-1
08A7 B024 03302           CALG         G2=M
08A8 E287 03303           JEPR FE2PCH
08A9 E1D8 03304           JEPR XMG2+G10                  G10 IS POSITION OF START COL PRINT
08AA E71C 03305           JEPR XFG01H45
08AB 1E75 03306           BPRT -A      DB7=1
08AC C?7D 03307           JEPR XFCAG10
08AD E715 03308           JEPR XFH45H01
08AE E71C 03309           JEPR XFG01H45
08AF E70C 03310           JEPR XFH01G01                  G10 IS AGAIN POS OF START COL PRINT
08B0 E715 03311           JEPR XFH45H01                  H10 IS PRESENT CARRIER POSITION
08B1 E721 03312           JEPR COG10H10                  COMPARE G10 WITH H10
08B2 930? 03313           BALG +1      M=0          G>   BR IF G10 IS LESS THAN H10
08B3 B363 03314           JEPU MVCRG10                   MOVE TO G10

08B4 000F 03316           RETN

                 * INSERTS G7 INTO RW AND INC. ADDR. OF POINTER
                 * ANAL 2ND CH AND INSERTS CH. IN RW CONVERTING 00 TO FF

08B5 E767 03322 XFG74RW   JEPR DEC H2                    DEC. # CH. REMAIN IN BUFFER
08B6 BA72 03323           CALG         M=G7
08B7 CD5F 03324           JEPR INRW+                     INS. CH. AND INC. ADDR
08B8 E4?B 03325           JEPR TEM2CH                    TEST M FOR 2ND CH.
08B9 9703 03326           BALG +3      (M=0)'       1>   IF NO 2ND CH. BR
08BA E767 03327           JEPR DEC H2                    DEC. # CH. REMAIN. IN BUFFER
08BB BA42 03328           CALG         M=G4              2ND CH TO M
08BC 8EC2 03329           JEPU INDATRW+                  INSERT CH. SUBS. FF FOR 00

08BD 000F 03331           RETN                      1>

                 * RECORDS RW BUFFER ONTO MEDIA IF ERROR ATTEMPTS
                 * THREE REWRITES.

08BE 2?00 03338 RCRWB     CRWM         NWF               NORMAL WRITE FORWARD
08BF CE?D 03339           JEPR ANRWBCEN
08C0 B03F 03340           CALR         M=03              NO. OF REWRITES
08C1 B004 03341           CALG         G0=M
08C2 8B97 03342           JEPU RCRWB1                    CONTINUE

                 * ANALYSES CHARACTER IN G7 FOR CARRIAGE RETURN ON SPECIAL CARRIAGE
                 * RETURN, IF FOUND SET BOTH EC STOP CONDITION MET AND POTENTIAL
                 * PARAGRAPH STOP IN G6

08C3 E51F 03350 ANG7PAEC  JEPR TEG7CR
08C4 9706 03351           BALG +6      (M=0)'            BRANCH IF G7 NOT CR.
08C5 E51A 03352           JEPR TEG7CRSC
08C6 9702 03353           BALG +2      (M=0)'            BRANCH IF G7 NOT CR OR SCR
08C7 B08F 03354           CALR         M=08
08C8 92E1 03355           BALG +1      M.G6=0            BRANCH IF POT PARA STOP FLAG NOT SET
08C9 B0AF 03356           CALR         M=0A
08CA A790 03357           JEPU SEG6                      SET POT PARA STOP AND STOP COND FLAGS

08CB B0B9 03359           CALR         M=0B-M
08CC 9302 03360           BALG +2      M=0               BRANCH IF PRECEDENTED TAB
08CD C822 03361           JEPR REFPSTOP
08CE BFAF 03362           CALR         M=FA
08CF B08A 03363           CALR         M=M+08
08D0 92E1 03364           BALG +1      M.G6=0            BRANCH IF POT. PARA STOP FLAG NOT SET
08D1 8824 03365           JEPU SEECSTOP
08D2 000F 03366           RETN
                 * ANNALYZE G7 CHARACTER MARGIN CONTROL AT LEFT MARGIN

08D3 B01F 03371           CALR         M=01
08D4 BE62 03372           CALG         M=M.G6
08D5 9706 03373           BALG +6      (M=0)'            BRANCH IF TAB COUNTER OPEN
08D6 CF06 03374           JEPR FECH
08D7 E705 03375           JEPR XFH10G47
08D8 9A0A 03376 ANG7MCLM  BDAT -5      M=20              BRANCH IF SPACE
08D9 E520 03377           JEPR TEMCR
08DA 9301 03378           BALG +1      M=0               BRANCH IF CARRIAGE RETURN
```

```
ADDR CODE NUMBR LABEL     CMND NEXTADDR OPERAND          COMMENT

08DB 000F 03379           RETN
08DC A390 03380           JEPU RETN3

          *  RECORD PREABLE - PREAMBLE CONSISTS OF 2 CHARACTES (HEX FF)

08DD 2240 03385 RCPREAM   CRWM          RMED        RESET MEDIA
08DE 8FFF 03386           CALR          M=FF
08DF 2E2F 03387           BRWM -0       WDB=1       1><BR. IF WRITE DATA BUSY
08E0 2220 03388           CRWM          WR=M          M TO WRITE REG.
08E1 2E2F 03389           BRWM -0       WDB=1       2><BR. IF WRITE DATA BUSY
08E2 2220 03390           CRWM          WR=M          M TO WRITE REG.
08E3 B04F 03391           CALR          M=04          SET DLY TO 8MS. VIA M.
08E4 0003 03392           CP3D          2MDLY         SET 2MS. DLY
08E5 C8A1 03393           BRRD +1       NM=0          BR. IF 2MS DLY NOT EXP.
08E6 2A1E 03394           BRWM -1       RDR=0       BRANCH IF READ DATA NOT READY
08E7 E87F 03395 RCRVON    JEPR TEDACLRW
08E8 970E 03396           BALG -1       (M=0)'      BRANCH IF DATA
08E9 000F 03397           RETN

          *RECORDS CHAR. IN H1 IF WRITE DATA IS NOT BUSY. IF WRITE DATA IS BUSY
          **RLRC IS CHECKED ALONG WITH STOP KEY.

08EA CAF7 03403           JEPR CKRLRC               1< CHECK RLRC
08EB E1C6 03404           JEPR MOKB                   TEST KEYBD. ENTRY
08EC 2E2D 03405 RC H1     BRWM -2       WDB=1       1> BR. IF WRITE DATA BUSY
08ED FA12 03406           CALH          M=H1          CHAR. TO BE WRITTEN
08EE 2220 03407           CRWM          WR=M          WRITE CHAR TO TAPE
08EF 000F 03408           RETN

          * TEST CHARACTER ON M FOR BREAKPOINT IN MARGIN ZONE

08F0 9AD9 03413 TEMMZBP   BDAT +9       M=2D        BR IF HYPHEN
08F1 9948 03414           BDAT +8       M=1A        BRANCH IF TAB
08F2 9407 03415           BDAT +7       M=20        BRANCH IF SPACE
08F3 1E75 03416           BPRT +5       DB7=1       BRANCH IF NOT POTENTIAL BK PT CHAR
08F4 801E 03417           CALR          M=M^01
08F5 9334 03418           BDAT +4       M=13        BR. IF FLF.CEN
08F6 9873 03419           BDAT +3       M=07        BR. IF PSCR.CR
08F7 9892 03420           BDAT +2       M=09        BR. IF PCR.SCR
08F8 9881 03421           BDAT +1       M=0B        BR. IF TAB.PTB
08F9 000F 03422           RETN
08FA A724 03423           JEPU CLM

          *STORES H1 - CHAR. REG., UPDATES WLRC AND STORES WLRC IN G3 BR. TO INC.
          **CHAR. COUNT.
          **G1.G3. H1

08FB F014 03430 XFH1WLRC  CALH          H1=M        STORE CHAR
08FC 8932 03431 WLRC&CNT  CALG          M=M^G3      UPDAE  WLRC
08FD 8034 03432           CALG          G3=M        STORE  WLRC
08FE A74E 03433           JEPU INC G1

          ** ANALYSES G7 FOR PRINTER FUNCTION CODES IN PLAY & JUSTIFY. BRANCHES TO
          ** EXECUTE PRINTER COMMANDS.
          *** USES GP REG G0

08FF 7F88 03440            *CHECK WORD*
0900 E520 03440 ANG7PFPJ  JEPR TEMCR
0901 9707 03441           BALG +7       (M=0)'      BRANCH IF CHAR NOT CR
0902 852E 03442           JEPU CRAC

0903 8470 03444           JEPU TB

0904 8353 03446           JEPU IX

0905 82A5 03448           JEPU UBS

0906 8411 03450           JEPU BS

0907 8759 03452           JEPU SECOL

0908 8336 03454           JEPU RIX

0909 98A9 03456           BDAT -6       M=0A        BRANCH IF TAB
090A 9893 03457           BDAT -7       M=0B        BRANCH IF BTB
090B 98C8 03458           BDAT -7       M=0C        BRANCH IF INX
090C 98D8 03459           BDAT -4       M=0D        BRANCH IF RIX
090D 98E7 03460           BDAT -8       M=0E        BRANCH IF UBS
090E 98F7 03461           BDAT -8       M=0F        BRANCH IF PBS
090F 9917 03462           BDAT -8       M=11        BRANCH IF COL
0910 9932 03463           BDAT +2       M=13        BRANCH IF CEN
0911 9923 03464           BDAT +3       M=12        BRANCH IF FLF
0912 A39F 03465           JEPU RETN1
0913 8FA7 03467           JEPU MVCRCEN

0914 000F 03469           RETN

0915 C540 03471           JEPR CPFL
0916 E5A5 03472           JEPR TERVRC
0917 970C 03473           BALG -3       (M=0)'      BRANCH IF IN REV OR RECORD
0918 E3P4 03474           JEPR FLFLCTR
0919 8014 03475           CALG          G0=M
091A E2B4 03476           JEPR FEFLPPC
091B 9302 03477           BALG -7       M=0         BRANCH IF NO NUMBER SET
```

```
ADDR CODE NUMBR LABEL      CMND NEXTADDR OPERAND              COMMENT

091C B  .1 03478           CALG           M=M-G0
091D C25  03479            JEPR MV+V        .       EXECUTE VERTICAL MOTION
091E B30F 03480            CALR           M=00
091F A392 03481            JEPU SELCCTR             CLEAR LINE COUNTER

0920 E261 03484            JEPR XFMKS
0921 E481 03485            JEPR SKSPTBRO
0922 E5 0 03486            JEPR TFMCR
0923 9701 03487            BALG +1         (M=0)'
0924 BE5C 03488            JEPU AURO-
0925 CE5C 03489            JEPR AURO-
                * LOAD A CARRIAGE RETURN ONTO KEYBOARD STACK

0926 807F 03492 LOCRKS     CALR           M=07      CR TO STACK
0927 A261 03493            JEPU XFMKS

                * ANALYSES CHARACTER IN G7 FOR MARGIN ZONE MODE OF MARGIN CONTROL
                * PERFORMS CONVERSION IF NECESSARY.

0928 C955 03498 ANG7MZ     JEPR ANG7MCTZ            MZ RETN                CG040
0929 8A72 03499            CALG           M=G7
092A 9AD5 03500            BDAT -A        M=20
092B 99A4 03501            BDAT -B        M=1A      BRANCH IF PHY
092C 80B9 03502            CALR           M=0B-M    TEST FOR PTB
092D 9C07 03503            BALG -B        M=0       BRANCH IF PRECEDENTED TAB
092E E5C0 03504            JEPR TEG7SPTB
092F 9201 03505            BALG -E        M=0       BRANCH IF SPECIAL TAB
0930 E51F 03506            JEPR TEG7CR
0931 9705 03507            BALG +5        (M=0)'    BRANCH IF NOT CARRIAGE RETURN
0932 C773 03508            JEPR XFG7STK
0933 C85F 03509            JEPR ANCRMC
0934 9701 03510            BALG +1        (M=0)'    BRANCH IF PRECEDENTED TAB IN MC ZONE
0935 A4E0 03511            JEPU RETC

0936 000F 03513            RETN

0937 0002 03515            RNOP
0938 8104 03516            CALG           G0=0
0939 896F 03517            JEPU ANCHMZC
093A 000F 03520            RETN

                * ANALYSES CHARACTER IN G7 FOR STOP CHARACTRER IN WORD LINE.
                * OR PARAGRAPH MODE. IF FOUND SET EC STOP CONDITION MET FLAG

093B BA72 03525 ANNPCEC    CALG           M=G7
093C 1A72 03526            BPRT +2        D37=0
093D 980C 03527            BDAT -3        M=80      BR. IF EOR
093E 96CB 03528            BDAT -4        M=8C      BR. IF BMK
093F C000 03529            NOOP
0940 B01F 03530            CALR           M=01
0941 9287 03531            BALG +7        M.G8=0    BRANCH IF WORD NOT SET
0942 9262 03532            BALG +2        M.GC=0    BRANCH IF TAB COUNTER NOT OPEN
0943 B0AF 03533            CALR           M=0A
0944 907A 03534            BALG +A        M-G7=0    BRANCH IF TAB
0945 604F 03535            CALR           M=04
0946 9266 03536            BALG +6        M.G6=0    BRANCH IF FIRST PRINT CHAR FLAG NOT SET
0947 B02F 03537 SEPCSTOP   CALR           M=02      SET PC STOP            CG020
0948 A790 03538            JEPU SEG6
0949 802F 03539            CALR           M=02
094A 92d3 03540            BALG +3        M.G8=0    BRANCH IF LINE NOT SET
094B E51F 03541            JEPR TEG7CR
094C 930A 03542            BALG -5        M=0       BRANCH IF G7 CR
094D 000F 03543            RETN

094E 89C3 03545            JEPU ANG7PAEC
094F B02F 03546            CALR           M=02
0950 9261 03547            BALG +1        M.G6=0    BRANCH IF TAB COUNTER NOT OPEN
0951 E824 03548            JEPU SEECSTOP
0952 8947 03549            JEPU SEPCSTOP

                ** ANALYSES G7 FOR MEDIA CONTROL CODES AND PRINTER LINE SPACE CODES
                ** IN PLAY AND JUSTIFY.

0953 840F 03555            CALR           M=40      SET GB B6. RETURN AND
0954 E7BA 03556            JEPR SEGB
0955 B80F 03557            CALR           M=80      RESET GB B7  (LS1 SET)
0956 A7BC 03558            JEPU REGB

0957 8C0F 03560            CALR           M=C0      RESET GB B6 & B7  (LSX SET)
0958 A7BC 03561            JEPU REGB

0959 680F 03563            CALR           M=80      SET GB B7. RETURN AND
095A E7BA 03564            JEPR SEGB
095B B4CF 03565            CALR           M=40      RESET GB B6  (LS2 SET)
095C A76C 03566            JEPU REGB

095D 9815 03568 ANG7CCPJ   BDAT -A        M=01      BRANCH IF CHAR IS LS1
095E 9828 03569            BDAT -7        M=02      BRANCH IF CHAR IS LSX
095F 9839 03570            BDAT -6        M=03      BRANCH IF CHAR IS LS2
0960 9887 03571            BDAT +7        M=08      BRANCH IF CHAR IS SWR
0961 9097 03572            BDAT +7        M=09      BRANCH IF CHAR IS SWS
0962 9876 03573            BDAT +6        M=B7      BRANCH IF CHAR IS SCH
0963 9806 03574            BDAT +6        M=0D      BRANCH IF CHAR IS HLT
0964 98E6 03575            BDAT +6        M=0E      BRANCH IF CHAR IS NRS
0965 99F1 03576            BDAT +1        M=0F      BRANCH IF CHAR IS TRL
0966 87AA 03577            JEPU TESW&SK                  BR. TO TEST SWITCH & SKIP
```

```
ADDR CODE NUMBER LABEL    CMND NEXTADDR OPERAND              COMMENT

0967 C0CF 03579           RETN

0968 8773 03581           JEPU SWPLAY

0969 8C8C 03583           JEPU EXSC/SWS

096A A473 03585           JEPU SESTOP

096B E5A8 03587           JEPR TERV
096C 970D 03588           BALG -2          (M=0)'     BRANCH IF REVISE ON
096D C5AB 03589           JEPR CPNRC
096E A3BE 03590           JEPU RETN2


              * ANALYZE A CHARACTER IN THE MARGIN ZONE FOR A BREAKPOINT CHARACTER
              * IF NOT BREAKPOINT RETURN IF STOP SET IF NOT DO OPERATION TO SEE IF
              * CARRIAGE IS IN RIGHT MARGIN RANGE USE GO.G1.

096F C3F0 03597 ANCHMZC   JEPR TERMZBP                CONT MZ                   CG050
0970 9701 03598           BALG +1          (M=0)'     BRANCH IF NOT BREKPOINT CHARACTER
0971 6925 03599           JEPU LDCRKS
0972 E4   03600           JEPR EVSTOP
0973 9201 03601           BALG +1          M=0        BRANCH IF STOP NOT SET
0974 C0CF 03602           RETN
0975 80FF 03603           CALR             M=0F
0976 BEF2 03604           CALG             M=M.GF
0977 8C14 03605           CALG             G1=M
0978 8A02 03606           CALG             M=G0
0979 9114 03607           BALG +4          M>G1
097A CF50 03608           JEPR FECHRC+6
097B C3F0 03609           JEPR TERMZBP
097C 9703 03610           BALG -7          (M=0)'     BRANCH IF PRECEDENTED TAB IN MC ZONE
097D 9F1  03611           JEPU AJROGO-
097E CF1  03612           JEPR AJROGO-
097F CF00 03613           JEPR AJROBG7
0980 802F 03614           CALR             M=02
0981 E73  03615           JEPR SEGS
0982 A3BE 03616           JEPU RETN2                  SET MARGIN CONTROL SINGLE CYCLE


              *TEST CODE IN G7 FOR PUNC. CHARACTEP IF TRUE
              * RETURN WITH M NOT EQUAL TO ZERO.

0983 8A72 03622 TEG7PUNC  CALG             M=G7       G7 PUNCT TEST             CG130
0984 9A16 03623           BDAT +6          M=21       BRANCH IF EXCLAMATION MARK
0985 92A5 03624           BDAT +5          M=3A       BRANCH ON COLON
0986 98E4 03625           BDAT +4          M=3E       BRANCH UPPER CASE PERIOD
0987 98F3 03626           BDAT +3          M=3F       BRANCH ON DIAGONAL
0988 99E2 03627           BDAT +2          M=1E       BRANCH IF EXPANDED COMMA
0989 9AE1 03628           BDAT +1          M=2E       BRANCH IF PFRIOD
098A A724 03629           JEPU CLM
098B C0CF 03630           RETN


              **RECORDS BUFFER. CARRIER POS.. WRLC
              **TEST FOR SMK AND EOR AND IF TRUE WRITES GO. TEST IF IN REVISE
              ***G1.G2.G3.H1.

098C 8114 03638 WRDATA    CALG             G1=0       RESET COUNT
098D 8124 03639           CALG             G2=0       RESET RLRC
098E 8134 03640           CALG             G3=0       RESET WLRC
098F 2240 03641           CRAM             RMED       RESET MEDIA
0990 CC1E 03642           JEPR RCBUF                  BR. TO RECORD BUFFER
0991 8A72 03643           CALG             M=G7       CHAR. REG
0992 1A72 03644           EPPT +2          DB7=0
0993 93C5 03645           BDAT +5          M=8C       BR. IF SMK
0994 9804 03646           BDAT +4          M=80       BR. IF EOR
0995 810F 03647           CALR             M=10       REVISE MASK
0996 8562 03648           CALG             M=M.G8
0997 9701 03649           BALG +1          (M=0)'     BR. IF REVISE
0998 C9F0 03650           JEPR RCFILL                 BR. TO REC. FILL CHAR.
0999 F114 03651           CALH             H1=0       END OF DATA CODE
099A C8EC 03652           JEPR RC H1                  BR. TO RECORD H1
099B FA32 03653           CALH             M=H3       CARRIER POS. FOR EMPTY RWB
099C F014 03654           CALH             H1=M
099D 8932 03655           CALG             M=M-G3     CREATE NEW WLRC
099E 8034 03656           CALG             G3=M       STORE NEW WLRC
099F C5EC 03657           JEPR RC H1                  BR. TO REC. H1
09A0 8A02 03658           CALG             M=G3       WLRC
09A1 F014 03659           CALH             H1=M
09A2 68EC 03660           JEPU RC H1                  RECORD H1 (WLRC)


              *ERASE-IF IN REVISE CK:EOT.WINH.CIN-START WRITE AND TURN RECORD ON
              ****    IF NOT IN REVISE FETCH FROM RW AND TEST FOR NULL
              **                        IF CHAR. EQ. 0 CLEAR RO AND TURN RECORD ON
              **                        IF CHAR NEQ. 0 TURN ON BZR AND GO ICLE3

09A3 810F 03668 ERASE     CALR             M=10          BIT MASK FOR REVISE
09A4 9208 03669           BALG +8          M.G8=0     1> BR IF NOT REV
09A5 CDBB 03670           JEPR FERW                      FETCH CHAR FROM RW
09A6 9301 03671           BALG +1          M=0        2>3BRANCH IF CHAR EQ. NULL
09A7 8A44 03672           JEPU BZERI3
09A8 C5AE 03673           JEPR CPG7                      BR. CODE. PRINT G7
09A9 CEAE 03674           JEPR CLRO                   2< BR. CLEAR RO
09AA 27EC 03675           CACU             NRR
09AB E719 03676           JEPR SKPACSTP
09AC 88CF 03677           JEPU SEREC                     BR. SET RECORD
```

```
ADDR CODE NUMBR LABEL      CMND NEXTADDR OPERAND            COMMENT

09AD 2A59 03679            BRWM -6        EOT=0
09AE 2E48 03680            BRWM -7        WINH=1
09AF 2A57 03681            BRAM -6        CIN=0
09B0 CEAE 03682            JEPR CPG7                    BR. CODE PRINT G7
09B1 2AD1 03683            BRWM +1        ACT=0
09B2 CEAE 03684            JEPR CLRO
09B3 2?90 03685 NEWTAPE    CRWM           NWF           NORMAL WRITE FORWARD
09B4 E7E3 03686            JEPR CLREOTRW
09B5 B03F 03687            CALR           M=02          SET M FOR 1 SEC.
09B6 C013 03688            CK3D           HSDLY         SET 1/2 SEC. DLY.
09B7 E2C5 03689            JEPR WAITHS
09B8 880F 03690            JEPU SEREC

09B9 E261 03693            JEPR XFMKS                   TRANSFER M TO KEYBOARD STACK
09BA 876F 03694            JEPU ANHYTZMC

09BB C900 03696 ANG7MCTZ JEPR ANMCZONE                  ---TEXT ZONE START--- ANALYZE MC ZONE
09BC 0002 03697            RNOP
09BD BA72 03698            CALG           M=G7
09BE 99AA 03699            BDAT -5        M=1A          BR IF PHY
09BF 9ADA 03700            BDAT -5        M=2D          BR IF HYPHEN
09C0 E51B 03701            JEPR TEMCRSCR
09C1 97C1 03702            BALG +1        (M=0)'        BRANCH IF NOT A CR CODE 07 OR SCR 09
09C2 882C 03703            JEPU ANCRTZMC                CR IN TEXT ZONE ANALYSIS
09C3 BA72 03704            CALG           M=G7
09C4 1E73 03705            BPRT +3        DB7=1
09C5 9865 03706            BDAT +5        M=06          BRANCH IF PSCR
09C6 9E64 03707            BDAT +4        M=08          BRANCH IF PCR
09C7 93A1 03708            BDAT +1        M=0A          BRANCH IF TAB
09C8 8866 03709            JEPU ANPUNCTZ                TEXT ZONE PUNCT. TEST
09C9 801F 03710            CALR           M=01
09CA 9261 03711            BALG +1        M.G6=0        BRANCH IF TAB COUNTER CLOSED
09CB A38F 03712            JEPU RETN1
09CC A38E 03713            JEPU RETN2

                 *CHECKS IF BLM.# GREATER THAN BCD 98 - IF TRUE BR. TO BUZZER IDLE3
                 **IF FALSE PUT SCH. CODE IN G7 AND CONVERT BMK TO BIN. AND ADD 1.
                 ***GO

09CD E380 03720 RECBMK     JEPR FEBNRW
09CE B004 03721            CALG           G0=M           BNO STORED IN GO
09CF 898F 03722            CALR           M=98
09D0 9101 03723            BALG +1        M>G0          1> BR. IF BNO N. GREAT. THAN 2 DIG. CAP.
09D1 8A44 03724            JEPU BZERI3

09D2 B0CF 03726            CALR           M=OC           1< DIFF. BET. BMK AND EOR
09D3 C074 03727            CALG           G7=M
09D4 BA02 03728            CALG           M=G0           BNO TO M
09D5 E563 03729            JEPR CVMBCDBI                 CONV. BNO FROM BCD TO BINARY
09D6 8F01 03730            CALG           M=M+1          INC. BNO.
09D7 8A05 03731            JEPU CALBIBCD

                 *CALCULATES OVERHEAD AS A FUNCTION OF THE CHAR. COUNT
                 ***G1.H1

09D8 BA12 03737 CALCRCOH CALG             M=G1           COUNT
09D9 BFCD 03738            CALR           M=M.FC
09DA E?AC 03739            JEPR RML6
09DB B0?? 03740            CALG           G1=M
09DC 8F6D 03741            CALR           M=M.F8
09DD E?8D 03742            JEPR RML5
09DE B009 03743            CALR           M=00-M
09DF B910 03744            CALG           M=M+G1
09E0 8014 03745            CALG           G1=M           OH CALCULATED
09E1 F114 03746            CALH           H1=0
09E2 C8?2 03747            J1PU +2                      1><
09E3 C0EC 03748            JEPR RC H1                     RECORD H1
09E4 E751 03749            JEPR DEC G1                    DECR. G1 - CHAR. COUNT
09E5 970D 03750            BALG -2        (M=0)'        1<>
09E6 814F 03751            CALR           M=14
09E7 C003 03752            CK3D           2MDLY           SET 2MS DLY.
09E8 0CA1 03753            BKBD +1        NM=1          2> MS DELAY NOT EXP.
09E9 8A7C 03754            JEPU LKRCER                  3< RECORD ERROR

09EA E8C0 03756            JEPR TEDATRW
09EB 930C 03757            BALG -3        M=0           BRANCH IF DATA IN RW BUFFER
09EC CAF7 03758            JEPR CKRLRC
09ED E8B0 03759            JEPR TEDATRW
09EE 970D 03760            BALG -2        (M=0)'        BRANCH IF NO DATA IN RW BUFFER
09EF 000F 03761            RETN

                 *CHECKS IF BUFFER FULL. IF NOT FILL BUFFER WITH AT MOST 50 FILL CHARACTERS
                 ***G1.H1

09F0 B512 03767 RCFILL     CALG           M=G1'          NO. OF BUFFER POS. NOT FILLED
09F1 F014 03768            CALH           H1=M           STORE G1' IN H1 THE WRITE REG.
09F2 9?0B 03769            BALG +6        M=0          1> BR. IF BUFFER FULL
09F3 B32F 03770            CALR           M=32           DEC. 50 TO M - MAX. NO. OF FILL CHAR.
09F4 D111 03771            BALH +1        M>H1         2> BR. IF DEC. 50 GREATER THAN # OF POS.
09F5 F014 03772            CALH           H1=M           MAX. #OF FILL CHAR. TO H1
09F6 CAF7 03773            JEPR CKRLRC                  2< BR. TO CK. RLRC
09F7 E1C0 03774            JEPR WOKB                      BR. TO KB. TEST AND ENTRY - STOP KEY
09F8 2E20 03775            BFBW -2        WDB=1        2> BR. IF WRITE DATA IS BUSY
09F9 BFFF 03776            CALR           M=FF           FILL CHAR. TO M
```

```
ADDR CODE NUMBER LABEL     CMND NEXTADDR OPERAND           COMMENT

09FA 2220 03777             CRWM          WR=M              WRITE FILL CHAR.
09FB C6FC 03778             JEPR WLRC4CNT
09FC E7C1 03779             JEPR DEC H1                     DEC. H1 - THE # OF FILL CHAR. NEEDED
09FD 9708 03780             BALG -7       (M=0)'         2> BR. IF #OF FILL CHAR. NEEDED EQ. ZE
09FE 000F 03781             RETN

                 *MASK TO SET REC. AND RECD. FLASH IN G9.
                 **STORES BMK OR EOR IN G7.RSETS RW REWIND IN C5. PRINTS BNO.
                 **CKS SERVO AND TAPE NOT UP TO SPEED

09FF 0038 03786             *CHECK WORD*
0A00 B30F 03788 RECEOR      CALR          M=30              RECORD AND RECORD FLASH MASK
0A01 E780 03789             JEPR SEG9
0A02 B174 03790             CALG          G7=0              DIFF. BET. EOR AND EOR
0A03 E330 03791             JEPR FEENRW                     FETCH RW BLOCK NO.
0A04 E 80 03792             JEPR CVMBCDBI                   CONVERT BNO. BCD TO BINARY
0A05 E776 03793 CALBIBCD    JEPR CVMBIBCD                   CONVERT BNO. BINARY TO BCD
0A06 B044 03794             CALG          G4=M              STORE BCD BNO IN G4
0A07 E5C1 03795             JEPR SEBNRW                     STORE RW BNO IN MEM. 242
0A08 C0D6 03796             JEPR FERW
0A09 9301 03797             BALG +1       M=0            1> TEST BUFFER FOR END
0A0A C8BE 03798             JEPR RCRWB                      BR  TO RECORD RW BUFFER
0A0B B80F 03799             CALR          M=80           1< EOR CODE
0A0C B970 03800             CALG          M=M+G7            IF EOR G7=0.IF BMK G7 EQ. OC
0A0D B074 03801             CALG          G7=M              STORE BMK. OR EOR
0A0E CDBF 03802             JEPR INRW+                      INSERT G7
0A0F E3B0 03803             JEPR FEBNRW
0A10 CE02 03804             JEPR INDATRW+
0A11 B4CF 03805             CALR          M=40              MASK RW REWIND
0A12 E780 03806             JEPR REG5                       RESET RW REWIND IN G5
0A13 C654 03807             JEPR CPBCD
0A14 210C 03808             CRWM          NWF               NORMAL WRITE FORWARD
0A15 2EA1 03809             BRWM +1       SOK=1          2><BR. IF SERVO IS OK
0A16 8CC3 03810             JEPU RWSNOK                     BR. RW SERVO NOT OK

0A17 2EED 03812             BRWM -2       TNS=1          2<>BR. IF TAPE NOT UP TO SPEED
0A18 BA0F 03813             CALR          M=A0              20 MS DELAY
0A19 E360 03814             JEPR DLY MSKB                   BR. SET MS DLY
0A1A C8BE 03815             JEPR RCRWB                      BR. TO RECORD RW BUFFER
0A1B B80F 03816             CALR          M=80
0A1C 9071 03817             BALG +1       M-G7=0         3> BR. IF CHAR. EQ. EOR
0A1D 000F 03818             RETN

0A1E 8A8E 03820             JEPU ENDEORRC                   BR. TO TERMINATE REC. OF.EOR

                 * EXECUTE SINGLE CYCLE: TEST G7 FOR CR, HY. OR PHY. IF TRUE
                 * RESET SINGLE CYCLE. IF CONTROL CHARACTER DB7=1 BUZZ. IF ANY OTHER
                 * PRINTING CHARACTER TEST FOR ACTIVE MODE & RESET SINGLE CYCLE.

0A1F E51F 03827 SC          JEPR TEG7CR                     EXEC S. CY                CG100
0A20 9303 03828             BALG +9       M=0               BRANCH IF G7 IS CR
0A21 BA72 03829             CALG          M=G7
0A22 1E76 03830             BPRT +6       DB7=1             BRANCH ON INVALID CHARACTER
0A23 9AD6 03831             BDAT +6       M=2D              BRANCH ON SINGLE QUOTE MARK
0A24 99A5 03832             BDAT +5       M=1A              BRANCH IF PHY
0A25 BFCF 03833             CALR          M=FC
0A26 BE72 03834             CALG          M=M.G7
0A27 B1C0 03835             CALR          M=1C-M            TEST FOR WRD LIN PAR AUT
0A28 9303 03836             BALG +3       M=0               BRANCH IF WORD.LINE.PARA OR AUTO FLG SE
0A29 8A44 03837             JEPU BZERI3
0A2A B02F 03838 RESC        CALR          M=02              RESET SINGLE CYCLE BIT
0A2B A78D 03839             JEPU REG5

0A2C CF08 03841             JEPR FECH
0A2D E706 03842             JEPR XFH10G47
0A2E C5F0 03843             JEPR TEMMZBP
0A2F 930A 03844             BALG -5       M=0               BRANCH IF BRKPT IN MC ZONE
0A30 E473 03845             JEPR SESTOP
0A31 A36E 03846             JEPU RETN2

0A32 C1C0 03849             JEPR SEPA
0A33 C720 03850             JEPR PASKDC
0A34 8060 03851             JEPU REKBIDL

0A35 C39F 03853             JEPR ANSPX/US
0A36 8060 03854             JEPU REKBIDL

                 *ANALYZE KEYBOARD INPUTS WITH BIT 7 EQUAL TO 1 IN THE CHARACTER CODE

0A37 BA72 03858             CALG          M=G7
0A38 9C7C 03859             BDAT -3       M=C7              BRANCH IF CONTINOUS UNDERSCORE
0A39 9CFB 03860             BDAT -7       M=CF              BRANCH IF HAY CODE
0A3A 8A44 03861             JEPU BZERI3

0A3B E5D0 03863             JEPR TELAMP
0A3C 8060 03864             JEPU REKBIDL

0A3D 1E09 03866 ANKBB71     BPRT -6       DB6=1             BR IF C.D.E.F
0A3E BA72 03867             CALG          M=G7
0A3F 93CE 03868             BDAT -4       M=93              BRANCH IF LAMP TEST CODE
0A40 9BEC 03869             BDAT +C       M=BE              BR IF COM
0A41 9BC4 03870             BDAT +4       M=BC              BRANCH IF LSP
0A42 C31A 03871             JEPR ANFCTKB
0A43 9701 03872 RETNAEID    BALG +1       (M=0)'            BRANCH TO IDLE IF M NOT 0
0A44 E3C0 03873 BZERI3      JEPR BZERPOP
0A45 B060 03874             JEPU REKBIDL
```

```
ADDR CODE NUMBR LABEL    CMND NEXTADDR OPERAND          COMMENT

0A46 B81F 03876          CALR          M=81
0A47 0813 03877          BKBD +3       NLS1=0
0A48 CC21 03878          BKBD +1       NLS2=1
0A49 B01A 03879          CALR          M=M+01
0A4A B01A 03880          CALR          M=M+01
0A4B B074 03881          CALG          G7=M        LOAD G7 WITH LS CODE IN M
0A4C 80C0 03882          JEPU SELSEQSW

0A4D 0EF1 03884          BCOM +1       COM=1
0A4E 8A44 03885          JEPU BZERI3

0A4F 071F 03887          JEXA          EA1
0A50 8002 03888          JEPU 0002


          * WRONG END OF TAPE - TURN ON BUZZER AND SET RECORD AND FLASH BITS
          *                  (2 AND 3) IN REG.G9.

0A51 0722 03894 WEOT     CKBD          BUZZ=2      TURN ON BUZZER CONTINUOSLY
0A52 B30F 03895          CALR          M=30        BIT MASK REC., AND RECD. FLASH
0A53 E7B0 03896          JEPR SEG9
0A54 8A96 03897          JEPU WEOT1


          * IF IN REVISE OR NO MEDIA IN SET BUZZER. TURN RECORD ON. IF RW
          * NOT ACTIVE RETURN. IF RW AVTIVE FETCH CHARACTER FROM RO BUFFER
          * AND MOVE RW HEAD LEFT IS DATA. IF NO DATA REMAINING CLEAR
          * RO BUFFER

0A55 2EC3 03905 SERC     BRWM +3       RUN=1       1> BRANCH IF TAPE RUNNING
0A56 2E42 03906          BRWM +2       WINH=1      1> BR. IF WRITE INHIBIT ON
0A57 B10F 03907          CALR          M=10           BIT MASK-REVISE
0A58 9281 03908          BALG +1       M.G8=0      2> BR. IF NOT IN REVISE
0A59 8A44 03909          JEPU BZERI3

0A5A B04F 03911          CALR          M=04        2< BIT MASK - JUST. MODE
0A5B 9291 03912          BALG +1       M.G9=0      3> BR. IF NOT IN JUST.
0A5C E951 03913          JEPR PRSTDLJ                 BR. TO PRINT STD. LEFT JUST.
0A5D 2E51 03914          BRWM +1       READ=1      3< BR  IF WRITE CURRENT OFF
0A5E 8A00 03915          JEPU RECEOR                  JMP TO REC. END OF RECORD

0A5F CDE2 03917          JEPR CLRW                    BR. TO RW CLEAR
0A60 B30F 03918          CALR          M=30           BIT MASK - REC & REC. FLASH
0A61 E7B0 03919          JEPR SEG9
0A62 2A9A 03920          BRWM +A       EOT=0       4> BR. IF NOT CLEAR LEDER
0A63 2?10 03921          CRWM          NRF            TAPE NORM. RD. FORWARD
0A64 E7E3 03922          JEPR CLREOTRW
0A65 B04F 03923          CALR          M=04           ALLOWS 2 SEC. TIME-OUT
0A66 0013 03924          CKBD          HSDLY          SET1/2 SEC. DELAY
0A67 2A75 03925          BRWM +5       GAP=0       4> NO GAP IN DATA BRANCH
0A68 C07C 03926          JEPR MO                      BR. TO MONITOR
0A69 0CBD 03927          BKBD -2       NS=1           BR. IF 1/2 SEC. DLY NOT EXP.
0A6A 2?70 03928          CRWM          FRR         5< REAS FAST REV.
0A6B 2A3E 03929          BRWM -1       EOT=0       5> BR. NOT AT CLEAR LEDER
0A6C 8983 03930          JEPU NEWTAPE

0A6D 2AD1 03932          BRWM +1       ACT=0
0A6E CEAE 03933          JEPR CLRO
0A6F B00F 03934          CALR          M=00        4<
0A70 0402 03935          CKBD          ARDR           SELECT ACTIVE READER
0A71 CF77 03936          JEPR XF/RORW              SAVE RO BUF IN RW BUF
0A72 CE3E 03937          JEPR SCHEOR
0A73 B074 03938          CALG          G7=M        SAVE SEARCH TERMINATION INDICATION
0A74 CF4A 03939          JEPR XFRWROCL             RESTOR RO BUFFER
0A75 BA72 03940          CALG          M=G7
0A76 2E94 03941          BRWM +4       EOT=1       IF EOT ERASE FROM START OF TAPE
0A77 9301 03942          BALG +1       M=0         BRANCH IF SEARCH WAS ABORTED
0A78 B8CF 03943          JEPU SEREC

0A79 CEFC 03945          JEPR RESET RC             CLEAR RECORD BIT
0A7A 8060 03946          JEPU REKBIDL

0A7B 8983 03948          JEPU NEWTAPE


          * RECORD ERROR LOCK
          * SET RECORD  FLASH , STOP READ , AND SET BUZZ AND LOCK

0A7C B1CF 03954 LKRCER   CALR          M=10
0A7D E7B0 03955          JEPR SEG9                 SET RECORD FLASH
0A7E 2?C0 03956          CRWM          SWR
0A7F A058 03957          JEPU BZLK


          * IF IN REVISE OR RECORD MODE RECORD THE RW BUFFER AND EXECUTE
          * A TRACK PRINT

0A80 E5A5 03964 DUMP     JEPR TERVRC
0A81 9301 03965          BALG +1       M=0         1> BR. IF IN REV. OR REC.
0A82 B8BE 03966          JEPU RCRWB

0A83 8AE2 03968          JEPU SERWRC   1<


          **IF NOT IN JUST MODE BR TO TEST ACTION IF RETURNS FROM TEACT WITH M=0
          **STOP BIT NOT SET OR AUTO. PARA LINE OR WORD BITS IN G8 ARE NOT SET.
```

```
ADDR CODE NUMBR LABEL     CYLD NEXTADDR OPERAND                    COMMENT

                     * RECORD THE RW BUFFER AND FETCH A CHARACTER FROM THE ACTIVE MEDIA
                     * IF NOT ACTIVE RETURN AFTER RECORD

0A84 CA80 03978 DUMP&FCH JEPR DUMP
0A85 B04F 03979          CALR          M=04          JUSTIFY MASK
0A86 9202 03980          CALG +2       M.G9=0     1> BR  IF NOT IN JUSTIFY
0A87 F1F4 03981          CALH          HF=0
0A88 000F 03982          RETN
0A89 E5C5 03983          JEPR TESCH&AC
0A8A 9300 03984          BALG -7       M=0           BR  IF NO ACTION IN G8
0A8B CEF8 03985          JEPR TERDB2
0A8C 9700 03986          BALG -4       (M=0)'     BRANCH IF NO DATA
0A8D 87F0 03987          JEPU FEDA

                     *WRITE FORW. 3/2SEC. IF NOT EOT REV.TAPE 60MS.AND READ REV.
                     **CK.SERVO.EOT SKIP RW BLOCK TWICE AND READ FORWARD
                     **RESET RECD.RECD. FLASH, AND DUP.IN G9 STOP READ AND IDLE

0A8E 2 00 03995 ENDEORRC CRWM          NWF           NORMAL WRITE FORWARD
0A8F B03F 03996          CALR          M=03          3/2 SEC  DLY
0A90 C015 03997          CKBD          HSDLY         SET 1/2 SEC. DLY
0A91 2E01 03998          BRAM +4       EOT=1      1><BR. IF AT EOT
0A92 C100 03999          JEPR MOROTAPE               BR. TO RO TAPE MONITOR
0A93 CCBD 04000          BKBD -2       NS=1       2> BR. IF 1/2 SEC. DLY NOT EXP.
0A94 2 D0 04001          CRWM          NWR           NORMAL WRITE REVERSE
0A95 E62A 04002          JEPR RVTPRW
0A96 B30F 04003 WEOT1    CALR          M=30       1< SET 60 MS. DLY
0A97 E059 04004          JEPR DLY MSKB               BR. TO MS. DLY
0A98 2150 04005          CRWM          NRR           NORMAL READ REVERSE
0A99 2AA5 04006          BRAM +5       SOK=0      3><BR. IF SERVO NOT OK
0A9A 2E0E 04007          BRAM -1       EOT=1      4> BR. IF AT EOT
0A9B E8B1 04008          JEPR SKPRWBLK               BR  TO RW SKIP BLOCK
0A9C E8B1 04009          JEPR SKPRWBLK               SKIP BLOCK
0A9D 2110 04010          CRWM          NRF           NORMAL READ FORWARD
0A9E E831 04011          JEPR SKPRWBLK
0A9F B31F 04012          CALR          M=31          RECD. FLASH AND DUP.
0AA0 E7B2 04013          JEPR REG9
0AA1 2EA1 04014          BRWM +1       SOK=1         BR. IF SERVO OK
0AA2 8BC5 04015          JEPU RWSNOK                 BR. SERVO NOT OK

0AA3 2700 04017          CRWM          SRD           STOP READ
0AA4 8060 04018          JEPU REKBIDL

                     * DUMP THE CONTENTS OF THE RW BUFFER IF IT IS DATA OTHERWISE EXIT

0AA5 C0B8 04024 DUMPIFDA JEPR FERW                   FETCH CHAR. FROM RW
0AA6 9701 04025          BALG +1       (M=0)'     1> BR. IF NOT A NULL CHAR.
0AA7 000F 04026          RETN
0AA8 8A80 04027          JEPU DUMP                1<

                     *SETS UP RW FOR RECORD
                     **CKS: SERVO, EOT,
                     **STOPS WRITE, TIMES OUT AND CKS FOR EOR IF NONE AND NEAR END OF TAPE
                     **BUZZER TURNED ON CONT. IF IN JUST. - EOR RECORD.; IF NOT JUST CLR STACK
                     **RESTORE RO AND RW

0AA9 CAE2 04037 ENDRC    JEPR SERWRC                 SET UP RWB TO RECORD
0AAA 2EA1 04038          BRWM +1       SOK=1      1> BR. IF SERVO OK
0AAB 8BC5 04039          JEPU RWSNOK

0AAC 2A91 04041          BRWM +1       EOT=0      1<BR. IF NOT EOT
0AAD 8A51 04042          JEPU WEOT

0AAE 2C80 04044          CRWM          SWR        1< STOP WRITE
0AAF B25F 04045          CALR          M=28
0AB0 E369 04046          JEPR DLY MSKB               SET MS DELAY
0AB1 B80F 04047          CALR          M=80
0AB2 907A 04048          BALG +A       M.G7=0     7>  BR. IF EOR
0AB3 2A69 04049          BRWM +9       NEOT=0
0AB4 0722 04050          CKBD          BUZZ=2        TURN ON BUZZER CONTINUOUS
0AB5 B04F 04051          CALR          M=04          BIT MASK FOR JUSTIFY
0AB6 F1F4 04052          CALH          HF=0          JUSTIFY: # OF RW CHAR. PROCESSED
0AB7 9294 04053          BALG +4       M.G9=0     TEST FOR JUST
0AB8 E205 04054          JEPR CLH4-H7
0AB9 CFE0 04055          JEPR RERO=RW
0ABA EA25 04056          JEPR AJRWBPJ
0AB3 E951 04057          JEPR PRSTDLJ
0ABC 8A00 04058          JEPU RECEOR

0ABD 000F 04050          RETN

                     *CLEARS RO BUFFER, CKS. ACTIVE READER FOR EOT. RESETS RLRC, BR. TO BIG
                     **MONITOR, AND CKS FOR READ DATA READY
                     ***G2

0ABE 2710 04067 RDSTART  CACY          NRF           NORMAL READ FORWARD
0ABF CEAE 04068          JEPR CLRO                   BR. TO CLEAR RO BUFFER
0AC0 E820 04069 RDSTRV   JEPR CLREOTAC               BR. TO CLEAR ACT. READER, CK. EOT
0AC1 6124 04070          CALG          G2=0          RESET RLRC
0AC2 2230 04071          CACM          PMED          RESET ACTIVE MEDIA
0AC3 B04F 04072          CALR          M=04          SET 2 SEC. DELAY
0AC4 C013 04073          CKBD          HSDLY         SET 1/2 SEC. DELAY
```

```
ADDR CODE NUMBR LABEL     CMND NEXTADDR OPERAND          COMMENT

0AC5 C0BE 04074           JEPR BIGMO                     <2BR. TO BIG MONITOR
0AC6 0C51 04075           BMBD +1        NS=1         1>  BR. IF 1/2 SEC. DLY NOT EXP.
0AC7 BAE9 04076           JEPU ANRDER                     BR. TO ANAL. READ ERROR

0AC8 281C 04078           BACM -3        RDR=0        1<>2
0AC9 000F 04079           RETN


     * CALCULATE THE INDENT FROM THE TAB COUNTER IN GC FOR JUSTIFICATION

0ACA E3AC 04085 CAINDENT JEPR FELM                      CALC GC INDENT
0ACB B014 04086           CALG           G1=M
0ACC F004 04087           CALH           HO=M
0ACD B0FF 04088           CALR           M=OF
0ACE BEC2 04089           CALG           M=M.GC
0ACF F014 04090           CALH           H1=M
0AD0 9702 04091           BALG +2        (M=0)'          BRANCH IF TAB COUNTER NOT ZERO
0AD1 FA02 04092 XFM=HO    CALH           M=HO
0AD2 000F 04093           RETN
0AD3 E59F 04094           JEPR TEMC&J
0AD4 9702 04095           BALG +2        (M=0)'          BRANCH IF MARGIN CONTROL OR JUSTIFY
0AD5 BAA2 04096           CALG           M=GA
0AD6 1A3A 04097           BPRT -5        DB3=0           BRANCH IF PRINT-AUTO NOT SET
0AD7 E3AC 04098           JEPR FELM
0AD8 F0C4 04099           CALH           HC=M
0AD9 C3F9 04100           JEPR FETBHC+
0ADA 95C4 04101           BALG +4        M=0             BRANCH IF NO TABS
0ADB F004 04102           CALH           HO=M
0ADC E7C1 04103           JEPR DEC H1
0ADD 970B 04104           BALG -4        (M=0)'          BRANCH IF H1 NOT EQUAL ZERO
0ADE BAD1 04105           JEPU XFM=HO

0ADF C4F6 04107           JEPR ANTBSTOP
0AE0 F0C4 04108 XFHO=M    CALH           HO=M
0AE1 000F 04109           RETN


     * SET UP TO RECORD THE RW BUFFER. IF IN JUSTIFY OR RW BUFFER IS
     * EMPTY CLEAR H2 AND H3. CLEARS RW BUFFER. SET H7=0 ADJUST ADDRESS
     * POINT GD TO FF AND SET H3 TO CARRIAGE POSITION

0AE2 B04F 04116 SERWRC    CALR           M=04             JUST. MASK
0AE3 9292 04117           BALG +2        M.G9=0       1> BR. IF NOT IN JUST.
0AE4 CE0F 04118           JEPR TERWB                      BR TO TEST RWB NEXT CHAR.
0AE5 9701 04119           BALG +1        (M=0)'       2> BR IF NO NEXT CHAR.
0AE6 A4C9 04120           JEPU CLRWH3                 1< CLEAR AND SETUP H3

0AE7 CDEE 04122           JEPR CLRW+M                     LOAD M INTO RW
0AE8 A4CA 04123           JEPU SEH3=CA                    SETUP H3


     * ANALYZE READ ERROR
     * READ DATA FORWARD AND REVERSE UNTIL GO=0 THEN MOVE HEAD
     * RIGHT. CLEAR THE RO BUFFER, BUZZ AND LOCK KEYBOARD

0AE9 CEAE 04131 ANRDER    JEPR CLRO                       BR. TO CLEAR RO
0AEA CAF2 04132           JEPR STOPACRD                   BR. TO STOP ACTIVE READER
0AEB B0CF 04133           CALR           M=0C             BIT MASK
0AEC B892 04134           CALG           M=M+G9           TURN ON PLAY & JUST. BITS IN G9
0AED BAFD 04135           CALR           M=M.AF           MASK SEARCH,REC,PLAY,JUST,SKIP,DUP
0AEE A358 04136           JEPU BZLK

     * TRANSFER CHAR. FROM THE RO BUFFER TO ACTIVE BLOCK NUMBER.

0AEF CEDB 04141 XFROBNAC  JEPR FERO+
0AF0 E3D7 04142           JEPR CVFFOO
0AF1 A86A 04143           JEPU SEBNAC

     * STOP ACTIVE READER - CHECKS ACTIVE SERVO. IF SERVO OK STOP THE ACTIVE
     *                    - READER

0AF2 2FA1 04149 STOPACRD  BACM +1        SOK=1        1>  BR. IF SERVO OK
0AF3 8CC2 04150           JEPU ACSNOK                     BR. TO SERVO NOT OK

0AF4 2700 04152           CACM           SRD          1<  STOP ACTIVE READER
0AF5 B25F 04153           CALR           M=25         SET 74 MSEC. DELAY.
0AF6 A369 04154           JEPU DLY MSKB                   SET 2 MS. DELAY


     * CHECK FOR READ DATA READY . FETCH CHARACTER IF TRUE . UPDATE LRC

0AF7 2A13 04160 CKRLRC    BRWM +3        RDR=0        1>  BR. IF READ DATA NOT READY
0AF8 2210 04161           CRWM           M=RR             DATA TO M
0AF9 B922 04162 UPCARLRC  CALG           M=M*G2           UPDATE RLRC
0AFA B024 04163           CALG           G2=M             STORE RLRC
0AFB 000F 04164           RETN                        1<


0AFC F0B4 04167 AJRW-     CALH           HB=M             SAVE M REGISTER
0AFD E74A 04168           JEPR DEC GD                     DECRIMENT POINTER
0AFE 8E5E 04169           JEPU XFM=HB
```

```
ADDR CODE NUMBER LABEL     CMND NEXTADDR OPERAND            COMMENT

              * START RECORD - MONITORS RO MEDIA. MONITORS STOP KEY. ERASES SHORT GAP
              *              (40 MILLI SEC. WIDE).

0AFF 5718 04176            *CHECK WORD*
0B00 C100 04176 RCSTART    JEPR MOROTAPE               2<
0B01 E1C6 04177            JEPR MOKB                      LOOK FOR STOP KEY
0B02 2A16 04178            BRWM +6        SOK=0        1> BR. IF SERVO NOT OK
0B03 2E6C 04179            BRWM -3        TNS=1        2> BR  IF TAPE NOT UP TO SPEED
0B04 B18F 04180            CALR           M=18
0B05 0003 04181            CKBD           2MDLY
0B06 2A91 04182            BRWM +1        EOT=0           BR IF NOT END OF TAPE
0B07 8A51 04183            JEPU WEOT

0B08 2EA1 04185            BRWM +1        SOK=1           BR. IF SERVO OK
0B09 8EC5 04186            JEPU PWSNOK                 1<

0B0A C100 04188            JEPR MOROTAPE
0B0B E1C6 04189            JEPR MOKB                      TEST FOR STOP KEY
0B0C 0CA9 04190            BKBD -6        NM=1            MS DELAY NOT EXP.
0B0D 000F 04191            RETN


              *CKS. ACTIVE READER FOR NO DATA IN 28 MS
              **IF DATA NEQ. TO ZERO STUFF BUFFER. UPDATE PLRC
              **IF DATA EQ. TO 0 READ CARRIER POS. AND LRC CHAR.

0B0E E7F9 04198 RDFWD      JEPR TEEODAC                   BR. TO ACTIVE READER EOD LOOP
0B0F 2340 04199            CACM           RMED            RESET MEDIA
0B10 B14F 04200            CALR           M=14            SET 28 MS. DELAY
0B11 0003 04201            CKBD           2MDLY           SET 2  MS. DLY.
0B12 0CA1 04202            BKBD +1        NM=1         1>< BR. IF MS. DLY. NOT EXP.
0B13 8AE9 04203            JEPU ANRDER                    BR. TO ANAL. READ ERROR

0B14 2B1D 04205            BACM -2        RDR=0        1<> BR. IF READ DATA NOT READY
0B15 2310 04206            CACM           M=RR         3<  READ DATA TO M
0B16 9701 04207            BALG +1        (M=0)'       2>  BR. IF DATA NEQ. TO 0
0B17 A16A 04208            JEPU RDCARLRC                   BR. TO READ CARR. POS. AND LRC CHAR.

0B18 CEE0 04210            JEPR INRO+                  2<  BR. TO INSERT DATA IN RO AND INC.
0B19 CAF9 04211            JEPR UPDARLRC                   BR. TO UPDATE RLRC
0B1A 2710 04212            CACM           NRF              NORMAL READ FORWARD
0B1B C58C 04213            JEPR LDPRTPA
0B1C E890 04214            JEPR TEDATAC                    BR. TO TEST ACTIVE READER EOD
0B1D 9707 04215            BALG -8        (M=0)'       3>  BR. IF DATA
0B1E 000F 04216            RETN


              * END READ - TIMES OUT FOR TAPE POSITION. READ LONG. REDUN. CHAR. STORED
              *            IN REG. G2 IF NEQ. TO O JUMP TO ANAL. READ ERROR
              *            OTHERWISE TEST FIRST CHAR. IN RO BUFFER  FOR EOR.
              *            IF EOR CH. REVERSE TAPE TO BEGIN. OF EOR BLOCK.

0B1F B05F 04225 ENDRD      CALR           M=05            SET 10 MS DELAY
0B20 E369 04226            JEPR DLY MSKB                  BR. TO SET 2MS DLY.
0B21 8A22 04227            CALG           M=G2            RLRC
0B22 9201 04228            BALG +1        M=0          1> BR. IF RLRC EQ. TO ZERO
0B23 8AE9 04229            JEPU ANRDER                    BR. TO ANAL. RD. ERROR

0B24 CEB2 04231            JEPR AJROST
0B25 CEF8 04232            JEPR TEROB2
0B26 B50F 04233            CALR           M=80-M
0B27 9201 04234            BALG +1        M=0          1> BR. IF EOR
0B28 8AF2 04235            JEPU STOPACRD                  BR. TO STOP ACTIVE READER

0B29 A70E 04237            JEPU SKPEORRV               REVERSE PAST EOR BLOCK


              *INITIATES READ ACTION.KEEPS TRACK OF #OF FWD. AND REV. READ PASS.
              **IF PLRC EQ. TO ZERO SKIP BLOCK
              *  *GO.G2

0B2A B05F 04245 RDFWD3     CALR           M=05            MAX. #OF PASSES TO BE MADE OVER BLK.
0B2B 8004 04246 RDFWDM     CALG           GO=M            STORE MAX. #OF PASSES
0B2C C4BE 04247 RDFWDM1    JEPR RDSTART                   BR. TO START READ
0B2D 2340 04248 RDFWDSPC   CACM           RMED            RESET MEDIA
0B2E CB0E 04249            JEPR RDFWD                     BR. TO READ FORWARD
0B2F E73D 04250            JEPR DEC GO                    DEC. #OF PASS TO BE MADE
0B30 9308 04251            BALG +8        M=0          1> #OF PASSES EQ. MAX.
0B31 8A22 04252            CALG           M=G2            RLRC
0B32 9708 04253            BALG +8        (M=0)'       2> BR. IF RLRC NEQ. TO ZERO
0B33 B01F 04254            CALR           M=01            BIT MASK
0B34 9204 04255            BALG +4        M.GO=0       1> BR. IF LAST READ WAS FINAL
0B35 B05F 04256            CALR           M=05            SET 10 MS. DLY.
0B36 E369 04257            JEPR DLY MSKB                  BR. TO 2 MS. DELAY
0B37 2750 04258            CACM           NRR             NORMAL READ REVERSE
0B38 E801 04259            JEPR SKPACBLK                  BR. TO ACTIVE READER SKIP BLOCK
0B39 BB1F 04260            JEPU ENDRD                  1< BR. TO TERMINATE READ

              * MOVE THE ACTIVE HEAD LEFT ONE TRACK AND READ 6 CHARACTERS INTO
              * THE RO BUFFER WHEN IN REVISE MODE.

0B3A B001 04265 RDREVM     CALG           GO=M            STORE PRESENT PASS
0B3B B05F 04266            CALR           M=05         2< SET 10 MS DELAY
0B3C E369 04267            JEPR DLY MSKB                  BR. TO 2 MS. DELAY
0B3D 2750 04268            CACM           NRR             ACTIVE READER NORMAL READ REVERSE
0B3E E801 04269            JEPR SKPACBLK                  BR. TO ACT. RDR. SKIP BLOCK
0B3F E369 04270            JEPR DLY MSKB                  BR. TO 2 MS DELAY
```

```
ADDR CODE NUMBR LABEL     CMND NEXTADDR OPERAND          COMMENT

0B40 E7DD 04271           JEPR DEC GO                  DEC. #OF PASSES
0B41 9301 04272           BALG +1        M=0 .     3>  BR. IF #OF PASS EQ. MAX.
0B42 BB2C 04273           JEPU RDFWDM1                 BR. TO READ FWD M 2ND INSTR.

0B43 BAE9 04275           JEPU ANRDER              3<  BR. TO READ ERROR

                *TESTS IF SYSTEM CONDITIONED FOR TEXT STRING SEARCH. SETS UP STORAGE AND
                *WAITS FOR ENTRY OF QUE.
                **H9.HE

0B44 2BD6 04282 TEXT SCH BACM +6        ACT=0     A>   A TRANSPORT MUST BE ACTIVE
0B45 BA32 04283           CALG           M=G9
0B46 1A54 04284           DPRT +4        DB3=0     A>  MUST BE IN PLAY MODE
0B47 BA32 04285           CALG           M=G8
0B48 1A43 04286           BPRT +3        DB4=0         BR IF NOT IN REV
0B49 CDEC 04287           JEPR TEFITRV
0B4A 9301 04288           BALG +1        M=0       B>   REMAINDER OF ROB MUST FIT IN RWB
0B4B BA44 04289           JEPU DZERI3              A<

0B4C B04F 04291           CALR           M=04
0B4D E7B7 04292           JEPR REGA
0B4E E1E9 04293           JEPR XFCAHE9             B<   SAVE PRESENT CARRIER POSITION
0B4F CBE5 04294           JEPR CLQUE                    CLEAR QUE STORAGE
0B50 1303 04295           CPRT           RBDN      D<
0B51 0832 04296           BKBD +2        STOP=0    C>
0B52 E7F3 04297           JEPR CLHE9                    CLEAR CARRIER STORAGE &
0B53 8060 04298           JEPU REKBIDL                  RETURN TO IDLE IF STOP KEY DEPRESS

0B54 E24D 04300           JEPR PACEKB              C<   LOOK FOR KB INPUT
0B55 930A 04301           BALG -5        M=0       D>   BR IF NO KEYBOARD INPUT
0B56 E26D 04302 FEKBTS    JEPR AJKS+1
0B57 CEB9 04303           JEPR ANKBTS                   ANALYZE KEYBOARD INPUT.
0B58 0B07 04304           JIPU -8                  D>

                *SETS EOR CODE TO G7. PUTS ACTIVE BNO TO G4
                ***G4

0B59 B80F 04310 SECPEOR   CALR           M=80          EOR CODE
0B5A B074 04311           CALG           G7=M
0B5B EB7C 04312           JEPR FEBNAC                   BR. TO PUT ACTIVE BNO TO M
0B5C A738 04313           JEPU XFG4=M

                *STORE PRINTING CHAR FOR TEXT STRING SEARCH AND PRINT IF CODE PRINT ON.
                *G3

0B5D B034 04319 EXPCTS    CALG           G3=M
0B5E C12A 04320           JEPR CVG3TOPC                  THE PRINT CODE IS STORED IN QUE
0B5F B034 04321           CALG           G3=M
0B60 BC3F 04322           CALR           M=C3
0B61 E3BB 04323           JEPR FEA2RAM                  FETCH POSITION OF LAST CHAR ENTERED
0B62 BC09 04324           CALR           M=CO-M
0B63 1A71 04325           BPRT +1        DB7=0     A>   BR IF QUE STORAGE NOT FILLED
0B64 A30D 04326           JEPU BZERROR

0B65 B099 04328           CALR           M=09-M
0B66 1E71 04329           BPRT +1        DB7=1     B>   BR IF NOT ON LAST 5 CHARACTERS.
0B67 E313 04330           JEPR BZ
0B68 BC3F 04331           CALR           M=C3
0B69 E3B3 04332           JEPR FEA2RAM
0B6A B01A 04333           CALR           M=M+01         INCR POSITION POINTER
0B6B 3008 04334           CMEM           MIN
0B6C 3084 04335           CMEM           A2IN
0B6D BA32 04336           CALG           M=G3
0B6E 3003 04337           CMEM           MIN            STORE CHAR ENTERED
0B6F BAE2 04338           CALG           M=G8
0B70 1E61 04339           BPRT +1        DB6=1     C>   BR IF CODE PRINT IS ON
0B71 000F 04340           RETN

0B72 C1AD 04342           JEPR FRG7PACE
0B73 9701 04343           BALG +1        (M=0).'   BRANCH IF NO TIMEOUT
0B74 00CF 04344           RETN

0B75 8B56 04346           JEPU FEKBTS

                ** ANALYSES NON-PRINT CHARACTERS IN PLAY.SKIP.DUP. IF CHAR IS RPT OR EJT
                ** TESTS FOR DUP AUTO. BRANCHES ACCORDING TO WHETHER CHAR IS MEDIA CONTROL
                ** CODE/LINE SPACE CODE OR A PRINTER FUNCTION CODE.

                *NON-PRINTING CHARACTERS

0B76 C848 04355 ANNPCPSD JEPR ANBM/EOR
0B77 9307 04356           BALG +7        M=0       BRANCH IF G7 = 0
0B78 9605 04357           BDAT +5        M=80      BRANCH IF END OF RECORD
0B79 B01F 04358           CALR           M=01      2<
0B7A 9293 04359           BALG +3        M.G9=0    BRANCH IF NOT POP MODE
0B7B B0DF 04360           CALR           M=08
0B7C 92B1 04361           BALG +1        M.G8=0    BRANCH IF NOT AUTO
0B7D A53F 04362           JEPU TETW

0B7E A3BE 04364           JEPU RETN2               3<
```

```
ADDR CODE NUMBR LABEL     CMND NEXTADDR OPERAND              COMMENT

0B7F E3F5 04366           JEPU TEG7FMT                       1<
0B80 9307 04367           BALG +7           M=0              BRANCH IF FORMAT CODE
0B81 B0AF 04368           CALR              M=0B
0B82 9207 04369           BALG +7           M.G9=0           BRANCH IF NOT DUP MODE
0B83 BA72 04370 ANNPCJ    CALG              M=G7
0B84 1071 04371           BPRT +1           DB7=1            BRANCH IF PRINT CHARACTER
0B85 8311 04372           JEPU ANG7PFPJ

0B86 1309 04374           CPRT              PBON
0B87 8930 04375           JEPU ANG7CCPJ

0B88 0002 04377           RNOP
0B89 A373 04378           JEPU ANFMT

0B8A 000F 04380           RETN                               6<

          * FETCH A CHARACTER FROM THE RW BUFFER AND RECORD IT UNLESS IT IS
          * END OF DATA. IF IT IS PUSH STACK UP ONE THEN RETURN.
0B8B CDBA 04386 FERCRW    JEPR FERW+
0B8C 9701 04387           BALG +1           (M=0)'           A> BRANCH IF END OF DATA
0B8D A33F 04388           JEPU RETN1

0B8E C0F6 04390           JEPR XFHIWLRC                      A<
0B8F 8PEC 04391           JEPU RC HI

          * RECORD THE CONTENTS OF THE RW BUFFER.IF A HARD RECORD ERROR OCCURS
          * END RECORD AND GO TO ERROR MODE. HARD RECORD ERROR-DOES NOT RECORD
          * CORRECTLY IN THREE TRIES. G2 HAS LRC RESULT. GO WORKING
0B90 8AA9 04398           JEPU ENDRC

0B91 2 00 04400           CRWR              NWR              REVERSE TAPE IF ERROR
0B92 E031 04401           JEPR SKPRABLK
0B93 E3-P 04402           JEPR DLY MSKB
0B94 2 90 04403           CRWR              NWF
0B95 E03A 04404           JEPR RVTPRW
0B96 E329 04405           JEPR DLY MSKB
0B97 CB00 04406 RCRWB1    JEPR RCSTART
0B98 C600 04407           JEPR PCPREAM
0B99 CDE7 04408           JEPR AJRWST
0B9A C9BC 04409           JEPR WPDATA
0B9B C908 04410           JEPR CALCRCOH
0B9C 8A22 04411           CALG              M=G2
0B9D 9302 04412           BALG -D           M=0              BRANCH IF LRC OK
0B9E E73D 04413           JEPR DEC GO                        DECRIMENT READ RETRY COUNTER
0B9F 9701 04414           BALG -E           (M=0)'
0BA0 CAA9 04415           JEPR ENDRC                         HARD ERROR
0BA1 8A7C 04416           JEPU LKRCER

          *ANAL G7 FOR A BLOCK MARK CODE IF NEQ. TO BMK G7 AND G4 STORED
          **CHECK REVISE - IF IN REVISE TESTS FOR DUMP CHAR. IF TRUE DUMP AND FETCH.
          **TESTS OVERFLOW
0BA2 E580 04424 TEG7DPJ   JEPR TEDUMP
0BA3 9701 04425           BALG +1           (M=0)'           BRANCH IF NOT A NULL CHARACTER
0BA4 000F 04426           RETN

0BA5 CF93 04428           JEPR ANAUTUS
0BA6 8A84 04429           JEPU DUMP&FCH

0BA7 83C0 04431           JEPU RCCBMK

0BA8 E467 04433 RCCHKB    JEPR SEDUMPRV                      SET DUMP IF IN REVISE
0BA9 E41E 04434           JEPR RECENIF
0BAA B6CF 04435 RCCHCP    CALR              M=BC             BMK CODE
0BAB 9070 04436           BALG -4           M-G7=0           BRANCH IF BLOCKMARK CODE
0BAC C53E 04437           JEPR PR CD                         BR. TO C AND D PRINT
0BAD CEB5 04438 RCCH      JEPR XFG74RW                       STORE G7/G4
0BAE 810F 04439           CALR              M=10             BIT MASK REVISE
0BAF 9282 04440           BALG -D           M.G8=0
0BB0 FA22 04441           CALH              M=H2             FOR REV. H2 EQ. # OF CH. IN BLK.
0BB1 BF01 04442           CALG              M=M+1
0BB2 9701 04443           BALG +1           (M=0)'           BR. IF # CH. REM. IN BLK NEQ. 0
0BB3 80C3 04444           JEPU LKRVLIM                       BR. REVISE LAST CHAR.

0BB4 E550 04446           JEPR TEDUMP
0BB5 9301 04447           BALG +1           M=0
0BB6 8CDC 04448           JEPU TEDUMPRV

0BB7 FA22 04450           CALH              M=H2             3< # CH. REM. IN BLK
0BB8 930A 04451           BALG -5           M=0
0BB9 B0AF 04452           CALR              M=0A
0BBA D121 04453           BALH +1           M>H2             4>
0BBB 000F 04454           RETN                               5<
0BBC B20F 04455           CALR              M=20             4< BIT MASK DUMP
0BBD 92FD 04456           BALG -2           M.GF=0           5> BR. IF DUMP NOT SET
0BBE 0000 04457           NOOP
0BBF E55D 04458           JEPR TESCH&AC
0BC0 9302 04459           BALG +2           M=0              BRANCH IF CHAR NOT FROM MEDIA
0BC1 CD5C 04460           JEPR TEFITRV
0BC2 9301 04461           BALG +1           M=0              BRANCH IF DATA FITS
0BC3 805F 04462           JEPU BZI3

0BC4 000F 04464           RETN
```

```
ADDR CODE NUMBER LABEL    CMND NEXTADDR OPERAND              COMMENT

                * RW SERVO NOT OK - EJECTS RW MEDIA IF NOT AT EOT OR IF TAPE NOT MOVING
                *                   FORWARD.
                *                   IF LAST COMMAND TO TAPE WAS FORWARD AND THE TAPE
                *                   IS  AT EOT  THEN  REWIND RW MEDIA.

0BC5 2A09 04472 RWSNOK   BRWM +9       TFWD=0
0BC6 2A95 04473          BRWM +8       EOT=0
0BC7 B  0F 04474         CALR          M=60
0BC8 E    04475          JEPR DLY MSKB              DO 180 MS DELAY
0BC9 2    04476          CRWM          SRD
0BCA 2    04477          CRWM          FRR
0BCB E7E3 04478          JEPR CLREOTRW
0BCC E3C3 04479          JEPR REWINDRW
0BCD C5FC 04480          JEPR RESET RC
0BCE 8060 04481          JEPU REKBIDL

0BCF E7F4 04483          JEPR EJRW
0BD0 B  0F 04484         CALR          M=60         SET 120 MS DELAY
0BD1 E359 04485          JEPR DLY MSK3              BR. TO SET 2MS DELAY
0BD2 2  0 04486          CRWM          SRD          STOP READ
0BD3 A354 04487          JEPU BZLKM=G9

                *DELETES LAST CHAR FROM QUE AND ADJUSTS CARRIER PSOITION
                * G7

0BD4 BC3F 04493 C CHARTS CALR          M=C3          FETCH POSITION OF LAST CHAR
0BD5 E326 04494          JEPR FEA2RAM
0BD6 BEF9 04495          CALR          M=BF-M
0BD7 1E71 04496          BPRT +1       DB7=1    A>   BP IF ANY DATA HAS BEEN ENTERED
0BD8 AAF5 04497          JEPU MVCRHE9                IF NO DATA MOVE CARIER TO BEGINNING

0BD9 3010 04499          CMEM          MOUT     A<   FETCH POSITION OF LAST CHAR
0BDA B030 04500          CALG          M=M-1         DECR POSITION POINTER
0BDB 3008 04501          CMEM          MIN           STORE DECREMENTED POINTER
0BDC B01A 04502          CALR          M=M+01   SET UP RAM ADDRESS SECTION 2
0BDD 3034 04503          CMEM          A2IN
0BDE 3010 04504          CMEM          MOUT          FETCH LAST CHARACTER
0BDF 8074 04505          CALG          G7=M
0BE0 B00F 04506          CALR          M=00
0BE1 3008 04507          CMEM          MIN           REPLACE LAST CHAR WITH ZERO
0BE2 BA82 04508          CALG          M=G8
0BE3 1E61 04509          BPRT +1       DBG=1    B>   BR IF CODE PRINT ON
0BE4 000F 04510          RETN

0BE5 A2F5 04512          JEPU C PRTCH           B<   MOVE CARRIER BACK 1 CHAR POSITION

                *CLEAR RAM LOCATION 228 THRU 237 AND SET 238=28 IN PREPARATION FOR
                *TEXT STRING SEARCH QUE ENTRY.

0BE6 890F 04519 CLQUE    CALR          M=90          ADDRESS LOCATION 228
0BE7 3034 04520          CMEM          A2IN
0BE8 B00F 04521          CALR          M=00     A<
0BE9 300A 04522          CMEM          MINI          CLEAR LOCATION ADDRESSED & INC ADDR
0BEA 3050 04523          CMEM          AOUT
0BEB 8C39 04524          CALR          M=C3-M
0BEC 9708 04525          BALG -4       (M=0)'   A>   BR IF NOT DONE CLEARING
0BED B8FF 04526          CALR          M=8F
0BEE A26A 04527          JEPU MIN               LOAD 28 INTO LOCATION 238

                * CLEAR GAP IN DATA
                * CLEAR RO BUFFER. SEARCH UNTIL DATA IS FOUND
                * IF DATA NOT FOUND IN 7 SEC: BRANCH TO SEARCH ERROR

0BEF CEAE 04534 CLGAP    JEPR CLRO                   BR. TO CLEAR RO
0BF0 2710 04535          CACM          NRF           NORMAL READ FORWARD
0BF1 80EF 04536          CALR          M=0E          SET 7 SEC. DELAY
0BF2 0013 04537          CKBD          HSDLY
0BF3 C07C 04538          JEPR MO                2<   BR. TO MONITOR
0BF4 2F71 04539          BACM +1       GAP=1    1>   BR. IF GAP IN DATA
0BF5 8D30 04540          JEPU RDFWDSCH               BR. TO SEARCH FORWARD READ

0BF6 0CBC 04542          BKBD -3       NS=1     1<>2BR. IF 1/2 SEC. DLY NOT EXP.
0BF7 8C20 04543          JEPU SCHER                  BR. TO SEARCH UNSUCCESSFUL

                * CLEAR EOR IN REVISE
                * SET G7 EQUAL TO LINE CORRECT CODE
                *READ PAST LINE AND EXECUTE A LINE  CORRECT
                *EXIT TO KEYBOARD IDLE

0BF8 BA5F 04552 CLEORRV  CALR          M=A5
0BF9 8074 04553          CALG          G7=M
0BFA E0DC 04554          JEPR RDLC
0BFB E0C5 04555          JEPR LCRVC
0BFC 8060 04556          JEPU REKBIDL

                * ANALYSE  FORMAT MODE FOR REVISE
                * IF REVISE OFF .DUMP BUFFER IF IT CONTAINS DATA AND END FORMAT RECORDING
                *IF REVISE ON TEST TO SEE IF BUFFER NEEDS TO BE DUMPED
```

```
ADDR CODE NUMBR LABEL    CMND NEXTADDR OPERAND              COMMENT

0BFE C80F 04563          *ADJUST WORD*
0BFF F431 04563          *CHECK WORD**
0C00 E5A8 04563 ANFMTTS  JEPR TERV
0C01 9703 04564          BALG +3       (M=0)'       BR IF REVISE
0C02 CAA5 04565          JEPR DUMPIFDA
0C03 E335 04566          JEPR SEFMT
0C04 A9A8 04567          JEPU ENDFMTRC
0C05 CDBB 04569          JEPR FERW
0C06 9301 04570          BALG +1       M=0          BR IF RW BUFFER EMPTY
0C07 BCDC 04571          JEPU TEDUMPRV

0C08 B20F 04573          CALR          M=20         RESET DUMP BIT
0C09 E78F 04574          JEPR REGF
0C0A E335 04575          JEPR SEFMT
0C0B 87F0 04576          JEPU FEDA


                *GET SCH BNO FROM THUMBWHEELS.INVERT AND STORE. SET ACTION TO MEDIA
                **SET DIRECTION OF SCH. ANAL: BMK/EOR
                ***G4

0C0C 0502 04584 EXSCH    CKBD          TWST              THUMBWHEELS TO M
0C0D B002 04585          CALG          M=M'              INVERT DATA
0C0E B044 04586          CALG          G4=M              STORE THUMBWHEEL DATA
0C0F E5F0 04587 ANSCHDIR JEPR TEACMED
0C10 B80F 04588          CALR          M=80.             BIT MASK
0C11 E7B0 04589          JEPR SEG9                       SET SEARCH BIT
0C12 BA42 04590 CNSCH    CALG          M=G4              THUMBWHEEL DATA TO M
0C13 9304 04591          BALG +4       M=0          1>   BR. IF SCH BNO EQ. 0
0C14 EB7C 04592          JEPR FEBNAC                     BR. TO TEST IF SCH BNO EQ. ACT. BNO
0C15 9141 04593          BALG +1       M>G4         2>   BR. IF SCH BNO LESS THAN ACT. BNO
0C16 BD1C 04594          JEPU SCHFWD                     BR. TO SEARCH FWD

0C17 8CA4 04596          JEPU SCHREV                2<   BR. TO SEARCH REVERSE

0C18 BA82 04598          CALG          M=G8
0C19 1A62 04599          BPRT +2       DB6=0
0C1A E1F4 04600          JEPR SVTB&MG
0C1B A576 04601          JEPU RDAUTLOG

0C1C CE3E 04603          JEPR SCHEOR                1<   BR. TO SEARCH TO EOR
0C1D 8060 04604          JEPU REKBIDL               3<   BR. TO IDLE 3


                *FETCH CHAR FROM RW BUFFER.CK FOR 00 INDICATING END OF BUFFER
                **STORES CHAR AND WRLC. WRITES CHAR. CK IF IN JUSTIFY MODE - IF TRUE
                **CK FOR FMT CHAR. IF TRUE CK FOR CR.
                ***H1

0C1E CAF7 04612 RCBUF    JEPR CKRLRC                    CHECK AND UPDATE THE LRC
0C1F 2C90 04613          CRWM          NWF
0C20 B10F 04614          CALR          M=10
0C21 9073 04615          BALG +3       M-G7=0       A> BRANCH IF FORMAT CODE
0C22 CBBB 04616          JEPR FERCRW                TRANSFER CHARACTER TO MEDIA
0C23 E468 04617          JEPR TEM2CH
0C24 9702 04618          BALG +2       (M=0)'       B> BRANCH IF NO SECOND CHARACTER
0C25 CBBB 04619          JEPR FERCRW                A<
0C26 8C1E 04620          JEPU RCBUF

0C27 EC4F 04622          JEPR RCBUFFIX
0C28 D011 04623          BALH +1       M-H1=0       C> BRANCH IF CARRIAGE RETURN
0C29 8C1E 04624          JEPU RCBUF
0C2A 000F 04625          RETN


                * SEARCH ERROR

0C2B 2A51 04630 SCHER    BRWM +1       READ=0       1>   BR. IF RW WRITE CURRENT ON
0C2C C5FC 04631          JEPR RESET RC                   BR. TO RESET RECORD
0C2D CAF2 04632          JEPR STOPACRD              1<   BR. TO STOP READ MODE
0C2E CEAE 04633          JEPR CLRO                       BR. TO CLEAR RO
0C2F BC0F 04634 LKSCHER  CALR          M=C0              SEH..SCH CODE MASK
0C30 BB92 04635          CALG          M=M@G9            SET BITS IN M
0C31 BEBD 04636          CALR          M=M.EB            MASK G9 MODES
0C32 A358 04637          JEPU BZLK                       BR. TO BUZZER TO LOCK


                * TEXT STRING TAPE - CALLED IN TEXT STRING SEARCH REVERSE. READS PREVIOUS
                * CKS AHEAD FOR EOT

0C33 E831 04643 TSTAPE   JEPR SKPACBLK
0C34 2F92 04644          BACM +2       EOT=1        BR IF EOT
0C35 E719 04645          JEPR SKPACSTP
0C36 2B94 04646          BACM +4       EOT=0        BR IF NOT EOT
0C37 E81F 04647          JEPR CLREOTFW
0C38 CB2A 04648          JEPR RDFWD3
0C39 CD7A 04649          JEPR SEH2RV
0C3A 8A44 04650          JEPU BZERI3

0C3B 8B2A 04652          JEPU RDFWD3


                * SET REVISE ON - CLEARS RW BUFFER SETS REVISE BIT (4) IN REG. G8 AND
                *                 TESTS THE RO BUFFER FOR DATA.

0C3C CDA0 04658 SERVON   JEPR CLRWRV
0C3D B10F 04659          CALR          M=10
```

```
ADDR CODE NUMBR LABEL    CMND NEXTADDR OPERAND            COMMENT

0C3E E795 04660          JEPR SEG8                   SET REVISE FLAG
0C3F CEF8 04661          JEPR TEROB2
0C40 9702 04662          BALG +2        (M=0)'       BRANCH IF NO DATA
0C41 CCDD 04663          JEPR RDRV
0C42 8060 04664          JEPU REKBIDL
0C43 8C44 04665          JEPU SERWRV

              * SET UP THE RW BUFFER WHEN REVISE IS TURNED ON: TRANSFERS RO BUFFER
              * TO RW BUFFER UP TO THE DATA THAT HAS NOT BEEN PLAYED OUT

0C44 B5E2 04671 SERWRV   CALG           M=GE'        SET UP RW BUFFER IN REVISE ON
0C45 B004 04672          CALG           G0=M
0C46 CEE8 04673          JEPR AJROLA
0C47 BAE2 04674          CALG           M=GE
0C48 B901 04675          CALG           M=M+G0+1
0C49 F024 04676          CALH           H2=M
0C4A CEB2 04677          JEPR AJROST
0C4B BA02 04678          CALG           M=G0
0C4C 8F5F 04679          JEPU XFRORWG0

              **ANAL. BMK OR EOR CODE PRINT
              ***G4

0C4D CED8 04686 ENDSCH   JEPR FERO+                       BR. TO FETCH FROM RO AND INC. ADDR
0C4E E307 04687          JEPR CVFF00                      BR. TO CONVERT FF TO 00
0C4F E86A 04688          JEPR SEBNAC                      BR. TO MAKE M RHE ACT. REF. BNO
0C50 9047 04689          BALG +7        M-G4=0       1>   BR. BRANCH IF SEARCH COMPLETE
0C51 E470 04690          JEPR EVSTOP                      BR. TO EVALUATE STOP KEY
0C52 9701 04691          BALG +1        (M=0)'       2>   BR. IF STOP KEY OR BIT ACTIVE
0C53 8C12 04692          JEPU CNSCH                       BR. TO CONTINUE SEARCH

0C54 801F 04694          CALR           M=01
0C55 92A1 04695          BALG +1        M.GA=0       BRANCH IF AUTO LOG NOT SET
0C56 000F 04696          RETN

0C57 8060 04698          JEPU REKBIDL                2<   BR. TO IDLE 3

0C58 BA72 04700          CALG           M=G7         1<
0C59 98C2 04701          BDAT +2        M=8C         3>   BR. IF CHAR. EQ. BMK
0C5A E87C 04702          JEPR FEBNAC                      BR. TO PUT ACT. BNO TO M
0C5B 8CF7 04703          JEPU COEORSCH                    BR. TO EOR DECISION

0C5C C853 04705          JEPR CPBM/EOR               3<   BR. TO BMK/EOR CODE PRINT
0C5D B40F 04706          CALR           M=40              SEARCH CODE MASK
0C5E 9295 04707          BALG -A        M.G9=0       2>   BR IF SEARCH BIT
0C5F BC0F 04708          CALR           M=C0
0C60 E7B2 04709          JEPR REG9                   RESET SEARCH AND S. CODE FLAGS
0C61 A38F 04710          JEPU RETN1

              *  TEST DUMP BIT (5) IN REG. GF.IF SET  REVERSE 1 BLOCK & SET REVISE
              *                    RECORD REG. H2.

0C62 BAF2 04716 TEDBRV   CALG           M=GF
0C63 1E51 04717          BPRT +1        DB5=1
0C64 000F 04718          RETN

0C65 2650 04720          CRWM           NRR
0C66 E831 04721          JEPR SKPACBLK
0C67 FA22 04722          CALH           M=H2
0C68 8D43 04723          JEPU RVRC

              *TRANSFER REMAINDER OF RO TO RW IN REVISE OFF
              *SET RO EQUAL TO RW AND REALIGN RO TO LAST CHAR PLAYED OUT

0C69 BAD2 04729 SERORWRV CALG           M=GD
0C6A B014 04730          CALG           G1=M         SAVE RO POINTER
0C6B B104 04731          CALG           G0=0
0C6C CF77 04732          JEPR XF/RORW
0C6D FA22 04733          CALH           M=H2         SUBTRACT # OF CHAR TRANSFERED TO
0C6E B501 04734          CALG           M=M-G0
0C6F F024 04735          CALH           H2=M
0C70 CEB2 04736          JEPR AJROST
0C71 CDE7 04737          JEPR AJRWST
0C72 B104 04738          CALG           G0=0
0C73 CF45 04739          JEPR XFRWROG0
0C74 CEE9 04740          JEPR AJROLAIF               PUT FILL CHARACTERS IN RW
0C75 FA22 04741          CALH           M=H2         BUFFER AFTER ALIGNING
0C76 B004 04742          CALG           G0=M         RO TO LAST CHARACTER
0C77 0B03 04743          JIPU +3
0C78 BFFF 04744          CALR           M=FF
0C79 CEE0 04745          JEPR INRO+
0C7A E73D 04746          JEPR DEC G0
0C7B 970C 04747          BALG -3        (M=0)'       BRANCH IF G0 NOT ZERO
0C7C BA12 04748          CALG           M=G1
0C7D 80E4 04749          CALG           GE=M
0C7E 8DEA 04750          JEPU AJRWLA

              * TURN REVISE ON AND OFF
              * CLEAR RW BUFFER, RESET DUMP BIT, SET REVISE BIT, TURN REVISE ON AND
              * READ INTO RO BUFFER, IF RO BUFFER NOT EMPTY MOVE RW HEAD
              * LEFT ONE TRACK
```

```
ADDR CODE NUMBR LABEL      CMND NEXTADDR OPERAND              COMMENT

0C7F E5A8 04759 SERV       JEPR TERV                     REVISE ON/OFF              CJ010
0C80 9302 04760            BALG +2        M=0            BRANCH IF NOT REVISE
0C81 CD01 04761            JEPR RERV
0C82 8060 04762            JEPU REKBIDL

0C83 2E45 04764            BRWM +5        WINH=1
0C84 2EC4 04765            BRWM +4        RUN=1
0C85 2AD3 04766            BRWM +3        ACT=0
0C86 2E92 04767            BRWM +2        EOT=1
0C87 820F 04768            CALR           M=20
0C88 9281 04769            BALG +1        M.G8=0         BRANCH IF LINE FLAG NOT SET
0C89 8A44 04770            JEPU BZERI3
0C8A CC3C 04771            JEPR SERVON
0C8B 8060 04772            JEPU REKBIDL

                 *TESTS STATUS OF REV. AND REC., CONV. G4 TO BINARY, TESTS FOR SCH. CODE
                 **FROM KBD. SETS G9 AND CKS REF. BNO.
                 ***G4

0C8C E5A5 04779 EXSC/SWS JEPR TERVRC                     BR. TO TEST REVISE AND RECORD STATUS
0C8D 9301 04780            BALG +1        M=0         1> BR. IF NOT IN REV. OR REC.
0C8E A3FC 04781            JEPU G4BIN                    CONVERT G4 FROM BCD TO BIN

0C8F 8A72 04783            CALG           M=G7           CHAR. TO M
0C90 1A71 04784            BPRT +1        DB7=0       2> BR. IF MSB EQ. TO 0  (NOT SCM CODE)
0C91 9872 04785            BDAT +2        M=87        3> BR. IF SCH CODE
0C92 E48F 04786            JEPR SW                    2< BR. TO EXECUTE SWITCH
0C93 9307 04787            BALG +7        M=0         4> BR. IF SWITCH EXECUTED
0C94 840F 04788            CALR           M=40        3< SCH CODE MASK
0C95 E780 04789            JEPR SEG9                     BR. TO SET G9
0C96 C854 04790            JEPR CPBCD
0C97 8A42 04791            CALG           M=G4           REF. BNO
0C98 9701 04792            BALG +1        (M=0)'         BR. IF REF. BNO NEQ 0
0C99 8C0C 04793            JEPU EXSCH                    BR. TO EXEC. SCH.

0C9A 8C0F 04795            JEPU ANSCHDIR                 BR. TO DIRECT SCH.

0C9B E3FC 04797            JEPR G4BIN
0C9C 8775 04798            JEPU SWPLAY                4< BR. TO SWITCH PLAY

                 * UPDATES THE REVISE LAMP AND GOES TO MONITOR

0C9D 0732 04803 UPRVLTBZ CKBD            BUZZ=3         REV LAMP MON               CJ080
0C9E 1309 04804 UPRVLT   CPRT            RBDN           REV L.M. WOB               CJ080
0C9F 810F 04805            CALR           M=10
0CA0 0CC1 04806            BKBD +1        2HZ=1
0CA1 E797 04807            JEPR REG8                     RESET REVISE FLAG
0CA2 E795 04808            JEPR SEG8                     SET REVISE FLAG
0CA3 807C 04809            JEPU MO

                 *SETS AC REP # TO 0.AND BRINGS TAPE TO BEGINNING.
                 **EVALUATES STOP KEY AND BIT.DECR. REF BNO.
                 **OKS  FOR BMK CODE TO TERMINATE SEARCH
                 ***G4.

0CA4 2750 04818 SCHREV   CACM            NRR            NORMAL READ REVERSE
0CA5 EB20 04819            JEPR CLREOTAC                 CLEAR ACT. MEDIA TO EOT
0CA6 2F94 04820            BACM +4        EOT=1       1> BR. IF ACT. AT. EOT
0CA7 2770 04821 CNSCHREV CACM            FRR         6< FAST READ REVERSE
0CA8 E800 04822            JEPR TE7SCGAP                 BR. TO TEST FOR MAX. DATA
0CA9 2F92 04823            BACM +2        EOT=1       2> BR. IF AT EOT
0CAA 0CB4 04824            BKBD +4        NS=1
0CAB 8C2B 04825            JEPU SCHER

0CAC E869 04827            JEPR SEBNAC=0
0CAD CAF2 04828            JEPR STOPACRD                 BR. TO STOP ACT. RDR
0CAE 8C12 04829            JEPU CNSCH                    BR. TO CONTINUE SEARCH

0CAF CCD4 04831            JEPR ANGAPSCH              3< BR. TO SCAN GAP
0CB0 E87C 04832            JEPR FEBNAC                   BR. TO FETCH AC BNO INTO M
0CB1 9044 04833            BALG +4        M-G4=0      4> BR. IF BNO EQUALS THUMBWHEELS
0CB2 E470 04834            JEPR EVSTOP                   BR. TO EVALUATE STOP KEY & BIT
0CB3 9702 04835            BALG +2        (M=0)'      5> BR. IF NO STOP KEY OR BIT
0CB4 E974 04836            JEPR DEC BNAC              4< BR. TO DFCR. ACT. REF. BNO
0CB5 8CA7 04837            JEPU CNSCHREV              6> BR. TO CONTINUE REV. SCH.

0CB6 2710 04839            CACM           NRF         5< NORMAL READ FWD.
0CB7 E7E9 04840            JEPR RVTPAC                   BR. TO REVERSE ACTIVE TAPE
0CB8 E369 04841            JEPR DLY MSKB                 BR. TO SET 2MS. DLY.
0CB9 CB2A 04842            JEPR RDFWD3                   BR. TO TRIPLE READ FORWARD
0CBA CED8 04843            JEPR FERO+                    BR. RO FETCH FWD
0CBB 8D74 04844            CALG           G7=M           STORE CHAR.
0CBC 88C9 04845            CALR           M=8C-M         BMK. CODE
0CBD 9701 04846            BALG +1        (M=0)'      7> BR. IF NOT A BMK CHAR.
0CBE 8C4D 04847            JEPU ENDSCH                   BR. TO TERMINATE SEARCH

0CBF 2750 04849            CACM           NRR         7> NORMAL READ REV.
0CC0 E831 04850            JEPR SKPACBLK                 BR. TO SKIP ACTIVE BLOCK
0CC1 8CA7 04851            JEPU CNSCHREV              6> BR. TO CONTINUE REVERSE SCH

                 * TEST ACTIVE TRANSPORT FOR SERVO OK

0CC2 2AD1 04857 ACSNOK   BRWM +1        ACT=0       1> BR. IF RW NOT ACTIVE
0CC3 8BC5 04858            JEPU RWSNOK
```

```
ADDR CODE NUMBR LABEL     CMND NEXTADDR OPERAND          COMMENT

OCC4 2D01 04860           BROM +1         ACT=1     1<>2BR. IF RO ACTIVE
OCC5 8A44 04861           JEPU BZERI3                    BR. TO ERROR BUZZER IDLE 3

OCC6 2908 04863 ROSNOK    BROM +8         TFWD=0
OCC7 2A97 04864           BRWM +7         EOT=0
OCC8 B?0F 04865           CALR            M=60
OCC9 E369 04866           JEPR DLY MSKB
OCCA 2500 04867           CROM            SRD
OCCB 2570 04868           CROM            FRR
OCCC E820 04869           JEPR CLREOTAC
OCCD E8C8 04870           JEPR REWINDRO
OCCE 8060 04871           JEPU REKBIDL

OCCF E81A 04873           JEPR EJRO
OCD0 B?0F 04874           CALR            M=60           SET 120 MS DELAY
OCD1 E369 04875           JEPR DLY MSKB                  BR. TO SET 2MS. DLY
OCD2 2500 04876           CROM            SRD            STOP RD TO RO
OCD3 A354 04877           JEPU BZLKM=G9                  BR. TO M=G9 BUZZER TO LOCK

                *TESTS SPEED AND TIMES OUT THROUGH GAP

OCD4 C07C 04882 ANGAPSCH JEPR MO                    1<   BR. TO MONITOR
OCD5 C0B8 04883           JEPR MORWSCH                   BR. TO MONITOR RW SEARCH
OCD6 287D 04884           BACM -2         GAP=0     1>   BR. IF NO GAP IN DATA
OCD7 E7EA 04885           JEPR TETSAC                    BR. TO TEST SPEED
OCD8 B1CF 04886           CALR            M=1C           SET 56 MS. DLY.
OCD9 E7CE 04887           JEPR TEMMSGAP                  BR. TO TEST MS DATA
OCDA OCA9 04888           BKBD -6         NM=1      1>   BR. IF MS DLY NOT EXP.
OCDB 000F 04889           RETN

                * TEST FOR DUMPING OF RW BUFFER IN THE REVISE MODE. IF DUMP FLAG
                * IS SET RECORD AND TRACK PRINT THE RW BUFFER. IF NOT TEST FOR DUMPING
                * CHARACTER THEN MOVE HEAD RIGHT. SET H2 & H3 WQUAL TO O AND READ
                * SIX CHARACTERS INTO THE ACTIVE BUFFER.

CDC CC62 04898 TEDUMPRV JEPR TEDBRV
CDD CDA0 04899 RDRV       JEPR CLRWRV
CDE CB2A 04900            JEPR RDFWD3
CDF BA72 04901            CALG            M=G7
CE0 F074 04902            CALH            H7=M
CE1 CED8 04903            JEPR FERO+
CE2 B074 04904            CALG            G7=M
CE3 C848 04905            JEPR ANBM/EOR
CE4 9309 04906            BALG +9         M=0       BRANCH IF BLOCK MARK OR END OF RECORD
CE5 98C2 04907            BDAT +2         M=BC      BRANCH IF REFERENCE CODE
CE6 BACF 04908            CALR            M=AC      2<-
CE7 D075 04909            BALH +5         M-H7=0    4>   BR. IF REV KEY
CE8 CD9E 04910            JEPR ENDRERV
CE9 B80F 04911            CALR            M=B0
CEA 9291 04912            BALG +1         M.G9=0    BRANCH IF SEARCH FLAG-NOT SET
CEB 8A44 04913            JEPU BZERI3

CEC 8060 04915            JEPU REKBIDL

CED 8BFB 04917            JEPU CLEORRV              4<

CEE CD7A 04919            JEPR SEH2RV
CEF A23B 04920            JEPU CLH4-H7

                *VERIFY EOR TEST RO FOR NULL. CK. FOR EOR
                ***G4,

CF0 E7D1 04927 ANEORSCH JEPR RDEORRVS                    BR. TO VERIFY EOR
CF1 CEDB 04928            JEPR FERO+                     BR. TO FETCH CHAR. FROM RO AND INC.
CF2 9305 04929            BALG +5         M=0       1>   BR. IF CHAR. EQ. O(NULL).
CF3 8809 04930            CALR            M=B0-M
CF4 9301 04931            BALG +1         M=0       2>.  BR. IF CHAR. EQ. EOR
CF5 8BEF 04932            JEPU CLGAP                     BR. TO CLEAR LARGE GAP

CF6 CAEF 04934 XF&COEOR JEPR XFROBNAC               2<   BR. TO PROCESS EOR
CF7 9146 04935 COEORSCH BALG +6           M>G4      3>   BR IF BNO GT DESIRED BLOCK
CF8 B01F 04936            CALR            M=01
CF9 92A3 04937            BALG +3         M.GA=0         BR IF NOT AUTO-LOG
CFA CE5C 04938            JEPR AJRO-
CFB C848 04939            JEPR ANBM/EOR
CFC 8060 04940            JEPU REKBIDL

FD 8C2B 04942             JEPU SCHER                1<   BR. TO SEARCH UNSUCCESSFUL

FE 8CA4 04944             JEPU SCHREV                    BR. TO SCH IN REVERSE

FF 8384 04947             *CHECK WORD*
00 8D9E 04947             JEPU ENDRERV

              * TURN REVISE OFF
              * IF DUMP BIT NOT SET MOVE HEAD RIGHT AND END RECORD REVISE
              * IF SET TEST RO BUFFER FOR FORMAT AND CLEAR RO BUFFER IF TRUE
              * OTHERWISE TEST FOR FIT IN REVISE AND RECORD RW BUFFER

01 B20F 04954 RERV        CALR            M=20      TURN REV OFF               CJ020
02 92FD 04955             BALG -2         M.GF=0    BRANCH IF DUMP NOT SET
03 CEFB 04956             JEPR TEROB3
04 E4FC 04957             JEPR TEMFMT
```

```
ADDR CODE NUMBR LABEL     CMND NEXTADDR OPERAND           COMMENT

0D05 9703 04958           BALG +3        (M=0)'    BRANCH IF NOT FORMAT
0D06 CDBB 04959           JEPR FERW
0D07 9308 04960           BALG -7        M=0       BRANCH IF NO DATA IN RW
0D08 CEAE 04961           JEPR CLRO
0D09 CD5C 04962           JEPR TEFITRV
0D0A 9301 04963           BALG +1        M=0       BRANCH IF ROOM IN RO
0D0B A354 04964           JEPU BZLKM=G9

0D0C CC69 04966           JEPR SERORWRV
0D0D 2050 04967           CRWM           NRR
0D0E E831 04968           JEPR SKPACBLK
0D0F FA22 04969           CALH           M=H2
0D10 CD43 04970           JEPR RVRC
0D11 CAF2 04971           JEPR STOPACRD
0D12 8D9E 04972           JEPU ENDRERV

                * SEARCH FORWARD:MOVE TAPE FORWARD AT HIGH SPEED AND BMK GAPS:
                * WHEN THE CORRECT BLOCK MARK IS THOUGHT TO BE FOUND READ
                * AND VERIFY BLOCK MARK:IF STOP KEY IS DEPRESSED TERMINATE AT NEXT BLOCK
                * MARK  USES G4,G2

0D13 8BEF 04980           JEPU CLGAP                1<  BR. TO CLEAR LARGE GAP

0D14 E81F 04982           JEPR CLREOTFW
0D15 E86D 04983           JEPR INC BNAC                 BR. TO INCR. BNO REFERRENCE
0D16 904C 04984           BALG -3        M-G4=0
0D17 2730 04985           CACM           FRF            FAST READ FORWARD
0D18 B04F 04986           CALR           M=04           SET 2SEC. DELAY
0D19 E801 04987           JEPR TEMHSGAP                 BR. TO TEST DATA
0D1A 0C83 04988           BKBD +3        NS=1
0D1B 8CF0 04989           JEPU ANEORSCH

0D1C 2F97 04991 SCHFWD    BACM -8        EOT=1
0D1D 2730 04992 CNSCHFWD  CACM           FRF            FAST READ FORWARD
0D1E CCD4 04993           JEPR ANGAPSCH             2<  BR. TO SCAN GAP
0D1F E86D 04994           JEPR INC BNAC                 BR. TO INCR BLOCK NUMBER
0D20 9047 04995           BALG +7        M-G4=0     4>  BR. IF BNO EQUALS THUMBWHEELS
0D21 E470 04996           JEPR EVSTOP                   BR. TO EVALUATE STOP KEY
0D22 9705 04997           BALG +5        (M=0)'     4>  BR. IF STOP KEY
0D23 B80F 04998           CALR           M=80           SET 160 MS. DELAY
0D24 E7CE 04999           JEPR TEMMSGAP                 BR. TO TEST MS. DATA
0D25 0CA1 05000           BKBD +1        NM=1
0D26 8CF0 05001           JEPU ANEORSCH

0D27 8D1D 05003           JEPU CNSCHFWD

0D28 B80F 05005           CALR           M=80       4<  SEARCH BIT MASK
0D29 E7B2 05006           JEPR REG9                     BR. TO RESET SEARCH BIT
0D2A CEAE 05007           JEPR CLRO                     BR. TO CLEAR RO
0D2B 2710 05008           CACM           NRF            NORMAL READ FORWARD
0D2C E80E 05009           JEPR TE.75GAP                 BR. TO TEST SPECIAL DATA
0D2D B80F 05010           CALR           M=80           SEARCH BIT MASK
0D2E E7B0 05011           JEPR SEG9                     BR. TO SET SEARCH BIT
0D2F 0886 05012           BKED -9        NS=0
0D30 8124 05013 RDFWDSCH  CALG           G2=0           RESET RLRC
0D31 805F 05014           CALR           M=05           MAX. NO. OF READS TO BE MADE
0D32 8004 05015           CALG           G0=M
0D33 C82D 05016           JEPR RDFWDSPC                 BR. TO SPEC. READ FWD.
0D34 CED8 05017           JEPR FERO+                    FETCH FROM RO AND INC. ADDR.
0D35 8074 05018           CALG           G7=M           STORE CHAR.
0D36 88C9 05019           CALR           M=BC-M
0D37 9306 05020           BALG +6        M=0        6>  BR. IF CHAR. EQ. BMK
0D38 80C9 05021           CALR           M=OC-M
0D39 9305 05022           BALG +5        M=0        7>  BR. IF CHAR. EQ. EOR
0D3A E470 05023           JEPR EVSTOP                   BR. TO EVALUATE STOP KEY
0D3B 9701 05024           BALG +1        (M=0)'     8>  BR. IF STOP KEY OR BIT ACTIVE
0D3C E874 05025           JEPR DEC BNAC                 BR. TO DECR ACTIVE REFERENCE BNO
0D3D 8C12 05026           JEPU CNSCH                8<  BR. TO CONTINUE SEARCH

0D3E 8C4D 05028           JEPU ENDSCH               6<  BR. TO TERMINATE SEARCH

0D3F 8CF6 05030           JEPU XF8COEOR             7<  BR. TO EOR DECISTION LESS 1 INSTR.

                * RECORD THE RW BUFFER IN REVISE MODE. CLEAR THE BW BUFFER
                * H2 CONTAINS NO. OF FILL CHARACTERS.

0D40 BFFF 05037           CALR           M=FF       1<
0D41 CDBF 05038           JEPR INRW+
0D42 E767 05039           JEPR DEC H2
0D43 970C 05040 RVRC      BALG -3        (M=0)'    BRANCH IF H2 NOT ZERO
0D44 CE8D 05041           JEPR ANRWBCEN
0D45 803F 05042           CALR           M=03
0D46 8004 05043           CALG           G0=M
0D47 0833 05044           JIPU +3
0D48 2050 05045 RVRC1     CRWM           NRR
0D49 E8B1 05046           JEPR SKPRWBLK
0D4A E369 05047           JEPR DLY MSKB
0D4B CDE7 05048           JEPR AJRWST
0D4C 2010 05049           CRWM           NRF
0D4D CAC0 05050           JEPR RDSTRV
0D4E 2090 05051           CRWM           NWF
0D4F CBE7 05052           JEPR RCRVON
0D50 C98C 05053           JEPR WRDATA
0D51 CDA6 05054           JEPR ENDRCRV
0D52 BA22 05055           CALG           M=G2
0D53 9307 05056           BALG +7        M=0        BRANCH IF NO DATA
```

```
ADDR CODE NUMBR LABEL     CMND NEXTADDR OPERAND              COMMENT

0D54 E73D 05057           JEPR DEC GO
0D55 9301 05058           BALG +1       M=0          BRANCH IF GO = 0
0D56 8D48 05059           JEPU RVRC1

0D57 CDA0 05061           JEPR CLRWRV
0D58 2A91 05062           BRWM +1       EOT=0        4>
0D59 8A51 05063           JEPU WEOT

0D5A 8D6D 05065           JEPU LKRVER                4<

0D5B 8DA0 05067           JEPU CLRWRV

               * TEST THE RO BUFFER TO SEE IF THE REVISION WILL FIT
               * USE GO AS TEMPORARY

0D5C BAE2 05073 TEFITRV   CALG          M=GE
0D5D B004 05074           CALG          GO=M         SAVE RO POSITION
0D5E CEFD 05075           JEPR AJROLADA              GO TO END OF DATA
0D5F B502 05076           CALG          M=GO'
0D60 9302 05077           BALG +2       M=0
0D61 BA02 05078           CALG          M=GO
0D62 91E3 05079           BALG +3       M>GE
0D63 BAE2 05080           CALG          M=GE         COMPUTE NUMBER OF CHARACTERS LEFT IN RO
0D64 8101 05081           CALG          M=M-GO
0D65 D523 05082           BALH +3       M=M-H2>0     BRANCH IF # OF CHAR IN RO > H2
0D66 BA02 05083           CALG          M=GO
0D67 B0E4 05084           CALG          GE=M         RESTORE POINTER
0D68 A724 05085           JEPU CLM

0D69 930C 05087           BALG -3       M=0          BRANCH IF # OF CHAR IN RO = H2
0D6A BA02 05088           CALG          M=GO         RESTORE RO POINTER
0D6B B0E4 05089           CALG          GE=M
0D6C A728 05090           JEPU SEM=FF

               * LOCK UP IF REVISE ERROR
               * SET FLASHING RECORD LIGHT, BUZZ AND WAIT UNTIL
               * STOP KEY IS DEPRESSED
               * THEN SET REVISE LIGHT AND END RECORD AND REVISE

0D6D B10F 05098 LKRVER    CALR          M=10
0D6E E369 05099           JEPR DLY MSKB
0D6F CAF2 05100           JEPR STOPACRD
0D70 B30F 05101           CALR          M=30
0D71 E780 05102           JEPR SEG9
0D72 CC9D 05103           JEPR UPRVLTBZ
0D73 083E 05104           BKBD -1       STOP=0       1>
0D74 0702 05105           CKBD          BUZZ=0
0D75 B10F 05106           CALR          M=10
0D76 E795 05107           JEPR SEG8
0D77 C5FC 05108           JEPR RESET RC
0D78 CD9E 05109           JEPR ENDRERV
0D79 8060 05110           JEPU REKBIDL

               * SET UP THE H2 REGISTER WITH NO. OF CHARACTERS LEFT IN BLOCK IN
               * REVISE MODE

0D7A CEE8 05116 SEH2RV    JEPR AJROLA
0D7B B9E1 05117           CALG          M=M+GE+1
0D7C F024 05118           CALH          H2=M
0D7D 8EB2 05119           JEPU AJROST

               * EXECUTE FORWARD TEXT STRING SEARCH - AFTER ANAL. BUFFER CK. STOP KEY.
               *                                    - ANAL. FMT CHAR.
               *                                    - IF BMK. OR EOR CLEAR RO & BUZZ (QUE
               *                                                DID NOT COMPARE)
               *                                    - ALL OTHER CHAR.: RECORD & COMPARE.

0D7E C07C 05128 EXTSFWD   JEPR MO
0D7F CDBB 05129           JEPR FERW
0D80 9702 05130           BALG +2       (M=0)'    A>    BR IF NOT END OF BLOCK
0D81 0831 05131           BKBD +1       STOP=0    A>    BR IF STOP KEY NOT DEPRESSED
0D82 8060 05132           JEPU REKBIDL                  TERM SCH IF STOP KEY & END OF BLK

0D83 CF05 05134           JEPR FECH               A<
0D84 E706 05135           JEPR XFH10G47
0D85 B109 05136           CALR          M=10-M
0D86 9702 05137           BALG +2       (M=0)'    B>    BR IF NOT FORMAT CODE (10)
0D87 CC00 05138           JEPR ANFMTTS
0D88 8D7E 05139           JEPU EXTSFWD

0D89 B849 05141           CALR          M=84-M
0D8A 9703 05142           BALG +3       (M=0)'    BRANCH IF NOT BMK
0D8B C848 05143           JEPR ANBM/EOR
0D8C CEAE 05144           JEPR CLRO
0D8D 8A44 05145           JEPU BZERI3

0D8E BF49 05147           CALR          M=F4-M
0D8F 930B 05148           BALG -4       M=0       BRANCH IF EOR
0D90 CF0E 05149           JEPR FECHRO-            ADJUST RO BACK
```

```
ADDR CODE NUMBR LABEL     CMND NEXTADDR OPERAND              COMMENT

0D91 CE6D 05150           JEPR TETSCOMP
0D92 9304 05151           BALG +4         M=0      BRANCH IF COMPARE
0D93 CF30 05152           JEPR FECHRO+
0D94 CBAD 05153           JEPR RCCH
0D95 8D7E 05154           JEPU EXTSFWD             TRY NEXT CHAR

0D96 CBAD 05156           JEPR RCCH
0D97 CF30 05157           JEPR FECHRO+
0D98 9303 05158           BALG +3         M=0      BRANCH IF END OF RO
0D99 E706 05159           JEPR XFH10G47            TEST NEXT CHAR FOR PRINTING CHAR
0D9A E533 05160           JEPR TEMPCSP
0D9B 970A 05161           BALG -5         (M=0)'   BRANCH IF PRINT CHARACTER OR SPACE
0D9C CF0E 05162           JEPR FECHRO-
0D9D 805F 05163           JEPU BZI3

          * END REVISE .RESET REVISE FLAG . RESET DUMP FLAG .IF G7=AC (REVISE KEY)
          * CLEAR RW BUFFER IF  NOT CLEAR RW BUFFER AS WELL AS H3

0D9E 810F 05169 ENDRERV   CALR            M=10
0D9F E797 05170           JEPR REGB                RESET REVISE FLAG
0DA0 820F 05171 CLRWRV    CALR            M=20
0DA1 E78F 05172           JEPR REGF                RESET DUMP FLAG
0DA2 BACF 05173           CALR            M=AC
0DA3 9071 05174           BALG +1         M-G7=0   1>  BR IF REVISE KEY
0DA4 A4C9 05175           JEPU CLRWH3

0DA5 8DE2 05177           JEPU CLRW                1<

          *  TERMINATE RECORDING OF DATA IN REVISE

0DA6 CAF7 05183 ENDRCRV   JEPR CKRLRC
0DA7 2E2E 05184           BRWM -1         WDB=1    WAIT FOR LAST CHAR TO BE WRITTEN
0DA8 808F 05185           CALR            M=08
0DA9 F024 05186           CALH            H2=M
0DAA CAF7 05187           JEPR CKRLRC
0DAB E767 05188           JEPR DEC H2
0DAC 970D 05189           BALG -2         (M=0)'   WAIT APPR. 150 MICRO SECS FOR LAST
0DAD 2610 05190           CRWM            NRF      BIT TO BE WRITTEN
0DAE 805F 05191           CALR            M=05
0DAF 0003 05192           CKBD            2MDLY
0DB0 0CA1 05193           BKBD +1         NM=1
0DB1 806D 05194           JEPU LKRVER
0DB2 2A1D 05195           BRWM -2         RDR=0
0DB3 2210 05196           CRWM            M=RR
0DB4 9701 05197           BALG +1         (M=0)'   BRANCH IF NOT END OF DATA
0DB5 A16A 05198           JEPU RDCARLRC

0DB6 CAF9 05200           JEPR UPDARLRC
0DB7 E880 05201           JEPR TEDATRW
0DB8 970A 05202           BALG -5         (M=0)'   BRANCH IF DATA IN RW
0DB9 000F 05203           RETN

          * FETCH A CHARACTER FROM THE RW BUFFER IN FERW+ FETCH NEXT CHARACTER
          * IN FERW FETCH PRESENT CHARACTER  GD IS BUFFER POINTER

  A E748 05209 FERW+      JEPR INC GD              INCRIMENT BUFFER POINTER
  B BAD2 05210 FERW       CALG            M=GD
  C 3004 05211            CMEM            AOIN     SET BUFFER ADDRESS
  D 84C9 05212            JEPU MOUT

          * CLEAR RW BUFFER IN CLRW+1 AND INSERT M INTO RW BUFFER IN INRW+
          * M IS SAVED IN HB

  E 800F 05218 CLRW+1     CALR            M=00     INSERT A ZERO IN RW
  F F084 05219 INRW+      CALH            HB=M     INSERT M IN RWB
  ) E748 05220            JEPR INC GD              INCRIMENT BUFFER POINTER
  I 3004 05221            CMEM            AOIN     SET BUFFER ADDRESS
  ? 8EE3 05222            JEPU HBMIN

          * PROCESSING OF LAST CHARACTER IN REVISE MODE: CLEAR KEYBOARD STACK. UPDAT
          * REVISE LAMP. WAIT FOR ENTRY. IF CHC OR LRC RETURN TO IDLE MODE. IF
          * TRACK LINE RECORD CHARACTER

 0732 05229 LKRVLIM       CKBD            BUZZ=3   LAST REV CH               CJ070
 E27E 05230               JEPR CLKS
 CC9E 05231               JEPR UPRVLT
 0831 05232               BKBD +1         STOP=0
 0702 05233               CKBD            BUZZ=0
 084C 05234               BKBD -3         STROBE=0
 E1C9 05235               JEPR XFKBKS
 CCA9 05236               JEPR CVKBINP
 85AA 05237               CALR            M=M+5A
 9302 05238               BALG +2         M=0
 BF01 05239               CALG            M=M+1
 9704 05240               BALG -8         (M=0)'
 0702 05241               CKBD            BUZZ=0
 810F 05242               CALR            M=10
 E795 05243               JEPR SEGB                SET REVISE FLAG ON
 8061 05244               JEPU RESTPIDL

          * SEARCH RW BUFFER FOR A 14 CODE (WORD UNDERSCORE) REPLACE WITH
          * A 13 CODE
```

```
ADDR CODE NUMBR LABEL     CMND NEXTADDR OPERAND          COMMENT

                                                    REPLACE R CENT          CJ100
0DD3 CDE7 05250 CVCENTRW JEPR AJRWST
0DD4 CE15 05251          JEPR FECHRW+
0DD5 9308 05252          BALG +8        M=0         BRANCH IF NO DATA
0DD6 B149 05253          CALR           M=14-M
0DD7 970C 05254          BALG -3        (M=0)'      BRANCH IF WORD UNDERSCORE CODE
0DD8 CAFC 05255          JEPR AJRW-
0DD9 B13F 05256          CALR           M=13
0DDA CE04 05257          JEPR CVRWCH
0DDB CDBA 05258          JEPR FERW+
0DDC BA22 05259          CALG           M=G2
0DDD 9301 05260          BALG +1        M=0         BRANCH IF NO DATA
0DDE 000F 05261          RETN
0DDF BA0F 05262          CALR           M=A0
0DE0 B024 05263          CALG           G2=M
0DE1 8E04 05264          JEPU CVRWCH

        * CLEAR RW BUFFER WITHOUT AFFECTING THE BUFFER POINTER
0DE2 F1F4 05268 CLRW     CALH           HF=0
0DE3 B00F 05269          CALR           M=00
0DE4 3004 05270          CMEM           A0IN        SET BUFFER ADDRESS TO ZERO
0DE5 300A 05271 CLRWCONT CMEM           MINI
0DE6 1AFE 05272          BPRT -1        MAZ=0       BRANCH IF NOT DONE

        *         GO TO BEGINNING OF RW BUFFER
0DE7 BFFF 05276 AJRWST   CALR           M=FF        SET POINTER TO FF
0DE8 B0D4 05277          CALG           GD=M
0DE9 A724 05278          JEPU CLM

        * IN AJRWLA ADJUST RW BUFFER TO LAST DATA AND ADJUST POINTER
        * IN AFROLAIF ADJUST RW BUFFER TO LAST DATA DO NOT ADJUST
        * POINTER
0DEA CDE7 05285 AJRWLA   JEPR AJRWST                GO TO BEGINNING

0DEB CDBA 05287 AJRWLAIF JEPR FERW+                 GET THE NEXT CHARACTER OUT OF RWB
0DEC 970E 05288          BALG -1        (M=0)'      BRANCH IF NOT ZERO
0DED BAFC 05289          JEPU AJRW-                 BACK UP TO LAST CHAR

        * CLEAR THE RW BUFFER FROM THE PRESENT POSITION TO THE END
0DEE BAD2 05294 CLRW+M   CALG           M=GD        PUT RW BUFFER ADDRESS IN M
0DEF BF01 05295          CALG           M=M+1       INCREMENT RW BUFFER ADDRESS
0DF0 F004 05296          CALH           H0=M        PUT NEW ADDRESS IN H0
0DF1 CDBA 05297          JEPR FERW+                 FETCH NEXT FROM RW
0DF2 F0C4 05298          CALH           HC=M        SAVE POINTER IN HC
0DF3 BAD2 05299          CALG           M=GD        PUT OLD B A IN M
0DF4 F501 05300          CALH           M=M-H0
0DF5 3004 05301          CMEM           A0IN        ADDRESS NEXT POSITION IN BUFFER
0DF6 FAC2 05302          CALH           M=HC        INPUT FROM BUFFER
0DF7 3008 05303          CMEM           MIN
0DF8 9708 05304          BALG -7        (M=0)'      BRANCH IF STILL DATA
0DF9 8DE5 05305          JEPU CLRWCONT

        * CLEAR THE RW BUFFER FROM THE END TO BEGINNING OF DATA
                                                    CLEAR FIRST CHAR
0DFA CDBE 05310 CLRWEOD  JEPR CLRW+1                CLEAR TO START OF BUFFER
0DFB 300A 05311          CMEM           MINI
0DFC 1AFE 05312          BPRT -1        MAZ=0       GO TO END OF DATA
0DFD 8DEA 05313          JEPU AJRWLA

        * FETCH THE LAST CHARACTER FROM THE RW BUFFER
0DFF 7C1C 05318          *CHECK WORD*               DECRIMENT POINTER
0E00 E74A 05318 FERW-    JEPR DEC GD                AND FETCH CHAR
0E01 8DBB 05319          JEPU FERW

        * INSERT DATA INTO THE RW BUFFER CONVERT THE 00 TO FF
0E02 E3DB 05324 INDATRW+ JEPR CV00FF                CONVERT 00 TO FF
0E03 8DBF 05325          JEPU INRW+                 STORE FORWARD

                                                    BACK BEHIND CHAR...
0E04 CAFC 05329 CVRWCH   JEPR AJRW-                 ...AND INSERT
0E05 8DBF 05330          JEPU INRW+

                                                    DECRIMENT BUFFER POINTER
0E06 E74A 05334 RECHRWB  JEPR DEC GD                SET MEMORY ADDRESS
0E07 3006 05335          CMEM           A0INI       INCRIMENT ADDRESS
0E08 3002 05336          CMEM           AINC        OUTPUT NEXT CHAR AND DECR ADDRESS
0E09 3011 05337          CMEM           MOUTD       INPUT CHAR AND INCRIMENT CHAR
0E0A 300A 05338          CMEM           MINI        MEMORY OUTPUT =0
0E0B 1BBC 05339          BPRT -3        MEZ=0       YES
0E0C 000F 05340          RETN

        * FETCH PREVIOUS CHARACTER AND CLEAR THE REMAINDER OF RW BUFFER
                                                    RW A&C                  CK090
0E0D CF1D 05345 AJ&CLRWB JEPR FECHRW-
0E0E 8DFA 05346          JEPU CLRWEOD
```

```
ADDR CODE NUMBR LABEL     CMND NEXTADDR OPERAND              COMMENT

                  *         LOOK ONE CHARACRTER AHEAD IN RW BUFFER
                  *         STORES THE CHARACTER IN HO AND SECOND CHARACTER IN H1 IF ANY

0E0F CE15 05353 TERWB     JEPR FECHRW+                  FETCH NEXT COMPLETE CHAR
0E10 FA12 05354           CALH          M=H1
0E11 9301 05355           BALG +1       M=0             SECOND CHARACTER?
0E12 CAFC 05356           JEPR AJRW-                    YES. ADJUST FOR SECOND CHAR
0E13 FA02 05357           CALH          M=HO
0E14 8AFC 05358           JEPU AJRW-                    ADJUST FOR FIRST CHAR

0E15 F114 05361 FECHRW+   CALH          H1=0            RW FCH NEXT              CK060
0E16 CDBA 05362           JEPR FERW+
0E17 F004 05363           CALH          HO=M
0E18 E468 05364           JEPR TEM2CH
0E19 9702 05365           BALG +2       (M=O)'          BRANCH IF NO SECOND CHARACTER
0E1A CDBA 05366           JEPR FERW+
0E1B F014 05367           CALH          H1=M
0E1C 8AD1 05368           JEPU XFM=HO

                  * FETCH THE NEXT CHARACTER IN THE RW BUFFER

0E1D CE15 05373 FEXFTERW JEPR FECHRW+
0E1E E706 05374           JEPR XFH10G47
0E1F A520 05375           JEPU TEMCR

                  *         INSERT A CHARACTER IN RW BUFFER AND ALIGN TO IT
                  **USES HB AND HD

0E20 F0B4 05381 LDMRW&AJ CALH           HB=M            SAVE THE CHARACTER IN HB
0E21 CDBA 05382           JEPR FERW+
0E22 3010 05383           CMEM          MOUT            GET CHAR OUT OF BUFFER
0E23 F0D4 05384           CALH          HD=M            AND SAVE IN HD
0E24 FAB2 05385           CALH          M=HB            GET THE CHARACTER SAVED IN HB
0E25 300A 05386           CMEM          MINI            INPUT MEMORY AND INCR ADDRESS
0E26 FAD2 05387           CALH          M=HD
0E27 F0B4 05388           CALH          HB=M            XFER HD TO HB
0E28 9709 05389           BALG -6       (M=O)'          CONTINUE INSERTING CHARACTERS UNTIL END
0E29 000F 05390           RETN          END

                  * TEST IF RW BUFFER IS FULL

0E2A 803F 05395 TERWFULL CALR           M=03
0E2B 9:D1 05396           BALG +1       M=M+GDC            BR. IF POINTER = 253 OR 254
0E2C A724 05397           JEPU CLM

0E2D 8FEA 05399           CALR          M=M+FE
0E2E 000F 05400           RETN

                  * ADJUST RW BUFFER POINTER BY THE VALUE IN M

0E2F B900 05405 AJRWBM    CALG          M=M+GD
0E30 B0D4 05406           CALG          GD=M            ADD M TO POINTER
0E31 000F 05407           RETN

0E32 F174 05410 CTRWH7    CALH          H7=0            SCAN RWB                 CK100
0E33 0801 05411           JIPU +1
0E34 E783 05412           JEPR UPH7CHCT
0E35 CE15 05413           JEPR FECHRW+
0E36 970D 05414           BALG -2       (M=O)'
0E37 8AFC 05415           JEPU AJRW-

                  * REMOVE ALL SPACES FROM THE RW BUFFER

0E38 CDBA 05421 CLRWSP    JEPR FERW+                    RWB CLR SP ONLY          CK110
0E39 9ACE 05422           BDAT -1       M=20
0E3A 9301 05423           BALG +1       M=0
0E3B A9FA 05424           JEPU AJRWJ
0E3C E9FA 05425           JEPR AJRWJ
0E3D 8DFA 05426           JEPU CLRWEOD

                  * SEARCH ACTIVE TAPE  FOR  END OF RECORD . WHILE  LOOKING TEST FORWARD
                  * SEARCH SPEED AND GO THROUGH  SYSTEM MONITOR

0E3E 0C3F 05433 SCHEOR    BKBD -0       STOP=1             CLEAR STOP KEY
0E3F 2730 05434           CACM          FRF                FAST READ FORWARD
0E40 2896 05435           BACM +6       EOT=0         1>   BR. IF NOT AT EOT
0E41 E820 05436           JEPR CLREOTAC                    BR. TO CLR. ACT. RDR TO EOT
0E42 2F93 05437           BACM +3       EOT=1         2>   BR. IF AT EOT
0E43 B04F 05438 CNSCHEOR CALR           M=04          6<
0E44 E800 05439           JEPR TE7SCGAP                    BR. TO TEST FOR MAX. DATA
0E45 0CB1 05440           BKBD +1       NS=1          1>   BR. IF 1/2 SEC. DLY NOT EXP.
0E46 8C20 05441           JEPU SCHER                  2<   BR. TO SCH. UNSUCCESSFUL

0E47 E7EA 05443           JEPR TETSAC                 1<   BR. TO TEST SPEED
0E48 C07C 05444           JEPR MO                          BR. TO MONITOR
0E49 2B7E 05445           BACM -1       GAP=0         3>   BR. IF NO GAP IN DATA
0E4A B80F 05446           CALR          M=80               SET 160MS. WAIT
```

```
ADDR CODE NUMBR LABEL     CMND NEXTADDR OPERAND              COMMENT

0E4B E7CE 05447           JEPR TEMMSGAP                BR. TO MSEC. DATA TEST
0E4C 0832 05448           BKBD +2        STOP=0        BR. IF NO STOP KEY
0E4D E8C2 05449           JEPR REWINDAC                REWIND TAPE
0E4E A869 05450           JEPU SEBNAC=0

0E4F 0CA8 05452           BKBD -7        NM=1          BR. IF DLY NOT EXPIRED
0E50 E7D1 05453           JEPR RDEORRVS                BR. TO VERIFY EOR
0E51 CED8 05454           JEPR FERO+                   BR. TO FETCH AND INC.
0E52 9701 05455           BALG +1        (M=O)'   5>   BR. IF NEQ. O(NULL)
0E53 8C2B 05456           JEPU SCHER                   BR. TO SCH. UNSUCCESSFUL

0E54 B809 05458           CALR           M=BO-M   5<
0E55 9302 05459           BALG +2        M=Q      7>   BR. IF CHAR. EQ. EOR
0E56 2730 05460           CACM           FRF           FAST READ FWD.
0E57 8E43 05461           JEPU CNSCHEOR           6>   BR. TO CONT SCH. TO EOR

0E58 CAEF 05463           JEPR XFROBNAC           7<   BR. TO PROCESS EOR
0E59 BB0F 05464           CALR           M=BO          MASK
0E5A BE92 05465           CALG           M=M.G9        MASK SCM;SCH. CODE, RECD. FLASH
0E5B 000F 05466           RETN


0E5C F0B4 05469 AURO-     CALH           HB=M     SAVE M
0E5D E756 05470           JEPR DEC GE             DECRIMENT POINTER
0E5E FAB2 05471 XFM=HB    CALH           M=HB
0E5F 000F 05472           RETN

0E60 CF1D 05476           JEPR FECHRW-            FETCH LAST CHAR
0E61 E787 05477           JEPR AJH7CHCT
0E62 FA02 05478           CALH           M=HO
0E63 9A03 05479           BDAT +3        M=20     BRANCH IF SPACE
0E64 E401 05480           JEPR CAMJCS
0E65 E8FC 05481           JEPR SUG10H54
0E66 0801 05482           JIPU +1
0E67 E76D 05483           JEPR DEC H6
0E68 FA72 05484 AJRW&H7   CALH           M=H7     RETN&COMP                CK100
0E69 9706 05485           BALG -9        (M=O)'   BRANCH IF DATA
0E6A 000F 05486           RETN


               *TEST FOR TEXT STRING COMPARE RETURN M=00 IF COMPARE.
               **GO,G1,G3

0E6B B104 05492 TETSCOMP CALG            GO=O            GO POINTS TO CHAR IN QUE
0E6C BAE2 05493          CALG            M=GE
0E6D 8014 05494          CALG            G1=M            SAVE RO BUFFER POINTER IN G1
0E6E BA02 05495 TETSCONT CALG            M=GO
0E6F B90A 05496          CALR            M=M+90
0E70 E3BB 05497          JEPR FEA2RAM
0E71 9703 05498          BALG +3         (M=O)'   C>     BR IF TEST NOT COMPLETE
0E72 BA12 05499          CALG            M=G1
0E73 80E4 05500          CALG            GE=M            RESTORE RO BUFFER POINTER
0E74 A724 05501          JEPU CLM                        SEARCH IS SUCCESSFUL

0E75 CF30 05503          JEPR FECHRO+
0E76 9701 05504          BALG +1         (M=O)'
0E77 8E88 05505          JEPU TETSEX

0E78 B034 05507          CALG            G3=M
0E79 99A3 05508          BDAT +3         M=1A     BRANCH IF PRECEDENTED HYPHEN
0E7A E52A 05509          JEPR TEMSP
0E7B 9703 05510          BALG +3         (M=O)'   BRANCH IF NOT SOME TYPE SPACE
0E7C B0DF 05511          CALR            M=OD
0E7D B13A 05512          CALR            M=M+13
0E7E B034 05513          CALG            G3=M              CONVERT ALL SPACES TO STD SP
0E7F BA32 05514          CALG            M=G3     A<
0E80 E533 05515          JEPR TEMPCSP
0E81 970A 05516          BALG +A         (M=O)'   B>     BR IF NOT PRINTING CHAR OR SPACE
0E82 C12A 05517          JEPR CVG3TOPC                    CONVERT TO UNIQUE PRINTING CODE
0E83 B034 05518          CALG            G3=M
0E84 BA02 05519          CALG            M=GO
0E85 B90A 05520          CALR            M=M+90
0E86 E3BB 05521          JEPR FEA2RAM                     FETCH CHAR FROM QUE
0E87 9033 05522          BALG +3         M-G3=O   B>   BR IF COMPARE
0E88 BA12 05523 TETSEX   CALG            M=G1
0E89 80E4 05524          CALG            GE=M             RESTORE RO BUFFER POINTER
0E8A A728 05525          JEPU SEM=FF                      SEARCH NOT COMPLETE

0E8B E73A 05527          JEPR INC GO               B<    INCREMENT QUE CHAR POINTER
0E8C 8E6E 05528          JEPU TETSCONT                    CONTINUE COMPARE

               * TEST RW BUFFER FOR CENTER CODE OR FORMAT CODE BEFORE RECORDING
               * TEST FOR SCR OR SPECIAL CENTERING CODES AND INSERT OR ADJUST BUFFER
               * ACCORDINGLY

0E8D CDE7 05535 ANRWBCEN JEPR AJRWST              PRE REC ANAL             CJ110
0E8E CEOF 05536          JEPR TERWB
0E8F E3D7 05537          JEPR CVFFOO
0E90 9702 05538          BALG +2         (M=O)'   BR IF RWB NOT EMPTY
0E91 B5FF 05539          CALR            M=8F
0E92 8DBF 05540          JEPU INRW+

0E93 C940 05542          JEPR TEFMT/BM
0E94 9705 05543          BALG +5         (M=O)'   BRANCH IF FORMAT OR BLOCKMARK
0E95 FA32 05544          CALH            M=H3
0E96 B024 05545          CALG            G2=M
0E97 C07C 05546 ANRWC    JEPR MO                  REANAL                   CJ110
```

```
ADDR CODE NUMBR LABEL    CMND NEXTADDR OPERAND          COMMENT

0E98 E017 05547          JEPR FE&SG21F
0E99 9701 05548          BALG +1        (M=0)'      BRANCH IF M NOT PRINT CHARACTER
0E9A C0CF 05549          RETN
0E9B B099 05550          CALR           M=09-M
0E9C 9701 05551          BALG +1        (M=0)'      BRANCH IF SPECIAL CARRIAGE RETURN
0E9D B124 05552          CALG           G2=0
0E9E BF59 05553          CALR           M=F5-M      TEST SPECIAL CENTER CODE
0E9F 9708 05554          BALG -7        (M=0)'
0EA0 CE15 05555          JEPR FECHRW+
0EA1 930A 05556          BALG +A        M=0         BRANCH IF NO CHARACTER IN R/W BUFFER
0EA2 B14F 05557          CALR           M=14
0EA3 0003 05558          BALH +3        M-H0=0      BRANCH IF WORD UNDERSCORE CODE
0EA4 FA02 05559          CALH           M=H0
0EA5 E0D2 05560          JEPR TEMCENBP
0EA6 9709 05561          BALG -6        (M=0)'      BRANCH IF NOT CENTERING BREAKPOINT CHAR
0EA7 CF10 05562          JEPR FECHRW-
0EA8 E017 05563          JEPR FE&SG21F
0EA9 9302 05564          BALG +2        M=0         BRANCH IF M NOT PRINT CHARACTER
0EAA E520 05565          JEPR TEMCR
0EAB 970C 05566          BALG -3        (M=0)'      BRANCH IF M NOT SOME TYPE CARRIAGE RET.
0EAC CD03 05567          JEPR CVCENTRW
0EAD 8E97 05568          JEPU ANRWC

                  * CLEAR ALL DATA FROM THE RO BUFFER AND WHEN FINISHED SET BUFFER
                  * POINTER ADDRESS TO FF

0EAE B00F 05574 CLRO     CALR           M=00
0EAF 3044 05575          CMEM           A1IN        SET MEMORY ADDRESS TO ZERO
0EB0 300A 05576          CMEM           MINI        INPUT A ZERO AND INCR ADDR
0EB1 1AFE 05577          BPRT -1        MAZ=0       DONE
0EB2 BFFF 05578 AJROST   CALR           M=FF        SET POINTER TO FF
0EB3 B0E4 05579          CALG           GE=M
0EB4 A724 05580          JEPU CLM

                  *ANALYZES KB INPUT DURING TEXT STRING QUE ENTRY.
                  **G7

0EB5 81E2 05587          JEPU SEPC                  D<

0EB6 88D4 05589          JEPU C CHART6              C<

0EB7 CBE6 05591          JEPR CLQUE                 B<
0EB8 AAF5 05592          JEPU MVCRHE9

0EB9 B074 05594 ANKBTS   CALG           G7=M
0EBA 1A74 05595          BPRT +4        DB7=0       A>
0EBB 9A5B 05596          BDAT -4        M=A5        B<        LINE CORRECT
0EBC 9A69 05597          BDAT -6        M=A6        C>        CHAR CORRECT
0EBD 9AE7 05598          BDAT -8        M=AE        D>        PRINT CONTROL
0EBE A30D 05599          JEPU BZERROR

0EBF 0000 05601          NOOP
0EC0 0000 05602          NOOP
0EC1 9879 05603          BDAT +9        M=07        A< E>     CARRIAGE RETURN
0EC2 9888 05604          BDAT +8        M=08           E>     PREC CARRIAGE RETURN
0EC3 9FF4 05605          BDAT +4        M=7F        F>        PREC SPACE
0EC4 99A4 05606          BDAT +4        M=1A        BRANCH IF PRECEDENTED HYPHEN CODE
0EC5 1E64 05607          BPRT +4        DB6=1             BRANCH IF PC
0EC6 1E53 05608          BPRT +3        DB5=1
0EC7 A30D 05609          JEPU BZERROR

0EC8 BBEA 05611          CALR           M=M+8E
0EC9 B13A 05612          CALR           M=M+13
0ECA 8B5D 05613          JEPU EXPCTS                G<

0ECB B80F 05615          CALR           M=80           E<
0ECC E7B0 05616          JEPR SEG9                            SET SEARCH
0ECD C517 05617          JEPR CLDE
0ECE E0F3 05618          JEPR CLHE9
0ECF BAB2 05619          CALG           M=G8
0ED0 1A61 05620          BPRT +1        DB6=0       BRANCH IF TRACK PRINT CONTROL
0ED1 C1F4 05621          JEPR MVLM&PF
0ED2 BA72 05622          CALG           M=G7        H<
0ED3 9B71 05623          BDAT +1        M=07        BRANCH IF CARRIAGE RETURN CODE
0ED4 A28A 05624          JEPU EXTSRVS

0ED5 BD7E 05626          JEPU EXTSFWD               I<

                  * FETCH FIRST CHARACTER FROM RO BUFFER  OR FETCH THE NEXT OR THE
                  * CHARACTER WHOSE ADDRESS IS SPECIFIED BY GE

0ED6 B00F 05632 FERO1ST  CALR           M=00
0ED7 0802 05633          JIPU +2
0ED8 E754 05634 FERO+    JEPR INC GE                INCRIMENT POINTER
0ED9 BAE2 05635 FERO     CALG           M=GE
0EDA 3044 05636          CMEM           A1IN        SET ADDRESS
0EDB 3010 05637          CMEM           MOUT        GET CHARACTER...
0EDC 3144 05638          CMEM           XLST
0EDD 1EEF 05639          BPRT -0        MBY=1       LOOP IF RAM BUSY
0EDE 3141 05640          CMEM           XLOUT
0EDF 000F 05641          RETN                       ..AND EXIT

                  * SAVE M IN HB.INSERT CONTENTS M NEXT POSITION RO
```

```
ADDR CODE NUMBR LABEL      CMND NEXTADDR OPERAND        COMMENT

0EE0 F0B4 05646 INRO+      CALH          HB=M          SAVE M
0EE1 E754 05647            JEPR INC GE                 INCRIMENT POINTER
0EE2 3044 05648            CMEM          A1IN          SET ADDRESS
0EE3 FAB2 05649 HBMIN      CALH          M=HB
0EE4 3008 05650            CMEM          MIN           STORE CHAR
0EE5 000F 05651            RETN


0EE6 E756 05655 FERO-      JEPR DEC GE                 DECRIMENT POINTER
0EE7 8ED9 05656            JEPU FERO                   GET CHAR


0EE8 CEB2 05660 AJROLA     JEPR AJROST

           *                GO TO THE END OF DATA IN RO BUFFER
0EE9 CED8 05663 AJROLAIF   JEPR FERO+                  GET THE NEXT CHARACTER
0EEA 970E 05664            BALG -1       (M=0)'        DONE?
0EEB 8E5C 05665            JEPU AJRO-                  YES


0EEC CF0E 05669 TEROBLA    JEPR FECHRO-
0EED 8F30 05670            JEPU FECHRO+


0EEE CF06 05673 TEROB1     JEPR FECH
0EEF BF01 05674            JEPU AJROBM


          * ADJUST THE RO BUFFER ADDRESS TO THE LAST CHARACTER

0EF0 CEB2 05679 AJROLADA   JEPR AJROST
0EF1 CEFD 05680            JEPR FEDATRO+
0EF2 9304 05681            BALG +4       M=0           BRANCH IF END OF BUFFER
0EF3 E468 05682            JEPR TEM2CH
0EF4 970C 05683            BALG -3       (M=0)'        BRANCH IF NO SECOND CHAR
0EF5 CED8 05684            JEPR FERO+
0EF6 080A 05685            JIPU -5
0EF7 8E5C 05686            JEPU AJRO-


0EF8 E59C 05689 TEROB2     JEPR TEXLX
0EF9 CF30 05690            JEPR FECHRO+
0EFA BF01 05691            JEPU AJROBM


0EFB CED8 05694 TEROB3     JEPR FERO+                  MINI ROB TEST        CK130
0EFC 8E5C 05695            JEPU AJRO-


0EFD CED8 05698 FEDATRO+   JEPR FERO+                  RO DATA FCH FWD      CK200
0EFE A3D7 05699            JEPU CVFF00



          * IF CHARACTER IN G7 REQUIRES A SECOND CHARACTER ADJUST RO
          * BUFFER BACK 2 CHARACTERS IF NOT ADJUST BACK ONE CHARACTER

0EFF 24F3 05706            *CHECK WORD*
0F00 BA72 05706 AJROBG7    CALG          M=G7          G7 COMP ROB          CK140
0F01 E468 05707 AJROBM     JEPR TEM2CH                 COMP ROB             CK140
0F02 9701 05708            BALG +1       (M=0)'
0F03 CE5C 05709            JEPR AJRO-
0F04 FA02 05710            CALH          M=H0
0F05 8E5C 05711            JEPU AJRO-


          * FETCH CHARACTER FROM RO BUFFER

0F06 CF30 05716 FECH       JEPR FECHRO+                FETCH CHAR           CK155
0F07 9703 05717            BALG +3       (M=0)'        BRANCH IF CHARACTER
0F08 C7F0 05718            JEPR FEDA
0F09 CF30 05719            JEPR FECHRO+                BRANCH IF NO CHARACTER
0F0A 9301 05720            BALG +1       M=0
0F0B 000F 05721            RETN
0F0C E473 05722            JEPR SESTOP
0F0D A724 05723            JEPU CLM


          * FETCH PREVIOUS CHARACTER FROM RO BUFFER

0F0E CEE6 05728 FECHRO-    JEPR FERO-                  RO FCH LAST          CK170
0F0F E468 05729            JEPR TEM2CH
0F10 9704 05730            BALG +4       (M=0)'        BRANCH IF NO 2ND CHARACTER
0F11 CEE6 05731            JEPR FERO-
0F12 E468 05732            JEPR TEM2CH
0F13 9701 05733            BALG +1       (M=0)'
0F14 CED8 05734            JEPR FERO+
0F15 8EFB 05735            JEPU TEROB3
```

```
ADDR CODE NUMBR LABEL     CMND NEXTADDR OPERAND             COMMENT

                 * ADJUST THE  RO BUFFER ADDRESS   BY THE VALUE IN GO
                 * GO CONTAINS THE NUMBER OF CHARACTERS THAT NEED TO BE ELIMINATED

0F16 BAE2 05741 AJROGO-   CALG          M=GE       GET BUFFER POINTER
0F17 B001 05742           CALG          M=M-GO     SUBTRACT GO
0F18 B0E4 05743           CALG          GE=M
0F19 A724 05744           JEPU CLM

                 * ADJUST RO BUFFER  ADDRESS
                 * ADD GO TO GE . STORE RESULTS IN GE

0F1A BAE2 05751 AJROGO+   CALG          M=GE       GET BUFFER POINTER
0F1B B900 05752           CALG          M=M+GO     ADD GO
0F1C A758 05753           JEPU XFGE=M

                 * FETCH CHARACTER ONE POSITION BEHIND THE PRESENT POINTER ADDRESS

0F1D CDB8 05758 FECHRW-   JEPR FERW                RW FETCH LAST              CK070
0F1E F014 05759           CALH          H1=M
0F1F 8109 05760           CALR          M=10-M     BRANCH IF CHARACTER NOT FORMAT
0F20 97C5 05761           BALG +5       (M=0)'
0F21 CAFC 05762           JEPR AJRW-
0F22 FA12 05763           CALH          M=H1
0F23 F004 05764           CALH          H0=M
0F24 F114 05765           CALH          H1=0
0F25 000F 05766           RETN
0F26 CE0C 05767           JEPR FERW-
0F27 F004 05768           CALH          H0=M
0F28 E468 05769           JEPR TEM2CH
0F29 9708 05770           BALG -7       (M=0)'     BRANCH IF 2ND CHARACTER
0F2A CE00 05771           JEPR FERW-
0F2B E468 05772           JEPR TEM2CH
0F2C 9702 05773           BALG +2       (M=0)'     BRANCH IF 2ND CHARACTER
0F2D CDBA 05774           JEPR FERW+
0F2E 0803 05775           JIPU -C
0F2F 8AD1 05776           JEPU XFM=HO

                 * FETCH CHARACTER ONE POSITION AHEAD IN RO BUFFER

0F30 F114 05781 FECHRO+   CALH          H1=0       FETCH NEXT                 CK150
0F31 CED8 05782           JEPR FERO+
0F32 F004 05783           CALH          HO=M
0F33 9701 05784           BALG +1       (M=0)'     BRANCH IF SOME TYPE DATA
0F34 000F 05785           RETN
0F35 E3D7 05786           JEPR CVFF00
0F36 930A 05787           BALG -5       M=0        BRANCH IF RO CONTAINS FILL CHARACTERS
0F37 E468 05788           JEPR TEM2CH
0F38 97C2 05789           BALG +2       (M=0)'     BRANCH IF 2ND CHARACTER
0F39 CED8 05790           JEPR FERO+
0F3A F014 05791           CALH          H1=M
0F3B 8AD1 05792           JEPU XFM=HO

                 *TRANSFER CHARACTER FROM RO BUFFER TO RW BUFFER

0F3C CED8 05797 XFCHRORW  JEPR FERO+               CHAR TRANSF                CK210
0F3D 8DBF 05798           JEPU INRW+

                 * ADJUST RO BUFFER TO A TAB

0F3E FA02 05803 AJROTOTB  CALH          M=HO
0F3F CF01 05804           JEPR AJROBM
0F40 CF0E 05805           JEPR FECHRO-             A<
0F41 E538 05806           JEPR TEMTBCOL
0F42 970D 05807           BALG -2       (M=0)'     A>  BRANCH IF M IS NOT A TAB
0F43 CF30 05808           JEPR FECHRO+
0F44 8F30 05809           JEPU FECHRO+

                 * TRANSFER THE RW BUFFER TO THE RO BUFFER

0F45 CDBA 05814 XFRWROGO  JEPR FERW+               GO RW TO RO                CK220
0F46 CEED 05815           JEPR INRO+
0F47 E73A 05816           JEPR INC GO
0F48 970C 05817           BALG -3       (M=0)'     BRANCH IF NOT FINISHED WITH TRANSFER
0F49 000F 05818           RETN

                 * TRANSFER RW TO RO BUFFER AND CLEAR RW BUFFER

0F4A CEAE 05823 XFRWROCL  JEPR CLRO                RW TO RO & CLR             CK230
0F4B 8104 05824           CALG          GO=0
0F4C CDE7 05825           JEPR AJRWST
0F4D CF45 05826           JEPR XFRWROGO
```

```
ADDR CODE NUMBR LABEL     CMND NEXTADDR OPERAND'           COMMENT

OF4E CEB2 05827           JEPR AJRDST
OF4F 8DE2 05828           JEPU CLRW


          * FETCH NEXT CHARACTER IN RO BUFFER AND INCREMENT COUNT

OF50 F114 05833 FECHRO+&  CALH          H1=0     RO FCH NXT & CNT          CK160
OF51 E73A 05834           JEPR INC GO
OF52 CED8 05835           JEPR FERO+
OF53 F004 05836           CALH          HO=M
OF54 9307 05837           BALG +7       M=O      BRANCH IF NO SECOND CHARACTER
OF55 E3D7 05838           JEPR CVFFOO
OF56 930A 05839           BALG -5       M=0      BRANCH IF FILL CHARACTER
OF57 E468 05840           JEPR TEM2CH
OF58 9703 05841           BALG +3       (M=O)'
OF59 E73A 05842           JEPR INC GO
OF5A CED8 05843           JEPR FERO+
OF5B F014 05844           CALH          H1=M
OF5C 8AD1 05845           JEPU XFM=HO


          * TRANSFER RO BUFFER TO RW BUFFER

OF5D CF3C 05851           JEPR XFCHRORW
OF5E E73A 05852           JEPR INC GO
OF5F 970D 05853 XFRORWGO  BALG -2       (M=O)'   BRANCH IF TRANSFER NOT FINISHED
OF60 000F 05854           RETN


          * CLEAR THE RW BUFFER BY DUMPING FROM RO BUFFER.USED IN RESTORING BUFFER
          * AND IN JUSTIFY HELP MODE

OF61 000F 05860           RETN
OF62 CDFA 05861           JEPR CLRWEOD
OF63 FA72 05862 CLRW=RO   CALH          M=H7     CLR RWB FR ROB            CK240
OF64 930C 05863           BALG -3       M=O      BRANCH IF RW BUFFER IS CLEAR
OF65 CF1D 05864           JEPR FECHRW-
OF66 930A 05865           BALG -5       M=O      BRANCH IF LAST CHAR O
OF67 E707 05866           JEPR AJH7CHCT
OF68 E7C9 05867           JEPR UPH2CHCT
OF69 CFOE 05868           JEPR FECHRO-
OF6A D007 05869           BALH -8       M-HO=O   BRANCH IF NOT END OF DATA
OF6B CF30 05870           JEPR FECHRO+
OF6C A9FA 05871           JEPU AJRWJ


OF6D E9FA 05874 RERO=RW   JEPR AJRWJ             RESTORE ROB/RWB           CK270
OF6E CE32 05875           JEPR CTRWH7
OF6F CF63 05876           JEPR CLRW=RO
OF70 8E38 05877           JEPU CLRWSP


          * TRANSFER THE REMAINDER OF THE RO BUFFER TO THE RW BUFFER

OF71 CDBF 05882           JEPR INRW+
OF72 E468 05883           JEPR TEM2CH
OF73 9702 05884           BALG +2       (M=O)'   BRANCH IF HAVE 2ND CHARACTER
OF74 CF3C 05885           JEPR XFCHRORW
OF75 E73A 05886           JEPR INC GO
OF76 E73A 05887           JEPR INC GO
OF77 CEFD 05888 XF/RORW   JEPR FEDATRO+          RO REM TO RW              CK260
OF78 9708 05889           BALG -7       (M=O)'   BRANCH IF NOT FINISHED TRANSFER
OF79 8E5C 05890           JEPU AJRO-


          ** TEST WHETHER CHAR IN G7 IS AT A CARR POSITION WHICH IS UNDERSCORED

OF7A BFOF 05895 TEUSHE9   CALR          M=FO
OF7B FE92 05896           CALH          M=M.H9
OF7C FBE2 05897           CALH          M=M@HE
OF7D 000F 05898           RETN


          * EXECUTE AUTOMATIC UNDERSCORE IN PLAY AND JUSTIFY

OF7E C57D 05903 USPSDJ    JEPR XFCAG10           AUTO UND. SC.             CL030
OF7F C51B 05904           JEPR ADDEFG10
OF80 B04F 05905           CALR          M=04
OF81 9291 05906           BALG +1       M.G9=0   BRANCH IF NOT JUSTIFY
OF82 F164 05907           CALH          H6=0
OF83 E710 05908           JEPR XFG01H01
OF84 E700 05909           JEPR XFHE9G01
OF85 E72A 05910           JEPR NEG G10
OF86 E65F 05911           JEPR ADG10H10
OF87 E735 05912           JEPR XFG01G4H
OF88 E700 05913           JEPR XFHE9G01
OF89 C517 05914           JEPR CLDE
```

```
ADDR CODE NUMBR LABEL    CMND NEXTADDR OPERAND               COMMENT

0F8A CFE5 05915          JEPR SEDE&AJ
0F8B E16A 05916          JEPR SUMG10
0F8C BA32 05917          CALG          M=G3
0F8D EC8D 05918          JEPR RML7
0F8E ECE7 05919          JEPR ADM+G10
0F8F C363 05920          JEPR MVCRG10
0F90 ECF3 05921          JEPR CLHE9
0F91 CFCD 05922          JEPR US
0F92 A000 05923          JEPU LDG4


             * ANALYZE AUTOMATIC UNDERSCORE

0F93 B04F 05928 ANAUTUS  CALR          M=04
0F94 92A1 05929          BALG +1       M.GA=0       BRANCH IF NOT LINE UNDERSCORE
0F95 A033 05930          JEPU USKB

0F96 000F 05932          RETN


0F97 0000 05937          NOOP
0F98 0000 05938          NOOP
0F99 0000 05939          NOOP
0F9A 0000 05940          NOOP
0F9B 0000 05941          NOOP
0F9C 0000 05942          NOOP


             * PRINTS THE UNDERSCORE

0F9D 1308 05947 PRUS     CPRT          RBUP
0F9E B5FF 05948          CALR          M=5F
0F9F C572 05949          JEPR SEG01PR
0FA0 B7FF 05950          CALR          M=7F
0FA1 BE02 05951          CALG          M=M.G0
0FA2 8004 05952          CALG          G0=M
0FA3 B03F 05953          CALR          M=03
0FA4 BB12 05954          CALG          M=M¢G1
0FA5 8014 05955          CALG          G1=M
0FA6 84A3 05956          JEPU PRG01


             * CALCULATE THE NECESSARY MOVEMENT TO CENTER USED ANALYZING
             * G7 CODE IN PLAY AND JUSTIFY IF CHARACTER IS A CENTERING CODE

0FA7 B40F 05962 MVCRCEN  CALR          M=40         EXEC CENT                 CM020
0FA8 E790 05963          JEPR SEG6
0FA9 EC18 05964          JEPR RERF
0FAA E23B 05965          JEPR CLH4-H7
0FAB C517 05966          JEPR CLDE
0FAC A067 05967          JEPU CAMVCEN


             * CALCULATES CONSUMED SPACE FOR THE CENTERED WORD

0FAD 9A01 05972 CAMCSCEN BDAT +1       M=20         BRANCH IF SPACE CODE
0FAE A401 05973          JEPU CAMUCS
0FAF E3F1 05974          JEPR FEMWT
0FB0 ACC0 05975          JEPU SML1


             ** ANALYSES G7 TO DETECT AN UNDERSCORED CHARACTER. BRANCHES TO BEGIN VS TE
             *** USES GP REGS G0, G1,HE,H9

0FB1 B97F 05981 ANG7US   CALR          M=97
0FB2 9176 05982          BALG +6       M>G7         BRANCH IF NOT US CHARACTER
0FB3 CF7A 05983          JEPR TEUSHE9
0FB4 9301 05984          BALG +1       M=0          BRANCH IF BEGIN US
0FB5 000F 05985          RETN


0FB6 C67D 05987          JEPR XFCAG10
0FB7 C51B 05988          JEPR ADDEFG10
0FB8 AGF8 05989          JEPU XFG01HE9


0FB9 CF7A 05991 USPART   JEPR TEUSHE9
0FBA 930A 05992          BALG -5       M=0          BRANCH TO BEGIN UNDERSCORE
0FBB B08F 05993          CALR          M=08
0FBC 9291 05994          BALG +1       M.G9=0       BRANCH IF NOT PLAY MODE
0FBD 8F7E 05995          JEPU USPSDJ

0FBE AGF3 05997          JEPU CLHE9

             * ANALYZE KEYBOARD CENTERING
             * MOVE CARRIAGE TO NEAREST COLUMN, FETCH LEFT MARGIN AND CALCULATE
             * DISTANCE BETWEEN STORE IN G4. INSERTS A CENTERING CODE (14) INTO
```

```
ADDR CODE NUMBR LABEL     CMND NEXTADDR OPERAND              COMMENT

                  * THE BUFFER. SETS CENTERING FLAG AND JUMPS TO EVALUATE
                  * KEYBOARD CENTERING

0FBF C5D8 06006 ANKBCENT JEPR MVCRCOL              KB CENT                     CM010
0FC0 E3AC 06007          JEPR FELM
0FC1 B009 06008          CALR          M=00-M
0FC2 F9A0 06009          CALH          M=M+HA
0FC3 E3DB 06010          JEPR CVOOFF
0FC4 B044 06011          CALG          G4=M
0FC5 0C3F 06012          BKBD -0       STOP=1      LOOP UNTIL STOP KEY RELEASED
0FC6 B14F 06013          CALR          M=14
0FC7 B074 06014          CALG          G7=M
0FC8 CBA8 06015          JEPR RCCHKB
0FC9 C525 06016          JEPR MVCARDE
0FCA B40F 06017          CALR          M=40
0FCB E790 06018          JEPR SEG6                 SET THE CENTERING FLAG
0FCC A082 06019          JEPU EVKBCENT

                  * EXECUTE UNDERSCORE: TRANSFER G7 AND G4 TO G1 AND GO

0FCD E731 06024 US       JEPR XFG47G01             EXEC UND. SC.               CL040
0FCE BA32 06025          CALG          M=G3
0FCF EC6A 06026          JEPR SUMG10
0FD0 BA12 06027          CALG          M=G1
0FD1 1A71 06028          BPRT +1       DB7=0       BRANCH IF NOT UNDERSCORE CHARACTER
0FD2 8F9D 06029          JEPU PRUS

                  * EXECUTES UNDERSCORE FOR A 2 CHARACTERS IF
                  * BOTH NEED UNDERSCORE OR A WHOLE WORD UNTIL A NON UNDERSCORE
                  * CHARACTER IS REACHED.

0FD3 E735 06035          JEPR XFG01G4H
0FD4 CF9D 06036 PRNEXTUS JEPR PRUS
0FD5 E731 06037          JEPR XFG47G01
0FD6 B06F 06038          CALR          M=06
0FD7 EC6A 06039          JEPR SUMG10
0FD8 BA12 06040          CALG          M=G1
0FD9 1E74 06041          BPRT +4       DB7=1       BRANCH IF UNDERSCORED CHARACTER
0FDA E735 06042          JEPR XFG01G4H
0FDB B06F 06043          CALR          M=06
0FDC C357 06044          JEPR AJCR+M
0FDD 8FD4 06045          JEPU PRNEXTUS

0FDE B06F 06047          CALR          M=06
0FDF EC67 06048          JEPR ADM+G10
0FE0 BAC2 06049          CALG          M=G0
0FE1 9302 06050          BALG +2       M=0         BRANCH IF FINISHED UNDERSCORE
0FE2 C357 06051          JEPR AJCR+M
0FE3 8F9D 06052          JEPU PRUS

0FE4 000F 06054          RETN

0FE5 B5FF 06058 SEDE&AJ  CALR          M=5F        SET D.E. & ADJUST
0FE6 C510 06059          JEPR UPDEM                PUT DEFERRED ESCAPEMENT BITS
0FE7 C4FB 06060          JEPR FEDE                 IN M AND-SHIFT LEFT ONCE MASK
0FE8 BC00 06061          CALG          SML         DEF. ESC BITS IN M AND PUT THEM
0FE9 B034 06062          CALG          G3=M        IN RIGHT POSITION TO BE EXECUTED
0FEA FA72 06063          CALH          M=H7        IN M
0FEB 9301 06064          BALG +1       M=0         BRANCH IF AT LAST BKPT IN RWB
0FEC A724 06065          JEPU CLM
0FED BA42 06066          CALG          M=G4
0FEE 953D 06067          BALG -2       M=M-G3>0
0FEF B009 06068          CALR          M=00-M
0FF0 F004 06069          CALH          H0=M
0FF1 BFEF 06070          CALR          M=FE
0FF2 BE42 06071          CALG          M=M.G4
0FF3 E6BB 06072          JEPR RML7
0FF4 C511 06073          JEPR SEDE
0FF5 BFEF 06074          CALR          M=FE
0FF6 FE02 06075          CALH          M=M.H0
0FF7 A6BB 06076          JEPU RML7

                  * SETS TAB COUNTER EQUAL TO REG G1.

0FF8 E4E8 06081 SETC=G1  JEPR CLTC
0FF9 BA12 06082          CALG          M=G1
0FFA A02A 06083          JEPU ADMTOTC

0FFB E3AC 06086 AJCAH3   JEPR FELM                 ADJUST CARRIER TO LM + H3
0FFC F930 06087          CALH          M=M+H3
0FFD 82F0 06088          JEPU MVCRM
```

```
ADDR CODE NUMBR LABEL     CMND NEXTADDR OPERAND           COMMENT

          * RESTORE G4 TO CONTENTS PRIOR TO UNDERSCORE EXECUTION

0FFE 92E8 06093           *ADJUST WORD*
0FFF ECEF 06093           *CHECK WORD**
1000 B144 06093 LDG4      CALG          G4=0       RESTORE G4                CL080
1001 E467 06094           JEPR TEG72CH
1002 9707 06095           BALG +7       (M=0)'     BRANCH IF 2ND CHARACTER
1003 B04F 06096           CALR          M=04
1004 9292 06097           BALG +2       M.G9=0     BRANCH IF NOT JUSTIFY
1005 CDBB 06098           JEPR FERW
1006 0801 06099           JIPU +1
1007 CED9 06100           JEPR FERO
1008 E3D7 06101           JEPR CVFFOO
1009 B044 06102           CALG          G4=M
100A 000F 06103           RETN

          * TRANSFER THE RO BUFFER TO THE RW BUFFER & CLEAR THE RW BUFFER. CLEAR

          * DEFERED ESCAPEMENT AND MOVE TO LEFT MARGIN. WAIT FOR
          * NEXT KEYBOARD ENTRY AND PROCESS.

100B E5AB 06110 LCFMT     JEPR TERV
100C 9701 06111           BALG +1       (M=0)'     BRANCH IF REVISE
100D CF4A 06112           JEPR XFRWROCL
100E CDE2 06113           JEPR CLRW
100F C3C9 06114           JEPR CLDEMVO
1010 E1CB 06115           JEPR WTKBCH
1011 B074 06116           CALG          G7=M
1012 B109 06117           CALR          M=10-M
1013 9302 06118           BALG +2       M=0        BRANCH IF FORMAT CODE
1014 CFFB 06119           JEPR AJCAH3
1015 C04C 06120           JEPR ANMODIDL
1016 A50F 06121           JEPU FMTMODEX

1017 CE15 06124 FE&SG2IF  JEPR FECHRW+             FETCH NEXT CHARACTER FROM THE RW BUFFER
1018 1A71 06125 SEG2IFTX  BPRT +1       DB7=0      AND SET G2=FF IF PRINT CHARACTER
1019 9883 06126           BDAT +3       M=08       BRANCH IF PRECEDENTED TAB
101A E532 06127           JEPR TEMPC
101B 9702 06128           BALG +2       (M=0)'     B>     BRANCH IF NOT PRINT CHAR
101C BFFF 06129           CALR          M=FF
101D B024 06130           CALG          G2=M       A<     SET G2=FF
101E 8AD1 06131           JEPU XFM=HO

          *ALIGNS RW TO LAST LEADING TAB AND LOADS HC WITH CARRIER POSITION
          *CORRESPONDING TO LAST TAB
          **HC

101F E3AC 06138 ALRW&HC   JEPR FELM
1020 F930 06139           CALH          M=M+H3
1021 F0C4 06140           CALH          HC=M           INITIALIZE HC WITH BEGIN CARRIER PO
1022 CDE7 06141           JEPR AJRWST
1023 CE15 06142           JEPR FECHRW+             A<
1024 B0A9 06143           CALR          M=0A-M
1025 9704 06144           BALG +4       (M=0)'     B>  BR IF NOT TAB
1026 FAC2 06145           CALH          M=HC
1027 9306 06146           BALG -4       M=0        A>   BR IF NOT ENOUGH TAB STOPS SET
1028 C3F9 06147           JEPR FET8HC+                ADJUST HC TO NEXT TAB STOP
1029 0809 06148           JIPU -6
102A 8F1D 06149           JEPU FECHRW-                ALIGN ON LAST TAB & FCH CHAR PAST TAB

          * UPDATE TOTAL VERTICAL SPACING REQUIREMENT

102B E0FB 06154 UPGZ=LS   JEPR CAG7VSP             UPDATE LINE SP            CN040
102C B920 06155           CALG          M=M+G2
102D B024 06156           CALG          G2=M
102E 000F 06157           RETN

          * CALCULATE AND MOVE RW BUFFER FOR HORIZONTAL CORRECTION
          * MOVE CARRIAGE AS SPECIFIED IN G0 AND C1

102F E1D0 06163 CAMVRWHZ  JEPR CARWHZ
1030 C363 06164 MVRWHZ    JEPR MVCRG10
1031 E23B 06165           JEPR CLH4-H7
1032 8DEA 06166           JEPU AJRWLA

          *THE EXECUTION OF A KEYBOARD UNDERSCORE RESULTS IN THE CARRIAGE BEING
          *RETURNED TO THE FIRST PRECEEDING NON PRINTABLE CHARACTER AND UNDERSCORING
          *OF THE PRINTABLE CHARACTERS TO THE RIGHT
          ***G0G1

1033 C525 06174 USKB      JEPR MVCARDE             EXECUTE DEFERRED ESCAPEMENT
1034 B104 06175           CALG          G0=0
1035 B114 06176           CALG          G1=0
1036 0803 06177           JIPU +3
1037 FA02 06178           CALH          M=H0
```

```
ADDR CODE NUMBR LABEL     CMND NEXTADDR OPERAND .           COMMENT

1038 E4C1 06179           JEPR CAMJCS                 CALCULATE CONSUMED SPACE
1039 E?67 06180           JEPR ADM+G10
103A CF1D 06181           JEPR FECHRW-                FETCH LAST CHARACTER IN RW BUFFER
103B 1E73 06182           BPRT +3       DB7=1
103C 9A02 06183           BDAT +2       M=20          BRANCH IF SPACE
103D 8E0F 06184           CALR          M=E8
103E D?08 06185           BALH -7       M=M+HOC       BRANCH ON PRINTING CHAR.
103F CE15 06186           JEPR FECHRW+                FETCH NEXT CHAR.
1040 CE15 06187           JEPR FECHRW+                FETCH NEXT CHAR.
1041 9703 06188           BALG +3       (M=O)'
1042 CAFC 06189           JEPR AJRW-
1043 000F 06190           RETN

1044 B20F 06192           CALR          M=20
1045 9FFE 06193           BDAT -1       M=7F          BRANCH IF PRECEDENTED SPACE
1046 B80E 06194           CALR          M=M&80
1047 CE04 06195           JEPR CVRWCH                 REPLACE PSP WITH UND.SC. SPACE IN BUF
1048 CE15 06196           JEPR FECHRW+
1049 970B 06197           BALG -4       (M=O)'        BRANCH IF 2ND CHARACTER
104A CAFC 06198           JEPR AJRW-
104B E735 06199           JEPR XFG01G4H               G4/H7=G0/G1
104C E4B7 06200           JEPR SEDUMPRV
104D E3A3 06201           JEPR FEPITCH                FETCH PITCH
104E E?67 06202           JEPR ADM+G10
104F B5FF 06203           CALR          M=5F          SET M=5F UNDERSCORE CHAR. CODE
1050 E49A 06204           JEPR FEMPCWT                FETCH WEIGHT OF UNDERSCORE CHAR.
1051 E?6A 06205           JEPR SUMG10
1052 CFE5 06206           JEPR SEDE&AJ
1053 E?67 06207           JEPR ADM+G10
1054 C35D 06208           JEPR MVCR-                  MOVE CR LEFT
1055 CFCD 06209           JEPR US                     EXECUTE UNDERSCORE
1056 A728 06210           JEPU SEM=FF


          * SKIP BLOCK MARK ,CHECK FOR  EOT. IF REVISE  READ  NEXT 5 CHARACTERS
          * IF NOT REVISE  READ NEXT 6 CHARACTERS

1057 E719 06216 LCTAPE    JEPR SKPACSTP
1058 2F95 06217           BACM +5       EOT=1
1059 B10F 06218           CALR          M=10
105A 9281 06219           BALG +1       M.G8=O        BRANCH IF NOT REVISE
105B B0FF 06220           CALR          M=OF
105C BF6A 06221           CALR          M=M+F6
105D 8B2B 06222           JEPU RDFWDM

105E E30D 06224           JEPR BZERROR                1<
105F E5A8 06225           JEPR TERV
1060 9701 06226           BALG +1       (M=O)'        BRANCH IF REVISE
1061 89B3 06227           JEPU NEWTAPE

1062 E81F 06229           JEPR CLREOTFW
1063 A719 06230           JEPU SKPACSTP


          * CALCULATES THE POSITION OF THE CENTERED WORD IN THE JUSTIFY MODE

1064 BA72 06236           CALG          M=G7
1065 CFAD 06237           JEPR CAMCSCEN
1066 E9CA 06238           JEPR ADCSH54
1067 CF30 06239 CAMVCEN   JEPR FECHRO+
1068 E47A 06240           JEPR SKSPTBAJ
1069 9302 06241           BALG +2       M=O           BRANCH IF NOT SPACE OR TAB
106A E0D2 06242           JEPR TEMCENBP
106B 9708 06243           BALG -7       (M=O)'        BRANCH IF NOT CENTERING CODE
106C CF00 06244           JEPR AJROBG7
106D CF0E 06245           JEPR FECHRO-
106E B139 06246           CALR          M=13-M
106F 970D 06247           BALG -2       (M=O)'        BRANCH IF NOT CENTERING CODE
1070 CF30 06248           JEPR FECHRO+
1071 E706 06249           JEPR XFH10G47
1072 E715 06250           JEPR XFH45H01
1073 E6A0 06251           JEPR SHH10R
1074 E70C 06252           JEPR XFH01G01
1075 E72A 06253           JEPR NEG G10
1076 E150 06254           JEPR CACENTER
1077 E23B 06255 MVCRCENC  JEPR CLH4-H7
1078 E287 06256           JEPR FE2PCH
1079 ECD8 06257           JEPR XMG2+G10
107A BFCF 06258           CALR          M=FO
107B BD12 06259           CALG          M=M.G1'
107C 9702 06260           BALG +2       (M=O)'        BRANCH IF NO H1 ORDER BIT TO MOVE
107D B01F 06261 MVCR01    CALR          M=01
107E 82F0 06262           JEPU MVCRM
107F B363 06263           JEPU MVCRG10


          *KB ANALYSIS LOOP WHICH ALLOWS OPERATOR TO POSITION CARRIAGE AFTER
          *ENTERING CENTERING CODE WITHOUT RECORDING SPACES & BACKSPACES.

1080 C5C9 06269           JEPR MVCR+1                 D<
1081 E26D 06270           JEPR AJKS+1                 H<
```

```
ADDR CODE NUMBR LABEL     CMND NEXTADDR OPERAND            COMMENT

1082 E240 06271 EVKBCENT JEPR PACEKB              B<
1083 9702 06272          BALG +2      (M=0)'      A>     BRANCH IF KB INPUT
1084 083D 06273          BKBD -2      STOP=0      B>     BRANCH IF STOP KEY NOT PRESSED
1085 8061 06274          JEPU RESTPIDL

1086 1E73 06276          BPRT +3      DB7=1
1087 9A08 06277          BDAT -7      M=20        D>     BRANCH IF SPACE CODE
1088 98F2 06278          BDAT +2      M=OF              BRANCH IF BO
1089 9931 06279          BDAT +1      M=13              BRANCH IF CEN
108A 8061 06280          JEPU RESTPIDL

108B C5CC 06282          JEPR MVCR-1
108C 0B04 06283          JIPU -B

108D C0BE 06286 MOKB&MED JEPR BIGMO               KB MONITOR              CP010
108E A1C6 06287          JEPU MOKB


        *DELETE LAST RECORDED LINE OR LAST PART LINE & MOVE CARRIER TO BEGINNING
        **OF DELETED TEXT.

108F BAD2 06294 LCRC     CALG         M=GD
1090 9701 06295          BALG +1      (M=0)'      A>   BR IF DATA IN RW
1091 A11B 06296          JEPU RDLCRC                  ADJUST FOR PREVIOUS LINE.

1092 BA82 06298          CALG         M=G8        A<
1093 1A53 06299          BPRT +3      DB5=0       B>   BR IF MARGIN CONTROL
1094 BA62 06300          CALG         M=G6        B<
1095 1A04 06301          BPRT +4      DB0=0       D>   BR IF TAB COUNTER CLOSED
1096 E4E8 06302          JEPR CLTC                     CLEAR TAB COUNTER
1097 CFFB 06303          JEPR AJCAH3                   MOVE CARRIER TO BEGINNING
1098 CDE2 06304          JEPR CLRW
1099 A728 06305          JEPU SEM=FF

109A E01F 06307          JEPR ALRW&HC             D<   ALIGN TO END OF LEADING TABS.
109B BAD2 06308          CALG         M=GD
109C BF01 06309          CALG         M=M+1
109D B024 06310          CALG         G2=M             SET G2= NO OF LEADING RW TABS.
109E B0FF 06311          CALR         M=OF
109F BEC2 06312          CALG         M=M.GC           FETCH NO OF TABS FROM TAB
10A0 9527 06313          BALG +7      M=M-G2>0    E>   BR IF TB COUNT GE LEADING RW TABS
10A1 B90D 06314          CALG         M=M+GD
10A2 B0D4 06315          CALG         GD=M             ALIGN RW TO LAST TB CTR TAB.
10A3 CDFA 06316 MVCALATB JEPR CLRWECD             F<   CLR ANY DATA PAST TABS
10A4 E01F 06317          JEPR ALRW&HC                  ALIGN TO END OF TABS & FCH TB STOP
10A5 C4EF 06318          JEPR TBCRASH                  FETCH LAST COLUMN IF NO TB SET
1CA6 C2F0 06319          JEPR MVCRM                    MOVE TO POSITION OF LAST RW TAB
10A7 A728 06320          JEPU SEM=FF

10A8 FA02 06322          CALH         M=HO        E<
10A9 9709 06323          BALG -6      (M=0)'      F>   BR IF DATA PAST LAST TAB IN RW
10AA A11B 06324          JEPU RDLCRC                  CORRECT FOR PREVIOUS LINE


        * ADJUST THE CARRIAGE AS NECESSARY WHEN A CHARACTER CORRECT IS
        * PROCESSED

10AB BA22 06330 AJCARCHC CALG         M=G2
10AC 1A72 06331          BPRT +2      DB7=0      BRANCH IF LESS THAN STP MOVEMENT
10AD B009 06332          CALR         M=00-M
10AE 8354 06333          JEPU MV+V

10AF 8337 06335          JEPU MV-V


        * LINE CORRECT USED IN ANFCTKB - CORRECTS LINE TO BEGINNING
        * LCRVC USED IN LINE CORRECT RECORD

10B0 E5A5 06341 LCOR     JEPR TERVRC
10B1 9701 06342          BALG +1      (M=0)'      A>   BR IF REVISE OR RECORD MODE
10B2 A724 06343          JEPU CLM                          RETURN AND ERROR BUZZ.

10B3 C517 06345          JEPR CLDE
10B4 E422 06346          JEPR RECEN
10B5 EC1B 06347          JEPR RERF
10B6 ECF3 06348          JEPR CLHE9               A<   CLEAR BEGIN UNDERSCORE POSITION
10B7 B124 06349          CALG         G2=0
10B8 CDE7 06350          JEPR AJRWST
10B9 0B01 06351          JIPU +1                  B>
10BA E02B 06352          JEPR UPGZ=LS             C<   VERTICAL LINE SPACE ACCUMULATED
10BB CE15 06353          JEPR FECHRW+             B<     IN G2
10BC 970D 06354          BALG -2      (M=0)'      C>
10BD E0AB 06355          JEPR AJCARCHC                 MOVE VERTICAL AMT IN G2
10BE C32C 06356          JEPR RECOL
10BF B20F 06357          CALR         M=20
10C0 9291 06358          BALG +1      M.G9=0     BRANCH IF NO SKIP MODE
10C1 A08F 06359          JEPU LCRC                      JUMP TO LINE CORRECT FOR REC MODE

10C2 E7BF 06361          JEPR REGF
10C3 CED9 06362          JEPR FERO
10C4 9304 06363          BALG +4      M=0        BRANCH IF NO CHARACTER
```

```
ADDR CODE NUMBR LABEL     CMND NEXTADDR OPERAND              COMMENT

10C5 CDE2 06364 LCRVC     JEPR CLRW                        ADJUST FOR PART LINE
10C6 CD7A 06365           JEPR SEH2RV
10C7 CFFB 06366           JEPR AJCAH3
10C8 A728 06367           JEPU SEM=FF

10C9 BAD2 06369           CALG          M=GD
10CA 9703 06370           BALG +3       (M=O)'     H>    BR IF DATA IN RW
10CB 2050 06371           CRWM          NRR
10CC E831 06372           JEPR SKPACBLK
10CD EDDC 06373           JEPR RDLC                      READ PREVIOUS LINE
10CE A0C5 06374           JEPU LCRVC               H<    ADJUST CARRIER & BUFF FOR NEW LINE

10CF A724 06376           JEPU CLM                 I<    RETURN AND ERROR BUZZ


                *TESTS M FOR EENTERING BREAKPOINT WHICH IS ANY TAB, CARRIAGE RETURN OR
                *CENTERING CODE. RETURNS WITH M=00 IF ONE OF THESE CODES.

10D0 1E79 06382 TEMCRCE   BPRT +9       DB7=1
10D1 0803 06383           JIPU +3                  B>
10D2 1E77 06384 TEMCENBP  BPRT +7       DB7=1
10D3 98A7 06395           BDAT +7       M=0A             BRANCH IF TAB
10D4 98B6 06386           BDAT +6       M=0B             BRANCH IF PTB
10D5 9865 06387           BDAT +5       M=06       B<    BRANCH IF PSCR
10D6 9874 06388           BDAT +4       M=07       B)    BRANCH IF CR
10D7 9883 06389           BDAT +3       M=08             BRANCH IF PREC CR
10D8 9892 06390           BDAT +2       M=09             BRANCH IF SPECIAL CR
10D9 9931 06391           BDAT +1       M=13             BRANCH IF CENTERING
10DA A3D8 06392           JEPU CVOOFF

10DB A724 06394           JEPU CLM


                * READERLINE CORRECT
                * IN THE REVISE MODE A LINE CORRECT WILL CAUSE THE BUFFER TO
                * BE BACKED UP TO THE LAST LINE AND THE RW WILL BE READ TO PERFORM
                * THIS

10DC 2C50 06403 RDLC      CRWM          NRR
10DD B00F 06404           CALR          M=00
10DE 0402 06405           CKBD          ARDR
10DF E057 06406           JEPR LCTAPE            READ PREVIOUS DATA BLOCK
10E0 CEF8 06407           JEPR TEROB2
10E1 B8C9 06408           CALR          M=BC-M
10E2 970A 06409           BALG +A       (M=0)'   BRANCH IF NOT A BLOCK MARK
10E3 B10F 06410           CALR          M=10
10E4 9282 06411           BALG +2       M.G8=0   BRANCH IF NOT RECORD
10E5 CB2A 06412           JEPR RDFWD3
10E6 A30D 06413           JEPU BZERROR

10E7 CF4A 06415           JEPR XFRWROCL
10E8 2710 06416           CACM          NRF
10E9 E719 06417           JEPR SKPACSTP
10EA E4BF 06418           JEPR SERCTAPE
10EB 0002 06419           RNOP
10EC A724 06420           JEPU CLM

10ED E4BF 06422           JEPR SERCTAPE
10EE FAC2 06423           CALH          M=H0
10EF E4FC 06424           JEPR TEMFMT
10F0 9703 06425           BALG +3       (M=0)'   BRANCH IF NOT FORMAT CODE
10F1 0002 06426           RNOP
10F2 A00B 06427           JEPU LCFMT

10F3 E02B 06429           JEPR UPGZ=LS
10F4 CF30 06430           JEPR FECHRO+           2<
10F5 970D 06431           BALG -2       (M=0)'   3>
10F6 CEB2 06432           JEPR AJROST
10F7 A0AB 06433           JEPU AJCARCHC


                * CALCULATE LINE SPACE REQUIRED BY G7 AND PLACE IN H0

10F8 B0DF 06438 CAG7VSP   CALR          M=0D     H0 HAS LS CODE
10F9 D002 06439           BALH +2       M-H0=0   BR IF CODE NEED NOT BE CALCULATED
10FA FA02 06440           CALH          M=H0
10FB 8403 06441           JEPU CAMLS
10FC A728 06442           JEPU SEM=FF

10FD B28F 06445 TEKS      CALR          M=28
10FE A3BB 06446           JEPU FEA2RAM


                * CHARACTER CORRECT AFTER A LINE CORRECT
                * CLEAR HE AND H9. IF TAB COUNTER OPEN THEN CLEAR TABS
                * ADJUST BUFFER TO START, PROCESS CHARACTER CORRECT
```

```
ADDR CODE NUMBR LABEL     CMND NEXTADDR OPERAND             COMMENT


10FF F492 06453           *CHECK WORD*
1100 B124 06453 C LINCHC CALG          G2=0        CHC LCORR                  CN090
1101 ECF3 06454          JEPR CLHE9
1102 801F 06455          CALR          M=01
1103 9261 06456          BALG +1       M.G6=0      BRANCH IF TAB COUNTER NOT OPEN
1104 E4E8 06457          JEPR CLTC
1105 CDE7 06458          JEPR AJRWST
1106 0801 06459          JIPU +1
1107 E028 06460          JEPR UPCZ=LS
1108 CE15 06461          JEPR FECHRW+
1109 970D 06462          BALG -2       (M=0)'      BRANCH IF NOT END OF RW BUFFER
110A CDE2 06463          JEPR CLRW
110B E0AD 06464          JEPR AJCARCHC
110C CFFB 06465          JEPR AJCAH3
110D 8A44 06466          JEPU BZERI3

110E F004 06469 AJG01    CALH          H0=M        ADJUST H0,H1 PRIOR TO ADDING G0,G1
110F 880D 06470          CALR          M=M.80
1110 9301 06471          BALG +1       M=0         BRANCH IF POSITIVE NUMBER
1111 8FFF 06472          CALR          M=FF
1112 F014 06473          CALH          H1=M
1113 A65F 06474          JEPU ADG10H10



               *CONVERTS FIRST LINE FIND CODE TO CHAR CODE FOR CODE PRINT OR IF NOT FLF
               *CODE GOES TO "CODE PRINT CONVERSION" WHERE OTHER CONTROL CODES ARE
               *CONVERTED.

1114 812F 06482 CVG7CPCH CALR          M=12
1115 9071 06483          BALG +1       M-G7=0      A>       BRANCH IF G7=FIRST LINE FIND
1116 850A 06484          JEPU CVG7CP

1117 1AD1 06486          BPRT +1       LXL=0       A< B>    BRANCH IF "USO" SYSTEM.
1118 B1CA 06487          CALR          M=M+1C               12+1C+27=55=U CODE.
1119 B27A 06488          CALR          M=M+27         B<    12+27    =39=9 CODE.
111A 000F 06489          RETN



               * READERLINE CORRECT IN A RECORD MODE

111B CDE2 06494 RDLCRC   JEPR CLRW
111C CF77 06495          JEPR XF/RORW                    XFER REMAINING RO TO RW
111D E0DC 06496          JEPR RDLC                       READ PREVIOUS LINE
111E E4E6 06497          JEPR LKTC                       CLOSE TAB COUNTER
111F B114 06498          CALG          G1=0
1120 8A62 06499          CALG          M=G8
1121 1A5A 06500          BPRT +A       D85=0       BRANCH IF MARGIN CONTROL FLAG NOT SET
1122 0801 06501          JIPU +1                   >
1123 E74E 06502          JEPR INC G1               C<     COUNT TABS AT BEGINNING OF RO
1124 CF30 06503          JEPR FECHRO+              B<
1125 80A9 06504          CALR          M=0A-M
1126 930C 06505          BALG -3       M=0         C>   BR IF TAB
1127 CF30 06506          JEPR FECHRO+
1128 9306 06507          BALG +6       M=0         BRANCH IF NEXT RO IS NO CHARACTER
1129 80A9 06508          CALR          M=0A-M
112A 970C 06509          BALG -3       (M=0)'      BRANCH IF NOT A TAB
112B E4E0 06510          JEPR RETC
112C CF4A 06511          JEPR XFRWROCL
112D CFFB 06512          JEPR AJCAH3
112E A728 06513          JEPU SEM=FF

112F CF4A 06515          JEPR XFRWROCL
1130 CFFB 06516          JEPR SETC=G1
1131 C504 06517          JEPR LDTBRWC
1132 A0A3 06518          JEPU MVCALATB



               * FETCH G7 AND CALCULATE CONSUMED SPACE FOR COLUMN CENTERING

1133 8A72 06523 FEG7CSCC CALG          M=G7
1134 CFAD 06524          JEPR CAMCSCEN
1135 9705 06525          BALG +5       (M=0)'      A>     BRANCH IF CONSUMED SPACE NE 00
1136 8A62 06526          CALG          M=G8
1137 1A62 06527          BPRT +2       D86=0         B>   BRANCH IF CODE PRINT NOT ON
1138 E114 06528          JEPR CVG7CPCH
1139 A4C1 06529          JEPU CAMJCS

113A 800F 06531          CALR          M=00
113B 000F 06532          RETN                      A<B<

113C E1F4 06535 PRFMTAL  JEPR SVTB&MG              PRINT FORMATTED MARGINS AND TABS
113D E24E 06536          JEPR SEPFMT
113E A224 06537          JEPU RSTB&MG
```

```
ADDR CODE NUMBR LABEL    CMND NEXTADDR OPERAND              COMMENT

                 * ANALYZE CENTERING CORRECTION
                 * MOVE CARRIAGE TO POSITION PRIOR TO CENTERING CODE. EXECUTE A CHARACTER
                 * CORRECT FOLLOWING A LINE CORRECT TO INITIALIZE FLAGS.

113F CDBB 06545 ANCENCOR JEPR FERW                 HORIZ CORR CENT          CN100
1140 E501 06546          JEPR TEMSPTB
1141 9303 06547          BALG +3        M=0        BRANCH IF SPACE OR TAB
1142 CE15 06548          JEPR FECHRW+
1143 E200 06549          JEPR CAEOCENT
1144 A1E1 06550          JEPU CAHZCORC
1145 A100 06551          JEPU C LINCHC
1146 CFFB 06552 MVCRLMH3 JEPR AJCAH3   MOVE TO LM +H3
1147 8A44 06553          JEPU BZERI3


                 * CALCULATE COLUMN CENTER CORRECTION
                 * CALCULATE DISTANCE REQUIRED TO MOVE BACK BEFORE COLUMN CENTERING

1148 E157 06559 CACENC   JEPR CACEN1
1149 B80F 06560          CALR           M=80
114A BB22 06561          CALG           M=M@G2
114B A59E 06562          JEPU XFG2=M


                 * CALCULATE POSITION FOR DATA IN COLUMN CENTERING

114C C43A 06566 CACOLCEN JEPR FESTBCA+
114D B000 06567          CALG           M=M-1
114E D0A9 06568          BALH -6        M=M+HAC
114F A157 06569          JEPU CACEN1
1150 BA42 06570 CACENTER CALG           M=G4       CENT TO G2               CM025
1151 BA09 06571          CALR           M=A0-M
1152 970C 06572          BALG +C        (M=0)'     BRANCH IF NOT SPACE CODE
1153 E3AC 06573          JEPR FELM
1154 B024 06574          CALG           G2=M       PUT LEFT MARGIN IN G2
1155 EA7D 06575          JEPR FERMJ
1156 9027 06576          BALG +7        M=M+G2C    BRANCH IF CENTERING FIXED
1157 E0BB 06577 CACEN1   JEPR RML7
1158 B024 06578          CALG           G2=M
1159 B81F 06579          CALR           M=81
115A 9022 06580          BALG +2        M=M+G2C
115B E3A3 06581          JEPR FEPITCH
115C A067 06582          JEPU ADM+G10


115D A59E 06584          JEPU XFG2=M

115E A148 06586          JEPU CACENC

115F E3AC 06588          JEPR FELM
1160 B940 06589          CALG           M=M+G4
1161 B024 06590          CALG           G2=M
1162 E3A3 06591          JEPR FEPITCH
1163 A067 06592          JEPU ADM+G10


1164 BAA2 06595 FERM/TRM CALG           M=GA       FETCH RIGHT MARGIN AND TEST RIGHT MARGI
1165 1E01 06596          BPRT +1        DB0=1      BRANCH IF IN AUTO-LOG PRINT
1166 A3AE 06597          JEPU FERM

1167 B89F 06599          CALR           M=89
1168 A3BB 06600          JEPU FEA2RAM


                 *READS CARRIER POS. AND STORES IT. TESTS IF CARR. POS EQ. TO H3(CARR. POS.
                 **ON EMPTY RW BUFFER) SETS DUMP IF REV. IF NEQ.
                 **IF CASS. ACT. TEST REVISE. IF IN REVISE CK CHAR EQ TO LCR. XP CARR. POS.
                 **AND UPDATE RLRC
                 ***HO

1169 000F 06609          RETN                      1<

116A E890 06611 RDCARLRC JEPR TEDATAC                   BR. TO ACTIVE READER EOD TEST
116B 930D 06612          BALG -2        M=0        1>   BR. IF EOD
116C 2310 06613          CACM           M=RR
116D F004 06614          CALH           HO=M            STORE CARRIER POS. IN HO
116E CAF9 06615          JEPR UPDARLRC                  BR. TO UPDATE RLRC.
116F FA02 06616          CALH           M=HO            CARR. CHAR
1170 D035 06617          BALH +5        M-H3=0
1171 CED6 06618          JEPR FERO1ST
1172 1A72 06619          BPRT +2        DB7=0
1173 98CB 06620          BDAT +B        M=8C
1174 980A 06621          BDAT +A        M=80

1175 E4B7 06623          JEPR SEDUMPRV                  BR. TO SET DUMP IF REV.
1176 2AD4 06624          BRWM +4        ACT=0      2<>3BR. IF RW CASS NOT ACTIVE
1177 B10F 06625          CALR           M=10            REV. MASK
1178 92B4 06626          BALG +4        M.GB=0     4>   BR. IF REV NOT SET
1179 BA5F 06627          CALR           M=A5            LINE CORRECT CODE
117A 9072 06628          BALG +2        M-G7=0     4>   CHAR. EQ. TO LINE CORRECT
117B B01F 06629          CALR           M=01       3<   DUP. MASK
117C 9292 06630          BALG +2        M.G9=0          BR. IF NOT IN DUP. MODE
117D FA02 06631          CALH           M=HO       4<
117E F034 06632          CALH           H3=M            CARR. CHAR. TO CARRIER POS. REG.
117F E890 06633          JEPR TEDATAC                   BR. TO ACTIVE EOD TEST
1180 9305 06634          BALG +5        M=0        5>   BR. IF EOD
1181 2310 06635          CACM           M=RR            READ DATA TO M
```

```
ADDR CODE NUMBR LABEL     CMND NEXTADDR OPERAND          COMMENT

1182 CAF9 06636           JEPR UPDARLRC                  BR. TO UPDATE RLRC
1183 2710 06637           CACM          NRF           6< NORMAL READ FORWARD
1184 E86F 06638           JEPR TEDACLAC                  BR.
1185 970D 06639           BALG -2       (M=0)'        6>
1186 000F 06640           RETN                        5<



               * DO FORMAT HEADER USED KEYBOARD FORMAT MODE ANALYZE

1187 13C9 06645 FMTHDR    CPRT          RBDN
1188 E514 06646           JEPR FEKBFMT                GET KEYBOARD ENTRY
1189 E845 06647           JEPR ANFMTHDR               .AND PROCESS
118A B10F 06648           CALR          M=10
118B E7BF 06649           JEPR REGF                   RESET STOP BIT
118C 0702 06650           CKBD          BUZZ=0
118D A187 06651           JEPU FMTHDR



               *  IN CODE PRINT - RESET DEFD. TRACK PRINT BIT IN REG. G5, PRINT TRACK NO
               *  IN REVISE RECORD & TRACK PRINT RW BUFFER.
               *  NOT IN REVISE -' DUMP BUFFER
               * EXIT ROUTINE FROM FORMAT BLOCK
               * MOVE CARRIAGE TO LEFT MARGIN
               * RECORD AND TRACK PRINT THE FORMAT INFORMATION

118E E1AF 06661 EXFMT     JEPR ST&PTFMT
118F BA82 06662 EXFMTHDR  CALG          M=G8
1190 1E42 06663           BPRT +2       DB4=1         Q. REVISE ON?
1191 CA84 06664           JEPR DUMP&FCH               A. NO
1192 8060 06665           JEPU REKBIDL
1193 CCDC 06666           JEPR TEDUMPRV               A. YES
1194 8060 06667           JEPU REKBIDL



               *    STORE EMPTY RW BUFFER CARRIER POSITION IN REGISTER H3.
               *    STORE FORMAT CODE, LEFT MARGIN, RIGHT MARGIN, TABS & SPECIAL
               *          TABS IN RW BUFFER.
               *    REGISTER HC IS TAB/SPEC. TAB POS.
               *    SEPERATE TABS AND SPECIAL TABS WITH CODE 9F

1195 E4CA 06677 SEH3&FMT  JEPR SEH3=CA
1196 B10F 06678           CALR          M=10          STORE FMT CODE
1197 CDBF 06679           JEPR INRW+
1198 E3AC 06680           JEPR FELM
1199 CE02 06681           JEPR INDATRW+               STORE LEFT MARGIN
119A E3AE 06682           JEPR FERM
119B CE02 06683           JEPR INDATRW+               STORE RIGHT MARGIN
119C F1C4 06684           CALH          HC=0
119D C3F9 06685           JEPR FETBHC+                GET THE TABS
119E CDBF 06686           JEPR INRW+                  STORE IN BUFFER
119F 970D 06687           BALG -2       (M=0)'        BRANCH IF MORE TABS
11A0 B9FF 06688           CALR          M=9F
11A1 CE04 06689           JEPR CVRWCH                 STORE A SEPARATOR CODE
11A2 F1C4 06690           CALH          HC=0
11A3 C43B 06691           JEPR FESTBHC+               GET THE SPECIAL TABS
11A4 CDBF 06692           JEPR INRW+                  STORE IN BUFFER
11A5 970D 06693           BALG -2       (M=0)'        BRANCH IF MORE SPECIAL TABS
11A6 B9FF 06694           CALR          M=9F
11A7 8E04 06695           JEPU CVRWCH                 STORE IN SEPARATOR CODE



               *  IN FORMAT MODE - TRANSFER RO BUFFER TO THE RW BUFFER

11A8 CF3C 06700 XFFMT     JEPR XFCHRORW               FMT TRANSF.            C0080
11A9 CF3C 06701           JEPR XFCHRORW
11AA CEDB 06702           JEPR FERO+
11AB CDBF 06703           JEPR INRW+
11AC CEFD 06704           JEPR FEDATRO+
11AD 970D 06705           BALG -2       (M=0)'        BRANCH IF MORE DATA
11AE 000F 06706           RETN



               * SET UP AND PRINT FORMAT BLOCK

11AF C2EF 06712 ST&PTFMT  JEPR MVCRLM
11B0 E195 06713           JEPR SEH3&FMT               SET UP FMT BLOCK
11B1 B10F 06714           CALR          M=10
11B2 92B5 06715           BALG +5       M.G8=0        BR IF NOT REVISE
11B3 BAD2 06716           CALG          M=GD
11B4 D124 06717           BALH +4       M>H2          BRANCH IF BUFFER ADDRESS > NO. CHARS
11B5 FA22 06718           CALH          M=H2          REM. IN BLOCK
11B6 B3D0 06719           CALG          M=M-GD-1      REDUCE H2 BY # OF CHAR IN RW
11B7 F024 06720           CALH          H2=M
11B8 A1BC 06721           JEPU CPTP                   ..AND PRINT IT

11B9 CDE2 06723           JEPR CLRW
11BA E30D 06724           JEPR BZERROR
11BB A50F 06725           JEPU FMTMODEX
```

```
ADDR CODE NUMBR LABEL     CMND NEXTADDR OPERAND          COMMENT

                 *     CODE PRINT TRACK PRINT - CK CODE PRINT BIT (6) IN REG. G5.
                 *     IF LXL INSTALLED PRINT E. IF NOT PRINT R
                 *     PRINT FORMAT

11BC 8A82 06732 CPTP      CALG          M=G8       Q. CODE PRT ON
11BD 1E61 06733           BPRT +1       DB6=1      A. BRANCH IF ON
11BE 000F 06734           RETN
11BF C1F4 06735           JEPR MVLM&PF             DO A CR
11C0 845F 06736           CALR          M=45
11C1 1ED1 06737           BPRT +1       LXL=1      BRANCH IF LANGUAGE TRANSLATOR IN
11C2 8D1F 06738           CALR          M=D1
11C3 C5A9 06739           JEPR PRM/WORB
11C4 A426 06740           JEPU PRFMT

                 *  KEYBOARD MONITOR - MONITORS KEYBOARD STROBE AND ACTION MODES
                 *                     XFERS ENTRY FROM TO KEYBOARD STACK.

11C5 000F 06746           RETN
11C6 084E 06747 MOKB      BKBD -1       STROBE=0   TEST KEYBOARD FOR ENTRY
11C7 E55E 06748           JEPR TEACMODE
11C8 970C 06749           BALG -3       (M=0)'
11C9 0602 06750 XFKBKS    CKBD          KBST       TRANSFER ENTRY TO KEYBOARD STACK
11CA A261 06751           JEPU XFMKS

                 * DO NOTHING BUT BIGMO AND WAIT FOR KEYBOARD ENTRY

11CB C0BE 06756 WTKBCH    JEPR BIGMO
11CC 0C3F 06757           BKBD -0       STOP=1     BRANCH UNTIL STOP KEY RELEASED
11CD C29D 06758           JEPR TEKB
11CE 930C 06759           BALG -3       M=0        BRANCH NO KEYBOARD ENTRY
11CF 000F 06760           RETN

11D0 CF1D 06763 CARWHZ    JEPR FECHRW-             CALCULATE RW HORIZONTAL DISTANCE
11D1 E706 06764           JEPR XFH10G47
11D2 9308 06765           BALG +8       M=0        BRANCH IF NO ADJUSTMENT REQUIRED
11D3 E51F 06766           JEPR TEG7CR
11D4 9703 06767           BALG +3       (M=0)'     BRANCH IF CHARACTER NOT A CARRIAGE RET.
11D5 CDBA 06768           JEPR FERW+
11D6 E3AC 06769           JEPR FELM
11D7 0806 06770           JIPU +6
11D8 E467 06771           JEPR TEG72CH
11D9 9706 06772           BALG -9       (M=0)'     BRANCH IF SECOND CHARACTER
11DA A13F 06773           JEPU ANCENCOR

                 * CALCULATE THE NUMBER OF CHARACTERS REQUIRED IN MOVING THE RW
                 * BUFFER TO THE BEGINNING OF THE LINE WHEN A LINE CORRECT IS
                 * EXECUTED

11DB CD6A 06779           JEPR FERW+
11DC E3AC 06780 CARWHZLM  JEPR FELM
11DD F930 06781           CALH          M=M+H3
11DE B024 06782 CARWHZM   CALG          G2=M
11DF E287 06783 CAHZCOR1  JEPR FE2PCH
11E0 E6D6 06784           JEPR XMG2
11E1 CE15 06785 CAHZCORC  JEPR FECHRW+             HORIZ CORR CONT         CN070
11E2 9701 06786           BALG +1       (M=0)'     BRANCH IF NEXT CHARACTER IN BUFFER
11E3 000F 06787           RETN

11E4 E539 06789           JEPR TEMTB
11E5 9306 06790           BALG +6       M=0        BRANCH IF TAB
11E6 E706 06791           JEPR XFH10G47
11E7 C402 06792           JEPR CAG7LS
11E8 9708 06793           BALG -7       (M=0)'     BRANCH IF LS CHANGES
11E9 E133 06794           JEPR FEG7CSCC
11EA E10E 06795           JEPR AJG01
11EB A1E1 06796           JEPU CAHZCORC
11EC E287 06797           JEPR FE2PCH
11ED E79B 06798           JEPR DIG1/M
11EE BA12 06799           CALG          M=G1
11EF F0C4 06800           CALH          HC=M
11F0 C3F9 06801           JEPR FETBHC+
11F1 C4EF 06802           JEPR TBCRASH
11F2 B024 06803           CALG          G2=M
11F3 A1DF 06804           JEPU CAHZCOR1

                 * USED IN SEARCH MODE AND IN PRINTING FORMAT OF TABS
                 *

11F4 F104 06810 SVTB&MG   CALH          H0=0
11F5 FA02 06811           CALH          M=H0       SET THE FETCH ADDRESS
11F6 E3B8 06812           JEPR FEA2RAM
11F7 F0D4 06813           CALH          HD=M       SAVE M IN HD
11F8 FA02 06814           CALH          M=H0
```

```
ADDR CODE NUMBR LABEL     CMND NEXTADDR OPERAND            COMMENT

11F9 B48A 06815           CALR          M=M+48    SET THE SET ADDRESS
11FA E3D4 06816           JEPR SEA2RAM            STORE HD
11FB E75A 06817           JEPR INC HO
11FC B41F 06818           CALR          M=41
11FD D107 06819           BALH -8       M>HO
11FE 000F 06820           RETN

              * CALCULATE ENDING POSITION FOR DATA IN COLUMN CENTERING

11FF 3878 06825           *CHECK WORD*
1200 E230 06825 CAEOCENT  JEPR CLH4-H7            CALC EO CENT              CN110
1201 CE15 06826           JEPR FECHRW+
1202 9308 06827           BALG +8       M=0       BRANCH IF NO SECOND CHARACTER
1203 E3D7 06828           JEPR CVFF00
1204 930C 06829           BALG -3       M=0       BRANCH IF FILL CHARACTER
1205 E0D2 06830           JEPR TEMCENBP
1206 9304 06831           BALG +4       M=0       BRANCH IF NOT CENTERING BREAKPOINT
1207 FA02 06832           CALH          M=HO
1208 CFAD 06833           JEPR CAMCSCEN
1209 E9CA 06834           JEPR ADCSH54
120A 0806 06835           JIPU -9
120B CF1D 06836           JEPR FECHRW-
120C E715 06837           JEPR XFH45HO1
120D ECA0 06838           JEPR SHH1OR
120E E70C 06839           JEPR XFHO1GO1
120F B40F 06840           CALR          M=40
1210 9284 06841           BALG +4       M.G8=0    BRANCH IF NOT REVISE
1211 B14F 06842           CALR          M=14
1212 C5DB 06843           JEPR CVMCP
1213 E401 06844           JEPR CAMJCS
1214 E667 06845           JEPR ADM+G10
1215 E150 06846           JEPR CACENTER
1216 E2B7 06847           JEPR FE2PCH
1217 ACDB 06848           JEPU XMG2+G10

              * EXECUTE A FORMAT TAB USED ONLY IN ANKBFMT

1218 C525 06853 EXFMTTB   JEPR MVCARDE
1219 C427 06854           JEPR FEXTBCA+
121A 1E11 06855           BPRT +1       DB1=1     BRANCH IF SPECIAL TAB
121B 8476 06856           JEPU MVTAB
121C C476 06857           JEPR MVTAB
121D C07C 06858           JEPR MO
121E 1CDE 06859           BPRT -1       CMBY=1    WAIT UNTIL TAB IS DONE
121F 1308 06860           CPRT          RBUP
1220 B80F 06861           CALR          M=80
1221 E369 06862           JEPR DLY MSKB           LIFT RIBBON FOR SPECIAL TAB
1222 1309 06863           CPRT          RBDN
1223 000F 06864           RETN

1224 B48F 06867 RSTB&MG   CALR          M=48
1225 F004 06868           CALH          HO=M
1226 FA02 06869           CALH          M=HO      SET THE FETCH ADDRESS
1227 E3BD 06870           JEPR FEA2RAM
1228 FOD4 06871           CALH          HD=M      SAVE M IN HD
1229 FA02 06872           CALH          M=HO
122A B88A 06873           CALR          M=M+88    SET THE SET ADDRESS (HO-48)
122B E3D4 06874           JEPR SEA2RAM            STORE HD
122C E75A 06875           JEPR INC HO
122D B89F 06876           CALR          M=89
122E D107 06877           BALH -8       M>HO
122F 000F 06878           RETN

              * WAITS FOR KEYBOARD ENTRY
              *  BEEPS ON EVERY CHAR. AFTER BUFFER POS. /8A
              *  LOCKS AFTER THE 147TH KBD. ENTRY

1230 0C02 06885 WTKBNRPT  CKBD          KBST      KB WAIT WO RPT            CP020
1231 1309 06886           CPRT          RBDN
1232 COBE 06887           JEPR BIGMO
1233 0C3F 06888           BKBD -0       STOP=1
1234 084D 06889           BKBD -2       STROBE=0
1235 829F 06890           JEPU FECVKB

              * CLEAR KEYBOARD, KEYBOARD STACK
              * CLEAR KEYBOARD REGISTERS H4, H5, H6, & H7 IF IN JUSTIFY

1236 E27E 06896 CLKBKSRG  JEPR CLKS
1237 0C02 06897           CKBD          KBST      CLR KB & STACK            CP050
1238 B04F 06898           CALR          M=04
1239 9291 06899           BALG +1       M.G9=0    BRANCH IF NOT JUSTIFY
123A 000F 06900           RETN
123B F144 06901 CLH4-H7   CALH          H4=0      CLEAR STACK               CP050
123C F154 06902           CALH          H5=0
123D F164 06903           CALH          H6=0
123E F174 06904           CALH          H7=0
123F 000F 06905           RETN

              * KEYBOARD WAIT MONITOR - UPDATES BLOCK NO., TESTS KEYBOARD STACK & RPT.

1240 E08D 06910 PACEKB    JEPR MOKB&MED           KB WAIT MONITOR           CP030
1241 0CAE 06911           BKBD -1       NM=1
1242 B19F 06912           CALR          M=19
```

```
ADDR CODE NUMBR LABEL     CMND NEXTADDR OPERAND            COMMENT

1243 0003 06913           CKBD          2MDLY
1244 E0FC 06914           JEPR TEKS
1245 9301 06915           BALG +1       M=0      BRANCH NOTHING IN KEYBOARD STACK
1246 8CA9 06916           JEPU CVKBINP
1247 C2A1 06917           JEPR TEKBRP
1248 9701 06918           BALG +1       (M=0)'   BRANCH IF NOT REPEAT
1249 0003 06919           CKBD          2MDLY
124A 000F 06920           RETN

124B E32B 06923 MOBELL    JEPR UPBELL            BELL MONITOR              CP070
124C B19F 06924           CALR          M=19
124D A369 06925           JEPU DLY MSKB

124E E335 06928 SEPFMT    JEPR SEFMT             GET PRINT FORMAT
124F E1BC 06929           JEPR CPTP
1250 0A82 06930           CALG          M=G8
1251 1E61 06931           BPRT +1       DB6=1    BRANCH IF CODE PRINT NOT SET
1252 8EE9 06932           JEPU AUROLAIF

1253 CF30 06934           JEPR FECHRO+
1254 9704 06935           BALG +4       (M=0)'   BRANCH IF NXT CHAR DATA IN RO
1255 000F 06936           RETN                   RETN IF NO HEADER INFO

1256 C1F4 06938           JEPR MVLM&PF
1257 CF30 06939 PRFMTHDR  JEPR FECHRO+
1258 9305 06940           BALG +5       M=0      BR IF END OF HEADER
1259 B074 06941           CALG          G7=M
125A 989B 06942           BDAT -4       M=09     BRANCH IF SPECIAL CARRIAGE RETURN
125B 98F3 06943           BDAT +3       M=0F     BR IF PBS
125C C780 06944           JEPR PR&MVG7           PRINT CHAR
125D 0809 06945           JIPU -6

125E 81F4 06947           JEPU MVLM&PF

125F C411 06949           JEPR BS
1260 A257 06950           JEPU PRFMTHDR

          * TRANSFER M TO KBD. STACK - POS. 23F HOLDS STACK POINTER.
          * IF STACK FULL POS. 23F HAS 3E AND ROUTINE RETNS WITH M=00
          * IF STACK NOT FULL  INCR. CONTENTS OF RAM POS. 23F & DEPOSIT KBD. ENTRY
          * WHICH IS IN REG. HO IN POS. 2XX. (XX = CONTENTS OF POS. 23F )
1261 F004 06958 XFMKS     CALH          HO=M
1262 B3FF 06959 XFHOSTK   CALR          M=3F
1263 3084 06960           CMEM          A2IN
1264 3010 06961           CMEM          MOUT
1265 9BE6 06962           BDAT +6       M=3E     EXIT IF STACK FULL
1266 BF01 06963           CALG          M=M+1
1267 3008 06964           CMEM          MIN
1268 3084 06965           CMEM          A2IN
1269 FA02 06966           CALH          M=HO
126A 3008 06967 MIN       CMEM          MIN
126B 000F 06968           RETN

126C A724 06970           JEPU CLM

          * PUSH KEYBOARD STACK UP - TO PROCESS NEXT KBD ENTRY - SAVE M IN HO
126D F004 06974 AJKS+1    CALH          HO=M     STACK PUSH-UP             CP060
126E B3FF 06975           CALR          M=3F
126F 3084 06976           CMEM          A2IN
1270 3010 06977           CMEM          MOUT
1271 9A7B 06978           BDAT +B       M=27
1272 B000 06979           CALG          M=M-1
1273 3008 06980           CMEM          MIN
1274 B29F 06981           CALR          M=29
1275 3084 06982           CMEM          A2IN
1276 3011 06983           CMEM          MOUTD
1277 300A 06984           CMEM          MINI
1278 3052 06985           CMEM          AOUTI
1279 B3E9 06986           CALR          M=3E-M
127A 970B 06987           BALG -4       (M=0)'
127B 3001 06988           CMEM          ADEC
127C 3008 06989           CMEM          MIN
127D 8AD1 06990           JEPU XFM=HO

          * CLEAR KEYBOARD STACK - DEPOSIT 00 IN RAM POS. 228 THRU 23E
127E B28F 06995 CLKS      CALR          M=28
127F 3084 06996           CMEM          A2IN
1280 B00F 06997           CALR          M=00
1281 3008 06998           CMEM          MIN
1282 3052 06999           CMEM          AOUTI
1283 B3E9 07000           CALR          M=3E-M
1284 970B 07001           BALG -4       (M=0)'   BRANCH KEYBOARD STACK NOT FULL
1285 B27F 07002           CALR          M=27
1286 A26A 07003           JEPU MIN

1287 E3A3 07006 FE2PCH    JEPR FEPITCH           DBL PITCH TO M            CP150
1288 ACC0 07007           JEPU SML1

1289 A298 07010           JEPU TEBMTS

          *EXECUTE TEXT STRING SEARCH IN REVISE MODE. TEST FOR NOT ON CLEAR LEADER.
          *RECORD NOT ON.AND REVISE  ON  BEFORE GOING TO TEXT STRING SEARCH
```

```
ADDR CODE NUMBR LABEL    CMND NEXTADDR OPERAND          COMMENT

128A 2B91 07015 EXTSRVS  BACM +1       EOT=0     BR IF NOT ON LEADER
128B 8A44 07016          JEPU BZERI3

128C BA92 07018          CALG          M=G9
128D 1E5D 07019          BPRT -2       DB5=1     BR IF RECORD ON
128E BAB2 07020          CALG          M=G8
128F 1A49 07021          BPRT -6       DB4=0     A>    BR IF REVISE OFF
1290 BAF2 07022          CALG          M=GF
1291 1A52 07023          BPRT +2       DB5=0     G>    BR IF DUMP BIT NOT SET
1292 CD01 07024          JEPR RERV
1293 CC3C 07025          JEPR SERVON
1294 CDE2 07026          JEPR CLRW               G<
1295 A2A0 07027          JEPU TSRVS

1296 CEAE 07029          JEPR CLRO
1297 8A44 07030          JEPU BZERI3

                 * READS PPEVIOUS BLOCK AND  CHECKS FOR BLOCK MARK TO SIGNAL END OF
                 *               TEXT STRING SEARCH REVERSE. FETCH NEXT BLOCK OF DATA
                 *               IF NO  COMPARE  WITH CUE..

1298 CEF8 07036 TEBMTS   JEPR TEROB2
1299 970B 07037          BALG -4       (M=0)'
129A 2750 07038          CACM          NRR
129B E719 07039          JEPR SKPACSTP           READ PREVIOUSE RECORD
129C CF06 07040          JEPR FECH
129D 1A71 07041          BPRT +1       DB7=0
129E 98C7 07042          BDAT -8       M=8C          BR  IF BMK
129F CEE8 07043          JEPR AJROLA
12A0 C07C 07044 TSRVS    JEPR MO                 A<
12A1 CF0E 07045          JEPR FECHRO-
12A2 9304 07046          BALG +4       M=0
12A3 CE6B 07047          JEPR TETSCOMP
12A4 970B 07048          BALG -4       (M=0)'    A>    BR IF TEXT STRING DOESNT COMPARE
12A5 CC44 07049          JEPR SERWRV
12A6 805F 07050          JEPU BZI3               C<    SEARCH COMPLETE

12A7 0831 07052          BKBD +1       STOP=0    B< D>
12A8 8060 07053          JEPU REKBIDL                  TERMINATE SEARCH IF "STOP" SET

12A9 2750 07055          CACM          NRR          D<
12AA CC33 07056          JEPR TSTAPE
12AB CD7A 07057          JEPR SEH2RV
12AC 0000 07058          NOOP
12AD 0000 07059          NOOP
12AE CF30 07060          JEPR FECHRO+
12AF 88C9 07061          CALR          M=8C-M
12B0 9705 07062          BALG +5       (M=0)'    BRANCH IF NOT BMK
12B1 CEAE 07063          JEPR CLRO
12B2 B10F 07064          CALR          M=10
12B3 9281 07065          BALG +1       M.GB=0    BRANCH IF NOT REV
12B4 CCDD 07066          JEPR RDRV
12B5 8A44 07067          JEPU BZERI3                   SEARCH FAILS.

12B6 B7C9 07069          CALR          M=7C-M    E<
12B7 9302 07070          BALG +2       M=0       BRANCH IF FORMAT BLOCK
12B8 CEE8 07071          JEPR AJROLA
12B9 A2A0 07072          JEPU TSRVS              F<

12BA E335 07074          JEPR SEFMT
12BB CEB2 07075          JEPR AJROST
12BC A2A0 07076          JEPU TSRVS

                 *RIGHT MARGIN TEST
                 ***G2.

12BD E3AE 07082 TERM     JEPR FERM
12BE 8024 07083          CALG          G2=M      STORE RM IN G2
12BF BF0F 07084          CALR          M=F0      BIT MASK
12C0 B7F2 07085          CALG          M=M@GF'   RT. MARGIN RANGE
12C1 B921 07086          CALG          M=M+G2+1
12C2 CC12 07087          JEPR TECR=M
12C3 B08F 07088          CALR          M=08
12C4 000F 07089          RETN

                 * WAIT HALF SECOND - MONITORS TRANSPORTS & TESTS KED  UNTIL
                 *                  THE  HALF SECOND DELAY  HAS EXPIRED.

12C5 C07C 07097 WAITHS   JEPR MO
12C6 C29D 07098          JEPR TEKB
12C7 0CBD 07099          BKBD -2       NS=1      BRANCH DELAY NOT EXPIRED
12C8 000F 07100          RETN

                 *DELETES LAST CHARACTER PRINTED FROM RW BUFFER AND REPOSITIONS CARRIER AND
                 *OR PAPER POSITION TO ITS PREVIOUS POSITION.
                 ***G0.G1.G2.G3.G4.G7.H0.H1

12C9 C525 07107 C CHAR   JEPR MVCARDE
12CA CDBB 07108          JEPR FERW
12CB 9702 07109          BALG +2       (M=0)'    BRANCH IF RW BUFFER NOT EMPTY.
12CC CFFB 07110          JEPR AJCAH3
12CD 8A44 07111          JEPU BZERI3
12CE E4B7 07112          JEPR SEDUMPRV
12CF CF1D 07113          JEPR FECHRW-
```

```
ADDR CODE NUMBR LABEL     CMND NEXTADDR OPERAND            COMMENT

12D0 E7C9 07114           JEPR UPH2CHCT
12D1 E706 07115           JEPR XFH10G47
12D2 E3DD 07116           JEPR FEG7ACWT
12D3 9302 07117           BALG +2       M=0        BRANCH IF NOT ACCENT CODE
12D4 CDFA 07118           JEPR CLRWEOD
12D5 A313 07119           JEPU BZ
12D6 CF1D 07120           JEPR FECHRW-
12D7 E3DE 07121           JEPR FEMACWT
12D8 970D 07122           BALG -2       (M=0)'     BRANCH IF ACCENT CHAR
12D9 CE15 07123           JEPR FECHRW+
12DA CDFA 07124           JEPR CLRWEOD             CLEAR ACCENT CODES IF ANY
12DB E467 07125           JEPR TEG72CH
12DC 9702 07126           BALG +2       (M=0)'     BRANCH IF NO 2ND CHAR INVOLVED
12DD E313 07127           JEPR BZ
12DE A02F 07128           JEPU CAMVRWHZ            ADJ FOR CHAR OF UNDEFINED WIDTH

12DF E51F 07130           JEPR TEG7CR
12E0 9703 07131           BALG +3       (M=0)'     BRANCH IF NOT CARRIAGE RETURN CODE
12E1 C402 07132           JEPR CAG7LS
12E2 C337 07133           JEPR MV-V
12E3 A02F 07134           JEPU CAMVRWHZ            ADJ FOR CHAR OF UNDEFINED WIDTH

12E4 C402 07136           JEPR CAG7LS
12E5 9304 07137           BALG +4       M=0        BRANCH IF NOT INDEX OR REV INDEX
12E6 BA72 07138           CALG          M=G7
12E7 98D1 07139           BDAT +1       M=0D       BRANCH IF REV INDEX CODE
12E8 8336 07140           JEPU RIX                 ADJUST FOR INDEX CODE
12E9 8353 07141           JEPU IX                  ADJUST FOR REV INDEX CODE
12EA BA72 07142           CALG          M=G7
12EB B119 07143           CALR          M=11-M
12EC 9701 07144           BALG +1       (M=0)'
12ED C?2C 07145           JEPR RECOL
12EE BA72 07146           CALG          M=G7
12EF B0B9 07147           CALR          M=0B-M
12F0 930C 07148           BALG +C       M=0        BRANCH IF PRECEDENTED TAB
12F1 9406 07149           BALG +6       M=M-1=0    BRANCH IF TAB
12F2 E114 07150           JEPR CVG7CPCH
12F3 9301 07151           BALG +1       M=0        BRANCH IF NOT CONTROL CODE
12F4 E313 07152           JEPR BZ
12F5 E133 07153 C PRTCH   JEPR FEG7CSCC            FETCH WIDTH OF PRT CH. UBS. PBS. & SP.
12F6 E9E8 07154           JEPR SE&TEGO1            LOAD GO & G1 WITH CHAR WIDTH
12F7 835D 07155           JEPU MVCR-

12F8 BA62 07157           CALG          M=G6
12F9 1E02 07158           BPRT +2       DBO=1      BRANCH IF TAAB COUNTER OPEN
12FA CC11 07159           JEPR TELM
12FB 9701 07160           BALG +1       (M=0)'     BRANCH IF NOT AT LEFT MARGIN
12FC E61E 07161           JEPR DEC TC
12FD A02F 07162           JEPU CAMVRWHZ

                * ANALYZE  CHARACTER IN FORMAT HEADER MODE
                * IF  M=AE  EXECUTES CODE PRINT
                * IF  M=A5  EXECUTES LINE CORRECT
                * IF  M=A6  EXECUTES CHARACTER CORRECT
                * ANY OTHER RESULTS IN BUZZ ERROR

12FF ED7A 07171           *CHECK WORD*
1300 9AE3 07171 ANFMTHD1  BDAT +3       M=AE       BR. IF CODE PRINT
1301 9A53 07172           BDAT +3       M=A5       ..IF LINE CORRECT
1302 9A66 07173           BDAT +6       M=A6       BR IF CHAR CORRECT
1303 A30D 07174           JEPU BZERROR             ILLEGAL CHARACTER
1304 81E2 07175           JEPU SEPC                IF CODE PRT TOGGLE BIT

                * EXECUTE LINE CORRECT FORMAT

1305 C2EF 07179 EXLCFMT   JEPR MVCRLM              MOVE TO LEFT MARGIN
1306 CDE2 07180           JEPR CLRW                CLEAR BUFFER..
1307 CC44 07181           JEPR SERWRV
1308 8060 07182           JEPU REKBIDL

1309 CDBB 07184           JEPR FERW
130A 99F1 07185           BDAT +1       M=9F       BRANCH IF EXPANDED SPACE
130B A2C9 07186           JEPU C CHAR

130C A30D 07188           JEPU BZERROR

 *
                *  BUZZER ERROR & BUZZER - 2 BEEP INDICATION OR 1 BEEP INDICATION DEPENT-
                *  ING ON ENTRY..

130D 0722 07194 BZERROR   CKBD          BUZZ=2     ERROR BUZZER          CP110
130E B40F 07195           CALR          M=40
130F E369 07196           JEPR DLY MSKB            DELAY 80 MSEC
1310 0702 07197           CKBD          BUZZ=0
1311 B40F 07198           CALR          M=40
1312 E369 07199           JEPR DLY MSKB
1313 0722 07200 BZ        CKBD          BUZZ=2     BUZZER                CP110
1314 B80F 07201           CALR          M=80
1315 E369 07202           JEPR DLY MSKB
1316 0702 07203           CKBD          BUZZ=0
1317 000F 07204           RETN


1318 85CC 07208           JEPU MVCR-1

1319 81E2 07210           JEPU SEPC                TOGGLE CODE PRINT
```

```
ADDR CODE NUMBR LABEL    CMND NEXTADDR OPERAND           COMMENT

131A A305 07212          JEPU EXLCFMT              IF LINE COR..EXIT FORMAT

131B 8444 07214          JEPU SETB@CA              SET TAB

                 * ANALYZE KEYBOARD ENTRIES FOR CHARACTER CORRECT.CODE PRINT.LINE CORRECT.
                 *TAB SET.TAB CLEAR.SPEC. TAB SET, TOTAL TAB CLEAR.RIGHT AND LEFT
                 * MARGIN SET

131C 9A6B 07220 ANKBFMT1 BDAT -4        M=A6       BRANCH IF CHC
131D 9AEB 07221          BDAT -4        M=AE       ..CODE PRT
131E 9A5B 07222          BDAT -4        M=A5       ..LINE CORRECT
131F 9B0B 07223          BDAT -4        M=B0       ..TAB SET
1320 9B15 07224          BDAT +5        M=B1       TAB CLEAR
1321 9B25 07225          BDAT +5        M=B2       SPEC. TAB SET
1322 9B35 07226          BDAT +5        M=B3       TOTAL TAB CLR.
1323 9B45 07227          BDAT +5        M=B4       LEFT MARGIN SET
1324 9B55 07228          BDAT +5        M=B5       RIGHT MARGIN SET
1325 A30D 07229          JEPU BZERROR              CHARACTER NOT LEGAL
1326 842F 07230          JEPU CLTBSTBC             IF TAB CLEAR
1327 8440 07231          JEPU SESTB@CA             IF SPECIAL  TAB SET
1328 8420 07232          JEPU CLALLTB              IF TOTAL TAB CLEAR
1329 821D 07233          JEPU SELMCA               IF LEFT MARGIN
132A 821B 07234          JEPU SERMCA               IF RIGHT MARGIN

                 * REGISTER H8 BIT 7 = BELL INITIATED
                 * REGISTER H8 BIT 6 = BELL IN PROGRESS
                 * SET BELL IF IN MARGIN ZONE
132B E28D 07240 UPBELL   JEPR TERM                 S/R BELL                CP080
132C 9212 07241          BALG +2        M.G1=0
132D B60F 07242          CALR           M=80
132E A7C4 07243          JEPU REH8
132F BC0F 07244          CALR           M=C0
1330 D281 07245          BALH +1        M.H8=0
1331 000F 07246          RETN
1332 0023 07247          CKBD           RTIME
1333 0722 07248          CKBD           BUZZ=2
1334 A7C6 07249          JEPU SEH8

                 * MOVES CARRIER TO EITHER LEFT MARGIN OR TEMP. LEFT MARGIN
                 * FETCHS BUFFER DATA FOR PRINT FORMAT MODE. CLEARS ALL PREVIOUS TAB &
                 * SPECIAL TAB SETTINGS. & SETS TEMPORARY TAB & SP. TAB SETTINGS FOR
                 * FORMAT PRINT

1335 E3AC 07257 SEFMT    JEPR FELM
1336 CG12 07258          JEPR TECR=M               TEST IF CARRIAGE IS AT LM
1337 F004 07259          CALH           HO=M       STORE RELATIVE CARRIAGE POSITION
1338 CEFD 07260          JEPR FEDATRO+
1339 E3BD 07261          JEPR SELM
133A FA02 07262          CALH           M=HO
133B 9701 07263          BALG +1        (M=0)'     WAS CARRIER AT LM
133C C3F1 07264          JEPR MVLM/TLM             YES GO TO NEW LM
133D CEFD 07265          JEPR FEDATRO+
133E E3C0 07266          JEPR SERM
133F C420 07267          JEPR CLALLTB              CLEAR PREVIOUS SETTINGS
1340 CED8 07268          JEPR FERO+
1341 1A71 07269          BPRT +1        DB7=0      TEST FOR (9F) TO INDICATE END..
1342 99F3 07270          BDAT +3        M=9F       ..OF TABS
1343 FOC4 07271          CALH           HC=M
1344 C446 07272          JEPR SETB@HC              SET TAB
1345 080A 07273          JIPU -5
1346 CED8 07274          JEPR FERO+
1347 1A71 07275          BPRT +1        DB7=0      TEST FOR (9F) TO INDICATE END..
1348 99F3 07276          BDAT +3        M=9F       ..OF SPECIAL TABS
1349 FOC4 07277          CALH           HC=M
134A C441 07278          JEPR SESTB@HC             SET SPECIAL TABS
134B 080A 07279          JIPU -5
134C 000F 07280          RETN

                 * FLASHING BUZZER ON MONITOR STOP KEY & SET STOP BIT.

134D 0C3F 07285 LOCK ERR BKBD -0        STOP=1     ERROR LOCK              CP100
134E 1309 07286          CPRT           RBDN
134F 0732 07287          CKBD           BUZZ=3
1350 C07C 07288          JEPR MO
1351 CB3E 07289          BKBD -1        STOP=0
1352 0602 07290          CKBD           KBST
1353 A473 07291          JEPU SESTOP

                 * FLASHING    BUZZER ON - STORE MODE (REG. G9)IN G7 CHECK FOR UNDERSCORE
                 * MONITOR EJECT KEY AND KBD LAMPS & STOP KEY

1354 0732 07297 BZLKM=G9 CKBD           BUZZ=3     M=G9 BUZZER TO LOCK     CP090
1355 BA92 07298 LKM=G9   CALG           M=G9       LOCK M=G9               CP090
1356 BABD 07299          CALR           M=M.AB
1357 0801 07300          JIPU +1
1358 0732 07301 BZLK     CKBD           BUZZ=3     BUZZER TO LOCK          CP090
1359 B074 07302          CALG           G7=M
135A BAA2 07303          CALG           M=GA
135B 1A72 07304          BPRT +2        DB7=0      BRANCH NOT COMMUNICATIONS
135C 071F 07305          JEXA           EA1
135D 8004 07306          JEPU 0004

135E 0C3F 07308          BKBD -0        STOP=1
135F CFB9 07309          JEPR USPART
1360 1309 07310          CPRT           RBDN
```

```
ADDR CODE NUMBR LABEL     CMND NEXTADDR OPERAND              COMMENT

1361 C0E5 07311           JEPR MORWLOOP
1362 C25F 07312           JEPR MOTAPE
1363 BA72 07313           CALG          M=G7
1364 0202 07314           CKBD          LDR2
1365 BA82 07315           CALG          M=G8
1366 0102 07316           CKBD          LDR1
1367 0839 07317           BKBD -6       STOP=0
1368 B060 07318           JEPU REKBIDL

                * KEYBOARD MILLISEC. DELAY - MONITORS KEYBOARD & CARD. WAIT DELAY ON M.

1369 0003 07323 DLY MSKB CKBD           2MDLY
136A C07C 07324 WAITMS    JEPR MO
136B E1C6 07325           JEPR MOKB
136C 0CAD 07326           BKBD -2       NM=1
136D 000F 07327           RETN

                * SET AND WAIT FOR A MILL.SECOND DELAY DETERMINED BY CONTENTS OF M
                * RESET  ONE HALF SECOND DELAY

136E 0003 07333 DLYMSWOM CKBD           2MDLY
136F 0CAF 07334 WAITWOM  BKBD -0        NM=1
1370 B00F 07335 REHSDLY  CALR           M=00
1371 0013 07336           CKBD          HSDLY
1372 000F 07337           RETN

                *  ANAL. FORMAT - TESTS FOR XLX.
                *  TESTS FOR WORD/LINE BITS IN REG. G8. DUP. BIT IN G9
                *  IF IN DUP. DUMPS RW SETS PRINT FMT & XFERS RO TO RW BUFFER AND DUMPS.
                *  IF NOT IN PLAY - SETS DUMP BIT IN REVISE & AJUSTS RO BUFFER.
                *  IF PLAY - DUMP RW. XFER RO TO RW BUFFER & SET PRINT FORMAT & DUMP
                *  IF PLAY REVISE DUMP BIT SET & RW EMPTY - RESET DUMP BIT & XFER RO TO RW
                *          SET PRINT FORMAT. IF DUMP BIT NOT SET FETCH CHAR.

1373 E59C 07348 ANFMT     JEPR TEXLX
1374 B03F 07349           CALR          M=03
1375 9281 07350           BALG +1       M.G8=0      BRANCH WORD AND LINE FLAGS NOT SET
1376 0002 07351           RNOP
1377 BA92 07352           CALG          M=G9
1378 1A14 07353           BPRT +4       DB1=0       BRANCH DUP FLAG NOT SET
1379 E487 07354           JEPR SEDUMPRV
137A 8EE9 07355           JEPU AJROLAIF
137B CAA5 07356 ANFMT1    JEPR DUMPIFDA
137C A9A8 07357           JEPU ENDFMTRC
137D B08F 07358           CALR          M=08
137E 929C 07359           BALG -3       M.G9=0      BRANCH NOT PLAY
137F E5A6 07360           JEPR TERV
1380 9307 07361           BALG +7       M=0         BRANCH NOT REVISE
1381 B20F 07362           CALR          M=20
1382 92F5 07363           BALG +5       M.GF=0      BRANCH DUMP NOT SET
1383 E7BF 07364           JEPR REGF
1384 CDBB 07365           JEPR FERW
1385 9302 07366           BALG +2       M=0         BRANCH NO CHARACTER IN RW
1386 E487 07367           JEPR SEDUMPRV
1387 87F0 07368           JEPU FEDA

1388 E24E 07370           JEPR SEPFMT
1389 B20F 07371           CALR          M=20
138A 929C 07372           BALG -3       M.G9=0      BRANCH NOT RECORD MODE
138B A37B 07373           JEPU ANFMT1

                * PUSH  RETN STACK UP

138C 0002 07379 RETN4     RNOP                      RETURN 4 DEEP IN STACK
138D 0002 07380 RETN3     RNOP                      RETURN 3 DEEP
138E 0002 07381 RETN2     RNOP                      RETURN 2 DEEP
138F 0002 07382 RETN1     RNOP                      RETURN 1 DEEP
1390 000F 07383           RETN

                *  INCREMENT BILLING CLOCK
1391 C611 07387 BILL      JEPR TELM                 BILL                    CP085
1392 9308 07388           BALG +8       M=0         BRANCH NOT AT LEFT MARGIN
1393 E55E 07389           JEPR TEACMODE
1394 9306 07390           BALG +6       M=0         BRANCH NOT ACTION MODE
1395 BFFF 07391 BILLC     CALR          M=FF
1396 E3BB 07392           JEPR FEA2RAM
1397 B01A 07393           CALR          M=M+01
1398 98A5 07394           BDAT +5       M=0A        BRANCH IF TAB
1399 9852 07395           BDAT +2       M=05
139A 3008 07396           CMEM          MIN
139B 000F 07397           RETN

139C 0033 07399           CKBD          STIME
139D 080C 07400           JIPU -3
139E B00F 07401           CALR          M=00
139F 080A 07402           JIPU -5

                * FETCH FRACTIONAL COLUMN DATA

13A0 BF0F 07407 FEFR      CALR          M=F0        FRACT TO M              CP140
13A1 BEC2 07408           CALG          M=M.GC
13A2 A08E 07409           JEPU RML4                 PUT FR. COL DATA LSB OF M
```

```
ADDR CODE NUMBR LABEL      CMND NEXTADDR OPERAND                COMMENT

                  * PITCH STORED IN REG GF BITS 7 & 6. FETCH PITCH & RETN WITH 86 =12 PITCH
                  * AND 05 = 10 PITCH

13A3 B80F 07415 FEPITCH  CALR            M=80       PITCH TO M               CP140
13A4 92F1 07416          BALG +1         M.GF=0
13A5 B7FF 07417          CALR            M=7F
13A6 B86A 07418          CALR            M=M+86
13A7 000F 07419          RETN

                  * FETCH CARRIER POSITION STORED IN REGISTER HA.

13A8 FAA2 07424 FECA+1   CALH            M=HA       FETCH CARR
13A9 9701 07425          BALG +1         (M=0)'
13AA BF01 07426          CALG            M=M+1
13AB 000F 07427          RETN

13AC B40F 07430 FELM     CALR            M=40          LEFT MARGIN
13AD A3BB 07431          JEPU FEA2RAM
13AE B41F 07432 FERM     CALR            M=41          RIGHT MARGIN
13AF A3BB 07433          JEPU FEA2RAM
13B0 B42F 07434 FEBNRW   CALR            M=42          READ/WRITE MEDIA TRACK NUMBER
13B1 A3BB 07435          JEPU FEA2RAM
13B2 B43F 07436 FEBNRO   CALR            M=43          READ ONLY MEDIA TRACK NUMBER
13B3 A3BB 07437          JEPU FEA2RAM
13B4 B44F 07438 FEFLPRE  CALR            M=44         "FIRST LINE"PRESET NUMBER
13B5 A3BB 07439          JEPU FEA2RAM
13B6 B45F 07440 FEFLCTR  CALR            M=45         "FIRST LINE"LINE COUNTER
13B7 A3BB 07441          JEPU FEA2RAM
13B8 B46F 07442 FELCPRE  CALR            M=46.        "PAGE END" PRESET NUMBER
13B9 A3BB 07443          JEPU FEA2RAM
13BA B47F 07444 FELCCTR  CALR            M=47         "PAGE END" LINE COUNTER
13BB 3084 07445 FEA2RAM  CMEM            A21N
13BC 84C9 07446          JEPU MOUT

                  *STORE M IN PREASSIGNED REGISTERS IN SECTION 2 OF RAM
                  **HD

13BD F0D4 07452 SELM     CALH            HD=M       STORE LEFT MARGIN
13BE B40F 07453          CALR            M=40
13BF A3D4 07454          JEPU SEA2RAM
13C0 F0D4 07455 SERM     CALH            HD=M       STORE RIGHT MARGIN
13C1 B41F 07456          CALR            M=41
13C2 A3D4 07457          JEPU SEA2RAM
13C3 F0D4 07458 SEBNRW   CALH            HD=M       STORE READ/WRITE MEDIA TRACK NUMBER
13C4 B42F 07459          CALR            M=42
13C5 A3D4 07460          JEPU SEA2RAM
13C6 F0D4 07461 SEBNRO   CALH            HD=M       STORE READ ONLY MEDIA TRACK NUMBER
13C7 B43F 07462          CALR            M=43
13C8 A3D4 07463          JEPU SEA2RAM
13C9 F0D4 07464 SEFLPRE  CALH            HD=M       STORE FIRST LINE PRESET NUMBER
13CA B44F 07465          CALR            M=44
13CB A3D4 07466          JEPU SEA2RAM
13CC F0D4 07467 SEFLCTR  CALH            HD=M       STORE FIRST LINE LINE COUNTER
13CD B45F 07468          CALR            M=45
13CE A3D4 07469          JEPU SEA2RAM
13CF F0D4 07470 SELCPRE  CALH            HD=M       STORE PAGE END PRESET NUMBER
13D0 B46F 07471          CALR            M=46
13D1 A3D4 07472          JEPU SEA2RAM
13D2 F0D4 07473 SELCCTR  CALH            HD=M       STORE PAGE END LINE COUNTER
13D3 B47F 07474          CALR            M=47
13D4 3084 07475 SEA2RAM  CMEM            A21N
13D5 FAD2 07476          CALH            M=HD
13D6 A26A 07477          JEPU MIN

                  * CONVERT FF TO 00 - RETN WITH M=00 IF ENTERED WITH FF

13D7 BF01 07482 CVFF00   CALG            M=M+1      NOP TO ZERO              CP160
13D8 9301 07483          BALG +1         M=0
13D9 B000 07484          CALG            M=M-1
13DA 000F 07485          RETN
                  * IF M =00 RETN WITH FF

13DB 930D 07488 CV00FF   BALG -2         M=0        ZERO TO NOP              CP160
13DC 000F 07489          RETN

                  *TESTS G7 OR M FOR ACCENT AND IF ACCENT RETURNS WITH WEIGHT OF ACCENT ON
                  **M. IF NOT AN ACCENT THEN RETURN WITH M=00.
                  ***G3

13DD BA72 07497 FEG7ACWT CALG            M=G7
13DE B034 07498 FEMACWT  CALG            G3=M
13DF E532 07499          JEPR TEMPC
13E0 9706 07500          BALG +6         (M=0)'
13E1 C12A 07501          JEPR CVG3TOPC                   CONVERT TO UNIQUE CODE
13E2 1E7A 07502          BPRT +A         DB7=1      A>
13E3 98A4 07503          BDAT +4         M=0A       B>   UPPER CASE GRAVE  ACCENT
13E4 99E3 07504          BDAT +3         M=1E         C> UPPER CASE CIRCUMFLEX
13E5 99B4 07505          BDAT +4         M=1B       D>   UMLAUT
13E6 9DE3 07506          BDAT +3         M=5E         E> CIRCUMFLEX
13E7 A724 07507          JEPU CLM
```

```
ADDR CODE NUMBR LABEL    CMND NEXTADDR OPERAND            COMMENT

13E8 BA62 07509          CALG          M=G6      B>C>
13E9 1E71 07510          BPRT +1       DB7=1     F>      PROP SPACING
13EA A3A3 07511          JEPU FEPITCH            D<E<G<H<

13EB 807F 07513          CALR          M=07      F<      WEIGHT OF UPPER CASE ACCENTS.
13EC 000F 07514          RETN

13ED 988C 07516          BDAT -3       M=88      A<  G>  ACCUTE
13EE 989B 07517          BDAT -4       M=89          H< GRAVE ACCENT
13EF A724 07518          JEPU CLM

              * FETCH AMT. OF ESCAPE. FOR CHAR. IN REG. G3.

13F0 BA32 07523 FEG3WT   CALG          M=G3      GET G3 WEIGHT          CP170
13F1 9A01 07524 FEMWT    BDAT +1       M=20      GET M WEIGHT           CP170
13F2 A49A 07525          JEPU FEMPCWT
13F3 0000 07526 FESTDSP  NOOP
13F4 B80F 07527          CALR          M=80
13F5 AAFB 07528          JEPU FESTDSPC


13F6 E3DE 07532 FEMWIDTH JEPR FEMACWT                    FETCH WIDTH IF ACCENT
13F7 9301 07533          BALG +1       M=0       A>      BRANCH IF NOT ACCENT
13F8 000F 07534          RETN

13F9 A49B 07536          JEPU FEG3PCWT           A<      FETCH WIDTH OF NON ACCENT CHAR.

              * FETCH THE PITCH TWICE DEVIDE INTO G1 CONVERT TO BINARY AND STORE
              * IN G4  G1.G0 CONTAIN CARRIAGE POSITION. RETN W RESULT IN M

13FA E287 07542 PITCHDIV JEPR FE2PCH
13FB A79B 07543          JEPU DIG1/M


13FC E67F 07546 G4BIN    JEPR CVBCBIG4
13FD A738 07547          JEPU XFG4=M

              *CALCULATES HORIZ SPACE REQUIRED BY CHAR IN G7 (IN 1/2 UNITS).A SPACE
              **HAS ZERO PRINTING CONSUMED SPACE.
              ***G3

13FE C4A7 07554          *ADJUST WORD*
13FF 555F 07554          *CHECK WORD**
1400 BA72 07554 CAG7JCS  CALG          M=G7      CALCUALTE G7 JUSTIFY CONSUMED SPACE
1401 B034 07555 CAMJCS   CALG          G3=M
1402 B7FD 07556          CALR          M=M.7F
1403 B68A 07557          CALR          M=M+68
1404 1A72 07558          BPRT +2       DB7=0     BRANCH IF NOT A PRINTING CHAR.
1405 E49B 07559          JEPR FEG3PCWT
1406 ACC0 07560          JEPU SML1

1407 B0FF 07562          CALR          M=0F
1408 B331 07563          CALG          M=M-G3
1409 9703 07564          BALG +3       (M=0)'    BRANCH IF NOT A BACKSPACE CODE
140A E287 07565          JEPR FE2PCH             CHAR IS BACKSPACE CODE
140B B009 07566          CALR          M=00-M
140C 000F 07567          RETN

140D 9401 07569          BALG +1       M=M-1=0   BRANCH IF A UNIT BACKSPACE CODE.
140E A724 07570          JEPU CLM

140F A728 07572          JEPU SEM=FF

              *FETCHS HIGH ORDER PRINTER DATA FOR CONSTANT SPOKE CHARACTERS.(2BITS OF
              **HAMMER FORCE & 2MSB OF CHAR WT.

1410 1A64 07578 FEHPD    BPRT +4       DB6=0
1411 B3FD 07579          CALR          M=M.3F
1412 0031 07580 XLH      CKBD          XL=MH
1413 0001 07581          CKBD          M=XL
1414 000F 07582          RETN

1415 E412 07584          JEPR XLH
1416 A68E 07585          JEPU RML4

              *FETCHES HIGH ORDER PRINTER DATA FOR VARIABLE SPOKE CHARACTERS.(2BITSOF
              **HAMMER FORCE & 3 BITS OF CHAR WT.

1417 A724 07591          JEPU CLM

1418 1ADE 07593 FEHPDVS  BPRT -1       LXL=0
1419 310C 07594          CMEM          APIN
141A B00F 07595          CALR          M=00
141B 3110 07596          CMEM          ALIN
141C 3120 07597          CMEM          XOUT
141D 000F 07598          RETN


              *RESET CENTERING BIT IF G7 CONTAINS A CHAR WHICH DEFINES THE END OF
              **CENTERED TEXT.
```

```
ADDR CODE NUMBR LABEL    CMND NEXTADDR OPERAND              COMMENT

141E 8A72 07605 RECENIF  CALG          M=G7
141F E0D2 07606          JEPR TEMCENBP
1420 9301 07607          BALG +1       M=0       A BRANCH IF CHAR DEFINES END OF CENTERED
                                                      TEXT.
1421 000F 07608          RETN

1422 B40F 07610 RECEN    CALR          M=40
1423 A792 07611          JEPU REG6

                 * PRINT FORMAT  INFORMATION
                 *PRINT LANGUAGE.LEFT MARGIN . RIGHT MARGIN . TABS AND SPECIAL
                 *TABS . RETURN TO LEFT MARGIN

1424 C1F4 07618 PRFMTLNG JEPR MVLM&PF                DO A CR
1425 C1D7 07619          JEPR PRLNG
1426 B4DF 07620 PRFMT    CALR          M=4D
1427 C4E0 07621          JEPR ESC&PRM                PRINT 'M'
1428 B47F 07622          CALR          M=47
1429 C4E0 07623          JEPR ESC&PRM                PRINT 'G'
142A B3AF 07624          CALR          M=3A
142B C4E0 07625          JEPR ESC&PRM                PRINT ':'
142C C4EC 07626          JEPR SPSTD                  PRINT ' '
142D E3AC 07627          JEPR FELM
142E C52E 07628          JEPR PRMBIN                 PRINT LEFT MARGIN
142F C4EC 07629          JEPR SPSTD
1430 E3AE 07630          JEPR FERM
1431 C52E 07631          JEPR PRMBIN                 PRINT RIGHT MARGIN
1432 F1C4 07632          CALH          HC=0
1433 C428 07633          JEPR FEXTBHC+
1434 9701 07634          BALG +1       (M=0)'        Q. ANY TABS
1435 81F4 07635          JEPU MVLM&PF
1436 C1F4 07636          JEPR MVLM&PF                DO CR
1437 F1C4 07637          CALH          HC=0
1438 C3F9 07638          JEPR FETBHC+                TEST FOR TABS
1439 9304 07639          BALG +4       M=0           Q. TAB?
143A B54F 07640          CALR          M=54          A. YES
143B C4E0 07641          JEPR ESC&PRM                PRINT 'T'
143C B42F 07642          CALR          M=42
143D C4E0 07643          JEPR ESC&PRM                PRINT 'B'
143E F1C4 07644          CALH          HC=0
143F C43B 07645          JEPR FESTBHC+               GET THE SPECIAL TABS
1440 9308 07646          BALG +8       M=0           Q. SPECIAL TAB?
1441 F1C4 07647          CALH          HC=0          A. YES
1442 C3F9 07648          JEPR FETBHC+
1443 9301 07649          BALG +1       M=0
1444 C4EC 07650          JEPR SPSTD                  PRINT ' '
1445 B54F 07651          CALR          M=54
1446 C5A9 07652          JEPR PRM/WORB
1447 B42F 07653          CALR          M=42
1448 C5A9 07654          JEPR PRM/WORB
1449 B3AF 07655          CALR          M=3A
144A C4E0 07656          JEPR ESC&PRM                PRINT ':'
144B F1C4 07657          CALH          HC=0
144C C428 07658 PRTFMTC  JEPR FEXTBHC+
144D 9701 07659          BALG +1       (M=0)'
144E 81F4 07660          JEPU MVLM&PF

144F E164 07662          JEPR FERM/TRM
1450 1A71 07663          BPRT +1       DB7=0
1451 BFCA 07664          CALR          M=M+FC
1452 D1A1 07665          BALH +1       M>HA          Q. IS RIGHT MARGIN GREATER THAN CARR
1453 C1F5 07666          JEPR MVFMTLM                A. NO. DO CR.
1454 C4C4 07667          JEPR FEXTBHC                GET THE TAB(S)
1455 1A04 07668          BPRT +4       DB0=0         BRANCH IF NO TAB
1456 C4EC 07669          JEPR SPSTD                  PRINT ' '
1457 FAC2 07670          CALH          M=HC
1458 C52E 07671          JEPR PRMBIN                 PRINT THE TAB
1459 C4C4 07672          JEPR FEXTBHC                GET THE TAB(S)
145A 1A13 07673          BPRT +3       DB1=0
145B C4EC 07674          JEPR SPSTD
145C FAC2 07675          CALH          M=HC
145D C5B9 07676          JEPR PRMBIN/                PRINT THE SPECIAL TAB
145E A44C 07677          JEPU PRTFMTC

145F C12A 07680 FEG3HF   JEPR CVG3TOPC               CONVERT G3 TO UNIQUE PRINTING CODE
1460 1A73 07681          BPRT +3       DB7=0
1461 E41B 07682          JEPR FEHPDVS                FETCH HIGH ORDER PRINTER DATA FOR
1462 E5BB 07683          JEPR RML7                    VARIABLE SPOKE CHAR.
1463 0801 07684          JIPU +1
1464 E410 07685          JEPR FEHPD                  FETCH HIGH ORDER PRINTER DATA FOR
1465 B0CD 07686          CALR          M=M.OC         CONSTANT SPOKE CHAR.
1466 000F 07687          RETN

1467 8A72 07690 TEG72CH  CALG          M=G7          G7 SECOND CHAR ANALYSIS
1468 1E73 07691 TEM2CH   BPRT +3       DB7=1
1469 9935 07692          BDAT +5       M=13          BR. IF CEN
146A 9944 07693          BDAT +4       M=14          BR. IF TEMP CEN
146B A728 07694          JEPU SEM=FF

146C 9872 07696          BDAT +2       M=87          BR. IF SCH
146D 9891 07697          BDAT +1       M=89          BR. IF SWS
146E 000F 07698          RETN
146F A724 07699          JEPU CLM

                 ** MONITORS KB STOP KEY. IF FALSE. RETNS WITH M=0 ONLY IF STOP BIT NOT SET
                 ** IF KB STOP KEY TRUE.JUMPS TO SEGF SUBRTN TO SET STOP BIT.
```

```
ADDR CODE NUMBR LABEL     CMND NEXTADDR OPERAND           COMMENT

1470 B40F 07705 EVSTOP    CALR              M=40
1471 0833 07706           BKBD +3           STOP=0       BRANCH STOP NOT DEPRESSED
1472 E7B2 07707           JEPR REG9                      RESET SEARCH CODE
1473 B10F 07708 SESTOP    CALR              M=10
1474 A7C1 07709           JEPU SEGF                      RESET STOP BIT

1475 B092 07711           CALG              M=M.G9'
1476 9302 07712           BALG +2           M=0
1477 B10F 07713           CALR              M=10
1478 BEF2 07714           CALG              M=M.GF
1479 000F 07715           RETN

          * SKIP SPACES & TABS - TESTS M FOR SPACE OR TAB.IF NOT A SP OR TB XFER
          * REG  H1 TO G4, H0 TO G7. IF M = SP OR TB AJUST RO BUFFER MINUS 1 &
          * FETCH 2 CHAR. INTO H1 & H0. EFFECTIVELY DROPS CHAR. IN H0.

147A E501 07722 SKSPTBAJ JEPR TEMSPTB                   SKIP SP/TB              CP250
147B 9301 07723           BALG +1      M=0
147C A706 07724           JEPU XFH10G47
147D E4BA 07725           JEPR SKSPTB1F
147E CE5C 07726           JEPR AJRO-
147F CF30 07727           JEPR FECHRO+
1480 A706 07728           JEPU XFH10G47

          * REMOVE SPACES AND TABS FROM ROB G0=NO. OF CHAR. TO FIRST NON SPACE OR
          * TAB  EXIT WITH FIRST NON SPACE OR TAB ON M.

1481 B104 07733 SKSPTBRO CALG               G0=0         REMOVE SP/TB            CP250
1482 E73A 07734           JEPR INC G0
1483 CED8 07735           JEPR FERO+
1484 E501 07736           JEPR TEMSPTB
1485 930C 07737           BALG -3      M=0               BRANCH IF SPACE OR TAB
1486 BAD1 07738           JEPU XFM=H0

          * SET DUMP IF REVISE-  RESETS RIGHT FLUSH BIT (1) IN REG GA.
          * SETS DUMP BIT (5) IN GF IF REVISE BIT (4) IN REG. G8 IS SET.

1487 E618 07744 SEDUMPRV JEPR RERF
1488 BA92 07745           CALG              M=G9
1489 1E74 07746           BPRT +4           DB7=1        BRANCH IF SEARCH
148A B10F 07747           CALR              M=10
148B 9282 07748           BALG +2           M.G8=0       BRANCH IF NOT REVISE
148C B20F 07749           CALR              M=20
148D A7C1 07750           JEPU SEGF                      SET DUMP BIT
148E 000F 07751           RETN

          * SWITCH READER - IF IN REVISE OR RECORD CLEARS M AND RETURNS.
          * OTHERWISE SETS SWITCH READER BIT (4) IN REG. G6. FORCES THE RO TRANSPORT
          * ACTIVE. CLEARS THE RO BUFFER & RETURNS WITH M = FF.

148F E5E4 07758 SW        JEPR TEG7EXEC     .            EXEC SWITCH             CP240
1490 9706 07759           BALG +6           (M=01)'      BRANCH IF SWITCH
1491 B10F 07760           CALR              M=10
1492 B962 07761           CALG              M=M*G6
1493 B064 07762           CALG              G6=M
1494 0402 07763           CKBD              ARDR
1495 CEAE 07764           JEPR CLRO
1496 A728 07765           JEPU SEM=FF
1497 A724 07766           JEPU CLM

          *FETCH PRINTING CHARACTER WEIGHT IN UNITS (1/60TH INCH). G7 MUST CONTAIN
          **A PRINTING CHARACTER OR A SPACE CODE.
          ***G3 UNLESS FEG3PCWT ENTRY POINT IS USED.

1498 A721 07774           JEPU CLM

1499 BA72 07776 FEG7PCWT CALG               M=G7
149A B034 07777 FEMFCWT  CALG               G3=M
149B BA32 07778 FEG3PCWT CALG               M=G3
149C 9A08 07779           BDAT -4           M=20         RETURN WITH M=00 IF SPACE CODE
149D E0DE 07780           JEPR FEMACWT
149E 9709 07781           BALG -6           (M=0)'
149F BA62 07782 FEWTC     CALG              M=G6
14A0 1A72 07783           BPRT +2           DB7=0        RETURN WITH M=PITCH IF IN PROP SP MODE.
14A1 C121 07784           JEPR TEG3=EX
14A2 9301 07785           BALG +1           M=0          BRANCH IF NOT AN EXPANDED CODE
14A3 A3A1 07786           JEPU FEPITCH

14A4 C12A 07788           JEPR CVG3TOPC                  CONVERT G3 TO UNIQUE PRT CODE.
14A5 1A72 07789           BPRT +2           DB7=0        BRANCH IF CONSTANT SPOKE CHAR.
14A6 E410 07790           JEPR FEHPDVS                   FETCH HIGH ORDER PRINT DATA (VAR SPOKE)
14A7 B07D 07791           CALR              M=M.07       SAVE ONLY WEIGHT INFO.
14A8 A4B6 07792           JEPU FEPCWT1
14A9 0001 07793           CKBD              XL=ML
14AA 0001 07794           CKBD              M=XL         FETCH LSB OF WEIGHT.(MSB OF M)
14AB B932 07795           CALG              M=M*G3
14AC B93D 07796           CALR              M=M.80
14AD B932 07797           CALG              M=M*G3
14AE B034 07798           CALG              G3=M         SAVE ONLY WEIGHT INFO AS MSB OF G3.
14AF C12A 07799           JEPR CVG3TOPC
14B0 E410 07800           JEPR FEHPD                     FETCH HIGH ORDER PRINT DATA.
14B1 B932 07801           CALG              M=M*G3
14B2 B03D 07802           CALR              M=M.03
14B3 B932 07803           CALG              M=M*G3
```

```
ADDR CODE NUMBR LABEL    CMND NEXTADDR OPERAND              COMMENT

1484 883D 07804          CALR          M=M.83
1485 8C01 07805          CALG          RML          M NOW CONTAINS WT INFO IN 3 LSB.
1486 802A 07806 FEPCWT1  CALR          M=M+02
1487 9891 07807          BDAT +1       M=09         09 INDICATES A DEAD CHAR. (0 WEIGHT)
1488 000F 07808          RETN

1489 A724 07810          JEPU CLM

                * ELIMINATES SPACES & TABS REG. GO=AMT. ELIM.
                * TEST FIRST NON SPACE OR TAB FOR BEING SCR. PCR. CR. PSCR. CEN.
                * IF CHAR. = ONE OF ABOVE RETURN WITH M = FF IF NOT AJUST RO BUFFER
                * MINUS REG. GO.

148A E481 07818 SKSPTBIF JEPR SKSPTBRO              ELIM SP/TB            CP250
148B E0D0 07819          JEPR TEMCRCE
148C 9301 07820          BALG +1       M=0          BRANCH NOT CENTERING CHARACTERS
148D 8F16 07821          JEPU AJROGO-
148E A728 07822          JEPU SEM=FF


                * SET RECORD - IF IN RECORD MODE & AT END OF TAPE STOP WRITE.
                *              IF NOT IN RECORD AND NOT IN REWIND MODE CK FOR EOT.

14BF B20F 07829 SERCTAPE CALR          M=20
14C0 9295 07830          BALG +5       M.G9=0       BRANCH IF NOT RECORD
14C1 2A92 07831          BRWM +2       EOT=0
14C2 2G00 07832          CRWM          SRD
14C3 000F 07833          RETN

14C4 2680 07835          CRWM          SWR
14C5 000F 07836          RETN

14C6 B40F 07838          CALR          M=40
14C7 925A 07839          BALG -5       M.G5=0       BRANCH IF RW REWIND NOT SET
14C8 000F 07840          RETN

                * CLEAR THE RW BUFFER AND SET HA EQUAL TO THE CARRIAGE POSITION

14C9 CDE2 07845 CLRWH3   JEPR CLRW
14CA E51F 07846 SEH3=CA  JEPR TEG7CR
14CB 9303 07847          BALG +3       M=0          BRANCH IF CR
14CC E3AC 07848          JEPR FELM
14CD CG12 07849          JEPR TECR=M
14CE E4D1 07850          JEPR DI/PITCH
14CF F034 07851          CALH          H3=M
14D0 000F 07852          RETN


                *IF G1 CONTAINS A NUMBER GREATER THAN 80  DIVIDE BY PITCH
                *IF G1 CONTAINS A NUMBER LESS THAN 80 TAKE ONES CONPLIMENT OF G1 AND
                *DIVIDE BY PITCH
                * RETURN WITH RESULTS  IN G1

14D1 880F 07861 DI/PITCH CALR          M=80
14D2 9214 07862          BALG +4       M.G1=0
14D3 E72A 07863          JEPR NEG G10
14D4 E3FA 07864          JEPR PITCHDIV
14D5 8511 07865          CALG          M=M-G1
14D6 000F 07866          RETN
14D7 E3FA 07867          JEPR PITCHDIV
14D8 A65D 07868          JEPU XFM=G1

                * COUNTS THE NUMBER OF CHARACTERS IN THE RW BUFFER. STORES COUNT
                *    IN REG. HF.

14D9 CDE7 07874 CTRWHF   JEPR AJRWST                SETUP HF              CP270
14DA F1F4 07875          CALH          HF=0
14DB 0801 07876          JIPU +1
14DC E77E 07877          JEPR UPHFCHCT
14DD CE15 07878          JEPR FECHRW+
14DE 970D 07879          BALG -2       (M=0)'
14DF 8AFC 07880          JEPU AJRW-


                *       'IF IN MARGIN CONTROL OR JUSTIFY CLEAR TAB COUNTER (4 LSB OF REG.
                *        GC) SET TAB COUNTER OPEN BIT (0) IN REGISTER G6.

14E0 E59F 07886 RETC     JEPR TEMC&J                OPEN TB CTR           CP290
14E1 9303 07887          BALG +3       M=0
14E2 E4E8 07888          JEPR CLTC
14E3 B01F 07889          CALR          M=01
14E4 A790 07890          JEPU SEG6                  SET TAB COUNTER OPEN FLAG
14E5 000F 07891          RETN

14E6 B01F 07893 LKTC     CALR          M=01         CLOSE TB CTR          CP290
14E7 A792 07894          JEPU REG6                  RESET TAB COUNTER FLAG


14E8 BF0F 07897 CLTC     CALR          M=F0         CLEAR TB CTR          CP300
14E9 BEC2 07898          CALG          M=M.GC
14EA A62E 07899          JEPU XFGC=M


                * RESET CEN. BIT (6) IN REG G6.
                * CLEARS DEFD. ESC.
```

```
ADDR CODE NUMBR LABEL     CMND NEXTADDR OPERAND         COMMENT

14EB C517 07905 CLTBCR    JEPR CLDE                 TB/CR CLEAR              CP300
14EC B40F 07906           CALR           M=40
14ED A792 07907           JEPU REG6                 RESET CENTER FLAG

              * RESETS STATUS FLAGS AND TERMINATES PRINTER FUNCTION IF PRINT REMAIN
              * IN BUSY STATE

14EE CEAE 07913 INT PRT   JEPR CLRO                 AUTO INTERUPT            CE051
14EF CDE2 07914           JEPR CLRW
14F0 ECF3 07915           JEPR CLHE9
14F1 C517 07916           JEPR CLDE
14F2 B3FF 07917           CALR           M=3F
14F3 E797 07918           JEPR REG8
14F4 B04F 07919           CALR           M=04
14F5 E7B2 07920           JEPR REG9
14F6 B70F 07921           CALR           M=70
14F7 E7BF 07922           JEPR REGF
14F8 B02F 07923           CALR           M=02
14F9 E78D 07924           JEPR REG5
14FA 8A44 07925           JEPU BZERI3

              * TESTS REG. G7 FOR FORMAT CODE - IF TRUE EXITS WITH M=00

14FB BA72 07930 TEG7FMT   CALG           M=G7       G7 FMT TEST              C0010
14FC B109 07931 TEMFMT    CALR           M=10-M     FMT TEST
14FD 000F 07932           RETN

              * TESTS REG G7  FOR SPACE OR TAB - IF TRUE EXITS WITH M=00

14FF FCBF 07937           *CHECK WORD*
1500 BA72 07937 TEG7SPTB  CALG           M=G7       G7 SP/TB TEST            C0020
1501 F004 07938 TEMSPTB   CALH           HO=M       SP/TB TEST               C0020
1502 EC40 07939           JEPR TEMUSCSP
1503 80A9 07940           CALR           M=0A-M
1504 000F 07941           RETN
1505 A724 07942           JEPU CLM

              * CHECKS REQUIRED CONDITIONS FOR ENTRY INTO FORMAT MODE, LEFT
              * MARGIN, RW BUFFER EMPTY.

1506 E3AC 07948 FMTMODE   JEPR FELM                 GET THE LEFT MARGIN
1507 C612 07949           JEPR TECR=M
1508 9301 07950           BALG +1        M=0        Q.IS PRINTER AT LEFT MARGIN
1509 8A44 07951           JEPU BZERI3               A NO
150A CDBB 07952           JEPR FERW
150B 9303 07953           BALG +3        M=0        Q. RW EMPTY
150C BA82 07954           CALG           M=G8       A  NO
150D 1E4B 07955           BPRT -4        DB4=1      Q. REVISE ON
150E CA80 07956           JEPR DUMP                 RECORD BUFFER ON MEDIA
150F E487 07957 FMTMODEX  JEPR SEDUMPRV
1510 C3C9 07958           JEPR CLDEMVO
1511 E514 07959 WTKBFMT   JEPR FEKBFMT              GET KEYBOARD ENTRY
1512 E6C8 07960           JEPR ANKBFMT              .AND PROCESS
1513 080D 07961           JIPU -2

              * FETCHES DATA FROM THE KEYBOARD IN THE FORMAT MODE

1514 C092 07965 FEKBFMT   JEPR MOPCHPRT             MONITOR PITCH CHANGE
1515 0831 07966           BKBD +1        STOP=0     Q. STOP KEY
1516 A305 07967           JEPU EXLCFMT              A. YES
1517 E240 07968           JEPR PACEKB               MONITOR KEYBOARD
1518 9308 07969           BALG -4        M=0        Q. ENTRY
1519 A26D 07970           JEPU AJKS+1               A. YES, PUSH UP ENTRY AND EXIT

              ** ANALYSES G7 FOR CR/SCR
              ** ANALYSES M FOR CR/SCR

151A BA72 07976 TEG7CRSC  CALG           M=G7
151B 8099 07977 TEMCRSCR  CALR           M=09-M
151C 9301 07978           BALG +1        M=0        BRANCH IF CHAR IS SCR
151D 8029 07979           CALR           M=02-M     IF NOT SCR TEST FOR CRN
151E 000F 07980           RETN                      RETN WITH M=0 DENOTES CRN/SCR

              ** ANALYSES G7 FOR CR, ANALYSES M FOR CR

151F BA72 07986 TEG7CR    CALG           M=G7
1520 1E74 07987 TEMCR     BPRT +4        DB7=1
1521 9864 07988           BDAT +4        M=06       BRANCH IF CHAR IS PSCR
1522 9873 07989           BDAT +3        M=07       BRANCH IF CHAR IS CRN
1523 9882 07990           BDAT +2        M=08       BRANCH IF CHAR IS PCR
1524 9891 07991           BDAT +1        M=09       BRANCH IF CHAR IS SCR
1525 A3DB 07992           JEPU CVOOFF

1526 A724 07994           JEPU CLM                  RETURN WITH M=0 IF CHAR IS A CR

              ** ANALYSES G7 FOR A KB SP
              ** ANALYSES G7 FOR ANY SP
              ** ANALYSES M FOR ANY SP
```

```
ADDR CODE NUMBR LABEL    CMND NEXTADDR OPERAND            COMMENT

1527 BA72 08001 TEG7KBSP CALG          M=G7       INPUT CHAR TO M
1528 A52B 08002          JEPU TEMSPPSP            BRANCH TO MAIN SPACE ANALYSIS ROUTINE

1529 BA72 08004 TEG7SP   CALG          M=G7       INPUT CHAR TO M
152A 99F3 08005 TEMSP    BDAT +3       M=1F       BRANCH IF ESP
152B 9A02 08006 TEMSPPSP BDAT +2       M=20       BRANCH IF SPA, USCSPA
152C B7F9 08007          CALR          M=7F-M     TEST FOR PSP
152D 000F 08008          RETN                     RETN WITH M=0 DENOTES PSP

152E A724 08010          JEPU CLM                 DENOTES SPA, USC SPA OR ESP


152F BA72 08013 TEG7PCSP CALG          M=G7
1530 0802 08014          JIPU +2                  A>
1531 BA72 08015 TEG7PC   CALG          M=G7
1532 9A04 08016 TEMPC    BDAT +4       M=20       B>    BRANCH IF SPACE
1533 B7FD 08017 TEMPCSP  CALR          M=M.7F     A<
1534 BC8A 08018          CALR          M=M+68
1535 1A71 08019          BPRT +1       DB7=0        C>  BRANCH IF NON PRINTING CHAR.
1536 A724 08020          JEPU CLM

1537 A728 08022          JEPU SEM=FF              B>C<


1538 BA72 08026 TEG7TB   CALG          M=G7       TEST G7 OR M FOR TAB
1539 B0A9 08027 TEMTB    CALR          M=0A-M
153A A3D7 08028          JEPU CVFF00


                * TEST M FOR  COLUMN CENTER CODE IF CLC RETURN WITH M=00

153B B119 08033 TEMTBCOL CALR          M=11-M
153C 9301 08034          BALG +1       M=0        BRANCH IF COLUMN CENTER CODE
153D B079 08035          CALR          M=07-M     00 IF CR
153E 000F 08036          RETN


                *TEST THUMBWHEELS - IF 0 OR GTEQ  ACTIVE BNO CLEAR M,
                **                  IF LT. BNO SET STOP BIT

153F E87C 08042 TETW     JEPR FEBNAC
1540 F004 08043          CALH          HO=M             STORE BNO
1541 0502 08044          CKBD          TWST             FETCH THUMBWHEEL DATA
1542 8002 08045          CALG          M=M'             INVERT THUMBWHEEL DATA
1543 9303 08046          BALG +3       M=0              BR. IF 0
1544 8000 08047          CALG          M=M-1            DECR. THUMBWHEELS
1545 D101 08048          BALH +1       M>HO             BR. IF THUMBWHEELS GREATER THAN BNO
1546 A473 08049          JEPU SESTOP                    BR. TO SET STOP BIT

1547 A724 08051          JEPU CLM                       BR. TO CLEAR M


                *  TEST G3    FOR A SPACE OF INDEX CODE, RETURN WITH M=00 IF TRUE

1548 E52A 08056 TEG3SPIX JEPR TEMSP
1549 9302 08057          BALG +2       M=0        BRANCH IF SPACE
154A BA32 08058          CALG          M=G3
154B B0C9 08059          CALR          M=0C-M     00 IF INDEX
154C A3D7 08060          JEPU CVFF00

154D BC5F 08063 TEPRTSTK CALR          M=C5
154E E3B8 08064          JEPR FEA2RAM
154F A3B8 08065          JEPU FEA2RAM


                * TEST G7 FOR PUNCTUATION IN JUSTIFY MODE

1550 C9B3 08070 TEG7PUNJ JEPR TEG7PUNC
1551 9303 08071          BALG +3       M=0        BR IF CHAR. NOT EQ. TO A POT. PARA. STOP
1552 B08F 08072          CALR          M=08       MASK FOR PT. PARA. STOP BIT
1553 E790 08073          JEPR SEG6                SET POT. PARA. STOP BIT
1554 A559 08074          JEPU XFM=G7
1555 BA72 08075          CALG          M=G7
1556 9A22 08076          BDAT +2       M=22       CHAR. EQ QUOTE
1557 B08F 08077          CALR          M=08       MASK FOR POT. PARA. STOP BIT
1558 E792 08078          JEPR REG6                RESET POT. PARA. STOP BIT
1559 BA72 08079 XFM=G7   CALG          M=G7       FETCH G7
155A 000F 08080          RETN


                * TEST SEARCH AND ACTIVE MODE - IF NOT IN SEARCH OR ERASE  TEST MODE BITS
                *                              (0,1,2,3) IN REG. G8, RETURN W M EQ. TO
                *                              MODE OR STATUS OF STOP BIT (4) IN REG GF.

155B B90F 08087 TESCH&AC CALR          M=90
155C 9291 08088          BALG +1       M.G9=0
155D 000F 08089          RETN

                * TEST ACTIVE MODE - TEST REG. G8 FOR AUTO. PARA. LINE, WORD IF TRUE RETN
                *        WITH M NOT EQ. TO ZERO.
                * IF STOP BIT (4) IN REG. GF SET RETN WITH M NOT EQ. TO ZERO.

155E B0FF 08095 TEACMODE CALR          M=0F       TEST ACTION              C0060
155F BE82 08096          CALG          M=M.G8
1560 9702 08097          BALG +2       (M=0)'
1561 B10F 08098          CALR          M=10
1562 BEF2 08099          CALG          M=M.GF
1563 000F 08100          RETN
```

```
ADDR CODE NUMBR LABEL    CMND NEXTADDR OPERAND          COMMENT

                 *TESTS FOR EITHER REVISE OR RECORD.IF NEITHER TEST FOR SEARCH CODE
                 **CKS  RO.RW. CARDS IN ACTIVITY AND IF TAPE RUNNING

1564 E5A5 08106 TEG7EXEC JEPR TERVRC                    BR. TO TEST FOR REV./REC. MODE
1565 9706 08107          BALG +6      (M=O)'     1>  BR. IF REV OR REC
1566 B87F 08108          CALR         M=87
1567 9076 08109          BALG +6      M-G7=0     2>  BR. IF SCH
1568 2A33 08110          BRWM +3      CIN=0      1>  BR. IF RW CARD NOT IN
1569 2932 08111          BROM +2      CIN=0      1>  BR. IF RO CARD NOT IN
156A 2902 08112          BROM +2      ACT=0      3>  BR. IF RO NOT ACTIVE
156B 2AC2 08113          BRWM +2      RUN=0      2>  BR. IF TAPE NOT RUNNING (RW)
156C 000F 08114          RETN                    1<

156D 2DCE 08116          BROM -1      RUN=1      3<  BR. IF RO TAPE NOT RUNNING
156E A724 08117          JEPU CLM                2<  BR. TO CLEAR M

                 * TEST DUP. MODE -BIT (0) IN REG G9.

156F E55E 08122 TEDUP    JEPR TEACMODE
1570 9303 08123          BALG +3      M=0        BRANCH NO ACTION
1571 B01F 08124          CALR         M=01
1572 9291 08125          BALG +1      M.G9=0     BRANCH NOT DUP MODE
1573 A38F 08126          JEPU RETN1
1574 000F 08127          RETN

                 *AUTO LOG - PRINTS NUMERICAL LISTING OF ALL FORMAT BLOCKS WITH HEADERS
                 ***GA

1575 A58F 08133          JEPU RDALSCH

1576 B01F 08135 RDAUTLOG CALR         M=01       SET AUTO-LOG BIT
1577 E7B5 08136          JEPR SEGA
1578 CEB2 08137          JEPR AJROST
1579 CF30 08138          JEPR FECHRO+            FECH FIRST CHAR FROM RO
157A B8C9 08139          CALR         M=8C-M
157B 9709 08140          BALG -6      (M=O)'     BRANCH IF NOT BMK
157C CEAE 08141          JEPR CLRO
157D CF06 08142 RDALCH   JEPR FECH               FETCH NEXT CHAR
157E E706 08143          JEPR XFH10G47
157F E47A 08144          JEPR SKSPTBAJ
1580 1A73 08145          BPRT +3      DB7=0
1581 98C6 08146          BDAT +6      M=8C       BR IF BMK
1582 9808 08147          BDAT +8      M=80       BR IF EOR
1583 0801 08148          JIPU +1

1584 9908 08150          BDAT +8      M=10       BR IF FMT
1585 E533 08151          JEPR TEMPCSP
1586 9307 08152          BALG +7      M=0        BR IF PRINTING CHAR OR SPA
1587 A57D 08153          JEPU RDALCH

1588 C1E9 08155          JEPR MVLM&PF3
1589 C848 08156          JEPR ANBM/EOR
158A A595 08157          JEPU RDALEX

158B C848 08159          JEPR ANBM/EOR           GO TO IDLE IF EOR
158C 8060 08160          JEPU REKBIDL

158D E13C 08162          JEPR PRFMTAL            PRINT FORMAT
158E C1E9 08163          JEPR MVLM&PF3
158F E86D 08164 RDALSCH  JEPR INC BNAC           INC NEXT FOR NEXT SCH
1590 9701 08165          BALG +1      (M=O)'     BRANCH IF LESS THAN 100
1591 8060 08166          JEPU REKBIDL

1592 B044 08168          CALG         G4=M
1593 E874 08169          JEPR DEC BNAC
1594 CC0F 08170          JEPR ANSCHDIR           SEARCH FOR NEXT BLOCK
1595 E470 08171 RDALEX   JEPR EVSTOP
1596 970A 08172          BALG -5      (M=O)'     BR IF STOP KEY
1597 A57D 08173          JEPU RDALCH

                 *  PLAY /MARGIN CONTROL TEST - RETURN WITH M=00 IF NOT IN PLAY

1598 B08F 08178 TEPNMC   CALR         M=08       PLAY NMGC TEST          CQ090
1599 9291 08179          BALG +1      M.G9=0
159A A5A2 08180          JEPU TEMC
159B 000F 08181          RETN

                 * TEST XLX

159C 3901 08186 TEXLX    BPRT +1      XLX=0      BRANCH XLATOR NOT IN
159D 0002 08187          RNOP
159E 000F 08188          RETN

                 * MARGIN CONTROL OR JUSTIFY TEST - RETURN WITH M=00 IF NEITHER.

159F 804F 08193 TEMC&J   CALR         M=04       MGC/JUST TEST           CQ090
15A0 BE92 08194          CALG         M=M.G9
15A1 9702 08195          BALG +2      (M=O)'
15A2 B20F 08196 TEMC     CALR         M=20       MGC TEST                CQ090
15A3 BE82 08197          CALG         M=M.G8
15A4 000F 08198          RETN

                 * REVISE OR RECORD TEST- RETN WITH M=00 IF NEITHER SET
```

```
ADDR CODE NUMBR LABEL     CMND NEXTADDR OPERAND            COMMENT
15A5 B20F 08203 TERVRC    CALR          M=20      REV/REC TEST                CQ100
15A6 BE92 08204           CALG          M=M.G9
15A7 9702 08205           BALG +2       (M=0)'
15A8 810F 08206 TERV      CALR          M=10      REV TEST                    CQ100
15A9 BE82 08207           CALG          M=M.G8
15AA 000F 08208           RETN

               *THIS ROUTINE CHECKS FOR PRINTER STATUS OK

15AB B03F 08214 TEPRT     CALR          M=03      SET COUNTER TO 3
15AC 9402 08215           BALG +2       M=M-1=0   IF PRT IS NOT OK CHECK TWICE THEN JEPU
15AD 189E 08216           EPR1 -1       OK=0      IF PRINTER IS OK RETURN TO MAIN ROUTINE
15AE C00F 08217           RETN
15AF 8009 08218           JEPU RESTORE            IF PRT FAILED JUMP TO PRT FAIL RESTORE

               *TESTS CHAR. FOR O.CRN..PCR. SCH. SWR. TRL. SSK AND SWS TO DUMP BUFFER.
               **CKS  FOR JUST MODE. AND IF RW BUFFER FULL.

15B0 BA72 08224 TEDUMP    CALG          M=G7
15B1 9308 08225           BALG +8       M=0       BR. IF NULL
15B2 9879 08226           BDAT +9       M=07      BR. IF CRN OR SCH
15B3 9888 08227           BDAT +8       M=08      BR. IF PCR OR SWR
15B4 1A73 08228           BPPT +3       DB7=0
15B5 98F6 08229           BDAT +6       M=8F      BR. IF TRL
15B6 98A5 08230           BDAT +5       M=8A             SSK
15B7 9894 08231           BDAT +4       M=89             SWS
15B8 804F 08232           CALR          M=04
15B9 9291 08233           BALG +1       M.G9=0    3>  BR. IF IN JUST MODE
15BA A724 08234           JEPU CLM                1<  BR. TO CLEAR M

15BB 0801 08236           JIPU +1

15BC A728 08238           JEPU SEM=FF             2<  BR. TO SET M EQ FF

15BD CE2A 08240           JEPR TERWFULL
15BE 930B 08241           BALG -4       M=0       BRANCH RW NOT FULL
15BF BF01 08242           CALG          M=M+1
15C0 9304 08243           BALG +4       M=0       BRANCH RW ALMOST FULL
15C1 CF1D 08244           JEPR FECHRW-
15C2 CE15 08245           JEPR FECHRW+
15C3 E3DE 08246           JEPR FEMACWT
15C4 9701 08247           BALG +1       (M=0)'    BRANCH ACCENT
15C5 A728 08248           JEPU SEM=FF

15C6 A724 08250           JEPU CLM


15C7 08C4 08254 TELAMP1   BKBD +4       2HZ=0     TELAMP1.TELAMP.TELAMPCO ARE PART OF
15C8 2080 08255           CRWM          SWR       THE LAMP TEST ROUTINE THIS IS CALLED
15C9 BFFF 08256           CALR          M=FF      WHEN CODE X IS ENTERED FROM KEYBOARD
15CA 0402 08257           CKBD          ARDR      TO FUNCTION CASSETTES MUST BE IN BOTH
15CB A5D3 08258           JEPU TELAMPCO           STATIONS IF DUAL CASSETTE OR IN THE
15CC B00F 08259           CALR          M=00      ONE STATION IF SINGLE CASSETTE
15CD 0402 08260           CKBD          ARDR
15CE 2000 08261           CRWM          SRD
15CF A5D3 08262           JEPU TELAMPCO


15D0 0722 08267 TELAMP    CKBD          BUZZ=2
15D1 802F 08268           CALR          M=02
15D2 0013 08269           CKBD          HSDLY     SET 1 SECOND DELAY
15D3 C25F 08270 TELAMPCO  JEPR MOTAPE
15D4 0CB2 08271           BKBD +2       NS=1
15D5 0891 08272           BKBD +1       NRPT=0
15D6 000F 08273           RETN


15D7 0002 08275           CKBD          KBST
15D8 8939 08276           CALR          M=93-M
15D9 9709 08277           BALG -6       (M=0)'    BRANCH IF KEYBOARD ENTRY NOT CODE X
15DA BABF 08278           CALR          M=AB
15DB 0202 08279           CKBD          LDR2      1 1.2.3 LIGHTS ALL KEYBOARD
15DC BFFF 08280           CALR          M=FF       LIGHTS
15DD 0102 08281           CKBD          LDR1       2
15DE 0302 08282           CKBD          LDR3      3
15DF 888F 08283           CALR          M=88
15E0 2202 08284           CRWM          BNO
15E1 2102 08285           CROM          BNO
15E2 A5C7 08286           JEPU TELAMP1

               * RETURNS M=00 TO CALLING ROUTINE IF NO'REASON NOT TO PRINT BACKWARDS

15E3 BA72 08291 TEG7HAY   CALG          M=G7      TEST G7 FOR HAY PRINT
15E4 1E74 08292           BPRT +4       DB7=1
15E5 98E2 08293           BDAT +2       M=0E      BRANCH UNDERSCORED BACKSPACE
15E6 98F1 08294           BDAT +1       M=0F      BRANCH PRECEDENTED BACKSPACE
15E7 A533 08295           JEPU TEMPCSP

15E8 A724 08297           JEPU CLM

15E9 981E 08299           BDAT -1       M=81      BRANCH LINE SPACE (6 LINES/IN)
15EA 982D 08300           BDAT -2       M=82      BRANCH LINE SPACE (4 LINES/IN)
```

```
ADDR CODE NUMBR LABEL     CMND NEXTADDR OPERAND          COMMENT

15EB 983C 08301           BDAT -3      M=83      BRANCH LINE SPACE (3 LINES/IN)
15EC A728 08302           JEPU SEM=FF

             * CHECK PRINTER FOR END OF RIBBON OR PRINTER BUSY

15ED 1CF1 08307 CKPRBUSY BPRT +1       PRBY=1
15EE 000F 08308           RETN
15EF 8A44 08309           JEPU BZERI3

             * IF RW ACTIVE RESET SWITCH READER BIT (4) IN REG G6.
             * IF RO ACTIVE SET SW. READER BIT IN REG. G6 & CLEAR THE RO BUFFER.
             * IF NEITHER ACTIVE BUZZ.

15F0 2FC9 08316 TEACMED  BACM +9       RUN=1
15F1 2ED6 08317           BRWM +6      ACT=1
15F2 29D2 08318           BROM +2      ACT=0
15F3 B20F 08319           CALR         M=20
15F4 9251 08320           BALG +1      M.G5=0    BRANCH RO REWIND FLAG NOT SET
15F5 8A44 08321           JEPU BZERI3
15F6 B10F 08322           CALR         M=10
15F7 A790 08323           JEPU SEG6              SET SW READER FLAG
15F8 B40F 08324           CALR         M=40
15F9 9251 08325           BALG +1      M.G5=0    BRANCH RW REWIND FLAG NOT SET
15FA 8A44 08326           JEPU BZERI3
15FB B10F 08327           CALR         M=10
15FC A792 08328           JEPU REG6              RESET SW READER FLAG

             *TESTS CONDITIONS REQUIRED FOR BEGINNING OF RIGHT FLUSH COLUMN.
             *RETURN WITH DB1        EQUAL TO A  1  IF OK TO BEGIN FLUSHED PORTION.

15FF CCD3 08334           *CHECK WORD*
1600 BAA2 08334 TERF     CALG         M=GA
1601 1E1D 08335           BPRT +D      DB1=1     A>   BR IF PREV DID TAB OR CR
1602 C611 08336           JEPR TELM
1603 930B 08337           BALG +B      M=0       A>   BR IF AT LEFT MARGIN
1604 CF1D 08338 TECOL    JEPR FECHRW-
1605 CE15 08339           JEPR FECHRW+
1606 E53B 08340           JEPR TEMTBCOL
1607 9705 08341           BALG +5      (M=0)'    B>   BR IF LAST CHAR EXEC WAS NOT TAB
1608 CF0E 08342           JEPR FECHRO-
1609 CEEC 08343           JEPR TEROBLA
160A E53B 08344           JEPR TEMTBCOL
160B 9302 08345           BALG +2      M=0       C>   BR IF LAST TAB WAS NOT PLAYED.
160C CF30 08346           JEPR FECHRO+
160D A724 08347           JEPU CLM               B<   NOT IN LEGAL RIGHT FLUSH COLUMN

160E CF30 08349           JEPR FECHRO+           C<
160F BA82 08350           CALG         M=G8
1610 1E57 08351           BPRT +7      DB5=1     D> A< BR IF MARGIN CONTROL ON
1611 BA92 08352           CALG         M=G9
1612 1A35 08353           BPRT +5      DB3=0     D>    BR IF PLAY NOT ON
1613 1E24 08354           BPRT +4      DB2=1     D>    BR IF JUSTIFY ON
1614 C427 08355           JEPR FEXTBCA+
1615 1A12 08356           BPRT +2      DB1=0     D>    BR IF NO RIGHT COLUMN LIMIT
1616 B02F 08357 SERF     CALR         M=02            IN LEGAL RIGHT FLUSH COLUMN.
1617 A7B5 08358           JEPU SEGA

1618 B02F 08360 RERF     CALR         M=02      D<
1619 A7B7 08361           JEPU REGA                   NOT LEGAL RIGHT FLUSH COLUMN

             * TEST REG G7 FOR CENTERING CODE OR WORD UNDERSCORE

161A B13F 08366 TETEMCEN CALR         M=13
161B 9571 08367           BALG +1      M=M-G7>0
161C BF01 08368           CALG         M=M+1
161D 000F 08369           RETN

             * TAB COUNTER UTILITY ROUTINES

161E BAC2 08374 DEC TC   CALG         M=GC
161F B0FD 08375           CALR         M=M.OF    MASK FRAC. COLUMN
1620 930E 08376           BALG +E      M=0       BRANCH TAB COUNTER 0
1621 BFFF 08377           CALR         M=FF
1622 0807 08378           JIPU +7

1623 BA62 08380 INC TC   CALG         M=G6
1624 1E04 08381           BPRT +4      DB0=1     BRANCH TAB COUNTER OPEN
1625 E55E 08382           JEPR TEACMODE
1626 9708 08383           BALG +8      (M=0)'    BRANCH NO ACTION
1627 C611 08384           JEPR TELM
1628 9706 08385           BALG +6      (M=0)'    BRANCH NOT AT LEFT MARGIN
1629 B01F 08386 INC TCC  CALR         M=01
162A 89C0 08387 ADMTOTC  CALG         M=M+GC
162B 89C2 08388           CALG         M=M*GC
162C B0FD 08389           CALR         M=M.OF
162D 89C2 08390           CALG         M=M*GC
162E B0C4 08391 XFGC=M   CALG         GC=M
162F 000F 08392           RETN

             *TEST IF DATA SHOULD BE INCLUDED IN RIGHT FLUSH COLUMN -RETN M=00 IF TRUE.
             **G3

1630 98F1 08398           BDAT +1      M=8F      A> C< UPPER CASE PREIOD.
1631 A728 08399           JEPU SEM=FF            B<     NOT COLUMAR DATA
```

```
ADDR CODE NUMBR LABEL    CMND NEXTADDR OPERAND              COMMENT

1632 A724 08401          JEPU CLM               A<     COLUMAR DATA

1633 B034 08403 TEMCOLDA CALG          G3=M
1634 E548 08404          JEPR TEG3SPIX
1635 930C 08405          BALG -3       M=0              ANY SPACE
1636 BA32 08406          CALG          M=G3
1637 E533 08407          JEPR TEMPCSP
1638 9708 08408          BALG -7       (M=0)'          NOT PRT CHAR
1639 C12A 08409          JEPR CVG3TOPC
163A 1E75 08410          BPRT -A       DB7=1    C>
163B 99A6 08411          BDAT -9       M=1A     A>     PHY
163C 9C05 08412          BDAT -A       M=40     A>     *
163D 9DB4 08413          BDAT -B       M=5B     A>     1/4
163E 9DC3 08414          BDAT -C       M=5C     A>     1/2
163F 9DF2 08415          BDAT -D       M=5F     D>     UNDERSCORE
1640 9FB5 08416          BDAT +5       M=7B     D>     1/3
1641 9FC4 08417          BDAT +4       M=7C     D>     2/3
1642 9FE3 08418          BDAT +3       M=7E     D>     3/4
1643 BE0D 08419          CALR          M=M.E0
1644 9A02 08420          BDAT +2       M=20     E>     HEX 2X OR 3X
1645 A728 08421          JEPU SEM=FF            F<     NOT COLUMAR DATA

1646 A724 08423          JEPU CLM               D<     COLUMAR DATA

1647 C12A 08425          JEPR CVG3TOPC          E<
1648 9A1C 08426          BDAT -3       M=21     F>     EXCLAMATION MARK
1649 9A2B 08427          BDAT -4       M=22     F>
164A 9A3A 08428          BDAT -5       M=23     F>     #
164B 9A49 08429          BDAT -6       M=24     F>     $
164C 9A58 08430          BDAT -7       M=25     F>     %
164D 9A77 08431          BDAT -8       M=27     G>     APOSTROPHE
164E 9AA6 08432          BDAT -9       M=2A     G>     ASTERICK
164F 9A95 08433          BDAT -A       M=29     G>     )
1650 9BF1 08434          BDAT +1       M=3F     G>
1651 A724 08435          JEPU CLM                      COLUMAR DATA

1652 A728 08437          JEPU SEM=FF            G<     NOT COLUMAR DATA


1653 EC98 08440          JEPR SHG2R
1654 9404 08441          BALG +4       M=M-1=0
1655 E6AA 08442 AUDI     JEPR SHH10L            DIVIDE ALIGN              CR030
1656 E721 08443          JEPR COG10H10
1657 9708 08444          BALG -4       (M=0)'
1658 A6A0 08445          JEPU SHH10R
1659 000F 08446          RETN

                * DIVIDE M BY TEN
                * DIVIDE GO BY M

165A B004 08452 DIM/10   CALG          G0=M     DIV. M BY TEN             CR040
165B B0AF 08453          CALR          M=0A
165C E79A 08454 DIGO/M   JEPR DIG10/M           DIV GO BY M               CR040
165D BA12 08455 XFM=G1   CALG          M=G1
165E 000F 08456          RETN


                * ADD G1/GO TO H1/HO

165F BA12 08461 ADG10H10 CALG          M=G1     G1/GO+H1/HO               CR060
1660 F910 08462          CALH          M=M+H1
1661 B014 08463          CALG          G1=M
1662 FA02 08464          CALH          M=H0
1663 AC67 08465          JEPU ADM+G10

1664 B004 08467          CALG          G0=M
1665 A74E 08468          JEPU INC G1
1666 BA22 08469 ADG2+G10 CALG          M=G2     ADD G2 W. CARRY           CR060
1667 930C 08470 ADM+G10  BALG -3       M=M+G0C  ADD M W. CARRY            CR060
1668 B004 08471 XFGO=M   CALG          G0=M
1669 000F 08472          RETN
166A 930E 08473 SUMG10   BALG -1       M=0      SUBTR M W BORR            CR060
166B B009 08474          CALR          M=00-M
166C 960B 08475          BALG -4       M=M+G0C
166D B004 08476          CALG          G0=M
166E A751 08477          JEPU DEC G1

                * SUBTRACT -  G1/GO - H1/HO

166F BA12 08481 SUH10G10 CALG          M=G1     G1/GO-H1/HO               CR060
1670 FC11 08482          CALH          M=M-H1
1671 B014 08483          CALG          G1=M
1672 FA02 08484          CALH          M=H0
1673 E66A 08485          JEPR SUMG10
1674 B80F 08486          CALR          M=80
1675 BD12 08487          CALG          M=M.G1'
1676 A691 08488          JEPU RML1

                *CONVERT BINARY TO BCD

1677 BA42 08493 CVBIBCG4 CALG          M=G4
1678 B004 08494 CVMBIBCD CALG          G0=M     SAVE G4 IN GO
1679 B0AF 08495          CALR          M=0A     CONVERT BINARY
167A E79A 08496          JEPR DIG10/M
167B BA12 08497          CALG          M=G1
167C ECBD 08498          JEPR SML4
167D BB02 08499          CALG          M=M*G0
167E 000F 08500          RETN
```

```
ADDR CODE NUMBR LABEL     CMND NEXTADDR OPERAND             COMMENT

                * CONVERT BCD  TO BINARY .PETURN WITH RESULT IN GO  AND G2

167F BA42 08507 CVBCBIG4 CALG             M=G4      G4 BCD TO BIN          CR070
1680 B024 08508 CVMBCDBI CALG             G2=M      BCD TO BIN             CR070
1681 B0FD 08509          CALR             M=M.OF
1682 B004 08510          CALG             GO=M
1683 BA22 08511          CALG             M=G2
1684 BF0D 08512          CALR             M=M.FO
1685 E08E 08513          JEPR RML4
1686 B024 08514          CALG             G2=M
1687 B0AF 08515 X10G2+GO CALR             M=0A      M=10G2+GO              CR070
1688 ECD7 08516          JEPR XMG2+GO
1689 BA02 08517 XFM=GO   CALG             M=GO
168A 000F 08518          RETN


168B BC01 08521 RML7     CALG             RML       CIRC 7                 CR080
168C BC01 08522 RML6     CALG             RML       CIRC 6                 CR080
168D BC01 08523 RML5     CALG             RML       CIRC 5                 CR080
168E BC01 08524 RML4     CALG             RML       CIRC 4                 CR080
168F BC01 08525 RML3     CALG             RML       CIRC 3                 CR080
1690 BC01 08526 RML2     CALG             RML       CIRC 2                 CR080
1691 BC01 08527 RML1     CALG             RML       CIRC 1                 CR080
1692 000F 08528          RETN


                * DOUBLE  REG G2 AND ADD M  IF OVERFLOW CLEAR M AND STORE REMAINDER IN G1

1693 9023 08533 CA2G2+M  BALG +3          M=M+G2C   G2=2G2+M               CR050
1694 9023 08534          BALG +3          M=M+G2C
1695 B024 08535          CALG             G2=M
1696 000F 08536          RETN
1697 B920 08537          CALG             M=M+G2
1698 B014 08538          CALG             G1=M
1699 0002 08539          RNOP
169A A724 08540          JEPU CLM

                *  SHIFT G2 RIGHT

169B BA22 08544 SHG2R    CALG             M=G2      R. SH. G2              CR050
169C BFED 08545          CALR             M=M.FE
169D E66B 08546          JEPR RML7
169E B024 08547 XFG2=M   CALG             G2=M
169F 000F 08548          RETN

                * SHIFT H1/HO RIGHT

16A0 FA12 08552 SHH1OR   CALH             M=H1      R. SH. H1/HO           CR050
16A1 F902 08553          CALH             M=M*HO
16A2 B01D 08554          CALR             M=M.01
16A3 F902 08555          CALH             M=M*HO
16A4 E68B 08556          JEPR RML7
16A5 F004 08557          CALH             HO=M
16A6 B01F 08558          CALR             M=01
16A7 F812 08559          CALH             M=M'.H1
16A8 E6BB 08560          JEPR RML7
16A9 A713 08561          JEPU XFH1=M

                * SHIFT H1/HO LEFT

16AA FA12 08565 SHH1OL   CALH             M=H1      L. SH. H1/HO           CR050.
16AB F902 08566          CALH             M=M*HO
16AC B80D 08567          CALR             M=M.80
16AD F912 08568          CALH             M=M*H1
16AE BC01 08569          CALG             RML
16AF F014 08570          CALH             H1=M
16B0 FA02 08571          CALH             M=HO
16B1 BC00 08572          CALG             SML
16B2 8AE0 08573          JEPU XFHO=M

                *  CONVERT M FROM HEX TO ASCII

16B3 B0FD 08578 CVHXASC  CALR             M=M.OF    HEX TO ASCII           CR070
16B4 F004 08579          CALH             HO=M
16B5 BF6F 08580          CALR             M=F6
16B6 DC01 08581          BALH +1          M=M+HOC
16B7 BF9A 08582          CALR             M=M+F9
16B8 B41A 08583          CALR             M=M+41
16B9 000F 08584          RETN


16BA BC00 08587 SML7     CALG             SML       SHIFT 7                CR080
16BB BC00 08588 SML6     CALG             SML       SHIFT 6                CR080
16BC BC00 08589 SML5     CALG             SML       SHIFT 5                CR080
16BD BC00 08590 SML4     CALG             SML       SHIFT 4                CR080
16BE BC00 08591 SML3     CALG             SML       SHIFT 3                CR080
16BF BC00 08592 SML2     CALG             SML       SHIFT 2                CR080
16C0 BC00 08593 SML1     CALG             SML       SHIFT 1                CR080
16C1 000F 08594          RETN


                * ANALYZE ALL KEYEYBOARD INPUTS IN THE FORMAT MODE

16C2 A218 08599          JEPU EXFMTTB               DO FMT TAB
16C3 E5A5 08600          JEPR TERVRC
16C4 9302 08601          BALG +2          M=0
16C5 E1AF 08602          JEPR ST&PTFMT              IF SCR PRINT AND STORE PRINTER SETTINGS
16C6 A187 08603          JEPU FMTHDR                AND GO TO HEADER PORTION
16C7 A18E 08604          JEPU EXFMT                 IF PCR EXIT FORMAT
```

```
ADDR CODE NUMBR LABEL     CMND NEXTADDR OPERAND         COMMENT
16C8 B074 08606 ANKBFMT   CALG          G7=M
16C9 1A71 08607           BPRT +1       DB7=0      BRANCH IF NOT BIT 7
16CA A31C 08608           JEPU ANKBFMT1

16CB 98A6 08610           BDAT -9       M=0A       BR IF TAB
16CC 9885 08611           BDAT -A       M=0B       BR IF PTB
16CD 9895 08612           BDAT -A       M=09       BR IF SCR
16CE 9896 08613           BDAT -7       M=08       BR IF PCR
16CF 9877 08614           BDAT -8       M=07       BR IF CRN
16D0 9A04 08615           BDAT +4       M=20       BR IF SPA
16D1 9FF3 08616           BDAT +3       M=7F       BR IF PSP
16D2 98F1 08617           BDAT +1       M=0F       ..BACKSPACE
16D3 A30D 08618           JEPU BZERROR             CHARACTER NOT LEGAL
16D4 85CC 08619           JEPU MVCR-1
16D5 85C9 08620           JEPU MVCR+1

                * MULTIPLY  M BY G2
                *               BY G2 &  ADD G0
                *               BY G2 &  ADD G1/G0

16D6 8104 08627 XMG2      CALG          G0=0       M MPY                CR010
16D7 B114 08628 XMG2+G0   CALG          G1=0       M MPY+G0             CR010
16D8 F004 08629 XMG2+G10  CALH          H0=M       M MPY+G1/G0          CR010
16D9 F014 08630           CALH          H1=M
16DA 9124 08631           BALC +4       M>G2
16DB BA22 08632           CALG          M=G2
16DC F004 08633           CALH          H0=M
16DD FA12 08634           CALH          M=H1
16DE 8024 08635           CALG          G2=M
16DF F114 08636           CALH          H1=0
16E0 BA22 08637           CALG          M=G2
16E1 0805 08638           JIPU +5
16E2 B01D 08639           CALR          M=M.01
16E3 9301 08640           BALG +1       M=0
16E4 EC5F 08641           JEPR ADG10H10
16E5 E3AA 08642           JEPR SHH10L
16E6 E69B 08643           JEPR SHG2R
16E7 970A 08644           BALG -5       (M=0)'
16E8 000F 08645           RETN

16E9 FAA2 08648 XFCAHE9   CALH          M=HA       CARR TO HE/H9
16EA F0E4 08649           CALH          HE=M
16EB BAC2 08650           CALG          M=GC
16EC BF0D 08651 STMH9     CALR          M=M.F0     STORE UPPER BITS OF M IN H9
16ED F992 08652           CALH          M=M*H9
16EE BF0D 08653           CALR          M=M.F0
16EF F992 08654           CALH          M=M*H9
16F0 A6F6 08655           JEPU XFH9=M

16F1 B08F 08658 CLHELP    CALR          M=08       CLEAR HELP&HE/H9     CS010
16F2 E7BF 08659           JEPR REGF

16F3 F1E4 08661 CLHE9     CALH          HE=0       CLEAR HE/H9          CS010
16F4 B0FF 08662           CALR          M=0F
16F5 FE92 08663           CALH          M=M.H9
16F6 F094 08664 XFH9=M    CALH          H9=M
16F7 000F 08665           RETN

16F8 BA02 08668 XFG01HE9  CALG          M=G0       HE/H9=G0/G1          CS010
16F9 F0E4 08669           CALH          HE=M
16FA BA12 08670           CALG          M=G1
16FB ECBD 08671           JEPR SML4
16FC ACEC 08672           JEPU STMH9

16FF EB92 08675           *CHECK WORD*
1700 FAE2 08675 XFHE9G01  CALH          M=HE       G0/G1=HE/H9          CS010
1701 B004 08676           CALG          G0=M
1702 BF0F 08677           CALR          M=F0
1703 FE92 08678           CALH          M=M.H9
1704 EC8E 08679           JEPR RML4
1705 A7A5 08680           JEPU XFG1=M

1706 FA12 08683 XFH10G47  CALH          M=H1       G4/G7=H1/H0          CS020
1707 E3D7 08684           JEPR CVFF00
1708 B044 08685           CALG          G4=M
1709 FA02 08686 XFH0G7    CALH          M=H0       G7=H0                CS020
170A B074 08687 XFG7=M    CALG          G7=M
170B 000F 08689           RETN

170C FA02 08691 XFH01G01  CALH          M=H0       G0/G1=H0/H1          CS030
170D B004 08692           CALG          G0=M
170E FA12 08693           CALH          M=H1
170F A7A5 08694           JEPU XFG1=M

1710 BA02 08697 XFG01H01  CALG          M=G0       H0/H1=G0/G1          CS030
1711 F004 08698           CALH          H0=M
1712 BA12 08699           CALG          M=G1
1713 F014 08700 XFH1=M    CALH          H1=M
1714 000F 08701           RETN

1715 FA42 08704 XFH45H01  CALH          M=H4       H0/H1=H4/H5          CS030
1716 F004 08705           CALH          H0=M
1717 FA52 08706           CALH          M=H5
1718 A713 08707           JEPU XFH1=M
```

```
ADDR CODE NUMBR LABEL    CMND NEXTADDR OPERAND           COMMENT

               * SKIP 1 BLOCK AND STOP THE ACTIVE READER

1719 E831 08712 SKPACSTP JEPR SKPACBLK                    BR. TO ACT. MED. SKIP BLOCK
171A E369 08713          JEPR DLY MSKB                    SET MS DLY
171B 8AF2 08714          JEPU STOPACRD                    BR. TO ACT. READ


171C BA02 08718 XFG01H45 CALG          M=G0        H4/H5=G0/G1           CS030
171D F044 08719          CALH          H4=M
171E BA12 08720          CALG          M=G1
171F F054 08721          CALH          H5=M
1720 000F 08722          RETN

1721 BA12 08725 COG10H10 CALG          M=G1        G1/G0>H1/H0           CS030
1722 D013 08726          BALH +3       M-H1=0
1723 D114 08727          BALH +4       M>H1
1724 B00F 08728 CLM.     CALR          M=00        CLEAR M               CS030
1725 000F 08729          RETN
1726 B502 08730          CALG          M=G0'
1727 DC0C 08731          BALH -3       M=M+H0C
1728 BFFF 08732 SEM=FF   CALR          M=FF        M=FF                  CS030
1729 000F 08733          RETN

172A B512 08736 NEG G10  CALG          M=G1'       G1/G0= -G1/G0         CS030
172B B014 08737          CALG          G1=M
172C BA02 08738          CALG          M=G0
172D 9701 08739          BALG +1       (M=0)'
172E A74E 08740          JEPU INC G1
172F B009 08741          CALR          M=00-M
1730 A668 08742          JEPU XFG0=M

1731 FA72 08745 XFG47G01 CALH          M=H7        G0/G1=G4/H7           CS040
1732 B014 08746          CALG          G1=M
1733 BA42 08747          CALG          M=G4
1734 A668 08748          JEPU XFG0=M


1735 BA12 08751 XFG01G4H CALG          M=G1        G4/H7=G0/G1           CS040
1736 F074 08752          CALH          H7=M
1737 BA02 08753          CALG          M=G0
1738 B044 08754 XFG4=M   CALG          G4=M
1739 000F 08755          RETN


173A BA02 08759 INC G0   CALG          M=G0        INCR G0               CS070
173B BF01 08760          CALG          M=M+1
173C 0802 08761          JIPU +2
173D BA02 08762 DEC G0   CALG          M=G0        DECR G0               CS070
173E B000 08763          CALG          M=M-1
173F A668 08764          JEPU XFG0=M

1740 B9DF 08767 INCHC158 CALR          M=9D          SET M=157
1741 D1C2 08768          BALH +2       M>HC        A>  BRANCH IF HC LESS THAN OR EQUAL 156
1742 F1C4 08769          CALH          HC=0
1743 A724 08770          JEPU CLM

1744 FAC2 08772          CALH          M=HC
1745 BF01 08773          CALG          M=M+1       A<
1746 F0C4 08774 XFHC=M   CALH          HC=M
1747 000F 08775          RETN

1748 B01F 08778 INC GD   CALR          M=01
1749 0801 08779          JIPU +1
174A BFFF 08780 DEC GD   CALR          M=FF        SET M TO -1
174B B9D0 08781          CALG          M=M+GD      ADD TO GD
174C B0D4 08782          CALG          GD=M
174D 000F 08783          RETN

174E BA12 08786 INC G1   CALG          M=G1        INCR G1               CS070
174F BF01 08787          CALG          M=M+1
1750 0802 08788          JIPU +2
1751 BA12 08789 DEC G1   CALG          M=G1        DECR G1               CS070
1752 B000 08790          CALG          M=M-1
1753 A7A5 08791          JEPU XFG1=M

1754 B01F 08794 INC GE   CALR          M=01
1755 0801 08795          JIPU +1
1756 BFFF 08796 DEC GE   CALR          M=FF        SET M TO -1
1757 B9E0 08797          CALG          M=M+GE      ADD TO GE
1758 B0E4 08798 XFGE=M   CALG          GE=M
1759 000F 08799          RETN

175A B01F 08802 INC H0   CALR          M=01        INCR H0               CS060
175B 0801 08803          JIPU +1
175C BFFF 08804 DEC H0   CALR          M=FF        DECR H0               CS060
175D F900 08805          CALH          M=M+H0
175E 8AE0 08806          JEPU XFH0=M
```

```
ADDR CODE NUMBR LABEL     CMND NEXTADDR OPERAND                  COMMENT

175F B01F 08809 INC H1    CALR          M=01      INCR H1
1760 0801 08810           JIPU +1
1761 BFFF 08811 DEC H1    CALR          M=FF      DECR H1        CS060
1762 F910 08812           CALH          M=M+H1
1763 A713 08813           JEPU XFH1=M

1764 FA22 08816 INC H2    CALH          M=H2      INCR H2        CS070
1765 BF01 08817           CALG          M=M+1
1766 0802 08818           JIPU +2
1767 FA22 08819 DEC H2    CALH          M=H2      DECR H2        CS070
1768 B000 08820           CALG          M=M-1
1769 F024 08821           CALH          H2=M
176A 000F 08822           RETN

176B B01F 08825 INC H6    CALR          M=01      INCR H6        CS060
176C 0801 08826           JIPU +1
176D BFFF 08827 DEC H6    CALR          M=FF      DECR H6        CS060
176E F960 08828           CALH          M=M+H6
176F F064 08829           CALH          H6=M
1770 000F 08830           RETN

1771 FA72 08833 DEC H7    CALH          M=H7      DECR H7        CS080
1772 F000 08834           CALH          M=M-1
1773 0802 08835           JIPU +2
1774 FA72 08836 INC H7    CALH          M=H7      INCR H7        CS080
1775 FF01 08837           CALH          M=M+1
1776 F074 08838           CALH          H7=M
1777 000F 08839           RETN

1778 B01F 08842 INC HF    CALR          M=01      INCR HF        CS060
1779 0801 08843           JIPU +1
177A BFFF 08844 DEC HF    CALR          M=FF      DECR HF        CS060
177B F9F0 08845           CALH          M=M+HF
177C F0F4 08846           CALH          HF=M
177D 000F 08847           RETN

177E E778 08850 UPHFCHCT  JEPR INC HF             UPDATE HF      CS100
177F FA12 08851           CALH          M=H1
1780 9301 08852           BALG +1       M=0
1781 E778 08853           JEPR INC HF
1782 A706 08854           JEPU XFH10G47

1783 FA12 08857 UPH7CHCT  CALH          M=H1      UPDATE H7      CS080
1784 D301 08858           BALH +1       M=0
1785 E774 08859           JEPR INC H7
1786 A774 08860           JEPU INC H7

1787 FA12 08863 AJH7CHCT  CALH          M=H1      COMP H7        CS080
1788 9301 08864           BALG +1       M=0
1789 E771 08865           JEPR DEC H7
178A A771 08866           JEPU DEC H7

178B B852 08869 SEG5      CALG          M=M⊕G5    SET G5         CS090
178C 0801 08870           JIPU +1
178D B852 08871 REG5      CALG          M=M'.G5   RESET G5       CS090
178E B054 08872           CALG          G5=M
178F 000F 08873           RETN

1790 B862 08876 SEG6      CALG          M=M⊕G6    SET G6         CS090
1791 0801 08877           JIPU +1
1792 B862 08878 REG6      CALG          M=M'.G6   RESET G6       CS090
1793 B064 08879           CALG          G6=M
1794 000F 08880           RETN

1795 B882 08883 SEG8      CALG          M=M⊕G8    SET G8         CS090
1796 C801 08884           JIPU +1
1797 B882 08885 REG8      CALG          M=M'.G8   RESET G8       CS090
1798 B084 08886           CALG          G8=M
1799 000F 08887           RETN

179A B114 08890 DIG10/M   CALG          G1=0      SH. DIV. BY M  CR020
179B F004 08891 DIG1/M    CALH          H0=M      DIVIDE BY M    CR020
179C F114 08892           CALH          H1=0
179D B80F 08893           CALR          M=80
179E B024 08894           CALG          G2=M
179F BA12 08895           CALG          M=G1
17A0 D102 08896           BALH +2       M>H0
17A1 FA02 08897           CALH          M=H0
17A2 9704 08898           BALG +4       (M=0)'
17A3 BFFF 08899           CALR          M=FF
17A4 B004 08900           CALG          G0=M
17A5 B014 08901 XFG1=M    CALG          G1=M
17A6 000F 08902           RETN
17A7 E721 08903           JEPR COG10H10
17A8 9302 08904           BALG +2       M=0
17A9 EC55 08905           JEPR AJDI
17AA E56F 08906           JEPR SUH10G10
17AB E693 08907           JEPR CA2G2+M
```

```
ADDR CODE NUMBR LABEL    CMND NEXTADDR OPERAND              COMMENT

17AC E6A0 08908          JEPR SHH1OR
17AD E721 08909          JEPR COG10H10
17AE 970B 08910          BALG -4         (M=0)'
17AF 080B 08911          JIPU -4


17B0 8B92 08914 SEG9     CALG            M=M⊕G9      SET G9                    CS090
17B1 0801 08915          JIPU +1
17B2 8B92 08916 REG9     CALG            M=M'.G9     RESET G9                  CS090
17B3 B094 08917          CALG            G9=M
17B4 000F 08918          RETN


17B5 8BA2 08922 SEGA     CALG            M=M⊕GA
17B6 0801 08923          JIPU +1
17B7 8BA2 08924 REGA     CALG            M=M'.GA
17B8 80A4 08925          CALG            GA=M
17B9 000F 08926          RETN


17BA 8BB2 08929 SEGB     CALG            M=M⊕GB
17BB 0801 08930          JIPU +1
17BC 8BB2 08931 REGB     CALG            M=M'.GB
17BD B0B4 08932          CALG            GB=M
17BE 000F 08933          RETN


17BF 8BF2 08936 REGF     CALG            M=M'.GF     RESET GF                  CS090
17C0 0801 08937          JIPU +1
17C1 8BF2 08938 SEGF     CALG            M=M⊕GF      SET GF                    CS090
17C2 B0F4 08939          CALG            GF=M
17C3 000F 08940          RETN


17C4 F882 08943 REH8     CALH            M=M'.H8     RESET H8                  CS090
17C5 0801 08944          JIPU +1
17C6 F882 08945 SEH8     CALH            M=M⊕H8      SET H8                    CS090
17C7 F084 08946          CALH            H8=M
17C8 000F 08947          RETN

               * UPDATE CHARACTER COUNT REMAINING IN BLOCK STORED IN REG H2.

17C9 E764 08952 UPH2CHCT JEPR INC H2                 UPDATE H2                 CS110
17CA FA12 08953          CALH            M=H1
17CB 9301 08954          BALG +1         M=0
17CC E764 08955          JEPR INC H2
17CD 000F 08956          RETN


               * TEST GAP LENGTH

17CE 0003 08962 TEMMSGAP CKBD            2MDLY          SET MS DLY
17CF B00F 08963          CALR            M=00           SET 1/2 SEC.
17D0 A801 08964          JEPU TEMHSGAP                  BR. TO TEST DATA


               *READ END OF RECORD REVISE
               * CLEAR ACTIVE TAPE TO EOR .GO THROUGH MONITOR . CLEAR RO BUFFER. SKIP
               * BLOCK MARK . THEN READ TRIPPLE FORWARD

17D1 2750 08972 RDEORRVS CACM            NRR            NORMAL READ REVERSE
17D2 2B91 08973          BACM +1         EOT=0
17D3 C5FC 08974          JEPR RESET RC
17D4 E7E9 08975          JEPR RVTPAC                    REV. ACT. TAPE
17D5 E820 08976          JEPR CLREOTAC                  CLEAR ACT. TAPE TO EOT
17D6 B0EF 08977          CALR            M=0E           7 SEC DLY
17D7 0013 08978          CKBD            HSDLY          SET 1/2 SEC DLY
17D8 C07C 08979          JEPR MO                        BR. TO MONITOR
17D9 0CB1 08980          BKBD +1         NS=1           BR. IF 1/2 SEC. DLY NOT EXP.
17DA 8EAE 08981          JEPU CLRO                      BR. TO CLEAR RO

17DB 2F7C 08983          BACM -3         GAP=1          BR. IF GAP IN DATA
17DC EB31 08984          JEPR SKPACBLK                  SKIP BLOCK
17DD 8B2A 08985          JEPU RDFWD3                    BR TO TRIPLE RD FWD.


               *  SKIP EOR IN REVISE - REVERSES TAPE 2 BLOCKS AND READS FORWARD 1 BLOCK
               *                     - POSITIONS  TAPE IN FRONT OF EOR

17DE 2750 08992 SKPEORRV CACM            NRR            NORMAL READ REVERSE
17DF E831 08993          JEPR SKPACBLK                  BR. TO SKIP BLOCK
17E0 E831 08994          JEPR SKPACBLK                  BR. TO SKIP BLOCK
17E1 2710 08995          CACM            NRF            NORMAL READ FWD.
17E2 A719 08996          JEPU SKPACSTP                  BR. TO SKIP ONE BLOCK

               * CLEAR RW TAPE  PAST CLEAR LEADER

17E3 2E92 09001 CLREOTRW BRWM +2         EOT=1       1><2BR. IF AT EOT
17E4 B80F 09002          CALR            M=80           SET 160 MS DLY
17E5 A369 09003          JEPU DLY MSKB                  BR. TO SET 2MS DLY

17E6 C100 09005          JEPR MOROTAPE               1< BR. TO RO TAPE MONITOR
17E7 2EAB 09006          BRWM -4         SOK=1          BR. IF SERVO OK
17E8 8BC5 09007          JEPU RWSNOK                 2> BR. TO SERVO NOT OK
```

```
ADDR CODE NUMBR LABEL    CMND NEXTADDR OPERAND              COMMENT

                 *  TEST TAPE SERVO OK AND TAPE AT SPEED FOR REVISE RECORD

17E9 2B6F 09013 RVTPAC   BACM -0        TNS=0          BR. IF TAPE UP TO SPEED
17EA 2FA1 09014 TETSAC   BACM +1        SOK=1      1>  BR. IF SERVO OK
17EB 8CC2 09015          JEPU ACSNOK                   BR. TO SERVO NOT OK

17EC 2F6D 09017          BACM -2        TNS=1      BR. IF TAPE NOT AT SPEED
17ED B40F 09018          CALR           M=40
17EE 000F 09019          RETN

                 *IF REWIND BIT SET AND REWIND SWITCH ACTIVE .RESET
                 *REWIND BIT AND EJECT RW TAPE

17EF B40F 09026 EJRW REW CALR           M=40           MASK
17F0 9257 09027          BALG +7        M.G5=0     1>  BR. IF REW. RW BIT NOT SET
17F1 2EB6 09028          BRWM +6        KREW=1     1>  BR. IF REW. SW. ACTIVE
17F2 2A95 09029          BRWM +5        EOT=0          BR. IF NOT AT EOT
17F3 E78D 09030          JEPR REG5                     BR. TO RESET G5
17F4 220C 09031 EJRW     CRWM           SEJT           SET EJECT
17F5 B20F 09032          CALR           M=20           SET 160MS. DLY
17F6 E36E 09033          JEPR DLYMSWOM
17F7 2208 09034          CRWM           REJT           RESET EJECT
17F8 000F 09035          RETN                      1<

                 *  TEST ACTIVE TRANSPORT FOR END OF DATA.

17F9 E88F 09041 TEEODAC  JEPR TEDACLAC             1<  BR. TO EOD W/ CLR FOR ACT. RDR
17FA 970E 09042          BALG -1        (M=0)'     1>  BR. IF NOT AT EOD
17FB 000F 09043          RETN

                 * TEST FOR GAP IN DATA

17FE 4E5E 09048          *ADJUST WORD*
17FF E216 09048          *CHECK WORD**
1800 B0EF 09048 TE7SCGAP CALR           M=0E           SET 7 SEC. DLY
1801 0013 09049 TEMHSGAP CKBD           HSDLY          SET 1/2 SEC DLY TO ZERO
1802 C25F 09050          JEPR MOTAPE               3<  BR. TO TAPE MONITOR
1803 C0DC 09051          JEPR MO2WAY                   BR. TO 2 WAY MONITOR
1804 0CB2 09052          BKBD +2        NS=1       1>  BR. IF 1/2 SEC. DLY NOT EXP.
1805 0CA1 09053          BKBD +1        NM=1       1><2BR. IF MS. DLY NOT EXP.
1806 000F 09054          RETN

1807 2B7E 09056          BACM -1        GAP=0      1<>2BR. IF NO GAP IN DATA
1808 2B99 09057          BACM -6        EOT=0      3>  BR. IF NOT AT EOT
1809 B20F 09058          CALR           M=20           SET 40MS. DLY
180A A36E 09059          JEPU DLYMSWOM

                 * TEST FOR END OF DATA & CLEARS RW TRANSPORT READ DATA READY.

180B E87F 09065 TEEODRW  JEPR TEDACLRW             1<  BR. TO EOD W/ CLR. FOR RW RDR
180C 970E 09066          BALG -1        (M=0)'     1>  BR. IF NOT AT EOD
180D 000F 09067          RETN

                 * TESTS FOR DATA IN GAP

180E 880F 09073 TE.7SGAP CALR           M=80           SET 160 MS. DLY
180F E7CE 09074          JEPR TEMMSGAP                 BR. TO MS. DATA TEST
1810 B01F 09075          CALR           M=01           SET 1/2 SEC. DLY
1811 0CA1 09076          BKBD +1        NM=1       1>  BR. IF MS DLY NOT EXP.
1812 A801 09077          JEPU TEMHSGAP                 BR. TO TEST DATA

1813 0013 09079          CKBD           HSDLY      1<  SET 1/2 SEC. DLY.
1814 000F 09080          RETN

                 * IF REWIND BIT SET AND REWIND SWITCH SET AND EOT THEN RESET REWIND BIT
                 * AND EJECT THE RO TAPE

1815 B20F 09087 EJRO REW CALR           M=20           MASK
1816 9257 09088          BALG +7        M.G5=0     1>  BR. IF RO REW BIT NOT SET
1817 2D66 09089          BROM +6        KREW=1     1>  BR. IF REW  SW. ACT.
1818 2995 09090          BROM +5        EOT=0      1>  BR. IF NOT AT EOT
1819 E78D 09091          JEPR REG5
181A 210C 09092 EJRO     CROM           SEJT           SET EJECT
181B B20F 09093          CALR           M=20
181C E36E 09094          JEPR DLYMSWOM
181D 2108 09095          CROM           REJT           RESET EJECT
181E 000F 09096          RETN                      1<

                 *CLEAR TAPE PAST END OF TAPE SENSOR . MOVE TAPE FOR 3 SEC. OR UNTIL OFF OF
                 *CLEAR LEADER

181F 2710 09103 CLREOTFW CACM           NRF
1820 2F91 09104 CLREOTAC BACM +1        EOT=1      BRANCH ON CLEAR LEADER
1821 000F 09105          RETN
```

```
ADDR CODE NUMBR LABEL     CMND NEXTADDR OPERAND              COMMENT

1822 B06F 09107           CALR          M=06
1823 0013 09108           CKBD          HSDLY
1824 08BC 09109           BKBD  -3      NS=0
1825 2FA1 09110           BACM  +1      SOK=1
1826 8CC2 09111           JEPU ACSNOK

1827 2F9C 09113           BACM  -3      EOT=1      BRANCH ON CLEAR LEADER
1828 B40F 09114           CALR          M=40
1829 A36E 09115           JEPU DLYMSWOM

182A 2A6F 09118 RVTPRW    BRWM  -0      TNS=0           BR. IF TAPE NOT UPTO SPEED
182B 2EA1 09119           BRWM  +1      SOK=1           BR. IF SERVO OK
182C 8BC5 09120           JEPU RWSNOK                   BR. TO RW SERNO NG

182D 2E6D 09122           BRWM  -2      TNS=1           BR. IF TAPE NOT UP TO SPEED
182E B40F 09123           CALR          M=40
182F 000F 09124           RETN

            **LOOKS FOR END OF DATA IN NEXT BLOCK

1830 8AE9 09129           JEPU ANRDER

1831 2340 09131 SKPACBLK CACM           RMED            RESET MEDIA
1832 B04F 09132           CALR          M=04       1<   SET 2 SEC. DLY
1833 0013 09133           CKBD          HSDLY           SET 1/2 SEC. DLY
1834 0BBD 09134           BKBD  -2      NS=0       1><3BR. IF 1/2 SEC. DLY EXPIRED
1835 C07C 09135           JEPR MO                       BR. TO MONITOR
1836 2F98 09136           BACM  +8      EOT=1      2>   BR. IF AT EOT
1837 2B1C 09137           BACM  -3      RDR=0      3>   BR. IF READ DATA NOT READY
1838 E7F9 09138           JEPR TEEODAC                  BR. TO ACTIVE READ TO END OF DATA
1839 B14F 09139           CALR          M=14            SET 28 MSEC. DLY.
183A 0003 09140           CKBD          2MDLY           SET 2MS. DLY.
183B 0BA4 09141           BKBD  -8      NM=0       4,)5BR. IF 2MS DLY EXPIRED
183C 2F92 09142           BACM  +2      EOT=1      2>   BR. IF AT EOT
183D 2B1D 09143           BACM  -2      RDR=0      5>   BR. IF READ DATA NOT READY
183E E7F9 09144           JEPR TEEODAC                  BR. TO ACT. READ TO END OF DATA
183F C07C 09145           JEPR MO                  2<   BR. TO MONITOR
1840 B05F 09146           CALR          M=05
1841 000F 09147           RETN

1842 A300 09150           JEPU ANFMTHD1
1843 C1F4 09151           JEPR MVLM&PF
1844 A18F 09152           JEPU EXFMTHDR

1845 8074 09154 ANFMTHDR CALG           G7=M
1846 1E7B 09155           BPRT  -4      DB7=1
1847 1E67 09156           BPRT  +7      DB6=1
1848 1E56 09157           BPRT  +6      DB5=1
1849 99A5 09158           BDAT  +5      M=1A       BRANCH IF CODE HYPHEN..
184A 9BF4 09159           BDAT  +4      M=0F       ..BACKSPACE
184B 9877 09160           BDAT  -8      M=07       BR IF CRN
184C 9886 09161           BDAT  -9      M=08       BR IF PCR
184D 9891 09162           BDAT  +1      M=09       ..SPECIAL CR
184E A30D 09163           JEPU BZERROR             ILLEGAL CHARACTER
184F BA82 09164           CALG          M=G8
1850 1E43 09165           BPRT  +3      DB4=1      BR IF REVISE
1851 BFBF 09166           CALR          M=FB
1852 B?D1 09167           CALG          M=M-GD     SET UP H2 IF IN RECORD
1853 F024 09168           CALH          H2=M
1854 FA22 09169           CALH          M=H2
1855 9702 09170           BALG  +2      (M=0)'     BR IF MORE ROOM
1856 1309 09171           CPRT          RBDN
1857 A34D 09172           JEPU LOCK ERR

1858 BF5F 09174           CALR          M=F5
1859 D?21 09175           BALH  +1      M=M+H2C    BR IF H2 > TEN
185A E313 09176           JEPR BZ
185B 0000 09177           NOOP
185C C8B5 09178           JEPR XFG74RW
185D 0000 09179           NOOP
185E 0000 09180           NOOP
185F 8A72 09181           CALG          M=G7
1860 9896 09182           BDAT  +6      M=09       BR IF SCR
1861 98F6 09183           BDAT  +6      M=0F       BRANCH IF PBS
1862 C1AD 09184           JEPR PRG7PACE            PRINT CHAR
1863 9701 09185           BALG  +1      (M=0)'
1864 000F 09186           RETN

1865 E26D 09188           JEPR AJKS+1              PROCESS NEXT CHAR
1866 A845 09189           JEPU ANFMTHDR

1867 81F4 09191           JEPU MVLM&PF

1868 8411 09193           JEPU BS

            *DEPOSITS BNO ACTIVE

1869 B00F 09198 SEBNAC=0 CALR           M=00       SET AC BNO TO ZERO
186A 2DD1 09199 SEBNAC    BROM  +1      ACT=1      STORE ACTIVE BNO
186B A3C3 09200           JEPU SEBNRW

186C A3C6 09202           JEPU SEBNRO

            *INCR  BR DECR AND STORES REF. BNO
            ***HO
```

```
ADDR CODE NUMBR LABEL     CMND NEXTADDR OPERAND              COMMENT

186D E87C 09208 INC BNAC  JEPR FEBNAC                        BR. TO FETCH REF. BNO
186E E380 09209           JEPR CVMBCDBI                      BR. TO CONVERT M FROM BCD TO BIN
186F BF01 09210           CALG          M=M+1                INC. REF. BNO
1870 F004 09211           CALH          HO=M                 STORE BNO TEMP.
1871 B63F 09212           CALR          M=63                 DECIMAL 99
1872 D106 09213           BALH +6       M>HO                 BR IF BNO LESS THAN 99
1873 A724 09214           JEPU CLM                           CLEAR M

1874 E87C 09216 DEC BNAC  JEPR FEBNAC                        BR. TO FETCH AC BNO
1875 930D 09217           BALG -2       M=O                  BR. TO CLR M IF EQ. O
1876 E380 09218           JEPR CVMBCDBI
1877 B000 09219           CALG          M=M-1                DECR REF. BNO
1878 F004 09220           CALH          HO=M                 STORE
1879 FA02 09221           CALH          M=HO
187A E578 09222           JEPR CVMBIBCD                      BR. TO CONV. BIN. TO BCD
187B A86A 09223           JEPU SEBNAC                        BR. TO STORE AC BNO


                *  FETCH TRACK NO ACTIVE TRANSPORT

187C 2DD1 09228 FEBNAC    BROM +1       ACT=1       FETCH ACTIVE BNO
187D A380 09229           JEPU FEBNRW

187E A382 09231           JEPU FEBNRO


                *RESETS RDR AND TESTS FOR END OF DATA

187F 2210 09237 TEDACLRW CRWM           M=RR              RESET RDR
1880 B60F 09238 TEDATRW   CALR          M=60
1881 2E15 09239           BRWM +5       RDR=1       1><2BR. IF RD. DATA READY
1882 BF01 09240           CALG          M=M+1
1883 970D 09241           BALG -2       (M=O)'      2>
1884 BF01 09242           CALG          M=M+1       3<
1885 9301 09243           BALG +1       M=O         1>
1886 2A1D 09244           BRWM -2       RDR=0       3>  BR. IF RD. DATA NOT READY
1887 000F 09245           RETN                      1<


                * STOP REWIND OF RW TRANSPORT - STOPS MOTION, RESETS THE INVIBIT RUN BIT 3
                *                                  IN REG G5

1888 2C00 09252 STPREWRW CRWM           SRD               STOP READ
1889 B08F 09253           CALR          M=08              INHIBIT RUN BIT MASK
188A E78D 09254           JEPR REG5                       BR. TO RESET G5
188B 85FC 09255           JEPU RESET RC


                * STOP REWIND OF RO TRANSPORT - STOPS TAPE MOTION & RESETS THE RO
                *                                 INHIBIT RUN BIT (2)  IN REG. G5.

188C 2500 09261 STPREWRO CROM           SRD
188D B04F 09262           CALR          M=04
188E A78D 09263           JEPU REG5


                *  TEST FOR END OF DATA USING ACTIVE TRANSPORT

188F 2310 09270 TEDACLAC CACM           M=RR              RESET READ DATA READY
1890 B60F 09271 TEDATAC   CALR          M=60
1891 2F15 09272           BACM +5       RDR=1       1><2BR. IF READ DATA READY
1892 BF01 09273           CALG          M=M+1
1893 970D 09274           BALG -2       (M=O)'      2>  BR. IF M NEQ. O
1894 BF01 09275           CALG          M=M+1       3<
1895 9301 09276           BALG +1       M=O         1>
1896 2B1D 09277           BACM -2       RDR=0       3>  BR. IF READ DATA NOT READY
1897 000F 09278           RETN                      1<


                *  AJUST RW BUFFER TO FIRST UNPROCESSED CHARACTER IF NOT OO
                *  ADJUST THE RW BUFFER TO ITS LAST CHARACTER.

1898 E9FA 09286 SEKSJ     JEPR AJRWJ                J SETUP STACK             CU015
1899 CE0F 09287           JEPR TERWB
189A 9301 09288           BALG +1       M=O
189B BDEA 09289           JEPU AJRWLA
189C A238 09290           JEPU CLH4-H7

                *  JUSTIFY: TAB PRINT - TRANSFERS CHAR. FROM THE RO TO THE RW UNTIL TAB IS
                *           REACHED. AJUSTS RO TO LAST CHARACTER BEFORE TAB.
                *           AJUSTS RW BUFFER TO THE LAST UNPROCESSED CHARACTER
                *           & PRINTS THE PROCESSED LINE.
189D E8DD 09297 PRJTB     JEPR ANBPJ                J. TB PRINT               CU080
189E CE5C 09298           JEPR AJRO-
189F 0002 09299           RNOP
18A0 0002 09300           RNOP
18A1 0002 09301           RNOP
18A2 F144 09302           CALH          H4=0
18A3 B06F 09303           CALR          M=06
18A4 F054 09304           CALH          H5=M
18A5 C802 09305           JIPU +2
```

```
ADDR CODE NUMBR LABEL     CMND NEXTADDR OPERAND           COMMENT
18A6 FA02 09306           CALH          M=H0
18A7 CDBF 09307           JEPR INRW+
18A8 CF3C 09308           JEPR FECHRO+
18A9 E539 09309           JEPR TEMTB
18AA 930B 09310           BALG -4       M=0        BRANCH IF TAB
18AB C85D 09311           JEPR AJRO-/HO
18AC E9FA 09312           JEPR AJRWJ
18AD E923 09313           JEPR PRLJ
18AE E238 09314           JEPR CLH4-H7
18AF AADE 09315           JEPU CLH7&PC

               **READS TILL  END OF NEXT RECORD

18B0 8A7C 09320           JEPU LKRCER
18B1 2240 09321 SKPRWBLK CRWM           RMED          RESET MEDIA
18B2 B04F 09322           CALR          M=04       1<  SET 2 SEC. DLY
18B3 0013 09323           CKBD          HSDLY          SET 1/2 SEC. DLY
18B4 08BD 09324           BKBD -2       NS=0       1><3BR. IF 1/2 SEC. DLY EXP.
18B5 C07C 09325           JEPR MO                      BR. TO MONITOR
18B6 2E93 09326           BRWM +8       EOT=1      2>  BR. IF AT EOT
18B7 241C 09327           BRWM -3       RDR=0      3>  BR. IF READ DATA READY
18B8 E60B 09328           JEPR TEEODRW                 BR. TO END OF RW DATA READ
18B9 B14F 09329           CALR          M=14           SET 28 MS. DLY
18BA 0003 09330           CKBD          2MDLY          SET 2 MS. DLY
18BB C8A4 09331           BKBD -B       NM=0       4,)5BR. IF 28 MS DLY EXP.
18BC 2E92 09332           BRWM +2       EOT=1      2>  BR. IF AT EOT
18BD 2A1D 09333           BRWM -2       RDR=0      5>  BR. IF READ DATA NOT READY
18BE E80B 09334           JEPR TEEODRW                 BR. TO RD. TO END OF RW DATA
18BF C07C 09335           JEPR MO                  2<  BR. TO MONITOR
18C0 B05F 09336           CALR          M=05
18C1 000F 09337           RETN

18C2 2AD4 09341 REWINDAC BRWM +4        ACT=0      1>  BR. IF RW NOT ACTIVE
18C3 2570 09342 REWINDRW CRWM           FRR            FAST READ REVERSE
18C4 B08F 09343           CALR          M=08           INHIBIT RW RUN BIT
18C5 E78B 09344           JEPR SEG5                2<  BR. TO SET G5
18C6 A724 09345           JEPU CLM                     BR. TO CLEAR M

18C7 29DE 09347           BROM -1       ACT=0      1) BR. IF RO NOT ACTIVE
18C8 2570 09348 REWINDRO CROM           FRR          FAST READ REVERSE
18C9 B04F 09349           CALR          M=04           INHIBIT RO RUN BIT
18CA 080A 09350           JIPU -5                  2>

               * IN JUSTIFY HELP ZONE- TEST WIDTH OF SPACE

18CB E9C8 09356 TESPHLPJ JEPR CASPHLP              MAX SP TEST              CU270
18CC 9301 09357           BALG +1       M=0        BRANCH IF OUT OF SPACE
18CD A96D 09358           JEPU LKHLPERR
18CE 000F 09359           RETN

               *- JUSTIFY: TEST  G7 FOR BREAKPOINT(EJECT CEN.) IF NO
               *          BREAKPOINT & CENTERING BIT NOT SET AJUST BUFFER
               *          TO G7
18CF BA72 09365 TEG7BKJ  CALG           M=G7       J BKPT TEST              CU095
18D0 B139 09366           CALR          M=13-M
18D1 9302 09367           BALG +2       M=0        BRANCH IF CENTERING CODE
18D2 B40F 09368           CALR          M=40
18D3 9261 09369           BALG +1       M.G6=0     BRANCH IF CENTERING FLAG NOT SET
18D4 000F 09370           RETN
18D5 CF00 09371           JEPR AJROBG7
18D6 AA27 09372           JEPU LKJERR

               *  TEST CONSUMED SPACE IN JUSTIFY

18D7 E9EE 09377 TECS     JEPR CALINEJ              CONS SP TEST             CU255
18D8 9301 09378           BALG +1       M=0        BRANCH IF NO JUSTIFY AREA
18D9 A9C7 09379           JEPU CASPJ
18DA 0002 09380           RNOP
18DB A9B9 09381           JEPU CAEXITJ

               *  IN JUSTIFY - ANAL  BREAKPOINT - IF TAB RETN TO PRINT JUSTIFY TAB.
               *             IF NOT TAB CALC. AMT OF JUSTIFY SPACE.
               *             CALC. WIDTH OF JUSTIFY SPACES AND TEST AGAINST LOWER
               *             LIMIT
               *             TEST FOR HYPEN OR PREC. HYPEN. IF # OF LARGER SPACES AND
               *             # OF JUST. SPACES EQUAL ZERO ANAL. IF END OF PARA.

18DC 000F 09392           RETN
18DD B0AF 09393 ANBPJ    CALR           M=0A       ANAL BK PT
18DE 907D 09394           BALG -2       M-G7=0     BRANCH IF TAB
18DF E9EE 09395           JEPR CALINEJ
18E0 9305 09396           BALG +5       M=0        BRANCH IF NO MORE SPACE
18E1 FA62 09397           CALH          M=H6
18E2 E79B 09398           JEPR DIG1/M
18E3 EAC7 09399           JEPR FELOLIMJ
18E4 9113 09400           BALG +3       M>G1       BRANCH IF WIDTH OF SPACE > ALLOWED
18E5 ABF3 09401           JEPU ANEOP BP
18E6 FA62 09402           CALH          M=H6
18E7 9306 09403           BALG +6       M=0        BRANCH NO VARIABLE SPACES
18E8 0002 09404           RNOP
18E9 EAC1 09405           JEPR SUCSIFHY
```

```
ADDR CODE NUMBR LABEL      CMND NEXTADDR OPERAND            COMMENT

18EA BA72 09406            CALG          M=G7
18EB 99A1 09407            BDAT +1       M=1A       BRANCH IF PRECEDENTED HYPHEN
18EC C00F 09408            RETN
18ED 8F30 09409            JEPU FECHRO+
18EE FA42 09410            CALH          M=H4
18EF FB52 09411            CALH          M=M@H5
18F0 9301 09412            BALG +1       M=0        BRANCH IF NO SPACES TO ACCOUNT FOR
18F1 EBCF 09413            JEPR TEG7BKJ
18F2 ABF3 09414            JEPU ANEOP BP

                 *SEPERATE END OF PARAGRAPH BREAKPOINTS (RETN 2) FROM LESSER BREAKPOINTS
                 *(RETN 3)

18F3 EAC1 09420 ANEOP BP   JEPR SUCSIFHY               SUBTRACT HYPHEN CONS SP IF HYPHEN
18F4 E52F 09421            JEPR TEG7PCSP
18F5 9701 09422            BALG +1       (M=0)'     A>  BRANCH IF G7 NOT A PRT CH OR SPACE
18F6 A38D 09423            JEPU RETN3               D<

18F7 E51F 09425            JEPR TEG7CR              A<
18F8 9702 09426            BALG +2       (M=0)'     C> BRANCH NO CR
18F9 EB89 09427            JEPR TEEOPCRJ
18FA EAD0 09428            JEPR SESTOPIF            C<  SET STOP IF PARAGRAPH MODE.
18FB A38E 09429            JEPU RETN2

18FC E9EB 09432 SUG10H54   JEPR SESTEG01            COMP CONS SPACE
18FD E72A 09433            JEPR NEG G10
18FE A9CB 09434            JEPU ADH54G10

18FF 79CC 09437            *CHECK WORD*
1900 BA72 09437 TEG7TXTJ   CALG          M=G7
1901 1E72 09438            BPRT +2       DB7=1      A>
1902 98AA 09439            BDAT +A       M=0A       B>     BR IF TAB CODE
1903 0805 09440            JIPU +5
1904 98F8 09441            BDAT +8       M=8F       A< D>  BR IF TRACK LINK
1905 9878 09442            BDAT +8       M=87              BR IF SCH CODE
1906 98A7 09443            BDAT +7       M=8A              BR IF SSK CODE
1907 9886 09444            BDAT +6       M=88       E>     BR IF SWITCH CODE
1908 9895 09445            BDAT +5       M=89        F>    BR IF REPEAT CODE
1909 EA1C 09446            JEPR XFG7RWJ             C<     STORE CHAR IN RW BUFFER
190A E400 09447            JEPR CAG7JCS                    CALCULATE CHAR WIDTH
190B EAE1 09448            JEPR REPCIFCS                   RESET "1ST PRT CHAR"BIT IF M NE O
190C E9CB 09449            JEPR ADH54G10                   ADD CHAR WIDTH TO TOTAL
190D A559 09450            JEPU XFM=G7              B< D<  RETN WITH M=G7

190E E564 09452            JEPR TEG7EXEC            E<F<   TEST IF"SW" OR"RPT"CAN BE DONE
190F 0000 09453            NOOP
1910 9301 09454            BALG +1       M=0        G>     BR IF"SW"OR"RPT" CAN BE DONE
1911 A724 09455            JEPU CLM

1912 E973 09457            JEPR EXJUST              G<     EXECUTE CHAR AS REQUIRED
1913 A559 09458            JEPU XFM=G7                     RETN WITH M=G7

                 * JUSTIFY LOOP - ANAL. CHAR. IN JUSTIFY. ACCUMULATES THEIR WIDTHS AND
                 *                 EVALUATES IF BREAKPOINT.

1914 EC08 09464            JEPR ANCHJ
1915 E9CE 09465            JEPR CENTJ
1916 C525 09466 ANACCHJ    JEPR MVCARDE             JUST LOOP                  CU020
1917 EA29 09467            JEPR AJRWBPJ
1918 C07C 09468 ANCHJC     JEPR MO                  CONT J LOOP                CU020
1919 CF06 09469            JEPR FECH
191A E47A 09470            JEPR SKSPTBAJ
191B EA5F 09471            JEPR EVBPJ
191C 9707 09472            BALG -8       (M=0)'     BRANCH IF NOT BREAKPOINT
191D E550 09473            JEPR TEG7PUNJ
191E E900 09474            JEPR TEG7TXTJ
191F 9708 09475            BALG -7       (M=0)'     BRANCH NOT TEXT
1920 E950 09476            JEPR PRLJSTRW
1921 CFB9 09477            JEPR USPART
1922 8060 09478            JEPU REKBIDL

                 * IN JUSTIFY TESTS FOR AUTOPRINT,TEST FOR DEF'D CR.,
                 *             PRINTS LINE  (RW BUFFER).

1923 C3A1 09484 PRLJ       JEPR ENDLINPA
1924 B10F 09485            CALR          M=10
1925 E787 09486            JEPR REGA                RESET DEFERRED SPACE FLAG
1926 CCFA 09487            JEPR CRPACR
1927 0803 09488            JIPU +3
1928 E77E 09489            JEPR URHFCHCT
1929 E973 09490            JEPR EXJUST
192A CBA2 09491            JEPR TEG7DPJ
192B CE15 09492            JEPR FECHRW+
192C 970B 09493            BALG -4       (M=0)'     BRANCH CHARACTER IN RW
192D 8AFC 09494            JEPU AJRW-

                 * IN JUSTIFY- ENTERS ROUTINE WITH WIDTH OF JUSTIFY SPACE TOO SMALL (TOO
                 *             MANY CHARAGTERS ON A LINE. TAKES CHARACTERS FROM BREAKPOINT
                 *             TO LAST BREAKPOINT. CALCULATES NEW SPACE WIDTH. TESTS SPACE
                 *             WIDTH AGAINST H8 LIMIT ENTERS HELP ZONE IF NECESSARY  & PRINT
                 *             LINE.

192E E89D 09503 AJLINEJ    JEPR PRJTB               TOO TIGHT                  CU070
192F 0002 09504            RNOP
```

```
ADDR CODE NUMBR LABEL     CMND NEXTADDR OPERAND             COMMENT
1930 0002 09505           RNOP
1931 CF00 09506           JEPR AJROBG7
1932 E9F7 09507           JEPR AJRWTOBP
1933 0804 09508           JIPU +4
1934 E76D 09509           JEPR DEC H6               BRANCH IF SPACE
1935 0802 09510           JIPU +2                   BRANCH IF DATA
1936 E401 09511           JEPR CAMJCS
1937 E8FC 09512           JEPR SUG10H54
1938 CE15 09513           JEPR FECHRW+
1939 9A0A 09514           BDAT -5        M=20
193A 970B 09515           BALG -4        (M=0)'
193B CAFC 09516           JEPR AJRW-
193C E9F7 09517           JEPR AJRWTOBP
193D EAD4 09518           JEPR TERWHYJ
193E E9C7 09519           JEPR CASPJ
193F FA62 09520           CALH           M=H6
1940 9304 09521           BALG +4        M=0        BRANCH NO ACC. VARIABLE SPACES
1941 B3FF 09522           CALR           M=3F
1942 FE82 09523           CALH           M=M.H8     PUT JUST. UL SPACE IN M
1943 BCC0 09524           CALG           SML
1944 9111 09525           BALG +1        M>G1       BRANCH IF HAVE SPACE TO WORK WITH
1945 E958 09526           JEPR HLP
1946 E71C 09527           JEPR XFG01H45
1947 CE0F 09528           JEPR TERWB
1948 9A03 09529           BDAT +3        M=20       BRANCH IF SPACE
1949 B07F 09530           CALR           M=07
194A CE20 09531           JEPR LDMRW&AJ
194B AB4E 09532           JEPU PRJ
194C E771 09533           JEPR DEC H7
194D B07F 09534           CALR           M=07
194E CDBF 09535           JEPR INRW+
194F AB4E 09536           JEPU PRJ

          * PRINTS LINE IN JUSTIFY- USING CALCULATED SPACE WIDTH FOR STD. SPACE.

1950 EA1C 09541 PRLJSTRW JEPR XFG7RWJ               STORE & PRT L.J.      CU140
1951 E9FA 09542 PRSTDLJ  JEPR AJRWJ                 PRINT STD L.J.        CU140
1952 F144 09543           CALH           H4=0
1953 E3F3 09544           JEPR FESTDSP
1954 BC00 09545           CALG           SML
1955 F054 09546           CALH           H5=M
1956 E923 09547           JEPR PRLJ
1957 A23B 09548           JEPU CLH4-H7

          * IN JUSTIFY HELP ZONE - CALCULATES AMOUNT OF JUSTIFY SPACE. PRINTS HELP
          *                        ZONE WORD, AJUSTS RW BUFFER TO BREAKPOINT. &
          *                        ANAL. HELP ZONE BREAKPOINT.

1958 E9EE 09555 HLP       JEPR CALINEJ              HELP                  CU220
1959 9701 09556           BALG +1        (M=0)'     BRANCH IF ROOM TO CONTINUE JUSTIFY
195A A96D 09557           JEPU LKHLPERR
195B B02F 09558           CALR           M=02
195C E78B 09559           JEPR SEG5                 SET JUSTIFY HELP FLAG
195D C9A1 09560           JEPR ENDLINPA
195E B10F 09561           CALR           M=10
195F E7B7 09562           JEPR REGA                 RESET LEFT PRINT FLAG
1960 EAEF 09563           JEPR MVCRSCRA
1961 EA07 09564           JEPR PRHLP
1962 E9F7 09565           JEPR AJRWTOBP
1963 CF1D 09566           JEPR FECHRW-
1964 CE15 09567           JEPR FECHRW+
1965 B2D9 09568           CALR           M=2D-M
1966 9702 09569           BALG +2        (M=0)'     BRANCH IF '
1967 CE06 09570           JEPR RECHRWB
1968 EAC4 09571           JEPR SUHYCS
1969 E9AB 09572           JEPR ANBPHLP
196A 1309 09573           CPRT           RBDN
196B FA62 09574           CALH           M=H6
196C 9702 09575           BALG +2        (M=0)'     BRANCH IF HAVE ACCUMULATED VARIABLE SP.
196D EAEB 09576 LKHLPERR JEPR MVFRHLP               HELP ERROR            CU220
196E AA27 09577           JEPU LKJERR
196F 0602 09578           CKBD           KBST
1970 EC2C 09579           JEPR ANKBHLP
1971 080E 09580           JIPU -1

          * IN JUSTIFY - UPDATES PROCESSED CHAR. COUNT IN REG. HF.
          *              ANAL. G7 FOR UNDERSCORE, & PRINTING CHAR.
          *              EXECUTES RT. JUSTIFY AND SHIFTS RWB.

1972 E77E 09587 PRJ&AJHF JEPR UPHFCHCT              UPD & EXEC JUST       CU170
1973 CFB1 09588 EXJUST    JEPR ANG7US               EXEC JUST.            CU170
1974 E52F 09589           JEPR TEG7PCSP
1975 9701 09590           BALG +1        (M=0)'     BRANCH NON PRINT CHARACTER
1976 877E 09591           JEPU PRCH
1977 E4FB 09592           JEPR TEG7FMT
1978 9701 09593           BALG +1        (M=0)'     BRANCH NO FORMAT
1979 A9AD 09594           JEPU ANFMTJ
197A BBEF 09595           CALR           M=8E
197B 9073 09596           BALG +3        M-G7=0     BRANCH IF STOP CODE
197C E97E 09597           JEPR EXJUSTRT
197D 000F 09598           RETN
197E 8B93 09599 EXJUSTRT JEPU ANNPCJ
197F E473 09600           JEPR SESTOP
1980 8E06 09601           JEPU RECHRWB

          * PRINT END OF PARAGRAPH
          * TRANSFER G7 TO RW BUFFER . CALCULATE CONSUMED SPASE FOR LINE , CLEAR
          * H4 ,H5 , H6, H7 ,PRINT HELP IF NEEDED. CONTINUE PRINTING UNTIL END OF
          * PARAGRAPH IS  REACHED  THEN GO TO KEYBOARD IDLE
```

```
ADDR CODE NUMBR LABEL     CMND NEXTADDR OPERAND                COMMENT

1981 E92E 09609 PREOP     JEPR AJLINEJ
1982 EA1C 09610           JEPR XFG7RWJ
1983 E9FA 09611           JEPR AJRWJ
1984 E9C7 09612           JEPR CASPJ
1985 0002 09613           RNOP
1986 E23B 09614           JEPR CLH4-H7
1987 E3F3 09615           JEPR FESTDSP
1988 BC00 09616           CALG          SML
1989 F054 09617           CALH          H5=M
198A 8009 09618           CALR          M=00-M
198B 9712 09619           BALG +2       M=M+G1C     EXIT JUSTIFY WHEN CONSUME SPACE
198C BA12 09620           CALG          M=G1        EXCEEDS SPACE AVAILABLE
198D F054 09621           CALH          H5=M
198E E923 09622           JEPR PRLJ                 HELP J EXIT             CU060
198F E238 09623           JEPR CLH4-H7
1990 0804 09624           JIPU +4
1991 E706 09625           JEPR XFH10G47
1992 EA1C 09626           JEPR XFG7RWJ
1993 E972 09627           JEPR PRJ&AJHF
1994 CBA2 09628           JEPR TEG7DPJ
1995 B20F 09629           CALR          M=20
1996 E792 09630           JEPR REG6
1997 CF06 09631           JEPR FECH
1998 E520 09632           JEPR TEMCR
1999 9307 09633           BALG -8       M=0         BRANCH IF CR
199A C850 09634           JEPR AJRO-/HO
199B C201 09635           JEPR MOLINCTR
199C E470 09636           JEPR EVSTOP
199D 9301 09637           BALG +1       M=0         BRANCH STOP NOT SET
199E 8060 09638           JEPU REKBIDL
199F AADE 09639           JEPU CLH7&PC

                *    PROCESS FORMAT CHAR. IN JUSTIFY - IF # OF CHAR. PROCESSED (STORED IN
                *              REG. HF) EQUALS ZERO DUMP BUFFER.
                *              SET NEW PRINT FORMAT AJUST RO

19A0 CE0D 09646 ANFMTJ    JEPR AJ&CLRWB             PROCESS J FMT           CU210
19A1 E77A 09647           JEPR DEC HF
19A2 9301 09648           BALG +1       M=0         BRANCH NO MORE CHARACTERS TO PROCESS
19A3 CA84 09649           JEPR DUMP&FCH
19A4 E24E 09650           JEPR SEPFMT
19A5 B20F 09651           CALR          M=20
19A6 9292 09652           BALG +2       M.G9=0      BRANCH NOT RECORD
19A7 CEE9 09653           JEPR AJROLAIF
19A8 CEB2 09654 ENDFMTRC  JEPR AJROST
19A9 E1A8 09655           JEPR XFFMT
19AA 8A84 09656           JEPU DUMP&FCH

                *   IN JUSTIFY HELP ZONE - CALCULATES MAX. BK PT. FOR JUSTIFY LINE.
                *                AND SLASHES THAT CHAR.

19AB EA3E 09663 ANBPHLP   JEPR CAMAXBPJ             HELP MAX BK PT          CU240
19AC B64F 09664           CALR          M=64
19AD 8004 09665           CALG          G0=M
19AE B05F 09666           CALR          M=05
19AF 8014 09667           CALG          G1=M
19B0 BA42 09668           CALG          M=G4
19B1 9701 09669           BALG +1       (M=0)'      BRANCH IF 2ND CHARACTER
19B2 8363 09670           JEPU MVCRG10
19B3 E667 09671           JEPR ADM+G10
19B4 E3A3 09672           JEPR FEPITCH
19B5 E66A 09673           JEPR SUMG10
19B6 C363 09674           JEPR MVCRG10
19B7 85B5 09675           JEPU PR/

                * IN JUSTIFY SUBTRACT 1 CHAR. FROM LINE ENDING

19B8 A76D 09680           JEPU DEC H6
19B9 CF1D 09681 CAEXITJ   JEPR FECHRW-              CALC J EXIT             CU250
19BA E7B7 09682           JEPR AJH7CHCT
19BB FA02 09683           CALH          M=H0
19BC 9A0B 09684           BOAT -4       M=20        BRANCH IF SPACE
19BD E401 09685           JEPR CAMJCS
19BE B004 09686           CALG          G0=M
19BF E6B8 09687           JEPR RML7
19C0 C511 09688           JEPR SEDE
19C1 C4FB 09689           JEPR FEDE
19C2 B009 09690           CALR          M=00-M
19C3 B940 09691           CALG          M=M+G4
19C4 B044 09692           CALG          G4=M
19C5 BA02 09693           CALG          M=G0
19C6 A8FC 09694           JEPU SUG10H54

                * IN JUSTIFY CALCULATE SIZE OF VARIABLE SPACE

19C7 E9EE 09699 CASPJ     JEPR CALINEJ              CALC J SPACE            CU330
19C8 FA62 09700 CASPHLP   CALH          M=H6        HELP CALC SP            CU330
19C9 A79B 09701           JEPU DIG1/M

19CA E9E8 09704 ADCSH54   JEPR SE&TEG01             UPDATE CONS SPACE
19CB E715 09705 ADH54G10  JEPR XFH45H01             TERM CONS SP            CU320
19CC E65F 09706           JEPR ADG10H10
19CD A71C 09707           JEPU XFG01H45
```

```
ADDR CODE NUMBR LABEL     CMND NEXTADDR OPERAND            COMMENT

             * IN JUSTIFY - TEST CENTERING BIT (6) IN REG. G6.IF SET
             *              FETCH CHAR. FROM RO BUFFER SKIPS SPACES & TABS
             *              TEST FOR CEN. BK.PT.. ADJUSTS RO TO BK PT & PRINT.

19CE B40F 09714 CENTJ     CALR            M=40        JUST CENT            CU200
19CF BE62 09715           CALG            M=M.G6
19D0 9703 09716           BALG +3         (M=O)'      BRANCH CENTER FLAG SET
19D1 000F 09717           RETN
19D2 E900 09718           JEPR TEG7TXTJ
19D3 9306 09719           BALG +6         M=0         BRANCH NO TEXT
19D4 CF30 09720           JEPR FECHRO+
19D5 E47A 09721           JEPR SKSPTBAJ
19D6 0000 09722           NOOP
19D7 9302 09723           BALG +2         M=0         BRANCH SPACE OR TAB SKIPPED
19D8 E0D2 09724           JEPR TEMCENBP
19D9 9708 09725           BALG -7         (M=O)'
19DA CF00 09726           JEPR AJROBG7
19DB E951 09727           JEPR PRSTDLJ
19DC 8FB9 09728           JEPU USPART

             *  RESET JUSTIFY, MOVE CARRIER FROM HELP ZONE, AJUST THE RW BUFFER
             *                TO THE LAST PROCESSED CHARACTER. SCAN AHEAD IN RW
             *                BUFFER FOR 00.ALLIGNS RW AND RO.

19DD F164 09735 REJMDHLP CALH             H6=0        HELP JUST            CU310
19DE EAEB 09736           JEPR MVFRHLP
19DF E9FA 09737           JEPR AJRWJ
19E0 CE32 09738           JEPR CTRWH7
19E1 CF63 09739           JEPR CLRW=RO
19E2 CEOF 09740           JEPR TERWB
19E3 9701 09741           BALG +1         (M=O)'      BRANCH NXT CHAR IN RWB
19E4 ABB9 09742           JEPU REJ
19E5 E473 09743           JEPR SESTOP
19E6 E951 09744           JEPR PRSTDLJ
19E7 ABB9 09745           JEPU REJ

19E8 B004 09748 SE&TEGO1 CALG             GO=M        TEST IF GO NEGATIVE
19E9 B800 09749           CALR            M=M.80
19EA 9301 09750           BALG +1         M=0
19EB BFFF 09751           CALR            M=FF
19EC 8014 09752           CALG            G1=M
19ED 000F 09753           RETN

             * CALCULATES THE AMOUNT OF JUSTIFY AREA BETWEEN CARRIER POSITION AND
             *              RIGHT MARGIN.

19EE C67D 09759 CALINEJ   JEPR XFCAG10                CALC J AREA          CU330
19EF E72A 09760           JEPR NEG G10
19F0 EA7D 09761           JEPR FERMJ
19F1 8F01 09762           CALG            M=M+1
19F2 8024 09763           CALG            G2=M
19F3 E287 09764           JEPR FE2PCH
19F4 ECD8 09765           JEPR XMG2+G10
19F5 E715 09766           JEPR XFH45H01
19F6 A66F 09767           JEPU SUH10G10

19F7 FA72 09770 AJRWTOBP CALH             M=H7        RETN TO BK PT        CU350
19F8 B0C9 09771           CALR            M=00-M
19F9 8E2F 09772           JEPU AJRWBM

             * IN JUSTIFY-AJUST RW BUFFER TO LAST PROCESSED CHAR.

19FA CDE7 09777 AJRWJ     JEPR AJRWST                 J RWB ALIGN          CU360
19FB FAF2 09778           CALH            M=HF
19FC 8E2F 09779           JEPU AJRWBM

             *JUSTIFY - IN HELP ZONE AUTO DEPRESSED. BREAKS JUSTIFIED LINE IN HELP ZONE

19FF EE76 09784           *CHECK WORD*
1A00 E401 09784           JEPR CAMJCS
1A01 9305 09785           BALG +5         M=0         BRANCH NOT BS CODE
1A02 8800 09786           CALR            M=M.80
1A03 9302 09787           BALG +2         M=0         BRANCH NOT UNDERSCORE
1A04 E973 09788           JEPR EXJUST
1A05 C801 09789           JIPU +1
1A06 C780 09790           JEPR PR&MVG7
1A07 CE15 09791 PRHLP     JEPR FECHRW+                HELP PRINT           CU230
1A08 E706 09792           JEPR XFH10G47
1A09 9706 09793           BALG -9         (M=O)'
1A0A 8AFC 09794           JEPU AJRW-

             * FETCH RW CHAR IF SECOND CHAR. NEEDED BUZZ.
             *                IF SPACE INCR. # OF VARIABLE SPACE REG. H6.
             *                OTHERWISE ADJUST AMOUNT OF CONSUMMED SPACE.

1A0B CE15 09801 SPHLP     JEPR FECHRW+                HELP SP              CU290
1A0C E783 09802           JEPR UPH7CHCT
1A0D E709 09803           JEPR XFHOG7
1A0E E3DE 09804           JEPR FEMACWT
1A0F 970B 09805           BALG -4         (M=O)'      BRANCH IF ACCENT
1A10 CE0F 09806           JEPR TERWB
1A11 9307 09807           BALG +7         M=0         BRANCH NO DATA RWB
```

```
ADDR CODE NUMBER LABEL     CMND NEXTADDR OPERAND          COMMENT

1A12 BA72 09808            CALG          M=G7
1A13 9A04 09809            EDAT +4       M=20        BRANCH IF SPACE
1A14 CC90 09810            JEPR AJDEHO
1A15 C357 09811            JEPR AJCR+M
1A16 E400 09812            JEPR CAG7JCS
1A17 A9CA 09813            JEPU ADCSH54
1A18 A76B 09814            JEPU INC H6
1A19 CF1C 09815            JEPR FECHRW-
1A1A E7B7 09816            JEPR AJH7CHCT
1A1B A30D 09817            JEPU BZERROR

                 * IN JUSTIFY - STORE G7 AND G4 (IF) SECOND CHAR.) IN RW BUFFER.
                 *              INCR. H7(DISTANCE TO LAST BREAKPOINT)

1A1C BA72 09823 XFG7RWJ    CALG          M=G7        STORE RWB                CU340
1A1D CDBF 09824            JEPR INRW+
1A1E E774 09825            JEPR INC H7
1A1F E467 09826            JEPR TEG72CH
1A20 9703 09827            BALG +3       (M=0)'      BRANCH IF 2ND CHARACTER
1A21 E774 09828            JEPR INC H7
1A22 BA42 09829            CALG          M=G4
1A23 CE02 09830            JEPR INDATRW+
1A24 CE2A 09831            JEPR TERWFULL
1A25 9701 09832            BALG +1       (M=0)'      BRANCH RW NOT FULL
1A26 000F 09833            RETN
1A27 EB00 09834 LKJERR     JEPR BZLUJ                HARD J ERROR             CU340
1A28 080E 09835            JIPU -1

                 * OVERCOME BREAKPOINT - FETCH CHAR. FROM RW & STORE TABS

1A29 CDBA 09840 AJRWBPJ    JEPR FERW+                OVERC BK PT              CU370
1A2A CAFC 09841            JEPR AJRW-
1A2B 9302 09842            BALG +2       M=0         BRANCH IF BREAKPOINT
1A2C EA98 09843            JEPR TETB1NSJ
1A2D AABE 09844            JEPU INTB-RW
1A2E EA98 09845            JEPR TETB1NSJ
1A2F AA3C 09846            JEPU INTB+RW

                 *  IN JUSTIFY HELP ZONE- LOADS HYPHEN INTO RW BUFFER AFTER CALC.
                 *                   AMOUNT OF JUSTIFY SPACE AND COMPARING IT TO
                 *                   UPPER/LOWER LIMITS.

1A30 E9EE 09853 ANHYHLP    JEPR CALINEJ              HELP HYPHEN              CU270
1A31 9305 09854            BALG +5       M=0         BRANCH NO MORE ROOM IN LINE
1A32 E8CB 09855            JEPR TESPHLPJ
1A33 B3FF 09856            CALR          M=3F
1A34 FE82 09857            CALH          M=M,H8
1A35 FC00 09858            CALH          SML
1A36 0801 09859            JIPU +1
1A37 A30D 09860            JEPU BZERROR
1A38 EAC7 09861            JEPR FELOLIMJ
1A39 911D 09862            BALG -2       M>G1        BRANCH IF < LOWER LIMIT
1A3A AB2C 09863            JEPU LDHYRW

                 *  INSERT TABS IN RW BUFFER.

1A3B EA89 09868            JEPR INTBRWB
1A3C 970E 09869 INTB+RW    BALG -1       (M=0)'      STORE TABS FWD           CU380
1A3D 000F 09870            RETN

                 *  CALCULATES MAXIMUM BREAK POINT IN JUSTIFY

1A3E EADE 09875 CAMAXBPJ   JEPR CLH7&PC              CALC MAX BK PT           CU250
1A3F EA94 09876            JEPR ADHYCS
1A40 8144 09877            CALG          G4=0
1A41 0805 09878            JIPU +5
1A42 A9B9 09879            JEPU CAEXITJ
1A43 E76B 09880            JEPR INC H6
1A44 E8D7 09881 CAMAXCT    JEPR TECS
1A45 EAC7 09882            JEPR FELOLIMJ
1A46 911B 09883            BALG -4       M>G1
1A47 CE15 09884            JEPR FECHRW+
1A48 9701 09885            BALG +1       (M=0)'
1A49 8AFC 09886            JEPU AJRW-
1A4A E783 09887            JEPR UPH7CHCT
1A4B FA02 09888            CALH          M=H0
1A4C 9A06 09889            BDAT -9       M=20        BRANCH IF SPACE
1A4D E401 09890            JEPR CAMJCS
1A4E 9308 09891            BALG -7       M=0         BRANCH ALL SPACE CONSUMED
1A4F B004 09892            CALG          G0=M
1A50 B940 09893            CALG          M=M+G4
1A51 B044 09894            CALG          G4=M
1A52 BA02 09895            CALG          M=G0
1A53 E9CA 09896            JEPR ADCSH54
1A54 AA44 09897            JEPU CAMAXCT

                 *TEST FOR POTENTIAL BREAKPOINT CHARACTER IN JUSTIFY. RETN WITH M NE 00
                 *IF POTENTIAL BREAKPOINT.

1A55 FA42 09903            CALH          M=H4        C<
1A56 FB52 09904            CALH          M=M$H5
1A57 9702 09905            BALG +2       (M=0)'      A>          BR IF ANY ACCUM WIDTH
1A58 0002 09906            RNOP
```

```
ADDR CODE NUMBR LABEL     CMND NEXTADDR OPERAND            COMMENT
1A59 A319 09907           JEPU ANCHJC

1A5A B04F 09909           CALR          M=04     A<
1A5B 9262 09910           BALG +2       M.G6=0   B>             BR IF"1ST PRT CH"BIT=0
1A5C E76B 09911           JEPR INC H6                           INCREMENT CNT OF VAR SP.
1A5D A724 09912           JEPU CLM

1A5E 000F 09914           RETN                   B<

1A5F 9A05 09916 EVBPJ     BDAT -A       M=20     C>             BR IF"SPACE"CODE
1A60 98AA 09917           BDAT +A       M=0A     R>             BR IF"TAB"CODE
1A61 99A4 09918           BDAT +4       M=1A     D>             BR IF"PREC HYPHEN"CODE
1A62 9AD4 09919           BDAT +4       M=2D     E>             BR IF HYPHEN"CODE
1A63 B00D 09920           CALR          M=M.60
1A64 9309 09921           BALG +9       M=0      F>             BR IF CODE=20-7F OR A0-FF
1A65 A724 09922           JEPU CLM

1A66 EA1C 09924           JEPR XFG7RWJ           D<
1A67 E400 09925           JEPR CAG7JCS           E<
1A68 EAE1 09926           JEPR REPCIFCS
1A69 E9CB 09927           JEPR ADH54G10
1A6A A72B 09928           JEPU SEM=FF

1A6B B01F 09930           CALR          M=01     R<
1A6C BE62 09931           CALG          M=M.G6
1A6D 000F 09932           RETN                                  RETN M=00 IF TB CTR SHUT

1A6E BEFF 09934           CALR          M=EF     F<
1A6F BE72 09935           CALG          M=M.G7                  MASK OFF BIT 7 OF G7
1A70 9817 09936           BDAT +7       M=01     G>             BR IF COL OR LS1
1A71 98F6 09937           BDAT +6       M=0F       H>           BR IF PBS.ESP.TRL.CR ESP
1A72 BA72 09938           CALG          M=G7
1A73 1A75 09939           BPRT +5       DB7=0    I>             BR CODE=00-1F. NOT IF80-9F
1A74 9807 09940           BDAT +7       M=80                    BR EOR
1A75 1A32 09941           BPRT +2       DB3=0        J>         BR CODE=80-87 OR 90-97
1A76 1E41 09942           BPRT +1       DB4=1          K>       BR CODE=98-9F. NOT IF80-8F
1A77 1E24 09943           BPRT +4       DB2=1    M>             BR CODE=8C-8F. NOT IF88-8B
1A78 A724 09944           JEPU CLM               G<H<J<K<O<P<

1A79 1A32 09946           BPRT +2       DB3=0    I< N>          BR CODE=00-07 OR 10-17
1A7A 1E4D 09947           BPRT -2       DB4=1           O>      BR CODE=18-1F. NOT IF08-0F
1A7B 1E2C 09948           BPRT -3       DB2=1             P>    BR CODE=0C-0F. NOT IF08-0B
1A7C A72B 09949           JEPU SEM=FF            M< N<

                 * FETCH RIGHT MARGIN IN JUSTIFY CK. THAT RM DOES NOT EXCEED SPECIFIED
                 *        HELP ZONE.

1A7D E3AE 09956 FERMJ     JEPR FERM
1A7E F0C4 09957           CALH          HC=M
1A7F B04F 09958           CALR          M=04
1A80 9297 09959           BALG +7       M.G9=0   BRANCH NOT JUSTIFY
1A81 B80F 09960           CALR          M=80
1A82 92F3 09961           BALG +3       M.GF=0   BRANCH TWELVE PITCH NOT SET
1A83 B84F 09962           CALR          M=84
1A84 D1C3 09963           BALH +3       M>HC
1A85 000F 09964           RETN
1A86 B6EF 09965           CALR          M=6E
1A87 080C 09966           JIPU -3
1A88 83FC 09967           JEPU XFM=HC


1A89 B0AF 09970 INTBRWB   CALR          M=0A     TABS TO RWB
1A8A CE20 09971           JEPR LDMRW&AJ
1A8B A75C 09972           JEPU DEC H0


1A8C EA89 09975           JEPR INTBRWB'
1A8D CAFC 09976           JEPR AJRW-
1A8E 970D 09977 INTB-RW   BALG -2       (M=0)'   STORE TABS REV          CU380
1A8F B0FF 09978           CALR          M=0F
1A90 BEC2 09979           CALG          M=M.GC
1A91 CE2F 09980           JEPR AJRWBM
1A92 EAB6 09981           JEPR EVRWBJ
1A93 080E 09982           JIPU -1

                 *  ADD HYPEN TO CONSUMMED SPACE CALCULATION.

1A94 B2DF 09987 ADHYCS    CALR          M=2D     ADD HYPHEN
1A95 E401 09988           JEPR CAMJCS
1A96 A9CA 09989           JEPU ADCSH54


1A97 A724 09992           JEPU CLM
1A98 B20F 09993 TETB1NSJ  CALR          M=20     J TAB INS TEST          CU390
1A99 926D 09994           BALG -2       M.G6=0   BRANCH INSERT TAB FLAG NOT SET
1A9A E792 09995           JEPR REG6              RESET INSERT TAB FLAG
1A9B B0FF 09996           CALR          M=0F
1A9C BEC2 09997           CALG          M=M.GC
1A9D F004 09998           CALH          H0=M
1A9E F9F0 09999           CALH          M=M+HF
1A9F F0F4 10000           CALH          HF=M
1AA0 8AD1 10001           JEPU XFM=H0

                 * FETCH LAST 2 CH. FROM RW BUFFER. ADJUST CHAR. COUNT REG H7.
                 *                IF SPACE DECR. # VARIABLE SPACES REG H6.
                 *                OTHERWISE ADJUST AMOUNT OF CONSUMMED SPACE.
```

```
ADDR CODE NUMBR LABEL     CMND NEXTADDR OPERAND            COMMENT

1AA1 FA72 10008 BSHLP     CALH          M=H7      HELP BS                      CU300
1AA2 9701 10009           BALG +1       (M=0)'
1AA3 A30D 10010           JEPU BZERROR
1AA4 CF1D 10011           JEPR FECHRW-
1AA5 E787 10012           JEPR AJH7CHCT
1AA6 E709 10013           JEPR XFHOG7
1AA7 E3DE 10014           JEPR FEMACWT
1AA8 970B 10015           BALG -4       (M=0)'    ADJUST AGAIN IF ACCENT
1AA9 08C1 10016           JIPU +1
1AAA E787 10017           JEPR AJH7CHCT
1AAB CF1D 10018           JEPR FECHRW-
1AAC E3DE 10019           JEPR FEMACWT
1AAD 970C 10020           BALG -3       (M=0)'
1AAE CE15 10021           JEPR FECHRW+
1AAF 8A72 10022           CALG          M=G7
1AB0 9A04 10023           BDAT +4       M=20      BRANCH IF SPACE
1AB1 CC90 10024           JEPR AJDEHO
1AB2 C35B 10025           JEPR AJCR-M
1AB3 E400 10026           JEPR CAG7JCS
1AB4 A8FC 10027           JEPU SUG10H54
1AB5 A76D 10028           JEPU DEC H6

                  *  IN JUSTIFY - EVALUATE RW BUFFER - UPDATES CHAR. COUNT IN REG H7
                  *             CALCULATES CONSUMMED SPACE & ADJUSTS BUFFER.

1AB6 CE15 10034 EVRWBJ    JEPR FECHRW+            EVAL J RWB                   CU400
1AB7 D704 10035           BALH +4       (M=0)'    BRANCH IF CHARACTER IN RWB
1AB8 0002 10036           RNOP
1AB9 8AFC 10037           JEPU AJRW-
1ABA 8E06 10038           JEPU RECHRWB
1ABB 0000 10039           NOOP
1ABC E783 10040           JEPR UPH7CHCT
1ABD FA02 10041           CALH          M=H0
1ABE 9A08 10042           BDAT -4       M=20      BRANCH IF SPACE
1ABF E401 10043           JEPR CAMJCS
1AC0 A9CA 10044           JEPU ADCSH54

                  *  IF G7 CONTAINS HYPEN SUBTRACT IT FROM CONSUMED SPACE.

1AC1 8A72 10049 SUCSIFHY  CALG          M=G7
1AC2 9AD1 10050           BDAT +1       M=2D      BR IF HYP
1AC3 000F 10051           RETN
1AC4 82DF 10052 SUHYCS    CALR          M=2D      SUBTRACT HYPHEN
1AC5 E401 10053           JEPR CAMJCS
1AC6 A8FC 10054           JEPU SUG10H54

1AC7 B80F 10057 FELOLIMJ  CALR          M=80      LOW LIM TO M                 CU410
1AC8 9264 10058           BALG +4       M.G6=0    BRANCH NOT PROPORTIONAL SPACE
1AC9 9251 10059           BALG +1       M.G5=0    BRANCH LOWER LIMIT NOT SET
1ACA BFEA 10060           CALR          M=M+FE
1ACB B85A 10061           CALR          M=M+85
1ACC 000F 10062           RETN
1ACD E287 10063           JEPR FE2PCH
1ACE BFDA 10064           CALR          M=M+FD
1ACF 000F 10065           RETN                    RETURN WITH PROPER PITCH IN M

                  * SET STOP BIT IF IN PARA. MODE.

1AD0 B04F 10070 SESTOPIF  CALR          M=04      SET STOP IF PARA             CU440
1AD1 9281 10071           BALG +1       M.G8=0    BRANCH NOT PARA MODE
1AD2 A473 10072           JEPU SESTOP
1AD3 000F 10073           RETN

                  * TESTS RW BUFFER FOR HYPHEN OR PREC. HYPEN

1AD4 CE0F 10078 TERWHYJ   JEPR TERWB              HYPHEN TEST                  CU420
1AD5 E532 10079           JEPR TEMPC
1AD6 9301 10080           BALG +1       M=0       BRANCH IF PRINT CHARACTER
1AD7 000F 10081           RETN
1AD8 CF1D 10082           JEPR FECHRW-
1AD9 CE15 10083           JEPR FECHRW+
1ADA 99AC 10084           BDAT -3       M=1A      BRANCH IF PRECEDENTED HYPHEN
1ADB 82DF 10085           CALR          M=2D
1ADC CE20 10086           JEPR LDMRW&AJ
1ADD AA94 10087           JEPU ADHYCS

1ADE F174 10090 CLH7&PC   CALH          H7=0      CLR H7 & PC                  CU450
1ADF B04F 10091           CALR          M=04
1AE0 A792 10092           JEPU REG6               RESET 1ST  PRINT CHARACTER FLAG

                  * RESETS FIRST PRINTING CHARACTER BIT (2) IN REG. G6 IF CHAR=00

1AE1 9303 10097 REPCIFCS  BALG +3       M=0       RESET PC IF C. SP.           CU450
1AE2 E9E8 10098           JEPR SE&TEGO1
1AE3 B04F 10099           CALR          M=04
1AE4 A792 10100           JEPU REG6               RESET 1ST  PRINT CHARACTER FLAG
1AE5 A9E8 10101           JEPU SE&TEGO1

                  * CLEAR DISTANCE TO LAST BREAKPOINT IF FIRST PRINTING CHAR BIT (2) IN
                  *              REG. G6 RESET.
```

```
ADDR CODE NUMBR LABEL     CMND NEXTADDR OPERAND              COMMENT
1AE6 804F 10107 CLH71F    CALR          M=04      CLR H7 IF OK                 CU450
1AE7 9261 10108           BALG +1       M.G6=0    BRANCH 1ST PRINT FLAG NOT SET
1AE8 000F 10109           RETN
1AE9 F174 10110           CALH          H7=0
1AEA A790 10111           JEPU SEG6               SET 1ST PRINT CHARACTER FLAG

                 * MOVE FROM HELP ZONE

1AEB 802F 10116 MVFRHLP   CALR          M=02
1AEC E78D 10117           JEPR REG5
1AED EAF5 10118           JEPR MVCRHE9            RESET MGE FLAG
1AEE ACF1 10119           JEPU CLHELP

1AEF E6E9 10122 MVCRSCRA  JEPR XFCAHE9            MOVE TO SCRATCH              CU470
1AF0 B80F 10123           CALR          M=80
1AF1 92F1 10124           BALG +1       M.GF=0    BRANCH NOT 12 PITCH
1AF2 897F 10125           CALR          M=97
1AF3 8F3A 10126           CALR          M=M+F3
1AF4 82F0 10127           JEPU MVCRM

1AF5 8F0F 10130 MVCRHE9   CALR          M=F0      MOVE TO HE/H9                CU470
1AF6 FE92 10131           CALH          M=M.H9
1AF7 E6BE 10132           JEPR RML4
1AF8 B004 10133           CALG          G0=M
1AF9 FAE2 10134           CALH          M=HE
1AFA 82F1 10135           JEPU MVCRM+FR

1AFB 9262 10138 FESTDSPC  BALG +2       M.G6=0    M ENTERS WITH 80 BR NOT PROP SPACE
1AFC B03F 10139           CALR          M=03
1AFD 000F 10140           RETN

1AFE A3A3 10142           JEPU FEPITCH

                 * IN JUSTIFY - TURNS ON FLASHING BUZZER AND FLASHES JUSTIFY LIGHT.AFTER
                 *              STOP KEY DEPRESSED EXIT JUSTIFY ADJUST BUFFERS &
                 *              PRINT.

1AFF 9CD1 10149           *CHECK WORD*
1B00 0732 10149 BZLUJ     CKBD          BUZZ=3    J BUZZ LOCK                  CU480.
1B01 0C3F 10150           BKBD -0       STOP=1
1B02 B04F 10151           CALR          M=04
1B03 0CC6 10152           BKBD +6       2HZ=1
1B04 E7B0 10153           JEPR SEG9               SET JUSTIFY FLAG
1B05 0835 10154           BKBD +5       STOP=0
1B06 CF6D 10155           JEPR RERO=RW
1B07 E951 10156           JEPR PRSTDLJ
1B08 CFB9 10157           JEPR USPART
1B09 ABB9 10158           JEPU REJ
1B0A E7B2 10159           JEPR REG9
1B0B C07C 10160           JEPR MO
1B0C C29D 10161           JEPR TEKB
1B0D 9304 10162           BALG -B       M=0
1B0E 0702 10163           CKBD          BUZZ=0
1B0F 000F 10164           RETN

1B10 803F 10167 SELOLIMJ  CALR          M=03      SET JUSTIFY LOWER LIMIT OF SPACES
1B11 B021 10168           CALG          M=M-G2    G2 CONTAINS LOW LIM VALUE
1B12 9305 10169           BALG +5       M=0       BRANCH DEFAULT LOW LIMIT VALUE
1B13 9401 10170           BALG +1       M=M-1=0
1B14 ABC2 10171           JEPU BZJLMTER
1B15 B80F 10172           CALR          M=80
1B16 E78B 10173           JEPR SEG5               SET LOWER LIMIT FLAG
1B17 ABC3 10174           JEPU SEJLMT
1B18 B80F 10175           CALR          M=80
1B19 E78D 10176           JEPR REG5               RESET LOWER LIMIT FLAG
1B1A ABC3 10177           JEPU SEJLMT

1B1B CE6B 10180 ANAUTHLP  JEPR AJRW&H7            HELP AUTO                    CU280
1B1C FA62 10181           CALH          M=H6
1B1D 9701 10182           BALG +1       (M=0)'    BRANCH IF VARIABLE SPACES ACCUMULATED
1B1E A96D 10183           JEPU LKHLPERR
1B1F CE0F 10184           JEPR TERWB
1B20 E532 10185           JEPR TEMPC
1B21 9304 10186           BALG +4       M=0       BRANCH IF PRINT CHARACTER
1B22 EAC4 10187           JEPR SUHYCS
1B23 E9EE 10188           JEPR CALINEJ
1B24 E8CB 10189           JEPR TESPHLPJ
1B25 0808 10190           JIPU +8
1B26 CF1D 10191           JEPR FECHRW-
1B27 CE15 10192           JEPR FECHRW+
1B28 99A9 10193           BDAT -6       M=1A      BRANCH IF PRECEDENTED HYPHEN
1B29 E9EE 10194           JEPR CALINEJ
1B2A E8CB 10195           JEPR TESPHLPJ
1B2B AB2C 10196           JEPU LDHYRW
1B2C B2DF 10197 LDHYRW    CALR          M=2D      INSERT HYPHEN AND EXIT
1B2D CE20 10198           JEPR LDMRW&AJ
1B2E 0002 10199           RNOP
1B2F EAEB 10200           JEPR MVFRHLP
1B30 A9C7 10201           JEPU CASPJ

                 * SETS CODE PRINT & EXP SPACE RESETS TAB COUNTER & LINE UNDERSCORE.
```

```
ADDR CODE NUMBR LABEL     CMND NEXTADDR OPERAND          COMMENT

1B31 EB80 10206 SEJ       JEPR TEJON                     J KEY                     CU490
1B32 9701 10207           BALG +1       (M=O)'           BRANCH IF JUSTIFY ON
1B33 8A44 10208           JEPU BZERI3
1B34 E23B 10209           JEPR CLH4-H7
1B35 BC0F 10210           CALR          M=C0
1B36 E797 10211           JEPR REG8                      RESET EXPAND AND CODE PRINT FLAG
1B37 E4D9 10212           JEPR CTRWHF
1B38 B0CF 10213           CALR          M=0C             RESET PLAY AND JUSTIFY FLAGS
1B39 E7B0 10214           JEPR SEG9
1B3A B04F 10215           CALR          M=04
1B3B E7B7 10216           JEPR REGA                      RESET LINE UNDERSCORE FLAG
1B3C A4E0 10217           JEPU RETC                      OPEN TAB COUNTER

1B3D 0102 10220 SETFLASH CKBD           LDR1             USED IN END OF RIBBON ROUTINE
1B3E B7DF 10221           CALR          M=7D             SETS 250MS DELEY
1B3F C003 10222           CKBD          2MDLY
1B40 C25F 10223           JEPR MOTAPE
1B41 0CAE 10224           BKBD -1       NM=1
1B42 000F 10225           RETN

          * SET JUSTIFY LIMIT.

1B43 EB80 10230 SEJ&JLMT JEPR TEJON                      JLMT KEY                  CU500
1B44 9701 10231           BALG +1       (M=O)'           BRANCH IF JUSTIFY ON
1B45 8A44 10232           JEPU BZERI3
1B46 EBC3 10233 SEJLMTJ   JEPR SEJLMT                    JLMT                      CU500
1B47 9702 10234           BALG +2       (M=O)'           BRANCH IF NOT DEFAULT CONDITION
1B48 B04F 10235           CALR          M=04
1B49 9291 10236           BALG +1       M.G9=0           BRANCH JUSTIFY NOT ON
1B4A 8060 10237           JEPU REKBIDL
1B4B EB31 10238           JEPR SEJ
1B4C 8060 10239           JEPU REKBIDL

          * PRINT IN THE JUSTIFY MODE BOTH FORWARD AND REVERSE

1B4E C517 10244 PRJ       JEPR CLDE
1B4F F164 10245           CALH          H6=0
1B50 C6A1 10246           JEPR ENDLINPA                       PRINT FROM PRINT STACK TILL EMPTY
1B51 B10F 10247           CALR          M=10
1B52 E7B7 10248           JEPR REGA                           RESET REVERSE PRINT IF SET
1B53 1E5B 10249           BPRT +8       DB5=1       A>        BR IF DEFERRED CR
1B54 E9FA 10250 PRJFWD    JEPR AJRWJ
1B55 CE1D 10251           JEPR FEXFTERW             C<        FETCH FROM RW BUFFER
1B56 9302 10252           BALG +2       M=0         B>        BR IF CR
1B57 E973 10253           JEPR EXJUST                         EXECUTE CHARACTER
1B58 080C 10254           JIPU -3                   C>
1B59 BAA2 10255           CALG          M=GA        B<
1B5A 1E32 10256           BPRT +2       DB3=1       D>        BR IF PRINT AUTO
1B5B E973 10257           JEPR EXJUST                         EXECUTE CR IF NOT PRINT AUTO
1B5C 0301 10258           JIPU +1                   E>
1B5D C73A 10259           JEPR CRPAIX               D<        INDEX ETC IF PR AUTO & SET DEED CR
1B5E AB74 10260           JEPU ENDJPR               E<

1B5F E9FA 10262           JEPR AJRWJ                A<
1B60 CE1D 10263           JEPR FEXFTERW             G<        FETCH FROM RW BUFFER
1B61 9304 10264           BALG +4       M=0         F>        BR IF CR
1B62 E5E3 10265           JEPR TEG7HAY
1B63 930C 10266           BALG -3       M=0         G>        BR IF CAN BE PRINTED REVERSE
1B64 C5FA 10267           JEPR CRPACR                         EXECUTE DCEED CR
1B65 AB54 10268           JEPU PRJFWD

1B66 EC49 10270           JEPR MVRMSERP             SET REVERSE PRINT, GO RIGHT MARGIN
1B67 CF1D 10271           JEPR FECHRW-
1B68 CF1D 10272           JEPR FECHRW-              I<
1B69 9305 10273           BALG +5       M=0         H>
1B6A E706 10274           JEPR XFH10G47
1B6B B0A9 10275           CALR          M=0A-M
1B6C 930B 10276           BALG -4       M=0
1B6D E973 10277           JEPR EXJUST                         EXECUTE CHARACTER
1B6E 0809 10278           JIPU -6                   I>
1B6F C73A 10279           JEPR CRPAIX               H<        INDEX ETC & SET DEED ESC BIT
1B70 C5FA 10280           JEPR CRPACR                         CLEAR DEED ESC BIT
1B71 CDE7 10281           JEPR AJRWST
1B72 CE1D 10282           JEPR FEXFTERW
1B73 970E 10283           BALG -1       (M=O)'
1B74 CBA2 10284 ENDJPR    JEPR TEG7DPJ
1B75 E23B 10285           JEPR CLH4-H7
1B76 CF6D 10286           JEPR RERO=RW
1B77 F1F4 10287           CALH          HF=0
1B78 CE0F 10288           JEPR TERWB
1B79 9705 10289           BALG +5       (M=O)'      BRANCH CHARACTER RWB
1B7A E470 10290           JEPR EVSTOP
1B7B 9302 10291           BALG +2       M=0         BRANCH NO STOP CONDITION
1B7C EA29 10292           JEPR AJRWBPJ
1B7D 8060 10293           JEPU REKBIDL
1B7E C0C1 10294           JEPR MOLINCTR
1B7F A23B 10295           JEPU CLH4-H7

          * CLEAR M IF IN REVISE, OR NOT IN PS OR NOT PLAY OR MARGIN CONTROL

1B80 E5A8 10300 TEJON     JEPR TERV                 J ON TEST                 CU510
1B81 9704 10301           BALG +4       (M=O)'      BRANCH NOT REVISE
1B82 0C83 10302           BKDD +3       NPS=1       BRANCH PS SWITCH TRUE
1B83 E596 10303           JEPR TEPNMC
1B84 9701 10304           BALG +1       (M=O)'      BRANCH NOT MARGIN CONTROL
```

```
ADDR CODE NUMBR LABEL     CMND NEXTADDR OPERAND              COMMENT

1BB5 A728 10305           JEPU SEM=FF
1BB6 A724 10306           JEPU CLM

              * IN JUSTIFY - TESTS FOR END OF PARAGRAPH

1BB7 A4E0 10311           JEPU RETC

1BB8 000F 10313           RETN

1BB9 BA72 10315 TEEOPCRJ  CALG          M=G7
1BBA 980D 10316           BDAT -2       M=06       BR PSCR
1BBB 980C 10317           BDAT -3       M=08       BR PCR
1BBC CEEE 10318           JEPR TEROB1
1BBD B0B9 10319           CALR          M=0B-M
1BBE 9308 10320           BALG -7       M=0        BR PTB
1BBF E4BA 10321           JEPR SKSPTBIF
1B90 9305 10322           BALG +5       M=0        BR IF NO TABS SKIPPED
1B91 CE5C 10323           JEPR AJRO-
1B92 FA02 10324           CALH          M=HO
1B93 E520 10325           JEPR TEMCR
1B94 9705 10326           BALG +5       (M=0)'     BR IF CEN
1B95 000F 10327           RETN                     RETN IF CR

1B96 C011 10329           JEPR TELM
1B97 FB42 10330           CALH          M=M⊕H4
1B98 FB52 10331           CALH          M=M⊕H5
1B99 9701 10332           BALG +1       (M=0)'
1B9A A38D 10333           JEPU RETN3               BRANCH IF SPACE LEFT TO EXECUTE

1B9B BA62 10335           CALG          M=G6
1B9C 1E6D 10336           BPPT -2       DB6=1      BR IF CEN BIT
1B9D E481 10337           JEPR SKSPTBRO
1B9E CE5C 10338           JEPR AJRO-
1B9F A38C 10339           JEPU RETN4

              * ANALYZE ALL KEYBOARD INPUTS IN THE JUSTIFY MODE

1BA2 CC0C 10344           JEPR EXSCH
1BA3 8A44 10345           JEPU BZERI3

1BA4 BA72 10347 ANKBJ     CALG          M=G7
1BA5 1E79 10348           BPRT +9       DB7=1      A>
1BA6 99F2 10349           BDAT +2       M=1F       B>        BR IF "AUTO" CODE
1BA7 99E2 10350           BDAT +2       M=1E       C>        BR IF "PARA" CODE
1BA8 8A44 10351           JEPU BZERI3

1BA9 803A 10353           CALR          M=M+03     B<        IF+03+E6=08 (SET"AUTO"BIT)
1BAA BE6A 10354           CALR          M=M+E6     C<        1E+E6   =04 (SET"PARA"BIT)
1BAB E795 10355           JEPR SEG8                          SET"AUTO" OR"PARA" MODE
1BAC E5F0 10356           JEPR TEACMED
1BAD E898 10357           JEPR SEKSJ
1BAE A916 10358           JEPU ANACCHJ                       ENTER MAIN JUSTIFY LOOP

1BAF 9A02 10360           BDAT -D       M=A0            BR. IF SER.
1BB0 9CFE 10361           BDAT +E       M=CF            BR. IF
1BB1 9A44 10362           BDAT +4       M=A4            BR. IF ERS.
1BB2 9A64 10363           BDAT +4       M=AB       H>        BR IF "REC"  CODE (RECORD)
1BB3 9B94 10364           BDAT +4       M=B9       I>        BR IF "JLT"  CODE(JUSTIFY LMT
1BB4 9A94 10365           BDAT +4       M=A9       J>        BR IF "JST"  CODE(JUSTIFY)
1BB5 8A44 10366           JEPU BZERI3

1BB6 89A3 10368           JEPU ERASE

1BB7 8A55 10370           JEPU SERC                H<

1BB8 AB46 10372           JEPU SEJLMTJ             I<

1BB9 B04F 10374 REJ       CALR          M=04       J<
1BBA E7B2 10375           JEPR REG9                          RESET JUSTIFY
1BBB E951 10376           JEPR PRSTDLJ
1BBC CFB9 10377           JEPR USPART
1BBD E4E6 10378           JEPR LKTC
1BBE 8060 10379           JEPU REKBIDL

1BBF C6E0 10381           JEPR SEPA
1BC0 E89B 10382           JEPR SEKSJ
1BC1 A916 10383           JEPU ANACCHJ

              * ANAL. 2 DIGITS FROM KEYBOARD TO BE UPPER & LOWER JUSTIFY LIMITS.

1BC2 E30D 10388 BZJLMTER  JEPR BZERROR             JLMT ERROR                CU520
1BC3 C3B3 10389 SEJLMT    JEPR ANKBDIG             SET JLMT                  CU520
1BC4 930D 10390           BALG -2       M=0        BRANCH IMPOSSIBLE DIGIT ENTRY
1BC5 E3D7 10391           JEPR CVFF00
1BC6 8024 10392           CALG          G2=M
1BC7 BFAF 10393           CALR          M=FA
1BC8 9C29 10394           BALG -6       M=M+G2C
1BC9 0804 10395           JIPU +4
1BCA AE10 10396           JEPU SELOLIMJ
1BCB B2CF 10397           CALR          M=2C
1BCC D00D 10398           BALH -2       M-HO=0
1BCD E30D 10399           JEPR BZERROR
1BCE C3B3 10400           JEPR ANKBDIG
1BCF 930B 10401           BALG -4       M=0
1BD0 E3D7 10402           JEPR CVFF00
1BD1 B004 10403           CALG          G0=M
```

```
ADDR CODE NUMBR LABEL     CMND NEXTADDR OPERAND      COMMENT

BD2 E.87 10404            JEPR X10G2+GO
BD3 BCDF 10405            CALR           M=CD
BD4 9707 10406            BALG +7        M=M+GOC
BD5 804F 10407            CALR           M=04
BD6 9105 10408            BALG +5        M>GO
BD7 FA82 10409            CALH           M=H8
BD8 8COD 10410            CALR           M=M.CO
BD9 8B02 10411            CALG           M=M&GO
BDA F064 10412            CALH           H8=M
BDB A724 10413            JEPU CLM
BDC ABC2 10414            JEPU BZJLMTER

1BDD 1CB1 10416 CHKEORIB BPRT +1         EORIB=1      CHECK END OF RIBBON
1BDE 000F 10417           RETN                        IF END OF RIBBON HAS OCCURRED ON LIN
1BDF EBF9 10418           JEPR TESTOP
1BE0 C07C 10419           JEPR MO
1BE1 E54D 10420           JEPR TEPRTSTK
1BE2 970D 10421           BALG -2        (M=0)'
1BE3 80FF 10422           CALR           M=OF         KEYS. SYSTEM IS RESET BY LIFTING
1BE4 EB3D 10423           JEPR SETFLASH               TYPEWRITER COVER AND REPLACING WITH
1BE5 800F 10424           CALR           M=00         NEW RIBBON CARTRIDGE
1BE6 EB3D 10425           JEPR SETFLASH
1BE7 18FB 10426           BPRT -4        PRBY=0
1BE8 C07C 10427           JEPR MO
1BE9 1CFE 10428           BPRT -1        PRBY=1
1BEA 0702 10429           CKBD           KBST
1BEB 80CF 10430           CALR           M=OC
1BEC 9281 10431           BALG +1        M.G8=0
1BED ABFO 10432           JEPU EORLOOP
1BEE 0C3F 10433           BKBD -0        STOP=1
1BEF A27E 10434           JEPU CLKS
1BF0 C07C 10435 EORLOOP   JEPR MO
1BF1 084E 10436           BKBD -1        STROBE=0
1BF2 0602 10437           CKBD           KBST
1BF3 99F3 10438           BDAT +3        M=1F
1BF4 99E2 10439           BDAT +2        M=1E
1BF5 E30D 10440           JEPR BZERROR
1BF6 ABFO 10441           JEPU EORLOOP
1BF7 0C3F 10442           BKBD -0        STOP=1
1BF8 AC39 10443           JEPU MOTP&PP


1BF9 0831 10446 TESTOP    BKBD +1        STOP=0
1BFA A473 10447           JEPU SESTOP
1BFB 000F 10448           RETN


1BFE D5A8 10451           *ADJUST WORD*
1BFF 3C36 10451           *CHECK WORD**
1C05 C859 10451           JEPR ANHY
1C06 9301 10452           BALG +1        M=0          BRANCH IF BREAKPOINT
1C07 000F 10453           RETN

                    *  ANALYZE CHARACTER IN JUSTIFY FOR POSSIBLE BREAKPOINT
                    *  REGISTER H6 EQ. THE NUMBER OF VARIABLE SPACES.

1C08 C84B 10458 ANCHJ     JEPR ANBM/EOR
1C09 9301 10459           BALG +1        M=0          BRANCH IF BLOCK MARK OR END OF RECORD
1C0A 8060 10460           JEPU REKBIDL

1C0B E981 10462           JEPR PREOP
1C0C EAE6 10463           JEPR CLH7IF
1C0D BA72 10464           CALG           M=G7
1C0E 99A6 10465           BDAT -9        M=1A         BRANCH IF TAB
1C0F 9AD5 10466           BDAT -A        M=2D         BRANCH IF HYPHEN
1C10 9ACA 10467           BDAT +A        M=20         BRANCH IF SPACE
1C11 E51B 10468           JEPR TEMCRSCR
1C12 9709 10469           BALG +9        (M=0)'       BRANCH IF NOT CR OR SCR
1C13 E4E6 10470           JEPR LKTC
1C14 820F 10471           CALR           M=20
1C15 8074 10472           CALG           G7=M         INSERT SPACE
1C16 EA1C 10473           JEPR XFG7RWJ
1C17 E76B 10474           JEPR INC H6
1C18 B08F 10475           CALR           M=08
1C19 9263 10476           BALG +3        M.G6=0       BRANCH IF NOT POTENTIAL PARAGRAPH STOP
1C1A E792 10477           JEPR REG6
1C1B E76B 10478           JEPR INC H6
1C1C AA1C 10479           JEPU XFG7RWJ
1C1D 000F 10480           RETN


                    *ANALYZE KEYBOARD ENTRY IN THE JUSTIFY HELP MODE

1C27 9A92 10485           BDAT +2        M=A9         BRANCH IF RIGHT JUSTIFY KEY
1C28 9A62 10486           BDAT +2        M=A6         BRANCH IF CHARACTER CORRECT CODE
1C29 A30D 10487           JEPU BZERROR

1C2A A9DD 10489           JEPU REJMDHLP               A>     RESET JUSTIFY MODE

1C2B AAA1 10491           JEPU BSHLP

1C2C CCA1 10493 ANKBHLP   JEPR ENDLINPA
1C2D E230 10494           JEPR WTKBNRPT
1C2E B80F 10495           CALR           M=80
1C2F D707 10496           BALH -8        M=M+HOC
1C30 9AD5 10497           BDAT +5        M=2D         BRANCH IF HYPHEN
1C31 9A05 10498           BDAT +5        M=20         BRANCH IF SPACE
1C32 9FF4 10499           BDAT +4        M=7F         BRANCH IF PRECEDENTED SPACE
1C33 99E4 10500           BDAT +4        M=1E         BRANCH IF PARA CODE
```

```
ADDR CODE NUMBR LABEL     CMND NEXTADDR OPERAND         COMMENT

1C34 99F3 10501           BDAT +3       M=1F      BRANCH IF AUTO CODE
1C35 A30D 10502           JEPU BZERROR

1C36 AA30 10504           JEPU ANHYHLP            D<

1C37 AA0B 10506           JEPU SPHLP              E<F<

1C38 AB1B 10508           JEPU ANAUTHLP           G<H<


1C39 C58C 10511 MOTP&PP   JEPR LDPRTPA            MONITOR TAPE AND POWER PRINT
1C3A C100 10512           JEPR MOROTAPE
1C3B 80E5 10513           JEPU MORWLOOP


1C3C 9AD2 10516 EXPNDFIX  BDAT +2       M=2D      BRANCH IF HYPHEN
1C3D 9AE1 10517           BDAT +1       M=2E      BRANCH IF PERIOD
1C3E 000F 10518           RETN
1C3F B161 10519           JEPU CNV.OR-


1C40 9A01 10522 TEMUSCSP  BDAT +1       M=20
1C41 000F 10523           RETN                    RETN IF NOT SPACE
1C42 B20F 10524           CALR          M=20
1C43 9282 10525           BALG +2       M.G8=0    BRANCH IF NOT MGC.
1C44 0002 10526           RNOP
1C45 A724 10527           JEPU CLM
1C46 FA02 10528           CALH          M=H0
1C47 1A7C 10529           BPRT -3       DB7=0     CODE WAS 20.
1C48 A38F 10530           JEPU RETN1              CODE WAS A0.


1C49 C5F1 10533 MVRMSERP  JEPR SERP
1C4A EA7D 10534           JEPR FERMJ
1C4B 82F0 10535           JEPU MVCRM


1C4F BA92 10538 RCBUFFIX  CALG          M=G9      LOAD STATUS
1C50 1A22 10539           BPRT +2       DB2=0     TEST FOR JUSTIFY
1C51 B07F 10540           CALR          M=07      LOAD MASK
1C52 000F 10541           RETN
1C53 0002 10542           RNOP
1C54 8C1E 10543           JEPU RCBUF

                          ORG  1CFD
1CFD 1000 10547           CADU          LPAGE
1CFE 3A9F 10548           *ADJUST WORD*
1CFF F34A 10548           *CHECK WORD**
```

| LABEL | ADDR | REFERENCES |
|---|---|---|
| ACSNOK | 0CC2 | 0AF3 17EB 1826 |
| ACTION | 0247 | 01A7 |
| ADCSH54 | 19CA | 074A 0897 1066 1209 1A17 1A53 1A96 1AC0 |
| ADDE+G10 | 051F | 04EA |
| ADDEFG10 | 051B | 0617 08A2 0F7F 0F87 |
| ADDESP | 01FB | 035E |
| ADG10CA | 03EB | 032C 0362 036F 0618 068F |
| ADG10H10 | 165F | 0F86 1113 16E4 19CC |
| ADG2+G10 | 1666 | |
| ADG7DE | 050F | 04BA 078C |
| ADHYCS | 1A94 | 1A3F 1ADD |
| ADH54G10 | 19CB | 18FE 190C 1A69 |
| ADM+G10 | 1667 | 01FC 03EC 051E 0522 0F8E 0FDF 1039 104E 1053 115C 1163 1214 1663 1983 |
| ADMTOTC | 162A | 0FFA |
| AJ&CLRWB | 0E0D | 19A0 |
| AJCAH3 | 0FFB | 1014 1097 10C7 110C 112D 1146 12CC |
| AJCARCHC | 10AB | 10BD 10F7 110B |
| AJCR+M | 0357 | 046E 04EE 052D 0FDC 0FE2 1A15 |
| AJCR-M | 0358 | 0790 1AB2 |
| AJDEH0 | 0690 | 1A14 1AB1 |
| AJDI | 1655 | 17A9 |
| AJG01 | 110E | 11EA |
| AJH7CHCT | 1787 | 0E61 0F67 19BA 1A1A 1AA5 1AAA |
| AJKS+1 | 126D | 029B 079C 0B56 1081 1519 1865 |
| AJLINEJ | 192E | 1981 |
| AJRO- | 0E5C | 0733 07F3 0832 0924 0925 0CFA 0EEB 0EF7 0EFC 0F03 0F05 0F79 147E 189E 1B91 1B9E |
| AJRO-/H0 | 085D | 18AB 199A |
| AJROBG7 | 0F00 | 0873 097F 106C 18D5 1931 19DA |
| AJROBM | 0F01 | 085E 0EEF 0EFA 0F3F |
| AJROG0+ | 0F1A | |
| AJROG0- | 0F16 | 097D 097E 14BD |
| AJROLA | 0EEB | 0C46 0D7A 129F 12B8 |
| AJROLADA | 0EF0 | 0D5E |
| AJROLAIF | 0EE9 | 0C74 1252 137A 19A7 |
| AJROLNST | 0734 | 0703 07DA |
| AJROST | 0EB2 | 0B24 0C4A 0C70 0D7D 0EE8 0EF0 0F4E 10F6 12BB 1578 19A8 |
| AJROTOTB | 0F3E | 074F |
| AJRW&H7 | 0E68 | 1B1B |
| AJRW- | 0AFC | 0DD8 0DED 0E04 0E12 0E14 0E37 0F21 1042 104A 14DF 192D 193B 1A0A 1A2A 1A49 1A8D 1AB9 |
| AJRWBM | 0E2F | 19F9 19FC 1A91 |
| AJRWBPJ | 1A29 | 060A 0ABA 1917 1B7C |
| AJRWJ | 19FA | 0E3B 0E3C 0F6C 0F6D 1898 18AC 1951 1983 19DF 1B54 1B5F |
| AJRWLA | 0DEA | 0C7E 0DFD 1032 189B |
| AJRWLAIF | 0DEB | |
| AJRWST | 0DE7 | 069D 0B99 0C71 0D4B 0DD3 0DEA 0EBD 0F4C 1022 10B8 1105 14D9 19FA 1B71 |

```
LABEL     ADDR  REFERENCES

AURWTOBP  19F7  1932 193C 1962
AUV+1     0351  01F7
ALPWAHC   101F  109A 10A4
ANACCHJ   1916  18AE 1BC1
ANAUTHLP  1818  1C38
ANAUTUS   0F93  0224 07A8 0BA5
ANBW/EOR  0848  0B76 0CE3 0CFB 0D88 1589 1588 1C08
ANBPHLP   19AB  1969
ANBPJ     18DD  1890
ANCENCOR  113F  110A
ANCHJ     1C08  1914
ANCHJC    1918  1A59
ANCHMZC   096F  0939
ANCHPA    05EF  0712 0729
ANCHPSD   079D  05EF 0879
ANCRMC    085F  0933
ANCRTZMC  082C  09C2
ANECSTOP  0817  0771 0878
ANEOP BP  18F3  18E5 18F2
ANEORSCH  0CF0  0D18 0D26
ANFCTKB   037A  0A42
ANFMT     1373  0889
ANFMTHDR  1845  1189 1866
ANFMTHD1  1300  1842
ANFMTJ    19A0  1979
ANFMTTS   0C00  0D87
ANFMT1    1378  1388
ANGAPSCH  0CD4  0CAF 0D1E
ANG7CCPJ  095D  0887
ANG7IDL   0046  022E
ANG7MCLM  08D8  0803
ANG7MCTZ  09BB  0928
ANG7MZ    0928  0796
ANG7PAEC  0BC3  094E
ANG7PFPJ  0900  0885
ANG7US    0FB1  073C 079E 1973
ANHY      0859  076F 1C05
ANHYHLP   1A30  1C36
ANHYTZMC  076F  098A
ANKB      0206  005C
ANKBAC    070C  0762
ANKBB7    047C  0202
ANKBB71   0A3D  047E
ANKBCENT  0FBF  01A8
ANKBDIG   0383  0311 0315 18C3 18CE
ANKBFMT   16CB  1512
ANKBFMT1  131C  16CA
ANKBHLP   1C2C  1970
ANKBJ     1BA4  004E
ANKBTS    0EB9  0857
ANKB1     01A0  02E7
ANKB2DIG  0311  0230 0303 033F 0486
ANMCZONE  0800  0988
ANMDPSD   0874  0768
ANMODIDL  004C  1015
ANNPCEC   093B  0818 0835
ANNPCJ    0883  197E
ANNPCPSD  0876  07A9
ANPFTCKB  0208  0381
ANPRCHKB  0178  01A8
ANPUNCTZ  0868  09C8
ANRDER    0AE9  0AC7 0813 0823 0843 1830
ANRWBCEN  0E8D  08BF 0D44
ANRWC     0E97  0EAD
ANSCHDIR  0C0F  0C9A 1594
ANSFX/US  039F  0A35
ANTBSTOP  04F6  0ADF
BIGMO     00BE  0014 0069 02F8 0767 083A 0AC5 108D 11CB 1232
BILL      1391  01F4 062E
BILLC     1395  073D
BS        0411  019E 0906 125F 1868
BSHLP     1AA1  1C2B
BSKB      019E  02EB
BZ        1313  005F 0258 0B67 1205 120D 12F4 185A
BZERI3    0A44  01AC 01EE 0228 0246 02BE 033E 03A7 0485 06E3 09A7 09D1 0A29 0A3A 0A4E 0A59
                084B 0C3A 0C89 0CC5 0CEB 0D8D 110D 1147 1288 1297 1285 12CD 14FA 1509 15EF
                15F5 15FA 1B33 1B45 1BA3 1BAB 1BB5
BZERROR   130D  0310 0317 034F 07FB 0A44 0B64 0EBE 0EC7 105E 10E6 118A 1303 130C 1325 16D3
                184E 1A1B 1A37 1AA3 1BC2 1BCD 1BF5 1C29 1C35
BZI3      005F  000D 0BC3 0D9D 12A6
BZJLMTER  1BC2  1B14 1BDC
BZLK      1358  0A7F 0AEE 0C32
BZLKM=G9  1354  0BD3 0CD3 0D08
BZLUJ     1800  1A27
BZSK      0258  07F9
C CHAR    12C9  039D 1308
C CHARTS  0BD4  0EB6
C LINCHC  1100  1145
C PRTCH   12F5  0BE5
CACENC    1148  115E
CACENTER  1150  1076 1215
CACEN1    1157  1148 114F
CACOLCEN  114C  0757
CAECCENT  1200  1143
CAEXITJ   1989  18DB 1A42
CAG7JCS   1400  190A 1A16 1A67 1AB3
CAG7LS    0402  0336 0353 11E7 12E1 12E4
CAG7VSP   10F8  1028
CAHZCORC  11E1  1144 11EB
```

```
LABEL     ADDR  REFERENCES

CAHZCOR1 11DF   11F3
CAINDENT 0ACA   03C7 0611 063F 0683 069E 07D3
CALBIBCD 0A05   09D7
CALCRCOH 09D8   0B9B
CALINEJ  19EE   1BD7 1BDF 1958 19C7 1A30 1B23 1B29
CALPST   069D   07CB
CAMAXBPJ 1A3E   19AB
CAMAXCT  1A44   1A54
CAMC5CEN 0FAD   0749 0896 1065 1134 1208
CAMJCS   1401   0E64 0FAE 1038 1139 1213 1936 19BD 1A00 1A4D 1A95 1ABF 1AC5
CAMLS    0403   10FB
CAMVCEN  1067   0FAC
CAMVRWHZ 102F   12DE 12E3 12FD
CANEARCO 05F3   05DB
CARWHZ   11D0   102F
CARWHZLM 11DC
CARWHZM  11DE   06A0
CASPHLP  19C8   18CB
CASPJ    19C7   18D9 193E 1984 1B30
CA2G2+M  1693   17AB
CENTJ    19CE   1915
CHKEORIB 1BDD   062B 06A6
CKPRBUSY 15ED   0222 022D
CKRLRC   0AF7   08EA 09EC 09F6 0C1E 0DA6 0DAA
CL&INCPS 05A0   0595 059B
CLALLTB  0420   0203 1328 133F
CLDE     0517   02F5 03F4 0789 0ECD 0F89 0FAB 10B3 14EB 14F1 1B4E
CLDEMVO  03C9   009A 100F 1510
CLEORRV  0BF8   0CED
CLGAP    0BEF   0CF5 0D13
CLHELP   16F1   1AEE
CLHE9    16F3   07A6 0B52 0ECE 0F90 0FBE 10B6 1101 14F0
CLH4-H7  1238   0745 088F 0AB8 0CEF 0FAA 1031 1077 1200 189C 18AE 1957 1986 198F 1B34 1B75
                1B7F
CLH7&PC  1ADE   18AF 199F 1A3E
CLH7IF   1AE6   1C0C
CLKBKSRG 1236   0013 0035 0060
CLKS     127E   0489 0874 0DC4 1236 1BEF
CLM      1724   0125 0214 028D 02A2 02C5 031D 037E 0395 03BD 0408 04C2 0554 0567 069C 0842
                0845 0847 0866 08FA 09BA 0D68 0DE9 0E2C 0E74 0EB4 0F0D 0F19 0FEC 10B2 10CF
                10D8 10EC 126C 13E7 13EF 140E 1417 146F 1497 1498 14B9 1505 1526 152E 1536
                1547 156E 158A 15C6 15E8 1600 1632 1646 1651 169A 1743 1873 18C6 1911 1A5D
                1A65 1A78 1A97 1B86 1BDB 1C45
CLQUE    0BE6   0B4F 0EB7
CLREOTAC 1820   0AC0 0CA5 0CCC 0E41 17D5
CLREOTFW 181F   0C37 0D14 1062
CLREOTRW 17E3   09B4 0A64 0BCB
CLRO     0EAE   0002 0120 0284 07B2 0852 09A9 09B2 0A6E 0ABF 0AE9 0BEF 0C2E 0D08 0D2A 0D8C
                0F4A 1296 12B1 1495 14EE 157C 17DA
CLRW     0DE2   0003 06F8 0702 0717 07C0 0A5F 0DA5 0F4F 100E 1098 10C5 110A 111B 11B9 1294
                1306 14C9 14EF
CLRW+M   0DEE   0AE7
CLRW+1   0DBE   0DFA -
CLRW=RO  0F63   0F6F 19E1
CLRWCONT 0DE5   0DF9
CLRWEOD  0DFA   04DD 0E0E 0E3D 0F62 10A3 12D4 12DA
CLRWH3   14C9   0AE6 0DA4
CLRWRV   0DA0   0C3C 0CDD 0D57 0D5B
CLRWSP   0E3B   0F70
CLSTB?HC 0431
CLTB?HC  0434   0430
CLTBCR   14EB   0479 0629 073F
CLTBSTBC 042F   0202 1326
CLTC     14E8   0621 0704 072D 0FF8 1096 1104 14E2
CNSCH    0C12   0C53 0CAE 0D3D
CNSCHEOR 0E43   0E57
CNV.OR-  0161   1C3F
COEORSCH 0CF7   0C5B
COG10H10 1721   0367 08B1 1656 17A7 17AD
CONVERT  0152   06BB 06C6 06CE 06D5 06DE
CPBCD    0854   0A13 0C96
CPBM/EOR 0853   0C5C
CPFL     054C   02EE 0915
CPG7     05AE   0233 0348 053F 0854 09A8 09B0
CPM      05AF
CPNRC    05AB   096D
CPPHYPSP 0569   0787
CPPRECPF 0641   0478 0625 0636 063D
CPTP     11BC   11B8 124F
CR       0627   0639 0640
CRAC     062E   0902
CRKB     0624   02D4
CRPACR   06FA   0622 0705 071D 1926 1B64 1B70
CRPAIX   073A   070D 0724 1B5D 1B6F
CTROTBS  072D   071C 07C1
CTROTBSC 072E   0732
CTRWHF   14D9   1B37
CTRWH7   0E32   0F6E 19E0
CVBCBIG4 167F   13FC
CVBIBCG4 1677   0549
CVCENTRW 00D3   0EAC
CVFF00   13D7   0108 0267 0313 0319 0574 0784 084F 0AF0 0C4E 0E8F 0EFE 0F35 0F55 1008 1203
                153A 154C 1707 1BC5 1BD0
CVG3CP   05DC   05B2
CVG3PCC  013B   012E
CVG3PCC1 013A
CVG3TOPC 012A   016C 0573 0B5E 0E82 13E1 145F 14A4 14AF 1639 1647
CVG7CP   05DA   1116
CVG7CPCH 1114   1138 12F2
```

| LABEL | ADDR | REFERENCES |
|---|---|---|
| CVG7KBMC | 01C4 | 0052 |
| CVHXASC | 1683 | 0537 053C 05C2 05C7 |
| CVKBEXCH | 0146 | 0179 018D 0198 |
| CVKBINP | 06A9 | 018C 029C 02A0 0DCA 1246 |
| CVLMKBMC | 016F | 01CE |
| CVMBCDBI | 1680 | 09D5 0A04 186E 1876 |
| CVM●IBCD | 1678 | 0A05 187A |
| CVMCP | 0508 | 1212 |
| CVMZKBMC | 0190 | 01D2 |
| CVRWCH | 0E04 | 0DCA 0DE1 1047 11A1 11A7 |
| CVTZKBMC | 014C | 0171 01D1 |
| CVOOFF | 13D8 | 03BC 0E02 0FC3 10DA 1525 |
| DEC BNAC | 1874 | 0CB4 0D3C 1593 |
| DEC GD | 174A | 0AFD 0E00 0E06 |
| DEC GE | 1756 | 0E5D 0EE6 |
| DEC GO | 173D | 036D 0B2F 0B40 0B9E 0C7A 0D54 |
| DEC G1 | 1751 | 09E4 166E |
| DEC HF | 177A | 19A1 |
| DEC HO | 175C | 1A88 |
| DEC H1 | 1761 | 09FC 0ADC |
| DEC H2 | 1767 | 0885 088A 0D42 0DAB |
| DEC H6 | 176D | 089A 0E67 1934 1988 1AB5 |
| DEC H7 | 1771 | 1789 178A 194C |
| DEC TC | 161E | 12FC |
| DI/PITCH | 14D1 | 14CE |
| DIGO/M | 165C | |
| DIG1/M | 179B | 032E 07CE 11ED 13F8 18E2 19C9 |
| DIG10/M | 179A | 165C 167A |
| DIM/10 | 165A | 0534 0535 053A 05BF 05C0 05C5 |
| DLY MSKB | 1369 | 01AE 0811 0A19 0A97 0AB0 0AF6 0B20 0B36 0B3C 0B3F 0893 0B96 0BC8 0BD1 0CB8 0CC9 0CD1 0D4A 0D6E 1221 124D 130F 1312 1315 171A 17E5 |
| DLYMSWOM | 136E | 17F6 180A 181C 1829 |
| DUMP | 0A80 | 0A84 0AAB 150E |
| DUMP&FCH | 0A84 | 0BA6 1191 19A3 19AA |
| DUMPIFDA | 0AA5 | 0C02 1378 |
| EJRO | 181A | 0CCF |
| EJRO REW | 1815 | 0074 |
| EJRW | 17F4 | 0BCF |
| EJRW REW | 17EF | 0073 |
| END PA | 0704 | 071B |
| ENDEORRC | 0A8E | 0A1E |
| ENDFMTRC | 19AB | 0C04 137C |
| ENDJPR | 1874 | 185E |
| ENDLINPA | 06A1 | 0623 0700 0719 1923 195D 1850 1C2C |
| ENDRC | 0AA9 | 0B90 0BA0 |
| ENDRCRV | 0DA6 | 0D51 |
| ENDRD | 0B1F | 0B39 |
| ENDRERV | 0D9E | 0814 0CE8 0D00 0D12 0D78 |
| ENDSCH | 0C4D | 0C6E 0D3E |
| EORLOOP | 1BF0 | 1BED 1BF6 |
| ERASE | 09A3 | 0383 1BB6 |
| ESC&PRM | 04E0 | 01CC 0532 0538 053D 05A9 05B4 1427 1429 1428 143B 143D 144A |
| ESC&PRM/ | 05B4 | 01DA 0552 |
| EVBPJ | 1A5F | 191B |
| EVKBCENT | 1082 | 0FCC |
| EVPTB | 04D0 | 0473 |
| EVRWBJ | 1A86 | 1A92 |
| EVSTOP | 1470 | 060E 06A7 076A 0972 0C51 0C82 0D21 0D3A 1595 199C 1B7A |
| EXFMT | 118E | 16C7 |
| EXFMTHDR | 118F | 1844 |
| EXFMTTB | 1218 | 16C2 |
| EXJUST | 1973 | 1912 1929 1A04 1857 1B5B 1B6D |
| EXJUSTRT | 197E | 197C |
| EXLCFMT | 1305 | 131A 1516 |
| EXPCTS | 0B5D | 0ECA |
| EXPNDFIX | 1C3C | 016A |
| EXSC/SWS | 0C8C | 0969 |
| EXSCH | 0C0C | 0398 0C99 1BA2 |
| EXTAPE | 0000 | |
| EXTSFWD | 0D7E | 0D88 0D95 0ED5 |
| EXTSRVS | 128A | 0ED4 |
| F&TNEXT | 083A | 0783 |
| FAKEAS | 031E | 0326 |
| FE&SG2IF | 1017 | 0E98 0EAB |
| FEA2RAM | 1388 | 0305 0306 03F6 05A3 0861 0869 08D5 0E70 0E86 10FE 1168 11F6 1227 1396 13AD 13AF 1381 1383 1385 1387 1389 154E 154F |
| FEBNAC | 187C | 0858 0C14 0C5A 0CB0 153F 186D 1874 |
| FEBNRO | 1382 | 0102 0107 187E |
| FEBNRW | 1380 | 0261 0266 09CD 0A03 0A0F 187D |
| FECA+1 | 13A8 | 021B 021D |
| FECH | 0F06 | C720 0763 083B 0859 08D6 0A2C 0D83 0EEE 129C 157D 1919 1997 |
| FECHRO+ | 0F30 | 0739 074B 07C2 0891 0D93 0D97, 0E75 0EED 0EF9 0F06 0F09 0F43 0F44 0F6B 1067 1070 10F4 1124 1127 1253 1257 12AE 147F 1579 160C 160E 18A8 18ED 19D4 |
| FECHRO+& | 0F50 | 082A 086C 097A |
| FECHRO- | 0F0E | 0734 0735 0746 07D9 0828 0890 0899 0D90 0D9C 0EEC 0F40 0F69 106D 12A1 1608 |
| FECHRW+ | 0E15 | 04DC 0DD4 0E0F 0E1D 0E35 0EA0 1017 1023 103F 1040 1048 10B8 1108 1142 11E1 1201 12D9 14DD 15C2 1605 1928 1938 1964 1A07 1A08 1A47 1AAE 1A86 1AD9 1B27 |
| FECHRW- | 0F1D | 04D9 0708 0E0D 0E60 0EA7 0F65 102A 103A 11D0 1208 12CF 12D6 15C1 1604 1963 19B9 1A19 1AA4 1AAB 1AD8 1B26 1867 1868 |
| FECVKB | 029F | C2A3 02FA 1235 |
| FEDA | 07F0 | 0A8D 0C08 0F08 1387 |
| FEDATRO+ | 0EFD | 0EF1 0F77 11AC 1338 133D |
| FEDE | 04FB | 045C 0521 0529 0580 0693 0FE7 19C1 |
| FEFLCTR | 1386 | 0659 065E 0668 0918 |
| FEFLPRE | 1384 | 0656 0668 091A |
| FEFR | 13A0 | 03E8 045A 05F5 |
| FEG3HF | 145F | 0588 |
| FEG3PCWT | 1498 | 057E 13F9 1405 |
| FEG3WT | 13F0 | 0482 |

| LABEL | ADDR | REFERENCES |
|---|---|---|
| FEG7ACWT | 130D | 0710 076C 078A 12D2 |
| FEG7CSCC | 1133 | 11E9 12F5 |
| FEG7PCWT | 1499 | |
| FEHPD | 1410 | 1464 1480 |
| FEHPDVS | 1418 | 1461 14A6 |
| FEKBFMT | 1514 | 1188 1511 |
| FEKBTS | 0856 | 0875 |
| FELCCTR | 13BA | 0601 0653 0665 |
| FELCPRE | 13B8 | 0603 0651 |
| FELM | 13AC | 00A2 02EF 0638 0ACA 0AD7 0FC0 0FFB 101F 1153 115F 1198 11D6 11DC 1335 142D 14CC 1506 |
| FELOLIMJ | 1AC7 | 18E3 1A38 1A45 |
| FELXLSTD | 0140 | 0127 0681 |
| FEMACWT | 13DE | 12D7 13F6 149D 15C3 1A0E 1AA7 1AAC |
| FEMPCWT | 149A | 0510 0696 1050 13F2 |
| FEMWIDTH | 13F6 | 04E7 |
| FEMWT | 13F1 | 0FAF |
| FEPCWT1 | 14B6 | 14A8 |
| FEPITCH | 13A3 | 02F2 0461 0523 052B 05F3 104D 115B 1162 1287 13EA 14A3 19B4 1AFE |
| FERCRW | 0888 | 0C22 0C25 |
| FERM | 13AE | 00A7 1166 119A 12BD 1430 1A7D |
| FERM/TRM | 1164 | 144F |
| FERMJ | 1A7D | 1155 19F0 1C4A |
| FERO | 0ED9 | 0EE7 1007 10C3 |
| FERO+ | 0ED8 | 072E 084E 0AEF 0C4D 0CBA 0CE1 0CF1 0D34 0E51 0EE9 0EF5 0EFB 0EFD 0F14 0F31 0F39 0F3C 0F52 0F5A 11AA 1340 1346 1483 |
| FERO- | 0EE6 | 0F0E 0F11 |
| FERO1ST | 0ED6 | 1171 |
| FERW | 0DBB | 09A5 0A08 0AA5 0C05 0D06 0D7F 0E01 0F1D 1005 113F 12CA 1309 1384 150A |
| FERW+ | 0DBA | 088B 0DDB 0DEB 0DF1 0E16 0E1A 0E21 0E38 0F2D 0F45 11D5 11DB 1A29 |
| FERW- | 0E00 | 0F26 0F2A |
| FESPCS | 044D | 01FB 046D 051D |
| FESTBCA+ | 043A | 08A5 114C |
| FESTBHC+ | 043B | 07BE 11A3 143F |
| FESTDLAN | 0127 | 0022 0344 06D6 |
| FESTDSP | 13F3 | 045B 04EC 1953 1987 |
| FESTDSPC | 1AFB | 13F5 |
| FESTLM | 0674 | 0036 00A4 00B2 |
| FESTRM | 0671 | 0038 00A9 00B4 |
| FETBCA+ | 03F8 | 0475 |
| FETBHC+ | 03F9 | 0AD9 1028 119D 11F0 1438 1442 |
| FETBMASK | 04BE | 0431 0434 0441 0446 |
| FEWTC | 149F | |
| FEXFTERW | 0E1D | 1855 1860 1872 |
| FEXTBCA+ | 0427 | 1219 1614 |
| FEXTBHC | 04C4 | 042A 1454 1459 |
| FEXTBHC+ | 0428 | 0080 03F9 043B 1433 144C |
| FE2PCH | 1287 | 032D 03ED 0417 0613 068D 07CD 08AB 1078 11DF 11EC 1216 13FA 140A 19F3 1ACD |
| FIN PA | 061D | 006C |
| FLS/LCS | 0230 | 0204 |
| FMTHDR | 1187 | 118D 16C6 |
| FMTMODE | 1506 | 02EC |
| FMTMODEX | 150F | 1016 1188 |
| G4BCD | 0549 | 0857 |
| G4BIN | 13FC | 0855 0C8E 0C9B |
| HAYOK | 0700 | 07D1 |
| HAYWIRE | 07DA | 07C8 |
| HBMIN | 0EE3 | 0DC2 |
| HLP | 1958 | 1945 |
| IDL | 0062 | 005E 022F 025D |
| INC BNAC | 186D | 0D15 0D1F 158F |
| INC GD | 1748 | 0DBA 0DC0 |
| INC GE | 1754 | 0ED8 0EE1 |
| INC G0 | 173A | 0E88 0F47 0F51 0F59 0F5E 0F75 0F76 1482 |
| INC G1 | 174E | 08FE 1123 1665 172E |
| INC HF | 1778 | 177E 1781 |
| INC H0 | 175A | 05E4 11FB 122C |
| INC H1 | 175F | |
| INC H2 | 1764 | 17C9 17CC |
| INC H6 | 176B | 0894 1A18 1A43 1A5C 1C17 1C1B |
| INC H7 | 1774 | 1785 1786 1A1E 1A21 |
| INC PSPT | 05A3 | 03E0 |
| INC TC | 1623 | 04D2 |
| INC TCC | 1629 | 0731 |
| INCHC158 | 1740 | 0428 |
| INDATRW+ | 0E02 | 088C 0A10 1199 119B 1A23 |
| INITSYS | 0001 | 00FC |
| INRO+ | 0EE0 | 0B18 0C79 0F46 |
| INRW+ | 0DBF | 08B7 0A0E 0D41 0E03 0E05 0E92 0F3D 0F71 1197 119E 11A4 11AB 18A7 194E 1A1D |
| INT PRT | 14EE | 03EA 04C3 |
| INTB+RW | 1A3C | 1A2F |
| INTB-RW | 1A8E | 1A2D |
| INTBRWB | 1A89 | 1A3B 1A8C |
| IX | 0353 | 02E8 0628 0742 0904 12E9 |
| LCFMT | 1008 | 10F2 |
| LCOR | 1080 | C384 |
| LCRC | 108F | 10C1 |
| LCRVC | 10C5 | 0BFB 10CE |
| LCTAPE | 1057 | 10DF |
| LDASPSD | 0791 | 0877 |
| LDCRKS | 0926 | 0971 |
| LDG4 | 1000 | 0F92 |
| LDHYRW | 182C | 1A3A 1B2B |
| LDMRW&AJ | 0E20 | 194A 1A8A 1ADC 1B2D |
| LDPRTPA | 058C | 007D 0B1B 1C39 |
| LDTBRW | 0501 | 0068 017D |
| LDTBRWC | 0504 | 1131 |
| LKHLPERR | 196D | 18CD 195A 1B1E |
| LKJERR | 1A27 | 18D6 196E |

```
LABEL     ADDR  REFERENCES

LKM=G9    1355  060D
LKRCER    0A7C  09L9 0BA1 1880
LKR\ER    0D6D  0D5A 0DB1
LKRVLIM   0DC3  0BB3
LKSCHER   0C2F
LKTC      14E6  02C9 063E 073E 082D 085F 111E 1BBD 1C13
LOCK ERR  134D  077C 1857
MIN       126A  05A8 0BEE 1286 13D6
MO        007C  0007 00BF 03D9 03E1 06A3 0713 072A 0A68 0BF3 0CA3 0CD4 0D7E 0E48 0E97 121D
                12A0 12C5 1350 136A 17D8 1835 183F 1885 188F 1918 1B08 1BE0 1BE8 1BF0
MOBELL    124B  017B
MOBZ      00F5  0113
MOKB      11C6  08E8 09F7 0B01 0B08 108E 136B
MOKB&MED  108D  0185 03E2 1240
MOLINCTR  0601  0067 0068 0769 1998 1B7E
MOLSSW    00C0  0071
MOPCHPRT  0092  0044 1514
MORCTAPE  0100  0276 027B 0285 0A92 0B00 0B0A 17E6 1C3A
MORWLOOP  00E5  0070 008B 00BE 00DF 1361 1C3B
MORWSCH   0088  00DE 0CD5
MOTAPE    025F  0091 1362 15D3 1802 1840
MOTP&PP   1C39  1BF8
MOUT      04C9  048E 0DBD 138C
MO2WAY    00DC  1803
MV+V      0354  091D 10AE
MV-V      0337  10AF 12E2
MVCALATB  10A3  1132
MVCARDE   0525  0066 0180 0183 0416 0474 0FC9 1033 1218 12C9 1916
MVCR      0320  0373
MVCR+     035E  04EB
MVCR+1    05C9  1080 16D5
MVCR+2M   04ED  0483
MVCR-     035D  041A 1054 12F7
MVCR-INC  035A  02AD
MVCR-1    05CC  01F1 108B 1318 16D4
MVCRCEN   0FA7  0913
MVCRCENC  1077  0758
MVCRCOL   05D8  0200 0215 0FBF
MVCRCOLU  0745  088C
MVCRG10   0363  02F6 0863 0F8F 1030 107F 19B2 1986
MVCRG7CS  04E6  0486
MVCRHE9   1AF5  0BD8 0EB8 1AED
MVCRLM    02EF  0011 03F3 04DF 11AF 1305
MVCRLMH3  1146
MVCRM     02F0  03C8 03CA 03F7 047B 05C8 05CF 05D9 0627 0FFD 107E 10A6 1AF4 1C48
MVCRM+FR  02F1  1AFA
MVCRMCS   04E7  04E1 0786
MVCRSCRA  1AEF  1960
MVCR01    107D  036B 0415
MVFMTLM   01F5  1453
MVFRHLP   1AEB  196D 190E 1B2F
MVINDLM   03C7  06FD
MVLM&PF   01F4  01E1 01E9 01EA 01EB 05D7 0ED1 118F 1256 125E 1424 1435 1436 144E 1843 1867
MVLM&PF3  01E9  1588 158E
MVLM/TLM  03F1  01F6 133C
MVRFLUSH  0887  079D
MVRMSERP  1C49  1866
MVRWHZ    1030  070A
MVTAB     0476  121B 121C
MVV       038E  033C 0356
NEG G10   172A  032B 035D 0361 036E 0372 0616 0756 08A4 0F85 1075 14D3 18FD 19EF
NEWTAPE   0983  0A6C 0A7B 1061
PACEKB    1240  039C 0B54 1082 1517
PACEKBID  017B  018F 019F
PAFWD     0717  070E 0788 07DB
PAFWDC    0720  072C 0A33
PARVSC    070B  0714 0716
PITCHDIV  13FA  14D4 14D7
PR CD     053E  077B 0BAC
PR&MVG7   0780  017A 019A 01AF 125C 1A06
PR/       05B5  19B7
PR/WORB   056E  04B9 05AA
PRBING4   052F  05D2
PRCH      077E  07A7 1976
PREOP     1981  1C0B
PRFMT     1426  11C4
PRFMTAL   113C  158D
PRFMTHDR  1257  1260
PRFMTLNG  1424  0217
PRG01     04A3  0FA6
PRG7      04A0  0715 0788
PRG7PACE  01AD  0B72 1862
PRHLP     1A07  1961
PRJ       1B4E  194B 194F
PRJ&AJHF  1972  1993
PRJFWD    1854  1865
PRJTB     189D  192E
PRLJ      1923  18AD 1956 198E
PRLJSTRW  1950  1920
PRLNG     01D7  1425
PRM       04A1  0468 04E3 056F 05B6
PRM/WORB  05A9  058D 05C3 05CB 0650 11C3 1446 1448
PRMBIN    052E  01E0 142E 1431 1458
PRMBIN/   0589  145D
PRNEXTUS  0FD4  0FDD
PRSTDLJ   1951  0A5C 0AB8 19DB 19E6 1B07 1BBB
PRTFMTC   144C  145E
PRUS      0F9D  0FD2 0FD4 0FE3
PR2DIG    05D0  0234 0349 0544 0856
```

| LABEL | ADDR | REFERENCES |
|---|---|---|
| PSD | 075E | 0252 |
| RC H1 | 08EC | 099A 099F 09A2 09E3 0B8F |
| RCBUF | 0C1E | 0990 0C26 0C29 1C54 |
| RCBUFFIX | 1C4F | 0C27 |
| RCCH | 0BAD | 072B 0D94 0D96 |
| RCCHCP | 0BAA | 0500 050A |
| RCCHINTB | 0500 | 087C |
| RCCHKB | 0BA8 | 005D 017C 019B 0FC8 |
| RCFILL | 09F0 | 0998 |
| RCPREAM | 08D9 | 0B98 |
| RCRVON | 08E7 | 0D4F |
| RCRWB | 0BBE | 0A0A 0A1A 0A82 |
| RCRWB1 | 0B97 | 08C2 |
| RCSTART | 0800 | 0B97 |
| RDALCH | 157D | 1587 1597 |
| RDALEX | 1595 | 158A |
| RDALSCH | 158F | 1575 |
| RDAUTLOG | 1576 | 0C1B |
| RDCARLRC | 116A | 0B17 0DB5 |
| RDEORRVS | 17D1 | 0CF0 0E50 |
| RDFWD | 080E | 082E |
| RDFWDM | 0B2B | 105D |
| RDFWDM1 | 0B2C | 0B42 |
| RDFWDSCH | 0D30 | 0BF5 |
| RDFWDSPC | 0B2D | 0D33 |
| RDFWD3 | 0B2A | 07FA 0C38 0C3B 0CB9 0CDE 10E5 17DD |
| RDLC | 10DC | 0BFA 10CD 111D |
| RDLCRC | 111B | 1091 10AA |
| RDREVM | 0B3A | |
| RDRV | 0CDD | 0C41 1284 |
| RDSTART | 0ABE | 0B2C |
| RDSTRV | 0AC0 | 0D4D |
| REBZ | 00E0 | 006A |
| RECBMK | 09CD | 0BA7 |
| RECEN | 1422 | 10B4 |
| RECENIF | 141E | 0BA9 |
| RECEOR | 0A00 | 0A5E 0ABC |
| RECHRWB | 0E06 | 1967 1980 1ABA |
| RECOL | 062C | 01F5 0741 10BE 12ED |
| REGA | 17B7 | 004A 01FA 0289 03B0 0518 06FC 071F 0B4D 1619 1925 195F 1B3B 1B52 |
| REGB | 17BC | 00CA 0348 0956 0958 095C |
| REGF | 17BF | 003E 051A 0528 0C09 0DA1 10C2 118B 1383 14F7 16F2 |
| REG5 | 178D | 0227 062D 0A12 0A2B 14F9 17F3 1819 18BA 18BE 1AEC 1B19 |
| REG6 | 1792 | 0043 0098 00DB 0503 0823 0826 1423 14E7 14ED 1558 15FC 1996 1A9A 1AE0 1AE4 1C1A |
| REG8 | 1797 | 0046 0286 02C8 03AE 0CA1 0D9F 14F3 1B36 |
| REG9 | 17B2 | 003C 0048 05FD 0AA0 0C60 0D29 1472 14F5 1B0A 1BBA |
| REHSDLY | 1370 | |
| REHB | 17C4 | 00F9 132E |
| REJ | 1BB9 | 19E4 19E7 1B09 |
| REJMOHLP | 19DD | 1C2A |
| REKBIDL | 0060 | 0183 01F2 0218 0228 023D 0245 025E 0280 034E 039B 048A 0706 0815 0A34 0A36 0A3C 0A45 0A7A 0AA4 0B53 0BCE 0BFC 0C1D 0C42 0C57 0C82 0C88 0CCE 0CEC 0CFC 0D79 0D82 1192 1194 12A8 1308 136B 158C 1591 1922 199E 1B4A 1B4C 1B7D 1BBE 1C0A |
| REPCIFCS | 1AE1 | 190B 1A6B |
| REPPSTOP | 0822 | 08CD |
| REPRINT | 000E | 000B 00A1 00B7 |
| RERF | 1618 | 0470 0FA9 10B5 1487 |
| RERO*RW | 0F6D | 0AB9 1B06 1B76 |
| RERV | 0D01 | 0C81 1292 |
| RESC | 0A2A | 0808 |
| RESET RC | 05FC | 0A79 0BCD 0C2C 0D77 17D3 18BB |
| RESTORE | 0009 | 15AF |
| RESTPIDL | 0061 | 0176 01BE 039E 0DD2 1085 10BA |
| RETC | 14E0 | 02D1 04DE 0637 0772 0839 0935 112B 1B3C 1B87 |
| RETNAEID | 0A43 | 01AA |
| RETN1 | 138F | 03B2 0799 07AD 0828 083E 086A 0912 09CB 0B8D 0C61 1573 1C48 |
| RETN2 | 138E | 02FE 07BA 096E 0982 09CC 0A31 0B7E 18FB |
| RETN3 | 138D | 08DC 18F6 1B9A |
| RETN4 | 138C | 0809 1B9F |
| REWINDAC | 18C2 | 0E4D |
| REWINDRO | 18C8 | 0105 0CCD |
| REWINDRW | 18C3 | 0264 0BCC |
| RIX | 0336 | 02E9 0908 12E8 |
| RML1 | 1691 | 1676 |
| RML2 | 1690 | 04CF |
| RML3 | 168F | |
| RML4 | 168E | 0334 04CD 0689 06B3 13A2 1416 1685 1704 1AF7 |
| RML5 | 168D | 09DD |
| RML6 | 168C | 041C 04C8 0583 09DA |
| RML7 | 168B | 0F8D 0FF3 0FF7 1157 1462 169D 16A4 16A8 198F |
| ROSNOK | 0CC6 | 007A |
| RST8&MG | 1224 | 113E |
| RVRC | 0D43 | 0C6B 0D10 |
| RVRC1 | 0D48 | 0D56 |
| RVTPAC | 17E9 | 0CB7 17D4 |
| RVTPRW | 1B2A | 0A95 0B95 |
| RWFRR | 00F1 | 00BA |
| RWSNOK | 0BC5 | 0077 0A16 0AA2 0AAB 0B09 0CC3 17E8 1B2C |
| SC | 0A1F | 080D |
| SCHEOR | 0E3E | 0A72 0C1C |
| SCHER | 0C2B | 0BF7 0CAB 0CFD 0E46 0E53 |
| SCHFWD | 0D1C | 0C16 |
| SCHREV | 0CA4 | 0C17 0CFE |
| SE&TEGO1 | 19E8 | 12F6 18FC 19CA 1AE2 1AE5 |
| SEACMED | 00D0 | 0072 |
| SEACTION | 02B5 | 0247 07EF |
| SEA2RAM | 13D4 | 11FA 122B 13BF 13C2 13C5 13C8 13CB 13CE 13D1 |

| LABEL | ADDR | REFERENCES |
|---|---|---|
| SEBNAC | 186A | 0851 0AF1 0C4F 187B |
| SEBNAC=0 | 1869 | 0CAC 0E4E |
| SEBNRO | 13C6 | 0005 0106 011E 186C |
| SEBNRW | 13C3 | 0006 0265 0282 0A07 1868 |
| SECOL | 0759 | 0907 |
| SECOLKB | 01EC | 02ED |
| SECPEOR | 0859 | |
| SEDE | 0511 | 0FF4 19C0 |
| SEDE&AJ | 0FE5 | 0F8A 1052 |
| SEDUMPRV | 1487 | 087F 08AB 104C 1175 12CE 1379 1386 150F |
| SEECSTOP | 0824 | 0801 0951 |
| SEFLCTR | 13CC | 0239 066D |
| SEFLPRE | 13C9 | 023C |
| SEFMT | 1335 | 0C03 0C0A 124E 12BA |
| SEGA | 17B5 | 03AC 046F 05F2 06EB 0744 1577 1617 |
| SEGB | 17BA | 0023 00CF 034D 0954 095A |
| SEGF | 17C1 | 0516 1474 148D |
| SEGP | 001A | 0001 |
| SEG01PR | 0572 | 04A2 0F9F |
| SEG21FTX | 1018 | |
| SEG5 | 17BB | 01F3 075D 0981 18C5 195C 1B16 |
| SEG6 | 1790 | 0097 049F 081F 08CA 0948 0FA8 0FCB 14E4 1553 15F7 1AEA |
| SEG8 | 1795 | 02B2 02B4 02C2 02C4 03A9 06ED 0C3E 0CA2 0D76 0DD1 1BAB |
| SEG9 | 17B0 | 0813 0A01 0A53 0A61 0A7D 0C11 0C95 0D2E 0D71 0ECC 1B04 1B39 |
| SEH2RV | 0D7A | 0C39 0CEE 10C6 12AB |
| SEH3&FMT | 1195 | 1180 |
| SEH3=CA | 14CA | 0AE8 1195 |
| SEHB | 17C6 | 021A 0255 1334 |
| SEJ | 1B31 | 0385 1B4B |
| SEJ&JLMT | 1B43 | 0206 |
| SEJLMT | 1BC3 | 1B17 1B1A 1B46 |
| SEJLMTJ | 1B46 | 1B88 |
| SEKSJ | 1B98 | 1BAD 1BC0 |
| SELCCTR | 13D2 | 023F 060C 0667 091F |
| SELCPRE | 13CF | 0244 |
| SELM | 13BD | 0037 00B3 021E 1339 |
| SELMCA | 021D | 1329 |
| SELNG | 033D | 0207 0350 |
| SELOLIMJ | 1B10 | 1BCA |
| SELSEQSW | 00C9 | 0A4C |
| SEM=FF | 1728 | 0126 0295 0298 02CA 030E 03B1 0426 044C 0D6C 0EBA 1056 1099 10A7 10C8 10FC 112E 140F 1468 1496 14BE 1537 15BC 15C5 15EC 1631 1645 1652 1A6A 1A7C 1B85 |
| SEMC | 02C6 | 030F 0386 07EB 07EE |
| SEMR | 0303 | 0205 |
| SEPA | 06E0 | 0A32 1BBF |
| SEPACEKB | 0184 | 0181 01B5 01B9 |
| SEPC | 01E2 | 039A 07DE 0EB5 1304 1319 |
| SEPCSTOP | 0947 | 0952 |
| SEPFMT | 124E | 113D 1388 19A4 |
| SEPSD | 0286 | 037D |
| SERC | 0A55 | 0387 1BB7 |
| SERCTAPE | 14BF | 10EA 10ED |
| SEREC | 080F | 09AC 09B8 0A78 |
| SERF | 1616 | |
| SERM | 13C0 | 0039 0085 021C 133E |
| SERMCA | 021B | 132A |
| SERORWRV | 0C69 | 0D0C |
| SERP | 05F1 | 0707 1C49 |
| SERV | 0C7F | 0388 |
| SERVON | 0C3C | 0C8A 1293 |
| SERWRC | 0AE2 | 0AB3 0AA9 |
| SERWRV | 0C44 | 0C43 12A5 1307 |
| SESKDLY | 0259 | 07FC |
| SESTB¢CA | 0440 | 0216 1327 |
| SESTB¢HC | 0441 | 134A |
| SESTOP | 1473 | 0223 0610 0827 0885 096A 0A30 0F0C 1353 1546 197F 19E5 1AD2 1BFA |
| SESTOPIF | 1AD0 | 1BFA |
| SETB¢CA | 0444 | 0201 1318 |
| SETB¢HC | 0446 | 1344 |
| SETC=G1 | 0FF8 | 1130 |
| SETFLASH | 1B3D | 1BE4 1BE6 |
| SETPADDR | 041B | 0436 0448 04C4 |
| SHG2R | 169B | 1653 16E6 |
| SHH10L | 16AA | 1655 16E5 |
| SHH10R | 16A0 | 0751 1073 120D 1658 17AC |
| SKPACBLK | 1831 | 0838 0B3E 0C33 0C66 0CC0 0D0E 10CC 1719 17DC 17DF 17E0 |
| SKPACSTP | 1719 | 09AB 0C35 1057 1063 10E9 1298 17E2 |
| SKPEORRV | 17DE | 0829 |
| SKPRWBLK | 1881 | 0A9B 0A9C 0A9E 0B92 0D49 |
| SKSPTBAJ | 147A | 0766 086E 1068 157F 191A 19D5 |
| SKSPTBIF | 148A | 147D 188F |
| SKSPTBRO | 1481 | 0831 0921 148A 189D |
| SML1 | 16C0 | 0459 0FB0 1288 1406 |
| SML2 | 16BF | 007F |
| SML3 | 16BE | |
| SML4 | 16BD | 0332 167C 16F8 |
| SML5 | 16BC | |
| SML6 | 16BB | |
| SML7 | 16BA | |
| SP | 04A8 | 018E 0782 |
| SPC | 0469 | 04BB |
| SPHLP | 1A0B | 1C37 |
| SPKB | 018D | 0205 |
| SPSTD | 04EC | 01DD 142C 142F 1444 1456 145B |
| ST&PTFMT | 11AF | 118E 16C5 |
| STMH9 | 16EC | 16FC |
| STOPACRD | 0AF2 | 0AEA 0B28 0C2D 0CAD 0D11 0D6F 171B |
| STPREWRC | 188C | 010E |
| STPREWRW | 1888 | 026E |

| LABEL | ADDR | REFERENCES |
|---|---|---|
| SUCSIFHY | 1AC1 | 18E9 18F3 |
| SUDEG10 | 0523 | 0615 08A3 |
| SUG10H54 | 18FC | 0E65 1937 19C6 1AB4 1AC6 |
| SUHYCS | 1AC4 | 1968 1B22 |
| SUH10G10 | 166F | 17AA 19F6 |
| SUMG10 | 166A | 0524 0F88 0FCF 0FD7 1051 1673 1985 |
| SVTB&MG | 11F4 | 0C1A 113C |
| SW | 148F | 0399 0779 07AF 0C92 |
| SWPLAY | 0775 | 07B1 0968 0C9C |
| TAB | 0474 | |
| TAKESLAK | 0014 | 000C |
| TB | 0470 | 02D3 0903 |
| TBCRASH | 04EF | 0476 10A5 11F1 |
| TE.75GAP | 180E | 0D2C |
| TEACMED | 15F0 | 0251 06F9 0C0F 1BAC |
| TEACMODE | 155E | 02AE 0469 05DC 11C7 1393 156F 1625 |
| TEBMTS | 1298 | 1289 |
| TECOL | 1604 | 088A |
| TECR=M | 0612 | 02A8 0412 12C2 1336 14CD 1507 |
| TECS | 18D7 | 1A44 |
| TEDACLAC | 188F | 1184 17F9 |
| TEDACLRW | 187F | 08E7 1808 |
| TEDATAC | 1890 | 0B1C 116A 117F |
| TEDATRW | 1880 | 09EA 09ED 0D67 |
| TEDBRV | 0C62 | 0CDC |
| TEDUMP | 15B0 | 0BA2 0BB4 |
| TEDUMPRV | 0CDC | 07F6 0BB6 0C07 1193 |
| TEDUP | 156F | 053E |
| TEEODAC | 17F9 | 080E 1838 183E |
| TEEODRW | 1808 | 1888 18BE |
| TEEOPCRJ | 1889 | 18F9 |
| TEFITRV | 0D5C | 0B49 0BC1 0D09 |
| TEFMT/BM | 0840 | 0E93 |
| TEG3=EX | 0121 | 012A 14A1 |
| TEG3SPIX | 1548 | 1634 |
| TEG7BKJ | 18CF | 18F1 |
| TEG7CR | 151F | 08C3 0930 0948 0A1F 11D3 12DF 14CA 18F7 |
| TEG7CRSC | 151A | 08C5 |
| TEG7DPJ | 0BA2 | 192A 1994 1B74 |
| TEG7EXCV | 0165 | 014A |
| TEG7EXEC | 1564 | 148F 190E |
| TEG7FMT | 14FB | 0B7F 1977 |
| TEG7HAY | 15E3 | 07C6 1B62 |
| TEG7KBSP | 1527 | |
| TEG7PC | 1531 | 0819 |
| TEG7PCSP | 152F | 079F 18F4 1974 |
| TEG7PUNC | 0983 | 0868 1550 |
| TEG7PUNJ | 1550 | 191D |
| TEG7SP | 1529 | 0780 081C |
| TEG7SPTB | 1500 | 092E |
| TEG7TB | 1538 | |
| TEG7TXTJ | 1900 | 191E 19D2 |
| TEG72CH | 1467 | 0542 1001 11D8 12D8 1A1F |
| TEHAY | 07BC | 0725 |
| TEHORPCH | 0556 | 02A4 |
| TEJON | 1B80 | 1B31 1B43 |
| TEKB | 029D | 01D5 07DC 11CD 12C6 1B0C |
| TEKB&KS | 0299 | 01D6 |
| TEKB&KSJ | 01D3 | 021F |
| TEKBIDL | 021F | 007B 01BF |
| TEKBRP | 02A1 | 0188 029E 1247 |
| TEKS | 10FD | 0186 0299 0797 1244 |
| TEKSPSD | 0797 | 087D |
| TELAMP | 15D0 | 0A3B |
| TELAMPCO | 15D3 | 15CB 15CF |
| TELAMP1 | 15C7 | 15E2 |
| TELM | 0611 | 01CC 04D6 0632 0800 12FA 1391 1602 1627 1B96 |
| TEMC | 15A2 | 159A |
| TEMC&J | 159F | 0471 0499 0759 0AD3 14E0 |
| TEMCENBP | 10D2 | 074D 0EA5 106A 1205 141F 19D8 |
| TEMCOLDA | 1633 | 0892 |
| TEMCR | 1520 | 0406 0722 0737 07C4 086F 08D9 0900 0922 0E1F 0EAA 1998 1B93 |
| TEMCRCE | 10D0 | 0833 0865 14BB |
| TEMCRSCR | 151B | 085A 09C0 1C11 |
| TEMFMT | 14FC | 0D04 10EF |
| TEMHSGAP | 1801 | 0D19 17D0 1812 |
| TEMMSGAP | 17CE | 0CD9 0D24 0E4B 180F |
| TEMMZBP | 08F0 | 096F 097B 0A2E |
| TEMODE | 024E | 0051 022C |
| TEMPC | 1532 | 0691 101A 13DF 1AD5 1B20 |
| TEMPCSP | 1533 | 01BC 0D9A 0EB0 1585 15E7 1637 |
| TEMSP | 152A | 0E7A 1548 |
| TEMSPPSP | 152B | 1528 |
| TEMSPTB | 1501 | 1140 147A 14B4 |
| TEMTB | 1539 | 072F 11E4 18A9 |
| TEMTBCOL | 153B | 0F41 1606 160A |
| TEMUSCSP | 1C40 | 1502 |
| TEM2CH | 1468 | 0888 0C23 0E18 0EF3 0F01 0F0F 0F12 0F28 0F2B 0F37 0F57 0F72 |
| TEPACEKB | 01B9 | 017F 0182 |
| TEPNMC | 159B | 1B83 |
| TEPRT | 15AB | 007C |
| TEPRTOK | 04BF | 03D8 04BC |
| TEPRTSTK | 154D | 058E 06A4 1BE1 |
| TERF | 1600 | 088D |
| TERM | 12BD | 01CF 0804 132B |
| TEROBLA | 0EEC | 1609 |
| TEROB1 | 0EEE | 0718 07BC 082E 0862 1B8C |
| TEROB2 | 0EF8 | 0A8B 0B25 0C3F 10E0 1298 |
| TEROB3 | 0EFB | 0D03 0F15 |

| LABEL | ADDR | REFERENCES |
|---|---|---|
| TEROMAY | 07C2 | 07CA |
| TERV | 15AB | 0270 02CB 096B 0C00 0C7F 100B 105F 137F 1B80 |
| TERVRC | 15A5 | 0775 0916 0A80 0C8C 1080 1564 16C3 |
| TERWB | 0E0F | 0AE4 0E8E 1B99 1947 19E2 1A10 1AD4 1B1F 1B78 |
| TERWFULL | 0E2A | 158D 1A24 |
| TERWHYJ | 1AD4 | 193D |
| TESCH&AC | 155B | 0116 0279 0A89 0B6F |
| TESPHLPJ | 1BCB | 1A32 1B24 1B2A |
| TESTOMG | 00A2 | 009D |
| TESTOP | 1BF9 | 1BDF |
| TESW&SK | 07AA | 0966 |
| TETBINS | 0499 | 062A 0740 |
| TETBINSJ | 1A9B | 1A2C 1A2E |
| TETEMCEN | 161A | 0540 |
| TETSAC | 17EA | 0C07 0E47 |
| TETSCOMP | 0E6B | 0D91 12A3 |
| TETSCONT | 0E6E | 0E8C |
| TETSEX | 0E88 | 0E77 |
| TETW | 153F | 024C 087D |
| TEUSHE9 | 0F7A | 0FB3 0FB9 |
| TEXLX | 159C | 07F0 0EF8 1373 |
| TEXT SCH | 0844 | 0382 |
| TE7SCGAP | 1800 | 0CA8 0E44 |
| TSRVS | 12A0 | 1295 12B9 12BC |
| TSTAPE | 0C33 | 12AA |
| UBS | 02A5 | 02EA 0905 |
| UPBELL | 132B | 0075 124B |
| UPDARLRC | 0AF9 | 0B19 0DB6 116E 1182 |
| UPDEM | 0510 | 04F5 069A 0FE6 |
| UPFLAGS | 003A | 006D |
| UPGZ=LS | 102B | 10BA 10F3 1107 |
| UPHFCHCT | 177E | 140C 1928 1972 |
| UPH2CHCT | 17C9 | 0F68 12D0 |
| UPH7CHCT | 1783 | 0E34 1A0C 1A4A 1ABC |
| UPLCFWD | 0663 | 0355 |
| UPLCRVS | 0651 | 0338 |
| UPRVLT | 0C9E | 0DC5 |
| UPRVLTBZ | 0C9D | 0D72 |
| US | 0FCD | 0F91 1055 |
| USKB | 1033 | 005B 01A9 03AA 0F95 |
| USPART | 0F89 | 0253 135F 1921 19DC 1B08 1BBC |
| USPSDJ | 0F7E | 0F8D |
| WAITHS | 12C5 | 0987 |
| WAITWS | 136A | |
| WAITWOM | 136F | |
| WEOT | 0A51 | 0AAD 0B07 0D59 |
| WEOT1 | 0A96 | 0A54 |
| WLRC&CNT | 08FC | 09FB |
| WRDATA | 098C | 0B9A 0D50 |
| WRRAM | 044B | 0439 |
| WTKB | 02F7 | 0383 |
| WTKBCH | 11CB | 1010 |
| WTKBFMT | 1511 | |
| WTKBNRPT | 1230 | 1C2D |
| XF&COEOR | 0CF6 | 0D3F |
| XF/RORW | 0F77 | 0A71 0C6C 111C |
| XFCAG10 | 067D | 08AC 0F7E 0F86 19EE |
| XFCAHC | 045A | 03F8 0427 042F 043A 0440 0444 |
| XFCAHE9 | 16E9 | 0B4E 1AEF |
| XFCHRORW | 0F3C | 0F5D 0F74 11A8 11A9 |
| XFFMT | 11A8 | 19A9 |
| XFGC=M | 162E | 0335 14EA |
| XFGE=M | 1758 | 0F1C |
| XFG0=M | 1668 | 1730 1734 173F |
| XFG01G4H | 1735 | 0F87 0FD3 0FDA 1048 |
| XFG01HE9 | 16FB | 0FB8 |
| XFG01H01 | 1710 | 0F83 |
| XFG01H45 | 171C | 07CC 08AA 08AE 1946 19CD |
| XFG01PIF | 03E2 | 0322 03D2 |
| XFG01PR | 03CB | 031F 03C3 04A4 |
| XFG1=M | 17A5 | 0571 058A 1705 170F 1753 |
| XFG2=M | 169E | 114B 115D |
| XFG4=M | 1738 | 085C 13FD |
| XFG47G01 | 1731 | 0FCD 0FD5 |
| XFG7=M | 170A | 0150 019D |
| XFG7RWJ | 1A1C | 1909 1950 1982 1992 1A66 1C16 1C1C |
| XFG7STK | 0773 | 0932 |
| XFG74RW | 08B5 | 07C9 08AD 185C |
| XFHC=M | 1746 | 0468 |
| XFHE9G01 | 1700 | 0F84 0F88 |
| XFH0=M | 0AE0 | 015F 1682 175E |
| XFH0G7 | 1709 | 1A0D 1AA6 |
| XFH0STK | 1262 | |
| XFH01G01 | 170C | 036C 0709 0752 089E 08AF 1074 120E |
| XFH1=M | 1713 | 16A9 1718 1763 |
| XFH1WLRC | 08FB | 08BE |
| XFH10G47 | 1706 | 070F 0721 0764 07C3 08D7 0A2D 0D84 0D99 0E1E 1071 11D1 11E6 12D1 147C 1480 157E 1782 1991 1A08 1B6A |
| XFH45H01 | 1715 | 0708 0750 089D 0BAD 0880 1072 120C 19CB 19F5 |
| XFH9=M | 16F6 | 16F0 |
| XFKBKS | 11C9 | 0DC9 |
| XFM=G0 | 1689 | 0698 |
| XFM=G1 | 165D | 1408 |
| XFM=G7 | 1559 | 0858 1554 190D 1913 |
| XFM=HB | 0E5E | 0AFE |
| XFM=HC | 03FC | 041F 1A88 |
| XFM=H0 | 0AD1 | 06DF 0ADE 0E1C 0F2F 0F38 0F5C 101E 127D 1486 1AA0 |

```
LABEL     ADDR  REFERENCES

XFMKS     1261  0774 0868 0872 0920 0927 09B9 11CA
XFPSPIF   04BC  0593 0599 059E
XFPSWAIT  03D4  03DA
XFROBNAC  0AEF  07B6 0CF6 0E58
XFRORWGO  0F5F  0C4C
XFRWROCL  0F4A  0A74 100D 10E7 112C 112F
XFRWROGO  0F45  0C73 0F4D
XL        067A  057C 05E2 05EE
XLH       1412  1415
XMG2      16D6  0614 0662 0670 11E0
XMG2+G0   16D7  02F4 068E 1688
XMG2+G10  16D8  03F0 08A9 1079 1217 19F4
XOU1      0144  013F
X10G2+G0  1687  031B 1BD2
```

CARD APPENDIX B

```
ADDR CODE NUMBR LABEL    CMND NEXTADDR OPERAND           COMMENT

                  **************************************************************************
                  *                                                                        *
                  * RANK XEROX EXODUS PROPORTIONAL SPACED MAG CARD SYSTEM                  *
                  *                                                                        *
                  **************************************************************************

                  *******************GENERAL PURPOSE REGISTER ASSIGNMENT********************

                  **************************************************************************
                  *                                    ****BIT****
                  ********7*******6*******5*******4*******3*******2*******1*******0****
                  *G0 *-------*-------*----GENERAL USE*-------*-------*-------*-------*
                  *G1 *-------*-------*----GENERAL USE*-------*-------*-------*-------*
                  *G2 *-------*-------*----GENERAL USE*-------*-------*-------*-------*
                  *G3 *-------*-------*----GENERAL USE*-------*-------*-------*-------*
                  *G4 *-------*-------*----SECOND CHARACTER AND MISC.* *-------*-------*
                  *G5 *LOWER  *DEFD   *INIT RW*INIT RO*INHIB  *INHIB  *MGC SC *COLUMN *
                  *   *LIMIT  *TRK PRT*EJECT  *EJECT  *RW RUN *RO RUN *J HELP *CENTER *
                  *   *       *       *       *       *       *       *       *       *
                  *G6 *PROP.  *CENT.  *INSERT *SWITCH *POTPARA*FIRST  *STOP   *TAB CTR*
                  *   *SPACE  *       *TAB    *READER *STOP   *PRTCHAR*CONDMET*OPEN   *
                  *   *       *       *       *       *       *       *       *       *
                  *G7 *-------------------CHARACTER BEING PROCESSED-------------------*
                  *   *       *       *       *       *       *       *       *       *
                  *G8 *XPAND  *PRTC   *MGC    *REV    *AUTO   *PARA   *LINE   *WORD   *
                  *   *       *       *       *       *       *       *       *       *
                  *G9 *TRACK  *REV HD *RECORD *RECORD *PLAY   *JUST   *SKIP   *DUP    *
                  *   *72 BUZZ*STEP   *       *FLASH  *       *       *       *       *
                  *   *       *       *       *       *       *       *       *       *
                  *GA *COMM   *DEFD   *DEFD   *LEFT   *PRINT  *LINE   *RTFLUSH*AUTO   *
                  *   *       *SPACE  *CR     *PRINT  *AUTO   *UNDSCR *COL    *LOG    *
                  *   *       *       *       *       *       *       *       *       *
                  *GB *SYSTEM *SYSTEM *SWITCH *SWITCH *LANGUAGE OPTION-----------------*
                  *   *LS2    *LS1    *LS2    *LS1    *                               *
                  *   *       *       *       *       *       *       *       *       *
                  *GC *---FRACTIONAL COLUMN---------------*------TAB COUNTER-----------*
                  *   *       *       *       *       *       *       *       *       *
                  *GD *----------------------RW BUFFER ADDRESS-------------------------*
                  *   *       *       *       *       *       *       *       *       *
                  *GE *----------------------RO BUFFER ADDRESS-------------------------*
                  *   *       *       *       *       *       *       *       *       *
                  *GF *TWELVE *DEFD   *DUMP   *STOP   *------RIGHT MARGIN RANGE-------*
                  *   *PITCH  *ESC    *       *       *                               *
                  ********7*******6*******5*******4*******3*******2*******1*******0****
                  *H0 *---------GENERAL USE--------------------------------------------*
                  *   *       *       *       *       *       *       *       *       *
                  *H1 *---------GENERAL USE--------------------------------------------*
                  *   *       *       *       *       *       *       *       *       *
                  *H2 *---------# OF CHARACTERS REMAINING IN BLOCK---------------------*
                  *   *       *       *       *       *       *       *       *       *
                  *H3 *---------CARRIAGE POSITION ON EMPTY RW BUFFER-------------------*
                  *   *       *       *       *       *       *       *       *       *
                  *H4 *---------JUSTIFY: CONSUMED SP AND NUM. OF LARGER SPACES (LOW)---*
                  *   *       *       *       *       *       *       *       *       *
                  *H5 *---------JUSTIFY: CONSUMED SP AND WT OF J SPACE  (HIGH ORDER)---*
                  *   *       *       *       *       *       *       *       *       *
                  *H6 *---------JUSTIFY: ACCUMULATED # OF VARIABLE SPACES--------------*
                  *   *       *       *       *       *       *       *       *       *
                  *H7 *---------JUSTIFY: DISTANCE (IN RWB) TO LAST BREAKPOINT----------*
                  *   *       *       *       *       *       *       *       *       *
                  *H8 *BELL AT RHT MGN*JUSTIFY: SPACE UPPER LIMIT----------------------*
                  *   *INIT.  *IN PROG*                                                *
                  *   *       *       *       *       *       *       *       *       *
                  *H9 *BEGIN UNDSC FRACTIONAL COLUMN--*-------DEFERRED ESCAPEMENT------*
                  *   *       *       *       *       *       *       *       *       *
                  *HA *---------PRINTER CARRIER POSITION-------------------------------*
                  *   *       *       *       *       *       *       *       *       *
                  *HB *---------GENERAL USE--------------------------------------------*
                  *   *       *       *       *       *       *       *       *       *
                  *HC *USED IN TAB ROUTINES--DO NOT USE IN PRT ROUTINES BECAUSE OF FMT*
                  *   *       *       *       *       *       *       *       *       *
                  *HD *---------GENERAL USE--------------------------------------------*
                  *   *       *       *       *       *       *       *       *       *
                  *HE *BEGIN UNDERSCORE POSITION AND RETN CARRIAGE POSITION FOR J.HELP*
                  *   *       *       *       *       *       *       *       *       *
                  *HF *---------JUSTIFY: # OF RWB CHAR. ALREADY PROCESSED--------------*
```

```
ADDR CODE NUMBR LABEL     CMND NEXTADDR OPERAND             COMMENT

0000 0000 00080 EXODUS    NOOP                     PROGRAM START LOCATION

                 * PROGRAM START : SETS RW AND RO BUFFER TO ZERO,SETS GP REGISTERS TO INITI
                 * VALUES AND EJECTS RO AND RW MEDIA .RESTORE PRINTER

0001 C049 00086 INITSYS   JEPR SEGP
0002 CC51 00087           JEPR CLRW
0003 CCF4 00088           JEPR CLRO
0004 E4B0 00089           JEPR EJRO
0005 E4B5 00090           JEPR EJRW
0006 C0AD 00091           JEPR MO
0007 0732 00092           CKBD          BUZZ=3
0008 1CFD 00093 RESTORE   BPRT -2       PRBY=1     PRT FAIL RESTORE          CC020
0009 0702 00094           CKBD          BUZZ=0
000A C00C 00095           JEPR REPRINT
000B 807C 00096           JEPU BZI3

                 * RESTORE PRINTER . INITIALIZE HA TO 0,MOVE CARRIAGE TO LEFT MARGIN

000C 1208 00101 REPRINT   CPRT          RSET       RESTORE PRINTER           CC020
000D F1A4 00102           CALH          HA=0       CLEAR CARR
000E 1308 00103           CPRT          RBUP
000F C899 00104           JEPR MVCRLM
0010 1309 00105           CPRT          RBDN
0011 A109 00106           JEPU CLKBKSRG

                 * UPDATE BITS IN GENERAL PURPOSE REGISTERS USED AS FLAGS IN PROGRAM

0012 0CB2 00111 UPFLAGS   BKBD +2       NS=1       FLAG UPDATE               CC060
0013 802F 00112           CALR          M=02
0014 E916 00113           JEPR REG9                RESET SKIP FLAG
0015 810F 00114           CALR          M=10
0016 E924 00115           JEPR REGF                RESET DEFERRED ESCAPEMENT FLAG
0017 840F 00116           CALR          M=40
0018 E908 00117           JEPR REG5                RESET DEFERRED TRACK PRINT
0019 819F 00118           CALR          M=19
001A E91B 00119           JEPR REGA                RESET LEFT PRINT,PRINT AUTO,AUTO LOG
001B 802F 00120           CALR          M=02
001C 9251 00121           BALG +1       M.G5=0     BRANCH IF MGC SC OR J HELP FLAG
001D 000F 00122           RETN

001E B0EF 00124           CALR          M=0E
001F E90D 00125           JEPR REG6                RESET POTENTIAL PARAGRAPH STOP,FIRST
0020 B0FF 00126           CALR          M=0F       PRINT CHARACTER FLAG. AND STOP COND.
0021 E912 00127           JEPR REG8                MET FLAGS    RESET AUTO,PARA,LINE,WORD
0022 8023 00128           JEPU MOPCHPRT            FLAGS

                 * MONITOR THE PITCH SWITCH ON PRINTER AND SET SYSTEM ACCORDINGLY

0023 B80F 00133 MOPCHPRT  CALR          M=80       PCH/PRT MONITOR
0024 92F5 00134           BALG +5       M.GF=0     BRANCH NOT TWELVE PITCH
0025 0865 00135           BKBD +5       N10P=0     BR. 10P SET
0026 0872 00136           BKBD +2       N12P=0     BR. 12P SET
0027 0C81 00137           BKBD +1       NPS=1
0028 A90B 00138           JEPU SEG6                SET PROPORTIONAL SPACE FLAG

0029 A90D 00140           JEPU REG6                RESET PROPORTIONAL SPACE FLAG

002A 086E 00142           BKBD -1       N10P=0
002B C48C 00143           JEPR CLDEMVO
002C 1891 00144           BPRT +1       OK=0
002D 1CDE 00145           BPRT -1       CMBY=1
002E C033 00146           JEPR TESTDMG
002F B80F 00147           CALR          M=80
0030 B9F2 00148           CALG          M=M*GF
0031 B0F4 00149           CALG          GF=M       RESET TWELVE PITCH FLAG
0032 800C 00150           JEPU REPRINT

                 * STD MARGIN TEST WILL DETECT ANY CHANGE IN THE MARGIN SETTINGS
                 * GENERAL PURPOSE REG G0 IS USED

0033 E29F 00156 TESTDMG   JEPR FELM
0034 B004 00157           CALG          G0=M       FETCHES STANDARD LEFT MARGIN FROM RAM
0035 CCD4 00158           JEPR FESTLM
0036 9001 00159           BALG +1       M-G0=0     COMPARE STORED LEFT MARGIN WITH STLM
0037 000F 00160           RETN

0038 E2A1 00162           JEPR FERM
0039 B004 00163           CALG          G0=M       FET CHES STANDARD RIGHT MARGIN
003A CCD1 00164           JEPR FESTRM
003B 9001 00165           BALG +1       M-G0=0     BRANCH IF CHANGE IN MARGIN SETTINGS
003C 000F 00166           RETN

003D B80F 00168           CALR          M=80
003E B9F2 00169           CALG          M=M*GF     TOGGLE 12 PITCH BIT IN GF
003F B0F4 00170           CALG          GF=M
0040 F1C4 00171           CALH          HC=0
0041 C422 00172           JEPR FEXTBHC+
0042 9704 00173           BALG +4       (M=0)'     BRANCH IF TABS ARE SET
0043 CCD4 00174           JEPR FESTLM
0044 E1C9 00175           JEPR SELM                STORE ST. LEFT MARGIN
0045 CCD1 00176           JEPR FESTRM
0046 E1CC 00177           JEPR SERM                STORE ST. RIGHT MARGIN
```

```
ADDR CODE NUMBR LABEL     CMND NEXTADDR OPERAND             COMMENT

0047 0002 00178           RNOP
0048 800C 00179           JEPU REPRINT

          *          THIS ROUTINE INITIALIZES THE GENERAL PURPOSE REGISTERS.

0049 B154 00184 SEGP      CALG            G5=0      RESET GP REG G5
004A B164 00185           CALG            G6=0      RESET GP REG G6
004B B184 00186           CALG            G8=0      RESET GP REG G8
004C B194 00187           CALG            G9=0      RESET GP REG G9
004D B1A4 00188           CALG            GA=0      RESET GP REG GA
004E B1B4 00189           CALG            GB=0      RESET GP REG GB
004F B1C4 00190           CALG            GC=0      RESET GP REG GC
0050 1AD2 00191           BPRT +2         LXL=0
0051 C140 00192           JEPR FESTDLAN
0052 E91F 00193           JEPR SEGB
0053 B05F 00194           CALR            M=05
0054 1AD1 00195           BPRT +1         LXL=0     BR. USO SYSTEM
0055 B02A 00196           CALR            M=M+02
0056 0861 00197           BKBD +1         N1OP=0
0057 B80A 00198           CALR            M=M+80
0058 B0F4 00199           CALG            GF=M      SET PITCH=10 OR 12
0059 F134 00200           CALH            H3=0
005A B08F 00201           CALR            M=08
005B F084 00202           CALH            H8=M
005C F1A4 00203           CALH            HA=0      RESET CARR
005D F094 00204           CALH            H9=M      SET DEFFERED ESCAPEMENT TO 8
005E F1C4 00205           CALH            HC=0      RESET GP REG HC
005F F1E4 00206           CALH            HE=0      RESET GP REG HE
0060 B00F 00207           CALR            M=00
0061 3084 00208           CMEM            A21N
0062 300A 00209           CMEM            MINI
0063 1AFE 00210           BPRT -1         MAZ=0
0064 E109 00211           JEPR CLKBKSRG
0065 C6D4 00212           JEPR FESTLM                FETCH STANDARD MARGIN SETTINGS
0066 E1C9 00213           JEPR SELM
0067 C6D1 00214           JEPR FESTRM
0068 A1CC 00215           JEPU SERM

          *ANALYZE MODE TO DETERMINE WHERE KB INPUT SHOULD BE ANALYZED.

0069 BA92 00220 ANMODIDL CALG             M=G9
006A 1A21 00221           BPRT +1         DB2=0      A>   BRANCH IF NOT JUSTIFY.
006B A892 00222           JEPU ANKBJ                      ANALYZE KB INPUT IN JUSTIFY.

006C BA52 00224           CALG            M=G5       A<
006D 1A11 00225           BPRT +1         DB1=0      B<   BRANCH IF NOT MARGIN CONTROL S.C.
006E 81DB 00226           JEPU TEMODE                     ANALYZE KB INPUT IN MG CONT  S.C.

006F C204 00228           JEPR CVG7KBMC              B<   CONVERT CHAR AS REQD IF MG. CONT.
0070 B04F 00229           CALR            M=04
0071 92A7 00230           BALG +7         M.GA=0     BR IF NOT IN US
0072 BA72 00231           CALG            M=G7
0073 1E74 00232           BPRT +4         DB7=1      BR IF BIT 7 AND DO US
0074 99A4 00233           BDAT +4         M=1A       BR IF PHY
0075 9943 00234           BDAT +3         M=14       BR IF WUN
0076 1E62 00235           BPRT +2         DB6=1      BR IF PC OR..
0077 1E51 00236           BPRT +1         DB5=1      ..SPACE
0078 CF82 00237           JEPR USKB                  DO UNDERSCORE
0079 C4E6 00238           JEPR ANKB                       ANALYZE KB INPUT   (NORMAL)
007A C93D 00239           JEPR RCCHKB                     STORE CHAR IN RW BUFFER FOR RECORD
007B 807F 00240           JEPU IDL

          *IDLE LOOP : NORMAL LOOP OF NON-BUSY MODE - ANY OPERATOR INTERACTION
          *WITH SYSTEM IS DETERMINED AND EXECUTED HERE

007C E158 00246 BZI3      JEPR BZ                    BUZZER IDLE 3              CC040
007D E109 00247 REKBIDL   JEPR CLKBKSRG              IDLE 3
007E 0C3F 00248 RESTPIDL BKBD -0          STOP=1     IDLE 2                     CC040
007F BAA2 00249 IDL       CALG            M=GA
0080 1A72 00250           BPRT +2         DB7=0      BRANCH IF NOT COMMUNICATIONS
0081 071F 00251           JEXA            EA1        A A.B NOT REACHED IN A NON-COMMUNICATIO
0082 8003 00252           JEPU 0003                  B MACHINE

0083 C105 00254           JEPR REBZ
0084 C5BE 00255           JEPR MVCARDE
0085 C70E 00256           JEPR FIN PA
0086 C0BF 00257           JEPR MOLSSW
0087 C0A1 00258           JEPR SEACMED
0088 CB1E 00259           JEPR UPWRI
0089 E141 00260           JEPR UPBELL
008A C0AD 00261           JEPR MO
008B E066 00262           JEPR UPBNO
008C CGC1 00263           JEPR MOLINCTR
008D C560 00264           JEPR LDTBRW
008E C012 00265           JEPR UPFLAGS
008F 1309 00266           CPRT            RBDN
0090 3140 00267           CMEM            IDLE
0091 C1F8 00268 TEKBIDL   JEPR TEKB&KSJ
0092 9302 00269           BALG +2         M=0        A>     BRANCH IF NO KB ENTRY
0093 C10D 00270           JEPR TEACOK                       TEST IF OK TO ACT ON ENTRY
0094 8069 00271           JEPU ANMODIDL

0095 0835 00273           BKBD +5         STOP=0     A< B>  BR IF STOP KEY NOT DEPRESSED.
0096 E28B 00274           JEPR SESTOP                       SET STOP BIT.
0097 CD91 00275           JEPR ANAUTUS
0098 BA52 00276           CALG            M=G5
```

```
ADDR CODE NUMBR LABEL     CMND NEXTADDR OPERAND              COMMENT

0099 1A12 00277           BPRT +2       DB1=0      C>     BRANCH IF NOT MARGIN CONTROL SC
009A E908 00278           JEPR REG5                       RESET SINGLE CYCLE BIT
009B 807F 00279           JEPU IDL                    B<

009C B04F 00281           CALR          M=04       C<
009D 9291 00282           BALG +1       M.G9=0     D>     BRANCH IF NOT IN JUSTIFY
009E 8445 00283           JEPU BZERI3

009F C113 00285           JEPR RDRVIF              D<     TEST IF OK TO ACT ON ENTRY
00A0 81DB 00286           JEPU TEMODE

                * DETERMINES THE TRANSPORT THAT SHOULD BE THE ACTIVE READER

00A1 B10F 00291 SEACMED   CALR          M=10       SELECT ACTIVE MEDIA       CC100
00A2 2938 00292           BROM +8       CIN=0
00A3 2A35 00293           BRWM +5       CIN=0
00A4 B20F 00294           CALR          M=20
00A5 BE92 00295           CALG          M=M.G9
00A6 9701 00296           BALG +1       (M=0)'     BRANCH RECORD ON
00A7 B562 00297           CALG          M=G6'
00A8 B002 00298           CALG          M=M'
00A9 0402 00299           CKBD          ARDR
00AA 000F 00300           RETN

00AB 2E3C 00302           BRWM -3       CIN=1
00AC A90D 00303           JEPU REG6                RESET SWITCH READER FLAG

                * THIS ROUTINE MONITORS THE PRINTER,LAMPS, EJECT SWITCHES,TRANSPORT HEADS
                *AND MAG. CARDS FOR ANY CHANGE IN STATUS

00AD C0BA 00309 MO        JEPR TEPRT
00AE C0CF 00310           JEPR MOLT
00AF CB1E 00311 EJKEY     JEPR UPWRI
00B0 C1BD 00312           JEPR MOEJKEY
00B1 C120 00313 MOROHD    JEPR MOROHDS
00B2 C130 00314           JEPR MORWHD
00B3 C2BC 00315 MOCD&PS   JEPR LDPRTPA
00B4 C213 00316 MOROCARD  JEPR MOROCDS
00B5 C284 00317           JEPR MORWCARD
00B6 0AF2 00318           BCOM +2       COM=0      BRANCH NOT COMMUNICATIONS
00B7 071F 00319           JEXA          EA1
00B8 8001 00320           JEPU 0001

00B9 000F 00322           RETN

                *THIS ROUTINE CHECKS FOR PRINTER STATUS OK

00BA 803F 00327 TEPRT     CALR          M=03       SET COUNTER TO 3
00BB 9402 00328           BALG +2       M=M-1=0    IF PRT IS NOT OK CHECK TWICE THEN JEPU
00BC 189E 00329           BPRT -1       OK=0       IF PRINTER IS OK RETURN TO MAIN ROUTINE
00BD 000F 00330           RETN

00BE 8008 00332           JEPU RESTORE             IF PRT FAILED JUMP TO PRT FAIL RESTORE

                * THE MONITOR LINE SPACE SWITCHES ROUTINE WILL DETECT ANY CHANGE
                * IN THE POSITION OF THE LSP SWITCHES AND WILL UPDATE THE SYSTEM
                * TO THE NEW SETTINGS.

00BF BAB2 00339 MOLSSW    CALG          M=GB
00C0 1E46 00340           BPRT +6       DB4=1      A>    BR IF SW WAS IN SINGLE SPACE
00C1 1E53 00341           BPRT +3       DB5=1      B>    BR IF SW WAS IN DOUBLE SPACE
00C2 0815 00342           BKBD +5       NLS1=0     C>    BR IF SW CHANGED TO SINGLE SPACE
00C3 0824 00343           BKBD +4       NLS2=0     C>    BR IF SW CHANGED TO DOUBLE SPACE
00C4 000F 00344           RETN                        D<

00C5 082E 00346           BKBD -1       NLS2=0     B< D> BR IF SW STILL IN DOUBLE SPACE
00C6 0801 00347           JIPU +1
00C7 081C 00348           BKBD -3       NLS1=0     A< D> BR IF SW STILL IN SINGLE SPACE
00C8 BF0F 00349 SELSEQSW  CALR          M=F0       C<
00C9 E921 00350           JEPR REGB                      RESET SW & SYSTEM BITS
00CA BA0F 00351           CALR          M=A0
00CB 0B22 00352           BKBD +2       NLS2=0     E>    BR IF SW NOW IN DOUBLE SPACE
00CC B50F 00353           CALR          M=50
00CD 0C16 00354           BKBD -9       NLS1=1        D< BR IF SW NOW IN 1-1/2  SPACE
00CE A91F 00355           JEPU SEGB                E<

                * MONITORS ALL KEYBOARD LAMPS AND MODIFIES THOSE THAT HAVE HAD A
                *  CHANGE IN STATUS

00CF BA92 00361 MOLT      CALG          M=G9
00D0 E7D9 00362           JEPR SML2
00D1 B100 00363           CALR          M=M.10
00D2 9702 00364           BALG +2       (M=0)'     BRANCH IF JUSTIFY IS SET
00D3 BAA2 00365           CALG          M=GA
00D4 B800 00366           CALR          M=M.80
00D5 0302 00367           CKBD          LDR3
00D6 BA92 00368           CALG          M=G9
00D7 B3BD 00369           CALR          M=M.3B
00D8 0202 00370           CKBD          LDR2       UPDATE G9 LAMPS
00D9 B00F 00371           CALR          M=00
00DA 0CC4 00372           BKBD +4       2HZ=1
00DB BAA2 00373           CALG          M=GA
00DC B0CD 00374           CALR          M=M.0C
00DD 1A21 00375           BPRT +1       DB2=0
```

```
ADDR CODE NUMBR LABEL     CMND NEXTADDR OPERAND              COMMENT

00DE B80F 00376           CALR          M=80
00DF 8982 00377           CALG          M=M*G8
00E0 0102 00378           CKBD          LDR1        UPDATE GA LAMPS
00E1 80F3 00379           JEPU MOBZ

                *MAKE SURE IT IS OK TO GIVE PRINTER COMMANDS

00E2 B04F 00384 TEPRTOK   CALR          M=04
00E3 9402 00385           BALG +2       M=M-1=0     B>  BR IF PRINTER BUSY FOR 12 MICROSEC
00E4 1CFE 00386           BPRT -1       PRBY=1          BR IF PRINTER BUSY
00E5 A887 00387           JEPU CLM                      RETN M=00 IF OK TO

00E6 8390 00389           JEPU INT PRT              B<

                *CLEARS HIGH ORDER CMND FROM STACK AND FETCHS LOW ORDER IF OK
                *TO PRINT

00E7 C0E2 00395 XFPSPIF   JEPR TEPRTOK
00E8 300A 00396           CMEM          MINI            CLEAR HIGH ORDER PRINT CMND
00E9 3010 00397           CMEM          MOUT            FETCH LOW ORDER PRINT CMND
00EA 000F 00398           RETN

00EB C0AD 00401 MO&BNO    JEPR MO                   MON WITH BNO              CC170
00EC A666 00402           JEPU UPBNO

                *FETCH STANDARD LANGUAGE STORED AT LANGUAGE TRANSLATOR ADDRESS 000.

00ED B0DF 00407 FELXLSTD  CALR          M=0D
00EE 3110 00408           CMEM          ALIN
00EF B0FF 00409           CALR          M=0F
00F0 3109 00410           CMEM          AKIN
00F1 3120 00411 XOUT      CMEM          XOUT
00F2 000F 00412           RETN

                * MONITORS FOR TRACK 72  BUZZ SET  AND FOR PASSAGE THROUGH RIGHT MARGIN

00F3 B80F 00417 MOBZ      CALR          M=80        BUZZ MONITOR              CC190
00F4 9293 00418           BALG +3       M.G9=0      BRANCH IF TRK72 BUZZ FLAG SET
00F5 0CB7 00419           BKBD +7       NS=1
00F6 0702 00420           CKBD          BUZZ=0
00F7 A916 00421           JEPU REG9

00F8 B40F 00423           CALR          M=40
00F9 D283 00424           BALH +3       M.H8=0      BRANCH NO BELL AT RM IN PROGRESS FLAG
00FA 08C2 00425           BKBD +2       2HZ=0
00FB 0702 00426           CKBD          BUZZ=0
00FC A929 00427           JEPU REH8                 RESET BELL AT RM IN PROGRESS FLAG

00FD 000F 00429           RETN

                * MONITORS MAGNETIC HEADS IF ANY TRANSPORT IS ACTIVE

00FF 1D43 00434           *CHECK WORD*
0100 2FD3 00434 MOAC      BACM +3       ACT=1       BR. IF ACTIVE REDER INACTIVE
0101 807D 00435           JEPU REKBIDL

0102 2ACE 00437 MORWRUN   BRWM -1       RUN=0       BR. RW CARD NOT RUNNING
0103 E0C3 00438 MOKB&CRD  JEPR MOKB                 KB & CARD MONITOR
0104 80B1 00439           JEPU MOROHD

                * RESETS THE BUZZER FLAGS IN G9 AND H8

0105 B40F 00444 REBZ      CALR          M=40        BUZZ RESET                CC200
0106 FE82 00445           CALH          M=M.H8
0107 9704 00446           BALG +4       (M=0)'      BR IF BELL AT RM IN PROGRESS FLAG SET
0108 B80F 00447           CALR          M=80
0109 8E92 00448           CALG          M=M.G9
010A 9701 00449           BALG +1       (M=0)'      BR TRACK 72 BUZZ FLAG SET
010B 0702 00450           CKBD          BUZZ=0
010C 000F 00451           RETN

                * RETURNS TO IDLE LOOP IF PRINTER BUSY (COVER UP)
                *ALSO DOES REVISE READ IF REVISE IS ON AND THE LAST ACTION WAS TO STEP THE
                *HEAD AND THE CODE BEING ANALYZED DOES NOT REQUIRE A HEAD MOVEMENT.
                **G7

010D 18F1 00459 TEACOK    BPRT +1       PRBY=0
010E 8445 00460           JEPU BZERI3               A<

010F B074 00462           CALG          G7=M        B<    CONVERTED KB CHAR TO G7 IF KB ENT
0110 BFCD 00463           CALR          M=M.FC
0111 BA09 00464           CALR          M=A0-M
0112 9306 00465           BALG +6       M=0         C.    BRANCH IF HEAD STEP CODE A0-A3.
0113 BA82 00466 RDRVIF    CALG          M=G8
0114 1A44 00467           BPRT +4       DB4=0       C.    BRANCH IF NOT REVISE MODE
0115 B40F 00468           CALR          M=40
0116 9292 00469           BALG +2       M.G9=0      C.    BRANCH IF LAST ACT NOT HEAD STEP
0117 E916 00470           JEPR REG9
0118 8BCD 00471           JEPU RDRV

0119 000F 00473           RETN                      C<
```

```
ADDR CODE NUMBR LABEL     CMND NEXTADDR OPERAND                  COMMENT

                *TEST G3 AND RETURN WITH M=FF IF G3=EXPANDED CHARACTER

011A BA32 00478 TEG3=EX   CALG            M=G3
011B 99A2 00479           BDAT +2         M=1A         BR. PREC. HYPHEN
011C BFBD 00480           CALR            M=M.F8         MASK OFF 3 LSB
011D 9981 00481           BDAT +1         M=18           BRANCH IF CHAR IN COL 1 OR 9 & B3=1
011E A88B 00482           JEPU SEM=FF                  CHAR IS NOT AN EXPANDED CHAR.

011F A887 00484           JEPU CLM                     CHAR IS AN EXPANDED CHAR.


                * THE RO HEAD MONITOR  WILL DETECT ANY CHANGE IN THE HEAD
                * POSITION AND WILL UPDATE THE RO TRACK NO. IN RAM MEMORY

0120 2D48 00490 MOROHDS   BROM +8         HDBY=1
0121 E2A5 00491           JEPR FETNRO
0122 9704 00492           BALG +4         (M=0)'       BRANCH IF TRACK NO. NOT 0
0123 2D81 00493           BROM +1         LSN=1        BRANCH IF CALIBRATE SWITCH NOT CLOSED
0124 2907 00494           BROM +7         01=0               BR IF ON EVEN TRACK
0125 2180 00495           CROM            HDL
0126 000F 00496           RETN

0127 BF01 00498           CALG            M=M+1
0128 9303 00499           BALG +3         M=0
0129 2D3C 00500           BROM -3         CIN=1
012A B00F 00501           CALR            M=00
012B A1D2 00502           JEPU SETNRO


012C 2932 00504           BROM +2         CIN=0
012D 2181 00505           CROM            HDR
012E B01F 00506           CALR            M=01
012F A1D2 00507           JEPU SETNRO


                * THIS PROGRAM DETECTS ANY CHANGE IN THE READ WRITE HEAD AND
                * UPDATES THE TRACK NUMBER STORE IN RAM LOCATION 242

0130 2E48 00513 MORWHD    BRWM +8         HDBY=1       IS HEAD MOVING
0131 E2A3 00514           JEPR FETNRW
0132 9704 00515           BALG +4         (M=0)'       BR. NOT ON TRACK ZERO
0133 2E81 00516           BRWM +1         LSN=1        IS HEAD IN CALIBRATE POSITION
0134 2A07 00517           BRWM +7         01=0               BR IF EVEN TRACK
0135 2280 00518           CRWM            HDL
0135 000F 00519           RETN

0137 BF01 00521           CALG            M=M+1
0138 9303 00522           BALG +3         M=0          BR. HEAD TO LEFT OF TRACK ZERO
0139 2E3C 00523           BRWM -3         CIN=1
013A B00F 00524           CALR            M=00
013B A1CF 00525           JEPU SETNRW

013C 2A32 00527           BRWM +2         CIN=0
013D 2281 00528           CRWM            HDR          MOVE RIGHT ONE TRACK IF ON EVEN TRACK
013E B01F 00529           CALR            M=01
013F A1CF 00530           JEPU SETNRW

                *  FETCH STANDARD LANGUAGE AND RETURN WITH IT ON M

0140 C0ED 00535 FESTDLAN JEPR FELXLSTD
0141 B0FD 00536           CALR            M=M.0F       MASK UNNECESSARY BITS
0142 000F 00537           RETN


                *CONVERTS CODE IN G7 TO ITS EXPANDED EQUIVALENT IF CODE IS EXPANDABLE AND
                **EXPAND IS ON. RETURNS WITH NEW CHARACTER IN G7
                ***G3

0143 BA82 00544 CVKBEXCH CALG             M=G8
0144 1A73 00545           BPRT +3         DB7=0        RETURN IF EXPAND NOT ON
0145 BA72 00546           CALG            M=G7
0146 1E71 00547           BPRT +1         DB7=1         CHAR IS NOT EXPANDABLE IF BIT 7=1
0147 81A6 00548           JEPU TEG7EXCV                JUMP TO CONTINUE CONVERSION BELOW

0148 C00F 00550           RETN


                *CONVERT KB INPUT AS REQUIRED IN TEXT ZONE IN MARGIN CONTROL.

0149 BA72 00555 CVTZKBMC CALG             M=G7

012C 2932 00504           BROM +2         CIN=0
012D 2181 00505           CROM            HDR
012E B01F 00506           CALR            M=01
012F A1D2 00507           JEPU SETNRO


                * THIS PROGRAM DETECTS ANY CHANGE IN THE READ WRITE HEAD AND
                * UPDATES THE TRACK NUMBER STORE IN RAM LOCATION 242

0130 2E48 00513 MORWHD    BRWM +8         HDBY=1       IS HEAD MOVING
0131 E2A3 00514           JEPR FETNRW
0132 9704 00515           BALG +4         (M=0)'       BR. NOT ON TRACK ZERO
0133 2E81 00516           BRWM +1         LSN=1        IS HEAD IN CALIBRATE POSITION
0134 2A07 00517           BRWM +7         01=0               BR IF EVEN TRACK
0135 2280 00518           CRWM            HDL
0136 000F 00519           RETN
```

```
ADDR CODE NUMBR LABEL     CMND NEXTADDR OPERAND          COMMENT

0137 BF01 00521           CALG          M=M+1
0138 9303 00522           BALG +3       M=0       BR. HEAD TO LEFT OF TRACK ZERO
0139 2E3C 00523           BRWM -3       CIN=1
013A B00F 00524           CALR          M=00
013B A1CF 00525           JEPU SETNRW

013C 2A32 00527           BRWM +2       CIN=0
013D 2281 00528           CRWM          HDR       MOVE RIGHT ONE TRACK IF ON EVEN TRACK
013E B01F 00529           CALR          M=01
013F A1CF 00530           JEPU SETNRW

          * FETCH STANDARD LANGUAGE AND RETURN WITH IT ON M

0140 C0ED 00535 FESTDLAN JEPR FELXLSTD
0141 B0FD 00536           CALR          M=M.0F    MASK UNNECESSARY BITS
0142 000F 00537           RETN

          *CONVERTS CODE IN G7 TO ITS EXPANDED EQUIVALENT IF CODE IS EXPANDABLE AND
          **EXPAND IS ON. RETURNS WITH NEW CHARACTER IN G7
          ***G3

0143 BA82 00544 CVKBEXCH CALG           M=G8
0144 1A73 00545           BPRT +3       DB7=0     RETURN IF EXPAND NOT ON
0145 BA72 00546           CALG          M=G7
0146 1E71 00547           BPRT +1       DB7=1     CHAR IS NOT EXPANDABLE IF BIT 7=1
0147 81A6 00548           JEPU TEG7EXCV           JUMP TO CONTINUE CONVERSION BELOW

0148 000F 00550           RETN

          *CONVERT KB INPUT AS REQUIRED IN TEXT ZONE IN MARGIN CONTROL.

0149 BA72 00555 CVTZKBMC CALG           M=G7

012C 2932 00504           BROM +2       CIN=0
012D 2181 00505           CROM          HDR
012E B01F 00506           CALR          M=01
012F A1D2 00507           JEPU SETNRO

          * THIS PROGRAM DETECTS ANY CHANGE IN THE READ WRITE HEAD AND
          * UPDATES THE TRACK NUMBER STORE IN RAM LOCATION 242

0130 2E48 00513 MORWHD    BRWM +8       HDBY=1    IS HEAD MOVING
0131 E2A3 00514           JEPR FETNRW
0132 9704 00515           BALG +4       (M=0)'    BR. NOT ON TRACK ZERO
0133 2E81 00516           BRWM +1       LSN=1     IS HEAD IN CALIBRATE POSITION
0134 2A07 00517           BRWM +7       Q1=0          BR IF EVEN TRACK
0135 2280 00518           CRWM          HDL
0136 000F 00519           RETN
```

```
0137 BF01 00521           CALG          M=M+1
0138 9303 00522           BALG +3       M=0       BR. HEAD TO LEFT OF TRACK ZERO
0139 2E3C 00523           BRWM -3       CIN=1
013A B00F 00524           CALR          M=00
013B A1CF 00525           JEPU SETNRW

013C 2A32 00527           BRWM +2       CIN=0
013D 2281 00528           CRWM          HDR       MOVE RIGHT ONE TRACK IF ON EVEN TRACK
013E B01F 00529           CALR          M=01
013F A1CF 00530           JEPU SETNRW

          * FETCH STANDARD LANGUAGE AND RETURN WITH IT ON M

0140 C0ED 00535 FESTDLAN JEPR FELXLSTD
0141 B0FD 00536           CALR          M=M.0F    MASK UNNECESSARY BITS
0142 000F 00537           RETN

          *CONVERTS CODE IN G7 TO ITS EXPANDED EQUIVALENT IF CODE IS EXPANDABLE AND
          **EXPAND IS ON. RETURNS WITH NEW CHARACTER IN G7
          ***G3

0143 BA82 00544 CVKBEXCH CALG           M=G8
0144 1A73 00545           BPRT +3       DB7=0     RETURN IF EXPAND NOT ON
0145 BA72 00546           CALG          M=G7
0146 1E71 00547           BPRT +1       DB7=1     CHAR IS NOT EXPANDABLE IF BIT 7=1
0147 81A6 00548           JEPU TEG7EXCV           JUMP TO CONTINUE CONVERSION BELOW

0148 000F 00550           RETN

          *CONVERT KB INPUT AS REQUIRED IN TEXT ZONE IN MARGIN CONTROL.

0149 BA72 00555 CVTZKBMC CALG           M=G7
```

```
014A 9AD1 00556           BPAT +1       M=2D      A>   BRANCH IF HYPHEN
014B 000F 00557           RETN

014C B1AF 00559           CALR          M=1A      A<   CONVERT HYPHEN TO PREC HYPHEN.
014D A865 00560           JEPU XFG7=M

          * ANALYZE KEYBOARD INPUT FOR PRINTING CHARACTER

014E 1308 00565 ANPRCHKB CPRT           RBUP      KB PRT. CHAR.          CD060
014F C143 00566           JEPR CVKBEXCH
```

```
ADDR CODE NUMBR LABEL    CMND NEXTADDR OPERAND              COMMENT

0150 C918 00567          JEPR PR6MVG7
0151 E0FA 00568 PACEKBID JEPR MOBELL                KB WAIT LOOP              CD060
0152 C93D 00569          JEPR RCLHKB
0153 C560 00570          JEPR LDTBRW
0154 B32F 00571          CALR          M=32
0155 C17C 00572          JEPR TEPACEKB
0156 C58E 00573          JEPR MVCARDE
0157 B19F 00574          CALR          M=19
0158 C17C 00575          JEPR TEPACEKB
0159 807D 00576          JEPU REKBIDL

                *PRINT CHARACTER CONVERSTION
                ** ASSUMES G3 CONTAINS A PRINTING  CHAR & CONVERTS THIS CHAR TO CODE REQD
                *   TO LOOK UP PRINTER DATA. RETURNS WITH CODE ON M ONLY.
                ***   USES REG G2.

015A C11A 00584 CVG3TOPC JEPR TEG3=EX
015B 9703 00585          BALG +3       (M=0)'       BRANCH IF NOT EXPANDED CODE
015C BA32 00586          CALG          M=G3
015D B10A 00587          CALR          M=M+10         CONVERT EXPANDED CODE TO NON EXPANDED
015E 816C 00588          JEPU CVG3PCC

015F B00F 00590          CALR          M=00
0160 3110 00591          CMEM          ALIN           SET LANGUAGE=00
0161 1AD9 00592          BPRT +9       LXL=0        BR USO SYSTEM
0162 B10F 00593          CALR          M=10
0163 B000 00594          CALG          M=M-1
0164 F004 00595          CALH          H0=M
0165 310A 00596          CMEM          AMIN
0166 3120 00597          CMEM          XOUT
0167 B031 00598          CALG          M=M-G3
0168 9805 00599          BDAT +5       M=00         BR IF STANDARD LANGUAGE
0169 FAC2 00600          CALH          M=H0
016A 9708 00601          BALG -7       (M=0)'         BRANCH IF TEST NOT COMPLETE
016B BA32 00602          CALG          M=G3           TEST COMPLETE. NO CONVERSION REQUIRED
016C B7FD 00603 CVG3PCC  CALR          M=M.7F       MASK OFF UNDERSCORE BIT.
016D 000F 00604          RETN

016E BAB2 00606          CALG          M=GB           FETCH LANGUAGE
016F 3110 00607          CMEM          ALIN           XFER LANG TO ADDRESS OF LANG  XLATOR.
0170 80F1 00608          JEPU XOUT

                *CONVERT KB INPUT AS REQUIRED AT LEFT MARGIN IN MARGIN CONTROL MODE

0171 BA72 00613 CVLMKBMC CALG          M=G7
0172 9A01 00614          BDAT +1       M=20         A>     BRANCH IF SPACE
0173 8149 00615          JEPU CVTZKBMC

0174 BA82 00617          CALG          M=G8         A<
0175 1E73 00618          BPRT +3       DB7=1        B>     BRANCH IF EXPAND ON
0176 BA62 00619          CALG          M=G6
0177 1EC1 00620          BPRT +1       DB0=1          C>   BRANCH IF TAB COUNTER OPEN.
0178 807E 00621          JEPU RESTPIDL                     JUMP TO IDLE (SKIP SPACE AT LM).

0179 000F 00623          RETN                       B<C<


017A C3D6 00626 BSKB     JEPR BS                    KB BS                     CD080
017B 8151 00627          JEPU PACEKBID


                * TEST KEYBOARD STACK EXECUTE IF ANY ENTRY WAS MADE

017C C1D0 00632 TEPACEKB JEPR SEPACEKB
017D 9701 00633          BALG +1       (M=0)'       BRANCH IF KEYBOARD ENTRY
017E 000F 00634          RETN

017F E359 00636          JEPR TEMPCSP
0180 9301 00637          BALG +1       M=0          BRANCH IF PRINT CHARACTER OR SPACE
0181 807E 00638          JEPU RESTPIDL

0182 8091 00640          JEPU TEKBIDL


                * CONVERT CHAR IN H0 IF FOUND IN ROW HB  BETWEEN
                * COLUMN X0 (HEX) AND COLUMN  M-1. (INCLUDES END
                *POINTS).

0183 FAC2 00647          CALH          M=HC         B<
0184 B000 00648 CONVERT  CALG          M=M-1
0185 F0C4 00649          CALH          HC=M
0186 3109 00650          CMEM          AKIN                SELECT COLUMN
0187 3120 00651          CMEM          XOUT
0188 D004 00652          BALH +4       M-H0=0       A>     BR IF CHAR TO BE CONVERTED
0189 FAC2 00653          CALH          M=HC
018A B0FD 00654          CALR          M=M.0F
018B 9707 00655          BALG -8       (M=0)'       B>     BR IF SEARCH NOT COMPLETE
018C 000F 00656          RETN

018D FAB2 00658          CALH          M=HB         A<
018E F910 00659          CALH          M=M+H1              NEW CHAR FOUND AT COLUMN HC AND
018F 3110 00660          CMEM          ALIN                NEW ROW = PRESENT ROW + H1.
0190 3120 00661          CMEM          XOUT
0191 8A30 00662          JEPU XFH0=M

                *CONVERT KB INPUT AS REQUIRED IN MARGIN ZONE IN MARGIN CONTROL.
```

```
ADDR CODE NUMBR LABEL     CMND NEXTADDR OPERAND            COMMENT

0192 8A72 00667 CVMZKBMC CALG          M=G7
0193 9AD6 00668          BDAT +6       M=2D       A>    BRANCH IF HYPHEN
0194 99A6 00669          BDAT +6       M=1A       B>    BRANCH IF PREC HYPHEN
0195 9A01 00670          BDAT +1       M=20       C>    BRANCH IF SPACE
0196 000F 00671          RETN

0197 8AB2 00673          CALG          M=G8       C<
0198 1A75 00674          BPRT +5       DB7=0      D>    BRANCH IF EXPAND OFF.
0199 000F 00675          RETN

019A C143 00677          JEPR CVKBEXCH            A<    EXPAND CONVERSION
019B 1308 00678          CPRT          RBUP       B<
019C C918 00679          JEPR PR&MVG7                   PRINT HYPHEN OR PREC HYPHEN
019D C93D 00680          JEPR RCCHKB                    RECORD HYPHEN OR PREC HYPHEN
019E B07F 00681          CALR          M=07       D<    CONVERT G7 TO CR.
019F A865 00682          JEPU XFG7=M

          *TEST REG G7 FOR CONVERSION TO EXPANDED CODE

01A0 B0FA 00687          CALR          M=M+0F     ADD TOTAL OF FF TO G7 IF G7=SPACE
01A1 B10A 00688          CALR          M=M+10     ADD TOTAL OF F0 TO G7 IF G7=.-()
01A2 BDDA 00689          CALR          M=M+DD     ADD TOTAL OF E0 TO G7 IF G7=UC. OR >
01A3 B03A 00690          CALR          M=M+03     ADD TOTAL OF 03 TO G7 IF G7=PHY.
01A4 8074 00691          CALG          G7=M
01A5 000F 00692          RETN

01A6 9BEB 00694 TEG7EXCV BDAT -4       M=3E       TEST FOR UC.
01A7 9A08 00695          BDAT -7       M=20       TEST FOR SPACE
01A8 9A88 00696          BDAT -7       M=28       TEST FOR (
01A9 9A97 00697          BDAT -8       M=29       TEST FOR )
01AA 9AC6 00698          BDAT -9       M=2C       TEST FOR >
01AB 9AD5 00699          BDAT -A       M=2D       TEST FOR -
01AC 9AE4 00700          BDAT -B       M=2E       TEST FOR .
01AD 8034 00701          CALG          G3=M
01AE C15A 00702          JEPR CVG3TOPC            CONVERT PRINT CHAR TO UNIQUE CODE
01AF 9BC2 00703          BDAT -D       M=3C       TEST FOR UC.
01B0 000F 00704          RETN

          * ANALYZE KEYBOARD INPUT FOR AUTO UNDERSCORE OR POWER PRINT

01B1 8A72 00709 ANKBCDEF CALG          M=C7
01B2 9C72 00710          BDAT +2       M=C7       BRANCH IF CONTINOUS UNDERSCORE
01B3 9CF3 00711          BDAT +3       M=CF       BRANCH IF HAY PRINT CODE
01B4 8445 00712          JEPU BZERI3

01B5 C5AF 00714          JEPR ANSPX/US
01B6 807D 00715          JEPU REKBIDL

01B7 C715 00717          JEPR SEPA
01B8 C6E6 00718          JEPR PAFWDC
01B9 807D 00719          JEPU REKBIDL

          * EXECUTE KEYBOARD SPACE

01BA C143 00724 SPKB     JEPR CVKBEXCH
01BB C929 00725          JEPR SP
01BC 8151 00726          JEPU PACEKBID

          * MONITORS THE EJECT SWITCHES ON BOTH RO AND RW TRANSPORT

01BD 2AB1 00731 MOEJKEY  BRWM +1       NEJT=0
01BE 81C7 00732          JEPU LPEJKEY

01BF E394 00734          JEPR TERVRC
01C0 9706 00735          BALG +6       (M=0)'     BRANCH IF RECORD OR REVISE
01C1 2AD2 00736          BRWM +2       ACT=0
01C2 E37F 00737          JEPR TEACMODE
01C3 9703 00738          BALG +3       (M=0)'     BRANCH IF ACTION MODE
01C4 E4B5 00739          JEPR EJRW
01C5 B08F 00740          CALR          M=08
01C6 E908 00741          JEPR REG5
01C7 29F7 00742 LPEJKEY  BROM +7       CCI=0
01C8 2DB6 00743          BROM +6       NEJT=1
01C9 29D2 00744          BROM +2       ACT=0
01CA E37F 00745          JEPR TEACMODE
01CB 9703 00746          BALG +3       (M=0)'     BRANCH IF ACTION MODE
01CC E4B0 00747          JEPR EJRO
01CD B04F 00748          CALR          M=04
01CE A908 00749          JEPU REG5                RESET INHIBIT RO RUN FLAG

01CF 000F 00751          RETN

          * SET THE PACE OF THE KEYBOARD MONITOR

01D0 0003 00756 SEPACEKB CKBD          2MDLY      M DELAY KB MON.
01D1 CDFD 00757          JEPR MOKB&MED
01D2 E0CD 00758          JEPR TEKS
01D3 9704 00759          BALG +4       (M=0)'     BRANCH IF DATA IN KEYBOARD STACK
01D4 C2E1 00760          JEPR TEKBRP
01D5 9701 00761          BALG +1       (M=0)'     BR IF REPEAT ACTIVE
01D6 0CAA 00762          BKBD -5       NM=1
01D7 000F 00763          RETN

01D8 8A59 00765          JEPU CVKBINP
```

```
ADDR CODE NUMBR LABEL     CMND NEXTADDR OPERAND            COMMENT

                * DETERMINE IF SYSTEM IS IN AN ACTIVE MODE. EXECUTES AND RETURNS
                * TO IDLE

01D9 8445 00771           JEPU BZERI3

01DA C32A 00773 ACTION    JEPR SEACTION             ACTION                    CD110
01DB B0BF 00774 TEMODE    CALR          M=0B        MODE TEST                 CD110
01DC 929C 00775           BALG -3       M.G9=0      BRANCH NOT PLAY SKIP OR DUP
01DD 3D01 00776           BPRT +1       XLX=1       BR. IF XLATOR PRESENT
01DE E3B5 00777           JEPR TEACMED
01DF C800 00778           JEPR PSD
01E0 CDBA 00779 ENDACT    JEPR USPART
01E1 880F 00780           CALR          M=80
01E2 E92B 00781           JEPR SEH8                 SET BELL AT RM INITIALIZE FLAG
01E3 803F 00782           CALR          M=03
01E4 9296 00783           BALG +6       M.G9=0      BRANCH NOT SKIP OR DUP
01E5 E158 00784 BZSK      JEPR BZ                   SKIP BZ & WAIT            CD110
01E6 802F 00785 SESKDLY   CALR          M=02        SKIP EXIT                 CD110
01E7 9293 00786           BALG +3       M.G9=0      BRANCH NOT SKIP
01E8 B04F 00787           CALR          M=04
01E9 0013 00788           CKBD          HSDLY
01EA 807F 00789           JEPU IDL

01EB 807D 00791           JEPU REKBIDL


                *PRINT G7 CHAR AND DELAY 100 MS BEFOR ESCAPING AND AN ADDITIONAL
                *50 MS BEFOR RBDN  EXIT WITH CHAR ANYTIME DURING DELAYS

01EC 819F 00797 PRG7PACE CALR           M=19
01ED E187 00798           JEPR DLY MSKB
01EE C918 00799           JEPR PR&MVG7
01EF 832F 00800           CALR          M=32
01F0 C1D0 00801           JEPR SEPACEKB
01F1 9705 00802           BALG +5       (M=0)'      BRANCH NO MORE DELAY
01F2 C58E 00803           JEPR MVCARDE
01F3 819F 00804           CALR          M=19
01F4 C1D0 00805           JEPR SEPACEKB
01F5 9701 00806           BALG +1       (M=0)'      BRANCH NO MORE DELAY
01F6 1309 00807           CPRT          RBDN
01F7 000F 00808           RETN


                * TEST KEYBOARD FOR ENTRY AND CHECK KEYBOARD STACK FOR CONTENTS

01F8 B04F 00813 TEKB&KSJ CALR           M=04        NEW KB & STACK ENTRY      CD165
01F9 9291 00814           BALG +1       M.G9=0      BRANCH NOT JUSTIFY
01FA 82DD 00815           JEPU TEKB

01FB 82D9 00817           JEPU TEKB&KS


                *  MOVE CARRIAGE TO INDENTED LEFT MARGIN


01FC CA1A 00822 MVINDLM   JEPR CAINDENT
01FD 889A 00823           JEPU MVCRM


                *CONVERT KB INPUT AS REQUIRED FOR MARGIN CONTROL.

01FF E800 00828           *CHECK WORD*
0200 BFCA 00828           CALR          M=M+FC
0201 B01A 00829           CALR          M=M+01
0202 B074 00830           CALG          G7=M        A<
0203 000F 00831           RETN                      B<

                * CONVERT CHARACTER IN G7 TO SPECIAL CODES IF NECESSARY IN MARGIN CONTROL

0204 BAB2 00835 CVG7KBMC CALG           M=G8
0205 1A5D 00836           BPRT -2       DB5=0       BRANCH MG CONTROL FLAG NOT SET
0206 BA62 00837           CALG          M=G6
0207 1E6D 00838           BPRT -4       DB6=1       BRANCH CENTER FLAG SET
0208 BA72 00839           CALG          M=G7
0209 1E79 00840           BPRT -6       DB7=1       BR UNDERSCORED CHAR.
020A 9895 00841           BDAT -A       M=09        BRANCH SCR
020B 9875 00842           BDAT -A       M=07        D>    CR
020C C755 00843           JEPR TELM                 TEST LEFT MARGIN
020D 9701 00844           BALG +1       (M=0)'      E>     BRANCH IF NOT AT LEFT MARGIN
020E 8171 00845           JEPU CVLMKBMC                    MAKE CONVERSION REQD IF @ LEFT MG.

020F E139 00847           JEPR TERM                 E<
0210 9211 00848           BALG +1       M.G1=0      F>     BRANCH IF @ OR RT OF RIGHT MARGIN
0211 8149 00849           JEPU CVTZKBMC                    MAKE CONVERSION REQD IF TEXT ZONE

0212 8192 00851           JEPU CVMZKBMC             F<     MAKE CONVERSION REQD IF MARGIN


                * MONITORS RO MEDIA:ALLOWS MEDIA INPUT AND EJECTION

0213 29F5 00856 MOROCDS   BROM +5       CCI=0
0214 B04F 00857           CALR          M=04
0215 9254 00858           BALG +4       M.G5=0      BRANCH INHIBIT RO RUN NOT SET
0216 2991 00859           BROM +1       EOC=0
0217 E908 00860           JEPR REG5                 RESET INHIBIT RO RUN FLAG
0218 2500 00861 LPMOROCA CROM           SRD
0219 000F 00862           RETN
```

```
ADDR CODE NUMBR LABEL     CMND NEXTADDR OPERAND          COMMENT

021A 2DC4 00864           BROM +4      RUN=1
021B 2D9D 00865           BROM -2      EOC=1
021C 2D3C 00866           BROM -3      CIN=1
021D 2105 00867           CROM         CIN=1
021E A453 00869           JEPU NRRRO

021F 0000 00870           NOOP
0220 08B7 00871           BKBD +7      NS=0
0221 29EB 00872           BROM +8      FWD=0
0222 2D34 00873           BROM +4      CIN=1
0223 B10F 00874           CALR         M=10
0224 2D91 00875           BROM +1      EOC=1
0225 A908 00876           JEPU REG5                    RESET INHIBIT RO EJECT FLAG

0226 9255 00878           BALG +5      M.G5=0          BRANCH INH RO EJECT FLAG NOT SET
0227 000F 00879           RETN

0228 2DE1 00881           BROM +1      FWD=1
0229 A4B0 00882           JEPU EJRO

022A E906 00884           JEPR SEG5                    SET INH RO EJ FLAG
022B E4B0 00885           JEPR EJRO
022C 8218 00886           JEPU LPMOROCA

022D 293B 00888           BROM -4      CIN=0
022E 2D9D 00889           BROM -2      EOC=1
022F 000F 00890           RETN

                * ANALYZE KEYBOARD INPUT CODE.

0230 9937 00895 ANKB---1  BDAT +7      M=13            BRANCH CENTER CODE
0231 9947 00896           BDAT +7      M=14            BRANCH WORD UNDERSCORE
0232 99AB 00897           BDAT +8      M=1A            BRANCH PRECEDENTED HYPHEN
0233 B10D 00898           CALR         M=M.60
0234 9706 00899           BALG +6      (M=0)'          BRANCH IF PRINTING CHAR
0235 B1BF 00900           CALR         M=1B
0236 9175 00901           BALG +5      M>G7            BRANCH IF NOT AN ACTION KEY
0237 81DA 00902           JEPU ACTION

0238 8DEE 00904           JEPU ANKBCENT                EXECUTE KB CENTRE

0239 CF82 00906           JEPR USKB
023A 8444 00907           JEPU RE1NAEID

023B 814E 00909           JEPU ANPRCHKB                EXECUTE PRINTING OF CHAR

023C 8445 00911           JEPU BZERI3                  ERROR BUZZ AND REVERT TO IDLE 3

                *              PRINT LANGUAGE

023D 1ED1 00916 PR LNG    BPRT +1      LXL=1           BR. IF LANGUAGE TRANSLATOR IN
023E A265 00917           JEPU PRT FMT

023F E04D 00919           JEPR MVLM&PF                 MOVE TO LEFT MARGIN AND PAPER FEED
0240 B52F 00920           CALR         M=52
0241 C36B 00921           JEPR ESC&PRM/                PRINT "R" SLASHED
0242 B3AF 00922           CALR         M=3A
0243 C4DC 00923           JEPR ESC&PRM
0244 C55C 00924           JEPR SPSTD                   ESCAPE STANDARD SPACE
0245 BAB2 00925           CALG         M=GB            FETCH LANGUAGE OPTION
0246 B0FD 00926           CALR         M=M.0F          MASK OUT UPPER 4 BITS
0247 CF23 00927           JEPR PRMBIN
0248 A265 00928           JEPU PRT FMT

                * SET CODE PRINT FLAG IF PRESENT CHARACTER IS CODE PRINT

0249 BAEF 00933 SEPC      CALR         M=AE            PRTC ON/OFF              CD140
024A B671 00934           CALG         M=M-G7
024B 9703 00935           BALG +3      (M=0)'          BRANCH NOT CODE PRINT CODE
024C B40F 00936           CALR         M=40
024D B982 00937 TOG G8    CALG         M=M*G8          TOGGLE G8                CD140
024E B0B4 00938 XFG8=M    CALG         G8=M
024F 000F 00939           RETN

                *ANPFTCKB
                ** ANALYSES KB I/P FOR PRINTER FORMAT CODES
                *** USES GP REG H8

0250 C58C 00946           JEPR MVCRCOL
0251 8483 00947           JEPU SETB&CA

0252 8400 00949           JEPU CLTBSTBC                A<

0253 841A 00951           JEPU CLALLTB                 B<

0254 8310 00953           JEPU FLS/LCS                 C<D<

0255 8303 00955           JEPU SEMR                    E<

0256 A810 00957           JEPU SEJ&JLMT                F<

0257 8360 00959           JEPU SELNG                   G<

0258 9B19 00961 ANPFTCKB  BDAT -6      M=B1            A> BRANCH TAB CLEAR
0259 9B39 00962           BDAT -6      M=B3            B> BRANCH TOTAL TAB CLEAR
```

```
ADDR CODE NUMBR LABEL     CMND NEXTADDR OPERAND            COMMENT

025A 9B69 00963           BDAT -6       M=B6       C> BRANCH FIRST LINE SET
025B 9B78 00964           BDAT -7       M=B7       D> BRANCH PAGE END
025C 9B88 00965           BDAT -7       M=B8       E> BRANCH SET MARGIN RANGE
025D 9B98 00966           BDAT -7       M=B9       F> BRANCH JUSTIFY LIMIT
025E 9BAB 00967           BDAT -7       M=BA       G> BRANCH LANGUAGE
025F 9B0D 00968           BDAT -F       M=B0          BRANCH TAB SET
0260 9B24 00969           BDAT +4       M=B2          BRANCH SPECIAL TAB SET
0261 9BB5 00970           BDAT +5       M=BB          BRANCH FORMAT PRINT
0262 9B57 00971           BDAT +7       M=B5          BRANCH RIGHT MARGIN SET
0263 9B4A 00972           BDAT +A       M=B4          BRANCH LEFT MARGIN SET
0264 A887 00973           JEPU CLM                 RETN WITH M=00 IF CHAR NOT FOUND

0265 C58C 00975           JEPR MVCRCOL             I<
0266 847F 00976           JEPU SESTB-CA

0267 C230 00978           JEPR PR LNG
0268 E04D 00979           JEPR MVLM&PF
0269 807D 00980           JEPU REKBIDL

026A B80F 00982           CALR          M=80       K<
026B E92B 00983           JEPR SEH8                   SET BELL AT RM INIT FLAG
026C E1E4 00984 SERMCA    JEPR FECA+1
026D A1CC 00985           JEPU SERM

026E E1E4 00987 SELMCA    JEPR FECA+1
026F A1C9 00988           JEPU SELM

                * EXECUTE  UNIT BACK SPACE

0270 B80F 00993 UBS       CALR          M=80       KB UBS                    CD100
0271 9267 00994           BALG +7       M.G6=0        BRANCH NOT PROPORTIONAL SPACE
0272 B01F 00995           CALR          M=01
0273 C156 00996           JEPR TECR=M
0274 9302 00997           BALG +2       M=0        BRANCH NO CARRIAGE MOVE REQUIRED
0275 B80F 00998           CALR          M=80
0276 9211 00999           BALG +1       M.G1=0     BRANCH NEG CARR MOVE REQ
0277 000F 01000           RETN

0278 88A4 01002           JEPU MVCR-INC

0279 E37F 01004           JEPR TEACMODE
027A 970C 01005           BALG -3       (M=0)'     BRANCH IF ACTION MODE
027B 807D 01006           JEPU REKBIDL

                *   SET  COLUMN CENTERING FROM KEYBOARD

027C BA82 01011 SECOLKB   CALG          M=G8
027D 1A51 01012           BPRT +1       DB5=0      BRANCH MARG CONT FLAG NOT SET
027E 8645 01013           JEPU BZERI3

027F B01F 01015           CALR          M=01
0280 9252 01016           BALG +2       M.G5=0     BRANCH COLUMN CENTER NOT SET
0281 C5D0 01017           JEPR MVCR-1
0282 807D 01018           JEPU REKBIDL

0283 A906 01020           JEPU SEG5                SET COLUMN CENTER FLAG

                * MONITORS THE STATUS OF RW MAGNETIC CARD AND ALLOWS INSERTION OF MEDIA
                * IF ATTEMPTED

0284 B08F 01026 MORWCARD CALR           M=08       RW CARD MONITOR           CC160
0285 9254 01027           BALG +4       M.G5=0     BRANCH INH RW RUN NOT SET
0286 2A91 01028           BRWM +1       EOC=0
0287 E908 01029           JEPR REG5
0288 2C03 01030 LPMORWCA CRWM           SRD
0289 000F 01031           RETN

028A 2EC4 01033           BRWM +4       RUN=1
028B 2E9D 01034           BRWM -2       EOC=1
028C 2E3C 01035           BRWM -3       CIN=1
028D 2205 01036           CRWM          CIN=1
028E A455 01037           JEPU NRRRW

028F 0000 01039           NOOP
0290 0687 01040           BKBD +7       NS=0
0291 2AEB 01041           BRWM +B       FWD=0
0292 2E34 01042           BRWM +4       CIN=1
0293 B20F 01043           CALR          M=20
0294 2E91 01044           BRWM +1       EOC=1
0295 A908 01045           JEPU REG5          .     RESET INH RW EJECT FLAG

0296 9255 01047           BALG +5       M.G5=0     BRANCH INH RW EJET NOT SET
0297 000F 01048           RETN

0298 2EE1 01050           BRWM +1       FWD=1
0299 A4B5 01051           JEPU EJRW

029A E906 01053           JEPR SEG5
029B E4B5 01054           JEPR EJRW
029C 8288 01055           JEPU LPMORWCA

029D 2A3B 01057           BRWM -4       CIN=0
029E 2E9D 01058           BRWM -2       EOC=1
029F 000F 01059           RETN

02A0 A887 01062           JEPU CLM
```

```
ADDR CODE NUMBR LABEL     CMND NEXTADDR OPERAND              COMMENT

              * TURN  MARGIN CONTROL ON AND OFF

02A1 B20F 01066 SEMC      CALR             M=20      MGC ON/OFF                 CD140
02A2 9263 01067           BALG +3          M.G8=0    BRANCH MARG CONT NOT SET
02A3 E912 01068           JEPR REG8                  RESET MARG CONTROL
02A4 E0FD 01069           JEPR LKTC
02A5 A8ED 01070           JEPU SEM=FF

02A6 E39C 01072           JEPR TERV
02A7 9706 01073           BALG -7          (M=0)'    BRANCH IF REVISE
02A8 BA82 01074           CALG             M=G8
02A9 B7FD 01075           CALR             M=M.7F    RESET EXPAND FLAG
02AA B20E 01076           CALR             M=M+20    SET MGC FLAG
02AB B084 01077           CALG             G8=M
02AC A30F 01078           JEPU RETC

              * ENTER 2 DIGITS FROM KEYBOARD AND PUTS DIGITS IN G4.USED IN LANGUAGE
              * ROUTINE.MARGIN SET ROUTINE AND FIRST LINE FIND AND SET.

02AD E152 01084           JEPR BZERROR
02AE C343 01085 ANKB2DIG  JEPR ANKBDIG               2 DIGIT ENTRY             CD180
02AF 930D 01086           BALG -2          M=0       BRANCH INVALID ENTRY
02B0 E1E8 01087           JEPR CVFF00
02B1 B024 01088           CALG             G2=M
02B2 C343 01089           JEPR ANKBDIG
02B3 9702 01090           BALG +2          (M=0)'
02B4 E152 01091           JEPR BZERROR
02B5 080C 01092           JIPU -3
02B6 E1E8 01093           JEPR CVFF00
02B7 B004 01094           CALG             G0=M
02B8 E3F2 01095           JEPR X10G2+G0
02B9 B044 01096           CALG             G4=M
02BA A887 01097           JEPU CLM

              * LDPRTPA LOADS PRINTER WITH DATA FROM THE PRINTER DURING
              * AUTO PRINT OTHER ROUTINES CLEAR AND INCREMENT PRINT STACK POINTER

02BB 000F 01103           RETN                       A<

02BC BAA2 01105 LDPRTPA   CALG             M=GA
02BD 1A3D 01106           BPRT -2          DB3=0     A>     BR IF PRINT AUTO NOT SET
02BE E39A 01107           JEPR TEPRTSTK
02BF 930B 01108           BALG -4          M=0       A>     BR IF PRINT STACK EMPTY
02C0 1210 01109           CPRT             LHDB
02C1 1A44 01110           BPRT +4          DB4=0     B>     BR IF NOT CARRIAGE MOTION CMND
02C2 1CDA 01111           BPRT +A          CMBY=1    C.    BR IF BUSY
02C3 C0E7 01112           JEPR XFPSPIF                      FETCH LOW ORDER PRINTER DATA
02C4 1202 01113           CPRT             CMST
02C5 B2D0 01114           JEPU CL&INCPS                     CLR LAST COMMAND & INC POINTER

02C6 1A55 01116           BPRT +5          DB5=0     B. D.BR IF NOT PRINT COMMAND
02C7 1CE5 01117           BPRT +5          CHBY=1    C.     BR IF BUSY
02C8 1308 01118           CPRT             RBUP
02C9 C0E7 01119           JEPR XFPSPIF                      FETCH LOW ORDER PRINTER DATA
02CA 1201 01120           CPRT             CHST
02CB B2D0 01121           JEPU CL&INCPS                     CLR LAST COMMAND & INC POINTER

02CC 1BC1 01123           BPRT +1          PFBY=0    E> D< BR IF NOT BUSY
02CD 000F 01124           RETN                       C<

02CE C0E7 01126           JEPR XFPSPIF               E<     FETCH LOW ORDER PRINTER DATA
02CF 1204 01127           CPRT             PFST
02D0 B00F 01128 CL&INCPS  CALR             M=00
02D1 30C8 01129           CMEM             MIN              CLEAR LAST CMND FROM PRINT STACK
02D2 BC5F 01130           CALR             M=C5
02D3 E2AE 01131 INC PSPT  JEPR FEA2RAM                      INCREMENT OUTPUT POINTER
02D4 BEE9 01132           CALR             M=EE-M
02D5 9301 01133           BALG +1          M=0       F>
02D6 B2A9 01134           CALR             M=2A-M
02D7 BC6A 01135           CALR             M=M+C6    F<
02D8 A1E2 01136           JEPU MIN

              * CHECK KEYBOARD STACK AND EXECUTE CONVERSION ON CODE IF NECESSARY

02D9 E0CD 01141 TEKB&KS   JEPR TEKS
02DA 9302 01142           BALG +2          M=0
02DB E15D 01143           JEPR AJKS+1
02DC 8A59 01144           JEPU CVKBINP

              *  FETCH  ALL  ENTRIES  FROM  KEYBOARD  HERE

02DD 0C41 01148 TEKB      BKBD +1          STROBE=1  KEYBD ENTRY              CD160
02DE 82E1 01149           JEPU TEKBRP

02DF 0C02 01151 FECVKB    CKBD             KBST      KEYBD FETCH              CD160
02E0 8A59 01152           JEPU CVKBINP

02E1 0891 01154 TEKBRP    BKBD +1          NRPT=0    RPT FETCH                CD160
02E2 A887 01155           JEPU CLM

02E3 C2DF 01157           JEPR FECVKB
02E4 84B8 01158           JEPU TEHORPCH

              * SET  PLAY SKIP OR DUPLICATE MODE
```

```
ADDR CODE NUMBR LABEL    CMND NEXTADDR OPERAND          COMMENT

02E5 BA72 01163 SEPSD    CALG          M=G7
02E6 99F6 01164          BDAT +6       M=9F        BRANCH PLAY CODE
02E7 B04F 01165          CALR          M=04
02E8 E91B 01166          JEPR REGA                 RESET LINE UNDERSCORE FLAG
02E9 BA72 01167          CALG          M=G7
02EA 99E3 01168          BDAT +3       M=9E        BRANCH SKIP CODE
02EB 2A52 01169          BRWM +2       READ=0
02EC A887 01170          JEPU CLM

02ED BA4F 01172          CALR          M=A4
02EE B74A 01173          CALR          M=M+64
02EF B992 01174          CALG          M=M-G9
02F0 B0B0 01175          CALR          M=M.0B
02F1 B992 01176          CALG          M=M*G9
02F2 B094 01177          CALG          G9=M
02F3 B020 01178          CALR          M=M.02
02F4 9701 01179          BALG +1       (M=0)'      BR IF SKIP SET
02F5 A88B 01180          JEPU SEM=FF

02F6 B04F 01182          CALR          M=04
02F7 0013 01183          CKBD          HSDLY
02F8 A888 01184          JEPU SEM=FF

                  * IF DEFFERED SPACE FLAG IS SET ADD THE WIDTH OF A SPACE TO
                  *    GO AND G1

02F9 B40F 01190 ADDESP   CALR          M=40
02FA 92A3 01191          BALG +3       M.GA=0      A  BR IF DEFD SPACE FLAG NOT SET
02FB E91B 01192          JEPR FEGA
02FC C3F0 01193          JEPR FESPCS
02FD A3E3 01194          JEPU ADM+G10                 ADD SPACE WIDTH TO G1/0

02FE 000F 01196          RETN                      A


                  *SEMR
                  ** ANALYSES 2 DIGIT ENTRY FROM KB DEFINING MARGIN RANGE. UPDATES STORED
                  ** MARGIN RANGE AND SETS MGC

02FF 352E 01203          *CHECK WORD*
0300 B0FF 01203          CALR          M=0F        A<
0301 B044 01204          CALG          G4=M
0302 0805 01205          JIPU +5
0303 C2AE 01206 SEMR     JEPR ANKB2DIG             2 DIG ENTRY. RETURN WITH MR NO. SET
0304 BA69 01207          CALR          M=A6-M
0305 9306 01208          BALG +8       M=0
0306 BF0F 01209          CALR          M=F0        ...IN G4
0307 9048 01210          BALG -7       M=M+G4C     A>   BRANCH IF NO. IN G4 NOT 15
0308 BF0F 01211          CALR          M=F0
0309 BEF2 01212          CALG          M=M.GF         TRANSFER GF.B7-B4 TO M (B3-B0=0
030A BB42 01213          CALG          M=M&G4         TRANSFER MR FROM G4 TO M.B3-B0
030B B0F4 01214          CALG          GF=M           SET GF=M. THEREBY STORING NEW MR
030C B20F 01215          CALR          M=20
030D 9281 01216          BALG +1       M.G8=0      B> BRANCH IF MGC NOT SET
030E A888 01217          JEPU SEM=FF

030F 82A1 01219          JEPU SEMC                 B< JUMP TO SEMC


                  *             FIRST LINE SET AND FIRST LINE COUNT SET.
                  **SETS NUMBER OF LINES BETWEEN FIRST LINES AND NUMBER OF LINES
                  **PER PAGE.
                  *** G4,G7

0310 C2AE 01227 FLS/LCS  JEPR ANKB2DIG                FETCH TWO DIGIT ENTRY
0311 BA69 01228          CALR          M=A6-M          BRANCH IF CHC
0312 930A 01229          BALG +A       M=0       A>
0313 C062 01230          JEPR CPG7                    CODE PRINT FLS/LCS
0314 C5F1 01231          JEPR PR2DIG
0315 BA72 01232          CALG          M=G7
0316 BB79 01233          CALR          M=B7-M
0317 9306 01234          BALG +6       M=0       B>   BRANCH IF LCS
0318 B00F 01235          CALR          M=00
0319 E1D8 01236          JEPR SEFLCTR                 RESET FL COUNTER ADDRESS 245
031A BA42 01237          CALG          M=G4
031B B940 01238          CALG          M=M+G4         DOUBLE FL SETTING FOR INDEX
031C E1D5 01239          JEPR SEFLPRE                 SET FIRST LINE PRESET ADDRESS 244
031D 807D 01240          JEPU REKBIDL            A<   RETURN TO IDLE 3.

031E B00F 01242          CALR          M=00       B<
031F E1DE 01243          JEPR SELCCTR                 RESET LINE COUNTER ADDRESS 247
0320 BA42 01244          CALG          M=G4
0321 B940 01245          CALC          M=M+G4         DOUBLE LINE COUNT
0322 9301 01246          BALG +1       M=0        C>
0323 B000 01247          CALG          M=M-1          DECREMENT LC IF SETTING NOT 0
0324 E1DB 01248          JEPR SFLCPRE             C< SET LINE COUNT PRESET ADDRESS 246
0325 807D 01249          JEPU REKBIDL                 RETURN TO IDLE 3.


                  *                       SET  ACTION
                  * SETS SYSTEM TO WORD. LINE. PARA. OR AUTO MODE FOR PSD

0326 B01F 01255          CALR          M=01
0327 A910 01256          JEPU SEG8                 SET WORD FLAG

0328 B02F 01258          CALR          M=02
0329 A910 01259          JEPU SEG8                 SET LINE FLAG
```

```
ADDR CODE NUMBR LABEL     CMND NEXTADDR OPERAND            COMMENT

032A B0FF 01261 SEACTION CALR          M=0F
032B E912 01262          JEPR REG8                RESET AUTO,PARA,LINE,WORD FLAGS
032C BA72 01263          CALG          M=G7
032D 99C8 01264          BDAT -7       M=1C       BRANCH IF WRD
032E 99D9 01265          BDAT -6       M=1D       BRANCH IF LIN
032F B10F 01266          CALR          M=10
0330 9283 01267          BALG +3       M.G8=0     BRANCH NOT REVISE
0331 B02F 01268          CALR          M=02
0332 9291 01269          BALG +1       M.G9=0     BRANCH NOT SKIP
0333 8445 01270          JEPU BZERI3

0334 BA72 01272          CALG          M=G7
0335 99E2 01273          BDAT +2       M=1E       BRANCH PARA CODE
0336 B08F 01274          CALR          M=08
0337 A910 01275          JEPU SEG8                SET AUTO FLAG

0338 B04F 01277          CALR          M=04
0339 A910 01278          JEPU SEG8                SET PARA FLAG

         *  WAIT FOR KEYBOARD ENTRY OR FOR STOP KEY DEPRESSION

033A 1309 01283 WTKB     CPRT          RBCN       KB WAIT W. STOP       CD190
033B C0EB 01284          JEPR MO&BNO
033C 0841 01285          BKBD +1       STROBE=0   BRANCH NO KEYBOARD ENTRY
033D 82DF 01286          JEPU FECVKB

033E 083C 01288          BKBD -3       STOP=0
033F BA6F 01289          CALR          M=A6
0340 F004 01290          CALH          HO=M
0341 A170 01291          JEPU RETN2

         * ALLOWS ENTRY OF A HEX CHARACTER FROM KEYBOARD AND CHARACTER CORRECT

0342 A171 01296          JEPU RETN1

0343 C33A 01298 ANKBDIG  JEPR WTKB                DIGIT ENTRY           CD200
0344 BA6F 01299          CALR          M=A6
0345 D00C 01300          BALH -3       M-HO=0     BRANCH NO DIGIT ENTRY
0346 BC6F 01301          CALR          M=C6
0347 DC05 01302          BALH +5       M=M+HOC
0348 B2FF 01303          CALR          M=2F
0349 D103 01304          BALH +3       M>HO
034A B0FF 01305          CALR          M=0F
034B FE02 01306          CALH          M=M.HO
034C A1EC 01307          JEPU CV00FF

034D A887 01309          JEPU CLM

         *  MOVE  CARRIAGE FORWARD  OR  REVERSE  THE DISTANCE  SPECIFIED  IN  GA

034E B10F 01314 FAKEAS   CALR          M=10
034F C3BF 01315          JEPR XFG01PR
0350 BAA2 01316 MVCR     CALG          M=GA
0351 1E34 01317          BPRT +4       DB3=1      BRANCH PRINT AUTO FLAG SET
0352 C3B1 01318          JEPR XFG01PIF
0353 1CDE 01319          BPRT -1       CMBY=1
0354 1202 01320          CPRT          CMST
0355 0801 01321          JIPU +1
0356 C34E 01322          JEPR FAKEAS
0357 B08F 01323          CALR          M=08
0358 9213 01324          BALG +3       M.G1=0     BRANCH IF MOVEMENT POSITIVE
0359 BB12 01325          CALG          M=M'.G1
035A B014 01326          CALG          G1=M
035B E87D 01327          JEPR NEG G10
035C C3B9 01328          JEPR ADG10CA
035D EDDA 01329          JEPR FE2PCH
035E E49B 01330          JEPR DIG1/M
035F BA12 01331          CALG          M=G1
0360 F0A4 01332          CALH          HA=M
0361 BAC2 01333          CALG          M=GC
0362 E7D7 01334          JEPR SML4
0363 BB02 01335          CALG          M=M⊕G0
0364 E7F9 01336          JEPR RML4
0365 A36E 01337          JEPU XFGC=M

         *  EXECUTE  REVERSE INDEX

0366 C3A2 01342 RIX      JEPR CAG7LS              EXEC RIX              CE030
0367 B024 01343 MV-V     CALG          G2=M       PR                    CE030
0368 C343 01344          JEPR UPLCRVS
0369 B08F 01345          CALR          M=08
036A BB12 01346          CALG          M=M⊕G1
036B B014 01347          CALG          G1=M
036C 8387 01348          JEPU MVV

         *              SET  LANGUAGE
         **  ALLOWS A TWO DIGIT INPUT OF NO GREATER THAN 12 TO SPECIFY
         **  THE LANGUAGE OPTION TO BE USED.
         *** G4.GB

036D 1ED1 01356 SELNG    BPRT +1       LXL=1      BRANCH IF LANGUAGE CARD IN
036E 8445 01357          JEPU BZERI3
```

```
ADDR CODE NUMBR LABEL     CMND NEXTADDR OPERAND            COMMENT

036F C2AE 01358           JEPR ANKB2DIG               ENTER TWO DIGITS
0370 8A69 01359           CALR          M=A6-M        COMPARE ENTRY FOR CHARACTER CORRECT
0371 930C 01360           BALG +C       M=0           BRANCH IF CHC
0372 8A42 01361           CALG          M=G4          FETCH ENTRY
0373 9702 01362           BALG +2       (M=0)'
0374 C140 01363           JEPR FESTDLAN               FETCH STANDARD LANGUAGE
0375 B044 01364           CALG          G4=M          SET G4=STANDARD LANGUAGE
0376 BF3F 01365           CALR          M=F3
0377 9147 01366           BALG +7       M=M+G4C       BRANCH IF ENTRY GREATER THAN 12 (HEX=0C)
0378 C162 01367           JEPR CPG7                   CODE PRINT G7
0379 C5F1 01368           JEPR PR2DIG                 AND ENTRY
037A B0FF 01369           CALR          M=0F
037B E921 01370           JEPR REGB                   RESET LOWER 4 BITS OF GB
037C 8A42 01371           CALG          M=G4
037D E91F 01372           JEPR SEGB                   SET LOWER 4 BITS OF GB TO LANG OPTION
037E 8070 01373           JEPU REKBIDL                RETURN TO IDLE 3

037F E152 01375           JEPR BZERROR                SET BUZZER
0380 836D 01376           JEPU SELNG                  ALLOW NEW LANG. ENTRY

                  * EXECUTE A PAPER FEED OR A LINE SPACE AS DEFINED BY THE SWITCHES

0381 B02F 01381 AJV+1     CALR          M=02          SPEC PF                    CE030
0382 0801 01382           JIPU +1
0383 C3A2 01383 IX        JEPR CAG7LS                 EXEC INDEX                 CE030
0384 B024 01384 MV+V      CALG          G2=M          PF
0385 C29F 01385           JEPR UPLCFWD
0386 8387 01386           JEPU MVV

                  * LOAD PRINTER INTERFACE REGISTER AND EXECUTE PAPER MOTION

0387 B07F 01391 MVV       CALR          M=07          EXEC PM                    CE030
0388 BE12 01392           CALG          M=M.G1
0389 BB02 01393           CALG          M=M⊕G0
038A 9304 01394           BALG +4       M=0           BRANCH NO PAPER MOVEMENT
038B B40F 01395           CALR          M=40
038C C3BF 01396           JEPR XFGC1PR
038D 1CCE 01397           BPRT -1       PFBY=1
038E 1204 01398           CPRT          PFST
038F 000F 01399           RETN

                  * RESETS STATUS FLAGS AND TERMINATES PRINTER FUNCTION IF PRINT REMAIN
                  * IN BUSY STATE

0390 CCF4 01405 INT PRT   JEPR CLRO                   AUTO INTERUPT              CE051
0391 E300 01406           JEPR CLRWH23
0392 E82C 01407           JEPR CLHE9
0393 C5C2 01408           JEPR CLDE
0394 B3FF 01409           CALR          M=3F
0395 E912 01410           JEPR REGB
0396 B04F 01411           CALR          M=04
0397 E916 01412           JEPR REG9
0398 B70F 01413           CALR          M=70
0399 E924 01414           JEPR REGF
039A B02F 01415           CALR          M=02
039B E908 01416           JEPR REG5
039C B445 01417           JEPU BZERI3

                  *TEST FOR TAB OR PREC TAB. RETN WITH M=0 IS POSITIVE INDICATION.

039D 8A72 01422 TEG7TB    CALG          M=G7
039E E0A9 01423 TEMTB     CALR          M=0A-M
039F A1E8 01424           JEPU CVFF00

                  *CALCULATE LINE SPACE IN 1/12 INCH INCREMENTS FOR CHAR IN G7.

03A0 B01F 01429           CALR          M=01          B<C<
03A1 000F 01430           RETN

03A2 8A72 01432 CAG7LS    CALG          M=G7
03A3 1E74 01433 CAMLS     BPRT +4       DB7=1         A>
03A4 98CB 01434           BDAT -4       M=0C                   INDEX
03A5 98DA 01435           BDAT -5       M=0D                   REVERSE INDEX
03A6 E335 01436           JEPR TEMCR
03A7 9301 01437           BALG +1       M=0           BRANCH IF CARRIAGE RETURN
03A8 A987 01438           JEPU CLM                    A<

03A9 8AB2 01440           CALG          M=GB          D<E<F<
03AA BC00 01441           CALR          M=M.C0                 MASK OUT SYSTEM LINE SPACE BITS
03AB 9303 01442           BALG +3       M=0           G>       BRANCH IF 1 1/2 LINE SPACE
03AC 1A61 01443           BPRT +1       DB6=0         H>       BRANCH IF 2     LINE SPACE
03AD B7EF 01444           CALR          M=7E                   7E +81 + 03 = 02 (1 LINE SP)
03AE B81A 01445           CALR          M=M+81                 80 + 81 + 03 = 04 (2 LINE SP)
03AF B03A 01446           CALR          M=M+03        G>       00 + 03 =03 (1 1/2 LINE SP)
03B0 000F 01447           RETN

                  *TRANSFER G0 AND G1 TO PRINTER REG. IF RIBBON AND PRINTER OK

03B1 CDFD 01452 XFG01PIF  JEPR MOKB8MED               LOAD DATA                  CE050
03B2 B03F 01453           CALR          M=03
03B3 9404 01454           BALG +4       M=M-1=0
```

```
ADDR CODE NUMBR LABEL    CMND NEXTADDR OPERAND            COMMENT

03B4 1CFE 01455          BPRT -1       PRBY=1
03B5 BA12 01456          CALG          M=G1
03B6 1210 01457          CPRT          LHDB
03B7 A3F4 01458          JEPU XFM=GO

03B8 8390 01460          JEPU INT PRT

                * ADD     GO AND G1 TO CARRIAGE POSITION CONTAINED IN HA AND FRACTION
                * IN  GC

03B9 E19E 01466 ADG1OCA  JEPR FEFR                  G1/GO+CARR           CE060
03BA E3E3 01467          JEPR ADM+G1O
03BB E0DA 01468          JEPR FE2PCH
03BC B024 01469          CALG          G2=M
03BD FAA2 01470          CALH          M=HA
03BE A440 01471          JEPU XMG2+G1O

                *STORES PRINT COMMAND IN PRINT CMND STACK IF "PRINT AUTO" FLAG SET.

03BF F004 01476 XFGO1PR  CALH          HO=M
03C0 B0FF 01477          CALR          M=0F
03C1 BE12 01478          CALG          M=M.G1
03C2 FB02 01479          CALH          M=M&HO
03C3 F004 01480          CALH          HO=M
03C4 BAA2 01481          CALG          M=GA
03C5 1E31 01482          BPRT +1       DB3=1        BRANCH PRINT AUTO SET
03C6 83B1 01483          JEPU XFGO1PIF

03C7 0002 01485          RNOP
03C8 BC4F 01486 XFPSWAIT CALR          M=C4
03C9 E2AE 01487          JEPR FEA2RAM
03CA E2AE 01488          JEPR FEA2RAM
03CB 9303 01489          BALG +3       M=0          BRANCH NOTHING IN STACK
03CC C0E2 01490          JEPR TEPRTOK
03CD C0A0 01491          JEPR MO
03CE 83C8 01492          JEPU XFPSWAIT
03CF FAC2 01493          CALH          M=HO
03D0 300A 01494          CMEM          MINI
03D1 BA02 01495          CALG          M=GO
03D2 300A 01496          CMEM          MINI
03D3 BC4F 01497          CALR          M=C4
03D4 C2D3 01498          JEPR INC PSPT
03D5 80AD 01499          JEPU MO

                *EXECUTE BACKSPACE

03D6 B02F 01504 BS       CALR          M=02         TEST FOR COLUMN 2
03D7 C556 01505          JEPR TECR=M
03D8 BA12 01506          CALG          M=G1
03D9 1A71 01507          BPRT +1       DB7=0
03DA 8E69 01508          JEPU MVCRO1

03DB C5BE 01510          JEPR MVCARDE
03DC E0DA 01511          JEPR FE2PCH
03DD B004 01512          CALG          GO=M
03DE B114 01513          CALG          G1=0
03DF 88A7 01514          JEPU MVCR-

                * EXECUTE SPACE IF ACTIVE MODE . SET DEFFERED SPACE FLAG IF NOT

03E0 E37F 01519 SPC      JEPR TEACMODE
03E1 9302 01520          BALG +2       M=0          A  BR IF NOT ACTIVE MODE
03E2 B40F 01521          CALR          M=40
03E3 92A2 01522          BALG +2       M.GA=0       BRANCH DEFERRED SPACE NOT SET
03E4 C3F0 01523          JEPR FESPCS
03E5 88A1 01524          JEPU AJCR+M

03E6 A919 01526          JEPU SEGA                  B  SET DEFD SPACE FLAG

                * TEST M FOR  COLUMN CENTER CODE IF CLC RETURN WITH M=00

03E7 B119 01531 TEMTBCOL CALR          M=11-M
03E8 9301 01532          BALG +1       M=0          BRANCH COLUMN CENTER CODE
03E9 B079 01533          CALR          M=07-M       RETN WITH 00 IF CR ALSO
03EA 000F 01534          RETN

                *SETS RAM MEMORY ADDRESS REG=HC/4  & RETURNS WITH M=HC

03EB FAC2 01539 SETRADDR CALH          M=HC
03EC E7F7 01540          JEPR RML6
03ED B3FD 01541          CALR          M=M.3F
03EE 30B4 01542          CMEM          A2IN
03EF 847D 01543          JEPU XFM=HC

                * FETCH  SPACE CODE  AND ADJUST  ACCORDING TO MODE AND JUSTIFY

03F0 0000 01548 FESPCS   NOOP
03F1 0000 01549          NOOP
03F2 B04F 01550          CALR          M=04
03F3 9297 01551          BALG +7       M.G9=0       BRANCH JUSTIFY FLAG NOT SET
03F4 FA42 01552          CALH          M=H4
03F5 9303 01553          BALG +3       M=0          B     BR IF NO MORE LARGE SPACES
```

```
ADDR CODE NUMBR LABEL      CMND NEXTADDR OPERAND                COMMENT

03F6 B000 01554            CALG          M=M-1
03F7 F044 01555            CALH          H4=M             DECREMENT NO OF LARGE SPACES
03F8 BC1F 01556            CALR          M=01
03F9 F950 01557            CALH          M=M+H5     B     FETCH JUSTIFY SPACE WIDTH
03FA 000F 01558            RETN

03FB E203 01560            JEPR FESTDSP             A    FETCH NON JUSTIFY SPACE WIDTH
03FC A7DA 01561            JEPU SML1

                  *CLEAR TAB OR SPECIAL TAB AT CARRIER POSITION OR LOCATION SPECIFIED IN HC
                  ***HB.HC

03FE 5C1D 01567            *ADJUST WORD*
03FF 2996 01567            *CHECK WORD**
0400 C40B 01567 CLTBSTBC   JEPR XFCAHC
0401 C405 01568            JEPR CLTB&HC                    CLEAR TAB AT HC
0402 C521 01569            JEPR FETBMASK                  FETCH TAB AMSK
0403 BC01 01570            CALG          RML               ADJUST MASK FOR STB
0404 0801 01571            JIPU +1                  A>
0405 C521 01572 CLTB&HC    JEPR FETBMASK                   FETCH TAB MASK
0406 F084 01573            CALH          HB=M       A<     STORE MASK IN HB
0407 C3EB 01574            JEPR SETRADDR                   SET TAB REGISTER ADDRESS
0408 3010 01575            CMEM          MOUT
0409 FD82 01576            CALH          M=M.HB'           RESET TAB BIT DICTATED BY MASK.
040A 848A 01577            JEPU WRRAM                      STORE IN RAM.

                  * TRANSFERS  THE CARRIAGE POSITION TO HC IN TAB SET ROUTINES

040B E19E 01582 XFCAHC     JEPR FEFR
040C F0C4 01583            CALH          HC=M
040D C56E 01584            JEPR FEDE
040E F9C0 01585            CALH          M=M+HC
040F F0C4 01586            CALH          HC=M
0410 BAF2 01587            CALG          M=GF
0411 1A66 01588            BPRT +6       DB6=0      BRANCH DEFERRED ESCAPEMENT FLAG NOT SET
0412 E1A1 01589            JEPR FEPITCH
0413 D5C3 01590            BALH +3       M=M-HC>0   BR NO TAB HERE OR TO THE RIGHT
0414 FAA2 01591            CALH          M=HA
0415 BF01 01592            CALG          M=M+1
0416 0802 01593            JIPU +2
0417 930C 01594            BALG -3       M=0
0418 FAA2 01595            CALH          M=HA
0419 A8BB 01596            JEPU XFHC=M

                  *CLEAR ALL TABS AND SPECIAL TABS.

041A B28F 01601 CLALLTB    CALR          M=28
041B 3084 01602            CMEM          A2IN              ADDRESS END OF TAB REGISTER + 1
041C B00F 01603            CALR          M=00
041D 3001 01604            CMEM          ADEC       A<     DEC TAB REGISTER ADDRESS
041E 3008 01605            CMEM          MIN               CLEAR TAB REG BEING ADDRESSED
041F 1AFD 01606            BPRT -2       MAZ=0      A>     BRANCH IF NOT AT BEGIN OF TAB REG.
0420 A8BB 01607            JEPU SEM=FF

                  *FETCHS NEXT TAB OR SPECIAL TAB STOP PAST PRESENT CARRIER POSITION OR
                  **POSITION STORED IN HC. RETN WITH M=00 INDICATES NO TABS SET. M=01
                  **INDICATES NO RMAL TAB STOP. M=02 INDICATES SPECIAL TAB STOP. LOCATION
                  **OF TAB IS IN HC.
                  ***HC

0421 C40B 01616 FEXTBCA+   JEPR XFCAHC                    TRANSFER CARRIER POSITION TO HC
0422 EBB2 01617 FEXTBHC+   JEPR INCHC158            C<    INCREMENT HC MODULO 158
0423 9304 01618            BALG +4       M=0        A>    BRANCH IF NO TABS SET.
0424 C400 01619            JEPR FEXTBHC                   FETCH CONTENTS OF TAB STORE REG CHC
0425 1E01 01620            BPRT +1       DB0=1      B>    BRANCH IF NORMAL TAB SET @ LOC HC
0426 1A1B 01621            BPRT -4       DB1=0      C>    BRANCH IF NO TAB SET @ LOC HC
0427 B03D 01622            CALR          M=M.03     B<    MASK OFF IRRELAVENT BITS.
0428 000F 01623            RETN                     A<

                  *FETCHS NEXT TAB STOP PAST PRESENT CARRIER POSITION OR PAST POSITION
                  **STORED IN HC. RETN WITH M=0 INDICATES NO TAB SET.
                  ***HC

0429 C40B 01630 FETBCA+    JEPR XFCAHC                    TRANSFER CARRIER POSITION TO HC
042A C422 01631 FETBHC+    JEPR FEXTBHC+            B< FETCH NEXT TAB OR STB
042B 9302 01632            BALG +2       M=0        A> BRANCH IF NO TABS
042C 1A0D 01633            BPRT -2       DB0=0      B> BRANCH IF STB
042D FAC2 01634            CALH          M=HC
042E 000F 01635            RETN                     A<

                  *ANKBB7
                  ** ANALYSES KB I/P CODES WITH B7=1. WHEN LSP CODE IS DETECTED THE SETTING
                  ** THE LINE SPACE SWITCH IS ANALYSED AND THE APPROPRIATE SYSTEM CODE IS EN
                  ** INTO G7.
                  *** USES GP REGISTER G7

042F B70D 01644 ANKBB7     CALR          M=M.70
0430 970C 01645            BALG +C       (M=0)'     BRANCH IF CHAR NOT IN COL 8 OF CODE MATR
0431 BA72 01646            CALG          M=G7       ...IF NOT A RECDBL MEDIA CONTROL CODE.
0432 9896 01647            BDAT +6       M=89       BRANCH IF RPT
0433 98C6 01648            BDAT +6       M=8C       BRANCH IF EJT
0434 9886 01649            BDAT +6       M=88       BRANCH IF SWR
```

```
ADDR CODE NUMBR LABEL     CMND NEXTADDR OPERAND          COMMENT

0435 98D5 01650           BDAT +5        M=8D     BRANCH IF HLT
0436 98E4 01651           BDAT +4        M=8E     BRANCH IF NRS
0437 98F3 01652           BDAT +3        M=8F     BRANCH IF TRL
0438 8445 01653           JEPU BZERI3             JUMP TO BZERI3 (ERROR DETECTED)

0439 A461 01655           JEPU RPKB

043A A434 01657           JEPU EJKB

043B 000F 01659           RETN

043C 81B1 01661           JEPU ANKBCDEF

043D 1E6E 01663           BPRT -1        DB6=1    BRANCH IF CHAR IS IN COLS. C.D.E. OR F.
043E BA72 01664           CALG           M=G7
043F BC5A 01665           CALR           M=M+C5
0440 9835 01666           BDAT +E        M=83     BRANCH LINE SPACE 8 LINES /INCH
0441 9D8B 01667           BDAT +B        M=58     BRANCH IF X
0442 9814 01668           BDAT +4        M=81     BRANCH IF LSP
0443 C535 01669           JEPR ANFCTKB
0444 9701 01670 RETNAEID  BALG +1        (M=0)'   BRANCH TO IDLE IF M NOT 0
0445 E152 01671 BZERI3    JEPR BZERROR
0446 807D 01672           JEPU REKBIDL

0447 0813 01674           BKBD +3        NLS1=0
0448 0C21 01675           BKBD +1        NLS2=1
0449 B01A 01676           CALR           M=M+01
044A B01A 01677           CALR           M=M+01
044B B074 01678           CALG           G7=M     LOAD G7 WITH LS CODE IN M
044C 80C8 01679           JEPU SELSEQSW

044D C454 01681           JEPR TELAMP
044E 807D 01682           JEPU REKBIDL

044F 0000 01684           NOOP
0450 0EF1 01685           BCOM +1        COM=1    BRANCH IF COMMUNICATIONS
0451 8445 01686           JEPU BZERI3

0452 071F 01688           JEXA           EA1
0453 8002 01689           JEPU 0002

                *LIGHTS ALL LIGHTS FOR AS LONG AS  OPERATOR HOLDS "X" KEY DEPRESSED
                *OR A MINIMUM OF 1 SECOND
                **HB

0454 C0AD 01696 TELAMP    JEPR MO                 A<
0455 0CBE 01697           BKBD -1        NS=1     AS     WAIT FOR CARD TO STOP IF REQD.
0456 0722 01698           CKBD           BUZZ=2
0457 B02F 01699           CALR           M=02
0458 0013 01700           CKBD           HSDLY           SET DELAY FOR 1 SECOND
0459 2E31 01701           BRWM +1        CIN=1    B>     SAVE CONDITION OF RO&RW CIN IN HB
045A B00F 01702           CALR           M=00
045B 2931 01703           BROM +1        CIN=0    B< C>
045C B01A 01704           CALR           M=M+01
045D F0B4 01705           CALH           HB=M        C<
045E 2105 01706           CROM           CIN=1           SET BOTH CIN LATCHES
045F 2205 01707           CRWM           CIN=1
0460 0CB1 01708 TELAMPCO  BKBD +1        NS=1     D>     BRANCH IF 1 SEC NOT EXPIRED
0461 0C93 01709           BKBD +3        NRPT=1   E>     BRANCH IF "REPEAT"LEVEL IS LOW.
0462 0002 01710           CKBD           KBST     D<
0463 B939 01711           CALR           M=93-M
0464 9306 01712           BALG +6        M=0      F>     BRANCH IF CODE IS "CODE X"
0465 FAB2 01713           CALH           M=HB     E<     RESTORE RO&RW CIN LATCHES.
0466 1E01 01714           BPRT +1        DB0=1    BR IF RO LIGHT WAS ON
0467 2104 01715           CROM           CIN=0    BR IF RW LIGHT WAS ON
0468 1E11 01716           BPRT +1        DB1=1    G< H>
0469 2204 01717           CRWM           CIN=0
046A 000F 01718           RETN                       H<

046B 2000 01720           CRWM           SRD      F<     RESET WRITE CURRENT
046C 0CC2 01721           BKBD +2        2HZ=1    I>     BRANCH IF 2HZ SQ WAVE IS HIGH
046D 2080 01722           CRWM           SWR             SET WRITE CURRENT
046E BFFF 01723           CALR           M=FF
046F 0402 01724           CKBD           ARDR     I<     SET RW ACTIVE IF M=00
0470 BABF 01725           CALR           M=AB
0471 0202 01726           CKBD           LDR2            LIGHT SCH.REC.PLAY.SKIP.&DUP
0472 BFFF 01727           CALR           M=FF
0473 0102 01728           CKBD           LDR1            LIGHT OTHER KEYTOPS EXCEPT JUST.
0474 0302 01729           CKBD           LDR3          LIGHT"JUST" KEY
0475 B88F 01730           CALR           M=88
0476 2202 01731           CRWM           TNO           LIGHT RW TRACK NO DISPLAY =88
0477 2102 01732           CROM           TNO           LIGHT RO TRACK NO DISPLAY =88
0478 8460 01733           JEPU TELAMPCO

                *FETCHS NEXT SPECIAL TAB STOP PAST PRESENT CARRIER POSITION OR PAST
                **POSITION STORED IN HC. RETURN WITH M=0 INDICATES NO STB SET.
                ***HC

0479 C40B 01740 FESTBCA+  JEPR XFCAHC              TRANSFER CARRIER POSITION TO HC
047A C422 01741 FESTBHC+  JEPR FEXTBHC+         B< FETCH NEXT TAB OR STB
047B 9302 01742           BALG +2        M=0    A> BRANCH IF NO TABS
047C 1A1D 01743           BPRT -2        DB1=0  B> BRANCH IF NORMAL TAB.
047D FAC2 01744 XFM=HC    CALH           M=HC
047E 000F 01745           RETN                  A<

                *SET TAB OR SPECIAL TAB AT CARRIER POSITION OR LOCATION SPECIFIED IN HC
                ***HB,HC
```

```
ADDR CODE NUMBR LABEL    CMND NEXTADDR OPERAND              COMMENT

047F C40B 01751 SESTB&CA JEPR XFCAHC
0480 C521 01752 SESTB&HC JEPR FETBMASK                  FETCH TAB MASK
0481 BC01 01753          CALG          RML              ADJUST TAB MASK FOR STB
0482 0803 01754          JIPU +3                   A>
0483 C40B 01755 SETB&CA  JEPR XFCAHC
0484 9306 01756          BALG +6       M=0         B>
0485 C521 01757 SETB@HC  JEPR FETBMASK                  FETCH TAB MASK
0486 F084 01758          CALH          HB=M        A<   STORE TAB MASK IN HB
0487 C3EB 01759          JEPR SETRADDR                  SET TAB REGISTER ADDRESS
0488 3010 01760          CMEM          MOUT
0489 FB82 01761          CALH          M=M$HB           SET TAB
048A 3008 01762 WRRAM    CMEM          MIN              STORE IN RAM.
048B A888 01763          JEPU SEM=FF               B<

048C B00F 01766 CLDEMVO  CALR          M=00
048D 889A 01767          JEPU MVCRM

                * PRINT CHARACTER . CODE IN G7 . CODE MAY BE ON M. OR PRINTER
                * CODE MAY BE IN G0 & G1

048E 8A72 01773 PRG7     CALG          M=G7        PRINT G7                CE160
048F 1308 01774 PRM      CPRT          RBUP        PRINT M                 CE160
0490 C573 01775          JEPR SEGO1PR
0491 B20F 01776 PRGO1    CALR          M=20
0492 C38F 01777          JEPR XFGO1PR
0493 1CEE 01778          BPRT -1       CHBY=1
0494 1201 01779          CPRT          CHST
0495 000F 01780          RETN

                *  TEST G3   FOR A SPACE OF INDEX CODE. RETURN WITH M=00 IF TRUE

0496 E340 01785 TEG3SPIX JEPR TEMSP
0497 9302 01786          BALG +2       M=0         BRANCH IF SPACE CODE
0498 BA32 01787          CALG          M=G3
0499 B0C9 01788          CALR          M=0C-M
049A A1E8 01789          JEPU CVFF00               RETURN WITH 00 IF INDEX CODE

                *EVALUATE PRECEDENTED TAB . IF TAB COUNTER CLOSED OR AT LEFT MARGIN
                * RETURN IF NOT FIND LAST NON-TAB CHARACTER
                * IN THE BUFFER AND CLEAR OUT ALL THE TAB BETWEEN

049B B0BF 01796 EVPTB    CALR          M=0B        EVALUATE PTB
049C 9071 01797          BALG +1       M-G7=0      BRANCH IF PRECEDENTED TAB
049D A363 01798          JEPU INC TC

049E B01F 01800          CALR          M=01
049F 8E62 01801          CALG          M=M.G6
04A0 9702 01802          BALG +2       (M=0)'      BRANCH IF TAB COUNTER OPEN
04A1 C:55 01803          JEPR TELM
04A2 9301 01804          BALG +1       M=0         BRANCH IF NOT AT LEFT MARGIN
04A3 000F 01805          RETN

04A4 CC6D 01807          JEPR FECHRW-
04A5 B0A9 01808          CALR          M=0A-M
04A6 930D 01809          BALG -2       M=0         BRANCH IF TAB
04A7 CC8C 01810          JEPR FECHRW+
04A8 CC5D 01811          JEPR CLRWEOD
04A9 E30F 01812          JEPR RETC
04AA 8899 01813          JEPU MVCRLM

                * RESET RIGHT FLUSH. TEST FOR PRECEDENTED TAB AND JUSTIFY. EXECUTE TAB
                * CODE PRINT TAB IS CODE PRINT IS ON

04AB C518 01819 TB       JEPR RERF
04AC E38E 01820          JEPR TEMC&J
04AD 9301 01821          BALG +1       M=0         BRANCH NOT MARG. CONT. OR JUSTIFY
04AE C49B 01822          JEPR EVPTB
04AF C58E 01823          JEPR MVCARDE
04B0 C429 01824          JEPR FETBCA+
04B1 C550 01825 MVTAB    JEPR TBCRASH
04B2 B044 01826          CALG          G4=M
04B3 CC6F 01827          JEPR CPPRECPF
04B4 E315 01828          JEPR CLTBCR
04B5 BA42 01829          CALG          M=G4
04B6 889A 01830          JEPU MVCRM

                * TEST H0 FOR  REPEAT CHARACTER . RETURN WITH  M=0 IF  NOT  REPEAT

04B7 000F 01835          RETN

04B8 FA02 01837 TEHORPCH CALH          M=H0        REPEAT TEST
04B9 1A74 01838          BPRT +4       DB7=0
04BA 9A6C 01839          BDAT -3       M=A6        BRANCH IF CHARACTER CORRECT
04BB 9A0B 01840          BDAT -4       M=A0        BRANCH IF TRACK(-)
04BC 9A1A 01841          BDAT -5       M=A1        BRANCH IF TRACK(+)
04BD A887 01842          JEPU CLM

04BE 9878 01844          BDAT -7       M=07        BRANCH IF CARRIAGE RETURN
04BF 9867 01845          BDAT -8       M=06
04C0 988E 01846          BDAT +E       M=08        BRANCH IF PRECEDENTED CARRIAGE RETURN
04C1 98FD 01847          BDAT +D       M=0F        BRANCH IF PRECEDENTED BACKSPACE
04C2 98CC 01848          BDAT +C       M=0C        BRANCH IF INDEX
04C3 98DB 01849          BDAT +B       M=0D        BRANCH IF REVERSE INDEX
```

```
ADDR CODE NUMBR LABEL     CMND NEXTADDR OPERAND              COMMENT

04C4 9A0A 01850           BDAT +A       M=20        BRANCH IF SPACE
04C5 9899 01851           BDAT +9       M=09        BRANCH IF SPECIAL CR
04C6 9DF8 01852           BDAT +8       M=5F        BRANCH IF UNDERLINE
04C7 9AD7 01853           BDAT +7       M=2D        BRANCH IF HYPHEN
04C8 9AE6 01854           BDAT +6       M=2E        BRANCH IF .
04C9 9BE5 01855           BDAT +5       M=3E        BRANCH IF UC .
04CA 9D84 01856           BDAT +4       M=58        BRANCH IF UC X
04CB 9F83 01857           BDAT +3       M=78        BRANCH IF LC X
04CC 99A2 01858           BDAT +2       M=1A        BRANCH IF PRECEDENTED HYPHEN
04CD 9FF1 01859           BDAT +1       M=7F        BRANCH IF PRECEDENTED SPACE
04CE A887 01860           JEPU CLM

04CF 000F 01862           RETN

                *FETCHS TAB REGISTER LOCATION SPECIFIED BY HC

04D0 C3EB 01867 FEXTBHC   JEPR SETRADDR
04D1 1E15 01868           BPRT +5       DB1=1       A>
04D2 1A02 01869           BPRT +2       DB0=0       B>
04D3 3010 01870           CMEM          MOUT
04D4 A7F7 01871           JEPU RML6                       SHIFT DB3&DB2 TO POS DB1 & DB0

04D5 3010 01873           CMEM          MOUT        B<
04D6 000F 01874           RETN

04D7 1E02 01876           BPRT +2       DB0=1       A< C>
04D8 3010 01877           CMEM          MOUT
04D9 A7F9 01878           JEPU RML4                       SHIFT DB5 & DB4 TO POS DB2 & DB0

04DA 3010 01880           CMEM          MOUT          C<
04DB A7FB 01881           JEPU RML2                       SHIFT DB7 & DB6 TO POS DB2 & DB0

                * PRINT CHARACTER SPECIFIED BY THE CODE IN M AND EXECUTE
                * DEFFERED ESCAPEMENT

04DC B034 01887 ESC&PRM   CALG          G3=M        ESC & PRT M              CE190
04DD C52D 01888           JEPR MVCRMCS
04DE BA32 01889           CALG          M=G3
04DF C48F 01890           JEPR PRM
04E0 BA32 01891           CALG          M=G3
04E1 8598 01892           JEPU UPDEM

                *ANKB
                ** ANALYSES KB I/P CODES. BRANCHING TO EXECUTE PRINTER CONTROL CODES. PRIN
                ** FUNCTION CODES. ACTION CODES. PRINTING OF CHARACTERS OR CODES HAVING B7

04E2 842F 01899           JEPU ANKBB7               ANALYSE KB CHAR HAVING B7=1.IE MEDIA CC.

04E3 84AB 01901           JEPU TB                   EXECUTE TAB

04E4 85D4 01903           JEPU CRKB                 EXECUTE CRN

04E5 81BA 01905           JEPU SPKB                 EXECUTE SPA

04E6 BA72 01907 ANKB      CALG          M=G7
04E7 1E7A 01908           BPRT -5       DB7=1       BRANCH IF CHAR IN RH HALF OF CODE MATRIX
04E8 98AA 01909           BDAT -5       M=0A        BRANCH IF TAB
04E9 9889 01910           BDAT -6       M=08        BRANCH IF PREC TAB
04EA 9879 01911           BDAT -6       M=07        BRANCH IF CRN
04EB 9888 01912           BDAT -7       M=08        BRANCH IF PREC CR
04EC 9897 01913           BDAT -8       M=09        BRANCH IF SPECL CR
04ED 9A07 01914           BDAT -8       M=20        BRANCH IF SPA
04EE 9FF6 01915           BDAT -9       M=7F        BRANCH IF PREC SPA
04EF 9864 01916           BDAT -B       M=06
04F0 98C8 01917           BDAT +8       M=0C        BRANCH IF INDEX
04F1 98D6 01918           BDAT +6       M=0D        BRANCH IF REV INDEX
04F2 98E7 01919           BDAT +7       M=0E        BRANCH IF UNIT BS
04F3 98F7 01920           BDAT +7       M=0F        BRANCH IF PREC ES
04F4 9907 01921           BDAT +7       M=10        BRANCH IF FORMAT
04F5 9917 01922           BDAT +7       M=11        BRANCH IF COLMN HDNG
04F6 9927 01923           BDAT +7       M=12        BR IF FIRST LINE FIND
04F7 8230 01924           JEPU ANKB---1

04F8 8366 01926           JEPU RIX                  EXECUTE REV INDEX

04F9 8383 01928           JEPU IX                   EXECUTE INDEX

04FA 8270 01930           JEPU UBS                  EXECUTE UNIT BS

04FB 817A 01932           JEPU BSKB                 EXECUTE PREC BS

04FC 8F85 01934           JEPU FMTMODE              EXECUTE FORMAT

04FD 827C 01936           JEPU SECOLKB

04FE 85C6 01938           JEPU CPFL                 EXECUTE FL CODE PRINT

                *TESTS CONDITIONS REQUIRED FOR BEGINNING OF RIGHT FLUSH COLUMN.
                *RETURN WITH DB1       EQUAL TO A "1" IF OK TO BEGIN FLUSHED PORTION.

04FF 5369 01944           *CHECK WORD*
0500 BAA2 01944 TERF      CALG          M=GA
0501 1E1D 01945           BPRT +D       DB1=1       A>   BR IF PREV DID TAB OR CR
0502 CC55 01946           JEPR TELM
0503 930B 01947           BALG +8       M=0         A>   BR IF AT LEFT MARGIN
```

```
ADDR CODE NUMBR LABEL     CMND NEXTADDR OPERAND              COMMENT

0504 CC6D 01948 TECOL     JEPR FECHRW-
0505 CCBC 01949           JEPR FECHRW+
0506 C3E7 01950           JEPR TEMTBCOL
0507 9705 01951           BALG +5       (M=0)'     B>   BR IF LAST CHAR EXEC WAS NOT TAB
0508 CD5F 01952           JEPR FECHRO-
0509 CCFD 01953           JEPR TEROBLA
050A C3E7 01954           JEPR TEMTBCOL
050B 9302 01955           BALG +2       M=0        C>   BR IF LAST TAB WAS NOT PLAYED.
050C CD44 01956           JEPR FECHRO+
050D A887 01957           JEPU CLM                 B<   NOT IN LEGAL RIGHT FLUSH COLUMN

050E CD44 01959           JEPR FECHRO+             C<
050F BA82 01960           CALG          M=G8       A<
0510 1E57 01961           BPRT +7       DB5=1      D>   BR IF MARGIN CONTROL ON.
0511 BA92 01962           CALG          M=G9
0512 1A35 01963           BPRT +5       DB3=0      D>   BR IF PLAY NOT ON.
0513 1E24 01964           BPRT +4       DB2=1      D>   BR IF JUSTIFY ON.
0514 C421 01965           JEPR FEXTBCA+
0515 1A12 01966           BPRT +2       DB1=0      D>   BR IF NO RIGHT COLM LIMIT.
0516 B02F 01967 SERF      CALR          M=02
0517 A919 01968           JEPU SEGA                     IN LEGAL RIGHT FLUSH COLUMN.

0518 B02F 01970 RERF      CALR          M=02       D<
0519 A91B 01971           JEPU REGA                     NOT LEGAL RIGHT FLUSH COLUMN.

                * TEST TAB COUNTER IN JUSTIFY MODE TO DETERMINE IF A LAB SHOULD
                * BE EXECUTED AT BEGINNING OF LINE.

051A E38E 01977 TETBINS   JEPR TEMC&J              TB INS TEST              CE130
051B 9302 01978           BALG +2       M=0
051C B01F 01979           CALR          M=01
051D 9261 01980           BALG +1       M.G6=0     BR TAB COUNTER OPEN FLAG NOT SET
051E 000F 01981           RETN

051F B20F 01983           CALR          M-20       SET INSERT TAB FLAG
0520 A90B 01984           JEPU SEG6

                *SETS BIT IN M CORRESPONDING TO TAB REGISTER LOCATION SPECIFIED BY
                **B0 & B1 OF H7.

0521 FAC2 01990 FETBMASK CALH          M=HC
0522 B03D 01991           CALR          M=M.03
0523 1E12 01992           BPRT +2       DB1=1      BRANCH PRECEDENTED TAB
0524 1A05 01993           BPRT +5       DB0=0      BRANCH NO TAB
0525 0803 01994           JIPU +3                  C>
0526 1A01 01995           BPRT +1       DB0=0      A< D>
0527 B32F 01996           CALR          M=32            SET M=40 IF DB1=1 & DB0=1
0528 B0BA 01997           CALR          M=M+0B        D< SET M=10 IF DB1=1 & DB0=0
0529 B02A 01998           CALR          M=M+02     C<   SET M=04 IF DB1=0 & DB0=1
052A B01A 01999           CALR          M=M+01     B<   SET M=01 IF DB1=0 & DB0=0
052B 000F 02000           RETN

                * MOVE THE CARRIAGE THE DEFFERED ESCAPEMENT OF G7 OR M

052C BA72 02005 MVCRG7CS CALG          M=G7       EXEC G7 ESC              CE200
052D E206 02006 MVCRMCS   JEPR FEMWIDTH            EXEC M ESCAPE
052E B004 02007           CALG          G0=M
052F B114 02008           CALG          G1=0
0530 C5A3 02009           JEPR ADDE+G10
0531 B8A8 02010           JEPU MVCR+

                *ANFCTKB
                ** ANALYSES KB I/P FOR MODE CODES, MODE MODIFIER CODES AND MEDIA CONTROL C
                ** BRANCHES TO ANPFTCKB TO DECODE PRINTER FORMAT CODES.
                ** USES GP REGS G8

0532 8258 02018           JEPU ANPFTCKB

0533 A479 02020           JEPU TEHDLROK

0534 A763 02022           JEPU SCH TK

0535 BA72 02024 ANFCTKB   CALG          M=G7
0536 1E54 02025           BPRT +4       DB5=1      BRANCH IF CHAR IN COLS A OR B OF CODE MA
0537 B9CF 02026           CALR          M=9C
0538 9171 02027           BALG +1       M>G7       BRANCH IF ERROR
0539 82E5 02028           JEPU SEPSD

053A A887 02030           JEPU CLM

053B 1E46 02032           BPRT -9       DB4=1      BRANCH IF PRINTER FORMAT CODE
053C 9A06 02033           BDAT -9       M=A0       BRANCH IF HDL
053D 9A15 02034           BDAT -A       M=A1       BRANCH IF HDR
053E 9A25 02035           BDAT -A       M=A2       BRANCH IF LSK
053F 9A34 02036           BDAT -B       M=A3       BRANCH IF RSK
0540 9A57 02037           BDAT +7       M=A5       BRANCH IF LCR
0541 9A97 02038           BDAT +7       M=A9       BRANCH IF JST
0542 9AA7 02039           BDAT +7       M=AA       BRANCH IF MGC
0543 9AB7 02040           BDAT +7       M=AB       BRANCH IF REC
0544 9AC7 02041           BDAT +7       M=AC       BRANCH IF REV
0545 9AF7 02042           BDAT +7       M=AF       BRANCH IF ARD
0546 9AE7 02043           BDAT +7       M=AE       BRANCH IF CDP
0547 85A9 02044           JEPU ANFCT--1
```

```
ADDR CODE NUMBR LABEL    CMND NEXTADDR OPERAND          COMMENT

0548 8E90 02046          JEPU LCOR

0549 A7EB 02048          JEPU SEJ

054A 82A1 02050          JEPU SEMC

054B 8A90 02052          JEPU SERC

054C 8BB5 02054          JEPU SERV

054D A2E6 02056          JEPU SW

054E C249 02058          JEPR SEPC
054F 807D 02059          JEPU REKBIDL

                * TEST TAB FOR A STOP POSITION PAST THE CRASH STOP ON THE CARRIER

0550 B80F 02064 TBCRASH  CALR          M=80     HC TAB CRASH EVALUATION
0551 92F3 02065          BALG +3       M.GF=0   TEST 12 PITCH
0552 FAC2 02066          CALH          M=HC
0553 9303 02067          BALG +3       M=0
0554 000F 02068          RETN

0555 B84F 02070          CALR          M=84
0556 D1CB 02071          BALH -4       M>HC     TEST MAXIMUM CARRIER POSITION
0557 B80F 02072 ANTBSTOP CALR          M=80     MAX TB STOP                CE110
0558 92F1 02073          BALG +1       M.GF=0   BRANCH NOT TWELVE PITCH
0559 B9AF 02074          CALR          M=9A
055A B04A 02075          CALR          M=M+04
055B 000F 02076          RETN

                * EXECUTE A STANDARD SPACE ESCAPEMENT

055C E203 02081 SPSTD    JEPR FESTDSP           EXEC STD SP                CE200
055D BC0C 02082 MVCR+2M  CALG          SML      MOVE R 2M                  CE200
055E 88A1 02083          JEPU AJCR+M

                * RECORD CHARACTER AND CODE PRINT, INSERT TAB IF BIT 5 OF G6=1 AND
                * TAB COUNTER IS NOT CLOSED.

055F C93F 02089 RCCHINTB JEPR RCCHCP            CH RECD W TB INS           CE140
0560 B20F 02090 LDTBRW   CALR          M=20     INSERT TABS                CE140
0561 926B 02091          BALG +B       M.G6=0   BRANCH FIRST PRINT CHARACTER FLAG NOT S
0562 E90D 02092          JEPR REG6
0563 B0AF 02093 LDTBRWC  CALR          M=0A
0564 B074 02094          CALG          G7=M
0565 B0FF 02095          CALR          M=0F
0566 BEC2 02096          CALG          M=M.GC
0567 9305 02097          BALG +5       M=0      BR TAB COUNT=0 0
0568 B044 02098          CALG          G4=M
0569 C93F 02099          JEPR RCCHCP
056A BA42 02100          CALG          M=G4
056B B000 02101          CALG          M=M-1
056C 970B 02102          BALG -4       (M=0)'   BR MORE TABS TO DO
056D 000F 02103          RETN

                * FETCH DEFERED ESCAPEMENT FROM H9

056E B0FF 02108 FEDE     CALR          M=0F     FETCH DEFD ESC             CE210
                * TEST CODE OF M FOR COLUMAR DATA
                * RETURN WITH M=00 IF TRUE : M=FF IF FALSE

056F FE92 02112          CALH          M=M.H9
0570 000F 02113          RETN

                *LOADS G0 &G1 WITH DATA REQUIRED BY THE PRINTER TO PRINT THE CHAR ON M
                ***G0,G1,G3

0571 B004 02120          CALG          G0=M
0572 A4A5 02121          JEPU XFG1=M

0573 B034 02123 SEG01PR  CALG          G3=M
0574 C15A 02124          JEPR CVG3TOPC          CONV G3 TO UNIQUE PRINTING CHAR CODE
0575 E1E8 02125          JEPR CVFF00
0576 930A 02126          BALG -5       M=0
0577 1A75 02127          BPFT +5       DB7=0    BRANCH IF CONSTANT SPOKE CHAR
0578 310C 02128          CMEM          APIN
0579 BAB2 02129          CALG          M=GB
057A 3110 02130          CMEM          ALIN
057B 3120 02131          CMEM          XOUT     OUTPUT SPOKE POSITION FOR VARIABLE
057C 0801 02132          JIPU +1
057D C1DA 02133          JEPR XL
057E B004 02134          CALG          G0=M      SPOKE CHAR
057F E235 02135          JEPR FEG3PCWT          FETCH G3 PRINTING CHAR WT IN UNITS.
0580 B014 02136          CALG          G1=M
0581 C56E 02137          JEPR FEDE              FETCH PRINTING CHAR WT OF LAST CHAR.
0582 BFCA 02138          CALR          M=M+FC   SUBTRACT 4
0583 B910 02139          CALG          M=M+G1
0584 E7F7 02140          JEPR RML6
```

```
ADDR CODE NUMBR LABEL     CMND NEXTADDR OPERAND          COMMENT

0585 B014 02141           CALG          G1=M       G1=(WT PREV + WT PRESENT-4)/2 WITH
0586 B800 02142           CALR          M=M.80      LSB & REMAINDER IN  MSB POSITIONS.
0587 B802 02143           CALG          M=M@GO
0588 B004 02144           CALG          GO=M       PLACE LSB OF RIB ADV IN MSB OF GO
0589 E254 02145           JEPR FEG3HF              FETCH HAMMER FORCE IN BITS 2&3 OF M.
058A BB12 02146           CALG          M=M@G1
058B A4A5 02147           JEPU XFG1=M

058C CC96 02150 MVCRCOL   JEPR CANEARCO           MOVE TO COL              CE350
058D 889A 02151           JEPU MVCRM

               * IF DEFERED ESCAPEMENT BIT IN GF IS TRUE : FETCH AND EXECUTE
               * DEFERED ESCAPEMENT

058E B40F 02157 MVCARDE   CALR          M=40      EXEC DEFD ESC            CE210
058F BEF2 02158           CALG          M=M.GF
0590 9305 02159           BALG +5       M=0       BRANCH DEFERRED ESCAPE FLAG NOT SET
0591 E924 02160           JEPR REGF               RESET DEFERRED ESC. FLAG
0592 C56E 02161           JEPR FEDE
0593 B004 02162           CALG          GO=M
0594 E1A1 02163           JEPR FEPITCH
0595 B900 02164           CALG          M=M+GO
0596 88A1 02165           JEPU AJCR+M

               * CALCULATE DEFERED ESCAPEMENT FOR CHARACTER IN G7, STORE IN H9, AND SET
               * DEFERED ESCAPEMENT BIT IN GF

0597 BA72 02171 ADG7DE    CALG          M=G7      G7 UPD DEFD ESC          CE210
0598 E235 02172 UPDEM     JEPR FEMPCWT            M UPD DEFD ESC           CE210
0599 F992 02173 SEDE      CALH          M=M*H9    DEFD ESC=M               CE210
059A B0FD 02174           CALR          M=M.OF
059B F992 02175           CALH          M=M*H9
059C F094 02176           CALH          H9=M
059D B40F 02177           CALR          M=40
059E A926 02178           JEPU SEGF               SET DEFERRED ESC. FLAG

               * ADD DEFERED ESCAPEMENT TO THE CONTENTS OF GO AND G1; ADD SPACE
               * IF DEFERED SPACE BIT SET IN GA

059F BAA2 02184 ADDEFG10 CALG           M=GA
05A0 1A62 02185           BPRT +2       DB6=0     BRANCH DEFERRED SPACE NOT SET
05A1 C3F0 02186           JEPR FESPCS
05A2 E3E3 02187           JEPR ADM+G10
05A3 B40F 02188 ADDE+G10 CALR           M=40      ADD DEFD ESC             CE210
05A4 92F2 02189           BALC +2       M.GF=0    BRANCH DEF. ESC. NOT SET
05A5 C56E 02190           JEPR FEDE
05A6 A3E3 02191           JEPU ADM+G10

05A7 E1A1 02193 SUDEG10   JEPR FEPITCH            SUBTR DEFD ESC           CE210
05A8 A3E6 02194           JEPU SUMG10

               * ANALYZE KEYBOARD INPUT FOR FUNCTIONS; CHECK M FOR
               * CHARACTER CORRECT OR SPACE EXPANDED. CLEAR M IF
               * NOT

05A9 9A62 02201 ANFCT--1 BDAT +2        M=A6      BRANCH IF CHC
05AA 9AD4 02202           BDAT +4       M=AD      BRANCH IF SPA
05AB A887 02203           JEPU CLM                CLEAR M INDICATES ERROR

05AC E0DC 02205           JEPR PACEKB
05AD CF2A 02206           JEPR C CHAR
05AE 807E 02207           JEPU RESTPIDL

               * ANALYZE EXPANDED SPACE FOR AUTO UNDERSCORE FEATURE
               * CHECK FLAG BIT 2 REG. GA

05AF BAA2 02212 ANSPX/US CALG           M=GA
05B0 1E2C 02213           BPRT +C       DB2=1         BR IF AUTO UNDERSCORE
05B1 BAB2 02214           CALG          M=GB
05B2 1E7A 02215           BPRT +A       DB7=1     BR. IF SPACE EXP ON
05B3 BC7F 02216           CALR          M=C7      BOTH MODES OFF
05B4 9075 02217           BALG +5       M-G7=0    BR. IF AUTO-US
05B5 BA82 02218           CALG          M=GB
05B6 1A51 02219           BPRT +1       DB5=0     BRANCH MGC FLAG NOT SET
05B7 8445 02220           JEPU BZERI3

05B8 B80F 02222           CALR          M=80
05B9 A910 02223           JEPU SEGB               SET EXPAND FLAG

05BA CFB2 02225           JEPR USKB
05BB B04F 02226           CALR          M=04
05BC A919 02227           JEPU SEGA               SET LINE UNDERSCORE FLAG

05BD B80F 02229           CALR          M=80      RESET BOTH MODES
05BE E912 02230           JEPR REGB               RST EXPAND FLAG
05BF B04F 02231           CALR          M=04
05C0 E91B 02232           JEPR REGA               RST LINE UNDERSCORE FLAG
05C1 A88B 02233           JEPU SEM=FF

05C2 B40F 02236 CLDE      CALR          M=40      CLEAR DEFD ESC           CE210
05C3 E91B 02237           JEPR REGA               RESET DEFERRED SPACE
05C4 B40F 02238           CALR          M=40
05C5 A924 02239           JEPU REGF               RESET DEFERRED ESCP.
```

```
ADDR CODE NUMBR LABEL     CMND NEXTADDR OPERAND              COMMENT

                 *CODE PRINTS FOR "FIRST LINE FIND" CODE

05C6 BA82 02244 CPFL      CALG           M=G8
05C7 1E61 02245           BPRT +1        DBG=1        A>  BRANCH IF PRINT CONTROL IS ON.
05C8 000F 02246           RETN

05C9 839F 02248           CALR           M=39         A<  39 IS CODE FOR "9"  (USO FL)
05CA 1AD1 02249           BPRT +1        LXL=0        B>  BRANCH IF USO SYSTEM
05CB 855F 02250           CALR           M=55             55 IS CODE FOR "U"
05CC 856B 02251           JEPU ESC&PRM/               B<

                 *MOVE CARRIER FORWARD OR REVERSE ONE SPACE

05CD FAA2 02256 MVCR+1    CALH           M=HA         MOVE TO CARR+1
05CE BF01 02257           CALG           M=M+1
05CF 889A 02258           JEPU MVCRM

05D0 FAA2 02260 MVCR-1    CALH           M=HA         MOVE TO CARR-1
05D1 9301 02261           BALG +1        M=0
05D2 8000 02262           CALG           M=M-1
05D3 889A 02263           JEPU MVCRM

                 * EXECUTE CARRIAGE RETURN FROM KEYBOARD BY MOVING
                 * CARRIAGE TO LEFT MARGIN, EXCUTING AN INDEX, AND INSERTING A
                 * TAB IF JUSTIFY AND TAB COUNTER CLOSED; ALSO CHECK FOR END OF RIBBON.

05D4 0C59 02270 CRKB      BKBD +9        NMRL=1
05D5 CC6F 02271           JEPR CPPRECPF
05D6 B01F 02272           CALR           M=01
05D7 C89A 02273 CR        JEPR MVCRM                  EXEC CR                  CE080
05D8 C383 02274           JEPR IX
05D9 E315 02275           JEPR CLTBCR
05DA C51A 02276           JEPR TETBINS
05DB E960 02277           JEPR CHKEORIB
05DC B01F 02278 RECOL     CALR           M=01
05DD A908 02279           JEPU REG5                   RESET COLUMN CENTER FLAG

                 * EXECUTE AUTOMATIC CARRIAGE RETURN IF CR OR PCR CODE, OR IF MANUAL
                 * MARGIN CONTROL CONVERSION TO CR IS REQUIRED.

05DE E18F 02284 CRAC      JEPR BILL                   EXEC AUTO CR             CE080
05DF 8A72 02285           CALG           M=G7
05E0 9865 02286           BDAT +5        M=06         BRANCH PSCR
05E1 9884 02287           BDAT +4        M=08         BRANCH PCR
05E2 C255 02288           JEPR TELM
05E3 9302 02289           BALG +2        M=0          BRANCH AT LM
05E4 880F 02290           CALR           M=80
05F5 9214 02291           BALG +4        M.G1=0
05E6 C36F 02292           JEPR CPPRECPF
05E7 E30F 02293           JEPR RETC
05E8 E29F 02294           JEPR FELM
05E9 85D7 02295           JEPU CR

05EA B40F 02297           CALR           M=40
05EB 8E62 02298           CALG           M=M.G6
05EC 9709 02299           BALG -6        (M=0)'       BRANCH CENTER FLAG SET
05ED C06F 02300           JEPR CPPRECPF
05EE E0FD 02301           JEPR LKTC
05EF CA1A 02302           JEPR CAINDENT
05F0 85D7 02303           JEPU CR

                 * PRINT THE TWO 4 BIT BINARY CHARACTERS IN G4 IF CODE PRINT ON

05F1 B40F 02308 PR2DIG    CALR           M=40         2 DIGIT PRINT            CE260
05F2 9282 02309           BALG +2        M.G8=0       BRANCH CODE PRINT FLAG NOT SET
05F3 C624 02310           JEPR PRBING4
05F4 1309 02311           CPRT           RBDN
05F5 000F 02312           RETN

                 * CODE PRINT PRECEDENTED HYPHEN IF CODE PRINT FLAG SET IN G8

05F6 B40F 02317 CPPHYPSP  CALR           M=40         PHY/PSP C.P.             CE290
05F7 9282 02318           BALG +2        M.G8=0       BRANCH CODE PRINT NOT SET
05F8 BA72 02319           CALG           M=G7
05F9 99A1 02320           BDAT +1        M=1A         BRANCH IF PHY
05FA 000F 02321           RETN

05FB 8C6C 02323           JEPU PR/

                 * ANALYZE A CHARACTER IN THE AUTO PRINT MODE (REVERSE PRINTING)

05FC C820 02328 ANCHPA    JEPR ANCHPSD
05FD 000F 02329           RETN

                 *TEST IF DATA SHOULD BE INCLUDED IN RIGHT FLUSH COLUMN -RETN M=00 IF TRUE.
                 **G3

05FF 0A72 02335           *CHECK WORD*
0600 98F1 02335           BDAT +1        M=8F         A> C< UPPER CASE PERIOD.
0601 A88B 02336           JEPU SEM=FF                 B<    NOT CO LUMAR DATA

0602 A887 02338           JEPU CLM                    A<    COLUMAR DATA

0603 B034 02340 TEMCOLDA  CALG           G3=M
0604 C496 02341           JEPR TEG35PIX
```

```
ADDR CODE NUMBR LABEL     CMND NEXTADDR OPERAND              COMMENT

0605 930C 02342           BALG -3       M=0             ANY SPACE
0606 8A32 02343           CALG          M=G3
0607 E359 02344           JEPR TEMPCSP
0608 9708 02345           BALG -7       (M=0)'          NOT PRT CHAR
0609 C15A 02346           JEPR CVG3TOPC
060A 1E75 02347           BPRT -A       DB7=1       C>
060B 99A6 02348           BDAT -9       M=1A      A>     PHY
060C 9C05 02349           BDAT -A       M=40      A>     ¢
060D 9D84 02350           BDAT -B       M=5B      A>     1/4
060E 9DC3 02351           BDAT -C       M=5C      A>     1/2
060F 9DF2 02352           BDAT -D       M=5F      D>     UNDERSCORE
0610 9FB5 02353           BDAT +5       M=7B      D>     1/3
0611 9FC4 02354           BDAT +4       M=7C      D>     2/3
0612 9FE3 02355           BDAT +3       M=7E      D>     3/4
0613 BE0D 02356           CALR          M=M.E0
0614 9A02 02357           BDAT +2       M=20      E>     HEX 2X OR 3X
0615 A88B 02358           JEPU SEM=FF             F<    NOT COLUMAR DATA

0616 A887 02360           JEPU CLM                D<    COLUMAR DATA

0617 C15A 02362           JEPR CVG3TOPC           E<
0618 9A1C 02363           BDAT -3       M=21      F>     EXCLAMATION MARK
0619 9A2B 02364           BDAT -4       M=22      F>     "
061A 9A3A 02365           BDAT -5       M=23      F>     #
061B 9A49 02366           BDAT -6       M=24      F>     $
061C 9A58 02367           BDAT -7       M=25      F>     %
061D 9A77 02368           BDAT -8       M=27      F>    APOSTROPHE
061E 9A95 02369           BDAT -9       M=29      F>    )
061F 9AA5 02370           BDAT -A       M=2A      F>    ASTERICK
0620 9BF1 02371           BDAT +1       M=3F      G>     ?
0621 A887 02372           JEPU CLM                     COLUMAR DATA

0622 A88B 02374           JEPU SEM=FF             G<   NOT COLUMAR DATA


                * PRINT THE TWO 4 BIT BINARY CHARACTERS ON M OR IN G4

0623 B044 02379 PRMBIN    CALG          G4=M      BIN 2/3 DIG PRT              CE270
0624 B03F 02380 PRBING4   CALR          M=63      G4 BIN 2/3 DIG PRT           CE270
0625 9142 02381           BALG +2       M>G4      TEST IF GREATER THAN 100
0626 B31F 02382           CALR          M=31      PRINT A ONE
0627 C4DC 02383           JEPR ESC&PRM
0628 BA42 02384           CALG          M=G4
0629 E39D 02385           JEPR DIM/10
062A E39D 02386           JEPR DIM/10
062B BA02 02387           CALG          M=G0
062C E3F6 02388           JEPR CVHXASC
062D C4DC 02389           JEPR ESC&PRM
062E BA42 02390           CALG          M=G4
062F E39D 02391           JEPR DIM/10
0630 BA02 02392           CALG          M=G0
0631 E3F6 02393           JEPR CVHXASC
0632 B4DC 02394           JEPU ESC&PRM


                *PRINT THE BINARY NUMBER ON M IN DECIMAL DIGITS SLASHED

0633 B044 02399 PRMBIN/   CALG          G4=M
0634 B03F 02400           CALR          M=63
0635 9142 02401           BALG +2       M>G4      TEST IF M GREATER THAN 100
0636 B31F 02402           CALR          M=31      IF SO PRINT A ONE
0637 CC6B 02403           JEPR ESC&PRM/
0638 BA42 02404           CALG          M=G4
0639 E39D 02405           JEPR DIM/10
063A E39D 02406           JEPR DIM/10
063B BA02 02407           CALG          M=G0
063C E3F6 02408           JEPR CVHXASC            CONVERT HEX TO ASCII
063D CC6B 02409           JEPR ESC&PRM/
063E BA42 02410           CALG          M=G4
063F E39D 02411           JEPR DIM/10
0640 BA02 02412           CALG          M=G0
0641 E3F6 02413           JEPR CVHXASC            CONVERT TO ASCII
0642 8C6B 02414           JEPU ESC&PRM/


                *UPDATE COUNTERS WHICH KEEP TRACK OF VERTICAL PAPER POSITION FOR PAGE END
                *AND FIRST LINE FIND FEATURES WHEN MOVING PAPER REVERSE.
                ***HO

0643 E2AB 02421 UPLCRVS   JEPR FELCPRE
0644 9303 02422           BALG +3       M=0        A>      BRANCH IF PAGE END NOT SET.
0645 E2AD 02423           JEPR FELCCTR
0646 B"21 02424           CALG          M=M-G2             SUBTRACT VERTICAL MOVEMENT
0647 3008 02425           CMEM          MIN
0648 E2A7 02426           JEPR FEFLPRE             A<
0649 9305 02427           BALG +5       M=0        B>      BRANCH IF FIRST LINE NOT SET
064A F004 02428           CALH          HO=M
064B E2A9 02429           JEPR FEFLCTR
064C 9522 02430           BALG +2       M=M-G2>0     C>    ADJUST COUNT & BR IF RESULT GE 00
064D D"01 02431           BALH +1       M=M+HOC    E<  D>  ADJUST COUNT MODULO FL PRESET #
064E C80E 02432           JIPU -1                  E>
064F F004 02433           CALH          HO=M       B<C<D<
0650 E2A9 02434           JEPR FEFLCTR
0651 FA02 02435           CALH          M=HO
0652 3008 02436           CMEM          MIN                SET FIRST LINE COUNTER TO NEW VAL
0653 804F 02437           CALR          M=04
0654 A43E 02438           JEPU XMG2                        MULT G2 BY 04 IN PREPARATION FOR

                * TEST IF THE POSITION OF CARRIER CORRESPONDS TO THE COLUMN SPECIFIED IN
                * G2
```

```
ADDR CODE NUMBR LABEL     CMND NEXTADDR OPERAND              COMMENT

0655 CA1A 02444 TELM      JEPR CAINDENT              LM TEST                 CE390
0656 B024 02445 TECR=M    CALG          G2=M         M COL TEST              CE390
0657 E0DA 02446           JEPR FE2PCH
0658 E43E 02447           JEPR XMG2
0659 C5A7 02448           JEPR SUDEG10
065A E87D 02449           JEPR NEG G10
065B C59F 02450           JEPR ADDEFG10
065C C3B9 02451           JEPR ADG10CA
065D BA12 02452           CALG          M=G1
065E BB02 02453           CALG          M=M0GO
065F 000F 02454           RETN

          * CODE PRINT CHARACTERS IF IN ACTIVE MODE AND NOT RECORD

0660 CB1E 02459 CPNRC     JEPR UPWRI                 N REC CP                CE240
0661 9704 02460           BALG +4       (M=0)'
0662 E37F 02461 CPG7      JEPR TEACMODE              G7 CODE PRINT           CE240
0663 9303 02462           BALG +3       M=0          BRANCH NO ACTION
0664 B01F 02463           CALR          M=01
0665 9291 02464           BALG +1       M.G9=0       BRANCH DUP NOT SET
0666 000F 02465           RETN

0667 B40F 02467           CALR          M=40
0668 9285 02468           BALG +5       M.G8=0       BRANCH CODE PRINT FLAG NOT SET
0669 C381 02469           JEPR CVG7CP
066A 9303 02470           BALG +3       M=0          BRANCH NOT CODE PRINTED CHARACTER
066B C4DC 02471 ESC&PRM/  JEPR ESC&PRM         .     ESC & PRT M SLASHED     CE240
066C B2FF 02472 PR/       CALR          M=2F         PRINT SLASH
066D C4BF 02473           JEPR PRM
066E 872F 02474           JEPU TPDEFAC

          *CODE PRINT PRECEDENTED CARRIER RETURN, PRECEDENTED TAB, AND SPECIAL
          **CARRIER RETURN.

066F BAB2 02480 CPPRECPF  CALG          M=G8
0670 1A66 02481           BPRT +6       DB6=0        A>    BR IF NOT CODE PRINT
0671 BA72 02482           CALG          M=G7
0672 1E74 02483           BPRT +4       DB7=1          B>
0673 9866 02484           BDAT +6       M=06
0674 9888 02485           BDAT +8       M=0B               BR IF PREC TB
0675 9886 02486           BDAT +6       M=08         D>    BR IF PREC CR
0676 9891 02487           BDAT +1       M=09         E>                SPECIAL CARRIER RETURN
0677 877C 02488           JEPU TPCRRC                A<B<

0678 1ED1 02490           BPRT +1       LXL=1        E< F>    BRANCH IF INTERNATIONAL SYSTEM
0679 B11A 02491           CALR          M=M+11                09+11+14+03+22=53=CODE FOR "S"
067A 0000 02492           NOOP
067B B14A 02493           CALR          M=M+14          F<    09+14+03+22=     42=CODE FOR "U"
067C B03A 02494           CALR          M=M+03       D<       08+03+22=        2D=CODE FOR "-"
067D B22A 02495           CALR          M=M+22       C<       08+22=           2D=CODE FOR "-"
067E C66B 02496           JEPR ESC&PRM/
067F C58E 02497           JEPR MVCARDE
0680 8GF3 02498           JEPU TPCRRCAC

          *CODE PRINT CONVERSTION
          ** LOOKS UP CODE PRINT CHAR CORRESPONDING TO CODE IN G7 AND RETURNS WITH
          **  CHAR ON M. 00 ON M INDICATES CODE DOES NOT CODE PRINT.
          ***  USES GP REG G3

0681 BA72 02506 CVG7CP    CALG          M=G7
0682 B0   02507 CVMCP     CALG          G3=M
0683 E37  02508 CVG3CP    JEPR TEACMODE
0684 9301 02509           BALG +1       M=0          BRANCH IF CHAR NOT FROM MEDIA
0685 B04F 02510           CALR          M=04
0686 BC0A 02511           CALR          M=M+C0
0687 F004 02512           CALH          H0=M         BEGINNING ADDRESS OF C. PC CONV ROM TO H
0688 FA02 02513           CALH          M=H0         START COMPARE TEST LOOP TO SEE IF CHAR
0689 CFDA 02514           JEPR XL
068A 9034 02515           BALG +4       M-G3=0       BRANCH IF CHAR IN G3 REQUIRES CONV
068B E8E9 02516           JEPR INC H0                INCREMENT ADDRESS OF C.P. CONV
068C BD49 02517           CALR          M=D4-M
068D 970A 02518           BALG -5       (M=0)'
068E 000F 02519           RETN                       ...HEX D3. RETURN WITH M=0 INDICATES NO

068F FA02 02521           CALH          M=H0
0690 B33A 02522           CALR          M=M+33
0691 1A72 02523           BPRT +2       DB7=0        BRANCH IF (G2)"GE"HEXCC.(CP USO=CP RANK)
0692 1AD1 02524           BPRT +1       LXL=0        BRANCH IF USO SYSTEM
0693 B14A 02525           CALR          M=M+14       ADJUST ADDRESS TO LOCATION CONTAINING
0694 BE1A 02526           CALR          M=M+E1       ...CONVERTED CODE.
0695 8CDA 02527           JEPU XL

          * CALCULATE THE NEAREST COLUMN TO THE PRESENT CARRIAGE POSITION WHEN
          * IN PORP. SPACE AND NOT ON A 1 UNIT COLUMN.

0696 E1A1 02533 CANEARCO  JEPR FEPITCH               CALC NEAR COL           CE360
0697 F004 02534           CALH          H0=M
0698 E19E 02535           JEPR FEFR
0699 D102 02536           BALH +2       M>H0
069A FAA2 02537           CALH          M=HA
069B 000F 02538           RETN

069C FAA2 02540           CALH          M=HA
069D BF01 02541           CALG          M=M+1
069E 000F 02542           RETN
```

```
ADDR CODE NUMBR LABEL    CMND NEXTADDR OPERAND          COMMENT

                *UPDATE  COUNTERS WHICH KEEP TRACK OF VERTICAL PAPER POSITION FOR PAGE END
                *AND FIRST LINE FIND FEATURES.
                ***HO

069F B12F 02549 UPLCFWD  CALR           M=12
06A0 9073 02550          BALG +3        M-G7=0            BRANCH IF "FIRST LINE FIND" CODE
06A1 E2AD 02551          JEPR FELCCTR
06A2 B920 02552          CALG           M=M+G2            ADD VERTICAL MOVEMENT
06A3 E1DE 02553          JEPR SELCCTR
06A4 E2A7 02554          JEPR FEFLPRE             A<
06A5 9305 02555          BALG +5        M=0       B>      BRANCH IF FIRST LINE NOT SET.
06A6 F004 02556          CALH           HO=M
06A7 E2A9 02557          JEPR FEFLCTR
06A8 B920 02558          CALG           M=M+G2            ADD VERTICAL MOVEMENT
06A9 E1C8 02559          JEPR SEFLCTR             C<      ADJUST COUNT MODULO
06AA D50E 02560          BALH -1        M=M-HO>O  C>      FIRST LINE PRESET NUMBER
06AB B04F 02561          CALR           M=04      B<      MULTIPLY G2  BY 04 IN PREPARATION
06AC A43E 02562          JEPU XMG2                          FOR PRINTER  COMMAND.

                * IF NOT IN JUSTIFY SET GO & G1 EQUAL TO CARRIAGE POSITION IN HA
                * IF IN JUSTIFY EXECUTE A CR IF DEFERED CR FLAG TRUE AND IF IN
                * HELP MODE SET GO & G1 UP FOR HELP PRINTING BEYOND RIGHT MARGIN

06AD 8104 02569 XFCAG10  CALG           GO=0      G1/GO=CARR                 CE370
06AE 8114 02570          CALG           G1=0
06AF B04F 02571          CALR           M=04
06B0 929E 02572          BALG +E        M.G9=0    BRANCH JUSTIFY NOT SET
06B1 BAA2 02573          CALG           M=GA
06B2 1A52 02574          BPRT +2        DB5=0     BRANCH DEFERRED CR FLAG NOT SET
06B3 CA1A 02575          JEPR CAINDENT
06B4 0B07 02576          JIPU +7
06B5 B02F 02577          CALR           M=02
06B6 9258 02578          BALG +8        M.G5=0    BRANCH JUSTIFY HELP NOT SET
06B7 BF0F 02579          CALR           M=F0
06B8 FE92 02580          CALH           M=M.H9
06B9 E7F9 02581          JEPR RML4
06BA B004 02582          CALG           GO=M
06BB FAE2 02583          CALH           M=HE
06BC B024 02584          CALG           G2=M
06BD E0DA 02585          JEPR FE2PCH
06BE A43F 02586          JEPU XMG2+GO

06BF 83B9 02588          JEPU AD#10CA


                *CHECK LINE COUNTER FOR END OF PAGE INDICATION.
                ***HO

06C0 000F 02594          RETN                     A<B<C<

06C1 E2AD 02596 MOLINCTR JEPR FELCCTR
06C2 F004 02597          CALH           HO=M
06C3 E2AB 02598          JEPR FELCPRE
06C4 930B 02599          BALG -4        M=0       A>        BRANCH IF LINE CTR NOT PRESENT.
06C5 D10A 02600          BALH -5        M>HO        B>      BRANCH IF LINE CTR LE PRESET NO.
06C6 B3AF 02601          CALR           M=3A
06C7 D10B 02602          BALH -7        M=M+HOC       C>  BRANCH IF LINE COUNT IS NEGATIVE
06C8 BA92 02603          CALG           M=G9
06C9 1A24 02604          BPRT +4        DB2=0     D.      BRANCH IF NOT JUSTIFY MODE
06CA ECB9 02605          JEPR AJRWBPJ
06CB B00F 02606          CALR           M=00
06CC E1DE 02607          JEPR SELCCTR
06CD A174 02608          JEPU LKM=G9

06CE E2BA 02610          JEPR EVSTOP              D<
06CF 930B 02611          BALG -4        M=0               BRANCH IF STOP BIT NOT SET
06D0 A2BB 02612          JEPU SESTOP


                *        THIS ROUTINE FETCHES THE STANDARD RIGHT AND LEFT MARGIN

06D1 B80F 02617 FESTRM   CALR           M=80      SET MASK TO TEST BIT 7
06D2 92F6 02618          BALG +6        M.GF=0    IS PITCH SET AT 10 OR 12
06D3 0B04 02619          JIPU +4                  IF PITCH SET AT 12 JUMP AHEAD 4 INST.
06D4 B80F 02620 FESTLM   CALR           M=80      SET MASK TO TEST BIT 7
06D5 92F1 02621          BALG +1        M.GF=0    IS PITCH SET AT 10 OR 12
06D6 BF01 02622          CALG           M=M+1     NEXT 4 INST. CALCULATE XLATOR ADDRESS
06D7 BF01 02623          CALG           M=M+1
06D8 BF01 02624          CALG           M=M+1
06D9 B7CA 02625          CALR           M=M+7C
06DA 0011 02626 XL       CKBD           XL=M
06DB 0001 02627          CKBD           M=XL      GATE DATA TO M
06DC 000F 02628          RETN                     RETURN TO MAIN ROUTINE


                *INITIALIZES TO BEGINING OF LINE AND PRINTS FORWARD FOR AUTO
                *PRINT MODE

06DD CC51 02634 PAFWD    JEPR CLRW
06DE CD26 02635          JEPR TEROB1                     READ NEXT BLOCK IF REQD
06DF C77F 02636          JEPR ENDLINPA                   FINISH PRINTING FROM STACK
06E0 9301 02637          BALG +1        M=0       A>     BR IF STOP NOT SET
06E1 E75B 02638          JEPU END PA

06E2 C79C 02640          JEPR CTROTBS             A<     COUNT LEADING TABS
06E3 C7E5 02641          JEPR CRPACR
06E4 B10F 02642          CALR           M=10
06E5 E91D 02643          JEPR REGA                       RESET REVERSE PRINT FLAG
06E6 CD39 02644 PAFWDC   JEPR FECH                       FETCH CHAR TO BE PRINTED .
```

```
ADDR CODE NUMBR LABEL     CMND NEXTADDR OPERAND              COMMENT

06E7 E861 02645           JEPR XFH10C47
06E8 E335 02646           JEPR TEMCR
06E9 9703 02647           BALG +3        (M=0)'      BRANCH NOT CARRIAGE RETURN
06EA C7C6 02648           JEPR CRPAIX
06EB 885C 02649           JEPU TEHAY

06EC 000F 02651           RETN

06ED 88DF 02653           CALR           M=8D        BRANCH IF TRANSFER STOP CODE
06EE 9070 02654           BALG -2        M-G7=0
06EF C5FC 02655           JEPR ANCHPA                B<   EXECUTE CHARACTER
06F0 C0AD 02656           JEPR MO
06F1 C940 02657           JEPR RCCH
06F2 86E6 02658           JEPU PAFWDC                     LOOP TO EXECUTE NEXT CHARACTER

                * TEST CODE IN G7 FOR CARRIAGE RETURN OR PRECEDENTED CARRIAGE RETURN,
                * IF TRUE TEST FOR RECORD OR ACTIVE

06F3 E33C 02664 TPCRRCAC JEPR TE7CRPCR               TP CR REC/ACTIVE
06F4 9301 02665           BALG +1        M=0
06F5 000F 02666           RETN

06F6 8734 02668           JEPU TPRCAC

                * SET COL CENT BIT IF NOT IN MARGIN CONTROL OR JUSTIFY.

06F7 E38E 02673 SECOL     JEPR TEMC&J
06F8 9301 02674           BALG +1        M=0         A>  BRANCH IF NOT MARGIN CONT OR JUSTIFY
06F9 000F 02675           RETN

06FA B01F 02677           CALR           M=01        A<
06FB A906 02678           JEPU SEC5

                * SET PRINT FROM RIGHT TO LEFT FLAG BIT 4 GA

06FC B10F 02683 SERP      CALR           M=10
06FD A919 02684           JEPU SEGA

                * UPDATE DEFERED ESCAPEMENT IF G7 CODE IS PRINTING CHARACTER

06FF 71B5 02689           *CHECK WORD*
0700 BA72 02689 AUDEHO    CALG           M=G7        HO UPD ESC
0701 E358 02690           JEPR TEMPC
0702 9709 02691           BALG +9        (M=0)'      BRANCH IF PRINT CHARACTER
0703 C56E 02692           JEPR FEDE
0704 B004 02693           CALG           GO=M
0705 BA72 02694           CALG           M=G7
0706 E235 02695           JEPR FEMPCWT
0707 B900 02696           CALG           M=M+GO
0708 B004 02697           CALG           GO=M
0709 BA72 02698           CALG           M=G7
070A C598 02699           JEPR UPDEM
070B A3F4 02700           JEPU XFM=GO

070C AB87 02702           JEPU CLM

070D 000F 02705           RETN

                * IF POWER PRINT CLEAR TAB COUNTER IF NOT JUSTIFY AND EXECUTE
                * CARRIAGE RETURN IF DEFERED CR FLAG TRUE AND END LINE POWER PRINT

070E BAA2 02710 FIN PA    CALG           M=GA
070F 1A3D 02711           BPRT -2        DB3=0       BRANCH PRINT-AUTO NOT SET
0710 BA92 02712           CALG           M=G9
0711 1E21 02713           BPRT +1        DB2=1       BRANCH IF JUSTIFY
0712 E30C 02714           JEPR CLTC
0713 C7E5 02715           JEPR CRPACR
0714 877F 02716           JEPU ENDLINPA

                *PSD
                ** SUPERVISES PLAY/SKIP/DUP MODE EXECUTION
                * PUTS SYSTEM IN DEDICATED PRINT MODE IF IN PLAY, NOT REVISE,
                * NOT RECORD, NOT CODE PRINT, NOT MARGIN CONTROL

0715 BA82 02725 SEPA      CALG           M=G8
0716 B70D 02726           CALR           M=M.70
0717 9301 02727           BALG +1        M=0         A>   BR IF NOT MGC,REV, NOR CODE PRINT
0718 8445 02728           JEPU BZERI3                B<

0719 BA92 02730           CALG           M=G9        A<
071A 1A3D 02731           BPRT -2        DB3=0       B>   BR IF NOT PLAY
071B 1E5C 02732           BPRT -3        DB5=1       B>   BR IF RECORD
071C 2BDB 02733           BACM -4        ACT=0
071D BAA2 02734           CALG           M=GA
071E 1E29 02735           BPRT -6        DB2=1       BRANCH LINE UNDERSCORE
071F B08F 02736           CALR           M=08
0720 E919 02737           JEPR SEGA                  SET PRINT-AUTO
0721 B08F 02738           CALR           M=08
0722 E310 02739           JEPR SEG8                  SET AUTO FLAG
0723 BC4F 02740           CALR           M=C4
0724 3084 02741           CMEM           A2IN
0725 BC6F 02742           CALR           M=C6
0726 300A 02743           CMEM           MINI             INIT PRT STACK INPUT POINTER
```

```
ADDR CODE NUMBR LABEL    CMND NEXTADDR OPERAND            COMMENT

0727 300A 02744          CMEM          MINI         INIT PRT STACK OUTPUT POINTER
0728 B00F 02745          CALR          M=00     C<
0729 300A 02746          CMEM          MINI         CLEAR PRINT STACK
072A 3050 02747          CMEM          AOUT
072B BF09 02748          CALR          M=FO-M
072C 970B 02749          BALG -4       (M=0)'
072D CC51 02750          JEPR CLRW
072E A3B5 02751          JEPU TEACMED

              * EXECUTE TRACK PRINT IF NOT RECORD AND ACTIVE MODE

072F B40F 02756 TPDEFAC  CALR          M=40     TP DEF NREC & ACT         CE410
0730 925B 02757          BALG +B       M.G5=0   BRANCH DEFERRED TP NOT SET
0731 E908 02758          JEPR REG5
0732 E394 02759 TPAC     JEPR TERVRC            TP NREC & ACT             CE410
0733 9708 02760          BALG +8       (M=0)'   BRANCH IF REVISE OR RECORD
0734 E394 02761 TPRCAC   JEPR TERVRC            TP REC/ACT                CE410
0735 9302 02762          BALG +2       M=0      BRANCH NOT REVISE OR RECORD
0736 E2A3 02763 TPRW     JEPR FETNRW            RW T.P.
0737 8741 02764          JEPU TP

0738 B08F 02766          CALR          M=08
0739 9292 02767          BALG +2       M.G9=0   BRANCH PLAY NOT SET
073A E37F 02768          JEPR TEACMODE
073B 9701 02769          BALG +1       (M=0)'   BRANCH IF ACTIVE MODE
073C 000F 02770          RETN

              * FETCH ACTIVE TRACK NUMBER, DECREMENT BY 1, AND EXECUTE TRACK
              * PRINT

073D E497 02775 TPA1     JEPR FFACBNO
073E E321 02776          JEPR DEC M3CD
073F 8741 02777          JEPU TP

              * TRACK PRINT IF DEFERED TP BIT IN REG G5=1, PRINT TRACK NUMBER
              * BETWEEN BRACKETS  (TN)

0740 000F 02783          RETN

0741 B044 02785 TP       CALG          G4=M
0742 B40F 02786          CALR          M=40
0743 928C 02787          BALG -3       M.G8=0   BRANCH CODE PRINT NOT ON
0744 BA42 02788          CALG          M=G4·
0745 E3EB 02789          JEPR CVMBCDBI
0746 B044 02790          CALG          G4=M
0747 B40F 02791          CALR          M=40
0748 E906 02792          JEPR SEG5              SET CODE PRINT FLAG
0749 C755 02793          JEPR TELM
074A 9302 02794          BALG +2       M=0
074B B40F 02795          CALR          M=40
074C E908 02796          JEPR REG5              RESET DEFERRED TRACK PRINT
074D B28F 02797          CALR          M=28
074E C4DC 02798          JEPR ESC&PRM
074F C024 02799          JEPR PRBING4
0750 B29F 02800          CALR          M=29
0751 C4DC 02801          JEPR ESC&PRM
0752 B40F 02802          CALR          M=40
0753 9252 02803          BALG +2       M.G5=0
0754 E908 02804          JEPR REG5
0755 81FC 02805          JEPU MVINDLM

0756 000F 02807          RETN

              *MOVE CARRIER TO END OF LINE AND PRINT LINE REVERSE

0757 C77F 02812 HAYOK    JEPR ENDLINPA           FINISH PRINTING FROM STACK
0758 9305 02813          BALG +5       M=0      A>  BR IF STOP FLAG NOT SET
0759 CC51 02814          JEPR CLRW
075A C786 02815          JEPR AJROLNST           ADJUST ROB TO START OF LINE
075B E30C 02816 END PA   JEPR CLTC              CLEAR TAB COUNTER
075C C7E5 02817          JEPR CRPACR
075D 807D 02818          JEPU REKBIDL

075E B10F 02820          CALR          M=10     A<
075F E919 02821          JEPR SEGA               SET LEFT PRINT FLAG
0760 EB70 02822          JEPR XFH45H01
0761 EB67 02823          JEPR XFH01G01           FETCH LINE END (LP START) POSITION
0762 CE8D 02824          JEPR MVRWHZ            MOVE TO NEW START PRINT POSITION.
0763 CC6D 02825 PARVSC   JEPR FECHRW-           FETCH NEXT CODE TO BE EXECUTED
0764 9702 02826          BALG +2       (M=0)'   B>  BR IF NOT END OF LINE.
0765 C7C6 02827          JEPR CRPAIX
0766 8CDD 02828          JEPU PAFWD              PRINT NEXT LINE FORWARD

0767 E861 02830          JEPR XFH10G47          B<
0768 E2CD 02831          JEPR FEG7ACWT          C<
0769 9703 02832          BALG +3       (M=0)'   D>  BR IF ACCENT CODE
076A C5FC 02833          JEPR ANCHPA                CONTINUE ANALYSIS OF PRESENT CODE
076B C0AD 02834          JEPR MO
076C 8763 02835          JEPU PARVSC                FETCH & ANALYZE NEXT CODE

076D C48E 02837          JEPR PRG7              D<  PRINT ACCENT
076E 8763 02838          JEPU PARVSC                FETCH & ANALYZE NEXT CODE

              * IF G7 IS CR OR PCR RETURN
              * IF NOT CHECK FOR REV OR REC, IF NOT RETURN
```

```
ADDR CODE NUMBR LABEL     CMND NEXTADDR OPERAND              COMMENT

               * IF RECORD OR REVICE. CHECK FIRST CHARACTER IN RW BUFFER. IF ITS NOT A
               * FORMAT CODE THE EXECUTE A TRACK PRINT.

076F E33C 02846 TPRC      JEPR TE7CRPCR              TP NCR REC
0770 9304 02847           BALG +4          M=0
0771 E394 02848           JEPR TERVRC
0772 9302 02849           BALG +2          M=0       BRANCH NOT REVISE OR RECORD
0773 B01F 02850           CALR             M=01
0774 9291 02851           BALG +1          M.G9=0    BRANCH NOT DUP
0775 000F 02852           RETN

0776 B00F 02854           CALR             M=00      FETCH 1ST
0777 3004 02855           CMEM             AOIN      CHAR IN THE
0778 3010 02856           CMEM             MOUT      RW BUFFER
0779 8109 02857           CALR             M=10-M
077A 930A 02858           BALG -5          M=0       BRANCH IF FORMAT CODE
077B 8736 02859           JEPU TPRW

               * EXECUTE TRACK PRINT IF G7= CR AND RECORD TRUE

077C E33C 02863 TPCRRC    JEPR TE7CRPCR              TP CR REC
077D 93C3 02864           BALG -C          M=0
077E 0C0F 02865           RETN

               * IF POWER PRINT AUTO EMPTY PRINTER STACK AND THEN EVALUATE STOP
               * CONDITIONS. IF NOT PPA EVALUATE STOP CONDITIONS ONLY

077F BAA2 02871 ENDLINPA CALG              M=GA
0780 1A33 02872           BPRT +3          DB3=0     BRANCH AUTO NOT SET
0781 C0AD 02873           JEPR MO
0782 E39A 02874           JEPR TEPRTSTK
0783 970C 02875           BALG -2          (M=0)'    BRANCH SOMETHING IN PRINT STACK
0784 E960 02876           JEPR CHKEOR1B
0785 A2BA 02877           JEPU EVSTOP

               *ADJUST READ ONLY BUFFER POINTER BACK TO BEGINNING OF LINE
               *(BEGINNING OF BUFFER OR CARRIAGE RETURN CODE)

0786 CD5F 02883 AJROLNST JEPR FECHRO-                B<
0787 CD5F 02884           JEPR FECHRO-
0788 9302 02885           BALG +2          M=0       A>    BR IF BEGINNING OF BUFFER
0789 E335 02886           JEPR TEMCR
078A 970C 02887           BALG -3          (M=0)'    B<    BR IF NOT CARRIAGE RETURN CODE
078B 8D44 02888           JEPU FECHRO+               A<

               *CALCULATE STARTING CARRIER POSITION TO LEFT PRINT DATA IN
               *RW BUFFER

078C CC56 02894 CALPST    JEPR AJRWST
078D CA1A 02895           JEPR CAINDENT
078E 8000 02896           CALG             M=M-1
078F 8F0E 02897           JEPU CARWHZM                  ADD RW DATA WIDTH TO INDENTED LM-1.

               *COUNT LEADING TABS IN RO BUFFER

0790 E30C 02902 CTROTBS   JEPR CLTC
0791 CCEC 02903 CTROTBSC JEPR FERO+
0792 C39E 02904           JEPR TEMTB
0793 9702 02905           BALG +2          (M=0)'    BRANCH NO TAB
0794 E369 02906           JEPR INC TCC
0795 8791 02907           JEPU CTROTBSC

0796 8D06 02909           JEPU AJRO-

               *CALCULATES  BEGINNING POSITION OF RIGHT FLUSH COLUMN & MOVES THERE IF REQ
               ****GO

0797 000F 02915           RETN

0798 3D0E 02917 MVRFLUSH BPRT -1           XLX=1     BRANCH TRANSLATOR IN
0799 BA52 02918           CALG             `M=G5
079A 1A03 02919           BPRT +3          DB0=0     BRANCH COL CENT FLAG NOT SET
079B C504 02920           JEPR TECOL
079C 1A1A 02921           BPRT -5          DB1=0     BRANCH NOT OK TO BEGIN FLUSHED PORTION
079D 8701 02922           JEPU MVCRCOLU

079E C500 02924           JEPR TERF
079F 1A17 02925           BPRT -8          DB1=0     BRANCH NOT OK TO BEGIN FLUSH
07A0 E10E 02926           JEPR CLH4-H7
07A1 CD5F 02927           JEPR FECHRO-
07A2 CD44 02928           JEPR FECHRO+               C<
07A3 C003 02929           JEPR TEMCOLDA
07A4 9707 02930           BALG +7          (M=0)'    C>    BR IF NOT COLUMAR DATA
07A5 E8F4 02931           JEPR INC H6                      COUNT CHAR TO BE FLUSHED
07A6 BA32 02932           CALG             M=G3
07A7 CE2A 02933           JEPR CAMCSCEN
07A8 E5F8 02934           JEPR ADCSH54                     ACCUMULATE WIDTH OF DATA
07A9 080B 02935           JIPU -7                    D>
07AA CD5F 02936           JEPR FECHRO-               E<    REALIGN RO BUFFER
07AB E8F6 02937           JEPR DEC H6
07AC FA62 02938           CALH             M=H6      C<
07AD 970C 02939           BALG -3          (M=0)'    E>    BR IF RO NOT YET REALIGNED
07AE E870 02940           JEPR XFH45H01
07AF E867 02941           JEPR XFH01G0I                    TOTAL WIDTH TO G10
```

```
ADDR CODE NUMBR LABEL     CMND NEXTADDR OPERAND             COMMENT

0780 8B02 02942           CALG          M=M¢G0
0781 9701 02943           BALG +1       (M=0)'     F>   BR IF TOTAL WIDTH NOT ZERO
0782 000F 02944           RETN

0783 C59F 02946           JEPR ADDEFG10
0784 C577 02947           JEPR SUDEG10
0785 EB70 02948           JEPR NEG G10             F<   NEGATIVE OF G10 TO G10
0786 C479 02949           JEPR FESTBCA+                 FETCH END OF COLUMN.
0787 B000 02950           CALG          M=M-1
0788 B024 02951           CALG          G2=M
0789 E01A 02952           JEPR FE2PCH
078A E400 02953           JEPR XMG2+G10                 G10 IS POSITION OF START COL PRINT
078B E874 02954           JEPR XFG01H45
078C 1E75 02955           BPRT -A       DB7=1
078D CCAD 02956           JEPR XFCAG10
078E E870 02957           JEPR XFH45H01
078F E874 02958           JEPR XFG01H45
07C0 E867 02959           JEPR XFH01G01                 G10 IS AGAIN POS OF START COL PRINT
07C1 E870 02960           JEPR XFH45H01                 H10 IS PRESENT CARRIER POSITION
07C2 E884 02961           JEPR COG10H10                 COMPARE G10 WITH H10
07C3 9301 02962           BALG +1       M=0        G>   BR  IF G10 IS LESS THAN H10
07C4 86AD 02963           JEPU MVCRG10                  MOVE TO G10

07C5 000F 02965           RETN


                * DETERMINES IF UNDERSCORE CHARACTER IN G7. INCREMENTS THE BILL COUNTER.
                * CLOSES TAB COUNTER. CLEARS BUFFER OF TABS AND CR. TEST FOR TABS TO
                * BE INSERTED IN JUSTIFY. INDEXES PAPER. AND SETS DEFERED CR FLAG.

07C6 B07F 02972 CRPAIX    CALR          M=07
07C7 B074 02973           CALG          G7=M
07C8 C0B2 02974           JEPR ANG7US
07C9 E193 02975           JEPR BILLC
07CA E0FD 02976           JEPR LKTC
07CB E315 02977           JEPR CLTBCR
07CC C51A 02978           JEPR TETBINS
07CD C5DC 02979           JEPR RECOL
07CE C383 02980           JEPR IX
07CF B20F 02981           CALR          M=20
07D0 A919 02982           JEPU SEGA                SET DEFERRED CR FLAG


                *MOVE CARRIER TO BEGINNING OF COLUMN HEADING IF REQUIRED.
                **H0,H1,H4,H5,G0,G1,G2

07D1 E10E 02988 MVCRCOLU  JEPR CLH4-H7
07D2 CD5F 02989           JEPR FECHR0-
07D3 9803 02990           JIPU +3
07D4 FAC2 02991           CALH          M=H0         C<
07D5 CE24 02992           JEPR CAMCSCEN
07D6 E5F8 02993           JEPP ADCSH54
07D7 CD44 02994           JEPR FECHR0+               A>   BEGIN LOOP TO CALC CONS SPACE
07D8 9302 02995           BALG +2       M=0          B>   BRANCH OUT OF LOOP IF END OF DATA.
07D9 CE87 02996           JEPR TEMCENBP
07DA 9709 02997           BALG -6       (M=0)'       C>   BRANCH IF NOT END OF COL HEADING.
07DB CD67 02998           JEPR AJROTOTB              B<   REALIEN BUFFER TO BEGIN OF COLUMN.
07DC E870 02999           JEPR XFH45H01
07DD E3C9 03000           JEPR SHH10R                     DIVIDE TOTAL CS BY 2.
07DE E867 03001           JEPR XFH01G01
07DF B202 03002           CALG          M=M¢G0
07E0 9701 03003           BALG +1       (M=0)'       D>   BRANCH IF CS NOT EQUAL 0.
07E1 000F 03004           RETN

07E2 EB70 03006           JEPR NEG G10               D<   NEGATE CONSUMED SPACE /2
07E3 CF6A 03007           JEPR CACOLCEN                   COLUMN CENTER TO G2.
07E4 8F81 03008           JEPU MVCRCENC                   COMPLETE COMPUTATION & MOVE


                * IF DEFERED CR FLAG TRUE, EXECUTE CR AND RESET FLAG

07E5 B20F 03013 CRPACR    CALR          M=20
07E6 9242 03014           BALG +2       M.GA=0     A>   BR IF NO DEF'D CR.
07E7 E916 03015           JEPR REGA
07E8 81FC 03016           JEPU MVINDLM

07E9 000F 03018           RETN                     A<


                * TEST FOR CENTER FLAG FALSE AND PLAY TRUE. THEN ANALYZE CHARACTER
                * IN G7 FOR CONVERSION IN MARGIN CONTROL. TEST KEYBOARD STACK FOR NEW
                * ENTRY AND EXECUTE DEFERED TRACK PRINT IF NOT

07EA B40F 03025 LDASPSD   CALR          M=40       AUTO PSD RETN            CF040
07EB 9261 03026           BALG +1       M.G6=0     BRANCH CENTER NOT SET
07EC 000F 03027           RETN

07ED 508F 03029           CALR          M=08
07EE 9290 03030           BALG -2       M.G9=0     BRANCH PLAY NOT SET
07EF CAFB 03031           JEPR ANG7MZ
07F0 E0C0 03032 TEKSPSD   JEPR TEKS
07F1 9102 03033           BALG +2       (M=0)'
07F2 0002 03034           RNOP
07F3 8E2F 03035           JEPU TPDEFAC
07F4 B144 03036           CALG          G4=0
07F5 B074 03037           CALG          G7=M
07F6 8000 03038           JEPU AJKS+1
```

```
ADDR CODE NUMBR LABEL     CMND NEXTADDR OPERAND            COMMENT

                 * ANALYZE FOR A HYPHEN IN TEXT ZONE IN MARGIN CONTROL. IF M=O
                 * WHEN RETURN THEN PLACE THE CR OR SCR IN G7 ON KEYBOARD STACK

07F7 C9D3 03044 ANHYTZMC JEPR ANHY
07F8 9301 03045          BALG +1          M=0
07F9 8901 03046          JEPU ANECSTOP                B<

07FA E30F 03048          JEPR RETC
07FB BA72 03049 XFG7STK  CALG             M=G7
07FC A113 03050          JEPU XFMKS                       XFER CR/SCR TO KB STACK

                 * CONTROL RAOUTINE FOR PLAY, SKIP AND DUPLICATE MODES

07FE 3201 03055          *ADJUST WORD*
07FF B748 03055          *CHECK WORD**
0800 B02F 03055 PSD      CALR             M=02
0801 BE52 03056          CALG             M=M.G5
0802 9704 03057          BALG +4          (M=0)'      BRANCH IF MGC SC SET
0803 3D01 03058          BPRT +1          XLX=1       BR. IF XLATOR PRESENT
0804 CB7C 03059          JEPR ANKBAC
0805 CB0F 03060          JEPR FECHPSD
0806 EE61 03061          JEPR XFH10G47
0807 C0AD 03062          JEPR MO
0808 C964 03063          JEPR ANMDPSD
0809 C.C1 03064          JEPR MOLINCTR
080A E2BA 03065          JEPR EVSTOP
080B 9307 03066          BALG -8          M=0         BRANCH NO STOP CONDITION
080C E2CD 03067          JEPR FEG7ACWT
080D 9705 03068          BALG -A          (M=0)'
080E 000F 03069          RETN                         ...IS NOT SET

                 *FECHPSD
                 **SUPERVISES ROUTINES FOR FETCHING DATA FROM RO BUFFER. ANALYSES DATA
                 **IN HO AND DETECTS CR,PCR.
                 *** USES GP REGS HO.G5

080F CD39 03077 FECHPSD  JEPR FECH
0810 3D0D 03078          BPRT +B          XLX=1
0811 E2C0 03079          JEPR SKSPTBAJ
0812 B07F 03080          CALR             M=07
0813 D009 03081          BALH +9          M-HO=0      BRANCH IF CHAR IN HO IS CR
0814 B08F 03082          CALR             M=08
0815 D005 03083          BALH +5          M-HO=0      BRANCH IF CHAR IN HO IS PCR
0816 CCEC 03084          JEPR FERO+
0817 CD06 03085          JEPR AJRO-
0818 9702 03086          BALG +2          (M=0)'      BRANCH IF (M=0)' ON RETN FROM RO TEST
0819 B40F 03087          CALR             M=40
081A E9C6 03088          JEPR SEG5                    SET DEFD.TP BIT IN G5
081B FA02 03089          CALH             M=HO
081C 000F 03090          RETN

081D C732 03092          JEPR TPAC
081E CD06 03093          JEPR AJRO-
081F 8D39 03094          JEPU FECH

                 *ANCHPSD
                 ** ANALYSES CHARACTERS IN PLAY. SKIP OR DUP MODES. BRANCHES ACCORDING TO
                 ** WHETHER CHARACTER IS PRINTING OR NON-PRINTING

0820 C798 03101 ANCHPSD  JEPR MVRFLUSH
0821 CDB2 03102          JEPR ANG7US
0822 E355 03103          JEPR TEG7PCSP
0823 9707 03104          BALG +7          (M=0)'      BRANCH PC OR SP
0824 B04F 03105          CALR             M=04
0825 92A4 03106          BALG +4          M.GA=0      BRANCH LINE UNDERSCORE NOT SET
0826 B7FF 03107          CALR             M=7F
0827 BE72 03108          CALG             M=M.G7
0828 B074 03109          CALG             G7=M
0829 E82C 03110          JEPR CLHE9
082A 8915 03111          JEPU PRCH

082B CD91 03113          JEPR ANAUTUS
082C 898A 03114          JEPU ANNPCPSD

                 * ANALYSES CARRIAGE RETURN IN TEXT ZONE OF MARGIN CONTROL MADE
                 * REPLACE CR WITH SPACE IF IN TEXT ZONE

082D 0002 03120 ANCRTZMC RNOP                         TZ CR                 CG070
082E E0FD 03121          JEPR LKTC
082F CD?? 03122          JEPR TEROB1
0830 B0B9 03123          CALR             M=OB-M      TEST FOR PTB
0831 9307 03124          BALG +7          M=0         BRANCH PRECEDENTED TAB
0832 E2E0 03125          JEPR SKSP1BRO
0833 CD06 03126          JEPR AJRO-
0834 CEB0 03127          JEPR TEMCRCE
0835 9303 03128          BALG +3          M=0         BRANCH NOT CENTERING BREAKPOINT
0836 C9C0 03129          JEPR ANNPCEC
0837 B20F 03130          CALR             M=20        SET G7 TO SPACE CODE
0838 A865 03131          JEPU XFG7=M

0839 A30F 03133          JEPU RETC

                 * ANALYZE THE CODE IN G7 FOR PUNC. CHARACTER. TRANSFER TO STACK IF
                 * TRUE. IF NEXT CODE IS CARRIAGE RETURN REPLACE WITH A SPACE
```

```
ADDR CODE NUMBR LABEL    CMND NEXTADDR OPERAND          COMMENT

083A CB90 03139 ANPUNCTZ JEPR TEG7PUNC                  TZ PUNCT TEST                 CG120
083B 9701 03140          BALG +1      (M=01)'           BRANCH IF PUNCTUATION
083C A171 03141          JEPU RETN1

083D E113 03143          JEPR XFMKS
083E CD50 03144          JEPR FECHRO+&
083F 9A2D 03145          BDAT -2      M=22              BRANCH IF DOUBLE QUOTES
0840 E2C0 03146          JEPR SKSPTBAJ
0841 E335 03147          JEPR TEMCR
0842 9702 03148          BALG +2      (M=0)'            BRANCH NOT CARR RET
0843 B20F 03149          CALR         M=20              PUT A SPACE IN STACK
0844 E113 03150          JEPR XFMKS
0845 BD31 03151          JEPU AJROBG7

                 * IF NOT IN CODE PRINT TEST FOR TRACK PRINT. IF IN CODE PRINT
                 * TEST KEYBOARD STACK, ANALYZE CHARACTER AND PLACE IN BUFFER

0846 BA92 03157 TPHYCR   CALG         M=G8
0847 1A65 03158          BPRT +6      DB6=0             BRANCH CODE PRINT NOT SET
0848 E9CD 03159          JEPR TEKS
0849 9304 03160          BALG +4      M=0               BRANCH CHARACTER NOT IN KEY STACK
084A E15D 03161          JEPR AJKS+1
084B 8074 03162          CALG         G7=M
084C C820 03163          JEPR ANCHPSO
084D C55F 03164          JEPR RCCHINTB
084E 8732 03165          JEPU TPAC

                 * TEST FOR MEDIA TRANSLATOR NOT IN. IF REVISE AND PLAY CHECK FOR
                 * DUMP OF BUFFER. TEST FOR AN EDIT STOP CONDITION IF NONE.
                 * BUZZ. IF IN REVISE READ THE NEXT CHARACTER IN THE BUFFER

084F E37C 03172 FEDA     JEPR TEXLX
0850 810F 03173          CALR         M=10
0851 9286 03174          BALG +6      M.G8=0            BRANCH NOT REVISE
0852 803F 03175          CALR         M=08
0853 9291 03176          BALG +1      M.G9=0            BRANCH NOT PLAY
0854 8BC7 03177          JEPU TEDUMPRV

0855 B02F 03179          CALR         M=02
0856 9262 03180          BALG +2      M.G6=0            BRANCH STOP CONDITION NOT MET
0857 81E5 03181          JEPU BZSK

0858 BADD 03183          JEPU RDFWD3

0859 E152 03185          JEPR BZERROR
085A 81E6 03186          JEPU SESKDLY

                 * TEST IF NEXT LINE SHOULD BE PRINTED REVERSE (LEFT PRINTED)

085B 8CDD 03191          JEPU PAFWD

085C CD26 03193 TEHAY    JEPR TEROB1                         FETCH NEXT BLOCK IF REQUIRED
085D F1C4 03194          CALH         HC=0
085E C47A 03195          JEPR FESTBHC+
085F 970B 03196          BALG -4      (M=01)'
0860 CC51 03197          JEPR CLRW
0861 C790 03198          JEPR CTROTBS                        COUNT LEADING TABS IN NEXT LINE
0862 CD44 03199 TEROHAY  JEPR FECHRO+
0863 E861 03200          JEPR XFH10G47
0864 E335 03201          JEPR TEMCR
0865 9305 03202          BALG +5      M=0          A>        BR IF END OF LINE  (CR)
0866 E3B1 03203          JEPR TEG7HAY
0867 9301 03204          BALG +1      M=0          B>        BR IF OK TO PRINT CHAR BACKWARDS
0868 887A 03205          JEPU HAYWIRE                        LINE CAN'T BE PRINTED REVERSE

0869 C95D 03207          JEPR XFG74RW              B<        STORE CHAR(S) IN RW BUFFER
086A 8862 03208          JEPU TEROHAY                        LOOP TO TEST NEXT CODE

086B C78C 03210          JEPR CALPST               A<        CALCULATE LEFT PRINT START POINT
086C E874 03211          JEPR XFG01H45
086D E0DA 03212          JEPR FE2PCH
086E E49D 03213          JEPR DIG1/M
086F BA12 03214          CALG         M=G1                   G1=LEFT PRINT START COLUMN
0870 D541 03215          BALH +1      M=M-HA>0     C>        BR IF CARRIER TO LEFT OF LP  START
0871 8757 03216          JEPU HAYOK                     F<   OK TO LEFT PRINT (LP)

0872 8004 03218          CALG         G0=M         C<        G0=CARRIER DISTANCE FROM LP START
0873 CA1A 03219          JEPR CAINDENT                       CALCULATE LEFT EXTREMITY OF LINE
0874 8C14 03220          CALG         G1=M                   G1=LP END
0875 FAA2 03221          CALH         M=HA                   HA=PRESENT CARRIER POSITION
0876 9511 03222          BALG +1      M=M-G1>0     D>        BR IF CARRIER TO RT OF LP END
0877 0801 03223          JIPU +1                   E>
0878 9108 03224          BALG -7      M>G0         D< F>     BR IF CARRIER CLOSER TO LP START
0879 CD5F 03225          JEPR FECHRO-              E<
087A C786 03226 HAYWIRE  JEPR AJROLNST                       ADJUST ROB TO START OF LINE
087B 8.DD 03227          JEPU PAFWD                          PRINT AUTO FORWARD

                 *ANKBAC
                 ** ANALYSES ENTRIES FROM THE KB IN PLAY/SKIP/DUP MODES IN ORDER TO
                 *  DETECT ACTION KEY OPERATIONS

087C C2DD 03234 ANKBAC   JEPR TEKB
087D 8074 03235          CALG         G7=M              TRANSFER INPUT CHARACTER TO G7
087E C249 03236          JEPR SEPC
```

```
ADDR CODE NUMBR LABEL     CMND NEXTADDR OPERAND           COMMENT
087F BA72 03237           CALG          M=G7
0880 BAA9 03238           CALR          M=AA·M
0881 9307 03239           BALG +7       M=0         BRANCH IF MGC KEY
0882 B08F 03240           CALR          M=08
0883 9294 03241           BALG +4       M.G9=0      BRANCH IF NOT IN PLAY MODE
0884 B03F 03242           CALR          M=03
0885 B872 03243           CALG          M=M'.G7
0886 B1C9 03244           CALR          M=1C·M
0887 9307 03245           BALG +7       M=0         BRANCH IF ACTION KEY
0888 000F 03246           RETN

0889 B20F 03248           CALR          M=20
088A 9281 03249           BALG +1       M.G8=0      BRANCH IF NOT IN MARGIN CONTROL
088B 82A1 03250           JEPU SEMC

088C B08F 03252           CALR          M=08
088D 9299 03253           BALG -6       M.G9=0      BRANCH IF NOT IN PLAY MODE
088E 82A1 03254           JEPU SEMC

088F 832A 03256           JEPU SEACTION


                    *TEST CODE IN G7 FOR PUNC. CHARACTER IF TRUE
                    * RETURN WITH M NOT EQUAL TO ZERO.

0890 BA72 03262 TEG7PUNC CALG           M=G7        G7 PUNCT TEST          CG130
0891 9A16 03263           BDAT +6       M=21·       BRANCH IF !
0892 9BA5 03264           BDAT +5       M=3A        BRANCH IF :
0893 9BE4 03265           BDAT +4       M=3E        BRANCH IF UC .
0894 9BF3 03266           BDAT +3       M=3F        BRANCH IF ?
0895 99E2 03267           BDAT +2       M=1E        BRANCH IF PARA
0896 9AE1 03268           BDAT +1       M=2E        BRANCH IF LC .
0897 A887 03269           JEPU CLM

0898 000F 03271           RETN


                    * THIS ROUTINE MOVES THE CARRIER FORWARDS AND REVERSE; ENTRY POINTS FOR
                    * MOVING TO LEFT MARGIN, MOVING DISTANCE SPECIFIED ON M, MOVING
                    * DISTANCE SPECIFIED BY G0 AND G1

0899 E29F 03278 MVCRLM   JEPR FELM                  MOVE TO LM
089A B104 03279 MVCRM    CALG           G0=0        MOVE TO M              CE010
089B B024 03280 MVCRM+FR CALG           G2=M        MOVE TO M + FRACT      CE010
089C E1A1 03281           JEPR FEPITCH
089D BC00 03282           CALG          SML
089E E43F 03283           JEPR XMG2+G0
089F C5C2 03284           JEPR CLDE
08A0 080C 03285           JIPU +C
08A1 B114 03286 AJCR+M   CALG           G1=0        SHORT MOVER.           CE010
08A2 B004 03287           CALG          G0=M
08A3 0804 03288           JIPU +4
08A4 B01F 03289 MVCR-INC CALR           M=01        1 INCR LEFT
08A5 B114 03290 AJCR-M   CALG           G1=0        SHORT MOVE L           CE010
08A6 B004 03291           CALG          G0=M
08A7 E87D 03292 MVCR-    JEPR NEG G10               MOVE LEFT              CE010
08A8 C2F9 03293 MVCR+    JEPR ADDESP
08A9 BAA2 03294           CALG          M=GA
08AA 1A41 03295           BPRT +1       DB4=0
08AB E87D 03296           JEPR NEG G10
08AC C3B9 03297           JEPR ADG10CA
08AD B06F 03298 MVCRG10  CALR           M=06        MOVE TO G1/G0          CE010
08AE F014 03299           CALH          H1=M
08AF B31F 03300           CALR          M=31
08B0 F004 03301           CALH          H0=M
08B1 E8B4 03302           JEPR COG10H10
08B2 9302 03303           BALG +2       M=0         BRANCH G1,G0<H1,H0
08B3 E92F 03304           JEPR TENEG
08B4 E8C3 03305           JEPR DEC G0
08B5 E87D 03306           JEPR NEG G10
08B6 C3B9 03307           JEPR ADG10CA
08B7 B08F 03308           CALR          M=08
08B8 9212 03309           BALG +2       M.G1=0      BRANCH NOT NEGATIVE MOVEMENT
08B9 E87D 03310           JEPR NEG G10
08BA 8350 03311           JEPU MVCR

08BB BB12 03313           CALG          M=M⊕G1
08BC B014 03314           CALG          G1=M
08BD B07D 03315           CALR          M=M.07
08BE BBC2 03316           CALG          M=M⊕G0
08BF 970A 03317           BALG -5       (M=0)'
08C0 000F 03318           RETN


08C1 B01F 03321           CALR          M=01
08C2 BE62 03322           CALG          M=M.G6
08C3 9706 03323           BALG +6       (M=0)'      BRANCH TAB COUNTER OPEN
08C4 CD39 03324           JEPR FECH
08C5 E8E1 03325           JEPR XFH10G47
08C6 9A0A 03326 ANG7MCLM BDAT -5        M=20        BRANCH IF SPACE
08C7 E335 03327           JEPR TEMCR
08C8 9301 03328           BALG +1       M=0         BRANCH SOME TYPE CR
08C9 000F 03329           RETN

08CA A16F 03331           JEPU RETN3


                    * IF NOT IN JUSTIFY RECORD RW BUFFER AND EXECUTE TRACK PRINT

08CB B04F 03336 SERCOFF  CALR           M=04        REC OFF SETUP          CH015
08CC 9291 03337           BALG +1       M.G9=0      BRANCH NOT JUSTIFY
08CD 000F 03338           RETN
```

```
ADDR CODE NUMBR LABEL    CMND NEXTADDR OPERAND          COMMENT

08CE BA3E 03340          JEPU RC&TPRWB

                 * ANALYSES CHARACTER IN G7 FOR CARRIAGE RETURN ON SPECIAL CARRIAGE
                 * RETURN. IF FOUND SET BOTH EC STOP CONDITION MET AND POTENTIAL
                 * PARAGRAPH STOP IN G6

08CF E334 03347 ANG7PAEC JEPR TEG7CR
08D0 9706 03348          BALG +6       (M=0)'      BRANCH NO CR
08D1 E345 03349          JEPR TEG7CRSC
08D2 9702 03350          BALG +2       (M=0)'      BRANCH NOT CR OR SCR
08D3 B08F 03351          CALR          M=08
08D4 9261 03352          BALG +1       M.G6=0      BRANCH NOT POTENTIAL PARA STOP
08D5 B0AF 03353          CALR          M=0A
08D6 A90B 03354          JEPU SEG6                 SET POTENTIAL PARA STOP AND STP COND ME

08D7 B0B9 03356          CALR          M=0B-M
08D8 9302 03357          BALG +2       M=0         BRANCH PRECEDENTED TAB
08D9 C90B 03358          JEPR REPPSTOP
08DA BFAF 03359          CALR          M=FA
08DB 808A 03360          CALR          M=M+08
08DC 9261 03361          BALG +1       M.G6=0
08DD 8900 03362          JEPU SEECSTOP

08DE 000F 03364          RETN

                 * ANALYSES CHARACTER IN G7 IN MARGIN ZONE MODE OF MARGIN CONTROL. IF
                 * A BREAK POINT CHARACTER IS DELECTED INSERT A CARRIAGE RETURN
                 * IF NOT TEST FOR SETTING OF SINGLE CYCLE MODE.

08DF C9F2 03371 ANCHMZC  JEPR TEG7MZBP             CONT MZ                    CG050
08E0 9701 03372          BALG +1       (M=0)'      BRANCH NOT MARGIN ZONE BREAKPOINT
08E1 8A06 03373          JEPU LOCRKS

08E2 E2BA 03375          JEPR EVSTOP
08E3 9301 03376          BALG +1       M=0         BRANCH NO STOP
08E4 000F 03377          RETN

08E5 B0FF 03379          CALR          M=0F
08E6 BEF2 03380          CALG          M=M.GF
08E7 B014 03381          CALG          G1=M
08E8 BA02 03382          CALG          M=G0
08E9 9114 03383          BALG +4       M>G1
08EA CD50 03384          JEPR FECHRO+&
08EB C9F2 03385          JEPR TEG7MZBP
08EC 9708 03386          BALG -7       (M=0)'      BRANCH NOT MARGIN ZONE BREAKPOINT
08ED 8D2D 03387          JEPU AJROGO-

08EE CD2D 03389          JEPR AJROGO-
08EF CD31 03390          JEPR AJROBG7
08F0 B02F 03391          CALR          M=02
08F1 E906 03392          JEPR SEG5                 SET MARGIN CONTROL SINGLE CYCLE
08F2 A170 03393          JEPU RETN2

                 * WRITE 00 OR FF WHEN WRITE REGISTER IS READY

08F3 B00F 03398 WR00     CALR          M=00
08F4 0801 03399          JIPU +1
08F5 BFFF 03400 WRFF     CALR          M=FF        WRITE FF                   CH050
08F6 2E2F 03401 WRM      BRWM -0       WDB=1       WRITE M                    CH050
08F7 2220 03402          CRWM          WR=M
08F8 CB8E 03403          JEPR UPLRC
08F9 8103 03404          JEPU MOKB&CRD

                 *ADJUST RW BUFFER POINTER REVERSE

08FA F0B4 03409 AJRW-    CALH          HB=M        SAVE M REGISTER
08FB E8CE 03410          JEPR DEC GD               DECRIMENT POINTER
08FC 0008 03411          JEPU AFM=HB

                 *            FETCH PREVIOUS CHARACTER OUT OF RW BUFFER

08FD E8CE 03416 FERW-    JEPR DEC GD               DECRIMENT POINTER
08FE 8BE0 03417          JEPU FERW                 AND FETCH CHAR

08FF 0678 03420          *CHECK WORD*
0900 000F 03420          RETN

                 * TEST CHARACTER IN G7 FOR STOP CONDITION FOR PRESENT OPERATING MODE
                 * OF SYSTEM (WORD,LINE,PARAGRAPH) IF STOP CHARACTER SET
                 * SET EDIT CONTROL STOP MET FLAG

0901 B07F 03426 ANECSTOP CALR          M=07        EC STOPS                   CG010
0902 928D 03427          BALG -2       M.G8=0      BRANCH NOT PARA.LINE OR WORD
0903 E357 03428          JEPR TEG7PC
0904 9301 03429          BALG +1       M=0
0905 89C0 03430          JEPU ANNPCEC

0906 E33F 03432          JEPR TEG7SP
0907 930D 03433          BALG -2       M=0         BRANCH IF SPACE
0908 B04F 03434          CALR          M=04
0909 E90B 03435          JEPR SEG6                 SET 1ST CHARACTER FLAG
090A 1E12 03436          BFRT +2       DB1=1       BRANCH STOP COND MET FLAG SET
090B B08F 03437 REPPSTOP CALR          M=08        RESET PP STOP              CG010
090C A90D 03438          JEPU REG6                 RESET POTENTIAL PARA STOP FLAG
```

```
ADDR CODE NUMBR LABEL    CMND NEXTADDR OPERAND          COMMENT

              * SET EDIT CONTROL STOP IF NOT IN MARGIN CONTROL OR JUSTIFY HELP

090D BA52 03442 SEECSTOP CALG          M=G5
090E B02D 03443          CALR          M=M.02
090F 970C 03444          BALG -3       (M=0)'
0910 E2BB 03445          JEPR SESTOP
0911 CD5F 03446          JEPR FECHRO-
0912 9071 03447          BALG +1       M-G7=0
0913 8D50 03448          JEPU FECHRO+&

0914 A171 03450          JEPU RETN1

              *ESCAPES, PRINTS CHARACTER IN G7,& UPDATES DEFFERRED ESCAPEMENT.

0915 BA32 03455 PRCH     CALG          M=G9
0916 1E31 03456          BPRT +1       DB3=1       BR. IF PLAY
0917 000F 03457          RETN

0918 E33F 03459 PR&MVG7  JEPR TEG7SP
0919 9701 03460          BALG +1       (M=0)'            BRANCH IF NOT SPACE CODE
091A 8929 03461          JEPU SP                         JUMP TO "SPACE" ROUTINE

091B BA72 03463          CALG          M=G7        B>
091C E1E8 03464          JEPR CVFF00               BRANCH FF RECORDED ON MEDIA
091D 9309 03465          BALG -6       M=0
091E C52D 03466          JEPR MVCRMCS                    MOVE CARRIER TO NEXT PRINT POS.
091F C48E 03467          JEPR PRG7                 PRINT CODE DESIGNATED IN G7.
0920 C5F6 03468          JEPR CPPHYPSP             CODE PRINT IF PREC HY OR PREC SP.
0921 C5C2 03469          JEPR CLDE                       CLEAR DEFERRED ESCAPEMENT
0922 E2CD 03470          JEPR FEG7ACWT                   FETCH WEIGHT IF ACCENT
0923 9701 03471          BALG +1       (M=0)'      D>    BRANCH IF ACCENT
0924 8597 03472          JEPU ADG7DE                     SET DEFERRED ESCAPEMENT

0925 9B71 03474          BDAT +1       M=07        D<  E> BRANCH IF WEIGHT=07
0926 000F 03475          RETN                      A<C<

0927 B02F 03477          CALR          M=02        E<
0928 8BA5 03478          JEPU AJCR-M                     AJ CARRIER TO CENTER OF STD CHAR.

              * IF AUTO UNDERSCORE AND DEFERED SPACE FLAG SET EXECUTE SPACE.
              * IF G7 CONTAIN A SPACE CODE (20) EXECUTE SPACE.
              * CODE PRINT THE SPACE IF CODE PRINT BIT 6 IN G8=1

0929 B04F 03485 SP       CALR          M=04
092A 92A4 03486          BALG +4       M.GA=0      BRANCH LINE UNDERSCORE NOT SET
092B BA72 03487          CALG          M=G7
092C 99F2 03488          BDAT +2       M=1F        BRANCH IF AUTO
092D B7FF 03489          CALR          M=7F        BRANCH IF PRECEDENTED SPACE
092E B074 03490          CALG          G7=M
092F BA72 03491          CALG          M=G7
0930 B034 03492          CALG          G3=M
0931 9A0A 03493          BDAT +A       M=20        BRANCH IF SPACE
0932 9FF2 03494          BDAT +2       M=7F        BRANCH IF PRECEDENTED SPACE
0933 E200 03495          JEPR FEG3WT
0934 855D 03496          JEPU MVCR+2M

0935 B40F 03498          CALR          M=40
0936 928C 03499          BALG -3       M.G8=0      BRANCH CODE PRINT NOT SET
0937 C52C 03500          JEPR MVCRG7CS
0938 B2DF 03501          CALR          M=2D        PUT HYPHEN CODE IN M
0939 C48F 03502          JEPR PRM
093A CC6C 03503          JEPR PR/
093B 8597 03504          JEPU ADG7DE

093C 83E0 03506          JEPU SPC

              * SET DUMP BIT IF IN REVISE, RESET CENTERING BIT IF G7 CONTAINS A
              * CHARACTER WHICH DEFINES THE END OF CENTERED TEXT, CODE PRINT G7 IF
              * CODE PRINT ON, RECORD CHARACTER, IF REVISE TEST DUMP BIT, IF NOT
              * ANALYZE AUTOMATIC UNDERSCORE.

093D E2C7 03514 RCCHKB   JEPR SEDUMPRV             RECORD CHARACTER FROM KEYBOARD
093E E2B4 03515          JEPR RECENIF
093F CC62 03516 RCCHCP   JEPR CPG7                 RECORD CHARACTER
0940 C95D 03517 RCCH     JEPR XFG74RW              RECORD CHARACTER WITHOUT CODE PRINT
0941 E397 03518          JEPR TERV
0942 9301 03519          BALG +1       M=0         BRANCH NOT REVISE
0943 8BEC 03520          JEPU RCCHRV

0944 CB30 03522 TEG7DPJ  JEPR TEDUMP               JUSTIFY DUMP TEST
0945 9701 03523          BALG +1       (M=0)'      BRANCH IF DUMP
0946 000F 03524          RETN

0947 CD91 03526          JEPR ANAUTUS
0948 8AF5 03527          JEPU DUMP&FCH

              *              TEXT ZONE

              * ANALYSES CODE IN G7 IN TEXT ZONE MARGIN CONTROL
              * TEST FOR PRESEDENTED HYPHEN, HYPHEN, CR, SCR, TAB, PCR AND
              * PUNCTUATION

0949 E113 03536          JEPR XFMKS                TRANSFER M TO KEYBOARD STACK
094A 87F7 03537          JEPU ANHYTZMC
```

```
ADDR CODE NUMBR LABEL     CMND NEXTADDR OPERAND             COMMENT

0948 C97B 03539 ANG7MCTZ JEPR ANMCZONE             ***TEXT ZONE START*** ANALYZE MC ZONE
094C 0002 03540          RNOP
094D BA72 03541          CALG           M=G7
094E 99AA 03542          BDAT -5        M=1A       BRANCH ON PHY CODE 1A
094F 9ADA 03543          BDAT -5        M=2D       BRANCH ON HYP CODE 2D
0950 E346 03544          JEPR TEMCRSCR
0951 9701 03545          BALG +1        (M=0)'     BRANCH IF NOT A CR CODE 07 OR SCR 09
0952 882D 03546          JEPU ANCRTZMC             CR IN TEXT ZONE ANALYSIS

0953 BA72 03548          CALG           M=G7
0954 1E73 03549          BPRT +3        DB7=1
0955 9865 03550          BDAT +5        M=06       BRANCH IF PSCR
0956 9884 03551          BDAT +4        M=08       BRANCH IF PCR
0957 98A1 03552          BDAT +1        M=0A       BRANCH IF TAB
0958 883A 03553          JEPU ANPUNCTZ             TEXT ZONE PUNCT. TEST

0959 B01F 03555          CALR           M=01
095A 9261 03556          BALG +1        M.G6=0     BRANCH IF TAB COUNTER CLOSED
095B A171 03557          JEPU RETN1

095C A170 03559          JEPU RETN2


                * PLACE CHARACTER IN G7 INTO RW BUFFER. IF SECOND
                * CHARACTER NECESSARY INSERT G4 INTO BUFFER

095D BA72 03565 XFG74RW  CALG           M=G7
095E CC30 03566          JEPR INRW+
095F E282 03567          JEPR TEM2CH
0960 9702 03568          BALG +2        (M=0)'     BRANCH NO SECOND CHARACTER
0961 BA42 03569          CALG           M=G4
0962 89FD 03570          JEPU INDATRW+

0963 000F 03572          RETN


                *ANMDPSD
                ** MONITORS STATUS OF PLAY/DUP. MAINTAINS LOOPING VIA ANCHPSD AND
                ** RCHINTB SUBROUTINES WHILST PLAY/DUP SET. BRANCHES WHEN PLAY DUP
                ** RESET TO MONITOR AUTO STATUS AND, IF AUTO ON, LOOKS FOR NRS CHAR.

0964 E109 03580 ANMDPSD  JEPR CLKBKSRG
0965 B20F 03581          CALR           M=20
0966 9281 03582          BALG +1        M.G8=0     BRANCH IF MGC OFF
0967 C7EA 03583          JEPR LDASPSD
0968 C901 03584          JEPR ANECSTOP
0969 C820 03585          JEPR ANCHPSD
096A B09F 03586          CALR           M=09
096B 9293 03587          BALG +3        M.G9=0     BRANCH IF NOT IN PLAY OR DUP
096C C55F 03588          JEPR RCCHINTB
096D C7FD 03589          JEPR TEKSPSD
096E 0809 03590          JIPU -6
096F E2C7 03591          JEPR SEDUMPRV
0970 B05F 03592          CALR           M=C8
0971 9282 03593          BALG +2        M.G8=0     BRANCH IF AUTO OFF
0972 B6EF 03594          CALR           M=8E
0973 9071 03595          BALG +1        M-G7=0     BRANCH IF STOP CHARACTER
0974 000F 03596          RETN

0975 A2BB 03598          JEPU SESTOP


                * WRITE THE NUMBER OF FF CODES AS SPECIFIED BY H1. RETURN WITH
                * M=00

0976 F014 03604 WRMNOOPS CALH           H1=M       WRITE M NOOPS              CH050
0977 C8F5 03605          JEPR WRFF
0978 E8F1 03606          JEPR DEC H1
0979 970D 03607          BALG -2        (M=0)'
097A 000F 03608          RETN


                * IF AT LEFT MARGIN ALALYZE G7 FOR MARGIN CONTROL AT LEFT MARGIN. IF IN
                * MARGIN ZONE TOGGLE THE SINGLE CYCLE BIT.

097B C555 03614 ANMCZONE JEPR TELM                 MGC ANAL                   CG080
097C 9702 03615          BALG +2        (M=0)'     BRANCH NOT AT LEFT MARGIN
097D BA72 03616          CALG           M=G7
097E 88C6 03617          JEPU ANG7MCLM

097F E139 03619          JEPR TERM
0980 9214 03620          BALG +4        M.G1=0
0981 B02F 03621          CALR           M=02
0982 9256 03622          BALG +6        M.G5=0     BRANCH NOT MARG CONTROL
0983 CE4A 03623          JEPR RESC
0984 A16E 03624          JEPU RETN4

0985 0002 03626          RNOP
0986 B02F 03627          CALR           M=02
0987 9251 03628          BALG +1        M.G5=0
0988 8B3F 03629          JEPU SC

0989 000F 03631          RETN


                *ANNPCPSD
                ** ANALYSES NON-PRINT CHARACTERS IN PLAY.SKIP.DUP. IF CHAR IS RPT OR EJT
                ** TESTS FOR DUP AUTO. BRANCHES ACCORDING TO WHETHER CHAR IS MEDIA CONTROL
                ** CODE/LINE SPACE CODE OR A PRINTER FUNCTION CODE.
```

```
ADDR CODE NUMBR LABEL     CMND NEXTADDR OPERAND          COMMENT

098A BA72 03639 ANNPCPSD CALG          M=G7
098B B109 03640          CALR          M=10-M
098C 9702 03641          BALG +2       (M=0)'     BRANCH IF CHAR NOT FMT
098D 0002 03642          RNOP
098E A11E 03643          JEPU ANFMT               PROCESS FORMAT COMMAND

098F B879 03645          CALR          M=87-M
0990 930A 03646          BALG +A       M=0        BRANCH TO DUP AUTO TEST IF CHAR IS RPT
0991 B039 03647          CALR          M=03-M
0992 9308 03648          BALG +8       M=0        BRANCH TO DUP AUTO TEST IF CHAR IS EJT
0993 B08F 03649          CALR          M=08
0994 9295 03650          BALG +5       M.G9=0     BRANCH AND RETURN IF PLAY NOT SET
0995 BA72 03651 ANNPCJ   CALG          M=G7
0996 1E71 03652          BPRT +1       DB7=1      BRANCH IF CHAR IS MEDIA CC OR LS CODE
0997 A051 03653          JEPU ANG7PFPJ            ANALYSE & EXECUTE PEC'S

0998 1309 03655          CPRT          RBDN
0999 89AD 03656          JEPU ANG7CCPJ            ANALYSE & EXECUTE CC'S OR LS CODES

099A 000F 03658          RETN

099B B08F 03660          CALR          M=08
099C 9286 03661          BALG -9       M.G8=0     BRANCH IF AUTO NOT SET
099D B01F 03662          CALR          M=01
099E 9294 03663          BALG -B       M.G9=0     BRANCH IF DUP  NOT SET
099F E4B0 03664          JEPR EJRO
09A0 C940 03665          JEPR RCCH
09A1 E4B5 03666          JEPR EJRW
09A2 B07C 03667          JEPU BZI3

                *ANG7CCPJ
                ** ANALYSES G7 FOR MEDIA CONTROL CODES AND PRINTER LINE SPACE CODES
                ** IN PLAY AND JUSTIFY.

09A3 B40F 03674          CALR          M=40
09A4 E91F 03675          JEPR SEGB                SET GB B6, RETURN AND
09A5 B80F 03676          CALR          M=80
09A6 A921 03677          JEPU REGB                RESET GB B7  (LS1 SET)

09A7 BC0F 03679          CALR          M=C0
09A8 A921 03680          JEPU REGB                RESET GB B6 & B7  (LSX SET)

09A9 B80F 03682          CALR          M=80
09AA E91F 03683          JEPR SEGB                SET GB B7, RETURN AND
09AB B40F 03684          CALR          M=40
09AC A921 03685          JEPU REGB                RESET GB B6  (LS2 SET)

09AD 9815 03687 ANG7CCPJ BDAT -A       M=01
09AE 9828 03688          BDAT -7       M=02       BRANCH IF CHAR IS LSX
09AF 9839 03689          BDAT -6       M=03       BRANCH IF CHAR IS LS2
09B0 9887 03690          BDAT +7       M=08       BRANCH IF CHAR IS SWR
09B1 9897 03691          BDAT +7       M=09       BRANCH IF CHAR IS RPT
09B2 98C7 03692          BDAT +7       M=0C       BRANCH IF CHAR IS EJT
09B3 98D7 03693          BDAT +7       M=0D       BRANCH IF CHAR IS HLT
09B4 98E7 03694          BDAT +7       M=0E       BRANCH IF CHAR IS NRS
09B5 98F1 03695          BDAT +1       M=0F       BRANCH IF CHAR IS TRL
09B6 A171 03696          JEPU RETN1

09B7 000F 03698          RETN

09B8 A427 03700          JEPU SWPLAY

09B9 A47F 03702          JEPU RPPLAY

09BA A470 03704          JEPU EJPLAY

09BB A2BB 03706          JEPU SESTOP

09BC E397 03708          JEPR TERV
09BD 970D 03709          BALG -2       (M=0)'
09BE C960 03710          JEPR CPNRC
09BF A170 03711          JEPU RETN2

                * ANALYSES CHARACTER IN G7 FOR STOP CHARACTRER IN WORD LINE,
                * OR PARAGRAPH MODE. IF FOUND SET EC STOP CONDITION MET FLAG

09C0 B01F 03717 ANNPCEC  CALR          M=01       NON-PR EC STOP          CG020
09C1 9287 03718          BALG +7       M.G8=0     BRANCH WORD NOT SET
09C2 9262 03719          BALG +2       M.G6=0     BRANCH TAB COUNTER NOT OPEN
09C3 B0AF 03720          CALR          M=0A
09C4 907A 03721          BALG +A       M-G7=0     BRANCH IF TAB
09C5 B04F 03722          CALR          M=04
09C6 9266 03723          BALG +6       M.G6=0     BRANCH 1ST PRINT CHARACTER NOT SET
09C7 B02F 03724 SEPCSTOP CALR          M=02       SET STOP CONDITION MET FLAG
09C8 A90B 03725          JEPU SEG6

09C9 B02F 03727          CALR          M=02
09CA 9283 03728          BALG +3       M.G8=0     BRANCH LINE NOT SET
09CB E334 03729          JEPR TEG7CR
09CC 930A 03730          BALG -5       M=0        BRANCH NOT CR
09CD 000F 03731          RETN

09CE 88CF 03733          JEPU ANG7PAEC

09CF B02F 03735          CALR          M=02
09D0 9261 03736          BALG +1       M.G6=0     BRANCH STOP CONDITION NOT MET
09D1 890D 03737          JEPU SEECSTOP
```

```
ADDR CODE NUMBR LABEL     CMND NEXTADDR OPERAND            COMMENT

09D2 89C7 03739           JEPU SEPCSTOP     .

                *ANALYZES DATA FOLLOWING HYPHEN FOR CONVERSION IN MARGIN CONTROL TEXT
                *ZONE   CR FOLLOWING HYPHEN IS SKIPPED EXCEPT AT END OF PARAGRAPH.

09D3 CD39 03745 ANHY      JEPR FECH
09D4 8099 03746           CALR          M=09-M
09D5 9308 03747           BALG +8       M=0          BRANCH IF SCR
09D6 8029 03748           CALR          M=02-M
09D7 9303 03749           BALG +3       M=0          BRANCH IF HYPHEN
09D8 C002 03750           RNOP
09D9 FA02 03751 AJRO-/HO  CALH          M=HO
09DA 8D32 03752           JEPU AJROBM

09DB C846 03754           JEPR TPHYCR
09DC 807F 03755           CALR          M=07
09DD F004 03756           CALH          HO=M
09DE E864 03757           JEPR XFHOG7
09DF E0FD 03758 ANCRMC    JEPR LKTC
09E0 CD26 03759           JEPR TEROBI                   FETCH NEXT CHAR & ADJ BEHIND IT
09E1 1E73 03760           BPRT +3       DB7=1
09E2 98B1 03761           BDAT +1       M=0B         BRANCH IF PRECEDENTED TAB
09E3 8E80 03762           JEPU TEMCRCE

09E4 A887 03764           JEPU CLM

09E5 000F 03766           RETN

                * RECORD POST AMBLE CHARACTERS: CARRIAGE POSITION. LRC CHARACTER. FB.
                *          18 NOOPS AND NOOPS UNTIL MEDIA IS STOPPED.

09E6 FA32 03772 WRPOST    CALH          M=H3         RECORD TRIMMINGS         CH070
09E7 CBF6 03773           JEPR WRM
09E8 8A22 03774           CALG          M=G2
09E9 CBF6 03775           JEPR WRM
09EA CBF3 03776           JEPR WROO
09EB 8FBF 03777           CALR          M=FB
09EC CBF6 03778           JEPR WRM
09ED 818F 03779           CALR          M=18
09EE C976 03780           JEPR WRMNOOPS
09EF 2080 03781           CDWM          SWP
09F0 828F 03782           CALR          M=28
09F1 8976 03783           JEPU WRMNOOPS

                *MARGIN ZONE BK. PT. ANALYSIS
                ** M REG. IS TESTED FOR SYSTEM CODES OF HYP.PHY.SPA.CEN.FLF.CRN.SCR.
                ** PCR.TAB.OR PTB. IF ANY OF THESE CHARACTERS ARE PRESENT. M IS CLEARED

09F2 9AD9 03790 TEG7MZBP  BDAT +9       M=2D         A BRANCH ON HYP.
09F3 99A8 03791           BDAT +8       M=1A         A BRANCH ON PHY.
09F4 9A07 03792           BDAT +7       M=20         A BRANCH ON SPA.
09F5 1E75 03793           BPRT +5       DB7=1         B BRANCH IF COLUMN 8 THRU F
09F6 801E 03794           CALR          M=M⊕01
09F7 9934 03795           BDAT +4       M=13               FLF OR CEN
09F8 9873 03796           BDAT +3       M=07               PSCR OR CR
09F9 9892 03797           BDAT +2       M=09               PCR . SCR
09FA 98B1 03798           BDAT +1       M=0B               TAB . PTB
09FB 000F 03799           RETN                        B

09FC A887 03801           JEPU CLM                   A  CLEAR M

                *            INSERT A CHARACTER INTO RW BUFFER SUBSTITUTING 'FF' FOR '00'

09FD E1EC 03806 INDATRW+  JEPR CVOOFF                CONVERT 00 TO FF
09FE 8C30 03807           JEPU INRW+                 STORE FORWARD

09FF 1B79 03810           *CHECK WORD*
0A00 E113 03810           JEPR XFMKS
0A01 E2E0 03811           JEPR SKSPTBRO
0A02 E335 03812           JEPR TEMCR
0A03 9701 03813           BALG +1       (M=0)'       BRANCH IF CR
0A04 8D06 03814           JEPU AJRO-

                * LOAD A CARRIAGE RETURN ONTO KEYBOARD STACK

0AC5 CD06 03818           JEPR AJRO-
0AC6 807F 03819 LDCRKS    CALR          M=07         CR TO STACK
0A07 A113 03820           JEPU XFMKS

                * ANALYSES CHARACTER IN G7 FOR MARGIN ZONE MODE OF MARGIN CONTROL
                * PERFORMS CONVERSION IF NECESSARY.

0A08 C948 03825 ANG7MZ    JEPR ANG7MCTZ              MZ RETN                  CG040
0A09 8A72 03826           CALG          M=G7
0A0A 9AD5 03827           BDAT -A       M=2D         BRANCH IF EXP HY.
0A0B 99A4 03828           BDAT -B       M=1A         BRANCH IF PHY
0A0C B089 03829           CALR          M=0B-M       TEST FOR PTB
0A0D 9307 03830           BALG -6       M=0
0A0E E32E 03831           JEPR TEG7SPTB
0A0F 9301 03832           BALG -E       M=0          BRANCH IF SPACE OR TAB
0A10 E334 03833           JEPR TEG7CR
0A11 9705 03834           BALG +5       (M=0)'       BRANCH NOT CARR RET
0A12 C7FB 03835           JEPR XFG7STK
0A13 C9DF 03836           JEPR ANCRMC
0A14 9701 03837           BALG +1       (M=0)'       BRANCH NO CONVERSION NECESSARY
0A15 A30F 03838           JEPU RETC
```

```
ADDR CODE NUMBR LABEL    CMND NEXTADDR OPERAND          COMMENT

0A16 000F 03840          RETN

0A17 0002 03842          RNOP
0A18 8104 03843          CALG          G0=0
0A19 88DF 03844          JEPU ANCHMZC

           * CALCULATE THE INDENT FROM THE TAB COUNTER IN GC FOR JUSTIFICATION

0A1A E29F 03849 CAINDENT JEPR FELM                   CALC GC INDENT
0A1B 8014 03850          CALG          G1=M
0A1C F004 03851          CALH          H0=M
0A1D B0FF 03852          CALR          M=0F
0A1E BEC2 03853          CALG          M=M.GC
0A1F F014 03854          CALH          H1=M
0A20 9702 03855          BALG +2       (M=0)'
0A21 FA02 03856 XFM=H0   CALH          M=H0
0A22 000F 03857          RETN

0A23 E38E 03859          JEPR TEMC&J
0A24 9702 03860          BALG +2       (M=0)'        BRANCH IF MARGIN CONTROL OR JUSTIFY
0A25 8AA2 03861          CALG          M=GA
0A26 1A3A 03862          BPRT -5       DB3=0         BRANCH PRINT AUTO NOT SET
0A27 E29F 03863          JEPR FELM
0A28 F0C4 03864          CALH          HC=M
0A29 C42A 03865          JEPR FETBHC+
0A2A 9304 03866          BALG +4       M=0
0A2B F004 03867          CALH          H0=M
0A2C E8F1 03868          JEPR DEC H1
0A2D 970B 03869          BALG -4       (M=0)'
0A2E 8A21 03870          JEPU XFM=H0

0A2F C557 03872          JEPR ANTBSTOP
0A30 F004 03873 XFH0=M   CALH          H0=M
0A31 000F 03874          RETN

           * TURN RECORD ON. IF ON TRACK 72 BUZZ.IF IN JUSTIFY SET H3 EQUAL
           * TO THE CARRIAGE POSITION IF NOT CLEAR THE RW BUFFER, H2 AND H3

0A32 E2A3 03880 SERCON   JEPR FETNRW
0A33 8729 03881          CALR          M=72-M
0A34 9705 03882          BALG +5       (M=0)'        BRANCH NOT ON TRACK 72
0A35 880F 03883          CALR          M=80
0A36 E914 03884          JEPR SEG9                   SET TRACK 72 BUZZ FLAG
0A37 0722 03885          CKBD          BUZZ=2
0A38 805F 03886          CALR          M=05
0A39 0013 03887          CKBD          HSDLY
0A3A 804F 03888          CALR          M=04
0A3B 9291 03889          BALG +1       M.G9=0        BRANCH JUSTIFY NOT SET
0A3C A301 03890          JEPU SEH3=CA

0A3D A300 03892          JEPU CLRWH23

           * CONTROL ROUTINE FOR RECORDING OF RW BUFFER
           * MONITORS TRANSPORT STATUS. ADJUST RW BUFFER TO START. INITIATES A
           * NORMAL WRITE FORWARD COMMAND. WRITE PRE AMBLE. DATA. AND
           * POST AMBLE AND THEN CHECKS FOR CORRECT LRC CHARACTERS WHEN
           * PERFORMING REVERSE READ VERIFICATION

0A3E C76F 03901 RC&TPRWB JEPR TPRC                   RWB REC & T.P.          CH040
0A3F CC9E 03902 RCRWB    JEPR ANRWBCEN               RWB RECORD              CH040
0A40 803F 03903          CALR          M=03
0A41 8004 03904          CALG          G0=M
0A42 C103 03905 RCAGAIN  JEPR MOKB&CRD               RE RECORD
0A43 2ECE 03906          BRWM -1       RUN=1
0A44 2A6D 03907          BRWM -2       CNS=0
0A45 2E4C 03908          BRWM -3       HDBY=1
0A46 CC55 03909          JEPR AJRWST
0A47 E457 03910          JEPR NWFRW
0A48 2240 03911          CRWM          RMED
0A49 C102 03912          JEPR MORWRUN
0A4A C8F5 03913          JEPR WRFF
0A4B 2E9D 03914          BRWM -2       EOC=1
0A4C 2E6C 03915          BRWM -3       CNS=1
0A4D 821F 03916          CALR          M=21
0A4E C976 03917          JEPR WRMNOOPS
0A4F CBF6 03918          JEPR WRM
0A50 CBF3 03919          JEPR WROO
0A51 CACE 03920          JEPR WRDATA
0A52 C9E6 03921 REC C    JEPR WRPOST                 CONT RECORD             CH040
0A53 8AA9 03922          JEPU RDWR


0A54 CBE0 03925 DUMPIFDA JEPR FERW                   DUMP IF DATA            CH115
0A55 9701 03926          BALG +1       (M=0)'
0A56 000F 03927          RETN

0A57 8ACA 03929          JEPU DUMP

           *KEYBOARD INPUT CONVERSION--ASSUMES CHAR TO BE CONVERTED IS ON M
           ***H0,H1,HB,HC

0A58 000F 03935          RETN

0A59 F004 03937 CVKBINP  CALH          H0=M
0A5A BC69 03938          CALR          M=C6-M        BRANCH IF SPECIAL PRECEDENTED CR
0A5B 9702 03939          BALG +2       (M=0)'
```

```
ADDR CODE NUMBR LABEL     CMND NEXTADDR OPERAND          COMMENT

0A5C B06F 03940           CALR          M=06
0A5D F004 03941           CALH          H0=M
0A5E FA02 03942           CALH          M=H0
0A5F 1AD8 03943           BPRT -7       LXL=0            NO CONVERSION IF USO SYSTEM
0A60 0000 03944           NOOP
0A61 C0ED 03945           JEPR FELXLSTD
0A62 BF0D 03946           CALR          M=M.F0
0A63 E7F9 03947           JEPR RML4
0A64 F014 03948           CALH          H1=M                H1 IS CONVERSION DELTA
0A65 9308 03949           BALG +8       M=0        A>       BR IF 1ST CONV NOT REQ'D
0A66 B04F 03950           CALR          M=04
0A67 B000 03951           CALG          M=M-1      B<
0A68 F0B4 03952           CALH          HB=M                HB IS ROW TO BE SEARCHED
0A69 3110 03953           CMEM          ALIN
0A6A B18F 03954           CALR          M=18                SET M=END OF SEARCH COL +1
0A6B C184 03955           JEPR CONVERT
0A6C 9702 03956           BALG +2       (M=0)'     A>       BR IF CONV WAS MADE
0A6D FAB2 03957           CALH          M=HB
0A6E 9708 03958           BALG -7       (M=0)'     B>       BR TO SEARCH ANOTHER ROW.
0A6F B02F 03959           CALR          M=02       A<
0A70 F014 03960           CALH          H1=M                SET CODE CONV DELTA
0A71 B0EF 03961           CALR          M=0E
0A72 B000 03962           CALG          M=M-1      D<
0A73 F0B4 03963           CALH          HB=M
0A74 3110 03964           CMEM          ALIN                SELECT ROW TO BE SEARCHED
0A75 B16F 03965           CALR          M=18                SET M=END OF SEARCH COL +1
0A76 C184 03966           JEPR CONVERT
0A77 9702 03967           BALG +2       (M=0)'     C>       BR IF CODE CONV COMPLETE
0A78 FAB2 03968           CALH          M=HB
0A79 98D8 03969           BDAT -7       M=0D       D>       BR TO SEARCH ROW C
0A7A B0CF 03970           CALR          M=0C       C<
0A7B F0B4 03971           CALH          HB=M                SELECT ROW TO BE SEARCHED
0A7C 3110 03972           CMEM          ALIN
0A7D B10F 03973           CALR          M=10                SET M=END OF SEARCH COL +1
0A7E C184 03974           JEPR CONVERT
0A7F 0000 03975           NOOP
0A80 9705 03976           BALG +5       (M=0)'     E>       BR IF CONV COMPLETE
0A81 B0DF 03977           CALR          M=0D
0A82 F0B4 03978           CALH          HB=M
0A83 3110 03979           CMEM          ALIN                SELECT ROW TO BE SEARCHED
0A84 B0FF 03980           CALR          M=0F                SET M=END OF SEARCH COL+1
0A85 C184 03981           JEPR CONVERT
0A86 C140 03982           JEPR FESTDLAN            E<
0A87 B000 03983           CALG          M=M-1
0A88 3110 03984           CMEM          ALIN
0A89 F0B4 03985           CALH          HB=M
0A8A B0B1 03986           CALG          M=M-GB
0A8B BFF9 03987           CALR          M=FF-M
0A8C F014 03988           CALH          H1=M                  MINUS STANDARD LANG.
0A8D B10F 03989           CALR          M=10                SET M= END OF SEARCH COL +1
0A8E C184 03990           JEPR CONVERT
0A8F 8A21 03991           JEPU XFM=H0

                * IF IN REVISE OR NO MEDIA IN SET BUZZER. TURN RECORD ON. IF RW
                * NOT ACTIVE RETURN. IF RW AVTIVE FETCH CHARACTER FROM RO BUFFER
                * AND MOVE RW HEAD LEFT IS DATA. IF NO DATA REMAINING CLEAR
                * RO BUFFER

0A90 E397 03999 SERC      JEPR TERV                REC ON/OFF                 CH010
0A91 9701 04000           BALG +1       (M=0)'     BRANCH IF REVISE
0A92 2E3B 04001           BRWM +B       CIN=1
0A93 8445 04002           JEPU BZERI3

0A94 CA32 04004           JEPR SERCON
0A95 B20F 04005           CALR          M=20
0A96 E914 04006           JEPR SEG9                SET RECORD FLAG
0A97 2A05 04007           BRWM +5       ACT=0
0A98 3D03 04008           BPRT +3       XLX=1
0A99 CCEC 04009           JEPR FERO+
0A9A 9301 04010           BALG +1       M=0
0A9B EC4F 04011           JEPR HDLRW
0A9C CCF4 04012           JEPR CLRO
0A9D 807D 04013           JEPU REKBIDL

0A9E CB1E 04015           JEPR UPWRI
0A9F 9304 04016           BALG -B       M=0
0AA0 CBE0 04017           JEPR FERW
0AA1 9301 04018           BALG +1       M=0
0AA2 CBCB 04019           JEPR SERCOFF
0AA3 BC1F 04020 ENDRCRV   CALR          M=61
0AA4 E916 04021           JEPR REG9                RESET RECOR.REV HD STP 4 DUP
0AA5 B10F 04022           CALR          M=10
0AA6 E912 04023           JEPR REG8                RESET REVISE
0AA7 CAC8 04024           JEPR REDUMP
0AA8 807D 04025           JEPU REKBIDL

                * RECORD VERIFY CHECKS THE DATA THAT HAS BEEN RECORDED BY READING IN THE
                * REVERSE MODE AND COMPARTING USING A LONGITUDINAL REDUNDANCE CHARACTER
                * TO DETECTECT CORRECTNESS

0AA9 E455 04032 RDWR      JEPR NRRRW               SET NORMAL READ REVERSE & 0.5 SEC DELAY
0AAA C102 04033           JEPR MORWRUN             MONITOR CARD RUNNING
0AAB 2E6E 04034           BRWM -1       CNS=1      GO BACK TO MORWRUN IF CARD NOT AT SPEED
0AAC B06F 04035           CALR          M=06
0AAD E187 04036           JEPR DLY MSKB
0AAE 2240 04037           CRWM          RMED       MONITOR KEYBOARD AND CARD FOR 2 MS
0AAF CB55 04038           JEPR RDCHRW
```

```
ADDR CODE NUMBR LABEL    CMND NEXTADDR OPERAND        COMMENT

0AB0 B024 04039          CALG          G2=M      FETCH LONGITUDINAL REDUNDANCE CHARACTER
0AB1 CB55 04040          JEPR RDCHRW
0AB2 CB8E 04041          JEPR UPLRC
0AB3 CB55 04042          JEPR RDCHRW
0AB4 CB8E 04043          JEPR UPLRC
0AB5 CB55 04044          JEPR RDCHRW              RECORDED DATA VERIFIED
0AB6 970D 04045          BALG -2       (M=0)'
0AB7 BA22 04046          CALG          M=G2
0AB8 9701 04047          BALG +1       (M=0)'
0AB9 2EC4 04048          BRWM +4       RUN=1
0ABA E8C3 04049          JEPR DEC GO
0ABB 9301 04050          BALG +1       M=0
0ABC 8A42 04051          JEPU RCAGAIN

0ABD 8B11 04053          JEPU ANRCER

0ABE CB27 04055          JEPR SERWRC
0ABF E2A3 04056          JEPR FETNRW
0AC0 B719 04057          CALR          M=71-M    CHECK FOR TRACK 71
0AC1 9705 04058          BALG +5       (M=0)'
0AC2 B80F 04059          CALR          M=80
0AC3 E914 04060          JEPR SEG9                SET TRK 72 BUZZ FLAG
0AC4 0722 04061          CKBD          BUZZ=2    TURN ON BUZZER IF ON TRACK 71
0AC5 805F 04062          CALR          M=05
0AC6 0013 04063          CKBD          HSDLY     SET 0.5 SEC DELAY
0AC7 E50D 04064          JEPR HDRRW
0AC8 B20F 04065 REDUMP   CALR          M=20
0AC9 A924 04066          JEPU REGF                RESET DUMP FLAG

               * IF IN REVISE OR RECORD MODE RECORD THE RW BUFFER AND EXECUTE
               * A TRACK PRINT

0ACA E394 04072 DUMP     JEPR TERVRC              DUMP                    CH120
0ACB 9301 04073          BALG +1       M=0        BRANCH NOT REVISE OR RECORD
0ACC 8A3E 04074          JEPU RC&TPRWB

0ACD 8B27 04076          JEPU SERWRC

               * RECORD NEXT CHARACTER IN RW BUFFER. IF FORMAT CODE RECORD ALL
               * NON ZERO CHARACTERS IN BUFFER

0ACE B124 04082 WRDATA   CALG          G2=0       RECORD DATA
0ACF CC86 04083 WRDATA1  JEPR TERWB
0AD0 E32C 04084          JEPR TEMFMT
0AD1 930B 04085          BALG +8       M=0        BRANCH IF FORMAT
0AD2 FA02 04086          CALH          M=H0
0AD3 9306 04087          BALG +8       M=0
0AD4 C8F6 04088          JEPR WRM
0AD5 CC8C 04089          JEPR FECHRW+
0AD6 E33D 04090          JEPR TEMCRPCR
0AD7 9304 04091          BALG +4       M=0        BRANCH IF CR OR PCR
0AD8 6B00 04092          JEPU WRDATA2

0AD9 C8F6 04094          JEPR WRM
0ADA CBDF 04095          JEPR FERW+
0ADB 970D 04096          BALG -2       (M=0)'     BRANCH NO MORE DATA
0ADC 88F6 04097          JEPU WRM

               * READS THREE CHARACTERS FROM THE MAGNETIC CARD. IF LAST CHARACTER
               * IS FB THEN TERMINATE THE READ.

0ADD B05F 04103 RDFWD3   CALR          M=05       TRIPLE RD FWD           CI010
0ADE B004 04104 RDFWDM   CALG          G0=M       M RD FWD                CI010
0ADF CB74 04105 RDFWD    JEPR RDSTART             RD FWD                  CI010
0AE0 E459 04106          JEPR NRF AC
0AE1 CC36 04107          JEPR FINDDATA
0AE2 C601 04108          JIPU +1
0AE3 CD00 04109          JEPR INR0+
0AE4 CB8E 04110          JEPR UPLRC
0AE5 C0B3 04111          JEPR MOCD&PS
0AE6 CB86 04112          JEPR RDCH
0AE7 970B 04113          BALG -4       (M=0)'
0AE8 CB86 04114          JEPR RDCH
0AE9 F004 04115          CALH          H0=M
0AEA CB8E 04116          JEPR UPLRC
0AEB CB86 04117          JEPR RDCH
0AEC CB8E 04118          JEPR UPLRC
0AED CB66 04119          JEPR RDCH
0AEE CB36 04120          JEPR RDCH
0AEF BFB9 04121          CALR          M=FB-M
0AF0 9301 04122          BALG +1       M=0        BRANCH GOOD SYNC CHARACTER
0AF1 CBDB 04123          JEPR RDSYNCER
0AF2 2BC1 04124          BACM +1       RUN=0
0AF3 8C00 04125          JEPU ENDRD

0AF4 807D 04127          JEPU REKBIOL

               * RECORD THE RW BUFFER AND FETCH A CHARACTER FROM THE ACTIVE MEDIA
               * IF NOT ACTIVE RETURN AFTER RECORD

0AF5 CACA 04133 DUMP&FCH JEPR DUMP                DUMP & FETCH            CH110
0AF6 B04F 04134          CALR          M=04
0AF7 9292 04135          BALG +2       M.G9=0     BRANCH JUSTIFY NOT SET
0AF8 F1F4 04136          CALH          HF=0
0AF9 000F 04137          RETN
```

```
ADDR CODE NUMBR LABEL    CMND NEXTADDR OPERAND           COMMENT

0AFA E37F 04139          JEPR TEACMODE
0AFB 930D 04140          BALG -2        M=0       BRANCH NOT ACTIVE
0AFC CD2B 04141          JEPR TEROB2
0AFD 970B 04142          BALG -4        (M=0)'
0AFE 8B4F 04143          JEPU FEDA

             *     EXECUTE FORMAT HEADER
             *  RESET STOP BIT IN REGISTER GF
             * WRITE CONTENTS OF 41 IS NOT ZERO. CHECK IF LAST CHARACTER IN BUFFER. IF
             * NOT RECORD. IF TRUE WRITE A 00

0AFF 255F 04151          *CHECK WORD*
0B00 FA12 04151 WRDATA2  CALH           M=H1
0B01 9301 04152          BALG +1        M=0
0B02 CBF6 04153          JEPR WRM
0B03 BCBF 04154          CALR           M=6B
0B04 9CD1 04155          BALG +1        M=M+GDC
0B05 8ACF 04156          JEPU WRDATA1

0B06 9703 04158          BALG +3        (M=0)'    BRANCH NO MORE DATA
0B07 FA02 04159          CALH           M=H0
0B08 E2CE 04160          JEPR FEMACWT
0B09 970B 04161          BALG -4        (M=0)'    BRANCH IF ACCENT
0B0A C8F3 04162          JEPR WR00
0B0B CC86 04163          JEPR TERWB
0B0C 9701 04164          BALG +1        (M=0)'    BRANCH IF DATA
0B0D 000F 04165          RETN

0B0E 0002 04167          RNOP
0B0F CA52 04168          JEPR REC C
0B10 8A3F 04169          JEPU RCRWB

             * ANALYZE RECORD FAILURE: CLEARS RW BUFFER. IF G7 CONTAINS A
             * FF EJECT THE RW MEDIA. IF NOT INSERT A TRACK LINK INTO BUFFER AND
             * RECORD IT

0B11 CC51 04176 ANRCER   JEPR CLRW                RECORD FAILURE         CH090
0B12 BFFF 04177          CALR           M=FF
0B13 9079 04178          BALG +9        M-G7=0
0B14 6074 04179          CALG           G7=M
0B15 B8FF 04180          CALR           M=8F
0B16 CC30 04181          JEPR INRW+
0B17 CA3F 04182          JEPR RCRWB
0B18 B10F 04183          CALR           M=10
0B19 9281 04184          BALG +1        M.G8=0    BRANCH NOT REVISE
0B1A 8BE4 04185          JEPU LKRVER

0B1B E914 04187          JEPR SEG9                SET RECORD FLASH FLAG
0B1C A177 04188          JEPU BZLK

0B1D A567 04190          JEPU EJRWI3

             * MONITOR RUN, CARD AT SPEED. RECORD FLAG IF NOT ALL TRUE STOP
             * READ AND RETURN

0B1E BA92 04196 UPWRI    CALG           M=G9      RECORD TRUE            CH140
0B1F B20D 04197          CALR           M=M.20
0B20 2EC3 04198          BRWM +3        RUN=1
0B21 2A62 04199          BRWM +2        CNS=0
0B22 9302 04200          BALG +2        M=0       BRANCH RECORD FLAG NOT SET
0B23 2C80 04201          CRWM           SWR
0B24 000F 04202          RETN

0B25 2C00 04204          CRWM           SRD
0B26 000F 04205          RETN

             * SET UP TO RECORD THE RW BUFFER. IF IN JUSTIFY OR RW BUFFER IS
             * EMPTY CLEAR H2 AND H3. CLEARS RW BUFFER. SET H7=0 ADJUST ADDRESS
             * POINT GD TO FF AND SET H3 TO CARRIAGE POSITION

0B27 B04F 04212 SERWRC   CALR           M=04      REC RWB SETUP          CH130
0B28 9292 04213          BALG +2        M.G9=0    BRANCH JUSTIFY FLAG NOT SET
0B29 CC86 04214          JEPR TERWB
0B2A 9701 04215          BALG +1        (M=0)'
0B2B A300 04216          JEPU CLRWH23

0B2C CC61 04218          JEPR CLRW+M
0B2D CCE0 04219          JEPR CTRWH7
0B2E CC56 04220          JEPR AJRWST
0B2F A301 04221          JEPU SEH3=CA

             *                     DUMP TEST
             * THE RW BUFFER IS ANALYZED AND DUMPED TO THE CARD IF ANY OF THE
             * FOLLOWING CONDITIONS EXIST.
             *  1.BUFFER CONTAINS 151 CHARACTERS
             *  2.BUFFER CONTAINS 150 CHARACTERS OF WHICH THE LAST IS NOT AN ACCENT
             *  3.THE CURRENT CHARACTER BEING PROCESSED IS ONE OF THE FOLLOWING:
             *     CR,PCR,SWR,RPT,TRL,EJT
             ***HC

0B30 BCBF 04233 TEDUMP   CALR           M=6B
0B31 9CD9 04234          BALG +9        M=M+GDC    JUMP TO ACCENT TEST IF #150 OR GREATER
             * TEST CHARACTER IN G7 FOR DUMPING CHARACTER: CR, PCR, SWR, RPT,
             * TRL, EJT
```

```
ADDR CODE NUMBR LABEL     CMND NEXTADDR OPERAND              COMMENT

0B32 BA72 04238 TEG7DUMP CALG           M=G7
0B33 9876 04239 TEMDUMP  BDAT +6        M=07        C>    DUMP IF CR
0B34 9885 04240          BDAT +5        M=08        D>    DUMP IF PCR OR SWR
0B35 1A73 04241          BPRT +3        DB7=0       E>
0B36 9B93 04242          BDAT +3        M=89          EF      DUMP IF RPT
0B37 9BF2 04243          BDAT +2        M=8F           G      DUMP IF TRL
0B38 98C1 04244          BDAT +1        M=8C            H     DUMP IF EJT
0B39 A887 04245          JEPU CLM

0B3A A88B 04247          JEPU SEM=FF                  BCD FGH   DUMP BUFFER

0B3B 970E 04249          BALG -1        (M=O)'
0B3C E2CD 04250          JEPR FEG7ACWT              A             TEST FOR ACCENT
0B3D 970B 04251          BALG -4        (M=O)'      GO TO NON-DUMP IF (M=O)'
0B3E A88B 04252          JEPU SEM=FF                DUMP IF NOT ACCENT

                * EXECUTE SINGLE CYCLE: TEST G7 FOR CR. HY. OR PHY. IF TRUE
                * RESET SINGLE CYCLE. IF CONTROL CHARACTER DB7=1 BUZZ. IF ANY OTHER
                * PRINTING CHARACTER TEST FOR ACTIVE MODE & RESET SINGLE CYCLE.

0B3F E334 04259 SC       JEPR TEG7CR                EXEC S. CY                CG100
0B40 9309 04260          BALG +9        M=0
0B41 BA72 04261          CALG           M=G7
0B42 1E76 04262          BPRT +6        DB7=1
0B43 9AD6 04263          BDAT +6        M=2D        BRANCH IF HY.
0B44 99A5 04264          BDAT +5        M=1A        BRANCH IF PHY
0B45 BFCF 04265          CALR           M=FC
0B46 BE72 04266          CALG           M=M.G7
0B47 B1C9 04267          CALR           M=1C-M      TEST FOR WRD LIN PAR AUT
0B48 9303 04268          BALG +3        M=0
0B49 8445 04269          JEPU BZERI3

0B4A B02F 04271 RESC     CALR           M=02        RESET SINGLE CYCLE BIT
0B4B A908 04272          JEPU REG5

0B4C C80F 04274          JEPR FECHPSD
0B4D E861 04275          JEPR XFH10G47
0B4E C9F2 04276          JEPR TEG7MZBP
0B4F 930A 04277          BALG -5        M=0
0B50 E28B 04278          JEPR SESTOP
0B51 A170 04279          JEPU RETN2

                * READ A CHARACTER FROM THE RW MEDIA. MONITOR KEYBOARD AND CARDS
                * WHILE RDR NOT TRUE

0B52 2AC5 04285          BRWM +5        RUN=0
0B53 E0C3 04286          JEPR MOKB
0B54 C0B4 04287          JEPR MOROCARD
0B55 B00F 04288 RDCHRW   CALR           M=00
0B56 2A1B 04289          BRWM -4        RDR=0
0B57 2210 04290          CRWM           M=RR
0B58 000F 04291          RETN

0B59 8C12 04294          JEPU ANRDER

                * READ DATA INTO THE RO BUFFER WHEN IN REVISE MODE

0B5A CB74 04298 RDRVS    JEPR RDSTART               RD REV                    CI020
0B5B E451 04299          JEPR NRR AC
0B5C CC36 04300          JEPR FINDDATA
0B5D B024 04301          CALG           G2=M
0B5E BA32 04302          CALG           M=G3
0B5F 9309 04303          BALG -6        M=0
0B60 CB86 04304          JEPR RDCH
0B61 F004 04305          CALH           HO=M
0B62 CB8E 04306          JEPR UPLRC
0B63 CB86 04307          JEPR RDCH
0B64 CB8E 04308          JEPR UPLRC
0B65 C0B3 04309          JEPR MOCD&PS
0B66 CB86 04310          JEPR RDCH
0B67 CD00 04311          JEPR INRO+
0B68 970B 04312          BALG -4        (M=O)'
0B69 CB86 04313          JEPR RDCH
0B6A 9703 04314          BALG +3        (M=O)'
0B6B CB86 04315          JEPR RDCH
0B6C BF01 04316          CALG           M=M+1
0B6D 9301 04317          BALG +1        M=0
0B6E CB8B 04318          JEPR RDSYNCER
0B6F CD0E 04319          JEPR SWROEND
0B70 8C00 04320          JEPU ENDRD

                * MOVE THE ACTIVE HEAD LEFT ONE TRACK AND READ 6 CHARACTERS INTO
                * THE RO BUFFER WHEN IN REVISE MODE.

0B71 E64E 04325 RDREVM   JEPR HDL AC                M RD REV                  CI020
0B72 B06F 04326          CALR           M=06
0B73 8ADE 04327          JEPU RDFWDM

                * INITIALIZATION FOR READ START: CLEAR RO BUFFER. SET G2=0. UPDATE
                * TRACK NUMBER. MONITOR HEAD BUSY. RUN. AND CARD AT SPEED

0B74 CCF4 04333 RDSTART  JEPR CLRO                  START READ                CI030
0B75 B124 04334          CALG           G2=0
0B76 E066 04335          JEPR UPBNO
0B77 C100 04336          JEPR MOAC
0B78 2F4E 04337          BACM -1        HDBY=1
```

```
ADDR CODE NUMBR LABEL    CMND NEXTADDR OPERAND                COMMENT

0B79 2FCD 04338          BACM -2       RUN=1
0B7A 2B6C 04339          BACM -3       CNS=0
0B7B E497 04340          JEPR FEACBNO
0B7C E1E8 04341          JEPR CVFFOO
0B7D 9309 04342          BALG -6       M=0
0B7E 000F 04343          RETN

              * SET UP THE RW BUFFER WHEN REVISE IS TURNED ON: TRANSFERS RO BUFFER
              * TO RW BUFFER UP TO THE DATA THAT HAS NOT BEEN PLAYED OUT

0B7F B5E2 04349 SERWRV   CALG          M=GE'        SET UP RW BUFFER IN REVISE ON
0B80 8004 04350          CALG          GO=M
0B81 CCF6 04351          JEPR AJROST
0B82 BA02 04352          CALG          M=GO
0B83 8D7B 04353          JEPU XFRORWGO

              * READ A CHARACTER FROM THE ACTIVE MEDIA

0B84 2BC6 04358          BACM +6       RUN=0
0B85 CDB4 04359          JEPR MOROCARD
0B86 2B1D 04360 RDCH     BACM -2       RDR=0
0B87 E8BC 04361          JEPR DEC G3
0B88 9302 04362          BALG +2       M=0
0B89 2310 04363          CACM          M=RR
0B8A 000F 04364          RETN

0B8B BFFF 04366 RDSYNCER CALR          M=FF         SYNC ERROR            CI050
0B8C B024 04367          CALG          G2=M
0B8D A8B7 04368          JEPU CLM

0B8E 8922 04370 UPLRC    CALG          M=M*G2       LRC                   CI050
0B8F A3BE 04371          JEPU XFG2=M

              *TRANSFERE REMAINDER OF RO TO RW IN REVISE OFF
              *SET RO EQUAL TO RW AND REALIGN RO TO LAST CHAR PLAYED OUT

0B90 BAD2 04377 SERORWRV CALG          M=GD
0B91 B014 04378          CALG          G1=M         SAVE RO POINTER
0B92 CD9B 04379          JEPR XF/RORW               TRANSFER REMAINDER OF RO TO RW BUFFER
0B93 CCF8 04380          JEPR AJROST                ADJUST BUFFERS TO START
0B94 CC56 04381          JEPR AJRWST
0B95 B104 04382          CALG          GO=0
0B96 CD74 04383          JEPR XFRWROGO              TRANSFERE RW TO RO
0B97 BA12 04384          CALG          M=G1
0B98 80E4 04385          CALG          GE=M         RESTORE RO POINTER
0B99 000F 04386          RETN

              * PROCESSING OF LAST CHARACTER IN REVISE MODE: CLEAR KEYBOARD STACK, UPDAT
              * REVISE LAMP, WAIT FOR ENTRY, IF CHC OR LRC RETURN TO IDLE MODE, IF
              * TRACK LINE RECORD CHARACTER

0B9A 0732 04393 LKRVLIM  CKBD          BUZZ=3       LAST REV CH           CJ070
0B9B E109 04394          JEPR CLKBKSRG
0B9C CBAF 04395          JEPR UPRVLT
0B9D 0831 04396          BKBD +1       STOP=0
0B9E 0702 04397          CKBD          BUZZ=0
0B9F 084C 04398          BKBD -3       STROBE=0
0BA0 B10F 04399          CALR          M=10
0BA1 E910 04400          JEPR SEG8                  SET REVISE FLAG
0BA2 0702 04401          CKBD          BUZZ=0
0BA3 E0C6 04402          JEPR XFKBKS
0BA4 CA59 04403          JEPR CVKBINP
0BA5 8074 04404          CALG          G7=M
0BA6 1A73 04405          BPRT +3       DB7=0
0BA7 9A53 04406          BDAT +3       M=A5         BRANCH LINE CORRECT CODE
0BA8 9A62 04407          BDAT +2       M=A6         BRANCH CHARACTER CORRECT CODE
0BA9 98F2 04408          BDAT +2       M=8F         BRANCH TRACK LINK CODE
0BAA 8B9A 04409          JEPU LKRVLIM

0BAB 807E 04411          JEPU RESTPIDL

0BAC E109 04413          JEPR CLKBKSRG
0BAD 8BEC 04414          JEPU RCCHRV

              * UPDATES THE REVISE LAMP AND GOES TO MONITOR

0BAE 0732 04419 UPRVLTBZ CKBD          BUZZ=3       REV LAMP MON          CJ080
0BAF 1309 04420 UPRVLT   CPRT          RBDN         REV L.M. WOB
0BB0 B10F 04421          CALR          M=10
0BB1 0CC1 04422          BKBD +1       2HZ=1
0BB2 E912 04423          JEPR REG8                  RESET REVISE FLAG
0BB3 E910 04424          JEPR SEG8                  SET REVISE FLAG
0BB4 80AD 04425          JEPU MO

              * TURN REVISE ON AND OFF
              * CLEAR RW BUFFER, RESET DUMP BIT, SET REVISE BIT, TURN REVISE ON AND
              * READ INTO RO BUFFER, IF RO BUFFER NOT EMPTY MOVE RW HEAD
              * LEFT ONE TRACK

0BB5 E397 04433 SERV     JEPR TERV                  REVISE ON/OFF         CJ010
0BB6 9301 04434          BALG +1       M=0          BRANCH REVISE OFF
0BB7 8C1F 04435          JEPU RERV
```

```
ADDR CODE NUMBR LABEL     CMND NEXTADDR OPERAND              COMMENT

0BB8 2AD2 04437           BRWM +2       ACT=0
0BB9 E20F 04438           CALR          M=20
0BBA 9281 04439           BALG +1       M.G8=0      BRANCH MGC NOT SET
0BBB 8445 04440           JEPU BZERI3

0BBC CC51 04442           JEPR CLRW
0BBD CAC8 04443           JEPR REDUMP
0BBE E10F 04444           CALR          M=10
0BBF E910 04445           JEPR SEG8                 SET REVISE ON
0BC0 CD2B 04446           JEPR TEROB3
0BC1 9702 04447           BALG +2       (M=0)'
0BC2 CBCD 04448           JEPR RDRV
0BC3 807D 04449           JEPU REKBIDL

0BC4 CB7F 04451           JEPR SERWRV
0BC5 EC4F 04452           JEPR HDLRW
0BC6 807D 04453           JEPU REKBIDL

                * TEST FOR DUMPING OF RW BUFFER IN THE REVISE MODE. IF DUMP FLAG
                * IS SET RECORD AND TRACK PRINT THE RW BUFFER. IF NOT TEST FOR DUMPING
                * CHARACTER THEN MOVE HEAD RIGHT. SET H2 & H3 WOUAL TO 0 AND READ
                * SIX CHARACTERS INTO THE ACTIVE BUFFER.

0BC7 B20F 04461 TEDUMPRV CALR           M=20        REVISE RECD TEST         CJ040
0BC8 92F2 04462           BALG +2       M.GF=0      BRANCH DUMP NOT SET
0BC9 CA3E 04463 RCRDRV    JEPR RC&TPRWB
0BCA 0802 04464           JIPU +2
0BCB C76F 04465           JEPR TPRC
0BCC E50D 04466           JEPR HDRRW
0BCD E300 04467 RDRV      JEPR CLRWH23              REVISE RD                CJ040
0BCE B06F 04468           CALR          M=06
0BCF BADE 04469           JEPU RDFWDM

                * PLACES THE CORRECT CARRIAGE POSITION IN REG. H3 WHEN THE RW BUFFER IS
                * EMPTY

0BD0 2AD9 04475 SECA      BRWM +9       ACT=0       SET CARR                 CI070
0BD1 BA72 04476           CALG          M=G7
0BD2 BA59 04477           CALR          M=A5-M
0BD3 9308 04478           BALG +8       M=0         BRANCH LINE CORRECT CODE
0BD4 B10F 04479           CALR          M=10
0BD5 9286 04480           BALG +6       M.G8=0      BRANCH REVISE NOT ON
0BD6 FA02 04481           CALH          M=H0
0BD7 D036 04482           BALH +6       M-H3=0
0BD8 B20F 04483           CALR          M=20
0BD9 A926 04484           JEPU SEGF                 SET DUMP FLAG

0BDA B01F 04486           CALR          M=01
0BDB 9292 04487           BALG +2       M.G9=0      BRANCH DUP NOT SET
0BDC FA02 04488           CALH          M=H0
0BDD F034 04489           CALH          H3=M
0BDE 000F 04490           RETN

                *FETCH NEXT CHARACTER OUT OF RW BUFFER

0BDF E8CC 04495 FERW+     JEPR INC GD               INCRIMENT BUFFER POINTER
0BE0 BAD2 04496 FERW      CALG          M=GD
0BE1 3004 04497           CMEM          A0IN        SET BUFFER ADDRESS
0BE2 3010 04498           CMEM          MOUT        EXIT WITH CHARACTER ON M
0BE3 000F 04499           RETN

                * LOCK UP IF REVISE ERROR
                * SET FLASHING RECORD LIGHT. BUZZ AND WAIT UNTIL
                * STOP KEY IS DEPRESSED
                * THEN SET REVISE LIGHT AND END RECORD AND REVISE

0BE4 B30F 04507 LKRVER    CALR          M=30
0BE5 E914 04508           JEPR SEG9                 SET RECORD AND RECORD FLASH FLAGS
0BE6 CBAE 04509           JEPR UPRVLTBZ
0BE7 083E 04510           BKBD -1       STOP=0
0BE8 0702 04511           CKBD          BUZZ=0
0BE9 B10F 04512           CALR          M=10
0BEA E910 04513           JEPR SEG8                 SET REVISE ON
0BEB 8AA3 04514           JEPU ENDRCRV

                * RECORD CHARACTER IN REVISE MODE
                * INSERTS A CHARACTER IN TO RW BUFFER AND IF DUMP BIT SET OR DATA
                * WILL NOT FIT LOCK UP KEYBOARD
                * IF ONE OF THE LAST 10 CHARACTERS THAT WILL FIT. BUZZ
                * AND RETURN

0BEC CB32 04523 RCCHRV    JEPR TEG7DUMP             REV CH REC               CJ030
0BED 9301 04524           BALG +1       M=0
0BEE 8BC7 04525           JEPU TEDUMPRV

0BEF B20F 04527           CALR          M=20
0BF0 92FA 04528           BALG +A       M.GF=0      A>    BR IF DUMP BIT NOT SET.
0BF1 CB30 04529           JEPR TEDUMP
0BF2 9301 04530           BALG +1       M=0         B>    BR IF NOT LAST CHAR ALLOWED
0BF3 8B9A 04531           JEPU LKRVLIM                    LOCK IF LAST CHAR ALLOWED

0BF4 B8BF 04533           CALR          M=8B        B<
0BF5 91D5 04534           BALG +5       M>GD        A>    BR IF NOT ON LAST 10 CHAR.
0BF6 E37F 04535           JEPR TEACMODE
0BF7 9701 04536           BALG +1       (M=0)'      C>    BR IF CHAR FROM MEDIA
0BF8 807C 04537           JEPU BZI3                 D<    BUZZ ON LAST 10 CHAR.
```

```
ADDR CODE NUMBR LABEL     CMND NEXTADDR OPERAND              COMMENT

0BF9 E0A7 04539           JEPR TEFITRV              C<
0BFA 970D 04540           BALG -2       (M=0)'      D>   BR IF REMAINING RW DOESNT FIT IN RO
0BFB 000F 04541           RETN                      A<

                  *          SUBSTITUTE THE CHARACTER IN RW BUFFER WITH M

0BFC C8FA 04546 CVRWCH    JEPR AJRW-                BACK BEHIND CHAR...
0BFD 8C30 04547           JEPU INRW+                ...AND INSERT

                  * TERMINATE READ. IF G3 DOES NOT EQUAL ZERO GO TO A READ ERROR
                  * OTHERWISE STOP THE READ MOTORS, ADJUST THE RO BUFFER TO START, SET
                  * THE CORRECT CARRIAGE POSITION, MOVES HEAD RIGHT IF GO NOT EQUAL TO
                  * ZERO, AND TURNS MOTORS ON IN REVERSE DIRECTION.

0BFE EB9F 04555           *ADJUST WORD*
0BFF 2D36 04555           *CHECK WORD**
0C00 8A32 04555 ENDRD     CALG          M=G3        TERM RD                   CI060
0C01 930D 04556           BALG +D       M=0
0C02 2BE3 04557           BACM +3       FWD=0
0C03 B0EF 04558           CALR          M=0E
0C04 E18B 04559           JEPR DLY MS
0C05 2700 04560           CACM          SRD
0C06 8A22 04561           CALG          M=G2
0C07 9706 04562           BALG +6       (M=0)'
0C08 CCF8 04563           JEPR AJROST
0C09 C8D0 04564           JEPR SECA
0C0A B01F 04565           CALR          M=01
0C0B 9201 04566           BALG +1       M.G0=0
0C0C E50C 04567           JEPR HDR AC
0C0D A451 04568           JEPU NRR AC

0C0E 8C12 04570           JEPU ANRDER

                  * ANALYZE READ ERROR
                  * READ DATA FORWARD AND REVERSE UNTIL G0=0 THEN MOVE HEAD
                  * RIGHT, CLEAR THE RO BUFFER, BUZZ AND LOCK KEYBOARD

0C0F 0000 04576           NOOP
0C10 2BE1 04577           BACM +1       FWD=0
0C11 2700 04578           CACM          SRD
0C12 E8C3 04579 ANRDER    JEPR DEC G0               RD ERROR                  CI060
0C13 9305 04580           BALG +5       M=0
0C14 E8C3 04581           JEPR DEC G0
0C15 9304 04582           BALG +4       M=0
0C16 2FE1 04583           BACM +1       FWD=1
0C17 8ADF 04584           JEPU RDFWD

0C18 885A 04586           JEPU RDRVS

0C19 E50C 04588           JEPR HDR AC
0C1A E451 04589           JEPR NRR AC
0C1B CCF4 04590           JEPR CLRO
0C1C B0CF 04591           CALR          M=0C
0C1D 8B92 04592           CALG          M=M@G9
0C1E A177 04593           JEPU BZLK

                  * TURN REVISE OFF
                  * IF DUMP BIT NOT SET MOVE HEAD RIGHT AND END RECORD REVISE
                  * IF SET TEST RO BUFFER FOR FORMAT AND CLEAR RO BUFFER IF TRUE
                  * OTHERWISE TEST FOR FIT IN REVISE AND RECORD RW BUFFER

0C1F B20F 04601 RERV      CALR          M=20        TURN REV OFF              CJ020
0C20 92FC 04602           BALG +C       M.GF=0      BRANCH NOT FORMAT
0C21 CD2B 04603           JEPR TEROB3
0C22 E32C 04604           JEPR TEMFMT
0C23 9703 04605           BALG +3       (M=0)'
0C24 CBE0 04606           JEPR FERW
0C25 9304 04607           BALG +4       M=0         BRANCH NO DATA
0C26 CCF4 04608           JEPR CLRO
0C27 E0A7 04609           JEPR TEFITRV
0C28 9301 04610           BALG +1       M=0         BRANCH IF DATA FITS
0C29 A173 04611           JEPU BZLKM=G9

0C2A C890 04613           JEPR SERORWRV
0C2B CA3F 04614           JEPR RCRWB
0C2C 8AA3 04615           JEPU ENDRCRV

0C2D E50D 04617           JEPR HDRRW
0C2E 8AA3 04618           JEPU ENDRCRV

                  *INSERT A CHARACTER INTO RW BUFFER

0C2F B00F 04623 CLRW+1    CALR          M=00        INSERT A ZERO IN RW
0C30 F0D4 04624 INRW+     CALH          HB=M        INSERT M IN RWB
0C31 E8CC 04625           JEPR INC GD               INCRIMENT BUFFER POINTER
0C32 3004 04626           CMEM          A0IN        SET BUFFER ADDRESS
0C33 FAB2 04627           CALH          M=HB
0C34 3008 04628           CMEM          MIN         INPUT BUFFER AND EXIT
0C35 000F 04629           RETN

                  * FINDS THE FIRST DATA CHARACTER IN A READ BY ANALYZING THE
                  * RECORDED PREAMBLE AND RETURNS WITH THE FIRST CHARACTER ON M

0C36 B134 04635 FINDDATA CALG           G3=0        FIND DATA                 CI040
0C37 C130 04636           JEPR MOAC
0C38 2F0E 04637           BACM -1       CNS=1       LOOP UNTIL CARD AT SPEED
0C39 2F9D 04638           BACM -2       EOC=1
```

```
ADDR CODE NUMBR LABEL     CMND NEXTADDR OPERAND          COMMENT

0C3A B00F 04639           CALR          M=06
0C3B 2BE1 04640           BACM +1       FWD=0
0C3C B0FF 04641           CALR          M=0F
0C3D E1BB 04642           JEPR DLY MS
0C3E 2340 04643           CACM          RMED
0C3F B30F 04644           CALR          M=30
0C40 0003 04645           CKBD          2MDLY        96 MS DELAY
0C41 2B14 04646           BACM +4       RDR=0        BRANCH NO DATA
0C42 B9FF 04647           CALR          M=9F
0C43 B034 04648           CALG          G3=M
0C44 2310 04649           CACM          M=RR
0C45 00CF 04550           RETN

0C46 C0B3 04652           JEPR MOCD&PS
0C47 0CA9 04653           BKBD -6       NM=1
0C48 2BEC 04654           BACM -3       FWD=0
0C49 E397 04655           JEPR TERV
0C4A 9702 04656           BALG +2       (M=0)'       BRANCH IF REVISE
0C4B BAA2 04657           CALG          M=GA
0C4C 1A02 04658           BPRT +2       DBO=0        BRANCH IF AUTO LOG NOT SET
0C4D E451 04659           JEPR NRR AC
0C4E A171 04660           JEPU RETN1

0C4F E4B6 04662           JEPR EJAC
0C50 A569 04663           JEPU EJACEOC

          *CLEAR RW BUFFER

0C51 F1F4 04666 CLRW      CALH          HF=0
0C52 B00F 04669           CALR          M=00
0C53 3004 04670           CMEM          A01N         SET BUFFER ADDRESS TO ZERO
0C54 300A 04671 CLRWCONT  CMEM          MINI         SET TO ZERO AND INCR. ADDR.
0C55 1AFE 04672           BPRT -1       MAZ=0        BRANCH IF NOT DONE

          *GO TO BEGINNING OF RW BUFFER

0C56 BFFF 04676 AJRWST    CALR          M=FF         SET POINTER TO FF
0C57 B0D4 04677           CALG          GD=M
0C58 A887 04678           JEPU CLM

          *         UNCONDITIONALLY GO TO END OF RWB

0C59 CC56 04683 AJRWLA    JEPR AJRWST                GO TO BEGINNING
0C5A CBDF 04684           JEPR FERW+
0C5B 970E 04685           BALG -1       (M=0)'       BRANCH IF NOT ZERO
0C5C 8BFA 04686           JEPU AJRW-                 BACK UP TO LAST CHAR

          *         CLEAR ALL FOLLOWING DATA OUT OF RW BUFFER

0C5D CC2F 04691 CLRWEOD   JEPR CLRW+1                CLEAR FIRST CHAR
0C5E 300A 04692           CMEM          MINI         CLEAR TO START OF BUFFER
0C5F 1AFE 04693           BPRT -1       MAZ=0
0C60 8C59 04694           JEPU AJRWLA                GO TO END OF DATA

          *         CLEAR M CHARACTERS OUT OF RW BUFFER

0C61 BAD2 04699 CLRW+M    CALG          M=GD
0C62 BF01 04700           CALG          M=M+1
0C63 F004 04701           CALH          HO=M
0C64 CBDF 04702           JEPR FERW+
0C65 F0C4 04703           CALH          HC=M
0C66 BAD2 04704           CALG          M=GD
0C67 FC01 04705           CALH          M=M-HO
0C68 3004 04706           CMEM          A01N
0C69 FAC2 04707           CALH          M=HC
0C6A 3008 04708           CMEM          MIN
0C6B 9708 04709           BALG -7       (M=0)'       BRANCH RWB NOT CLEAR
0C6C 8C54 04710           JEPU CLRWCONT

          * FETCH CHARACTER ONE POSITION BEHIND THE PRESENT POINTER ADDRESS

0C6D CBE0 04715 FECHRW-   JEPR FERW
0C6E F014 04716           CALH          H1=M
0C6F CBFD 04717           JEPR FERW-
0C70 F004 04718           CALH          HO=M
0C71 E2B2 04719           JEPR TEM2CH
0C72 9706 04720           BALG +6       (M=0)'       BRANCH NOT 2ND CHARACTER
0C73 CBFD 04721           JEPR FERW-
0C74 E2B2 04722           JEPR TEM2CH
0C75 97C2 04723           BALG +2       (M=0)'
0C76 CBDF 04724           JEPR FERW+
0C77 0801 04725           JIPU +1
0C78 8A21 04726           JEPU XFM=HO

0C79 FA12 04728           CALH          M=H1
0C7A F114 04729           CALH          H1=0
0C7B 8A30 04730           JEPU XFHO=M

          * FETCH CHARACTER AND TRANSFER G7 AND G4 TO HO AND H1 THEN TEST M
          * FOR CARRIAGE RETURN

0C7C CC8C 04736 FEXFTERW  JEPR FECHRW+
0C7D E861 04737           JEPR XFH10G47
0C7E A335 04738           JEPU TEMCR
```

```
ADDR CODE NUMBR LABEL     CMND NEXTADDR OPERAND            COMMENT

                 *         REMOVE A CHARACTER FROM RWB AND SHIFT FOLLOWING DATA DOWN

0C7F EBCE 04743 RECHRWB   JEPR DEC GO                 DECRIMENT BUFFER POINTER
0C80 3006 04744           CMEM           AOINI        SET MEMORY ADDRESS
0C81 3002 04745           CMEM           AINC         INCRIMENT ADDRESS
0C82 3011 04746           CMEM           MOUTD        OUTPUT NEXT CHAR AND DECR ADDRESS
0C83 300A 04747           CMEM           MINI         INPUT CHAR AND INCRIMENT CHAR
0C84 18BC 04748           BPRT -3        MEZ=0        MEMORY OUTPUT =0
0C85 000F 04749           RETN                        YES

                 *         LOOK ONE CHARACTER AHEAD IN RW BUFFER
                 *         STORES THE CHARACTER IN HO AND SECOND CHARACTER IN H1 IF ANY

0C86 CC8C 04755 TERWB     JEPR FECHRW+                FETCH NEXT COMPLETE CHAR
0C87 FA12 04756           CALH           M=H1
0C88 9301 04757           BALG +1        M=0          SECOND CHARACTER?
0C89 C8FA 04758           JEPR AJRW-                  YES. ADJUST FOR SECOND CHAR
0C8A FA02 04759           CALH           M=HO
0C8B 88FA 04760           JEPU AJRW-                  ADJUST FOR FIRST CHAR

                 * FETCH THE NEXT CHARACTER IN THE RW BUFFER

0C8C F114 04765 FECHRW+   CALH           H1=0         RW FCH NEXT              CK060
0C8D CBDF 04766           JEPR FERW+
0C8E F004 04767           CALH           HO=M
0C8F E2B2 04768           JEPR TEM2CH
0C90 9702 04769           BALG +2        (M=0)'       BRANCH NOT 2ND CHARACTER
0C91 CBDF 04770           JEPR FERW+
0C92 F014 04771           CALH           H1=M
0C93 8A21 04772           JEPU XFM=HO

                 *         INSERT A CHARACTER IN RW BUFFER AND ALIGN TO IT
                 **USES HB AND HD

0C94 F0B4 04778 LOMRW&AJ  CALH           HB=M         SAVE THE CHARACTER IN HB
0C95 CBDF 04779           JEPR FERW+
0C96 3010 04780           CMEM           MOUT         GET CHAR OUT OF BUFFER
0C97 F0D4 04781           CALH           HD=M         AND SAVE IN HD
0C98 FAB2 04782           CALH           M=HB         GET THE CHARACTER SAVED IN HB
0C99 300A 04783           CMEM           MINI         INPUT MEMORY AND INCR ADDRESS
0C9A FAD2 04784           CALH           M=HD
0C9B F0B4 04785           CALH           HB=M         XFER HD TO HB
0C9C 9709 04786           BALG -6        (M=0)'       CONTINUE INSERTING CHARACTERS UNTIL END
0C9D 000F 04787           RETN

                 * TEST RW BUFFER FOR CENTER CODE OR FORMAT CODE BEFORE RECORDING
                 * TEST FOR SCR OR SPECIAL CENTERING CODES AND INSERT OR ADJUST BUFFER
                 * ACCORDINGLY

0C9E CC56 04794 ANRWBCEN  JEPR AJRWST                 PRE REC ANAL             CJ110
0C9F CC86 04795           JEPR TERWB
0CA0 9702 04796           BALG +2        (M=0)'
0CA1 B8FF 04797           CALR           M=BF
0CA2 CC30 04798           JEPR INRW+                  INSERT TRACK LINK
0CA3 E32C 04799           JEPR TEMFMT
0CA4 9305 04800           BALG +5        M=0          BRANCH IF FORMAT
0CA5 FA32 04801           CALH           M=H3
0CA6 B024 04802           CALG           G2=M
0CA7 C0AD 04803 ANRWC     JEPR MO                     REANAL                   CJ110
0CA8 CE78 04804           JEPR FE&SG2IF
0CA9 9701 04805           BALG +1        (M=0)'       BRANCH NEXT CHARACTER TEXT
0CAA 000F 04806           RETN

0CAB B099 04808           CALR           M=09-M       TEST FOR SCR
0CAC 9701 04809           BALG +1        (M=0)'
0CAD B124 04810           CALG           G2=0
0CAE BF59 04811           CALR           M=F5-M       TEST SPECIAL CENTER CODE
0CAF 9708 04812           BALG -7        (M=0)'
0CB0 CC8C 04813           JEPR FECHRW+
0CB1 9304 04814           BALG +A        M=0          BRANCH NO NEXT CHARACTER
0CB2 B14F 04815           CALR           M=14
0CB3 D003 04816           BALH +3        M-HO=0       BRANCH WORD UNDERSCORE CODE
0CB4 FAC2 04817           CALH           M=HO
0CB5 CE62 04818           JEPR TEMCENBP
0CB6 9709 04819           BALG -6        (M=0)'       BRANCH NOT CENTERING BREAKPOINT
0CB7 CC6D 04820           JEPR FECHRW-
0CB8 CE78 04821           JEPR FE&SG2IF
0CB9 9302 04822           BALG +2        M=0          BRANCH NXT CHAR NOT TEXT
0CBA E335 04823           JEPR TEMCR
0CBB 970C 04824           BALG -3        (M=0)'       BRANCH NOT CARRIAGE RETURN
0CBC CCC0 04825           JEPR CVCENTRW
0CBD 8CA7 04826           JEPU ANRWC

                 * FETCH PREVIOUS CHARACTER AND CLEAR THE REMAINDER OF RW BUFFER

0CBE CC6D 04831 AJ&CLRWB  JEPR FECHRW-                RW A&C                   CK090
0CBF 8C5D 04832           JEPU CLRWEOD

                 * SEARCH RW BUFFER FOR A 14 CODE (WORD UNDERSCORE) REPLACE WITH
                 * A 13 CODE

0CC0 CC56 04838 CVCENTRW  JEPR AJRWST                 REPLACE R CENT           CJ100
0CC1 CC8C 04839           JEPR FECHRW+
0CC2 9308 04840           BALG +8        M=0
```

```
ADDR CODE NUMBR LABEL    CMND NEXTADDR OPERAND            COMMENT

0CC3 B149 04841          CALR          M=14-M
0CC4 970C 04842          BALG -3       (M=0)'       BRANCH NOT WORD UNDERSCORE
0CC5 C8FA 04843          JEPR AJRW-
0CC6 B13F 04844          CALR          M=13
0CC7 CBFC 04845          JEPR CVRWCH
0CC8 CBDF 04846          JEPR FERW+
0CC9 BA22 04847          CALG          M=G2
0CCA 9301 04848          BALG +1       M=0
0CCB 000F 04849          RETN

0CCC BA0F 04851          CALR          M=A0
0CCD 8024 04852          CALG          G2=M
0CCE 8BFC 04853          JEPU CVRWCH

           *             TEST IF RW BUFFER IS NEARING ITS CAPACITY

0CCF B02F 04858 TERWFULL CALR          M=02
0CD0 B9D0 04859          CALG          M=M+GD       IF POINTER IS 253 OR 254 RETN WITH
0CD1 A1E8 04860          JEPU CVFF00                ZERO


0CD2 CC6D 04863          JEPR FECHRW-
0CD3 E8FA 04864          JEPR AJH7CHCT
0CD4 FA02 04865          CALH          M=H0
0CD5 9A03 04866          BDAT +3       M=20         BRANCH IF SPACE
0CD6 E1EF 04867          JEPR CAMJCS
0CD7 E599 04868          JEPR SUG10H54
0CD8 0801 04869          JIPU +1
0CD9 E8F6 04870          JEPR DEC H6
0CDA FA72 04871 AJRW&H7  CALH          M=H7         RETN&COMP              CK100
0CDB 9706 04872          BALG -9       (M=0)'
0CDC 000F 04873          RETN

           * MOVE RW BUFFER POINTER FORWARD BY THE AMOUNT IN M

0CDD B9D0 04878 AJRWBM   CALG          M=M+GD
0CDE B0D4 04879          CALG          GD=M         ADD M TO POINTER
0CDF 000F 04880          RETN

           * COUNTS THE NUMBER OF CHARACTERS IN RW BUFFER. COUNT CONTAINED IN H7

0CE0 F174 04885 CTRWH7   CALH          H7=0         SCAN RWB               CK100
0CE1 0801 04886          JIPU +1
0CE2 EBD9 04887          JEPR UPH7CHCT
0CE3 CC8C 04888          JEPR FECHRW+
0CE4 970D 04889          BALG -2       (M=0)'
0CE5 88FA 04890          JEPU AJRW-

           * REMOVE ALL SPACES FROM THE RW BUFFER

0CE6 CBDF 04895 CLRWSP   JEPR FERW+                 RWB CLR SP ONLY        CK110
0CE7 9A0E 04896          BDAT -1       M=20         BRANCH IF SPACE
0CE8 9301 04897          BALG +1       M=0
0CE9 A6A9 04898          JEPU AJRWJ

0CEA E6A9 04900          JEPR AJRWJ
0CEB 8C5D 04901          JEPU CLRWEOD

           *             FETCH FORWARD OUT OF RO BUFFER

0CEC E8E3 04906 FERO+    JEPR INC GE                INCRIMENT POINTER
0CED BAE2 04907 FERO     CALG          M=GE
0CEE 3044 04908          CMEM          A1IN         SET ADDRESS
0CEF 3010 04909          CMEM          MOUT         GET CHARACTER...
0CF0 3144 04910          CMEM          XLST
0CF1 1EEF 04911          BPRT -0       MBY=1
0CF2 3141 04912          CMEM          XLOUT
0CF3 000F 04913          RETN                       ..AND EXIT

           *             CLEAR ALL CHARACTERS FROM RO BUFFER

0CF4 B00F 04918 CLRO     CALR          M=00
0CF5 3044 04919          CMEM          A1IN         SET MEMORY ADDRESS TO ZERO
0CF6 300A 04920          CMEM          MINI         INPUT A ZERO AND INCR ADDR
0CF7 1AFE 04921          BPRT -1       MAZ=0        DONE
0CF8 BFFF 04922 AJROST   CALR          M=FF         SET POINTER TO FF
0CF9 B0E4 04923          CALG          GE=M
0CFA A8B7 04924          JEPU CLM

           *             FETCH PREVIOUS CHARACTER OUT OF RO BUFFER

0CFB E8E5 04929 FERO-    JEPR DEC GE                DECRIMENT POINTER
0CFC 8CED 04930          JEPU FERO                  GET CHAR


0CFD CD5F 04933 TEROBLA  JEPR FECHRO-
0CFE 8D44 04934          JEPU FECHRO+

           *             INSERT A CHARACTER INTO RO BUFFER

0CFF 7DE5 04939          *CHECK WORD*
0D00 F0B4 04939 INRO+    CALH          H8=M         SAVE M
```

```
ADDR CODE NUMBR LABEL     CMND NEXTADDR OPERAND              COMMENT

0D01 E8E3 04940           JEPR INC GE                    INCRIMENT POINTER
0D02 3044 04941           CMEM          A1IN             SET ADDRESS
0D03 FAB2 04942           CALH          M=HB
0D04 3008 04943           CMEM          MIN              STORE CHAR
0D05 000F 04944           RETN

                 * ADJUST RO BUFFER POINTER REVERSE SAVE M IN HB DURING THIS OPERATION

0D06 F0B4 04949 AJRO-     CALH          HB=M             SAVE M
0D07 E8E5 04950           JEPR DEC GE                    DECRIMENT POINTER
0D08 FAB2 04951 XFM=HB    CALH          M=HB             RESTORE M
0D09 000F 04952           RETN

                 *UNCONDITIONALLY GO TO TEH END OF RO BUFFER

0D0A CCF8 04957 AJROLA    JEPR AJROST

                 *        GO TO THE END OF DATA IN RO BUFFER

0D0B CCEC 04961 AJROLAIF  JEPR FERO+                     GET THE NEXT CHARACTER
0D0C 970E 04962           BALG -1       (M=0)'           DONE?
0D0D 8D06 04963           JEPU AJRO-                     YES

                 *        SWAP RO BUFFER END TO END
                 **USES H1,HB,HD

0D0E CD0A 04969 SWROEND   JEPR AJROLA                    GO TO END OF DATA
0D0F B00F 04970           CALR          M=00
0D10 F014 04971           CALH          H1=M
0D11 3044 04972           CMEM          A1IN             SET ADDRESS TO ZERO
0D12 3010 04973 LPSWROEN  CMEM          MOUT             OUTPUT MEMORY...
0D13 F0B4 04974           CALH          HB=M             ...AND SAVE IN HB
0D14 BAE2 04975           CALG          M=GE             GO TO END OF DATA
0D15 3044 04976           CMEM          A1IN
0D16 3010 04977           CMEM          MOUT             OUTPUT MEMORY...
0D17 F0D4 04978           CALH          HD=M             ...AND SAVE IN HD
0D18 FAB2 04979           CALH          M=HB
0D19 3008 04980           CMEM          MIN              SWAP CHARACTERS
0D1A FA12 04981           CALH          M=H1             GET FORWARD ADDRESS
0D1B 3044 04982           CMEM          A1IN
0D1C FAD2 04983           CALH          M=HD             STORE REAR CHARACTER
0D1D 300A 04984           CMEM          MINI
0D1E BAE2 04985           CALG          M=GE
0D1F FC11 04986           CALH          M=M-H1           TEST IF DONE
0D20 9304 04987           BALG +4       M=0
0D21 9403 04988           BALG +3       M=M-1=0
0D22 E8EF 04989           JEPR INC H1                    NOT DONE. INCREMENT FORWARD POINTER
0D23 E8E5 04990           JEPR DEC GE                    DECRIMENT REAR POINTER
0D24 8D12 04991           JEPU LPSWROEN                  GO TO LOOP ENTRY
0D25 8CF8 04993           JEPU AJROST                    GO TO START OF DATA ON EXIT

                 * FETCH AND TEST CHARACTER IN RO FOR ADJUSTMENT

0D26 CD39 04998 TEROB1    JEPR FECH                      BIG ROB TEST          CK130
0D27 8D32 04999           JEPU AJROBM

                 * FETCH NEXT CHARACTER AND TEST FOR FURTHER ADJUSTMENT IN RO BUFFER

0D28 E37C 05004 TEROB2    JEPR TEXLX                     ROB TEST
0D29 CD44 05005           JEPR FECHRO+
0D2A 8D32 05006           JEPU AJROBM

                 * FETCH NEXT FROM RO BUFFER AND ADJUST POINTER BACK

0D2B CCEC 05011 TEROB3    JEPR FERO+                     MINI ROB TEST         CK130
0D2C 8D06 05012           JEPU AJRO-

                 *        ADJUST RO BACK BY AMOUNT IN GO

0D2D BAE2 05017 AJROGO-   CALG          M=GE             GET BUFFER POINTER
0D2E B601 05018           CALG          M=M-GO           SUBTRACT GO
0D2F B0E4 05019           CALG          GE=M
0D30 AB87 05020           JEPU CLM

                 * IF CHARACTER IN G7 REQUIRES A SECOND CHARACTER ADJUST RO
                 * BUFFER BACK 2 CHARACTERS IF NOT ADJUST BACK ONE CHARACTER

0D31 BA72 05026 AJROBG7   CALG          M=G7             G7 COMP ROB           CK140
0D32 E2B2 05027 AJROBM    JEPR TEM2CH                    COMP ROB              CK140
0D33 9701 05028           BALG +1       (M=0)'
0D34 CD06 05029           JEPR AJRO-
0D35 FA02 05030           CALH          M=H0
0D36 8D06 05031           JEPU AJRO-

                 * FETCH NEXT CHARACTER IN RO BUFFER

0D37 CCEC 05036 FEDATRO+  JEPR FERO+                     RO DATA FCH FWD       CK200
0D38 A1E8 05037           JEPU CVFF00
```

```
ADDR CODE NUMBR LABEL    CMND NEXTADDR OPERAND              COMMENT

                 * FETCH CHARACTER FROM RO BUFFER

0D39 CD44 05042 FECH     JEPR FECHRO+              FETCH CHAR               CK155
0D3A 9703 05043          BALG +3        (M=0)'
0D3B C84F 05044          JEPR FEDA
0D3C CD44 05045          JEPR FECHRO+
0D3D 9301 05046          BALG +1        M=0
0D3E 000F 05047          RETN

0D3F BAA2 05049          CALG           M=GA
0D40 1E02 05050          BPRT +2        DBO=1      BRANCH AUTO LOG FLAG SET
0D41 E2BB 05051          JEPR SESTOP
0D42 A887 05052          JEPU CLM
0D43 A50C 05054          JEPU HDR AC

                 * FETCH NEXT CHARACTER FROM RO BUFFER. FETCH SECOND CHARACTER IF
                 * NECESSARY. CONVERTS FF TO 00

0D44 F114 05060 FECHRO+  CALH           H1=0       FETCH NEXT               CK150
0D45 CCEC 05061          JEPR FERO+
0D46 F004 05062          CALH           HO=M
0D47 9701 05063          BALG +1        (M=0)'
0D48 000F 05064          RETN

0D49 E1E8 05066          JEPR CVFF00
0D4A 930A 05067          BALG -5        M=0
0D4B E2B2 05068          JEPR TEM2CH
0D4C 9702 05069          BALG +2        (M=0)'
0D4D CCEC 05070          JEPR FERO+
0D4E F014 05071          CALH           H1=M
0D4F 8A21 05072          JEPU XFM=HO

                 * FETCH NEXT CHARACTER IN RO BUFFER AND INCREMENT COUNT

0D50 F114 05077 FECHRO+& CALH           H1=0       RO FCH NXT & CNT         CK160
0D51 E8C0 05078          JEPR INC GO
0D52 CCEC 05079          JEPR FERO+
0D53 F004 05080          CALH           HO=M
0D54 9307 05081          BALG +7        M=0
0D55 E1E8 05082          JEPR CVFF00
0D56 930A 05083          BALG -5        M=0
0D57 E2B2 05084          JEPR TEM2CH
0D58 9703 05085          BALG +3        (M=0)'
0D59 E8C0 05086          JEPR INC GO
0D5A CCEC 05087          JEPR FERO+
0D5B F014 05088          CALH           H1=M
0D5C 8A21 05089          JEPU XFM=HO

                 *TRANSFER CHARACTER FROM RO BUFFER TO RW BUFFER

0D5D CCEC 05094 XFCHRORW JEPR FERO+                CHAR TRANSF              CK210
0D5E 8C30 05095          JEPU INRW+

                 * FETCH PREVIOUS CHARACTEP FROM RO BUFFER

0D5F CCFB 05100 FECHRO-  JEPR FERO-                RO FCH LAST              CK170
0D60 E2B2 05101          JEPR TEM2CH
0D61 9704 05102          BALG +4        (M=0)'
0D62 CCFB 05103          JEPR FERO-
0D63 E2B2 05104          JEPR TEM2CH
0D64 9701 05105          BALG +1        (M=0)'
0D65 CCEC 05106          JEPR FERO+
0D66 8D2B 05107          JEPU TEROB3

                 *MOVE RO POINTER COUNTER BACK TO LAST TAB COCE.

0D67 FA02 05112 AJROTOTB CALH           M=HO
0D68 CD32 05113          JEPR AJROBM
0D69 CD5F 05114          JEPR FECHRO-              A<
0D6A C3E7 05115          JEPR TEMTBCOL
0D6B 970D 05116          BALG -2        (M=0)'     A>  BRANCH IF M IS NOT A TAB
0D6C CD44 05117          JEPR FECHRO+
0D6D 8D44 05118          JEPU FECHRO+

                 * TRANSFER RW TO RO BUFFER AND CLEAR RW BUFFER

0D6E CCF4 05123 XFRWROCL JEPR CLRO                 RW TO RO & CLR           CK230
0D6F CC56 05124          JEPR AJRWST
0D70 8104 05125          CALG           GO=0
0D71 CD74 05126          JEPR XFRWROGO
0D72 CCF8 05127          JEPR AJROST
0D73 8C51 05128          JEPU CLRW

                 * TRANSFER THE RW BUFFER TO THE RO BUFFER

0D74 CBDF 05133 XFRWROGO JEPR FERW+                GO RW TO RO              CK220
0D75 CD00 05134          JEPR INRO+
0D76 E8C0 05135          JEPR INC GO
0D77 970C 05136          BALG -3        (M=0)'
0D78 000F 05137          RETN
```

```
ADDR CODE NUMBR LABEL     CMND NEXTADDR OPERAND            COMMENT

                 * TRANSFER RO BUFFER TO RW BUFFER

0D79 CD5D 05142           JEPR XFCHRORW
0D7A E8C0 05143           JEPR INC GO
0D7B 970D 05144 XFRORWGO  BALG -2          (M=O)'    GO RO RW XFER            CK250
0D7C 000F 05145           RETN

                 * CLEAR THE RO AND THE RW BUFFER

0D7D E6A9 05150 RERO=RW   JEPR AJRWJ                 RESTORE ROB/RWB          CK270
0D7E CCE0 05151           JEPR CTRWH7
0D7F CD83 05152           JEPR CLRW=RO
0D80 8CE6 05153           JEPU CLRWSP

0D81 000F 05156           RETN

0D82 CC5D 05158           JEPR CLRWEOD
0D83 FA72 05159 CLRW=RO   CALH             M=H7      CLR RWB FR ROB           CK240
0D84 930C 05160           BALG -3          M=0
0D85 CC6D 05161           JEPR FECHRW-
0D86 930A 05162           BALG -5          M=0
0D87 E8FA 05163           JEPR AJH7CHCT
0D88 C084 05164           JEPR MOROCARD
0D89 CD5F 05165           JEPR FECHRO-
0D8A D007 05166           BALH -8          M-HO=0
0D8B CD44 05167           JEPR FECHRO+
0D8C A6A9 05168           JEPU AJRWJ

                 *TEUSHE9
                 ** TEST WHETHER CHAR IN G7 IS AT A CARR POSITION WHICH IS UNDERSCORED

0D8D BF0F 05174 TEUSHE9   CALR             M=F0
0D8E FE92 05175           CALH             M=M.H9
0D8F FBE2 05176           CALH             M=M⊕HE
0D90 000F 05177           RETN

                 * ANALYZE AUTOMATIC UNDERSCORE

0D91 B04F 05182 ANAUTUS   CALR             M=04
0D92 92A1 05183           BALG +1          M.GA=0    BRANCH LINE UNDERSCORE NOT SET
0D93 8F82 05184           JEPU USKB

0D94 000F 05186           RETN

                 * TRANSFER THE REMAINDER OF THE RO BUFFER TO THE RW BUFFER

0D95 CC30 05191           JEPR INRW+
0D96 E2B2 05192           JEPR TEM2CH
0D97 9702 05193           BALG +2          (M=0)'
0D98 CD5D 05194           JEPR XFCHRORW
0D99 E8C0 05195           JEPR INC GO
0D9A E8C0 05196           JEPR INC GO
0D9B CD37 05197 XF/RORW   JEPR FEDATRO+              RO REM TO RW             CK260
0D9C 9708 05198           BALG -7          (M=0)'
0D9D 8D06 05199           JEPU AJRO-

                 * EXECUTE AUTOMATIC UNDERSCORE IN PLAY AND JUSTIFY

0D9E C6AD 05204 USPSDJ    JEPR XFCAG10               AUTO UND. SC.            CL030
0D9F C59F 05205           JEPR ADDEFG10
0DA0 B04F 05206           CALR             M=04
0DA1 9291 05207           BALG +1          M.G9=0    BRANCH JUSTIFY NOT ON
0DA2 F164 05208           CALH             H6=0
0DA3 E86B 05209           JEPR XFG01H01
0DA4 E85B 05210           JEPR XFHE9G01
0DA5 E87D 05211           JEPR NEG G10
0DA6 E3CA 05212           JEPR ADG10H10
0DA7 E88D 05213           JEPR XFG01G4H
0DA8 E85B 05214           JEPR XFHE9G01
0DA9 E4FD 05215           JEPR AJDEUS
0DAA E3E6 05216           JEPR SUMG10
0DAB 8A32 05217           CALG             M=G3
0DAC E7F6 05218           JEPR RML7
0DAD E3E3 05219           JEPR ADM+G10
0DAE C8AD 05220           JEPR MVCRG10
0DAF E82C 05221           JEPR CLHE9
0DB0 CE06 05222           JEPR US
0DB1 8DE3 05223           JEPU LDG4

                 *ANG7US
                 ** ANALYSES G7 TO DETECT AN UNDERSCORED CHARACTER. BRANCHES TO BEGIN VS TE
                 *** USES GP REGS GO. G1,HE,H9

0DB2 B97F 05230 ANG7US    CALR             M=97
0DB3 9176 05231           BALG +6          M>G7      BRANCH IF NOT US CHARACTER
0DB4 CD8D 05232           JEPR TEUSHE9
0DB5 9301 05233           BALG +1          M=0       BRANCH IF BEGIN US
0DB6 000F 05234           RETN

0DB7 C6AD 05236           JEPR XFCAG10
0DB8 C59F 05237           JEPR ADDEFG10
0DB9 A84B 05238           JEPU XFG01HE9
```

```
ADDR CODE NUMBR LABEL     CMND NEXTADDR OPERAND              COMMENT

ODBA CD8D 05240 USPART    JEPR TEUSHE9
ODBB 930A 05241           BALG -5        M=0        BRANCH NOT UNDERSCORE
ODBC B08F 05242           CALR           M=08
ODBD 9291 05243           BALG +1        M.G9=0     BRANCH PLAY NOT SET
ODBE BD9E 05244           JEPU USPSDJ

ODBF A82C 05246           JEPU CLHE9

                * PRINTS THE UNDERSCORE

ODC0 1308 05251 PRUS      CPRT           RBUP
ODC1 B5FF 05252           CALR           M=5F
ODC2 C573 05253           JEPR SEG01PR
ODC3 B7FF 05254           CALR           M=7F
ODC4 BE02 05255           CALG           M=M.GO
ODC5 B004 05256           CALG           GO=M
ODC6 B03F 05257           CALR           M=03
ODC7 BB12 05258           CALG           M=MPG1
ODC8 B014 05259           CALG           G1=M
ODC9 8491 05260           JEPU PRG01

                * FETCH THE ESCAPEMENT FOR THE UNDERSCORE CHARACTER

ODCA B80F 05265 FEUSESC   CALR           M=80
ODCB 92F1 05266           BALG +1        M.GF=0     BRANCH NOT TWELVE PITCH
ODCC 9261 05267           BALG +1        M.G6=0     BRANCH NOT PROPORTIONAL SPACE
ODCD B7FF 05268           CALR           M=7F
ODCE B85A 05269           CALR           M=M+B5
ODCF 000F 05270           RETN

                * ADJUST THE ESCAPEMENT FOR AN UNDERSCORE TO CENTER UNDER CHARACTER

ODD0 B5FF 05277 SEDE&AJ   CALR           M=5F       SET D.E. & ADJUST
ODD1 C598 05278           JEPR UPDEM
ODD2 C56E 05279           JEPR FEDE
ODD3 BC00 05280           CALG           SML
ODD4 B034 05281           CALG           G3=M
ODD5 FA72 05282           CALH           M=H7
ODD6 9301 05283           BALG +1        M=0
ODD7 A887 05284           JEPU CLM

ODD8 BA42 05286           CALG           M=G4
ODD9 953D 05287           BALG -2        M=M-G3>0
ODDA B009 05288           CALR           M=00-M
ODDB F004 05289           CALH           HO=M
ODDC BFEF 05290           CALR           M=FE
ODDD BE42 05291           CALG           M=M.G4
ODDE E7F6 05292           JEPR RML7
ODDF C599 05293           JEPR SEDE
ODE0 BFEF 05294           CALR           M=FE
ODE1 FE02 05295           CALH           M=M.HO
ODE2 A7F6 05296           JEPU RML7

                * RESTORE G4 TO CONTENTS PRIOR TO UNDERSCORE EXECUTION

ODE3 B144 05301 LDG4      CALG           G4=0       RESTORE G4              CL080
ODE4 E2B1 05302           JEPR TEG72CH
ODE5 9707 05303           BALG +7        (M=0)'
ODE6 B04F 05304           CALR           M=04
ODE7 9292 05305           BALG +2        M.G9=0     BRANCH JUSTIFY NOT ON
ODE8 CBE0 05306           JEPR FERW
ODE9 0801 05307           JTPU +1
ODEA CCED 05308           JEPR FERO
ODEB E1E8 05309           JEPR CVFF00
ODEC B044 05310           CALG           G4=M
ODED 000F 05311           RETN

                * ANALYZE KEYBOARD CENTERING
                * MOVE CARRIAGE TO NEAREST COLUMN. FETCH LEFT MARGIN AND CALCULATE
                * DISTANCE BETWEEN STORE IN G4. INSERTS A CENTERING CODE (14) INTO
                * THE BUFFER. SETS CENTERING FLAG AND JUMPS TO EVALUATE
                * KEYBOARD CENTERING

ODEE C58C 05320 ANKBCENT  JEPR MVCRCOL              KB CENT                 CM010
ODEF E29F 05321           JEPR FELM
ODF0 B009 05322           CALR           M=00-M
ODF1 F9A0 05323           CALH           M=M+HA
ODF2 E1EC 05324           JEPR CVOOFF
ODF3 B044 05325           CALG           G4=M
ODF4 0C3F 05326           BKBD -0        STOP=1
ODF5 B14F 05327           CALR           M=14
ODF6 B074 05328           CALG           G7=M
ODF7 C93D 05329           JEPR RCCHKB
ODF8 C58E 05330           JEPR MVCARDE
ODF9 1309 05331           CPRT           RBDN
ODFA B40F 05332           CALR           M=40
ODFB E90B 05333           JEPR SEG6                 SET THE CENTERING FLAG
ODFC BE42 05334           JEPU EVKBCENT

                * LOOK FOR KEYBOARD ENTRY AND MEDIA MOVEMENT
```

```
ADDR CODE NUMBR LABEL     CMND NEXTADDR OPERAND                COMMENT

0DFD C0AD 05339 MOKB&MED JEPR MO                         KB MONITOR              CP010
0DFE A0C3 05340          JEPU MOKB

                 * CALCULATE NECESSARY MOVEMENT FOR CENTERING USED IN PLAY AND
                 * JUSTIFY MODES

0DFF 3FBB 05346          *CHECK WORD*
0E00 B40F 05346 MVCRCEN  CALR          M=40           EXEC CENT               CM020
0E01 E90B 05347          JEPR SEG6                    SET THE CENTERING FLAG
0E02 C518 05348          JEPR RERF
0E03 E10E 05349          JEPR CLH4-H7
0E04 C5C2 05350          JEPR CLDE
0E05 8E53 05351          JEPU CAMVCEN

                 * EXECUTE UNDERSCORE: TRANSFER G7 AND G4 TO G1 AND G0

0E06 E879 05356 US       JEPR XFG47G01                EXEC UND. SC.           CL040
0E07 8A32 05357          CALG          M=G3
0E08 E3E6 05358          JEPR SUMG10
0E09 8A12 05359          CALG          M=G1
0E0A 1A71 05360          BPRT +1       DB7=0          BRANCH NOT UNDERSCORED CHARACTER
0E0B 8DC0 05361          JEPU PRUS

                 * EXECUTES UNDERSCORE FOR A 2 CHARACTERS IF
                 * BOTH NEED UNDERSCORE OR A WHOLE WORD UNTIL A NON UNDERSCORE
                 * CHARACTER IS REACHED.

0E0C E88D 05367          JEPR XFG01G4H
0E0D CDC0 05368 PRNEXTUS JEPR PRUS
0E0E E879 05369          JEPR XFG47G01
0E0F CDCA 05370          JEPR FEUSESC
0E10 E3E6 05371          JEPR SUMG10
0E11 8A12 05372          CALG          M=G1
0E12 1E74 05373          BPRT +4       DB7=1          BRANCH IF UNDERSCORED CHARACTER
0E13 E88D 05374          JEPR XFG01G4H
0E14 CDCA 05375          JEPR FEUSESC
0E15 C8A1 05376          JEPR AJCR+M
0E16 8E0D 05377          JEPU PRNEXTUS

0E17 CDCA 05379          JEPR FEUSESC
0E18 E3E3 05380          JEPR ADM+G10
0E19 8A02 05381          CALG          M=G0
0E1A 9302 05382          BALG +2       M=0
0E1B C8A1 05383          JEPR AJCR+M
0E1C 8DC0 05384          JEPU PRUS

0E1D 000F 05386          RETN

                 *ALIGNS RW TO LAST LEADING TAB AND LOADS HC WITH CARRIER POSITION
                 *CORRESPONDING TO LAST TAB
                 **HC

0E1E E29F 05393 ALRW&HC  JEPR FELM
0E1F F930 05394          CALH          M=M+H3
0E20 F0C4 05395          CALH          HC=M              INITIALIZE HC WITH BEGIN CARRIER POS
0E21 CC56 05396          JEPR AJRWST
0E22 CC8C 05397          JEPR FECHRW+            A<
0E23 80A9 05398          CALR          M=0A-M
0E24 9704 05399          BALG +4       (M=0)'    B> BR IF NOT TAB
0E25 FAC2 05400          CALH          M=HC
0E26 930B 05401          BALG -4       M=0       A>  BR IF NOT ENOUGH TAB STOPS SET
0E27 C42A 05402          JEPR FETBHC+                ADJUST HC TO NEXT TAB STOP
0E28 0809 05403          JIPU -6
0E29 8C6D 05404          JEPU FECHRW-                ALIGN ON LAST TAB & FCH CHAR PAST TAB

                 * CALCULATES CONSUMED SPACE FOR THE CENTERED WORD

0E2A 9A01 05409 CAMCSCEN BDAT +1       M=20        CALC CEN CONS SPACE
0E2B A1EF 05410          JEPU CAMJCS

0E2C E201 05412          JEPR FEMWT
0E2D A7DA 05413          JEPU SML1

                 * READERLINE CORRECT
                 * IN THE REVISE MODE A LINE CORRECT WILL CAUSE THE BUFFER TO
                 * BE BACKED UP TO THE LAST LINE AND THE RW WILL BE READ TO PERFORM
                 * THIS

0E2E E455 05421 RDLC     JEPR NRRRW
0E2F B07F 05422          CALR          M=07
0E30 0402 05423          CKBD          ARDR
0E31 CB71 05424          JEPR RDREVM
0E32 C0A1 05425          JEPR SEACMED
0E33 CD28 05426          JEPR TEROB2
0E34 B109 05427          CALR          M=10-M
0E35 9703 05428          BALG +3       (M=0)'      BRANCH NOT FORMAT
0E36 0002 05429          RNOP
0E37 8E6C 05430          JEPU LCFMT

0E38 CE4D 05432          JEPR UPGZ=LS
0E39 C044 05433          JEPR FECHRO+
0E3A 970D 05434          BALG -2       (M=0)'
0E3B CCF8 05435          JEPR AJROST
0E3C 8ECB 05436          JEPU AJCARCHC
```

```
ADDR CODE NUMBR LABEL    CMND NEXTADDR OPERAND                 COMMENT

              * ADJUST CARRIAGE TO POSITION SPECIFIED IN H3 PLUS THE STANDARD LEFT MARGI

0E3D E29F 05441 AJCAH3   JEPR FELM
0E3E F930 05442          CALH            M=M+H3
0E3F 889A 05443          JEPU MVCRM

              *KB ANALYSIS LOOP WHICH ALLOWS OPERATOR TO POSITION CARRIAGE AFTER
              *ENTERING CENTERING CODE WITHOUT RECORDING SPACES & BACKSPACES.

0E40 C5CD 05449          JEPR MVCR+1              D<
0E41 E15D 05450          JEPR AJKS+1              H<
0E42 E0DC 05451 EVKBCENT JEPR PACEKB              B<
0E43 9702 05452          BALG +2      (M=0)'      A>          BRANCH IF KB INPUT
0E44 083D 05453          BKBD -2      STOP=0      B>          BRANCH IF STOP KEY NOT PRESSED
0E45 807E 05454          JEPU RESTPIDL

0E46 1E73 05456          BPRT +3      DB7=1       A< C>
0E47 9A08 05457          BDAT -7      M=20        D>          BRANCH IF SPACE CODE
0E48 9BF2 05458          BDAT +2      M=0F            E<      BRANCH IF BACK SPACE CODE
0E49 9931 05459          BDAT +1      M=13         F>         BRANCH IF CENTERING CODE
0E4A 807E 05460          JEPU RESTPIDL

0E4B C5D0 05462          JEPR MVCR-1              G<F<E<
0E4C 0804 05463          JIPU -8                  H>

              * CALCULATE THE LINE SPACE REQUIRED AND PLACES IN G2

0E4D CED0 05468 UPGZ=LS  JEPR CAG7VSP             UPDATE LINE SP           CN040
0E4E 8920 05469          CALG            M=M+G2
0E4F A3BE 05470          JEPU XFG2=M

              * CALCULATES THE POSITION OF THE CENTERED WORD IN THE JUSTIFY MODE

0E50 BA72 05475          CALG            M=G7
0E51 CE2A 05476          JEPR CAMCSCEN
0E52 E5F8 05477          JEPR ADCSH54
0E53 CD44 05478 CAMVCEN  JEPR FECHRO+
0E54 E2C0 05479          JEPR SKSPTBAJ
0E55 9302 05480          BALG +2         M=0
0E56 CE82 05481          JEPR TEMCENBP
0E57 970B 05482          BALG -7      (M=0)'     BRANCH NOT CENTERING BREAKPOINT
0E58 CD31 05483          JEPR AJROBG7
0E59 CD5F 05484          JEPR FECHRO-
0E5A B139 05485          CALR            M=13-M
0E5B 970D 05486          BALG -2      (M=0)'     BRANCH NOT CENTERING CODE
0E5C CD44 05487          JEPR FECHRO+
0E5D E861 05488          JEPR XFH10G47
0E5E E870 05489          JEPR XFH45H01
0E5F E3C0 05490          JEPR SHH1OR
0E60 E867 05491          JEPR XFH01G01
0E61 E87D 05492          JEPR NEG G10
0E62 CF6E 05493          JEPR CACENTER
0E63 E10E 05494 MVCRCENC JEPR CLH4-H7
0E64 E0DA 05495          JEPR FE2PCH
0E65 E440 05496          JEPR XMG2+G10
0E66 BF0F 05497          CALR            M=F0
0E67 B012 05498          CALG            M=M.G1'
0E68 9702 05499          BALG +2      (M=0)'
0E69 B01F 05500 MVCR01   CALR            M=01
0E6A 889A 05501          JEPU MVCRM

0E6B 8BAD 05503          JEPU MVCRG10

              * LINE CORRECT FORMAT
              * TRANSFER THE RO BUFFER TO THE RW BUFFER & CLEAR THE RW BUFFER. CLEAR
              * DEFERED ESCAPEMENT AND MOVE TO LEFT MARGIN. WAIT FOR
              * NEXT KEYBOARD ENTRY AND PROCESS.

0E6C E397 05511 LCFMT    JEPR TERV                LCORR FMT                CN050
0E6D 9701 05512          BALG +1      (M=0)'      BRANCH IF REVISE
0E6E CD6E 05513          JEPR XFRWROCL
0E6F CC51 05514          JEPR CLRW
0E70 C48C 05515          JEPR CLDEMVO
0E71 E0C8 05516          JEPR WTKBCH
0E72 B074 05517          CALG         G7=M
0E73 B109 05518          CALR         M=10-M
0E74 9302 05519          BALG +2      M=0         BRANCH IF FORMAT CODE
0E75 CE3D 05520          JEPR AJCAH3
0E76 8069 05521          JEPU ANMODIDL
0E77 8FC0 05522          JEPU WTKBFMT

              *FETCHS NEXT CHAR FROM RW BUFFER AND SETS G2 IF THE CHARACTER IS TEXT.

0E78 CC8C 05527 FE&SG2IF JEPR FECHRW+
0E79 1A71 05528          BPRT +1      DB7=0       BR. IF PREC. TAB
0E7A 98B3 05529          BDAT +3      M=0B        0B IS PREC. TAB CODE
0E7B E358 05530          JEPR TEMPC
0E7C 9702 05531          BALG +2      (M=0)'      B>     BRANCH IF NOT PRINT CHAR
0E7D BFFF 05532          CALR         M=FF
0E7E B024 05533          CALG         G2=M        A<     SET G2=FF
0E7F 8A21 05534          JEPU XFM=HC

              *TESTS M FOR CENTERING BREAKPOINT WHICH IS ANY TAB, CARRIAGE RETURN OR
              *CENTERING CODE. RETURNS WITH M=00 IF ONE OF THESE CODES.
```

```
ADDR CODE NUMBR LABEL     CMND NEXTADDR OPERAND              COMMENT

0E80 1E79 05540 TEMCRCE   BPRT +9           DB7=1
0E81 0803 05541           JIPU +3
0E82 1E77 05542 TEMCENBP  BPRT +7           DB7=1
0E83 98A7 05543           BDAT +7           M=0A                 BR IF TAB
0E84 9886 05544           BDAT +6           M=0B                 BR IF PREC TAB
0E85 9865 05545           BDAT +5           M=06                 BR IF PSCR
0E86 9874 05546           BDAT +4           M=07         B)     BRANCH IF CR
0E87 9883 05547           BDAT +3           M=08                BRANCH IF PREC CR
0E88 9892 05548           BDAT +2           M=09                BRANCH IF SPECIAL CR
0E89 9931 05549           BDAT +1           M=13                BRANCH IF CENTERING
0E8A A1EC 05550           JEPU CVOOFF

0E8B A887 05552           JEPU CLM


                * CALCULATE AND MOVE RW BUFFER FOR HORIZONTAL CORRECTION
                * MOVE CARRIAGE AS SPECIFIED IN G0 AND G1

0E8C CF00 05558 CAMVRWHZ JEPR CARWHZ
0E8D C8AD 05559 MVRWHZ    JEPR MVCRG10
0E8E E10E 05560           JEPR CLH4-H7
0E8F 8C59 05561           JEPU AJRWLA


                *DELETES LAST RECORDED LINE (OR PART LINE) IF RECORD MODE OR
                *MOVES BACK ONE LINE (OR PART LINE) IF REVISE MODE.
                *MOVES CARRIER TO BEGINNING OF TEXT ON LINE.
                **GO G2

0E90 E394 05569 LCOR      JEPR TERVRC
0E91 9701 05570           BALG +1           (M=0)'
0E92 A887 05571           JEPU CLM                                RETURN AND ERROR BUZZ.

0E93 C5C2 05573           JEPR CLDE
0E94 E288 05574           JEPR RECEN
0E95 C518 05575           JEPR RERF
0E96 E82C 05576           JEPR CLHE9                     A<     CLEAR BEGIN UNDERSCORE POSITION
0E97 B124 05577           CALG              G2=0
0E98 CC56 05578           JEPR AJRWST
0E99 0801 05579           JIPU +1                        B>
0E9A CE4D 05580           JEPR UPGZ=LS                   C<     VERTICAL LINE SPACE ACCUMULATED
0E9B CC8C 05581           JEPR FECHRW+                   B<        IN G2
0E9C 970D 05582           BALG -2           (M=0)'       C>
0E9D CEC8 05583           JEPR AJCARCHC                         MOVE VERTICAL AMT IN G2
0E9E C5DC 05584           JEPR RECOL
0E9F B20F 05585           CALR              M=20
0EA0 9291 05586           BALG +1           M.G9=0       D>     BR IF REVISE MODE
0EA1 BEAF 05587           JEPU LCRC                             JUMP TO LINE CORRECT FOR REC MODE

0EA2 92F5 05589           BALG +5           M.GF=0       D> E<  BR IF DUMP BIT NOT SET
0EA3 E924 05590           JEPR REGF                             RESET DUMP BIT - AND
0EA4 CC51 05591 LCRVC     JEPR CLRW                               ADJUST FOR PART LINE
0EA5 CCFB 05592           JEPR AJROST
0EA6 CE3D 05593           JEPR AJCAH3
0EA7 A88B 05594           JEPU SEM=FF

0EA8 BAD2 05596           CALG              M=GD
0EA9 9703 05597           BALG +3           (M=0)'       H>       BR IF DATA IN RW
0EAA E2A3 05598           JEPR FETNRW
0EAB 9402 05599           BALG +2           M=M-1=0      I>     BR IF ON FIRST TRACK
0EAC CE2E 05600           JEPR RDLC                             READ PREVIOUS LINE
0EAD BEA4 05601           JEPU LCRVC                     H<     ADJUST CARRIER & BUFF FOR NEW LINE

0EAE A887 05603           JEPU CLM                       I<     RETURN AND ERROR BUZZ


                *DELETE LAST RECORDED LINE OR LAST PART LINE & MOVE CARRIER TO BEGINNING
                **OF DELETED TEXT.

0EAF BAD2 05609 LCRC      CALG              M=GD
0EB0 9701 05610           BALG +1           (M=0)'       A>      BR IF DATA IN RW
0EB1 A219 05611           JEPU RDLCRC                           ADJUST FOR PREVIOUS LINE.

0EB2 BA82 05613           CALG              M=G8         A<
0EB3 1A53 05614           BPRT +3           DB5=0        B>     BR IF NOT MARGIN CONTROL
0EB4 BA62 05615           CALG              M=G6         B<
0EB5 1A04 05616           BPRT +4           DB0=0        D>     BR IF TAB COUNTER CLOSED
0EB6 E30C 05617           JEPR CLTC                              CLEAR TAB COUNTER
0EB7 CE3D 05618           JEPR AJCAH3                            MOVE CARRIER TO BEGINNING
0EB8 CC51 05619           JEPR CLRW
0EB9 A88B 05620           JEPU SEM=FF

0EBA CE1E 05622           JEPR ALRW&HC                   D<      ALIGN TO END OF LEADING TABS.
0EBB BAD2 05623           CALG              M=GD
0EBC BF01 05624           CALG              M=M+1
0EBD B024 05625           CALG              G2=M                 SET G2= NO OF LEADING RW TABS.
0EBE B0FF 05626           CALR              M=0F
0EBF BEC2 05627           CALG              M=M.GC               FETCH NO OF TABS FROM TAB
0EC0 9527 05628           BALG +7           M=M-G2>0     E>      BR IF TB COUNT GE LEADING RW TABS
0EC1 B9D0 05629           CALG              M=M+GD
0EC2 B0D4 05630           CALG              GD=M                 ALIGN RW TO LAST TB CTR TAB.
0EC3 CC5D 05631 MVCALATB JEPR CLRWEOD                    F<      CLR ANY DATA PAST TABS
0EC4 CE1E 05632           JEPR ALRW&HC                           ALIGN TO END OF TABS & FCH TB STOP
0EC5 C550 05633           JEPR TBCRASH                           FETCH LAST COLUMN IF NO TB SET
0EC6 C89A 05634           JEPR MVCRM                             MOVE TO POSITION OF LAST RW TAB
0EC7 A88B 05635           JEPU SEM=FF

0EC8 FA02 05637           CALH              M=H0         E<
0EC9 9709 05638           BALG -6           (M=0)'       F>      BR IF DATA PAST LAST TAB IN RW
0ECA A219 05639           JEPU RDLCRC                            CORRECT FOR PREVIOUS LINE
```

```
ADDR CODE NUMBR LABEL    CMND NEXTADDR OPERAND            COMMENT

0ECB 8A22 05645 AJCARCHC CALG          M=G2
0ECC 1A72 05646          BPRT +2       DB7=0
0ECD 8009 05647          CALR          M=00-M
0ECE 8384 05648          JEPU MV+V

0ECF 8367 05650          JEPU MV-V

               * CALCULATE LINE SPACE REQUIRED BY G7 AND PLACE IN HO

0ED0 80DF 05655 CAG7VSP  CALR          M=0D
0ED1 D002 05656          BALH +2       M-HO=0
0ED2 FA02 05657          CALH          M=HO
0ED3 83A3 05658          JEPU CAMLS
0ED4 ABBB 05659          JEPU SEM=FF

               * EXECUTE LINE CORRECT FORMAT

0ED5 CB99 05664 EXLCFMT  JEPR MVCRLM                MOVE TO LEFT MARGIN
0ED6 CC51 05665          JEPR CLRW                  CLEAR BUFFER..
0ED7 807D 05666          JEPU REKBIDL               ..AND EXIT TO IDLE


0ED8 F004 05669 AJG01    CALH          HO=M         COMP G0/G1             CN375
0ED9 880D 05670          CALR          M=M.80
0EDA 9301 05671          BALG +1       M=0
0EDB BFFF 05672          CALR          M=FF
0EDC F014 05673          CALH          H1=M
0EDD A3CA 05674          JEPU ADG10H10

               * FETCH G7 AND CALCULATE CONSUMED SPACE FOR COLUMN CENTERING
               * RETURNS WITH THE WIDTH OF CHARACTER IN M.

0EDE 8A72 05680 FEG7CSCC CALG          M=G7
0EDF CE2A 05681          JEPR CAMCSCEN
0EE0 9705 05682          BALG +5       (M=0)'       BRANCH NO CONSUMED SPACE
0EE1 8A82 05683          CALG          M=G8
0EE2 1A62 05684          BPRT +2       DB6=0          B>    BRANCH IF CODE PRINT NOT ON
0EE3 CEE7 05685          JEPR CVG7CPCH
0EE4 A1EF 05686          JEPU CAMJCS

0EE5 800F 05688          CALR          M=00
0EE6 000F 05689          RETN                       A<B<

               *CONVERTS"FIRST LINE FIND"CODE TO CHAR CODE FOR CODE PRINT OR IF NOT FLF
               *CODE GOES TO "CODE PRINT CONVERSION" WHERE OTHER CONTROL CODES ARE
               *CONVERTED.

0EE7 812F 05696 CVG7CPCH CALR          M=12
0EE8 9071 05697          BALG +1       M-G7=0       A>       BRANCH IF G7=FIRST LINE FIND
0EE9 8681 05698          JEPU CVG7CP

0EEA 1AD1 05700          BPRT +1       LXL=0        A< B>    BRANCH IF "USO" SYSTEM.
0EEB 81CA 05701          CALR          M=M+1C                12+1C+27=55=U CODE.
0EEC 827A 05702          CALR          M=M+27          B<    12+27   =39=9 CODE.
0EED 000F 05703          RETN

               * CHARACTER CORRECT AFTER A LINE CORRECT
               * CLEAR HE AND H9. IF TAB COUNTER OPEN THEN CLEAR TABS
               * ADJUST BUFFER TO START. PROCESS CHARACTER CORRECT

0EEE 8124 05710 C LINCHC CALG          G2=0         CHC LCORR              CN090
0EEF EB2C 05711          JEPR CLHE9
0EF0 801F 05712          CALR          M=01
0EF1 9261 05713          BALG +1       M.G6=0       BRANCH IF TAB COUNTER NOT OPEN
0EF2 E30C 05714          JEPR CLTC
0EF3 CC56 05715          JEPR AJRWST
0EF4 0801 05716          UIPU +1
0EF5 CE4D 05717          JEPR UPGZ=LS
0EF6 CC8C 05718          JEPR FECHRW+
0EF7 970D 05719          BALG -2       (M=0)'       BRANCH IF CHARACTER
0EF8 CC51 05720          JEPR CLRW
0EF9 CECB 05721          JEPR AJCARCHC
0EFA CE3D 05722          JEPR AJCAH3
0EFB 8445 05723          JEPU BZERI3

               * SET UP AND PRINT FORMAT BLOCK

0EFC CB99 05728 ST&PTFMT JEPR MVCRLM
0EFD E029 05729          JEPR SEH3&FMT              SET UP FMT BLOCK
0EFE A25D 05730          JEPU CPTP                  ..AND PRINT IT

               * CALCULATE THE NUMBER OF CHARACTERS REQUIRED IN MOVING THE RW
               * BUFFER TO THE BEGINNING OF THE LINE WHEN A LINE CORRECT IS
               * EXECUTED

0EFF 6D35 05737          *CHECK WORD*
0F00 CC6D 05737 CARWHZ   JEPR FECHRW-
0F01 E861 05738          JEPR XFH10G47
0F02 9308 05739          BALG +8       M=0          BRANCH IF NO MOTION REQUIRED
0F03 E334 05740          JEPR TEG7CR
0F04 9703 05741          BALG +3       (M=0)'       BRANCH IF CARRIAGE RETURN
```

```
ADDR CODE NUMBR LABEL    CMND NEXTADDR OPERAND            COMMENT

0F05 CBDF 05742          JEPR FERW+
0F06 E29F 05743          JEPR FELM
0F07 0806 05744          JIPU +6
0F08 E2B1 05745          JEPR TEG72CH
0F09 9706 05746          BALG -9       (M=0)'     BRANCH IF 2ND CHARACTER
0F0A 8F5E 05747          JEPU ANCENCOR

0F0B CBDF 05749          JEPR FERW+
                * CALCULATES THE DISTANCE THE CARRIAGE MUST MOVE IN A HORIZONTAL
                * LINE CORRECTION

0F0C E29F 05753 CARWHZLM JEPR FELM
0F0D F930 05754          CALH          M=M+H3
0F0E B024 05755 CARWHZM  CALG          G2=M
0F0F E0DA 05756 CAHZCOR1 JEPR FE2PCH
0F10 E43E 05757          JEPR XMG2
0F11 CC8C 05758 CAHZCORC JEPR FECHRW+                HORIZ CORR CONT        CN070
0F12 9701 05759          BALG +1       (M=0)'     BRANCH IF CHARACTER
0F13 000F 05760          RETN

0F14 C39E 05762          JEPR TEMTB
0F15 9306 05763          BALG +6       M=0        BRANCH IF TAB
0F16 E861 05764          JEPR XFH10G47
0F17 C3A2 05765          JEPR CAG7LS
0F18 9708 05766          BALG -7       (M=0)'     BRANCH NO HORIZONTAL CORRECTION
0F19 CEDE 05767          JEPR FEG7CSCC
0F1A CED8 05768          JEPR AJGO1
0F1B 8F11 05769          JEPU CAHZCORC

0F1C E0DA 05771          JEPR FE2PCH
0F1D E49B 05772          JEPR DIG1/M
0F1E BA12 05773          CALG          M=G1
0F1F F0C4 05774          CALH          HC=M
0F20 C42A 05775          JEPR FETBHC+
0F21 C550 05776          JEPR TBCRASH
0F22 B024 05777          CALG          G2=M
0F23 8F0F 05778          JEPU CAHZCOR1

                * FETCHES DATA FROM THE KEYBOARD IN THE FORMAT MODE

0F24 C023 05783 FEKBFMT  JEPR MOPCHPRT            MONITOR PITCH CHANGE
0F25 0B31 05784          BKBD +1       STOP=0     Q. STOP KEY
0F26 8ED5 05785          JEPU EXLCFMT             A. YES

0F27 E0DC 05787          JEPR FACEKB              MONITOR KEYBOARD
0F28 9308 05788          BALG -4       M=0        Q. ENTRY
0F29 A15D 05789          JEPU AJKS+1              A. YES, PUSH UP ENTRY AND EXIT

                *DELETES LAST CHARACTER PRINTED FROM RW BUFFER AND REPOSITIONS CARRIER AND
                *OR PAPER POSITION TO ITS PREVIOUS POSITION.
                ***G0,G1,G2,G3,G4,G7,H0,H1

0F2A C58E 05796 C CHAR   JEPR MVCARDE
0F2B CBE0 05797          JEPR FERW
0F2C 9702 05798          BALG +2       (M=0)'     A<    BRANCH IF RW BUFFER NOT EMPTY.
0F2D CE3D 05799          JEPR AJCAH3
0F2E 8445 05800          JEPU BZERI3

0F2F E2C7 05802          JEPR SEDUMPRV            A<
0F30 CC6D 05803          JEPR FECHRW-
0F31 E861 05804          JEPR XFH10G47
0F32 E2CD 05805          JEPR FEG7ACWT
0F33 9302 05806          BALG +2       M=0        B>    BRANCH IF NOT ACCENT CODE
0F34 CC5D 05807          JEPR CLRWEOD                   CLEAR CHAR FROM RW BUFFER
0F35 A158 05808          JEPU BZ

0F36 CC6D 05810          JEPR FECHRW-             B<C<
0F37 E2CE 05811          JEPR FEMACWT
0F38 970D 05812          BALG -2       (M=0)'      C>   BRANCH IF ACCENT CHAR
0F39 CC8C 05813          JEPR FECHRW+
0F3A CC5D 05814          JEPR CLRWEOD                   CLEAR ACCENT CODES IF ANY
0F3B E2B1 05815          JEPR TEG72CH
0F3C 9702 05816          BALG +2       (M=0)'     D>    BRANCH IF NO 2ND CHAR INVOLVED
0F3D E158 05817          JEPR BZ
0F3E 8E8C 05818          JEPU CAMVRWHZ

0F3F E334 05820          JEPR TEG7CR              D<
0F40 9703 05821          BALG +3       (M=0)'     E>    BRANCH IF NOT CARRIAGE RETURN CODE
0F41 C3A2 05822          JEPR CAG7LS
0F42 C367 05823          JEPR MV-V
0F43 8E8C 05824          JEPU CAMVRWHZ

0F44 C3A2 05826          JEPR CAG7LS              E<
0F45 9304 05827          BALG +4       M=0        F>    BRANCH IF NOT INDEX OR REV INDEX
0F46 BA72 05828          CALG          M=G7
0F47 98D1 05829          BDAT +1       M=0D       G>   BRANCH IF REV INDEX CODE
0F48 8366 05830          JEPU RIX                      ADJUST FOR INDEX CODE

0F49 8383 05832          JEPU IX                  G<   ADJUST FOR REV INDEX CODE

0F4A BA72 05834          CALG          M=G7       F)
0F4B B119 05835          CALR          M=11-M
0F4C 9701 05836          BALG +1       (M=0)'
0F4D C5DC 05837          JEPR RECOL
0F4E BA72 05838          CALG          M=G7
0F4F B089 05839          CALR          M=0B-M
0F50 930C 05840          BALG +C       M=0        H> BRANCH IF PRECEDENTED TAB
0F51 9406 05841          BALG +6       M=M-1=0    I    BRANCH IF TB CODE
```

```
ADDR CODE NUMBR LABEL     CMND NEXTADDR OPERAND              COMMENT

OF52 CEE7 05842           JEPR CVG7CPCH
OF53 9301 05843           BALG +1        M=0       J>    BRANCH IF NOT CONTROL CODE
OF54 E158 05844           JEPR BZ
OF55 CEDE 05845           JEPR FEG7CSCC            J<    FETCH WIDTH OF PRT CH.UBS.PBS & SP
OF56 E657 05846           JEPR SE&TEGO1            LOAD GO & G1 WITH CHAR WIDTH
OF57 88A7 05847           JEPU MVCR-

OF58 BA62 05849           CALG           M=G6      I<
OF59 1E03 05850           BPRT +3        DBO=1     BRANCH IF TAB COUNTER OPEN
OF5A CC55 05851           JEPR TELM
OF5B 9701 05852           BALG +1        (M=0)'    H< BRANCH IF NOT AT LEFT MARGIN
OF5C E35E 05853           JEPR DEC TC              H<
OF5D 8E8C 05854           JEPU CAMVRWHZ

               * ANALYZE CENTERING CORRECTION
               * MOVE CARRIAGE TO POSITION PRIOR TO CENTERING CODE. EXECUTE A CHARACTER
               * CORRECT FOLLOWING A LINE CORRECT TO INITIALIZE FLAGS.

OF5E CBE0 05861 ANCENCOR JEPR FERW                 HORIZ CORR CENT           CN100
OF5F E32F 05862           JEPR TEMSPTB
OF60 9303 05863           BALG +3        M=0       BRANCH IF SPACE OR TAB
OF61 CC8C 05864           JEPR FECHRW+
OF62 CFC3 05865           JEPR CAEOCENT
OF63 8F11 05866           JEPU CAHZCORC

OF64 0002 05868           RNOP
OF65 8EEE 05869           JEPU C LINCHC

               * CALCULATE COLUMN CENTER CORRECTION
               * CALCULATE DISTANCE REQUIRED TO MOVE BACK BEFORE COLUMN CENTERING

OF66 CF75 05875 CACENC    JEPR CACENC1
OF67 B80F 05876           CALR           M=80
OF68 BB22 05877           CALG           M=M@G2
OF69 A3BE 05878           JEPU XFG2=M

               * CALCULATE POSITION FOR DATA IN COLUMN CENTERING

OF6A C479 05882 CACOLCEN JEPR FESTBCA+
OF6B F000 05883           CALH           M=M-1
OF6C D6A9 05884           BALH -6        M=M+HAC   BRANCH IF NO STANDARD TAB SET
OF6D 8F75 05885           JEPU CACENC1

OF6E BA42 05887 CACENTER CALG           M=G4      CENT TO G2                CM025
OF6F BA09 05888           CALR           M=AO-M
OF70 970C 05889           BALG +C        (M=0)'    BRANCH NOT SPACE
OF71 E29F 05890           JEPR FELM
OF72 B024 05891           CALG           G2=M
OF73 ECC0 05892           JEPR FERMJ
OF74 9027 05893           BALG +7        M=M:G2C   BRANCH IF NECESSARY TO CALCULATE CENTER
OF75 E7F6 05894 CACENC1   JEPR RML7
OF76 B024 05895           CALG           G2=M
OF77 B81F 05896           CALR           M=81
OF78 9622 05897           BALG +2        M=M+G2C
OF79 E1A1 05898           JEPR FEPITCH
OF7A A3E3 05899           JEPU ADM+G10

OF7B A3BE 05901           JEPU XFG2=M

OF7C 8F66 05903           JEPU CACENC

OF7D E29F 05905           JEPR FELM
OF7E B940 05906           CALG           M=M+G4
OF7F B024 05907           CALG           G2=M
OF80 E1A1 05908           JEPR FEPITCH
OF81 A3E3 05909           JEPU ADM+G10

               *          KEYBOARD UNDERSCORE
               *THE EXECUTION OF A KEYBOARD UNDERSCORE RESULTS IN THE CARRIAGE BEING
               *RETURNED TO THE FIRST PRECEEDING NON PRINTABLE CHARACTER AND UNDERSCORING
               *OF THE PRINTABLE CHARACTERS TO THE RIGHT
               ***GOG1

OF82 C58E 05918 USKB      JEPR MVCARDE             EXECUTE DEFERRED ESCAPEMENT
OF83 B104 05919           CALG           GO=0
OF84 B114 05920           CALG           G1=0
OF85 0803 05921           JIPU +3
OF86 FA02 05922           CALH           M=HO
OF87 E1EF 05923           JEPR CAMJCS              CALCULATE CONSUMED SPACE
OF88 E3E3 05924           JEPR ADM+G10
OF89 CC6D 05925           JEPR FECHRW-             FETCH LAST CHARACTER IN RW BUFFER
OF8A 1E73 05926           BPRT +3        DB7=1
OF8B 9A02 05927           BDAT +2        M=20      BRANCH IF SPACE
OF8C BE8F 05928           CALR           M=E8
OF8D D60B 05929           BALH -7        M=M+HOC   BRANCH ON PRINTING CHAR.
OF8E CC8C 05930           JEPR FECHRW+             FETCH NEXT CHAR.
OF8F CC8C 05931           JEPR FECHRW+             FETCH NEXT CHAR.
OF90 9703 05932           BALG +3        (M=0)'    TEST FOR NULL
OF91 CBFA 05933           JEPR AJRW-
OF92 000F 05934           RETN

OF93 B20F 05936           CALR           M=20
OF94 9FFE 05937           BDAT -1        M=7F      BRANCH IF PRECEDENTED SPACE
OF95 B80E 05938           CALR           M=M@BO
OF96 CBFC 05939           JEPR CVRWCH
OF97 CC8C 05940           JEPR FECHRW+
```

```
ADDR CODE NUMBR LABEL    CMND NEXTADDR OPERAND           COMMENT

0F98 970D 05941          BALG -4       (M=0)'     BRANCH CHARACTER IN RW
0F99 C8FA 05942          JEPR AJRW-
0F9A E88D 05943          JEPR XFG01G4H            G4/H7=G0/G1
0F9B E2C7 05944          JEPR SEDUMPRV
0F9C E1A1 05945          JEPR FEPITCH             FETCH PITCH
0F9D E3E3 05946          JEPR ADM+G10
0F9E B5FF 05947          CALR          M=5F       SET M=5F UNDERSCORE CHAR. CODE
0F9F E235 05948          JEPR FEMPCWT             FETCH WEIGHT OF UNDERSCORE CHAR.
0FA0 E3E6 05949          JEPR SUMG10
0FA1 CDD0 05950          JEPR SEDE&AJ
0FA2 E3E3 05951          JEPR ADM+G10
0FA3 C8A7 05952          JEPR MVCR-               MOVE CR LEFT
0FA4 CE06 05953          JEPR US                  EXECUTE UNDERSCORE
0FA5 A88D 05954          JEPU SEM=FF

                   * EXIT ROUTINE FROM FORMAT BLOCK
                   * MOVE CARRIAGE TO LEFT MARGIN
                   * RECORD AND TRACK PRINT THE FORMAT INFORMATION

0FA6 C899 05961 EXFMT    JEPR MVCRLM
0FA7 E029 05962          JEPR SEH3&FMT            SET UP BLOCK IN BUFFER
0FA8 E25D 05963          JEPR CPTP
0FA9 BA82 05964          CALG          M=G8
0FAA 1A64 05965          BPRT +4       DB6=0      BRANCH CODE PRINT NOT ON
0FAB B40F 05966          CALR          M=40
0FAC E908 05967          JEPR REG5                RESET CENTERING FLAG
0FAD C734 05968          JEPR TPRCAC
0FAE E04D 05969          JEPR MVLM&PF
0FAF BA82 05970          CALG          M=G8
0FB0 1E42 05971          BPRT +2       DB4=1      BRANCH IF REVISE FLAG SET
0FB1 CAF5 05972          JEPR DUMP&FCH            A. NO
0FB2 807D 05973          JEPU REKBIDL

0FB3 CBC9 05975          JEPR RCRDRV
0FB4 807D 05976          JEPU REKBIDL

                   *     FORMAT MODE

                   * CHECKS REQUIRED CONDITIONS FOR ENTRY INTO FORMAT MODE, LEFT
                   * MARGIN, RW BUFFER EMPTY.

0FB5 E29F 05984 FMTMODE  JEPR FELM                GET THE LEFT MARGIN
0FB6 C056 05985          JEPR TECR=M
0FB7 9301 05986          BALG +1       M=0        Q.IS PRINTER AT LEFT MARGIN
0FB8 8445 05987          JEPU BZERI3              A NO

0FB9 CBE0 05989          JEPR FERW
0FBA 9304 05990          BALG +4       M=0        Q. RW EMPTY
0FBB BA82 05991          CALG          M=G8       A  NO
0FBC 1E4B 05992          BPRT -4       DB4=1      Q. REVISE ON
0FBD C734 05993          JEPR TPRCAC              A. NO
0FBE CACA 05994          JEPR DUMP                RECORD BUFFER ON MEDIA
0FBF C48C 05995          JEPR CLDEMVO
0FC0 CF24 05996 WTKBFMT  JEPR FEKBFMT             GET KEYBOARD ENTRY
0FC1 E008 05997          JEPR ANKBFMT             .AND PROCESS
0FC2 080D 05998          JIPU -2

                   * CALCULATE ENDING POSITION FOR DATA IN COLUMN CENTERING

0FC3 E10E 06003 CAEOCENT JEPR CLH4-H7
0FC4 CC8C 06004          JEPR FECHRW+
0FC5 9308 06005          BALG +8       M=0        BRANCH NO CHARACTER IN RW BUFFER
0FC6 E1E8 06006          JEPR CVFF00
0FC7 930C 06007          BALG -3       M=0        BRANCH IF CHARACTERS IN RW ARE FILL
0FC8 CE82 06008          JEPR TEMCENBP
0FC9 9304 06009          BALG +4       M=0        BRANCH IF CENTERING BREAKPOINT
0FCA FA02 06010          CALH          M=H0
0FCB CE2A 06011          JEPR CAMCSCEN
0FCC E5F8 06012          JEPR ADCSH54
0FCD 0806 06013          JIPU -9
0FCE CC6D 06014          JEPR FECHRW-
0FCF E870 06015          JEPR XFH45H01
0FD0 E3C0 06016          JEPR SHH10R
0FD1 E867 06017          JEPR XFH01G01
0FD2 840F 06018          CALR          M=40
0FD3 9284 06019          BALG +4       M.G8=0     BRANCH CODE PRINT NOT ON
0FD4 B14F 06020          CALR          M=14
0FD5 CC82 06021          JEPR CVMCP
0FD6 E1EF 06022          JEPR CAMJCS
0FD7 E3E3 06023          JEPR ADM+G10
0FD8 CF6E 06024          JEPR CACENTER
0FD9 E0DA 06025          JEPR FE2PCH
0FDA A440 06026          JEPU XMG2+G10

                   * TRANSFER AND SET PRINTER FORMAT

0FDB E407 06031 XF&SEFMT JEPR SEPFMT              FMT SET & XFER          C0051
0FDC CCF8 06032 XF&ALFMT JEPR AJROST              FMT ALIGN & XFER        C0051
0FDD A046 06033          JEPU XFFMT

                   * FETCH POSITION IN GD (RW BUFFER) IF ESP. GO TO BUZZER ERROR
                   * OTHERWISE PERFORM CHARACTER CORRECT.

0FDE BAD2 06039 EXCCFMT  CALG          M=GD
0FDF 3005 06040          CMEM          AOIND
```

```
ADDR CODE NUMBR LABEL     CMND NEXTADDR OPERAND            COMMENT

OFE0 3010 06041           CMEM          MOUT
OFE1 99F1 06042           BDAT +1       M=9F        BRANCH IF EXPANDED SPACE
OFE2 8F2A 06043           JEPU C CHAR               ADJUST BUFFER AND PAPER

OFE3 A152 06045           JEPU BZERROR

          *   IN READ AUTO LOG MODE - SETS TRANSPORT TO TRACK 01

OFE4 E1D2 06050           JEPR SETNRO               SET RO TRACK NO. TO 00
OFE5 0804 06051           JIPU +4
OFE6 800F 06052 MVTOTK01  CALR          M=00
OFE7 2DDC 06053           BROM -3       ACT=1       BR. IF RO ACTIVE
OFE8 2ED1 06054           BRWM +1       ACT=1       BR. IF RW ACTIVE
OFE9 8445 06055           JEPU BZER13

OFEA E1CF 06057           JEPR SETNRW               SET RW TRACK NO. TO 00
OFEB C0AD 06058           JEPR MO
OFEC E497 06059           JEPR FEACBNO
OFED 9811 06060           BDAT +1       M=01        BRANCH IF HEAD IS AT FIRST TRACK
OFEE 080C 06061           JIPU -3
OFEF A0BE 06062           JEPU RDAUTLOG             BRANCH TO READ AUTO LOG

OFF0 E04D 06065 FMTHDR    JEPR MVLM&PF
OFF1 1309 06066           CPRT          RBDN
OFF2 CF24 06067           JEPR FEKBFMT
OFF3 E1A6 06068           JEPR ANFMTHDR             .AND PROCESS
OFF4 810F 06069           CALR          M=10
OFF5 E924 06070           JEPR REGF                 RESET STOP FLAG
OFF6 0702 06071           CKBD          BUZZ=0
OFF7 0809 06072           JIPU -6

          * ANACHDA - USED ONLY IN FORMAT PRINT MODE  .

OFF8 A04D 06077           JEPU MVLM&PF

OFF9 83D6 06079           JEPU BS

OFFA 989D 06081 ANACHDR   BDAT -2       M=09             SCR
OFFB 98FD 06082           BDAT -2       M=0F             PBS
OFFC 8918 06083 -         JEPU PR&MVG7
          ***                 ANALYZE  KEYBOARD  FORMAT
          **ANALYZE AND EXECUTES KEYBOARD ENTRIES IN FORMAT MODE

OFFE 15C0 06089           *ADJUST WORD*
OFFF 9CDF 06089           *CHECK WORD**
1000 A07E 06089           JEPU EXFMTTB              DO FORMAT TAB

1001 CEFC 06091           JEPR ST&PTFMT             IF SCR PRINT AND STORE PRINTER SETTINGS
1002 E394 06092           JEPR TERVRC               TEST FOR REV OR REC ON
1003 9303 06093           BALG +3       M=0
1004 C93F 06094           JEPR RCCHCP
1005 8FF0 06095           JEPU FMTHDR               BR. TO FORMAT HEADER IF REV OR REC ON

1006 8FA6 06097           JEPU EXFMT    BR. TO EXIT FORMAT

1007 A072 06099           JEPU EXFMTHDR

1008 B074 06101 ANKBFMT   CALG          G7=M
1009 B0B9 06102           CALR          M=0B-M
100A 9305 06103           BALG -A       M=0              CODE TAB
100B 9404 06104           BALG -B       M=M-1=0          TAB
100C 9404 06105           BALG -B       M=M-1=0          SCR
100D 9408 06106           BALG -7       M=M-1=0          PCR
100E 9407 06107           BALG -8       M=M-1=0          CR
100F BA72 06108           CALG          M=G7
1010 1E7A 06109           BPRT +A       DB7=1       BR. IF BIT 7 TRUE
1011 9A03 06110           BDAT +3       M=20        BR. IF SPACE
1012 9FF2 06111           BDAT +2       M=7F        BR. IF PRECEDENTED SPACE
1013 98F2 06112           BDAT +2       M=0F        BR. IF BACK SPACE
1014 A152 06113           JEPU BZERROR

1015 85CD 06115           JEPU MVCR+1               EXECUTE SPACE

1016 85D0 06117           JEPU MVCR-1               EXECUTE BACKSPACE

1017 8249 06119           JEPU SEPC                 TURN CODE PRINT ON AND OFF

1018 8ED5 06121           JEPU EXLCFMT              EXECUTE LINE CORRECT AND EXIT

1019 8483 06123           JEPU SETB@CA

101A 8400 06125           JEPU CLTBSTBC

101B 9A6A 06127           BDAT -5       M=A6        BR. IF CHARACTER CORRECT
101C 9AEA 06128           BDAT -5       M=AE        BR. IF CODE PRINT
101D 9A5A 06129           BDAT -5       M=A5        BR. IF LINE CORRECT
101E 9B0A 06130           BDAT -5       M=B0        BR. IF TAB SET
101F 9B1A 06131           BDAT -5       M=B1        BR. IF TAB CLEAR
1020 9B24 06132           BDAT +4       M=B2        BR. IF SPECIAL TAB SET
1021 9B34 06133           BDAT +4       M=B3        BR. IF TOTAL TAB CLEAR
1022 9B44 06134           BDAT +4       M=B4        BR. IF LEFT MARGIN SET
1023 9B54 06135           BDAT +4       M=B5        BR. IF RIGHT MARGIN SET
1024 A152 06136           JEPU BZERROR

1025 847F 06138           JEPU SESTB@CA             SET SPECIAL TAB
```

```
ADDR CODE NUMBR LABEL    CMND NEXTADDR OPERAND              COMMENT

1026 841A 06140          JEPU CLALLTB                CLEAR ALL TABS

1027 826E 06142          JEPU SELMCA                 SET LEFT MARGIN

1028 826C 06144          JEPU SERMCA                 SET RIGHT MARGIN

               *     STORE EMPTY RW BUFFER CARRIER POSITION IN REGISTER H3.
               *     STORE FORMAT CODE. LEFT MARGIN. RIGHT MARGIN. TABS & SPECIAL
               *            TABS IN RW BUFFER.
               *     REGISTER HC IS TAB/SPEC. TAB POS.
               *     SEPERATE TABS AND SPECIAL TABS WITH CODE 9F

1029 E301 06153 SEH3&FMT JEPR SEH3=CA
102A B10F 06154          CALR           M=10         STORE FMT CODE
102B CC30 06155          JEPR INRW+
102C E29F 06156          JEPR FELM
102D C9FD 06157          JEPR INDATRW+               STORE LEFT MARGIN
102E E2A1 06158          JEPR FERM
102F C9FD 06159          JEPR INDATRW+               STORE RIGHT MARGIN
1030 F1C4 06160          CALH           HC=0
1031 C42A 06161          JEPR FETBHC+                GET THE TABS
1032 CC30 06162          JEPR INRW+                  STORE IN BUFFER
1033 970D 06163          BALG -2        (M=0)'       BRANCH IF MORE TABS
1034 B9FF 06164          CALR           M=9F
1035 CBFC 06165          JEPR CVRWCH                 STORE A SEPARATOR CODE
1036 F1C4 06166          CALH           HC=0
1037 C47A 06167          JEPR FESTBHC+               GET THE SPECIAL TABS
1038 CC30 06168          JEPR INRW+                  STORE IN BUFFER
1039 970D 06169          BALG -2        (M=0)'       BRANCH IF MORE SPECIAL TABS
103A B9FF 06170          CALR           M=9F
103B 8BFC 06171          JEPU CVRWCH                 STORE IN SEPARATOR CODE

               *  EXECUTE FORMAT TRACK PRINT
               *  REG. GB BIT 6 = CODE PRINT
               *  REG. G5 BIT 6 = DEFD T.P.
               *  REG. GA BIT 0 = AUTOLOG

103C 000F 06179          RETN

103D BAB2 06181 SEPFMTTP CALG           M=GB
103E 1A6D 06182          BPRT -2        DB6=0        BRANCH CODE PRINT NOT SET
103F 840F 06183          CALR           M=40
1040 E908 06184          JEPR REG5                   RESET DEFERRED T.P. FLAG
1041 C734 06185          JEPR TPRCAC
1042 801F 06186          CALR           M=01
1043 92A1 06187          BALG +1        M.GA=0       BRANCH AUTOLOG FLAG NOT SET
1044 C73D 06188          JEPR TPAL
1045 A04D 06189          JEPU MVLM&PF

               *  IN FORMAT MODE - TRANSFER RO BUFFER TO THE RW BUFFER

1046 CD5D 06194 XFFMT    JEPR XFCHRORW               FMT TRANSF.              C0080
1047 CD5D 06195          JEPR XFCHRORW
1048 CCEC 06196          JEPR FERO+
1049 CC30 06197          JEPR INRW+
104A CD37 06198          JEPR FEDATRO+
104B 970D 06199          BALG -2        (M=0)'       BRANCH IF DATA TO TRANSFER
104C 000F 06200          RETN

               *  INCR. BILLING CLOCK. RESET BIT 1 IN REG. G5 (MARGIN CCONTROL SINGLE
               *          CYCLE. JUST. HELP ZONE) COL. DATA.
               *  RETURN TO LEFT MARGIN & PAPER FEED

104D E18F 06207 MVLM&PF  JEPR BILL                   GO LM WITH P.F.          C0090
104E C5CC 06208          JEPR RECOL
104F E09C 06209          JEPR MVLM/TLM
1050 8381 06210          JEPU AJV+1

               *ANG7PFPJ
               ** ANALYSES G7 FOR PRINTER FUNCTION CODES IN PLAY & JUSTIFY. BRANCHES TO
               ** EXECUTE PRINTER COMMANDS.
               *** USES GP REG G0

1051 E335 06218 ANG7PFPJ JEPR TEMCR
1052 9706 06219          BALG +6        (M=0)'       BRANCH NOT A CARRIAGE RETURN
1053 85DE 06220          JEPU CRAC

1054 83D6 06222          JEPU BS

1055 8270 06224          JEPU UBS

1056 84AB 06226          JEPU TB

1057 8383 06228          JEPU IX

1058 8366 06230          JEPU RIX

1059 BA72 06232          CALG           M=G7
105A 98AB 06233          BDAT -4        M=0A         BRANCH IF CHAR IS TAB
105B 98BA 06234          BDAT -5        M=0B         BRANCH IF CHAR IS PTB
105C 98CA 06235          BDAT -5        M=0C         BRANCH IF CHAR IS INX
105D 98DA 06236          BDAT -5        M=0D         BRANCH IF CHAR IS RIX
105E 98E6 06237          BDAT -9        M=0E         BRANCH IF CHAR IS UBS
```

```
ADDR CODE NUMBR LABEL     CMND NEXTADDR OPERAND            COMMENT

105F 98F4 06238           BDAT -8       M=OF       BRANCH IF CHAR IS PBS
1060 9913 06239           BDAT +3       M=11       BRANCH IF CHAR IS COL
1061 9933 06240           BDAT +3       M=13       BRANCH IF CHAR IS CEN
1062 9923 06241           BDAT +3       M=12       BRANCH IF CHAR IS FLF
1063 A171 06242           JEPU RETN1

1064 85F7 06244           JEPU SECOL

1065 8E00 06246           JEPU MVCRCEN

1066 C5C6 06248           JEPR CPFL
1067 E394 06249           JEPR TERVRC
1068 9704 06250           BALG +4       (M=0)'     BRANCH IF IN REV. OR REC.
1069 E2A9 06251           JEPR FEFLCTR
106A B004 06252           CALG          GO=M       TRANSFER VALUE OF MODULO (244)
106B E2A7 06253           JEPR FEFLPRE
106C 9701 06254           BALG +1       (M=0)'     BRANCH IF FL PRESENT NO. (IN 244) = 0.
106D 000F 06255           RETN

106E 8C01 06257           CALG          M=M-GO
106F C384 06258           JEPR MV+V
1070 600F 06259           CALR          M=00
1071 A1DE 06260           JEPU SELCCTR

                 *  IN CODE PRINT - RESET DEFD. TRACK PRINT BIT IN REG. G5, PRINT TRACK NO
                 *  IN REVISE RECORD & TRACK PRINT RW BUFFER.
                 *  NOT IN REVISE - DUMP BUFFER

1072 BA82 06267 EXFMTHDR CALG           M=G8
1073 1A63 06268           BPRT +3       DB6=0      BRANCH CODE PRINT NOT ON
1074 B40F 06269           CALR          M=40
1075 E908 06270           JEPR REG5                RESET DEFERRED TRACK PRINT
1076 C734 06271           JEPR TPRCAC
1077 E04D 06272           JEPR MVLM&PF
1078 BA82 06273           CALG          M=G8
1079 1E42 06274           BPRT +2       DB4=1      BRANCH IF REVISE IS ON
107A CAF5 06275           JEPR DUMP&FCH
107B C07D 06276           JEPR REKBIDL
107C CBC9 06277           JEPR RCRDRV
107D 807D 06278           JEPU REKBIDL

                 *EXECUTE FORMAT TAB (LIFT RIBBON ON SPECIAL TABS)

107E C58E 06283 EXFMTTB   JEPR MVCARDE
107F C421 06284           JEPR FEXTBCA+
1080 1E11 06285           BPRT +1       DB1=1      BRANCH IF SPECIAL TAB
1081 84B1 06286           JEPU MVTAB

1082 C4B1 06288           JEPR MVTAB
1083 C0AD 06289           JEPR MO
1084 1CDE 06290           BPRT -1       CMBY=1     WAIT UNTIL TAB IS DONE
1085 1308 06291           CPRT          RBUP
1086 B80F 06292           CALR          M=80
1087 E18B 06293           JEPR DLY MS              LIFT RIBBON FOR SPECIAL TAB
1088 1309 06294           CPRT          RBDN
1089 000F 06295           RETN

                 *PRINT FORMAT AND HEADER.....SAVE AND RESTORE PREVIOUS SETTINGS

108A E0CF 06300 PRFMTAL   JEPR SVTB&MG
108B E407 06301           JEPR SEPFMT
108C 1309 06302           CPRT          RBDN
108D A0EE 06303           JEPU RSTB&MG

                 *  READ AUTOLOG - CLEARS RO & RW BUFFERS. CHECKS STOP BIT.
                 *  IF STOP BIT SET EJECTS ACTIVE MEDIA. IF NOT
                 *  FETCHES ACTIVE MEDIA'S DATA
                 *  IF FIRST CHAR. = FMT CODE (10) SETS PRINT FORMAT.

108E CCF4 06311 RDAUTLOG JEPR CLRO
108F CC51 06312           JEPR CLRW
1090 E2BA 06313           JEPR EVSTOP
1091 9302 06314           BALG +2       M=C        BRANCH NO STOP CONDITION
1092 E4B6 06315           JEPR EJAC
1093 807D 06316           JEPU REKBIDL

1094 CD39 06318           JEPR FECH
1095 2B3D 06319           BACM -2       CIN=0      BRANCH IF NO MAG CARD IN SYSTEM
1096 1E71 06320           BPRT +1       DB7=1
1097 9902 06321           BDAT +2       M=10       BR. IF FMT. CODE
1098 CCF4 06322           JEPR CLRO
1099 0806 06323           JIPU -9
109A E08A 06324           JEPR PRFMTAL             BRANCH TO SET PRINT FORMAT
109B 080C 06325           JIPU -3

                 *MOVE TO LM OR TEMPORARY LM IF AUTO-LOG PRINT

109C BAA2 06330 MVLM/TLM CALG           M=GA
109D 1E01 06331           BPRT +1       DB0=1      BRANCH IF IN AUTO-LOG PRINT
109E 8B99 06332           JEPU MVCRLM

109F B88F 06334           CALR          M=88
10A0 E2AE 06335           JEPR FEA2RAM             FETCH TEMPORY LEFT MARGIN
10A1 889A 06336           JEPU MVCRM               MOVE TO TEMP LM
```

```
ADDR CODE NUMBR LABEL    CMND NEXTADDR OPERAND             COMMENT

                 *FETCH RM OR TEMPORY RM IF AUTO-LOG PRINT

10A2 BAA2 06341 FERM/TRM CALG          M=GA
10A3 1E01 06342          BPRT +1       DBO=1      BRANCH IF IN AUTO-LOG PRINT
10A4 A2A1 06343          JEPU FERM

10A5 B89F 06345          CALR          M=89
10A6 A2AE 06346          JEPU FEA2RAM             FETCH TEMPORY LEFT MARGIN

                 *TEST IF REMAINING RO WILL FIT IN LAST OF RW BUFFER
                 **GO G1 HC

10A7 B69F 06352 TEFITRV  CALR          M=69            256 - 151 = 105 = HEX 69
10A8 B014 06353          CALG          G1=M
10A9 BAE2 06354          CALG          M=GE
10AA F024 06355          CALH          H2=M          SAVE RO POINTER
10AB BF01 06356          CALG          M=M+1
10AC B004 06357          CALG          GO=M
10AD CD0A 06358          JEPR AJROLA                   GO TO END OF DATA IN RO
10AE BAE2 06359          CALG          M=GE            POSITION OF LAST DATA IN RO
10AF BF01 06360          CALG          M=M+1
10B0 9501 06361          BALG +1       M=M-GO>0
10B1 0805 06362          JIPU +5
10B2 B004 06363          CALG          GO=M
10B3 BAD2 06364          CALG          M=GD
10B4 BF01 06365          CALG          M=M+1           CALC NO OF CHAR IN RW
10B5 9609 06366          BALG +9       M=M+GOC    A>   BR IF REMAINING RO + RW GE 256
10B6 9513 06367          CALG +3       M=M+G1C      B> BR IF TOTAL GREATER OR EQUAL 151
10B7 FA22 06368          CALH          M=H2           RESTORE RO POINTER ((FITS))
10B8 B0E4 06369          CALG          GE=M
10B9 AB87 06370          JEPU CLM

10BA 9704 06372          BALG +4       (M=0)'     A,B) BR IF TOTAL GT 151
10BB CD5F 06373          JEPR FECHRO-                   FETCH LAST RO CHAR
10BC CD5F 06374          JEPR FECHRO-                   FETCH NEXT TO LAST RO CHAR
10BD E2CE 06375          JEPR FEMACWT                   TEST IF "ACCENT"
10BE 9708 06376          BALG -7       (M=0)'           BR IF ACCENT (151 OK)
10BF FA22 06377          CALH          M=H2       A<   RESTORE POINTER  ((DOESNT FIT))
10C0 B0E4 06378          CALG          GE=M
10C1 A88B 06379          JEPU SEM=FF

                 *  KEYBOARD MONITOR - MONITORS KEYBOARD STROBE AND ACTION MODES
                 *                     XFERS ENTRY FROM TO KEYBOARD STACK.

10C2 000F 06385          RETN

10C3 084E 06387 MOKB     BKBD -1       STROBE=0   KB TEST & ENTRY            CP010
10C4 E37F 06388          JEPR TEACMODE
10C5 970C 06389          BALG -3       (M=0)'     BRANCH IF ACTION MODE
10C6 0602 06390 XFKBKS   CKBD          KBST       KB TO STACK                CP010
10C7 A113 06391          JEPU XFMKS

10C8 C0EB 06394 WTKBCH   JEPR MO&BNO              KB WAIT                    CP020
10C9 0C3F 06395          BKBD -0       STOP=1     WAIT FOR STOP KEY UP
10CA C2DD 06396          JEPR TEKB
10CB 930C 06397          BALG -3       M=0        BRANCH NO KEYBOARD ENTRY
10CC 000F 06398          RETN

10CD B28F 06401 TEKS     CALR          M=28
10CE A2AE 06402          JEPU FEA2RAM

                 *SAVE TAB REGISTERS, LM, AND RM

10CF F104 06407 SVTB&MG  CALH          HO=0
10D0 FA02 06408          CALH          M=HO       SET THE FETCH ADDRESS
10D1 E2AE 06409          JEPR FEA2RAM
10D2 F0D4 06410          CALH          HD=M       SAVE M IN HD
10D3 FA02 06411          CALH          M=HO
10D4 B48A 06412          CALR          M=M+48     SET THE SET ADDRESS
10D5 E1E0 06413          JEPR SEA2RAM             STORE HD
10D6 E8E9 06414          JEPR INC HO
10D7 B41F 06415          CALR          M=41
10D8 D107 06416          BALH -8       M>HO
10D9 000F 06417          RETN

10DA E1A1 06420 FE2PCH   JEPR FEPITCH             DBL PITCH TO M             CP150
10DB A7DA 06421          JEPU SML1

                 * KEYBOARD WAIT MONITOR - UPDATES BLOCK NO., TESTS KEYBOARD STACK & RPT.

10DC CDFD 06426 PACEKB   JEPR MOKB&MED            KB WAIT MONITOR            CP030
10DD 0CAE 06427          BKBD -1       NM=1
10DE B19F 06428          CALR          M=19
10DF 0003 06429          CKBD          2MDLY
10E0 EC66 06430          JEPR UPBNO
10E1 E0CD 06431          JEPR TEKS
10E2 9301 06432          BALG +1       M=0        BRANCH NOTHING IN KEYBOARD STACK
10E3 8A59 06433          JEPU CVKBINP

10E4 C2E1 06435          JEPR TEKBRP
10E5 9701 06436          BALG +1       (M=0)'     BRANCH NO KEYBOARD REPEAT
10E6 0003 06437          CKBD          2MDLY
10E7 000F 06438          RETN
```

```
ADDR CODE NUMBR LABEL    CMND NEXTADDR OPERAND              COMMENT

                 * WAITS FOR KEYBOARD ENTRY
                 *  BEEPS ON EVERY CHAR. AFTER BUFFER POS. /8A
                 *  LOCKS AFTER THE 147TH KBD. ENTRY

10E8 0302 06445 WTKBNRPT CKBD          KBST      KB WAIT WO RPT          CP020
10E9 1309 06446          CPRT          RBDN
10EA COE0 06447          JEPR MO&BNO
10EB 0C3F 06448          BKBD -0       STOP=1
10EC 084D 06449          BKBD -2       STROBE=0
10ED 82DF 06450          JEPU FECVKB

                 *RESTORE TAB REGISTERS, LM, AND RM

10EE B48F 06455 RSTB&MG  CALR          M=48
10EF F004 06456          CALH          HO=M
10F0 FA02 06457          CALH          M=HO      SET THE FETCH ADDRESS
10F1 E2AE 06458          JEPR FEA2RAM
10F2 F0D4 06459          CALH          HD=M      SAVE M IN HD
10F3 FA02 06460          CALH          M=HO
10F4 B88A 06461          CALR          M=M+B8    SET THE SET ADDRESS (HO-48)
10F5 E1E0 06462          JEPR SEA2RAM            STORE HD
10F6 E8E9 06463          JEPR INC HO
10F7 B89F 06464          CALR          M=89
10F8 D107 06465          BALH -8       M>HO
10F9 000F 06466          RETN

10FA E141 06469 MOBELL   JEPR UPBELL             BELL MONITOR            CP070
10FB B19F 06470          CALR          M=19
10FC A187 06471          JEPU DLY MSKB

10FD 801F 06474 LKTC     CALR          M=01      CLOSE TB CTR            CP290
10FE A90D 06475          JEPU REG6

                 *  CLEAR KEYBOARD STACK - DEPOSIT 00 IN RAM POS. 228 THRU 23E

10FF 8AFF 06480          *CHECK WORD*
1100 B28F 06480 CLKS     CALR          M=28
1101 3084 06481          CMEM          A2IN
1102 B00F 06482          CALR          M=00
1103 3008 06483          CMEM          MIN
1104 3052 06484          CMEM          AOUTI
1105 B3E9 06485          CALR          M=3E-M
1106 970B 06486          BALG -4       (M=0)'    BRANCH KEYBOARD STACK NOT CLEAR
1107 B27F 06487          CALR          M=27
1108 A1E2 06488          JEPU MIN

                 * CLEAR KEYBOARD, KEYBOARD STACK
                 * CLEAR KEYBOARD REGISTERS H4, H5, H6, & H7 IF IN JUSTIFY

1109 E100 06494 CLKBKSRG JEPR CLKS
110A 0602 06495 CLKBKS   CKBD          KBST      CLR KB & STACK          CP050
110B 804F 06496          CALR          M=04
110C 9291 06497          BALG +1       M.G9=0    BRANCH JUSTIFY NOT SET
110D 000F 06498          RETN

                 * CLEAR GP REGISTERS H4,H5,H6,H7

110E F144 06502 CLH4-H7  CALH          H4=0
110F F154 06503          CALH          H5=0
1110 F164 06504          CALH          H6=0
1111 F174 06505          CALH          H7=0
1112 000F 06506          RETN

                 * TRANSFER M TO KBD. STACK - POS. 23F HOLDS STACK POINTER.
                 * IF STACK FULL POS. 23F HAS 3E AND ROUTINE RETNS WITH M=00
                 * IF STACK NOT FULL  INCR. CONTENTS OF RAM POS. 23F & DEPOSIT KBD. ENTRY
                 * WHICH IS IN REG. HO IN POS. 2XX. (XX = CONTENTS OF POS. 23F )

1113 F004 06514 XFMKS    CALH          HO=M
1114 B3FF 06515 XFHOSTK  CALR          M=3F
1115 3084 06516          CMEM          A2IN
1116 3010 06517          CMEM          MOUT
1117 9BE5 06518          BDAT +5       M=3E
1118 BF01 06519          CALC          M=M+1
1119 3C08 06520          CMEM          MIN
111A 3084 06521          CMEM          A2IN
111B FA02 06522          CALH          M=HO
111C A1E2 06523          JEPU MIN

111D A887 06525          JEPU CLM

                 *   ANAL. FORMAT - TESTS FOR XLX.
                 *   TESTS FOR WORD/LINE BITS IN REG. G8. DUP. BIT IN G9
                 *   IF IN DUP. DUMPS RW SETS PRINT FMT & XFERS RO TO RW BUFFER AND DUMPS.
                 *   IF NOT IN PLAY - SETS DUMP BIT IN REVISE & AJUSTS RO BUFFER.
                 *   IF PLAY - DUMP RW. XFER RO TO RW BUFFER & SET PRINT FORMAT & DUMP
                 *   IF PLAY REVISE DUMP BIT SET & RW EMPTY - RESET DUMP BIT & XFER RO TO RW
                 *          SET PRINT FORMAT. IF DUMP BIT NOT SET FETCH CHAR.
111E E37C 06535 ANFMT    JEPR TEXLX
111F B03F 06536          CALR          M=03
1120 9281 06537          BALG +1       M.G8=0    BRANCH LINE AND WORD NOT SET
1121 0002 06538          RNOP
1122 B01F 06539          CALR          M=01
```

```
ADDR CODE NUMBR LABEL    CMND NEXTADDR OPERAND          COMMENT

1123 9298 06540          BALG +8       M.G9=0     BRANCH DUP NOT SET
1124 CA54 06541          JEPR DUMPIFDA
1125 CFDC 06542          JEPR XF&ALFMT
1126 8AF5 06543          JEPU DUMP&FCH

1127 E2C7 06545          JEPR SEDUMPRV
1128 800B 06546          JEPU AJROLAIF

1129 CA54 06548          JEPR DUMPIFDA
112A CFDB 06549          JEPR XF&SEFMT
112B 8AF5 06550          JEPU DUMP&FCH

112C B08F 06552          CALR          M=08
112D 9299 06553          BALG -6       M.G9=0     BRANCH PLAY NOT SET
112E E397 06554          JEPR TERV
112F 9309 06555          BALG -6       M=0        BRANCH NOT REVISE
1130 B20F 06556          CALR          M=20
1131 92F3 06557          BALG +3       M.GF=0     BRANCH DUMP NOT SET
1132 E924 06558          JEPR REGF                RESET THE DUMP FLAG
1133 CBE0 06559          JEPR FERW
1134 9702 06560          BALG +2       (M=0)'     BRANCH IF DATA IN RWB
1135 CFDB 06561          JEPR XF&SEFMT
1136 884F 06562          JEPU FEDA

1137 E2C7 06564          JEPR SEDUMPRV
1138 884F 06565          JEPU FEDA


                  *RIGHT MARGIN TEST
                  ***G2.

                  * TEST IF CARRIER IN RIGHT MARGIN RANGE

1139 E2A1 06573 TERM     JEPR FERM
113A B024 06574          CALG          G2=M       STORE RM IN G2
113B BF0F 06575          CALR          M=F0       BIT MASK
113C B7F2 06576          CALG          M=M@GF'    RT. MARGIN RANGE
113D 8921 06577          CALG          M=M+G2+1
113E C656 06578          JEPR TECR=M
113F B08F 06579          CALR          M=08
1140 000F 06580          RETN


                  * REGISTER HB BIT 7 = BELL INITIATED
                  * REGISTER HB BIT 6 = BELL IN PROGRESS
                  * SET BELL IF IN MARGIN ZONE

1141 E139 06587 UPBELL   JEPR TERM                S/R BELL                   CP080
1142 9212 06588          BALG +2       M.G1=0     BRANCH NOT IN RIGHT MARGIN
1143 B80F 06589          CALR          M=80
1144 A929 06590          JEPU REHB                RESET BELL AT RHT MARG INIT

1145 BC0F 06592          CALR          M=C0
1146 D281 06593          BALH +1       M.HB=0     BRANCH NOT B AT RM INIT. OR IN PROGRESS
1147 000F 06594          RETN

1148 0023 06596          CKBD          RTIME
1149 0722 06597          CKBD          BUZZ=2
114A A92B 06598          JEPU SEHB

                  * FLASHING BUZZER ON MONITOR STOP KEY & SET STOP BIT.

114B 0C3F 06603 LOCK ERR BKBD -0       STOP=1     ERROR LOCK                 CP100
114C 1309 06604          CPRT          RBDN
114D 0732 06605          CKBD          BUZZ=3
114E C0AD 06606          JEPR MO
114F 083E 06607          BKBD -1       STOP=0
1150 0602 06608          CKBD          KBST
1151 A2BB 06609          JEPU SESTOP

                  *  BUZZER ERROR & BUZZER - 2 BEEP INDICATION OR 1 BEEP INDICATION DEPENT-
                  *  ING ON ENTRY..

1152 0722 06615 BZERROR  CKBD          BUZZ=2     ERROR BUZZER               CP110
1153 B40F 06616          CALR          M=40
1154 E187 06617          JEPR DLY MSKB
1155 0702 06618          CKBD          BUZZ=0
1156 B40F 06619          CALR          M=40
1157 E187 06620          JEPR DLY MSKB
1158 0722 06621 BZ       CKBD          BUZZ=2     BUZZER                     CP110
1159 B80F 06622          CALR          M=80
115A E187 06623          JEPR DLY MSKB
115B 0702 06624          CKBD          BUZZ=0
115C 000F 06625          RETN

                  * PUSH KEYBOARD STACK UP - TO PROCESS NEXT KBD ENTRY - SAVE M IN HO

115D F004 06630 AJKS+1   CALH          HO=M       STACK PUSH-UP              CP060
115E B3FF 06631          CALR          M=3F
115F 3084 06632          CMEM          A21N
1160 3010 06633          CMEM          MOUT
1161 9A7B 06634          BDAT +B       M=27
1162 B000 06635          CALG          M=M-1
1163 3008 06636          CMEM          MIN
1164 B29F 06637          CALR          M=29
```

```
ADDR CODE NUMBR LABEL     CMND NEXTADDR OPERAND              COMMENT
1165 3084 06638           CMEM          A2IN
1166 3011 06639           CMEM          MOUTD
1167 300A 06640           CMEM          MINI
1168 3052 06641           CMEM          AOUTI
1169 83E9 06642           CALR          M=3E-M
116A 970B 06643           BALG  -4      (M=O)'     BRANCH STACK NOT ADJUSTED
116B 3001 06644           CMEM          ADEC
116C 3008 06645           CMEM          MIN
116D 8A21 06646           JEPU XFM=HO

                * PUSH  RETN STACK UP

116E 0002 06651 RETN4     RNOP                     RETN 4               CP130
116F 0002 06652 RETN3     RNOP                     RETN 3               CP130
1170 0002 06653 RETN2     RNOP                     RETN 2               CP130
1171 0002 06654 RETN1     RNOP                     RETN 1               CP130
1172 000F 06655           RETN

                * FLASHING    BUZZER ON - STORE MODE (REG. G9)IN G7 CHECK FOR UNDERSCORE
                * MONITOR EJECT KEY AND KBD LAMPS & STOP KEY

1173 0732 06661 BZLKM=G9  CKBD          BUZZ=3     M=G9 BUZZER TO LOCK  CP090
1174 BA92 06662 LKM=G9    CALG          M=G9       LOCK M=G9            CP090
1175 BABD 06663           CALR          M=M.AB
1176 0801 06664           JIPU +1
1177 0732 06665 BZLK      CKBD          BUZZ=3     BUZZER TO LOCK       CP090
1178 8074 06666           CALG          G7=M
1179 BAA2 06667           CALG          M=GA
117A 1A72 06668           BPRT  +2      DB7=0      BRANCH NOT COMMUNICATIONS
117B 071F 06669           JEXA          EA1
117C 8004 06670           JEPU 0004

117D 0C3F 06672           BKBD  -0      STOP=1     LOOP UNTIL STOP KEY UP
117E CDBA 06673           JEPR USPART
117F 1309 06674           CPRT          RBDN
1180 C0AF 06675           JEPR EJKEY
1181 BA72 06676           CALG          M=G7
1182 0202 06677           CKBD          LDR2
1183 BAB2 06678           CALG          M=G8
1184 0102 06679           CKBD          LDR1
1185 083A 06680           BKBD  -5      STOP=0     LOOP UNTIL STOP KEY PRESSED
1186 807D 06681           JEPU REKBIDL

                * KEYBOARD MILLISEC. DELAY - MONITORS KEYBOARD & CARD. WAIT DELAY ON M.

1187 0003 06686 DLY MSKB  CKBD          2MDLY      MS DLY               CP120
1188 C103 06687           JEPR MOKB&CRD
1189 0CAE 06688           BKBD  -1      NM=1
118A 000F 06689           RETN

                * WAIT DELAY ON M. MONITOR CARD ONLY

118B 0003 06694 DLY MS    CKBD          2MDLY      MS DLY WO KB         CP120
118C C0B3 06695           JEPR MOCD&PS
118D 0CAE 06696           BKBD  -1      NM=1
118E 000F 06697           RETN

                *  INCREMENT BILLING CLOCK
118F CG55 06701 BILL      JEPR TELM                BILL                 CP085
1190 9308 06702           BALG +8       M=0        BRANCH NOT AT LEFT MARGIN
1191 E37F 06703           JEPR TEACMODE            BRANCH NOT ACTIVE
1192 9306 06704           BALG +6       M=0
1193 BFFF 06705 BILLC     CALR          M=FF
1194 E2AE 06706           JEPR FEA2RAM
1195 B01A 06707           CALR          M=M+01
1196 98A5 06708           BDAT +5       M=0A       BRANCH IF TAB
1197 9852 06709           BDAT +2       M=05
1198 3008 06710           CMEM          MIN
1199 000F 06711           RETN

119A 0033 06713           CKBD          STIME
119B 080C 06714           JIPU  -3
119C B00F 06715           CALR          M=00
119D 080A 06716           JIPU  -5

                * FETCH FRACTIONAL COLUMN DATA

119E BF0F 06721 FEFR      CALR          M=F0       FRACT TO M           CP140
119F BEC2 06722           CALG          M=M.GC
11A0 A7F9 06723           JEPU RML4

                * PITCH STORED IN REG GF BITS 7 & 6. FETCH PITCH & RETN WITH 86 =12 PITCH
                * AND 05 = 10 PITCH

11A1 B80F 06729 FEPITCH   CALR          M=80       PITCH TO M           CP140
11A2 92F1 06730           BALG +1       M.GF=0
11A3 B7FF 06731           CALR          M=7F
11A4 B86A 06732           CALR          M=M+86
11A5 000F 06733           RETN

                *              ANALIZE  KEYBOARD ENTRY FOR HEADER
```

```
ADDR CODE NUMBR LABEL     CMND NEXTADDR OPERAND          COMMENT

11A6 BC74 06738 ANFMTHDR CALC           C7=M
11A7 1A77 06739          BPRT +7        DB7=0
11A8 9AE3 06740          BDAT +3        M=AE        BR. IF CODE PRINT
11A9 9A53 06741          BDAT +3        M=A5        BR. IF LINE CORRECT
11AA 9A63 06742          BDAT +3        M=A6        BR. IF CHAR. CORRECT
11AB A152 06743          JEPU BZERROR

11AC 8249 06745          JEPU SEPC                  TURN CODE PRINT ON AND OFF

11AD 8ED5 06747          JEPU EXLCFMT               EXECUTE LINE CORRECT AND EXIT

11AE 8FDE 06749          JEPU EXCCFMT               EXECUTE CHARACTER CORRECT

11AF 0000 06751          NOOP
11B0 9876 06752          BDAT +6        M=07        BRANCH IF CR
11B1 9885 06753          BDAT +5        M=08        BRANCH IF PCR
11B2 9895 06754          BDAT +5        M=09        BRANCH IF SCR
11B3 98F4 06755          BDAT +4        M=0F        BRANCH IF PBS
11B4 1E63 06756          BPRT +3        DB6=1       BRANCH IF PRINTING CHAR.
11B5 1E52 06757          BPRT +2        DB5=1       BRANCH IF PRINTING CHAR.
11B6 A152 06758          JEPU BZERROR

11B7 A072 06760          JEPU EXFMTHDR

11B8 893F 06762          CALR           M=93
11B9 91D1 06763          BALG +1        M>GD
11BA A14B 06764          JEPU LOCK ERR

11BB C95D 06766          JEPR XFG74RW
11BC B8AF 06767          CALR           M=8A
11BD 91D1 06768          BALG +1        M>GD
11BE E158 06769          JEPR BZ
11BF BA72 06770          CALG           M=G7
11C0 9896 06771          BDAT +6        M=09        BRANCH IF SCR
11C1 98F6 06772          BDAT +6        M=0F        BRANCH IF PBS
11C2 C1EC 06773          JEPR PRG7PACE              PRINT CHARACTER.
11C3 9701 06774          BALG +1        (M=0)'
11C4 000F 06775          RETN

11C5 E15D 06777          JEPR AJKS+1                PROSS NEXT CHAR.
11C6 A1A6 06778          JEPU ANFMTHDR

11C7 A04D 06780          JEPU MVLM&PF

11C8 83D6 06782          JEPU BS

                 *STORE M IN PREASSIGNED REGISTERS IN SECTION 2 OF RAM
                 **HD

11C9 F0D4 06788 SELM     CALH           HD=M        STORE LEFT MARGIN
11CA B40F 06789          CALR           M=40
11CB A1E0 06790          JEPU SEA2RAM

11CC F0D4 06792 SERM     CALH           HD=M        STORE RIGHT MARGIN
11CD B41F 06793          CALR           M=41
11CE A1E0 06794          JEPU SEA2RAM

11CF F0D4 06796 SETNRW   CALH           HD=M        STORE READ/WRITE MEDIA TRACK NUMBER
11D0 B42F 06797          CALR           M=42
11D1 A1E0 06798          JEPU SEA2RAM

11D2 F0D4 06800 SETNRO   CALH           HD=M        STORE READ ONLY MEDIA TRACK NUMBER
11D3 B43F 06801          CALR           M=43
11D4 A1E0 06802          JEPU SEA2RAM

11D5 F0D4 06804 SEFLPRE  CALH           HD=M        STORE FIRST LINE PRESET NUMBER
11D6 B44F 06805          CALR           M=44
11D7 A1E0 06806          JEPU SEA2RAM

11D8 F0D4 06808 SEFLCTR  CALH           HD=M        STORE FIRST LINE LINE COUNTER
11D9 B45F 06809          CALR           M=45
11DA A1E0 06810          JEPU SEA2RAM

11DB F0D4 06812 SELCPRE  CALH           HD=M        STORE PAGE END PRESET NUMBER
11DC B46F 06813          CALR           M=46
11DD A1E0 06814          JEPU SEA2RAM

11DE F0D4 06816 SELCCTR  CALH           HD=M        STORE PAGE END LINE COUNTER
11DF B47F 06817          CALR           M=47
11E0 3084 06818 SEA2RAM  CMEM           A2IN
11E1 FAD2 06819          CALH           M=HD
11E2 3008 06820 MIN      CMEM           MIN
11E3 000F 06821          RETN

                 * FETCH CARRIER POSITION STORED IN REGISTER HA.

11E4 FAA2 06826 FECA+1   CALH           M=HA        FETCH CARR
11E5 9701 06827          BALG +1        (M=0)'
11E6 BF01 06828          CALG           M=M+1
11E7 000F 06829          RETN

                 * CONVERT FF TO 00 - RETN WITH M=00 IF ENTERED WITH FF

11E8 BF01 06834 CVFF00   CALG           M=M+1       NOP TO ZERO          CP160
11E9 9301 06835          BALG +1 -      M=0
```

```
ADDR CODE NUMBR LABEL    CMND NEXTADDR OPERAND                COMMENT

11EA B000 06836          CALG          M=M-1
11EB 000F 06837          RETN

               * IF M =00 RETN WITH FF

11EC 930D 06841 CVODFF   BALG -2       M=0        ZERO TO NOP              CP160
11ED 000F 06842          RETN

               *CALCULATES HORIZ SPACE REQUIRED BY CHAR IN G7 (IN 1/2 UNITS).A SPACE
               **HAS ZERO PRINTING CONSUMED SPACE.
               ***G3

11EE BA72 06849 CAG7JCS  CALG          M=G7       CALCUALTE G7 JUSTIFY CONSUMED SPACE
11EF B034 06850 CAMJCS   CALG          G3=M
11F0 B7FD 06851          CALR          M=M.7F
11F1 BC8A 06852          CALR          M=M+68
11F2 1A72 06853          BPRT +2       DB7=0      BRANCH IF NOT A PRINTING CHAR.
11F3 E236 06854          JEPR FEG3PCWT
11F4 A7DA 06855          JEPU SML1

11F5 B0FF 06857          CALR          M=OF
11F6 BC31 06858          CALG          M=M-G3
11F7 9703 06859          BALG +3       (M=0)'     BRANCH IF NOT A BACKSPACE CODE
11F8 E0DA 06860          JEPR FE2PCH              CHAR IS BACKSPACE CODE
11F9 B009 06861          CALR          M=00-M
11FA 000F 06862          RETN

11FB 9401 06864          BALG +1       M=M-1=0    BRANCH IF A UNIT BACKSPACE CODE.
11FC A887 06865          JEPU CLM

11FD A88B 06867          JEPU SEM=FF

               * FETCH THE CHARACTER WEIGHT FOR G3 OR M FOR ESPAPEMENT PURPOSES

11FF 4DA4 06872          *CHECK WORD*
1200 BA32 06872 FEG3WT   CALG          M=G3       GET G3 WEIGHT            CP170
1201 9A01 06873 FEMWT    BDAT +1       M=20       BRANCH IF SPACE OTHERWISE GET M WEIGHT
1202 A235 06874          JEPU FEMPCWT

               *. FETCH A STANDARD SPACE

1203 0000 06878 FESTDSP  NOOP
1204 B80F 06879          CALR          M=80
1205 A95C 06880          JEPU FESTDSPC

               *FETCHS  WEIGHT OF ANY PRINTING CHARACTER INCLUDING ACCENTS

                                                         FETCH WIDTH IF ACCENT
1206 E2CE 06885 FEMWIDTH JEPR FEMACWT
1207 9301 06886          BALG +1       M=0        A>     BRANCH IF NOT ACCENT
1208 000F 06887          RETN

1209 A236 06889          JEPU FEG3PCWT            A<     FETCH WIDTH OF NON ACCENT CHAR.

               *FETCHS HIGH ORDER PRINTER DATA FOR CONSTANT SPOKE CHARACTERS.(2BITS OF
               **HAMMER FORCE & 2MSB OF CHAR WT.

120A 1A64 06895 FEHPD    BPRT +4       DB6=0
120B B3FD 06896          CALR          M=M.3F
120C 0031 06897 XLH      CKBD          XL=MH
120D 0001 06898          CKBD          M=XL
120E 000F 06899          RETN

120F E20C 06901          JEPR XLH
1210 A7F9 06902          JEPU RML4

               *FETCHES HIGH ORDER PRINTER DATA FOR VARIABLE SPOKE CHARACTERS.(2 BITS OF
               **HAMMER FORCE & 3 BITS OF CHAR WT.

1211 A887 06908          JEPU CLM

1212 1ADE 06910 FEHPDVS  BPRT -1       LXL=0      BR USO SYSTEM
1213 310C 06911          CMEM          APIN
1214 B00F 06912          CALR          M=00
1215 3110 06913          CMEM          ALIN
1216 3120 06914          CMEM          XOUT
1217 000F 06915          RETN

               *READ PREVIOUS LINE AND CORRECT FOR IT

1218 A887 06920          JEPU CLM                 A<  RETURN & ERROR BUZZ

1219 E2A3 06922 RDLCRC   JEPR FETNRW
121A 940D 06923          BALG -2       M=M-1=0    A> BR IF ON TRACK ONE
121B CC51 06924          JEPR CLRW
121C CD9B 06925          JEPR XF/RORW                XFER REMAINING RO TO RW
121D CE2E 06926          JEPR RDLC                   READ PREVIOUS LINE
121E E0FD 06927          JEPR LKTC
121F B114 06928          CALG          G1=0
1220 BA82 06929          CALG          M=G8
1221 1A5A 06930          BPRT +A       DB5=0      BRANCH NGC NOT SET
1222 0801 06931          JIPU +1                  B>
1223 E8C6 06932          JEPR INC G1              C<  COUNT TABS AT BEGINNING OF RO
```

```
ADDR CODE NUMBR LABEL      CMND NEXTADDR OPERAND              COMMENT

1224 CD44 06933            JEPR FECHRO+                B<
1225 B0A9 06934            CALR          M=0A-M
1226 930C 06935            BALG -3       M=0           C>  BR IF TAB
1227 CD44 06936            JEPR FECHRO+
1228 9306 06937            BALG +6       M=0
1229 B0A9 06938            CALR          M=0A-M
122A 970C 06939            BALG -3       (M=0)'        BRANCH NOT TAB
122B E30F 06940            JEPR RETC
122C CD6E 06941            JEPR XFRWROCL
122D CE3D 06942            JEPR AJCAH3
122E A88B 06943            JEPU SEM=FF

122F CD6E 06945            JEPR XFRWROCL
1230 E2F4 06946            JEPR SETC=G1
1231 C563 06947            JEPR LDTBRWC
1232 8CC3 06948            JEPU MVCALATB                  MOVE CARRIER TO POSITION OF LAST TAB

                 *FETCH PRINTING CHARACTER WEIGHT IN UNITS (1/60TH INCH). G7 MUST CONTAIN
                 **A PRINTING CHARACTER OR A SPACE CODE.
                 ***G3 UNLESS FEG3PCWT ENTRY POINT IS USED.

1233 A887 06955            JEPU CLM

1234 BA72 06957 FEG7PCWT   CALG          M=G7
1235 B034 06958 FEMPCWT    CALG          G3=M
1236 BA32 06959 FEG3PCWT   CALG          M=G3
1237 9A0B 06960            BDAT -4       M=20           RETURN WITH M=00 IF SPACE CODE
1238 E2CE 06961            JEPR FEMACWT
1239 9709 06962            BALG -6       (M=0)'        BRANCH IF ACCENT
123A BA62 06963 FEWTC      CALG          M=G6
123B 1A72 06964            BPRT +2       DB7=0          RETURN WITH M=PITCH IF IN PROP SP MODE.
123C C11A 06965            JEPR TEG3=EX
123D 9701 06966            BALG +1       (M=0)'        BRANCH IF G3 EXPANDED CHARACTER
123E A1A1 06967            JEPU FEPITCH

123F C15A 06969            JEPR CVG3TOPC                CONVERT G3 TO UNIQUE PRT CODE.
1240 1A73 06970            BPRT +3       DB7=0          BRANCH IF CONSTANT SPOKE CHAR.
1241 E212 06971            JEPR FEHPDVS                 FETCH HIGH ORDER PRINT DATA (VAR SPOKE)
1242 B07D 06972            CALR          M=M.07         SAVE ONLY WEIGHT INFO.
1243 A250 06973            JEPU JUMPIX

1244 CFDA 06975            JEPR XL
1245 B932 06976            CALG          M=M*G3
1246 B80D 06977            CALR          M=M.80
1247 B932 06978            CALG          M=M*G3
1248 B034 06979            CALG          G3=M           SAVE ONLY WEIGHT INFO AS MSB OF G3.
1249 C15A 06980            JEPR CVG3TOPC
124A E20A 06981            JEPR FEHPD                   FETCH HIGH ORDER PRINT DATA.
124B B932 06982            CALG          M=M*G3
124C B03D 06983            CALR          M=M.03
124D B932 06984            CALG          M=M*G3
124E B83D 06985            CALR          M=M.B3
124F BC01 06986            CALG          RML            M NOW CONTAINS WT INFO IN 3 LSB.
1250 B02A 06987 JUMPIX     CALR          M=M+02
1251 9891 06988            BDAT +1       M=09           09 INDICATES A DEAD CHAR. (0 WEIGHT)
1252 000F 06989            RETN

1253 A887 06991            JEPU CLM

                 *FETCHES HAMMER FORCE FROM ROM INTO BITS 2&3 OF M.

1254 C15A 06996 FEG3HF     JEPR CVG3TOPC                CONVERT G3 TO UNIQUE PRINTING CODE
1255 1A73 06997            BPRT +3       DB7=0
1256 E212 06998            JEPR FEHPDVS                 FETCH HIGH ORDER PRINTER DATA FOR
1257 E7F6 06999            JEPR RML7                     VARIABLE SPOKE CHAR.
1258 0801 07000            JIPU +1
1259 E20A 07001            JEPR FEHPD                   FETCH HIGH ORDER PRINTER DATA FOR
125A B0CD 07002            CALR          M=M.0C          CONSTANT SPOKE CHAR.
125B 000F 07003            RETN

                 *      CODE PRINT TRACK PRINT - CK CODE PRINT BIT (6) IN REG. G5.
                 *      IF LXL INSTALLED PRINT E. IF NOT PRINT R
                 *      PRINT FORMAT

125C A908 07010            JEPU REG5                    RESET DEFD TP

125D B40F 07012 CPTP       CALR          M=40           Q. CODE PRINT ON
125E 928D 07013            BALG -2       M.G8=0         A. BRANCH IF OFF
125F E04D 07014            JEPR MVLM&PF                 DO A CR
1260 BD1F 07015            CALR          M=D1
1261 1AD1 07016            BPRT +1       LXL=0          BRANCH LXL NOT IN
1262 B45F 07017            CALR          M=45
1263 CC6B 07018            JEPR ESC&PRM/
1264 0801 07019            JIPU +1
1265 E04D 07020 PRT FMT    JEPR MVLM&PF                 DO A CR
1266 B4DF 07021            CALR          M=4D
1267 C4DC 07022            JEPR ESC&PRM                 PRINT 'M'
1268 B47F 07023            CALR          M=47
1269 C4DC 07024            JEPR ESC&PRM                 PRINT 'G'
126A B3AF 07025            CALR          M=3A
126B C4DC 07026            JEPR ESC&PRM                 PRINT ':'
126C C55C 07027            JEPR SPSTD                   PRINT ' '
126D E29F 07028            JEPR FELM
126E CC23 07029            JEPR PRMBIN                  PRINT LEFT MARGIN
126F C55C 07030            JEPR SPSTD
```

```
ADDR CODE NUMBR LABEL     CMND NEXTADDR OPERAND            COMMENT

1270 E2A1 07031           JEPR FERM
1271 C023 07032           JEPR PRMBIN                  PRINT RIGHT MARGIN
1272 F1C4 07033           CALH          HC=0
1273 C422 07034           JEPR FEXTBHC+
1274 9701 07035           BALG +1       (M=0)'         Q. ANY TABS
1275 000F 07036           RETN

1276 E04D 07038           JEPR MVLM&PF                 DO CR
1277 F1C4 07039           CALH          HC=0
1278 C42A 07040           JEPR FETBHC+                 TEST FOR TABS
1279 9304 07041           BALG +4       M=0            Q. TAB?
127A B54F 07042           CALR          M=54           A. YES
127B C4DC 07043           JEPR ESC&PRM                 PRINT 'T'
127C B42F 07044           CALR          M=42
127D C4DC 07045           JEPR ESC&PRM                 PRINT 'B'
127E F1C4 07046           CALH          HC=0
127F C47A 07047           JEPR FESTBHC+                GET THE SPECIAL TABS
1280 9308 07048           BALG +8       M=0            Q. SPECIAL TAB?
1281 F1C4 07049           CALH          HC=0           A. YES
1282 C42A 07050           JEPR FETBHC+
1283 9301 07051           BALG +1       M=0
1284 C55C 07052           JEPR SPSTD                   PRINT ' '
1285 B54F 07053           CALR          M=54
1286 C6CB 07054           JEPR ESC&PRM/
1287 B42F 07055           CALR          M=42
1288 C6CB 07056           JEPR ESC&PRM/                PRINT 'T' SLASHED
1289 B3AF 07057           CALR          M=3A
128A C4DC 07058           JEPR ESC&PRM                 PRINT ':'
128B F1C4 07059           CALH          HC=0
128C C422 07060 PRFMTC    JEPR FEXTBHC+
128D 9701 07061           BALG +1       (M=0)'
128E 000F 07062           RETN

128F E0A2 07064           JEPR FERM/TRM
1290 1A71 07065           BPRT +1       DB7=0
1291 BFCA 07066           CALR          M=M+FC
1292 D1A1 07067           BALH +1       M>HA.          Q. IS RIGHT MARGIN GREATER THAN CARR
1293 E04D 07068           JEPR MVLM&PF                 A. NO. DO CR
1294 C4D0 07069           JEPR FEXTBHC                 GET THE TAB(S)
1295 1A04 07070           BPRT +4       DB0=0          BRANCH IF NO TAB
1296 C55C 07071           JEPR SPSTD                   PRINT ' '
1297 FAC2 07072           CALH          M=HC
1298 C023 07073           JEPR PRMBIN                  PRINT THE TAB
1299 C4D0 07074           JEPR FEXTBHC                 GET THE TAB(S)
129A 1A13 07075           BPRT +3       DB1=0
129B C55C 07076           JEPR SPSTD
129C FAC2 07077           CALH          M=HC
129D C533 07078           JEPR PRMBIN/                 PRINT THE SPECIAL TAB
129E A28C 07079           JEPU PRFMTC

                 *FETCH CONTENTS OF PREASSIGNED REGISTERS IN SECTION 2 OF RAM.

129F B40F 07084 FELM      CALR          M=40           LEFT MARGIN
12A0 080D 07085           JIPU +D
12A1 B41F 07086 FERM      CALR          M=41           RIGHT MARGIN
12A2 080B 07087           JIPU +B
12A3 B42F 07088 FETNRW    CALR          M=42           READ/WRITE MEDIA TRACK NO.
12A4 0809 07089           JIPU +9
12A5 B43F 07090 FETNRO    CALR          M=43           READ ONLY MEDIA TRACK NO.
12A6 0807 07091           JIPU +7
12A7 B44F 07092 FEFLPRE   CALR          M=44           FIRST LINE PRESET NO.
12A8 0805 07093           JIPU +5
12A9 B45F 07094 FEFLCTR   CALR          M=45           FIRST LINE LINE COUNTER
12AA 0803 07095           JIPU +3
12AB B46F 07096 FELCPRE   CALR          M=46           PAGE END PRESET NO.
12AC 0801 07097           JIPU +1
12AD B47F 07098 FELCCTR   CALR          M=47           PAGE END LINE COUNTER
12AE 3084 07099 FEA2RAM   CMEM          A2IN
12AF 3010 07100           CMEM          MOUT
12B0 000F 07101           RETN

12B1 BA72 07104 TEG72CH   CALG          M=G7           G7 SECD CH ANAL          CP210
12B2 B139 07105 TEM2CH    CALR          M=13-M         M SECOND CHAR ANALYSIS
12B3 A1E8 07106           JEPU CVFF00

                 *RESET CENTERING BIT IF G7 CONTAINS A CHAR WHICH DEFINES THE END OF
                 **CENTERED TEXT.

12B4 BA72 07112 RECENIF   CALG          M=G7
12B5 CE82 07113           JEPR TEMCENBP
12B6 9301 07114           BALG +1       M=0            A BRANCH IF CHAR DEFINES END OF CENTERED
12B7 000F 07115           RETN                              TEXT.

12B8 B40F 07117 RECEN     CALR          M=40
12B9 A90D 07118           JEPU REG6

                 *EVSTOP
                 ** MONITORS KB STOP KEY. IF FALSE, RETNS WITH M=0 ONLY IF STOP BIT NOT SET
                 ** IF KB STOP KEY TRUE.JUMPS TO SEGF SUBRTN TO SET STOP BIT.

12BA 0832 07125 EVSTOP    BKBO +2       STOP=0         BRANCH IF KB STOP IS FALSE

                 *SESTOP
                 ** JUMPS TO SEGF SUBRTN TO SET STOP BIT.
```

```
ADDR CODE NUMER LABEL     CMND NEXTADDR OPERAND              COMMENT

12BB B10F 07130 SESTOP    CALR          M=10
12BC A926 07131           JEPU SEGF                  JUMP TO SET STOP BIT

12BD B10F 07133           CALR          M=10
12BE BEF2 07134           CALG          M=M.GF
12BF 000F 07135           RETN

               * SKIP SPACES & TABS - TESTS M FOR SPACE OR TAB.IF NOT A SP OR TB XFER
               * REG  H1 TO G4. HO TO G7. IF M = SP OR TB AJUST RO BUFFER MINUS 1 &
               * FETCH 2 CHAR. INTO H1 & HO. EFFECTIVELY DROPS CHAR. IN HO.

12C0 E32F 07142 SKSPTBAJ JEPR TEMSPTB                SKIP SP/TB              CP250
12C1 9301 07143           BALG +1       M=0
12C2 A861 07144           JEPU XFH10G47

12C3 E2EF 07146           JEPR SKSPTBIF
12C4 CD06 07147           JEPR AJRO-
12C5 CD44 07148           JEPR FECHRO+
12C6 A861 07149           JEPU XFH10G47

               * SET DUMP IF REVISE-  RESETS RIGHT FLUSH BIT (1) IN REG GA.
               * SETS DUMP BIT (5) IN GF IF REVISE BIT (4) IN REG. G8 IS SET.

12C7 C518 07155 SEDUMPRV JEPR RERF
12C8 B10F 07156           CALR          M=10         SET DUMP IF REV
12C9 9282 07157           BALG +2       M.G8=0       BRANCH NOT REVISE
12CA B20F 07158           CALR          M=20
12CB A926 07159           JEPU SEGF

12CC 000F 07161           RETN

               *TESTS G7 OR M FOR ACCENT AND IF ACCENT RETURNS WITH WEIGHT OF ACCENT ON
               **M. IF NOT AN ACCENT THEN RETURN WITH M=00.
               ***G3

12CD 8A72 07168 FEG7ACWT CALG           M=G7
12CE B034 07169 FEMACWT  CALG           G3=M
12CF E358 07170           JEPR TEMPC
12D0 9706 07171           BALG +6       (M=0)'
12D1 C15A 07172           JEPR CVG3TOPC                     CONVERT TO UNIQUE CODE
12D2 1E7A 07173           BPRT +A       DB7=1       A>
12D3 98A4 07174           BDAT +4       M=0A        B>      UPPER CASE GRAVE  ACCENT
12D4 99E3 07175           BDAT +3       M=1E          C>    UPPER CASE CIRCUMFLEX
12D5 9984 07176           BDAT +4       M=1B        D>      UMLAUT
12D6 9DE3 07177           BDAT +3       M=5E          E>    CIRCUMFLEX
12D7 A887 07178           JEPU CLM

12D8 8A62 07180           CALG          M=G6        B>C>
12D9 1E71 07181           BPRT +1       DB7=1       F>      PROP SPACING
12DA A1A1 07182           JEPU FEPITCH              D<E<G<H<

12DB B07F 07184           CALR          M=07        F<      WEIGHT OF UPPER CASE ACCENTS.
12DC 000F 07185           RETN

12DD 988C 07187           BDAT -3       M=88        A<  G>  ACCUTE
12DE 989B 07188           BDAT -4       M=89              H< GRAVE ACCENT
12DF A887 07189           JEPU CLM

               * REMOVE SPACES AND TABS FROM ROB GO=NO. OF CHAR. TO FIRST NON SPACE OR
               * TAB  EXIT WITH FIRST NON SPACE OR TAB ON M.

12E0 B104 07195 SKSPTBRO CALG           G0=0         REMOVE SP/TB            CP250
12E1 E8C0 07196           JEPR INC GO
12E2 CCEC 07197           JEPR FERO+
12E3 E32F 07198           JEPR TEMSPTB
12E4 930C 07199           BALG -3       M=0          BRANCH IF SPACE OR TAB
12E5 8A21 07200           JEPU XFM=HO

               * SWITCH READER - IF IN REVISE OR RECORD CLEARS M AND RETURNS.
               * OTHERWISE SETS SWITCH READER BIT (4) IN REG. G6, FORCES THE RO TRANSPORT
               * ACTIVE, CLEARS THE RO BUFFER & RETURNS WITH M = FF.

12E6 E374 07207 SW        JEPR TEG7EXEC              EXEC SWITCH             CP240
12E7 9706 07208           BALG +6       (M=0)'
12E8 B10F 07209           CALR          M=10
12E9 B962 07210           CALG          M=M.G6
12EA B064 07211           CALG          G6=M
12EB 0402 07212           CKBO          ARDR
12EC CCF4 07213           JEPR CLRO
12ED A88B 07214           JEPU SEM=FF

12EE A887 07216           JEPU CLM

               * ELIMINATES SPACES & TABS REG. GO=AMT. ELIM.
               * TEST FIRST NON SPACE OR TAB FOR BEING SCR. PCR. CR. PSCR. CEN.
               * IF CHAR. = ONE OF ABOVE RETURN WITH M = FF IF NOT AJUST RO BUFFER
               * MINUS REG. GO.

12EF E2E0 07224 SKSPTBIF JEPR SKSPTBRO               ELIM SP/TB              CP250
12F0 CEB0 07225           JEPR TEMCRCE
12F1 9301 07226           BALG +1       M=0
12F2 8D2D 07227           JEPU AJROGO-
12F3 A88B 07228           JEPU SEM=FF
```

```
ADDR CODE NUMBR LABEL    CMND NEXTADDR OPERAND              COMMENT

               * SETS TAB COUNTER EQUAL TO REG G1.

12F4 E30C 07233 SETC=G1  JEPR CLTC
12F5 BA12 07234          CALG          M=G1
12F6 A36A 07235          JEPU ADMTOTC

               * COUNTS THE NUMBER OF CHARACTERS IN THE RW BUFFER. STORES COUNT
               *    IN REG. HF.

12F7 CC56 07241 CTRWHF   JEPR AJRWST                SETUP HF                 CP270
12F8 F1F4 07242          CALH          HF=0
12F9 0801 07243          J1PU +1
12FA E8DE 07244          JEPR UPHFCHCT
12FB CC8C 07245          JEPR FECHRW+
12FC 970D 07246          BALG -2       (M=0)'       BRANCH IF CHARACTER IN RWB
12FD 88FA 07247          JEPU AJRW-

               *CLEARS RW AND SETS H2 AND H3.  DECIDES IF REVISE KEY OR CARRIAGE RETURN
               *KEY ACTIVE.

12FF B67E 07253          *CHECK WORD*
1300 CC51 07253 CLRWH23  JEPR CLRW
1301 BACF 07254 SEH3=CA  CALR          M=AC
1302 9078 07255          BALG +8       M-G7=0       BRANCH IF REVISE KEY ACTIVE
1303 E334 07256          JEPR TEG7CR                TEST G7 FOR CARRIAGE RETURN
1304 9305 07257          BALG +5       M=0          BRANCH IF CR ACTIVE
1305 C58E 07258          JEPR MVCARDE               MOVE CARRIER RIGHT DEF. ESCAP.
1306 E29F 07259          JEPR FELM
1307 F034 07260          CALH          H3=M         LEFT MARGIN TO H3
1308 C696 07261          JEPR CANEARCO              CARRIER NEAR COLUMN
1309 F631 07262          CALH          M=M-H3
130A F034 07263          CALH          H3=M
130B 000F 07264          RETN

130C BF0F 07267 CLTC     CALR          M=F0         CLEAR TB CTR             CP300
130D BEC2 07268          CALG          M=M.GC
130E A36E 07269          JEPU XFGC=M

               *       IF IN MARGIN CONTROL OR JUSTIFY CLEAR TAB COUNTER (4 LSB OF REG.
               *       GC) SET TAB COUNTER OPEN BIT (0) IN REGISTER G6.

130F E38E 07275 RETC     JEPR TEMC&J.               OPEN TB CTR              CP290
1310 9303 07276          BALG +3       M=0
1311 E30C 07277          JEPR CLTC
1312 B01F 07278          CALR          M=01
1313 A90B 07279          JEPU SEG6                  SET TAB COUNTER OPEN FLAG

1314 000F 07281          RETN

               * RESET CEN. BIT (6) IN REG G6.
               * CLEARS DEFD. ESC.

1315 C5C2 07287 CLTBCR   JEPR CLDE                  TB/CR CLEAR              CP300
1316 B40F 07288          CALR          M=40
1317 A90D 07289          JEPU REG6

               * INCR. M AND EXITS WITH BINARY CODED DECIMAL RESULT ON M.

1318 BF01 07294 INC MBCD CALG          M=M+1        BCD INCR                 CP310
1319 B034 07295          CALG          G3=M
131A B0FD 07296          CALR          M=M.0F
131B B06A 07297          CALR          M=M+06
131C B10D 07298          CALR          M=M.10
131D 9301 07299          BALG +1       M=0
131E B06F 07300          CALR          M=06
131F B930 07301          CALG          M=M+G3
1320 000F 07302          RETN

               *  DECR. M AND EXITS WITH BINARY CODED DECIMAL RESULT ON M

1321 B000 07307 DEC MBCD CALG          M=M-1        BCD DECR                 CP310
1322 B034 07308          CALG          G3=M
1323 BF0E 07309          CALR          M=M@F0
1324 BF01 07310          CALG          M=M+1
1325 9703 07311          BALG +3       (M=0)'
1326 B06F 07312          CALR          M=06
1327 B832 07313          CALG          M=M'.G3
1328 B034 07314          CALG          G3=M
1329 BA32 07315          CALG          M=G3
132A 000F 07316          RETN

               * TESTS REG. G7 FOR FORMAT CODE - IF TRUE EXITS WITH M=00

132B BA72 07321 TEG7FMT  CALG          M=G7         G7 FMT TEST              CQ010
132C B109 07322 TEMFMT   CALR          M=10-M       FMT TEST
132D 000F 07323          RETN

               * TESTS REG G7  FOR SPACE OR TAB - IF TRUE EXITS WITH M=0D

132E BA72 07328 TEG7SPTB CALG          M=G7         G7 SP/TB TEST            CQ020
132F F004 07329 TEMSPTB  CALH          H0=M         SP/TB TEST               CQ020
```

```
ADDR CODE NUMBR LABEL      CMND NEXTADDR OPERAND              COMMENT

1330 9A02 07330            BDAT +2       M=20
1331 B0A9 07331            CALR          M=0A-M
1332 000F 07332            RETN

1333 A887 07334            JEPU CLM

                *TEG7CR/TEMCR
                ** ANALYSES G7 FOR CR. ANALYSES M FOR CR

1334 BA72 07340 TEG7CR     CALG          M=G7
1335 1E74 07341 TEMCR      BPRT +4       DB7=1
1336 9864 07342            BDAT +4       M=06                PSCR
1337 9873 07343            BDAT +3       M=07       BRANCH IF CHAR IS CRN
1338 9882 07344            BDAT +2       M=08       BRANCH IF CHAR IS PCR
1339 9891 07345            BDAT +1       M=09       BRANCH IF CHAR IS SCR
133A A1EC 07346            JEPU CVOOFF

133B A887 07348            JEPU CLM                 RETURN WITH M=0 IF CHAR IS A CR

                *TESTS FOR CARRIAGE RETN OR PREC CARRIAGE RETURN IN G7. RETURN WITH
                **M=00 IF TRUE

133C BA72 07354 TE7CRPCR CALG            M=G7
133D B079 07355 TEMCRPCR CALR            M=07-M        07 IS CODE FOR CR. 08 IS CODE FOR PCR
133E A1E8 07356            JEPU CVFFOO

                * TESTS G7 FOR SPACE. EXP. SPACE. PREC. SPACE - RETURN
                * WITH M=00 IF TRUE.

133F BA72 07362 TEG7SP     CALG          M=G7       INPUT CHAR TO M
1340 99F3 07363 TEMSP      BDAT +3       M=1F       BRANCH IF ESP
1341 9A02 07364 TEMSPPSP BDAT +2         M=20       BRANCH IF SPA. USCSPA
1342 B7F9 07365            CALR          M=7F-M     TEST FOR PSP
1343 000F 07366            RETN                     RETN WITH M=0 DENOTES PSP

1344 A887 07368            JEPU CLM                 DENOTES SPA. USC SPA OR ESP

                *TEG7CRSC/TEMCRSCR
                ** ANALYSES G7 FOR CR/SCR
                ** ANALYSES M FOR CR/SCR

1345 BA72 07375 TEG7CRSC CALG            M=G7
1346 B099 07376 TEMCRSCR CALR            M=09-M
1347 9301 07377            BALG +1       M=0        BRANCH IF CHAR IS SCR
1348 B029 07378            CALR          M=02-M     IF NOT SCR TEST FOR CRN
1349 000F 07379            RETN                     RETN WITH M=0 DENOTES CRN/SCR

                * TEST G7 FOR PUNCTUATION IN JUSTIFY MODE

134A C890 07384 TEG7PUNJ JEPR TEG7PUNC
134B 9303 07385            BALG +3       M=0        BR IF CHAR. NOT EQ. TO A POT. PARA. STOP
134C B08F 07386            CALR          M=08       MASK FOR PT. PARA. STOP BIT
134D E908 07387            JEPR SEG6                SET POT. PARA. STOP BIT
134E A353 07388            JEPU FEG7

134F BA72 07390            CALG          M=G7
1350 9A22 07391            BDAT +2       M=22       CHAR. EQ QUOTE
1351 B08F 07392            CALR          M=08       MASK FOR POT. PARA. STOP BIT
1352 E90D 07393            JEPR REG6                RESET POT. PARA. STOP BIT
1353 BA72 07394 FEG7       CALG          M=G7       FETCH G7
1354 000F 07395            RETN

                *TEST IF G7/M IS A PRINTING CHARACTER. RETURN WITH M=00 IF TRUE..

1355 BA72 07400 TEG7PCSP CALG            M=G7
1356 0802 07401            JIPU +2                  A>
1357 BA72 07402 TEG7PC     CALG          M=G7
1358 9A04 07403 TEMPC      BDAT +4       M=20       B>    BRANCH IF SPACE
1359 B7FD 07404 TEMPCSP    CALR          M=M.7F     A<
135A B68A 07405            CALR          M=M+68
135B 1A71 07406            BPRT +1       DB7=0         C>  BRANCH IF NON PRINTING CHAR.
135C A887 07407            JEPU CLM

135D A88B 07409            JEPU SEM=FF              B>C<

                * TAB COUNTER UTILITY ROUTINES

135E BAC2 07414 DEC TC     CALG          M=GC
135F B0FD 07415            CALR          M=M.OF
1360 930E 07416            BALG +E       M=0        BRANCH NO TABS SET
1361 BFFF 07417            CALR          M=FF
1362 0807 07418            JIPU +7
1363 BA62 07419 INC TC     CALG          M=G6
1364 1E04 07420            BPRT +4       DB0=1      BRANCH TAB COUNTER OPEN
1365 E37F 07421            JEPR TEACMODE
1366 9708 07422            BALG +8       (M=0)'     BRANCH NO ACTION
1367 C655 07423            JEPR TELM
1368 9706 07424            BALG +6       (M=0)'     BRANCH NOT AT LEFT MARGIN
1369 B01F 07425 INC TCC    CALR          M=01
136A B9C0 07426 ADMTOTC    CALG          M=M+GC
136B B9C2 07427            CALG          M=M'GC
136C B0FD 07428            CALR          M=M.OF
```

```
ADDR CODE NUMBR LABEL     CMND NEXTADDR OPERAND              COMMENT

136D B9C2 07429           CALG          M=M*GC
136E B0C4 07430 XFGC=M    CALG          GC=M
136F 000F 07431           RETN

               *  PLAY /MARGIN CONTROL TEST - RETURN WITH M=00 IF NOT IN PLAY

1370 B08F 07436 TEPNMC    CALR          M=08
1371 9291 07437           BALG +1       M.G9=0      BRANCH NOT PLAY MODE
1372 A391 07438           JEPU TEMC                 TEST MGC TEST

1373 000F 07440           RETN

               * TESTS FOR REVISE OR RECORD MODES
               * IF REVISE OR RECORD RETURN WITH M NOT EQUAL TO ZERO
               * IF REG. G7=89 (REPEAT) RETURN WITH M=00
               * IF G7 NOT ERQ. TO 89 & BOTH RO & RW HAVE MEDIA RETURN WITH M=00

1374 E394 07448 TEG7EXEC JEPR TERVRC                EXEC TEST                   CQ050
1375 9704 07449           BALG +4       (M=0)'      BRANCH IF REVISE OR RECORD
1376 B89F 07450           CALR          M=89
1377 9073 07451           BALG +3       M.G7=0      BRANCH IF CHAR IS A CARD REPEAT CODE
1378 2A31 07452           BRWM +1       CIN=0
1379 2D31 07453           BROM +1       CIN=1
137A 000F 07454           RETN

137B A887 07456           JEPU CLM

               * TEST XLX

137C 3901 07461 TEXLX     BPRT +1       XLX=0       BRANCH TRANSLATOR NOT IN
137D 0002 07462           RNOP
137E 000F 07463           RETN

               * TEST ACTIVE MODE - TEST REG. G8 FOR AUTO. PARA. LINE. WORD IF TRUE RETN
               *       WITH M NOT EQ. TO ZERO.
               * IF STOP BIT (4) IN REG. GF SET RETN WITH M NOT EQ. TO ZERO.

137F B0FF 07470 TEACMODE CALR           M=0F        TEST ACTION                 CQ060
1380 BE82 07471           CALG          M=M.G8
1381 9702 07472           BALG +2       (M=0)'
1382 B10F 07473           CALR          M=10
1383 BEF2 07474           CALG          M=M.GF
1384 000F 07475           RETN

               * IF RW ACTIVE RESET SWITCH READER BIT (4) IN REG G6.
               * IF RO ACTIVE SET SW. READER BIT IN REG. G6 & CLEAR THE RO BUFFER.
               * IF NEITHER ACTIVE BUZZ.

1385 B10F 07482 TEACMED   CALR          M=10        ACTION TEST
1386 2AD1 07483           BRWM +1       ACT=0
1387 A90D 07484           JEPU REG6                 RESET SW READER FLAG

1388 29D4 07486           BROM +4       ACT=0
1389 9261 07487           BALG +1       M.G6=0      BRANCH SW READER FLAG NOT SET
138A A90B 07488           JEPU SEG6                 SET SW READER FLAG

138B E90B 07490           JEPR SEG6
138C 8CF4 07491           JEPU CLRO

138D 8445 07493           JEPU BZERI3

               * MARGIN CONTROL OR JUSTIFY TEST - RETURN WITH M=00 IF NEITHER.

138E B04F 07498 TEMC&J    CALR          M=04        MGC/JUST TEST               CQ090
138F BE92 07499           CALG          M=M.G9
1390 9702 07500           BALG +2       (M=0)'      BRANCH IF JUSTIFY
1391 B20F 07501 TEMC      CALR          M=20        MGC TEST                    CQ090
1392 BE82 07502           CALG          M=M.G8
1393 000F 07503           RETN

               * REVISE OR RECORD TEST- RETN WITH M=00 IF NEITHER SET

1394 B20F 07508 TERVRC    CALR          M=20        REV/REC TEST                CQ100
1395 BE92 07509           CALG          M=M.G9
1396 9702 07510           BALG +2       (M=0)'
1397 B10F 07511 TERV      CALR          M=10        REV TEST                    CQ100
1398 BE82 07512           CALG          M=M.G8
1399 000F 07513           RETN

               *TEST IF CMND IN PRINTER STACK

139A BC5F 07518 TEPRTSTK CALR           M=C5
139B E2AE 07519           JEPR FEA2RAM
139C A2AE 07520           JEPU FEA2RAM

               *  DIVIDE M BY TEN
               *  DIVIDE GO BY M

139D B004 07526 DIM/10    CALG          GO=M        DIV. M BY TEN               CR040
139E B0AF 07527           CALR          M=0A
```

```
ADDR CODE NUMBR LABEL      CMND NEXTADDR OPERAND              COMMENT

139F E49A 07528 DIGO/M     JEPR DIG10/M                DIV GO BY M                 CR040
13A0 BA12 07529 XFM=G1     CALG          M=G1
13A1 000F 07530            RETN

13A2 E3BB 07533            JEPR SHG2R
13A3 9404 07534            BALG +4       M=M-1=0
13A4 E3CF 07535 AJDI       JEPR SHH1OL                 DIVIDE ALIGN                CR030
13A5 E884 07536            JEPR COG1OH1O
13A6 970B 07537            BALG -4       (M=0)'
13A7 A3C0 07538            JEPU SHH1OR

13A8 000F 07540            RETN

               * DOUBLE  REG G2 AND ADD M  IF OVERFLOW CLEAR M AND STORE REMAINDER IN G1

13A9 9C23 07345 CA2G2+M    BALG +3       M=M+G2C       G2=2G2+M                    CR050
13AA 9C23 07546            BALG +3       M=M+G2C
13AB B024 07547            CALG          G2=M
13AC 000F 07548            RETN

13AD B920 07550            CALG          M=M+G2
13AE B014 07551            CALG          G1=M
13AF 0002 07552            RNOP
13B0 A887 07553            JEPU CLM

13B1 BA72 07556 TEG7HAY    CALG          M=G7
13B2 1E74 07557            BPRT +4       DB7=1
13B3 98E2 07558            BDAT +2       M=0E          BRANCH IF 1/2 BACKSPACE
13B4 98F1 07559            BDAT +1       M=0F          BRANCH IF PRECEDENTED BACKSPACE
13B5 A359 07560            JEPU TEMPCSP

13B6 A887 07562            JEPU CLM

13B7 981E 07564            BDAT -1       M=81          BRANCH LS 6 LINES PER INCH
13B8 982D 07565            BDAT -2       M=82          BRANCH LS 4 LINES PER INCH
13B9 983C 07566            BDAT -3       M=83          BRANCH LS 3 LINES PER INCH
13BA A88B 07567            JEPU SEM=FF

               *  SHIFT G2 RIGHT

13BB BA22 07572 SHG2R      CALG          M=G2          SHIFT CONTENTS OF G2 RIGHT 1
13BC BFED 07573            CALR          M=M.FE
13BD E7F6 07574            JEPR RML7
13BE B024 07575 XFG2=M     CALG          G2=M
13BF 000F 07576            RETN

               * SHIFT H1/HO RIGHT

13C0 FA12 07581 SHH1OR     CALH          M=H1          SHIFT CONTENTS OF REGISTER PAIR H1,HO
13C1 F902 07582            CALH          M=M*HO        RIGHT 1
13C2 B01D 07583            CALR          M=M.01
13C3 F902 07584            CALH          M=M*HO
13C4 E7F6 07585            JEPR RML7
13C5 F004 07586            CALH          HO=M
13C6 B01F 07587            CALR          M=01
13C7 F812 07588            CALH          M=M'.H1
13C8 E7F6 07589            JEPR RML7
13C9 A86E 07590            JEPU XFH1=M

               *  ADD G1/GO TO H1/HO

13CA BA12 07595 ADG1OH1O   CALG          M=G1          G1/GO+H1/HO                 CR060
13CB F910 07596            CALH          M=M+H1
13CC B014 07597            CALG          G1=M
13CD FA02 07598            CALH          M=HO
13CE A3E3 07599            JEPU ADM+G1O

               * SHIFT H1/HO LEFT

13CF FA12 07604 SHH1OL     CALH          M=H1          SHIFT CONTENTS OF REGISTER PAIR H1,HO
13D0 F902 07605            CALH          M=M*HO        LEFT 1
13D1 B80D 07606            CALR          M=M.80
13D2 F912 07607            CALH          M=M*H1
13D3 BC01 07608            CALG          RML
13D4 F014 07609            CALH          H1=M
13D5 FA02 07610            CALH          M=HO
13D6 BC00 07611            CALG          SML
13D7 BA30 07612            JEPU XFHO=M

               * SUBTRACT -  G1/GO - H1/HO

13D8 BA12 07617 SUH1OG1O   CALG          M=G1          SUBTRACT CONTENTS OF REGISTER PAIR H1 H
13D9 F611 07618            CALH          M=M-H1        FROM REGISTER PAIR G1,GO
13DA B014 07619            CALG          G1=M
13DB FA02 07620            CALH          M=HO
13DC E3E6 07621            JEPR SUMG1O
13DD B80F 07622            CALR          M=80
13DE BD12 07623            CALG          M=M.G1'
13DF A7FC 07624            JEPU RML1
```

```
ADDR CODE NUMBR LABEL      CMND NEXTADDR OPERAND              COMMENT

13E0 B004 07627            CALG           G0=M
13E1 A8C6 07628            JEPU INC G1

13E2 BA22 07630 ADG2+G10   CALG           M=G2        ADD G2 W. CARRY            CR060
13E3 960C 07631 ADM+G10    BALG -3        M=M+G0C     ADD M W. CARRY             CR060
13E4 B004 07632 XFG0=M     CALG           G0=M
13E5 000F 07633            RETN

                * SUBTRACT M FROM G0 IF BORROW NEEDED DECR. G1.

13E6 930E 07637 SUMG10     BALG -1        M=0         SUBTR M W BORR             CR060
13E7 E005 07638            CALH           M=G0-M
13E8 960B 07639            BALG -4        M=M+G0C
13E9 B004 07640            CALG           G0=M
13EA A8C9 07641            JEPU DEC G1

                * CONVERT M FROM BCD TO BINARY

13EB B024 07646 CVMBCDBI   CALG           G2=M        BCD TO BIN                 CR070
13EC B0FD 07647            CALR           M=M.0F
13ED B004 07648            CALG           G0=M
13EE BA22 07649            CALG           M=G2
13EF BF0D 07650            CALR           M=M.F0
13F0 E7F9 07651            JEPR RML4
13F1 B024 07652            CALG           G2=M
13F2 B0AF 07653 X10G2+G0   CALR           M=0A        M=10G2+G0                  CR070
13F3 E43F 07654            JEPR XMG2+G0
13F4 BA02 07655 XFM=G0     CALG           M=G0
13F5 000F 07656            RETN

                *  CONVERT M FROM HEX TO ASCII

13F6 B0FD 07661 CVHXASC    CALR           M=M.0F      HEX TO ASCII               CR070
13F7 F004 07662            CALH           H0=M
13F8 BF6F 07663            CALR           M=F6
13F9 D5C1 07664            BALH +1        M=M+H0C
13FA BF9A 07665            CALR           M=M+F9
13FB B41A 07666            CALR           M=M+41
13FC 000F 07667            RETN

                * SEARCH WITH REVISE ON - CLEARS RO BUFFER IF REVISE ON RESET DUMP BIT IN
                * REG GF AND SET REVISE HD STEP BIT IN G9.

13FE 15E3 07673            *ADJUST WORD*
13FF F4C6 07673            *CHECK WORD**
1400 CCF4 07673 SCHRVON    JEPR CLRO
1401 BAB2 07674            CALG           M=G8
1402 1A43 07675            BPRT +3        DB4=0       BRANCH REVISE FLAG NOT SET
1403 CAC8 07676            JEPR REDUMP
1404 B40F 07677            CALR           M=40
1405 A914 07678            JEPU SEG9                  SET REVISE HEAD STEP FLAG

1406 000F 07680            RETN

                * MOVES CARRIER TO EITHER LEFT MARGIN OR TEMP. LEFT MARGIN
                * FETCHS BUFFER DATA FOR PRINT FORMAT MODE. CLEARS ALL PREVIOUS TAB &
                * SPECIAL TAB SETTINGS, & SETS TEMPORARY TAB & SP. TAB SETTINGS FOR
                * FORMAT PRINT

1407 E29F 07688 SEPFMT     JEPR FFIM
1408 CE56 07689            JEPR TECR=M                TEST IF CARRIAGE IS AT LM
1409 F004 07690            CALH           H0=M
140A CD37 07691            JEPR FEDATRO+              STORE RELATIVE CARRIAGE POSITION
140B E1C9 07692            JEPR SELM
140C FA02 07693            CALH           M=H0
140D 9701 07694            BALG +1        (M=0)'      WAS CARRIER AT LM
140E E09C 07695            JEPR MVLM/TLM
140F CD37 07696            JEPR FEDATRO+
1410 E1CC 07697            JEPR SERM
1411 C41A 07698            JEPR CLALLTB               CLEAR PREVIOUS SETTINGS
1412 CCEC 07699            JEPR FERO+
1413 1A71 07700            BPRT +1        DB7=0       TEST FOR '9F' TO INDICATE END..
1414 99F3 07701            BDAT +3        M=9F        ..OF TABS
1415 F0C4 07702            CALH           HC=M
1416 C485 07703            JEPR SETB@HC               SET TAB
1417 080A 07704            JIPU -5
1418 CCEC 07705            JEPR FERO+
1419 1A71 07706            BPRT +1        DB7=0       TEST FOR '9F' TO INDICATE END..
141A 99F3 07707            BDAT +3        M=9F        ..OF SPECIAL TABS
141B F0C4 07708            CALH           HC=M
141C C480 07709            JEPR SESTB@HC              SET SPECIAL TABS
141D 080A 07710            JIPU -5
141E E25D 07711            JEPR CPTP
141F BA82 07712            CALG           M=G8
1420 1E62 07713            BPRT +2        DB6=1       BRANCH CODE PRINT FLAG ON
1421 A03D 07714            JEPU SEPFMTTP

1422 CFFA 07716            JEPR ANACHDR
1423 CCEC 07717            JEPR FERO+
1424 B074 07718            CALG           G7=M
1425 970C 07719            BALG -3        (M=0)'
1426 A03D 07720            JEPU SEPFMTTP

                * IF NOT IN REVISE OR RECORD CODE PRINT G7 SWITCH TRANSPORT
                * IF BOTH TRANSPORTS DO NOT HAVE CARDS BUZZ.
```

```
ADDR CODE NUMBR LABEL     CMND NEXTADDR OPERAND              COMMENT

1427 E394 07726 SWPLAY    JEPR TERVRC                 PLAY SWR                      CT015
1428 9704 07727           BALG +4        (M=0)'       BRANCH IF REVISE OR RECORD
1429 0002 07728           RNOP
142A CC62 07729           JEPR CPG7
142B E2E6 07730           JEPR SW
142C 9301 07731           BALG +1        M=0          BRANCH IF CARD NOT IN EITHER TRANSPORT
142D 000F 07732           RETN

142E A14B 07734           JEPU LOCK ERR

                *  JUSTIFY: PRINT END OF CARD - RESTORE RO & RW BUFFERS
                *           ADJUST THE JUSTIFY RW BREAKPOINT &
                *           PRINT STANDARD LINE.

142F F1F4 07741 PREOCJ    CALH           HF=0         EOC PRINT                     CT145
1430 E10E 07742           JEPR CLH4-H7
1431 CD7D 07743           JEPR RERO=RW
1432 E6B9 07744           JEPR AJRWBPJ
1433 A572 07745           JEPU PRSTOLJ

                * KEYBOARD EJECT - IF NOT IN REVISE OR RECORD AND THERE IS AN ACTIVE
                *                  MEDIA: EJECT ITS CARD CODE PRINTEJ.
                *                  IF IN REVISE OR RECORD, RECORD EJ CODE AND EJ THE RW.

1434 E394 07752 EJKB      JEPR TERVRC                 KB EJT                        CT040
1435 9303 07753           BALG +3        M=0          BRANCH NOT REVISE OR RECORD
1436 C93D 07754           JEPR RCCHKB
1437 E4B5 07755           JEPR EJRW
1438 807D 07756           JEPU REKBIDL

1439 2FD1 07758           BACM +1        ACT=1
143A 8445 07759           JEPU BZERI3

143B E4B6 07761           JEPR EJAC
143C CC62 07762           JEPR CPG7
143D 807D 07763           JEPU REKBIDL

                *  MULTIPLY  M BY G2
                *             BY G2 &  ADD GO
                *             BY G2 &  ADD G1/GO

143E B104 07770 XMG2      CALG           GO=0         M MPY                         CR010
143F B114 07771 XMG2+GO   CALG           G1=0         M MPY+GO                      CR010
1440 F004 07772 XMG2+G10  CALH           HO=M         M MPY+G1/GO                   CR010
1441 F014 07773           CALH           H1=M
1442 9124 07774           BALG +4        M>G2
1443 BA22 07775           CALG           M=G2
1444 F004 07776           CALH           HO=M
1445 FA12 07777           CALH           M=H1
1446 B024 07778           CALG           G2=M
1447 F114 07779           CALH           H1=0
1448 BA22 07780           CALG           M=G2
1449 0805 07781           JIPU +5
144A 801D 07782           CALR           M=M.01
144B 9301 07783           BALG +1        M=0
144C E3CA 07784           JEPR ADG10H10
144D E3CF 07785           JEPR SHH1OL
144E E3B8 07786           JEPR SHG2R
144F 970A 07787           BALG -5        (M=0)'       BRANCH MULTIPLICATION NOT FINISHED
1450 000F 07788           RETN

1451 2750 07791 NRR AC    CACM           NRR
1452 080B 07792           JIPU +8
1453 2550 07793 NRRRO     CROM           NRR
1454 0809 07794           JIPU +9
1455 2650 07795 NRRRW     CRWM           NRR
1456 0807 07796           JIPU +7
1457 2590 07797 NWFRW     CRWM           NWF          RW NWF                        CT010
1458 0805 07798           JIPU +5
1459 2710 07799 NRF AC    CACM           NRF          AC NRF                        CT010
145A 0803 07800           JIPU +3
145B 2610 07801 NRFRW     CRWM           NRF          RW NRF                        CT010
145C 0801 07802           JIPU +1
145D 2510 07803 NRFRO     CROM           NRF          RO NRF                        CT010
145E 803F 07804           CALR           M=03
145F 0013 07805           CKBD           HSDLY
1460 000F 07806           RETN

                * KEYBOARD REPEAT - IN SKIP AND NO  ACTIVE TRANS. BUZZ
                *                   DEP. CHAR. IN RW BUFFER SET ACTIVE TRANS. TO TRACK 00
                *                   & END REVISE OR RECORD

1461 CB1E 07813 RPKB      JEPR UPWRI                  KB RPT                        CT020
1462 9702 07814           BALG +2        (M=0)'
1463 2FD1 07815           BACM +1        ACT=1
1464 8445 07816           JEPU BZERI3

1465 C93D 07818           JEPR RCCHKB
1466 CB1E 07819           JEPR UPWRI
1467 9303 07820           BALG +3        M=0
1468 800F 07821           CALR           M=00
1469 E1CF 07822           JEPR SETNRW
146A BAA3 07823           JEPU ENDRCRV
```

```
ADDR CODE NUMBR LABEL     CMND NEXTADDR OPERAND              COMMENT

146B CCF4 07825           JEPR CLRO
146C 29DB 07826           BROM -4       ACT=0
146D B00F 07827           CALR          M=OC
146E E1D2 07828           JEPR SETNRO
146F 8AA3 07829           JEPU ENDRCRV

                * EJECT IN PLAY MODE - IN REVISE SET STOP BIT.
                *                      IN SKIP.CODE PRINT & EJECT CARD
                *                      OTHERWISE EJECT CARD

1470 E397 07836 EJPLAY    JEPR TERV                   PLAY EJT                CT050
1471 9301 07837           BALG +1       M=0           BRANCH NOT REVISE
1472 A2BB 07838           JEPU SESTOP
1473 CB1E 07840           JEPR UPWRI
1474 9702 07841           BALG +2       (M=0)'
1475 C562 07842           JEPR CPG7
1476 CC51 07843           JEPR CLRW
1477 E4B6 07844           JEPR EJAC
1478 A170 07845           JEPU RETN2

                *  HEAD LEFT/ RIGHT FROM KEYBOARD - IF NOT IN REVISE MOVE ACTIVE HEAD.

1479 E0DC 07850 TEHDLROK JEPR PACEKB                  KB HDR/L                CT080
147A 2BD3 07851           BACM +3       ACT=0
147B E397 07852           JEPR TERV
147C 9701 07853           BALG +1       (M=0)'        BRANCH REVISE
147D E4E5 07854           JEPR HDLRAC
147E 807E 07855           JEPU RESTPIDL

                *  RPT IN PLAY MODE -   IF IN REVISE OR RECORD EJECT
                *                       OTHERWISE MOVE TO TRACK 00
                *                       IF NOT IN JUSTIFY REC. CHAR.

147F E394 07862 RPPLAY    JEPR TERVRC                 PLAY REPEAT             CT030
1480 9301 07863           BALG +1       M=0           BRANCH NOT REVISE OR RECORD
1481 A470 07864           JEPU EJPLAY

1482 0002 07866           RNOP
1483 C562 07867           JEPR CPG7
1484 2ED3 07868           BRWM +3       ACT=1
1485 B00F 07869           CALR          M=00
1486 E1D2 07870           JEPR SETNRO
1487 0802 07871           JIPU +2
1488 B00F 07872           CALR          M=00
1489 E1CF 07873           JEPR SETNRW
148A 1309 07874           CPRT          RBDN
148B B04F 07875           CALR          M=04
148C 9291 07876           BALG +1       M.G9=0        BRANCH JUSTIFY NOT ON
148D 000F 07877           RETN

148E 8940 07879           JEPU RCCH

                 * HEAD LEFT OR RIGHT FROM KBD.

148F CCF4 07884 HDLRKB    JEPR CLRO                   KB HDL/R DO IT          CT100
1490 BA72 07885           CALG          M=G7
1491 9A12 07886           BDAT +2       M=A1          BRANCH HEAD RIGHT CODE
1492 AC4E 07887           JEPU HDL AC

1493 000F 07889           RETN

1494 E497 07891           JEPR FEACBNO
1495 9F2D 07892           BDAT -2       M=72          BRANCH ON TRACK 72
1496 A50C 07893           JEPU HDR AC

                 *  FETCH TRACK NO ACTIVE TRANSPORT

1497 29D1 07898 FEACBNO   BROM +1       ACT=0         FETCH ACTIVE BNO
1498 A2A5 07899           JEPU FETNRO

1499 A2A3 07901           JEPU FETNRW

                 * DIVIDE G1.GO REG.PAIR BY M OR REG. GO BY M

149A B114 07906 DIG10/M   CALG          G1=0          SH. DIV. BY M           CR020
149B F004 07907 DIG1/M    CALH          HO=M          DIVIDE BY M             CR020
149C F114 07908           CALH          H1=0
149D B80F 07909           CALR          M=80
149E B024 07910           CALG          G2=M
149F BA12 07911           CALG          M=G1
14A0 D102 07912           BALH +2       M>HO
14A1 FA02 07913           CALH          M=HO
14A2 9704 07914           BALG +4       (M=0)'
14A3 BFFF 07915           CALR          M=FF
14A4 B004 07916           CALG          GO=M
14A5 B014 07917 XFG1=M    CALG          G1=M
14A6 000F 07918           RETN

14A7 E884 07920           JEPR COG10H10
14A8 9302 07921           BALG +2       M=0
14A9 E3A4 07922           JEPR AJDI
14AA E3DB 07923           JEPR SUH10G10
14AB E3A9 07924           JEPR CA2G2+M
```

```
ADDR CODE NUMBR LABEL     CMND NEXTADDR OPERAND            COMMENT

14AC E3C0 07925           JEPR SHH10R
14AD E8B4 07926           JEPR COG10H10
14AE 9708 07927           BALG -4        (M=0)'
14AF 0806 07928           JIPU -4

          * EJECTS MEDIA & RESETS MODE REGISTERS

14B0 2D05 07933 EJRO      BROM +5        ACT=1
14B1 2104 07934           CROM           CIN=0
14B2 E45D 07935           JEPR NRFRO
14B3 B10F 07936           CALR           M=10
14B4 A906 07937           JEPU SEG5                  SET INIT RO EJECT FLAG

14B5 2AD4 07939 EJRW      BRWM +4        ACT=0
14B6 CCF4 07940 EJAC      JEPR CLRO                  ACT EJT                   CT060
14B7 80FF 07941           CALR           M=0F
14B8 E912 07942           JEPR REG8                  RESET ACTION FLAGS
14B9 2AD7 07943           BRWM -8        ACT=0
14BA B71F 07944           CALR           M=71
14BB E916 07945           JEPR REG9                  RESET REVERS HD STP.REC.REC FLASH&DUP
14BC B10F 07946           CALR           M=10
14BD E912 07947           JEPR REG8                  RESET REVISE
14BE 2204 07948           CRWM           CIN=0
14BF E45B 07949           JEPR NRFRW
14C0 B20F 07950           CALR           M=20
14C1 A906 07951           JEPU SEG5                  SET INIT RW EJECT FLAG

          * HEAD LEFT OR RIGHT (RW IN RECD)

14C2 2FD9 07956 HDLR      BACM +9        ACT=1
14C3 2A33 07957           BRWM +3        CIN=0
14C4 BA72 07958           CALG           M=G7
14C5 9A12 07959           BDAT +2        M=A1        BRANCH HEAD RIGHT CODE
14C6 A64F 07960           JEPU HDLRW

14C7 000F 07962           RETN

14C8 E2A3 07964           JEPR FETNRW
14C9 B729 07965           CALR           M=72-M
14CA 9302 07966           BALG +2        M=0         BRANCH ON TRACK 72
14CB A50D 07967           JEPU HDRRW

14CC A4E5 07969           JEPU HDLRAC

14CD B05F 07971           CALR           M=05
14CE 0013 07972           CKBD           HSDLY
14CF 0722 07973           CKBD           BUZZ=2
14D0 B80F 07974           CALR           M=80
14D1 A914 07975           JEPU SEG9                  SET TRACK 72 BUZZ

          *  JUSTIFY: TAB PRINT - TRANSFERS CHAR. FROM THE RO TO THE RW UNTIL TAB IS
          *         REACHED. AJUSTS RO TO LAST CHARACTER BEFORE TAB.
          *         AJUSTS RW BUFFER TO THE LAST UNPROCESSED CHARACTER
          *         & PRINTS THE PROCESSED LINE.
14D2 E59D 07982 PRJTB     JEPR ANBPJ                 J. TB PRINT               CU080
14D3 CD06 07983           JEPR AJRO
14D4 0002 07984           RNOP
14D5 0002 07985           RNOP
14D6 0002 07986           RNOP
14D7 F144 07987           CALH           H4=0
14D8 B06F 07988           CALR           M=06
14D9 F054 07989           CALH           H5=M
14DA 0802 07990           JIPU +2
14DB FA02 07991           CALH           M=H0
14DC CC30 07992           JEPR INRW+
14DD CD44 07993           JEPR FECHRO+
14DE C39E 07994           JEPR TEMTB
14DF 930B 07995           BALG -4        M=0         BRANCH IF TAB
14E0 C9D9 07996           JEPR AJRO-/HO
14E1 E5A9 07997           JEPR AJRWJ
14E2 E51D 07998           JEPR PRLJ
14E3 E10E 07999           JEPR CLH4-H7
14E4 A79F 08000           JEPU CLH7&PC

          * HEAD LEFT OR RIGHT ON THE ACTIVE MEDIA

14E5 CCEC 08005 HDLRAC    JEPR FERO+                 ACT KB HDL/R              CT110
14E6 9701 08006           BALG +1        (M=0)'      BRANCH ANOTHER CHARACTER IN RO BUFFER
14E7 A48F 08007           JEPU HDLRKB

14E8 CCF4 08009           JEPR CLRO
14E9 BA72 08010           CALG           M=G7
14EA 9A12 08011           BDAT +2        M=A1        BRANCH HEAD RIGHT CODE
14EB E64E 08012           JEPR HDL AC
14EC A64E 08013           JEPU HDL AC

14ED 000F 08015           RETN

          *  AJUST RW BUFFER TO FIRST UNPROCESSED CHARACTER IF NOT 00
          *  ADJUST THE RW BUFFER TO ITS LAST CHARACTER.

14EE E5A9 08021 SEKSJ     JEPR AJRWJ                 J SETUP STACK             CU015
14EF CC86 08022           JEPR TERWB
```

```
ADDR CODE NUMBR LABEL    CMND NEXTADDR OPERAND          COMMENT

14F0 9301 08023          BALG +1      M=0      BRANCH IF RW ADJUSTED
14F1 8C59 08024          JEPU AJRWLA

14F2 A10E 08026          JEPU CLH4-H7

               *  JUSTIFY: TEST  G7 FOR BREAKPOINT(EJECT CEN.) IF NO
               *           BREAKPOINT & CENTERING BIT NOT SET AJUST BUFFER
               *           TO G7
14F3 BA72 08032 TEG7BKJ  CALG         M=G7     J BKPT TEST            CU095
14F4 B8C9 08033          CALR         M=BC-M
14F5 9304 08034          BALG +4      M=0      BRANCH EJECT CODE
14F6 B799 08035          CALR         M=79-M
14F7 9302 08036          BALG +2      M=0      BRANCH IF BKPT CHARACTER
14F8 B40F 08037          CALR         M=40
14F9 9261 08038          BALG +1      M.G6=0   BRANCH CENTER FLAG NOT SET
14FA 000F 08039          RETN
14FB CD31 08040          JEPR AJROBG7
14FC ACB7 08041          JEPU LKJERR

               * ADJUST DEFERRED IF UNDERSCORE CHARACTER

14FD C5C2 08046 AJDEUS   JEPR CLDE
14FE 8DD0 08047          JEPU SEDE&AJ

               *  TEST CONSUMED SPACE IN JUSTIFY

14FF B8C3 08052          *CHECK WORD*
1500 E65C 08052 TECS     JEPR CALINEJ          CONS SP TEST           CU255
1501 9301 08053          BALG +1      M=0      BRANCH NO CONSUMED SPACE
1502 A5FC 08054          JEPU CASFJ

1503 0002 08056          RNOP
1504 A57A 08057          JEPU CAEXITJ

               * MOVES RO HEAD ONE TRACK RIGHT

1505 E2A5 08062 HDRRO    JEPR FETNRO           RO HDR
1506 E318 08063          JEPR INC MBCD
1507 E1D2 08064          JEPR SETNRO
1508 C103 08065          JEPR MOKB&CRD
1509 2D4E 08066          BROM -1      HDBY=1
150A 2181 08067          CROM         HDR
150B A666 08068          JEPU UPBNO

               * MOVES ACTIVE TRANSPORT ONE TRACK RIGHT.

150C 2AD8 08072 HDR AC   BRWM -7      ACT=0    ACT HDR                CT120
150D E2A3 08073 HDRRW    JEPR FETNRW
150E E318 08074          JEPR INC MBCD
150F E1CF 08075          JEPR SETNRW
1510 C103 08076          JEPR MOKB&CRD
1511 2E4E 08077          BRWM -1      HDBY=1
1512 2281 08078          CRWM         HDR
1513 A666 08079          JEPU UPBNO

               *SEPERATE*END OF PARAGRAPH*BREAKPOINTS (RETN 2) FROM LESSER BREAKPOINTS
               *(RETN 3)

1514 E70B 08085 ANEOP BP JEPR SUCSIFHY             SUBTRACT HYPHEN CONS SP IF HYPHEN
1515 E355 08086          JEPR TEG7PCSP
1516 9701 08087          BALG +1      (M=0)'   A>  BRANCH IF G7 NOT A PRT CH OR SPACE
1517 A16F 08088          JEPU RETN3            D<

1518 E334 08090          JEPR TEG7CR           A<
1519 9702 08091          BALG +2      (M=0)'   B>   BR IF NOT CR.
151A E7A9 08092          JEPR TEEOPCRJ
151B E796 08093          JEPR SESTOPIF         C<  SET STOP IF PARAGRAPH MODE.
151C A170 08094          JEPU RETN2

               * IN JUSTIFY TESTS FOR AUTOPRINT,TEST FOR DEF'D CR..
               *            PRINTS LINE  (RW BUFFER).

151D C77F 08100 PRLJ     JEPR ENDLINPA
151E B10F 08101          CALR         M=10
151F E91B 08102          JEPR REGA             RESET LEFT PRINT FLAG
1520 C7E5 08103          JEPR CRPACR
1521 0803 08104          JIPU +3
1522 E8DE 08105          JEPR UPHFCHCT
1523 E5D0 08106          JEPR EXJUST
1524 C944 08107          JEPR TEG7DPJ
1525 CC8C 08108          JEPR FECHRW+
1526 970B 08109          BALG -4      (M=0)'   BRANCH CHARACTER IN RW BUFFER
1527 88FA 08110          JEPU AJRW-

1528 C9D3 08113          JEPR ANHY
1529 9301 08114          BALG +1      M=0
152A 000F 08115          RETN

               *  ANALYZE CHARACTER IN JUSTIFY FOR POSSIBLE BREAKPOINT
               *  REGISTER H6 EQ. THE NUMBER OF VARIABLE SPACES.

152B E6D4 08120 ANCHJ    JEPR PREOP            JUST ANAL              CU050
152C E7A2 08121          JEPR CLH7IF
```

```
ADDR CODE NUMBR LABEL    CMND NEXTADDR OPERAND                COMMENT

1520 BA72 08122          CALG             M=G7
152E 99A9 08123          BDAT -6          M=1A       BRANCH IF PRECEDENTED HYPHEN
152F 9AD8 08124          BDAT -7          M=2D       BRANCH IF HYPHEN
1530 9A0A 08125          BDAT +A          M=20       BRANCH IF SPACE
1531 E346 08126          JEPR TEMCRSCR
1532 9709 08127          BALG +9          (M=0)'     BRANCH IF CR OR SCR
1533 E0FD 08128          JEPR LKTC
1534 B20F 08129          CALR             M=20
1535 B074 08130          CALG             G7=M
1536 ECAC 08131          JEPR XFG7RWJ
1537 E8F4 08132          JEPR INC H6
1538 B08F 08133          CALR             M=08
1539 9263 08134          BALG +3          M.G6=0     BR. POTENTIAL PARAGRAPH STOP FLAG NOT S
153A E90D 08135          JEPR REG6                   RESET PPSF
153B E8F4 08136          JEPR INC H6
153C A6AC 08137          JEPU XFG7RWJ

153D 000F 08139          RETN

                * IN JUSTIFY- ENTERS ROUTINE WITH WIDTH OF JUSTIFY SPACE TOO SMALL (TOO
                *           MANY CHARACTERS ON A LINE. TAKES CHARACTERS FROM BREAKPOINT
                *           TO LAST BREAKPOINT. CALCULATES NEW SPACE WIDTH. TESTS SPACE
                *           WIDTH AGAINST H8 LIMIT ENTERS HELP ZONE IF NECESSARY  & PRINT
                *           LINE.

153E E4D2 08148 AJLINEJ  JEPR PRJTB                  TOO TIGHT                 CU070
153F 0002 08149          RNOP
1540 0002 08150          RNOP
1541 CD31 08151          JEPR AJROBG7
1542 ECA6 08152          JEPR AJRWTOBP
1543 0804 08153          JIPU +4
1544 E8F6 08154          JEPR DEC H6
1545 0802 08155          JIPU +2
1546 E1EF 08156          JEPR CAMJCS
1547 E599 08157          JEPR SUG10H54
1548 CC8C 08158          JEPR FECHRW+
1549 9A0A 08159          BDAT -5          M=20       BRANCH IF SPACE
154A 970B 08160          BALG -4          (M=0)'     BRANCH IF CHARACTER IN RW
154B C8FA 08161          JEPR AJRW-
154C E6A6 08162          JEPR AJRWTOBP
154D E759 08163          JEPR TERWHYJ
154E E5FC 08164          JEPR CASPJ
154F FA62 08165          CALH             M=H6
1550 9304 08166          BALG +4          M=0
1551 B3FF 08167          CALR             M=3F
1552 FE82 08168          CALH             M=M.H8
1553 BC00 08169          CALG             SML
1554 9111 08170          BALG +1          M>G1
1555 EC2C 08171          JEPR HLP
1556 E874 08172          JEPR XFG01H45
1557 CC86 08173          JEPR TERWB
1558 9A03 08174          BDAT +3          M=20       BRANCH IF SPACE
1559 B07F 08175          CALR             M=07
155A CC94 08176          JEPR LDMRW&AJ
155B A71E 08177          JEPU PRJ

155C E8D2 08179          JEPR DEC H7
155D B07F 08180          CALR             M=07
155E CC94 08181          JEPR LDMRW&AJ
155F A71E 08182          JEPU PRJ

                *  EJECTS RW OR ACTIVE MEDIA IN JUSTIFY MODE
1560 B04F 08186 EJRWEOC  CALR             M=04       RW EOC EJT                CT145
1561 9295 08187          BALG +5          M.G9=0     BRANCH JUSTIFY NOT SET
1562 CB1E 08188          JEPR UPWRI
1563 9305 08189          BALG +5          M=0
1564 E4B5 08190          JEPR EJRW
1565 E42F 08191          JEPR PREOCJ
1566 807D 08192          JEPU REKBIDL

1567 E4B5 08194 EJRWI3   JEPR EJRW                   RW EJT IDLE 3             CT145
1568 81E0 08195          JEPU ENDACT

                * EJECT ACTIVE MEDIA WHEN YOU GET END OF CARD

1569 B04F 08199 EJACEOC  CALR             M=04       ACT EOC EJT               CT145
156A 9294 08200          BALG +4          M.G9=0     BRANCH JUSTIFY NOT SET
156B B8CF 08201          CALR             M=8C
156C CD00 08202          JEPR INRO+
156D CD06 08203          JEPR AJRO-
156E A170 08204          JEPU RETN2

156F E4B6 08206          JEPR EJAC
1570 81E0 08207          JEPU ENDACT

                * PRINTS LINE IN JUSTIFY- USING CALCULATED SPACE WIDTH FOR STD. SPACE.

1571 E6AC 08212 PRLJSTRW JEPR XFG7RWJ                STORE & PRT L.J.          CU140
1572 E6A9 08213 PRSTDLJ  JEPR AJRWJ                  PRINT STD L.J.            CU140
1573 F144 08214          CALH             H4=0
1574 E203 08215          JEPR FESTDSP
1575 BC00 08216          CALG             SML
1576 F054 08217          CALH             H5=M
1577 E51D 08218          JEPR PRLJ
1578 A10E 08219          JEPU CLH4-H7
```

```
ADDR CODE NUMBR LABEL    CMND NEXTADDR OPERAND           COMMENT

1579 ABF6 08222          JEPU DEC H6

           * IN JUSTIFY SUBTRACT 1 CHAR. FROM LINE ENDING

157A CC6D 08226 CAEXITJ  JEPR FECHRW-            CALC J EXIT          CU250
157B E8FA 08227          JEPR AJH7CHCT
157C FA02 08228          CALH          M=H0
157D 9A0B 08229          BDAT -4       M=20      BRANCH IF SPACE
157E E1EF 08230          JEPR CAMJCS
157F 8004 08231          CALG          G0=M
1580 E7F6 08232          JEPR RML7
1581 C599 08233          JEPR SEDE
1582 C56E 08234          JEPR FEDE
1583 B009 08235          CALR          M=00-M
1584 B940 08236          CALG          M=M+G4
1585 B044 08237          CALG          G4=M
1586 BA02 08238          CALG          M=G0
1587 A599 08239          JEPU SUG10H54

           * IN JUSTIFY HELP ZONE- TEST WIDTH OF SPACE

1588 E5FD 08244 TESPHLPJ JEPR CASPHLP            MAX SP TEST          CU270
1589 9301 08245          BALG +1       M=0       BRANCH NO SPACE CALCULATION ERROR
158A A641 08246          JEPU LKHLPERR

158B 000F 08248          RETN

           *  IN JUSTIFY HELP ZONE - CALCULATES MAX. BK PT. FOR JUSTIFY LINE.
           *                         AND SLASHES THAT CHAR.

158C E77F 08254 ANBPHLP  JEPR CAMAXBPJ           HELP MAX BK PT       CU240
158D B64F 08255          CALR          M=64
158E 8004 08256          CALG          G0=M
158F B05F 08257          CALR          M=05
1590 B014 08258          CALG          G1=M
1591 BA42 08259          CALG          M=G4
1592 9701 08260          BALG +1       (M=0)'
1593 8BAD 08261          JEPU MVCRG10

1594 E3E3 08263          JEPR ADM+G10
1595 E1A1 08264          JEPR FEPITCH
1596 E3E6 08265          JEPR SUMG10
1597 C8AD 08266          JEPR MVCRG10
1598 866C 08267          JEPU PR/

           * SUBTRACT G1,G0 REGISTER PAIR FROM H5,H4 REGISTER PAIR

1599 E657 08272 SUG10H54 JEPR SE&TEG01           COMP CONS SPACE
159A E87D 08273          JEPR NEG G10
159B A5F9 08274          JEPU ADH54G10

159C 000F 08277          RETN

           *  IN JUSTIFY - ANAL. BREAKPOINT - IF TAB RETN TO PRINT JUSTIFY TAB.
           *               IF NOT TAB CALC. AMT OF JUSTIFY SPACE.
           *               CALC. WIDTH OF JUSTIFY SPACES AND TEST AGAINST LOWER
           *               LIMIT
           *               TEST FOR HYPEN OR PREC. HYPEN. IF # OF LARGER SPACES AND
           *               # OF JUST. SPACES EQUAL ZERO ANAL. IF END OF PARA.

159D B0AF 08286 ANBPJ    CALR          M=0A      ANAL BK PT
159E 907D 08287          BALG -2       M-G7=0    BRANCH IF TAB
159F EC5C 08288          JEPR CALINEJ
15A0 9305 08289          BALG +5       M=0       BRANCH IF NO ROOM
15A1 FA62 08290          CALH          M=H6
15A2 E49B 08291          JEPR DIG1/M
15A3 E750 08292          JEPR FELOL1MJ
15A4 9113 08293          BALG +3       M>G1      BRANCH LOWER LIMIT > CALCULATED
15A5 A514 08294          JEPU ANEOP BP

15A6 FA62 08296          CALH          M=H6
15A7 9306 08297          BALG +6       M=0
15A8 0002 08298          RNOP
15A9 E70B 08299          JEPR SUCSIFHY
15AA BA72 08300          CALG          M=G7
15AB 99A1 08301          BDAT +1       M=1A      BRANCH IF PRECEDENTED HYPHEN
15AC 000F 08302          RETN

15AD 8D44 08304          JEPU FECHRO+

15AE FA42 08306          CALH          M=H4
15AF FB52 08307          CALH          M=M@H5
15B0 9301 08308          BALG +1       M=0
15B1 E4F3 08309          JEPR TEG7BKJ
15B2 A514 08310          JEPU ANEOP BP

           *ACCUM WIDTH OF NON BREAKPOINT CHARACTERS IN JUSTIFY

15B3 BA72 08315 TEG7TXTJ CALG          M=G7
15B4 1E72 08316          BPRT +2       DB7=1       A>
15B5 98AB 08317          BDAT +8       M=0A        B>    BR IF TAB CODE
15B6 0803 08318          JIPU +3                   C>
15B7 98F6 08319          BDAT +6       M=8F      A< D>   BR IF TRACK LINK CODE
15B8 9886 08320          BDAT +5       M=88        E>    BR IF SWITCH CODE
15B9 9895 08321          BDAT +5       M=89         F>   BR IF REPEAT CODE
```

```
ADDR CODE NUMBR LABEL     CMND NEXTADDR OPERAND              COMMENT

15BA EGAC 08322           JEPR XFG7RWJ               C<      STORE CHAR IN RW BUFFER
15BB E1EE 08323           JEPR CAG7WCC                       CALCULATE CHAR WIDTH
15BC E79A 08324           JEPR REPCIFCS                      RESET "1ST PRT CHAR"BIT IF M NE O
15BD E5F9 08325           JEPR ADH54G10                      ADD CHAR WIDTH TO TOTAL
15BE A353 08326           JEPU FEG7                  B< D<   RETN WITH M=G7

15BF E374 08328           JEPR TEG7EXEC              E<F<    TEST IF"SW" OR"RPT"CAN BE DONE
15C0 9301 08329           BALG +1         M=0        G>      BR IF"SW"OR"RPT" CAN BE DONE
15C1 AB87 08330           JEPU CLM

15C2 E5D0 08332           JEPR EXJUST                G<      EXECUTE CHAR AS REQUIRED
15C3 A353 08333           JEPU FEG7                          RETN WITH M=G7

                *   PROCESS FORMAT CHAR. IN JUSTIFY - IF # OF CHAR. PROCESSED (STORED IN
                *                 REG. HF) EQUALS ZERO DUMP BUFFER.
                *                 SET NEW PRINT FORMAT AJUST RO

15C4 CCBE 08340 ANFMTJ    JEPR AJ&CLRWB              PROCESS J FMT              CU210
15C5 E902 08341           JEPR DEC HF
15C6 9301 08342           BALG +1         M=0
15C7 CAF5 08343           JEPR DUMP&FCH
15C8 E407 08344           JEPR SEPFMT
15C9 820F 08345           CALR            M=20
15CA 9292 08346           BALG +2         M.G9=0     BRANCH RECORD NOT SET
15CB CD0B 08347           JEPR AJROLAIF
15CC CCF8 08348           JEPR AJROST
15CD E046 08349           JEPR XFFMT
15CE 8AF5 08350           JEPU DUMP&FCH

                *  IN JUSTIFY - UPDATES PROCESSED CHAR. COUNT IN REG. HF.
                *              ANAL. G7 FOR UNDERSCORE, & PRINTING CHAR.
                *              EXECUTES RT. JUSTIFY AND SHIFTS RWB.

15CF E8DE 08357 PRJ&AJHF  JEPR UPHFCHCT              UPD & EXEC JUST            CU170
15D0 CDB2 08358 EXJUST    JEPR ANG7US                EXEC JUST.                 CU170
15D1 E355 08359           JEPR TEG7PCSP
15D2 9701 08360           BALG +1         (M=0)'     BRANCH G7 NOT PRINT CHARACTER OR SPACE
15D3 8915 08361           JEPU PRCH

15D4 E32B 08363           JEPR TEG7FMT
15D5 9701 08364           BALG +1         (M=0)'     BRANCH G7 NOT FORMAT CODE
15D6 A5C4 08365           JEPU ANFMTJ

15D7 88EF 08367           CALR            M=8E
15D8 9073 08368           BALG +3         M-G7=0     BRANCH IF STOP ON MEDIA
15D9 E5DB 08369           JEPR EXJUSTRT
15DA 000F 08370           RETN

15DB 8995 08372 EXJUSTRT  JEPU ANNPCJ

15DC E2BB 08374           JEPR SESTOP
15DD 8C7F 08375           JEPU RECHRWB

                * IN JUSTIFY - TEST CENTERING BIT (6) IN REG. G6.IF SET
                *             FETCH CHAR. FROM RO BUFFER SKIPS SPACES & TABS
                *             TEST FOR CEN. BK.PT., ADJUSTS RO TO BK PT & PRINT.

15DE B40F 08382 CENTJ     CALR            M=40       JUST CENT                  CU200
15DF BE62 08383           CALG            M=M.G6
15E0 9703 08384           BALG +3         (M=0)'     BRANCH IF CENTER FLAG SET
15E1 000F 08385           RETN

15E2 E5B3 08387           JEPR TEG7TXTJ
15E3 9306 08388           BALG +6         M=0        BRANCH NOT TEXT
15E4 CD44 08389           JEPR FECHRO+
15E5 E2C0 08390           JEPR SKSPTBAJ
15E6 0000 08391           NOOP
15E7 9302 08392           BALG +2         M=0        BRANCH NOT SPACE OR TAB
15E8 CE82 08393           JEPR TEMCENBP
15E9 970B 08394           BALG -7         (M=0)'     BRANCH NOT CENTERING BREAKPOINT
15EA CD31 08395           JEPR AJROBG7
15EB E572 08396           JEPR PRSTDLJ
15EC 8DBA 08397           JEPU USPART

                *  RESET JUSTIFY. MOVE CARRIER FROM HELP ZONE. AJUST THE RW BUFFER
                *                 TO THE LAST PROCESSED CHARACTER. SCAN AHEAD IN RW
                *                 BUFFER FOR OO.ALLIGNS RW AND RO.

15ED F164 08404 REJMDHLP  CALH            H6=0       HELP JUST                  CU310
15EE E7C0 08405           JEPR MVFRHLP
15EF E6A9 08406           JEPR AJRWJ
15F0 CCE0 08407           JEPR CTRWH7
15F1 CD83 08408           JEPR CLRW=RO
15F2 CC86 08409           JEPR TERWB
15F3 9701 08410           BALG +1         (M=0)'     BRANCH IF CHARACTER IN RW BUFFER
15F4 ABAC 08411           JEPU REJ

15F5 E2BB 08413           JEPR SESTOP
15F6 E572 08414           JEPR PRSTDLJ
15F7 ABAC 08415           JEPU REJ

15F8 EE57 08418 ADCSH54   JEPR SE&TEG01              UPDATE CONS SPACE
15F9 E870 08419 ADH54G10  JEPR XFH45H01              TERM CONS SP               CU320
```

```
ADDR CODE NUMBR LABEL     CMND NEXTADDR OPERAND             COMMENT

15FA E3CA 08420           JEPR ADG10H10
15FB A874 08421           JEPU XFG01H45

              * IN JUSTIFY CALCULATE SIZE OF VARIABLE SPACE

15FC E55C 08426 CASPJ     JEPR CALINEJ                 CALC J SPACE          CU330
15FD FA62 08427 CASPHLP   CALH              M=H6       HELP CALC SP          CU330
15FE A49B 08428           JEPU DIG1/M

              * IN JUSTIFY HELP ZONE - PRINT HELP ZONE WORD

15FF 50F3 08433           *CHECK WORD*
1600 E1EF 08433           JEPR CAMJCS
1601 9305 08434           BALG +5           M=0        BRANCH CALC SPACE TOO MUCH
1602 B80D 08435           CALR              M=M.80
1603 9302 08436           BALG +2           M=0
1604 E5D0 08437           JEPR EXJUST
1605 0801 08438           JIPU +1
1606 C918 08439           JEPR PR&MVG7
1607 CC8C 08440 PRHLP     JEPR FECHRW+                 HELP PRINT            CU230
1608 E861 08441           JEPR XFH10G47
1609 9706 08442           BALG -9           (M=0)'
160A 88FA 08443           JEPU AJRW-

              *JUSTIFY - IN HELP ZONE AUTO DEPRESSED, BREAKS JUSTIFIED LINE IN HELP ZONE

160B CCDA 08448 ANAUTHLP  JEPR AJRW&H7                 HELP AUTO             CU280
160C FA62 08449           CALH              M=H6
160D 9701 08450           BALG +1           (M=0)'
160E A641 08451           JEPU LKHLPERR

160F CC86 08453           JEPR TERWB
1610 E35B 08454           JEPR TEMPC
1611 9304 08455           BALG +4           M=0        BRANCH IF PRINT CHARACTER
1612 E70E 08456           JEPR SUHYCS
1613 E55C 08457           JEPR CALINEJ
1614 E588 08458           JEPR TESPHLPJ
1615 0808 08459           JIPU +8
1616 CC6D 08460           JEPR FECHRW-
1617 CC8C 08461           JEPR FECHRW+
1618 99A9 08462           BDAT -6           M=1A       BRANCH IF PRECEDENTED HYPHEN
1619 E55C 08463           JEPR CALINEJ
161A E588 08464           JEPR TESPHLPJ
161B A61C 08465           JEPU LDHYRW

              * LOADS HYPEN IN JUSTIFY CALCULATES JUSTIFY SPACE.

161C B2DF 08469 LDHYRW    CALR              M=2D       INSERT HYPHEN AND EXIT
161D CC94 08470           JEPR LDMRW&AJ
161E 0002 08471           RNOP
161F E7C0 08472           JEPR MVFRHLP
1620 A5FC 08473           JEPU CASPJ

              *   IN JUSTIFY HELP ZONE- LOADS HYPHEN INTO RW BUFFER AFTER CALC.
              *                         AMOUNT OF JUSTIFY SPACE AND COMPARING IT TO
              *                         UPPER/LOWER LIMITS.

1621 E55C 08480 ANHYHLP   JEPR CALINEJ                 HELP HYPHEN           CU270
1622 9305 08481           BALG +5           M=0        BRANCH NO AREA LEFT
1623 E588 08482           JEPR TESPHLPJ
1624 B3FF 08483           CALR              M=3F
1625 FE82 08484           CALH              M=M.H8
1626 FC00 08485           CALH              SML
1627 0801 08486           JIPU +1
1628 A152 08487           JEPU BZERROR

1629 E750 08489           JEPR FELOL1MJ
162A 911D 08490           BALG -2           M>G1
162B A61C 08491           JEPU LDHYRW

              * IN JUSTIFY HELP ZONE - CALCULATES AMOUNT OF JUSTIFY SPACE, PRINTS HELP
              *                        ZONE WORD, AJUSTS RW BUFFER TO BREAKPOINT, &
              *                        ANAL. HELP ZONE BREAKPOINT.

162C E05C 08498 HLP       JEPR CALINEJ                 HELP                  CU220
162D 9701 08499           BALG +1           (M=0)'     BRANCH IF AREA LEFT
162E A641 08500           JEPU LKHLPERR

162F B02F 08502           CALR              M=02
1630 E906 08503           JEPR SEG5                    SET JUSTIFY HELP FLAG
1631 C77F 08504           JEPR ENDLINPA
1632 B10F 08505           CALR              M=10
1633 E91B 08506           JEPR REGA                    RESET LEFT PRINT FLAG
1634 E7E2 08507           JEPR MVCRSCRA
1635 E607 08508           JEPR PRHLP
1636 E6A6 08509           JEPR AJRWTOBP
1637 CC6D 08510           JEPR FECHRW-
1638 CC8C 08511           JEPR FECHRW+
1639 B2D9 08512           CALR              M=2D-M
163A 9702 08513           BALG +2           (M=0)'     BRANCH NOT A HYPHEN
163B CC7F 08514           JEPR RECHRWB
163C E70E 08515           JEPR SUHYCS
163D E58C 08516           JEPR ANBPHLP
163E 1309 08517           CPRT              RBDN
```

```
ADDR CODE NUMBR LABEL     CMND NEXTADDR OPERAND                COMMENT

163F FA62 08518           CALH          M=H6
1640 9702 08519           BALG +2       (M=0)'      BRANCH IF THERE ARE ACCUMLATED SPACES
1641 E7C0 08520 LKHLPERR  JEPR MVFRHLP              HELP ERROR                     CU220
1642 ACB7 08521           JEPU LKJERR

1643 0CD2 08523           CKBD          KBST
1644 E97C 08524           JEPR ANKBHLP
1645 080E 08525           JIPU -1

                 * MOVES HEAD ONE TRACK LEFT.

1646 E2A5 08530           JEPR FETNRO
1647 E321 08531           JEPR DEC MBCD
1648 9304 08532           BALG +4       M=0
1649 E1D2 08533           JEPR SETNRO
164A C103 08534           JEPR MOKB&CRD
164B 204E 08535           BROM -1       HDBY=1
164C 2180 08536           CROM          HDI
164D A666 08537           JEPU UPBNO

164E 2AD7 08539 HDL AC    BRWM -8       ACT=0       ACT HDL                        CT130
164F E2A3 08540 HDLRW     JEPR FETNRW               RW HDL
1650 E321 08541           JEPR DEC MBCD
1651 9304 08542           BALG +4       M=0
1652 E1CF 08543           JEPR SETNRW
1653 C103 08544           JEPR MOKB&CRD
1654 2E4E 08545           BRWM -1       HDBY=1
1655 2280 08546           CRWM          HDL
1656 A566 08547           JEPU UPBNO

                 *  TEST IF GO NEGATIVE.
1657 B004 08551 SE&TEGO1  CALG          GO=M        TEST IF GO NEGATIVE
1658 B800 08552           CALR          M=M.BO
1659 9301 08553           BALG +1       M=0
165A BFFF 08554           CALR          M=FF
165B A4A5 08555           JEPU XFG1=M

                 * CALCULATES THE AMOUNT OF JUSTIFY AREA BETWEEN CARRIER POSITION AND
                 *            RIGHT MARGIN.

165C CCAD 08561 CALINEJ   JEPR XFCAG10              CALC J AREA                    CU330
165D E87D 08562           JEPR NEG G10
165E ECC0 08563           JEPR FERMJ
165F BF01 08564           CALG          M=M+1
1660 B024 08565           CALG          G2=M
1661 E0DA 08566           JEPR FE2PCH
1662 E440 08567           JEPR XMG2+G10
1663 E870 08568           JEPR XFH45H01
1664 A3D8 08569           JEPU SUH10G10

1665 A569 08572           JEPU EJACEOC

                 *  UPDATE BLOCK/TRACK NUMBER DISPLAYS

1666 29D5 08576 UPBNO     BROM +5       ACT=0       REFRESH BNO                    CT140
1667 CD28 08577           JEPR TEROB2
1668 9303 08578           BALG +3       M=0
1669 E2A5 08579           JEPR FETNRO
166A E321 08580           JEPR DEC MBCD
166B 0801 08581           JIPU +1
166C E2A5 08582           JEPR FETNRO
166D 9F37 08583           BDAT -8       M=73        BRANCH ON TRACK 72
166E 2102 08584           CROM          BNO
166F E397 08585           JEPR TERV
1670 2AD6 08586           BRWM +6       ACT=0
1671 9705 08587           BALG +5       (M=0)'      BRANCH IF REVISE
1672 CD28 08588           JEPR TEROB2
1673 9303 08589           BALG +3       M=0
1674 E2A3 08590           JEPR FETNRW
1675 E321 08591           JEPR DEC MBCD
1676 0801 08592           JIPU +1
1677 E2A3 08593           JEPR FETNRW
1678 9F36 08594           BDAT +6       M=73        BRANCH ON TRACK 72
1679 2202 08595           CRWM          BNO
167A 9F22 08596           BDAT +2       M=72        BRANCH ON TRACK 72
167B B90F 08597           CALR          M=90
167C A916 08598           JEPU REG9                 RESET TRACK 72 BUZZ AND RECORD FLASH FL

167D B90F 08600           CALR          M=90
167E A914 08601           JEPU SEG9                 SET TRACK 72 BUZZ AND RECORD FLASH FLAG

167F A560 08603           JEPU EJRWEOC

                 * FETCH RW CHAR IF SECOND CHAR. NEEDED BUZZ.
                 *              IF SPACE INCR. # OF VARIABLE SPACE REG. H6.
                 *              OTHERWISE ADJUST AMOUNT OF CONSUMMED SPACE.

1680 CC8C 08610 SPHLP     JEPR FECHRW+              HELP SP                        CU290
1681 E8D9 08611           JEPR UPH7CHCT
1682 E864 08612           JEPR XFHOG7
1683 E2CE 08613           JEPR FEMACWT
1684 970B 08614           BALG -4       (M=0)'      BRANCH IF ACCENT
1685 CC86 08615           JEPR TERWB
```

```
ADDR CODE NUMBR LABEL    CMND NEXTADDR OPERAND            COMMENT

1686 9307 08616          BALG +7       M=0        BRANCH NO CHARACTER IN RW B
1687 BA72 08617          CALG          M=G7
1688 9A04 08618          BDAT +4       M=20       BRANCH IF SPACE
1689 C700 08619          JEPR AJDEHO
168A CBA1 08620          JEPR AJCR+M
168B E1EE 08621          JEPR CAG7JCS
168C A5F8 08622          JEPU ADCSH54

168D A8F4 08624          JEPU INC H6

168E CC6D 08626          JEPR FECHRW-
168F E8FA 08627          JEPR AJH7CHCT
1690 A152 08628          JEPU BZERROR

                * FETCH LAST 2 CH. FROM RW BUFFER. ADJUST CHAR. COUNT REG H7.
                *                IF SPACE DECR. # VARIABLE SPACES REG H6.
                *                OTHERWISE ADJUST AMOUNT OF CONSUMMED SPACE.

1691 FA72 08635 BSHLP    CALH          M=H7       HELP BS                 CU300
1692 9701 08636          BALG +1       (M=0)'
1693 A152 08637          JEPU BZERROR

1694 CC6D 08639          JEPR FECHRW-
1695 E8FA 08640          JEPR AJH7CHCT
1696 E8B4 08641          JEPR AFH007
1697 E2CE 08642          JEPR FEMACWT
1698 970D 08643          BALG -4       (M=0)'     BRANCH IF ACCENT
1699 0801 08644          JIPU +1
169A E8FA 08645          JEPR AJH7CHCT
169B CC6D 08646          JEPR FECHRW-
169C E2CE 08647          JEPR FEMACWT
169D 970C 08648          BALG -3       (M=0)'
169E CCBC 08649          JEPR FECHRW+
169F BA72 08650          CALG          M=G7
16A0 9A04 08651          BDAT +4       M=20       BRANCH IF SPACE
16A1 C700 08652          JEPR AJDEHO
16A2 CBA5 08653          JEPR AJCR-M
16A3 E1EE 08654          JEPR CAG7JCS
16A4 A599 08655          JEPU SUG10H54

16A5 ABF6 08657          JEPU DEC H6

                * IN JUSTIFY - AJUST RW BUFFER TO LAST BREAKPOINT.

16A6 FA72 08662 AJRWTOBP CALH          M=H7       RETN TO BK PT           CU350
16A7 8009 08663          CALR          M=00-M
16A8 8CDD 08664          JEPU AJRWBM

                * IN JUSTIFY-AJUST RW BUFFER TO LAST PROCESSED CHAR.

16A9 CC56 08669 AJRWJ    JEPR AJRWST              J RWB ALIGN             CU360
16AA FAF2 08670          CALH          M=HF
16AB 8CDD 08671          JEPU AJRWBM

                * IN JUSTIFY - STORE G7 AND G4 (IF) SECOND CHAR.) IN RW BUFFER.
                *              INCR. H7(DISTANCE TO LAST BREAKPOINT)

16AC BA72 08677 XFG7RWJ  CALG          M=G7       STORE RWB               CU340
16AD CC30 08678          JEPR INRW+
16AE E8D5 08679          JEPR INC H7
16AF E2B1 08680          JEPR TEG72CH
16B0 9703 08681          BALG +3       (M=0)'     BRANCH IF 2ND CHARACTER
16B1 E8D5 08682          JEPR INC H7
16B2 BA42 08683          CALG          M=G4
16B3 C9FD 08684          JEPR INDATRW+
16B4 CCCF 08685          JEPR TERWFULL
16B5 9301 08686          BALG +1       M=0        BRANCH IF RW IS NEARING ITS CAPACITY
16B6 000F 08687          RETN

16B7 E800 08689 LKJERR   JEPR BZLUJ               HARD J ERROR            CU340
16B8 080E 08690          JIPU -1

                * OVERCOME BREAKPOINT - FETCH CHAR. FROM RW & STORE TABS

16B9 CBDF 08695 AJRWBPO  JEPR FEHW+               OVERC BK PT             CU370
16BA CBFA 08696          JEPR AJRW-
16BB 9302 08697          BALG +2       M=0
16BC E701 08698          JEPR TETB1NSJ
16BD A6F7 08699          JEPU INTB-RW

16BE E701 08701          JEPR TETB1NSJ
16BF A6CD 08702          JEPU INTB+RW

                * FETCH RIGHT MARGIN IN JUSTIFY CK. THAT RM DOES NOT EXCEED SPECIFIED
                *       HELP ZONE.

16C0 E2A1 08708 FERMJ    JEPR FERM
16C1 F0C4 08709          CALH          HC=M
16C2 804F 08710          CALR          M=04
16C3 9297 08711          BALG +7       M.G9=0     BRANCH NOT JUSTIFY
16C4 880F 08712          CALR          M=80
16C5 92F3 08713          BALG +3       M.GF=0     BRANCH NOT TWELVE PITCH
16C6 B84F 08714          CALR          M=84
16C7 D1C3 08715          BALH +3       M>HC
16C8 000F 08716          RETN
```

```
ADDR CODE NUMBR LABEL      CMND NEXTADDR OPERAND            COMMENT

16C9 BCEF 08718            CALR          M=8E
16CA 080C 08719            JIPU -3
16CB 847D 08720            JEPU XFM=HC

               *  INSERT TABS IN RW BUFFER.

16CC ECCF 08725            JEPR INTBRWB
16CD 970E 08726 INTB+RW    BALG -1       (M=0)'     STORE TABS FWD              CU380
16CE 000F 08727            RETN

16CF 80AF 08730 INTBRWB    CALR          M=0A       TABS TO RWB
16D0 CC94 08731            JEPR LDMRW&AJ
16D1 ABEB 08732            JEPU DEC H0

16D2 E4B6 08735            JEPR EJAC
16D3 807D 08736            JEPU REKBIDL

               * PRINT END OF PARAGRAPH - TEST FOR EJECT CODE, INSERT CHAR. INTO RW
               *                         USING STANDARD SPACE

16D4 E53E 08741 PREOP      JEPR AJLINEJ             EOP PRINT                   CU060
16D5 88CF 08742            CALR          M=8C
16D6 907B 08743            BALG -4       M-G7=0     BRANCH IF EJECT CODE
16D7 E6AC 08744            JEPR XFG7RWJ
16D8 ECA9 08745            JEPR AJRWJ
16D9 E5EC 08746            JEPR CASPJ
16DA 0002 08747            RNOP
16DB E10E 08748            JEPR CLH4-H7
16DC E203 08749            JEPR FESTDSP
16DD 8C00 08750            CALG          SML
16DE F054 08751            CALH          H5=M
16DF 8009 08752            CALR          M=00-M
16E0 9012 08753            BALG +2       M=M+G1C
16E1 BA12 08754            CALG          M=G1
16E2 F054 08755            CALH          H5=M
16E3 E51D 08756 ENDJHLP    JEPR PRLJ                HELP J EXIT                 CU060
16E4 E10E 08757            JEPR CLH4-H7
16E5 0804 08758            JIPU +4
16E6 E861 08759            JEPR XFH10G47
16E7 E6AC 08760            JEPR XFG7RWJ
16E8 E5CF 08761            JEPR PRJ&AJHF
16E9 C044 08762            JEPR TEG7DPJ
16EA 820F 08763            CALR          M=20
16EB E90D 08764            JEPR REG6                RESET INSERT TAB FLAG
16EC CD39 08765            JEPR FECH
16ED E335 08766            JEPR TEMCR
16EE 9307 08767            BALG -8       M=0        BRANCH IF CR
16EF C9D9 08768            JEPR AJRO-/H0
16F0 C6C1 08769            JEPR MOLINCTR
16F1 E2BA 08770            JEPR EVSTOP
16F2 9301 08771            BALG +1       M=0        BRANCH STOP NOT SET
16F3 807D 08772            JEPU REKBIDL

16F4 A79F 08774            JEPU CLH7&PC

16F5 ECCF 08777            JEPR INTBRWB
16F6 CBFA 08778            JEPR AJRW-
16F7 970D 08779 INTB-RW    BALG -2       (M=0)'     STORE TABS REV              CU380
16F8 80FF 08780            CALR          M=0F
16F9 BEC2 08781            CALG          M=M.GC
16FA CCDD 08782            JEPR AJRWBM
16FB E711 08783            JEPR EVRWBJ
16FC 080E 08784            JIPU -1

16FF 9C85 08787            *CHECK WORD*
1700 A887 08787            JEPU CLM

1701 820F 08789 TETB1NSJ   CALR          M=20       J TAB INS TEST              CU390
1702 926D 08790            BALG -2       M.G6=0     BRANCH INSERT TAB FLAG NOT SET
1703 E90D 08791            JEPR REG6
1704 B0FF 08792            CALR          M=0F
1705 BEC2 08793            CALG          M=M.GC
1706 F004 08794            CALH          H0=M
1707 F9F0 08795            CALH          M=M+HF
1708 F0F4 08796            CALH          HF=M
1709 FA02 08797            CALH          M=H0
170A 000F 08798            RETN

               *  IF G7 CONTAINS HYPEN SUBTRACT IT FROM CONSUMED SPACE.

170B 8A72 08803 SUCSIFHY   CALG          M=G7       SUBTRACT IF HYPHEN
170C 9AD1 08804            BDAT +1       M=2D       BRANCH IF HYPHEN
170D 000F 08805            RETN

170E 82DF 08807 SUHYCS     CALR          M=2D       SUBTRACT HYPHEN
170F E1EF 08808            JEPR CAMJCS
1710 A599 08809            JEPU SUG10H54

               *  IN JUSTIFY - EVALUATE RW BUFFER - UPDATES CHAR. COUNT IN REG H7
               *           CALCULATES CONSUMMED SPACE & ADJUSTS BUFFER.

1711 CCBC 08815 EVRWBJ     JEPR FECHRW+             EVAL J RWB                  CU400
1712 D703 08816            BALH +3       (M=0)'     BRANCH IF CHARACTER IN RW
```

```
ADDR CODE NUMBR LABEL     CMND NEXTADDR OPERAND              COMMENT

1713 0002 08817           RNOP
1714 88FA 08818           JEPU AJRW-

1715 8C7F 08820           JEPU RECHRWB

1716 E8D9 08822           JEPR UPH7CHCT
1717 FA02 08823           CALH          M=H0
1718 9A0C 08824           BDAT -3       M=2C       BRANCH IF SPACE
1719 E1EF 08825           JEPR CAMJCS
171A A5F8 08826           JEPU ADCSH54

          *  ADD HYPEN TO CONSUMMED SPACE CALCULATION.

171B B2DF 08831 ADHYCS    CALR          M=2D       ADD HYPHEN
171C E1EF 08832           JEPR CAMJCS
171D A5F8 08833           JEPU ADCSH54

          *NORMAL PRINT OF JUSTIFIED LINE

171E C5C2 08838 PRJ       JEPR CLDE
171F F164 08839           CALH          H6=0
1720 C77F 08840           JEPR ENDLINPA                 PRINT FROM PRINT STACK TILL EMPTY
1721 B10F 08841           CALR          M=10
1722 E91B 08842           JEPR REGA                     RESET REVERSE PRINT IF SET
1723 1E5B 08843           BPRT +B       DB5=1      A>   BR IF DEFERRED CR
1724 E6A9 08844 PRJFWD    JEPR AJRWJ
1725 CC7C 08845           JEPR FEXFTERW            C<   FETCH FROM RW BUFFER
1726 9302 08846           BALG +2       M=0        B>   BR IF CR
1727 E5D0 08847           JEPR EXJUST                   EXECUTE CHARACTER
1728 080C 08848           JIPU -3       C>
1729 BAA2 08849           CALG          M=GA       B<
172A 1E32 08850           BPRT +2       DB3=1      D>   BR IF PRINT AUTO
172B E5D0 08851           JEPR EXJUST                   EXECUTE CR IF NOT PRINT AUTO
172C 0801 08852           JIPU +1                  E>
172D C7C6 08853           JEPR CRPAIX              D<   INDEX ETC IF PR AUTO & SET DEED CR
172E A744 08854           JEPU ENDJPR              E<

172F E6A9 08856           JEPR AJRWJ               A<
1730 CC7C 08857           JEPR FEXFTERW            G<   FETCH FROM RW BUFFER
1731 9304 08858           BALG +4       M=0        F>   BR IF CR
1732 E3B1 08859           JEPR TEG7HAY
1733 930C 08860           BALG -3       M=0        G>   BR IF CAN BE PRINTED REVERSE
1734 C7E5 08861           JEPR CRPACR                   EXECUTE DEED CR
1735 A724 08862           JEPU PRJFWD

1736 C6FC 08864           JEPR SERP                F<
1737 CC6D 08865           JEPR FECHRW-
1738 CC6D 08866           JEPR FECHRW-             I< J<
1739 9305 08867           BALG +5       M=0        H>
173A E861 08868           JEPR XFH10G47
173B 80A9 08869           CALR          M=0A-M
173C 9308 08870           BALG -4       M=0        J>
173D E5D0 08871           JEPR EXJUST                   EXECUTE CHARACTER
173E 0809 08872           JIPU -6                  I>
173F C7C6 08873           JEPR CRPAIX              H<   INDEX ETC & SET DEED ESC BIT
1740 C7E5 08874           JEPR CRPACR                   CLEAR DEED ESC BIT
1741 CC56 08875           JEPR AJRWST
1742 CC7C 08876           JEPR FEXFTERW
1743 970E 08877           BALG -1       (M=0)'     BRANCH NOT A CR
1744 C944 08878 ENDJPR    JEPR TEG7DPJ
1745 E10E 08879           JEPR CLH4-H7
1746 CD7D 08880           JEPR RERO=RW
1747 F1F4 08881           CALH          HF=0
1748 CC86 08882           JEPR TERWB
1749 9705 08883           BALG +5       (M=0)'     BRANCH CHARACTER IN RWB
174A E2BA 08884           JEPR EVSTOP
174B 9302 08885           BALG +2       M=0        BRANCH NOT STOP CONDITION
174C E6B9 08886           JEPR AJRWBPJ
174D 807D 08887           JEPU REKBIDL

174E C6C1 08889           JEPR MOLINCTR
174F A10E 08890           JEPU CLH4-H7

          * FETCH LOWER LIMIT IN JUSTIFY MODE

1750 B80F 08895 FELOL1MJ CALR           M=80       LOW LIM TO M              CU410
1751 9264 08896           BALG +4       M.G6=0     BRANCH NOT PROPORTIONAL SPACE
1752 9251 08897           BALG +1       M.G5=0     BRANCH LOWER LIMIT NOT SET
1753 BFEA 08898           CALR          M=M+FE
1754 B85A 08899           CALR          M=M+85
1755 000F 08900           RETN

1756 E0DA 08902           JEPR FE2PCH
1757 BFDA 08903           CALR          M=M+FD
1758 000F 08904           RETN

          * TESTS RW BUFFER FOR HYPHEN OR PREC. HYPEN

1759 CC86 08909 TERWHYJ   JEPR TERWB               HYPHEN TEST               CU420
175A E358 08910           JEPR TEMPC
175B 9301 08911           BALG +1       M=0        BRANCH IF PRINT CHARACTER
175C 000F 08912           RETN

175D CC6D 08914           JEPR FECHRW-
175E CC8C 08915           JEPR FECHRW+
```

```
ADDR CODE NUMBR LABEL     CMND NEXTADDR OPERAND             COMMENT

175F 99AC 08916           BDAT -3       M=1A       BRANCH IF TAB
1760 82DF 08917           CALR          M=2D
1761 CC94 08918           JEPR LDMRW&AJ
1762 A71B 08919           JEPU ADHYCS

                 * IF THUMBWHEELS SET TO 00 & NOT IN REVISE AND IN
                 * CODE  PRINT SET BIT 0 IN REGISTER GA FOR AUTOLOG MODE.
                 *  MOVE HEAD TO TRACK 01.
                 *  THUMBWHEELS NOT EQUAL TO 00 SEARCH TO
                 *  THUMBWHEEL TRACK.

1763 0502 08928 SCH TK    CKBD          TWST       TRACK SEEK             CT070
1764 E002 08929           CALG          M=M'
1765 B044 08930           CALG          G4=M
1766 9708 08931           BALG +8       (M=0)'
1767 E394 08932           JEPR TERVRC
1768 9301 08933           BALG +1       M=0        BR. IF NOT IN REVISE OR RECORD
1769 8445 08934           JEPU BZERI3

176A B40F 08936           CALR          M=40       BIT MASK - CODE PRINT
176B 928D 08937           BALG -2       M.G8=0     BR. IF NOT IN CODE PRINT
176C 801F 08938           CALR          M=01
176D E919 08939           JEPR SEGA                SET AUTO LOG BIT
176E 8FE6 08940           JEPU MVTOTK01            BR. TO MOVE HEAD TO TRACK 01

176F 0000 08942           NOOP
1770 2DD4 08943           BROM +4       ACT=1
1771 E394 08944           JEPR TERVRC
1772 9302 08945           BALG +2       M=0        BRANCH NOT REVISE OR RECORD
1773 CBE0 08946           JEPR FERW
1774 9709 08947           BALG +9       (M=0)'     BRANCH CHAR IN RW
1775 E400 08948           JEPR SCHRVOH
1776 E497 08949           JEPR FEACBNO
1777 9046 08950           BALG +6       M-G4=0
1778 9542 08951           BALG +2       M=M-G4>0
1779 BA1F 08952           CALR          M=A1
177A B074 08953           CALG          G7=M
177B E4C2 08954           JEPR HDLR
177C 2D49 08955           BROM -6       HDBY=1
177D 2E48 08956           BRWM -7       HDBY=1
177E 8070 08957           JEPU REKBIDL

                *  CALCULATES MAXIMUM BREAK POINT IN JUSTIFY

177F E79F 08962 CAMAXBPJ JEPR CLH7&PC              CALC MAX BK PT         CU250
1780 E71B 08963           JEPR ADHYCS
1781 B144 08964           CALG          G4=0
1782 0805 08965           JIPU +5
1783 A57A 08966           JEPU CAEXITJ

1784 E8F4 08968           JEPR INC H6
1785 E500 08969 CAMAXCT   JEPR TECS
1786 E750 08970           JEPR FELOL1MJ
1787 911B 08971           BALG -4       M>G1
1788 CC8C 08972           JEPR FECHRW+
1789 9701 08973           BALG +1       (M=0)'
178A 8BFA 08974           JEPU AJRW-

178B E8D9 08976           JEPR UPH7CHCT
178C FA02 08977           CALH          M=H0
178D 9A06 08978           BDAT -9       M=20       BRANCH IF SPACE
178E E1EF 08979           JEPR CAMJCS
178F 9308 08980           BALG -7       M=0
1790 B004 08981           CALG          G0=M
1791 B940 08982           CALG          M=M+G4
1792 B044 08983           CALG          G4=M
1793 BA02 08984           CALG          M=G0
1794 E5F8 08985           JEPR ADCSH54
1795 A785 08986           JEPU CAMAXCT

                * SET STOP BIT IF IN PARA. MODE.

1796 B04F 08991 SESTOPIF CALR           M=04       SET STOP IF PARA       CU440
1797 9281 08992           BALG +1       M.G8=0     BRANCH PARA FLAG NOT SET
1798 A2BB 08993           JEPU SESTOP

1799 000F 08995           RETN

                * RESETS FIRST PRINTING CHARACTER BIT (2) IN REG. G6 IF CHAR=00

179A 9303 09000 REPCIFCS BALG +3        M=0        RESET PC IF C. SP.     CU450
179B E657 09001           JEPR SE&TEG01
179C B04F 09002           CALR          M=04
179D A90D 09003           JEPU REG6                RESET FIRST PRINT CHARACTER FLAG

179E A657 09005           JEPU SE&TEG01

                * CLEAR H7 AND PRINT CHARACTER FLAG

179F F174 09010 CLH7&PC   CALH          H7=0       CLR H7 & PC            CU450
17A0 B04F 09011           CALR          M=04
17A1 A90D 09012           JEPU REG6                RESET FIRST PRINT CHARACTER FLAG
```

```
ADDR CODE NUMBR LABEL    CMND NEXTADDR OPERAND            COMMENT

                  * CLEAR DISTANCE TO LAST BREAKPOINT IF FIRST PRINTING CHAR BIT (2) IN
                  *                 REG. G6 RESET.

17A2 804F 09018 CLH7IF   CALR           M=04      CLR H7 IF OK              CU450
17A3 9261 09019          BALG +1        M.G6=0
17A4 000F 09020          RETN

17A5 F174 09022          CALH           H7=0
17A6 A90B 09023          JEPU SEG6                SET FIRST PRINT CHARACTER FLAG

17A7 A30F 09026          JEPU RETC

17A8 000F 09028          RETN

                  * IN JUSTIFY - TESTS FOR END OF PARAGRAPH

17A9 BA72 09032 TEEOPCRJ CALG           M=G7
17AA 986D 09033          BDAT -2        M=06      BR. PSCR
17AB 988C 09034          BDAT -3        M=08      BR. PCR
17AC CD26 09035          JEPR TEROB1
17AD B0D5 09036          CALR           M=0B-M
17AE 9308 09037          BALG -7        M=0       BRANCH IF PRECEDENTED TAB
17AF E2EF 09038          JEPR SKSPTBIF
17B0 9305 09039          BALG +5        M=0       BRANCH IF SPACE OR TAB SKIPPED
17B1 CD06 09040          JEPR AJRO-
17B2 FA02 09041          CALH           M=H0
17B3 E335 09042          JEPR TEMCR
17B4 9705 09043          BALG +5        (M=0)'    BRANCH NOT A CR
17B5 000F 09044          RETN

17B6 C655 09046          JEPR TELM
17B7 FB42 09047          CALH           M=M@H4
17B8 FB52 09048          CALH           M=M@H5
17B9 9701 09049          BALG +1        (M=0)'    BRANCH IF AT LEFT MARGIN
17BA A16F 09050          JEPU RETN3

17BB BA62 09052          CALG           M=G6
17BC 1E6D 09053          BPRT -2        DB6=1
17BD E2E0 09054          JEPR SKSPTBRO
17BE CD06 09055          JEPR AJRO-
17BF A16E 09056          JEPU RETN4

                  * MOVE FROM HELP ZONE

17C0 B02F 09061 MVFRHLP  CALR           M=C2
17C1 E008 09062          JEPR REG5                RESET MGC JUST HELP FLAG
17C2 E7DC 09063          JEPR MVCRHE9
17C3 A82A 09064          JEPU CLHELP

                  * JUSTIFY LOOP - ANAL. CHAR. IN JUSTIFY. ACCUMULATES THEIR WIDTHS AND
                  *                 EVALUATES IF BREAKPOINT.

17C4 E52B 09070          JEPR ANCHJ
17C5 E5DE 09071          JEPR CENTJ
17C6 C58E 09072 ANACCHJ  JEPR MVCARDE             JUST LOOP                 CU020
17C7 E6B9 09073          JEPR AJRWBPJ
17C8 C0AD 09074 ANCHJC   JEPR MO                  CONT J LOOP               CU020
17C9 CD39 09075          JEPR FECH
17CA E2C0 09076          JEPR SKSPTBAJ
17CB E93F 09077          JEPR EVBPJ
17CC 9707 09078          BALG -8        (M=0)'    BRANCH NOT A BREAKPOINT
17CD E34A 09079          JEPR TEG7PUNJ
17CE E5B3 09080          JEPR TEG7TXTJ
17CF 9708 09081          BALG -7        (M=0)'    BRANCH IF TEXT
17D0 BA72 09082          CALG           M=G7
17D1 9892 09083          BDAT +2        M=B9      BRANCH IF CARD REPEAT CODE
17D2 E571 09084          JEPR PRLJSTRW
17D3 807D 09085          JEPU REKBIDL

17D4 E572 09087          JEPR PRSTDLJ
17D5 E4B0 09088          JEPR EJRO
17D6 807D 09089          JEPU REKBIDL

                  * SHIFT CONTENTS ACCUMULATOR LEFT AS MANY AS FOR TIMES DEPENDING ON
                  * ENTRY POINT

17D7 BC00 09095 SML4     CALG           SML       SHIFT 4                   CR080
17D8 BC00 09096 SML3     CALG           SML       SHIFT 3                   CR080
17D9 BC00 09097 SML2     CALG           SML       SHIFT 2                   CR080
17DA BC00 09098 SML1     CALG           SML       SHIFT 1                   CR080
17DB 000F 09099          RETN

                  * MOVE CARRIAGE TO POSITION DEFINED IN HE.H9

17DC BF0F 09104 MVCRHE9  CALR           M=F0      MOVE TO HE/H9             CU470
17DD FE92 09105          CALH           M=M.H9
17DE E7F9 09106          JEPR RML4
17DF 8004 09107          CALG           G0=M
17E0 FAE2 09108          CALH           M=HE
17E1 889B 09109          JEPU MVCRM+FR

                  * MOVE CARRIAGE TO SCRATCH POSITION ON PLATEN

17E2 E81A 09114 MVCRSCRA JEPR XFCAHE9             MOVE TO SCRATCH           CU470
```

```
ADDR CODE NUMBR LABEL     CMND NEXTADDR OPERAND           COMMENT

17E3 B80F 09115           CALR          M=80
17E4 92F1 09116           BALG +1       M.GF=0      BRANCH TWELVE PITCH FLAG NOT SET
17E5 897F 09117           CALR          M=97
17E6 BF3A 09118           CALR          M=M+F3
17E7 889A 09119           JEPU MVCRM

                * SETS CODE PRINT & EXP SPACE RESETS TAB COUNTER & LINE UNDERSCORE.

17E8 E823 09124 SEJ       JEPR TEJON                J KEY                    CU490
17E9 9701 09125           BALG +1       (M=0)'      BRANCH NOT REVISE OR PS OR MGC SET
17EA 8445 09126           JEPU BZERI3

17EB CB1E 09128           JEPR UPWRI
17EC 9701 09129           BALG +1       (M=0)'      BRANCH CARD AT RUN,AT SPEED AND RECORD
17ED CC51 09130           JEPR CLRW
17EE BC0F 09131           CALR          M=C0
17EF E912 09132           JEPR REGB                 RESET EXPAND AND CODE PRINT
17F0 E2F7 09133           JEPR CTRWHF
17F1 B0CF 09134           CALR          M=0C
17F2 E914 09135           JEPR SEG9                 SET PLAY AND JUSTIFY
17F3 B04F 09136           CALR          M=04
17F4 E918 09137           JEPR REGA                 RESET LINE UNDERSCORE
17F5 A30F 09138           JEPU RETC

17F6 BC01 09141 RML7      CALG          RML         CIRC 7                   CR080
17F7 BC01 09142 RML6      CALG          RML         CIRC 6                   CR080
17F8 BC01 09143 RML5      CALG          RML         CIRC 5                   CR080
17F9 BC01 09144 RML4      CALG          RML         CIRC 4                   CR080
17FA BC01 09145 RML3      CALG          RML         CIRC 3                   CR080
17FB BC01 09146 RML2      CALG          RML         CIRC 2                   CR080
17FC BC01 09147 RML1      CALG          RML         CIRC 1                   CR080
17FD 000F 09148           RETN

                * IN JUSTIFY - TURNS ON FLASHING BUZZER AND FLASHES JUSTIFY LIGHT,AFTER
                *                  STOP KEY DEPRESSED EXIT JUSTIFY ADJUST BUFFERS &
                *                  PRINT.

17FE 61AE 09155           *ADJUST WORD*
17FF 8899 09155           *CHECK WORD**
1800 0732 09155 BZLUJ     CKBD          BUZZ=3      J BUZZ LOCK              CU480
1801 0C3F 09156           BKBD -0       STOP=1
1802 B04F 09157           CALR          M=04
1803 0CC6 09158           BKBD +6       2HZ=1
1804 E914 09159           JEPR SEG9                 SET JUSTIFY FLAG
1805 0835 09160           BKBD +5       STOP=0
1806 CD70 09161           JEPR RERO=RW
1807 E572 09162           JEPR PRSTDLJ
1808 CDBA 09163           JEPR USPART
1809 ABAC 09164           JEPU REJ

180A E916 09166           JEPR REG9
180B C0AD 09167           JEPR MO
180C C2DD 09168           JEPR TEKB
180D 9304 09169           BALG -B       M=0         BRANCH NO KEYBOARD ENTRY
180E 0702 09170           CKBD          BUZZ=0
180F 000F 09171           RETN

                *  SET JUSTIFY LIMIT.

1810 E823 09176 SEJ&JLMT  JEPR TEJON                JLMT KEY                 CU500
1811 9701 09177           BALG +1       (M=0)'      BRANCH CARD AT RUN,AT SPEED AND RECORD
1812 8445 09178           JEPU BZERI3

1813 E831 09180 SEJLMTJ   JEPR SEJLMT               JLMT                     CU500
1814 9702 09181           BALG +2       (M=0)'      BRANCH NOT GOOD LIMIT VALUE
1815 B04F 09182           CALR          M=04
1816 9291 09183           BALG +1       M.G9=0      BRANCH NOT JUSTIFY
1817 807D 09184           JEPU REKBIDL

1818 E7E8 09186           JEPR SEJ
1819 807D 09187           JEPU REKBIDL

                * TRANSFER CARRIAGE POSITION TO REG HE,H9

181A FAA2 09192 XFCAHE9   CALH          M=HA        CARR TO HE/H9
181B F0E4 09193           CALH          HE=M
181C BAC2 09194           CALG          M=GC
181D BF0D 09195 STMH9     CALR          M=M.F0      STORE UPPER BITS OF M IN H9
181E F992 09196           CALH          M=M*H9
181F BF0D 09197           CALR          M=M.F0
1820 F992 09198           CALH          M=M*H9
1821 F094 09199 XFH9=M    CALH          H9=M
1822 000F 09200           RETN

                * CLEAR M IF IN REVISE, OR NOT IN PS OR NOT PLAY OR MARGIN CONTROL

1823 E397 09205 TEJON     JEPR TERV                 J ON TEST                CU510
1824 9704 09206           BALG +4       (M=0)'      BRANCH IF REVISE
1825 0C83 09207           BKBD +3       NPS=1
1826 E370 09208           JEPR TEPNMC
1827 9701 09209           BALG +1       (M=0)'      BRANCH IF MARGIN CONTROL
1828 A888 09210           JEPU SEM=FF

1829 A887 09212           JEPU CLM
```

```
ADDR CODE NUMBR LABEL     CMND NEXTADDR OPERAND              COMMENT

182A B08F 09215 CLHELP    CALR          M=0B      CLEAR HELP&HE/H9           CS010
182B E924 09216           JEPR REGF               RESET RIGHT MARGIN RANGE
182C F1E4 09217 CLHE9     CALH          HE=0      CLEAR HE/H9                CS010
182D B0FF 09218           CALR          M=0F
182E FE92 09219           CALH          M=M.H9
182F A821 09220           JEPU XFH9=M

              * ANAL. 2 DIGITS FROM KEYBOARD TO BE UPPER & LOWER JUSTIFY LIMITS.

1830 E152 09225 BZJLMTER  JEPR BZERROR            JLMT ERROR                 CU520
1831 C343 09226 SEJLMT    JEPR ANKBDIG            SET JLMT                   CU520
1832 930D 09227           BALG -2       M=0       BRANCH BAD DIGIT ENTRY
1833 E1E8 09228           JEPR CVFF00
1834 B024 09229           CALG          G2=M
1835 BFAF 09230           CALR          M=FA
1836 9029 09231           BALG -6       M=M+G2C
1837 0804 09232           JIPU +4
1838 A850 09233           JEPU SELOLIMJ

1839 B2CF 09235           CALR          M=2C
183A D00D 09236           BALH -2       M-H0=0
183B E152 09237           JEPR BZERROR
183C C343 09238           JEPR ANKBDIG
183D 930B 09239           BALG -4       M=0
183E E1E8 09240           JEPR CVFF00
183F B004 09241           CALG          G0=M
1840 E3F2 09242           JEPR X10G2+G0
1841 BCDF 09243           CALR          M=CD
1842 9507 09244           BALG +7       M=M+G0C
1843 B04F 09245           CALR          M=04
1844 9105 09246           BALG +5       M>G0
1845 FA82 09247           CALH          M=H8
1846 BC0D 09248           CALR          M=M.C0
1847 8B02 09249           CALG          M=M⊕G0
1848 F084 09250           CALH          H8=M
1849 A887 09251           JEPU CLM

184A A830 09253           JEPU BZJLMTER


184B BA02 09256 XFG01HE9  CALG          M=G0      HE/H9=G0/G1                CS010
184C F0E4 09257           CALH          HE=M
184D BA12 09258           CALG          M=G1
184E E7D7 09259           JEPR SML4
184F A81D 09260           JEPU STMH9

              * SET LOWER LIMIT IN JUSTIFY MODE

1850 B03F 09265 SELOLIMJ  CALR          M=03
1851 BC21 09266           CALG          M=M-G2
1852 9305 09267           BALG +5       M=0
1853 9401 09268           BALG +1       M=M-1=0
1854 A830 09269           JEPU BZJLMTER

1855 B80F 09271           CALR          M=80
1856 E906 09272           JEPR SEG5               SET LOWER LIMIT FLAG
1857 A831 09273           JEPU SEJLMT

1858 B80F 09275           CALR          M=80
1859 E908 09276           JEPR REG5               RESET LOWER LIMIT FLAG
185A A831 09277           JEPU SEJLMT


185B FAE2 09280 XFHE9G01  CALH          M=HE      G0/G1=HE/H9                CS010
185C B004 09281           CALG          G0=M
185D BF0F 09282           CALR          M=F0
185E FE92 09283           CALH          M=M.H9
185F E7F9 09284           JEPR RML4
1860 A4A5 09285           JEPU XFG1=M


1861 FA12 09288 XFH10G47  CALH          M=H1      G4/G7=H1/H0                CS020
1862 E1E8 09289           JEPR CVFF00
1863 B044 09290           CALG          G4=M
1864 FA02 09291 XFH0G7    CALH          M=H0      G7=H0                      CS020
1865 B074 09292 XFG7=M    CALG          G7=M
1866 000F 09293           RETN


1867 FA02 09296 XFH01G01  CALH          M=H0      G0/G1=H0/H1                CS030
1868 B004 09297           CALG          G0=M
1869 FA12 09298           CALH          M=H1
186A A4A5 09299           JEPU XFG1=M


186B BA02 09302 XFG01H01  CALG          M=G0      H0/H1=G0/G1                CS030
186C F004 09303           CALH          H0=M
186D BA12 09304           CALG          M=G1
186E F014 09305 XFH1=M    CALH          H1=M
186F 000F 09306           RETN


1870 FA42 09309 XFH45H01  CALH          M=H4      H0/H1=H4/H5                CS030
1871 F004 09310           CALH          H0=M
1872 FA52 09311           CALH          M=H5
1873 A86E 09312           JEPU XFH1=M
```

```
ADDR CODE NUMBR LABEL    CMND NEXTADDR OPERAND                COMMENT

1874 BA02 09315 XFG01H45 CALG          M=G0      H4/H5=G0/G1           CS030
1875 F044 09316          CALH          H4=M
1876 BA12 09317          CALG          M=G1
1877 F054 09318          CALH          H5=M
1878 000F 09319          RETN

1879 FA72 09322 XFG47G01 CALH          M=H7      G0/G1=G4/H7           CS040
187A B014 09323          CALG          G1=M
187B BA42 09324          CALG          M=G4
187C A3E4 09325          JEPU XFG0=M

187D 8512 09328 NEG G10  CALG          M=G1'     G1/G0= -G1/G0         CS030
187E 8014 09329          CALG          G1=M
187F 8A02 09330          CALG          M=G0
1880 9701 09331          BALG +1       (M=0)'
1881 A8C6 09332          JEPU INC G1

1882 8009 09334          CALR          M=00-M
1883 A3E4 09335          JEPU XFG0=M

1884 BA12 09338 COG10H10 CALG          M=G1      G1/G0>H1/H0           CS030
1885 D013 09339          BALH +3       M-H1=0
1886 D114 09340          BALH +4       M>H1
1887 800F 09341 CLM      CALR          M=00      CLEAR M               CS030
1888 000F 09342          RETN

1889 8502 09344          CALG          M=G0'
188A DC0C 09345          BALH -3       M=M+H0C
188B 8FFF 09346 SEM=FF   CALR          M=FF      M=FF                  CS030
188C 000F 09347          RETN

188D BA12 09350 XFG01G4H CALG          M=G1      G4/H7=G0/G1           CS040
188E F074 09351          CALH          H7=M
188F 8A02 09352          CALG          M=G0
1890 8044 09353          CALG          G4=M
1891 000F 09354          RETN

                *ANALYZES KB INPUT WHEN IN JUSTIFY MODE

1892 8A72 09359 ANKBJ    CALG          M=G7
1893 1E78 09360          BPRT +8       DB7=1     A>
1894 99F2 09361          BDAT +2       M=1F      B>      BR IF "AUTO" CODE
1895 99E2 09362          BDAT +2       M=1E      C>      BR IF "PARA" CODE
1896 8445 09363          JEPU BZERI3

1897 803A 09365          CALR          M=M+03    B<      IF+03+E6=08 (SET"AUTO"BIT)
1898 8E6A 09366          CALR          M=M+E6    C<      1E+E6   =04 (SET"PARA"BIT)
1899 E910 09367          JEPR SEG8                       SET"AUTO" OR"PARA" MODE
189A E385 09368          JEPR TEACMED
189B E4EE 09369          JEPR SEKSJ
189C A7C6 09370          JEPU ANACCHJ                    ENTER MAIN JUSTIFY LOOP

189D C715 09372          JEPR SEPA
189E 080C 09373          JIPU -3
189F 9CFD 09374          BDAT -2       M=CF      A<
18A0 9A07 09375          BDAT +7       M=A0      D>     BR IF HDL CODE (HEAD LEFT)
18A1 9A16 09376          BDAT +6       M=A1      E>     BR IF HDR  CODE (HEAD RIGHT)
18A2 9A26 09377          BDAT +6       M=A2      F>     BR IF SEEK CODE (TRK SEEK)
18A3 9A35 09378          BDAT +5       M=A3      G>     BR IF SEEK CODE (TRK SEEK)
18A4 9AB5 09379          BDAT +5       M=AB      H>     BR IF RECD CODE (RECORD)
18A5 9B95 09380          BDAT +5       M=B9      I>     BR IF JLT  CODE (JUSTIFY LMT)
18A6 9A95 09381          BDAT +5       M=A9      J>     BR IF JST  CODE (JUSTIFY)
18A7 8445 09382          JEPU BZERI3

18A8 A479 09384          JEPU TEHDLROK           D< E<

18A9 A763 09386          JEPU SCH TK             F<G<

18AA 8A90 09388          JEPU SERC               H<

18AB A813 09390          JEPU SEJLMTJ            I<

18AC 804F 09392 REJ      CALR  .       M=04      J<
18AD E916 09393          JEPR REG9                       RESET JUSTIFY
18AE E572 09394          JEPR PRSTDLJ
18AF C0BA 09395          JEPR USPART
18B0 E0FD 09396          JEPR LKTC
18B1 807D 09397          JEPU REKBIDL

                *INCREMENT HC MODULO 158

18B2 89DF 09402 INCHC158 CALR          M=9D
18B3 D1C2 09403          BALH +2       M>HC
18B4 F1C4 09404          CALH          HC=0
18B5 A887 09405          JEPU CLM

18B6 FAC2 09407          CALH          M=HC
18B7 8F01 09408          CALG          M=M+1     A<
18B8 F0C4 09409 XFHC=M   CALH          HC=M
18B9 000F 09410          RETN

18BA B01F 09413 INC G3   CALR          M=01      INCR G3               CS060
18BB 0801 09414          JIPU +1
```

```
ADDR CODE NUMBR LABEL     CMND NEXTADDR OPERAND                   COMMENT

18BC BFFF 09415 DEC G3    CALR              M=FF        DECR G3              CS080
18BD B930 09416           CALG              M=M+G3
18BE B034 09417           CALG              G3=M
18BF 000F 09418           RETN

18C0 BA02 09421 INC G0    CALG              M=G0        INCR G0              CS070
18C1 BF01 09422           CALG              M=M+1
18C2 0802 09423           JIPU +2
18C3 BA02 09424 DEC G0    CALG              M=G0        DECR G0              CS070
18C4 B000 09425           CALG              M=M-1
18C5 A3E4 09426           JEPU XFG0=M

18C6 BA12 09429 INC G1    CALG              M=G1        INCR G1              CS070
18C7 BF01 09430           CALG              M=M+1
18C8 0802 09431           JIPU +2
18C9 BA12 09432 DEC G1    CALG              M=G1        DECR G1              CS070
18CA B000 09433           CALG              M=M-1
18CB A4A5 09434           JEPU XFG1=M

                *           INCRIMENT/DECRIMENT GP REGISTER GD

18CC B01F 09439 INC GD    CALR              M=01
18CD 0801 09440           JIPU +1
18CE BFFF 09441 DEC GD    CALR              M=FF        SET M TO -1
18CF B9D0 09442           CALG              M=M+GD      ADD TO GD
18D0 B0D4 09443           CALG              GD=M
18D1 000F 09444           RETN

18D2 FA72 09447 DEC H7    CALH              M=H7        DECR H7              CS080
18D3 F000 09448           CALH              M=M-1
18D4 0802 09449           JIPU +2
18D5 FA72 09450 INC H7    CALH              M=H7        INCR H7              CS080
18D6 FF01 09451           CALH              M=M+1
18D7 F074 09452           CALH              H7=M
18D8 000F 09453           RETN

18D9 FA12 09456 UPH7CHCT  CALH              M=H1        UPDATE H7            CS080
18DA D301 09457           BALH +1           M=0
18DB E8D5 09458           JEPR INC H7
18DC A8D5 09459           JEPU INC H7

18DE E900 09462 UPHFCHCT  JEPR INC HF                   UPDATE HF            CS100
18DF FA12 09463           CALH              M=H1
18E0 9301 09464           BALG +1           M=0
18E1 E900 09465           JEPR INC HF
18E2 A861 09466           JEPU XFH10G47

                *           INCRIMENT/DECRIMENT GD REGISTER GE

18E3 B01F 09471 INC GE    CALR              M=01
18E4 0801 09472           JIPU +1
18E5 BFFF 09473 DEC GE    CALR              M=FF        SET M TO -1
18E6 B9E0 09474           CALG              M=M+GE      ADD TO GE
18E7 B0E4 09475           CALG              GE=M
18E8 000F 09476           RETN

18E9 B01F 09479 INC H0    CALR              M=01        INCR H0              CS060
18EA 0801 09480           JIPU +1
18EB BFFF 09481 DEC H0    CALR              M=FF        DECR H0              CS060
18EC F900 09482           CALH              M=M+H0
18ED 8A30 09483           JEPU XFH0=M

18EF B01F 09486 INC H1    CALR              M=01        INCR H1
18F0 0801 09487           JIPU +1
18F1 BFFF 09488 DEC H1    CALR              M=FF        DECR H1              CS060
18F2 F910 09489           CALH              M=M+H1
18F3 A86E 09490           JEPU XFH1=M

18F4 B01F 09493 INC H6    CALR              M=01        INCR H6              CS060
18F5 0801 09494           JIPU +1
18F6 BFFF 09495 DEC H6    CALR              M=FF        DECR H6              CS060
18F7 F960 09496           CALH              M=M+H6
18F8 F064 09497           CALH              H6=M
18F9 000F 09498           RETN

18FA FA12 09501 AJH7CHCT  CALH              M=H1        COMP H7              CS080
18FB 9301 09502           BALG +1           M=0
18FC E8D2 09503           JEPR DEC H7
18FD A8D2 09504           JEPU DEC H7

18FF 3E80 09507           *CHECK WORD*
1900 B01F 09507 INC HF    CALR              M=01        INCR HF              CS060
1901 0801 09508           JIPU +1
1902 BFFF 09509 DEC HF    CALR              M=FF        DECR HF              CS060
1903 F9F0 09510           CALH              M=M+HF
1904 F0F4 09511           CALH              HF=M
1905 000F 09512           RETN
```

```
ADDR CODE NUMBR LABEL     CMND NEXTADDR OPERAND              COMMENT

1906 BB52 09515 SEG5      CALG          M=M●G5      SET G5               CS090
1907 0801 09516           JIPU +1
1908 BB52 09517 REG5      CALG          M=M'.G5     RESET G5             CS090
1909 B054 09518           CALG          G5=M
190A 000F 09519           RETN

190B BB62 09522 SEG6      CALG          M=M●G6      SET G6               CS090
190C 0801 09523           JIPU +1
190D BB62 09524 REG6      CALG          M=M'.G6     RESET G6             CS090
190E B064 09525           CALG          G6=M
190F 000F 09526           RETN

1910 BB82 09529 SEG8      CALG          M=M●G8      SET G8               CS090
1911 0801 09530           JIPU +1
1912 BB82 09531 REG8      CALG          M=M'.G8     RESET G8             CS090
1913 824E 09532           JEPU XFG8=M

1914 BB92 09535 SEG9      CALG          M=M●G9      SET G9               CS090
1915 0801 09536           JIPU +1
1916 8B92 09537 REG9      CALG          M=M'.G9     RESET G9             CS090
1917 B094 09538           CALG          G9=M
1918 000F 09539           RETN

1919 BBA2 09542 SEGA      CALG          M=M●GA
191A 0801 09543           JIPU +1
191B BBA2 09544 REGA      CALG          M=M'.GA
191C B0A4 09545           CALG          GA=M
191D 000F 09546           RETN

                *           SET/RESET GP REGISTER GB
191F BBB2 09550 SEGB      CALG          M=M●GB
1920 0801 09551           JIPU +1
1921 BBB2 09552 REGB      CALG          M=M'.GB
1922 B0B4 09553           CALG          GB=M
1923 000F 09554           RETN

1924 BBF2 09557 REGF      CALG          M=M'.GF     RESET GF             CS090
1925 0801 09558           JIPU +1
1926 BBF2 09559 SEGF      CALG          M=M●GF      SET GF               CS090
1927 B0F4 09560           CALG          GF=M
1928 000F 09561           RETN

1929 FB82 09564 REH8      CALH          M=M'.H8     RESET H8             CS090
192A 0801 09565           JIPU +1
192B FB82 09566 SEH8      CALH          M=M●H8      SET H8               CS090
192C F084 09567           CALH          H8=M
192D 000F 09568           RETN

192F BA12 09571 TENEG     CALG          M=G1
1930 1A72 09572           BPRT +2       DB7=0
1931 0002 09573           RNOP
1932 8E69 09574           JEPU MVCR01

1933 A867 09576           JEPU XFH01G01

                *TEST FOR POTENTIAL BREAKPOINT CHARACTER IN JUSTIFY. RETN WITH M NE 00
                *IF POTENTIAL BREAKPOINT.

1935 FA42 09582           CALH          M=H4        C<
1936 FB52 09583           CALH          M=M●H5
1937 9702 09584           BALG +2       (M=0)'      A>        BR IF ANY ACCUM WIDTH
1938 0002 09585           RNOP
1939 A7C8 09586           JEPU ANCHJC

193A B04F 09588           CALR          M=04        A<
193B 9262 09589           BALG +2       M.G6=0      B>        BR IF"1ST PRT CH"BIT=0
193C E8F4 09590           JEPR INC H6                         INCREMENT CNT OF VAR SP.
193D A887 09591           JEPU CLM

193E 000F 09593           RETN                      B<
                * EVALUATE FOR BREAKPOINT IN JUSTIFY MODE

193F 9A05 09597 EVBPJ     BDAT -A       M=20        C>        BR IF"SPACE"CODE
1940 98AA 09598           BDAT +A       M=0A        R>        BR IF"TAB"CODE
1941 99A4 09599           BDAT +4       M=1A        D>        BR IF"PREC HYPHEN"CODE
1942 9AD4 09600           BDAT +4       M=2D        E>        BR IF HYPHEN"CODE
1943 B00D 09601           CALR          M=M.60
1944 9309 09602           BALG +9       M=0         F>        BR IF CODE=20-7F OR A0-FF
1945 A887 09603           JEPU CLM

1946 E0AC 09605           JEPR XFG7RWJ              D<
1947 E1EE 09606           JEPR CAG7JCS              E<
1948 E79A 09607           JEPR REPCIFCS
1949 E5F9 09608           JEPR ADH54G10
194A A88B 09609           JEPU SEM=FF

194B 801F 09611           CALR          M=01        R<
194C BE62 09612           CALG          M=M.G6
194D 000F 09613           RETN                                RETN M=00 IF TB CTR SHUT
```

```
ADDR CODE NUMBR LABEL     CMND NEXTADDR OPERAND              COMMENT

194E BEFF 09615           CALR          M=EF      F<
194F BE72 09616           CALG          M=M.G7               MASK OFF BIT 7 OF G7
1950 9816 09617           BDAT +6       M=01      G>        BR IF "COL" OR "LS1"
1951 98F5 09618           BDAT +5       M=0F        H>      BR IF PBS.ESP.TRL.OR ESP
1952 BA72 09619           CALG          M=G7
1953 1A74 09620           BPRT +4       DB7=0     I>        BR CODE=00-1F. NOT IF80-9F
1954 1A32 09621           BPRT +2       DB3=0       J>      BR CODE=80-87 OR 90-97
1955 1E41 09622           BPRT +1       DB4=1         K>    BR CODE=98-9F. NOT IF80-8F
1956 1E24 09623           BPRT +4       DB2=1     M>        BR CODE=8C-8F. NOT IF88-8B
1957 A887 09624           JEPU CLM                G<H<J<K<O<P<

1958 1A32 09626           BPRT +2       DB3=0     I< N>     BR CODE=00-07 OR 10-17
1959 1E4D 09627           BPRT -2       DB4=1          O>   BR CODE=18-1F. NOT IF08-0F
195A 1E2C 09628           BPRT -3       DB2=1            P> BR CODE=0C-0F. NOT IF08-0B
195B A8B8 09629           JEPU SEM=FF             M< N<

195C 9262 09632 FESTDSPC BALG +2        M.G6=0    BRANCH NOT PROPORTIONAL SPACE
195D 803F 09633           CALR          M=03
195E 000F 09634           RETN

195F A1A1 09636           JEPU FEPITCH

1960 1C81 09639 CHKEORIB BPRT +1        EORIB=1   BRANCH END OF RIBBON LATCH SET
1961 000F 09640           RETN
1962 E989 09641           JEPR TESTOP
1963 0000 09642           NOOP
1964 C0AD 09643           JEPR MO
1965 E39A 09644           JEPR TEPRTSTK
1966 970D 09645           BALG -2       (M=0)'
1967 E999 09646           JEPR EORFLON
1968 E99B 09647           JEPR EORFLOFF
1969 18FD 09648           BPRT -2       PRBY=0
196A C0B3 09649           JEPR MOCD&PS
196B 1CFE 09650           BPRT -1       PRBY=1
196C 0602 09651           CKBD          KBST
196D 80CF 09652           CALR          M=0C
196E 0000 09653           NOOP
196F 0000 09654           NOOP
1970 9281 09655           BALG +1       M.G8=0
1971 A990 09656           JEPU EORIBCTD
1972 0C3F 09657           BKBD -0       STOP=1
1973 A100 09658           JEPU CLKS

          *ANALYZES KEYBOARD INPUT WHEN CARRIER IS IN "HELP" ZONE IN JUSTIFY.

1977 9A92 09663           BDAT +2       M=A9      A, B)  BR IF#JUSTIFY CODE.
1978 9A62 09664           BDAT +2       M=A6      C >  BR IF PREC BACKSPACE CODE.
1979 A152 09665           JEPU BZERROR

197A A5ED 09667           JEPU REJMDHLP           A>     RESET JUSTIFY MODE

197B A691 09669           JEPU BSHLP              C

197C C77F 09671 ANKBHLP  JEPR ENDLINPA
197D E0E8 09672           JEPR WTKBNRPT                  WAIT FOR KEYBORD INPUT
197E B80F 09673           CALR          M=80
197F D007 09674           BALH -8       M=M+HOC   B>   BR. IF BIT 7 OF KB CODE = A ONE
1980 9AD5 09675           BDAT +5       M=2D      D.   BR IF HYPHEN CODE
1981 9A05 09676           BDAT +5       M=20      E.   BR IF SPACE CODE
1982 9FF4 09677           BDAT +4       M=7F      F.   BR IF PREC SPACE CODE
1983 99E4 09678           BDAT +4       M=1E      G.   BR IF PARAGRAPH CODE
1984 99F3 09679           BDAT +3       M=1F      H.   BR IF AUTO CODE
1985 A152 09680           JEPU BZERROR

1986 A621 09682           JEPU ANHYHLP            D<

1987 A680 09684           JEPU SPHLP              E<F<

1988 A608 09686           JEPU ANAUTHLP           G<H<

          * EXIT POINT FOR END OF RIBBON ROUTINE

1989 0831 09692 TESTOP   BKBD +1        STOP=0
198A A2BB 09693           JEPU SESTOP
198B 000F 09694           RETN

1990 C0AD 09697 EORIBCTD JEPR MO
1991 084E 09698           BKBD -1       STROBE=0
1992 0602 09699           CKBD          KBST
1993 99F3 09700           BDAT +3       M=1F      AUTO KEY
1994 99E2 09701           BDAT +2       M=1E      PARA KEY
1995 E152 09702           JEPR BZERROR
1996 0809 09703           JIPU -6
1997 0C3F 09704           BKBD -0       STOP=1
1998 B0B3 09705           JEPU MOCD&PS

1999 B0FF 09708 EORFLON  CALR           M=0F
199A 0801 09709           JIPU +1
199B B00F 09710 EORFLOFF CALR           M=00
199C 0702 09711           CKBD          BUZZ=0
199D 0102 09712           CKBD          LDR1
199E B7DF 09713           CALR          M=7D
199F A18B 09714           JEPU DLY MS
```

```
ADDR CODE NUMBR LABEL    CMND NEXTADDR OPERAND              COMMENT

                         ORG   19FD
19FD 1000 09718          CADU           LPAGE
19FE F509 09719          *ADJUST WORD*
19FF F08A 09719          *CHECK WORD**

LABEL     ADDR  REFERENCES

ACTION    01DA  0237
ADCSH54   15F8  07AB 07D6 0E52 0FCC 168C 171A 171D 1794
ADDE+G10  05A3  0530
ADDEFG10  059F  0658 07B3 0D9F 0DB8
ADDESP    02F9  08AB
ADG10CA   0389  035C 065C 06BF 08AC 08B6
ADG10H10  13CA  0DA6 0EDD 144C 15FA
ADG2+G10  13E2
ADG7DE    0597  0924 093B
ADHYCS    171B  1762 1780
ADH54G10  15F9  159B 158D 1949
ADM+G10   13E3  02FD 038A 05A2 05A6 0DAD 0E18 0F7A 0F81 0F88 0F9D 0FA2 0FD7 13CE 1594
ADMTOTC   136A  12F6
AJ&CLRWB  0CBE  15C4
AJCAH3    0E3D  0E75 0EA6 0EB7 0EFA 0F2D 122D
AJCARCHC  0ECB  0E3C 0E9D 0EF9
AJCR+M    08A1  03E5 055E 0596 0E15 0E1B 168A
AJCR-M    08A5  0928 16A2
AJDEMO    0700  1689 16A1
AJDEUS    14FD  0DA9
AJDI      13A4  14A9
AJG01     0ED8  0F1A
AJH7CHCT  18FA  0C03 0D87 1578 168F 1695 169A
AJKS+1    115D  02DB 07F6 084A 0E41 0F29 11C5
AJLINEJ   153E  1604
AJRO-     0D06  0796 0817 081E 0833 0A04 0A05 0D0D 0D2C 0D34 0D36 0D9D 12C4 1403 156D 1781
                178E
AJRO-/HO  09D9  14E0 16EF
AJROBG7   0D31  0845 08EF 0E58 14FB 1541 15EA
AJROBM    0D32  090A 0D27 0D2A 0D6B
AJROGO-   0D2D  08ED 08E6 12F2
AJROLA    0D0A  0D0E 10AD
AJROLAIF  000B  1128 15CB
AJROLNST  0786  075A 087A
AJROST    0CF8  08B1 0B93 0C08 0D0A 0D25 0D72 0E3B 0EA5 0FDC 15CC
AJROTOTB  0D67  070B
AJRW&H7   0CDA  160B
AJRW-     08FA  08FC 0C5C 0C89 0C8B 0CC5 0CE5 0F91 0F99 12FD 1527 154B 160A 168A 16F6 1714
                178A
AJRWBM    0CDD  16A8 16AB 16FA
AJRWBPJ   1689  08CA 1432 174C 17C7
AJRWJ     16A9  0CE9 0CEA 0D7D 0DBC 14E1 14EE 1572 15EF 16D8 1724 172F
AJRWLA    0C59  0C60 0E8F 14F1
AJRWST    0C56  078C 0A46 0B2E 0B94 0C59 0C9E 0CC0 0D6F 0E21 0E98 0EF3 12F7 16A9 1741
AJRWTOBP  16A6  1542 154C 1636
AJV+1     0381  1050
ALRW&HC   0E1E  0EBA 0EC4
ANACCHJ   17C6  189C
ANACHDR   0FFA  1422
ANAUTHLP  160B  1988
ANAUTUS   0091  0097 0828 0947
ANBPHLP   158C  163D
ANBPJ     159D  1402
ANCENCOP  0F5E  0F0A
ANCHJ     152B  17C4
ANCHJC    17CB  1939
ANCHMZC   08DF  0A19
ANCHPA    05FC  06EF 076A
ANCHPSD   0820  05FC 084C 0969
ANCRMC    09DF  0A13
ANCRTZMC  082D  0952
ANECSTOP  0901  07F9 0968
ANEOP BP  1514  15A5 1582
ANFCT--1  05A9  0547
ANFCTKB   0535  0443
ANFMT     111E  098E
ANFMTHDR  11A6  0FF3 11C6
ANFMTJ    15C4  1506
ANG7CCPJ  09AD  0999
ANG7MCLM  08C6  097E
ANG7MCTZ  094B  0A08
ANG7MZ    0A08  07EF
ANG7PAEC  08CF  09CE
ANG7PFPJ  1051  0997
ANG7US    00B2  07C8 0821 15D0
ANHY      09D3  07F7 1528
ANHYHLP   1621  1986
ANHYTZMC  07F7  094A
ANKB      04E6  0079
ANKB---1  0230  04F7
ANKBAC    087C  0804
ANKBB7    042F  04E2
ANKBCDEF  0181  043C
ANKBCENT  00EE  0238
ANKBDIG   0343  02AE 0282 1831 183C
ANKBFMT   1008  0FC1
ANKBHLP   197C  1644
ANKBJ     1892  006B
ANKB2DIG  02AE  0303 0310 036F
ANMCZONE  097B  094B
ANMDPSD   0964  0808
ANMODIDL  0069  0094 0E76
ANNPCEC   09C0  0836 0905
```

```
LABEL     ADDR   REFERENCES
ANNPCJ    0995   150B
ANNPCPSD  098A   0B2C
ANPFTCKB  025B   0532
ANPRCHKB  014E   023B
ANPUNCTZ  083A   095B
ANRCER    0B11   0ABD
ANRDER    0C12   0B59 0C0E
ANRWBCEN  0C9E   0A3F
ANRWC     0CA7   0CBD
ANSPX/US  05AF   01B5
ANTBSTOP  0557   0A2F
BILL      118F   05DE 104D
BILLC     1193   07C9
BS        03D6   017A 0FF9 1054 11C8
BSHLP     1691   197B
BSKB      017A   C4FB
BZ        1158   007C 01E5 0F35 0F3D 0F54 11BE
BZERI3    0445   009E 010E 0184 01D9 023C 027E 0333 036E 039C 0438 0451 05B7 0718 0A93 0B49
                 0BBB 0EFB 0F2E 0FB8 0FE9 138D 143A 1464 1769 17EA 1812 1896 18A7
BZERROR   1152   02AD 02B4 037F 0445 0859 0FE3 1014 1024 11AB 11B6 1628 1690 1693 1830 183B
                 1979 1985 1995
BZI3      007C   000B 09A2 0BFB
BZJLMTER  1830   184A 1854
BZLK      1177   0B1C 0C1E
BZLKM=G9  1173   0C29
BZLUJ     1800   16B7
BZSK      01E5   0857
C CHAR    0F2A   05AD 0FE2
C LINCHC  0EEE   0F65
CACENC    0F66   0F7C
CACENC1   0F75   0F66 0F6D
CACENTER  0F6E   0E62 0FDB
CACOLCEN  0F6A   07E3
CAEOCENT  0FC3   0F62
CAEXITJ   157A   1504 1783
CAG7JCS   11EE   15BB 168B 16A3 1947
CAG7LS    03A2   0366 0383 0F17 0F41 0F44
CAG7VSP   0ED0   0E4D
CAHZCORC  0F11   0F1B 0F63
CAHZCOR1  0F0F   0F23
CAINDENT  0A1A   01FC 05EF 0655 06B3 0780 0873
CALINEJ   165C   1500 159F 15FC 1613 1619 1621 162C
CALPST    07BC   086B
CAMAXBPJ  177F   158C
CAMAXCT   1785   1795
CAMCSCEN  0E2A   07A7 07D5 0E51 0EDF 0FCB
CAMJCS    11EF   0CD6 0E2B 0EE4 0F87 0FD6 1546 157E 1600 170F 1719 171C 178E
CAMLS     03A3   0ED3
CAMVCEN   0E53   0E05
CAMVRWHZ  0E8C   0F3E 0F43 0F5D
CANEARCO  0696   058C 1308
CARWHZ    0F00   0E8C
CARWHZLM  0F0C
CARWHZM   0F0E   078F
CASPHLP   15FD   158B
CASPJ     15FC   1502 154E 1620 16D9
CA2G2+M   13A9   14AB
CENTJ     150E   17C5
CHKEORIB  1960   05DB 0784
CL&INCPS  02D0   02C5 02CB
CLALLTB   041A   0253 1026 1411
CLDE      05C2   0393 089F 0921 0E04 0E93 1315 14FD 171E
CLDEMVO   048C   002B 0E70 0FBF
CLHELP    182A   17C3
CLHE9     182C   0392 0829 0DAF 0DBF 0E96 0EEF
CLH4-H7   110E   07A0 07D1 0E03 0E63 0EBE 0FC3 1430 14E3 14F2 157B 16DB 16E4 1745 174F
CLH7&PC   179F   14E4 16F4 177F
[illegible]
CLKBKS    110A
CLKBKSRG  1109   0011 0064 007D 0964 0B98 0BAC
CLKS      1100   1109 1973
CLM       1887   00E5 011F 0264 02A0 02BA 02E2 02EC 034D 03A8 04BD 04CE 050D 053A 05AB 0602
                 0616 0621 070C 0B97 09E4 09FC 0B39 0B8D 0C58 0CFA 0D30 0D42 0DD7 0E8B 0E92
                 0EAE 10B9 111D 11FC 1211 1218 1233 1253 12D7 12DF 12EE 1333 1338 1344 135C
                 137B 13B0 13B6 15C1 1700 1829 1849 18B5 193D 1945 1957
CLRO      0CF4   0003 0390 0A9C 0B74 0C1B 0C26 0D6E 108E 1098 12EC 138C 1400 146B 148F 1486
                 14E8
CLRW      0C51   0002 06DD 072D 0759 0860 0B11 08BC 0D73 0E6F 0EA4 0E88 0ED6 0EF6 108F 121B
                 1300 1476 17ED
CLRW+M    0C61   0B2C
CLRW+1    0C2F   0C5D
CLRW=RO   0D83   0D7F 15F1
CLRWCONT  0C54   0C6C
CLRWEOD   0C5D   04AB 0CBF 0CEB 0D82 0EC3 0F34 0F3A
CLRWH23   1300   0391 0A3D 0B2B 0BCD
CLRWSP    0CE6   0D80
CLTB@HC   0405   0401
CLTBCR    1315   04B4 05D9 07CB
CLTBSTBC  0400   0252 101A
CLTC      130C   0712 075B 0790 0EB6 0EF2 12F4 1311
COG1OH10  1884   07C2 08B1 13A5 14A7 14AD
CONVERT   0184   0A6B 0A76 0A7E 0A85 0A8E
CPFL      05C6   04FE 1066
CPG7      0662   0313 0378 093F 142A 143C 1475 1483
CPNRC     0660   09BE
CPPHYPSP  05F6   0920
CPPRECPF  066F   04B3 05D5 05E6 05ED
CPTP      125D   0EFE 0FA8 141E
CR        05D7   05E9 05F0
CRAC      05DE   1053
```

```
LABEL     ADDR   REFERENCES

CRKB      05D4   04E4
CRPACR    07E5   06E3 0713 075C 1520 1734 1740
CRPAIX    07C6   06EA 0765 172D 173F
CTROTBS   0790   06E2 0861
CTROTBSC  0791   0795
CTRWHF    12F7   17F0
CTRWH7    0CE0   082D 0D7E 15F0
CVCENTRW  0CC0   0C8C
CVFFOO    11E8   0280 0286 039F 049A 0575 091C 087C 0CD1 0D38 0D49 0D55 0DEB 0FC6 12B3 133E
                 1833 183E 1862
CVG3CP    0683
CVG3PCC   016C   015E
CVG3TOPC  015A   01AE 0574 0609 0617 123F 1249 1254 12D1
CVG7CP    0681   0669 0EE9
CVG7CPCH  0EE7   0EE3 0F52
CVG7KBMC  0204   006F
CVHXASC   13F6   062C 0631 063C 0641
CVKBEXCH  0143   014F 019A 01BA
CVKBINP   0A59   01D8 02DC 02E0 08A4 10E3
CVLMKBMC  0171   020E
CVMBCDBI  13E8   0745
CVMCP     0682   0FD5
CVMZKBMC  0192   0212
CVRWCH    0BFC   0CC7 0CCE 0F96 1035 103B
CVTZKBMC  0149   0173 0211
CVOOFF    11EC   034C 09FD 0DF2 0EBA 133A
DEC GD    18CE   08FB 08FD 0C7F
DEC GE    18E5   0CFB 0D07 0D23
DEC GO    18C3   0884 0ABA 0C12 0C14
DEC G1    18C9   13EA
DEC G3    18BC   0887
DEC HF    1902   15C5
DEC HO    18EB   16D1
DEC H1    18F1   0978 0A2C
DEC H6    18F6   07AB 0CD9 1544 1579 16A5
DEC H7    18D2   155C 18FC 18FD
DEC MBCD  1321   073E 1647 1650 166A 1675
DEC TC    135E   0F5C
DIGO/M    139F
DIG1/M    149B   035E 086E 0F1D 15A2 15FE
DIG10/M   149A   139F
DIM/10    139D   0629 062A 062F 0639 063A 063F
DLY MS    1188   0C04 0C3D 1087 199F
DLY MSKB  1187   01ED 0AAD 10FC 1154 1157 115A
DUMP      0ACA   0A57 0AF5 0FBE
DUMP&FCH  0AF5   0948 0F81 107A 1126 1128 15C7 15CE
DUMPIFDA  0A54   1124 1129
EJAC      1486   0C4F 1092 143B 1477 156F 16D2
EJACEOC   1569   0C50 1665
EJKB      1434   043A
EJKEY     00AF   1180
EJPLAY    1470   098A 1481
EJRO      1480   0004 01CC 0229 022B 099F 17D5
EJRW      1485   0005 01C4 0299 029B 09A1 1437 1564 1567
EJRWEOC   1560   167F
EJRWI3    1567   081D
END PA    075B   06E1
ENDACT    01E0   1568 1570
ENDJHLP   16E3
ENDJPR    1744   172E
ENDLINPA  077F   06DF 0714 0757 151D 1631 1720 197C
ENDRCRV   0AA3   08E8 0C2C 0C2E 146A 146F
ENDRD     0C00   0AF3 0B70
EORFLOFF  199B   1968
EORFLON   1999   1967
EORIBCTD  1990   1971
ESC&PRM   04DC   0243 0627 062D 0632 0668 074E 0751 1267 1269 126B 127B 127D 128A
ESC&PRM/  0668   0241 05CC 0637 063D 0642 067E 1263 1286 1288
EVBPJ     193F   17CB
EVKBCENT  0E42   0DFC
EVPTB     049B   04AE
EVRWBJ    1711   16FB
EVSTOP    128A   06CE 0785 080A 08E2 1090 16F1 174A
EXCCFMT   0FDE   11AE
EXFMT     0FA6   1006
EXFMTHDR  1072   1007 1187
EXFMTTB   107E   1000
EXJUST    15D0   1523 15C2 1604 1727 1728 173D
EXJUSTRT  15DB   15D9
EXLCFMT   0ED5   0F26 1018 11AD
EXODUS    0000
FAKEAS    034E   0356
FE&SG2IF  0E78   0CA8 0CB8
FEACBNO   1497   073D 087B 0FEC 1494 1776
FEA2RAM   12AE   02D3 03C9 03CA 10A0 10A6 10CE 10D1 10F1 1194 139B 139C
FECA+1    11E4   026C 026E
FECH      0D39   06E6 080F 081F 08C4 09D3 0D26 1094 16EC 17C9
FECHPSD   080F   0805 084C
FECHRO+   0D44   050C 050E 07B8 07A2 07D7 0862 0CFE 0D29 0D39 0D3C 0D6C 0D6D 0D88 0E39 0E53
                 0E5C 1224 1227 12C5 14DD 15AD 15E4
FECHRO+&  0D50   083E 08EA 0913
FECHRO-   0D5F   0508 0786 0787 07A1 07AA 07D2 0879 0911 0CFD 0D69 0D89 0E59 1088 108C
FECHRW+   0CBC   04A7 0505 0AD5 0C7C 0C86 0CB0 0CC1 0CE3 0E22 0E78 0E9B 0EF6 0F11 0F39 0F61
                 0F8E 0FBF 0F97 0FC4 12F8 1525 1548 1607 1617 1638 1680 169E 1711 175E 1788
FECHRW-   0C6D   04A4 0504 0763 0C87 0C8E 0CD2 0D85 0E29 0F00 0F30 0F36 0F89 0FCE 157A 1618
                 1637 168E 1694 169B 1737 1738 175D
FECVKB    02DF   02E3 033D 10ED
FEDA      084F   0AFE 0D3B 1136 1138
FEDATRO+  0D37   0D98 104A 140A 140F
```

| LABEL | ADDR | REFERENCES |
|---|---|---|
| FEDE | 056E | 040D 0581 0592 05A5 0703 0DD2 1582 |
| FEFLCTR | 12A9 | 064B 0650 06A7 1069 |
| FEFLPRE | 12A7 | 064B 06A4 1068 |
| FEFR | 119E | 0389 040B 0698 |
| FEG3HF | 1254 | 0589 |
| FEG3PCWT | 1236 | 057F 11F3 1209 |
| FEG3WT | 1200 | 0933 |
| FEG7 | 1353 | 134E 15BE 15C3 |
| FEG7ACWT | 12CD | 0768 080C 0922 083C 0F32 |
| FEG7CSCC | 0EDE | 0F19 0F55 |
| FEG7PCWT | 1234 | |
| FEHPD | 120A | 124A 1259 |
| FEHPDVS | 1212 | 1241 1256 |
| FEKBFMT | 0F24 | 0FC0 0FF2 |
| FELCCTR | 12AD | 0645 06A1 06C1 |
| FELCPRE | 12AB | 0643 06C3 |
| FELM | 129F | 0033 05EB 0899 0A1A 0A27 0DEF 0E1E 0E3D 0F06 0F0C 0F71 0F7D 0FB5 102C 126D 1306 1407 |
| FELOL1MJ | 1750 | 15A3 1629 1786 |
| FELXLSTD | 00ED | 0140 0A61 |
| FEMACWT | 12CE | 0808 0F37 108D 1206 1238 1683 1697 169C |
| FEMPCWT | 1235 | 0598 0706 0F9F 1202 |
| FEMWIDTH | 1206 | 052D |
| FEMWT | 1201 | 0E2C |
| FEPITCH | 11A1 | 0412 0594 05A7 0696 089C 0F79 0F80 0F9C 10DA 123E 12DA 1595 195F |
| FERM | 12A1 | 0038 102E 10A4 1139 1270 16C0 |
| FERM/TRM | 10A2 | 128F |
| FERMJ | 16C0 | 0F73 165E |
| FERO | 0CED | 0CFC 0DEA |
| FERO+ | 0CEC | 0791 0816 0A99 0D08 0D2B 0D37 0D45 0D4D 0D52 0D5A 0D5D 0D65 1048 12E2 1412 1418 1423 14E5 |
| FERO- | 0CFB | 0D5F 0D62 |
| FERW | 0BE0 | 0BFE 0A54 0AA0 0C24 0C6D 0DE8 0F2B 0F5E 0FB9 1133 1773 |
| FERW+ | 0BDF | 0ADA 0C5A 0C64 0C76 0C8D 0C91 0C95 0CC8 0CE6 0D74 0F05 0F08 16B9 |
| FERW- | 0BFD | 0C6F 0C73 |
| FESPCS | 03F0 | 02FC 03E4 05A1 |
| FESTBCA+ | 0479 | 0786 0F6A |
| FESTBHC+ | 047A | 085E 1037 127F |
| FESTDLAN | 0140 | 0051 0374 0AB6 |
| FESTDSP | 1203 | 03FB 055C 1574 16DC |
| FESTDSPC | 195C | 1205 |
| FESTLM | 06D4 | 0035 0043 0065 |
| FESTRM | 06D1 | 003A 0045 0067 |
| FETBCA+ | 0429 | 0480 |
| FETBHC+ | 042A | 0A29 0E27 0F20 1031 1278 1282 |
| FETBMASK | 0521 | 0402 0405 0480 0485 |
| FETNRO | 12A5 | 0121 1498 1505 1646 1669 166C |
| FETNRW | 12A3 | 0131 0736 0A32 0ABF 0EAA 1219 1499 14C8 150D 164F 1674 1677 |
| FEUSESC | 0DCA | 0E0F 0E14 0E17 |
| FEWTC | 123A | |
| FEXFTERW | 0C7C | 1725 1730 1742 |
| FEXTBCA+ | 0421 | 0514 107F |
| FEXTBHC | 04D0 | 0424 1294 1299 |
| FEXTBHC+ | 0422 | 0041 042A 047A 1273 128C |
| FE2PCH | 10DA | 035D 0388 03DC 0657 06BD 0789 086D 0E64 0F0F 0F1C 0FD9 11FB 1661 1756 |
| FIN PA | 070E | 0085 |
| FINDDATA | 0C36 | 0AE1 0B5C |
| FLS/LCS | 0310 | 0254 |
| FMTHDR | 0FF0 | 1005 |
| FMTMODE | 0FB5 | 04FC |
| HAYOK | 0757 | 0871 |
| HAYWIRE | 087A | 0868 |
| HDL AC | 164E | 0871 1492 14EB 14EC |
| HDLR | 14C2 | 1778 |
| HDLRAC | 14E5 | 147D 14CC |
| HDLRKB | 148F | 14E7 |
| HDLRW | 164F | 0A9B 0BC5 14C6 |
| HDR AC | 150C | 0C0C 0C19 0D43 1496 |
| HDRRO | 1505 | |
| HDRRW | 150D | 0AC7 0BCC 0C2D 14CB |
| HLP | 162C | 1555 |
| IDL | 007F | 007B 009B 01EA |
| INC GD | 18CC | 0BDF 0C31 |
| INC GE | 18E3 | 0CEC 0D01 |
| INC G0 | 18C0 | 0D51 0D59 0D76 0D7A 0D99 0D9A 12E1 |
| INC G1 | 18C6 | 1223 13E1 1881 |
| INC G3 | 18BA | |
| INC HF | 1900 | 18DE 18E1 |
| INC H0 | 18E9 | 068B 10D6 10F6 |
| INC H1 | 18EF | 0D22 |
| INC H6 | 18F4 | 07A5 1537 153B 168D 1784 193C |
| INC H7 | 18D5 | 16AE 16B1 18DB 18DC |
| INC MBCD | 1318 | 1506 150E |
| INC PSPT | 02D3 | 03D4 |
| INC TC | 1363 | 049D |
| INC TCC | 1369 | 0794 |
| INCHC158 | 18B2 | 0422 |
| INDATRW+ | 09FD | 0962 102D 102F 1683 |
| INITSYS | 0001 | 0088 |
| INRO+ | 0D00 | 0AE3 0B67 0D75 156C |
| INRW+ | 0C30 | 095E 09FE 0816 0BFD 0CA2 0D5E 0D95 1028 1032 1038 1049 14DC 16AD |
| INT PRT | 0390 | 00E6 0388 |
| INTB+RW | 16CD | 168F |
| INTB-RW | 16F7 | 16BD |
| INTBRWB | 16CF | 16CC 16F5 |
| IX | 0383 | 04F9 05D8 07CE 0F49 1057 |
| JUMPIX | 1250 | 1243 |
| LCFMT | 0E6C | 0E37 |
| LCOR | 0E90 | 0548 |

| LABEL | ADDR | REFERENCES |
|---|---|---|
| LCRC | 0EAF | 0EA1 |
| LCRVC | 0EA4 | 0EAD |
| LDASPSD | 07EA | 0967 |
| LDCRKS | 0A06 | 08E1 |
| LDG4 | 0DE3 | 0D81 |
| LCHYRW | 161C | 161B 1628 |
| LDMHWGAU | 0C94 | 165A 155E 161D 16D0 1761 |
| LDPRTPA | 028C | 0083 |
| LDTBRW | 0560 | 008D 0153 |
| LDTBRWC | 0563 | 1231 |
| LKHLPERR | 1641 | 158A 160E 162E |
| LKJERR | 1687 | 14FC 1642 |
| LKM=G9 | 1174 | 06CD |
| LKRVER | 08E4 | 081A |
| LKRVLIM | 089A | 08AA 08F3 |
| LKTC | 10FD | 02A4 05EE 07CA 082E 09DF 121E 1533 1880 |
| LOCK ERR | 114B | 118A 142E |
| LPEJKEY | 01C7 | 018E |
| LPMOROCA | 0218 | 022C |
| LPMORWCA | 0288 | 029C |
| LPSWROEN | 0D12 | 0024 |
| MIN | 11E2 | 0208 1108 111C |
| MO | 00AD | 0006 008A 00EB 03CD 03D5 0454 06F0 0768 0781 0807 08B4 0CA7 0DFD 0FEB 1083 114E 17C8 1808 1964 1990 |
| MO&BNO | 00EB | 033B 10C8 10EA |
| MOAC | 0100 | 0B77 0C37 |
| MOBELL | 10FA | 0151 |
| MOBZ | 00F3 | 00E1 |
| MOCD&PS | 00B3 | 0AE5 0865 0C46 118C 196A 1998 |
| MOEJKEY | 018D | 0080 |
| MOKB | 10C3 | 0103 0B53 0DFE |
| MOKB&CRD | 0103 | 08F9 0A42 1188 1508 1510 164A 1653 |
| MOKB&MED | 0DFD | 0101 0381 10DC |
| MOLINCTR | 06C1 | 008C 0809 16F0 174E |
| MOLSSW | 00BF | 0086 |
| MOLT | 00CF | 00AE |
| MOPCHPRT | 0023 | 0022 0F24 |
| MOROCARD | 0084 | 0854 0885 0D88 |
| MOROCDS | 0213 | 00B4 |
| MOROHD | 0081 | 0104 |
| MOROHDS | 0120 | 0081 |
| MORWCARD | 0284 | 0085 |
| MORWHD | 0130 | 0082 |
| MORWRUN | 0102 | 0A49 0AAA |
| MV+V | 0384 | 0ECE 106F |
| MV-V | 0367 | 0ECF 0F42 |
| MVCALATB | 0EC3 | 1232 |
| MVCARDE | 058E | 0084 0156 01F2 03D8 04AF 087F 0DF8 0F2A 0F82 107E 1305 17C8 |
| MVCR | 0350 | 08BA |
| MVCR+ | 08A8 | 0531 |
| MVCR+1 | 05CD | 0E40 1015 |
| MVCR+2M | 055D | 0934 |
| MVCR- | 08A7 | 03DF 0F57 0FA3 |
| MVCR-INC | 08A4 | 0278 |
| MVCR-1 | 0500 | 0281 0E48 1016 |
| MVCRCEN | 0E00 | 1065 |
| MVCRCENC | 0E63 | 07E4 |
| MVCRCOL | 058C | 0250 0265 0DEE |
| MVCRCOLU | 07D1 | 079D |
| MVCRG10 | 08AD | 07C4 0DAE 0E68 0E8D 1593 1597 |
| MVCRG7CS | 052C | 0937 |
| MVCRHE9 | 17DC | 17C2 |
| MVCRLM | 0899 | 000F 04AA 0ED5 0EFC 0FA6 109E |
| MVCRM | 089A | 01FD 048D 04B6 058D 05CF 05D3 05D7 0E3F 0E6A 0EC6 10A1 17E7 |
| MVCRM+FR | 089B | 17E1 |
| MVCRMCS | 052D | 04DD 091E |
| MVCRSCRA | 17E2 | 1634 |
| MVCR01 | 0E69 | 03DA 1932 |
| MVFRHLP | 17C0 | 15EE 161F 1641 |
| MVINDLM | 01FC | 0755 07E8 |
| MVLM&PF | 104D | 023F 0268 0FAE 0FF0 0FF8 1045 1077 11C7 125F 1265 1276 1293 |
| MVLM/TLM | 109C | 104F 140E |
| MVRFLUSH | 0798 | 0820 |
| MVRWHZ | 0E8D | 0762 |
| MVTAB | 04B1 | 1081 1082 |
| MVTOTKO1 | 0FE6 | 176E |
| MVV | 0387 | 036C 0386 |
| NEG G10 | 187D | 0358 065A 07B5 07E2 08A7 08AB 0885 08B9 0DA5 0E61 159A 165D |
| NRF AC | 1459 | 0AE0 |
| NRFRO | 145D | 14B2 |
| NRFRW | 1458 | 148F |
| NRR AC | 1451 | 0858 0C0D 0C1A 0C4D |
| NRRRO | 1453 | 021E |
| NRRRW | 1455 | 028E 0AA9 0E2E |
| NWFRW | 1457 | 0A47 |
| PACEKB | 10DC | 05AC 0E42 0F27 1479 |
| PACEKBID | 0151 | 017B 018C |
| PAFWD | 06DD | 0766 0858 087B |
| PAFWDC | 06E6 | 0188 06F2 |
| PARVSC | 0763 | 076C 076E |
| PR LNG | 023D | 0267 |
| PR&MVG7 | 0918 | 0150 019C 01EE 0FFC 1606 |
| PR/ | 066C | 05F8 093A 1598 |
| PRBING4 | 0624 | 05F3 074F |
| PRCH | 0915 | 082A 15D3 |
| PREOCJ | 142F | 1565 |
| PREOP | 16D4 | 1528 |
| PRFMTAL | 108A | 109A |

```
LABEL     ADDR  REFERENCES

PRFMTC    128C  129E
PRG01     0491  0DC9
PRG7      048E  076D 091F
PRG7PACE  01EC  11C2
PRHLP     1607  1635
PRJ       171E  155B 155F
PRJ&AJHF  15CF  16EB
PRJFWD    1724  1735
PRJTB     1402  153E
PRLJ      151D  14E2 1577 16E3
PRLJSTRW  1571  17D2
PRM       048F  04DF 066D 0939
PRMBIN    0623  0247 126E 1271 1298
PRMBIN/   0633  129D
PRNEXTUS  0E0D  0E16
PRSTDLJ   1572  1433 15EB 15F6 17D4 1807 18AE
PRT FMT   1265  023E 0248
PRUS      0DC0  0E0B 0E0D 0E1C
PR2DIG    05F1  0314 0379
PSD       0800  01DF
RC&TPRWB  0A3E  08CE 0ACC 0BC9
RCAGAIN   0A42  0ABC
RCCH      0940  06F1 09A0 148E
RCCHCP    093F  055F 0569 1004
RCCHINTB  055F  084D 096C
RCCHKB    093D  007A 0152 019D 0DF7 1436 1465
RCCHRV    0BEC  0943 0BAD
RCRDRV    0BC9  0FB3 107C
RCRWB     0A3F  0810 0B17 0C2B
RDAUTLOG  108E  0FEF
RDCH.     0B86  0AE6 0AE8 0AEB 0AED 0AEE 0B60 0B63 0B66 0B69 0B6B
RDCHRW    0B55  0AAF 0AB1 0AB3 0AB5
RDFWD     0ADF  0C17
RDFWDM    0ADE  0B73 0BCF
RDFWD3    0ADD  0858
RDLC      0E2E  0EAC 121D
RDLCRC    1219  0EB1 0ECA
RDREVM    0B71  0E31
RDRV      0BCD  0118 0BC2
RDRVIF    0113  009F
RDRVS     085A  0C1B
RDSTART   0B74  0ADF 085A
RDSYNCER  0B8B  0AF1 0B6E
RDWR      0AA9  0A53
REBZ      0105  0083
REC C     0A52  080F
RECEN     1288  0E94
RECENIF   1284  093E
RECHRWB   0C7F  15DD 163B 1715
RECOL     05DC  07CD 0E9E 0F4D 104E
REDUMP    0AC8  0AA7 088D 1403
REGA      191B  001A 02EB 02FB 0519 05C0 05C3 06E5 07E7 151F 1633 1722 17F4
REGB      1921  00C9 037B 09A6 09A8 09AC
REGF      1924  0016 0399 0591 05C5 0AC9 0EA3 0FF5 1132 1828
REG5      1908  0018 009A 01C6 01CE 0217 0225 0287 0295 039B 05DD 0731 074C 0754 084B 0FAC
                1040 1075 125C 17C1 1859
REG6      190D  001F 0029 00AC 0562 090C 10FE 12B9 1317 1352 1387 153A 16EB 1703 179D 17A1
REG8      1912  0021 02A3 032B 0395 05BE 0AA6 0BB2 14B8 14BD 17EF
REG9      1916  0014 00F7 0117 0397 0AA4 14B8 167C 180A 18AD
REH8      1929  00FC 1144
REJ       18AC  15F4 15F7 1809
REJMDHLP  15ED  197A
REKBIDL   007D  0101 0159 01B6 01B9 01EB 0269 027B 0282 031D 0325 037E 0446 044E 054F 075D
                0A9D 0AA8 0AF4 0BC3 0BC6 0ED7 0FB2 0FB4 107B 107D 1093 1186 143B 143D 1566
                16D3 16F3 174D 177E 17D3 17D6 1817 1819 1881
REPCIFCS  179A  15BC 1948
REPPSTOP  090B  08D9
REPRINT   000C  000A 0032 0048
RERF      0518  04AB 0E02 0E95 12C7
RERO=RW   0D7D  1431 1746 1806
RERV      0C1F  0BB7
RESC      0B4A  0983
RESTORE   0008  00BE
RESTPIDL  007E  017B 0181 05AE 0BAB 0E45 0E4A 147E
RETC      130F  02AC 04A9 05E7 07FA 0839 0A15 122B 17A7 17F5
RETNAEID  0444  023A
RETN1     1171  0342 083C 0914 095B 0986 0C4E 1063
RETN2     1170  0341 08F2 095C 09BF 0B51 1478 151C 156E
RETN3     116F  08CA 1517 178A
RETN4     116E  0984 178F
RIX       0366  04F8 0F48 1058
RML1      17FC  130F
RML2      17FB  04DB
RML3      17FA
RML4      17F9  0364 04D9 06B9 0A63 11A0 1210 13F0 17DE 185F
RML5      17F8
RML6      17F7  03EC 04D4 0584
RML7      17F6  0DAC 0DDE 0DE2 0F75 1257 13BD 13C4 13C8 1580
RPKB      1461  0439
RPPLAY    147F  0989
RSTB&MG   10EE  109D
SC        083F  0988
SCH TK    1763  0534 18A9
SCHRVOH   1400  1775
SE&TEG01  1657  0F56 1599 15F8 179B 179E
SEACMED   00A1  0087 0E32
SEACTION  032A  01DA 008F
SEA2RAM   11E0  10D5 10F5 11C8 11CE 11D1 11D4 11D7 11DA 11DD
SECA      0BD0  0C09
SECOL     06F7  1064
```

```
LABEL     ADDR  REFERENCES

SECOLKB   027C  04FD
SEDE      0599  00DF 1581
SEDE&AJ   0DD0  0FA1 14FE
SEDUMPRV  12C7  093D 096F 0F2F 0F9B 1127 1137
SEECSTOP  090D  08DD 09D1
SEFLCTR   11D8  0319 06A9
SEFLPRE   11D5  031C
SEGA      1919  03E6 0517 05BC 06FD 0720 075F 07D0 176D
SEGB      191F  0052 00CE 037D 09A4 09AA
SEGF      1926  059E 0BD9 12BC 12CB
SEGP      0049  0001
SEG01PR   0573  0490 0DC2
SEG5      1906  022A 0283 029A 06FB 0748 081A 0BF1 14B4 14C1 1630 1856
SEG6      1908  0028 0520 08D6 0909 09CB 0DFB 0E01 1313 134D 138A 138B 17A6
SEG8      1910  0327 0329 0337 0339 0589 0722 0BA1 0BB3 0BBF 0BEA 1899
SEG9      1914  0A36 0A96 0AC3 081B 0BE5 1405 14D1 167E 17F2 1804
SEH3&FMT  1029  0EFD 0FA7
SEH3=CA   1301  0A3C 0B2F 1029
SEH8      192B  01E2 026B 114A
SEJ       17EB  0549 1818
SEJ&JLMT  1810  0256
SEJLMT    1831  1813 1857 185A
SEJLMTJ   1813  18AB
SEKSJ     14EE  189B
SELCCTR   11DE  031F 06A3 06CC 1071
SELCPRE   11DB  0324
SELM      11C9  0044 0066 026F 140B
SELMCA    026E  1027
SELNG     036D  0257 0380
SELOLIMJ  1850  1838
SELSEQSW  00CB  044C
SEM=FF    188B  011E 02A5 02F5 02F8 030E 0420 048B 05C1 0601 0615 0622 083A 083E 0EA7 0EB9
                0EC7 0ED4 0FA5 10C1 11FD 122E 12ED 12F3 135D 138A 1828 194A 195B
SEMC      02A1  030F 054A 088B 088E
SEMR      0303  0255
SEPA      0715  0187 189D
SEPACEKB  01D0  017C 01F0 01F4
SEPC      0249  054E 087E 1017 11AC
SEPCSTOP  09C7  09D2
SEPFMT    1407  0FDB 108B 15C8
SEPFMTTP  103D  1421 1426
SEPSD     02E5  0539
SERC      0A90  054B 18AA
SERCOFF   08CB  0AA2
SERCON    0A32  0A94
SERF      0516
SERM      11CC  0046 006B 026D 1410
SERMCA    026C  1028
SERORWRV  0890  0C2A
[illegible]
SERV      0BB5  054C
SERWRC    0B27  0ABE 0ACD
SERWRV    087F  0BC4
SESKDLY   01E6  085A
SESTB?CA  047F  0266 1025
SESTB@HC  0480  141C
SESTOP    128B  0096 06D0 0910 0975 09B8 0850 0D41 1151 1472 15DC 15F5 1798 198A
SESTOPIF  1796  151B
SETB&CA   0483  0251 1019
SETB6HC   0485  1416
SETC=G1   12F4  1230
SETNRO    11D2  012B 012F 0FE4 146E 1486 1507 1649
SETNRW    11CF  013B 013F 0FEA 1469 1489 150F 1652
SETRADDR  03EB  0407 0487 04D0
SHG2R     13BB  13A2 144E
SHH1OL    13CF  13A4 144D
SHH1OR    13C0  07DD 0E5F 0FD0 13A7 14AC
SKSPTBAJ  12C0  0811 0840 0E54 15E5 17CA
SKSPTBIF  12EF  12C3 17AF
SKSPTBRO  12E0  0832 0A01 12EF 17BD
SML1      17DA  03FC 0E2D 10DB 11F4
SML2      17D9  00D0
SML3      17D8
SML4      17D7  0362 184E
SP        0929  01BB 091A
SPC       03E0  093C
SPHLP     1680  1987
SPKB      01BA  04E5
SPSTD     055C  0244 126C 126F 1284 1296 129B
ST&PTFMT  0EFC  1001
STMH9     181D  184F
SUCSIFHY  170B  1514 15A9
SUDEG10   05A7  0659 07B4
SUG10H54  1599  0CD7 1547 1587 16A4 1710
SUHYCS    170E  1612 163C
SUH10G10  13D8  14AA 1664
SUMG10    13E6  05A8 CDAA 0E08 0E10 0FA0 13DC 1596
SVTB&MG   10CF  108A
SW        12E6  054D 1428
SWPLAY    1427  09B8
SWROEND   0D0E  086F
TB        04AB  04E3 1056
TBCRASH   0550  04B1 0EC5 0F21
TEACMED   1385  01DE 072E 189A
TEACMODE  137F  01C2 01CA 0279 03E0 0662 0683 073A 0AFA 0BF6 10C4 1191 1365
TEACOK    010D  0093
TECOL     0504  079B
TECR=M    0656  0273 03D7 0F86 113E 1408
TECS      1500  1785
TEDUMP    0830  0944 0BF1
```

| LABEL | ADDR | REFERENCES |
|---|---|---|
| TEDUMPRV | 0BC7 | 0854 0BEE |
| [illegible] | [illegible] | [illegible] |
| TEFITRV | 10A7 | 0BF9 0C27 |
| TEG3=EX | 011A | 015A 123C |
| TEG35PIX | 0496 | 0604 |
| TEG7BKJ | 14F3 | 1581 |
| TEG7CR | 1334 | 08CF 09CB 0A10 0B3F 0F03 0F3F 1303 1518 |
| TEG7CRSC | 1345 | 08D1 |
| TEG7DPJ | 0944 | 1524 16E9 1744 |
| TEG7DUMP | 0B32 | 0BEC |
| TEG7EXCV | 01A6 | 0147 |
| TEG7EXEC | 1374 | 12E6 15BF |
| TEG7FMT | 1328 | 1504 |
| TEG7HAY | 1381 | 0866 1732 |
| TEG7MZBP | 09F2 | 08DF 08E8 084E |
| TEG7PC | 1357 | 0903 |
| TEG7PCSP | 1355 | 0822 1515 15D1 |
| TEG7PUNC | 0890 | 083A 134A |
| TEG7PUNJ | 134A | 17CD |
| TEG7SP | 133F | 0906 0918 |
| TEG7SPTB | 132E | 0ADE |
| TEG7TB | 039D | |
| TEG7TXTJ | 15B3 | 15E2 17CE |
| TEG72CH | 1281 | 0DE4 0F08 0F38 16AF |
| TEHAY | 085C | 06E8 |
| TEHDLROK | 1479 | 0533 1BA8 |
| TEHORPCH | 04B8 | 02E4 |
| TEJON | 1823 | 17E8 1810 |
| TEKB | 02DD | 01FA 087C 10CA 180C |
| TEKB&KS | 02D9 | 01FB |
| TEKB&KSJ | 01F8 | 0091 |
| TEKBIDL | 0091 | 0182 |
| TEKBRP | 02E1 | 01D4 02DE 10E4 |
| TEKS | 10CD | 01D2 02D9 07F0 0848 10E1 |
| TEKSPSD | 07F0 | 096D |
| TELAMP | 0454 | 044D |
| TELAMPCO | 0460 | 0478 |
| TELM | 0655 | 020C 04A1 0502 05E2 0749 0978 0F5A 11BF 1367 1786 |
| TEMC | 1391 | 1372 |
| TEMC&J | 138E | 04AC 051A 06F7 0A23 130F |
| TEMCENBP | 0E82 | 07D9 0CB5 0E56 0FC8 1285 15E8 |
| TEMCOLDA | 0603 | 07A3 |
| TEMCR | 1335 | 03A6 06E8 0789 0841 0864 08C7 0A02 0C7E 0CBA 1051 16ED 1783 |
| TEMCRCE | 0E80 | 0834 09E3 12F0 |
| TEMCRPCR | 133D | 0AD6 |
| TEMCRSCR | 1346 | 0950 1531 |
| TEMDUMP | 0833 | |
| TEMFMT | 132C | 0AD0 0C22 0CA3 |
| TEMODE | 01DB | 006E 00A0 |
| TEMPC | 1358 | 0701 0E78 12CF 1610 175A |
| TEMPCSP | 1359 | 017F 0607 13B5 |
| TEMSP | 1340 | 0496 |
| TEMSPPSP | 1341 | |
| TEMSPTB | 132F | 0F5F 12C0 12E3 |
| TEMTB | 039E | 0792 0F14 14DE |
| TEMTBCOL | 03E7 | 0506 050A 0D6A |
| TEM2CH | 1282 | 095F 0C71 0C74 0C8F 0D32 0D48 0D57 0D60 0D63 0D96 |
| TENEG | 192F | 0883 |
| TEPACEKB | 017C | 0155 0158 |
| TEPNMC | 1370 | 1826 |
| TEPRT | 00BA | 00AD |
| TEPRTOK | 00E2 | 00E7 03CC |
| TEPRTSTK | 139A | 028E 0782 1965 |
| TERF | 0500 | 079E |
| TERM | 1139 | 020F 097F 1141 |
| TEROBLA | 0CFD | 0509 |
| TEROB1 | 0026 | 06DE 082F 085C 09E0 17AC |
| TEROB2 | 0D28 | 0AFC 0E33 1667 1672 |
| TEROB3 | 0D28 | 0BC0 0C21 0D66 |
| TEROHAY | 0862 | 086A |
| TERV | 1397 | 02A6 0941 09BC 0A90 0BB5 0C49 0E6C 112E 1470 1478 166F 1823 |
| TERVRC | 1394 | 01BF 0732 0734 0771 0ACA 0E90 1002 1067 1374 1427 1434 147F 1767 1771 |
| TERWB | 0C86 | 0ACF 0808 0829 0C9F 14EF 1557 15F2 160F 1685 1748 1759 |
| TERWFULL | 0CCF | 16B4 |
| TERWHYJ | 1759 | 154D |
| TESPHLPJ | 1588 | 1614 161A 1623 |
| TESTDMG | 0033 | 002E |
| TESTOP | 1989 | 1962 |
| TETBINS | 051A | 05DA 07CC |
| TETBINSJ | 1701 | 168C 16BE |
| TEUSHE9 | 0D8D | 0DB4 0DBA |
| TEXLX | 137C | 084F 0D28 111E |
| TE7CRPCR | 133C | 06F3 076F 077C |
| TOG G8 | 024D | |
| TP | 0741 | 0737 073F |
| TPAC | 0732 | 081D 084E |
| TPAL | 073D | 1044 |
| TPCRRC | 077C | 0677 |
| TPCRRCAC | 06F3 | 0680 |
| TPDEFAC | 072F | 066E 07F3 |
| TPHYCR | 0846 | 09DB |
| TPRC | 076F | 0A3E 08CB |
| TPRCAC | 0734 | 06F6 0FAD 0FBD 1041 1076 |
| TPRW | 0736 | 077B |
| UBS | 0270 | 04FA 1055 |
| UPBELL | 1141 | 0089 10FA |
| UPBNO | 1666 | 008B 00EC 0B76 10E0 1508 1513 164D 1656 |
| UPDEM | 0598 | 04E1 070A 0DD1 |
| UPFLAGS | 0012 | 008E |
| UPGZ=LS | 0E4D | 0E38 0E9A 0EF5 |

```
LABEL     ADDR  REFERENCES

UPHFCHCT  18DE  12FA 1522 15CF
UPH7CHCT  18D9  0CE2 1681 1716 178B
UPLCFWD   069F  0385
UPLCRVS   0643  0368
UPLHC     0B8E  08F8 0AB2 0AB4 0AE4 0AEA 0AEC 0B62 0B64
UPRVLT    0BAF  089C
UPRVLTBZ  0BAE  0BE6
UPWRI     0B1E  0088 00AF 0660 0A9E 1461 1466 1473 1562 [illegible]
[illegible]
USKB      0F82  0078 0239 058A 0093
USPART    0DBA  01E0 117E 15EC 1808 18AF
USPSDJ    0D9E  0DBE
WRDATA    0ACE  0A51
WRDATA1   0ACF  0B05
WRDATA2   0B00  [illegible]
WRFF      0BF5  0977 0A4A
WRM       0BF6  09E7 09E9 09EC 0A4F 0AD4 0AD9 0ADC 0B02
WRMNOOPS  0976  09EE 09F1 0A4E
WRPOST    09E6  0A52
WRRAM     048A  040A
WROO      0BF3  09EA 0A50 0B0A
WTKB      033A  0343
WTKBCH    10C8  0E71
WTKBFMT   0FC0  0E77
WTKBNRPT  10E8  197D
XF&ALFMT  0FDC  1125
XF&SEFMT  0FDB  112A 1135
XF/RORW   0D9B  0892 121C
XFCAG10   06AD  078D 0D9E 0DB7 165C
XFCAHC    040B  0400 0421 0429 0479 047F 0483
XFCAHE9   181A  17E2
XFCHRORW  0D5D  0D79 0D98 1046 1047
XFFMT     1046  0FDD 15CD
XFGC=M    136E  0365 [illegible]
XFG0=M    13E4  187C 1883 18C5
XFG01G4H  188D  0DA7 0E0C 0E13 0F9A
XFG01HE9  184B  0DB9
XFG01H01  186B  0DA3
XFG01H45  1874  07BB 07BF 086C 1556 15FB
XFG01PIF  03B1  0352 03C6
XFG01PR   03BF  034F 038C 0492
XFG1=M    14A5  0572 0588 165B 1860 186A 18CB
XFG2=M    13BE  088F 0E4F 0F69 0F7B
XFG47G01  1879  0E06 0E0E
XFG7=M    1865  014D 019F 0838
XFG7RWJ   16AC  1536 153C 1571 158A 1607 16E7 1946
XFG7STK   07FB  0A12
XFG74RW   095D  0869 0940 1188
XFG8=M    024E  1913
XFHC=M    1888  0419
XFHE9G01  185B  0DA4 0DA8
XFH0=M    0A30  0191 0C7B 13D7 18ED
XFH0G7    1864  090E 1682 1696
XFH0STK   1114
XFH01G01  1867  0761 07AF 07C0 07DE 0E60 0FD1 1933
XFH1=M    186E  13C9 1873 18F3
XFH10G47  1861  06E7 0767 0806 0863 08C5 0B4D 0C7D 0E5D 0F01 0F16 0F31 12C2 12C6 1608 16E6
                173A 18E2
XFH45H01  1870  0760 07AE 07BE [illegible] 0FCF 15F9 1663
XFH9=M    1821  182F
XFKBKS    10C6  08A3
XFM=G0    13F4  0387 0708
XFM=G1    13A0
XFM=HB    0008  08FC
XFM=HC    047D  03EF 16CB
XFM=H0    0A21  0A2E 0A8F 0C78 0C93 0D4F 0D5C 0E7F 116D 12E5
XFMKS     1113  07FC 083D 0844 0949 0A00 0A07 10C7
XFPSPIF   00E7  02C3 02C9 02CE
XFPSWAIT  03CB  03CE
XFRORWG0  007B  0883
XFRWROCL  0D6E  0E6E 122C 122F
XFRWROG0  0074  0896 0D71
XL        06DA  057D 0689 0695 1244
XLH       120C  120F
XMG2      143E  0654 0658 06AC 0F10
XMG2+G0   143F  06BE 089E 13F3
XMG2+G10  1440  038E 078A 0E65 0FDA 1662
XOUT      00F1  0170
```

MACHINE NO    OPERATOR    SHIFT    DATE(MMDD)    COST CENTER    START TIME    STOP TIME

REEL NO.    FILE    FILE ID.

NO. OF PAGES PRINTED 201

NO. OF LINES PRINTED 11344

NO. OF COPIES 1

NO. OF ABORTED PAGES 2    NO. OF OVERPRINT LINES 0

JOB REQUEST NO. 12    COLLATE MODE: YES    FORMS OVERLAY MODE: OFF    FILE MODE: MULTI

NO. OF VOLUMES PROCESSED 1

TAPE PHYSICAL BLOCK COUNT 11482

NO. OF TAPE PHYSICAL BLKS SKIP 0

END-OF-REPORT STATUS DISPLAY 112

APPENDIX C

| Instruction Keyboard Control | Operand | Definition | Assembly |
|---|---|---|---|
| CKBD | ARDR | Select Active Reader | 0000 0100 0000 0010 |
| " | TWST | Thumbwheels to M Register | 0000 0101 0000 0010 |
| " | KBST | Keyboard Register to M | 0000 0110 0000 0010 |
| " | 2MDLY | Set Two Ms. Delay | 0000 0000 0000 0011 |
| " | HSDLY | Set 1/2 Second Delay | 0000 0000 0001 0011 |
| " | RTIME | Reset 2HZ flip flop | 0000 0000 0010 0011 |
| " | M = XL | XLator to M | 0000 0000 0000 0001 |
| " | XL =M | M to XLator | 0000 0000 0001 0001 |
| " | XL = ML | M to Low Order X Lator | 0000 0000 0010 0001 |
| " | XL = MH | M to High Order X Lator | 0000 0000 0011 0001 |

| Instruction Keyboard Branch | Operand | Definition | Assembly |
|---|---|---|---|
| BKBD +n | 2HZ=c | Test state of 2HZ oscillator | 0000 1c00 1100 NRA |
| " | NLS1=c | Test state of line space switch | 0000 1c00 0001 NRA |
| " | 500HZ=c | Test state of 500 HZ oscillator | 0000 1c00 1101 NRA |
| " | 1KHZ=c | Test state of 1KHZ oscillator | 0000 1c00 1111 NRA |
| " | WOSC=c | Test state of write oscillator | 0000 1c00 1110 NRA |
| " | NLS2=c | Test Line Space Switch | 0000 1c00 0010 NRA |
| " | STOP=c | Test Stop Key | 0000 1c00 0011 NRA |
| " | STROBE=c | Test Keyboard Strobe | 0000 1c00 0100 NRA |
| " | NMRL=c | Test Margin Release Key | 0000 1c00 0101 NRA |
| " | NM=c | Test MS Delay Not Expired | 0000 1c00 1010 NRA |
| BKBD+n | NS=c | Test 1/2 Second Delay Not Expired | 0000 1c00 1011 NRA |
| " | N10P=c | Test 10 P Switch | 0000 1c00 0110 NRA |
| " | N12P=c | Test 12 P Switch | 0000 1c00 0111 NRA |
| " | NPS=c | Test Prop. Sp. Switch | 0000 1c00 1000 NRA |
| " | NRPT=c | Test Status of Repeat Line | 0000 1c00 1001 NRA |

NOTE: Branch condition specified by replacing "C" with a "1" for true, "0" for false; NRA is next relative address. Branch is relative to current address ± 0/F.

| Instruction Printer Control: | Operand | Definition | Assembly |
|---|---|---|---|
| CPRT | CHST | Character strobe | 0001 0010 0000 0001 |
| " | CMST | Carriage motion strobe | 0001 0010 0000 0010 |
| " | PFST | Paper feed strobe | 0001 0010 0000 0100 |
| " | RSET | Reset printer | 0001 0010 0000 1000 |
| " | LHDB | Load high order data bits | 0001 0010 0001 0000 |
| " | RBUP | Ribbon up | 0001 0011 0000 1000 |
| " | RBDN | Ribbon down | 0001 0011 0000 1001 |

| Instruction Printer Branch: | Operand | Definition | Assembly |
|---|---|---|---|
| BPRT ± n | OK=c | Printer OK | 0001 1c00 1001 NRA |
| " | PFBY=c | Paper feed busy | 0001 1c00 1100 NRA |
| " | CMBY=c | Carriage busy | 0001 1c00 1101 NRA |
| " | PRBY=c | Printer busy | 0001 1c00 1111 NRA |
| " | CHBY=c | Character busy | 0001 1c00 1110 NRA |
| " | EORIB=c | End of Ribbon | 0001 1c00 1000 NRA |
| " | DBX=c | Test state of data buss bits | 0001 1c10 0xxx NRA |
| " | MAZ=c | Memory address equal zero | 0001 1c10 1111 NRA |
| " | MEZ=c | Memory data equal zero | 0001 1c00 1011 NRA |
| " | LXL=c | Language translator in | 0001 1c10 1101 NRA |

NOTE: Branch condition specified by replacing "c" with a "1" for true, "0" for false.
NRA is next relative address
Branch is relative to current address.

APPENDIX C

| Instruction | Operand | Definition | Assembly |
|---|---|---|---|
| Media Control: | | | |
| CmmM | SRD | Stop read | 0010 01mm 0000 0000 |
| " | SWR | Stop write | 0010 01mm 1000 0000 |
| " | NRF | Normal read forward | 0010 01mm 0001 0000 |
| " | NWF | Normal write forward | 0010 01mm 1001 0000 |
| " | NRR | Normal read reverse | 0010 01mm 0101 0000 |
| " | NWR | Normal write reverse | 0010 01mm 1101 0000 |
| " | FRF | Fast read forward | 0010 01mm 0011 0000 |
| " | FRR | Fast read reverse | 0010 01mm 0111 0000 |
| " | SEJT | Set eject | 0010 00mm 0000 1100 |
| " | REJT | Reset eject | 0010 00mm 0000 1000 |
| " | M=RR | Transfer read register to M | 0010 00mm 0001 0000 |
| " | WR=M | Transfer M to write register | 0010 00mm 0010 0000 |
| " | RMED | Reset the media | 0000 00mm 0100 0000 |
| " | BNO | Transfer M to block number display | 0010 00mm 0000 0010 |
| " | CIN=0 | Reset card in flip flop | 0010 00mm 0000 0100 |
| " | CIN=1 | Set card in flip flop | 0010 00mm 0000 0101 |
| " | HDL | Head left one track | 0010 00mm 1000 0000 |
| " | HDR | Head right one track | 0010 00mm 1000 0001 |
| " | TNO | Transfer M to track number display | 0010 00mm 0000 0010 |

NOTE: Media selected is determined by replacing "mm" with; "RO", "01" - read only
"RW", "10" - read write
"AC", "11" - active

| Instruction | Operand | Definition | Assembly |
|---|---|---|---|
| Media Branch | | | |
| BmmM± n | RDR=c | Read data ready | 0n10 1cmm 0001 NRA |
| " | WDB=c | Write data busy | 0n10 1cmm 0010 NRA |
| " | CIN=c | Cassette in | 0n10 1cmm 0011 NRA |
| " | WINH=c | Write inhibit | 0n10 1cmm 0100 NRA |
| " | READ=c | Write current off | 0n10 1cmm 0101 NRA |
| " | TNS=c | Tape not at speed | 0n10 1cmm 0110 NRA |
| " | GAP=c | Gap in data | 0n10 1cmm 0111 NRA |
| " | NEOT=c | Near end of tape | 0n10 1cmm 1000 NRA |
| " | EOT=c | End of tape | 0n10 1cmm 1001 NRA |
| " | SOK=c | Servo OK | 0n10 1cmm 1010 NRA |
| " | KREW=c | Rewind switch | 0n10 1cmm 1011 NRA |
| " | RUN=c | Tape running | 0n10 1cmm 1100 NRA |
| " | ACT=c | Cassette active | 0n10 1cmm 1101 NRA |
| BmmM n | SEN=c | Servo enabled | 0n10 1cmm 1110 NRA |
| " | TCI=c | Tape/card in | 0n10 1cmm 1111 NRA |
| " | Q1=c | Test position of head | 0n10 1cmm 0000 NRA |
| " | HDBY=c | Head busy | 0n10 1cmm 0100 NRA |
| " | CNS=c | Card not at speed | 0n10 1cmm 0110 NRA |
| " | LSN=c | Calibrate switch closed | 0n10 1cmm 1000 NRA |
| " | EOC=c | End of card | 0n10 1cmm 1001 NRA |
| " | NEJT=c | Eject switch | 0n10 1cmm 1011 NRA |
| " | FWD=c | Card going forward | 0n10 1cmm 1110 NRA |
| " | CCI=c | Card Control card is in | 0n10 1cmm 1111 NRA |
| " | TFWD=c | Tape going forward | 0n10 1cmm 0000 NRA |

NOTE: Media selected is determined by replacing "mm" with "RO", "01" - read only
"RW", "10" - read write
"AC", "11" - active
Branch condition is specified by replacing "c" with a "1" for true, "0" for false;
NRA is next relative address.
Branch is relative to current address.

| Instruction | Operand | Definition | Assembly |
|---|---|---|---|
| ALU Control: | | | |
| CALG(H) | M=M' | | 1011 0000 0000 0010 |
| " | M=M@Gx | | 1011 1011 xxxx 0010 |
| " | M=M@Gx' | | 1011 0111 xxxx 0010 |
| " | M=(M@Gx)' | | 1011 0100 xxxx 0010 |
| " | M=M'@Gx | | 1011 0010 xxxx 0010 |
| " | M=M. Gx | | 1011 1110 xxxx 0010 |
| " | M=M. Gx' | | 1011 1101 xxxx 0010 |
| " | M=(M. Gx)' | | 1011 0001 xxxx 0010 |
| " | M=M'. Gx | | 1011 1000 xxxx 0010 |
| " | M=M*Gx | | 1011 1001 xxxx 0010 |
| " | M=(M*Gx)' | | 1011 0110 xxxx 0010 |
| " | M=Gx' | | 1011 0101 xxxx 0010 |
| " | M=Gx | | 1011 1010 xxxx 0010 |
| " | SML | (Shift Mleft) | 1011 1100 0000 0000 |

APPENDIX C (continued)

| Instruction ALU Control: | Operand | Definition | Assembly |
|---|---|---|---|
| CALG(H) | RML | (Rotate M left) | 1011 1100 0000 0001 |
| " | M=M+1 | | 1011 1111 0000 0001 |
| " | M=M+Gx | | 1011 1001 xxxx 0000 |
| " | M=M+Gx+1 | | 1011 1001 xxxx 0001 |
| " | M=M-1 | | 1011 0000 0000 0000 |
| " | M=M-Gx | | 1011 0110 xxxx 0001 |
| " | M=M-Gx-1 | | 1011 0110 xxxx 0000 |
| " | Gx=m | | 1011 0000 xxxx 0100 |
| " | Gx=0 | | 1011 0001 xxxx 0100 |

NOTE: ± are arithmetic symbols
@ is logic or (incl.)
. is logic and
* is logic exclusive or
HEX x is register number

| Instruction | Operand | Definition | Assembly |
|---|---|---|---|
| CALR | M=xx | | 1011 xxxx xxxx 1111 |
| " | M=(M-xx)' | | 1011 xxxx xxxx 1000 |
| " | M=xx-M | | 1011 xxxx xxxx 1001 |
| " | M=M+xx | | 1011 xxxx xxxx 1010 |
| " | M=M@xx | | 1011 xxxx xxxx 1110 |
| " | M=M. xx | | 1011 xxxx xxxx 1101 |
| " | M=M*xx | | 1011 xxxx xxxx 1100 |
| BALG(H) ± n | M-Gx=0 | | 1001 0000 xxxx NRA |
| " | M≥ Gx | | 1001 0001 xxxx NRA |
| " | M. Gx=0 | | 1001 0010 xxxx NRA |
| " | M=0 | | 1001 0011 0000 NRA |
| " | (M=0)' | | 1001 0111 0000 NRA |
| " | M=M-Gx≥0 | | 1001 0101 xxxx NRA |
| " | M=M+GxC | | 1001 0110 xxxx NRA |
| " | M=M-1=0 | | 1001 0110 xxxx NRA |

NOTE: All commands involving Gx (CALG, BALG) must also be implemented with Hx (B14 changes from A "0" to "1")
HEX x is register number
xx is (8-bit) constant
Branch is relative to current address.
* Only branch on data available on non ± branching processors

| Instruction Memory Control: | Operand | Definition | Assembly |
|---|---|---|---|
| CMEM | AxIN | Load address quadrant x | 0011 0000 xx00 0100 |
| " | AxINI | Load addr quad x and incr | 0011 0000 xx00 0110 |
| " | AxIND | Load addr quad x and decr | 0011 0000 xx00 0101 |
| " | ADEC | Decriment address | 0011 0000 0000 0001 |
| " | AOUTD | Output address and decr addr | 0011 0000 0101 0001 |
| " | MOUTD | Output memory and decr addr | 0011 0000 0001 0001 |
| " | MIND | Input memory and decr addr | 0011 0000 0000 1001 |
| " | AINC | Incriment address | 0011 0000 0000 0010 |
| " | AOUTI | Output address and incr addr | 0011 0000 0101 0010 |
| " | MOUTI | Output memory and incr addr | 0011 0000 0001 0010 |
| " | MINI | Input memory and incr addr | 0011 0000 0000 1010 |
| " | MIN | Input memory from M | 0011 0000 0000 1000 |
| " | AOUT | Output address to M | 0011 0000 0101 0000 |
| " | MOUT | Output memory to M | 0011 0000 0001 0000 |
| " | AMIN | Input addr to Media Xlator | 0011 0001 0000 1010 |
| " | APIN | Input addr to Printer Xlator | 0011 0001 0000 1100 |
| " | ALIN | Input addr to Language Xlator | 0011 0001 0001 0000 |
| " | XOUT | Output Translator to M | 0011 0001 0010 0000 |

| Instruction | Operand | Definition | Assembly |
|---|---|---|---|
| Jump and Misc. Instructions: | | | |
| JEPU | ZXXX (Next Addr. HEX) | Jump | 10Z0 XXXX XXXX XXXX (next addr) |
| JEPR | ZXXX (next Addr. HEX) | Jump store return addr | 11Z0 XXXX XXXX XXXX (next addr.) |
| JIPU | ± n | Intra page jump | 0n0C 1000 0000 NRA |
| RETN | | Jump to return address | 0000 0000 0000 1111 |
| RNOP | | Push return addr stack up | 0000 0000 0000 0010 |
| NOOP | | No operation | 0000 0000 0000 0000 |

NOTE: Branch condition is specified by replacing "c" with a "1" for true, "0" for false;
NRA is next relative address.
Branch is relative to current address.

APPENDIX D

| | 7 | 6 | 5 | 4 | 3 | 2 | 1 | 0 |
|---|---|---|---|---|---|---|---|---|
| G0 | | | | General Use | | | | |
| G1 | | | | General Use | | | | |
| G2 | | | | General Use | | | | |
| G3 | | | | General Use | | | | |
| G4 | | | Second Character and Miscellaneous | | | | | |
| G5 | Lower Limit | RW Rewind | RO Rewind | G E N E R A L U S E | | | MGC Sc J Help | Column Center |
| G6 | Prop. Space | Center | Insert Tab | Switch Reader | Potpara Stop | First PrtChar | Stop Condmet | Tab CTR Open |
| G7 | | | Character Being Processed | | | | | |
| G8 | XPAND | PRTC | MGC | REV | AUTO | PARA | LINE | WORD |
| G9 | Search | Search Code | Record | Record Flash | PLAY | JUST | SKIP | DUP |
| GA | COMM | Defd Space | Defd Cr | Left Print | Print Auto | Line Undscr | Rtflush Col | Auto Log |
| GB | System LS2 | System LS1 | Switch LS2 | Switch LS1 | | LANGUAGE OPTION | | |
| GC | FRACTIONAL COLUMN | | | | TAB COUNTER | | | |
| GD | | | | RW BUFFER ADDRESS | | | | |
| GE | | | | RO BUFFER ADDRESS | | | | |
| GF | Twelve Pitch | Defd ESC | DUMP | STOP | | RIGHT MARGIN RANGE | | |

APPENDIX E

| Register | 7 | 6 | 5 | 4 | 3 | 2 | 1 | 0 |
|---|---|---|---|---|---|---|---|---|
| H0 | GENERAL USE | | | | | | | |
| H1 | GENERAL USE | | | | | | | |
| H2 | No. of Characters Remaining in Block | | | | | | | |
| H3 | Carriage Position on Empty RW Buffer | | | | | | | |
| H4 | Justify: Consumed Sp and Num. of Larger Spaces (LOW) | | | | | | | |
| H5 | Justify: Consumed Sp and Wt of J Space (High Order) | | | | | | | |
| H6 | Justify: Accumulated No. of Variable Spaces | | | | | | | |
| H7 | Justify: Distance (In RWB) to Last Breakpoint | | | | | | | |
| H8 | Bell at Init | Right Hand Margin Justify In Prog. | | : Space Upper Limit | | | | |
| H9 | Begin Undsc. Fractional Column | | | | | Deferred Escapement | | |
| HA | PRINTER CARRIER POSITION | | | | | | | |
| HB | GENERAL USE | | | | | | | |
| HC | USED IN TAB ROUTINES - DO NOT USE IN PRT ROUTINES BECAUSE OF FMT | | | | | | | |
| HD | GENERAL USE | | | | | | | |
| HE | Begin Underscore Position and Retn Carriage Position for J. Help | | | | | | | |
| HF | Justify: No. of RWB Char. Already Processed | | | | | | | |

APPENDIX F

Carriage Arrangement

| Spoke | Character | Carriage PS Unit Value* (1 unit = 2/120th of an inch) | Hammer Force |
|---|---|---|---|
| 0 | | | |
| 1 | | | |
| 2 | | | |
| 3 | | | |
| 4 | # | 6 | 4 |
| 5 | 9 | 5 | 3 |
| 6 | 8 | 5 | 4 |
| 7 | 7 | 5 | 3 |
| 8 | 6 | 5 | 3 |
| 9 | 5 | 5 | 3 |
| 10 | 0 (zero) | 5 | 4 |
| 11 | 4 | 5 | 3 |
| 12 | 3 | 5 | 3 |
| 13 | 2 | 5 | 3 |
| 14 | 1(one) | 5 | 2 |
| 15 | 1/4 | 6 | 4 |
| 16 | . | 4 | 1 |
| 17 | % | 8 | 4 |
| 18 | , | 4 | 1 |
| 19 | & | 7 | 4 |
| 20 | ( | 4 | 2 |
| 21 | @ | 8 | 4 |
| 22 | ) | 4 | 2 |
| 23 | 1/2 | 6 | 4 |
| 24 | q | 6 | 4 |
| 25 | z | 6 | 3 |
| 26 | x | 6 | 3 |
| 27 | k | 6 | 3 |
| 28 | b | 6 | 3 |
| 29 | p | 6 | 4 |
| 30 | y | 6 | 3 |
| 31 | g | 6 | 4 |
| 32 | v | 6 | 3 |
| 33 | u | 6 | 3 |
| 34 | c | 6 | 3 |
| 35 | h | 6 | 3 |

APPENDIX F (continued)

| Spoke | Character | Carriage P.S. Unit Value* | Hammer Force |
|---|---|---|---|
| 36 | d | 6 | 3 |
| 37 | a | 6 | 3 |
| 38 | e | 6 | 3 |
| 39 | n | 6 | 3 |
| 40 | o | 6 | 3 |
| 41 | r | 5 | 2 |
| 42 | w | 7 | 3 |
| 43 | t | 6 | 3 |
| 44 | Q | 7 | 4 |
| 45 | s | 4 | 3 |
| 46 | X | 7 | 3 |
| 47 | j | 4 | 3 |
| 48 | m | 8 | 4 |
| 49 | i | 4 | 2 |
| 50 | K | 7 | 4 |
| 51 | f | 5 | 3 |
| 52 | Y | 7 | 3 |
| 53 | l | 4 | 3 |
| 54 | W | 8 | 4 |
| 55 | , | 4 | 1 |
| 56 | G | 7 | 4 |
| 57 | . | 4 | 1 |
| 58 | M | 8 | 4 |
| 59 | ! | 3 | 2 |
| 60 | C | 7 | 3 |
| 61 | - (hyp) | 5 | 1 |
| 62 | U | 7 | 4 |
| 63 | " | 5 | 2 |
| 64 | D | 7 | 4 |
| 65 | / | 4 | 2 |
| 66 | 0 | 7 | 4 |
| 67 | : | 4 | 2 |
| 68 | R | 7 | 4 |
| 69 | ; | 4 | 2 |
| 70 | H | 7 | 4 |
| 71 | I | 4 | 3 |
| 72 | N | 7 | 4 |
| 73 | ' | 3 | 1 |
| 74 | F | 6 | 4 |
| 75 | J | 5 | 3 |
| 76 | L | 6 | 3 |
| 77 | T | 6 | 3 |
| 78 | A | 7 | 4 |
| 79 | ? | 5 | 2 |
| 80 | E | 6 | 4 |
| 81 | * | 6 | 3 |
| 82 | S | 6 | 4 |
| 83 | _ (u score) | 5 | 1 |
| 84 | V | 6 | 3 |
| 85 | + | 6 | 2 |
| 86 | P | 6 | 4 |
| 87 | = | 6 | 2 |
| 88 | B | 6 | 4 |
| 89 | $ | 5 | 4 |
| 90 | Z | 6 | 3 |
| 91 | ¢ | 5 | 3 |
| 92 | | | |
| 93 | | | |
| 94 | | | |
| 95 | | | |

* In PS Mode Ribbon Advance is equal to carriage PS unit value.
In 10 pitch Ribbon & Carriage Advance = 6 units
In 12 pitch Ribbon & Carriage Advance = 5 units

APPENDIX G

R A M

| STORAGE LOCATIONS | INFORMATION |
| --- | --- |
| 000 - 0FF | RW Buffer |
| 100 - 1FF | RO Buffer |
| 200 - 227 | TAB Storage |
| 228 - 23F | KB Stack |
| 240 | LM |
| 241 | RM |
| 242 | RW BNO/TNO |
| 243 | RO BNO/TNO |
| 244 | FL Preset No. |
| 245 | FL Module (244) CTR. |
| 246 | Line Counter Preset No. |
| 247 | Line Count Counter |
| 248-287 | Temporary Tab Storage |
| 288 | Temporary Lm. |
| 289 | Temporary RM. |
| 290 - 2C2 | Text Sch. Que |
| 2C3 | Text Sch Que Pointer |
| 2C4 | Print Stack Input Pointer |
| 2C5 | Print Stack Output Pointer |
| 2C6 - 2EF | Print Stack |

What is claimed is:

1. In an automatic writing system including a keyboard and a printer, each of which is connected to at least a common data bus and a common instruction word bus, the improvement comprising:

selection means at said keyboard for defining designated pitch and proportionally spaced printing modes;

a microprocessor having a plurality of specific print control instructions stored therein at addressable locations, said microprocessor connected to said common instruction word bus and said common data bus; and a printer data store containing print information corresponding to alphameric information which may be entered at said keyboard, said printer data store being connected to said common data bus and said common instruction word bus and addressable by character information corresponding to alphameric information which may be inserted at said keyboard;

said microprocessor acting in response to the selection of a printing mode of operation and the entry of alphameric information to cause print information corresponding to entered alphameric information to be read from said printer data store and forwarded to said printer.

2. The automatic writing system according to claim 1 wherein said printer data store includes a printer data ROM and means for addressing said printer data ROM in response to alphameric information.

3. The automatic writing system according to claim 2 wherein said printer data ROM contains print information corresponding to alphameric information which may be inserted at said keyboard and said print information includes information defining the alphameric character to be printed and the width of said alphameric character to be printed in a proportionally spaced printing mode.

4. The automatic writing system according to claim 3 wherein said print information additionally includes the force with which the alphameric character defined is to be printed.

5. The automatic writing system according to claim 3 wherein said print information from said printer data ROM is forwarded through said common data bus to said microprocessor and subsequently from said microprocessor to said printer through said common data bus.

6. The automatic writing system according to claim 6 wherein said microprocessor is responsive to said width information contained in said print information and the mode of printing selected to forward appropriate escapement information to said printer.

7. The automatic writing system according to claim 6 wherein said microprocessor is responsive to the selection of a designated pitch mode of printing to substitute a constant width related to the pitch selected for width information present in said print information and forward escapement information to said printer which is related thereto.

8. The automatic writing system according to claim 7 wherein said microprocessor is responsive to the selection of a proportionally spaced mode of printing to forward escapement information to said printer which is related to said width information contained in said print information.

9. The automatic writing system according to claim 8 wherein said microprocessor stores width information associated with the last character printed at said printer and if an alphameric character entry occurs within a predetermined interval, forwards escapement information to said printer, prior to print information, which is a function related to one-half the width of the previously printed character and one-half the width of the alphameric character to be printed in the mode of printing selected.

10. The automatic writing system according to claim 9 wherein said microprocessor forwards escapament information to the printer which is a function related to one-half the width of the previously printed character plus a constant if an alphameric character entry does not occur within a predetermined interval.

11. The automatic writing system according to claim 9 wherein said microprocessor forwards additional escapement information to said printer upon an entry of alphameric characters when said entry did not occur within said predetermined interval, said additional escapement information comprising the difference between one-half the width of the alphameric character to be printed in the mode of printing selected and said constant.

12. The automatic writing system according to claim 5 wherein said printer is responsive to said information defining the alphameric character to be printed contained in said print information to print said alphameric character and is responsive to said width information to displace a ribbon through which impact printing is achieved.

13. The automatic writing system according to claim 12 wherein said print information additionally includes the force with which the alphameric character defined is to be printed.

14. The automatic writing system according to claim 13 wherein said printer is responsive to said information defining the force with which the alphameric character defined is to be printed to cause printing of that character to occur in relation to the force defined.

15. The automatic writing system according to claim 14 wherein said printer is a daisy wheel printer.

16. The automatic writing system according to claim 5, wherein said printer includes a printer interface having a latch means and said print information from said printer data ROM is read in two passes and supplied in two passes to said microprocessor through said common data bus, said microprocessor being responsive to print information thus received to forward print information to said printer in two passes, said latch means storing print information received through said common data bus in a first pass until print information in a second pass is received whereupon all of said printer data may be supplied to said printer in a single pass.

17. The automatic writing system according to claim 16 wherein said microprocessor acts to reorder printer information supplied thereto in two passes from the printer data ROM into an order suited to said printer prior to forwarding printer information to said printer.

18. The automatic writing system according to claim 2 additionally comprising means for selectively playing back recorded information originally entered at said keyboard, said means for playing back being connected to said common data bus and said common instruction word bus, said microprocessor acting in response to the selection of a playback and printing mode of operation, the playback of alphameric information and said means responsive to cause print information corresponding to entered alphameric information to be read from said printer data ROM.

19. A method of printing in a word processing system which includes a microprocessor, a keyboard, a printer and a printer data ROM, each of which is connected to a common data bus and a common instruction word bus, comprising the steps of:

inspecting each alphameric character entry within said microprocessor to ascertain if a printable character entry is present:

addressing said printer data ROM with said alphameric character entry if said word processing system is in a printing mode;

reading print information defining the alphameric character to be printed and a width therefor from said printer data ROM and supplying the print information read to said microprocessor;

forwarding escapement information from said microprocessor to said printer as a function of width information present in said printer information; and forwarding print information from said microprocessor to said printer to cause printing to occur.

20. The method of printing in a word processing system according to claim 19 wherein designated pitch and proportionally spaced printing modes may be selected, additionally comprising the steps of:

ascertaining if a designated pitch printing mode has been selected;

substituting constant width information for the width information in print information obtained from the printer data ROM if a designated pitch printing mode has been selected; and forwarding escapement information from said microprocessor to said printer as a function of said constant width information substituted.

21. In an automatic writing system including a keyboard, a printer and means for recording information entered at said keyboard and selectively playing back recorded information, each of which is connected to at least a common data bus and a common instruction word bus, the improvement comprising:

means at said keyboard for defining a mode of operation wherein recorded information is selectively played back and printed by said printer at high speeds;

a microprocessor having a plurality of specific print direction and escapement control instructions stored therein at addressable locations, said microprocessor connected to said common instruction word bus and said common data bus; and first and second buffers and a printer stack connected to said common data bus and said common instruction word bus, each of said first and second buffers capable of receiving a full line of alphameric information to be printed upon a playback of recorded information, said microprocessor acting in response to a definition of said playback and high speed print operation for causing a line of information to be printed in a first direction to be played back and loaded into said first buffer, said microprocessor acting thereafter to cause print information and escapement information associated with each character in the line of information loaded into said first buffer to be loaded into said printer stack and forwarded from said printer stack to said printer at a rate at which said printer can process said information, said microprocessor further acting at a time after print information and escapement information associated with the last character of the line loaded in said first buffer has been loaded into said printer stack to cause a line of information to be printed in a second direction to be played back and loaded into said second buffer while said printer is still processing information loaded into said printer stack from said first buffer.

22. The automatic writing system according to claim 21 wherein said microprocessor acts to test information loaded into said second buffer to ascertain whether the line information associated therewith can be logically printed in a second direction opposite to said first.

23. The automatic writing system according to claim 21 wherein said first and second buffers and said printer stack are formed within a RAM storage device.

24. The automatic writing system according to claim 22 wherein a line of information to be printed in a second direction is loaded into said second buffer by causing said line of information to be played back, loaded into said first buffer and thereafter transferred a character at a time to said second buffer.

25. The automatic writing system according to claim 24 wherein said microprocessor acts to test information loaded into said second buffer to ascertain whether the line information associated therewith may be printed in a second direction on a per character basis as each character is transferred from said first buffer to said second buffer.

26. The automatic writing system according to claim 24 wherein said microprocessor further acts upon an emptying of said printer stack, to read character information from said second buffer in a reverse direction, to load print information and escapement information associated with each character in the line of information read from said second buffer into said printer stack in the order read, and to forward print information and escapement information to said printer from said printer stack at a rate at which said printer can process said information.

27. The automatic writing system according to claim 22 wherein said microprocessor acts to calculate the start of printing point for information loaded into said second buffer, so that the line of information associated therewith may be printed in a second direction opposite to said first.

28. The automatic writing system according to claim 27 wherein said microprocessor acts to compare required printer displacement from the last print position in printing a previous line of information in a first direction to said start of printing point for said second buffer with required printer displacement from said last print position to a print position for printing line information in said second buffer in a first direction and if the last mentioned displacement is smaller causes printing to occur in a first direction.

29. The automatic writing system according to claim 28 wherein said microprocessor causes printing to occur in a first direction whenever the line information in said second buffer may not be logically printed in said second direction.

30. The automatic writing system according to claim 29 wherein a line of information to be printed in a second direction is loaded into said second buffer by causing said line of information to be played back, loaded into said first buffer and thereafter transferred a character at a time to said second buffer.

31. The automatic writing system according to claim 30 wherein said microprocessor acts to clear said second buffer when line information therein is not to be printed in said second direction and to cause said printer stack to be loaded with that line information from said first buffer in the same manner as if printing was to occur initially in said first direction.

32. The automatic writing system according to claim 27 wherein said microprocessor acts to displace the printer carriage to said start of printing point.

33. In an automatic writing system including a microprocessor, a keyboard, a printer, first and second buffers, a printer stack and means for recording information entered at said keyboard and selectively playing back recorded information; a method of high speed printing on playback comprising the steps of:

playing back a line of alphameric character information and loading each character thereof into said first buffer;

reading each character in said first buffer and loading print information and escapement information related thereto into said printer stack while escapement and print information already loaded into said printer stack is forwarded to said printer at a rate at which said printer can process such information to cause printing to occur in a first direction;

playing back a next line of alphameric character information and loading each character into said second buffer at a time after the complete contents of said first buffer have been read but while escapement and print information is still being forwarded from said printer stack to said printer to cause printing to occur in a first direction;

reading each character in said second buffer in a reverse direction and loading print information and escapement information related thereto into said printer stack after all previously loaded information therein has been forwarded to said printer and forwarding escapement and print information from said printer stack to said printer to cause printing to occur in a second direction opposite to said first direction.

34. The method of high speed printing according to claim 33 additionally comprising the steps of:

testing each character loaded into said second buffer to ascertain whether the line read can be printed in a second direction; and upon detecting a character which logically precludes printing in a second direction, loading said printer stack to cause printing to occur in a first direction.

35. In an automatic writing system including a keyboard, a printer and a buffer for storing character information entered from said keyboard, each of which is connected to at least a common data bus and a common instruction word bus, the improvement comprising:

means at said keyboard for defining a mode of margin control operable in response to information entered from said keyboard;

a microprocessor having a plurality of specific margin control instructions stored therein at addressable locations, said microprocessor connected to said common instruction word bus and said common data bus;

means at said keyboard for defining left and right margin locations as well as a margin zone width in which automatic carriage return operations may be initiated, said margin zone width being adjacent to and to the left of the right margin defined; and first storage means addressable by said microprocessor for storing said left and right margin locations defined as well as the width of said margin zone, said means for storing being connected to said common data bus and said common instruction word bus; and second storage means responsive to a definition of said mode of margin control operable in response to information entered from said keyboard, alphameric character information entered from said keyboard and a designated proximity to a defined right-hand margin for substituting carriage return information for space code information and thereby causing said defined right-hand margin to be honored, said means for storing being connected to at least said common data bus and said common instruction word bus.

36. The automatic writing system according to claim 35 wherein said microprocessor is responsive to a definition of said mode of margin control operable in response to information entered from said keyboard to test the printer location each time alphameric character information is entered from the keyboard to ascertain if printing is to occur within said margin zone width or to the left of the margin zone defined.

37. The automatic writing system according to claim 36 wherein said microprocessor acts, upon a determination of a printer location within said margin zone width, to test each character entered from the keyboard to ascertain if a hyphen code is present in any form and upon a detection of a hyphen code causes a hyphen code to be printed followed by a carriage return character.

38. The automatic writing system according to claim 36 wherein said microprocessor acts, upon a determination of a printer location within said margin zone width to test each character entered from the keyboard to ascertain if a space code is present and upon a detection of a space code substitutes a carriage return character therefor and causes the same to be processed.

39. The automatic writing system according to claim 38 wherein said microprocessor further acts upon a detection of a space code within said margin zone width to test whether a space expand mode has been established and if said space expand mode has been established to honor said space code detected within said margin zone.

40. The automatic writing system according to claim 36 wherein said microprocessor acts, upon a determination of a printer location to the left of said margin zone width, to test each character entered from the keyboard to ascertain if a hyphen code is present and upon a detection of a hyphen code substitutes a mandatory hyphen code, which is always honored therefor and causes the same to be processed.

41. The automatic writing system according to claim 35 wherein said microprocessor is responsive to a definition of said mode of margin control operable in response to information entered from said keyboard to test the printer location each time alphameric character information is entered from the keyboard to ascertain if printing is to occur at the left hand margin defined, within said margin zone width or within the remaining text zone.

42. The automatic writing system according to claim 35 wherein said microprocessor is responsive to a definition of said mode of margin control operable in response to information entered from said keyboard to test the printer location each time alphameric character information is entered from the keyboard to ascertain if printing is to occur at the left hand margin defined.

43. The automatic writing system according to claim 42 wherein said microprocessor acts, upon a determination of a printer location at said left hand margin, to test each character entered from the keyboard to ascertain if a space code is present and upon a detection of a space code causes sid space code to be skipped unless printing is occurring at the first line of a paragraph or a space expand mode has been established.

44. The automatic writing system according to claim 43 wherein said microprocessor acts, upon a determination of a printer location at said left hand margin and the detection of a non space code entry from the keyboard to process said non space code entry as a normal entry without said margin zone width.

45. The automatic writing system according to claim 44 wherein said microprocessor is responsive to a definition of said mode of margin control operable in response to information entered from said keyboard to test each character entered from the keyboard to ascertain if a carriage return code is present and upon detection of a carriage return code to transform that carriage return code into a mandatory form of that carriage return code and cause the normal processing of said transformed code regardless of designated proximity to a defined right hand margin whereupon the entry of a carriage return code during a defined mode of margin control operable in response to information entered from said keyboard acts to define an end to a paragraph.

46. A method of performing a manual mode of margin control in a word processing system which is responsive to alphameric character information entered at said keyboard, comprising the steps of:

reviewing the current print position of a printer each time an alphameric character is entered at said keyboard to ascertain if said print position is within a margin control zone in which carriage return operations may be conducted or within a text zone;

testing each alphameric character entered from the keyboard within said margin control zone to ascertain if a hyphen code is present and processing a hyphen followed by a carriage return code each time a hyphen code is ascertained; and testing each alphameric character entered from the keyboard within said margin control zone to ascertain if a space code is present and substituting and processing a carriage return character therefor except under conditions when a detected space code must be honored.

47. The method according to claim 46 additionally comprising the step of testing each alphameric character entered from the keyboard within said text zone to ascertain if a hyphen code is present and substituting and processing a mandatory hyphen code therefor when the same is ascertained.

48. In an automatic writing system including a microprocessor, a keyboard, a printer and a buffer for storing character information entered from said keyboard, each of which is connected to at least a common data bus and a common instruction word bus, the improvement comprising:

addressable storage means for defining a proportionally spaced printing mode and for causing said printer to operate during printing modes of operation in accordance therewith, said addressable storage means being connected to at least said common data bus and said common instruction word bus;

means at said keyboard for defining a memory backspace function wherein an alphameric character previously entered from the keyboard, printed and stored in said buffer is to be deleted; and comparison means responsive to a definition of said memory backspace function for deleting said previously entered alphameric character from said buffer and returning the print position of said printer to that which obtained prior to the printing of said previously entered alphameric character, said comparison means being connected to at least said common data bus and said common instruction word bus.

49. The automatic writing system according to claim 48 additionally comprising means for storing the width of each character printed in a proportionally spaced printing mode, said means for storing being connected to at least said common data bus and said common instruction word bus, said microprocessor acting upon an entry of a memory backspace function to read the last alphameric character code entered in said buffer and to obtain the width thereof from said means for storing, said microprocessor further acting to cause said printer to escape in a reverse direction as a function of the character width obtained in a proportionally spaced printing mode so as to position the printer carriage to a location corresponding to that which obtained prior to the entry of the alphameric character detected.

50. The automatic wiring system according to claim 49 wherein said means for storing comprises a printer data ROM connected to said common data bus and said common instruction word bus, said printer data ROM storing character information defining each alphameric character to the printer, the width thereof and the hammer force with which printing is to occur.

51. In an automatic writing system including a microprocessor, a keyboard, a printer, a buffer for accumulating and selectively reading character information and means for recording and selectively playing back information entered at said keyboard, each of which is connected to at least a common data bus and a common instruction word bus, the improvement comprising:

means at said keyboard for defining columns in which character information is to be printed and designator codes for specifying character information to be centered within said defined columns upon playback; and storage and register means responsive to defined columns and designator codes upon a playback of recorded information for centering specified character information within the columns defined, said storage and register means being connected to at least said common data bus and said common instruction word bus.

52. The automatic writing system according to claim 51 additionally comprising means for defining a proportionally spaced printing mode and for causing said printer to operate during printing modes of operation, including modes wherein specified character information is centered within the columns defined, in accordance therewith, said means for defining being connected to at least said common data bus and said common instruction word bus.

53. The automatic writing system according to claim 51 additionally comprising tab register means, addressable by said microprocessor, for storing tab locations defined at said keyboard, said tab register means including storage locations therein corresponding to each defined print position of said printer in a line of information and each storage location within said tab register capable of defining the nature of the tab entered, said tab register means being connected to at least said common data bus and said common instruction word bus.

54. The automatic writing system according to claim 53 wherein columns are defined at said keyboard by an insertion of a tab at a print position corresponding to the left hand limit of each column to be defined and a special tab having a differing code designation is inserted at a print position corresponding to the right hand limit of each column to be defined.

55. The automatic writing system according to claim 54 wherein tab and special tab codes are stored in said tab register means and may be recorded in special blocks on a record media by said means for recording and selectively playing back information entered at said keyboard.

56. The automatic writing system according to claim 55 wherein information to be centered within columns upon playback of a record media is recorded by defining columns, inserting a designator code at the beginning of each line to contain column centered information, tabbing to the beginning of a desired column and inserting alphanumeric character information to be centered upon playback at said tab location defined.

57. The automatic writing system according to claim 56 wherein, upon the playback of a recorded information containing alphameric character information to be centered within specified columns, said microprocessor acts to ascertain whether a designator code initiates a line being processed, said microprocessor further acting upon the detection of a designator code to test each code being processed for that line to ascertain whether a tab code is present and if no tab is present to process that character code in a normal manner.

58. The automatic writing system according to claim 57 wherein said microprocessor acts in a playback mode subsequent to a detection of a designator code and a tab code to determine presence within a column by testing the contents of said tab register means to ascertain if the next tab set to the right of the tab detected is a special tab code and if a special tab code is present to ascertain the width of the column defined, the width of the alphameric character information to be centered therein and thereafter to displace the printer to a position wherein the alphameric character information to be centered will be printed through normal processing in a manner to cause the same to be centered within the column defined.

59. The automatic writing system according to claim 58 wherein said microprocessor acts to determine the width of the alphameric character information to be centered by fetching the first character from the buffer following the tab code identifying the column entry, accumulating the width of that alphameric character and each alphameric character thereafter until a column centering breakpoint is ascertained.

60. The automatic writing system according to claim 59 wherein said microprocessor acts to ascertain the presence of a column centering breakpoint by testing each character fetched to determine if a carriage return or tab character is present.

61. A method of automatically centering alphameric character information within defined columns comprising the steps of:

recording alphameric character information to be centered upon playback by:

defining columns at a keyboard by entering a tab at the left hand limit of each column to be defined and a special tab at the right hand limit of each column to be defined;

storing each tab and special tab inserted in a register, initiating each line which is to contain alphameric character information to be centered within a column with a column centering designating code, and entering alphameric character information to be centered by tabbing to the beginning of the column defined and entering the alphameric character information to be centered; and playing back recorded information containing alphameric character information to be centered within defined columns and responding to column centering designating codes, defined columns and alphameric character information to be centered within a defined column to cause printing of said alphameric character information to be centered to occur in a centered manner within the column defined.

62. The method of automatically centering according to claim 61 wherein the step of playing back recorded information and responding thereto comprises the steps of:

playing back a line of recorded information and ascertaining whether that line is initited by a column centering designating code;

if a column centering designating code is ascertained, testing each character thereafter to determine if a tab code is present;

if no tab code is present processing that character in a normal manner, however, if a tab code is ascertained testing the contents of said tab register to determine if the next tab set to the right of the tab detected is a special tab code;

if a special tab is present ascertaining the width of the column defined and the width of the alphameric character information to be centered therein; and displacing the printer to a position wherein the alphanumeric character information to be entered will be printed through normal processing in a manner to cause the same to be centered within the column defined.

63. In an automatic writing system including a microprocessor, a keyboard, a printer, a buffer for accumulating and selectively reading character information and means for recording and selectively playing back information entered at said keyboard, each of which is connected to at least a common data bus and a common instruction word bus, the improvement comprising:

means at said keyboard for defining columns in which columnar data is to be printed and for specifying columnar data to be processed within said columns defined, said columnar data including a plurality of alphameric characters frequently employed in statistical displays; and means responsive upon playback to defined columns and columnar data for causing recorded columnar data to be printed flush to the right hand portion of an associated column defined in such manner that the last character of columnar data inserted for a column is printed flush to the right hand portion of the column defined therefor without regard to any decimal significance associated with said columnar data, said responsive means being connected to at least said common data bus and said common instruction word bus.

64. The automatic writing system according to claim 63 additionally comprising means for defining a proportionally spaced printing mode and for causing said printer to operate during printing modes of operation, including modes wherein specified columnar information is right flushed within the columns defined, in accordance therewith, said means for defining being connected to at least said common data bus and said common instruction word bus.

65. The automatic writing system according to claim 63 additionally comprising tab register means, addressable by said microprocessor, for storing tab locations defined at said keyboard, said tab register means including storage locations therein corresponding to each defined print position of said printer in a line of information and each storage location within said tab register capable of defining the nature of the tab entered, said tab register means being connected to at least said common data bus and said common instruction word bus.

66. The automatic writing system according to claim 65 wherein columns are defined at said keyboard by an insertion of a tab at a print position corresponding to the left hand limit of each column to be defined and a special tab having a differing code designation is inserted at a print position corresponding to the right hand limit of each column to be defined.

67. The automatic writing system according to claim 66 wherein tab and special tab codes are stored in said tab register means and may be recorded in special blocks on a record media by said means for recording and selectively playing back information entered at said keyboard.

68. The automatic writing system according to claim 67 wherein columnar data to be printed flush to the right hand portion of a defined column upon playback of a record media is recorded by defining columns, tabbing to the beginning of a desired column and inserting alphameric character information, including columnar data in sequence to be right flushed upon playback, at said tab location defined.

69. The automatic writing system according to claim 68 wherein, upon playback of recorded information containing columnar data to be right flushed in defined columns, said microprocessor acts to test for each character in line information being processed whether a right flush flag is set, said printer is at the left hand margin or said character is a tab code and if none of these start of column conditions are present to process that character code in a normal manner.

70. The automatic writing system according to claim 69 wherein said microprocessor acts in a playback mode subsequent to a detection of a start of column condition to determine presence within a column by testing the contents of said tab register means to ascertain if the next tab set to the right of the start column condition detected is a special tab code and if a special tab code is present to set said right flush flag.

71. The automatic writing system according to claim 70 wherein said microprocessor acts in a playback mode subsequent to a setting of right flush flat to process data in a defined column normally until columnar data is detected, to accumulate the width of columnar data once the same is detected, and upon a detection of an end of columnar data displacing the printer to a location to the left of the right limit of the column defined so that printing of the columnar data whose width has been accumulated will cause the same to be printed flush to the right limit of the column defined.

72. In an automatic writing system including a microprocessor, a keyboard, a printer and means for recording and selectively playing back information entered at said keyboard, each of which is connected to at least a common data bus and a common instruction word bus, the improvements comprising:

means at said keyboard for defining blocks of format information including descriptive alphameric character information;

means for recording blocks of format information independently of other alphameric character information, said recording means being connected to at least said common data bus and said common instruction word bus;

means at said keyboard for defining a special playback mode for reading blocks of format information; and comparison means responsive to a definition of said special playback mode for causing playing back and printing information contained in said blocks of format information to be printed by said printer and thereby provide a printed log in the form of the descriptive information contained in said blocks of format information, said comparison means being connected to at least said common data bus and said common instruction word bus.

73. The automatic wiring system according to claim 72 wherein said means at said keyboard for defining blocks of format information includes means for entering a format function defining the beginning of a line of format information, said microprocessor being responsive to a detection of a format function to record all information inserted subsequent thereto and prior to a termination code as a specialized line of information.

74. The automatic writing system according to claim 73 wherein a line of format information is initiated by said format function and may include Margin and Tab information to be employed in printing subsequently entered data, alphameric information which may be descriptive of said subsequently entered data and a termination code in the form of a carriage return character.

75. The automatic writing system according to claim 74 wherein said microprocessor does not cause printing of said line of format information unless a code print function is enabled, however, any margin and tab information which may be inserted in said line of format information is set into the system as well as being recorded.

76. The automatic writing system according to claim 75 wherein said keyboard includes means for defining block reference codes to identify blocks of recorded information wherein each block of recorded information includes a plurality of lines of information.

77. The automatic writing system according to claim 76 wherein said microprocessor is responsive to a detection of a block reference code to record said block reference code followed by a sequential reference number as a specialized block number line of information.

78. The automatic writing system according to claim 77 wherein a line of format information to be played back and printed during said special playback mode is recorded immediately after a specialized block number line of information.

79. The automatic writing system according to claim 78 wherein each specialized block number line of information may be located through high speed search techniques.

80. The automatic writing system according to claim 79 wherein said microprocessor is responsive to a definition of said special playback mode to search recorded information until a specialized block number line is located and once located to print the contents of said block number line format and header information contained in any immediately following line of format information and thereafter repeat this operation until an end of recorded information is ascertained.

81. The automatic writing system according to claim 80 wherein said search is conducted at high speed.

82. The automatic writing system according to claim 80 wherein the contents of said block number line and the margin and tab information contained in an immediately following line of format information are printed as separate lines together with approprite indicia defining their nature.

83. The automatic writing system according to claim 82 wherein any alphameric information contained in an immediately following line of format information is also printed as a separate line of information.

84. A method of automatically obtaining a log of format and header information recorded on a record media together with described and formatted document information comprising the steps of:

entering a reference code and sequential block reference number and recording the same in a record media as a specialized block number line of information which may be located through high speed search techniques;

entering a format code immediately following said specialized block number line of information;

setting margins and tab information;

inserting header information associated with following information to be recorded followed by a termination code; and recording said format code, margin and tab information set, header information and termination codes as a specialized format line immediately following said specialized block number line of information.

85. The method of obtaining a log in accordance with claim 84 additionally comprising the steps of:

defining a specialized playback mode for reading blocks of format information;

searching said record media at high speed in response to a definition of said specialized playback mode until a specialized block number line of information is detected;

printing the contents of said block number line and header and format information containing in any immediately following specialized format line; and repeating said searching and printing steps until an end of recorded information is ascertained.

86. In an automatic writing system including a microprocessor, a keyboard, a printer, a buffer for accumulating and selectively reading character information and means for recording and selectively playing back information entered at said keyboard, each of which is connected to at least a common data bus and a common instruction word bus, the improvement comprising:

means at said keyboard for defining a search mode of operation wherein a string of text, starting at any intermediate location in a line of recorded text, may be defined at the keyboard and a block of recorded information searched therefor;

means for storing a string of text entered from the keyboard pursuant to said search mode, said means for storing being connected to at least said common data bus and said common instruction word bus; and comparison means for searching a block of recorded information for the text string defined and terminating said search of said block of recorded information when said defined text string is located, said comparison means being connected to at least said common data bus and said common instruction word bus.

87. The automatic writing system according to claim 86 wherein said means for storing a string of text entered from said keyboard comprises memory storage means addressable by said microprocessor.

88. The automatic writing system according to claim 87 wherein said memory storage means is formed in a portion of a random access memory connected to said common data bus and said common instruction word bus.

89. The automatic writing system according to claim 87 wherein said microprocessor is responsive to a definition of a text string search mode of operation at the keyboard to treat subsequently entered alphameric information as text string information to be located and cause text string information inserted to be loaded as a text string search queue within said memory storage means.

90. The automatic writing system according to claim 89 wherein text string information loaded at said keyboard is only printed if said automatic writing system is established in a code print mode.

91. The automatic writing system according to claim 89 wherein said microprocessor is responsive to a termination code entered at said keyboard to terminate the loading of said text string search queue and initiate a search operation for the text string defined.

92. The automatic writing system according to claim 91 wherein first and second termination codes may be entered at said keyboard, said microprocessor responding to a first termination code for conducting a search for the text string defined in a forward direction and responding to a second termination code for conducting a second termination code for conducting a search for the text string defined in a reverse direction through recorded information.

93. The automatic writing system according to claim 92 wherein said microprocessor is responsive to a first termination code for playing back a line of information and loading said line of information in said buffer, if necessary, thereafter reading each character from said buffer in a forward direction and comparing it with the first character of the text string search queue established until a comparison is obtained and once a comparison is obtained comparing the next character in the buffer with the next character in the text string queue until the entire text string queue is successfully compared to the sequence of characters read from the buffer or a failure to compare occurs.

94. The automatic writing system according to claim 93 wherein upon a failure to compare, the initial character in the sequence of characters read from the buffer is incremented forward through one character position and the comparison operation set forth is repeated, said microprocessor further acting to playback a next line of information and load it into said buffer any time all character information in said buffer has been compared.

95. The automatic writing system according to claim 92 wherein said microprocessor is responsive to a second termination code for playing back a line of information and loading said line of information in said buffer, if necessary, thereafter reading each character from said buffer in a reverse direction and comparing it with the first character of the text string search queue established until a comparison is obtained and once a comparison is obtained comparing the next character in a forward direction in the buffer with the next character in the text string queue until the entire text string queue is successfully compared to the sequence of characters read from the buffer or a failure to compare occurs.

96. The automatic writing system according to claim 95 wherein upon a failure to compare, the initial character in the sequence of characters read from the buffer is decremented through one character position and the comparison operation set forth is repeated, said microprocessor further acting to playback a next line of information by backing up through two lines of information and thereafter reading a line in a forward direction and loading the line read into said buffer any time all character information in said buffer has been compared.

97. The automatic writing system according to claim 94 wherein the contents of the buffer are positioned to the beginning character position of the text string search queue any time a successful comparison of the entire text string search queue is obtained.

98. The automatic writing system according to claim 96 wherein the contents of the buffer are positioned to the beginning character position of the text string queue any time a successful comparison of the entire text string search queue is obtained.

99. A method of conducting a search of a recorded media for a defined string of text comprising the steps of:

defining a search mode at a keyboard wherein a string of text, starting at any intermediate location in a line of recorded text may be defined at the keyboard and a block of recorded information searched therefor;

inserting a string of text at said keyboard starting at any intermediate location in a line of recorded text, storing the string of text inserted at the keyboard in a location not employed for normal processing of keyboard data; and searching a block of recorded information for the text string inserted by comparing information read with text string information stored and terminating said search of said block of recorded information when said defined text string is located.

100. In an automatic writing system including a microprocessor, a keyboard, a printer and magnetic card means for at least playing back information recorded on a plurality of tracks on said magnetic card means, each of which is connected to at least a common data bus and a common instruction word bus, the improvement comprising:

means at said keyboard for defining a track to be located in a search mode of operation;

means at said keyboard for defining a track search mode of operation for stepping from one track on said magnetic card means to a defined track; and comparison means responsive to a definition of said track search mode at said keyboard and said means for defining a track to be located for stepping playback means at said magnetic card means to said defined track on said magnetic card means, said comparison means being connected to at least said common data bus and said common instruction word bus.

101. In an automatic writing system including a microprocessor, a keyboard, a printer and magnetic card means for recording information on a plurality of tracks on said magnetic card means, each of which is connected to at least a common data bus and a common instruction word bus, the improvement comprising:

means at said keyboard for defining a mode of operation wherein codes which are not normally printed have indicia printed therefor as the same are entered at the keyboard; and means responsive to a definition of said code printing mode of operation for causing the track number upon which information recordation is taking place to print out at the end of the entry of a line of information thereon, said responsive means being connected to at least said common data bus and said common instruction word bus.

102. In an automatic writing system including a microprocessor, a keyboard, a printer and means for recording and playing back information entered at said keyboard, each of which is connected to at least a common data bus and a common instruction word bus, the improvement comprising:

means at said keyboard for defining a recordable skip code and a recordable skip-off code; and storage means responsive to a playing back of a recorded skip code for terminating the printing of further recorded character information played back until a skip-off code is detected whereupon printing of recorded information being played back is continued, said storage means being connected to at least said common data bus and said common instruction word bus.

103. In an automatic writing system including a microprocessor, a keyboard, a printer, first means for selectively playing back recorded information and second means for recording and selectively playing back information entered at said keyboard, each of which is connected to at least a common data bus and a common instruction word bus, the improvement comprising:

means at said keyboard for defining a recordable switch and skip code and a recordable skip-off code; and comparison means responsive to a playing back of a recorded switch and skip code for switching playback from one of said first and second means for selectively playing back recorded information to the other and terminating the printing of further recorded character information played back until a skip-off code is detected whereupon printing of recorded information from said other means for selectively playing back recorded information is continued, said comparison means being connected to at least said common data bus and said common instruction word bus.

104. In an automatic writing system including a microprocessor, a keyboard, a printer, a buffer and means for recording and playing back information entered at said keyboard, each of which is connected to at least a common data bus, and a common instruction word bus, the improvement comprising:

means at said keyboard for entering alphanumeric character information to be printed;

means responsive to an entry of alphanumeric character information to cause the same to be printed and loaded in said buffer means, said responsive means being connected to at least said common data bus and said common instruction word bus;

means at said keyboard defining a word underscore encoded function;

means responsive to an entry of a word underscore encoded function for backing up the contents of the buffer until a space code is ascertained and accumulating the width of each character in the buffer through which backing up has occurred, said responsive means being connected to at least said common data bus and said common instruction word bus;

means for comparing the character width accumulated with the width of an underscore code and centering the printer beneath the character if the underscore code exceeds the character width accumulated while displacing the printer beneath the first character code of the characters through which backing up has occurred as a function of the width accumulated if the underscore code width does not exceed the character width accumulated, said comparison means being connected to at least said common data bus and said common instruction word bus; and means for underscoring forward until the original print position at the printer is restored, said means for underscoring overlapping each underscore code printed to obtain maximum uniformity for the word underscored, said underscoring means being connected to at least said common data bus and said common instruction word bus.

105. The automatic writing system according to claim 104 additionally comprising means for escaping said printer so that the first and last underscore character printed for the word underscored are flush to the beginning and ending portions of the word underscored, said means for escaping being connected to at least said common data bus and said common instruction word bus.

106. The automatic writing system according to claim 104 additionally comprising means for rolling the contents of the buffer forward and modifying one bit position within each character returned through so that said character manifests a delineated status, said means for rolling being connected to at least said common data bus and said common instruction word bus.

107. The automatic writing system according to claim 104 additionally comprising:

means at the keyboard for defining a continuous underscore function;

means responsive to the definition of a continuous underscore function at the keyboard for inspecting each subsequent character entered for a line to ascertain if a space code is present and modifying each space code detected to a mandatory space code which may be underscored and inserting said mandatory space code in said buffer in place of the space code entered at the keyboard, said means responsive to the definition of a continuous underscore function being connected to at least said common data bus and said common instruction word bus; and means responsive to a word underscore encoded function for causing all information inserted in a line subsequent to the entry of said continuous underscore code to be delineated and the mode terminated, said means responsive to a word underscore encoded function being connected to at least said common data bus and said common instruction word bus.

108. In an automatic writing system including a microprocessor, a keyboard, a printer, and first and second buffer means and means for recording and playing back information entered at said keyboard, each of which is connected to at least a common data bus and a common instruction word bus, the improvement comprising:

means at said keyboard for defining a justify playback mode of operation wherein line information is printed flush to the right hand margin defined;

means for defining maximum and minimum space widths which may be employed between words printed in a justified format, said defining means being connected to at least said common data bus and said common instruction word bus;

means responsive to a definition of a justify playback mode of operation for playing back a line of recorded information and loading the same into said first buffer means, said responsive means being connected to at least said common data bus and said common instruction word bus;

comparison means for transferring character information from said first buffer means to said second buffer means and testing each character transferred to ascertain if a printable textual character or a breakpoint character at which an end to transferring may occur is present, said comparison means being connected to at least said common data bus and said common instruction word bus;

means for accumulating the width of each printable textual character identified and for counting the number of breakpoint characters identified, said accumulating means being connected to at least said common data bus and said common instruction word bus; and counting means for testing each time a breakpoint character has been identified whether too much text has been accumulated in said second buffer means, said counting means being connected to at least said common data bus and said common instruction word bus.

109. The automatic writing system according to claim 108 additionally comprising:

means for testing the breakpoint, if too much text has not been accumulated, as to whether an end of a paragraph is defined thereby, said testing means being connected to at least said common data bus and said common instruction word bus;

means responsive to a breakpoint defining an end of a paragraph for printing all text accumulated in said second buffer means in a left hand justified manner, said means responsive to a breakpoint defining an end of a paragraph being connected to at least said common data bus and said common instruction word bus; and means responsive to a breakpoint not defining an end of paragraph when too much text has not been accumulated in said second buffer means for modifying said breakpoint character for text zone printing, treating the modified character as a printing character or a space code and causing more character information to be transferred from said first buffer means to said second buffer means, said means responsive to a breakpoint not defining an end of paragraph being connected to at least said common data bus and said common instruction word bus.

110. The automatic writing system according to claim 108 additionally comprising:

means responsive to an indication that too much text has been accumulated in said second buffer means for rolling the contents thereof back through the last breakpoint and revising the contents of the first buffer means in accordance therewith, said responsive means being connected to at least said second buffer means;

means for calculating the width of the interword spaces to be employed in printing the contents of the second buffer means as a line of justified information, said calculating means being connected to at least said common instruction word bus and said common data bus;

means for testing the space width calculated to ensure that the maximum space width defined is not exceeded, said testing means being connected to at least said common instruction word bus; and means responsive to an indication that the maximum space width is not exceeded for inserting a carriage return character in said second buffer means and printing the contents of the second buffer means as a line of justified text flush to a defined right hand margin which exhibits the interword space widths calculated, said responsive means being connected to at least said second buffer means and said means for testing.

111. The automatic writing system according to claim 110 additionally comprising:

means responsive to an indication that the space width calculated exceeds the maximum space width defined for displacing the printer to a scratch area, said responsive means being connected to at least said common data bus; and means responsive to the displacement of the printer to said scratch area for printing the word in the second buffer means preventing justification of the contents thereof with the minimum and maximum space width limits imposed, said last named means further acting to overprint said word with an indicia designating the last character location therein for which line justification may occur employing minimum space widths, said responsive means being connected to at least said common data bus.

112. The automatic writing system according to claim 111 additionally comprising:

means responsive to a printing of said word in said scratch area permitting limited keyboard entry of information to occur, said means responsive to said printing in said scratch area being connected to at least said common data bus;

means responsive to a limit release entry from said keyboard for releasing the maximum space width limit imposed and causing the contents of said second buffer exclusive of said last word and the preceding breakpoint to be printed as a line of justified information, said means responsive to a limit release entry being connected to at least said common data bus and said second buffer.

113. The automatic writing system according to claim 112 additionally comprising:

means responsive to printer positioning information inserted at said keyboard for positioning said printer and the contents of the second buffer means within limits which may permit justification of the contents of the second buffer means to occur, said means responsive to said printer positioning information being connected to at least said common data bus and said second buffer means; and means responsive to intra word line terminating codes entered at the keyboard for causing the contents of the second buffer means up to and including said intra word line terminating code to be printed as a justified line of information, said means reponsive to intra word line terminating codes being connected to at least said common data bus and said second buffer means.

114. The automatic writing system according to claim 108 additionally comprising means at said keyboard for modifying maximum and minimum space widths which may be employed between words printed in a justified format.

115. The automatic writing system according to claim 114 wherein said maximum space width may be independently modified.

116. In an automatic writing system including a microprocessor, a keyboard, a printer, a buffer means and means for recording and playing back information entered at said keyboard, each of which is connected to at least a common data bus and a common instruction word bus, the improvement comprising:

means at said keyboard for defining a centering code for causing information inserted and recorded from said keyboard in association therewith to be centered upon playback;

storage means responsive to each centering code defined at said keyboard, for a line of information and immediately followed by data to be centered, for storing a temporary centering code, the printer position at which it was entered and following data in said buffer means, said storage means being connected to at least said common data bus and said buffer means;

comparison means responsive to an entry of a character indicating an end of a recordable line of data for analyzing line information loaded in said buffer means to ascertain if printable data precedes a temporary centering code, printable data follows data to be centered or more than one temporary centering code followed by data to be centered is present, said comparison means being connected to at least said common data bus and said buffer means; and means responsive to an indication that no printable data precedes or follows a temporary centering code and the associated data to be centered and more than one temporary centering code is not present for converting said temporary centering code in said buffer means to a permanent centering code and modifying said following print position to reflect centering between margins which are set during playback, said means responsive to an indication that no printable data precedes or follows a temporary centering code being connected to at least said common data bus and said buffer means.

117. The automatic writing system according to claim 116 additionally comprising means responsive to an indication that printable data precedes or follows a temporary centering code and the associated data to be centered or more than one temporary centering code is present for converting said temporary centering code in said buffer means to a permanent centering code and retaining said following print position to indicate that centering about that columm position is to occur during playback, said responsive means being connected to at least said common data bus and said buffer means.

118. The automatic writing system according to claim 116 wherein centering codes and backspace codes entered intermediate an initial centering code and data to be centered cause the printer unit to backspace but are not loaded into said buffer means.

119. The automatic writing system according to claim 117 additionally comprising:

means responsive to a playback of a permanent centering code to calculate the width of following data to be centered, said responsive means being connected to at least said common data bus; and means for centering that data about the column position or intermediate the margins set in the manner defined by the position code following said permanent centering code, said centering means being connected to at least said common data bus.

* * * * *